US010175759B2

(12) United States Patent
Chaudhri et al.

(10) Patent No.: US 10,175,759 B2
(45) Date of Patent: Jan. 8, 2019

(54) DEVICES, METHODS, AND GRAPHICAL USER INTERFACES FOR PROVIDING HAPTIC FEEDBACK

(71) Applicant: Apple Inc., Cupertino, CA (US)

(72) Inventors: Imran A. Chaudhri, San Francisco, CA (US); Sebastian J. Bauer, San Francisco, CA (US); Marcos Alonso Ruiz, San Francisco, CA (US); Hugo D. Verweij, San Francisco, CA (US); Gary I. Butcher, Los Gatos, CA (US); Camille Moussette, Los Gatos, CA (US); Jean-Pierre M. Mouilleseaux, Cupertino, CA (US); Madeleine S. Cordier, Cupertino, CA (US); Joshua B. Kopin, Berkeley, CA (US); Jules K. Fennis, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 260 days.

(21) Appl. No.: 15/273,688

(22) Filed: Sep. 22, 2016

(65) Prior Publication Data

US 2017/0357319 A1 Dec. 14, 2017

Related U.S. Application Data

(63) Continuation of application No. 15/272,380, filed on Sep. 21, 2016, now Pat. No. 9,996,157.

(Continued)

(51) Int. Cl.

| | |
|---|---|
| ***G06F 3/01*** | (2006.01) |
| ***G06F 3/0488*** | (2013.01) |

(Continued)

(52) U.S. Cl.

CPC ............ *G06F 3/016* (2013.01); *G06F 3/0412* (2013.01); *G06F 3/0482* (2013.01);

(Continued)

(58) Field of Classification Search

CPC ...................................................... G06F 3/016

(Continued)

(56) References Cited

U.S. PATENT DOCUMENTS

| | | | |
|---|---|---|---|
| 5,959,624 | A | 9/1999 | Johnston, Jr. et al. |
| 5,990,869 | A | 11/1999 | Kubica et al. |

(Continued)

FOREIGN PATENT DOCUMENTS

| | | | |
|---|---|---|---|
| AU | 2016100246 | A4 | 4/2016 |
| CN | 101631162 | A | 1/2010 |

(Continued)

OTHER PUBLICATIONS

Notice of Allowance, dated Oct. 2, 2017, received in U.S. Appl. No. 15/619,359, 9 pages.

(Continued)

*Primary Examiner* — Reza Nabi
(74) *Attorney, Agent, or Firm* — Morgan, Lewis & Bockius LLP

(57) ABSTRACT

An electronic device with a touch-sensitive surface, a display, and tactile output generator(s) displays a user interface including an object and predetermined snap positions. The device detects a first portion of an input by a contact on the object to select the object. In response to detecting the object selection, the device visually indicates the selection and generates a first tactile output. While the object is selected, the device detects a movement of the contact as the second portion of the input by the contact. According to the contact movement, the device moves the object. After detecting the second portion and while the object is proximate to a (Continued)

predetermined snap position, the device detects a third portion of the input by the contact to drop off the object. In response, the device visually indicates the deselection, moves the object to the predetermined snap position; and generates a second tactile output.

54 Claims, 391 Drawing Sheets

Related U.S. Application Data

(60) Provisional application No. 62/384,170, filed on Sep. 6, 2016, provisional application No. 62/349,115, filed on Jun. 12, 2016.

(51) Int. Cl.
*G06F 3/0484* (2013.01)
*G06F 3/0482* (2013.01)
*G06F 3/041* (2006.01)
*G06F 3/0481* (2013.01)
*G06F 3/0485* (2013.01)
*H04M 1/725* (2006.01)

(52) U.S. Cl.
CPC .......... *G06F 3/0485* (2013.01); *G06F 3/0488* (2013.01); *G06F 3/04817* (2013.01); *G06F 3/04845* (2013.01); *G06F 3/04883* (2013.01); *H04M 1/72552* (2013.01); *G06F 2203/04105* (2013.01); *G06F 2203/04806* (2013.01)

(58) Field of Classification Search
USPC .......................................................... 715/702
See application file for complete search history.

(56) References Cited

U.S. PATENT DOCUMENTS 6,424,251 B1 7/2002 Byre
6,433,771 B1 8/2002 Yocum et al.
6,560,165 B1 5/2003 Barker
7,130,664 B1 10/2006 Williams
7,305,257 B2 12/2007 Ladouceur et al.
7,308,253 B2 12/2007 Moody et al.
7,469,381 B2 12/2008 Ording
7,479,949 B2 1/2009 Jobs et al.
7,720,213 B2 5/2010 Desai et al.
7,768,838 B2 8/2010 Aritome
7,809,406 B2 10/2010 Weinans
7,978,183 B2 7/2011 Rosenberg et al.
8,026,814 B1 9/2011 Heinze et al.
8,131,848 B1 3/2012 Denise
8,165,640 B2 4/2012 Mullen
8,204,548 B1 6/2012 Blinn et al.
8,207,832 B2 6/2012 Yun et al.
8,209,606 B2 6/2012 Ording
8,266,550 B1 9/2012 Cleron et al.
8,331,268 B2 12/2012 Hicks, III
8,509,856 B1 8/2013 Blinn et al.
8,548,418 B1 10/2013 Jintaseranee et al.
8,619,051 B2 12/2013 Lacroix et al.
8,624,864 B2 1/2014 Birnbaum et al.
8,659,571 B2 2/2014 Birnbaum et al.
8,676,274 B2 3/2014 Li
8,698,766 B2 4/2014 Ali et al.
8,717,151 B2 5/2014 Forutanpour et al.
8,750,296 B2 6/2014 Bosschaert et al.
8,754,757 B1 6/2014 Ullrich et al.
8,773,356 B2 7/2014 Martin et al.
8,886,252 B2 11/2014 Luke et al.
8,886,576 B1 11/2014 Sanketi et al.
9,088,668 B1 7/2015 Salvador
9,092,953 B1 7/2015 Mortimer et al.
9,100,805 B2 8/2015 Oshita
9,110,529 B2 8/2015 Kido
9,166,823 B2 10/2015 Karmarkar
9,189,932 B2 11/2015 Kerdemelidis
9,247,525 B2 1/2016 Jacobs et al.
9,357,052 B2 5/2016 Ullrich
9,411,422 B1 8/2016 McClendon et al.
9,430,796 B1 8/2016 So
9,509,829 B2 11/2016 Culbert et al.
9,542,820 B2 1/2017 Moussette et al.
9,548,050 B2 1/2017 Gruber et al.
9,690,382 B1 6/2017 Moussette et al.
9,830,784 B2 11/2017 Moussette et al.
9,928,699 B2 3/2018 Moussette et al.
9,984,539 B2 5/2018 Moussette et al.
2001/0002126 A1 5/2001 Rosenberg et al.
2002/0080112 A1 6/2002 Braun et al.
2002/0115478 A1 8/2002 Fujisawa et al.
2004/0088353 A1 5/2004 Mendelsohn et al.
2004/0213401 A1 10/2004 Aupperle et al.
2004/0233161 A1 11/2004 Shahoian et al.
2005/0231489 A1 10/2005 Ladouceur et al.
2005/0275638 A1 12/2005 Kolmykov-Zotov et al.
2005/0285846 A1 12/2005 Funaki
2006/0026521 A1 2/2006 Hotelling et al.
2006/0026535 A1 2/2006 Hotelling et al.
2006/0045252 A1 3/2006 Gorti et al.
2006/0248183 A1 11/2006 Barton
2007/0046627 A1 3/2007 Soh et al.
2007/0055770 A1 3/2007 Karmakar et al.
2007/0088560 A1 4/2007 Mock et al.
2007/0106457 A1 5/2007 Rosenberg
2007/0146316 A1 6/2007 Poupyrev et al.
2007/0193436 A1 8/2007 Chu
2007/0226646 A1 9/2007 Nagiyama et al.
2007/0274503 A1 11/2007 Klemm et al.
2007/0283239 A1 12/2007 Morris
2008/0024459 A1 1/2008 Poupyrev et al.
2008/0122796 A1 5/2008 Jobs et al.
2008/0270931 A1 10/2008 Bamford
2009/0085878 A1 4/2009 Heubel et al.
2009/0128581 A1 5/2009 Brid et al.
2009/0135142 A1 5/2009 Fu et al.
2009/0167509 A1 7/2009 Fadell et al.
2009/0167704 A1 7/2009 Terlizzi et al.
2009/0178008 A1 7/2009 Herz et al.
2009/0215432 A1 8/2009 Matsuoka
2009/0215479 A1 8/2009 Karmarkar
2009/0222902 A1 9/2009 Bender et al.
2009/0231271 A1 9/2009 Heubel et al.
2009/0284463 A1 11/2009 Morimoto et al.
2009/0292990 A1 11/2009 Park et al.
2009/0303031 A1 12/2009 Strohallen et al.
2009/0322497 A1 12/2009 Ku et al.
2009/0325645 A1 12/2009 Bang et al.
2009/0325647 A1 12/2009 Cho et al.
2010/0017489 A1 1/2010 Birnbaum et al.
2010/0099445 A1 4/2010 Song et al.
2010/0114974 A1 5/2010 Jung et al.
2010/0141411 A1 6/2010 Ahn et al.
2010/0144395 A1 6/2010 Komiya
2010/0156818 A1 6/2010 Burrough et al.
2010/0231367 A1 9/2010 Cruz-Hernandez et al.
2010/0231534 A1 9/2010 Chaudhri et al.
2010/0231537 A1* 9/2010 Pisula .................. G06F 3/0481 345/173
2010/0267424 A1 10/2010 Kim et al.
2010/0299638 A1 11/2010 Choi
2010/0302003 A1 12/2010 Zellner
2010/0302042 A1 12/2010 Barnett et al.
2011/0001707 A1 1/2011 Faubert et al.
2011/0017828 A1 1/2011 Pine
2011/0018695 A1 1/2011 Bells et al.
2011/0053577 A1 3/2011 Lee et al.
2011/0074695 A1 3/2011 Rapp et al.
2011/0266375 A1 3/2011 Ono et al.
2011/0081889 A1 4/2011 Gao et al.
2011/0102349 A1 5/2011 Harris
2011/0126148 A1 5/2011 Krishnaraj et al.

(56) References Cited

U.S. PATENT DOCUMENTS

2011/0141142 A1 6/2011 Leffert et al.
2011/0148608 A1 6/2011 Grant et al.
2011/0179388 A1 7/2011 Fleizach et al.
2011/0190595 A1* 8/2011 Bennett .............. A61B 1/00016 600/301
2011/0202843 A1 8/2011 Morris
2011/0210926 A1 9/2011 Pasquero et al.
2011/0252346 A1 10/2011 Chaudhri et al.
2011/0264491 A1 10/2011 Birnbaum et al.
2011/0267181 A1 11/2011 Kildal
2011/0267294 A1 11/2011 Kildal
2011/0270358 A1 11/2011 Davis et al.
2011/0271181 A1 11/2011 Tsai et al.
2011/0279380 A1 11/2011 Weber et al.
2011/0279381 A1 11/2011 Tong et al.
2011/0316698 A1 12/2011 Palin et al.
2012/0019365 A1 1/2012 Tuikka et al.
2012/0026110 A1 2/2012 Yamano
2012/0050324 A1 3/2012 Jeong et al.
2012/0056806 A1 3/2012 Rosenberg et al.
2012/0062491 A1 3/2012 Coni et al.
2012/0105367 A1 3/2012 Son et al.
2012/0174033 A1* 7/2012 Joo ....................... G06F 3/0482 715/831
2012/0191704 A1* 7/2012 Jones ................ G06F 17/30572 707/722
2012/0216139 A1 8/2012 Ording et al.
2012/0229276 A1 9/2012 Ronkainen
2012/0249461 A1 10/2012 Flanagan et al.
2012/0286943 A1* 11/2012 Rothkopf ................. G08B 6/00 340/407.1
2012/0286944 A1 11/2012 Forutanpour et al.
2012/0299857 A1 11/2012 Grant et al.
2012/0299859 A1 11/2012 Kinoshita
2012/0306631 A1 12/2012 Hughes
2012/0306632 A1 12/2012 Fleizach et al.
2012/0306790 A1 12/2012 Kyung et al.
2012/0311477 A1 12/2012 Mattos et al.
2012/0327006 A1 12/2012 Israr et al.
2013/0091462 A1 4/2013 Gray et al.
2013/0167058 A1 6/2013 Levee et al.
2013/0174137 A1 7/2013 Kim
2013/0201115 A1 8/2013 Heubel
2013/0222224 A1 8/2013 Eriksson et al.
2013/0225300 A1 8/2013 Brinlee
2013/0234929 A1 9/2013 Libin
2013/0244633 A1 9/2013 Jacobs et al.
2013/0262298 A1 10/2013 Morley
2013/0265268 A1 10/2013 Okumura et al.
2013/0282325 A1* 10/2013 Takahashi ............... G01P 13/00 702/141
2013/0290442 A1 10/2013 Dgani
2013/0300684 A1 11/2013 Kim et al.
2013/0307786 A1 11/2013 Heubel
2013/0316744 A1 11/2013 Newham et al.
2013/0318437 A1 11/2013 Jung et al.
2013/0321317 A1 12/2013 Hirukawa
2013/0326367 A1 12/2013 Nakamura et al.
2013/0332721 A1* 12/2013 Chaudhri ................ G06F 3/016 713/100
2014/0007005 A1 1/2014 Libin et al.
2014/0024414 A1 1/2014 Fuji
2014/0039900 A1 2/2014 Heubel et al.
2014/0059427 A1 2/2014 Dombrowski et al.
2014/0074716 A1 3/2014 Ni
2014/0075375 A1* 3/2014 Hwang ................. G06F 3/0482 715/784
2014/0082501 A1 3/2014 Bae et al.
2014/0091857 A1 4/2014 Bernstein
2014/0092037 A1 4/2014 Kim
2014/0132568 A1 5/2014 Hirose et al.
2014/0168110 A1 6/2014 Araki et al.
2014/0176415 A1 6/2014 Buuck et al.
2014/0176452 A1 6/2014 Aleksov et al.
2014/0176455 A1 6/2014 Araki et al.
2014/0181222 A1 6/2014 Geris et al.
2014/0181756 A1 6/2014 Kuo
2014/0197946 A1 7/2014 Park et al.
2014/0207880 A1 7/2014 Malkin et al.
2014/0210740 A1 7/2014 Lee
2014/0215494 A1 7/2014 Kim
2014/0218317 A1 8/2014 Aberg et al.
2014/0232657 A1 8/2014 Aviles et al.
2014/0253319 A1 9/2014 Chang
2014/0258857 A1 9/2014 Dykstra-Erickson et al.
2014/0267076 A1 9/2014 Birnbaum et al.
2014/0273858 A1 9/2014 Panther et al.
2014/0281924 A1* 9/2014 Chipman .......... G06F 17/30905 715/236
2014/0292501 A1 10/2014 Lim et al.
2014/0292668 A1 10/2014 Fricklas et al.
2014/0300454 A1 10/2014 Lacroix et al.
2014/0320402 A1 10/2014 Stahlberg
2014/0320431 A1 10/2014 Cruz-Hernandez et al.
2014/0329567 A1 11/2014 Chan et al.
2014/0333564 A1 11/2014 Hong et al.
2014/0340316 A1* 11/2014 Gu .......................... G06F 3/016 345/173
2014/0351698 A1 11/2014 Nakagawa
2014/0358709 A1 12/2014 Wu
2014/0368440 A1 12/2014 Polyakov et al.
2015/0002477 A1 1/2015 Cheatham, III et al.
2015/0020015 A1 1/2015 Zhou
2015/0050966 A1 2/2015 West
2015/0062052 A1* 3/2015 Bernstein .............. G06F 3/0416 345/173
2015/0067495 A1 3/2015 Bernstein et al.
2015/0067496 A1 3/2015 Missig et al.
2015/0067497 A1 3/2015 Cieplinski et al.
2015/0067563 A1 3/2015 Bernstein et al.
2015/0067596 A1* 3/2015 Brown ................. G06F 3/0416 715/808
2015/0070260 A1 3/2015 Saboune et al.
2015/0077335 A1* 3/2015 Taguchi ................. G06F 3/013 345/156
2015/0078586 A1 3/2015 Ang et al.
2015/0089613 A1 3/2015 Tippett et al.
2015/0097657 A1 4/2015 Gandhi et al.
2015/0103028 A1 4/2015 Ruemelin et al.
2015/0116239 A1 4/2015 Kaplan et al.
2015/0123775 A1 5/2015 Kerdemelidis
2015/0134531 A1 5/2015 Xia
2015/0135109 A1* 5/2015 Zambetti ............... G06F 3/0488 715/767
2015/0138046 A1 5/2015 Moon
2015/0145656 A1 5/2015 Levesque et al.
2015/0145657 A1 5/2015 Levesque et al.
2015/0149899 A1 5/2015 Moussette et al.
2015/0153828 A1 6/2015 Monkhouse et al.
2015/0153830 A1 6/2015 Hirose et al.
2015/0156196 A1 6/2015 Kim et al.
2015/0169059 A1 6/2015 Behles et al.
2015/0199172 A1 7/2015 Ringuette et al.
2015/0201065 A1 7/2015 Shim et al.
2015/0227204 A1 8/2015 Gipson et al.
2015/0227280 A1 8/2015 Westerman et al.
2015/0227589 A1 8/2015 Chakrabarti et al.
2015/0234464 A1 8/2015 Yliaho
2015/0244848 A1 8/2015 Park et al.
2015/0253835 A1 9/2015 Yu
2015/0254570 A1 9/2015 Florence et al.
2015/0254947 A1 9/2015 Komori et al.
2015/0261296 A1 9/2015 Yoshikawa
2015/0261387 A1 9/2015 Petersen
2015/0268725 A1 9/2015 Levesque et al.
2015/0286288 A1 10/2015 Lee et al.
2015/0293592 A1 10/2015 Cheong et al.
2015/0301838 A1 10/2015 Steeves
2015/0323996 A1* 11/2015 Obana ..................... G06F 3/016 345/177
2015/0332226 A1 11/2015 Wu et al.
2015/0332565 A1 11/2015 Cho et al.
2015/0346916 A1 12/2015 Jisrawi et al.

(56) References Cited

U.S. PATENT DOCUMENTS

| | | | | |
|---|---|---|---|---|
| 2015/0350146 | A1 | 12/2015 | Cary et al. | |
| 2015/0365306 | A1* | 12/2015 | Chaudhri | G06F 3/0416 715/736 |
| 2016/0007290 | A1 | 1/2016 | Lindemann et al. | |
| 2016/0034253 | A1 | 2/2016 | Bang et al. | |
| 2016/0041750 | A1 | 2/2016 | Cieplinski et al. | |
| 2016/0062464 | A1 | 3/2016 | Moussette et al. | |
| 2016/0062465 | A1 | 3/2016 | Moussette et al. | |
| 2016/0062466 | A1 | 3/2016 | Moussette et al. | |
| 2016/0062590 | A1* | 3/2016 | Karunamuni | G06F 3/0488 715/863 |
| 2016/0063496 | A1 | 3/2016 | Royyuru et al. | |
| 2016/0063825 | A1 | 3/2016 | Moussette et al. | |
| 2016/0063826 | A1 | 3/2016 | Morrell et al. | |
| 2016/0063827 | A1 | 3/2016 | Moussette et al. | |
| 2016/0063828 | A1 | 3/2016 | Moussette et al. | |
| 2016/0063850 | A1 | 3/2016 | Yang et al. | |
| 2016/0065525 | A1* | 3/2016 | Dye | H04L 51/22 715/752 |
| 2016/0123745 | A1 | 5/2016 | Cotier et al. | |
| 2016/0161922 | A1 | 6/2016 | Shin | |
| 2016/0165038 | A1 | 6/2016 | Lim et al. | |
| 2016/0179203 | A1 | 6/2016 | Modarres et al. | |
| 2016/0205244 | A1 | 7/2016 | Dvortsov et al. | |
| 2016/0246376 | A1 | 8/2016 | Birnbaum et al. | |
| 2016/0259499 | A1 | 9/2016 | Kocienda et al. | |
| 2016/0259519 | A1 | 9/2016 | Foss et al. | |
| 2016/0259528 | A1* | 9/2016 | Foss | G06F 3/0482 |
| 2016/0259542 | A1 | 9/2016 | Chaudhri et al. | |
| 2016/0295010 | A1* | 10/2016 | Miller | H04W 4/70 |
| 2016/0313875 | A1 | 10/2016 | Williams et al. | |
| 2016/0342973 | A1* | 11/2016 | Jueng | G06Q 20/085 |
| 2016/0349936 | A1 | 12/2016 | Cho et al. | |
| 2016/0357354 | A1 | 12/2016 | Chen et al. | |
| 2016/0357362 | A1 | 12/2016 | Gauci et al. | |
| 2016/0357363 | A1 | 12/2016 | Decker et al. | |
| 2017/0011210 | A1* | 1/2017 | Cheong | H04W 12/06 |
| 2017/0031495 | A1 | 2/2017 | Smith | |
| 2017/0068511 | A1* | 3/2017 | Brown | G06F 3/167 |
| 2017/0075520 | A1 | 3/2017 | Bauer et al. | |
| 2017/0075534 | A1 | 3/2017 | Leschenko | |
| 2017/0357317 | A1 | 12/2017 | Chaudhri et al. | |
| 2017/0357318 | A1 | 12/2017 | Chaudhri et al. | |
| 2017/0357320 | A1 | 12/2017 | Chaudhri et al. | |
| 2017/0358181 | A1 | 12/2017 | Moussette et al. | |
| 2018/0067557 | A1 | 3/2018 | Robert et al. | |
| 2018/0082552 | A1 | 3/2018 | Moussette et al. | |
| 2018/0129292 | A1 | 5/2018 | Moussette et al. | |
| 2018/0204425 | A1 | 7/2018 | Moussette et al. | |

FOREIGN PATENT DOCUMENTS

| | | | |
|---|---|---|---|
| CN | 101901048 | A | 12/2010 |
| CN | 102484664 | A | 5/2012 |
| CN | 102651920 | A | 8/2012 |
| CN | 103503428 | A | 1/2014 |
| CN | 1038438424 | A | 6/2014 |
| DE | 102010048745 | A1 | 4/2012 |
| EP | 2 141 569 | A2 | 1/2010 |
| EP | 2 194 697 | A1 | 6/2010 |
| EP | 2 328 063 | A1 | 1/2011 |
| EP | 2 386 935 | A1 | 11/2011 |
| EP | 2 434 387 | A2 | 3/2012 |
| EP | 2 733 575 | A1 | 5/2014 |
| EP | 2 821 912 | A1 | 1/2015 |
| EP | 2 827 225 | A2 | 1/2015 |
| EP | 2 846 549 | A1 | 3/2015 |
| EP | 2 847 658 | A1 | 3/2015 |
| EP | 2 857 933 | A1 | 4/2015 |
| EP | 2 977 859 | A1 | 1/2016 |
| GB | 2532766 | A | 6/2016 |
| GB | 2533572 | A | 6/2016 |
| JP | 2000209311 | A | 7/2000 |
| JP | 2004064117 | A | 2/2004 |
| JP | 2004363999 | A | 12/2004 |
| JP | 2010114702 | A | 5/2010 |
| JP | 2010136151 | A | 6/2010 |
| JP | 2011159110 | A | 8/2011 |
| JP | 2013503578 | A | 1/2013 |
| JP | 2013162167 | A | 8/2013 |
| KR | 20130075412 | A | 7/2013 |
| KR | 20140002563 | A | 1/2014 |
| TW | 1388995 | B | 3/2013 |
| WO | WO 01/24158 | A1 | 4/2001 |
| WO | WO 2004/053830 | A1 | 6/2004 |
| WO | WO 2008/075082 | A1 | 6/2008 |
| WO | WO 2012/081182 | A1 | 6/2012 |
| WO | WO 2013/156815 | A1 | 10/2013 |
| WO | WO 2013/169300 | a1 | 11/2013 |
| WO | WO 2013/169852 | A1 | 11/2013 |
| WO | WO 2013/169854 | A2 | 11/2013 |
| WO | WO 2013/169865 | A2 | 11/2013 |
| WO | WO 2013/169875 | A2 | 11/2013 |
| WO | WO 2014/095756 | A1 | 6/2014 |
| WO | WO 2014-105275 | A1 | 7/2014 |
| WO | WO 2015/116056 | A1 | 8/2015 |
| WO | WO 2016/171848 | A1 | 10/2016 |
| WO | WO 2017/027526 | A1 | 2/2017 |

OTHER PUBLICATIONS

Notice of Acceptance, dated Aug. 18, 2017, received in Australian Patent Application No. 2017216447, which corresponds with U.S. Appl. No. 15/270,885, 3 pages.

Notice of Acceptance, dated Aug. 21, 2017, received in Australian Patent Application No. 2017216475, which corresponds with U.S. Appl. No. 15/270,885, 3 pages.

Office Action, dated Aug. 25, 2017, received in European patent Application No. 17177160.3, which corresponds with U.S. Appl. No. 15/270,885, 3 pages.

Notice of Allowance, dated Aug. 21, 2017, received in Australian Application No. 2017213578, which corresponds with U.S. Appl. No. 15/271,073, 3 pages.

Notice of Allowance, dated Sep. 7, 2017, received in Australian Application No. 2017216471, which corresponds with U.S. Appl. No. 15/271,073, 3 pages.

Notice of Allowance, dated Aug. 24, 2017, received in Australian Application No. 2017216453, which corresponds with U.S. Appl. No. 15/271,073, 3 pages.

Office Action, dated Sep. 8, 2017, received in Chinese Application No. 201710735308.4, which corresponds with U.S. Appl. No. 15/271,073, 4 pages.

Office Action, dated Sep. 4, 2017, received in Danish Patent Application No. 201670720, which corresponds with U.S. Appl. No. 15/271,073, 4 pages.

Certificate of Grant, dated Aug. 23, 2017, received in Australian Patent Application No. 20171010920, which corresponds with U.S. Appl. No. 15/272,380, 1 page.

Office Action, dated Oct. 4, 2017, received in Australian Patent Application No. 2017101091, which correspond with U.S. Appl. No. 15/272,380, 8 pages.

Office Action, dated Aug. 28, 2017, received in Danish Patent Application No. 201670729, which corresponds with U.S. Appl. No. 15/272,380, 3 pages.

Office Action, dated Aug. 30, 2017, received in Danish Patent Application No. 201670736, which corresponds with U.S. Appl. No. 15/272,380, 4 pages.

Office Action, dated Aug. 31, 2017, received in Danish Patent Application No. 201670737, which corresponds with U.S. Appl. No. 15/272,380, 4 pages.

Office Action, dated Aug. 31, 2017, received in Danish Patent Application No. 201770372, 10 pages.

Office Action, dated Aug. 6, 2018, received in Danish Patent Application No. 201770369, which corresponds with U.S. Appl. No. 15,619,359, 5 pages.

Office Action, dated Jul. 25, 2018, received in Danish Patent Application No. 201670737, which corresponds with U.S. Appl. No. 15/272,380, 5 pages.

(56) References Cited

OTHER PUBLICATIONS

Final Office Action, dated Jul. 17, 2018, received in Korean Patent Application No. 2017-7005874, which corresponds with U.S. Appl. No. 14/835,708, 3 pages.
Office Action, dated Feb. 14, 2018, received in Danish Patent Application No. 2016-70724, which corresponds with U.S. Appl. No. 15/271,073, 2 pages.
Office Action, dated May 16, 2018, received in Danish Patent Application No. 201670725, which corresponds with U.S. Appl. No. 15/271,073, 2 pages.
Notice of Allowance, dated Mar. 8, 2018, received in U.S. Appl. No. 15/272,380, 11 pages.
Certificate of Grant, dated Apr. 26, 2018, received in Australian Patent Application No. 2018100429, which corresponds with U.S. Appl. No. 15/272,380, 1 page.
Office Action, dated May 31, 2018, received in Australian Patent Application No. 2018100429, which corresponds with U.S. Appl. No. 15/272,380, 5 pages.
Office Action, dated Mar. 9, 2018, received in Danish Patent Application No. 01670729, which corresponds with U.S. Appl. No. 15/272,380, 2 pages.
Office Action, dated May 17, 2018, received in Danish Patent Application No. 01670729, which corresponds with U.S. Appl. No. 15/272,380, 2 pages.
Office Action, dated Mar. 16, 2018, received in Danish Patent Application No. 201670736, which corresponds with U.S. Patent Application No. 15/272,380, 4 pages.
Notice of Acceptance, dated Apr. 5, 2018, received in Australian Patent Application No. 2015312344, which corresponds with U.S. Appl. No. 14/835,708, 5 pages.
Office Action, dated May 11, 2018, received in Japanese Patent Application No. 2017509011, which corresponds with U.S. Appl. No. 14/835,708, 8 pages.
Patent, dated Apr. 11, 2018, received in Taiwanese Patent Application No. 104126890, which corresponds with U.S. Appl. No. 14/835,708, 5 pages.
Examiner's Answer, dated Mar. 21, 2018, received in U.S. Appl. No. 14/869,829, 8 pages.
Notice of Allowance, dated May 29, 2018, received in U.S. Appl. No. 14/869,835, 12 pages.
Office Action, dated Apr. 17, 2018, received in Danish Patent Application No. 201770372, 5 pages.
Office Action, dated Mar. 7, 2018, received in U.S. Appl. No. 15/688,754, 9 pages.
Dosher et al., "Human Interaction with Small Haptic Effects", University of Washington, Seattle, WA, Jun. 2005, 16 pages.
Immersion, "The Value of Haptics", San Jose, California, 2010, 12 pages.
Sulaiman et al., "User Haptic Experience and the Design of Drawing Interfaces", *Interacting with Computers*, http://doi.org/10.1016/j.intcom.2009.11.009, Dec. 5, 2009, 20 pages.
VladMaxSoft, "Make Your iPhone Ring Louder When Inside a Pocket or Bag with Ringing Pocket Tweak", https://www.reddit.com/r/jailbreak/comments/1zj6zx/release_make_your_iphone_ring_louder_when_inside/, Mar. 4, 2014, 8 pages.
Innovation Patent, dated May 18, 2017, received in Australian Patent Application No. 2017100482, which corresponds with U.S. Appl. No. 15/619,359, 1 page.
Office Action, dated Jun. 27, 2017, received in Australian Patent Application No. 2017100482, which corresponds with U.S. Appl. No. 15/619,359, 7 page.
Notice of Allowance, dated Dec. 14, 2016, received in U.S. Appl. No. 15/270,885, 13 pages.
Notice of Allowance, dated Apr. 10, 2017, received in U.S. Appl. No. 15/270,885, 5 pages.
Notice of Allowance, dated Jul. 21, 2017, received in U.S. Appl. No. 15/270,885, 10 pages.
Office Action, dated Jan. 5, 2017, received in Danish Patent Application No. 201670721, which corresponds with U.S. Appl. No. 15/270,885, 7 pages.
Office Action, dated Jul. 20, 2017, received in Danish Patent Application No. 201670721, which corresponds with U.S. Appl. No. 15/270,885, 2 pages.
Office action, dated Jan. 18, 2017, received in Danish Patent Application No. 201670726, which corresponds with U.S. Appl. No. 15/270,885, 7 pages.
Office Action, dated Apr. 5, 2017, received in Danish Patent Application No. 201670726, which corresponds with U.S. Appl. No. 15/270,885, 2 pages.
Notice of Allowance, dated Jul. 18, 2017, received in Danish Patent Application No. 201670726, which corresponds with U.S. Appl. No. 15/270,885, 2 pages.
Office Action, dated Jan. 17, 2017, received in U.S. Appl. No. 15/271,073, 8 pages.
Notice of Allowance, dated May 2, 2017, received in U.S. Appl. No. 15/271,073, 5 pages.
Office Action, dated Jan. 20, 2017, received in Danish Patent Application No. 201670720, which corresponds with U.S. Appl. No. 15/271,073, 9 pages.
Office Action, dated Apr. 5, 2017, received in Danish Patent Application No. 2016-70724, which corresponds with U.S. Appl. No. 15/271,073, 5 pages.
Office Action, dated Aug. 1, 2017, received in Danish Patent Application No. 201670724, which corresponds with U.S. Appl. No. 15/271,073, 5 pages.
Office Action, dated Jan. 25, 2017, received in Danish Patent Application No. 201670725, which corresponds with U.S. Appl. No. 15/271,073, 6 pages.
Office Action, dated Apr. 5, 2017, received in Danish Patent Application No. 201670725, which corresponds with U.S. Appl. No. 15/271,073, 3 pages.
Office Action, dated Feb. 10, 2017, received in U.S. Appl. No. 15/272,380, 18 pages.
Office Action, dated Feb. 23, 2017, received in Danish Patent Application No. 201670729, which corresponds with U.S. Appl. No. 15/272,380, 9 pages.
Office Action, dated Jul. 27, 2017, received in Danish Patent Application No. 201670735, which corresponds with U.S. Appl. No. 15/272,380, 3 pages.
Notice of Allowance, dated Feb. 22, 2017, received in U.S. Appl. No. 15/271,534, 13 pages.
Office Action, dated Jan. 10, 2017, received in U.S. Appl. No. 15/271,653, 9 pages.
Office Action, dated Jan. 27, 2017, received in U.S. Appl. No. 15/271,708, 8 pages.
Notice of Allowance, dated Apr. 5, 2017, received in U.S. Appl. No. 15/271,708, 5 pages.
Office Action, dated Nov. 30, 2015, received in U.S. Appl. No. 14/835,708, 28 pages.
Final Office Action, dated May 20, 2016, received in U.S. Appl. No. 14/835,708, 7 pages.
Notice of Allowance, dated Aug. 29, 2016, received in U.S. Appl. No. 14/835,708, 9 pages.
Office Action, dated Aug. 1, 2016, received in Taiwanese Patent Application No. 104126890, which corresponds with U.S. Appl. No. 14/835,708, 17 pages.
Office Action, dated Dec. 20, 2016, received in Taiwanese Patent Application. No. 104126890, which corresponds with U.S. Appl. No. 14/835,708, 5 pages.
Office Action, dated Dec. 28, 2016, received in Taiwanese Patent Application. No. 104126890, which corresponds with U.S. Appl. No. 14/835,708, 3 pages.
Office action, dated Apr. 5, 2017, received in Taiwanese Patent Application No. 105139726, which corresponds with U.S. Appl. No. 14/835,708, 2 pages.
Notice of Allowance, dated Jul. 21, 2017, received in Taiwanese Patent Application. No. 105139726, which corresponds with U.S. Appl. No. 14/835,708, 6 pages.
Office Action, dated Feb. 12, 2016, received in U.S. Appl. No. 14/869,825, 15 pages.
Final Office Action, dated Jul. 8, 2016, received in U.S. Appl. No. 14/869,825, 20 pages.

(56) References Cited

OTHER PUBLICATIONS

Office Action, dated Dec. 27, 2016, received in U.S. Appl. No. 14/869,825, 27 pages.
Office Action, dated Feb. 12, 2016, received in U.S. Appl. No. 14/869,829, 20 pages.
Final Office Action, dated Aug. 8, 2016, received in U.S. Appl. No. 14/869,829, 28 pages.
Office Action, dated Mar. 7, 2017, received in U.S. Appl. No. 14/869,829, 24 pages.
Final Office Action, dated Jul. 24, 2017, received in U.S. Appl. No. 14/869,829, 30 pages.
Office Action, dated Feb. 18, 2016, received in U.S. Appl. No. 14/869,834, 17 pages.
Final Office Action, dated Aug. 8, 2016, received in U.S. Appl. No. 14/869,834, 22 pages.
Office Action, dated Mar. 7, 2017, received in U.S. Appl. No. 14/869,834, 20 pages.
Final Office Action, dated Jul. 25, 2017, received in U.S. Appl. No. 14/869,834, 18 pages.
Office Action, dated Feb. 17, 2016, received in U.S. Appl. No. 14/869,835, 15 pages.
Final Office Action, dated Aug. 4, 2016, received in U.S. Appl. No. 14/869,835, 21 pages.
Office Action, dated Jan. 6, 2017, received in U.S. Appl. No. 14/869,835, 17 pages.
Final Office Action, dated Jun. 28, 2017, received in U.S. Appl. No. 14/869,835, 24 pages.
Office Action, dated Dec. 30, 2015, received in U.S. Appl. No. 14/869,837, 35 pages.
Final Office Action, dated Jun. 30, 2016, received in U.S. Appl. No. 14/869,837, 37 pages.
Office Action, dated Jan. 17, 2017, received in U.S. Appl. No. 14/869,837, 27 pages.
Notice of Allowance, dated Jul. 31, 2017, received in U.S. Appl. No. 14/869,837, 27 pages.
International Search Report and Written Opinion, dated Mar. 15, 2016, received in International Patent Application No. PCT/US2015/041858, which corresponds with U.S. Appl. No. 14/835,708, 31 pages.
Office Action, dated Jun. 15, 2018, received in Danish Patent Application No. 201670735, which corresponds with U.S. Appl. No. 15/272,380, 2 pages.
Notice of Allowance, dated Jul. 12, 2018, received in U.S. Appl. No. 15/275,083, 22 pages.
Office Action, dated Jul. 20, 2018, received in U.S. Appl. No. 15/905,671, 7 pages.
Notice of Allowance, dated Jan. 31, 2018, received in U.S. Appl. No. 15/619,359, 8 pages.
Office Action, dated Jan. 24, 2018, received in Danish Patent Application No. 201770369, which corresponds with U.S. Appl. No. 15/619,359, 6 pages.
Office Action, dated Dec. 26, 2017, received in Korean Patent Application No. 2017-7005874, which corresponds with U.S. Appl. No. 14/835,708, 11 pages.
Notice of Allowance, dated Nov. 22, 2017, received in U.S. Appl. No. 15/270,885, 5 pages.
Grant, dated Dec. 21, 2017, received in Australian Application No. 2017216447, which corresponds with U.S. Appl. No. 15/270,885, 1 page.
Grant, dated Dec. 21, 2017, received in Australian Application No. 2017216475, which corresponds with U.S. Appl. No. 15/270,885, 1 page.
Patent, dated Oct. 16, 2017, received in Danish Patent Application No. 201670726, which corresponds with U.S. Appl. No. 15/270,885, 2 pages.
Office Action, dated Jan. 24, 2018, received in European Patent Application No. 17177160.3, which corresponds with U.S. Appl. No. 15/270,885, 4 pages.
Grant, dated Dec. 21, 2017, received in Australian Application No. 2017213578, which corresponds with U.S. Appl. No. 15/271,073, 1 page.
Grant, dated Dec. 21. 2017, received in Australian Application No. 2017216471, which corresponds with U.S. Appl. No. 15/271,073, 1 page.
Grant, dated Dec. 21. 2017, received in Australian Application No. 2017216453, which corresponds with U.S. Appl. No. 15/271,073, 1 page.
Notice of Allowance, dated Dec. 6, 2017, received in U.S. Appl. No. 15/272,380, 11 pages.
Office Action, dated Dec. 7, 2017, received in Danish Patent Application No. 201670735, which corresponds with U.S. Appl. No. 15/272,380, 3 pages.
Office Action, dated Nov. 22, 2017, received in Chinese Patent Application No. 201710736331.5, which corresponds with U.S. Appl. No. 15/271,108, 3 pages.
Office Action, dated Nov. 30, 2017, received in U.S. Appl. No. 14/869,835, 8 pages.
International Search Report and Written Opinion, dated Nov. 29, 2017, received in International Patent Application No. PCT/US2017/037004, which corresponds with U.S. Appl. No. 15/619,359, 21 pages.
Invitation to Pay Additional Fees, dated Nov. 8, 2017, received in International Patent Application No. PCT/US2017/045152, which corresponds with U.S. Appl. No. 15/270,885, 17 pages.
International Search Report and Written Opinion, dated Jan. 18, 2018, received in International Patent Application No. PCT/US2017/045152, which corresponds with U.S. Appl. No. 15/270,885, 20 pages.
Extended European Search Report, dated Jan. 10, 2018, received in European Patent Application No. 17186196.6, which corresponds with U.S. Appl. No. 15/271,073, 8 pages.
Extended European Search Report, dated Jan. 9, 2018, received in European Patent Application No. 17186312.9, which corresponds with U.S. Appl. No. 15/271,073, 6 pages.
Extended European Search Report, dated Jan. 5, 2018, received in European Patent Application No. 17186313.7, which corresponds with U.S. Appl. No. 15/271,073, 9 pages.
International Search Report and Written Opinion, dated Jan. 16, 2018, received in International Patent Application No. PCT/US2017/045740, which corresponds with U.S. Appl. No. 15/271,073, 19 pages.
International Search Report and Written Opinion, dated Jan. 18, 2018, received in International Patent Application No. PCT/US2017/044851, which corresponds with U.S. Appl. No. 15/272,380, 17 pages.
Certificate of Examination, dated Oct. 27, 2017, received in Australian Patent Application No. 2017100482, which corresponds with U.S. Appl. No. 15/619,359, 1 page.
Decision to Grant, dated Oct. 25, 2017, received in Danish Patent Application No. 201670721, which corresponds with U.S. Appl. No. 15/270,885, 2 pages.
Office Action, dated Oct. 12, 2017, received in Danish Patent Application No. 201670725, which corresponds with U.S. Appl. No. 15/271,073, 3 pages.
Office Action, dated Sep. 13, 2017, received in Chinese Patent Application No. 201710728497.2, which corresponds with U.S. Appl. No. 15/271,653, 3 pages.
Office Action, dated Oct. 30, 2017, received in Australian Patent Application No. 2015312344, which corresponds with U.S. Appl. No. 14/835,708, 2 pages.
Patent, dated Nov. 1, 2017, received in Taiwanese Patent Application No. 105139726, which corresponds with U.S. Appl. No. 14/835,708, 5 pages.
Notice of Allowance, dated Nov. 7, 2017, received in U.S. Appl. No. 14/869,834, 9 pages.
Extended European Search Report, dated Oct. 20, 2017, received in European Patent Application No. 17177493.8, 6 pages.
Office Action (Search Report), dated Jan. 24, 2017, received in Danish Patent Application No. 201670735, which corresponds with U.S. Appl. No. 15/272,380, 8 pages.

(56) References Cited

OTHER PUBLICATIONS

Office Action (Search Report), dated Jan. 11, 2017, received in Danish Patent Application No. 201670736, which corresponds with U.S. Appl. No. 15/272,380, 11 pages.
Office Action (Search Report), dated Jan. 30, 2017, received in Danish Patent Application No. 201670737, which corresponds with U.S. Appl. No. 15/272,380, 9 pages.
Office Action, dated Aug. 14, 2018, received in Danish Patent Application No. 201670720, which corresponds with U.S. Appl. No. 15/271,073, 2 pages.
Certificate of Examination, dated Aug. 7, 2018, received in Australian Patent Application No. 2018100429, which corresponds with U.S. Appl. No. 15/272,380, 1 page.
Notice of Allowance, dated Aug. 27, 2018, received in U.S. Appl. No. 15/688,754 (7507), 5 pages.
Certificate of Grant, dated Aug. 2, 2018, received in Australian Patent Application No. 2015312344 (7467AU), which corresponds with U.S. Appl. No. 14/835,708, 1 page.
International Search Report and Written Opinion, dated Aug. 22, 2018, received in International Patent Application No. PCT/US2018032936 (7493WO), which corresponds with U.S. Appl. No. 15/972,040, 14 pages.

* cited by examiner

First Click (B)

Time T=$T_0$

Time $T=T_0+t_1$

Time $T=T_0+t_1+t_2$, $t_2 \geq$ threshold

Time $T=T_0$ $T = T_0 + t_4$, $t_4 \geq$ threshold $T=T_0+t_5$, $t_5 \geq$ threshold $T=T_0$ $T=T_0+t_6$ $T=T_0+t_6+t_7$, $t_7 <$ threshold $T=T_0+t_6+t_7+t_8$, $t_7+t_8 \geq$ threshold

Figure 20A:
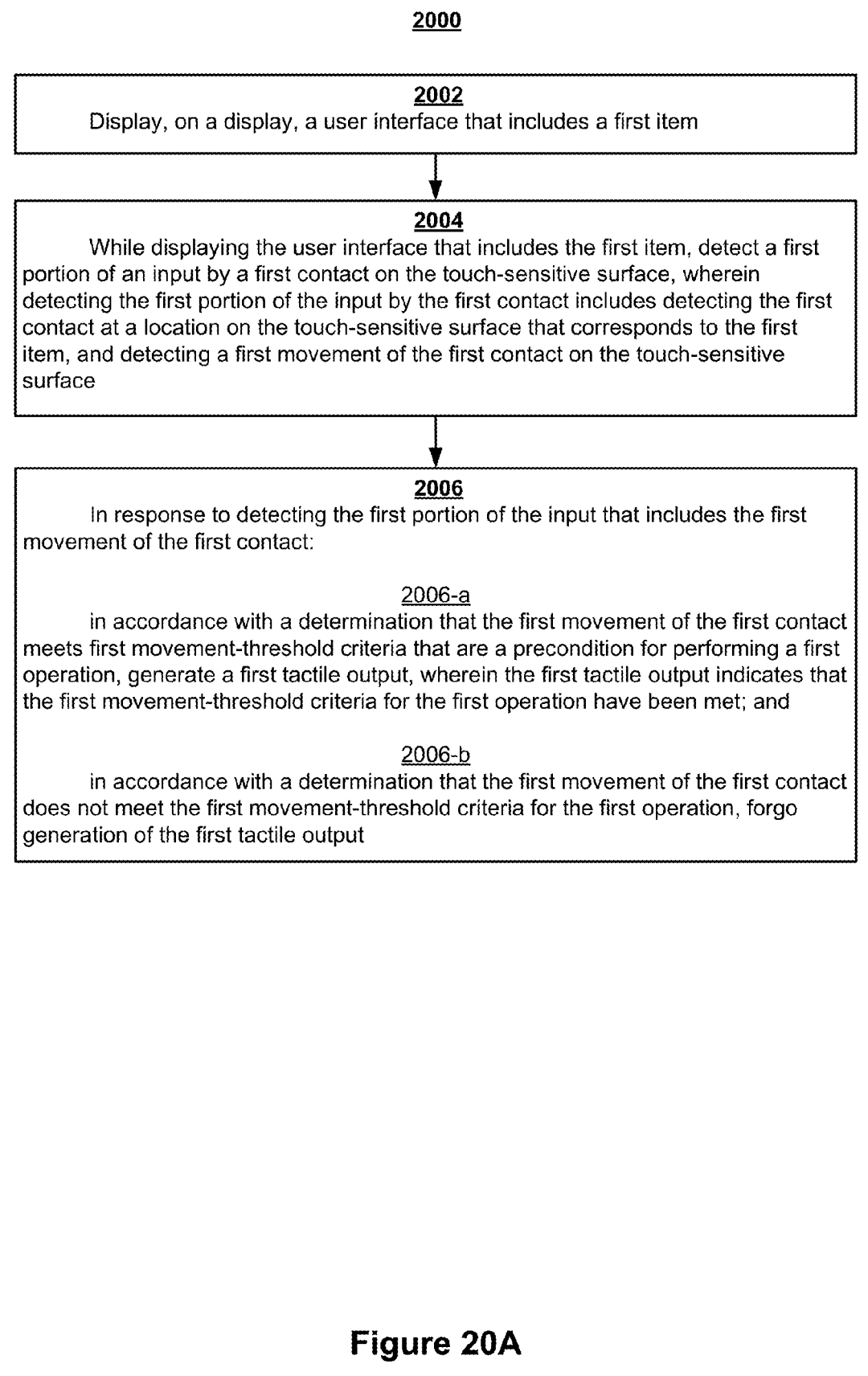

2000

2002
Display, on a display, a user interface that includes a first item

↓

2004
While displaying the user interface that includes the first item, detect a first portion of an input by a first contact on the touch-sensitive surface, wherein detecting the first portion of the input by the first contact includes detecting the first contact at a location on the touch-sensitive surface that corresponds to the first item, and detecting a first movement of the first contact on the touch-sensitive surface

↓

2006
In response to detecting the first portion of the input that includes the first movement of the first contact:

2006-a
in accordance with a determination that the first movement of the first contact meets first movement-threshold criteria that are a precondition for performing a first operation, generate a first tactile output, wherein the first tactile output indicates that the first movement-threshold criteria for the first operation have been met; and 2006-b
in accordance with a determination that the first movement of the first contact does not meet the first movement-threshold criteria for the first operation, forgo generation of the first tactile output

Figure 20B:
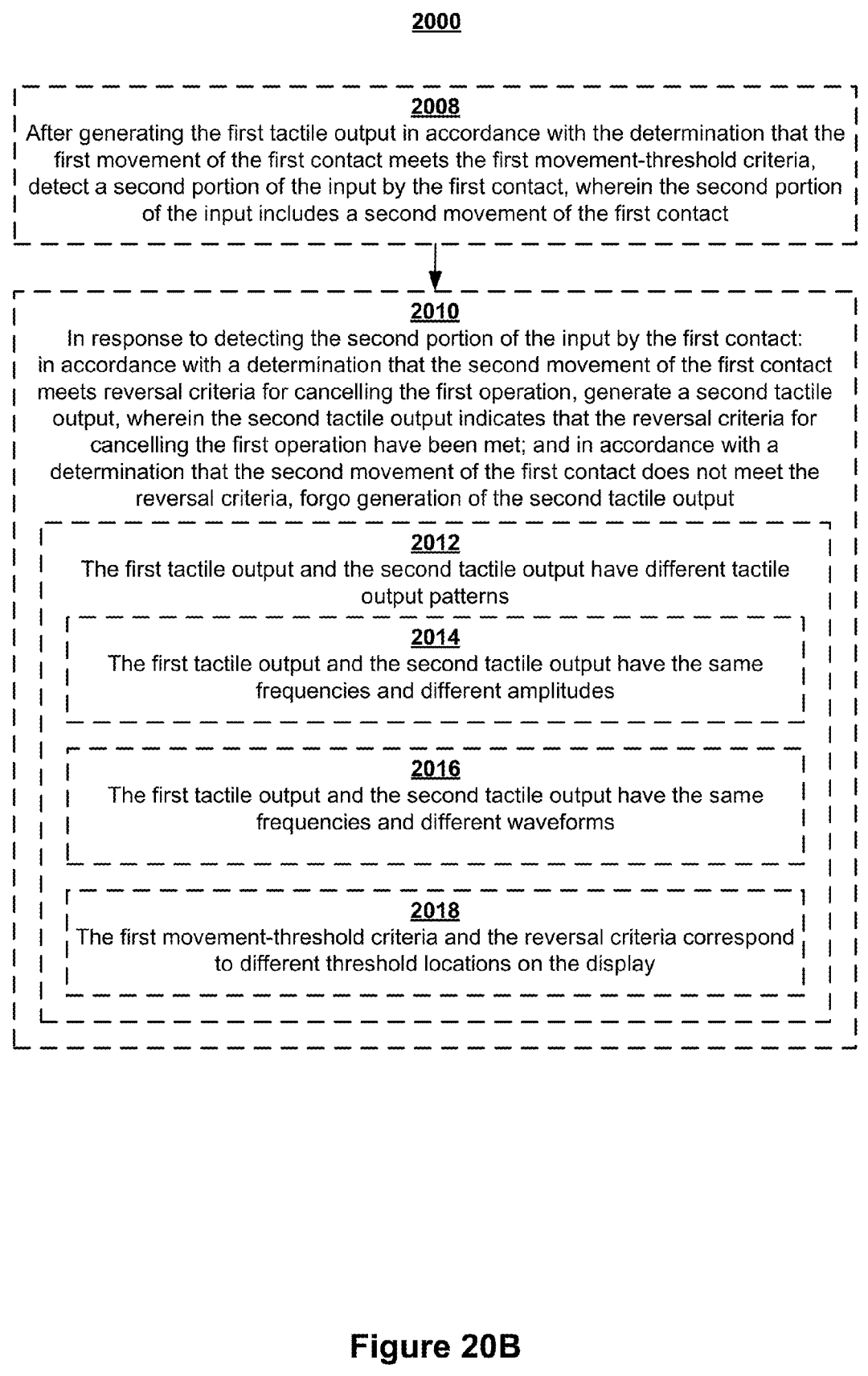

2008
After generating the first tactile output in accordance with the determination that the first movement of the first contact meets the first movement-threshold criteria, detect a second portion of the input by the first contact, wherein the second portion of the input includes a second movement of the first contact

2010
In response to detecting the second portion of the input by the first contact: in accordance with a determination that the second movement of the first contact meets reversal criteria for cancelling the first operation, generate a second tactile output, wherein the second tactile output indicates that the reversal criteria for cancelling the first operation have been met; and in accordance with a determination that the second movement of the first contact does not meet the reversal criteria, forgo generation of the second tactile output

2012
The first tactile output and the second tactile output have different tactile output patterns

2014
The first tactile output and the second tactile output have the same frequencies and different amplitudes

2016
The first tactile output and the second tactile output have the same frequencies and different waveforms

2018
The first movement-threshold criteria and the reversal criteria correspond to different threshold locations on the display

Figure 20C:
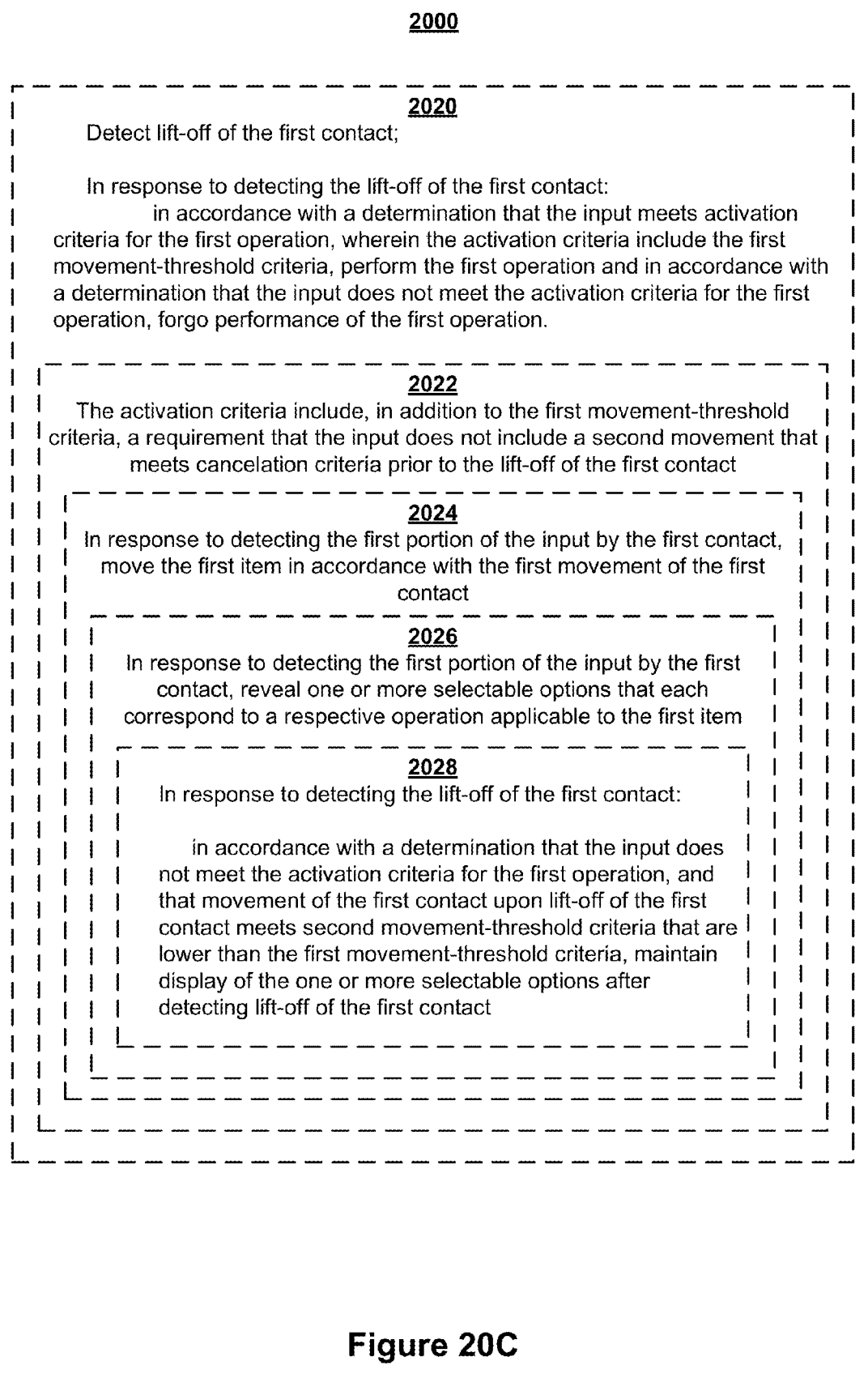

Detect lift-off of the first contact;

In response to detecting the lift-off of the first contact:
in accordance with a determination that the input meets activation criteria for the first operation, wherein the activation criteria include the first movement-threshold criteria, perform the first operation and in accordance with a determination that the input does not meet the activation criteria for the first operation, forgo performance of the first operation.

2022

The activation criteria include, in addition to the first movement-threshold criteria, a requirement that the input does not include a second movement that meets cancelation criteria prior to the lift-off of the first contact

2024

In response to detecting the first portion of the input by the first contact, move the first item in accordance with the first movement of the first contact

2026

In response to detecting the first portion of the input by the first contact, reveal one or more selectable options that each correspond to a respective operation applicable to the first item

2028

In response to detecting the lift-off of the first contact:

in accordance with a determination that the input does not meet the activation criteria for the first operation, and that movement of the first contact upon lift-off of the first contact meets second movement-threshold criteria that are lower than the first movement-threshold criteria, maintain display of the one or more selectable options after detecting lift-off of the first contact

Figure 20D:
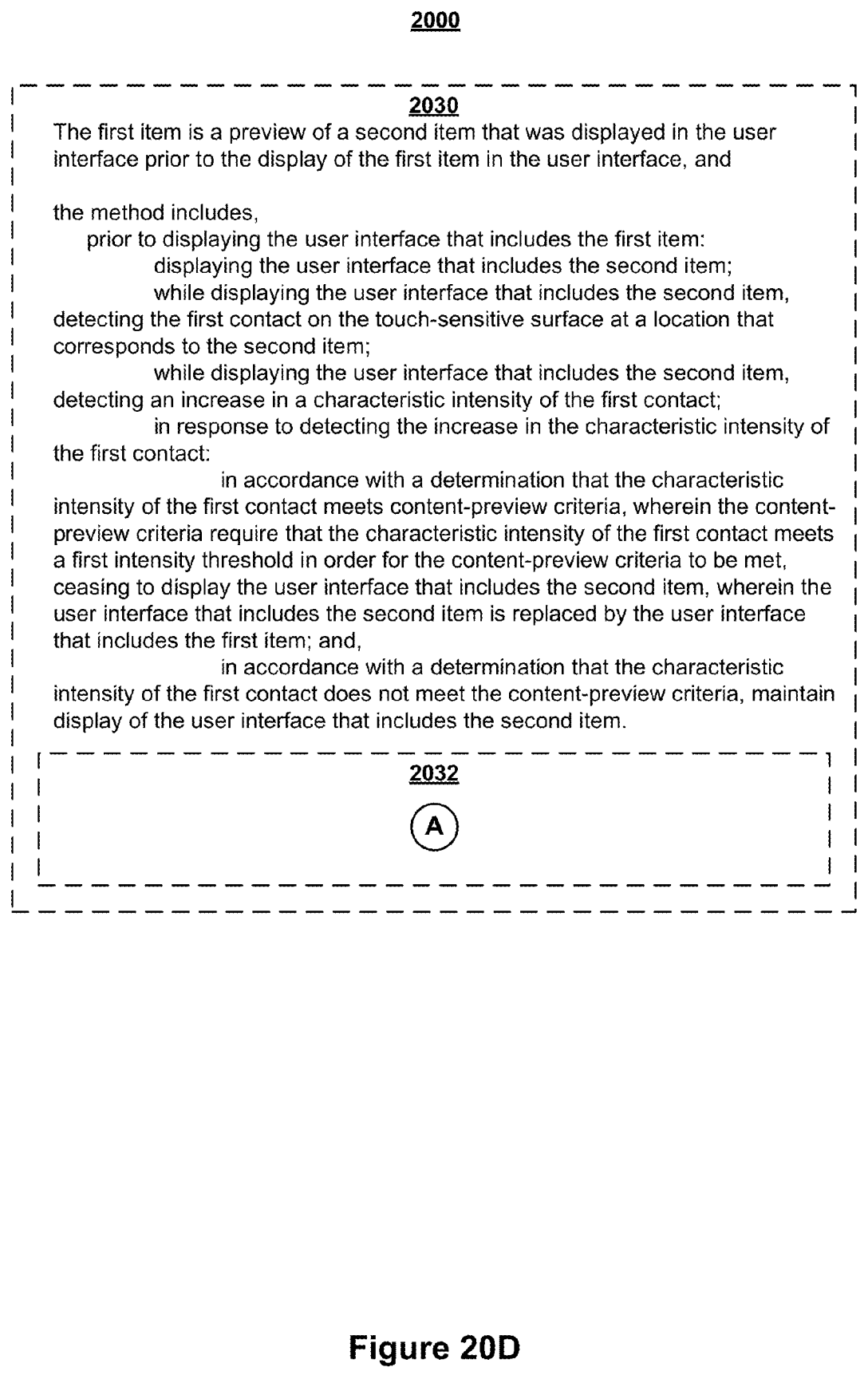

The first item is a preview of a second item that was displayed in the user interface prior to the display of the first item in the user interface, and the method includes,
prior to displaying the user interface that includes the first item:
displaying the user interface that includes the second item;
while displaying the user interface that includes the second item, detecting the first contact on the touch-sensitive surface at a location that corresponds to the second item;
while displaying the user interface that includes the second item, detecting an increase in a characteristic intensity of the first contact;
in response to detecting the increase in the characteristic intensity of the first contact:
in accordance with a determination that the characteristic intensity of the first contact meets content-preview criteria, wherein the content-preview criteria require that the characteristic intensity of the first contact meets a first intensity threshold in order for the content-preview criteria to be met, ceasing to display the user interface that includes the second item, wherein the user interface that includes the second item is replaced by the user interface that includes the first item; and,
in accordance with a determination that the characteristic intensity of the first contact does not meet the content-preview criteria, maintain display of the user interface that includes the second item.

Figure 20E:
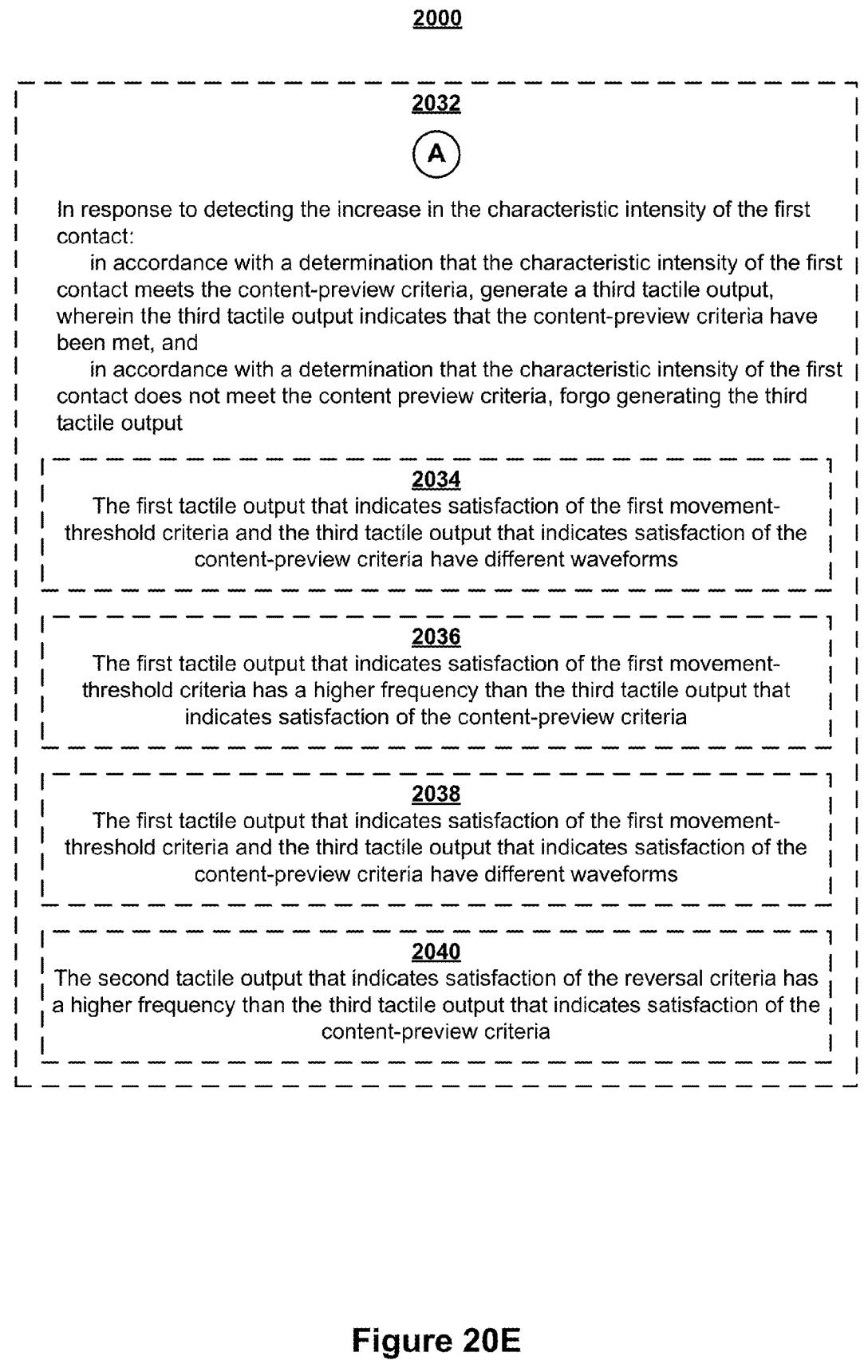

In response to detecting the increase in the characteristic intensity of the first contact:

in accordance with a determination that the characteristic intensity of the first contact meets the content-preview criteria, generate a third tactile output, wherein the third tactile output indicates that the content-preview criteria have been met, and in accordance with a determination that the characteristic intensity of the first contact does not meet the content preview criteria, forgo generating the third tactile output

2034

The first tactile output that indicates satisfaction of the first movement-threshold criteria and the third tactile output that indicates satisfaction of the content-preview criteria have different waveforms

2036

The first tactile output that indicates satisfaction of the first movement-threshold criteria has a higher frequency than the third tactile output that indicates satisfaction of the content-preview criteria

2038

The first tactile output that indicates satisfaction of the first movement-threshold criteria and the third tactile output that indicates satisfaction of the content-preview criteria have different waveforms

2040

The second tactile output that indicates satisfaction of the reversal criteria has a higher frequency than the third tactile output that indicates satisfaction of the content-preview criteria

Figure 20F:
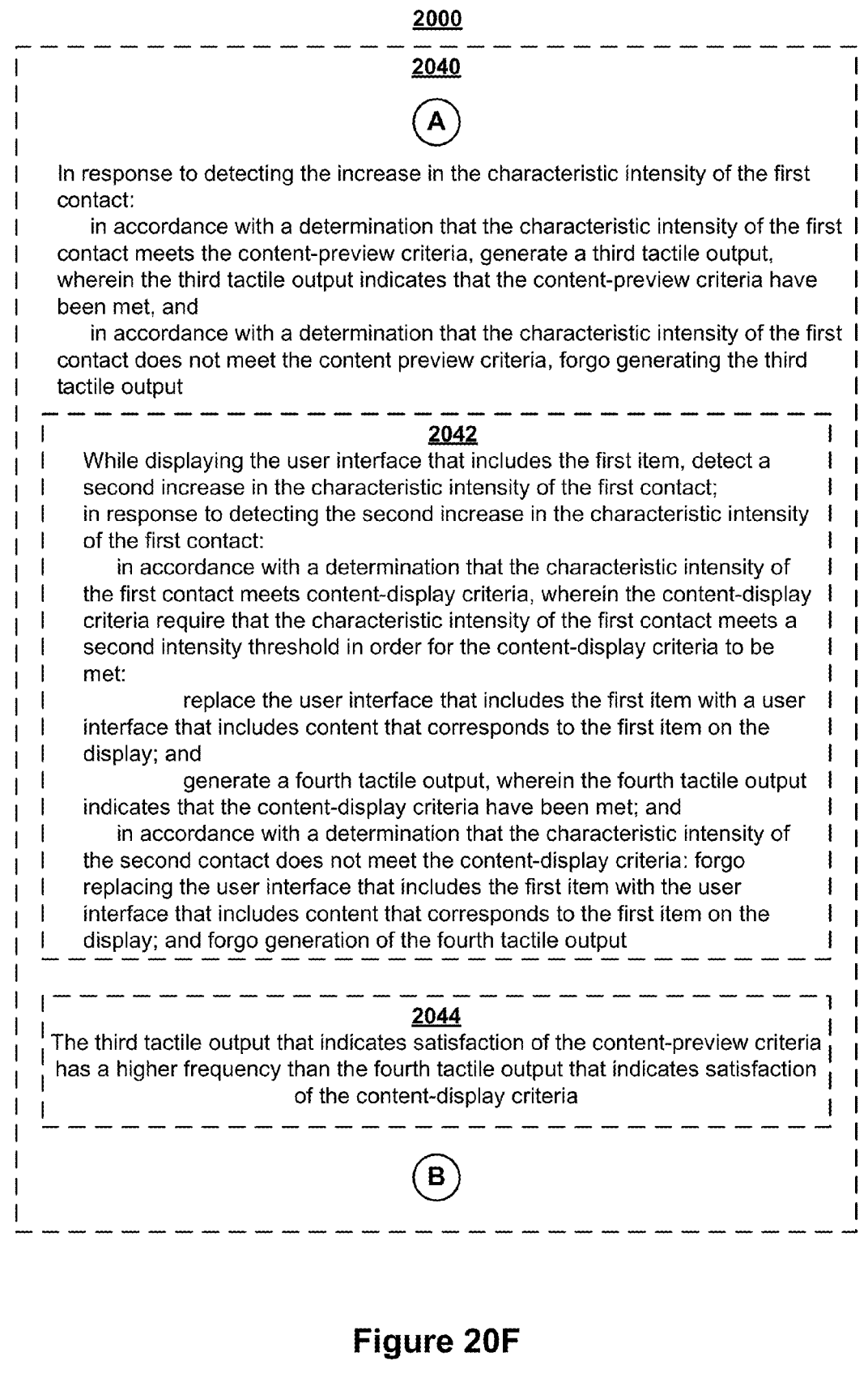

In response to detecting the increase in the characteristic intensity of the first contact:

in accordance with a determination that the characteristic intensity of the first contact meets the content-preview criteria, generate a third tactile output, wherein the third tactile output indicates that the content-preview criteria have been met, and in accordance with a determination that the characteristic intensity of the first contact does not meet the content preview criteria, forgo generating the third tactile output

2042

While displaying the user interface that includes the first item, detect a second increase in the characteristic intensity of the first contact;

in response to detecting the second increase in the characteristic intensity of the first contact:

in accordance with a determination that the characteristic intensity of the first contact meets content-display criteria, wherein the content-display criteria require that the characteristic intensity of the first contact meets a second intensity threshold in order for the content-display criteria to be met:

replace the user interface that includes the first item with a user interface that includes content that corresponds to the first item on the display; and generate a fourth tactile output, wherein the fourth tactile output indicates that the content-display criteria have been met; and in accordance with a determination that the characteristic intensity of the second contact does not meet the content-display criteria: forgo replacing the user interface that includes the first item with the user interface that includes content that corresponds to the first item on the display; and forgo generation of the fourth tactile output

2044

The third tactile output that indicates satisfaction of the content-preview criteria has a higher frequency than the fourth tactile output that indicates satisfaction of the content-display criteria (B)

Figure 20G:
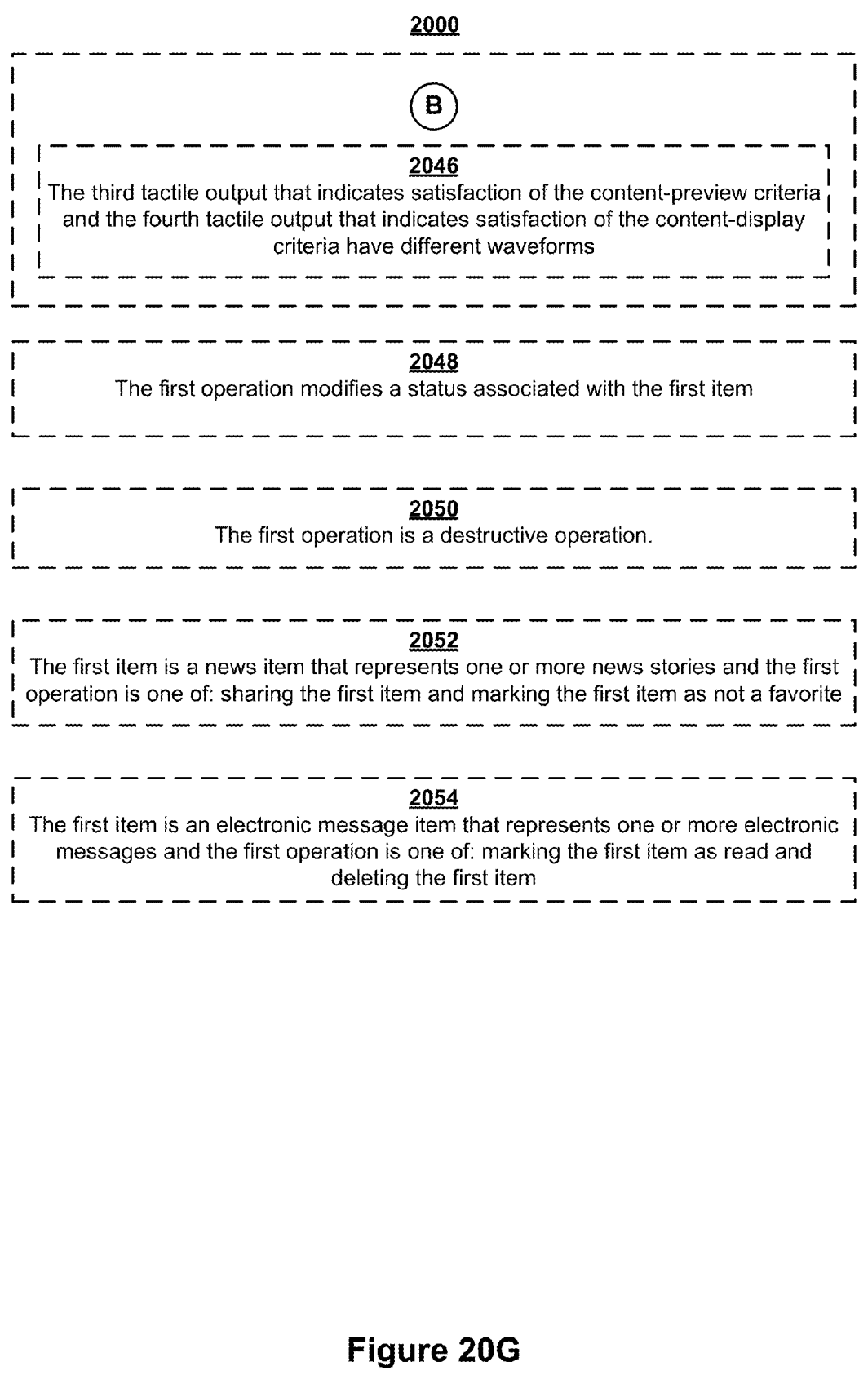

2046
The third tactile output that indicates satisfaction of the content-preview criteria and the fourth tactile output that indicates satisfaction of the content-display criteria have different waveforms 2048
The first operation modifies a status associated with the first item 2050
The first operation is a destructive operation.

2052
The first item is a news item that represents one or more news stories and the first operation is one of: sharing the first item and marking the first item as not a favorite 2054
The first item is an electronic message item that represents one or more electronic messages and the first operation is one of: marking the first item as read and deleting the first item

Figure 22A:
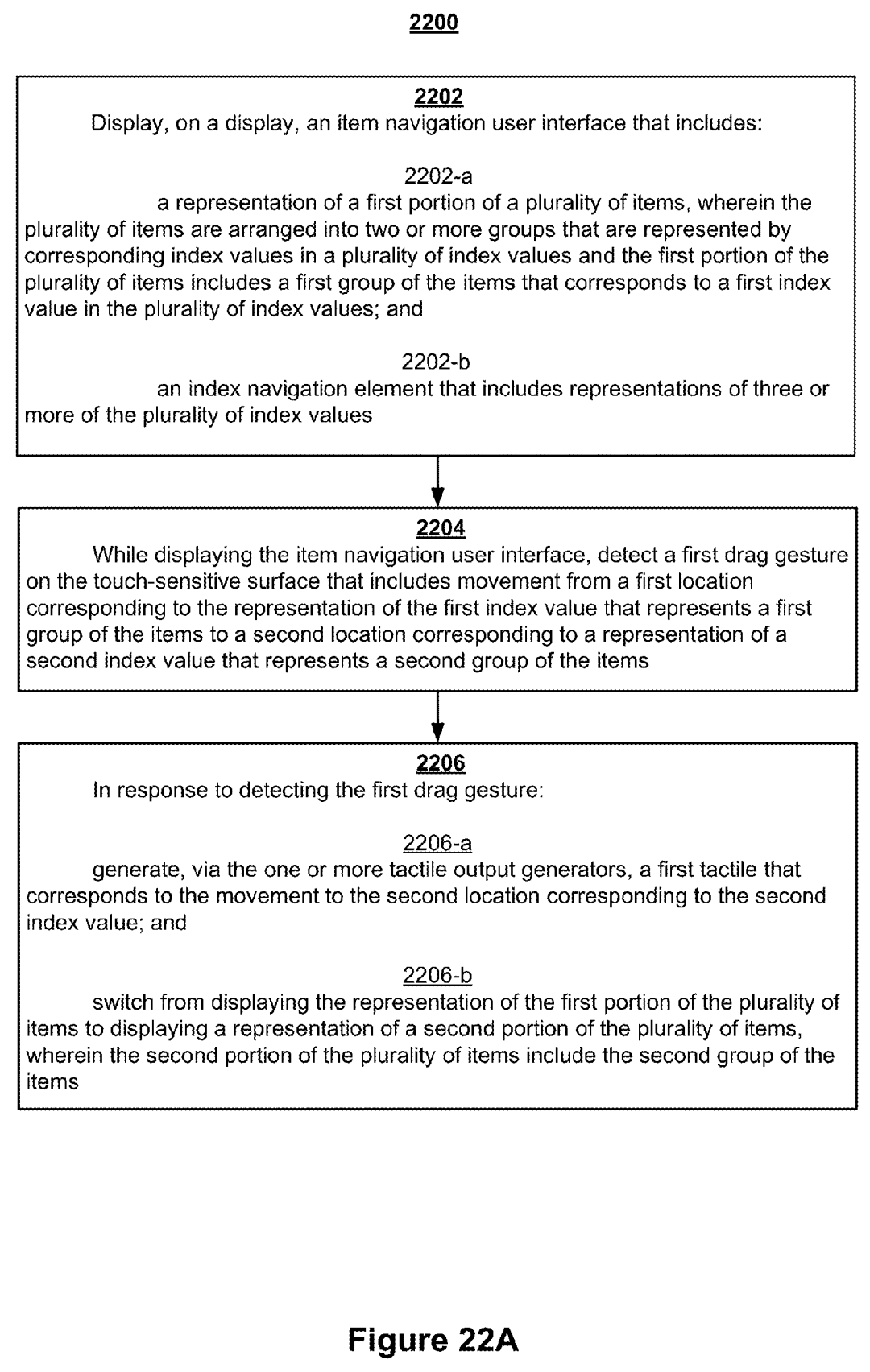

2202
Display, on a display, an item navigation user interface that includes:

2202-a
a representation of a first portion of a plurality of items, wherein the plurality of items are arranged into two or more groups that are represented by corresponding index values in a plurality of index values and the first portion of the plurality of items includes a first group of the items that corresponds to a first index value in the plurality of index values; and 2202-b
an index navigation element that includes representations of three or more of the plurality of index values

↓

2204
While displaying the item navigation user interface, detect a first drag gesture on the touch-sensitive surface that includes movement from a first location corresponding to the representation of the first index value that represents a first group of the items to a second location corresponding to a representation of a second index value that represents a second group of the items

↓

2206
In response to detecting the first drag gesture:

2206-a
generate, via the one or more tactile output generators, a first tactile that corresponds to the movement to the second location corresponding to the second index value; and 2206-b
switch from displaying the representation of the first portion of the plurality of items to displaying a representation of a second portion of the plurality of items, wherein the second portion of the plurality of items include the second group of the items

Figure 22B:
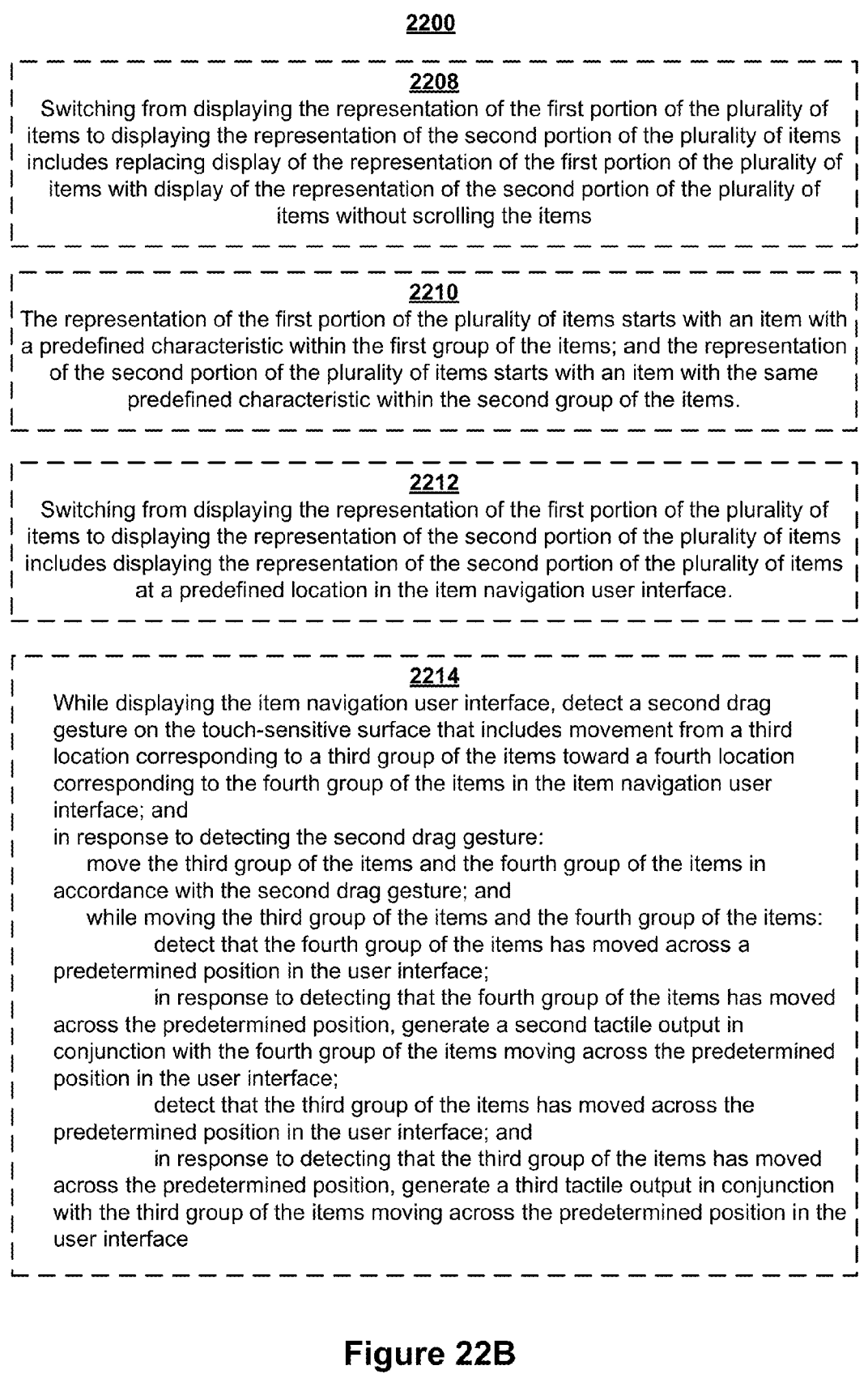

2208
Switching from displaying the representation of the first portion of the plurality of items to displaying the representation of the second portion of the plurality of items includes replacing display of the representation of the first portion of the plurality of items with display of the representation of the second portion of the plurality of items without scrolling the items 2210
The representation of the first portion of the plurality of items starts with an item with a predefined characteristic within the first group of the items; and the representation of the second portion of the plurality of items starts with an item with the same predefined characteristic within the second group of the items.

2212
Switching from displaying the representation of the first portion of the plurality of items to displaying the representation of the second portion of the plurality of items includes displaying the representation of the second portion of the plurality of items at a predefined location in the item navigation user interface.

2214
While displaying the item navigation user interface, detect a second drag gesture on the touch-sensitive surface that includes movement from a third location corresponding to a third group of the items toward a fourth location corresponding to the fourth group of the items in the item navigation user interface; and
in response to detecting the second drag gesture:
move the third group of the items and the fourth group of the items in accordance with the second drag gesture; and
while moving the third group of the items and the fourth group of the items:
detect that the fourth group of the items has moved across a predetermined position in the user interface;
in response to detecting that the fourth group of the items has moved across the predetermined position, generate a second tactile output in conjunction with the fourth group of the items moving across the predetermined position in the user interface;
detect that the third group of the items has moved across the predetermined position in the user interface; and
in response to detecting that the third group of the items has moved across the predetermined position, generate a third tactile output in conjunction with the third group of the items moving across the predetermined position in the user interface

Figure 22C:
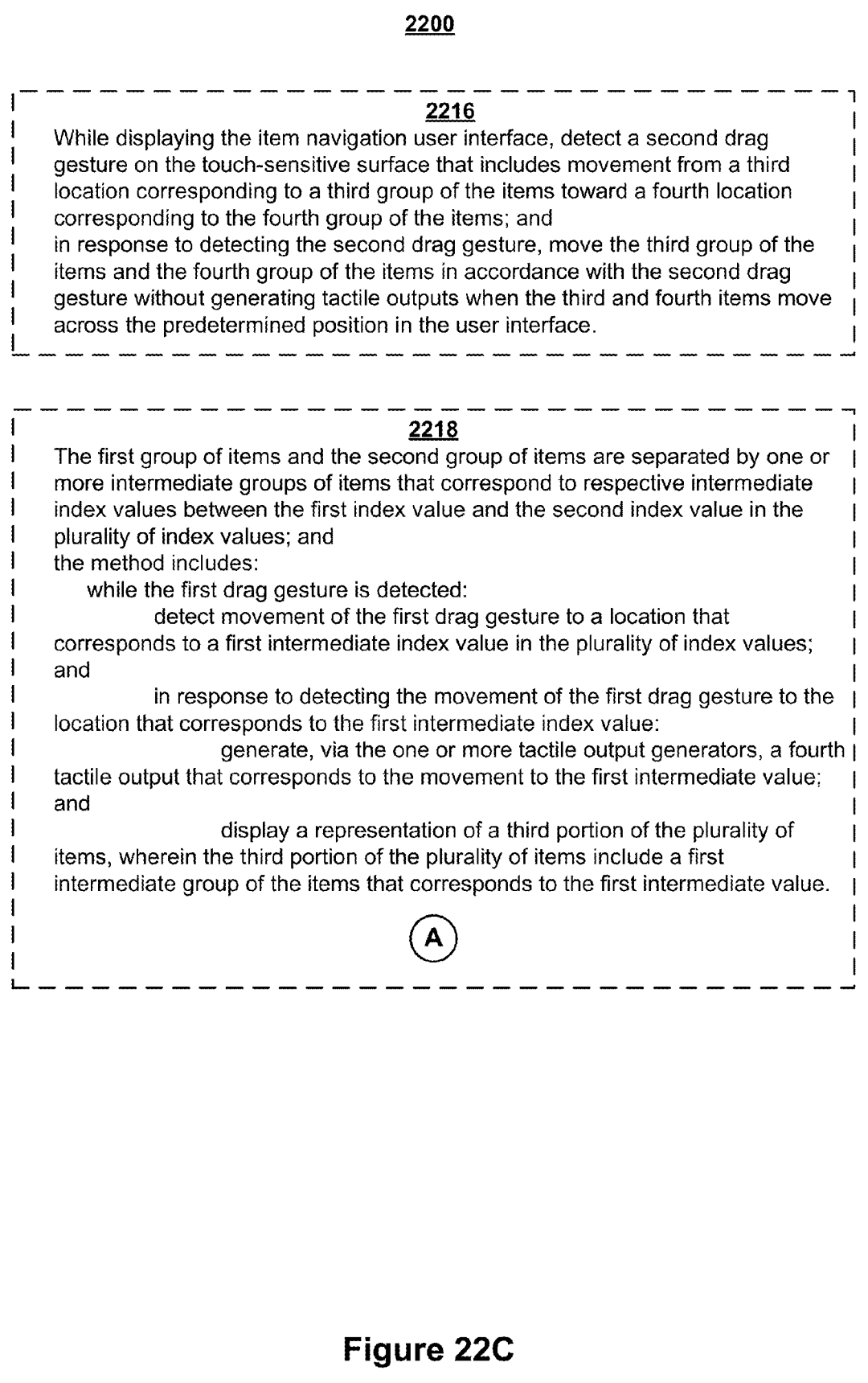

While displaying the item navigation user interface, detect a second drag gesture on the touch-sensitive surface that includes movement from a third location corresponding to a third group of the items toward a fourth location corresponding to the fourth group of the items; and in response to detecting the second drag gesture, move the third group of the items and the fourth group of the items in accordance with the second drag gesture without generating tactile outputs when the third and fourth items move across the predetermined position in the user interface.

2218

The first group of items and the second group of items are separated by one or more intermediate groups of items that correspond to respective intermediate index values between the first index value and the second index value in the plurality of index values; and the method includes:

while the first drag gesture is detected:

detect movement of the first drag gesture to a location that corresponds to a first intermediate index value in the plurality of index values; and in response to detecting the movement of the first drag gesture to the location that corresponds to the first intermediate index value:

generate, via the one or more tactile output generators, a fourth tactile output that corresponds to the movement to the first intermediate value; and display a representation of a third portion of the plurality of items, wherein the third portion of the plurality of items include a first intermediate group of the items that corresponds to the first intermediate value.

Figure 22D:
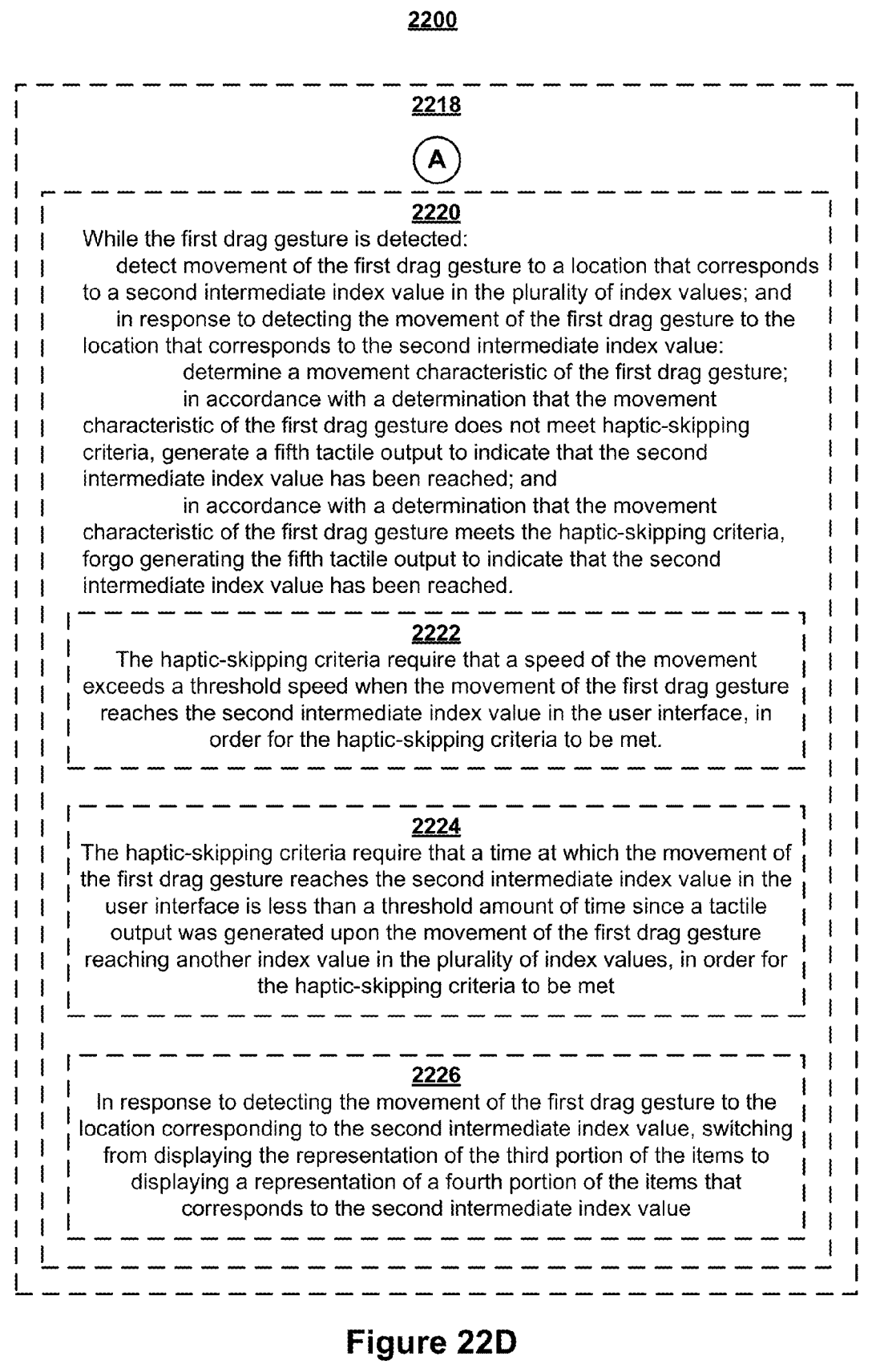

While the first drag gesture is detected:

detect movement of the first drag gesture to a location that corresponds to a second intermediate index value in the plurality of index values; and in response to detecting the movement of the first drag gesture to the location that corresponds to the second intermediate index value:

determine a movement characteristic of the first drag gesture;

in accordance with a determination that the movement characteristic of the first drag gesture does not meet haptic-skipping criteria, generate a fifth tactile output to indicate that the second intermediate index value has been reached; and in accordance with a determination that the movement characteristic of the first drag gesture meets the haptic-skipping criteria, forgo generating the fifth tactile output to indicate that the second intermediate index value has been reached.

2222

The haptic-skipping criteria require that a speed of the movement exceeds a threshold speed when the movement of the first drag gesture reaches the second intermediate index value in the user interface, in order for the haptic-skipping criteria to be met.

2224

The haptic-skipping criteria require that a time at which the movement of the first drag gesture reaches the second intermediate index value in the user interface is less than a threshold amount of time since a tactile output was generated upon the movement of the first drag gesture reaching another index value in the plurality of index values, in order for the haptic-skipping criteria to be met

2226

In response to detecting the movement of the first drag gesture to the location corresponding to the second intermediate index value, switching from displaying the representation of the third portion of the items to displaying a representation of a fourth portion of the items that corresponds to the second intermediate index value

Figure 22E:
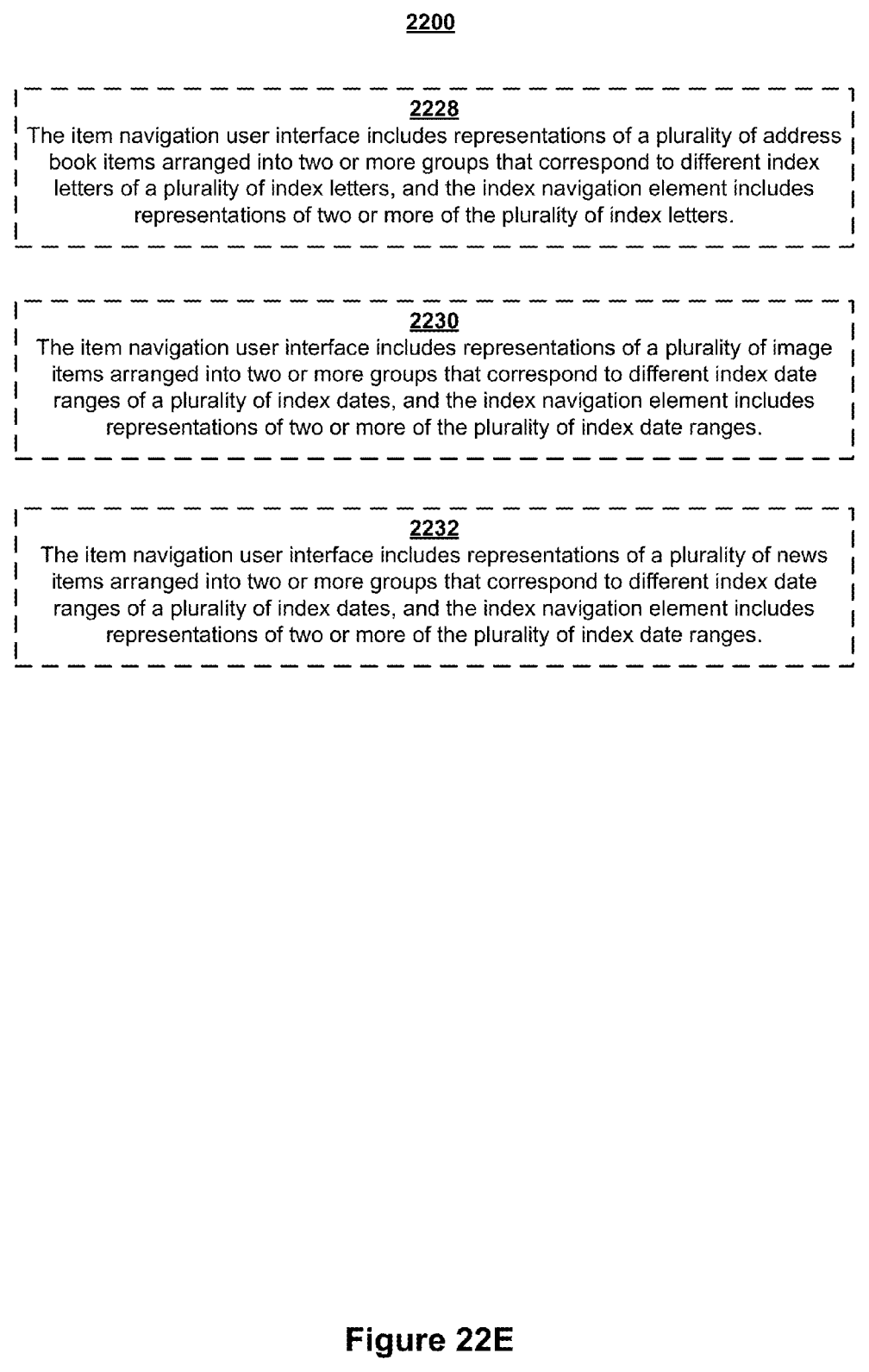

2228
The item navigation user interface includes representations of a plurality of address book items arranged into two or more groups that correspond to different index letters of a plurality of index letters, and the index navigation element includes representations of two or more of the plurality of index letters.

2230
The item navigation user interface includes representations of a plurality of image items arranged into two or more groups that correspond to different index date ranges of a plurality of index dates, and the index navigation element includes representations of two or more of the plurality of index date ranges.

2232
The item navigation user interface includes representations of a plurality of news items arranged into two or more groups that correspond to different index date ranges of a plurality of index dates, and the index navigation element includes representations of two or more of the plurality of index date ranges.

Figure 24A:
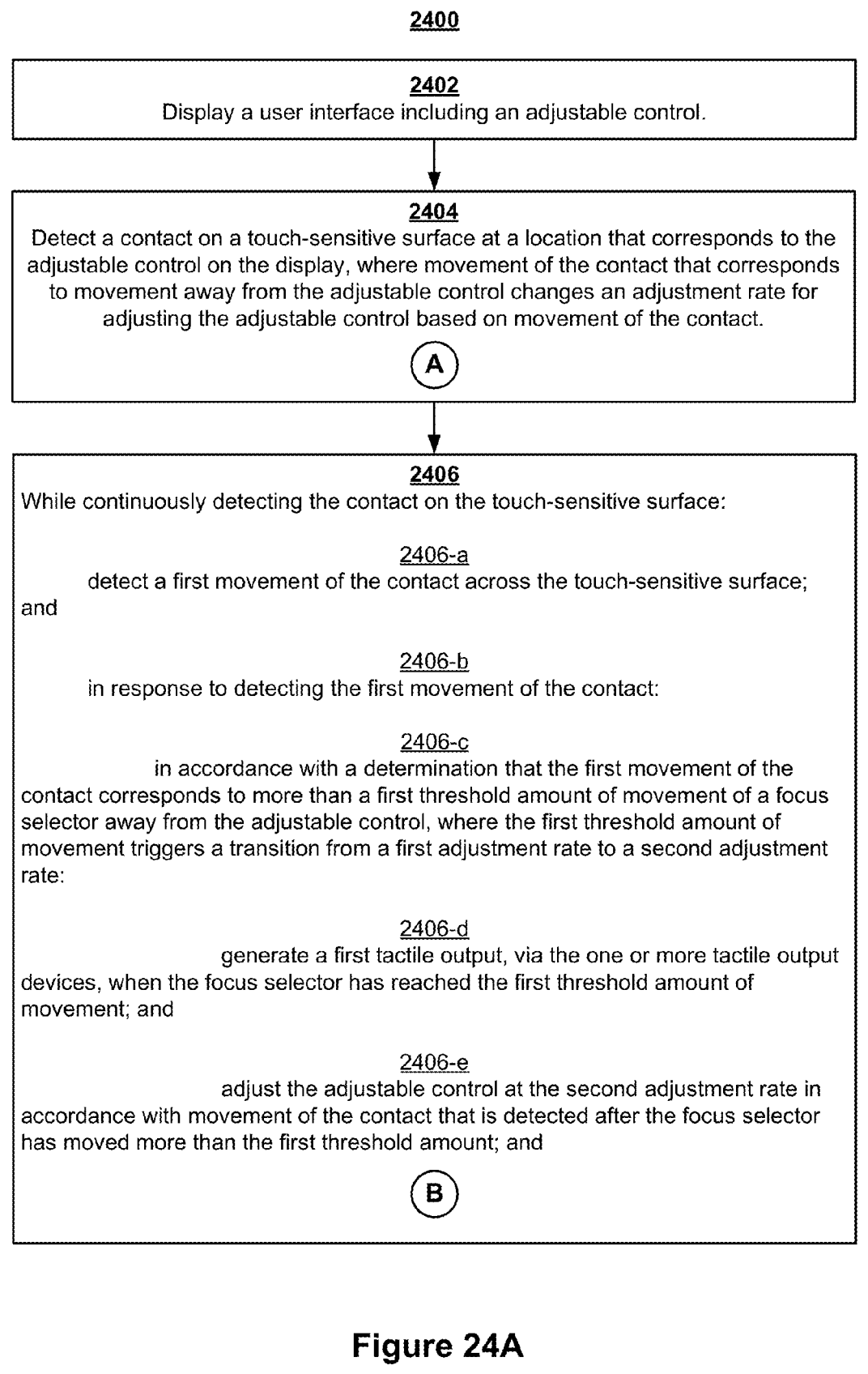

2402
Display a user interface including an adjustable control.

2404
Detect a contact on a touch-sensitive surface at a location that corresponds to the adjustable control on the display, where movement of the contact that corresponds to movement away from the adjustable control changes an adjustment rate for adjusting the adjustable control based on movement of the contact.

(A)

2406
While continuously detecting the contact on the touch-sensitive surface:

2406-a
detect a first movement of the contact across the touch-sensitive surface; and 2406-b
in response to detecting the first movement of the contact:

2406-c
in accordance with a determination that the first movement of the contact corresponds to more than a first threshold amount of movement of a focus selector away from the adjustable control, where the first threshold amount of movement triggers a transition from a first adjustment rate to a second adjustment rate:

2406-d
generate a first tactile output, via the one or more tactile output devices, when the focus selector has reached the first threshold amount of movement; and 2406-e
adjust the adjustable control at the second adjustment rate in accordance with movement of the contact that is detected after the focus selector has moved more than the first threshold amount; and (B)

2406-f in accordance with a determination that the first movement of the contact corresponds to less than the first threshold amount of movement of the focus selector away from the adjustable control, adjust the adjustable control at the first adjustment rate in accordance with movement of the contact without generating the first tactile output.

Figure 24B:
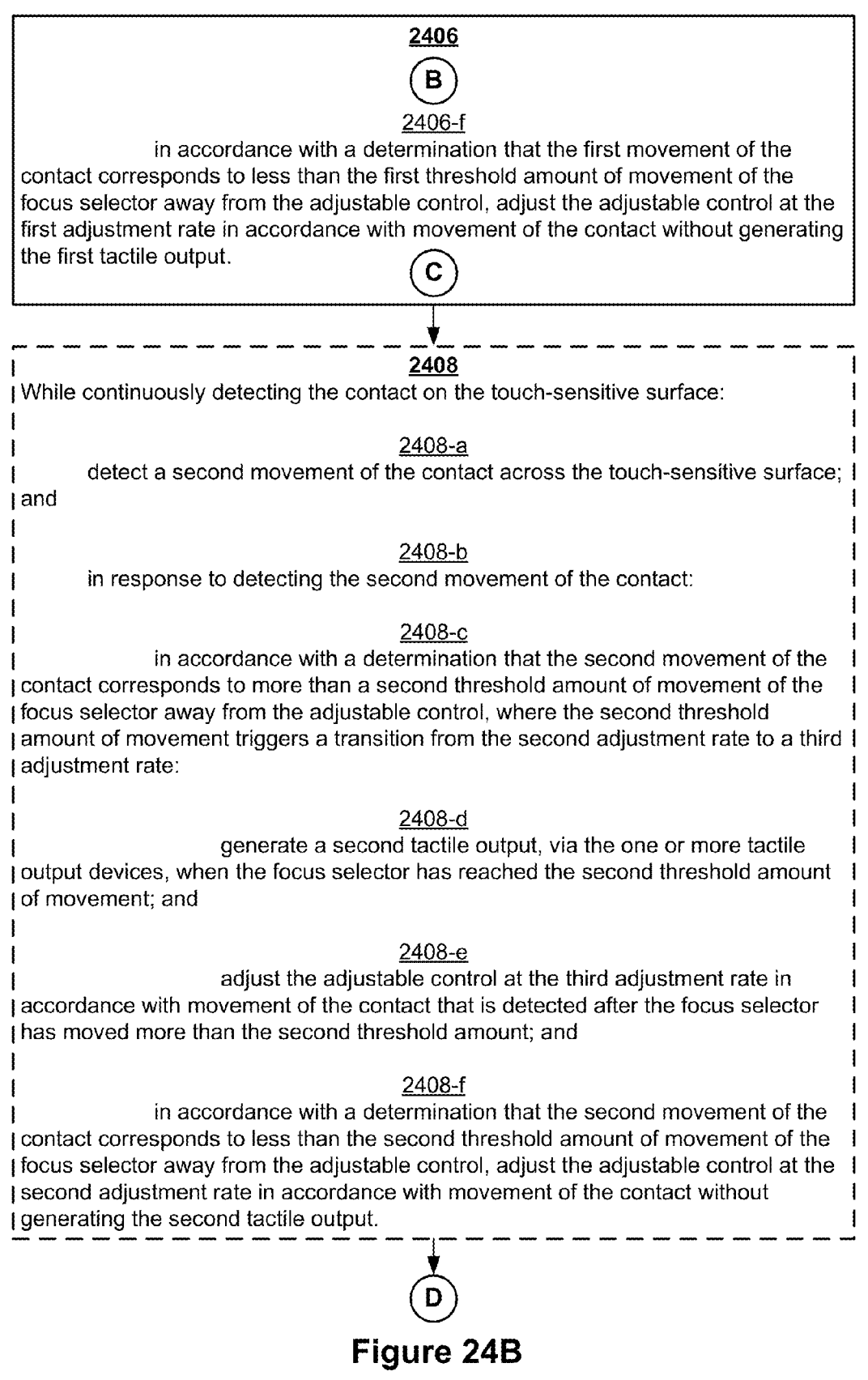

(C)

2408

While continuously detecting the contact on the touch-sensitive surface:

2408-a detect a second movement of the contact across the touch-sensitive surface; and 2408-b in response to detecting the second movement of the contact:

2408-c in accordance with a determination that the second movement of the contact corresponds to more than a second threshold amount of movement of the focus selector away from the adjustable control, where the second threshold amount of movement triggers a transition from the second adjustment rate to a third adjustment rate:

2408-d generate a second tactile output, via the one or more tactile output devices, when the focus selector has reached the second threshold amount of movement; and 2408-e adjust the adjustable control at the third adjustment rate in accordance with movement of the contact that is detected after the focus selector has moved more than the second threshold amount; and 2408-f in accordance with a determination that the second movement of the contact corresponds to less than the second threshold amount of movement of the focus selector away from the adjustable control, adjust the adjustable control at the second adjustment rate in accordance with movement of the contact without generating the second tactile output.

Figure 24C:
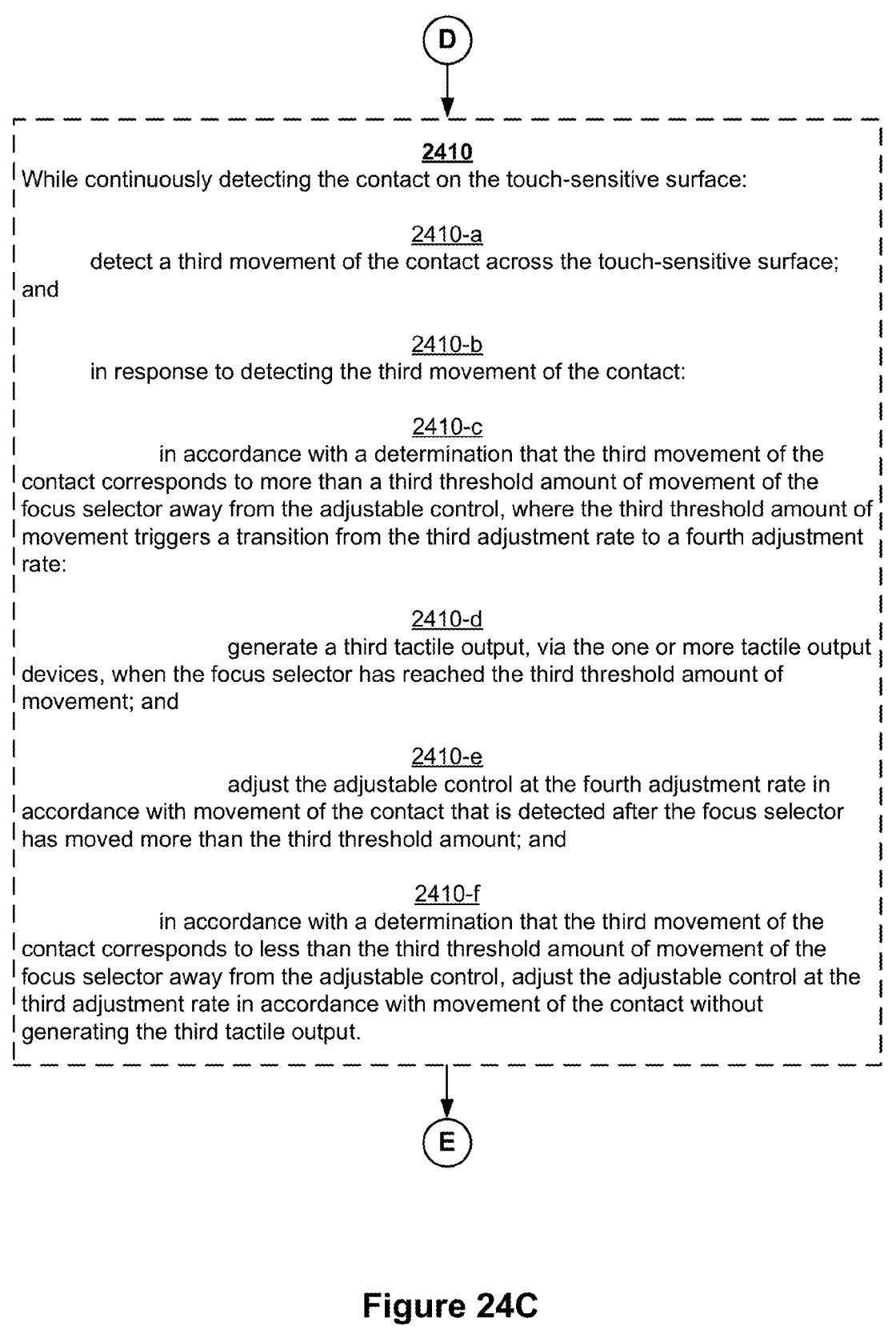

2410
While continuously detecting the contact on the touch-sensitive surface:

2410-a
detect a third movement of the contact across the touch-sensitive surface; and 2410-b
in response to detecting the third movement of the contact:

2410-c
in accordance with a determination that the third movement of the contact corresponds to more than a third threshold amount of movement of the focus selector away from the adjustable control, where the third threshold amount of movement triggers a transition from the third adjustment rate to a fourth adjustment rate:

2410-d
generate a third tactile output, via the one or more tactile output devices, when the focus selector has reached the third threshold amount of movement; and 2410-e
adjust the adjustable control at the fourth adjustment rate in accordance with movement of the contact that is detected after the focus selector has moved more than the third threshold amount; and 2410-f
in accordance with a determination that the third movement of the contact corresponds to less than the third threshold amount of movement of the focus selector away from the adjustable control, adjust the adjustable control at the third adjustment rate in accordance with movement of the contact without generating the third tactile output.

Figure 24D:
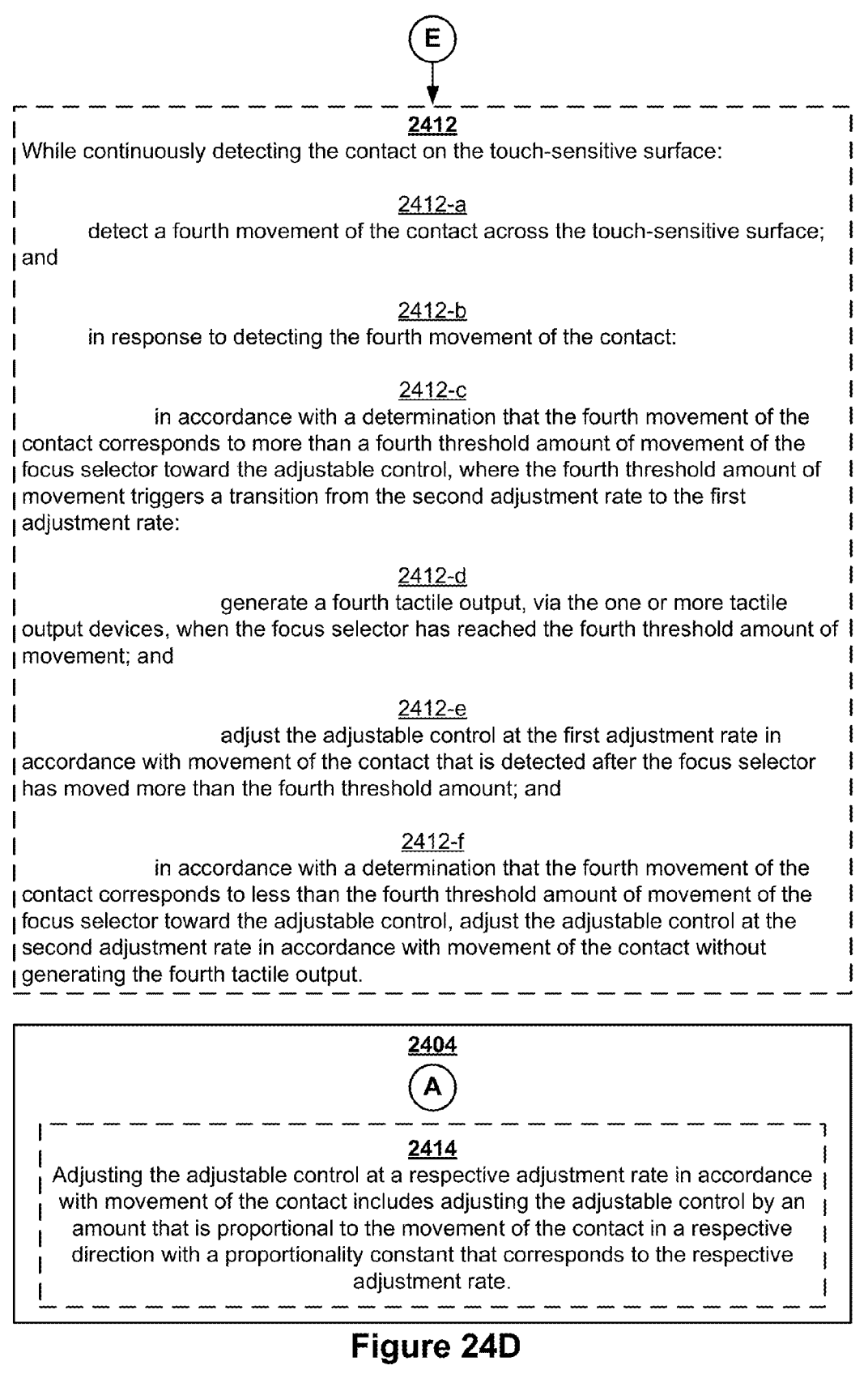

2412
While continuously detecting the contact on the touch-sensitive surface:

2412-a
detect a fourth movement of the contact across the touch-sensitive surface; and 2412-b
in response to detecting the fourth movement of the contact:

2412-c
in accordance with a determination that the fourth movement of the contact corresponds to more than a fourth threshold amount of movement of the focus selector toward the adjustable control, where the fourth threshold amount of movement triggers a transition from the second adjustment rate to the first adjustment rate:

2412-d
generate a fourth tactile output, via the one or more tactile output devices, when the focus selector has reached the fourth threshold amount of movement; and 2412-e
adjust the adjustable control at the first adjustment rate in accordance with movement of the contact that is detected after the focus selector has moved more than the fourth threshold amount; and 2412-f
in accordance with a determination that the fourth movement of the contact corresponds to less than the fourth threshold amount of movement of the focus selector toward the adjustable control, adjust the adjustable control at the second adjustment rate in accordance with movement of the contact without generating the fourth tactile output.

2404

(A)

2414
Adjusting the adjustable control at a respective adjustment rate in accordance with movement of the contact includes adjusting the adjustable control by an amount that is proportional to the movement of the contact in a respective direction with a proportionality constant that corresponds to the respective adjustment rate.

Figure 24E:
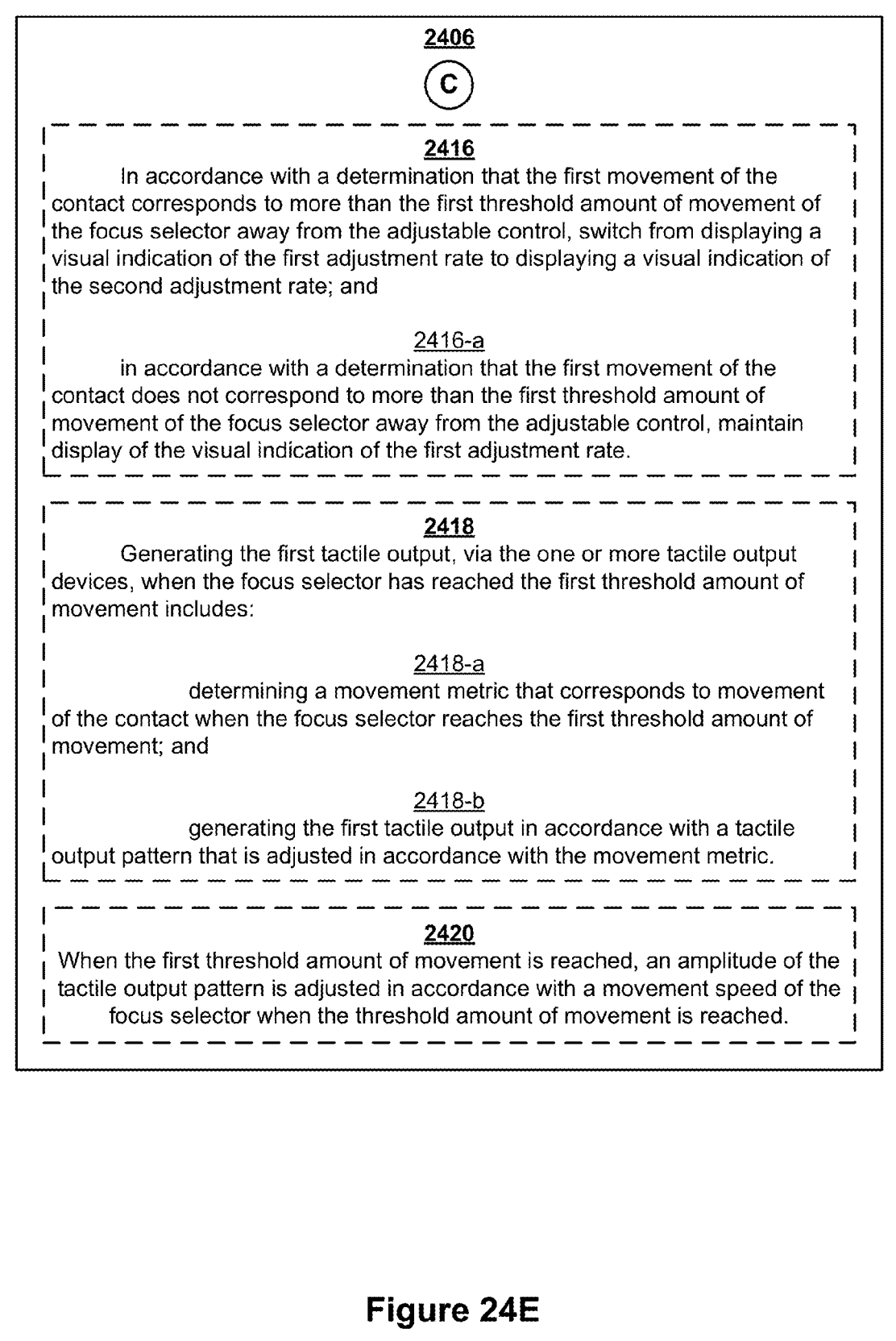

In accordance with a determination that the first movement of the contact corresponds to more than the first threshold amount of movement of the focus selector away from the adjustable control, switch from displaying a visual indication of the first adjustment rate to displaying a visual indication of the second adjustment rate; and 2416-a in accordance with a determination that the first movement of the contact does not correspond to more than the first threshold amount of movement of the focus selector away from the adjustable control, maintain display of the visual indication of the first adjustment rate.

2418

Generating the first tactile output, via the one or more tactile output devices, when the focus selector has reached the first threshold amount of movement includes:

2418-a determining a movement metric that corresponds to movement of the contact when the focus selector reaches the first threshold amount of movement; and 2418-b generating the first tactile output in accordance with a tactile output pattern that is adjusted in accordance with the movement metric.

2420

When the first threshold amount of movement is reached, an amplitude of the tactile output pattern is adjusted in accordance with a movement speed of the focus selector when the threshold amount of movement is reached.

Figure 24F:
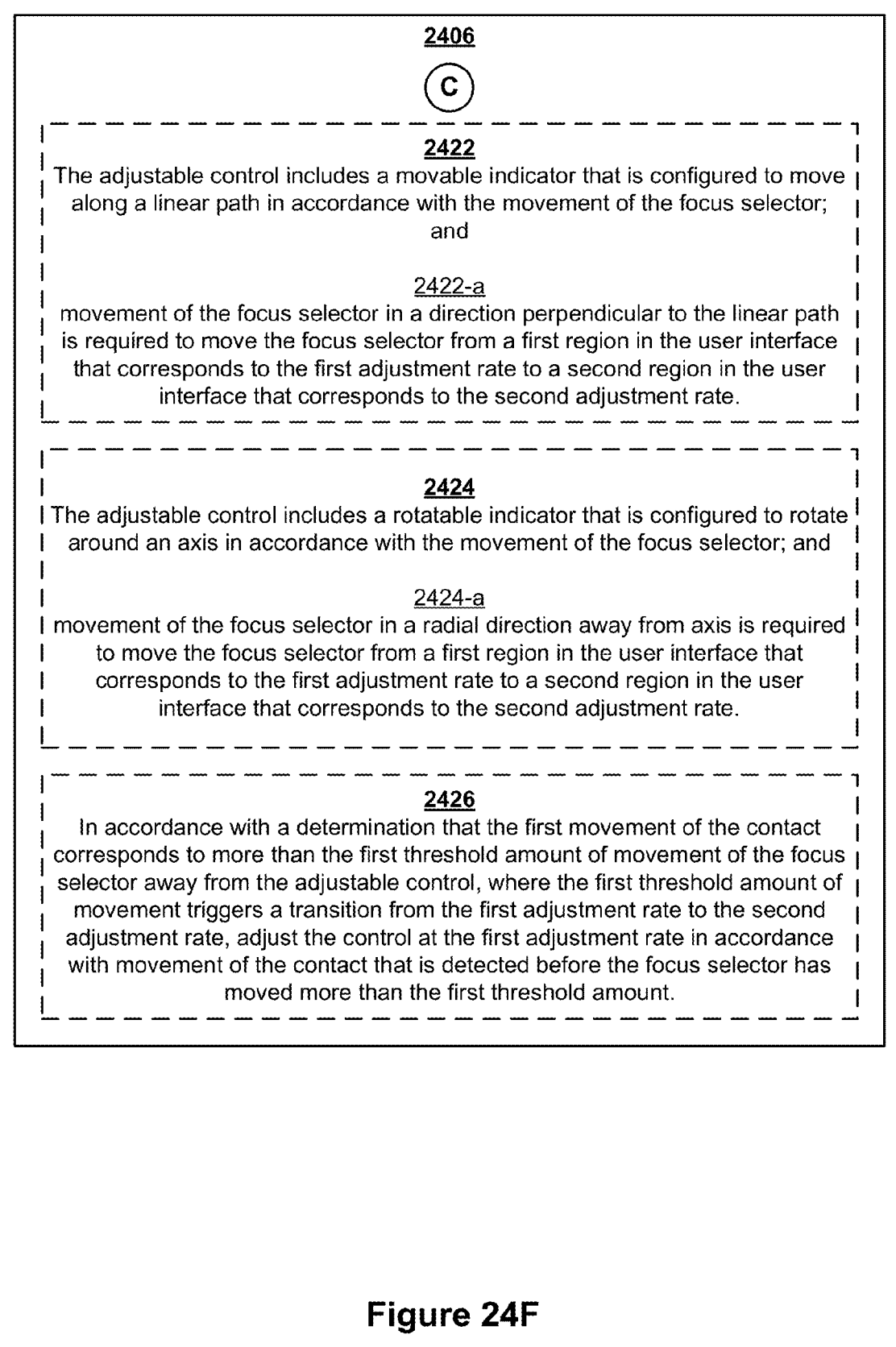

2422
The adjustable control includes a movable indicator that is configured to move along a linear path in accordance with the movement of the focus selector; and 2422-a
movement of the focus selector in a direction perpendicular to the linear path is required to move the focus selector from a first region in the user interface that corresponds to the first adjustment rate to a second region in the user interface that corresponds to the second adjustment rate.

2424
The adjustable control includes a rotatable indicator that is configured to rotate around an axis in accordance with the movement of the focus selector; and 2424-a
movement of the focus selector in a radial direction away from axis is required to move the focus selector from a first region in the user interface that corresponds to the first adjustment rate to a second region in the user interface that corresponds to the second adjustment rate.

2426
In accordance with a determination that the first movement of the contact corresponds to more than the first threshold amount of movement of the focus selector away from the adjustable control, where the first threshold amount of movement triggers a transition from the first adjustment rate to the second adjustment rate, adjust the control at the first adjustment rate in accordance with movement of the contact that is detected before the focus selector has moved more than the first threshold amount.

Figure 24G:
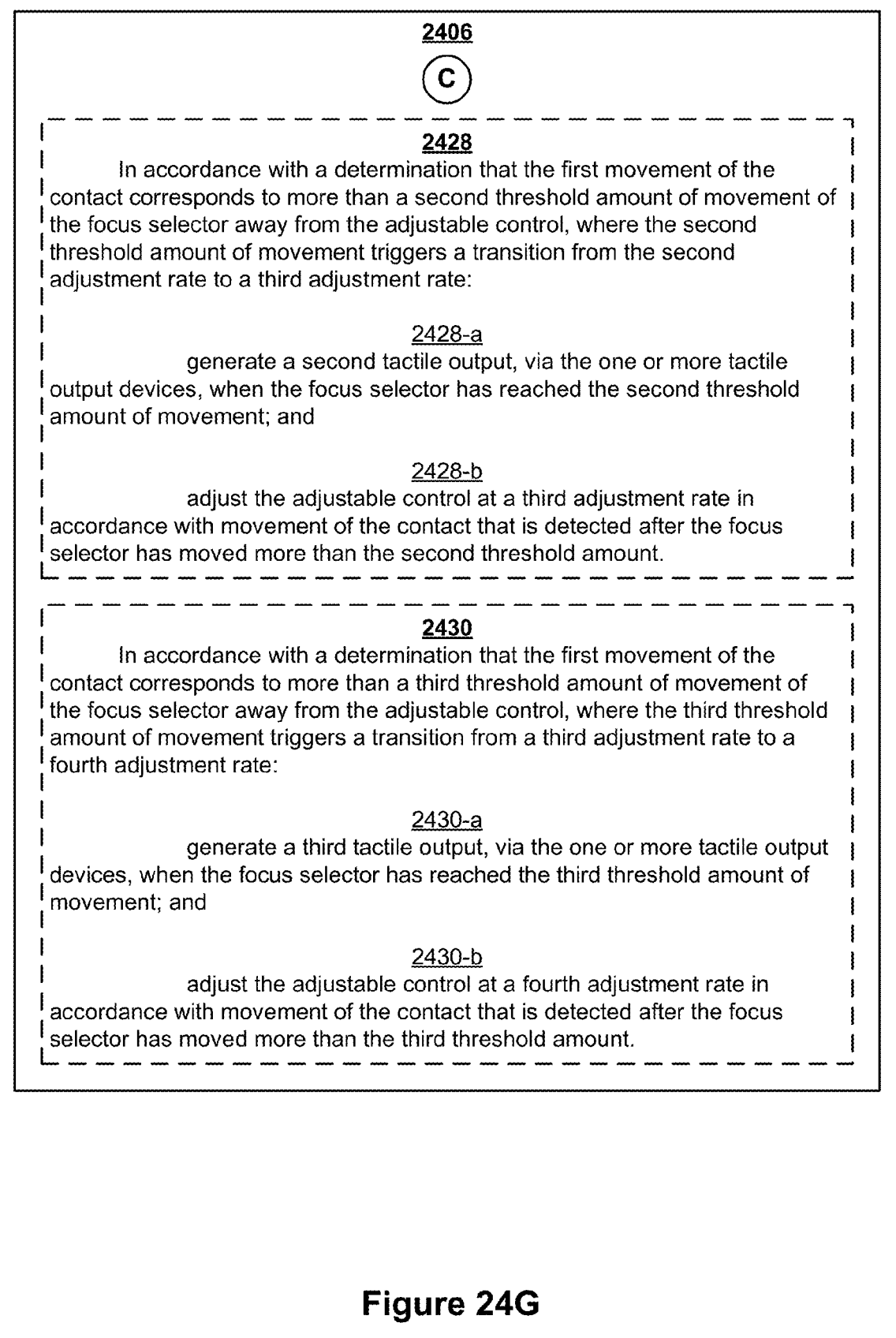

2428
In accordance with a determination that the first movement of the contact corresponds to more than a second threshold amount of movement of the focus selector away from the adjustable control, where the second threshold amount of movement triggers a transition from the second adjustment rate to a third adjustment rate:

2428-a
generate a second tactile output, via the one or more tactile output devices, when the focus selector has reached the second threshold amount of movement; and 2428-b
adjust the adjustable control at a third adjustment rate in accordance with movement of the contact that is detected after the focus selector has moved more than the second threshold amount.

2430
In accordance with a determination that the first movement of the contact corresponds to more than a third threshold amount of movement of the focus selector away from the adjustable control, where the third threshold amount of movement triggers a transition from a third adjustment rate to a fourth adjustment rate:

2430-a
generate a third tactile output, via the one or more tactile output devices, when the focus selector has reached the third threshold amount of movement; and 2430-b
adjust the adjustable control at a fourth adjustment rate in accordance with movement of the contact that is detected after the focus selector has moved more than the third threshold amount.

Figure 26A:
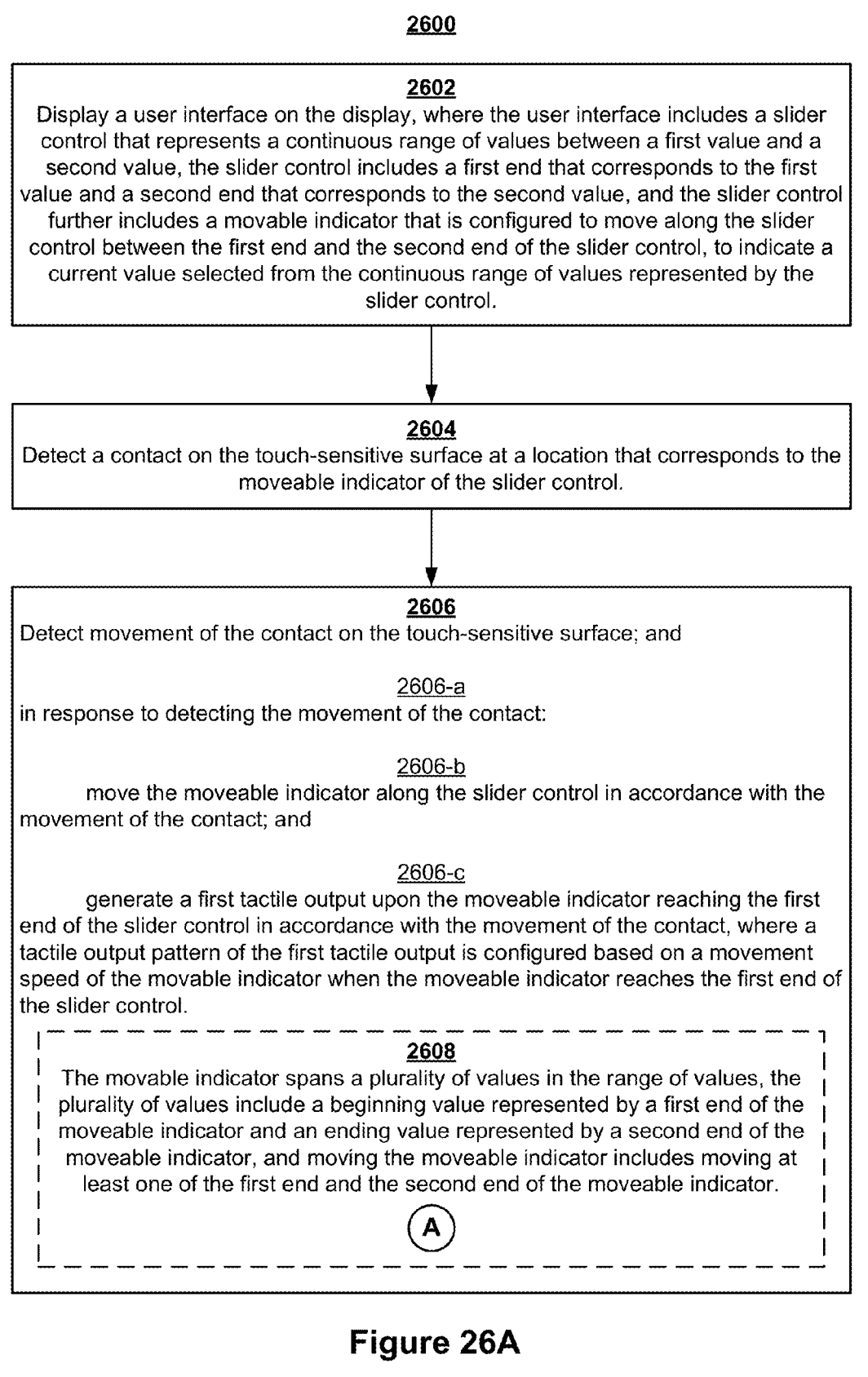

2602
Display a user interface on the display, where the user interface includes a slider control that represents a continuous range of values between a first value and a second value, the slider control includes a first end that corresponds to the first value and a second end that corresponds to the second value, and the slider control further includes a movable indicator that is configured to move along the slider control between the first end and the second end of the slider control, to indicate a current value selected from the continuous range of values represented by the slider control.

↓

2604
Detect a contact on the touch-sensitive surface at a location that corresponds to the moveable indicator of the slider control.

↓

2606
Detect movement of the contact on the touch-sensitive surface; and 2606-a
in response to detecting the movement of the contact:

2606-b
move the moveable indicator along the slider control in accordance with the movement of the contact; and 2606-c
generate a first tactile output upon the moveable indicator reaching the first end of the slider control in accordance with the movement of the contact, where a tactile output pattern of the first tactile output is configured based on a movement speed of the movable indicator when the moveable indicator reaches the first end of the slider control.

2608
The movable indicator spans a plurality of values in the range of values, the plurality of values include a beginning value represented by a first end of the moveable indicator and an ending value represented by a second end of the moveable indicator, and moving the moveable indicator includes moving at least one of the first end and the second end of the moveable indicator.

Figure 26B:
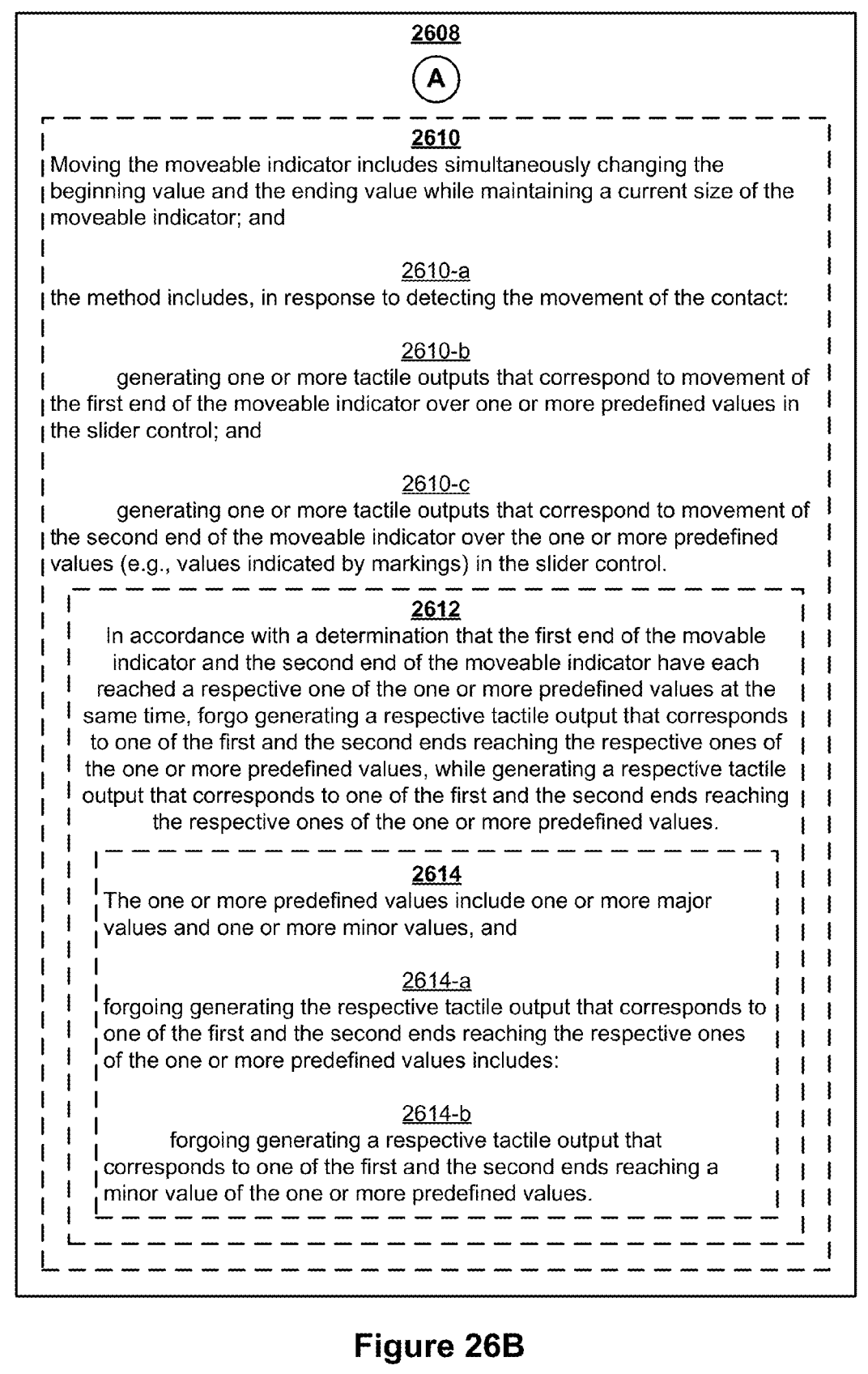

Moving the moveable indicator includes simultaneously changing the beginning value and the ending value while maintaining a current size of the moveable indicator; and 2610-a the method includes, in response to detecting the movement of the contact:

2610-b generating one or more tactile outputs that correspond to movement of the first end of the moveable indicator over one or more predefined values in the slider control; and 2610-c generating one or more tactile outputs that correspond to movement of the second end of the moveable indicator over the one or more predefined values (e.g., values indicated by markings) in the slider control.

2612

In accordance with a determination that the first end of the movable indicator and the second end of the moveable indicator have each reached a respective one of the one or more predefined values at the same time, forgo generating a respective tactile output that corresponds to one of the first and the second ends reaching the respective ones of the one or more predefined values, while generating a respective tactile output that corresponds to one of the first and the second ends reaching the respective ones of the one or more predefined values.

2614

The one or more predefined values include one or more major values and one or more minor values, and 2614-a forgoing generating the respective tactile output that corresponds to one of the first and the second ends reaching the respective ones of the one or more predefined values includes:

2614-b forgoing generating a respective tactile output that corresponds to one of the first and the second ends reaching a minor value of the one or more predefined values.

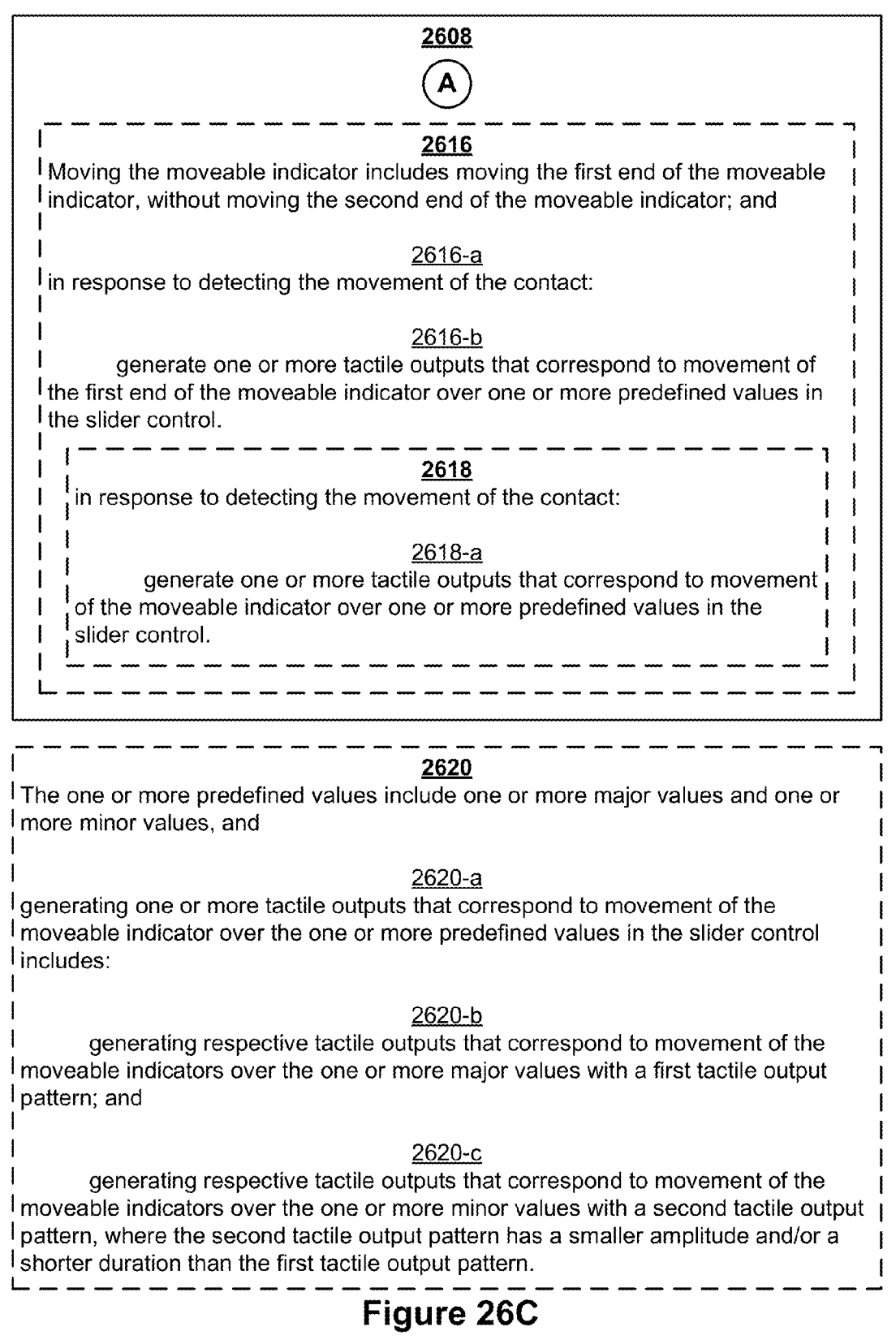

2616
Moving the moveable indicator includes moving the first end of the moveable indicator, without moving the second end of the moveable indicator; and 2616-a
in response to detecting the movement of the contact:

2616-b
generate one or more tactile outputs that correspond to movement of the first end of the moveable indicator over one or more predefined values in the slider control.

2618
in response to detecting the movement of the contact:

2618-a
generate one or more tactile outputs that correspond to movement of the moveable indicator over one or more predefined values in the slider control.

2620
The one or more predefined values include one or more major values and one or more minor values, and 2620-a
generating one or more tactile outputs that correspond to movement of the moveable indicator over the one or more predefined values in the slider control includes:

2620-b
generating respective tactile outputs that correspond to movement of the moveable indicators over the one or more major values with a first tactile output pattern; and 2620-c
generating respective tactile outputs that correspond to movement of the moveable indicators over the one or more minor values with a second tactile output pattern, where the second tactile output pattern has a smaller amplitude and/or a shorter duration than the first tactile output pattern.

Figure 26C

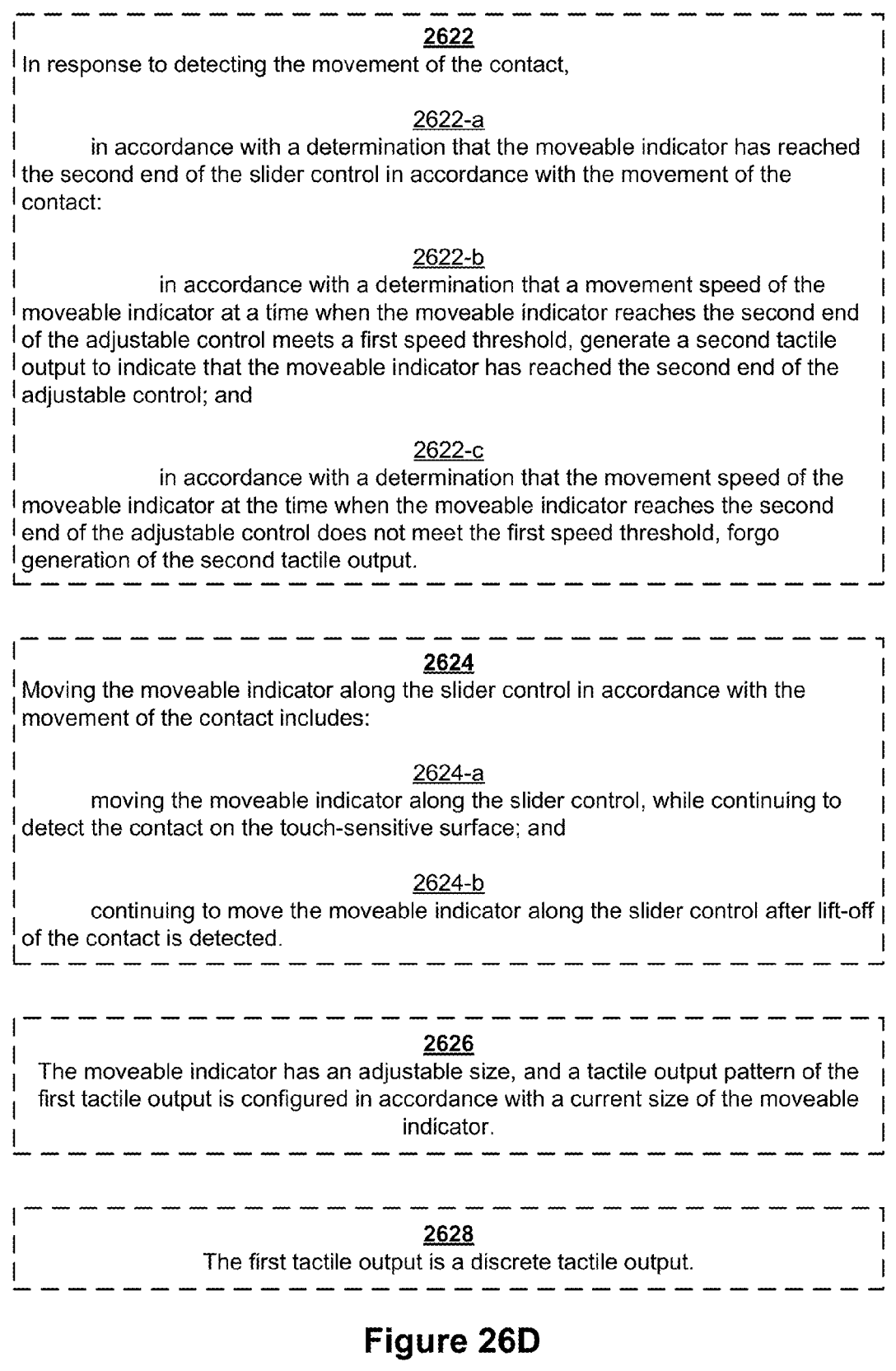

2622
In response to detecting the movement of the contact, 2622-a
in accordance with a determination that the moveable indicator has reached the second end of the slider control in accordance with the movement of the contact:

2622-b
in accordance with a determination that a movement speed of the moveable indicator at a time when the moveable indicator reaches the second end of the adjustable control meets a first speed threshold, generate a second tactile output to indicate that the moveable indicator has reached the second end of the adjustable control; and 2622-c
in accordance with a determination that the movement speed of the moveable indicator at the time when the moveable indicator reaches the second end of the adjustable control does not meet the first speed threshold, forgo generation of the second tactile output.

2624
Moving the moveable indicator along the slider control in accordance with the movement of the contact includes:

2624-a
moving the moveable indicator along the slider control, while continuing to detect the contact on the touch-sensitive surface; and 2624-b
continuing to move the moveable indicator along the slider control after lift-off of the contact is detected.

2626
The moveable indicator has an adjustable size, and a tactile output pattern of the first tactile output is configured in accordance with a current size of the moveable indicator.

2628
The first tactile output is a discrete tactile output.

Figure 26D

Figure 26E:
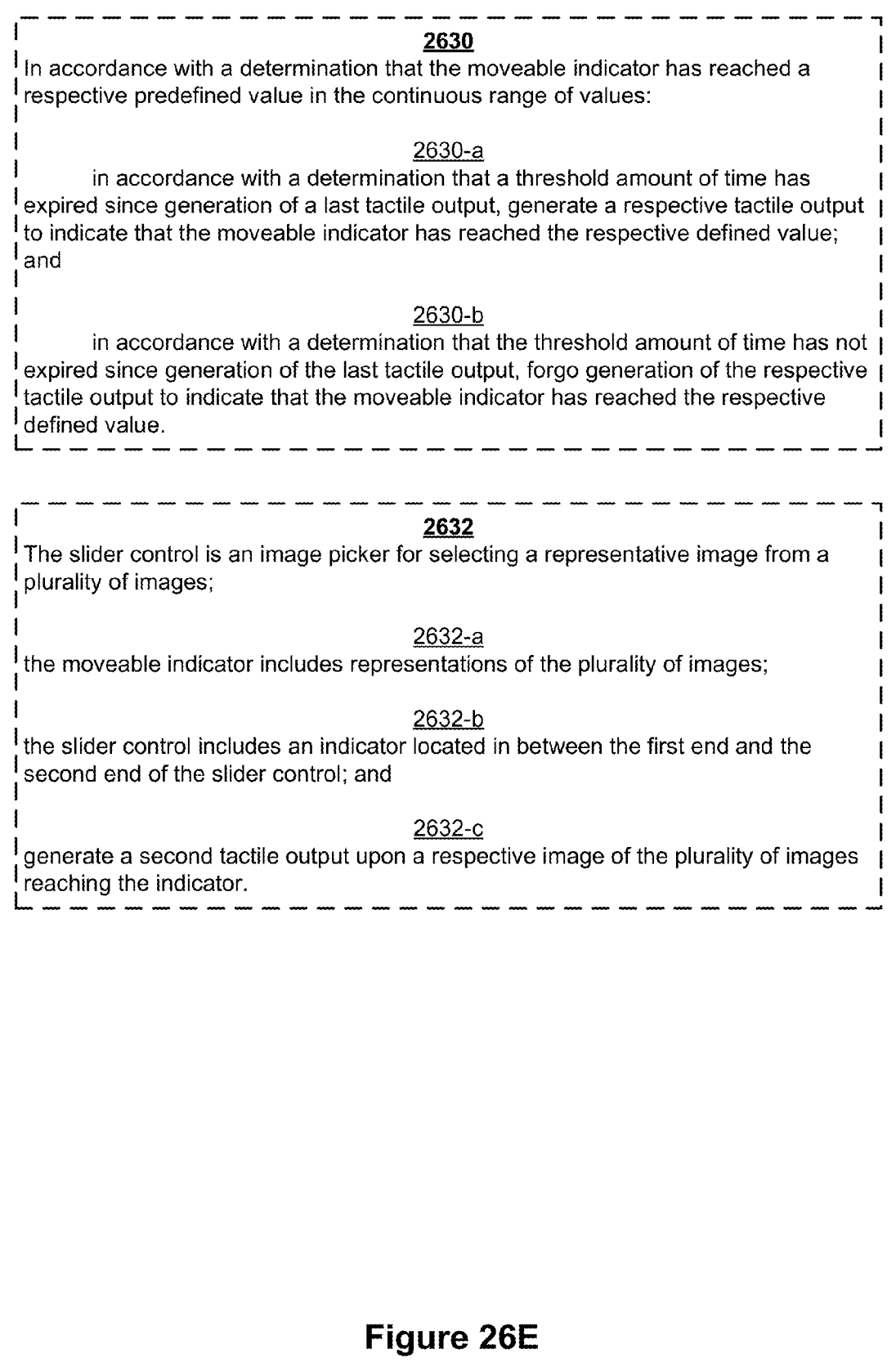

2630
In accordance with a determination that the moveable indicator has reached a respective predefined value in the continuous range of values:

2630-a
in accordance with a determination that a threshold amount of time has expired since generation of a last tactile output, generate a respective tactile output to indicate that the moveable indicator has reached the respective defined value; and 2630-b
in accordance with a determination that the threshold amount of time has not expired since generation of the last tactile output, forgo generation of the respective tactile output to indicate that the moveable indicator has reached the respective defined value.

2632
The slider control is an image picker for selecting a representative image from a plurality of images;

2632-a
the moveable indicator includes representations of the plurality of images;

2632-b
the slider control includes an indicator located in between the first end and the second end of the slider control; and 2632-c
generate a second tactile output upon a respective image of the plurality of images reaching the indicator.

Figure 28A:
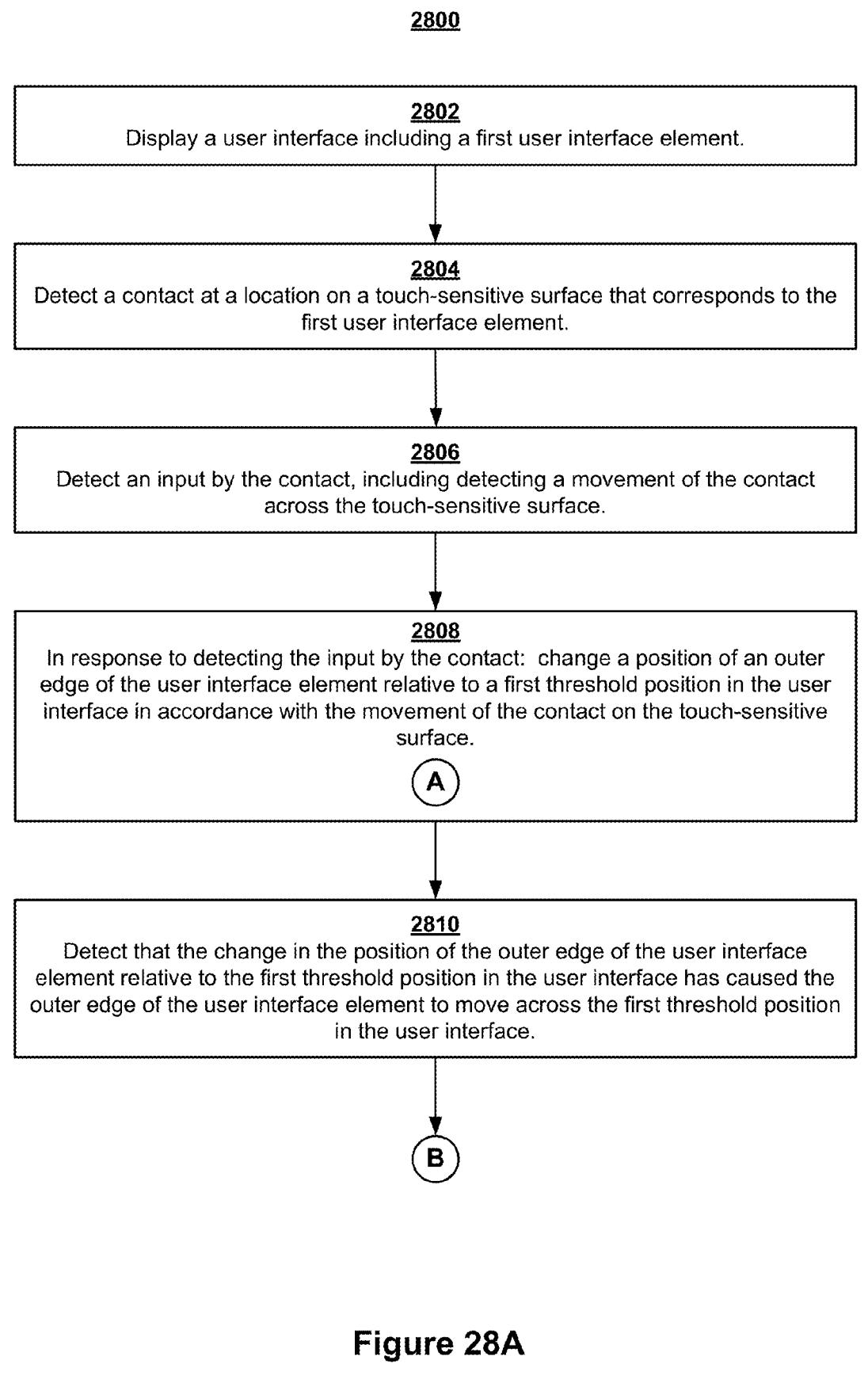

2802
Display a user interface including a first user interface element.

↓

2804
Detect a contact at a location on a touch-sensitive surface that corresponds to the first user interface element.

↓

2806
Detect an input by the contact, including detecting a movement of the contact across the touch-sensitive surface.

↓

2808
In response to detecting the input by the contact: change a position of an outer edge of the user interface element relative to a first threshold position in the user interface in accordance with the movement of the contact on the touch-sensitive surface.

(A)

↓

2810
Detect that the change in the position of the outer edge of the user interface element relative to the first threshold position in the user interface has caused the outer edge of the user interface element to move across the first threshold position in the user interface.

Figure 28B:
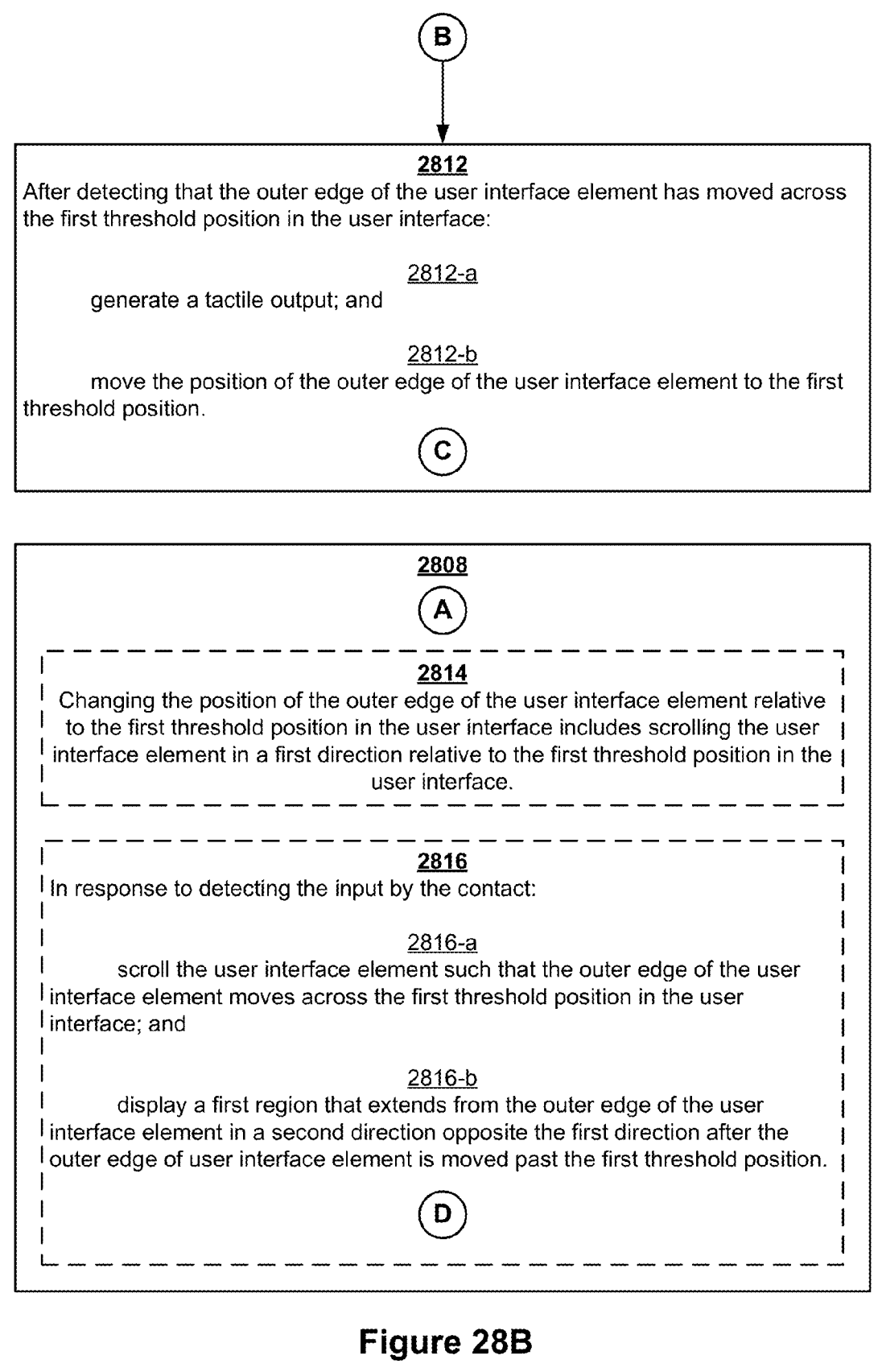

After detecting that the outer edge of the user interface element has moved across the first threshold position in the user interface:

2812-a generate a tactile output; and 2812-b move the position of the outer edge of the user interface element to the first threshold position.

(C)

2808

(A)

2814

Changing the position of the outer edge of the user interface element relative to the first threshold position in the user interface includes scrolling the user interface element in a first direction relative to the first threshold position in the user interface.

2816

In response to detecting the input by the contact:

2816-a scroll the user interface element such that the outer edge of the user interface element moves across the first threshold position in the user interface; and 2816-b display a first region that extends from the outer edge of the user interface element in a second direction opposite the first direction after the outer edge of user interface element is moved past the first threshold position.

2818 moving the position of the outer edge of the user interface element to the first threshold position includes:

2818-a scrolling the user interface element in the second direction until the outer edge of the user interface returns to the first threshold position; and 2818-b ceasing to display the first region that extends from the outer edge of the user interface element.

Figure 28C:
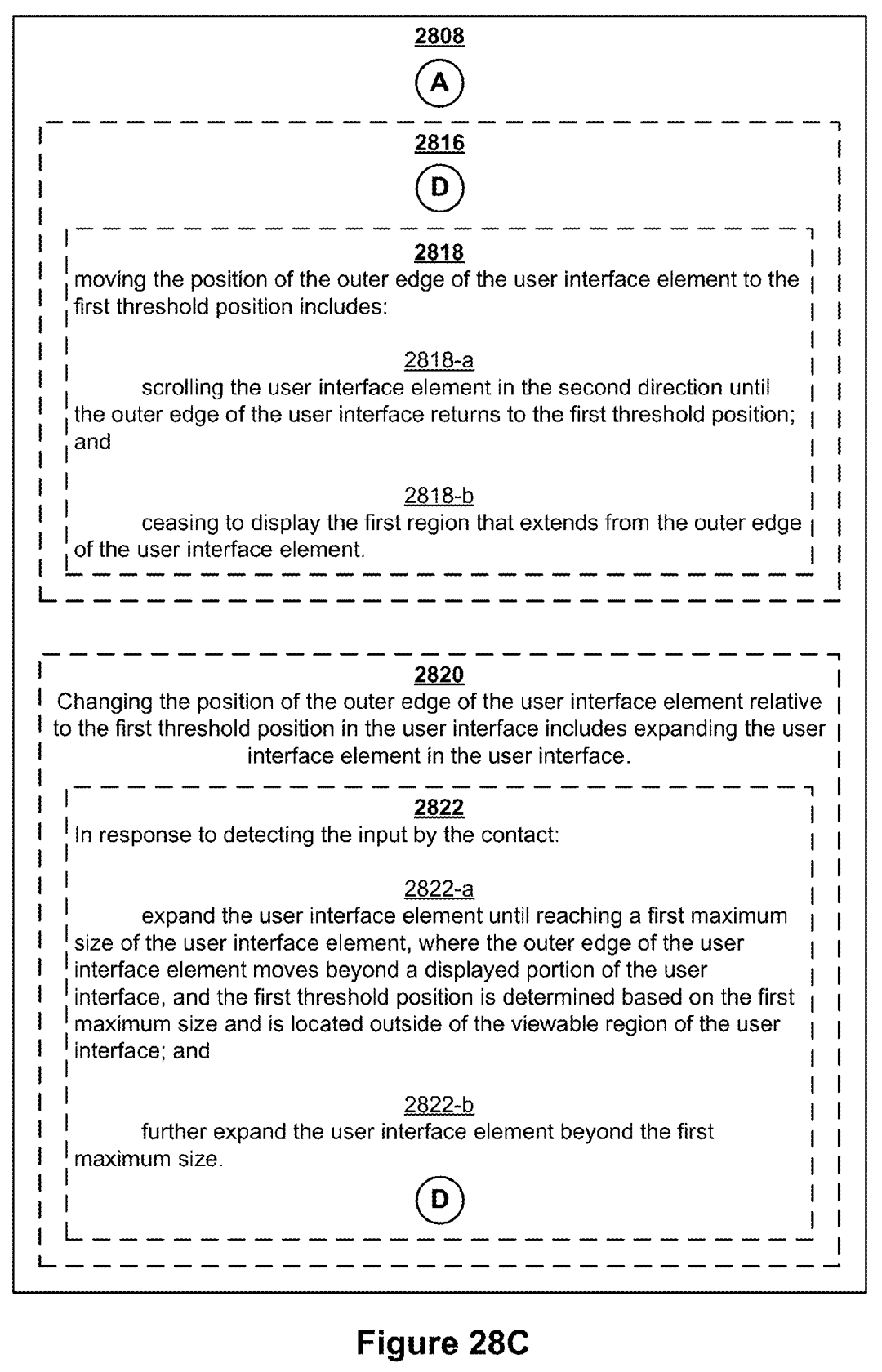

2820

Changing the position of the outer edge of the user interface element relative to the first threshold position in the user interface includes expanding the user interface element in the user interface.

2822

In response to detecting the input by the contact:

2822-a expand the user interface element until reaching a first maximum size of the user interface element, where the outer edge of the user interface element moves beyond a displayed portion of the user interface, and the first threshold position is determined based on the first maximum size and is located outside of the viewable region of the user interface; and 2822-b further expand the user interface element beyond the first maximum size.

Figure 28D:
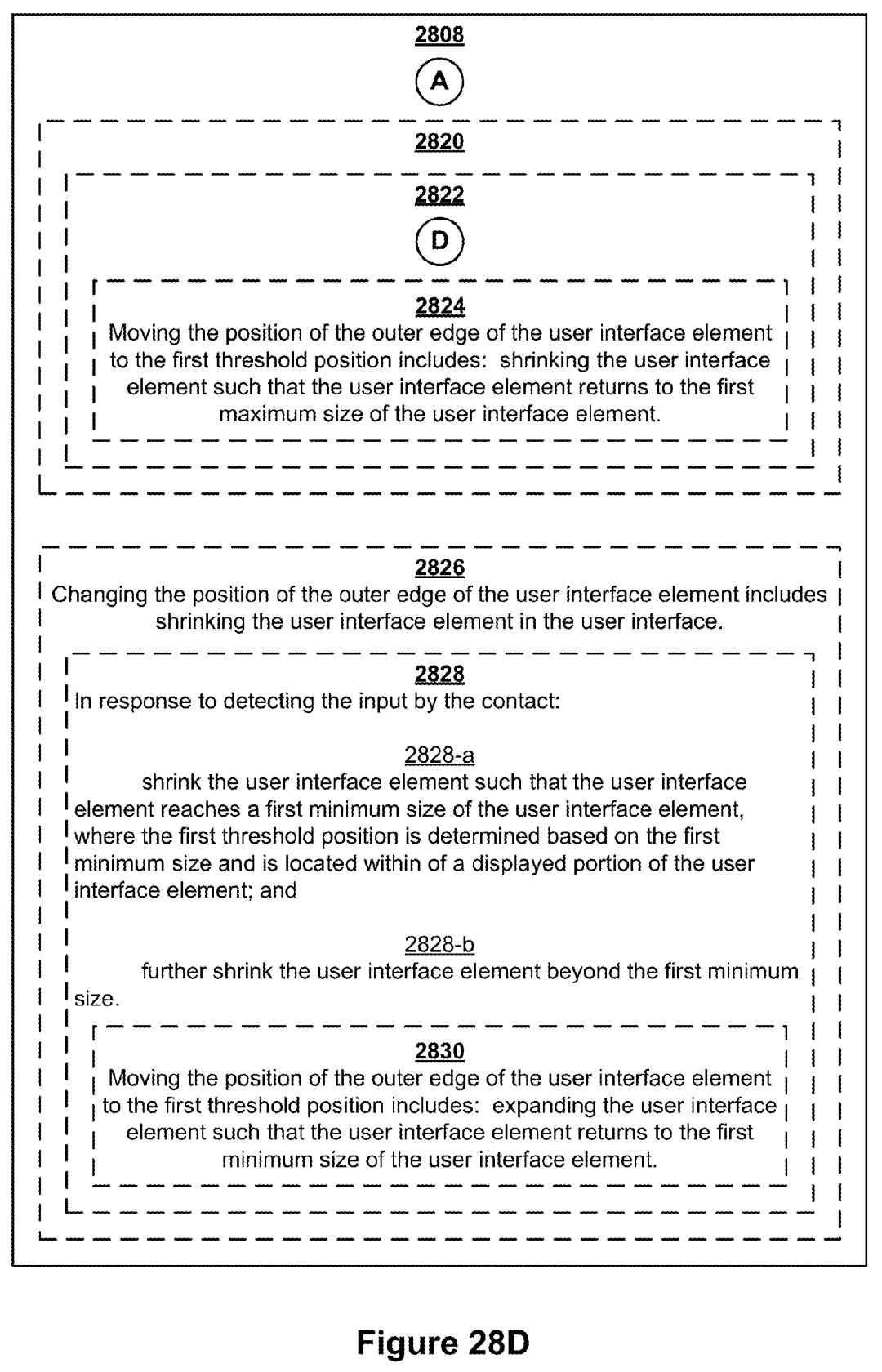

2824
Moving the position of the outer edge of the user interface element to the first threshold position includes: shrinking the user interface element such that the user interface element returns to the first maximum size of the user interface element.

2826
Changing the position of the outer edge of the user interface element includes shrinking the user interface element in the user interface.

2828
In response to detecting the input by the contact:

2828-a
shrink the user interface element such that the user interface element reaches a first minimum size of the user interface element, where the first threshold position is determined based on the first minimum size and is located within of a displayed portion of the user interface element; and 2828-b
further shrink the user interface element beyond the first minimum size.

2830
Moving the position of the outer edge of the user interface element to the first threshold position includes: expanding the user interface element such that the user interface element returns to the first minimum size of the user interface element.

Figure 28E:
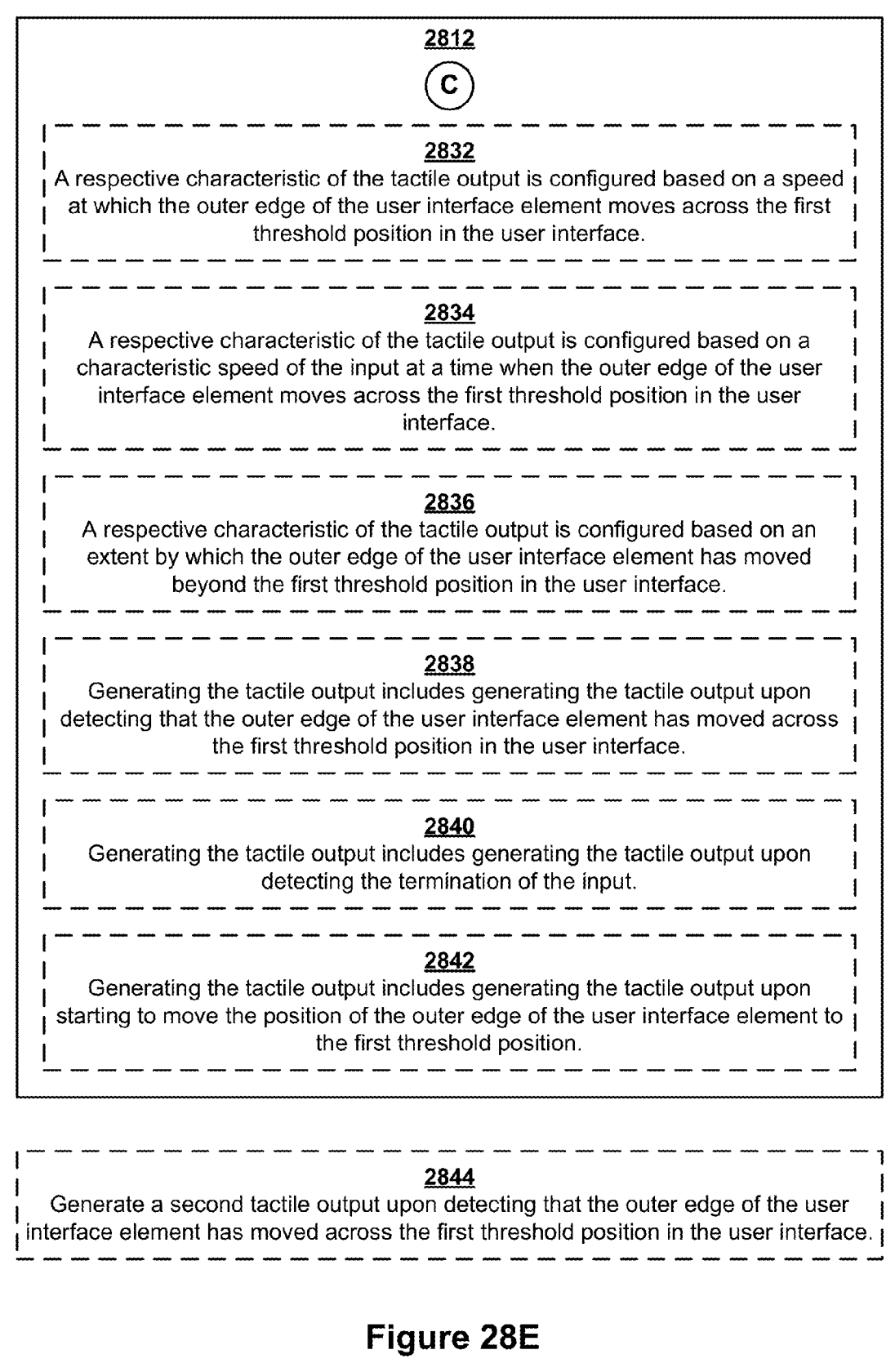

2832
A respective characteristic of the tactile output is configured based on a speed at which the outer edge of the user interface element moves across the first threshold position in the user interface.

2834
A respective characteristic of the tactile output is configured based on a characteristic speed of the input at a time when the outer edge of the user interface element moves across the first threshold position in the user interface.

2836
A respective characteristic of the tactile output is configured based on an extent by which the outer edge of the user interface element has moved beyond the first threshold position in the user interface.

2838
Generating the tactile output includes generating the tactile output upon detecting that the outer edge of the user interface element has moved across the first threshold position in the user interface.

2840
Generating the tactile output includes generating the tactile output upon detecting the termination of the input.

2842
Generating the tactile output includes generating the tactile output upon starting to move the position of the outer edge of the user interface element to the first threshold position.

2844
Generate a second tactile output upon detecting that the outer edge of the user interface element has moved across the first threshold position in the user interface.

Figure 28E (B)

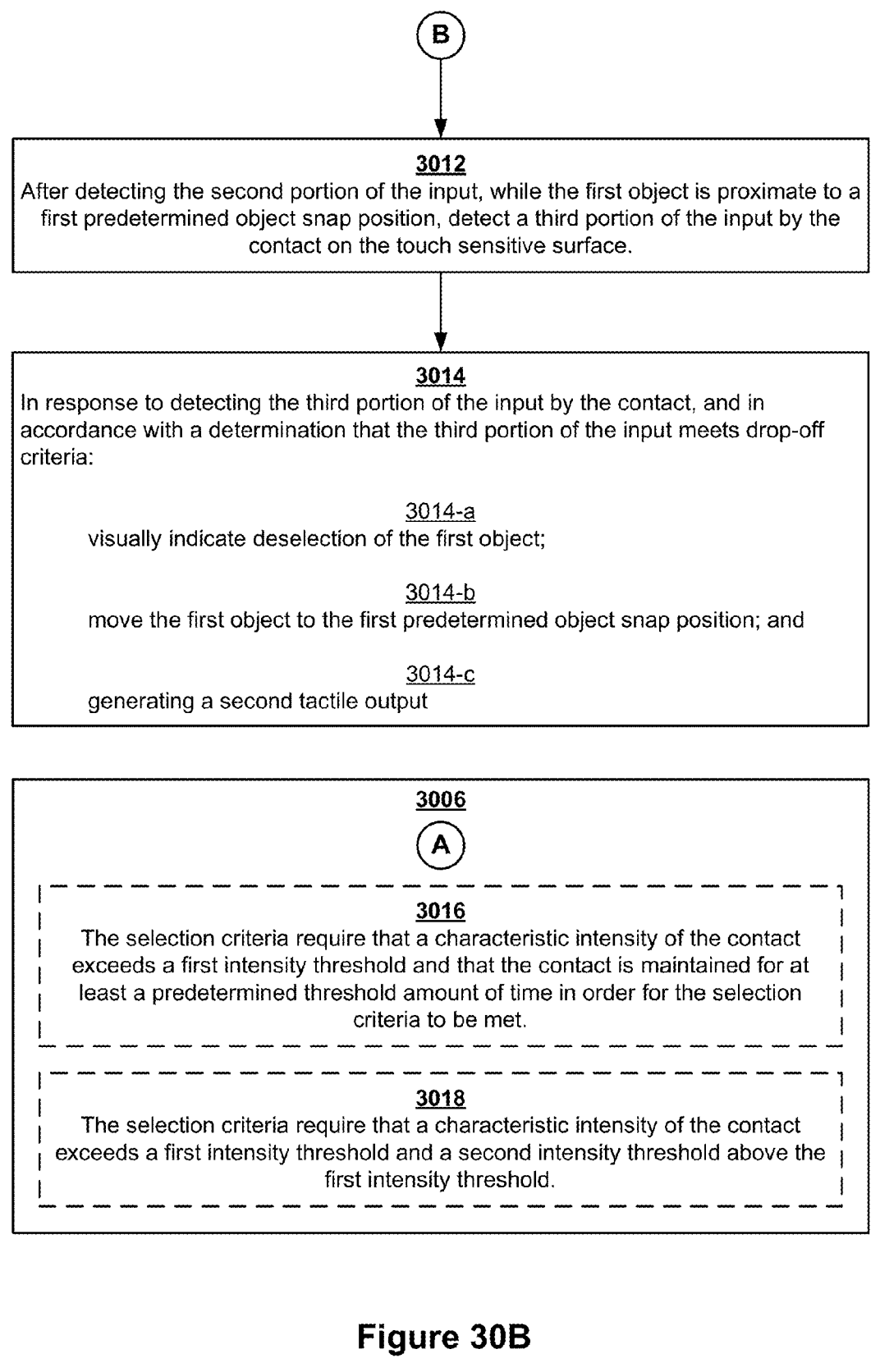

3012
After detecting the second portion of the input, while the first object is proximate to a first predetermined object snap position, detect a third portion of the input by the contact on the touch sensitive surface.

3014
In response to detecting the third portion of the input by the contact, and in accordance with a determination that the third portion of the input meets drop-off criteria:

3014-a
visually indicate deselection of the first object;

3014-b
move the first object to the first predetermined object snap position; and 3014-c
generating a second tactile output

3006

(A)

3016
The selection criteria require that a characteristic intensity of the contact exceeds a first intensity threshold and that the contact is maintained for at least a predetermined threshold amount of time in order for the selection criteria to be met.

3018
The selection criteria require that a characteristic intensity of the contact exceeds a first intensity threshold and a second intensity threshold above the first intensity threshold.

Figure 30B

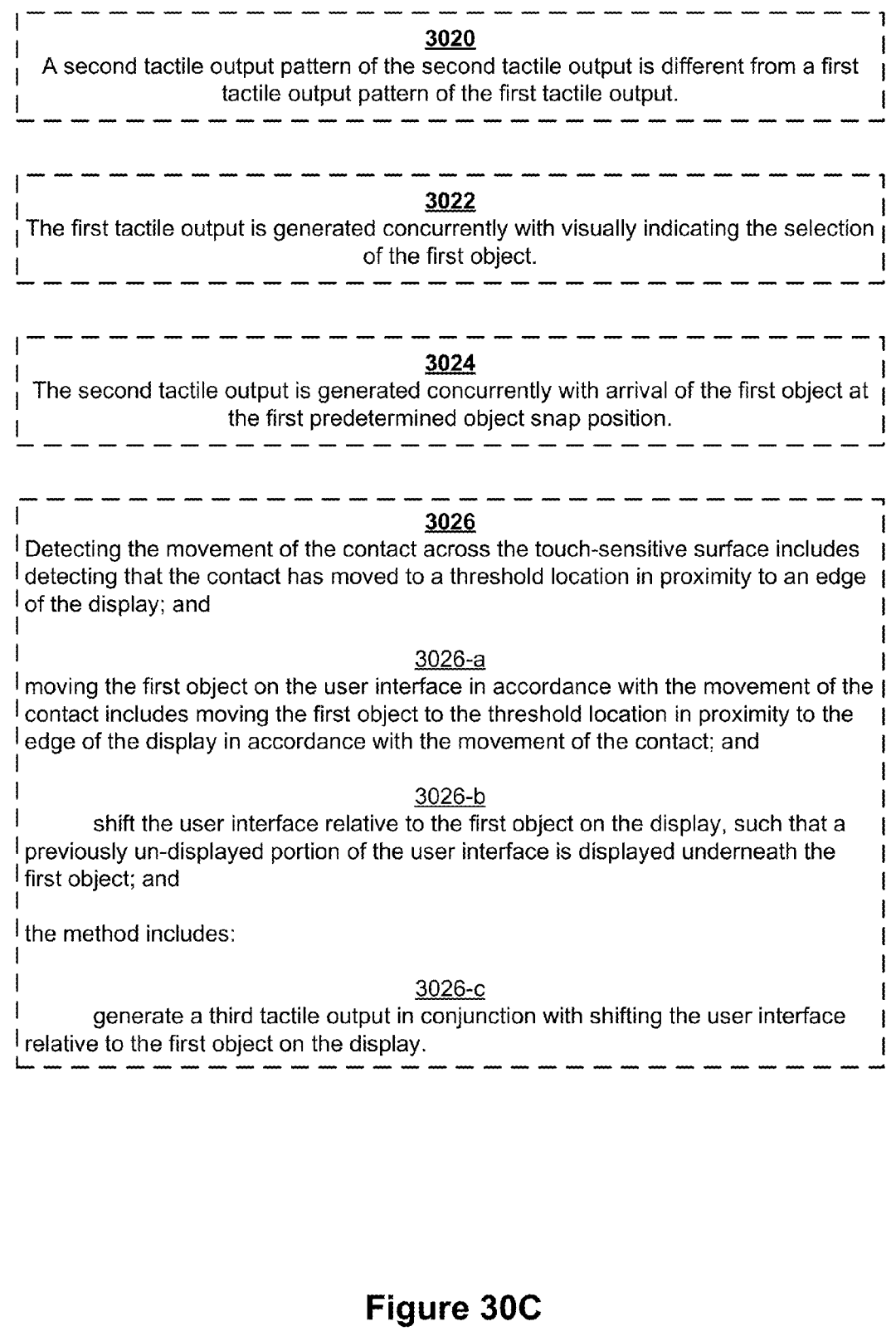

3020
A second tactile output pattern of the second tactile output is different from a first tactile output pattern of the first tactile output.

3022
The first tactile output is generated concurrently with visually indicating the selection of the first object.

3024
The second tactile output is generated concurrently with arrival of the first object at the first predetermined object snap position.

3026
Detecting the movement of the contact across the touch-sensitive surface includes detecting that the contact has moved to a threshold location in proximity to an edge of the display; and 3026-a
moving the first object on the user interface in accordance with the movement of the contact includes moving the first object to the threshold location in proximity to the edge of the display in accordance with the movement of the contact; and 3026-b
shift the user interface relative to the first object on the display, such that a previously un-displayed portion of the user interface is displayed underneath the first object; and the method includes:

3026-c
generate a third tactile output in conjunction with shifting the user interface relative to the first object on the display.

Figure 30C

Figure 30D:
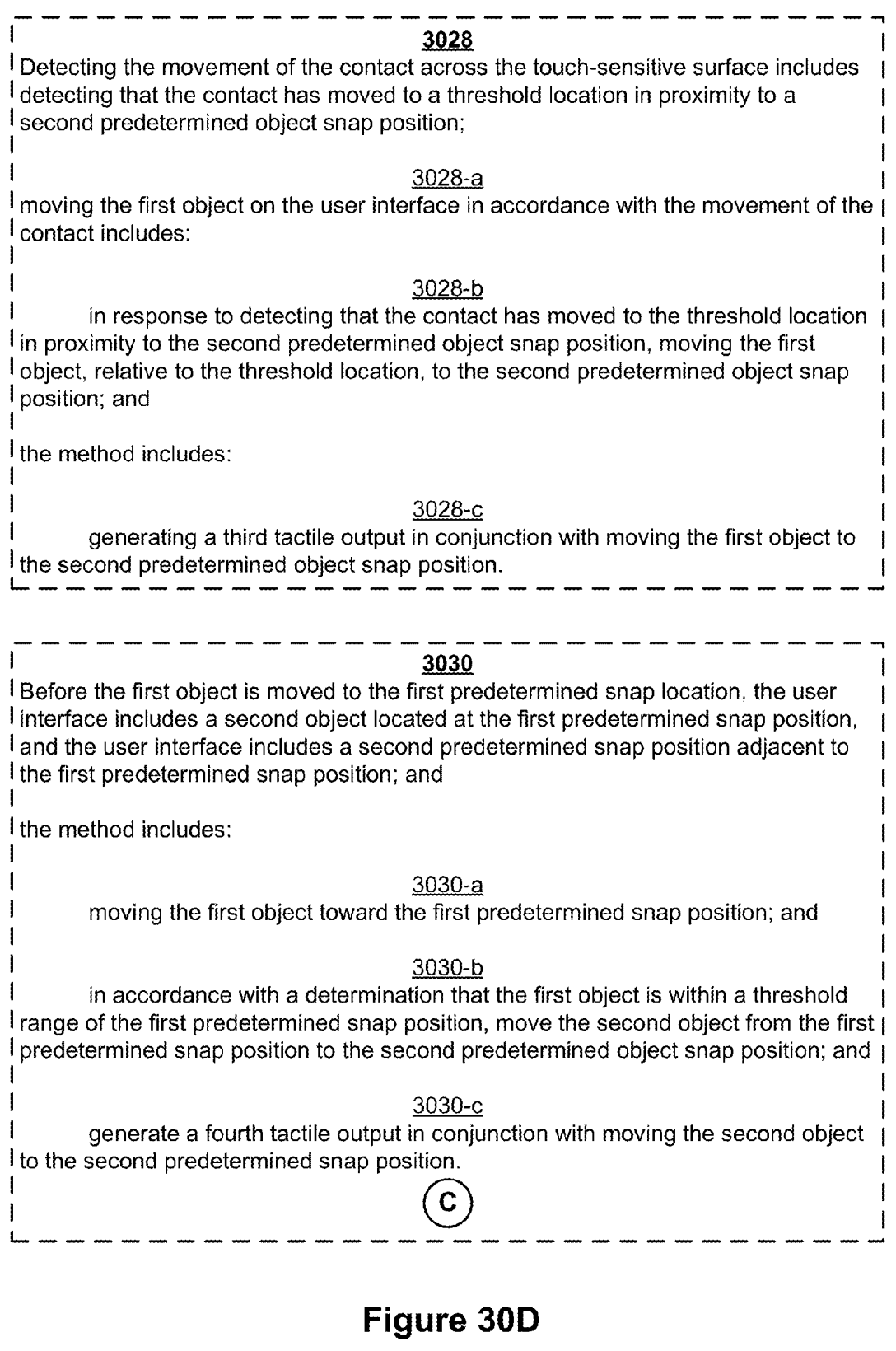

3028
Detecting the movement of the contact across the touch-sensitive surface includes detecting that the contact has moved to a threshold location in proximity to a second predetermined object snap position;

3028-a
moving the first object on the user interface in accordance with the movement of the contact includes:

3028-b
in response to detecting that the contact has moved to the threshold location in proximity to the second predetermined object snap position, moving the first object, relative to the threshold location, to the second predetermined object snap position; and the method includes:

3028-c
generating a third tactile output in conjunction with moving the first object to the second predetermined object snap position.

3030
Before the first object is moved to the first predetermined snap location, the user interface includes a second object located at the first predetermined snap position, and the user interface includes a second predetermined snap position adjacent to the first predetermined snap position; and the method includes:

3030-a
moving the first object toward the first predetermined snap position; and 3030-b
in accordance with a determination that the first object is within a threshold range of the first predetermined snap position, move the second object from the first predetermined snap position to the second predetermined object snap position; and 3030-c
generate a fourth tactile output in conjunction with moving the second object to the second predetermined snap position.

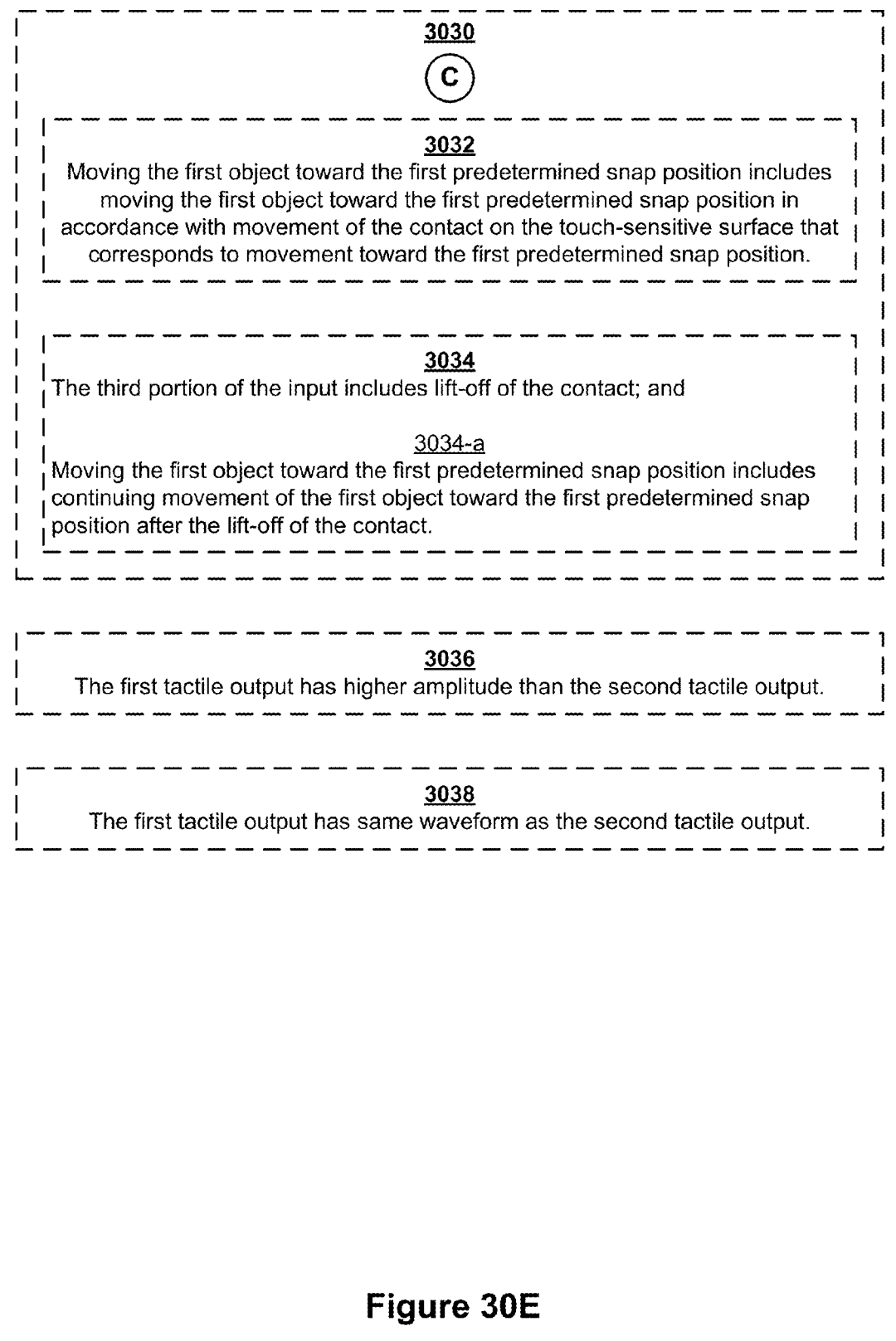

3032
Moving the first object toward the first predetermined snap position includes moving the first object toward the first predetermined snap position in accordance with movement of the contact on the touch-sensitive surface that corresponds to movement toward the first predetermined snap position.

3034
The third portion of the input includes lift-off of the contact; and 3034-a
Moving the first object toward the first predetermined snap position includes continuing movement of the first object toward the first predetermined snap position after the lift-off of the contact.

3036
The first tactile output has higher amplitude than the second tactile output.

3038
The first tactile output has same waveform as the second tactile output.

Figure 30E

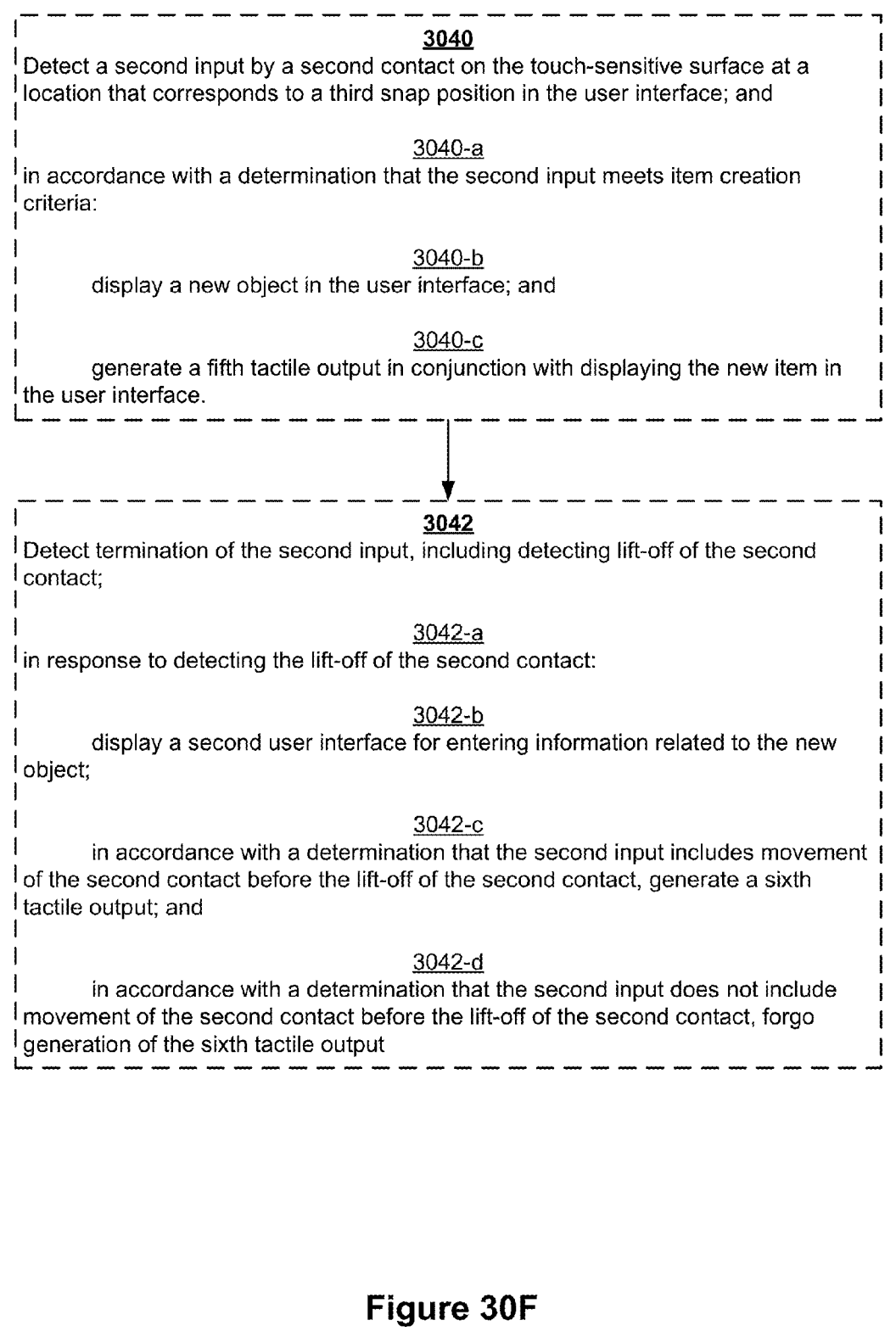

3040
Detect a second input by a second contact on the touch-sensitive surface at a location that corresponds to a third snap position in the user interface; and 3040-a
in accordance with a determination that the second input meets item creation criteria:

3040-b
display a new object in the user interface; and 3040-c
generate a fifth tactile output in conjunction with displaying the new item in the user interface.

↓

3042
Detect termination of the second input, including detecting lift-off of the second contact;

3042-a
in response to detecting the lift-off of the second contact:

3042-b
display a second user interface for entering information related to the new object;

3042-c
in accordance with a determination that the second input includes movement of the second contact before the lift-off of the second contact, generate a sixth tactile output; and 3042-d
in accordance with a determination that the second input does not include movement of the second contact before the lift-off of the second contact, forgo generation of the sixth tactile output

Figure 30F

Figure 30G:
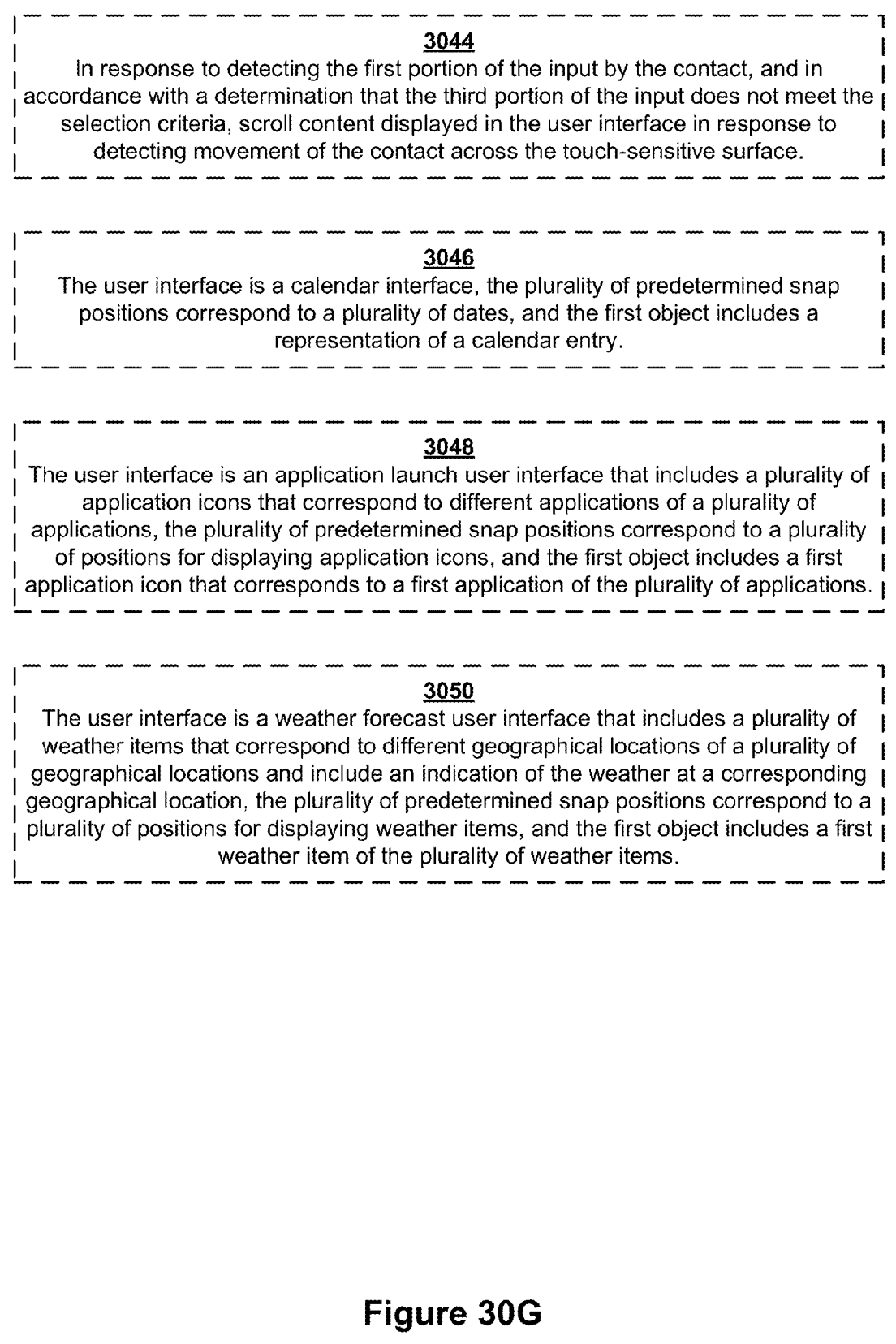

3044
In response to detecting the first portion of the input by the contact, and in accordance with a determination that the third portion of the input does not meet the selection criteria, scroll content displayed in the user interface in response to detecting movement of the contact across the touch-sensitive surface.

3046
The user interface is a calendar interface, the plurality of predetermined snap positions correspond to a plurality of dates, and the first object includes a representation of a calendar entry.

3048
The user interface is an application launch user interface that includes a plurality of application icons that correspond to different applications of a plurality of applications, the plurality of predetermined snap positions correspond to a plurality of positions for displaying application icons, and the first object includes a first application icon that corresponds to a first application of the plurality of applications.

3050
The user interface is a weather forecast user interface that includes a plurality of weather items that correspond to different geographical locations of a plurality of geographical locations and include an indication of the weather at a corresponding geographical location, the plurality of predetermined snap positions correspond to a plurality of positions for displaying weather items, and the first object includes a first weather item of the plurality of weather items.

Figure 32B:
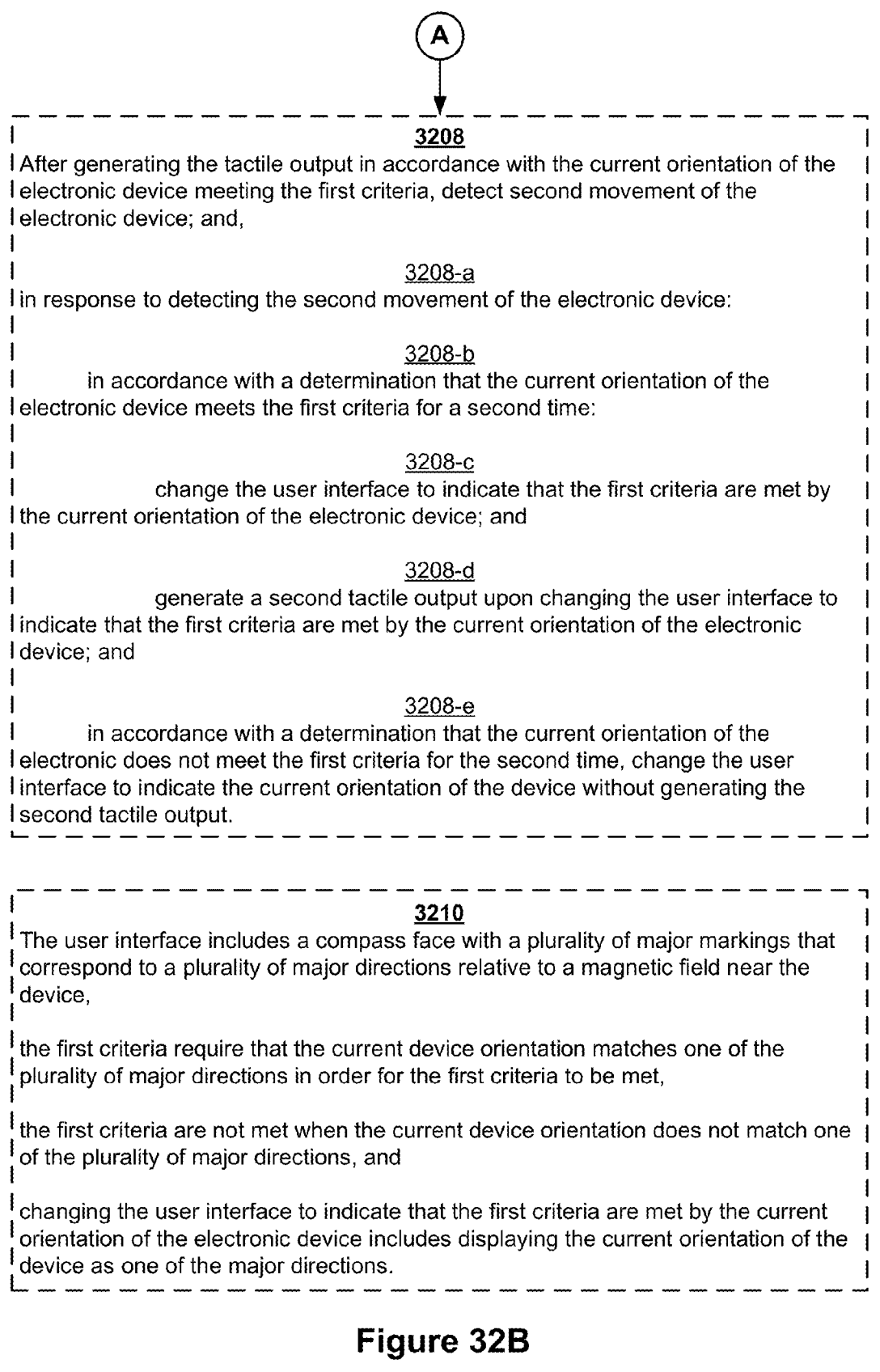

3208
After generating the tactile output in accordance with the current orientation of the electronic device meeting the first criteria, detect second movement of the electronic device; and, 3208-a
in response to detecting the second movement of the electronic device:

3208-b
in accordance with a determination that the current orientation of the electronic device meets the first criteria for a second time:

3208-c
change the user interface to indicate that the first criteria are met by the current orientation of the electronic device; and 3208-d
generate a second tactile output upon changing the user interface to indicate that the first criteria are met by the current orientation of the electronic device; and 3208-e
in accordance with a determination that the current orientation of the electronic does not meet the first criteria for the second time, change the user interface to indicate the current orientation of the device without generating the second tactile output.

3210
The user interface includes a compass face with a plurality of major markings that correspond to a plurality of major directions relative to a magnetic field near the device, the first criteria require that the current device orientation matches one of the plurality of major directions in order for the first criteria to be met, the first criteria are not met when the current device orientation does not match one of the plurality of major directions, and changing the user interface to indicate that the first criteria are met by the current orientation of the electronic device includes displaying the current orientation of the device as one of the major directions.

Figure 32C:
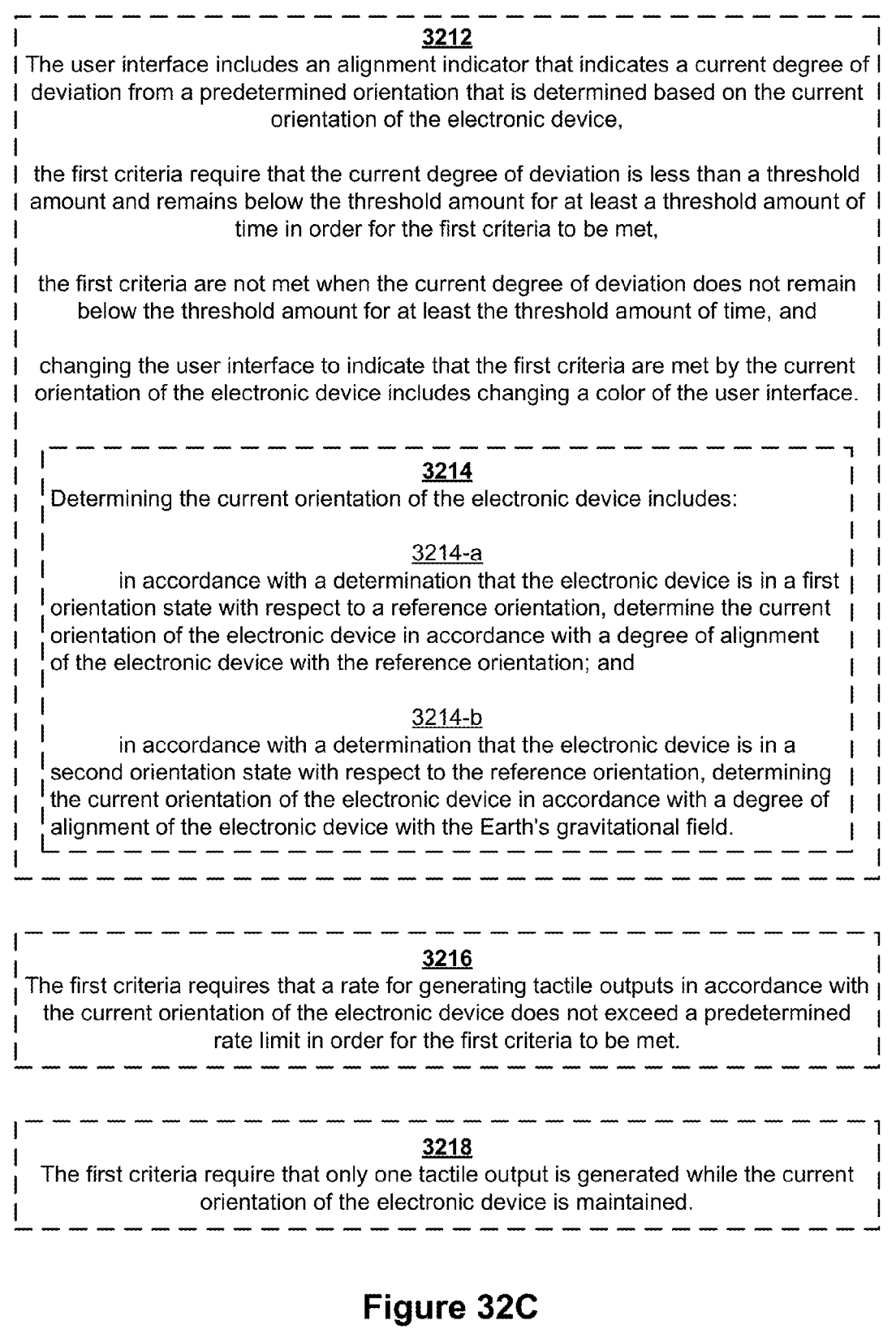

The user interface includes an alignment indicator that indicates a current degree of deviation from a predetermined orientation that is determined based on the current orientation of the electronic device, the first criteria require that the current degree of deviation is less than a threshold amount and remains below the threshold amount for at least a threshold amount of time in order for the first criteria to be met, the first criteria are not met when the current degree of deviation does not remain below the threshold amount for at least the threshold amount of time, and changing the user interface to indicate that the first criteria are met by the current orientation of the electronic device includes changing a color of the user interface.

3214

Determining the current orientation of the electronic device includes:

3214-a in accordance with a determination that the electronic device is in a first orientation state with respect to a reference orientation, determine the current orientation of the electronic device in accordance with a degree of alignment of the electronic device with the reference orientation; and 3214-b in accordance with a determination that the electronic device is in a second orientation state with respect to the reference orientation, determining the current orientation of the electronic device in accordance with a degree of alignment of the electronic device with the Earth's gravitational field.

3216

The first criteria requires that a rate for generating tactile outputs in accordance with the current orientation of the electronic device does not exceed a predetermined rate limit in order for the first criteria to be met.

3218

The first criteria require that only one tactile output is generated while the current orientation of the electronic device is maintained.

Figure 34A:
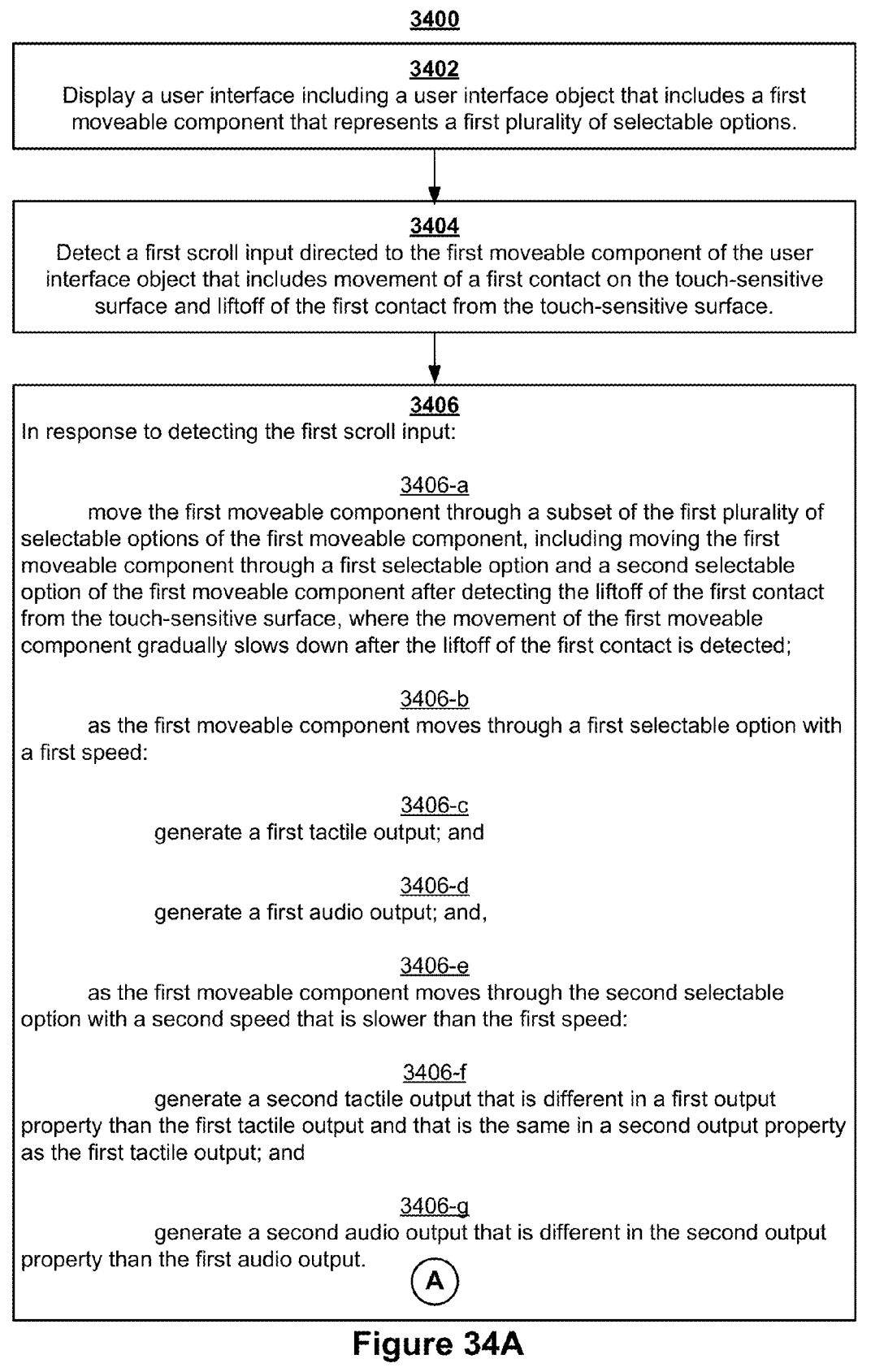

3402
Display a user interface including a user interface object that includes a first moveable component that represents a first plurality of selectable options.

↓

3404
Detect a first scroll input directed to the first moveable component of the user interface object that includes movement of a first contact on the touch-sensitive surface and liftoff of the first contact from the touch-sensitive surface.

↓

3406
In response to detecting the first scroll input:

3406-a
move the first moveable component through a subset of the first plurality of selectable options of the first moveable component, including moving the first moveable component through a first selectable option and a second selectable option of the first moveable component after detecting the liftoff of the first contact from the touch-sensitive surface, where the movement of the first moveable component gradually slows down after the liftoff of the first contact is detected;

3406-b
as the first moveable component moves through a first selectable option with a first speed:

3406-c
generate a first tactile output; and 3406-d
generate a first audio output; and, 3406-e
as the first moveable component moves through the second selectable option with a second speed that is slower than the first speed:

3406-f
generate a second tactile output that is different in a first output property than the first tactile output and that is the same in a second output property as the first tactile output; and 3406-g
generate a second audio output that is different in the second output property than the first audio output.

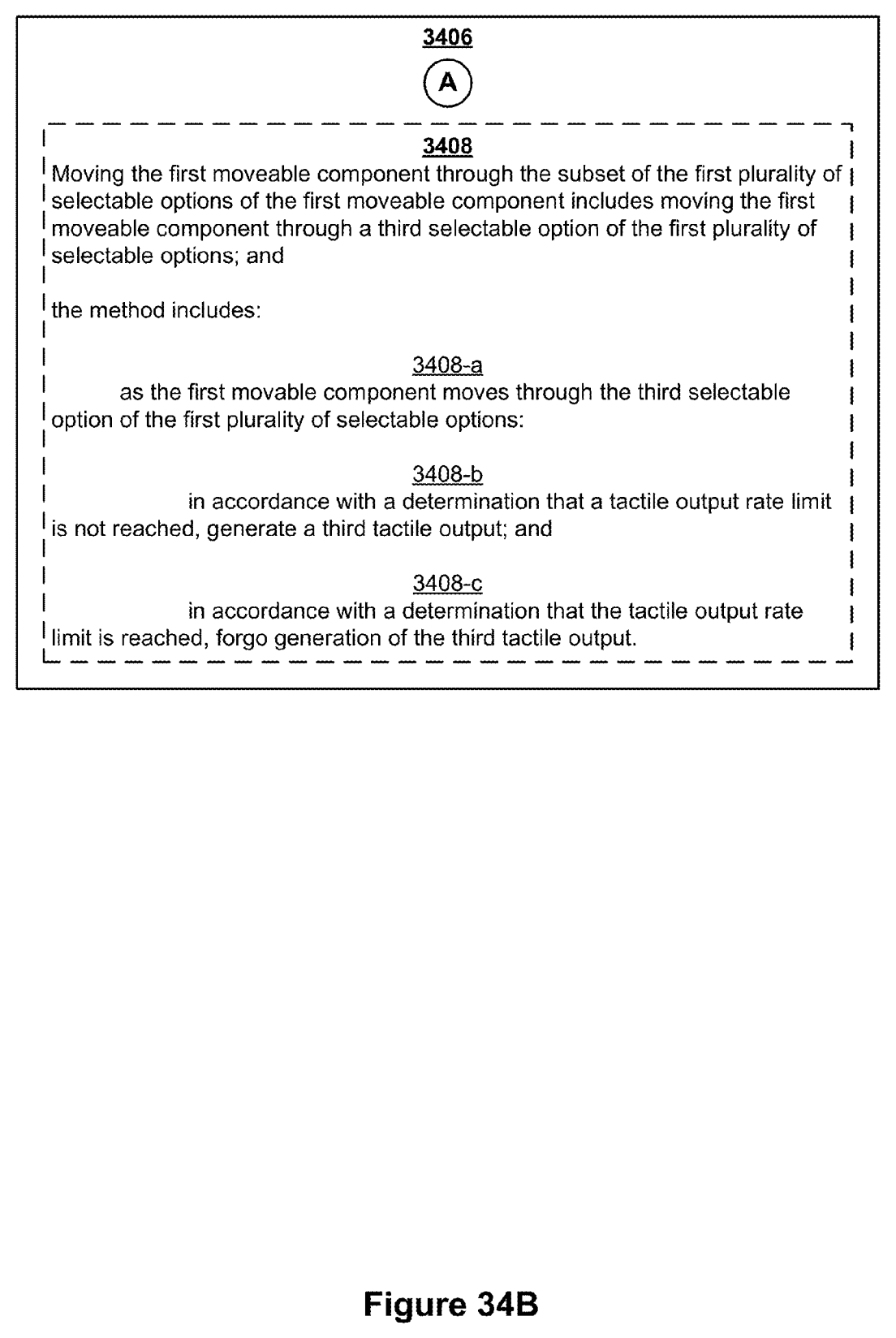

Moving the first moveable component through the subset of the first plurality of selectable options of the first moveable component includes moving the first moveable component through a third selectable option of the first plurality of selectable options; and the method includes:

3408-a as the first movable component moves through the third selectable option of the first plurality of selectable options:

3408-b in accordance with a determination that a tactile output rate limit is not reached, generate a third tactile output; and 3408-c in accordance with a determination that the tactile output rate limit is reached, forgo generation of the third tactile output.

Figure 34B

Figure 34C:
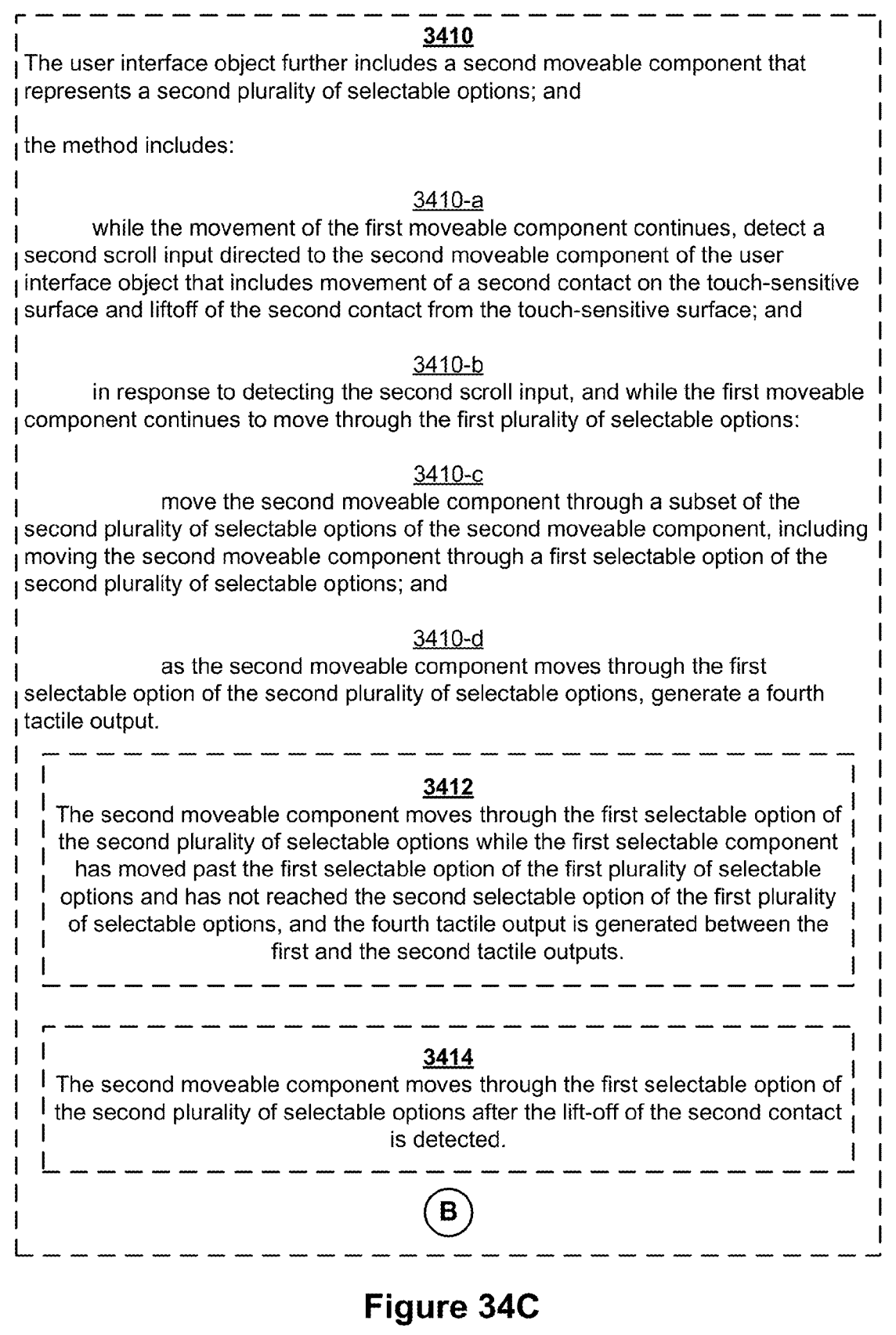

3410
The user interface object further includes a second moveable component that represents a second plurality of selectable options; and the method includes:

3410-a
while the movement of the first moveable component continues, detect a second scroll input directed to the second moveable component of the user interface object that includes movement of a second contact on the touch-sensitive surface and liftoff of the second contact from the touch-sensitive surface; and 3410-b
in response to detecting the second scroll input, and while the first moveable component continues to move through the first plurality of selectable options:

3410-c
move the second moveable component through a subset of the second plurality of selectable options of the second moveable component, including moving the second moveable component through a first selectable option of the second plurality of selectable options; and 3410-d
as the second moveable component moves through the first selectable option of the second plurality of selectable options, generate a fourth tactile output.

3412
The second moveable component moves through the first selectable option of the second plurality of selectable options while the first selectable component has moved past the first selectable option of the first plurality of selectable options and has not reached the second selectable option of the first plurality of selectable options, and the fourth tactile output is generated between the first and the second tactile outputs.

3414
The second moveable component moves through the first selectable option of the second plurality of selectable options after the lift-off of the second contact is detected.

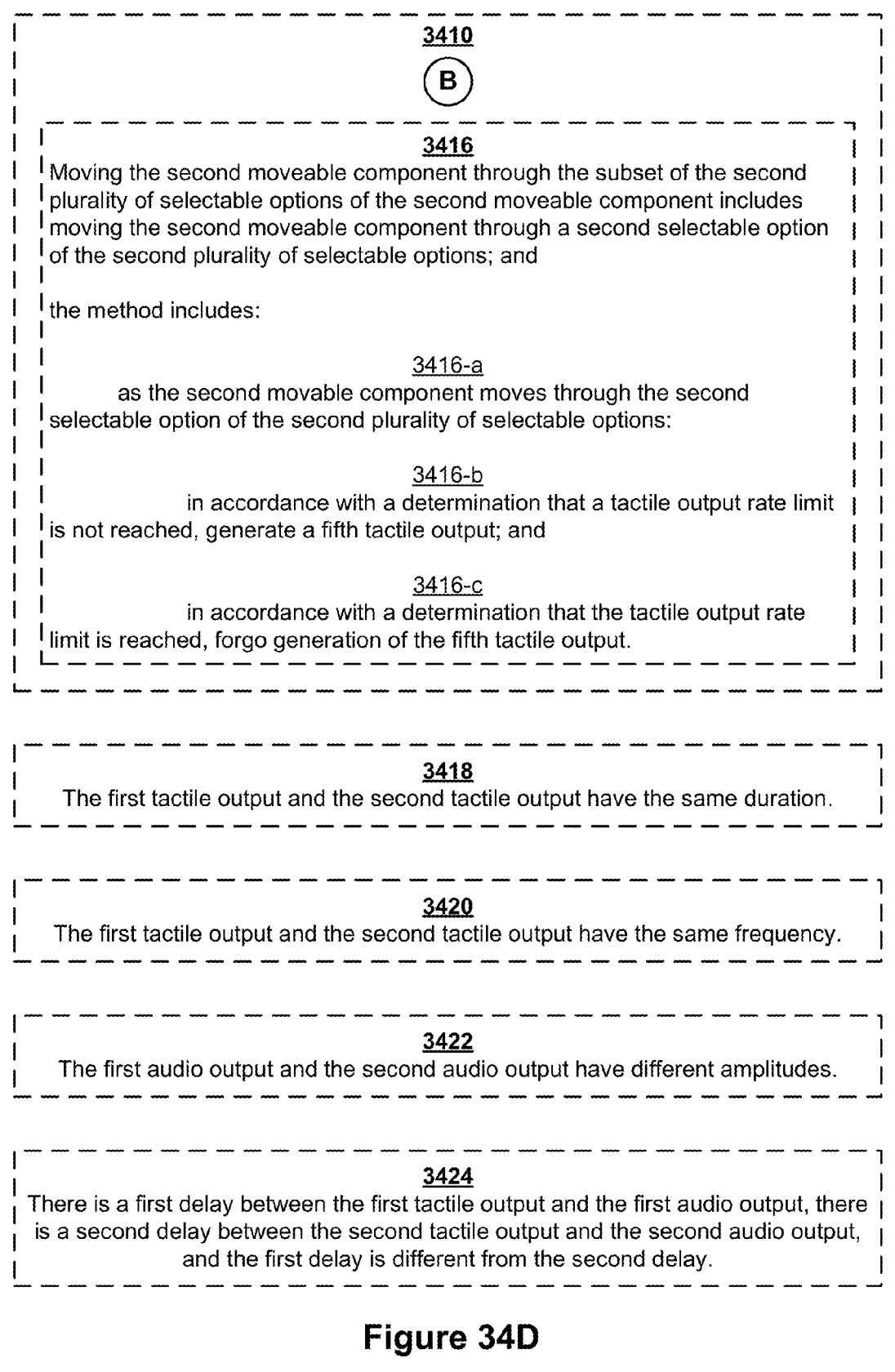

Moving the second moveable component through the subset of the second plurality of selectable options of the second moveable component includes moving the second moveable component through a second selectable option of the second plurality of selectable options; and the method includes:

3416-a as the second movable component moves through the second selectable option of the second plurality of selectable options:

3416-b in accordance with a determination that a tactile output rate limit is not reached, generate a fifth tactile output; and 3416-c in accordance with a determination that the tactile output rate limit is reached, forgo generation of the fifth tactile output.

3418

The first tactile output and the second tactile output have the same duration.

3420

The first tactile output and the second tactile output have the same frequency.

3422

The first audio output and the second audio output have different amplitudes.

3424

There is a first delay between the first tactile output and the first audio output, there is a second delay between the second tactile output and the second audio output, and the first delay is different from the second delay.

Figure 34D

DEVICES, METHODS, AND GRAPHICAL USER INTERFACES FOR PROVIDING HAPTIC FEEDBACK

RELATED APPLICATIONS

This is a continuation of U.S. application Ser. No. 15/272,380, filed Sep. 21, 2016, which claims priority to U.S. Provisional Application Ser. No. 62/384,170, filed Sep. 6, 2016, entitled "Devices, Methods, and Graphical User Interfaces for Providing Haptic Feedback," which claims priority to U.S. Provisional Application Ser. No. 62/349,115, filed Jun. 12, 2016, entitled "Devices, Methods, and Graphical User Interfaces for Providing Haptic Feedback," all of which are incorporated by reference herein in their entirety.

TECHNICAL FIELD

This relates generally to electronic devices with touch-sensitive surfaces, including but not limited to electronic devices with touch-sensitive surfaces that generate tactile outputs to provide haptic feedback to a user.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interfaces and objects therein on a display. Example user interface objects include digital images, video, text, icons, and control elements such as buttons and other graphics.

Haptic feedback, typically in combination with visual and/or audio feedback, is often used in an attempt to make manipulation of user interfaces and user interface objects more efficient and intuitive for a user, thereby improving the operability of electronic devices. But conventional methods of providing haptic feedback are not as helpful as they could be.

SUMMARY

Accordingly, there is a need for electronic devices with improved methods and interfaces for providing haptic feedback. Such methods and interfaces optionally complement or replace conventional methods for providing haptic feedback. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

There is a need for electronic devices with more methods and interfaces for providing haptic feedback indicating crossing of a threshold for triggering or canceling an operation. Such methods and interfaces may complement or replace conventional methods for indicating crossing of a threshold for triggering or canceling an operation. Such methods and interfaces reduce the number, extent, and/or the nature of the inputs from a user and produce a more efficient human-machine interface.

In accordance with some embodiments, a method is performed at an electronic device with a touch-sensitive surface, a display, and one or more tactile output generators for generating tactile outputs. The method includes displaying, on the display, a user interface that includes a first item; while displaying the user interface that includes the first item, detecting a first portion of an input by a first contact on the touch-sensitive surface, where the detecting the first portion of the input by the first contact includes detecting the first contact at a location on the touch-sensitive surface that corresponds to the first item, and detecting a first movement of the first contact on the touch-sensitive surface. The method further includes, in response to detecting the first portion of the input that includes the first movement of the first contact: in accordance with a determination that the first movement of the first contact meets first movement-threshold criteria that are a precondition for performing a first operation, generating a first tactile output, where the first tactile output indicates that the first movement-threshold criteria for the first operation have been met; and in accordance with a determination that the first movement of the first contact does not meet the first movement-threshold criteria for the first operation, forgoing generation of the first tactile output.

In accordance with some embodiments, an electronic device includes a display unit configured to display user interfaces, a touch-sensitive surface unit configured to detect contacts, one or more tactile output generator units configured to generate tactile outputs, and a processing unit coupled with the display unit, the touch-sensitive surface unit, and the one or more tactile output generator units. In some embodiments, the processing unit includes a detecting unit, a performing unit, a moving unit, a revealing unit, and a replacing unit. The processing unit is configured to: enable display of, on the display unit, a user interface that includes a first item; while displaying the user interface that includes the first item, detect a first portion of an input by a first contact on the touch-sensitive surface unit, where detecting the first portion of the input by the first contact includes detecting the first contact at a location on the touch-sensitive surface unit that corresponds to the first item, and detecting a first movement of the first contact on the touch-sensitive surface unit. The processing unit is further configured to: in response to detecting the first portion of the input that includes the first movement of the first contact: in accordance with a determination that the first movement of the first contact meets first movement-threshold criteria that are a precondition for performing a first operation, generate a first tactile output, where the first tactile output indicates that the first movement-threshold criteria for the first operation have been met; and in accordance with a determination that the first movement of the first contact does not meet the first movement-threshold criteria for the first operation, forgo generation of the first tactile output.

In accordance with some embodiments, a method is performed at an electronic device with a touch-sensitive surface, a display, and one or more tactile output generators for generating tactile outputs. The method includes displaying, on the display, an item navigation user interface that includes: a representation of a first portion of a plurality of items, where the plurality of items are arranged into two or more groups that are represented by corresponding index values in a plurality of index values and the first portion of the plurality of items includes a first group of the items that corresponds to a first index value in the plurality of index values; and an index navigation element that includes representations of three or more of the plurality of index values. The method further includes: while displaying the item navigation user interface, detecting a first drag gesture on the touch-sensitive surface that includes movement from a first location corresponding to the representation of the first index value that represents a first group of the items to a second location corresponding to a representation of a second index value that represents a second group of the items; and in response to detecting the first drag gesture: generating, via the one or more tactile output generators, a first tactile output that corresponds to the movement to the second location corresponding to the second index value; and switching from displaying the representation of the first portion of the plurality of items to displaying a representation of a second portion of the plurality of items, where the second portion of the plurality of items include the second group of the items.

In accordance with some embodiments, an electronic device an electronic device includes a display unit configured to display user interfaces; a touch-sensitive surface unit; one or more tactile output generator units configured to generate tactile outputs; and a processing unit coupled to the display unit, the touch-sensitive surface unit, and the one or more tactile output generator units. In some embodiments, the processing unit includes a detecting unit, a switching unit, a replacing unit, a moving unit, and a determining unit. The processing unit is configured to: enable display of, on the display unit, an item navigation user interface that includes: a representation of a first portion of a plurality of items, where the plurality of items are arranged into two or more groups that are represented by corresponding index values in a plurality of index values and the first portion of the plurality of items includes a first group of the items that corresponds to a first index value in the plurality of index values; an index navigation element that includes representations of three or more of the plurality of index values; while displaying the item navigation user interface, detect a first drag gesture on the touch-sensitive surface unit that includes movement from a first location corresponding to the representation of the first index value that represents a first group of the items to a second location corresponding to a representation of a second index value that represents a second group of the items; and in response to detecting the first drag gesture: generate, via the one or more tactile output generator units, a first tactile output that corresponds to the movement to the second location corresponding to the second index value; and switch from displaying the representation of the first portion of the plurality of items to displaying a representation of a second portion of the plurality of items, where the second portion of the plurality of items include the second group of the items.

In accordance with some embodiments, a method is performed at an electronic device with a touch-sensitive surface, a display, and one or more tactile output generators for generating tactile outputs. The method includes displaying a user interface on the display, where the user interface includes an adjustable control; detecting a contact on the touch-sensitive surface at a location that corresponds to the adjustable control on the display, where movement of the contact that corresponds to movement away from the adjustable control changes an adjustment rate for adjusting the adjustable control based on movement of the contact; while continuously detecting the contact on the touch-sensitive surface: detecting a first movement of the contact across the touch-sensitive surface. The method further includes: in response to detecting the first movement of the contact: in accordance with a determination that the first movement of the contact corresponds to more than a first threshold amount of movement of a focus selector away from the adjustable control, where the first threshold amount of movement triggers a transition from a first adjustment rate to a second adjustment rate: generating a first tactile output, via the one or more tactile output devices, when the focus selector has reached the first threshold amount of movement; and adjusting the adjustable control at the second adjustment rate in accordance with movement of the contact that is detected after the focus selector has moved more than the first threshold amount; and in accordance with a determination that the first movement of the contact corresponds to less than the first threshold amount of movement of the focus selector away from the adjustable control, adjusting the adjustable control at the first adjustment rate in accordance with movement of the contact without generating the first tactile output.

In accordance with some embodiments, an electronic device includes a display unit configured to display user interfaces; a touch-sensitive surface unit; one or more tactile output generator units configured to generate tactile outputs; and a processing unit coupled to the display unit, the touch-sensitive surface unit, and the one or more tactile output generator units. In some embodiments, the processing unit includes a detecting unit, an adjusting unit, a switching unit, a determining unit, and a maintaining unit. The processing unit is configured to: enable display of (e.g., with the display unit) a user interface on the display unit, where the user interface includes an adjustable control; detect (e.g., with the detecting unit) a contact on the touch-sensitive surface unit at a location that corresponds to the adjustable control on the display unit, where movement of the contact that corresponds to movement away from the adjustable control changes an adjustment rate for adjusting the adjustable control based on movement of the contact; while continuously detecting the contact on the touch-sensitive surface unit: detect (e.g., with the detecting unit) a first movement of the contact across the touch-sensitive surface unit; and in response to detecting the first movement of the contact: in accordance with a determination that the first movement of the contact corresponds to more than a first threshold amount of movement of a focus selector away from the adjustable control, where the first threshold amount of movement triggers a transition from a first adjustment rate to a second adjustment rate: generate (e.g., with the tactile output generator unit(s)) a first tactile output, via the one or more tactile output devices, when the focus selector has reached the first threshold amount of movement; and adjust (e.g., with the adjusting unit) the adjustable control at the second adjustment rate in accordance with movement of the contact that is detected after the focus selector has moved more than the first threshold amount; and in accordance with a determination that the first movement of the contact corresponds to less than the first threshold amount of movement of the focus selector away from the adjustable control, adjust the adjustable control at the first adjustment rate in accordance with movement of the contact without generating the first tactile output.

In accordance with some embodiments, a method is performed at an electronic device with a touch-sensitive surface, a display, and one or more tactile output generators for generating tactile outputs. The method includes displaying a user interface on the display, where the user interface includes a slider control that represents a continuous range of values between a first value and a second value, the slider control includes a first end that corresponds to the first value and a second end that corresponds to the second value, the slider control further includes a movable indicator that is configured to move along the slider control between the first end and the second end of the slider control, to indicate a current value selected from the continuous range of values represented by the slider control. The method further includes detecting a contact on the touch-sensitive surface at a location that corresponds to the moveable indicator of the slider control; detecting movement of the contact on the touch-sensitive surface; and in response to detecting the movement of the contact, moving the moveable indicator along the slider control in accordance with the movement of the contact; and generating a first tactile output upon the moveable indicator reaching the first end of the slider control in accordance with the movement of the contact, where a tactile output pattern of the first tactile output is configured based on a movement speed of the movable indicator when the moveable indicator reaches the first end of the slider control.

In accordance with some embodiments, an electronic device includes a display unit configured to display user interfaces; a touch-sensitive surface unit; one or more tactile output generator units configured to generate tactile outputs; and a processing unit coupled to the display unit, the touch-sensitive surface unit, and the one or more tactile output generator units. In some embodiments, the processing unit includes a detecting unit, a moving unit, and a changing unit. The processing unit is configured to: enable display of a user interface on the display unit, where: the user interface includes a slider control that represents a continuous range of values between a first value and a second value, the slider control includes a first end that corresponds to the first value and a second end that corresponds to the second value, the slider control further includes a movable indicator that is configured to move along the slider control between the first end and the second end of the slider control, to indicate a current value selected from the continuous range of values represented by the slider control; detect a contact on the touch-sensitive surface unit at a location that corresponds to the moveable indicator of the slider control; detect movement of the contact on the touch-sensitive surface unit; and in response to detecting the movement of the contact, move the moveable indicator along the slider control in accordance with the movement of the contact; and generate a first tactile output upon the moveable indicator reaching the first end of the slider control in accordance with the movement of the contact, where a tactile output pattern of the first tactile output is configured based on a movement speed of the movable indicator when the moveable indicator reaches the first end of the slider control.

In accordance with some embodiments, a method is performed at an electronic device with a touch-sensitive surface, a display, and one or more tactile output generators for generating tactile outputs. The method includes displaying a user interface on the display, where the user interface includes a first user interface element; detecting a contact at a location on the touch-sensitive surface that corresponds to the first user interface element; detecting an input by the contact, including detecting a movement of the contact across the touch-sensitive surface. The method further includes: in response to detecting the input by the contact: changing a position of an outer edge of the user interface element relative to a first threshold position in the user interface in accordance with the movement of the contact on the touch-sensitive surface; detecting that the change in the position of the outer edge of the user interface element relative to the first threshold position in the user interface has caused the outer edge of the user interface element to move across the first threshold position in the user interface; after detecting that the outer edge of the user interface element has moved across the first threshold position in the user interface generating a tactile output; and moving the position of the outer edge of the user interface element to the first threshold position.

In accordance with some embodiments, an electronic device includes a display unit configured to display user interfaces; a touch-sensitive surface unit; one or more tactile output generator units configured to generate tactile outputs; and a processing unit coupled to the display unit, the touch-sensitive surface unit, and the one or more tactile output generator units. In some embodiments, the processing unit includes a detecting unit, a changing unit, a moving unit, a scrolling unit, an expanding unit, and a shrinking unit. The processing unit is configured to: enable display of a user interface on the display unit, where the user interface includes a first user interface element; detect a contact at a location on the touch-sensitive surface unit that corresponds to the first user interface element; detect an input by the contact, including detecting a movement of the contact across the touch-sensitive surface unit; in response to detecting the input by the contact: change a position of an outer edge of the user interface element relative to a first threshold position in the user interface in accordance with the movement of the contact on the touch-sensitive surface unit; detect that the change in the position of the outer edge of the user interface element relative to the first threshold position in the user interface has caused the outer edge of the user interface element to move across the first threshold position in the user interface; after detecting that the outer edge of the user interface element has moved across the first threshold position in the user interface, generate a tactile output; and move the position of the outer edge of the user interface element to the first threshold position.

In accordance with some embodiments, a method is performed at an electronic device with a touch-sensitive surface, a display, and one or more tactile output generators for generating tactile outputs. The method includes displaying a user interface on the display, where the user interface includes a first object and a plurality of predetermined object snap positions; detecting a first portion of an input by a contact on the touch-sensitive surface at a location that corresponds to the first object in the user interface; in response to detecting the first portion of the input by the contact, and in accordance with a determination that the first portion of the input meets selection criteria: visually indicating selection of the first object; and generating a first tactile output in conjunction with visually indicating selection of the first object. The method further includes: while the first object is selected, detecting a second portion of the input by the contact on the touch-sensitive surface, where detecting the second portion of the input includes detecting movement of the contact across the touch-sensitive surface; in response to detecting the second portion of the input by the contact, moving the first object on the user interface in accordance with the movement of the contact; after detecting the second portion of the input, while the first object is proximate to a first predetermined object snap position, detecting a third portion of the input by the contact on the touch sensitive surface; and in response to detecting the third portion of the input by the contact, and in accordance with a determination that the third portion of the input meets drop-off criteria: visually indicating deselection of the first object; moving the first object to the first predetermined object snap position; and generating a second tactile output.

In accordance with some embodiments, an electronic device includes a display unit configured to display user interfaces; a touch-sensitive surface unit; one or more tactile output generator units configured to generate tactile outputs; and a processing unit coupled to the display unit, the touch-sensitive surface unit, and the one or more tactile output generator units. In some embodiments, the processing unit includes a detecting unit, a moving unit, a shifting unit, and a scrolling unit. The processing unit is configured to: enable display of a user interface on the display unit, where the user interface includes a first object and a plurality of predetermined object snap positions; detect a first portion of an input by a contact on the touch-sensitive surface unit at a location that corresponds to the first object in the user interface; in response to detecting the first portion of the input by the contact, and in accordance with a determination that the first portion of the input meets selection criteria: visually indicate selection of the first object; and generate a first tactile output in conjunction with visually indicating selection of the first object; while the first object is selected, detect a second portion of the input by the contact on the touch-sensitive surface unit, where detecting the second portion of the input includes detecting movement of the contact across the touch-sensitive surface unit; in response to detecting the second portion of the input by the contact, move the first object on the user interface in accordance with the movement of the contact; after detecting the second portion of the input, while the first object is proximate to a first predetermined object snap position, detect a third portion of the input by the contact on the touch sensitive surface; and in response to detecting the third portion of the input by the contact, and in accordance with a determination that the third portion of the input meets drop-off criteria: visually indicate deselection of the first object; move the first object to the first predetermined object snap position; and generate a second tactile output.

In accordance with some embodiments, a method is performed at an electronic device with a touch-sensitive surface, a display, one or more tactile output generators for generating tactile outputs, and one or more orientation sensors for determining a current orientation of the electronic device. The method includes displaying a user interface on the display, where the user interface includes an indicator of device orientation that indicates the current orientation of the electronic device; detecting movement of the electronic device; and, in response to detecting the movement of the electronic device: in accordance with a determination that the current orientation of the electronic device meets first criteria: changing the user interface to indicate that the first criteria are met by the current orientation of the electronic device; and generating a tactile output upon changing the user interface to indicate that the first criteria are met by the current orientation of the electronic device; and in accordance with a determination that the current orientation of the electronic device does not meet the first criteria, changing the user interface to indicate the current orientation of the device without generating the tactile output.

In accordance with some embodiments, an electronic device includes a display unit configured to display user interfaces; a touch-sensitive surface unit; one or more tactile output generator units configured to generate tactile outputs; one or more orientation sensors configured to determine a current orientation of the electronic device, and a processing unit coupled to the display unit, the touch-sensitive surface unit, the one or more tactile output generator units, and the one or more orientation sensors. In some embodiments, the processing unit includes a detecting unit, a changing unit, and a determining unit. The processing unit is configured to: enable display of a user interface on the display unit, where the user interface includes an indicator of device orientation that indicates the current orientation of the electronic device; detect movement of the electronic device; and, in response to detecting the movement of the electronic device: in accordance with a determination that the current orientation of the electronic device meets first criteria: change the user interface to indicate that the first criteria are met by the current orientation of the electronic device; and generate a tactile output upon changing the user interface to indicate that the first criteria are met by the current orientation of the electronic device; and in accordance with a determination that the current orientation of the electronic device does not meet the first criteria, change the user interface to indicate the current orientation of the device without generating the tactile output.

In accordance with some embodiments, a method is performed at an electronic device with a touch-sensitive surface, a display, and one or more tactile output generators for generating tactile outputs. The method includes displaying a user interface on the display, wherein the user interface includes a user interface object that includes a first moveable component that represents a first plurality of selectable options; detecting a first scroll input directed to the first moveable component of the user interface object that includes movement of a first contact on the touch-sensitive surface and liftoff of the first contact from the touch-sensitive surface; in response to detecting the first scroll input: moving the first moveable component through a subset of the first plurality of selectable options of the first moveable component, including moving the first moveable component through a first selectable option and a second selectable option of the first moveable component after detecting the liftoff of the first contact from the touch-sensitive surface, wherein the movement of the first moveable component gradually slows down after the liftoff of the first contact is detected; as the first moveable component moves through a first selectable option with a first speed: generating a first tactile output; and generating a first audio output; and, as the first moveable component moves through the second selectable option with a second speed that is slower than the first speed: generating a second tactile output that is different in a first output property than the first tactile output and that is the same in a second output property as the first tactile output; and generating a second audio output that is different in the second output property than the first audio output.

In accordance with some embodiments, an electronic device includes a display unit configured to display user interfaces; a touch-sensitive surface unit; one or more tactile output generator units configured to generate tactile outputs; and a processing unit coupled to the display unit, the touch-sensitive surface unit, and the one or more tactile output generator units. In some embodiments, the processing unit includes a detecting unit, a moving unit, and a determining unit. The processing unit is configured to: enable display of a user interface on the display unit, where the user interface includes a user interface object that includes a first moveable component that represents a first plurality of selectable options; detect a first scroll input directed to the first moveable component of the user interface object that includes movement of a first contact on the touch-sensitive surface unit and liftoff of the first contact from the touch-sensitive surface unit; in response to detecting the first scroll input: move the first moveable component through a subset of the first plurality of selectable options of the first moveable component, including moving the first moveable component through a first selectable option and a second selectable option of the first moveable component after detecting the liftoff of the first contact from the touch-sensitive surface unit, where the movement of the first moveable component gradually slows down after the liftoff of the first contact is detected; as the first moveable component moves through a first selectable option with a first speed: generate a first tactile output; and generate a first audio output; and, as the first moveable component moves through the second selectable option with a second speed that is slower than the first speed: generate a second tactile output that is different in a first output property than the first tactile output and that is the same in a second output property as the first tactile output; and generate a second audio output that is different in the second output property than the first audio output.

Thus, electronic devices with displays and touch-sensitive surfaces are provided with more methods and interfaces for providing haptic feedback, thereby increasing the effectiveness, efficiency, and user satisfaction with such devices. Such methods and interfaces may complement or replace conventional methods for providing haptic feedback.

In accordance with some embodiments, an electronic device includes a display, a touch-sensitive surface, optionally one or more sensors to detect intensities of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensities of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, and optionally one or more sensors to detect intensities of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensities of contacts with the touch-sensitive surface, includes means for performing or causing performance of the operations of any of the methods described herein.

Thus, electronic devices with displays, touch-sensitive surfaces, optionally one or more sensors to detect intensities of contacts with the touch-sensitive surface, one or more tactile output generators, optionally one or more device orientation sensors, and optionally an audio system, are provided with improved methods and interfaces for providing haptic feedback to a user, thereby increasing the effectiveness, efficiency, and user satisfaction with such devices. Such methods and interfaces may complement or replace conventional methods for providing haptic feedback to a user.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 20A-20G are flow diagrams of a process for providing haptic feedback indicating crossing of a threshold for triggering or canceling an operation in accordance with some embodiments.

FIGS. 22A-22E are flow diagrams of a process for providing haptic feedback in conjunction with switching between subsets of indexed content during navigation of indexed content in accordance with some embodiments.

FIGS. 24A-24G are flow diagrams of a process for providing haptic feedback during variable rate scrubbing in accordance with some embodiments.

FIGS. 26A-26E are flow diagrams of a process for providing haptic feedback for interaction with a slider control in accordance with some embodiments.

FIGS. 28A-28E are flow diagrams of a process for providing haptic feedback in conjunction with visual rubber band effect in accordance with some embodiments.

FIGS. 30A-30G are flow diagrams of a process for providing haptic feedback to indicate selection, picking up, dragging, dropping, and/or snapping of objects in a user interface in accordance with some embodiments.

FIGS. 32A-32C are flow diagrams of a process for providing haptic feedback on satisfaction of device orientation criteria in accordance with some embodiments.

FIGS. 34A-34D are flow diagrams of a process for providing haptic feedback for selection of a respective value in a value picker in accordance with some embodiments.

DESCRIPTION OF EMBODIMENTS

Figure 1A:
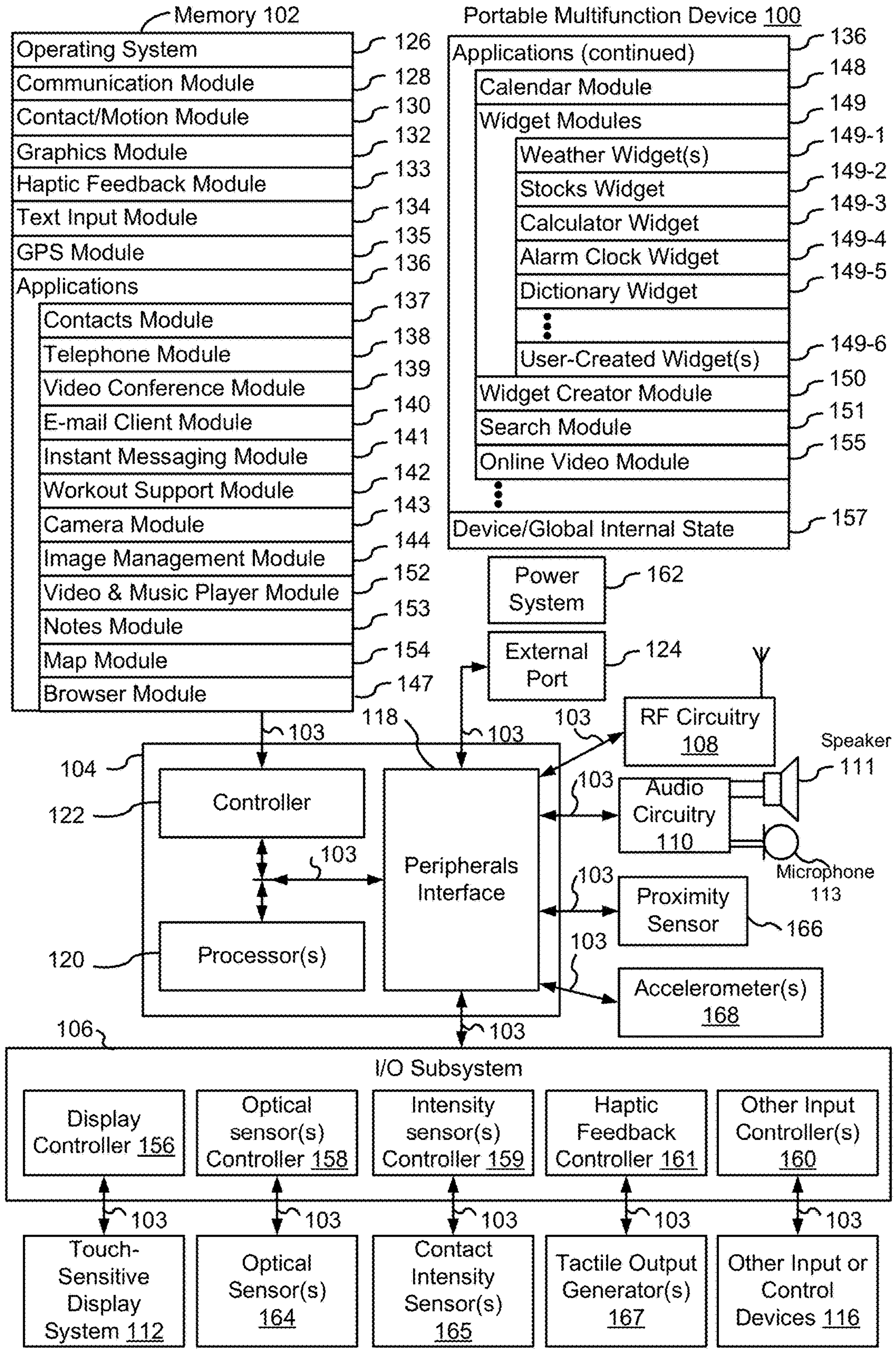
FIG. 1A is a block diagram illustrating a portable multifunction device with a touch-sensitive display in accordance with some embodiments.

Many electronic devices provide feedback as input is detected at a graphical user interface to provide an indication of the effects the input has on device operations. Methods described herein provide haptic feedback, often in conjunction with visual and/or audio feedback, to help a user understand the effects of detected inputs on device operations and to provide information to a user about the state of a device.

The methods, devices, and GUIs described herein use haptic feedback to improve user interface interactions in multiple ways. For example, they make it easier to: indicate hidden thresholds; perform scrubbing, such as index bar scrubbing and variable rate scrubbing; enhance rubber band effects; drag and drop objects; indicate device orientation; and scroll movable user interface components that represent selectable options.

EXAMPLE DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

Figure 4A:
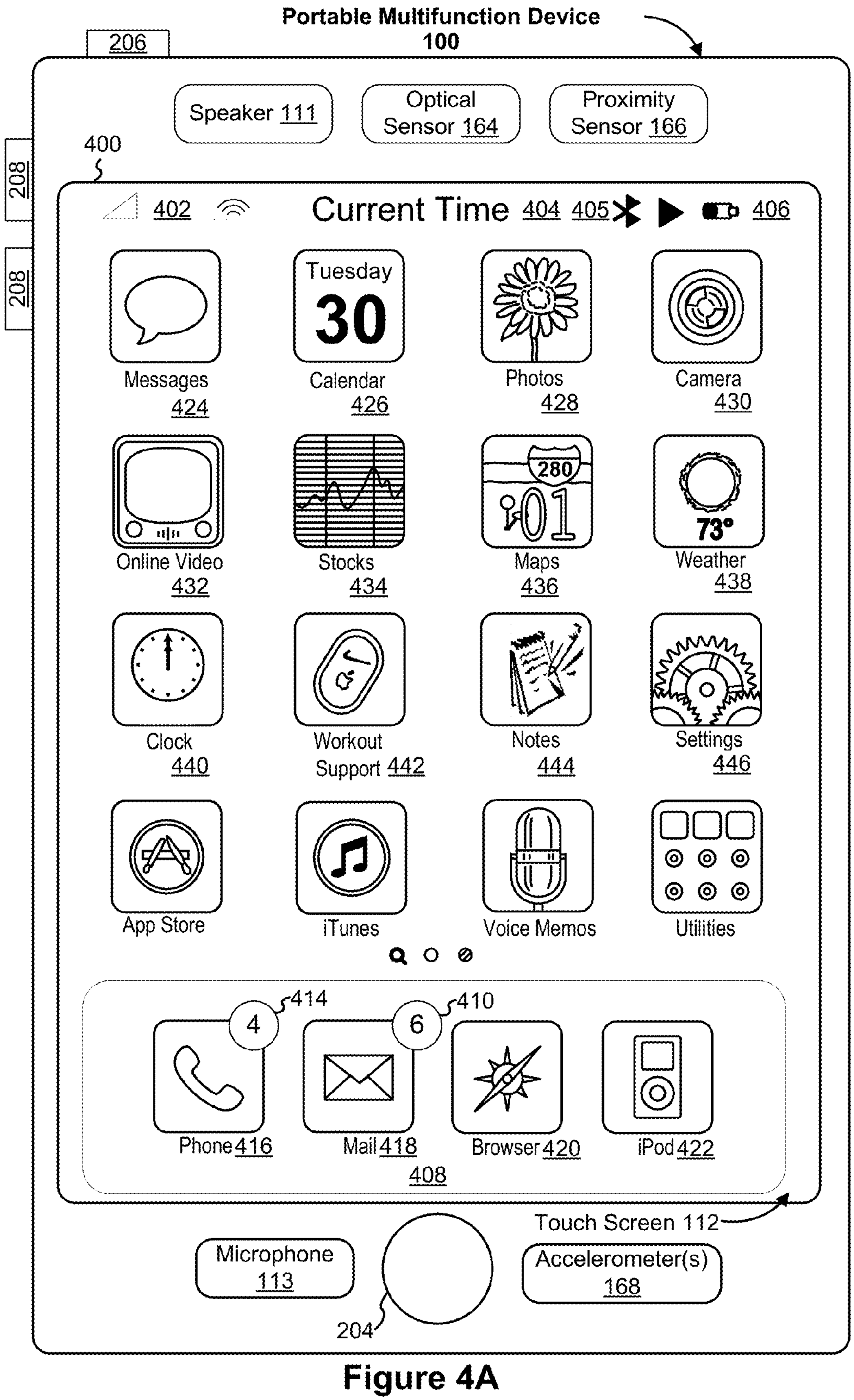
FIG. 4A illustrates an example user interface for a menu of applications on a portable multifunction device in accordance with some embodiments.
Figure 4B:
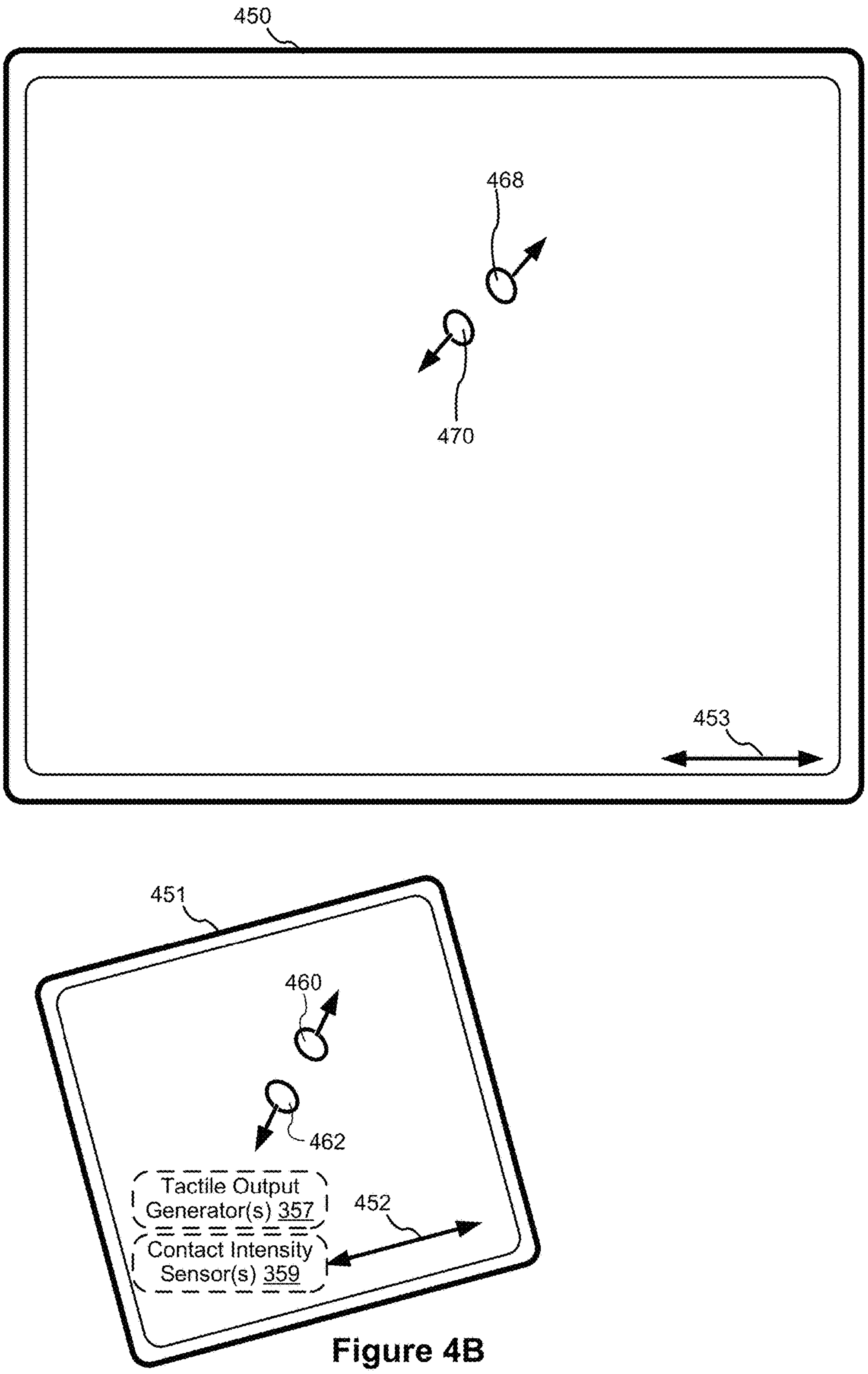
FIG. 4B illustrates an example user interface for a multifunction device with a touch-sensitive surface that is separate from the display in accordance with some embodiments.
Figure 4C:
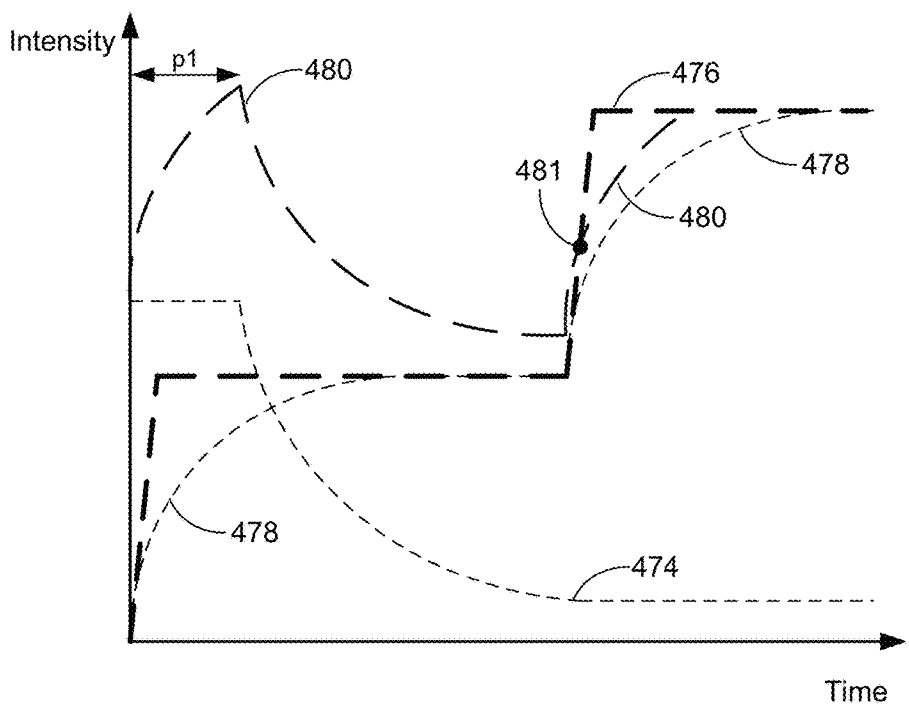
FIGS. 4C-4E illustrate examples of dynamic intensity thresholds in accordance with some embodiments.
Figure 4D:
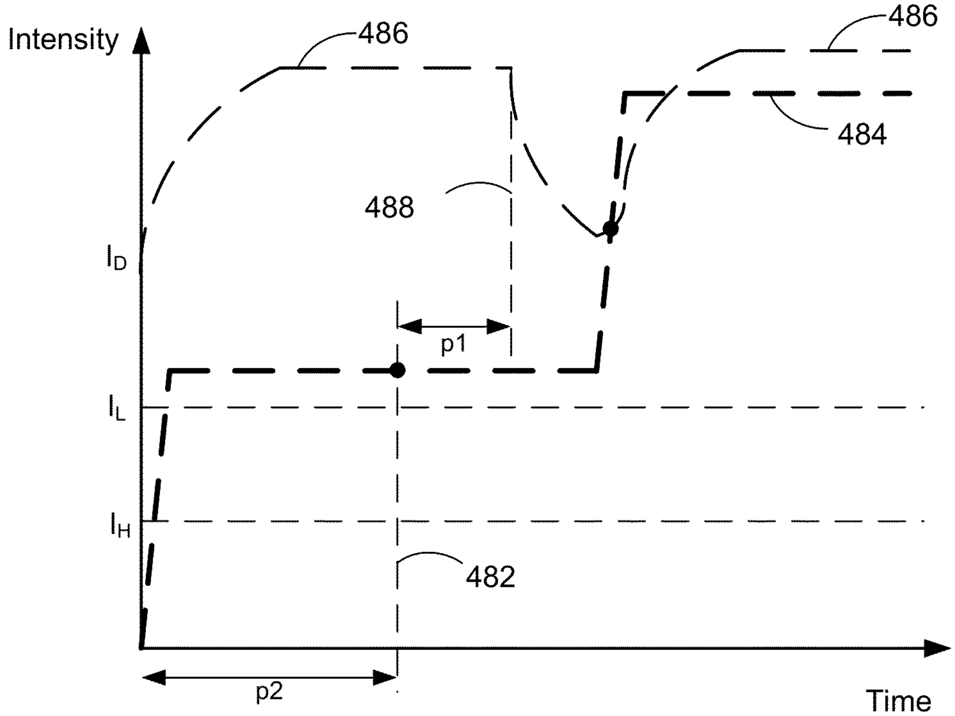
Figure 4E:
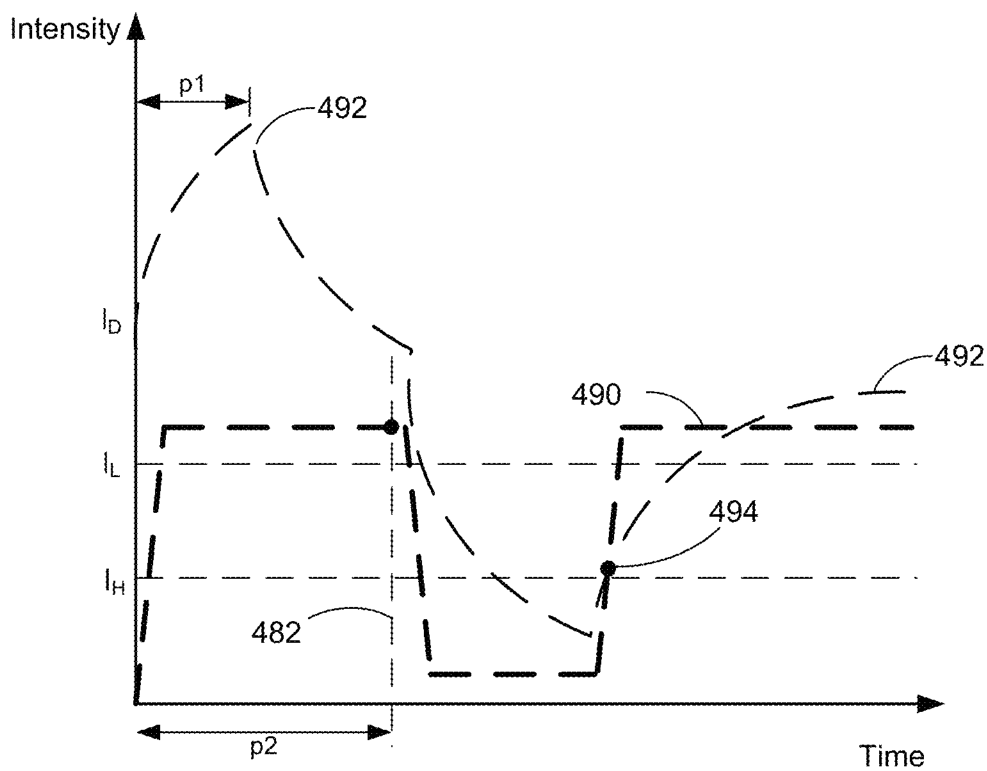
Figure 4F:
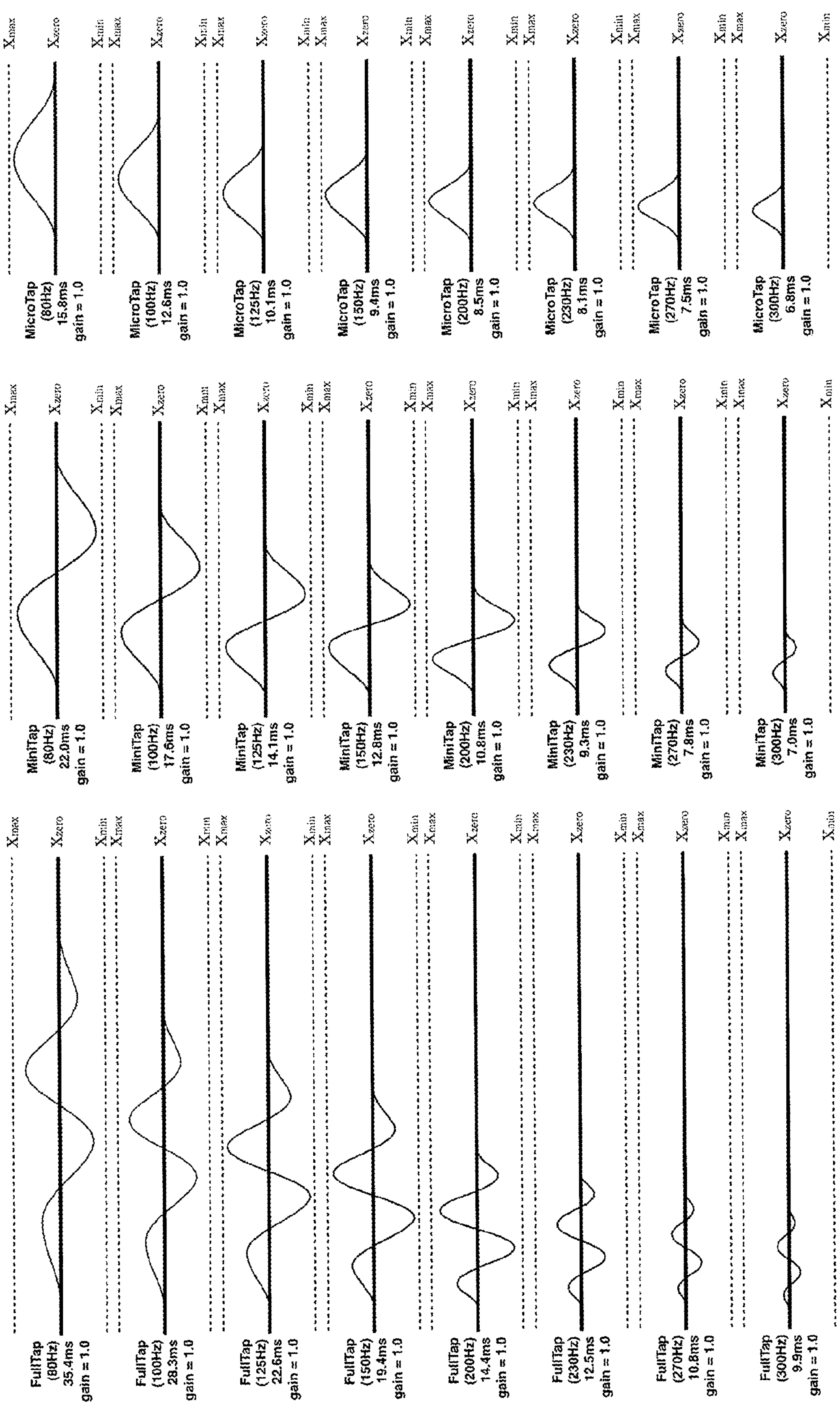
FIGS. 4F-4G illustrate a set of sample tactile output patterns in accordance with some embodiments.
Figure 4G:
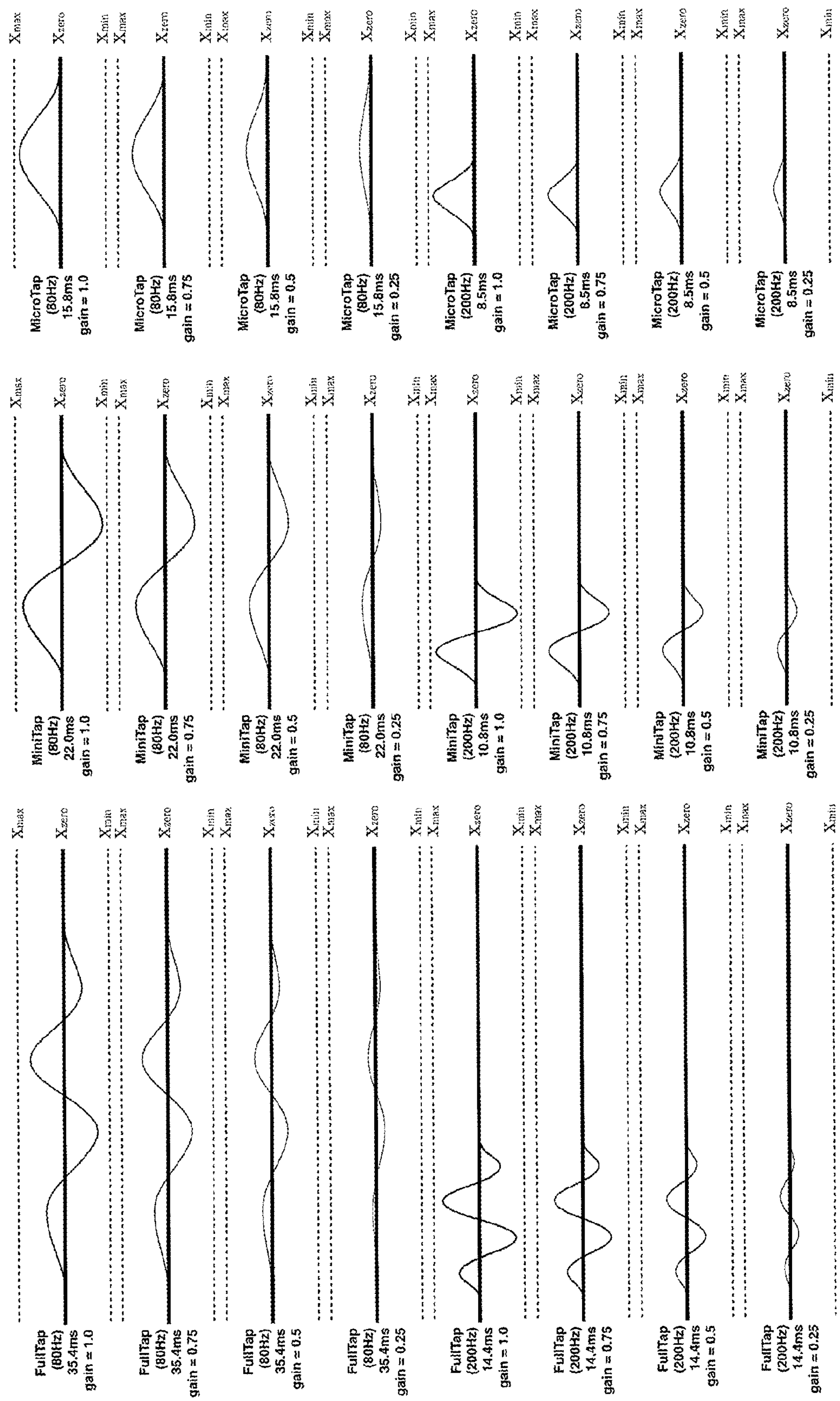

FIG. 4F provides a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in this figure, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIG. 4G, which are each shown with variants having a gain of 1.0, 0.75, 0.5, and 0.25. As shown in FIG. 4G, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

In FIG. 4F, each column shows tactile output patterns that have a particular waveform. The waveform of a tactile output pattern represents the pattern of physical displacements relative to a neutral position (e.g., $x_{zero}$) versus time that an moveable mass goes through to generate a tactile output with that tactile output pattern. For example, a first set of tactile output patterns shown in the left column in FIG. 4F (e.g., tactile output patterns of a "FullTap") each have a waveform that includes an oscillation with two complete cycles (e.g., an oscillation that starts and ends in a neutral position and crosses the neutral position three times). A second set of tactile output patterns shown in the middle column in FIG. 4F (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in the right column in FIG. 4F (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIG. 4F-4G include $x_{min}$ and $x_{max}$ values which represent the maximum and minimum extent of movement of the moveable mass. For larger electronic devices with larger moveable masses, there may be larger or smaller minimum and maximum extents of movement of the mass. The example shown in FIGS. 4F-4G describes movement of a mass in 1 dimension, however similar principles would also apply to movement of a moveable mass in two or three dimensions.

As shown in FIG. 4F, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIG. 4F, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 4F). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIG. 4F, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIG. 4F for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well. Table 1 provides examples of particular haptic feedback behaviors, configurations, and examples of their use.

TABLE 1

| Behavior Configuration | Feedback Configuration | Examples |
|---|---|---|
| | User Interface Haptics | |
| Retarget Default | MicroTap<br>High (270 Hz)<br>Gain: 0.4<br>Minimum Interval: 0.05 | Drag calendar event across day boundary<br>Retarget in force press quick action menu<br>Sliding over origin point in a scrubber<br>Reaching 0 degrees when cropping/straightening<br>Rearranging a list when items snap together<br>Swiping across multiple keyboards in a keyboard selection menu (e.g., a vertical menu) after a long press on a keyboard selection icon; or<br>Swiping across multiple alternate characters in an accent keyboard (e.g., a horizontal menu) after a long press on a character key |

TABLE 1-continued

| Behavior Configuration | Feedback Configuration | Examples |
|---|---|---|
| Retarget Strong | MicroTap High (270 Hz) Gain: 0.5 Minimum Interval: 0.05 | Retarget in A-Z scrubber |
| Retarget Picker | MicroTap High (270 Hz) Gain: 0.4 Minimum Interval: 0.05 | Spinning a wheel in the wheels of time user interface |
| Impact Default | MicroTap Medium (150 Hz) Gain max: 0.8 Gain min: 0.0 | Changing scrubbing speed when adjusting a slider<br>Creating a new calendar event by tapping and holding<br>Activating a toggle switch (changing the switch from on to off or off to on)<br>Reaching a predefined orientation on a compass (e.g., every 45 degrees from North)<br>Reaching a level state (e.g., 0 degrees tilt in any axis for 0.5 seconds)<br>Dropping a pin in a map<br>Sending or receiving a message with an emphasis animation (e.g., "slam" effect)<br>Sending or receiving an acknowledgment of a message<br>Snapping a ruler to different orientations (e.g., every 45 degrees)<br>Crossing over a suggested photo while scrubbing through a burst of photos<br>Crossing over a detent in a scrubber (e.g., text size, haptic strength, display brightness, display color temperature)<br>Transaction failure notification (ApplePay Failure) |
| Impact Light | MicroTap Medium (150 Hz) Gain max: 0.6 Gain min: 0.0 | Picking up an existing item (e.g., a calendar event, a favorite in web browser)<br>Moving a time selector over a minor division of time (e.g., 15 min) in sleep alarm |
| Impact Strong | MicroTap Medium (150 Hz) Gain max: 1.0 Gain min: 0.0 | Moving a time selector over a major division of time (e.g., 1 hour) in sleep alarm |
| Edge Scrubber | MicroTap Medium (150 Hz) Gain max: 0.6 Gain min: 0.3 | Dragging a brightness scrubber to an edge of the scrubber<br>Dragging a volume scrubber to an edge of the scrubber |
| Edge Zoom | MicroTap High (270 Hz) Gain: 0.6 | Reaching maximum zoom level when zooming into a photo<br>Re-centering a map |
| Drag Default | MicroTap High (270 Hz) Gain Pickup: 1.0 Gain Drop: 0.6 | Pickup and drop an event in calendar |
| Drag Snapping | MicroTap High (270 Hz) Gain Pickup: 1.0 Gain Drop: 0.6 Gain Snap: 1.0 | Rearrange lists in weather, contacts, music, etc. |
| States Swipe Action | Swipe in: MiniTap High (270 Hz) Gain: 1.0 Swipe out: MicroTap High (270 Hz) Gain: 0.55 | Swipe to delete a mail message or conversation<br>Swipe to mark a mail message as read/unread in mail<br>Swipe to delete a table row (e.g., a document in a document creation/viewing application, a note in a notes application, a location in a weather application, a podcast in a podcast application, a song in a playlist in a music application, a voice memo in a voice recording application<br>Swipe to delete a message while displaying a pressure-triggered preview<br>Swipe to mark a message as read/unread while displaying a pressure-triggered preview<br>Swipe to delete a news article<br>Swipe to favorite/love a news article |

TABLE 1-continued

| Behavior Configuration | Feedback Configuration | Examples |
|---|---|---|
| Button Default | MicroTap High (270 Hz) Gain: 0.9 | Reply to message/conversation<br>Adding a bookmark in an electronic book reader application<br>Activating a virtual assistant<br>Starting to record a voice memo<br>Stopping recording a voice memo |
| Button Destructive | MiniTap Low (100 Hz) Feedback Intensity: 0.8 | Delete message/conversation |
| Event Success | FullTap Medium (200 Hz) Gain: 0.7<br>MiniTap High (270 Hz) Gain: 1.0 | Confirmation that a payment has been made<br>Alert that authentication is needed to make a payment (e.g., biometric authentication or passcode authentication)<br>Adding a payment account to an electronic wallet application<br>Pairing success for Bluetooth pairing |
| Event Error | MiniTap High (270 Hz) Gain: 0.85 Gain: 0.75<br>FullTap Medium (200 Hz) Gain: 0.65<br>FullTap Low (150 Hz) Gain: 0.75 | Failure to process a payment transaction<br>Failure to authenticate a fingerprint detected on a fingerprint sensor<br>Incorrect passcode/password entered in a passcode/password entry UI |
| Event Warning | FullTap High (300 Hz) Gain: 0.9<br>FullTap Custom (270 Hz) Gain: 0.9 | Shake to undo |
| | Force Press | |
| States Preview | MicroTap Custom (200 Hz) Gain: 1.0 | Peek/Preview (e.g., peek at a mail message) |
| States Preview | FullTap Custom (150 Hz) Gain: 1.0 | Pop/Commit (e.g., pop into full mail message) |
| States Preview | MicroTap Custom (200 Hz) Gain: 1.0 | Unavailable (e.g., press hard on an app icon that doesn't have any associated quick actions) |
| | System Haptics | |
| Device Locked | MicroTap Medium (150 Hz) Gain: 1.0<br>MiniTap Medium (150 Hz) Gain: 1.0 | Press power button once to lock device |
| Vibe on Attach | Vibe at 150 Hz that gradually increases or decreases in amplitude over time | Attach device to power source |
| Ringtones & Alerts | Custom tactile output using one or more of:<br>Vibe 150 Hz<br>MicroTap 150 Hz<br>MiniTap 150 Hz<br>FullTap 150 Hz | Receive phone call or text message |

TABLE 1-continued

| Behavior Configuration | Feedback Configuration | Examples |
|---|---|---|
| Alert before Mute | 3x FullTap (150 Hz) | Mute the device |
| | | Solid-State Home Button |
| 1 ("Tick") | MiniTap 230 Hz Gain: 1.0 | Press home button with click option 1 selected |
| 2 ("Tak") | MiniTap 270 Hz Gain: 1.0 | Press home button with click option 2 selected |
| 3 ("Tock") | MiniTap 300 Hz Gain: 1.0 | Press home button with click option 3 selected |
| | | Special Effects |
| Full screen moments | Custom wide band tactile outputs | Full screen messages moments (e.g., fireworks, lightening, etc.) in Messages |
| Digital Touch | Custom tactile outputs | Taps and heartbeats in Messages |

The examples shown above in Table 1 are intended to illustrate a range of circumstances in which tactile outputs can be generated for different inputs and events. Table 1 should not be taken as a requirement that a device respond to each of the listed inputs or events with the indicated tactile output. Rather, Table 1 is intended to illustrate how tactile outputs vary and/or are similar for different inputs and/or events (e.g., based on the tactile output pattern, frequency, gain, etc.). For example Table 1 shows how an "event success" tactile output varies from an "event failure" tactile output and how a retarget tactile output differs from an impact tactile output.

Figure 4H:
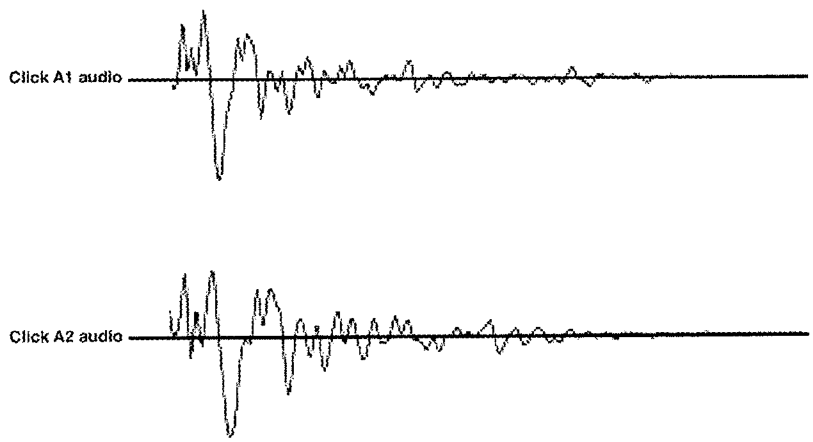
FIGS. 4H-4J illustrate example haptic audio output patterns versus time that are used in conjunction with tactile outputs to simulate button clicks in accordance with some embodiments.
Figure 4I:
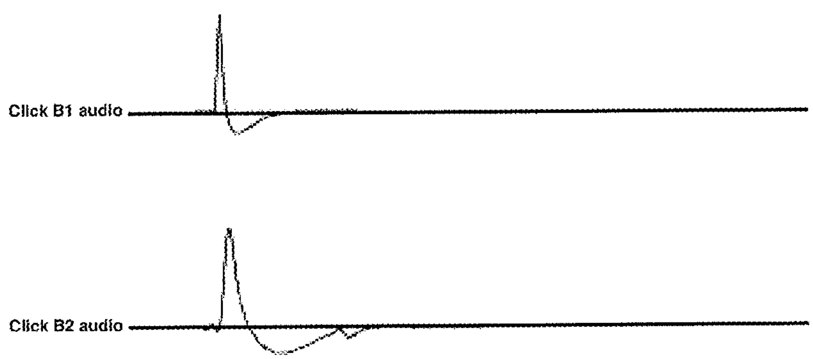
Figure 4J:
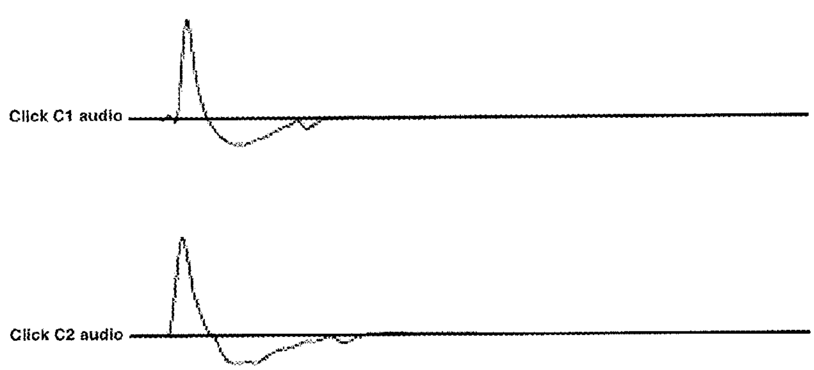

FIGS. 4H-4J illustrate example haptic audio output patterns versus time that are used in conjunction with tactile outputs to simulate button clicks in accordance with some embodiments.

Figure 4K:
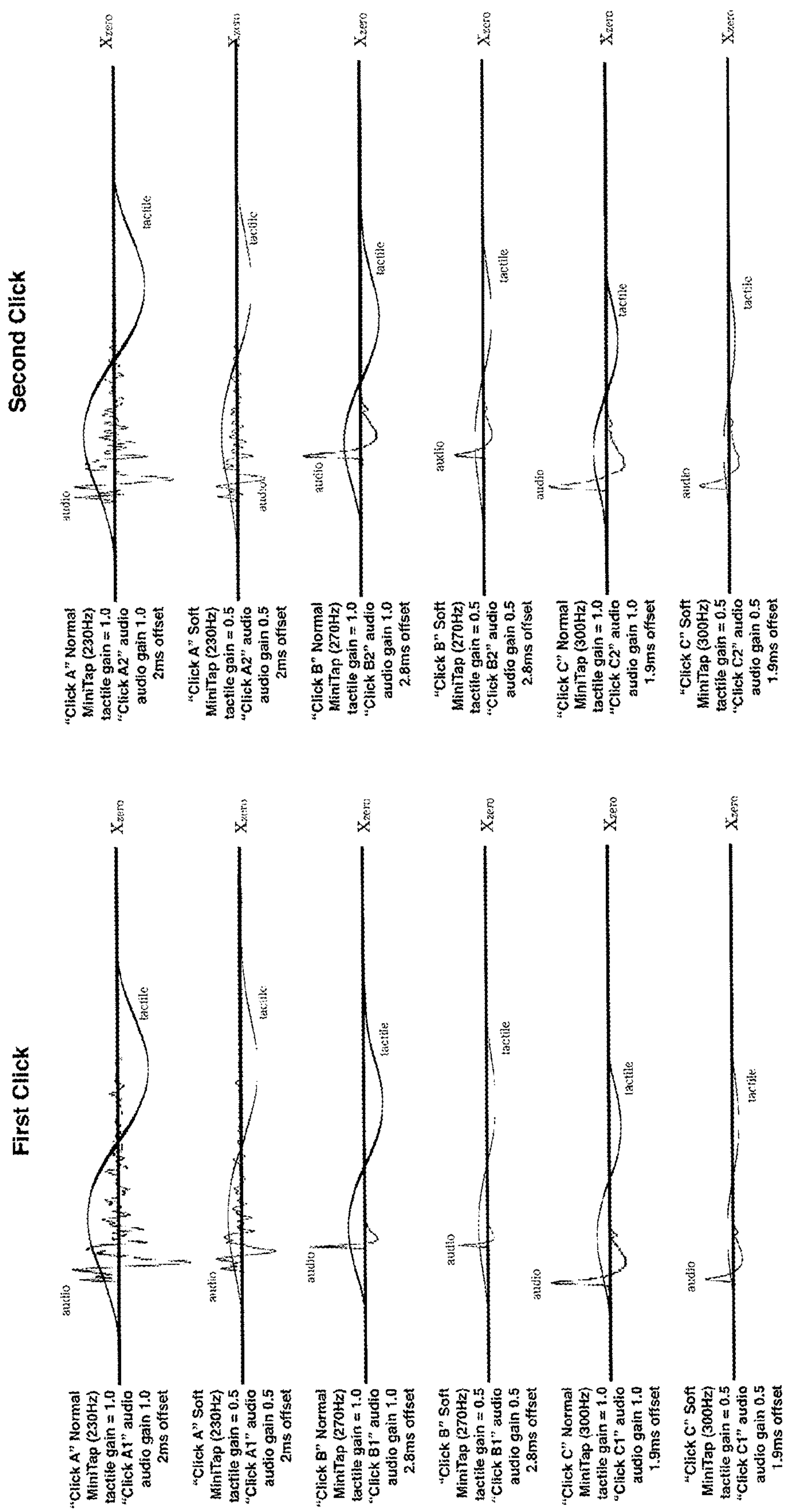
FIG. 4K illustrates example combinations of tactile output patterns and haptic audio output patterns versus time in accordance with some embodiments.

FIG. 4K illustrates example combinations of tactile output patterns and haptic audio output patterns versus time in accordance with some embodiments. FIGS. 4L-4Q enlarge the combinations shown in FIG. 4K for clarity.

Figure 4L:
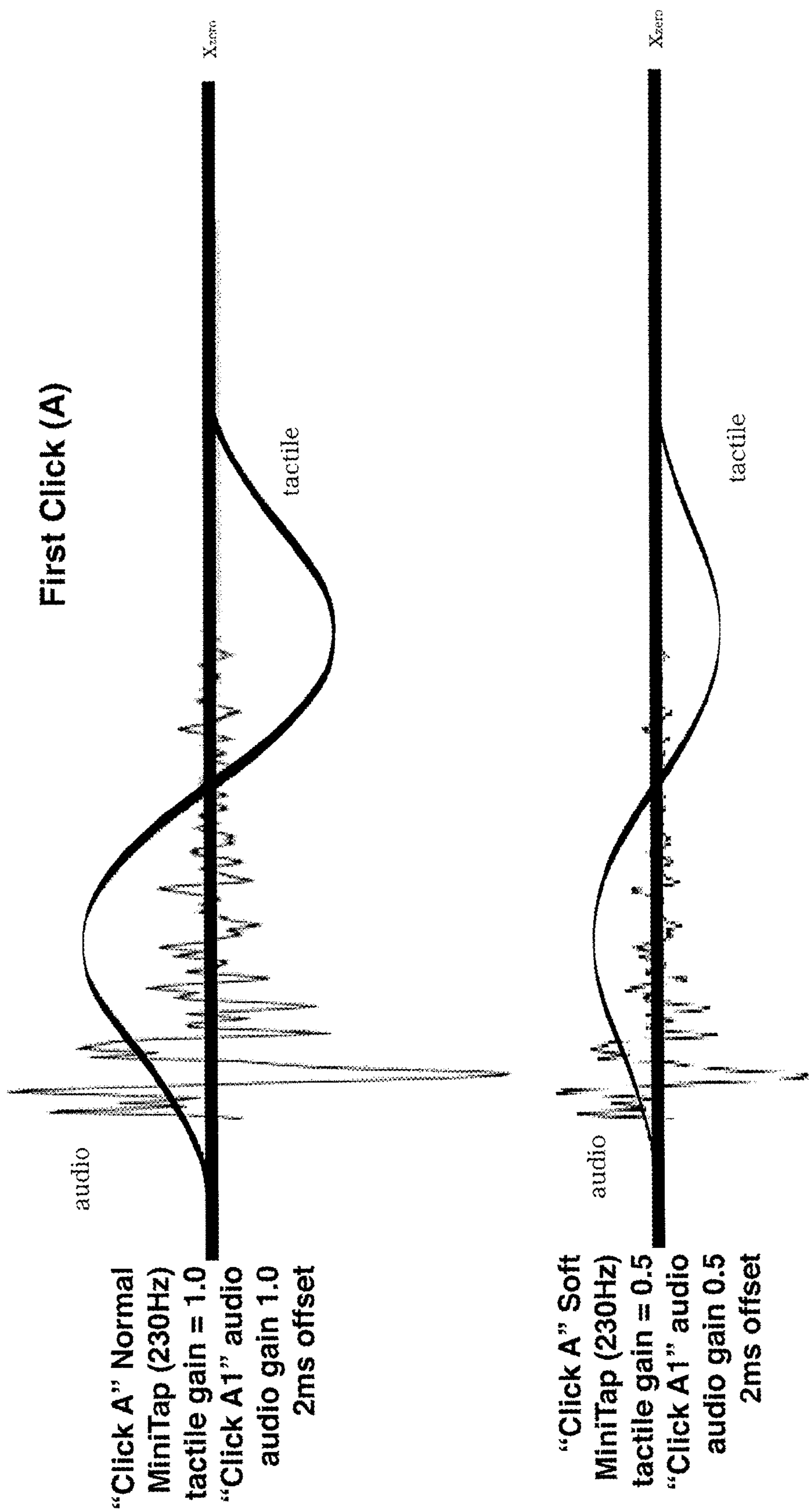
FIGS. 4L-4Q enlarge the combinations shown in FIG. 4K for clarity.

In FIG. 4H, the top haptic audio pattern "Click A1 audio" is audio output that is played conjunction with "Click A" Normal MiniTap (230 Hz) to simulate a first down-click in a "normal" first click, as shown in FIG. 4K (first row in the First Click column) and the upper portion of FIG. 4L, where the rate of change of intensity of a contact at a control activation threshold is above a threshold rate of change (e.g., the contact is making a "normal" hard/fast press). In this example, "Click A1 audio" is offset from the start of the "Click A" Normal MiniTap (230 Hz) tactile output by 2 ms. In some cases, the same "Click A1 audio" and "Click A" Normal MiniTap (230 Hz) are played to simulate the first up-click that follows the first down-click. In some cases, the gain of the "Click A1 audio" and/or "Click A" Normal MiniTap (230 Hz) are reduced (e.g., by 50%) in the up-click relative to the preceding down-click.

The top haptic audio pattern "Click A1 audio" is also played in conjunction with "Click A" Soft MiniTap (230 Hz) to simulate a first down-click in a "soft" first click, as shown in FIG. 4K (second row in the First Click column) and the lower portion of FIG. 4L, where the rate of change of intensity of a contact at a control activation threshold is below a threshold rate of change (e.g., the contact is making a "soft" and/or slow press). To simulate a "soft" down-click, the gain of the "Click A1 audio" and "Click A" Soft MiniTap (230 Hz) are reduced (e.g., by 50%) in the "soft" down-click relative to the "normal" down-click. In this example, "Click A1 audio" is offset from the start of the "Click A" Soft MiniTap (230 Hz) tactile output by 2 ms. In some cases, the same "Click A1 audio" and "Click A" Soft MiniTap (230 Hz) are played to simulate the first up-click that follows the first down-click. In some cases, the gain of the "Click A1 audio" and/or "Click A" Soft MiniTap (230 Hz) are reduced (e.g., by 50%) in the up-click relative to the preceding down-click.

Figure 4M:
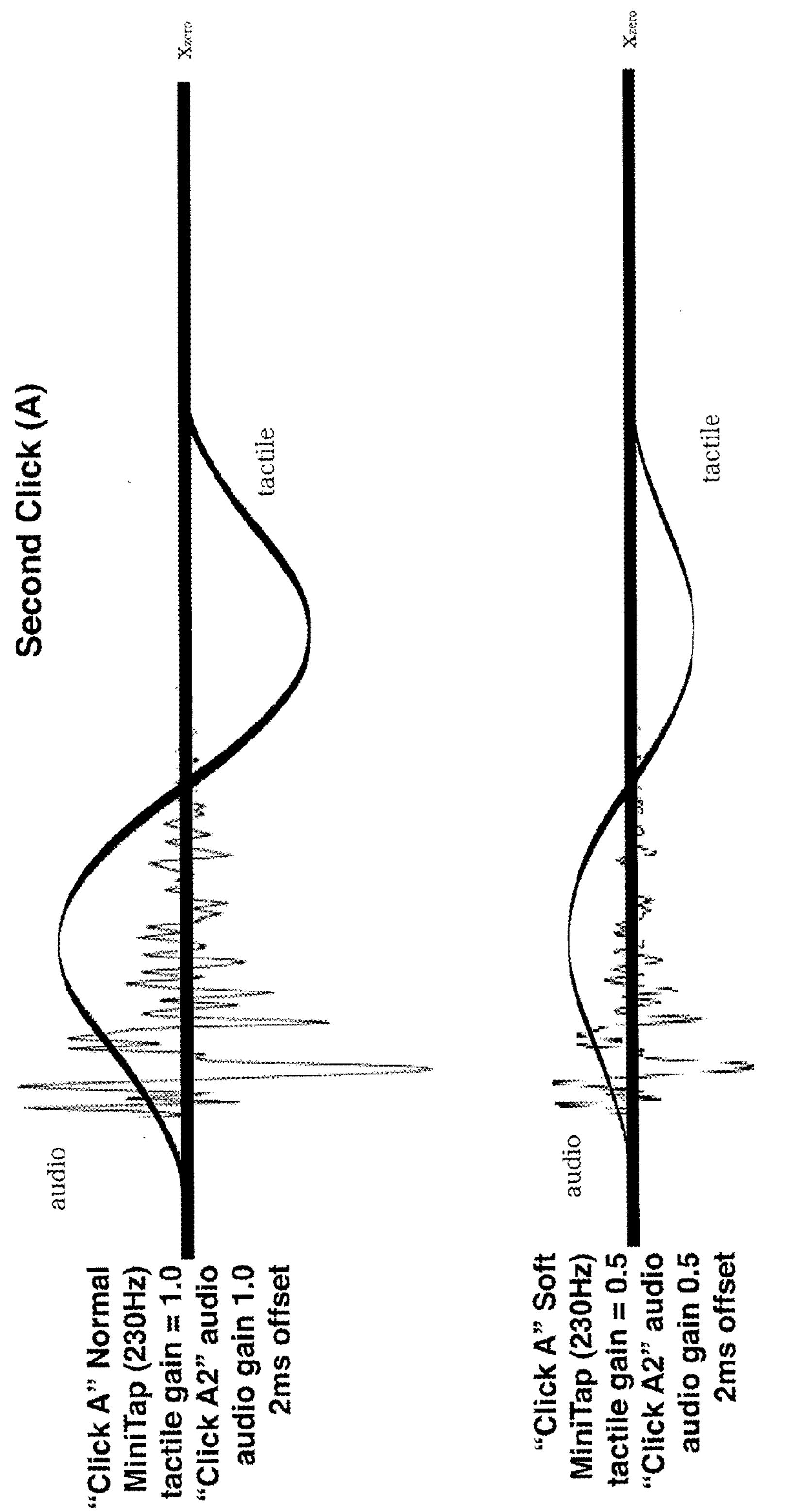

In FIG. 4H, the bottom haptic audio pattern "Click A2 audio" is audio output that is played conjunction with "Click A" Normal MiniTap (230 Hz) to simulate a second down-click in a "normal" second click that follows the first click within a predetermined period of time (e.g., as the second click in a double click input), as shown in FIG. 4K (first row in the Second Click column) and the upper portion of FIG. 4M, where the rate of change of intensity of a contact at a control activation threshold is above a threshold rate of change (e.g., the contact in the second click is making a "normal" hard/fast press). In this example, "Click A2 audio" is offset from the start of the "Click A" Normal MiniTap (230 Hz) tactile output by 2 ms. In some cases, the same "Click A2 audio" and "Click A" Normal MiniTap (230 Hz) are played to simulate the second up-click that follows the second down-click. In some cases, the gain of the "Click A2 audio" and/or "Click A" Normal MiniTap (230 Hz) are reduced (e.g., by 50%) in the second up-click relative to the preceding second down-click.

The bottom haptic audio pattern "Click A2 audio" is also played in conjunction with "Click A" Soft MiniTap (230 Hz) to simulate a second down-click in a "soft" second click that follows the first click within a predetermined period of time (e.g., as the second click in a double click input), as shown in FIG. 4K (second row in the Second Click column) and the lower portion of FIG. 4M, where the rate of change of intensity of a contact at a control activation threshold is below a threshold rate of change (e.g., the contact is making a "soft" and/or slow press). To simulate a "soft" down-click, the gain of the "Click A2 audio" and "Click A" Soft MiniTap (230 Hz) are reduced (e.g., by 50%) in the "soft" down-click relative to the "normal" down-click. In this example, "Click A2 audio" is offset from the start of the "Click A" Soft MiniTap (230 Hz) tactile output by 2 ms. In some cases, the same "Click A2 audio" and "Click A" Soft MiniTap (230 Hz) are played to simulate the second up-click that follows the second down-click. In some cases, the gain of the "Click A2 audio" and/or "Click A" Soft MiniTap (230 Hz) are reduced (e.g., by 50%) in the second up-click relative to the preceding second down-click.

Figure 4N:
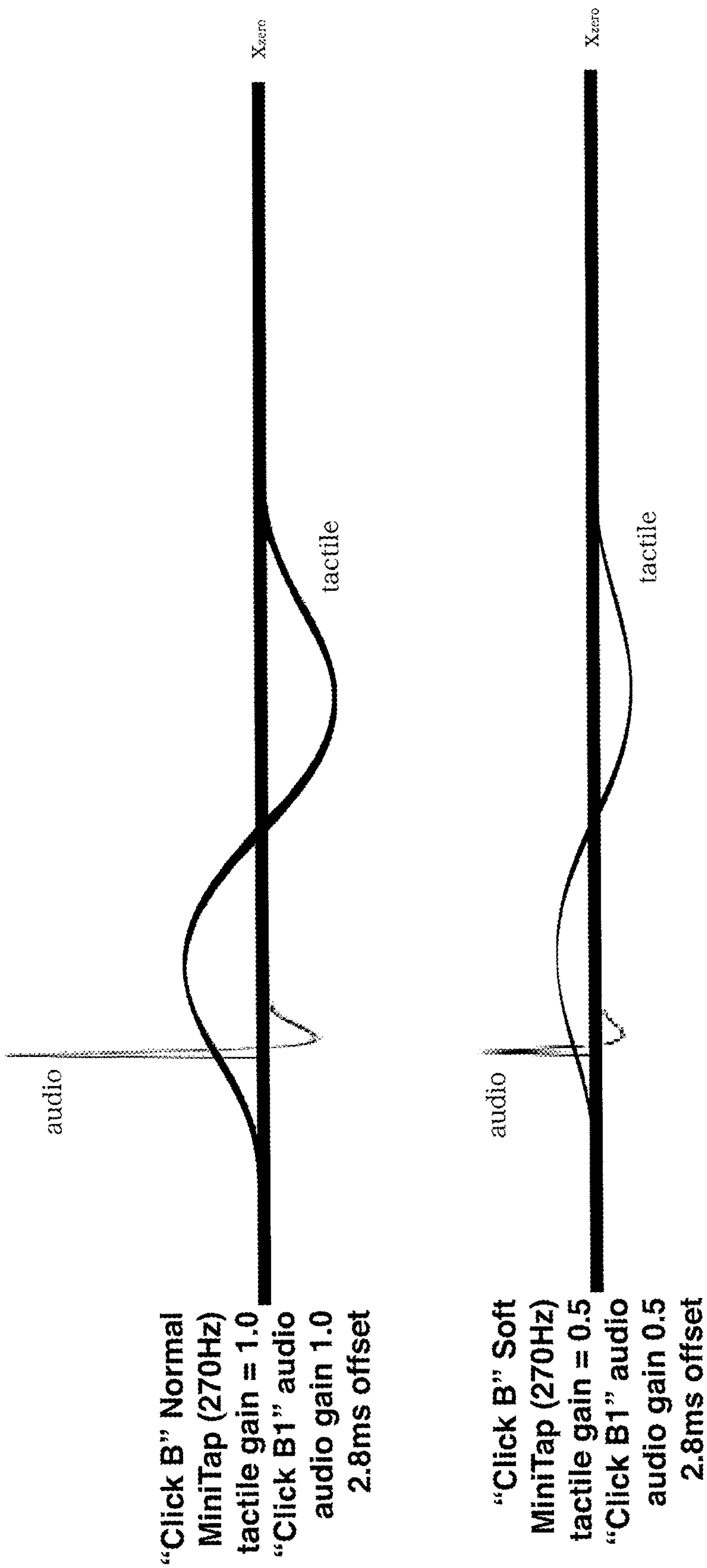

In FIG. 4I, the top haptic audio pattern "Click B1 audio" is audio output that is played conjunction with "Click B" Normal MiniTap (270 Hz) to simulate a first down-click in a "normal" first click, as shown in FIG. 4K (third row in the First Click column) and the upper portion of FIG. 4N, where the rate of change of intensity of a contact at a control activation threshold is above a threshold rate of change (e.g., the contact is making a "normal" hard/fast press). In this example, "Click B1 audio" is offset from the start of the "Click B" Normal MiniTap (270 Hz) tactile output by 2.8 ms. In some cases, the same "Click B1 audio" and "Click B" Normal MiniTap (270 Hz) are played to simulate the first up-click that follows the first down-click. In some cases, the gain of the "Click B1 audio" and/or "Click B" Normal MiniTap (270 Hz) are reduced (e.g., by 50%) in the up-click relative to the preceding down-click.

The top haptic audio pattern "Click B1 audio" is also played in conjunction with "Click B" Soft MiniTap (270 Hz) to simulate a first down-click in a "soft" first click, as shown in FIG. 4K (fourth row in the First Click column) and the lower portion of FIG. 4N, where the rate of change of intensity of a contact at a control activation threshold is below a threshold rate of change (e.g., the contact is making a "soft" and/or slow press). To simulate a "soft" down-click, the gain of the "Click B1 audio" and "Click B" Soft MiniTap (270 Hz) are reduced (e.g., by 50%) in the "soft" down-click relative to the "normal" down-click. In this example, "Click B1 audio" is offset from the start of the "Click B" Soft MiniTap (270 Hz) tactile output by 2.8 ms. In some cases, the same "Click B1 audio" and "Click B" Soft MiniTap (270 Hz) are played to simulate the first up-click that follows the first down-click. In some cases, the gain of the "Click B1 audio" and/or "Click B" Soft MiniTap (230 Hz) are reduced (e.g., by 50%) in the up-click relative to the preceding down-click.

Figure 4O:
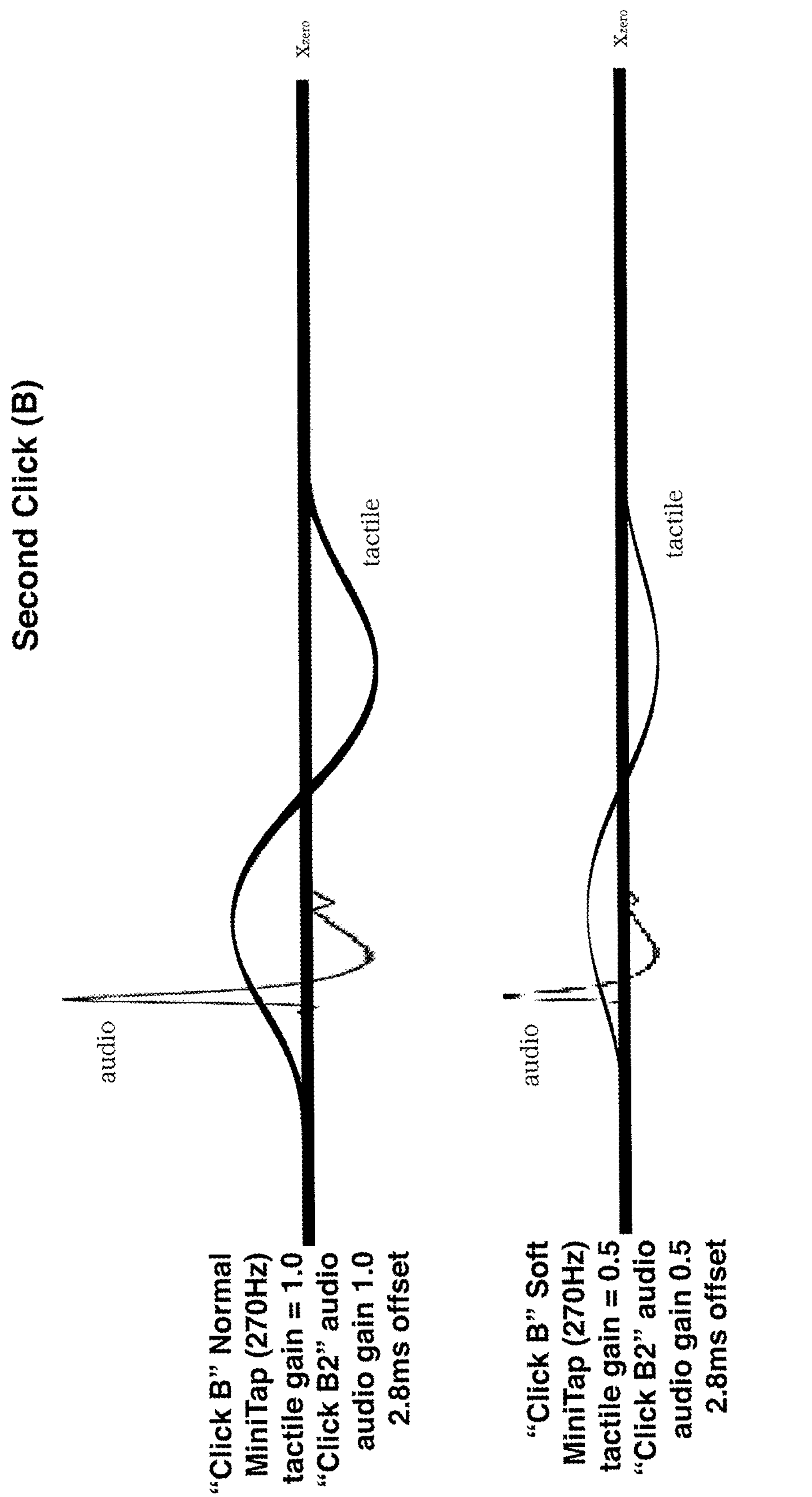

In FIG. 4I, the bottom haptic audio pattern "Click B2 audio" is audio output that is played conjunction with "Click B" Normal MiniTap (270 Hz) to simulate a second down-click in a "normal" second click that follows the first click within a predetermined period of time (e.g., as the second click in a double click input), as shown in FIG. 4K (third row in the Second Click column) and the upper portion of FIG. 4O, where the rate of change of intensity of a contact at a control activation threshold is above a threshold rate of change (e.g., the contact in the second click is making a "normal" hard/fast press). In this example, "Click B2 audio" is offset from the start of the "Click B" Normal MiniTap (270 Hz) tactile output by 2.8 ms. In some cases, the same "Click B2 audio" and "Click B" Normal MiniTap (230 Hz) are played to simulate the second up-click that follows the second down-click. In some cases, the gain of the "Click B2 audio" and/or "Click B" Normal MiniTap (270 Hz) are reduced (e.g., by 50%) in the second up-click relative to the preceding second down-click.

The bottom haptic audio pattern "Click B2 audio" is also played in conjunction with "Click B" Soft MiniTap (270 Hz) to simulate a second down-click in a "soft" second click that follows the first click within a predetermined period of time (e.g., as the second click in a double click input), as shown in FIG. 4K (fourth row in the Second Click column) and the lower portion of FIG. 4O, where the rate of change of intensity of a contact at a control activation threshold is below a threshold rate of change (e.g., the contact is making a "soft" and/or slow press). To simulate a "soft" down-click, the gain of the "Click B2 audio" and "Click B" Soft MiniTap (270 Hz) are reduced (e.g., by 50%) in the "soft" down-click relative to the "normal" down-click. In this example, "Click B2 audio" is offset from the start of the "Click B" Soft MiniTap (270 Hz) tactile output by 2.8 ms. In some cases, the same "Click B2 audio" and "Click B" Soft MiniTap (270 Hz) are played to simulate the second up-click that follows the second down-click. In some cases, the gain of the "Click B2 audio" and/or "Click B" Soft MiniTap (270 Hz) are reduced (e.g., by 50%) in the second up-click relative to the preceding second down-click.

Figure 4P:
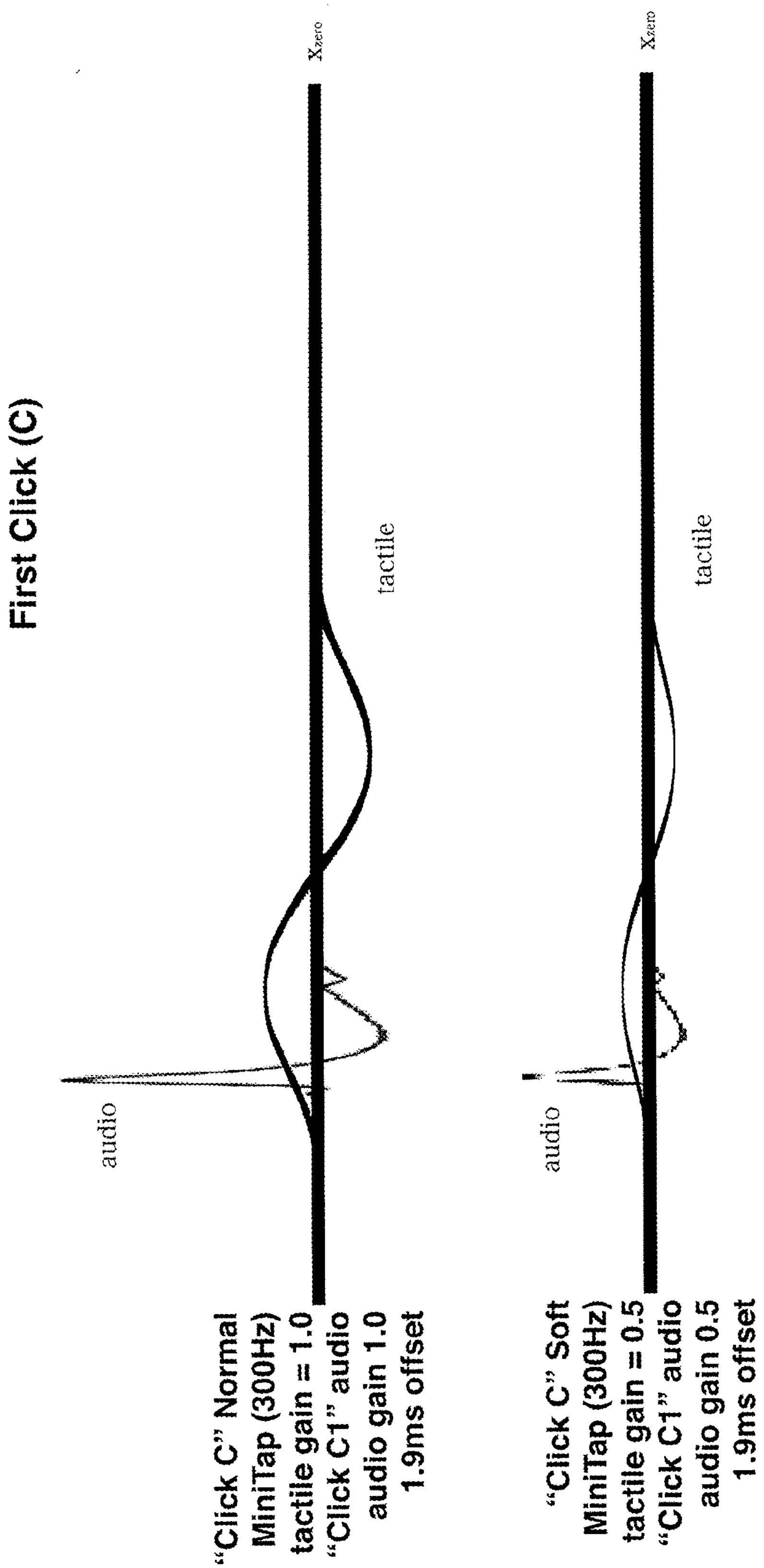

In FIG. 4J, the top haptic audio pattern "Click C1 audio" is audio output that is played conjunction with "Click C" Normal MiniTap (300 Hz) to simulate a first down-click in a "normal" first click, as shown in FIG. 4K (fifth row in the First Click column) and the upper portion of FIG. 4P, where the rate of change of intensity of a contact at a control activation threshold is above a threshold rate of change (e.g., the contact is making a "normal" hard/fast press). In this example, "Click C1 audio" is offset from the start of the "Click C" Normal MiniTap (300 Hz) tactile output by 1.9 ms. In some cases, the same "Click C1 audio" and "Click C" Normal MiniTap (300 Hz) are played to simulate the first up-click that follows the first down-click. In some cases, the gain of the "Click C1 audio" and/or "Click C" Normal MiniTap (300 Hz) are reduced (e.g., by 50%) in the up-click relative to the preceding down-click.

The top haptic audio pattern "Click C1 audio" is also played in conjunction with "Click C" Soft MiniTap (300 Hz) to simulate a first down-click in a "soft" first click, as shown in FIG. 4K (sixth row in the First Click column) and the lower portion of FIG. 4P, where the rate of change of intensity of a contact at a control activation threshold is below a threshold rate of change (e.g., the contact is making a "soft" and/or slow press). To simulate a "soft" down-click, the gain of the "Click C1 audio" and "Click C" Soft MiniTap (300 Hz) are reduced (e.g., by 50%) in the "soft" down-click relative to the "normal" down-click. In this example, "Click C1 audio" is offset from the start of the "Click C" Soft MiniTap (300 Hz) tactile output by 1.9 ms. In some cases, the same "Click C1 audio" and "Click C" Soft MiniTap (270 Hz) are played to simulate the first up-click that follows the first down-click. In some cases, the gain of the "Click C1 audio" and/or "Click C" Soft MiniTap (300 Hz) are reduced (e.g., by 50%) in the up-click relative to the preceding down-click.

Figure 4Q:
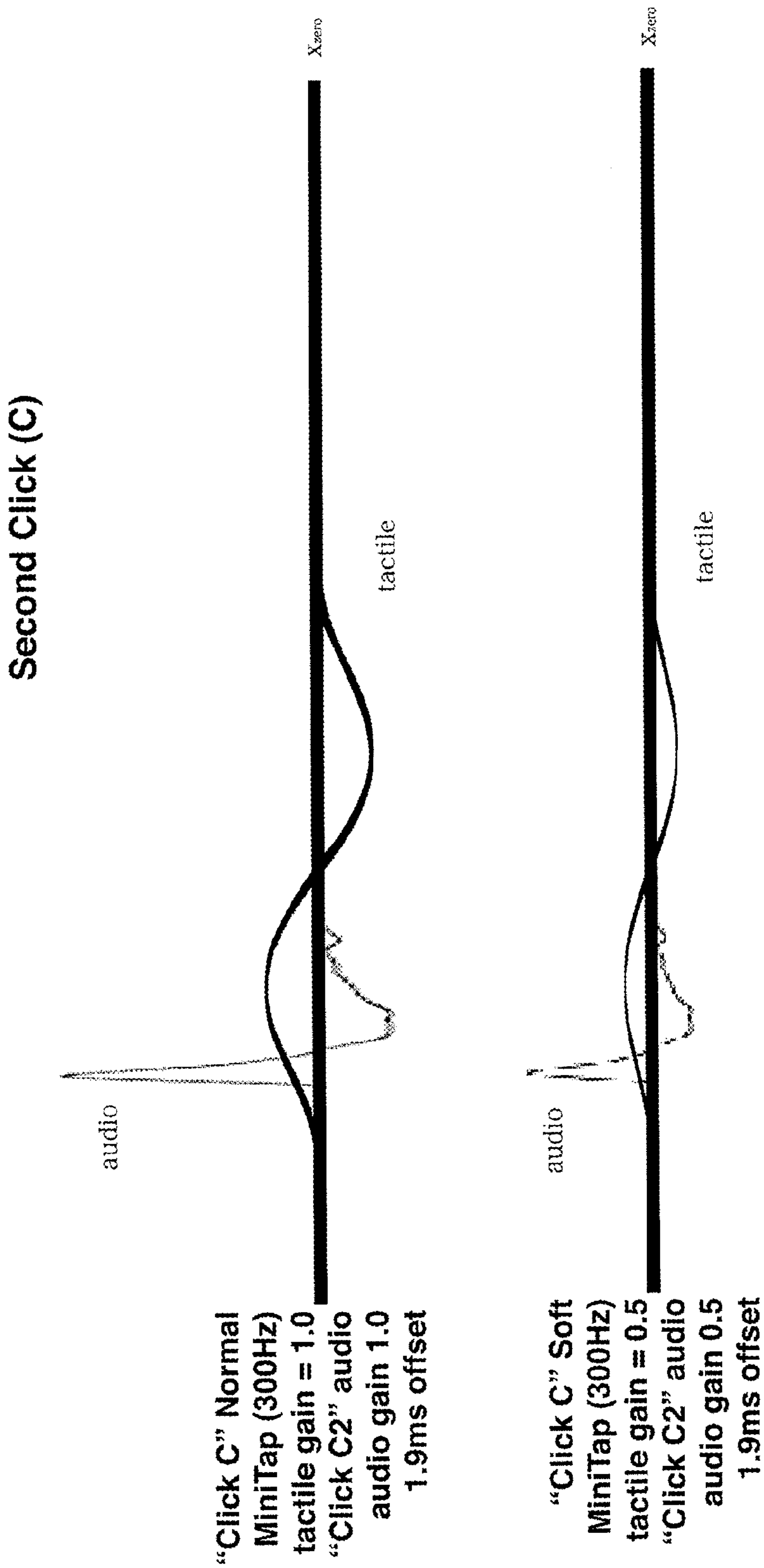

In FIG. 4J, the bottom haptic audio pattern "Click C2 audio" is audio output that is played conjunction with "Click C" Normal MiniTap (300 Hz) to simulate a second down-click in a "normal" second click that follows the first click within a predetermined period of time (e.g., as the second click in a double click input), as shown in FIG. 4K (fifth row in the Second Click column) and the upper portion of FIG. 4Q, where the rate of change of intensity of a contact at a control activation threshold is above a threshold rate of change (e.g., the contact in the second click is making a "normal" hard/fast press). In this example, "Click C2 audio" is offset from the start of the "Click C" Normal MiniTap (300 Hz) tactile output by 1.9 ms. In some cases, the same "Click C2 audio" and "Click C" Normal MiniTap (300 Hz) are played to simulate the second up-click that follows the second down-click. In some cases, the gain of the "Click C2 audio" and/or "Click C" Normal MiniTap (300 Hz) are reduced (e.g., by 50%) in the second up-click relative to the preceding second down-click.

The bottom haptic audio pattern “Click C2 audio” is also played in conjunction with “Click C” Soft MiniTap (300 Hz) to simulate a second down-click in a “soft” second click that follows the first click within a predetermined period of time (e.g., as the second click in a double click input), as shown in FIG. 4K (sixth row in the Second Click column) and the lower portion of FIG. 4Q, where the rate of change of intensity of a contact at a control activation threshold is below a threshold rate of change (e.g., the contact is making a “soft” and/or slow press). To simulate a “soft” down-click, the gain of the “Click C2 audio” and “Click C” Soft MiniTap (300 Hz) are reduced (e.g., by 50%) in the “soft” down-click relative to the “normal” down-click. In this example, “Click C2 audio” is offset from the start of the “Click C” Soft MiniTap (300 Hz) tactile output by 1.9 ms. In some cases, the same “Click C2 audio” and “Click C” Soft MiniTap (300 Hz) are played to simulate the second up-click that follows the second down-click. In some cases, the gain of the “Click C2 audio” and/or “Click C” Soft MiniTap (300 Hz) are reduced (e.g., by 50%) in the second up-click relative to the preceding second down-click.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2A). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2A) optionally include an up/down button for volume control of speaker 111 and/or microphone 113. The one or more buttons optionally include a push button (e.g., 206, FIG. 2A).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
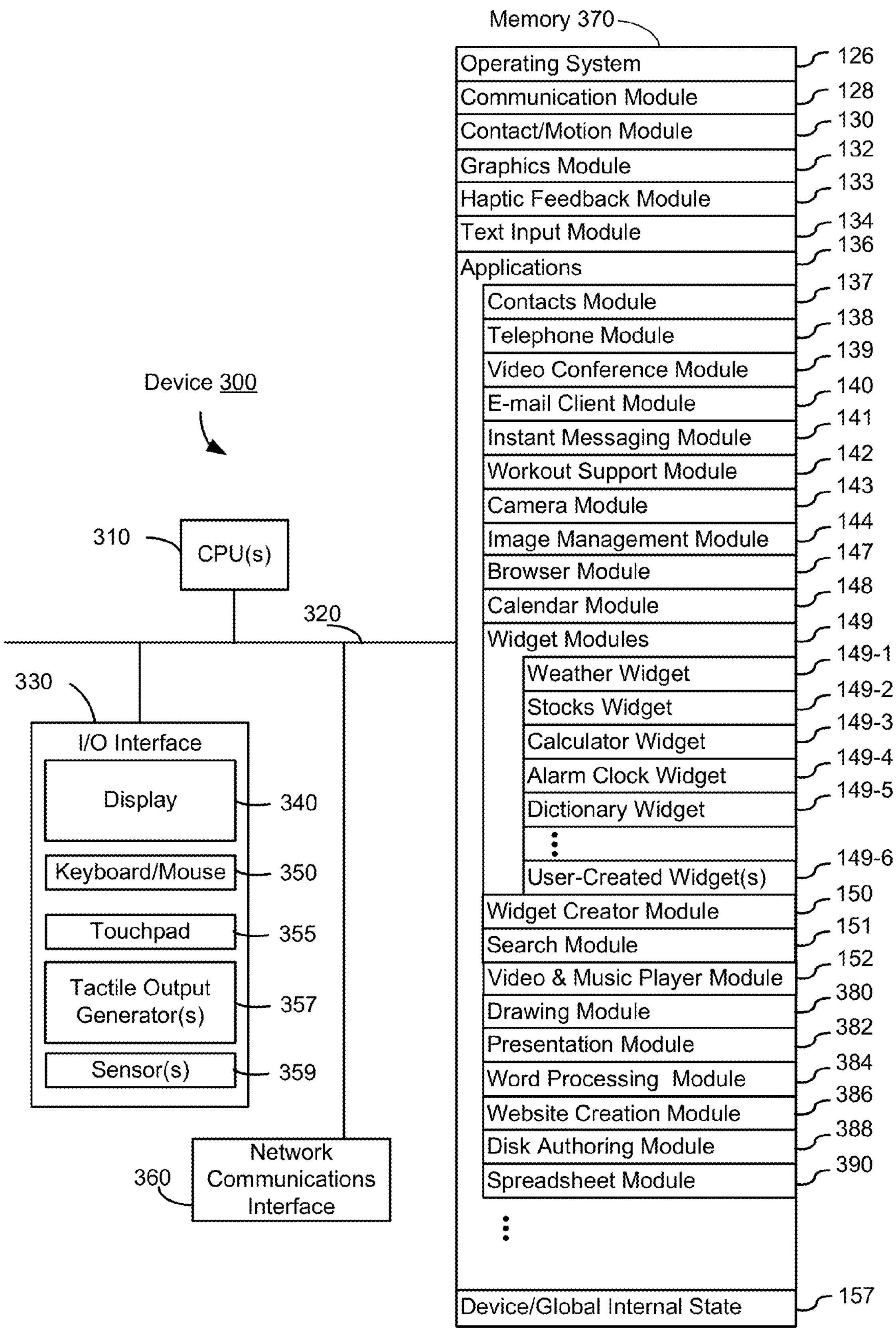
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensities of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
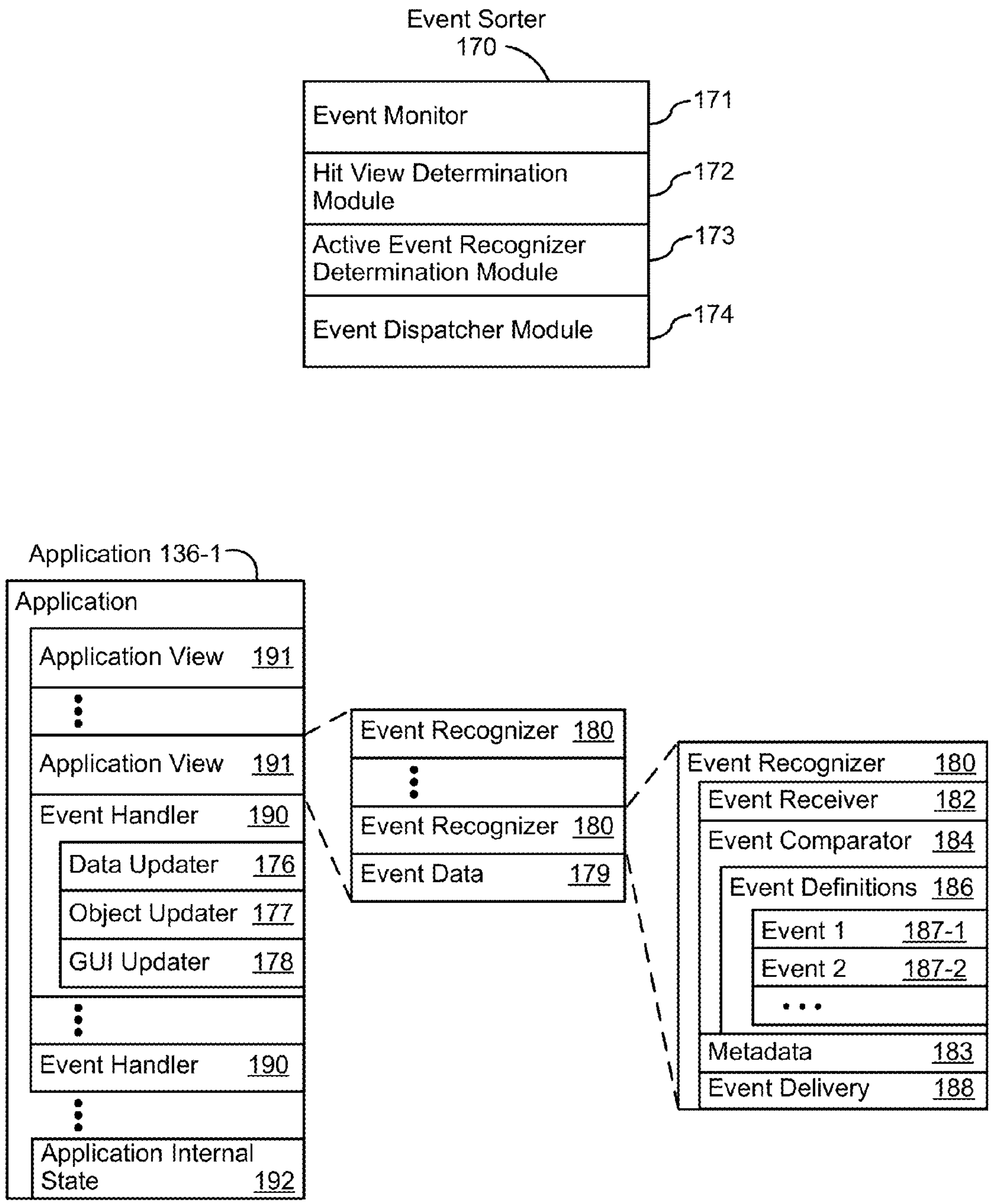
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
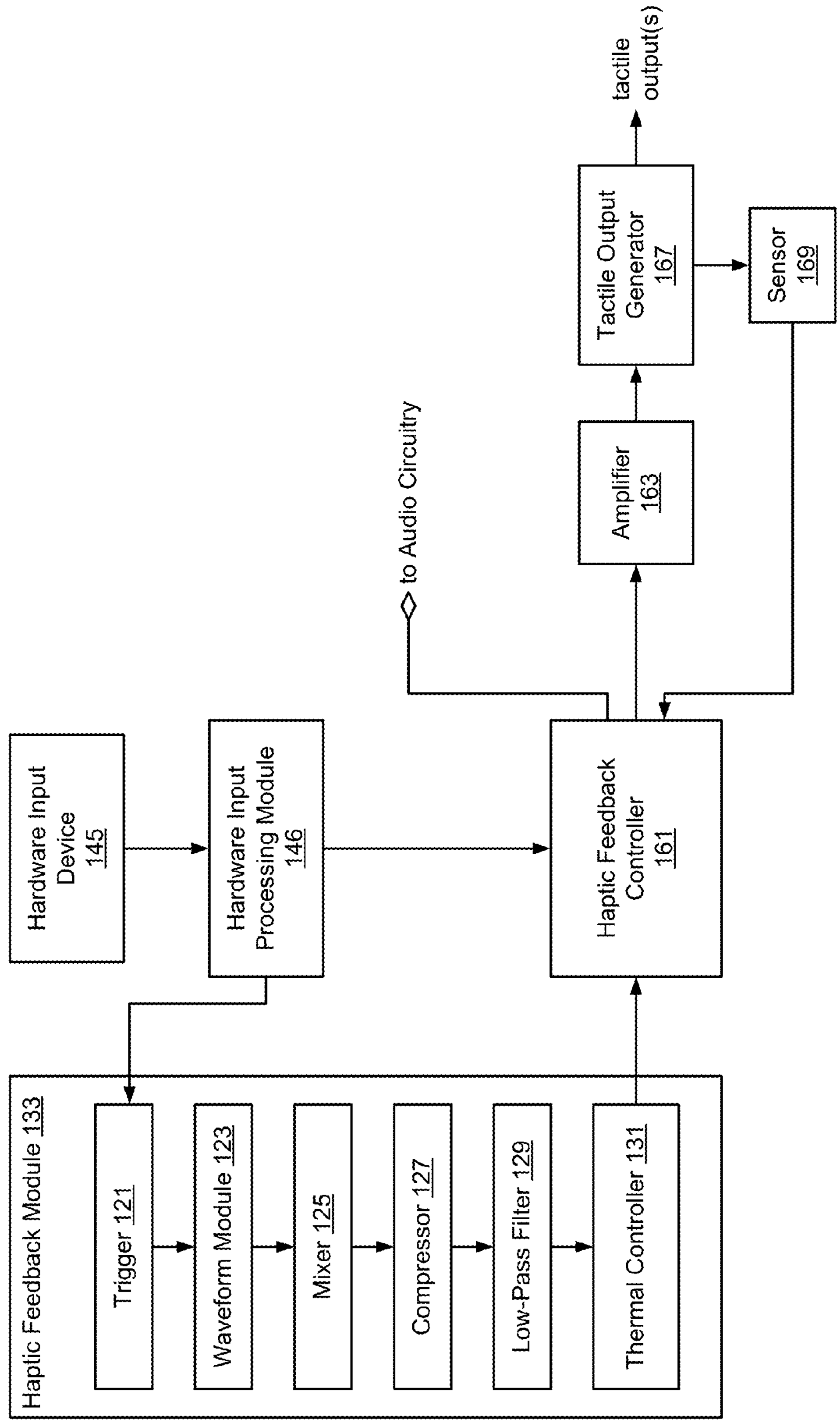
FIG. 1C is a block diagram illustrating a tactile output module in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of the hardware input device (e.g., a home button). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123, such as the waveforms described in greater detail below with reference to FIGS. 4F-4G).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167)

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smoothes) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 145 (e.g., other input or control devices 116 in FIG. 1A, such as a home button). In some embodiments, hardware input device 145 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive home button (e.g., as shown in FIG. 2B or a home button with a mechanical actuator as illustrated in FIG. 2C). In some embodiments, hardware input device 145 consists of an intensity-sensitive home button (e.g., as shown in FIG. 2B or a home button with a mechanical actuator as illustrated in FIG. 2C), and not touch-sensitive display system 112 (FIG. 1A), keyboard/mouse 350 (FIG. 3), or touchpad 355 (FIG. 3). In some embodiments, in response to inputs from hardware input device 145, hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 145 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 145 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator 167 (e.g., any of tactile output generators 167 (FIG. 1A) or 357 (FIG. 3)). For example, amplifier 163 amplifies the received waveforms to signal levels that are in accordance with physical specifications of tactile output generator 167 (e.g., to a voltage and/or a current required by tactile output generator 167 for generating tactile outputs so that the signals sent to tactile output generator 167 produce tactile outputs that correspond to the waveforms received from haptic feedback controller 161) and sends the amplified waveforms to tactile output generator 167. In response, tactile output generator 167 generates tactile outputs (e.g., by shifting a moveable mass back and forth in one or more dimensions relative to a neutral position of the moveable mass).

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall Effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

Figure 2A:
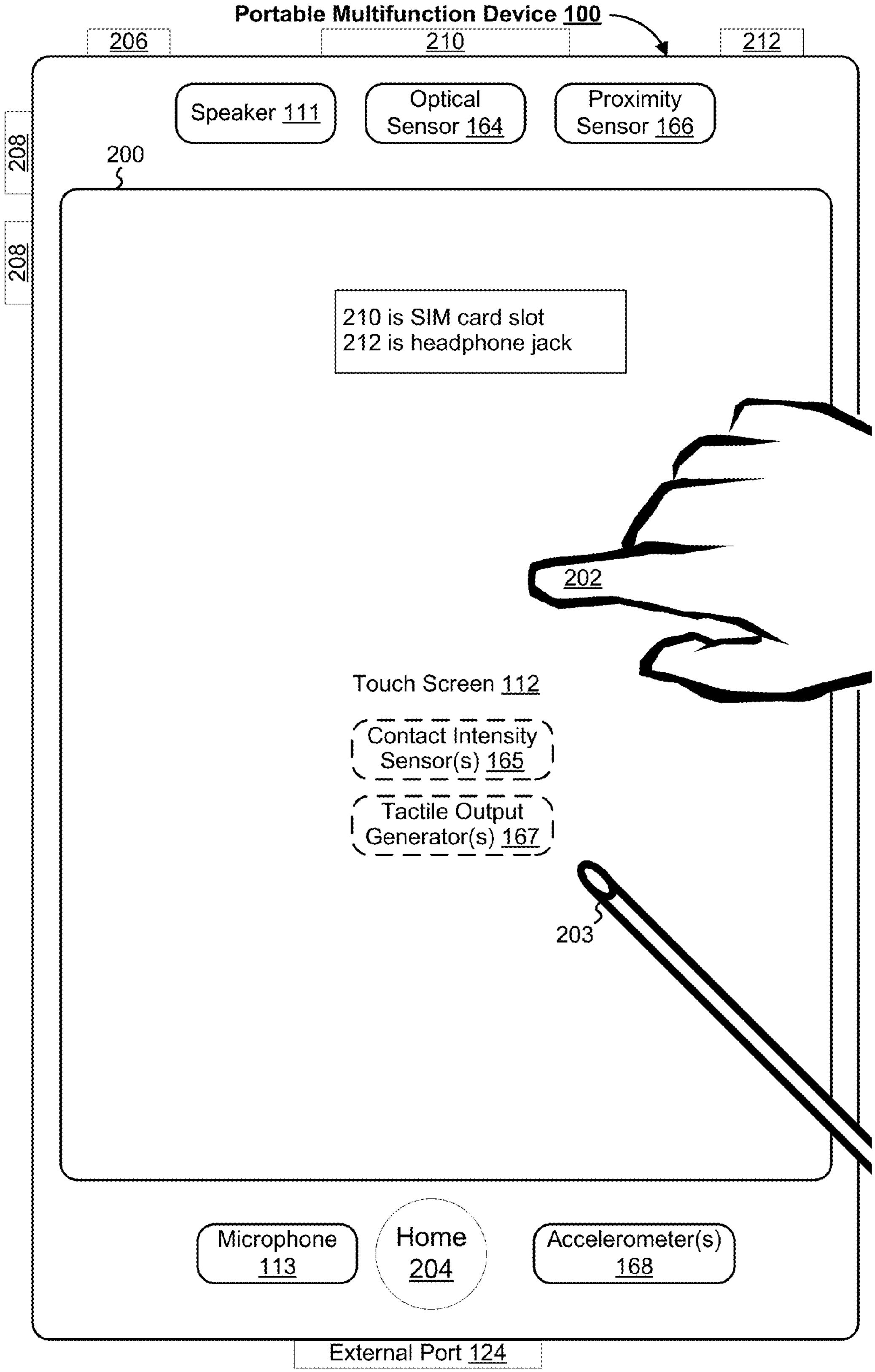
FIG. 2A illustrates a portable multifunction device having a touch screen in accordance with some embodiments.
Figure 2B:
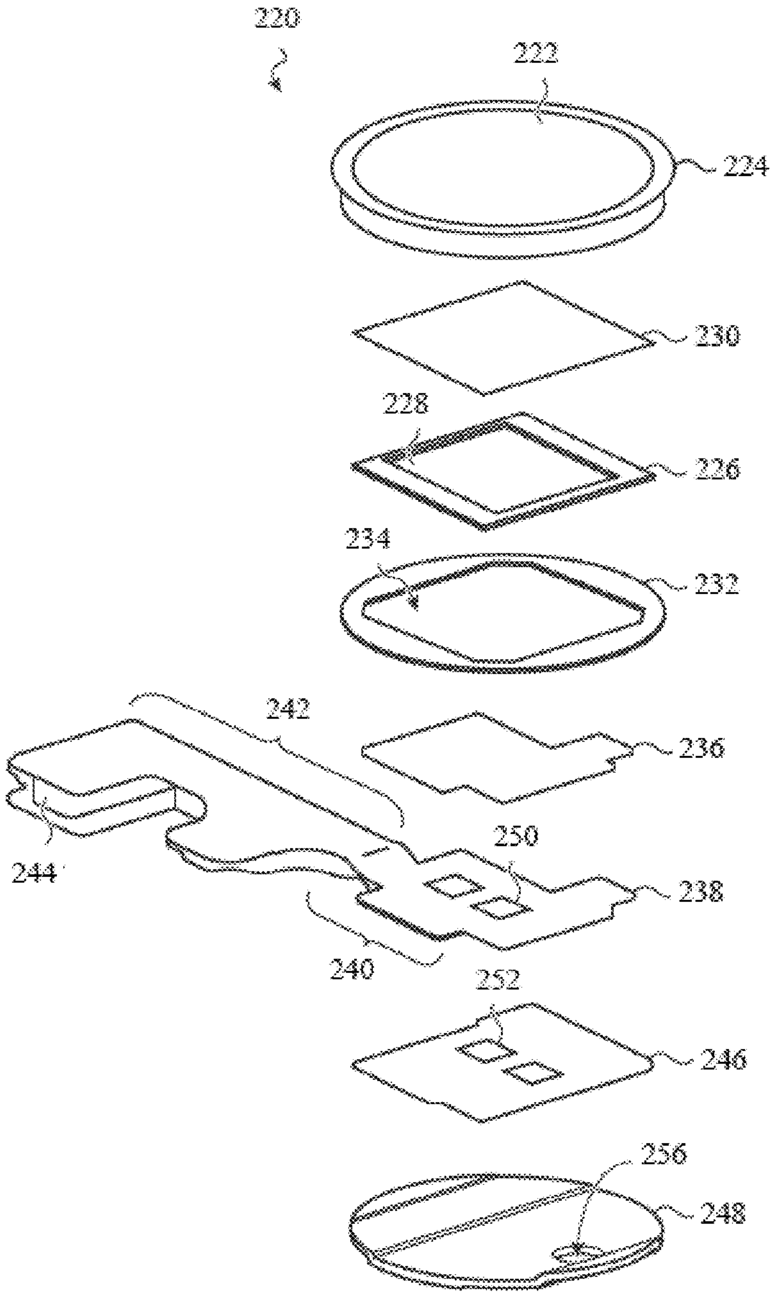
FIGS. 2B-2C show exploded views of a force-sensitive input device in accordance with some embodiments.
Figure 2C:
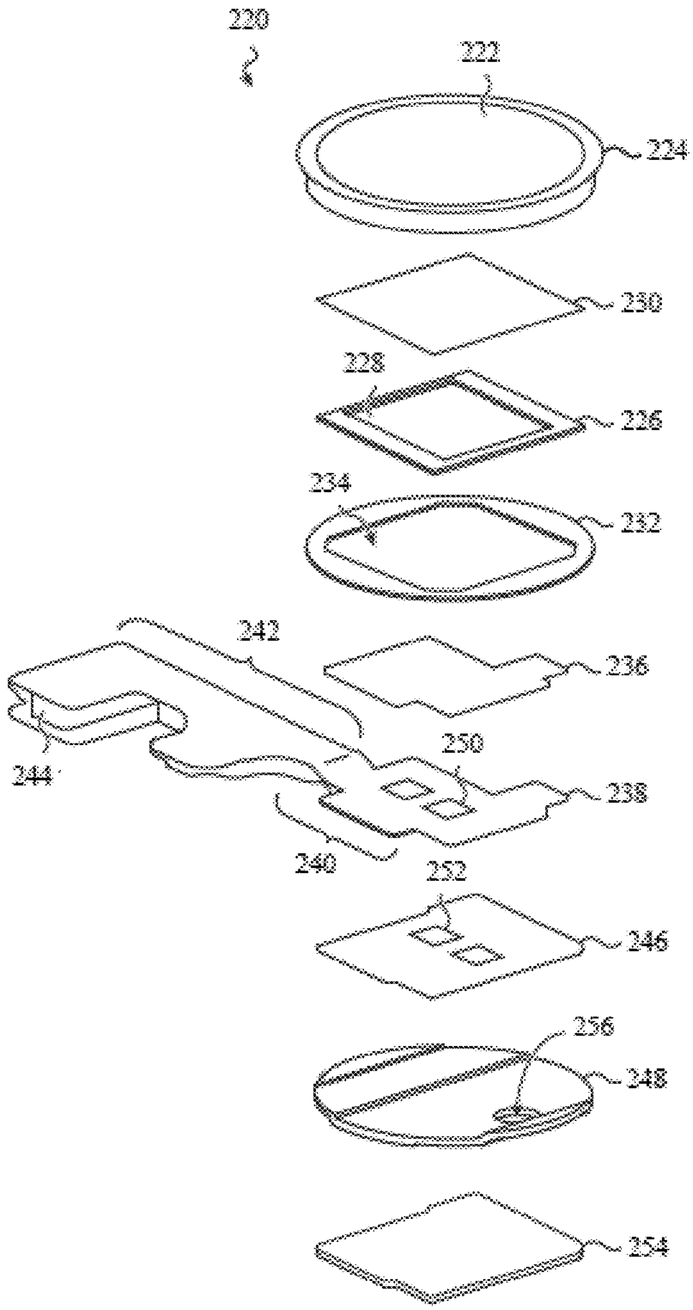

FIG. 2A illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIGS. 2B-2C show exploded views of a first input device suitable for use in the electronic devices shown in FIGS. 1A, 2A, 3, and/or 4A (e.g., as home button 204). FIG. 2B shows an example of an intensity-sensitive home button with capacitive sensors used to determine a range of intensity values that correspond to force applied to the intensity-sensitive home button. FIG. 2C shows an example of a home button with a mechanical switch element. With reference to FIG. 2B, the input device stack 220 includes a cover element 222 and a trim 224. In the illustrated embodiment, the trim 224 completely surrounds the sides of the cover element 222 and the perimeter of the top surface of the cover element 222. Other embodiments are not limited to this configuration. For example, in one embodiment the sides and/or top surface of the cover element 222 can be partially surrounded by the trim 224. Alternatively, the trim 224 can be omitted in other embodiments.

Both the cover element 222 and the trim 224 can be formed with any suitable opaque, transparent, and/or translucent material. For example, the cover element 222 can be made of glass, plastic, or sapphire and the trim 224 may be made of a metal or plastic. In some embodiments, one or more additional layers (not shown) can be positioned below the cover element 222. For example, an opaque ink layer can be disposed below the cover element 222 when the cover element 222 is made of a transparent material. The opaque ink layer can conceal the other components in the input device stack 220 so that the other components are not visible through the transparent cover element 222.

A first circuit layer 226 can be disposed below the cover element 222. Any suitable circuit layer may be used. For example, the first circuit layer 226 may be a circuit board or a flexible circuit. The first circuit layer 226 can include one or more circuits, signal lines, and/or integrated circuits. In one embodiment, the first circuit layer 226 includes a biometric sensor 228. Any suitable type of biometric sensor can be used. For example, in one embodiment the biometric sensor is a capacitive fingerprint sensor that captures at least one fingerprint when a user's finger (or fingers) approaches and/or contacts the cover element 222.

The first circuit layer 226 may be attached to the bottom surface of the cover element 222 with an adhesive layer 230. Any suitable adhesive can be used for the adhesive layer. For example, a pressure sensitive adhesive layer may be used as the adhesive layer 230.

A compliant layer 232 is disposed below the first circuit layer 226. In one embodiment, the compliant layer 232 includes an opening 234 formed in the compliant layer 232. The opening 234 exposes the top surface of the first circuit layer 226 and/or the biometric sensor 228 when the device stack 220 is assembled. In the illustrated embodiment, the compliant layer 232 is positioned around an interior perimeter of the trim 224 and/or around a peripheral edge of the cover element 222. Although depicted in a circular shape, the compliant layer 232 can have any given shape and/or dimensions, such as a square or oval. The compliant layer 232 is shown as a continuous compliant layer in FIGS. 2B and 2C, but other embodiments are not limited to this configuration. In some embodiments, multiple discrete compliant layers may be used in the device stack 220. Additionally, in some embodiments, the compliant layer 232 does not include the opening 234 and the compliant layer 232 extends across at least a portion of the input device stack 220. For example, the compliant layer 232 may extend across the bottom surface of the cover element 222, the bottom surface of the first circuit layer 226, or a portion of the bottom surface of the cover element 222 (e.g., around the peripheral edge of the cover element) and the bottom surface of the first circuit layer 226.

A second circuit layer 238 is positioned below the first circuit layer 226. A flexible circuit and a circuit board are examples of a circuit layer that can be used in the second circuit layer 238. In some embodiments, the second circuit layer 238 can include a first circuit section 240 and a second circuit section 242. The first and second circuit sections 240, 242 can be electrically connected one another other.

The first circuit section 240 can include a first set of one or more intensity sensor components that are included in an intensity sensor. In some embodiments, the first circuit section 240 can be electrically connected to the first circuit layer 226. For example, when the first circuit layer 226 includes a biometric sensor 228, the biometric sensor 228 may be electrically connected to the first circuit section 240 of the second circuit layer 238.

The second circuit section 242 can include additional circuitry, such as signal lines, circuit components, integrated circuits, and the like. In one embodiment, the second circuit section 242 may include a board-to-board connector 244 to electrically connect the second circuit layer 238 to other circuitry in the electronic device. For example, the second circuit layer 238 can be operably connected to a processing device using the board-to-board connector 244. Additionally or alternatively, the second circuit layer 238 may be operably connected to circuitry that transmits signals (e.g., sense signals) received from the intensity sensor component(s) in the first circuit section 240 to a processing device. Additionally or alternatively, the second circuit layer 238 may be operably connected to circuitry that provides signals (e.g., drive signals, a reference signal) to the one or more intensity sensor components in the first circuit section 240.

In some embodiments, the first circuit section 240 of the second circuit layer 238 may be attached to the bottom surface of the first circuit layer 226 using an adhesive layer 236. In a non-limiting example, a die attach film may be used to attach the first circuit section 240 to the bottom surface of the first circuit layer 226.

A third circuit layer 246 is disposed below the first circuit section 240 of the second circuit layer 238. The third circuit layer 246 may include a second set of one or more intensity sensor components that are included in an intensity sensor. The third circuit layer 246 is supported by and/or attached to a support element 248. In one embodiment, the support element 248 is attached to the trim 224 to produce an enclosure for the other components in the device stack 220. The support element 248 may be attached to the trim 224 using any suitable attachment mechanism.

The first set of one or more intensity sensor components in the first circuit section 240 and the second set of one or more intensity sensor components in the third circuit layer 246 together form an intensity sensor. The intensity sensor can use any suitable intensity sensing technology. Example sensing technologies include, but are not limited to, capacitive, piezoelectric, piezoresistive, ultrasonic, and magnetic.

In the examples shown in FIGS. 2B and 2C, the intensity sensor is a capacitive force sensor. With a capacitive force sensor, the first set of one or more intensity sensor components can include a first set of one or more electrodes 250 and the second set of one or more force sensor components a second set of one or more electrodes 252. Although shown in a square shape in FIGS. 2B and 2C each electrode in the first and second sets of one or more electrodes 250, 252 can have any given shape (e.g., rectangles, circles). Additionally, the one or more electrodes in the first and second sets 250, 252 may be arranged in any given pattern (e.g., one or more rows and one or more columns).

FIGS. 2B and 2C show two electrodes in the first and second sets of one or more electrodes 250, 252. However, other embodiments are not limited to this configuration. The first and second sets of one or more electrodes 250, 252 may each be a single electrode or multiple discrete electrodes. For example, if the first set of one or more electrodes is a single electrode, the second set of one or more electrodes comprises multiple discrete electrodes. In some embodiments, the second set of one or more electrodes can be a single electrode and the first set includes multiple discrete electrodes. Alternatively, both the first and second sets of one or more electrodes may each include multiple discrete electrodes.

Each electrode in the first set of one or more electrodes 250 is aligned in at least one direction (e.g., vertically) with a respective electrode in the second set of one or more electrodes 252 to produce one or more capacitors. When a force input is applied to the cover element 222 (e.g., the input surface of the input device), at least one electrode in the first set 250 moves closer to a respective electrode in the second set 252, which varies the capacitance of the capacitor(s). A capacitance signal sensed from each capacitor represents a capacitance measurement of that capacitor. A processing device (not shown) is configured to receive the capacitance signal(s) and correlate the capacitance signal(s) to an amount of intensity applied to the cover element 222. In some embodiments the force sensor can replace a switch element and different intensity thresholds can be used to determine activation events.

In some embodiments, such as the embodiment shown in FIG. 2C, a switch element 254 can be positioned below the support element 248. The switch element 254 registers a user input when a force input applied to the cover element 222 exceeds a given amount of force (e.g., a force threshold associated with closing the distance between the first circuit section 240 and the third circuit layer 246). Any suitable switch element can be used. For example, the switch element 254 may be a dome switch that collapses when the force input applied to the cover element 222 exceeds the force threshold. When collapsed, the dome switch completes a circuit that is detected by a processing device and recognized as a user input (e.g., a selection of an icon, function, or application). In one embodiment, the dome switch is arranged such that the apex of the collapsible dome is proximate to the bottom surface of the support plate 248. In another embodiment, the base of the collapsible dome can be proximate to the bottom surface of the support plate 248.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"

Icon 444 for notes module 153, labeled "Notes;" and

Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensities of contacts on touch-sensitive surface 451 and/or one or more tactile output generators 359 for generating tactile outputs for a user of device 300.

Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" is an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface is the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact is a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

USER INTERFACES AND ASSOCIATED PROCESSES

Attention is now directed towards embodiments of user interfaces ("UI") and associated processes that may be implemented on an electronic device, such as portable multifunction device 100 or device 300, with a display, a touch-sensitive surface, one or more tactile output generators for generating tactile outputs, and (optionally) one or more sensors to detect intensities of contacts with the touch-sensitive surface.

These user interfaces and associated processes provide new, improved ways to use haptic feedback to:

- indicate hidden thresholds;
- perform scrubbing, such as index bar scrubbing, variable rate scrubbing, and slider scrubbing;
- enhance rubber band effects;
- drag and drop objects;
- indicate device orientation; and
- scroll movable user interface components that represent selectable options.

FIGS. 5A-5DK illustrate example user interfaces for providing haptic feedback (optionally, in conjunction with visual feedback) indicating crossing of a threshold (e.g., moving past a respective threshold position or moving for more than a respective threshold amount of movement) for triggering or canceling an operation associated with a user interface item. The user interfaces in these figures are used to illustrate the processes described below, including the processes in FIGS. 20A-20G. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 5A:
FIGS. 5A-5DK illustrate exemplary user interfaces for providing haptic feedback indicating crossing of a threshold for triggering or canceling an operation in accordance with some embodiments.
Figure 5B:
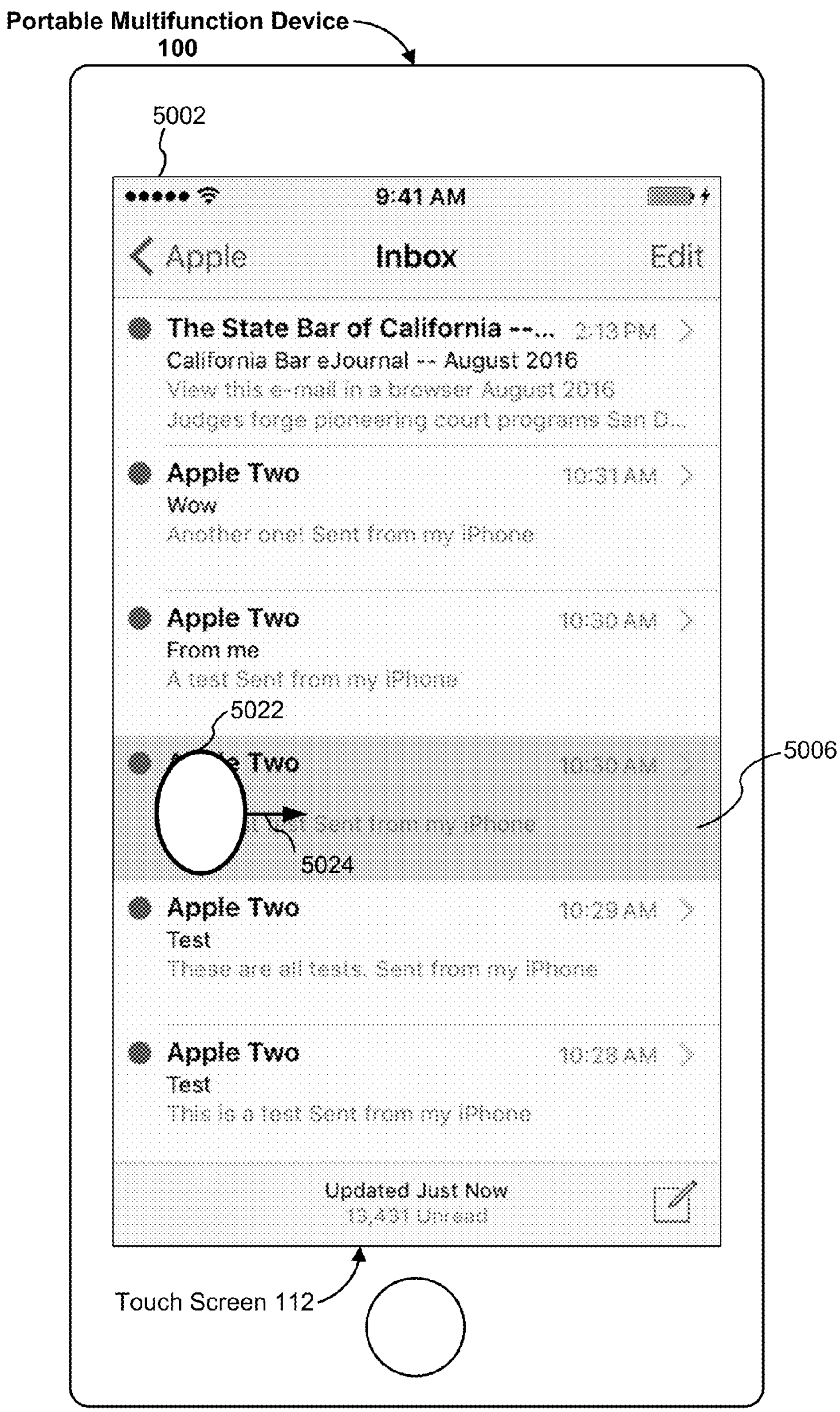
Figure 5C:
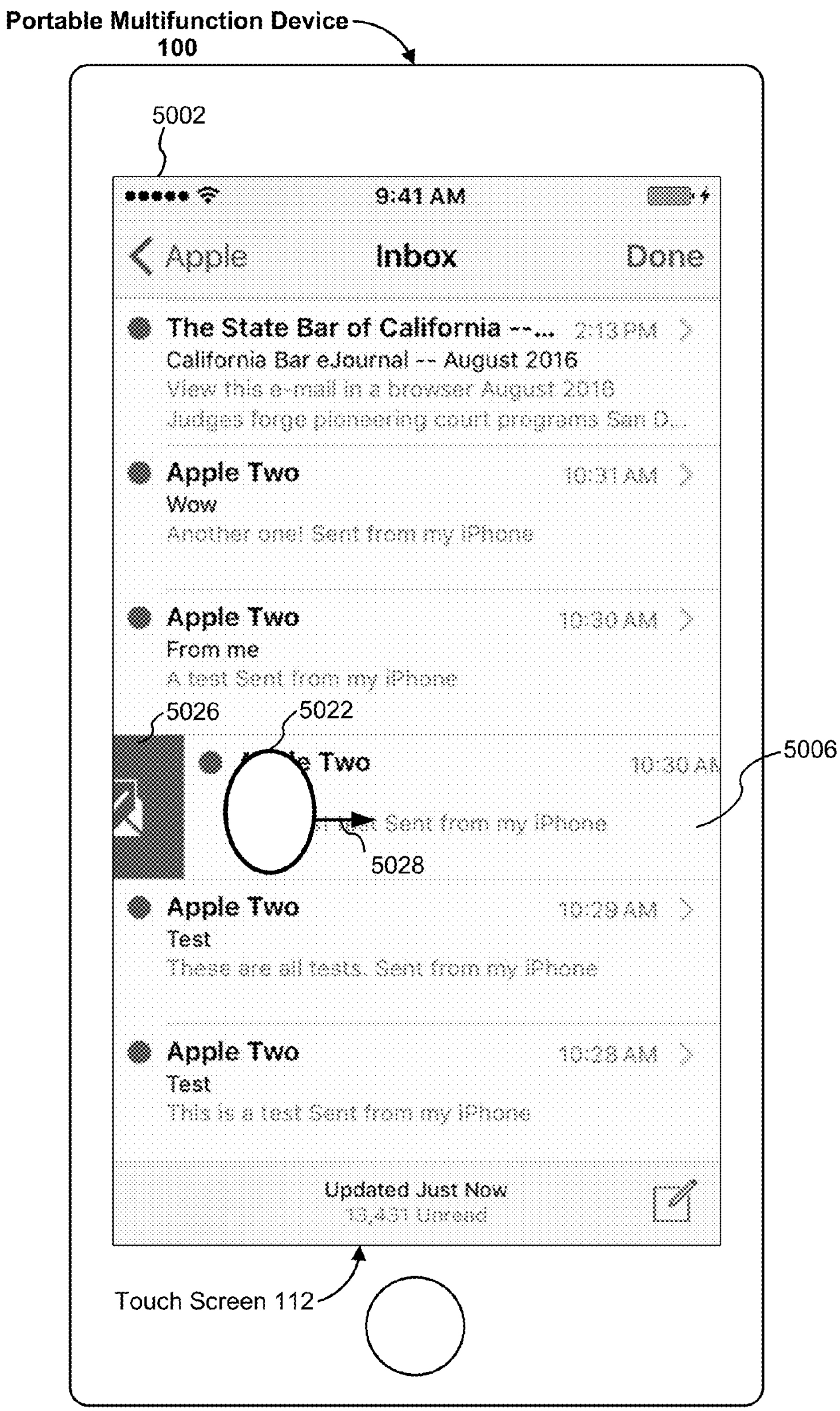
Figure 5D:
Figure 5E:
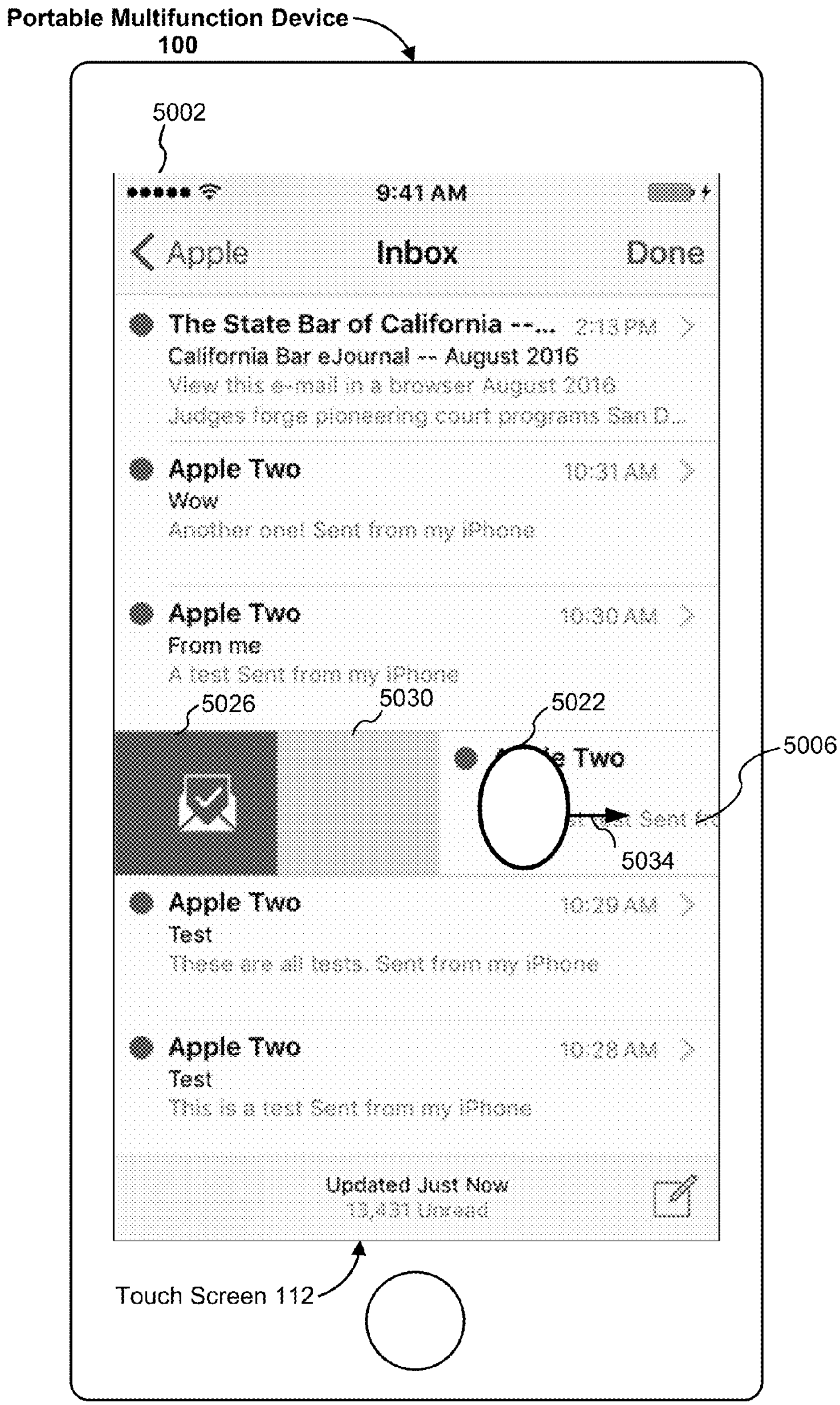
Figure 5F:
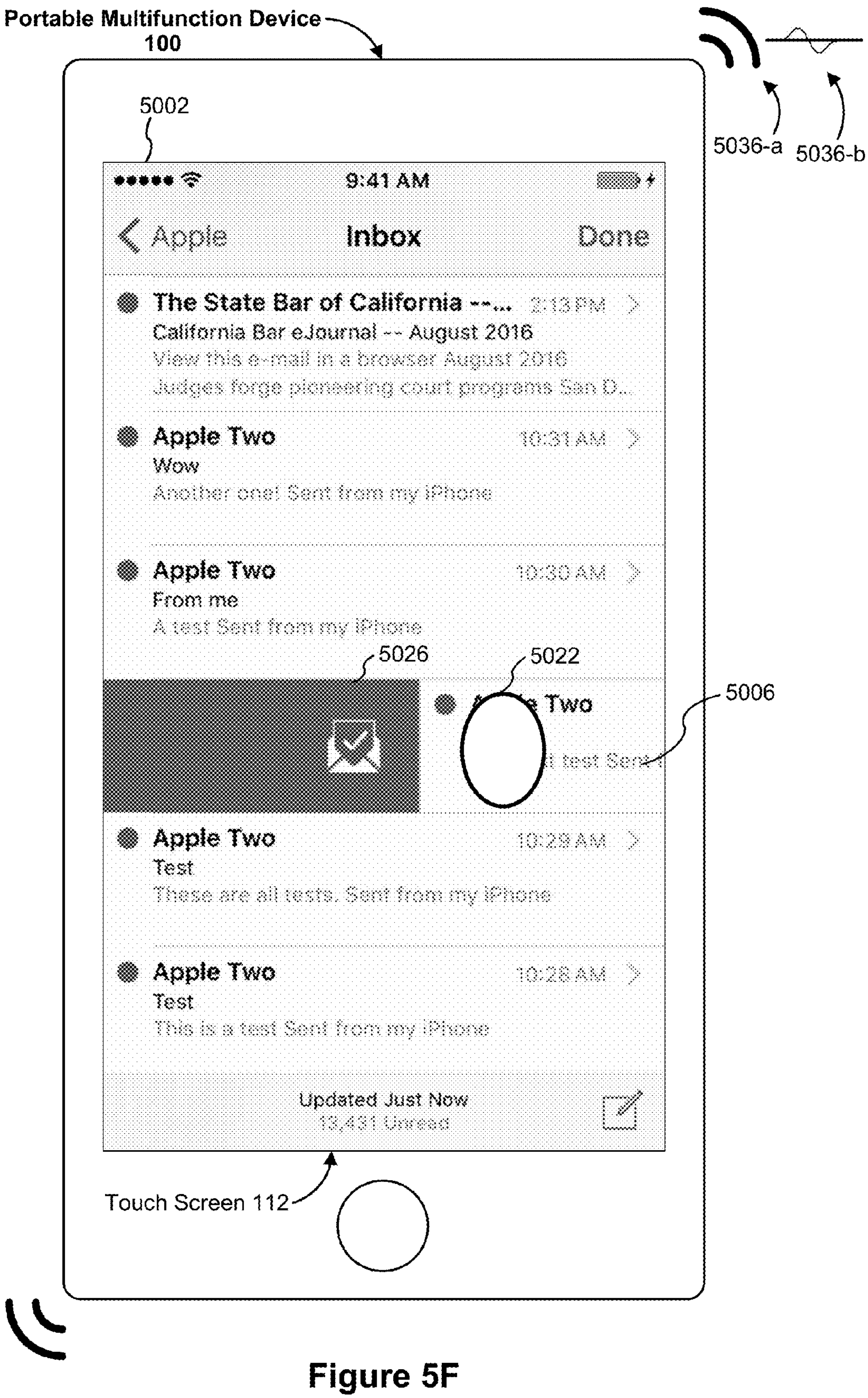
Figure 5G:
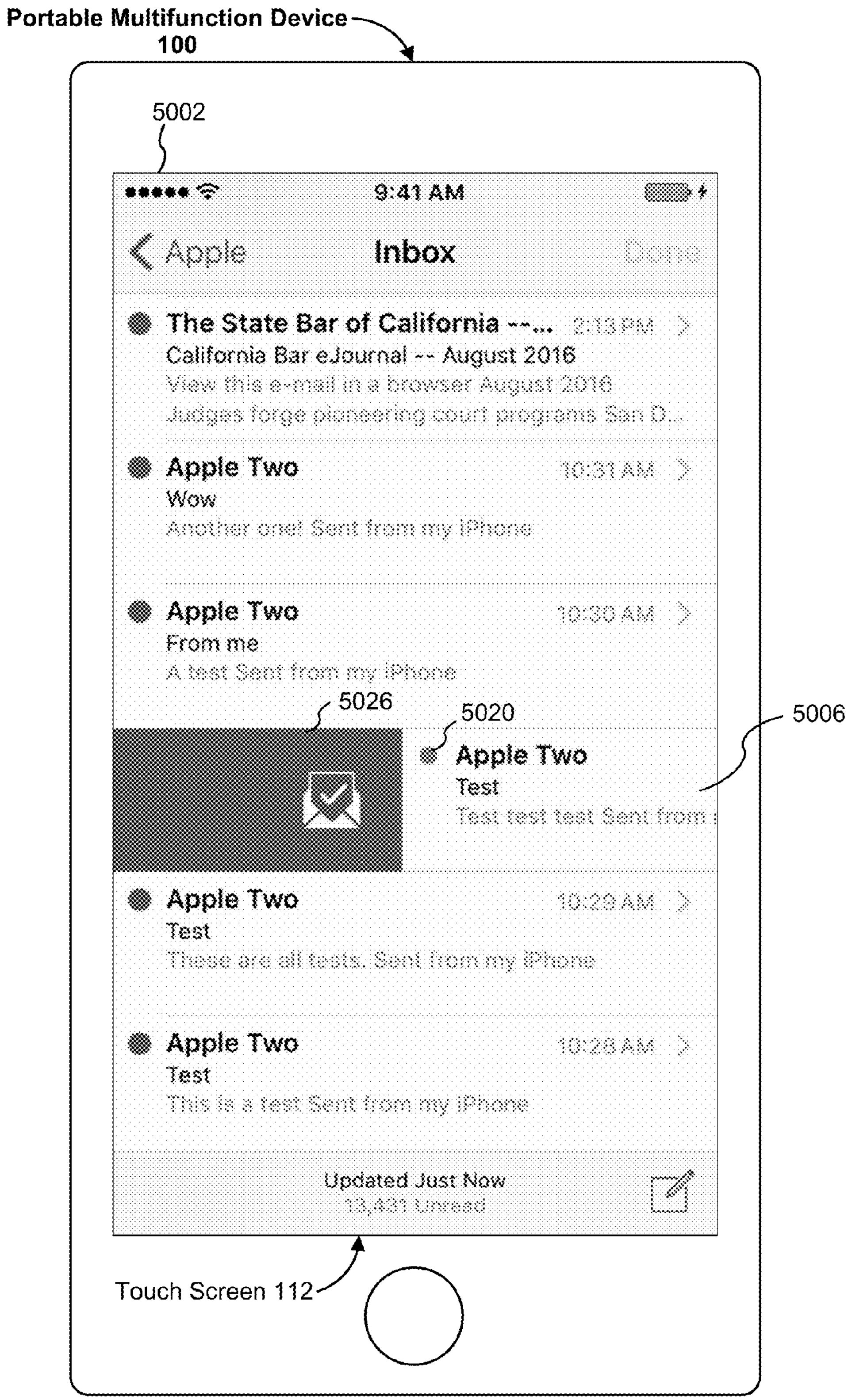
Figure 5H:
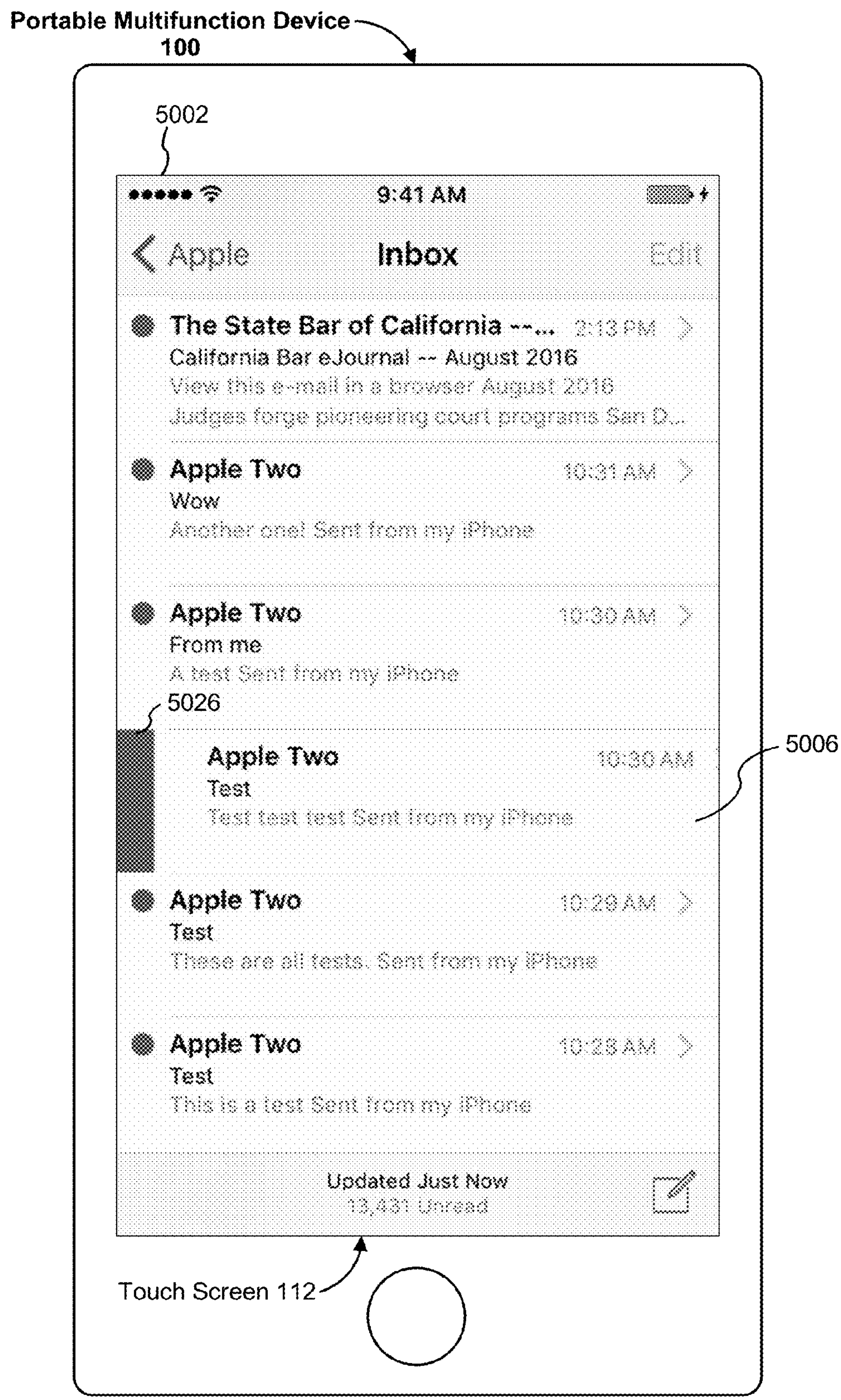
Figure 5I:
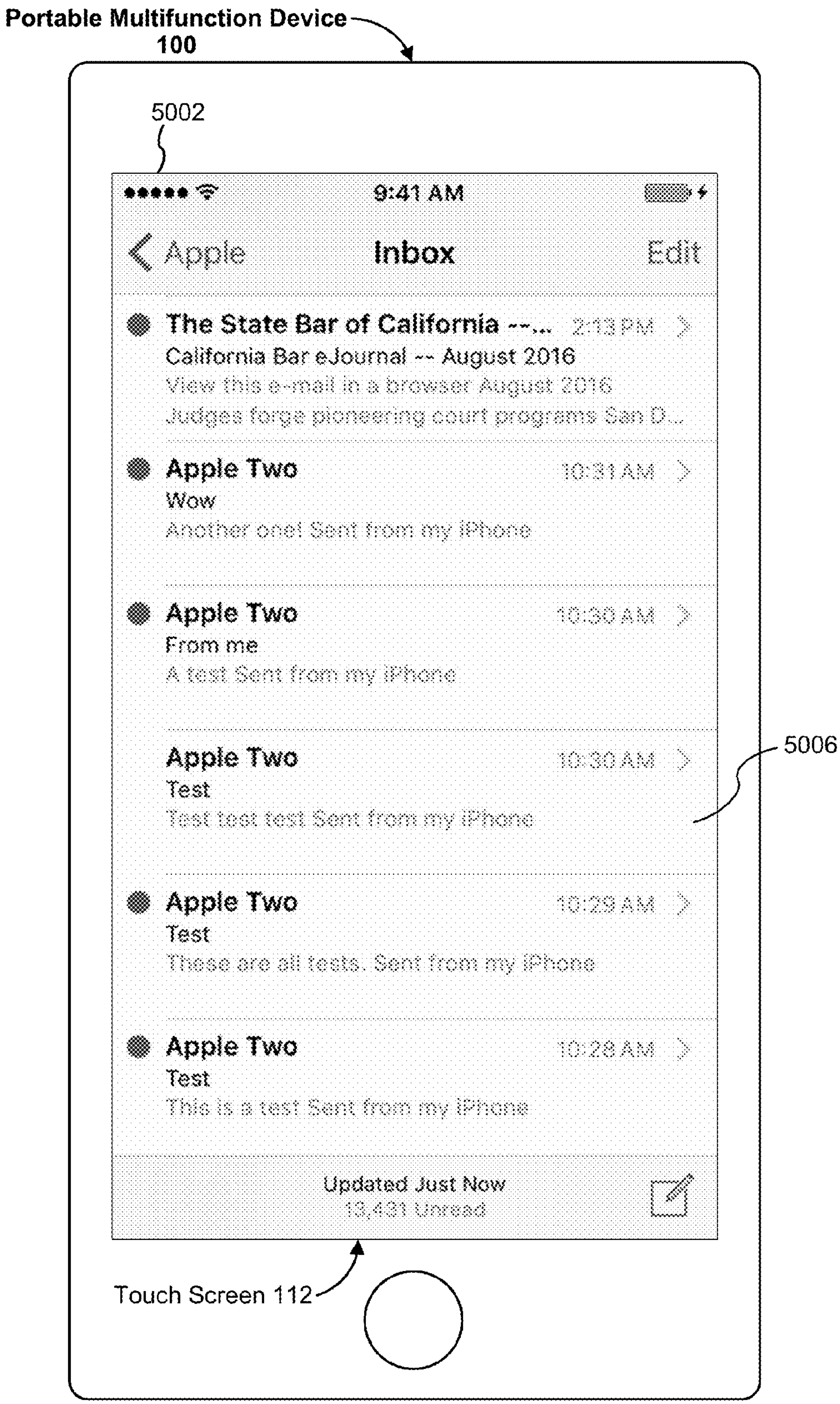
Figure 5J:
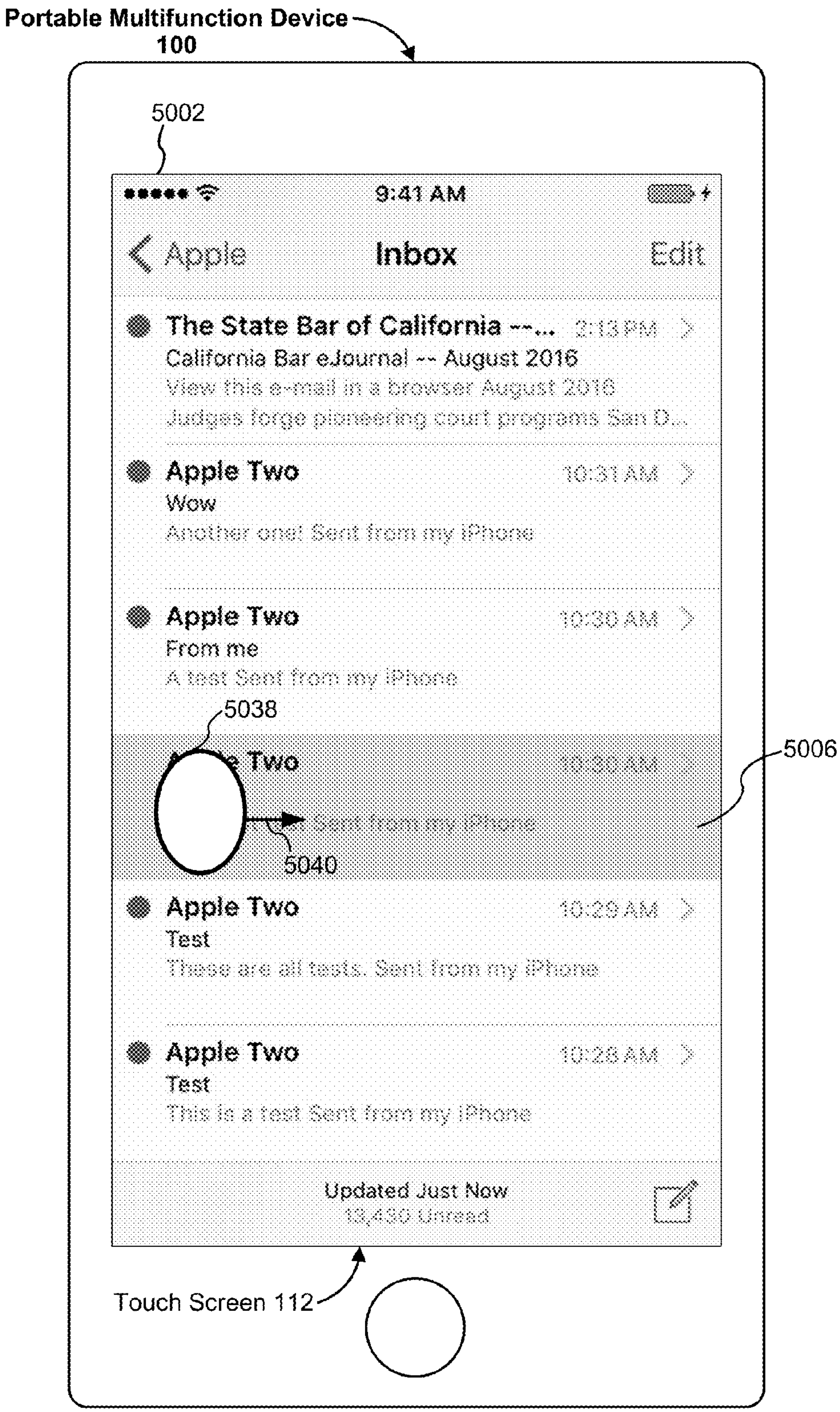
Figure 5K:
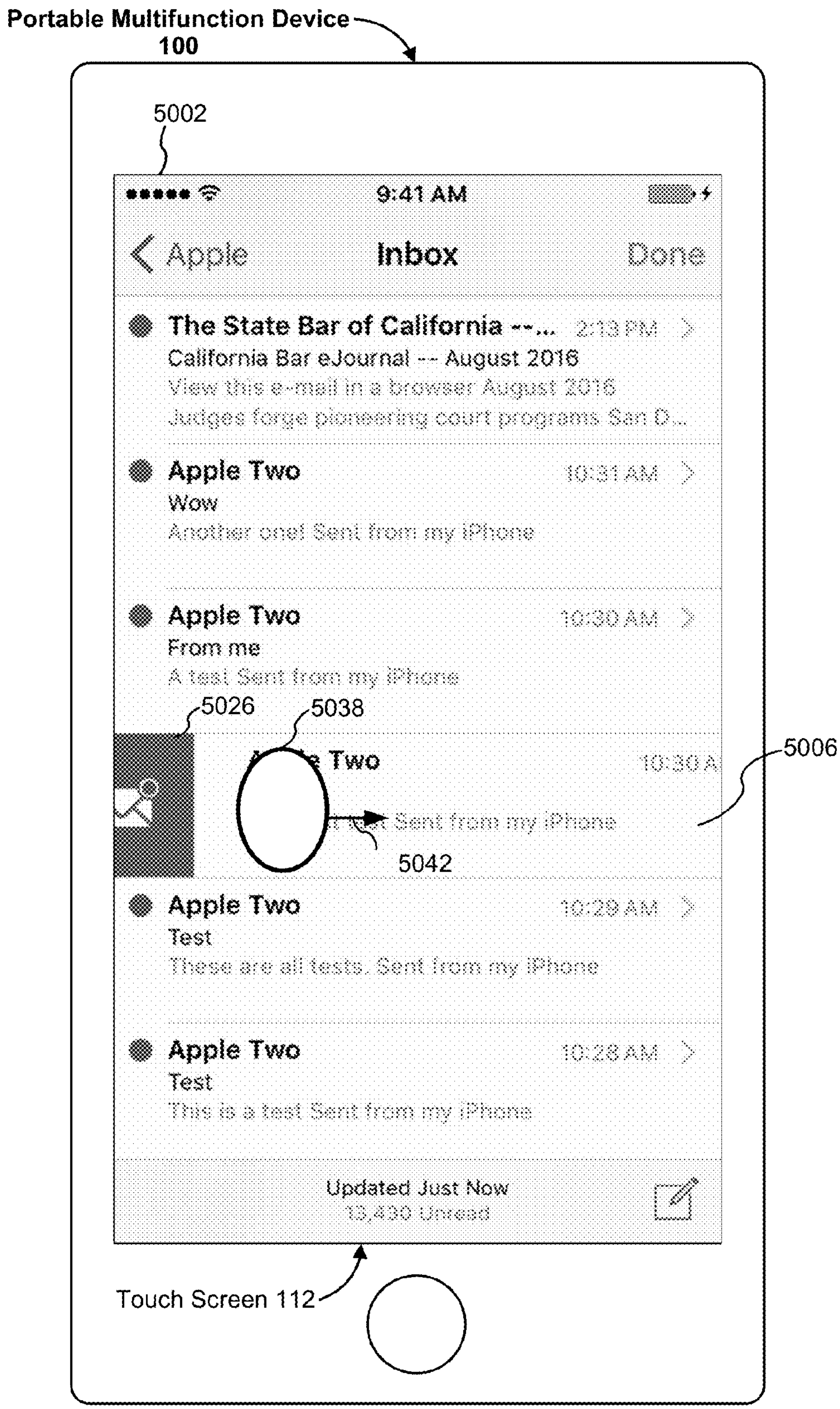
Figure 5L:
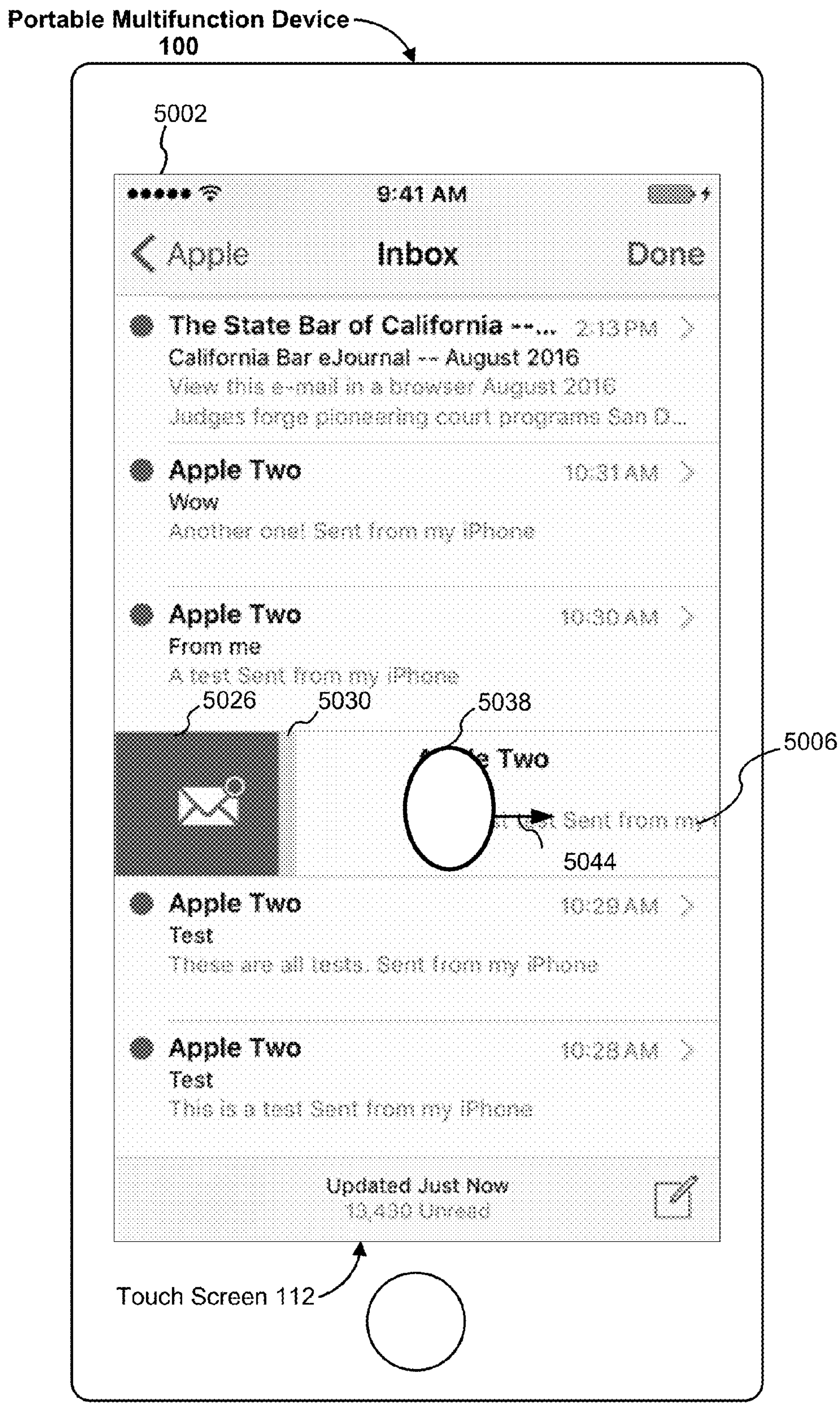
Figure 5M:
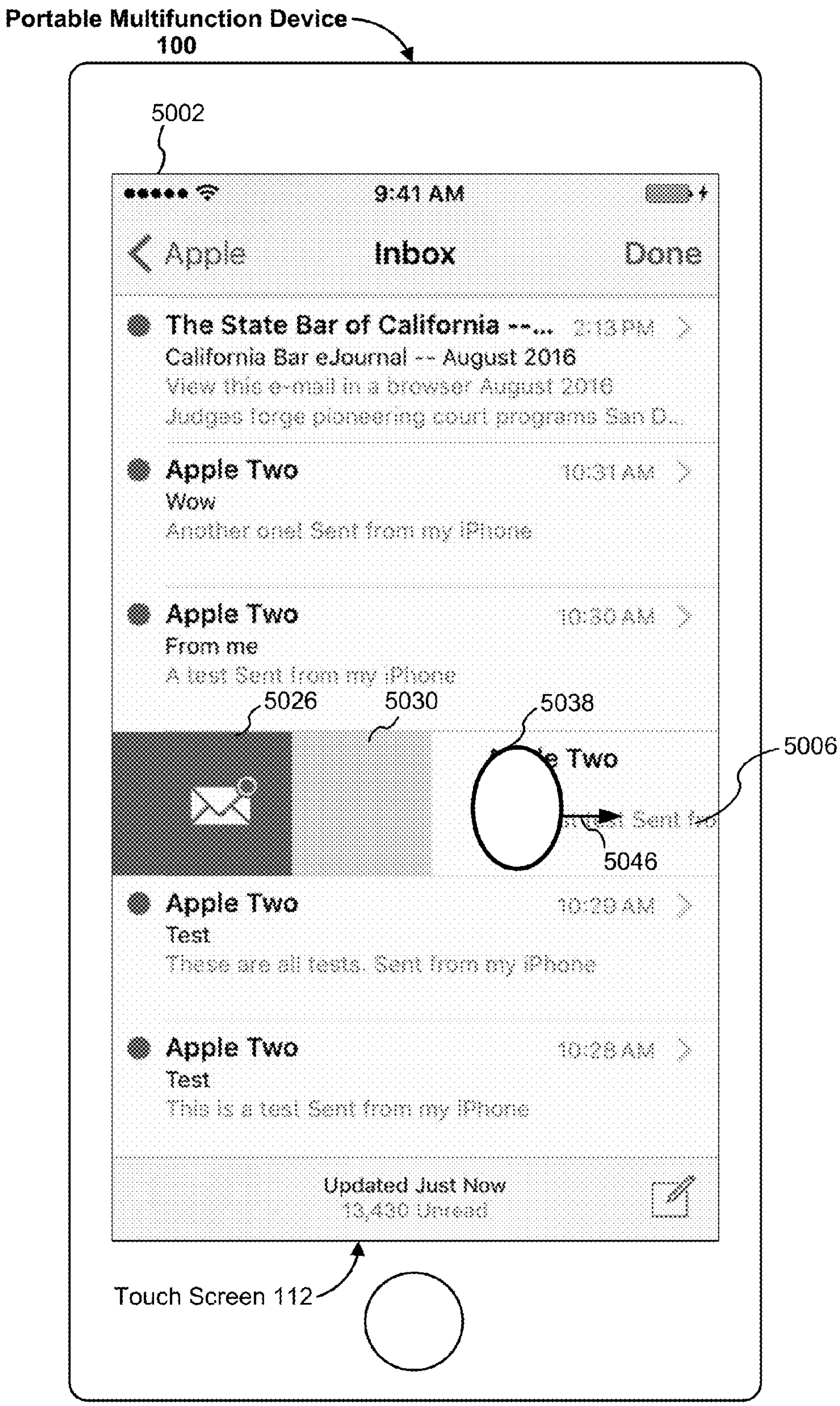
Figure 5N:
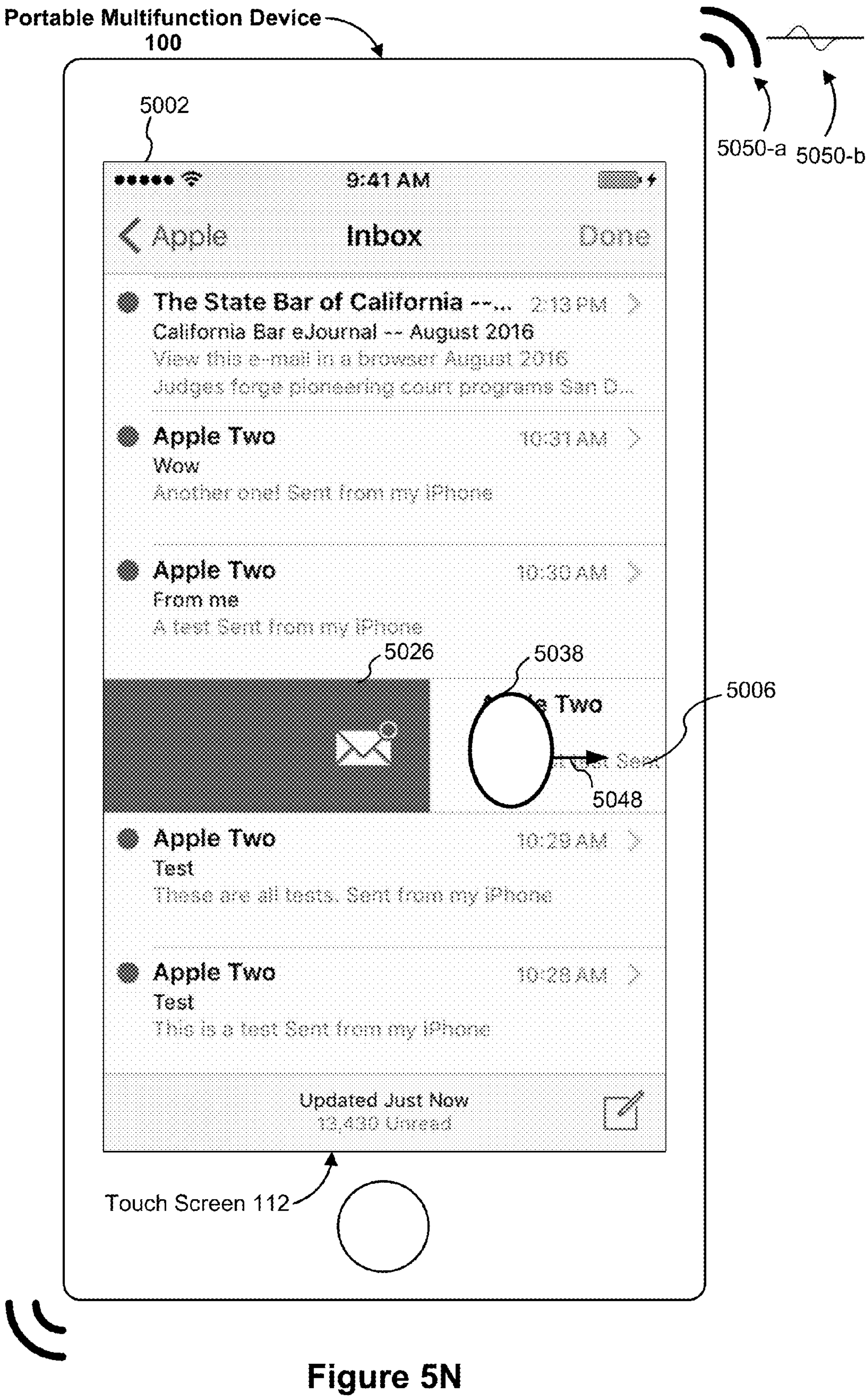
Figure 5O:
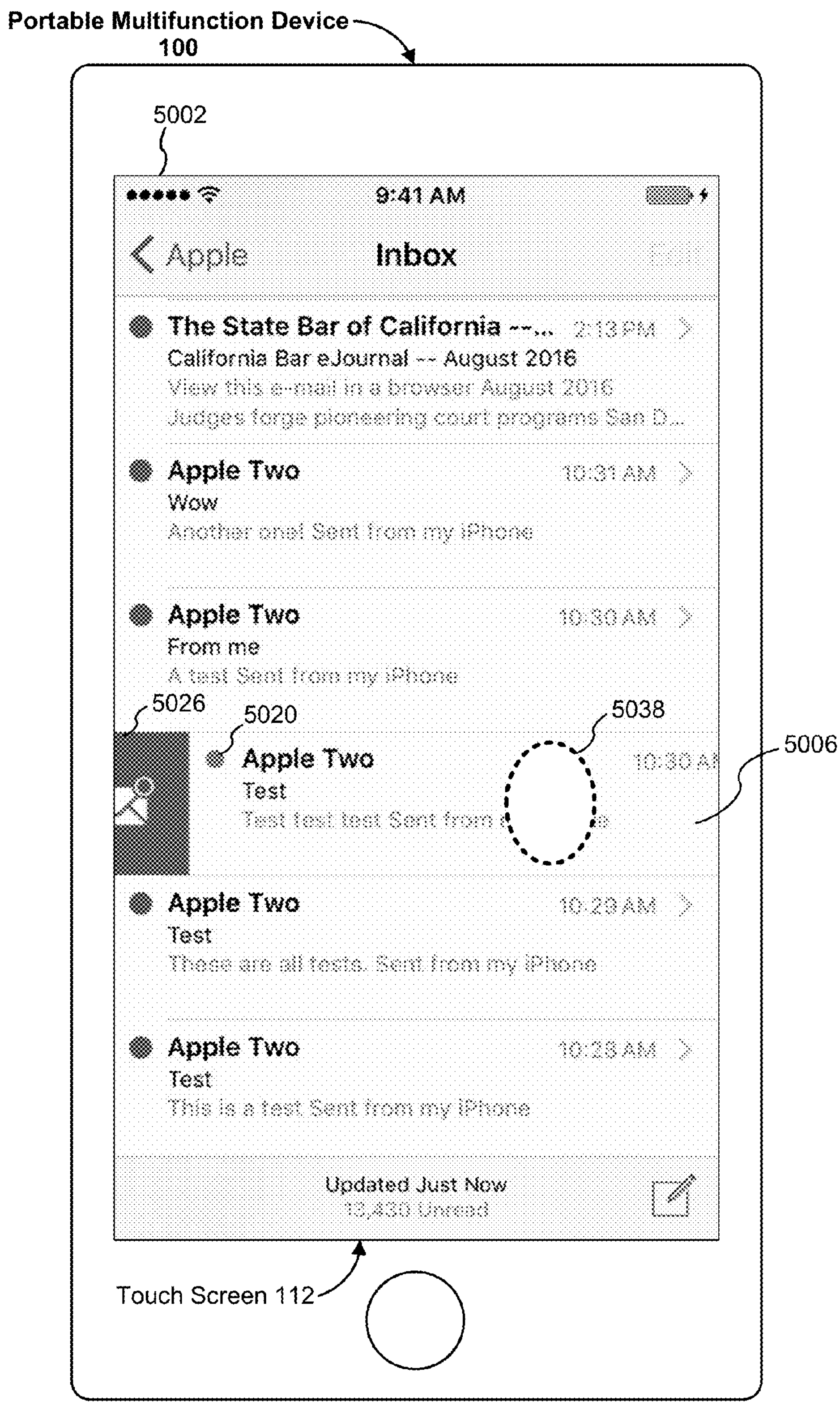
Figure 5P:
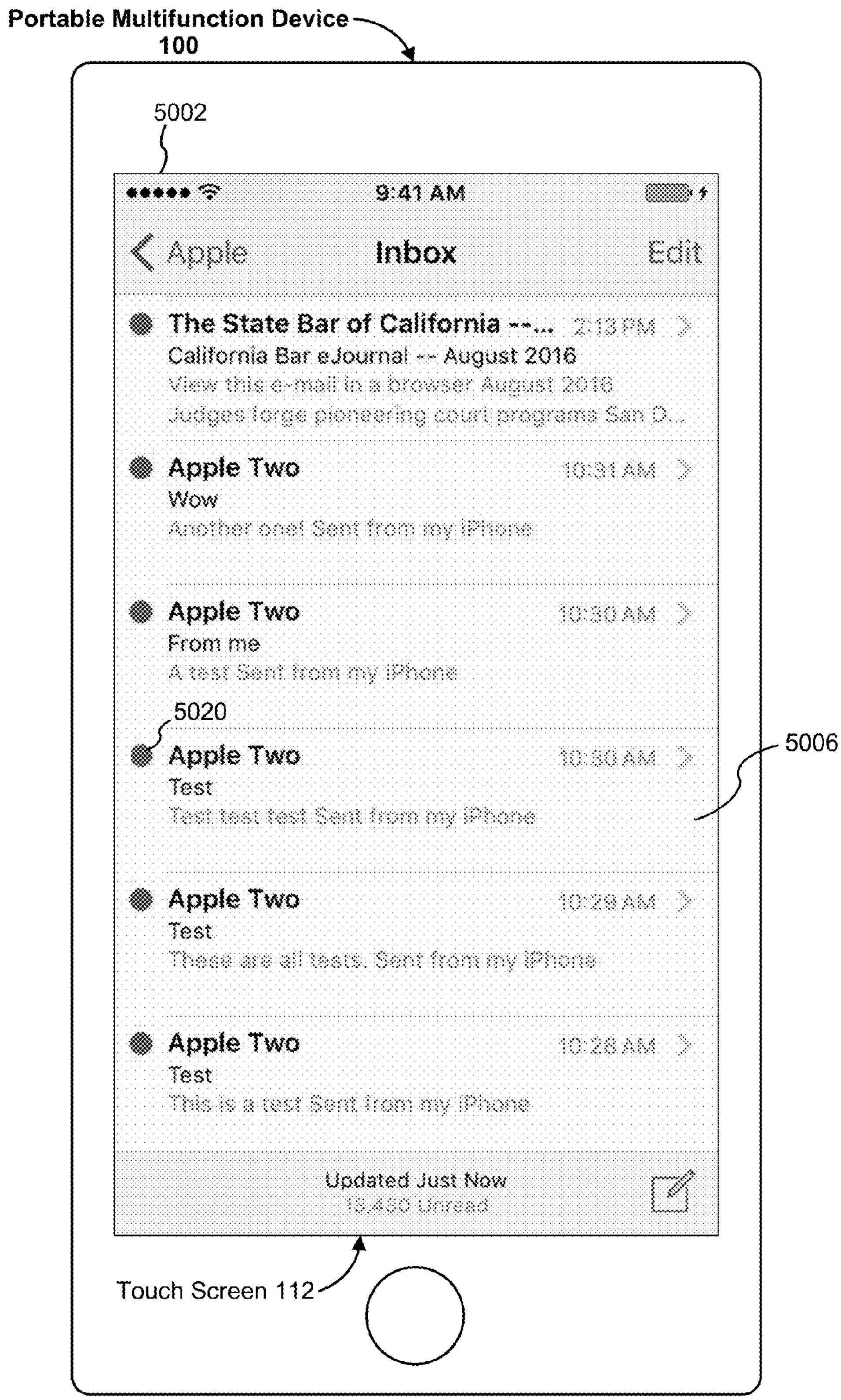
Figure 5Q:
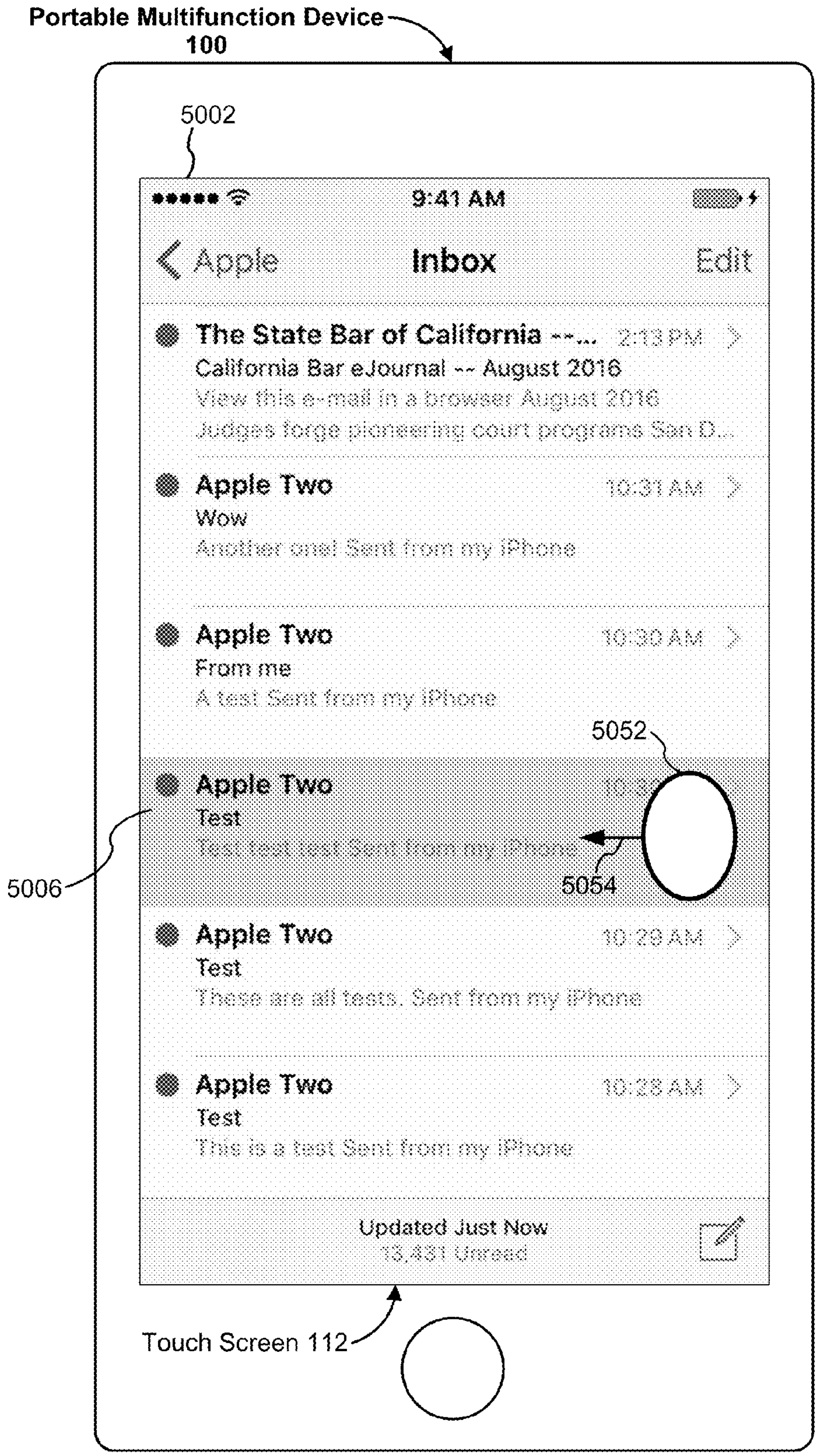
Figure 5R:
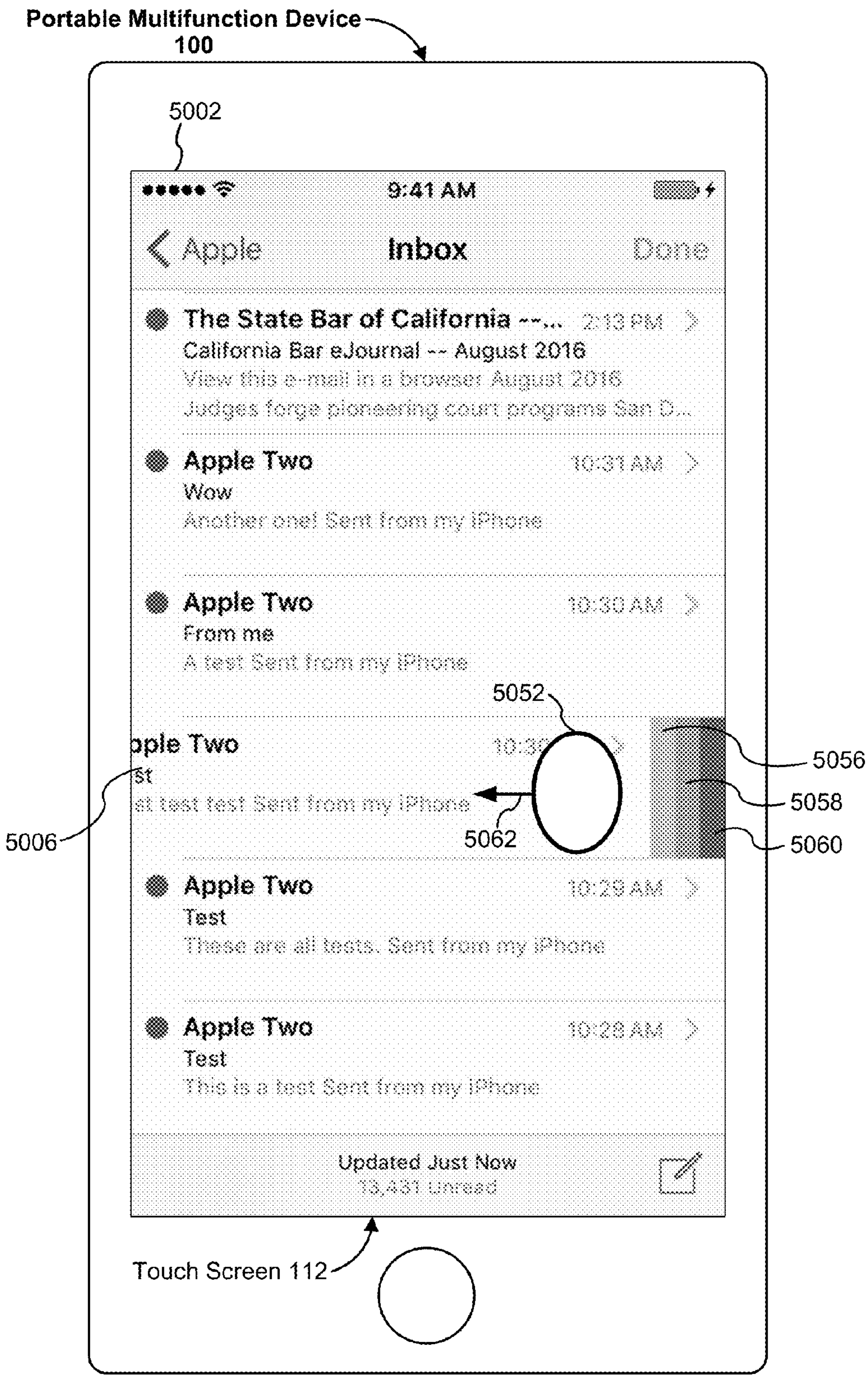
Figure 5S:
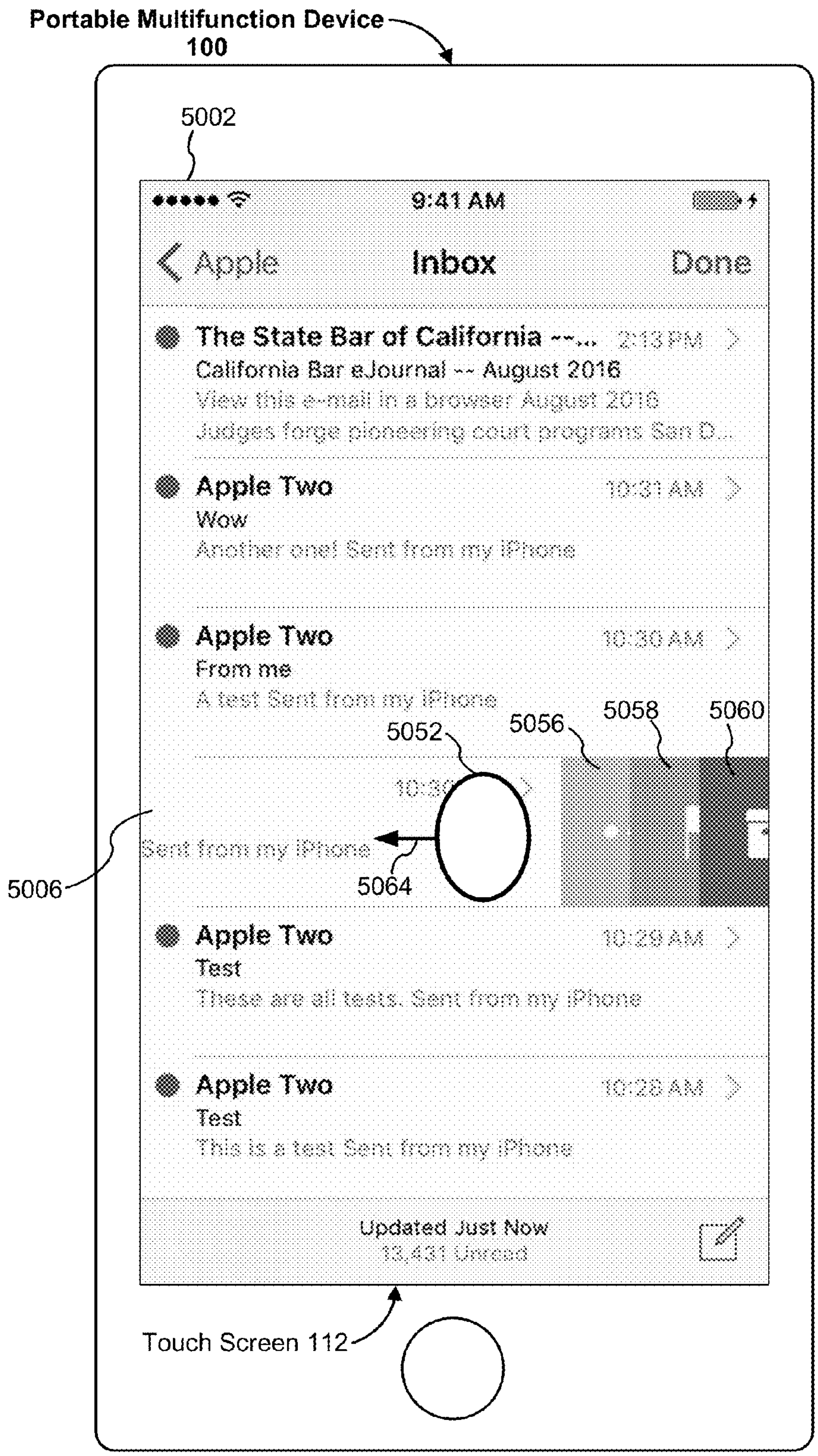
Figure 5T:
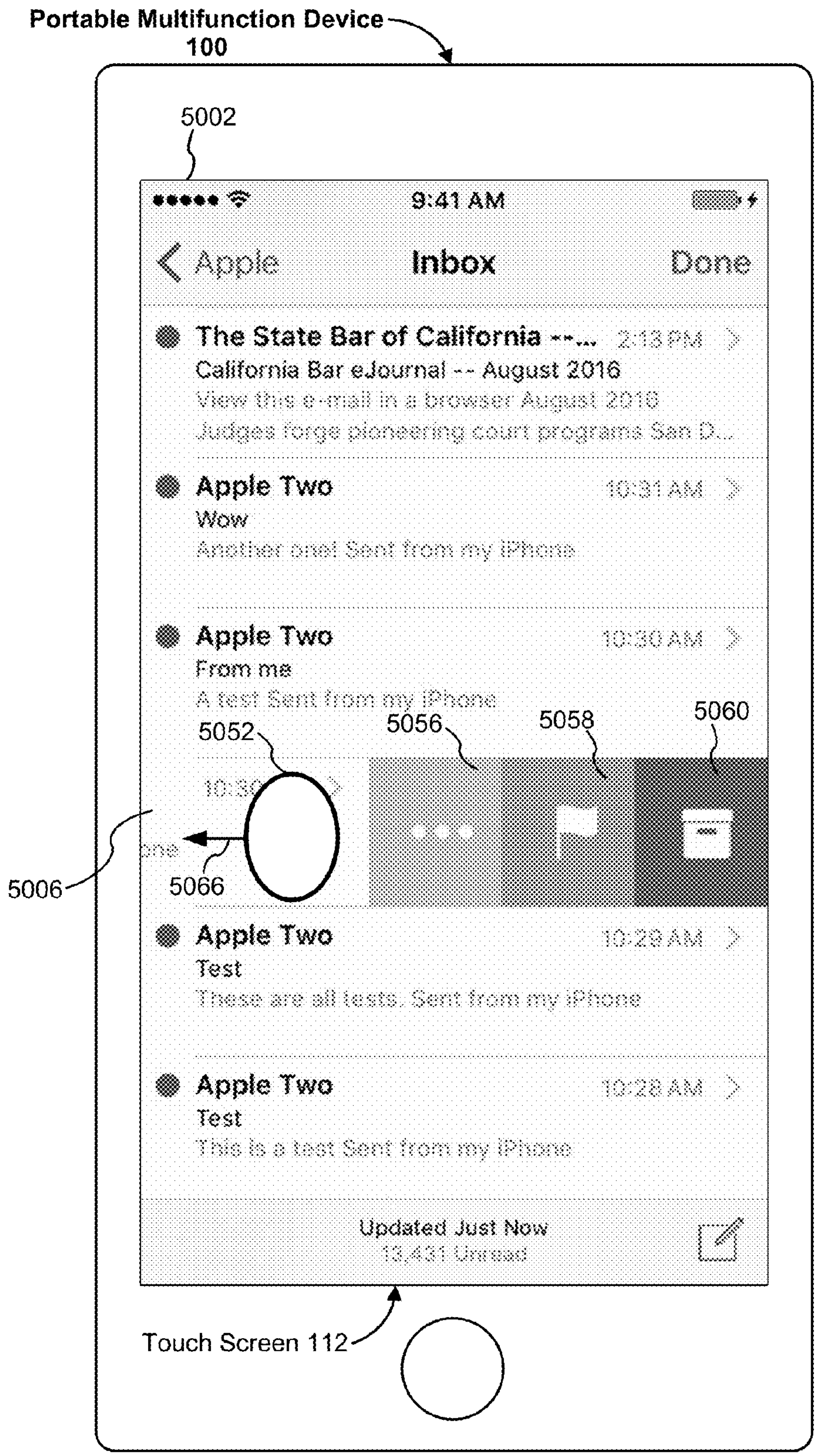
Figure 5U:
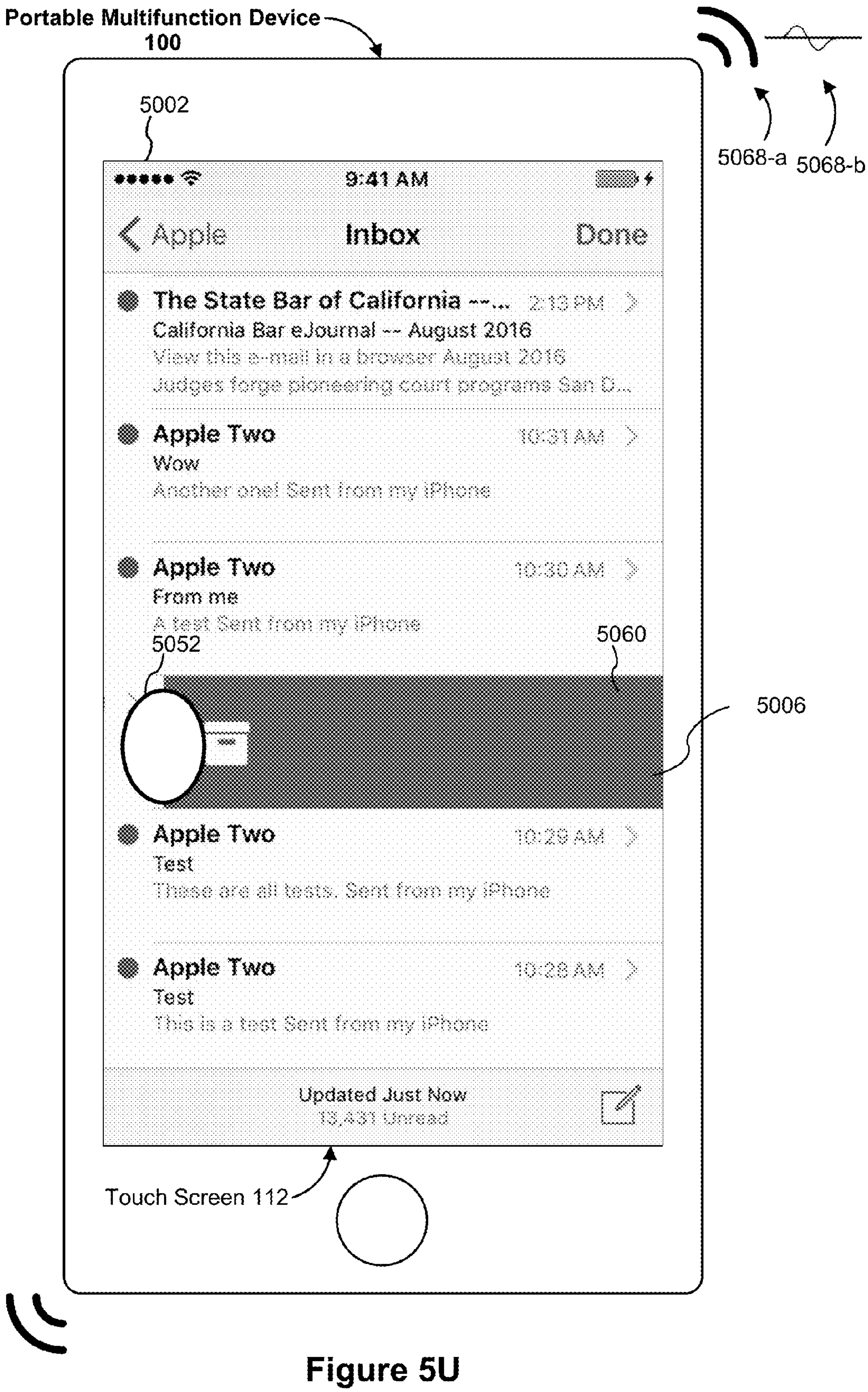
Figure 5V:
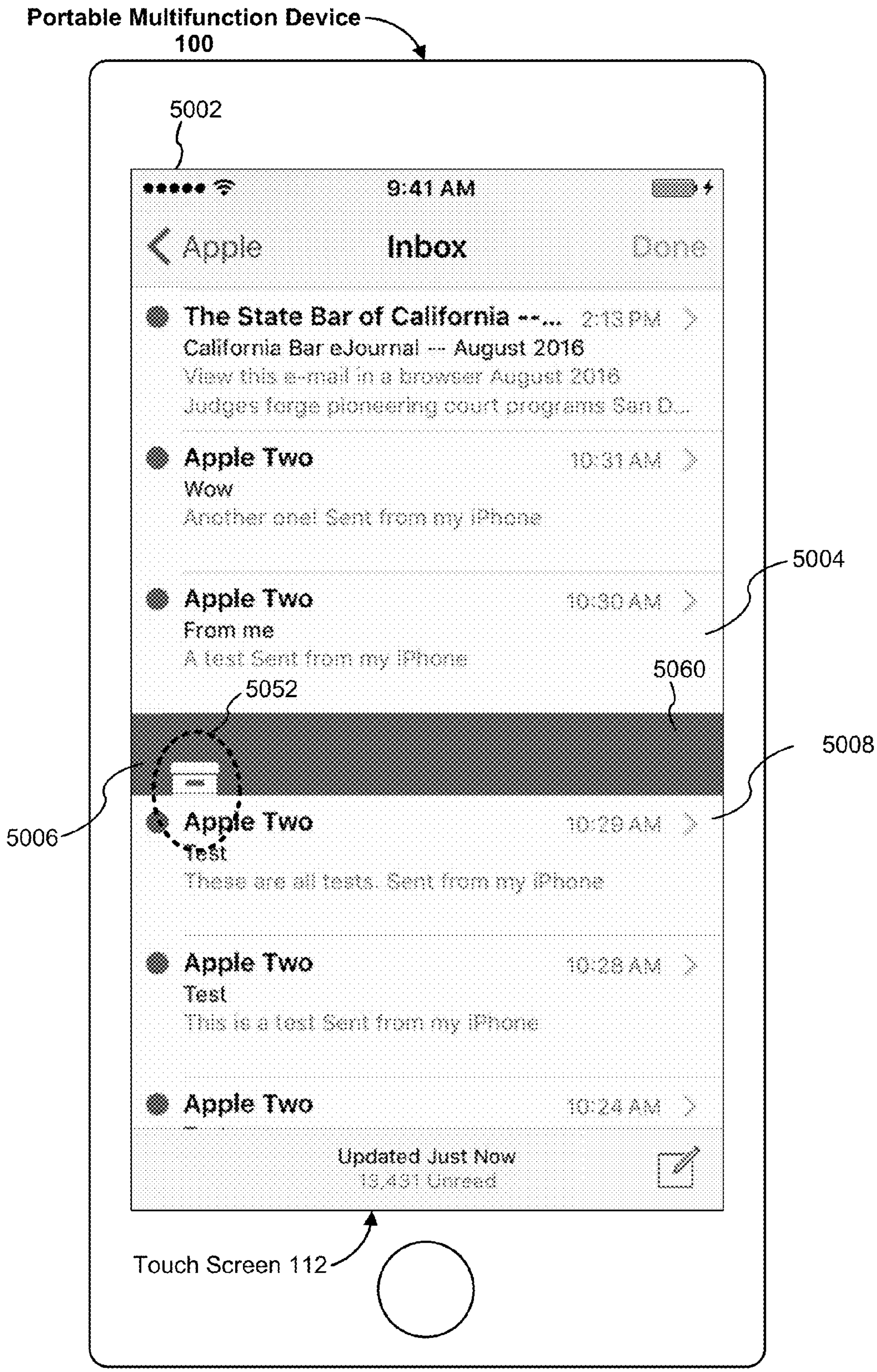
Figure 5W:
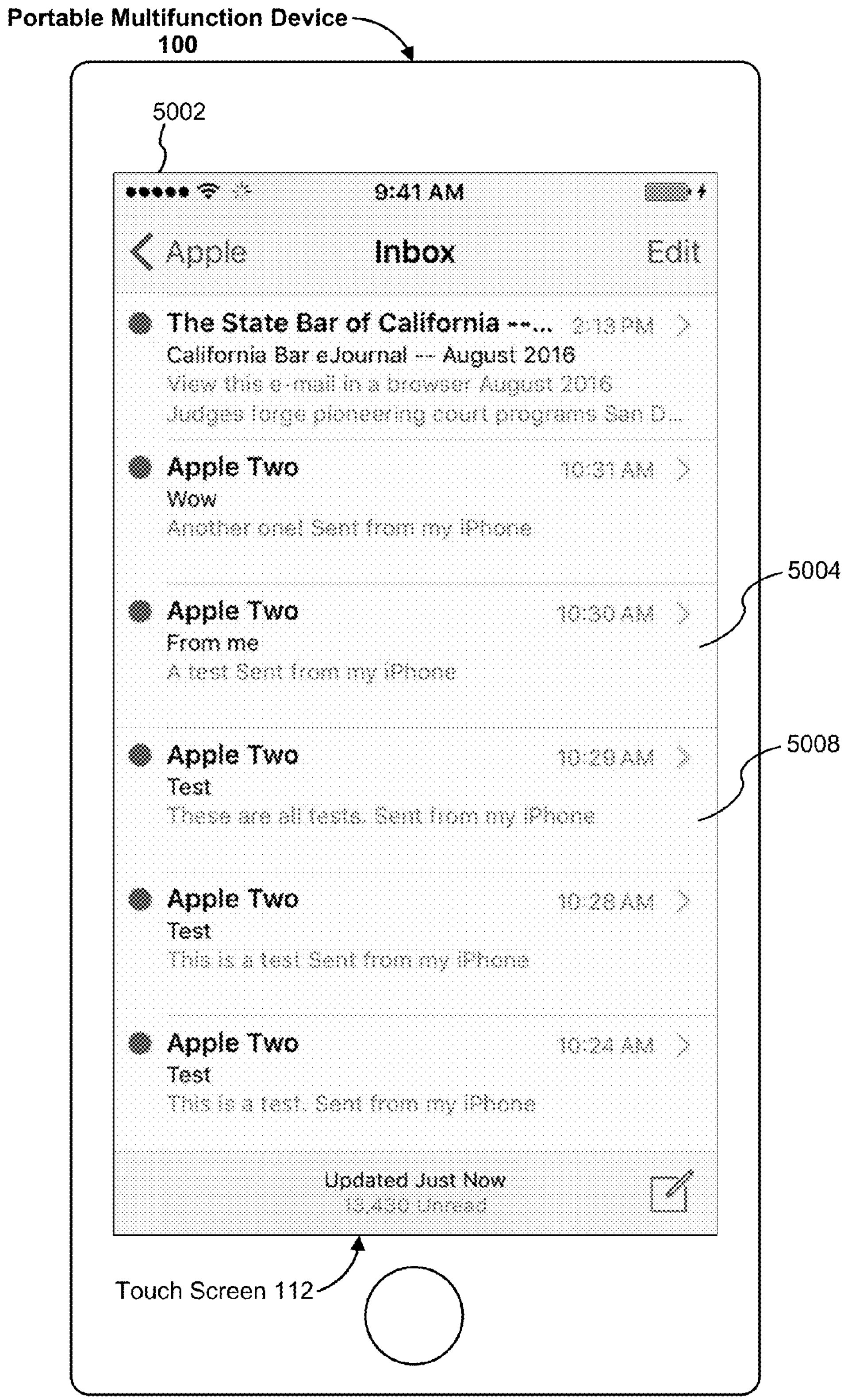

FIGS. 5A-5W illustrate providing tactile outputs in conjunction with providing visual feedback when meeting a hidden threshold for triggering an operation (e.g., changing read/unread status of an e-mail item) in a mail application.

FIG. 5A illustrates a user interface 5002 for a mail application that includes a list of e-mail summary items, including e-mail summary item 5004, e-mail summary item 5006, and e-mail summary item 5008. An e-mail summary item includes, e.g.:

- sender information 5010,
- a subject line 5012,
- an indication of e-mail content (e.g., truncated e-mail content) 5014,
- a time at which the e-mail was sent 5016
- a control 5018 for viewing an e-mail that corresponds to the e-mail summary item, and
- an unread mail indicator 5020 (e.g., a dot indicating that the e-mail corresponding to the e-mail summary item has an unread status).

FIGS. 5B-5I illustrate a process to change the status of an e-mail corresponding to e-mail summary item 5006 from "unread" to "read."

In FIG. 5B, the device detects an input on e-mail summary item 5006, such as touch-down of contact 5022 on touch screen 112. In response to detecting the touch-down of contact 5022 on touch screen 112 on e-mail summary item 5006, e-mail summary item 5006 is visually distinguished (e.g., highlighted, as shown) to indicate that e-mail summary item 5006 is selected and/or to distinguish selected e-mail summary item 5006 from non-selected first-email summary item 5004 and e-mail summary item 5008. Contact 5022 moves along e-mail summary item 5006 as indicated by arrow 5024.

In FIG. 5C, contact 5022 has moved along the path indicated by arrow 5024. As contact 5022 moves along the path indicated by arrow 5024, e-mail summary item 5006 moves in response to the movement of the contact 5022, e.g., along the path indicated by arrow 5024, gradually revealing (e.g., from the left edge of user interface 5002) content-marking indicator 5026. For example, because e-mail summary item 5006 is selected, e-mail summary item 5006 is "attached" to contact 5022 such that e-mail summary item 5006 moves with contact 5022. Contact 5022 continues to move along e-mail summary item 5006 as indicated by arrow 5028.

In FIG. 5D, contact 5022 has moved along the path indicated by arrow 5028. As contact 5022 moves along the path indicated by arrow 5028, e-mail summary item 5006 continues to move in response to the movement of the contact 5022, continuing to gradually reveal content-marking indicator 5026, and gradually revealing marking indicator tray 5030. Contact 5022 continues to move along e-mail summary item 5006 as indicated by arrow 5032.

In FIG. 5E, contact 5022 has moved along the path indicated by arrow 5032. As contact 5022 moves along the path indicated by arrow 5032, e-mail summary item 5006 continues to move in response to the movement of the contact 5022, continuing to gradually reveal content-marking indicator 5026 and marking indicator tray 5030. Contact 5022 continues to move along e-mail summary item 5006 as indicated by arrow 5034.

In FIG. 5F, contact 5022 has moved along the path indicated by arrow 5034. As contact 5022 moves along the path indicated by arrow 5034, movement of contact 5022 meets movement threshold criteria (e.g., contact 5022 moves by a distance exceeding a movement threshold, or reaches a threshold position in the user interface). When movement of contact 5022 moves past the threshold position (e.g., a threshold position that is not visually marked) in the user interface, the device produces tactile output 5036 (e.g., MiniTap (270 Hz), gain: 1.0, as illustrated by indicator 5036-*a* and waveform 5036-*b*). In addition, when contact 5022 moves past the threshold position in the user interface, an animation is started showing the content-marking indicator 5026 suddenly expands in the direction of the movement of the contact 5022 to fill up marking indicator tray 5030.

In FIGS. 5G-5I, in response to lift-off of contact 5022 from touch screen 112 when movement of contact 5022 has moved past the threshold position as described above with regard to FIG. 5F, e-mail summary item 5006 is released and returns to its original position in the user interface, and content-marking indicator 5026 is concealed by email summary item 5006. The status of an e-mail that corresponds to second e-mail summary 5006 is changed to "read," and second e-mail summary 5006 is no longer marked as unread. In FIG. 5I, the unread mail indicator 5020 is no longer displayed in second e-mail summary 5006.

FIGS. 5J-5P illustrate providing tactile outputs in conjunction with providing visual feedback when meeting a hidden threshold for triggering an operation (e.g., changing read/unread status of an e-mail item) in a mail application.

In FIG. 5J, the device detects an input on e-mail summary item 5006, such as touch-down of contact 5038 on touch screen 112. Contact 5038 moves along e-mail summary item 5006 as indicated by arrow 5040.

In FIG. 5K, contact 5038 has moved along the path indicated by arrow 5040. As contact 5038 moves along the path indicated by arrow 5040, e-mail summary item 5006 moves in response to the movement of the contact 5038, e.g., along the path indicated by arrow 5040, gradually revealing content-marking indicator 5026. Contact 5038 continues to move along e-mail summary item 5006 as indicated by arrow 5042.

In FIG. 5L, contact 5038 has moved along the path indicated by arrow 5042. As contact 5038 moves along the path indicated by arrow 5042, e-mail summary item 5006 continues to move in response to the movement of the contact 5038, continuing to gradually reveal content-marking indicator 5026, and gradually revealing marking indicator tray 5030. Contact 5038 continues to move along e-mail summary item 5006 as indicated by arrow 5044.

In FIG. 5M, contact 5038 has moved along the path indicated by arrow 5044. As contact 5038 moves along the path indicated by arrow 5044, e-mail summary item 5006 continues to move in response to the movement of the contact 5038, continuing to gradually reveal content-marking indicator 5026 and marking indicator tray 5030. Contact 5038 continues to move along e-mail summary item 5006 as indicated by arrow 5046.

In FIG. 5N, contact 5038 has moved along the path indicated by arrow 5046. As contact 5038 moves along the path indicated by arrow 5046, movement of contact 5038 meets movement threshold criteria (e.g., contact 5038 moves by a distance exceeding a movement threshold or past a threshold position in the user interface). When movement of contact 5038 meets the movement threshold criteria, the device produces tactile output 5050 (e.g., MiniTap (270 Hz), gain: 1.0, as illustrated by indicator 5050-*a* and waveform 5050-*b*). In addition, the device starts an animation showing content-marking indicator 5026 suddenly expands in the direction of the movement of the contact 5038 to fill marking indicator tray 5030. Contact 5038 continues to move along e-mail summary item 5006 as indicated by arrow 5048.

In FIG. 5O, in response to lift-off of contact 5038 from touch screen 112 when movement of contact 5038 has met the movement threshold criteria described above with regard to FIG. 5N, e-mail summary item 5006 is released to conceal content-marking indicator 5026 again. The status of the e-mail that corresponds to second e-mail summary 5006 is changed to "unread," and second e-mail summary 5006 is marked unread. In FIG. 5P, the unread mail indicator 5020 is redisplayed in second e-mail summary 5006.

FIGS. 5Q-5W illustrate providing tactile outputs in conjunction with providing visual feedback when meeting a hidden threshold for triggering an operation (e.g., archiving an e-mail item) in a mail application.

In FIG. 5Q, the device detects an input on e-mail summary item 5006, such as touch-down of contact 5052 on touch screen 112. Contact 5052 moves along e-mail summary item 5006 as indicated by arrow 5054.

In FIG. 5R, contact 5052 has moved along the path indicated by arrow 5054. As contact 5052 moves along the path indicated by arrow 5054, e-mail summary item 5006 moves in response to the movement of the contact 5054, e.g., along the path indicated by arrow 5054, gradually revealing (e.g., from the right edge of user interface 5002) content menu affordance 5056, flag content affordance 5058, and archive content affordance 5060. Contact 5052 continues to move along a path indicated by arrow 5062.

In FIG. 5S, contact 5052 has moved along the path indicated by arrow 5062. As contact 5052 moves along the path indicated by arrow 5062, e-mail summary item 5006 continues to move in response to the movement of the contact 5052, continuing to gradually reveal content menu affordance 5056, flag content affordance 5058, and archive content affordance 5060. Contact 5052 continues to move along e-mail summary item 5006 as indicated by arrow 5064.

In FIG. 5T, contact 5052 has moved along the path indicated by arrow 5064. As contact 5052 moves along the path indicated by arrow 5064, e-mail summary item 5006 continues to move in response to the movement of the contact 5052, continuing to gradually reveal content menu affordance 5056, flag content affordance 5058, and archive content affordance 5060. Contact 5052 continues to move along e-mail summary item 5006 as indicated by arrow 5066.

In FIG. 5U, contact 5052 has moved along the path indicated by arrow 5066. As contact 5052 moves along the path indicated by arrow 5066, movement of contact 5052 meets movement threshold criteria (e.g., contact 5052 moves by a distance exceeding a movement threshold or past a threshold position). When movement of contact 5052 meets the movement threshold criteria, the device produces tactile output 5068 (e.g., MiniTap (270 Hz), gain: 1.0, as illustrated by indicator 5068-*a* and waveform 5068-*b*) and archive content affordance 5060 suddenly expands in the direction of the movement of the contact 5052 (e.g., moves faster than the movement of the contact and/or moves faster than the previous movement of archive content affordance 5060) to cover content menu affordance 5056 and flag content affordance 5058.

In FIG. 5V, in response to lift-off of contact 5052 from touch screen 112, e-mail summary 5006 is released. In FIGS. 5V-5W, in response to lift-off of contact 5052 when movement of contact 5052 has met movement threshold criteria described above with regard to FIG. 5U, second e-mail summary 5006 is archived (e.g., as indicated by the animation in FIGS. 5U-5W, in which third e-mail summary 5008 and the e-mail summaries below third e-mail summary 5008 gradually rise from the bottom of user interface 5002 while the vertical size of second e-mail summary 5006 gradually decreases until second e-mail summary 5006 is no longer displayed). In FIG. 5W, second e-mail summary 5006 is not displayed in user interface 5002, indicating that the e-mail that corresponds to second e-mail summary 5006 has been archived.

Figure 5X:
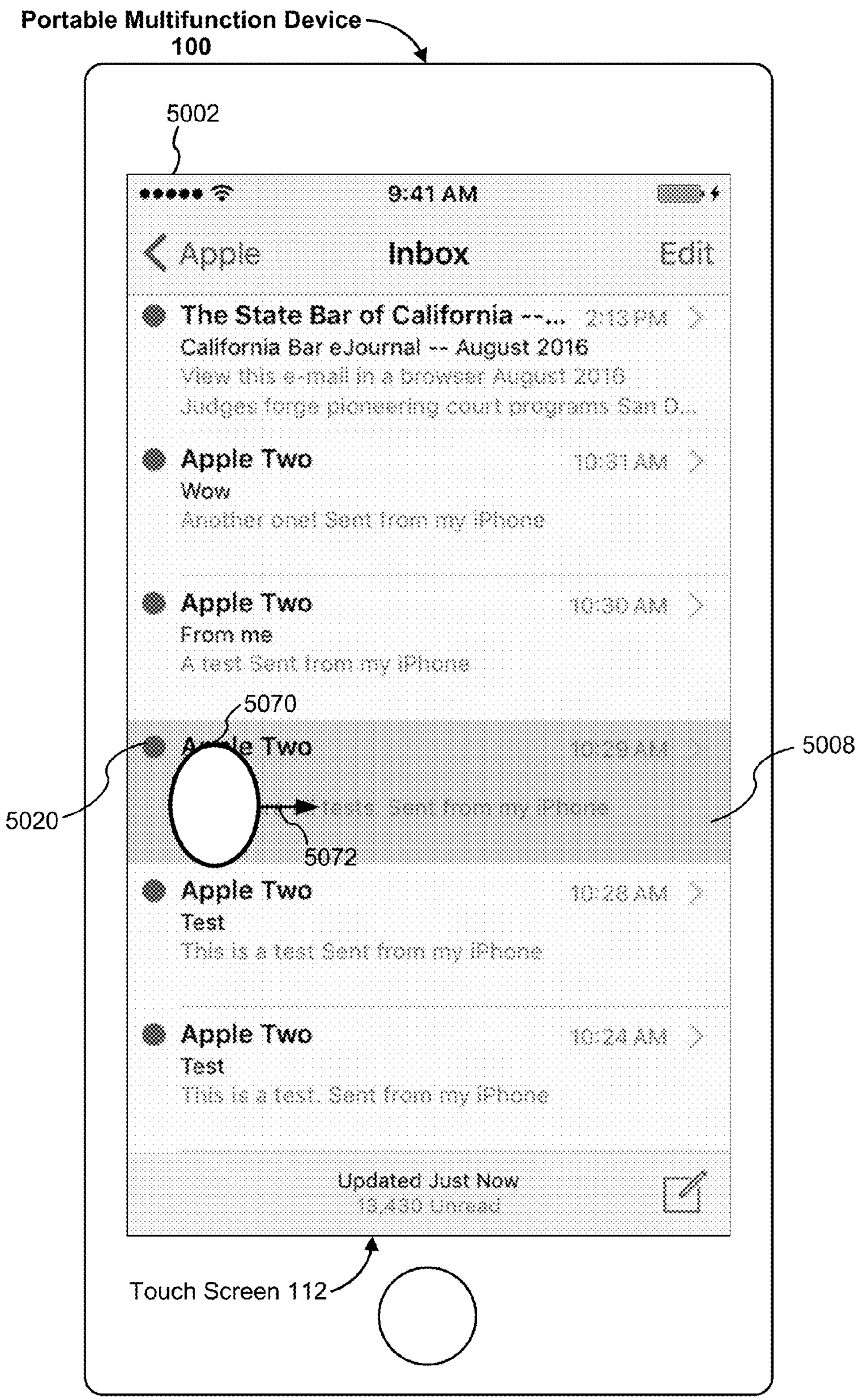

FIGS. 5X-5AF illustrate a process for a process for providing tactile outputs in conjunction with providing visual feedback when meeting an operation triggering threshold for an operation (e.g., changing read/unread status of an e-mail item) and subsequently meeting an operation canceling threshold such that the operation is not performed. During the process, a contact moves in a first direction to pass a threshold position for changing the read status of an e-mail and subsequently moves in a second direction to pass a threshold position for cancelling the operation for changing the read status of the e-mail before lift-off.

In FIG. 5X, the device detects an input on e-mail summary item 5008, such as touch-down of contact 5070 on touch screen 112. In response to detecting the touch-down of contact 5070 on touch screen 112 on e-mail summary item 5008, e-mail summary item 5008 is visually distinguished (e.g., highlighted, as shown) to indicate that e-mail summary item 5008 is selected and/or to distinguish selected e-mail summary item 5008 from non-selected first-email 5004. Contact 5070 moves along e-mail summary item 5008 as indicated by arrow 5072.

Figure 5Y:
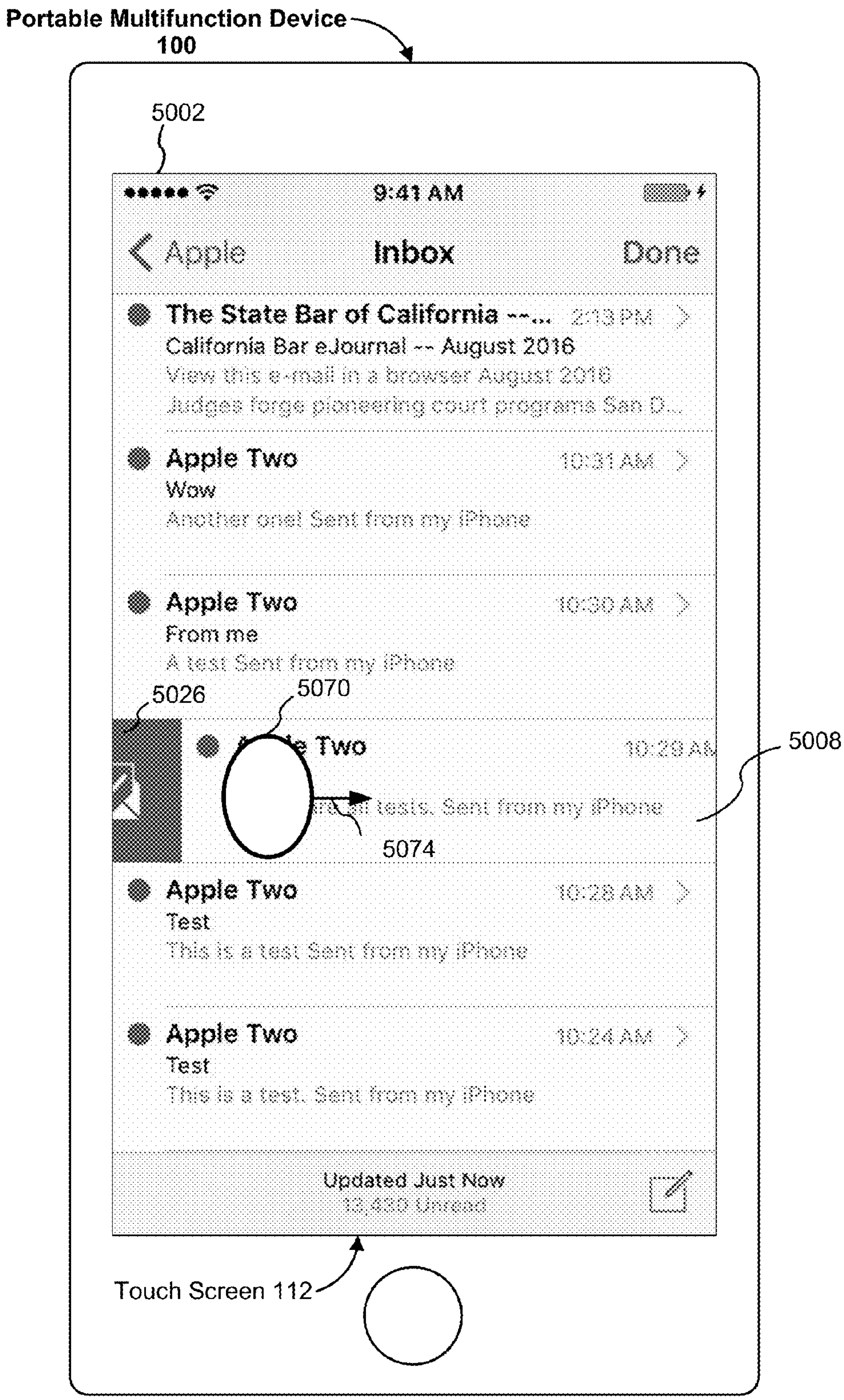

In FIG. 5Y, contact 5070 has moved along the path indicated by arrow 5072. As contact 5070 moves along the path indicated by arrow 5072, e-mail summary item 5008 moves in response to the movement of the contact 5070, e.g., along the path indicated by arrow 5072, gradually revealing (e.g., from the left edge of user interface 502) content-marking indicator 5026. Contact 5070 continues to move along e-mail summary item 5008 as indicated by arrow 5074.

Figure 5Z:
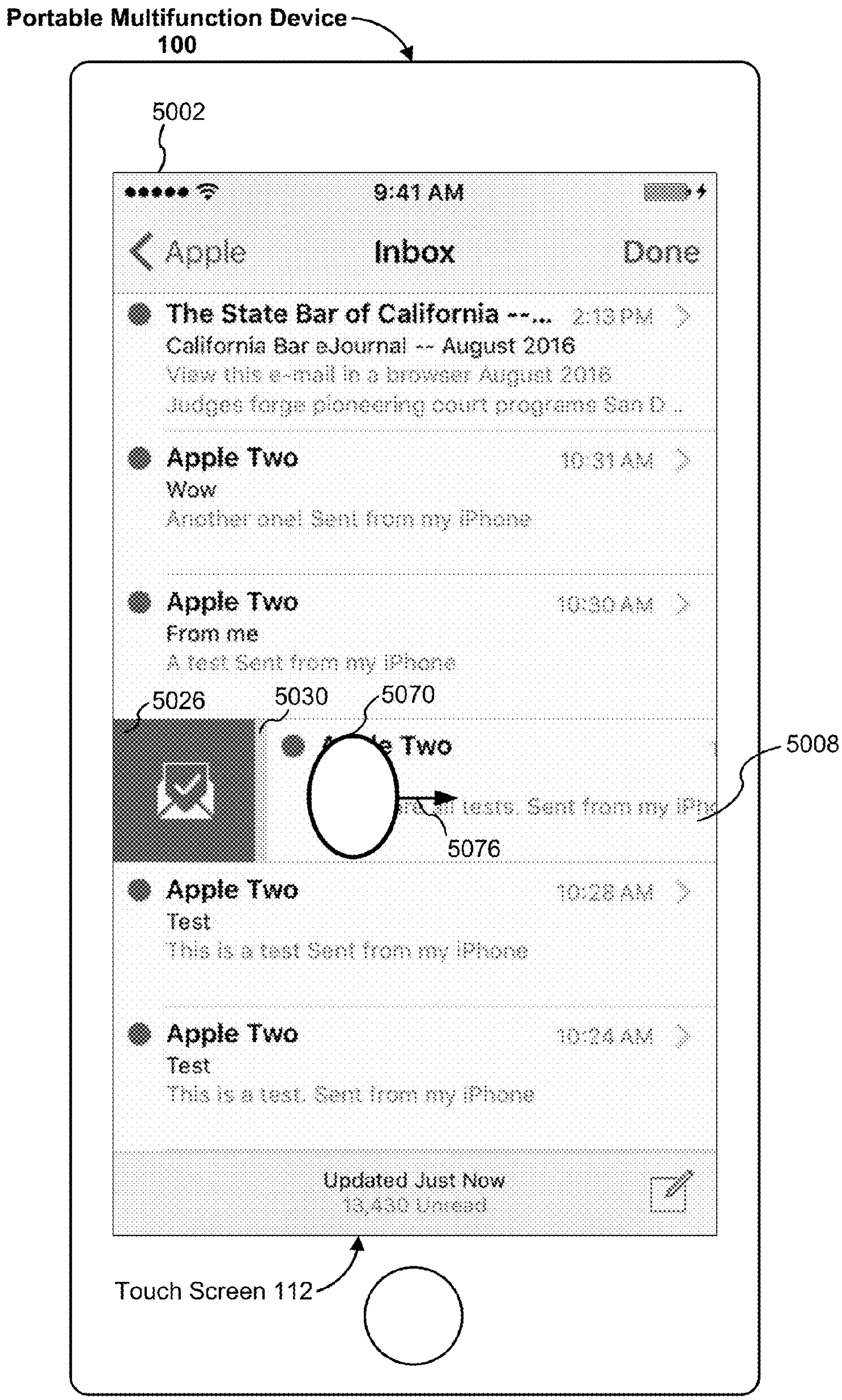
Figure 5A:
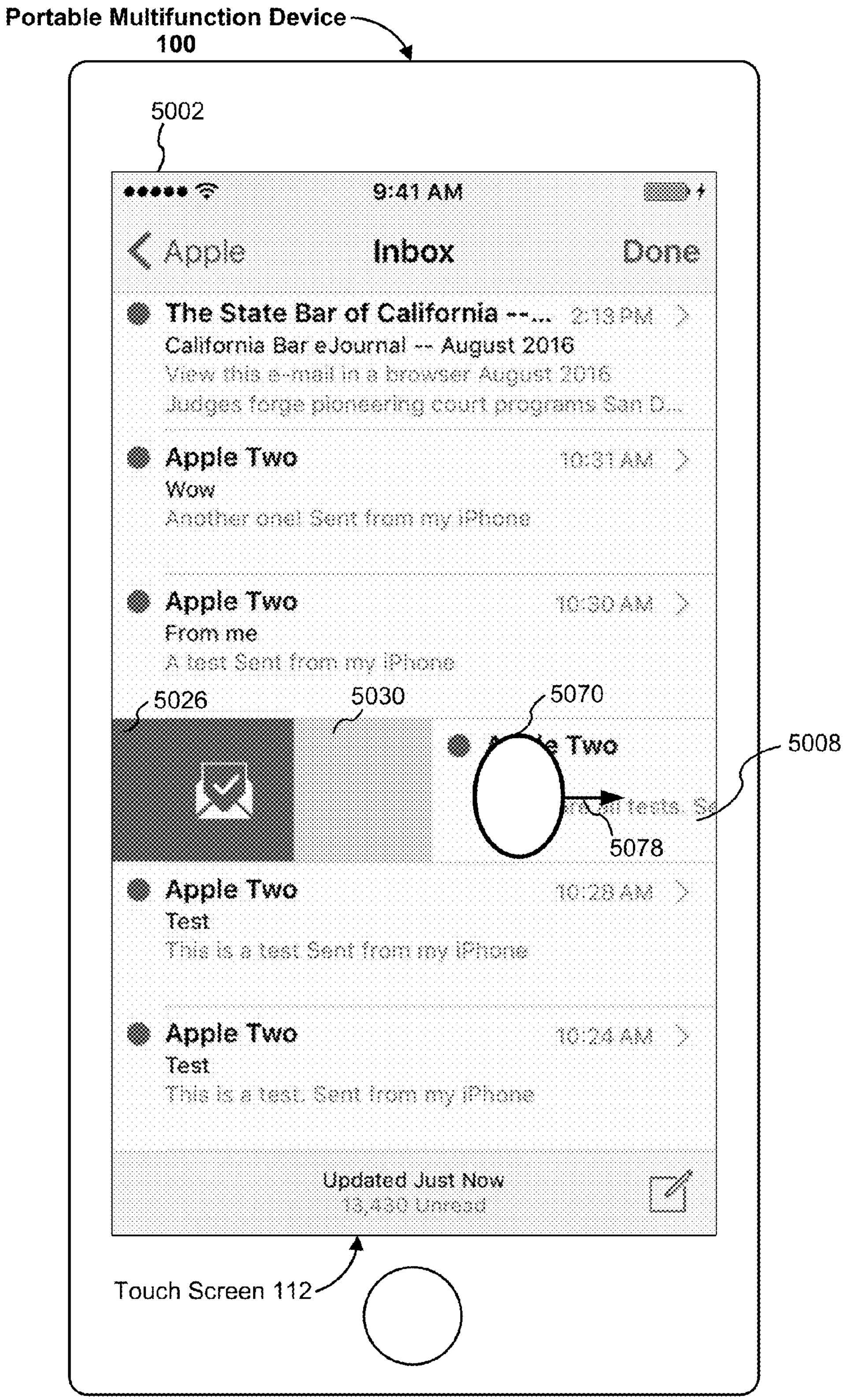
Figure 5A:
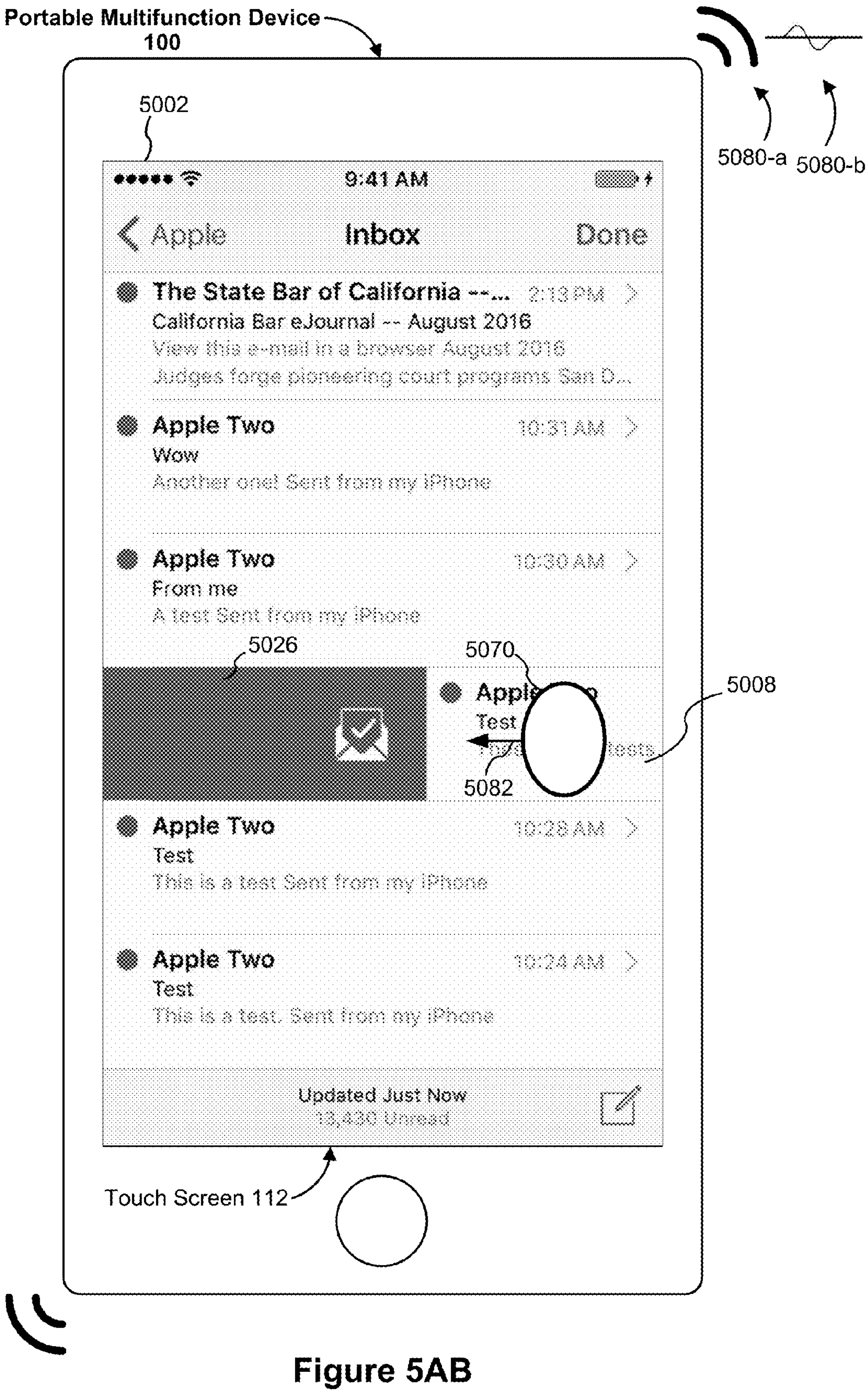
Figure 5A:
Figure 5A:
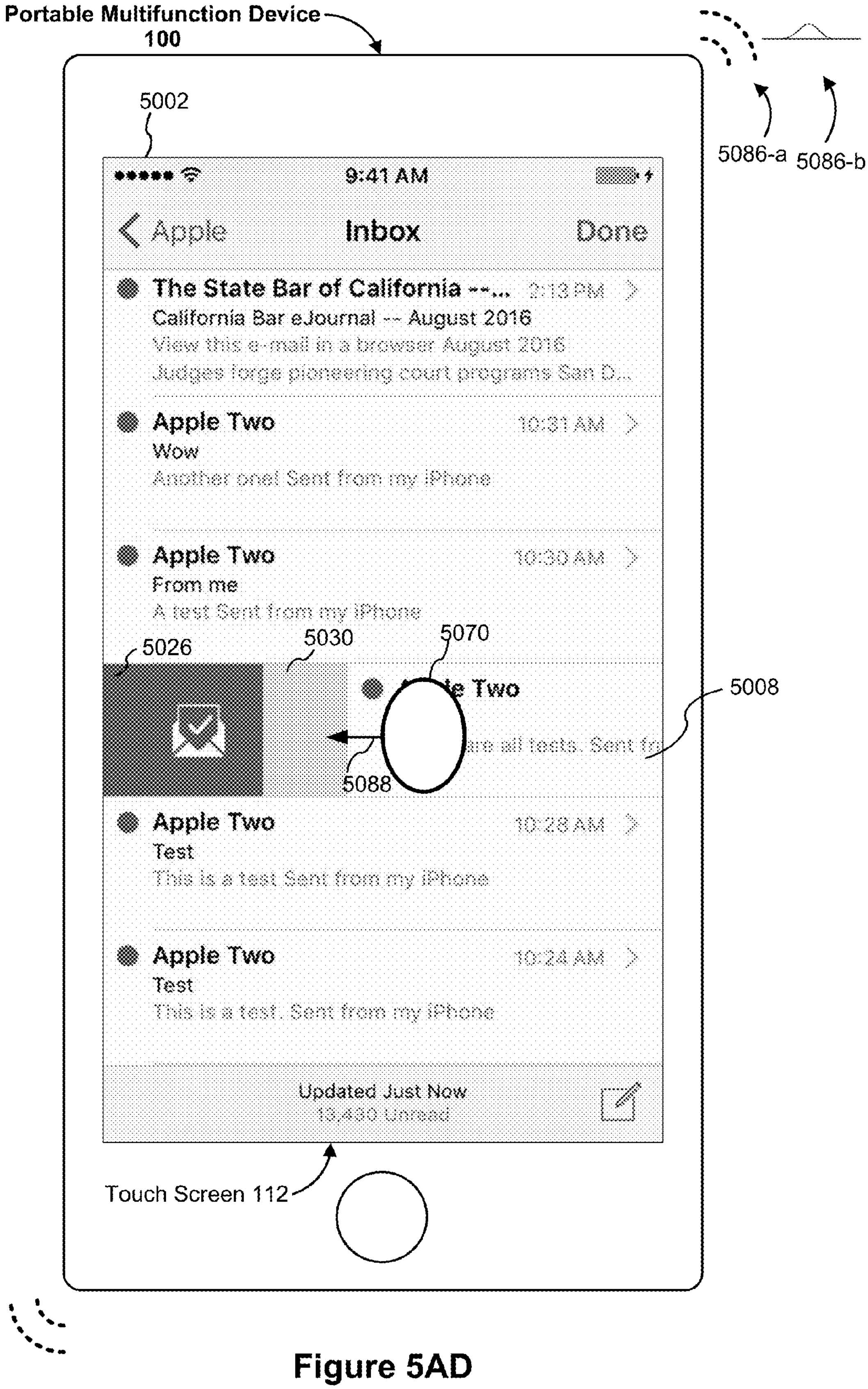
Figure 5A:
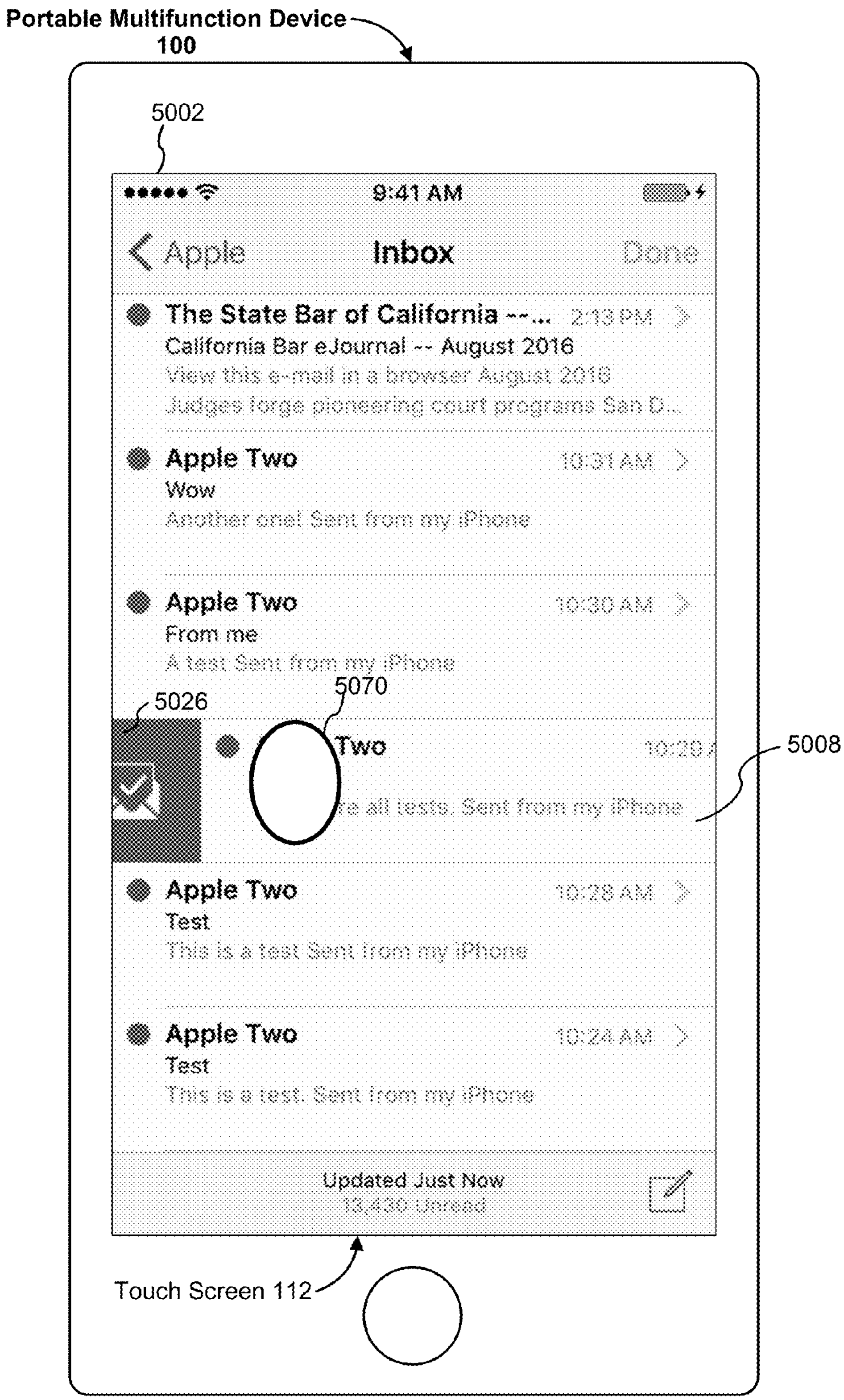
Figure 5A:
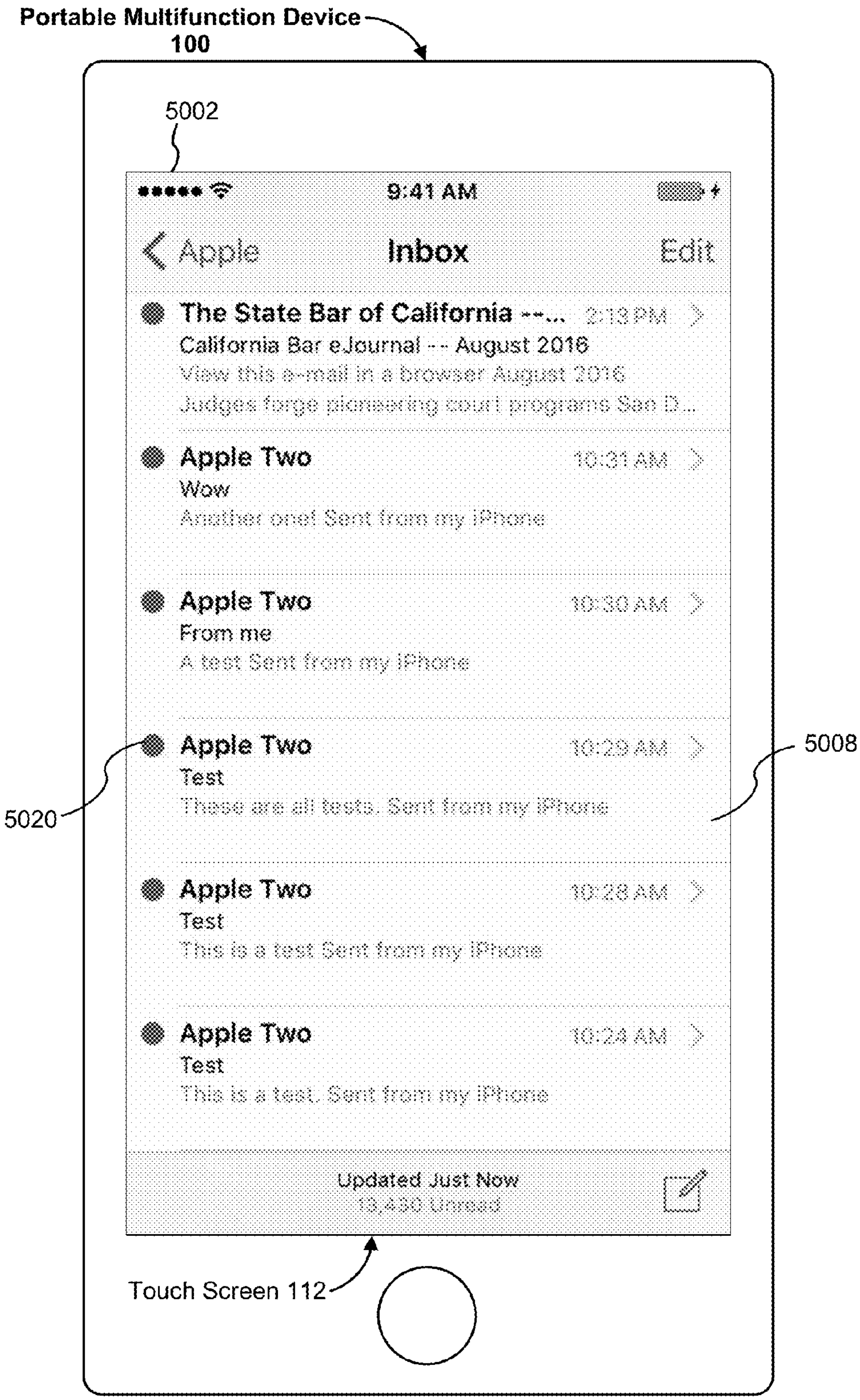
Figure 5A:
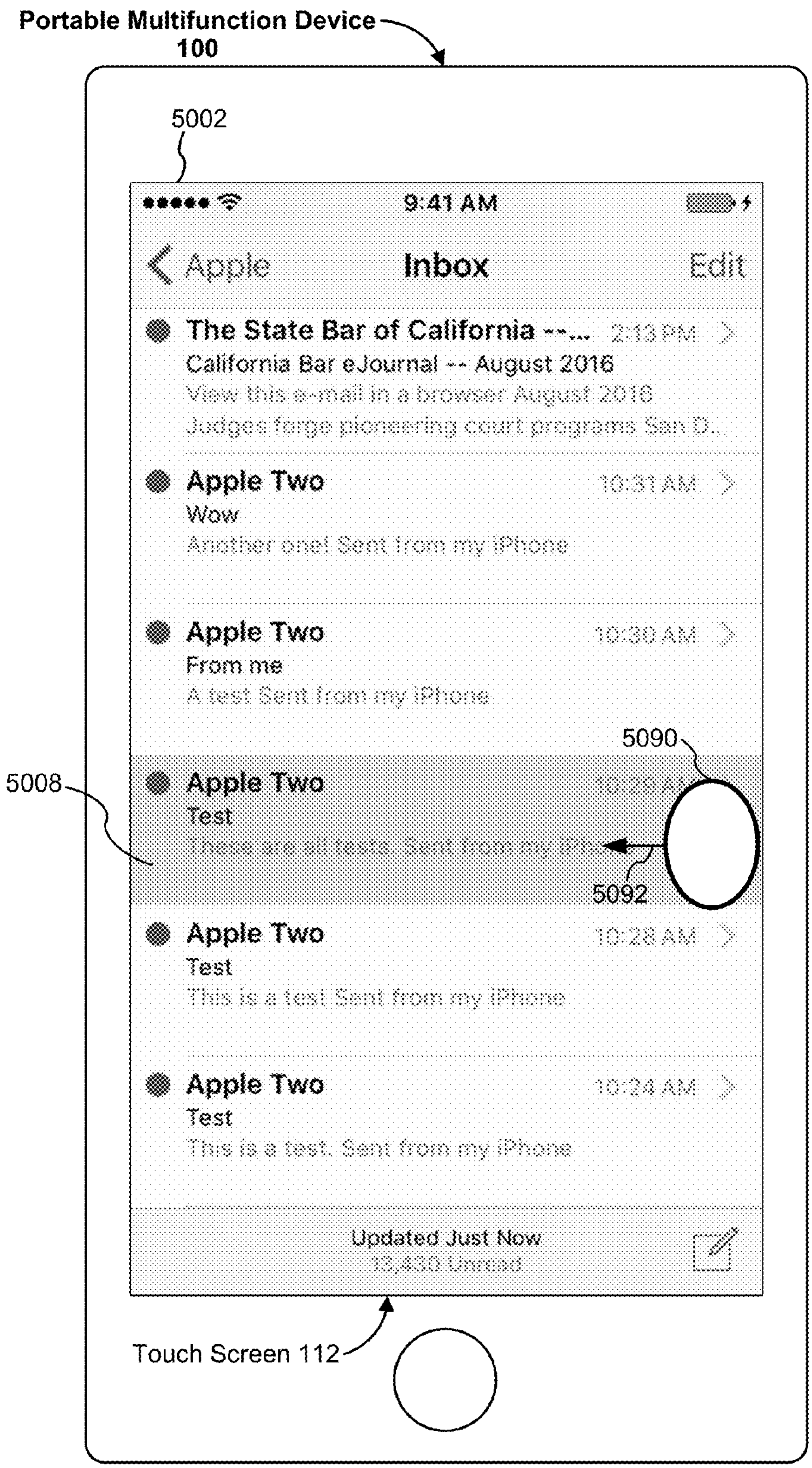
Figure 5A:
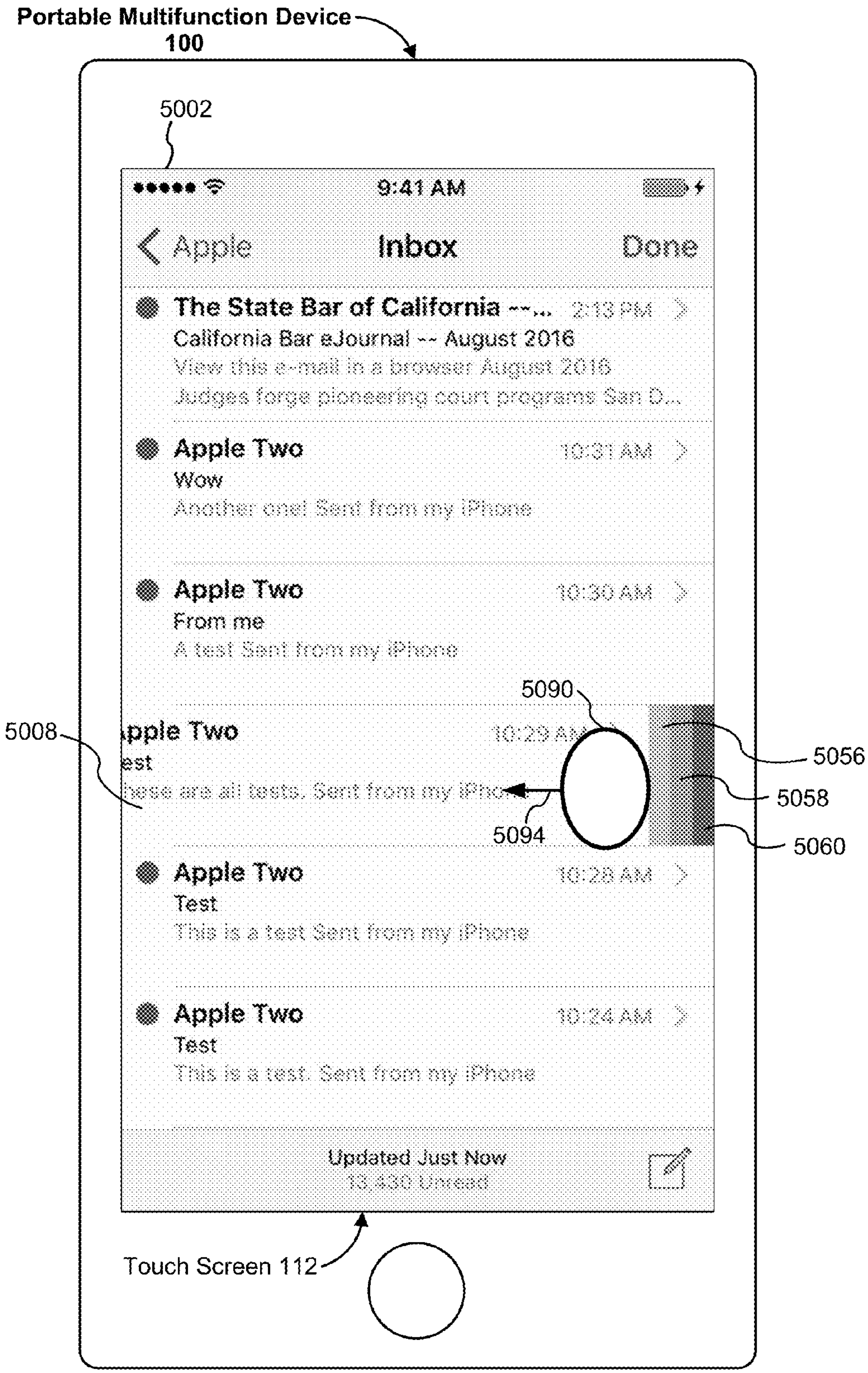
Figure 5A:
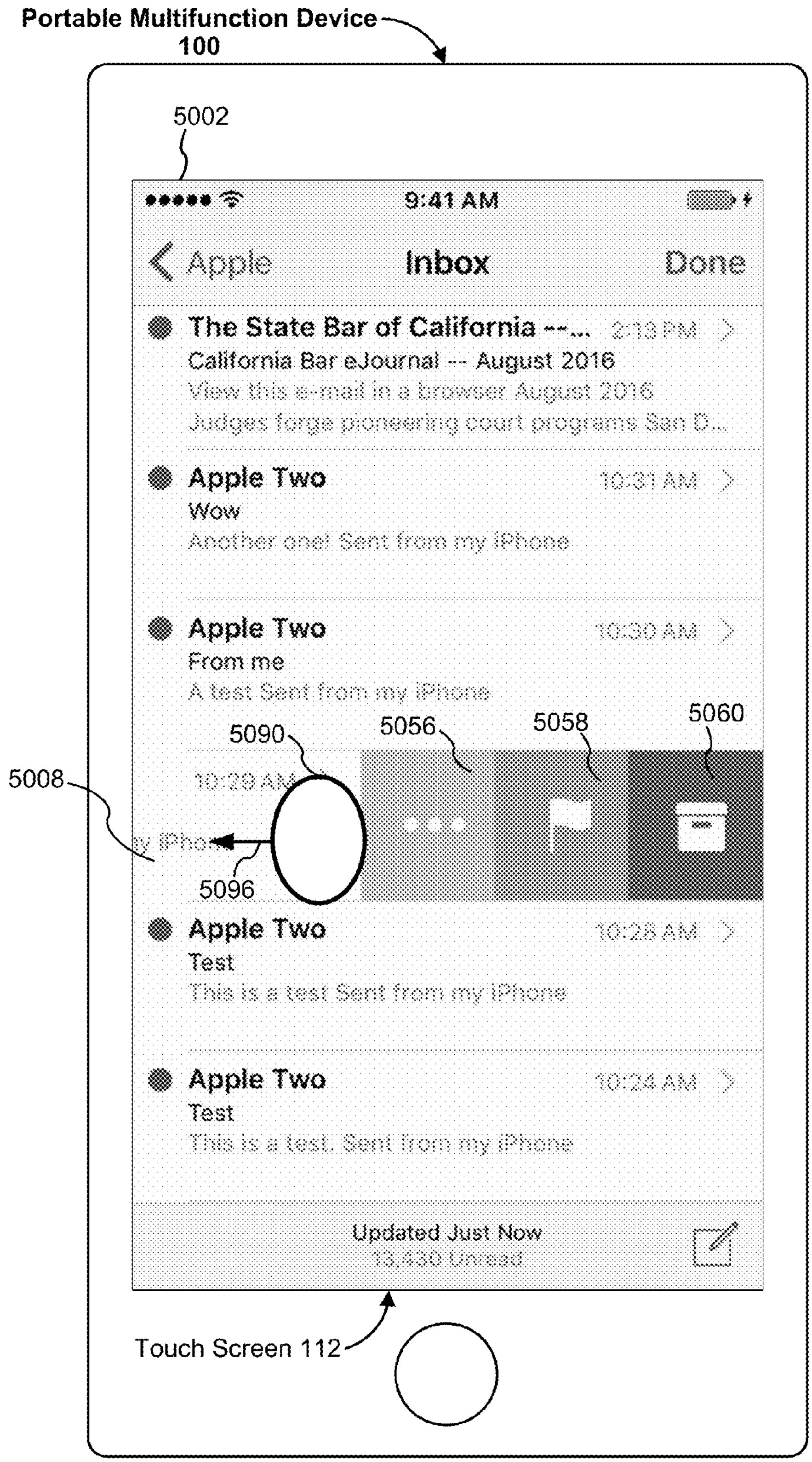
Figure 5A:
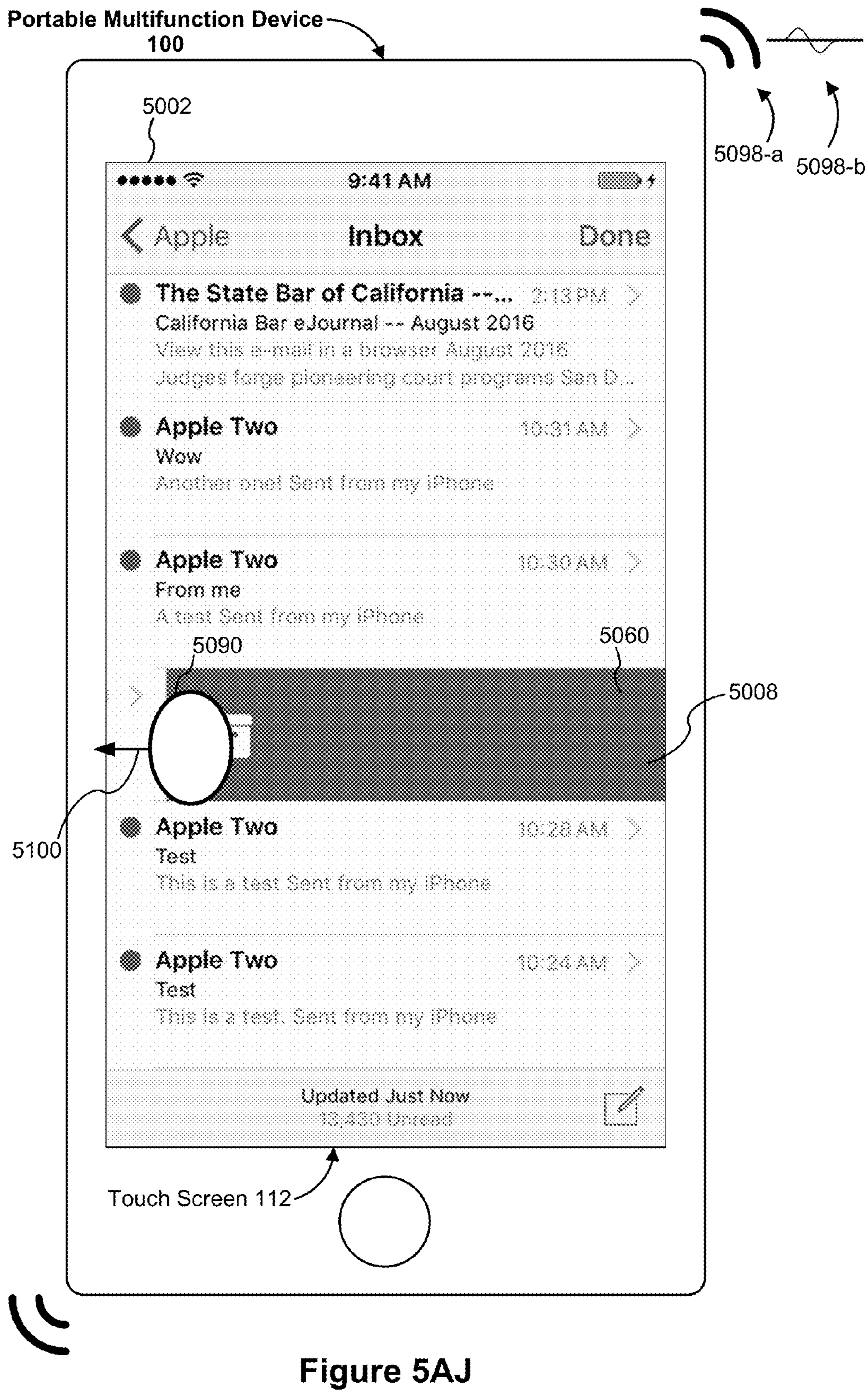
Figure 5A:
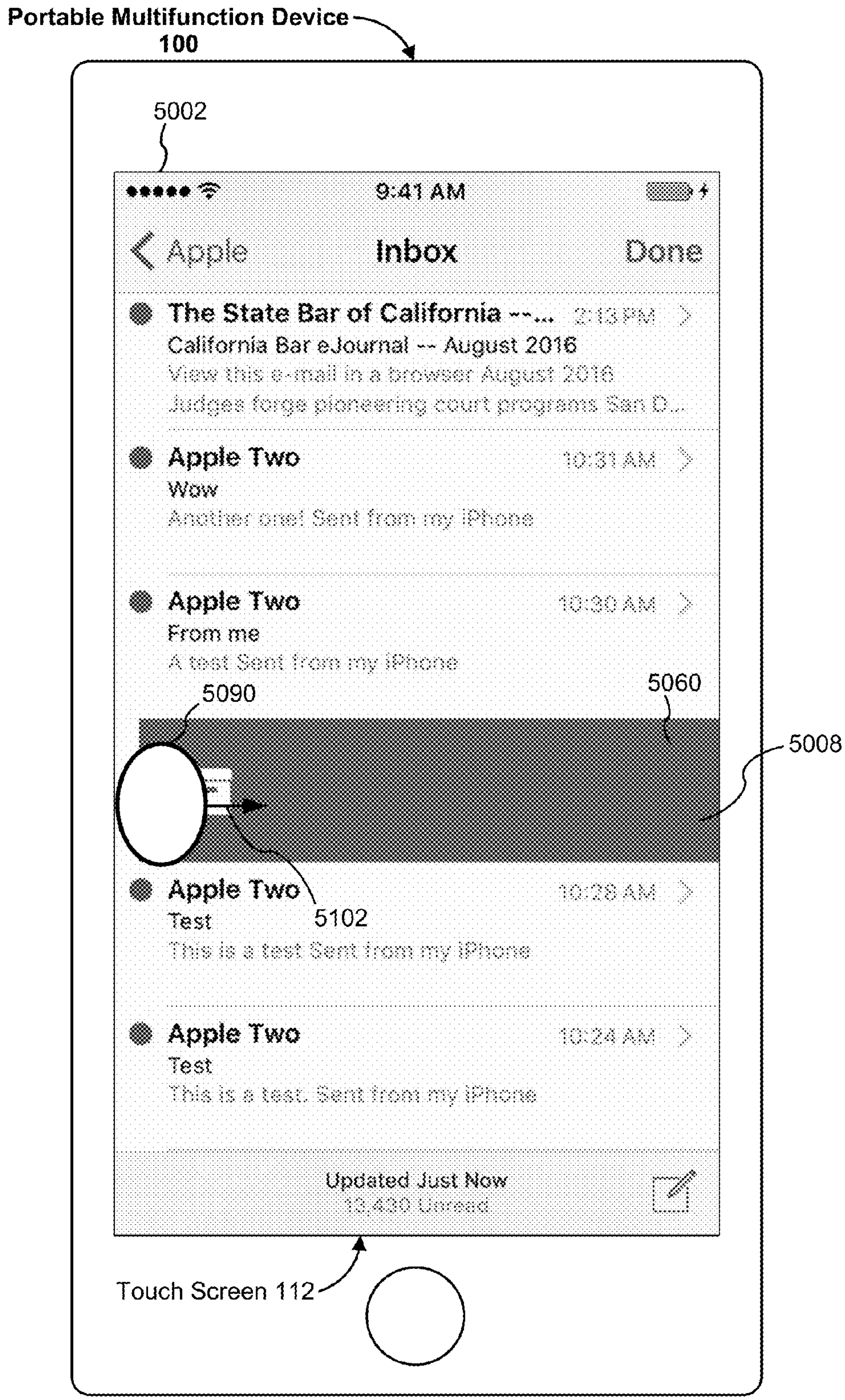
Figure 5A:
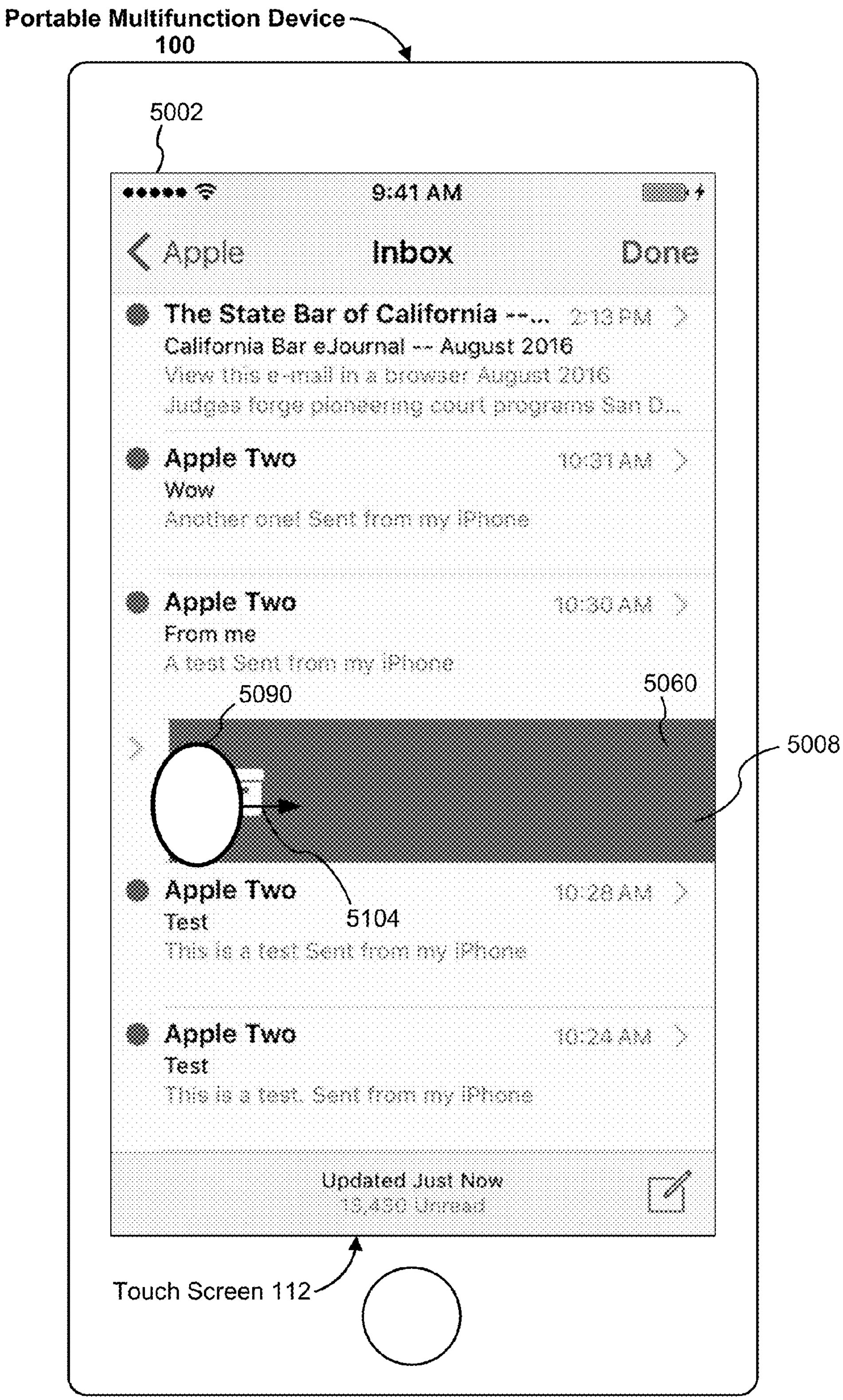
Figure 5A:
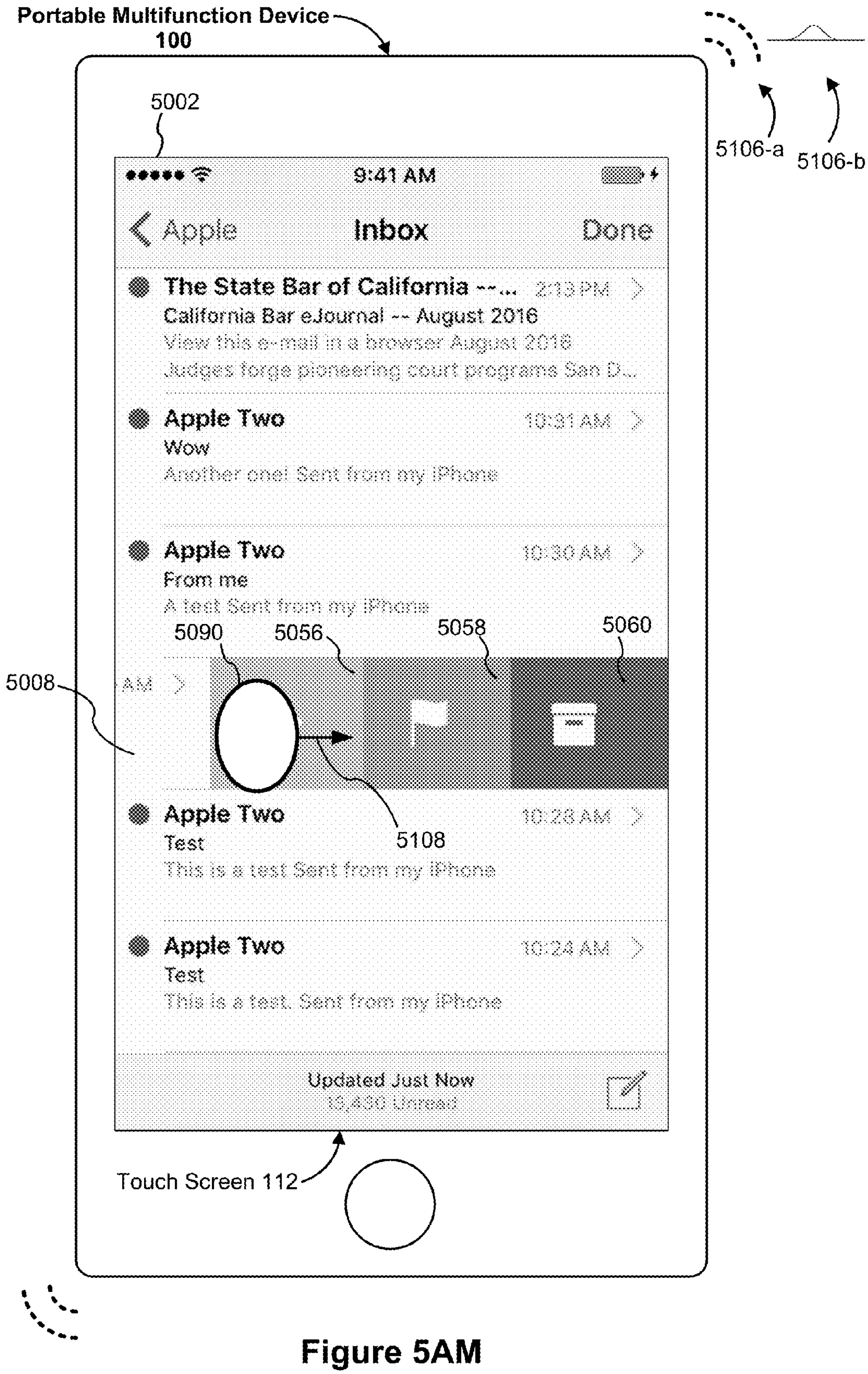
Figure 5A:
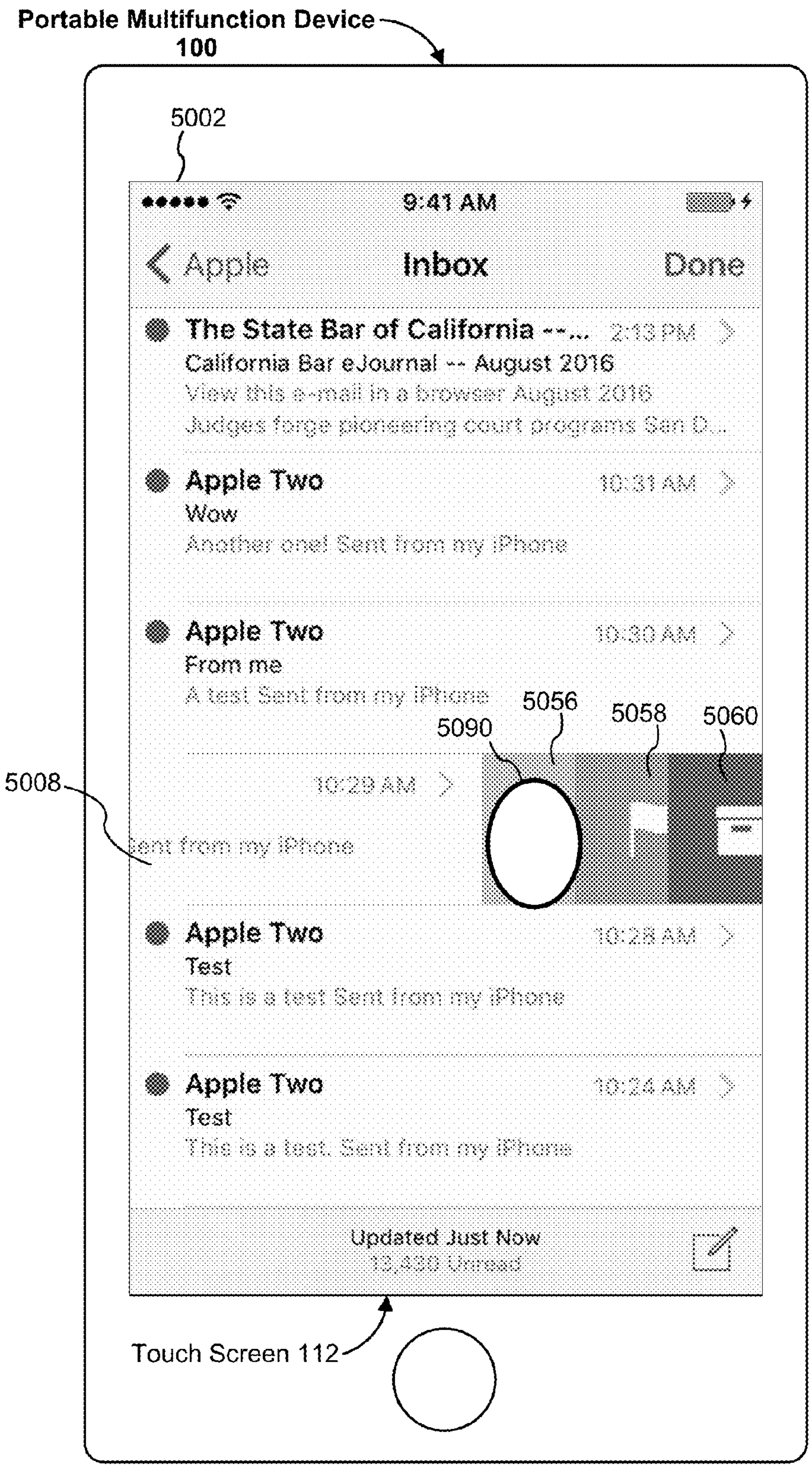
Figure 5A:
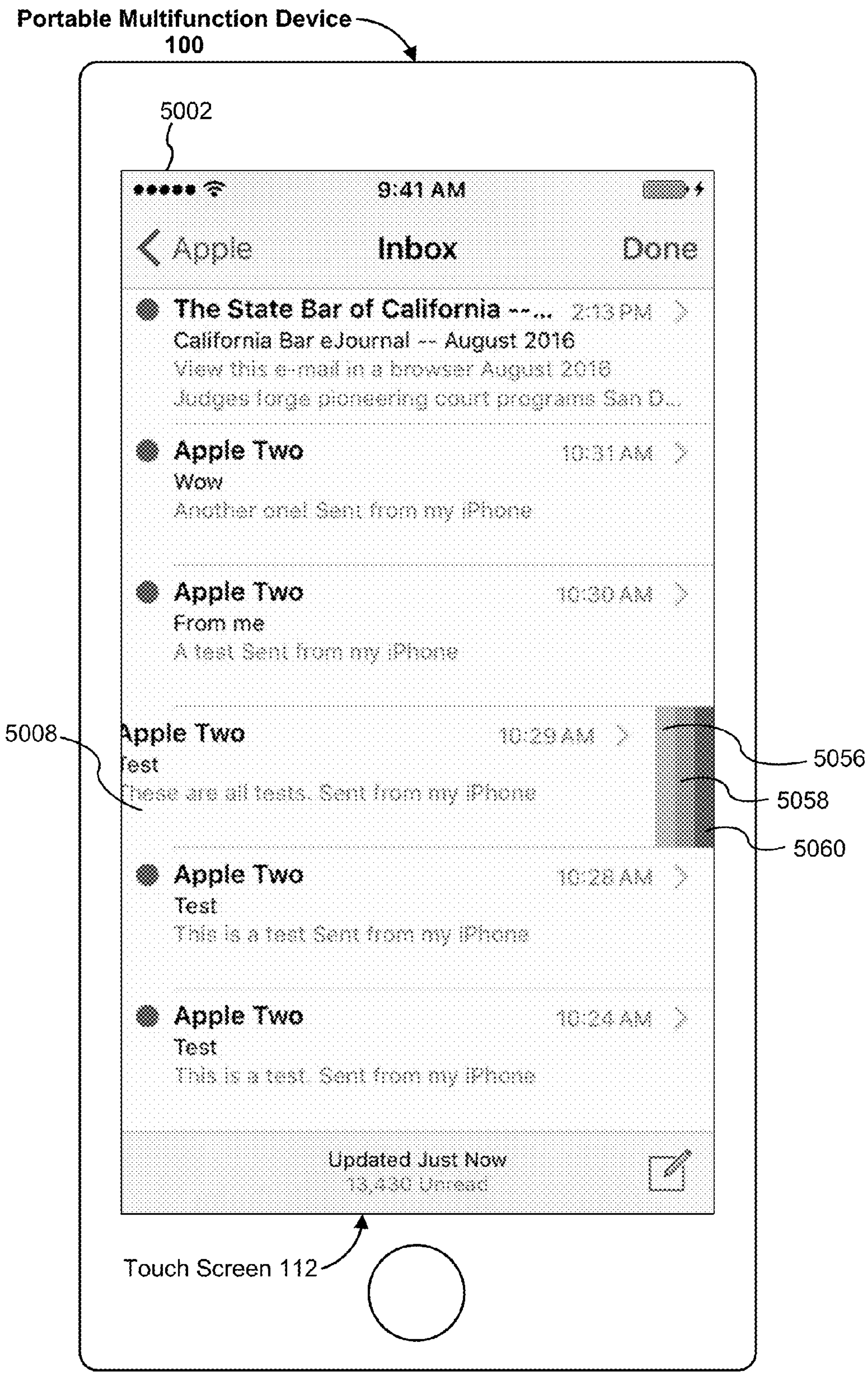
Figure 5A:
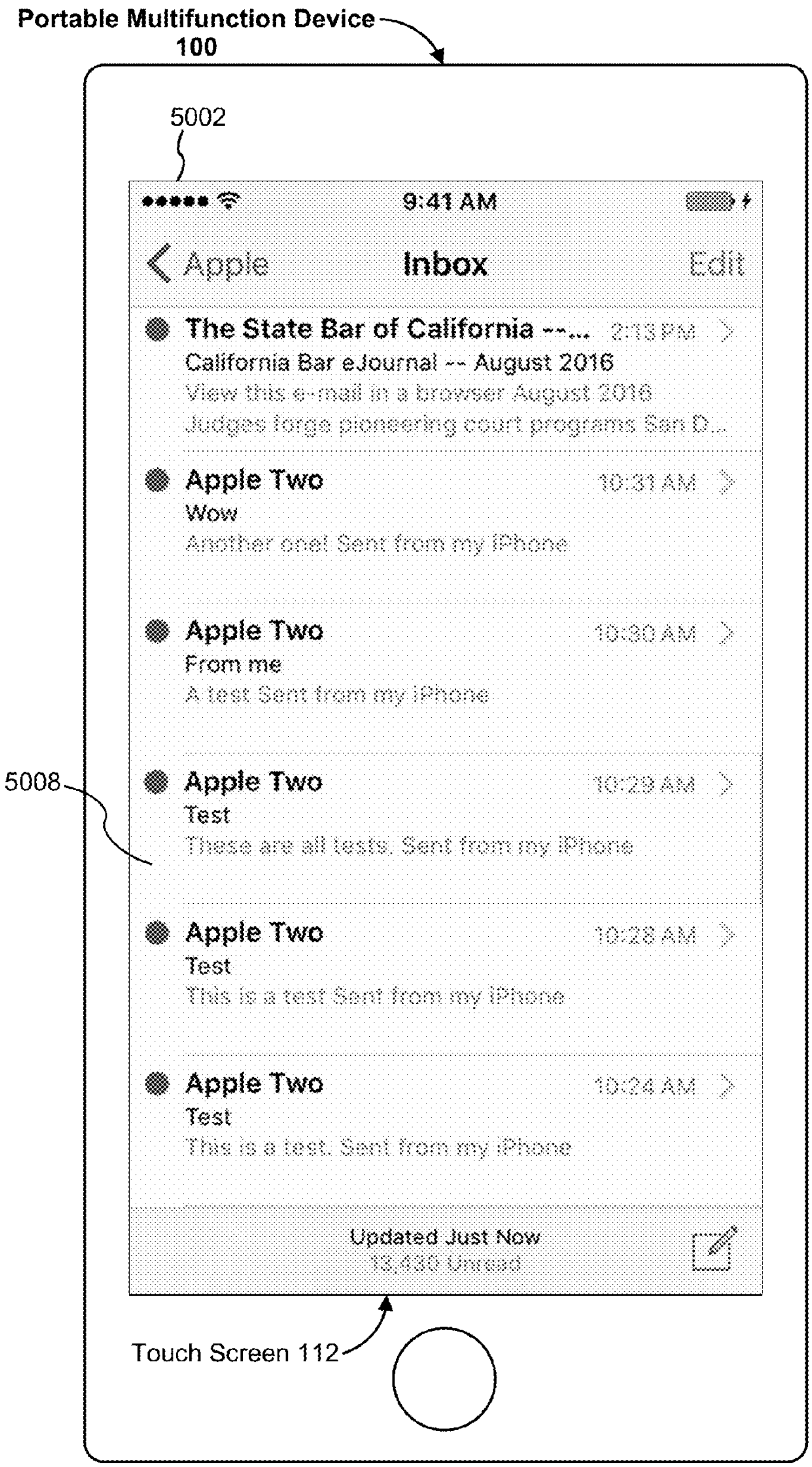
Figure 5A:
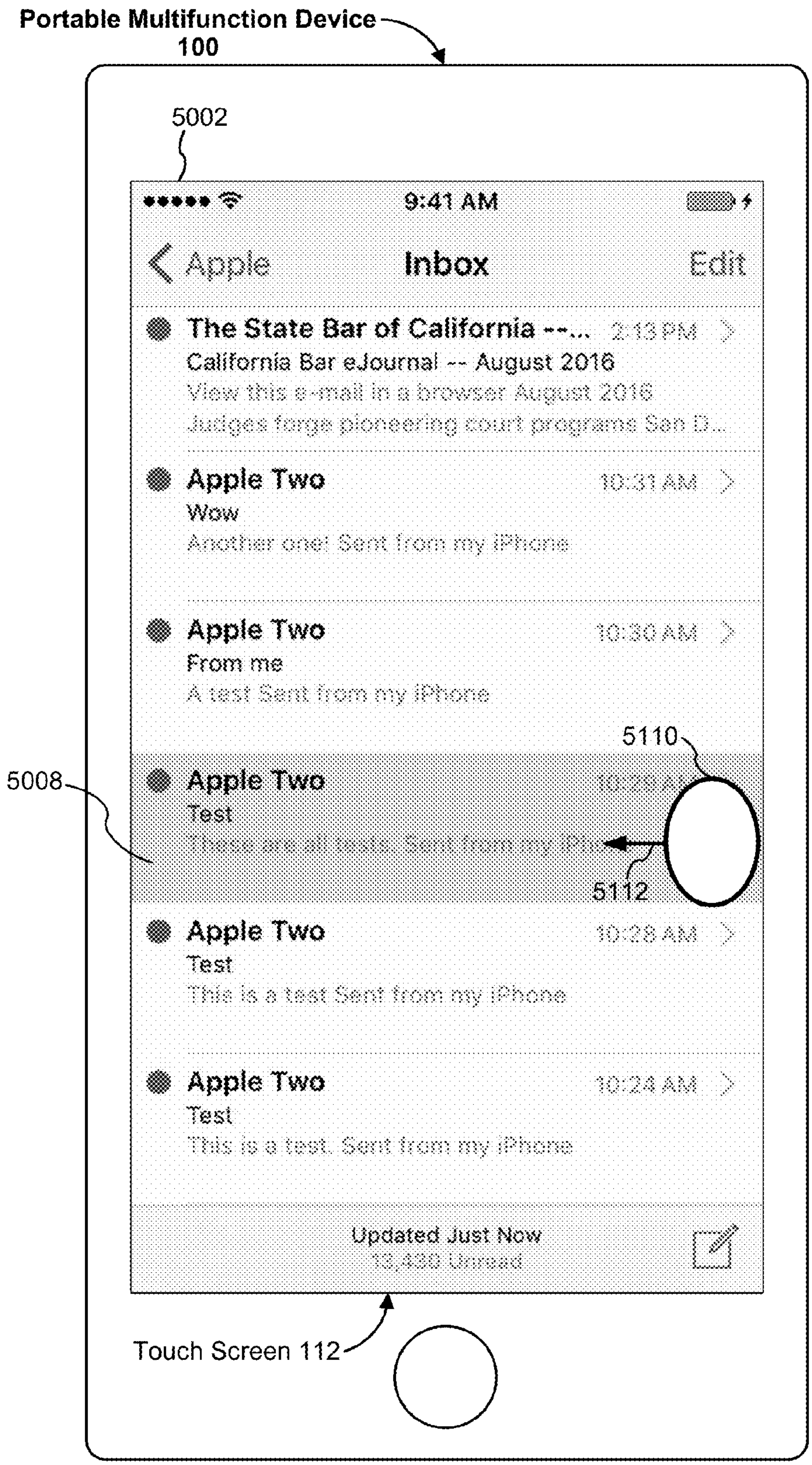
Figure 5A:
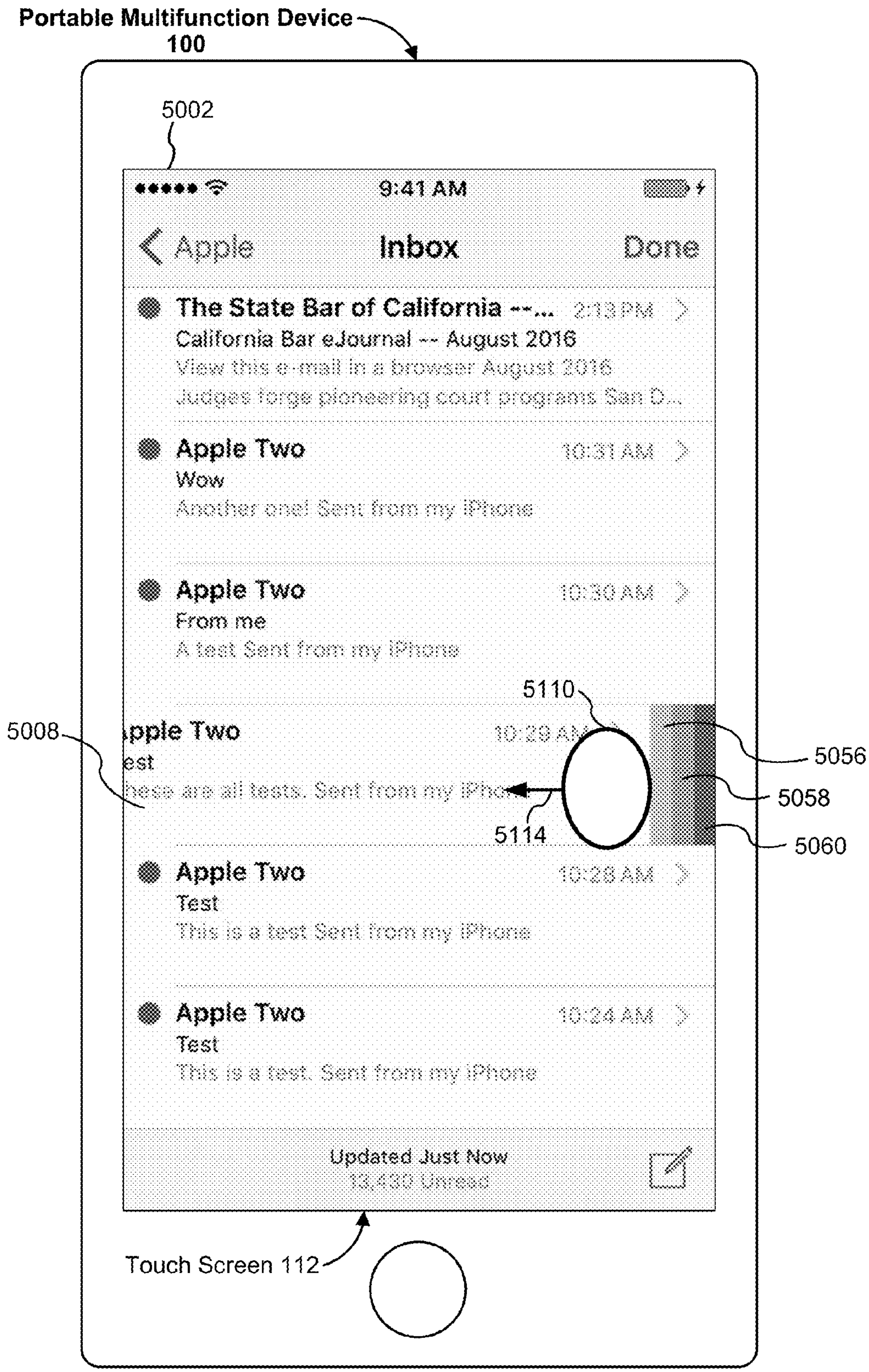
Figure 5A:
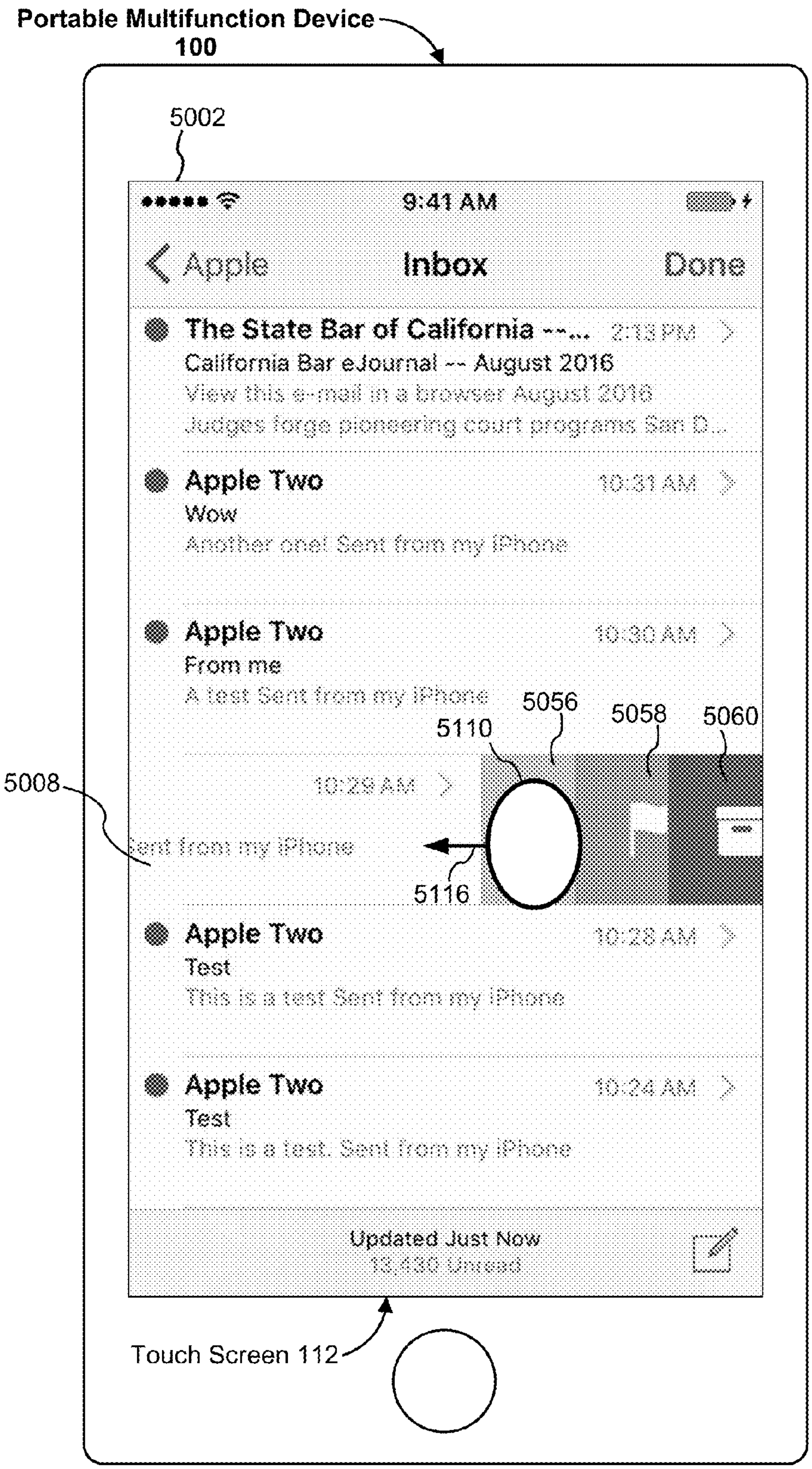
Figure 5A:
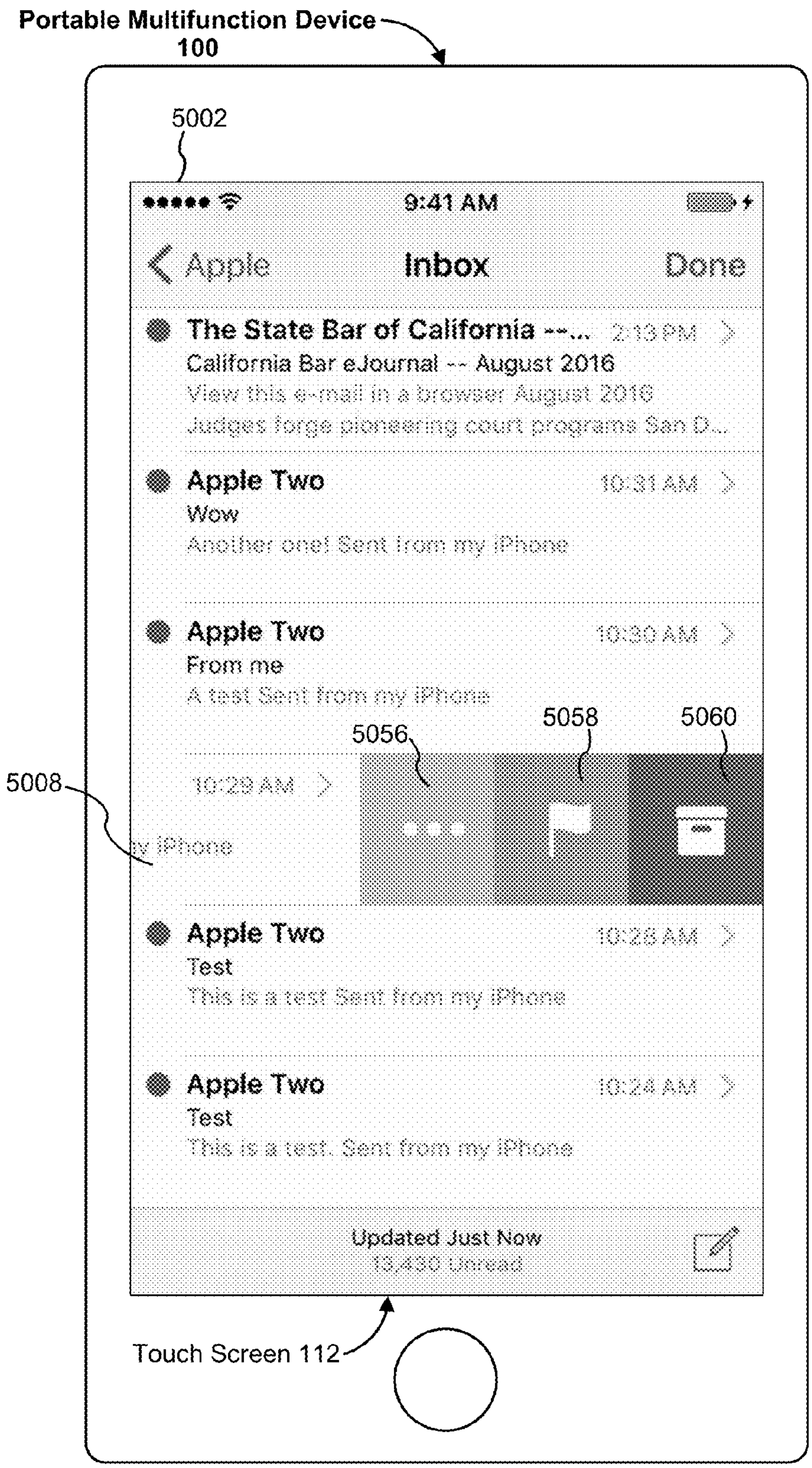
Figure 5A:
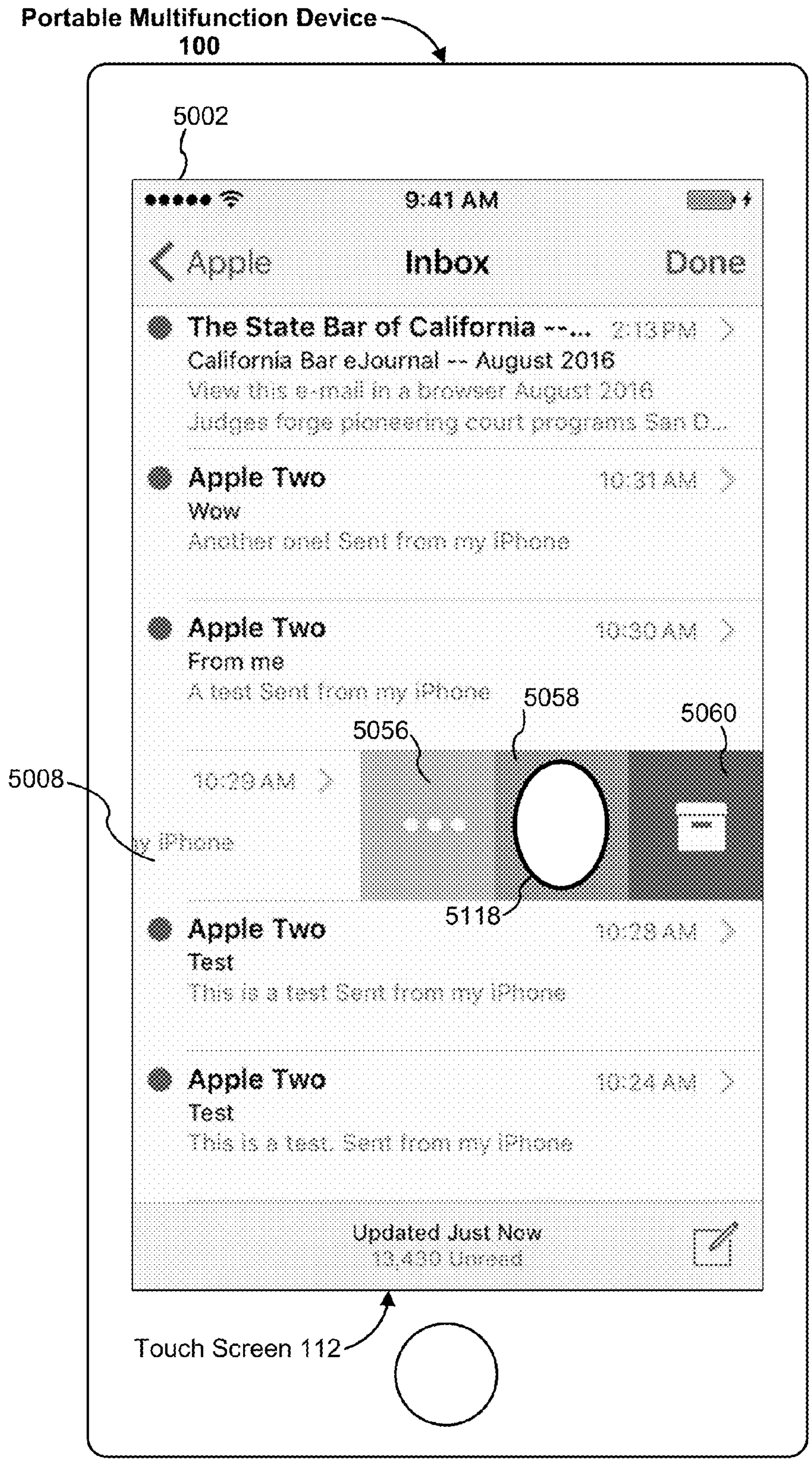
Figure 5A:
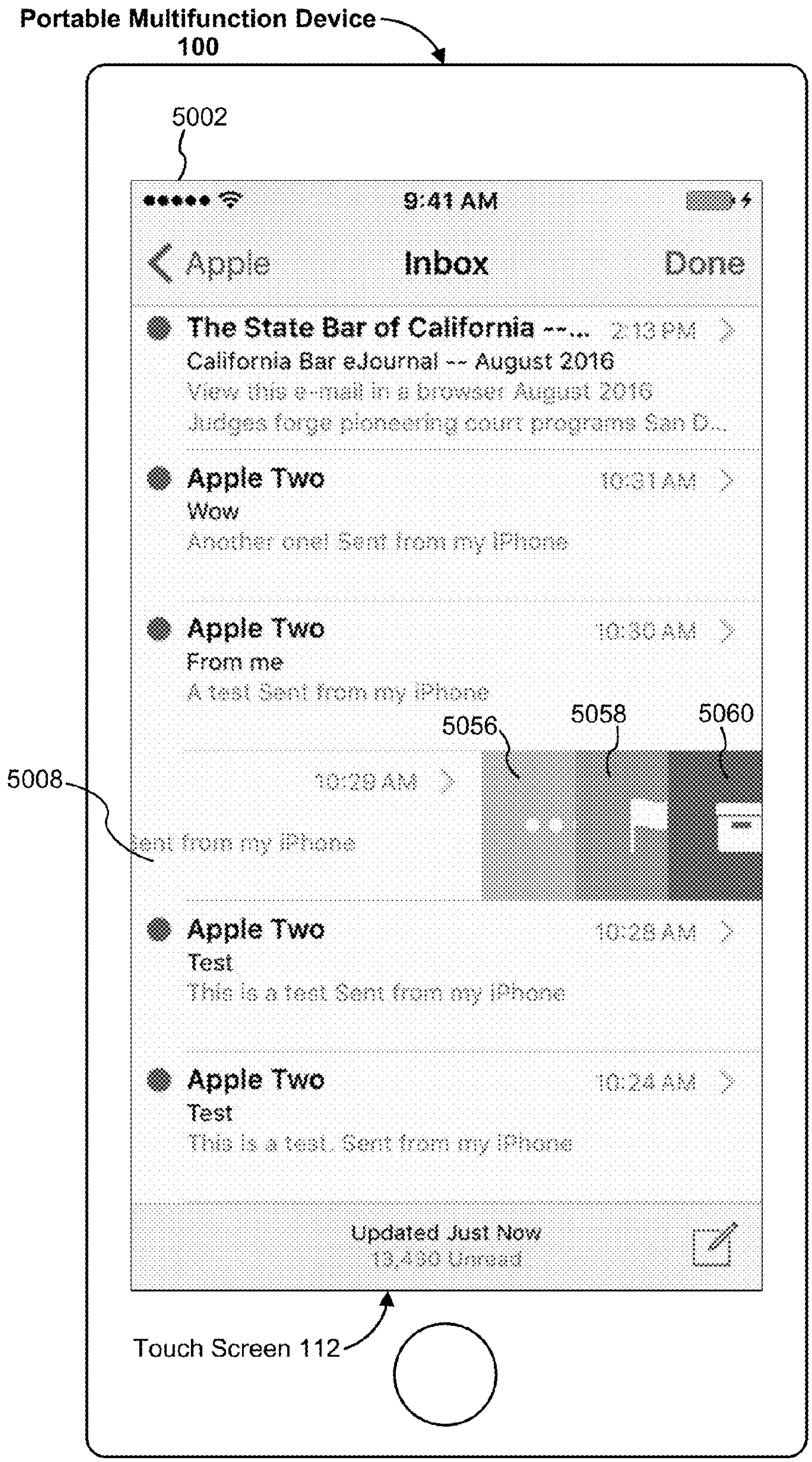
Figure 5A:
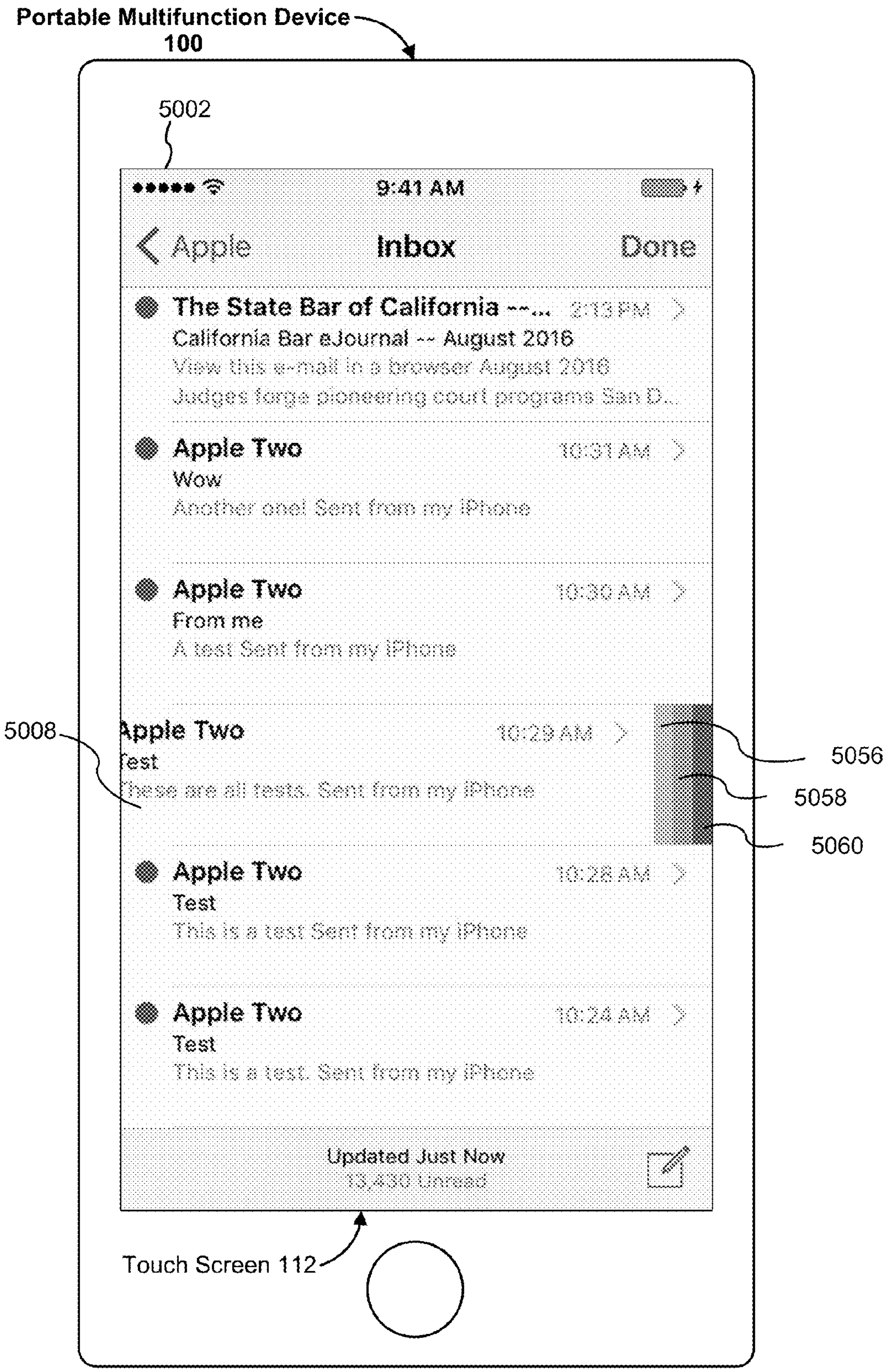
Figure 5A:
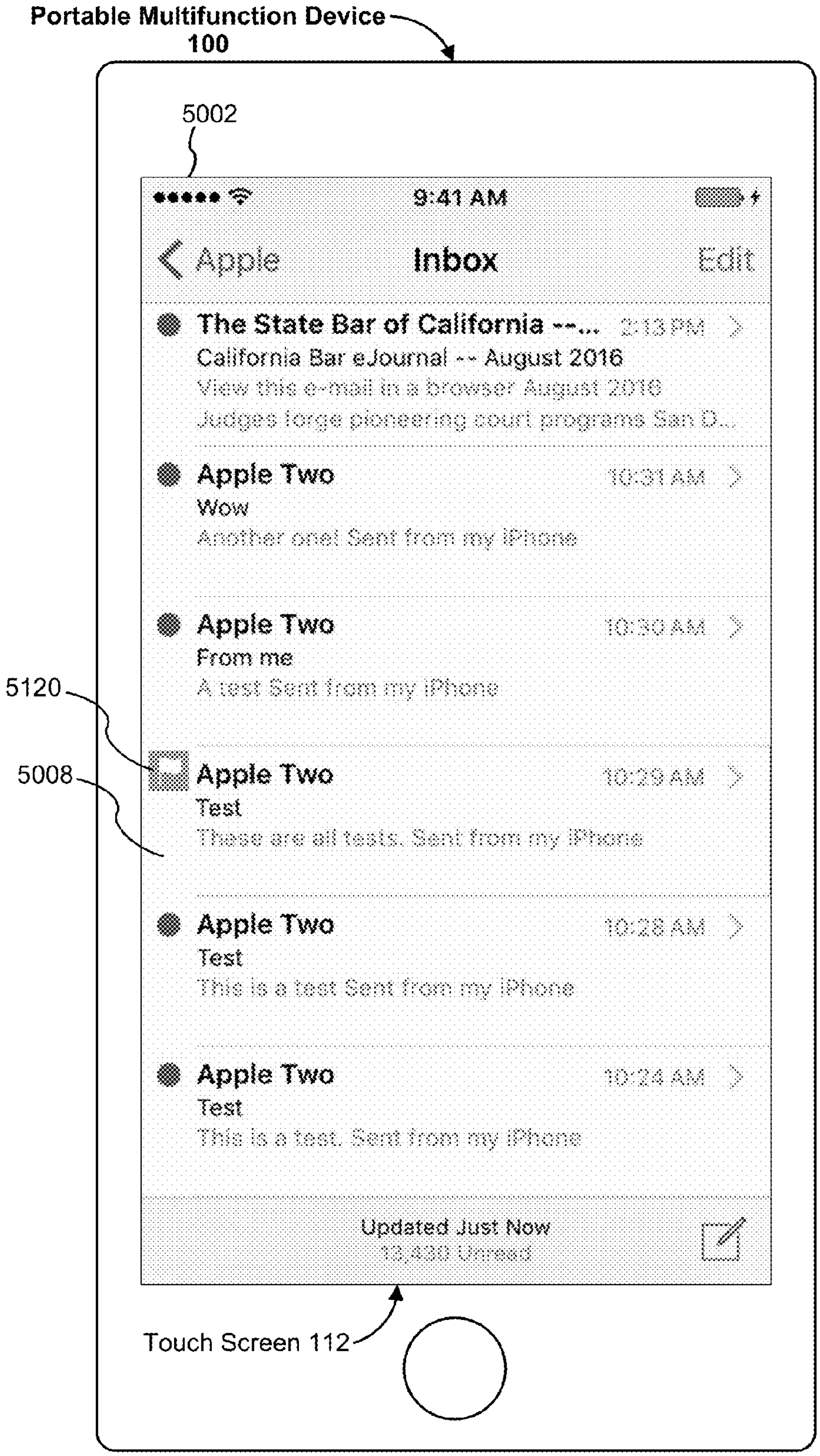
Figure 5A:
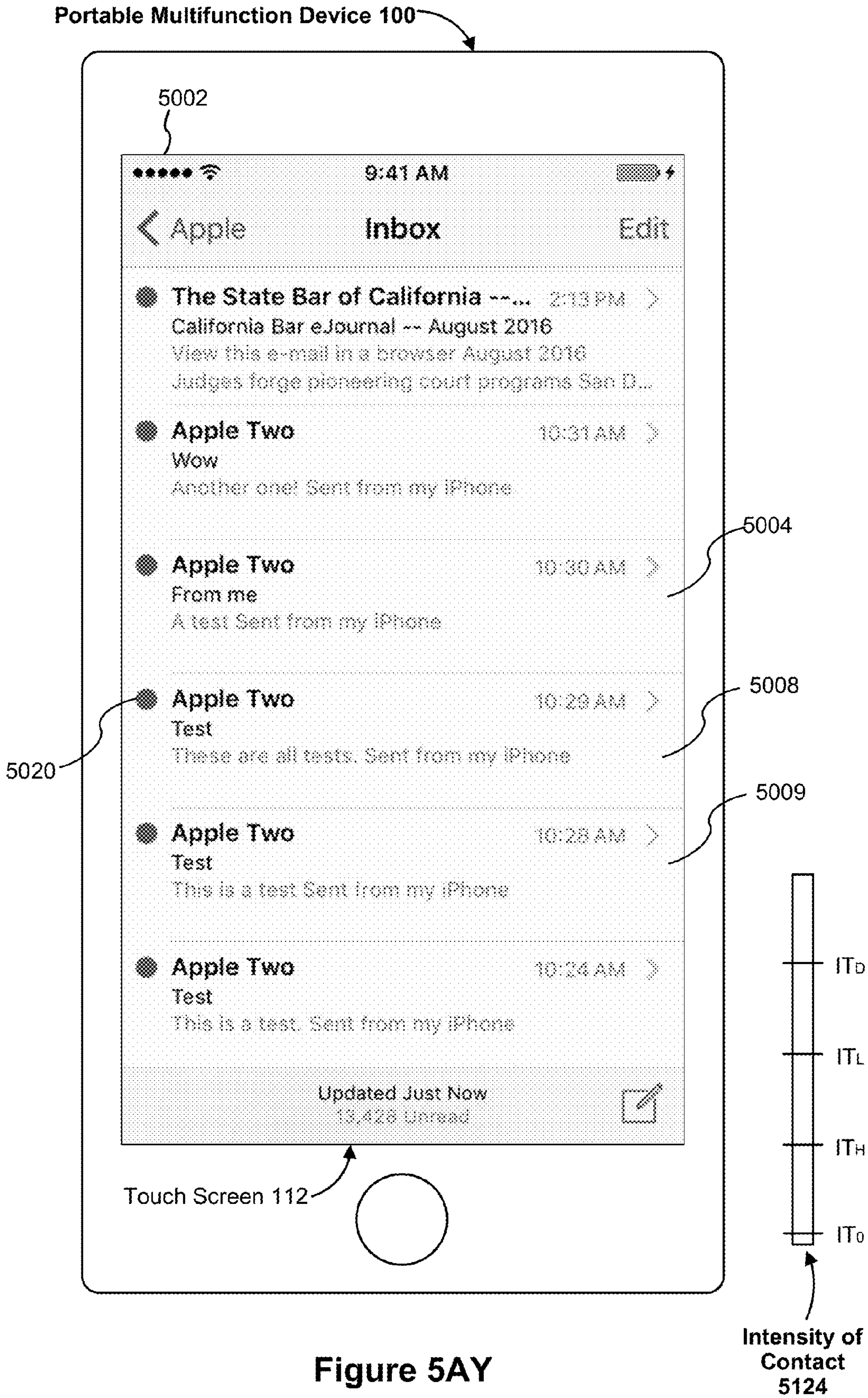
Figure 5A:
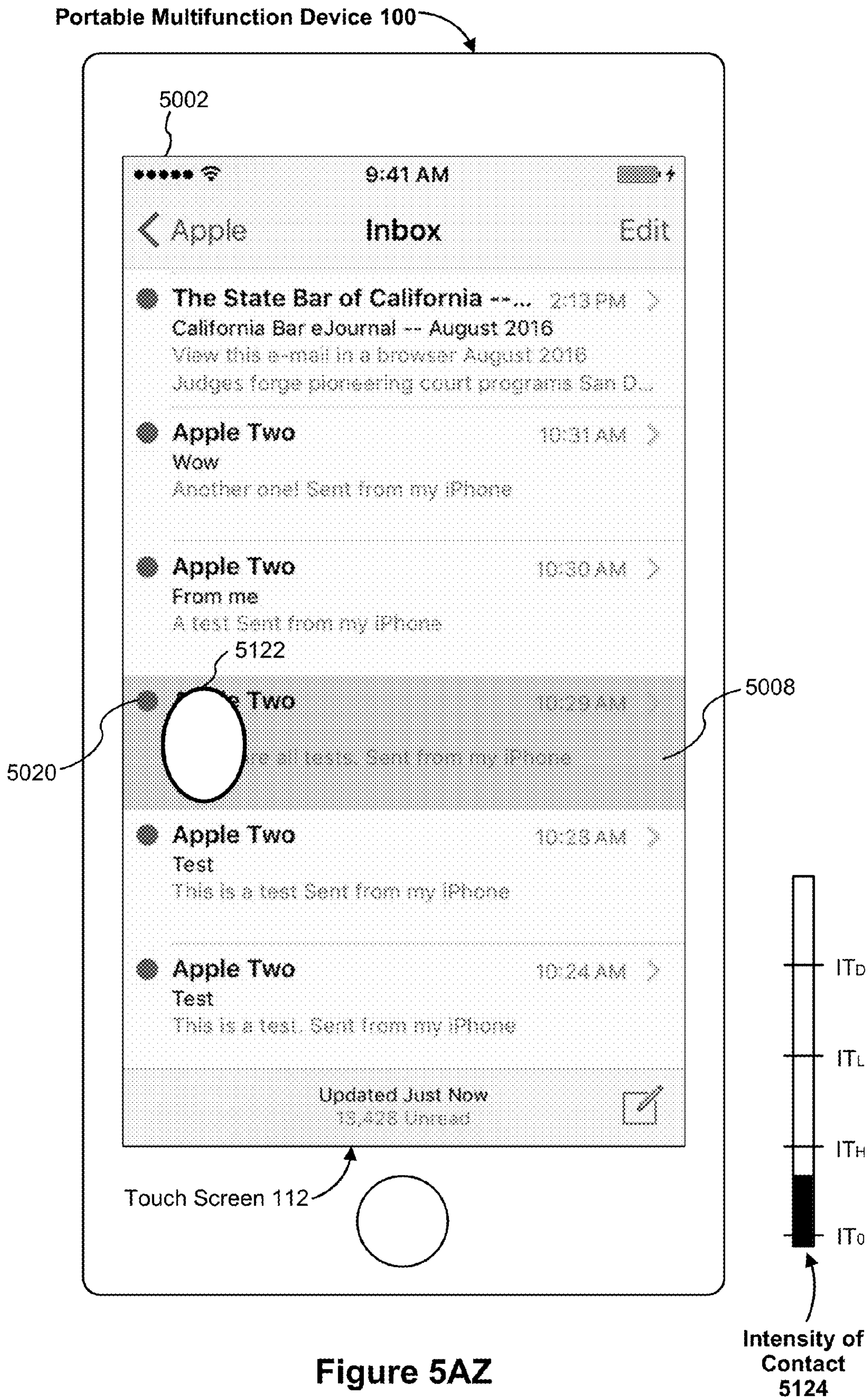
Figure 5B:
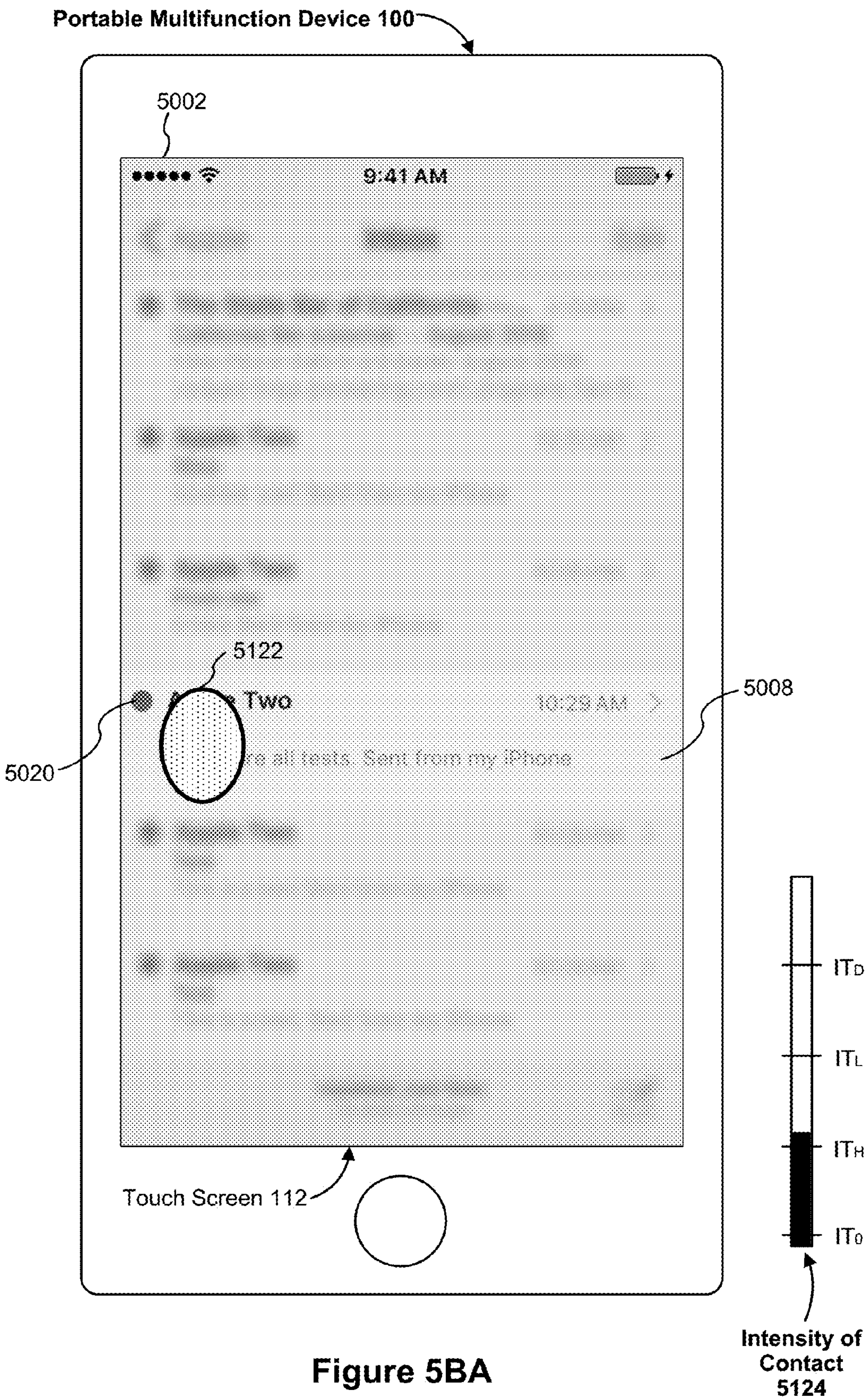
Figure 5B:
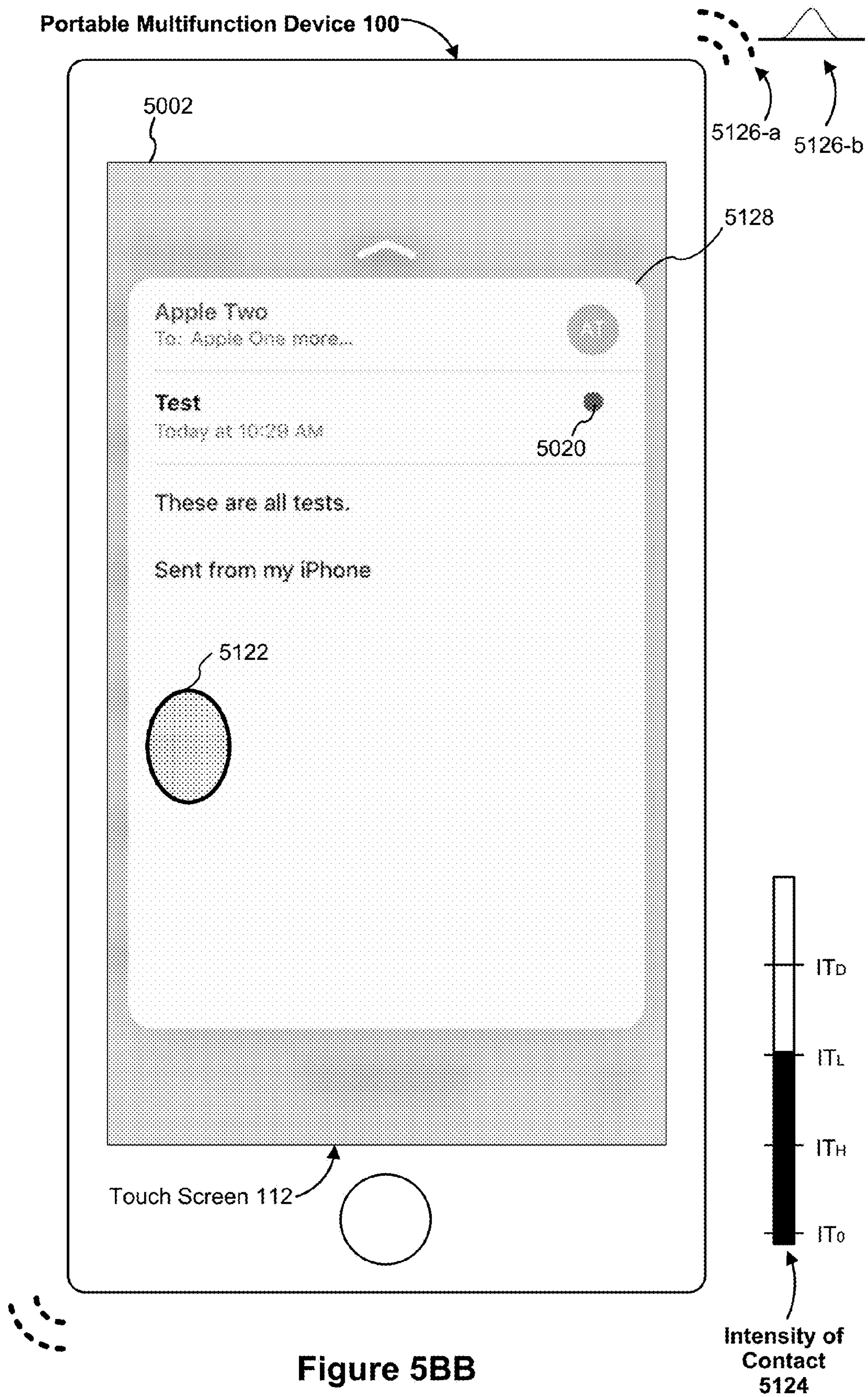
Figure 5B:
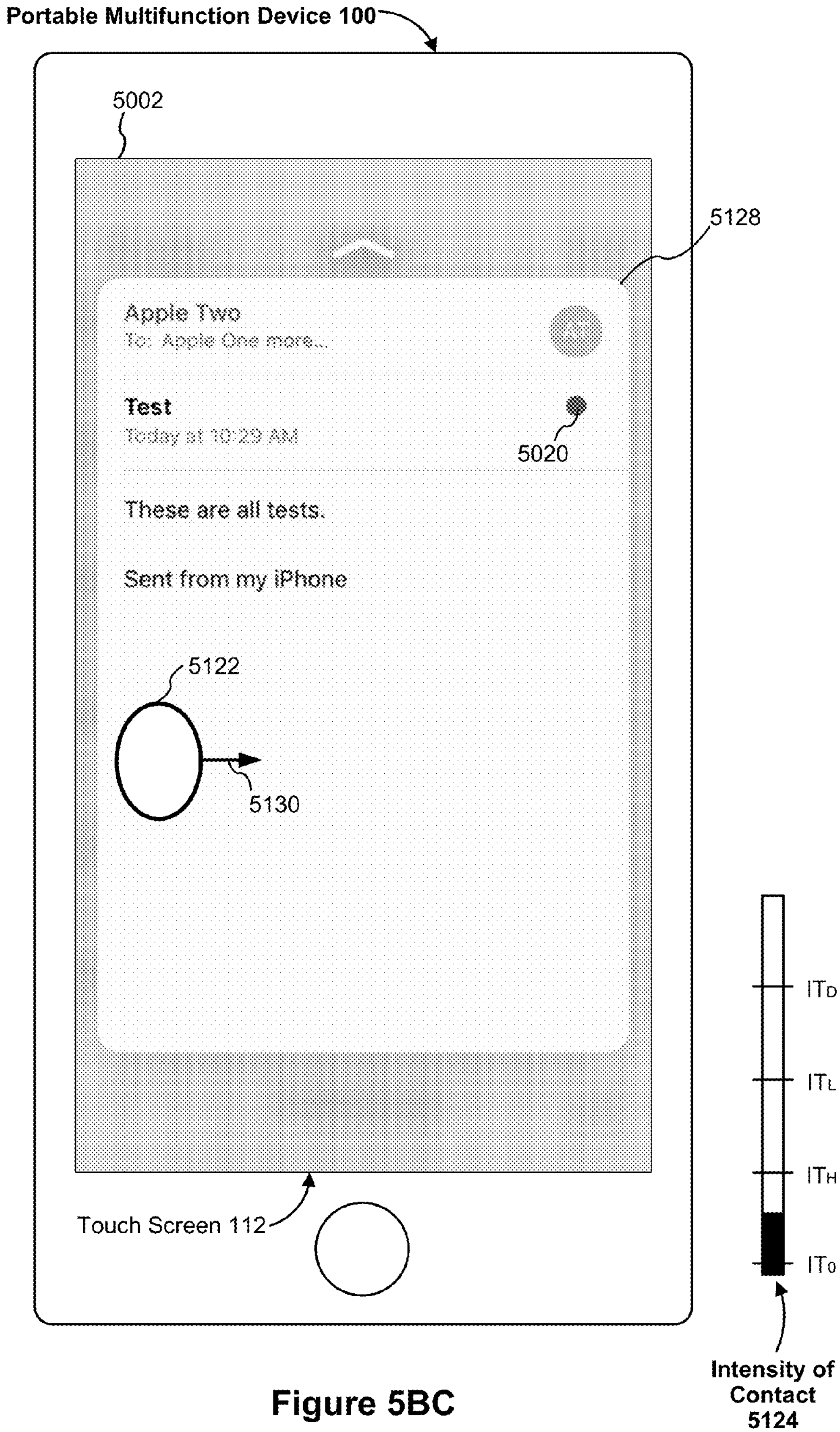
Figure 5B:
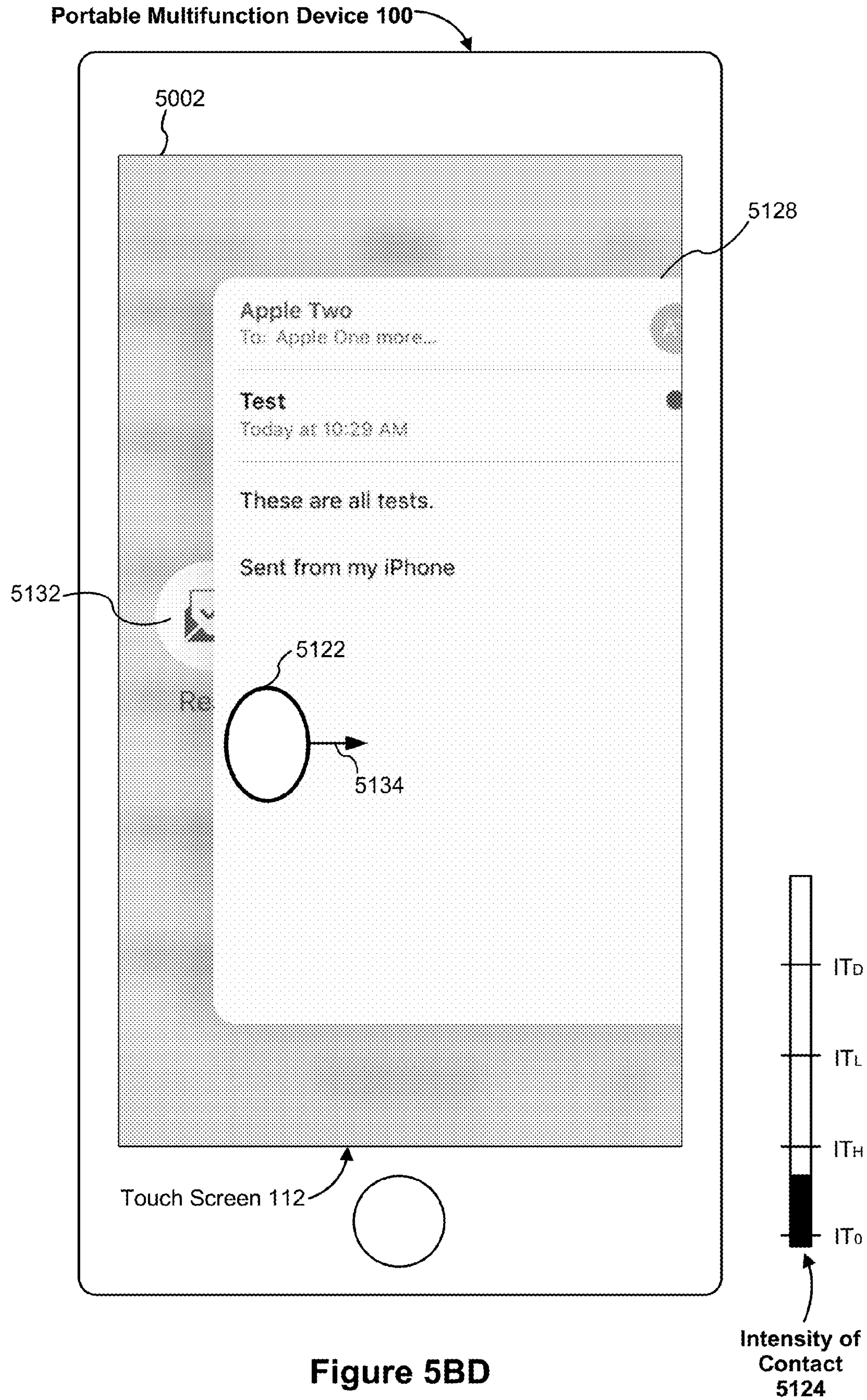
Figure 5B:
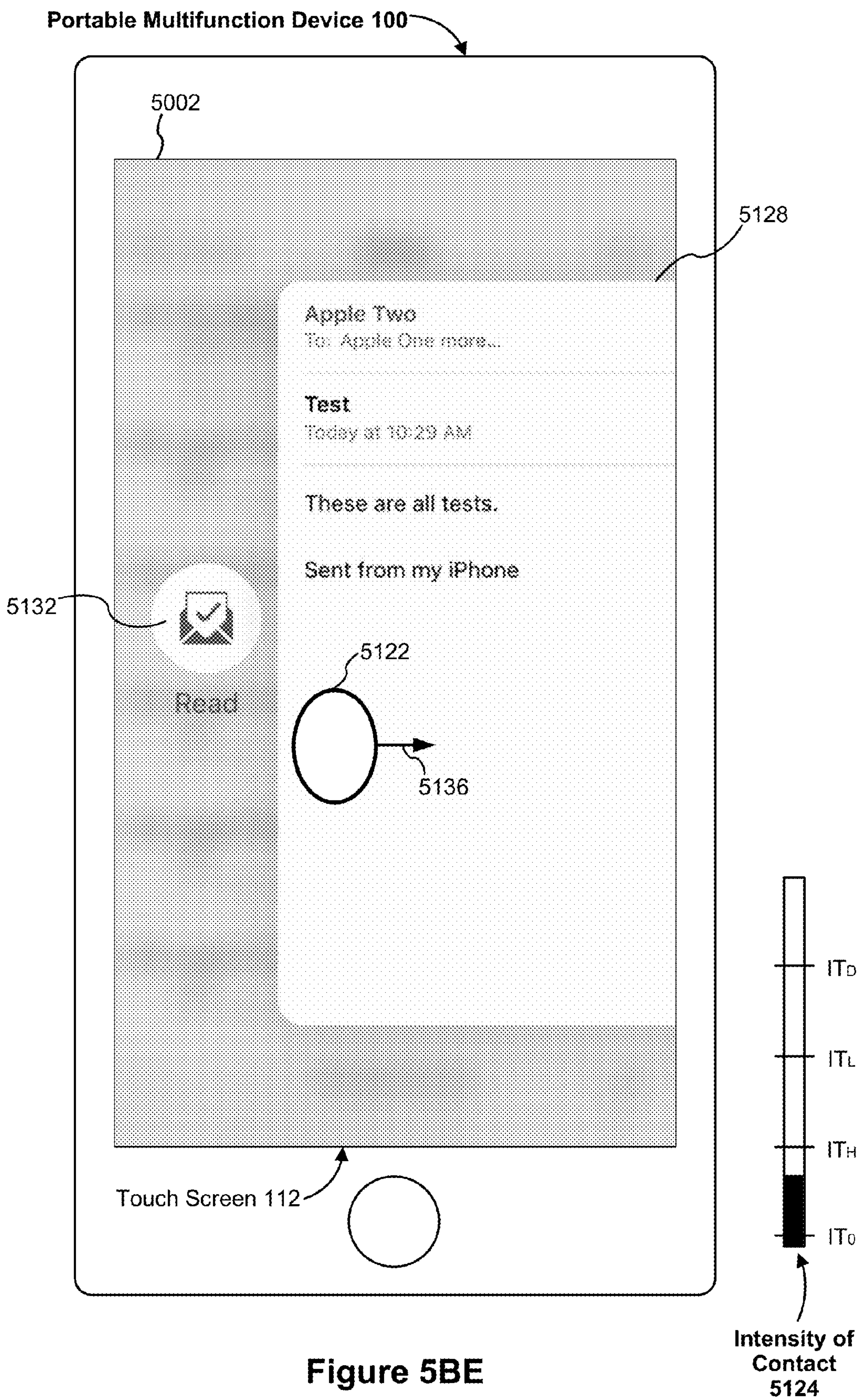
Figure 5B:
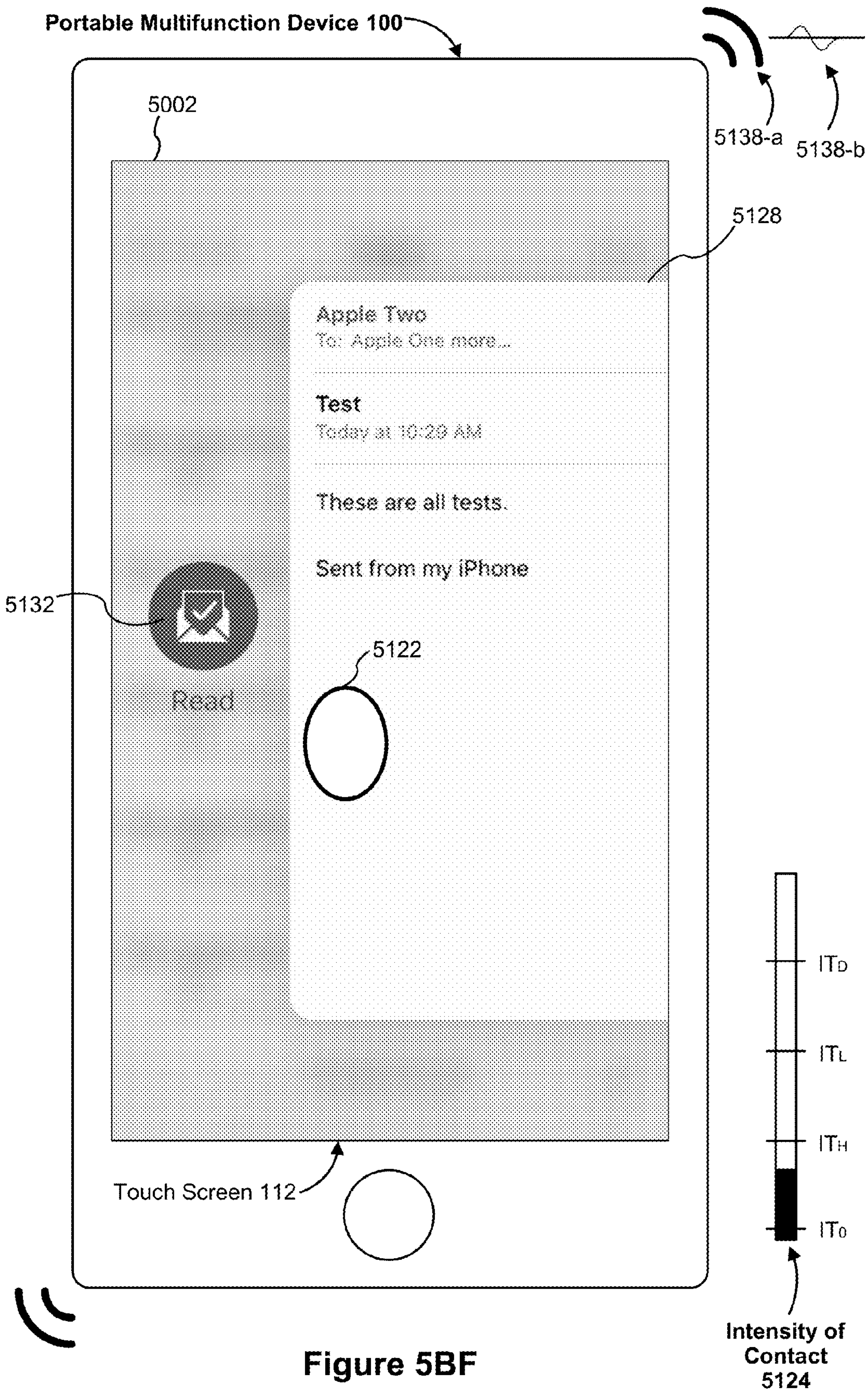
Figure 5B:
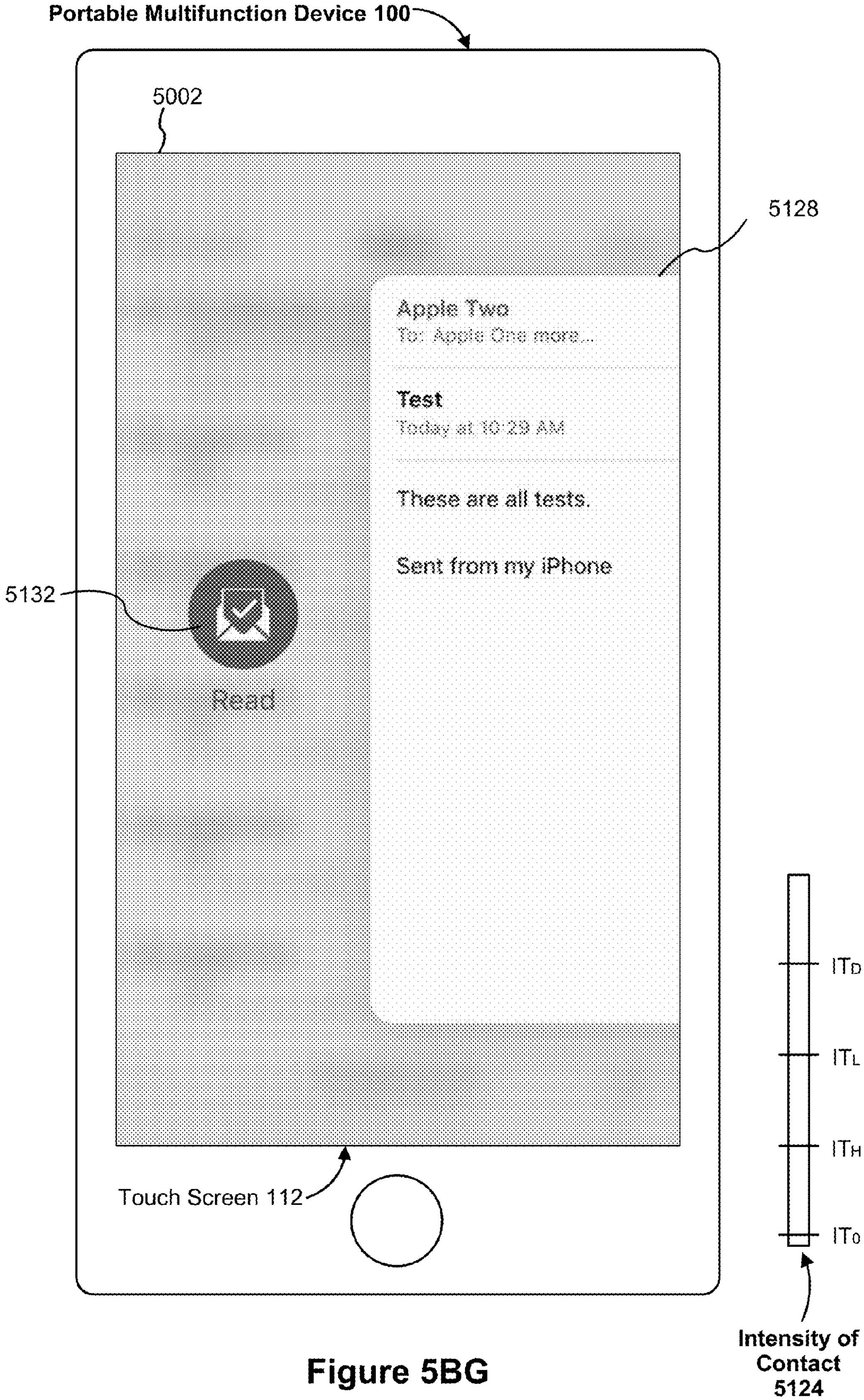
Figure 5B:
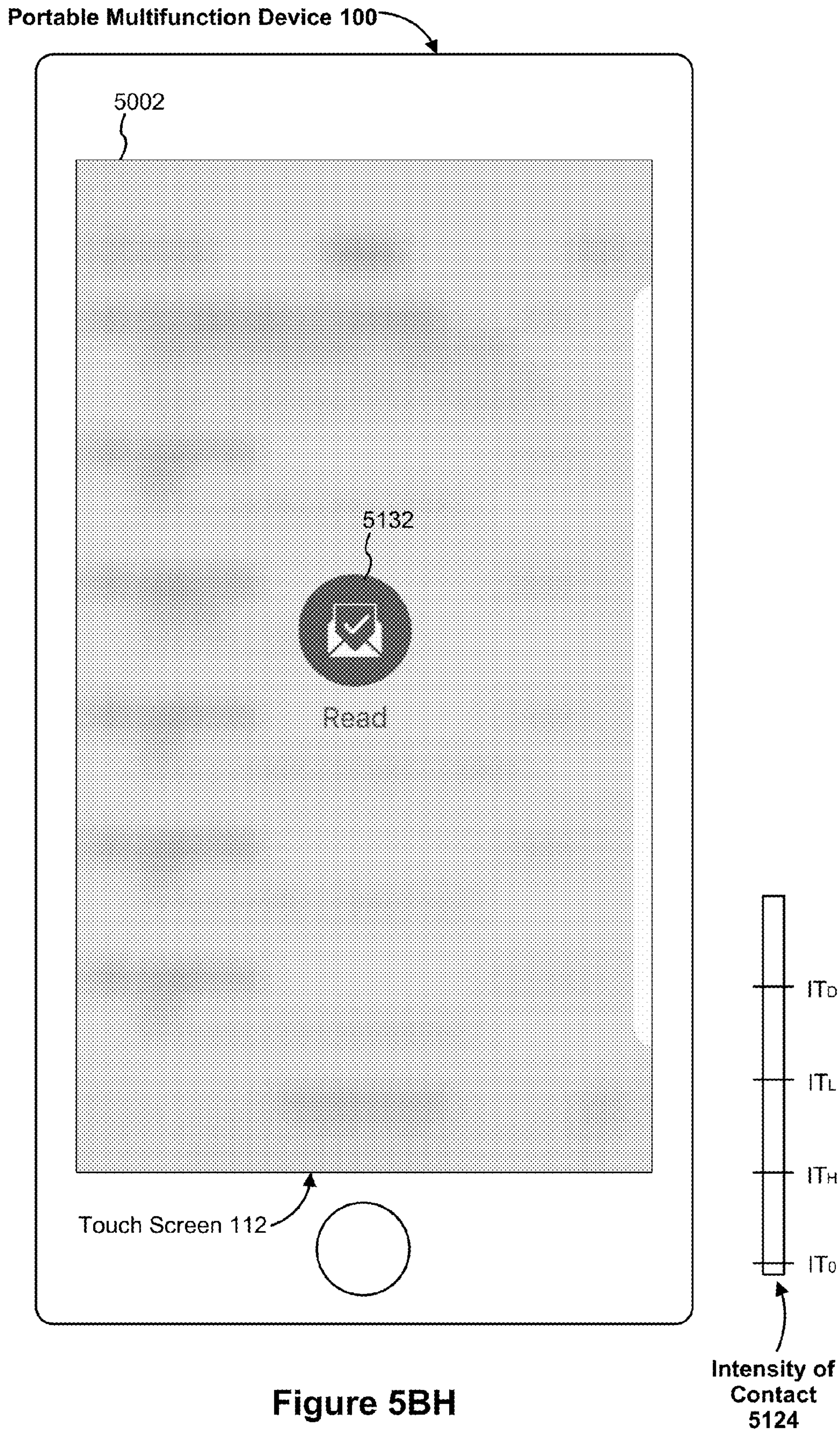
Figure 5B:
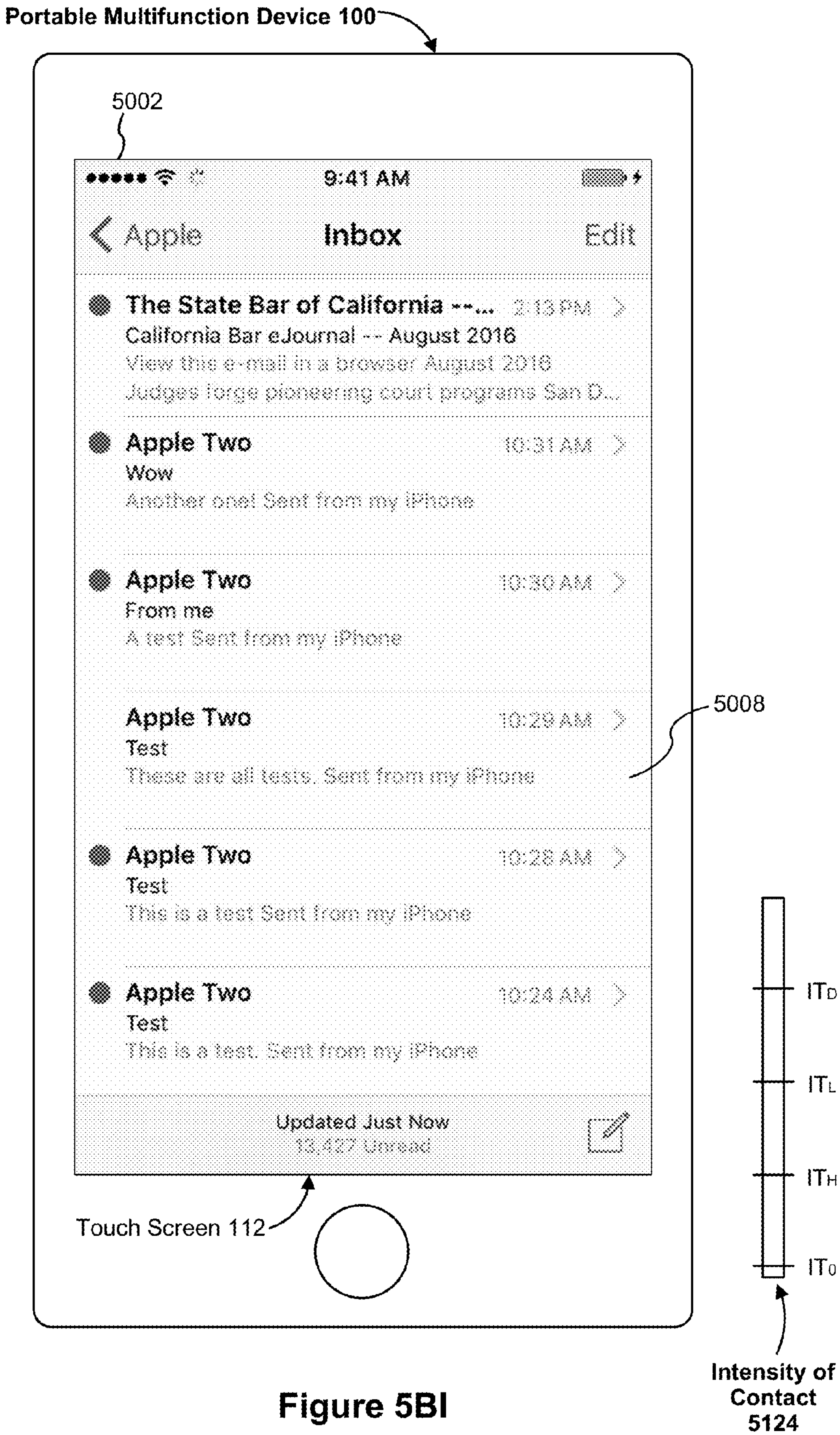
Figure 5B:
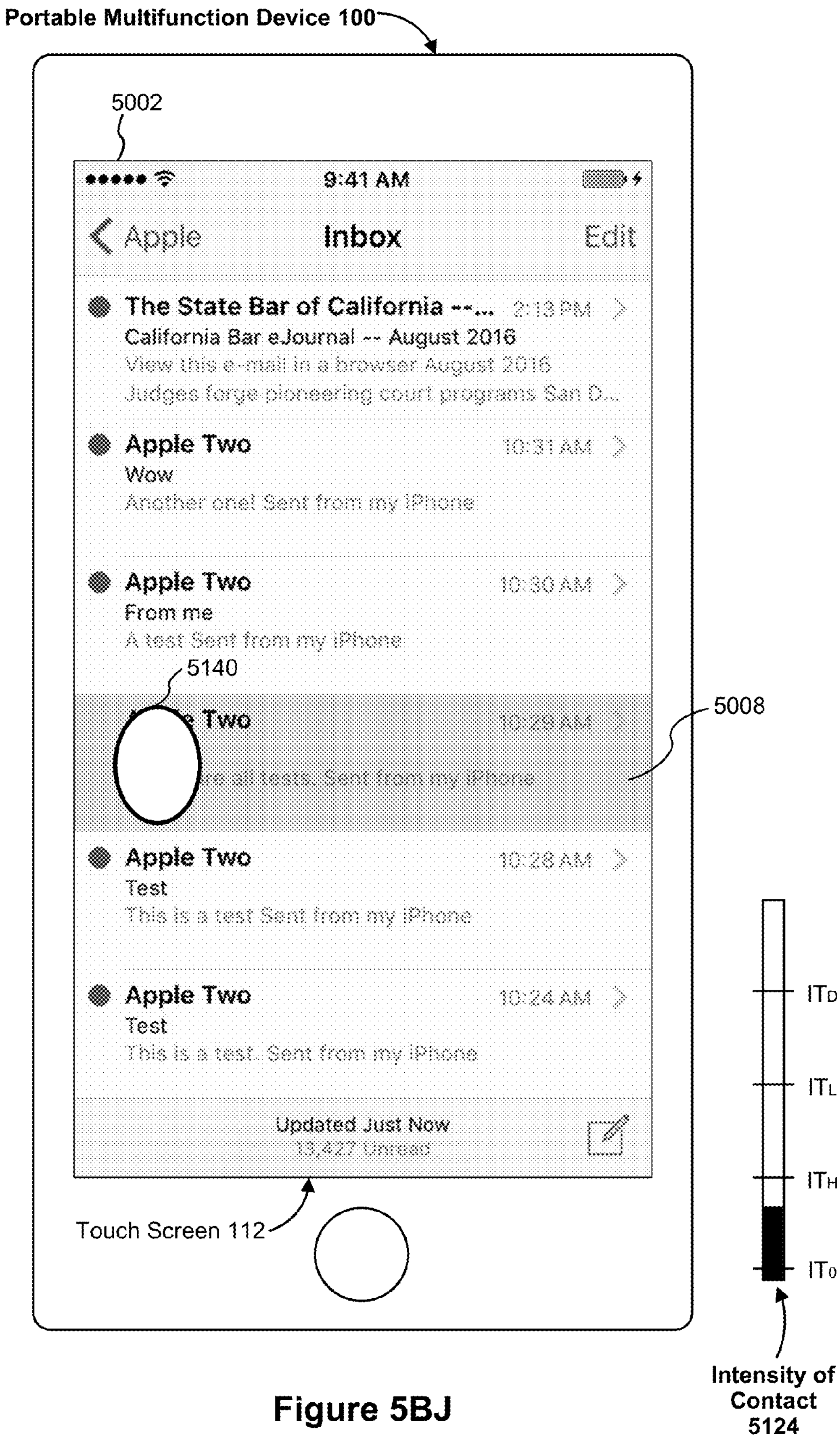
Figure 5B:
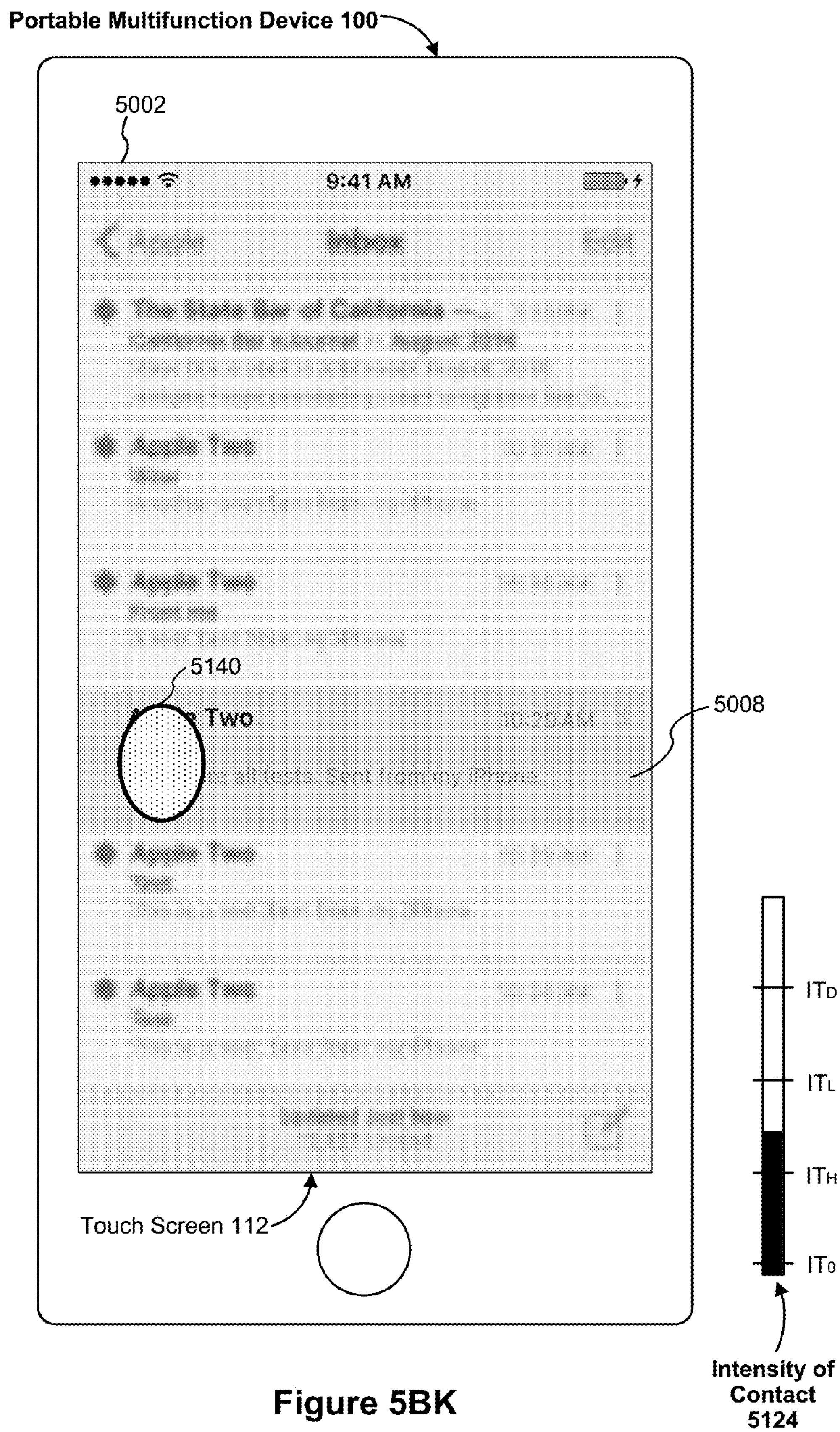
Figure 5B:
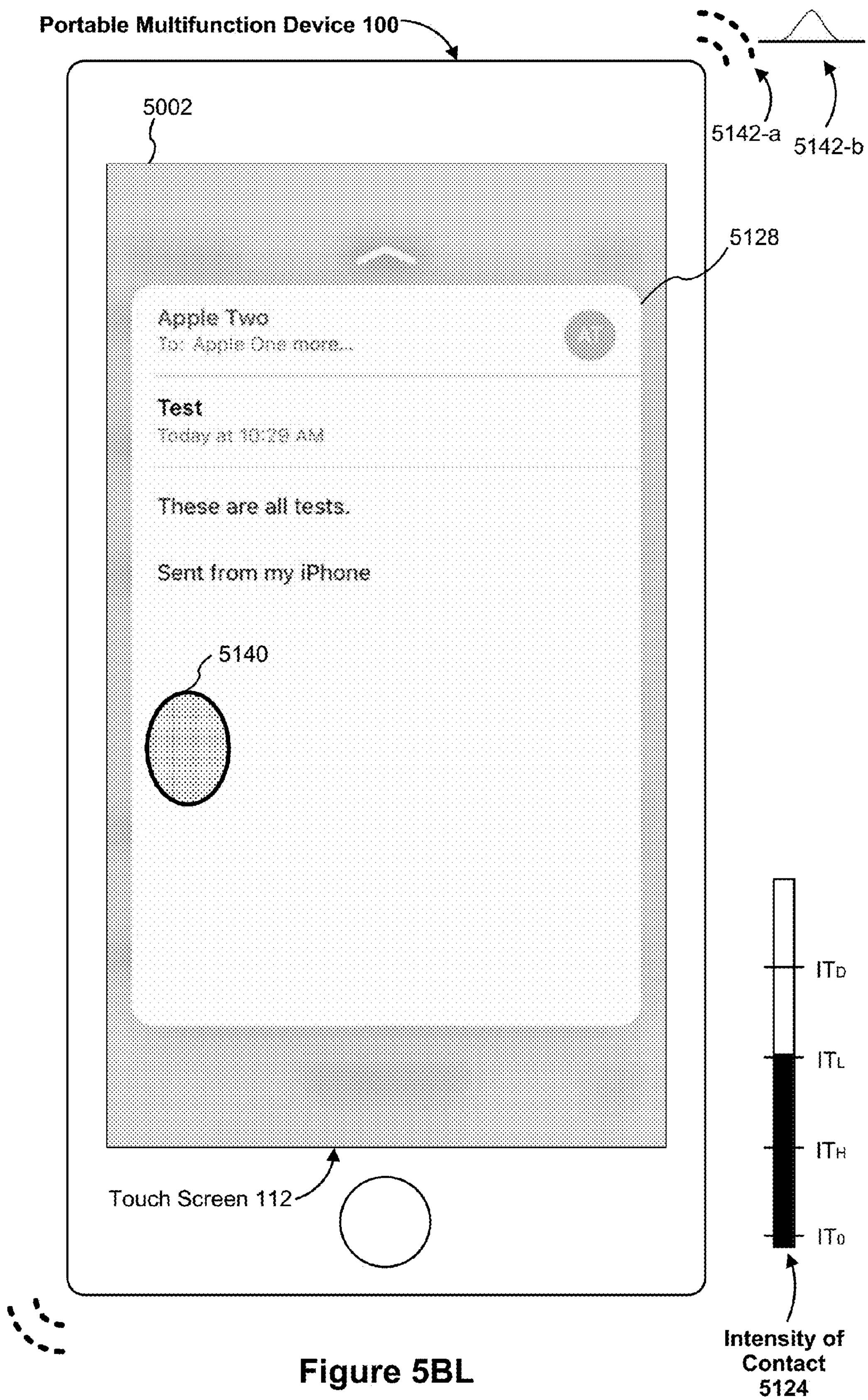
Figure 5B:
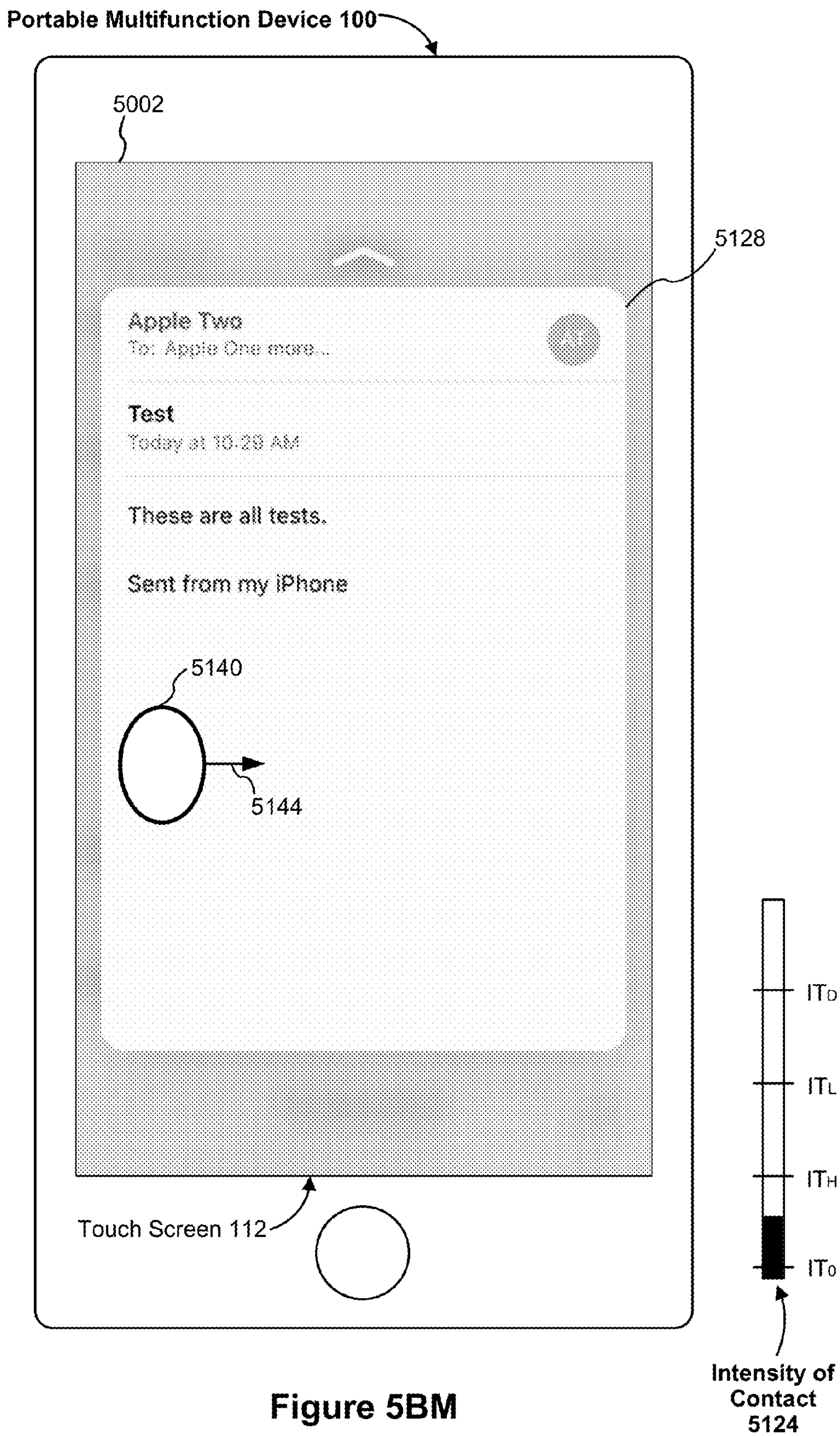
Figure 5B:
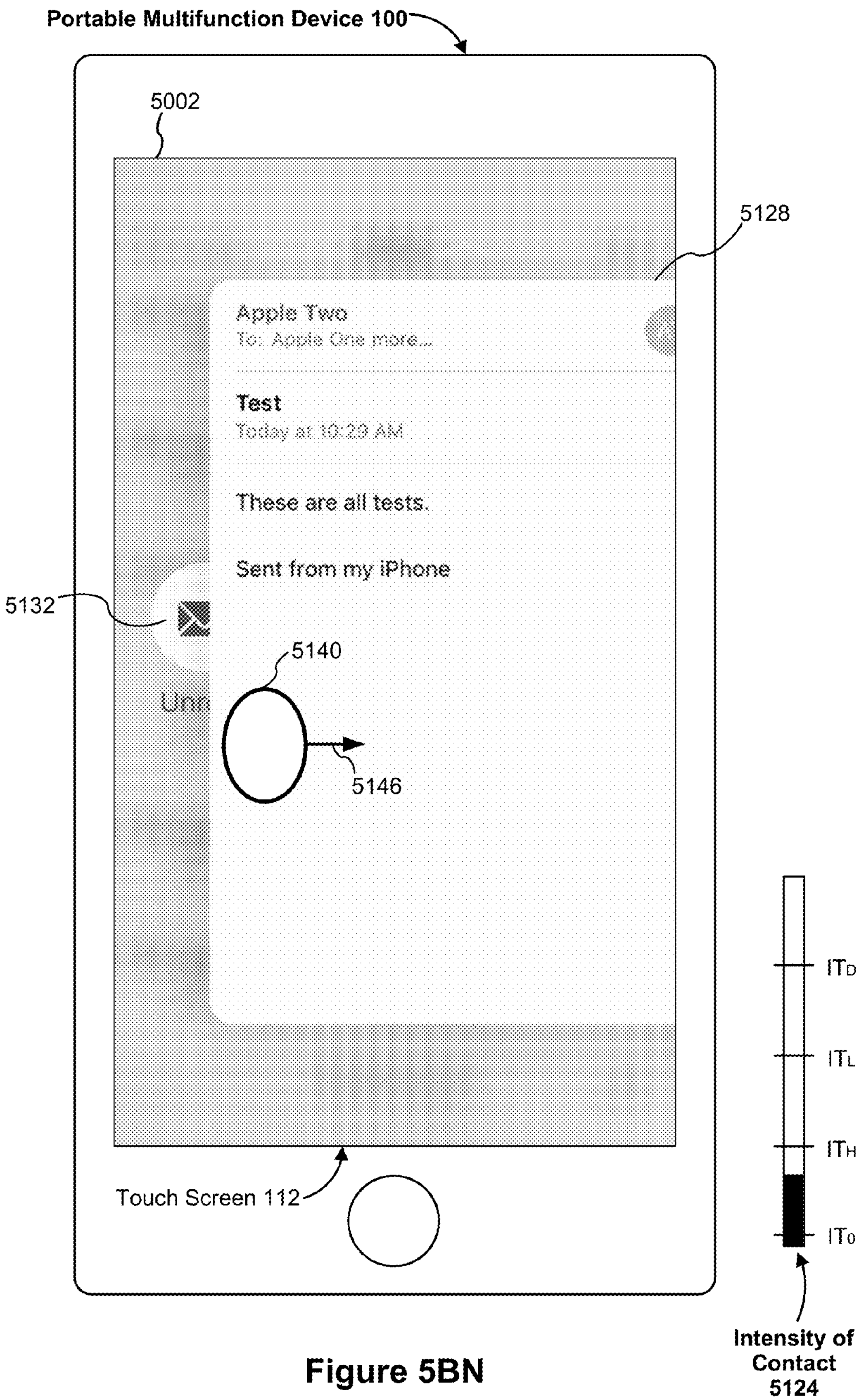
Figure 5B:
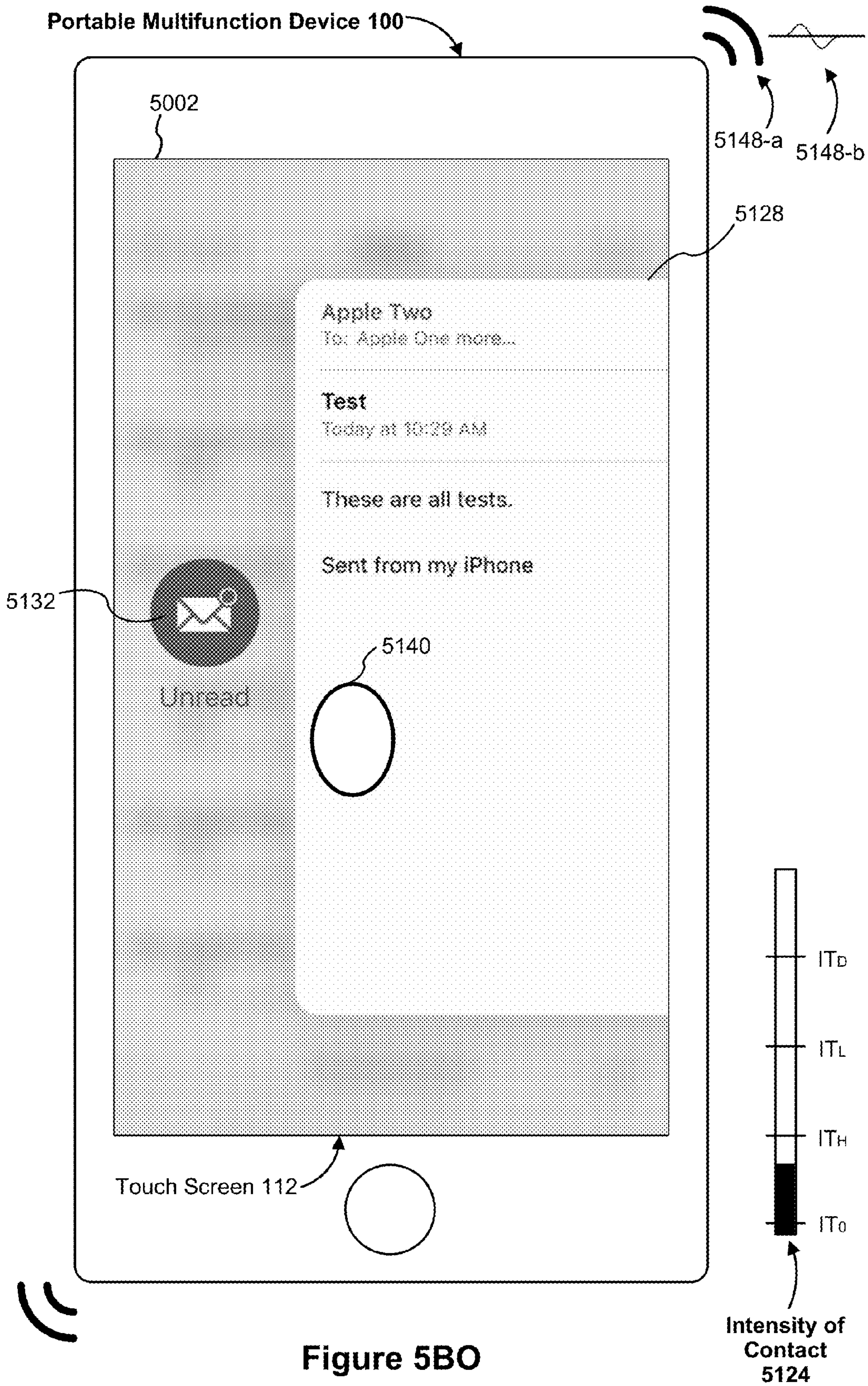
Figure 5B:
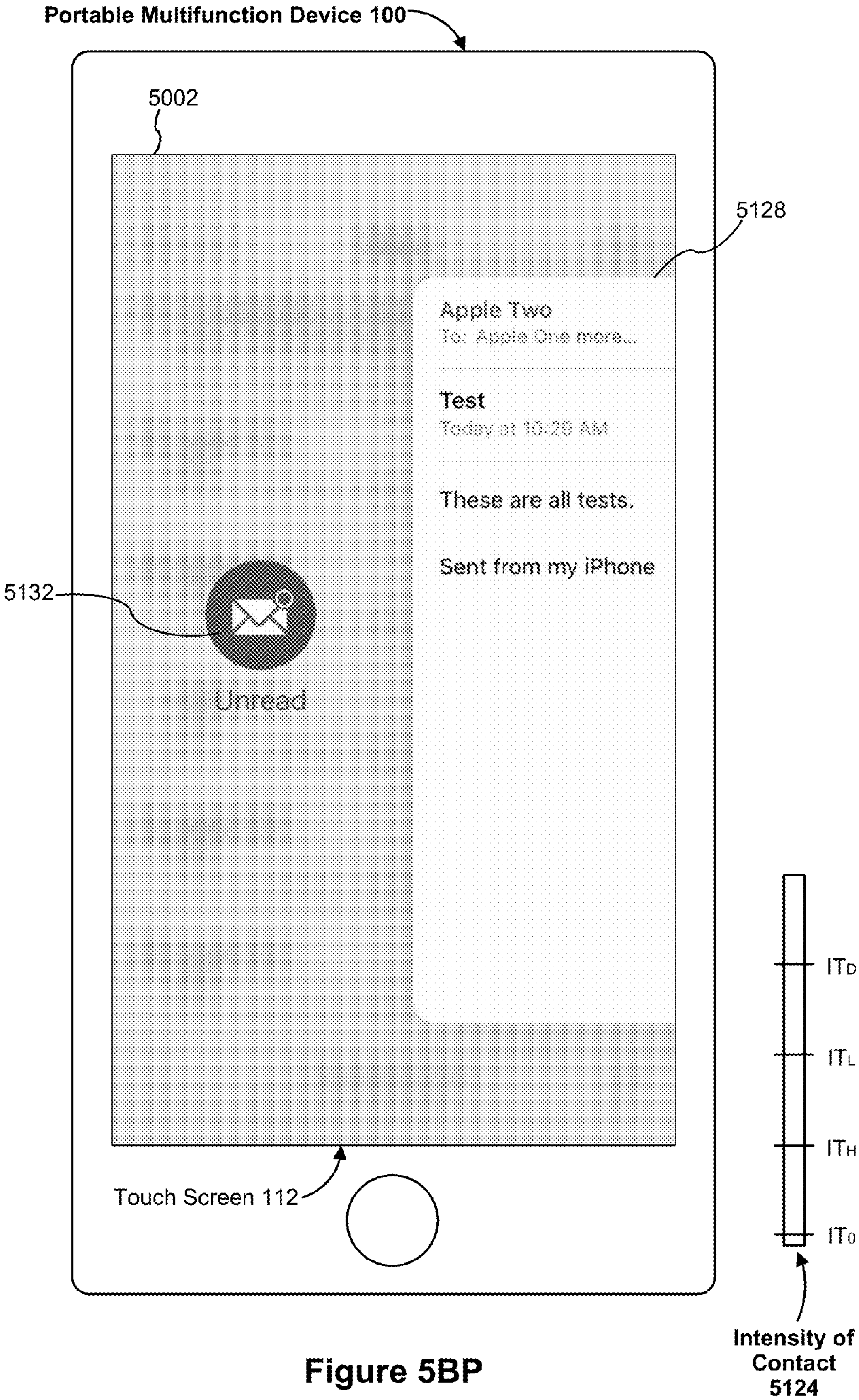
Figure 5B:
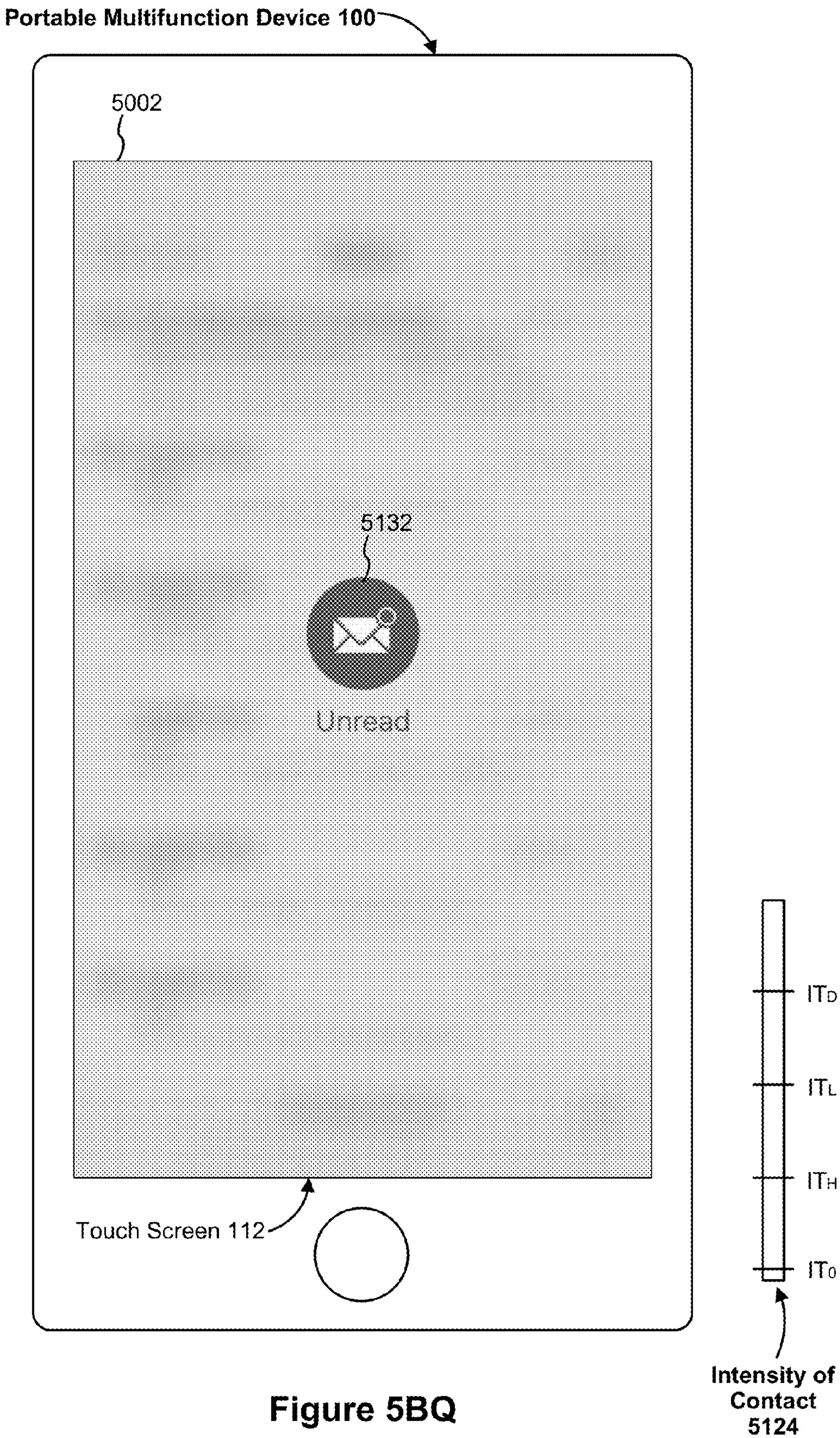
Figure 5B:
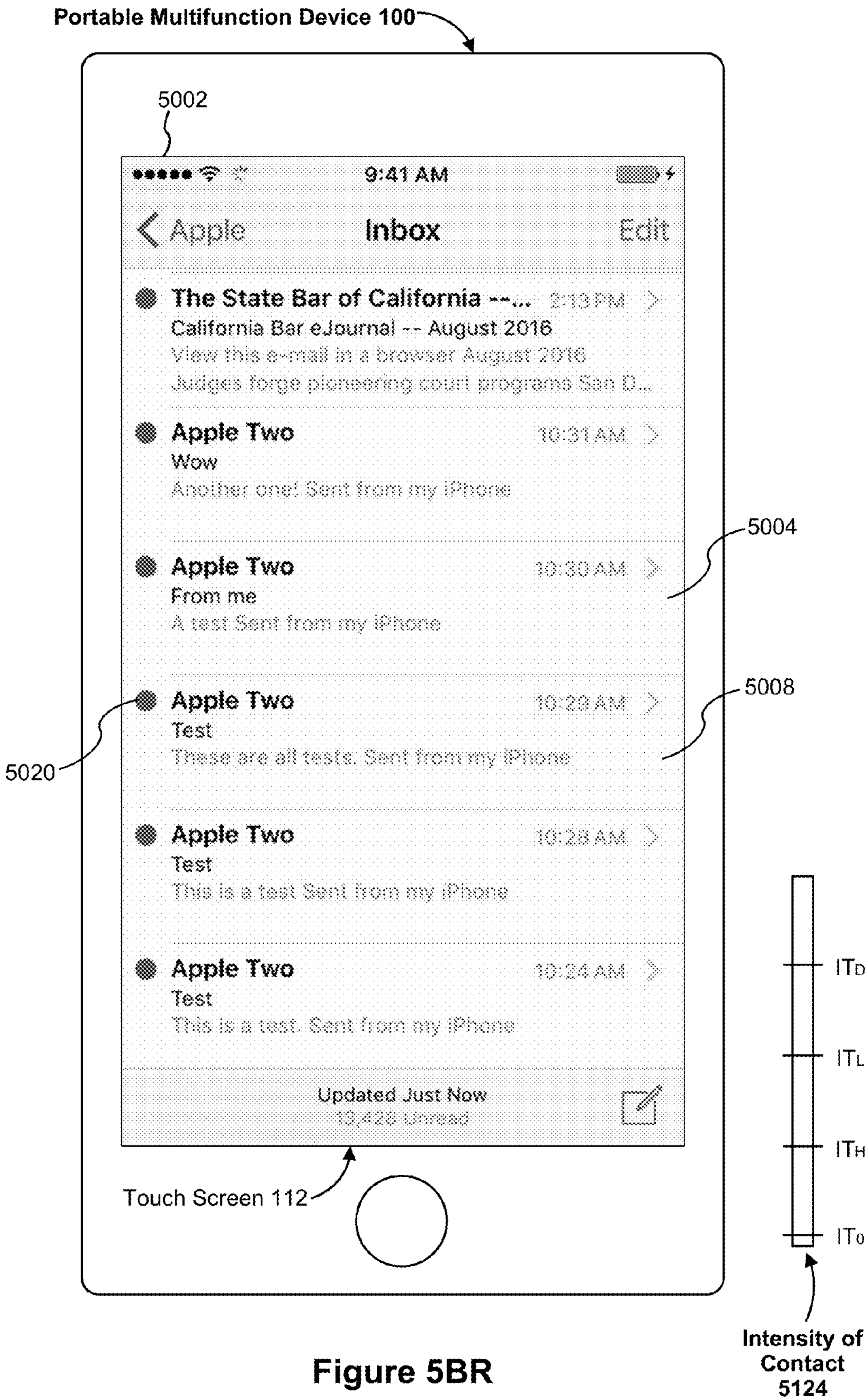
Figure 5B:
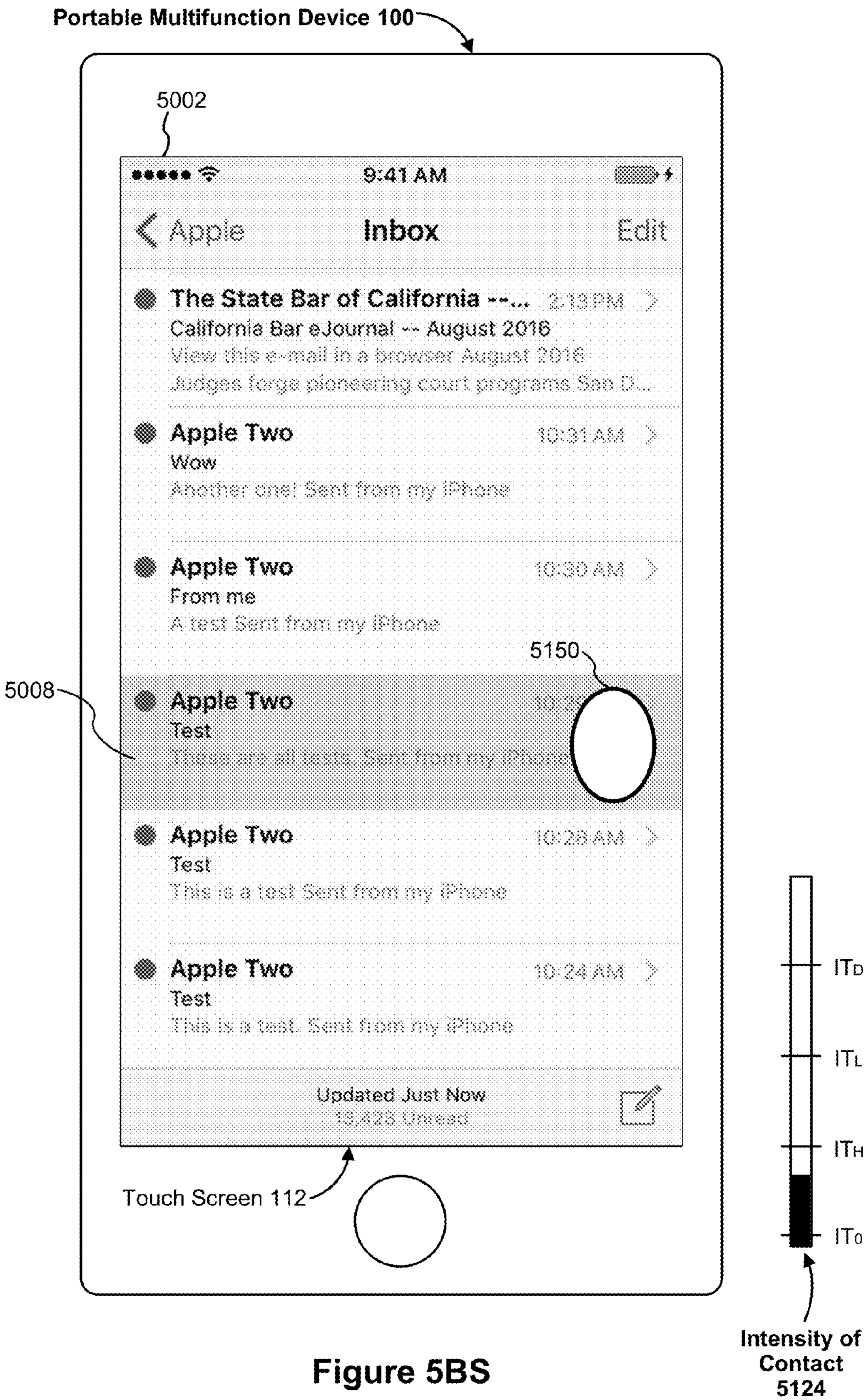
Figure 5B:
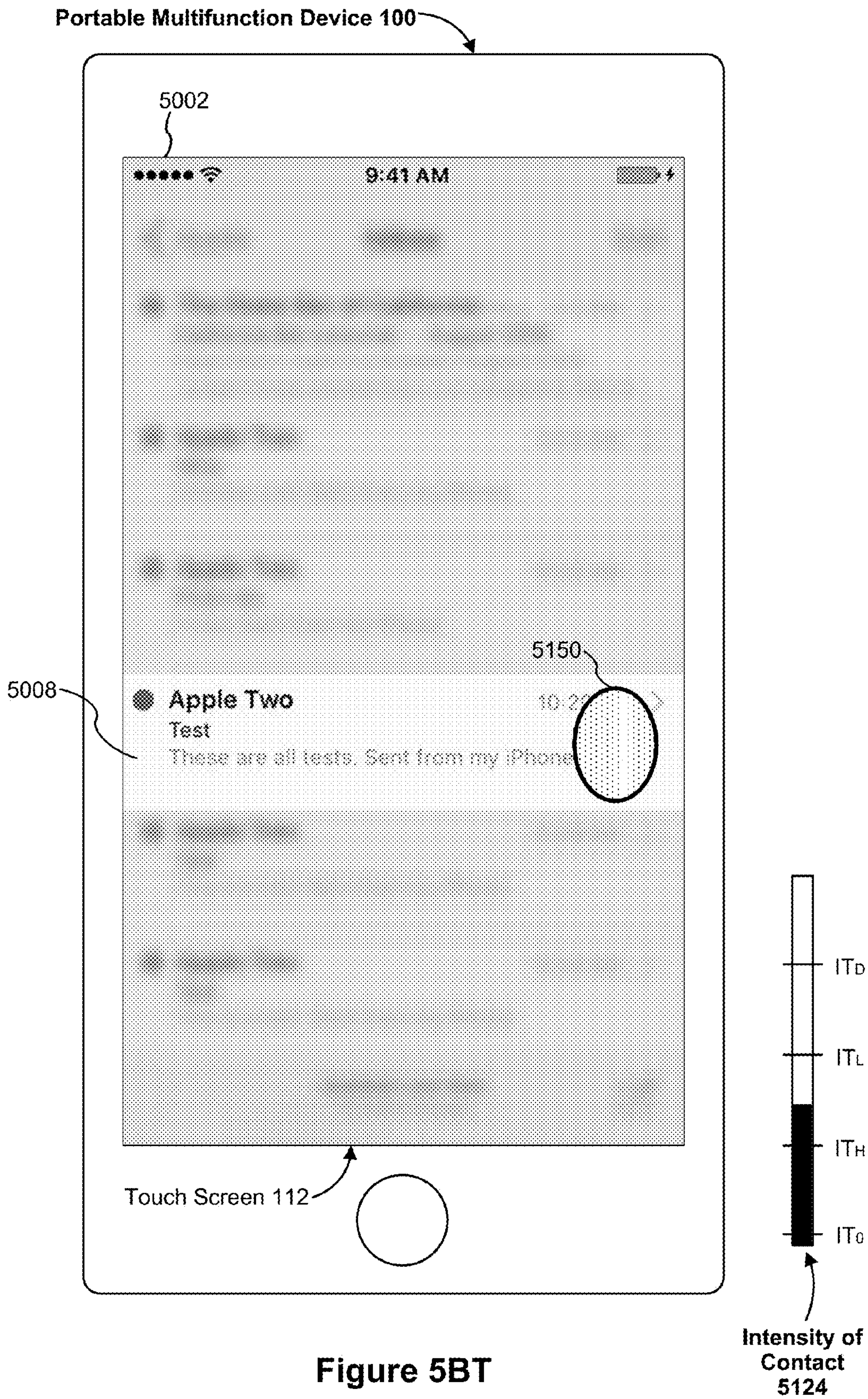
Figure 5B:
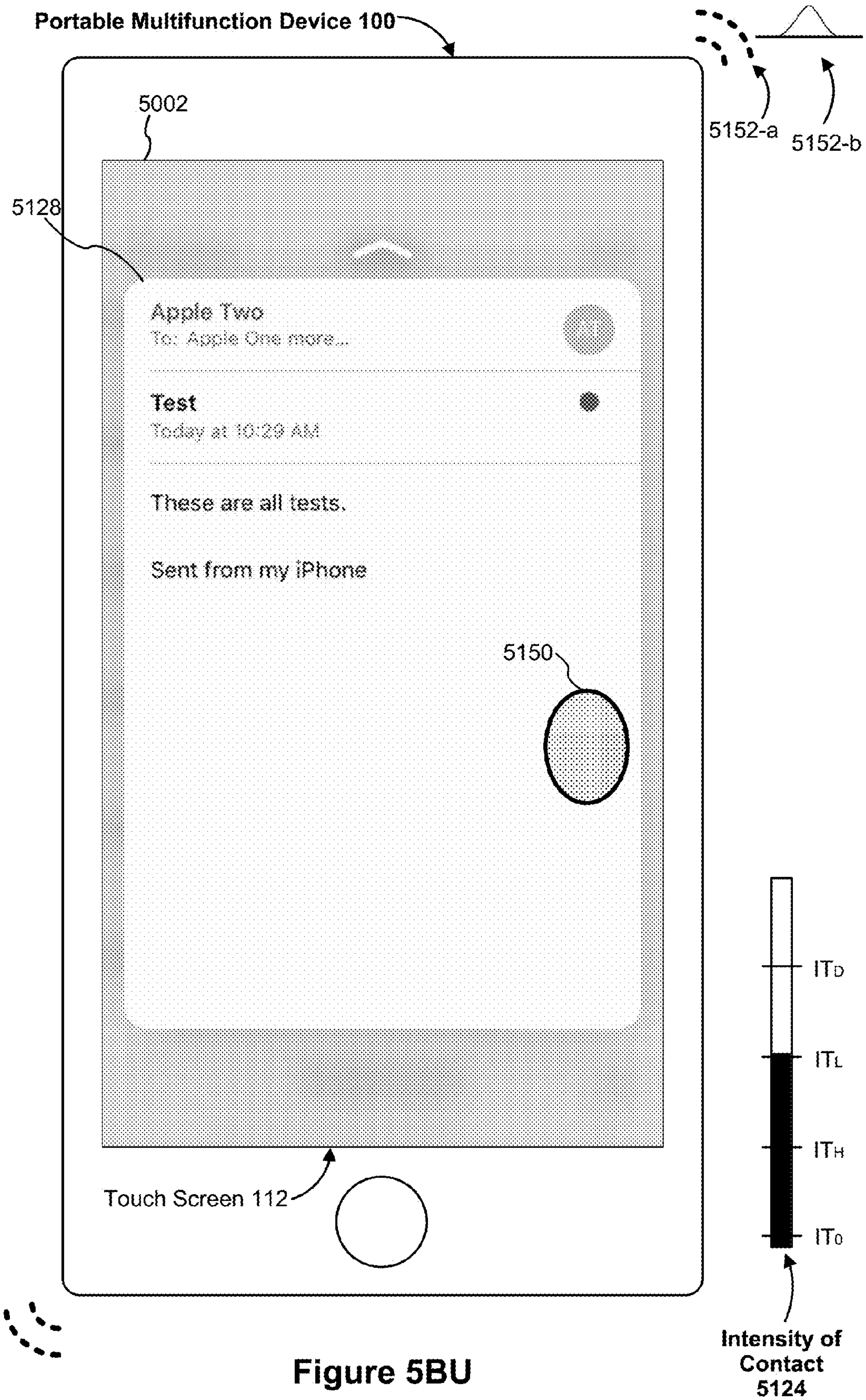
Figure 5B:
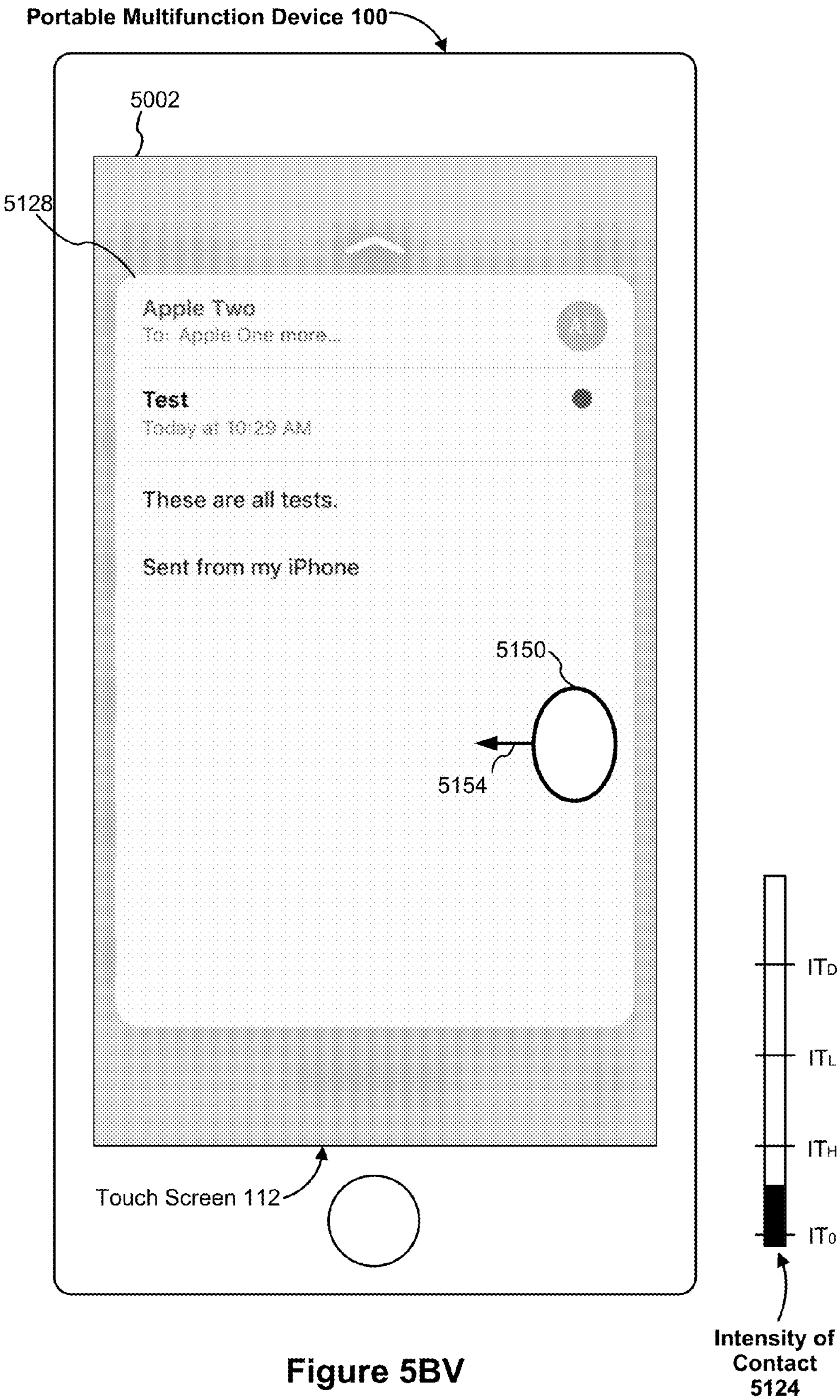
Figure 5B:
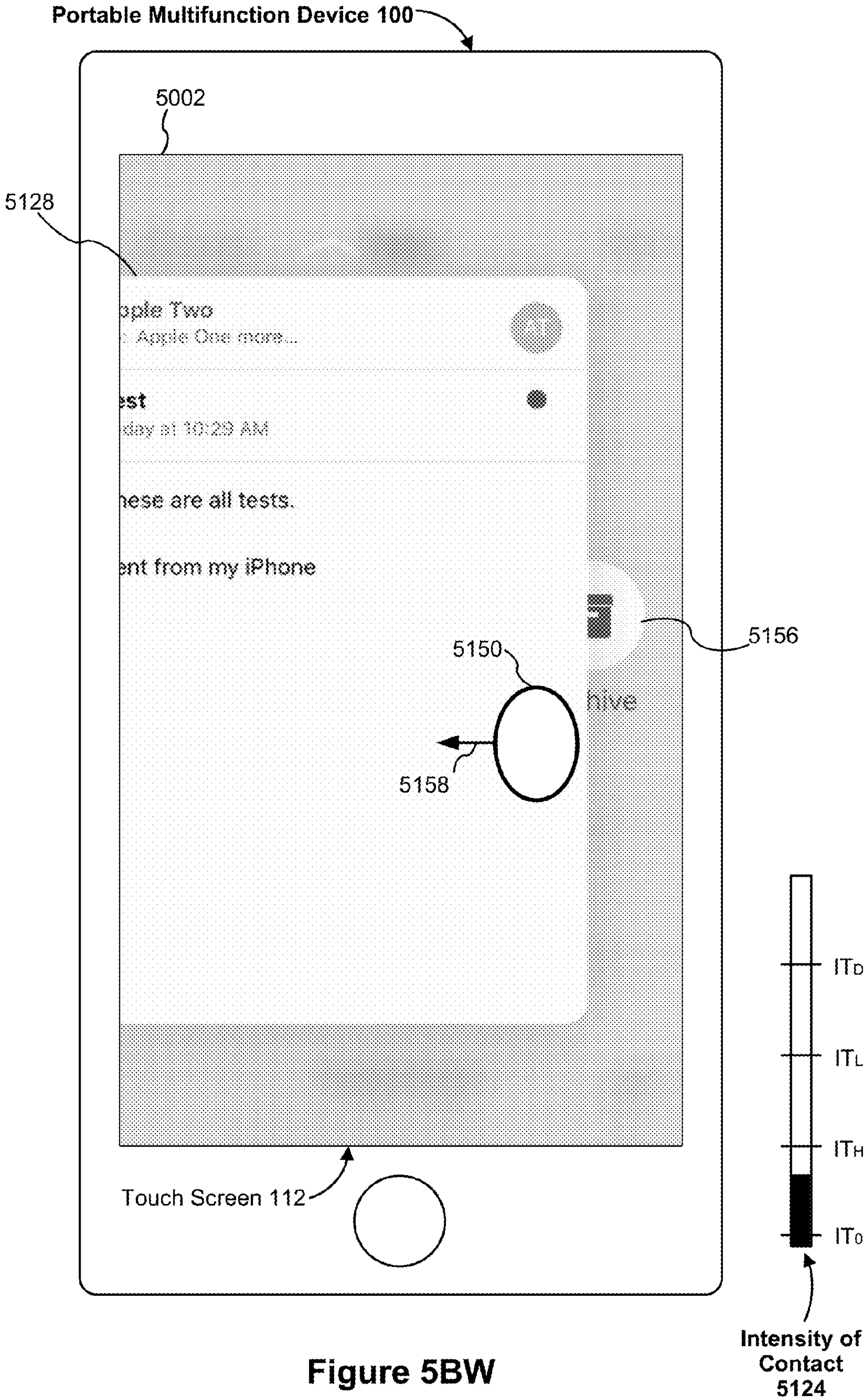
Figure 5B:
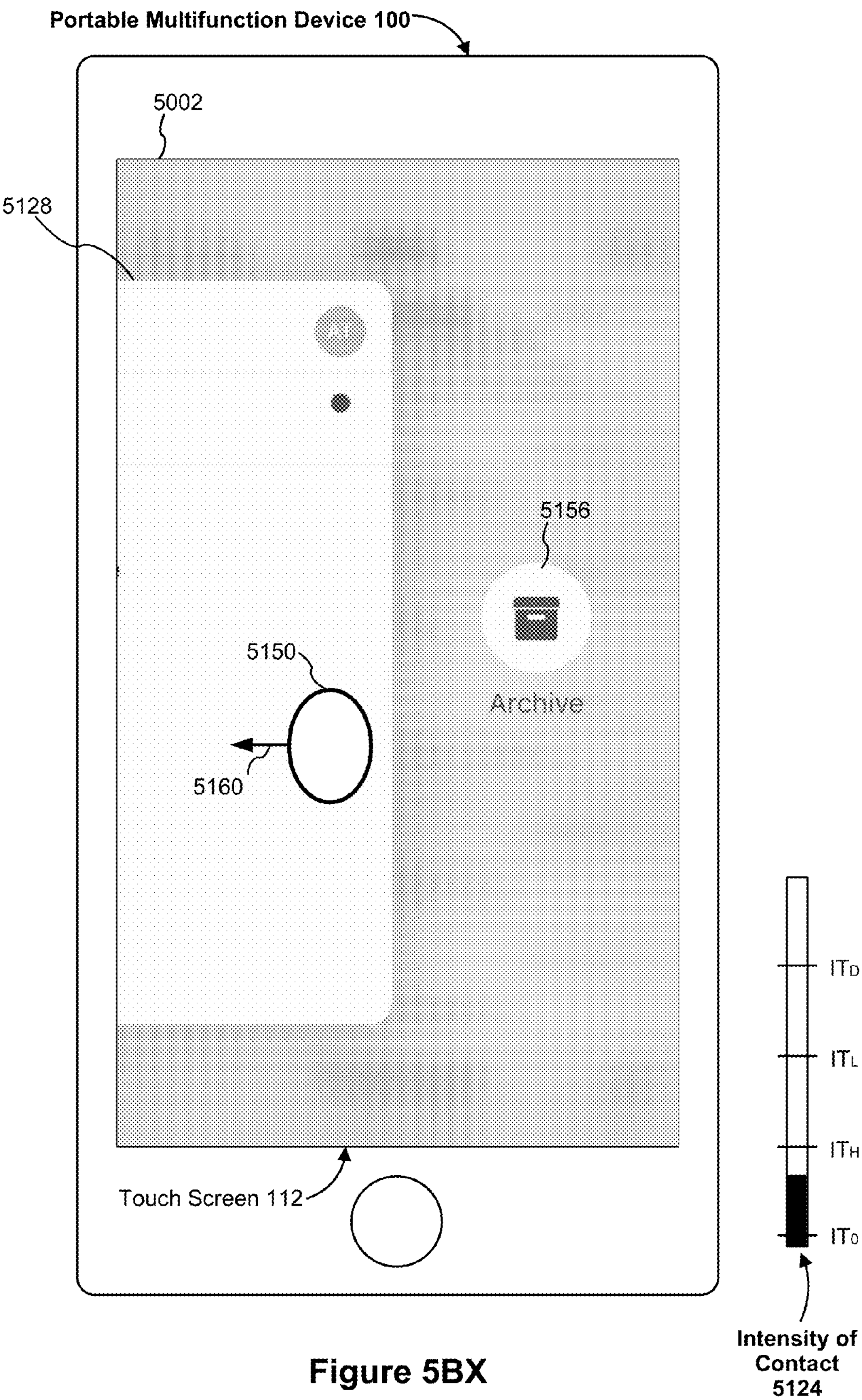
Figure 5B:
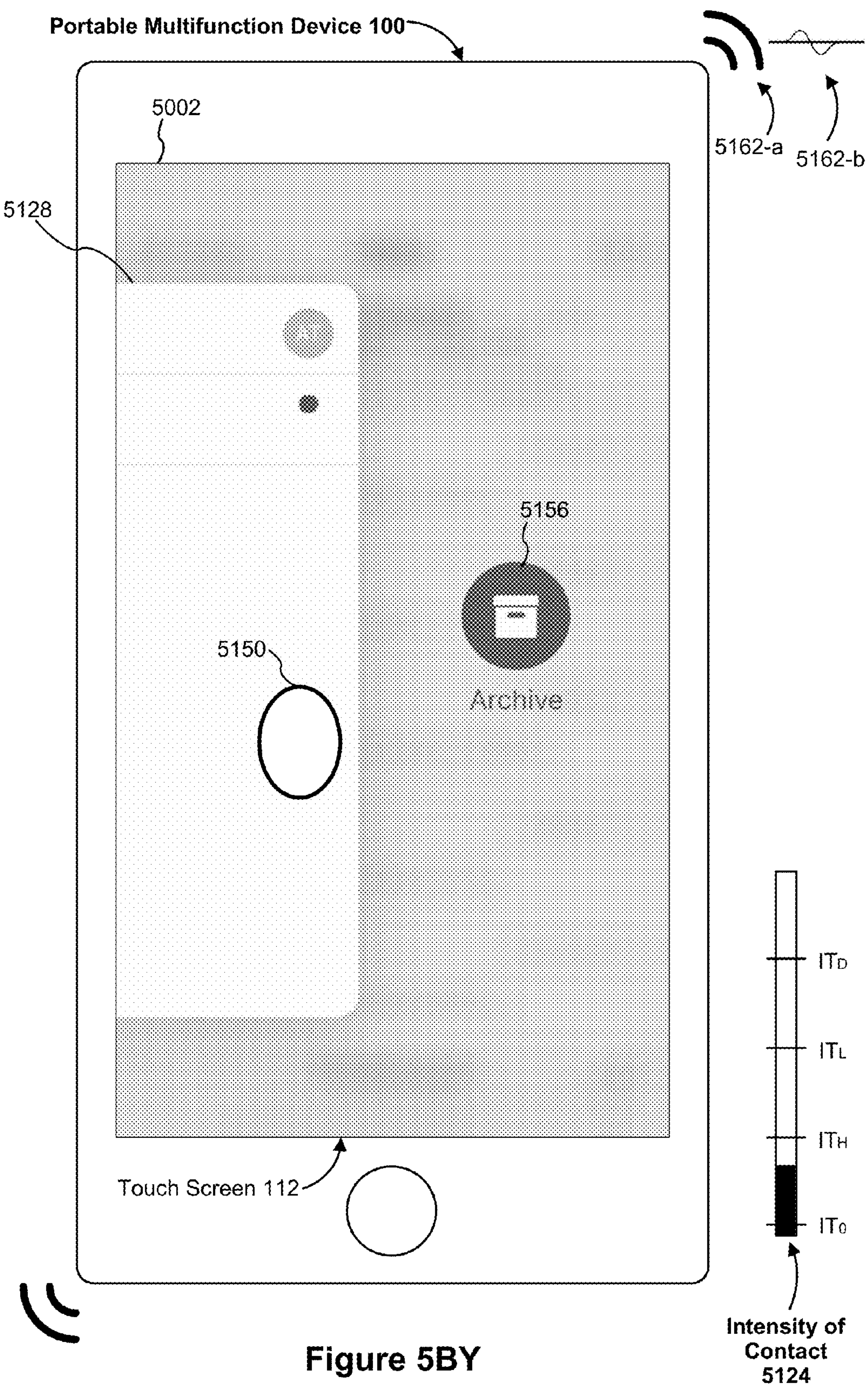
Figure 5B:
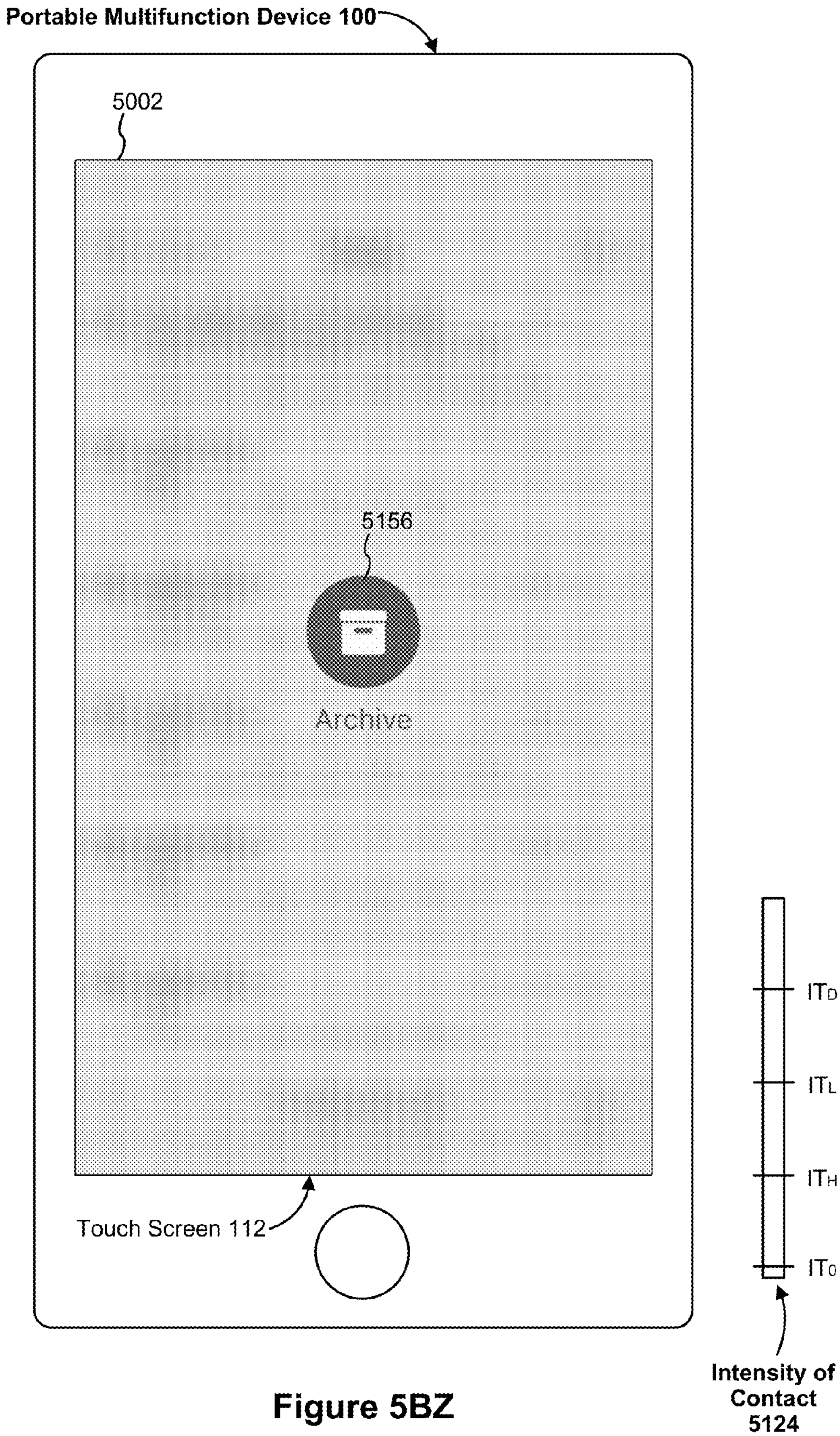
Figure 5C:
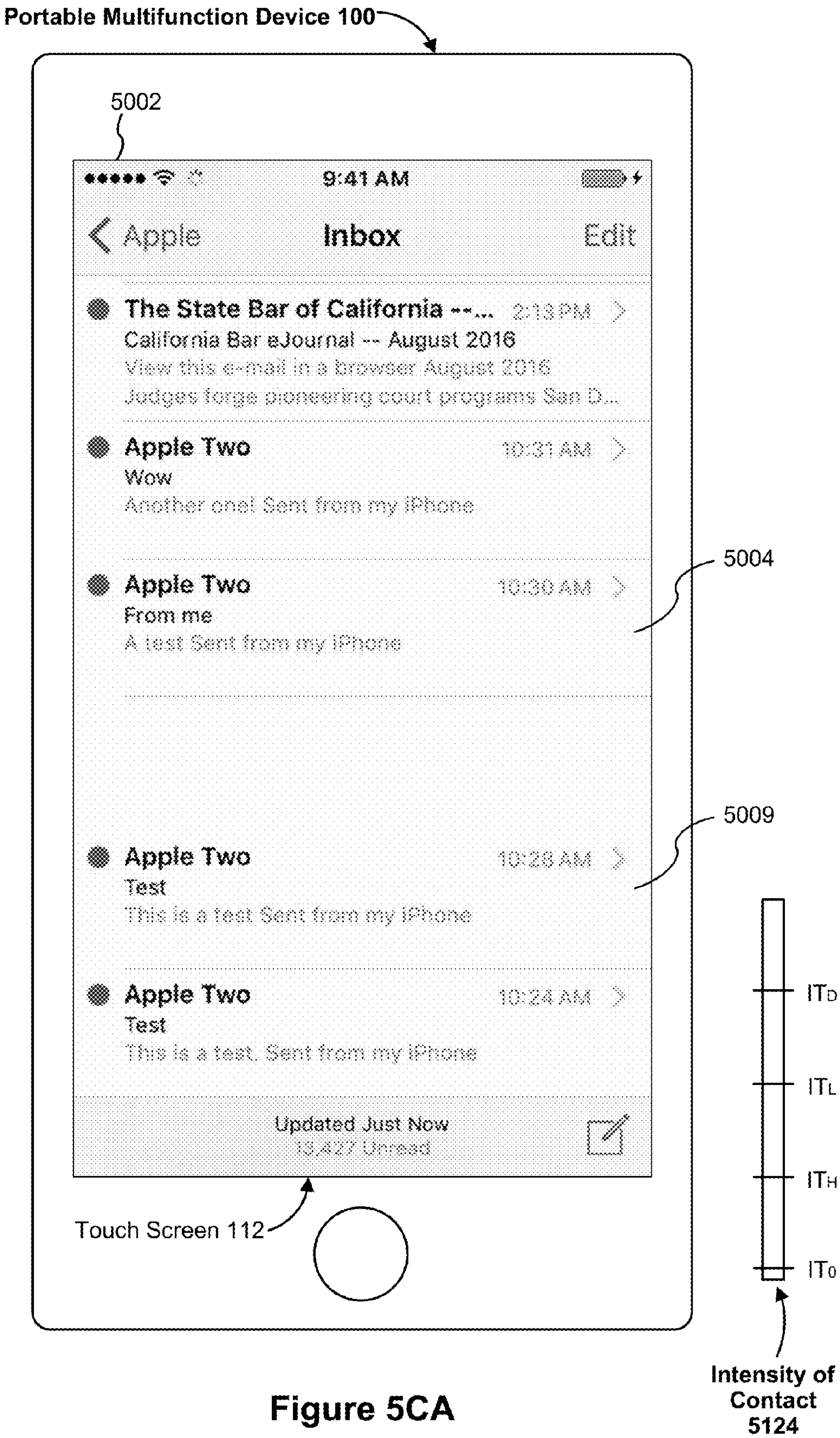
Figure 5C:
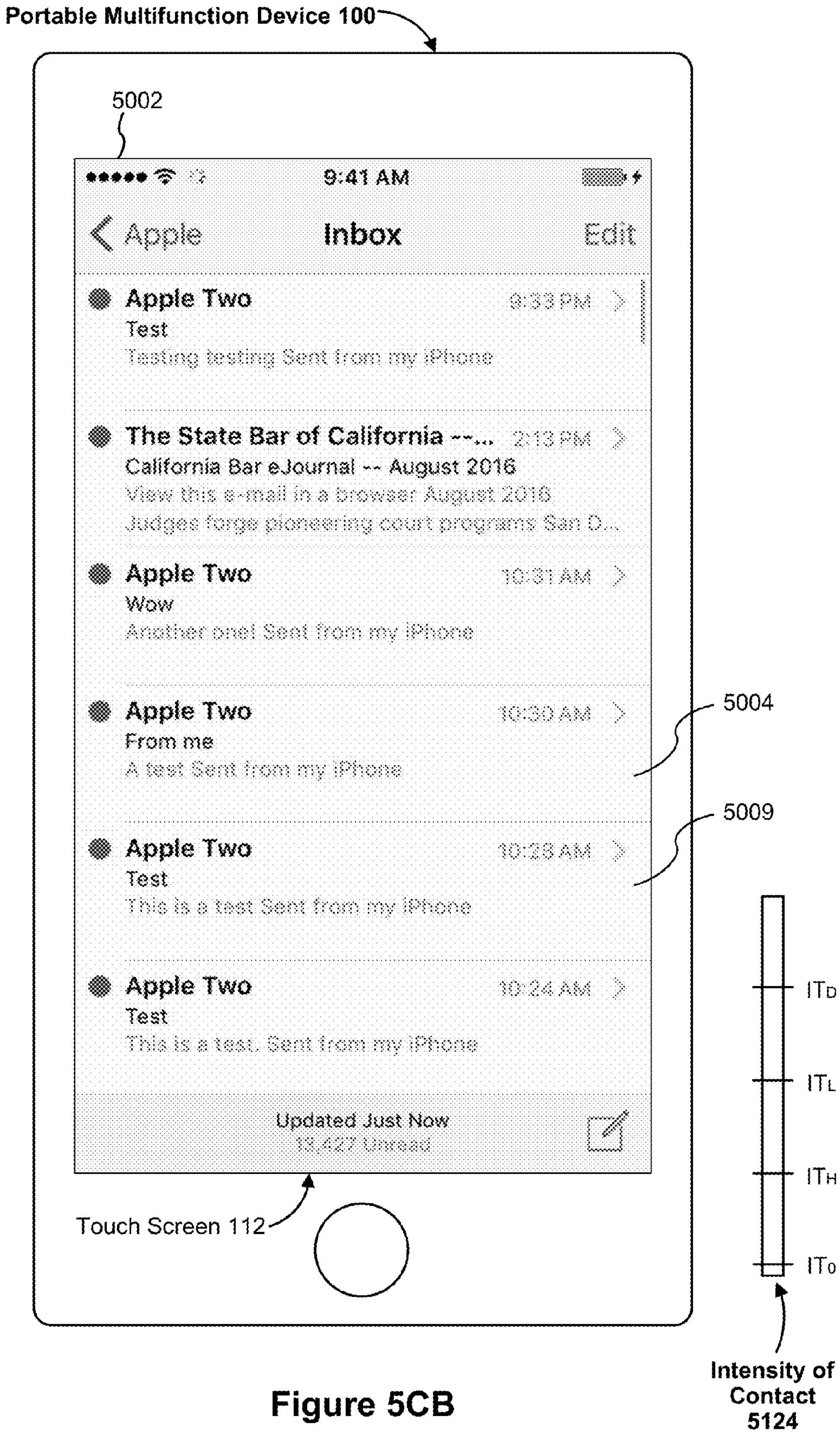
Figure 5C:
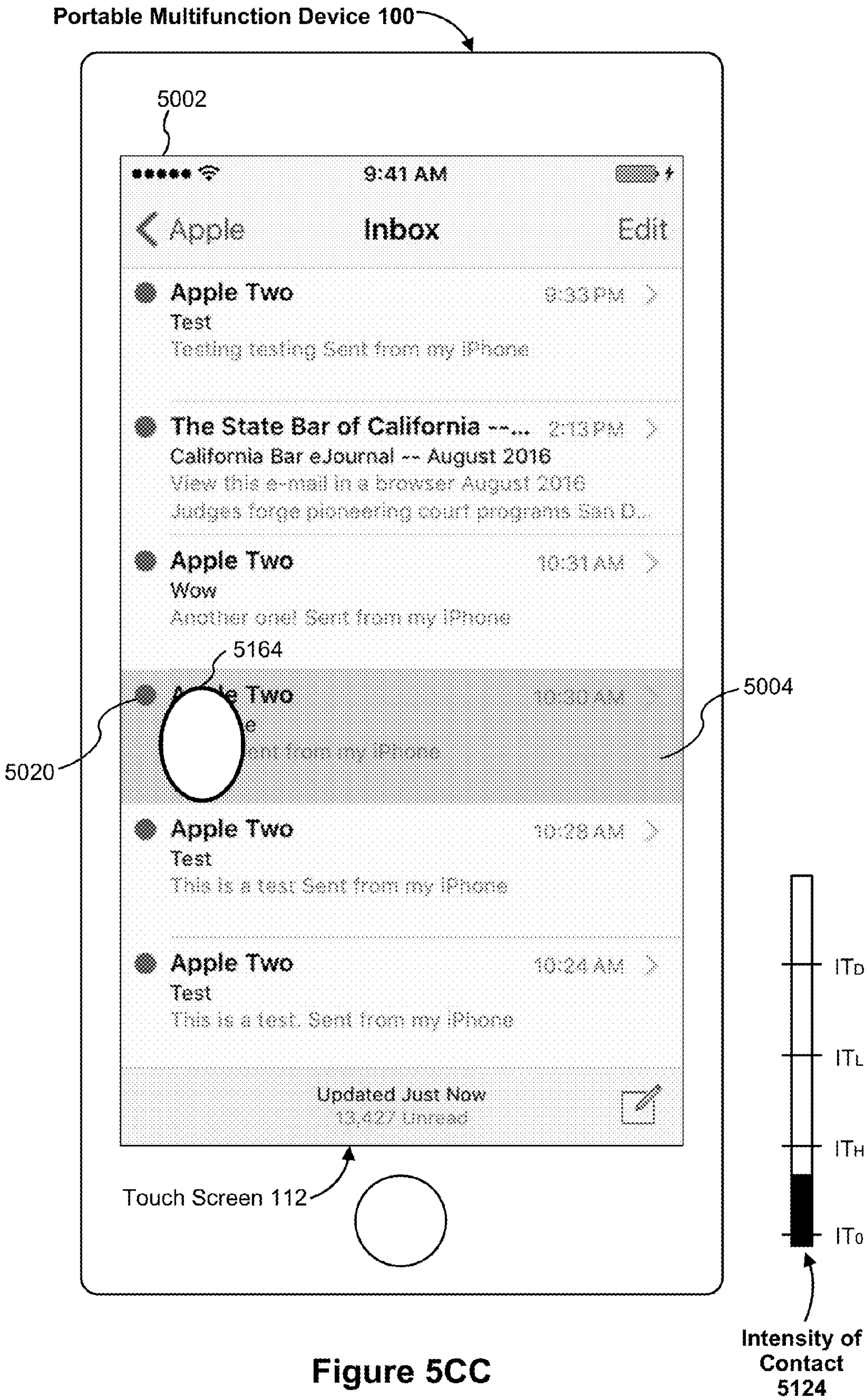
Figure 5C:
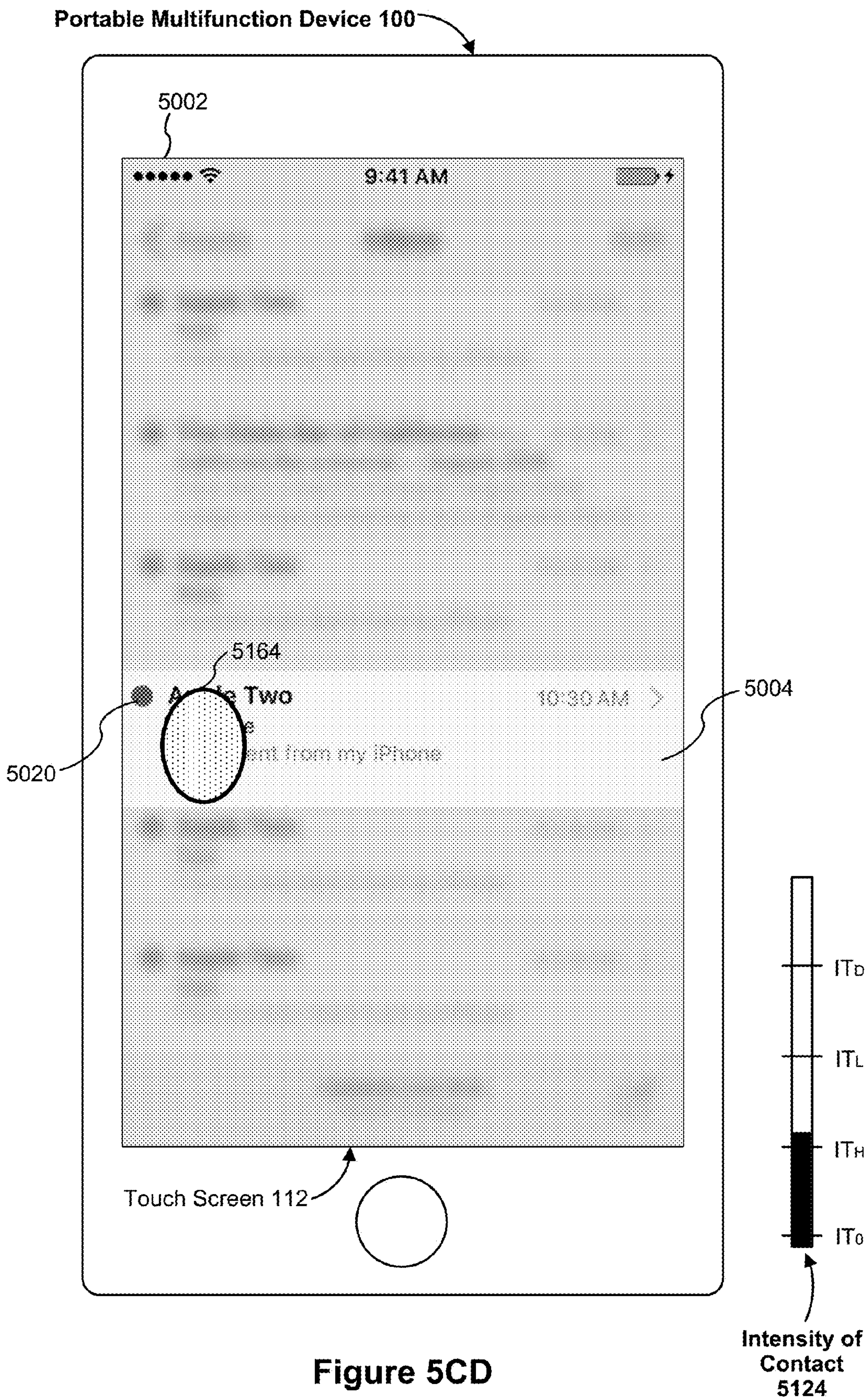
Figure 5C:
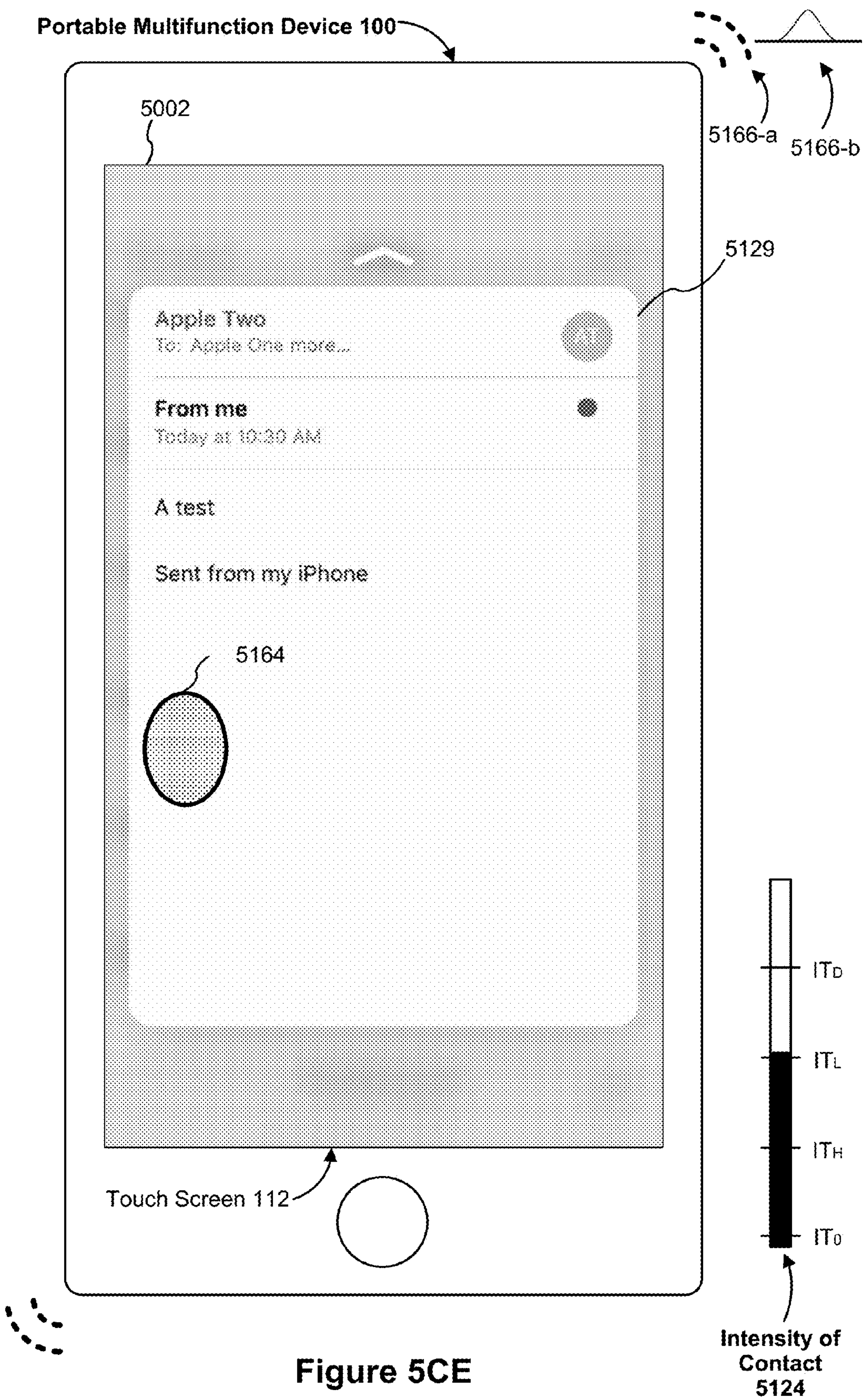
Figure 5C:
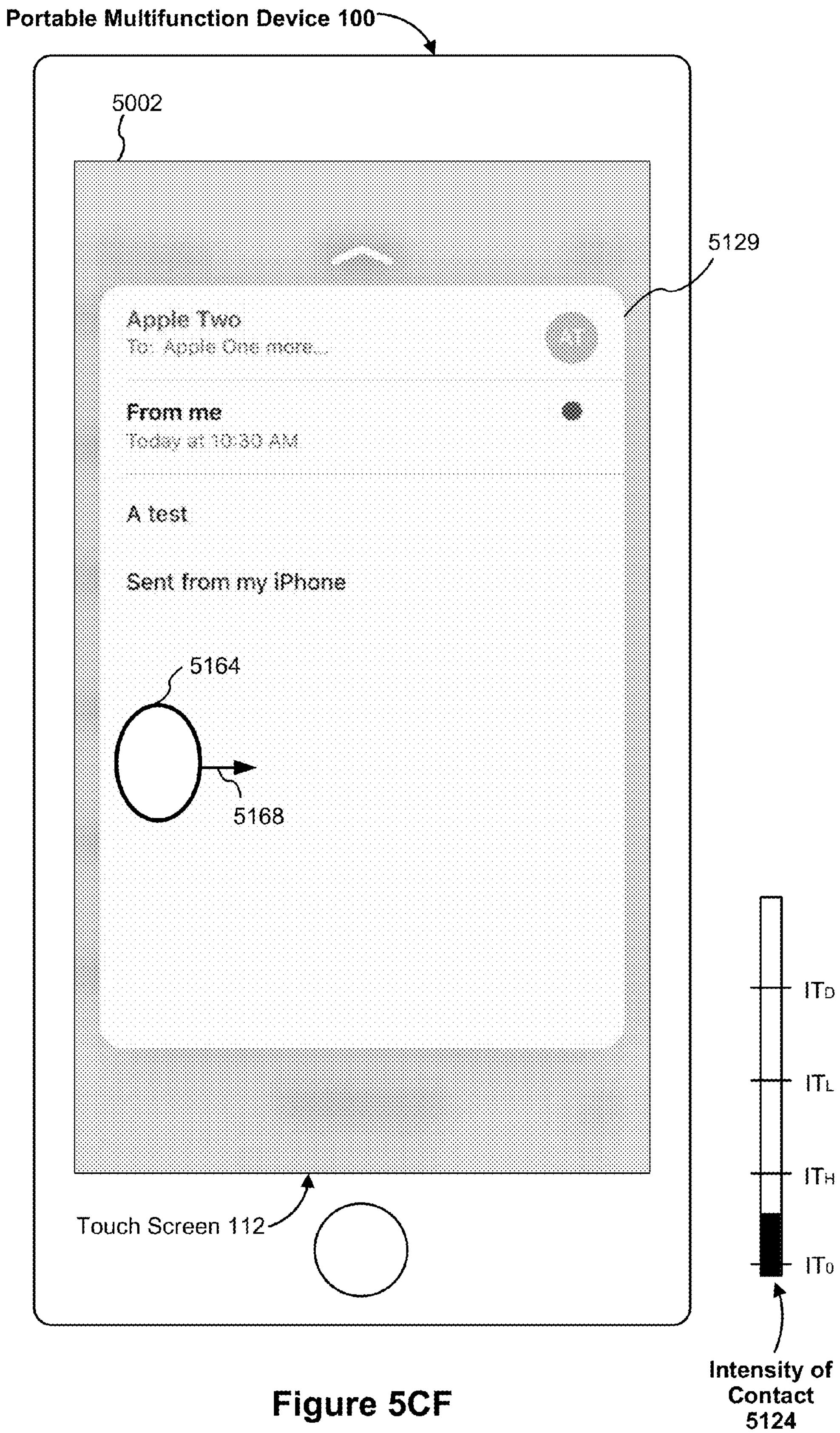
Figure 5C:
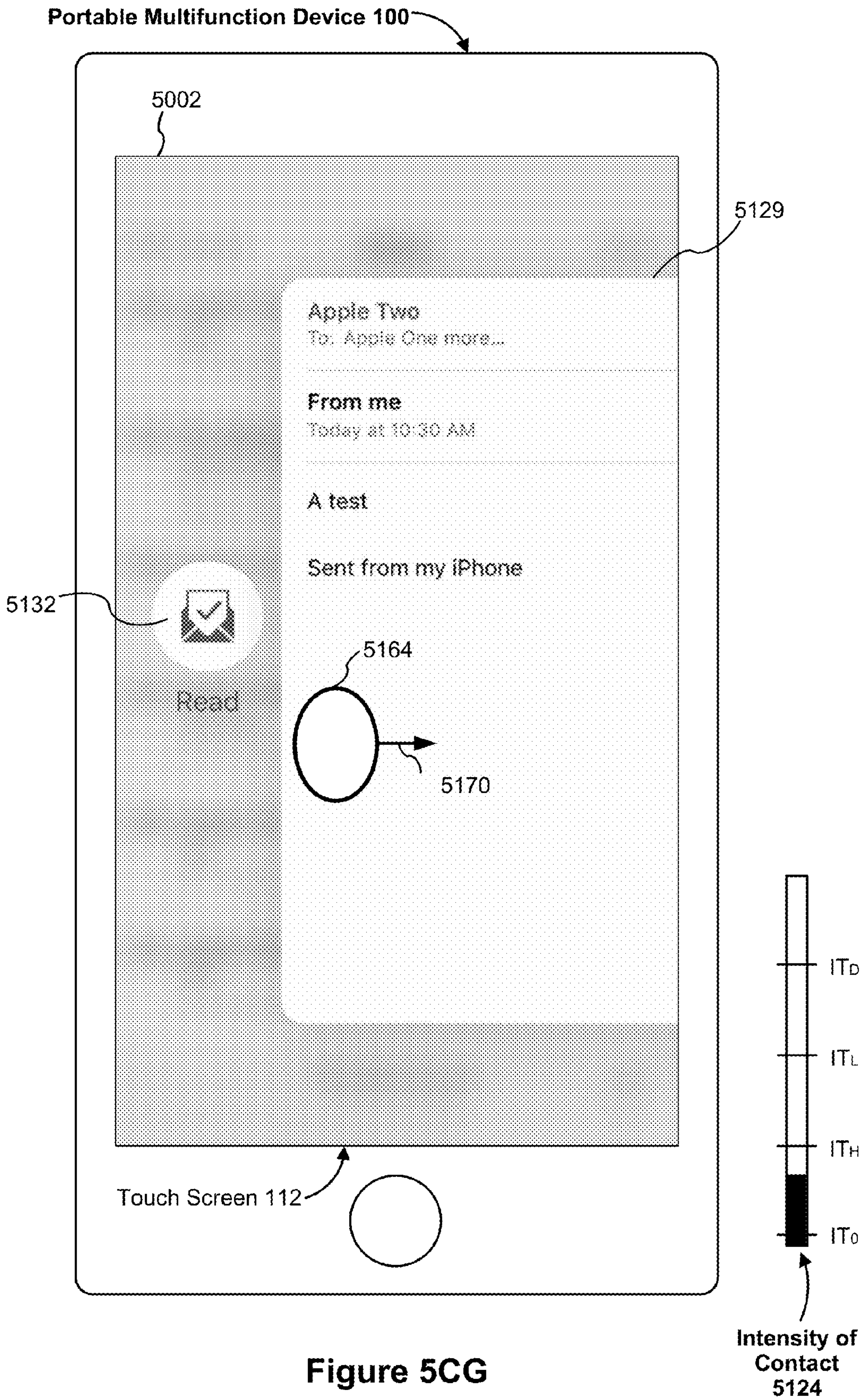
Figure 5C:
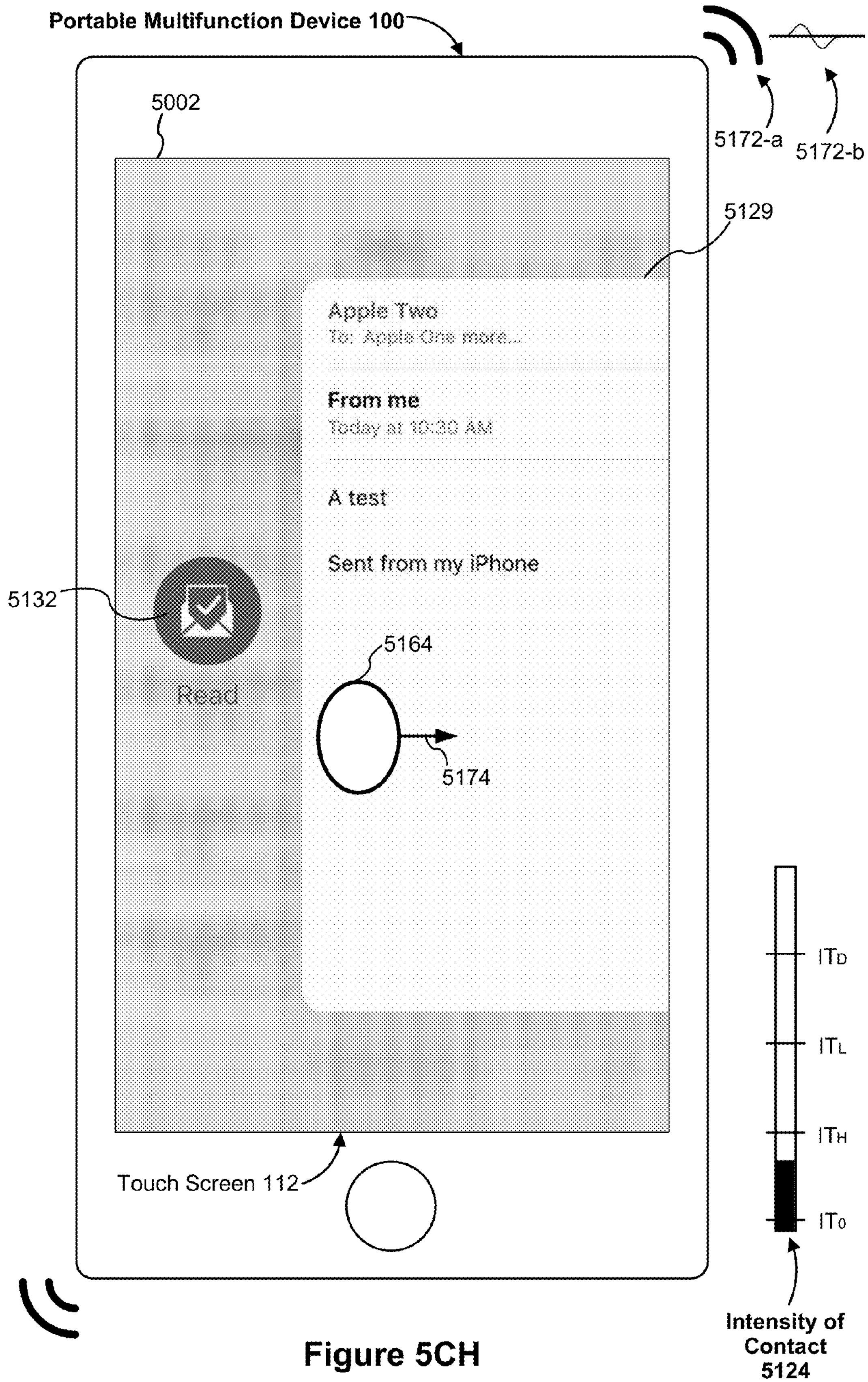
Figure 5C:
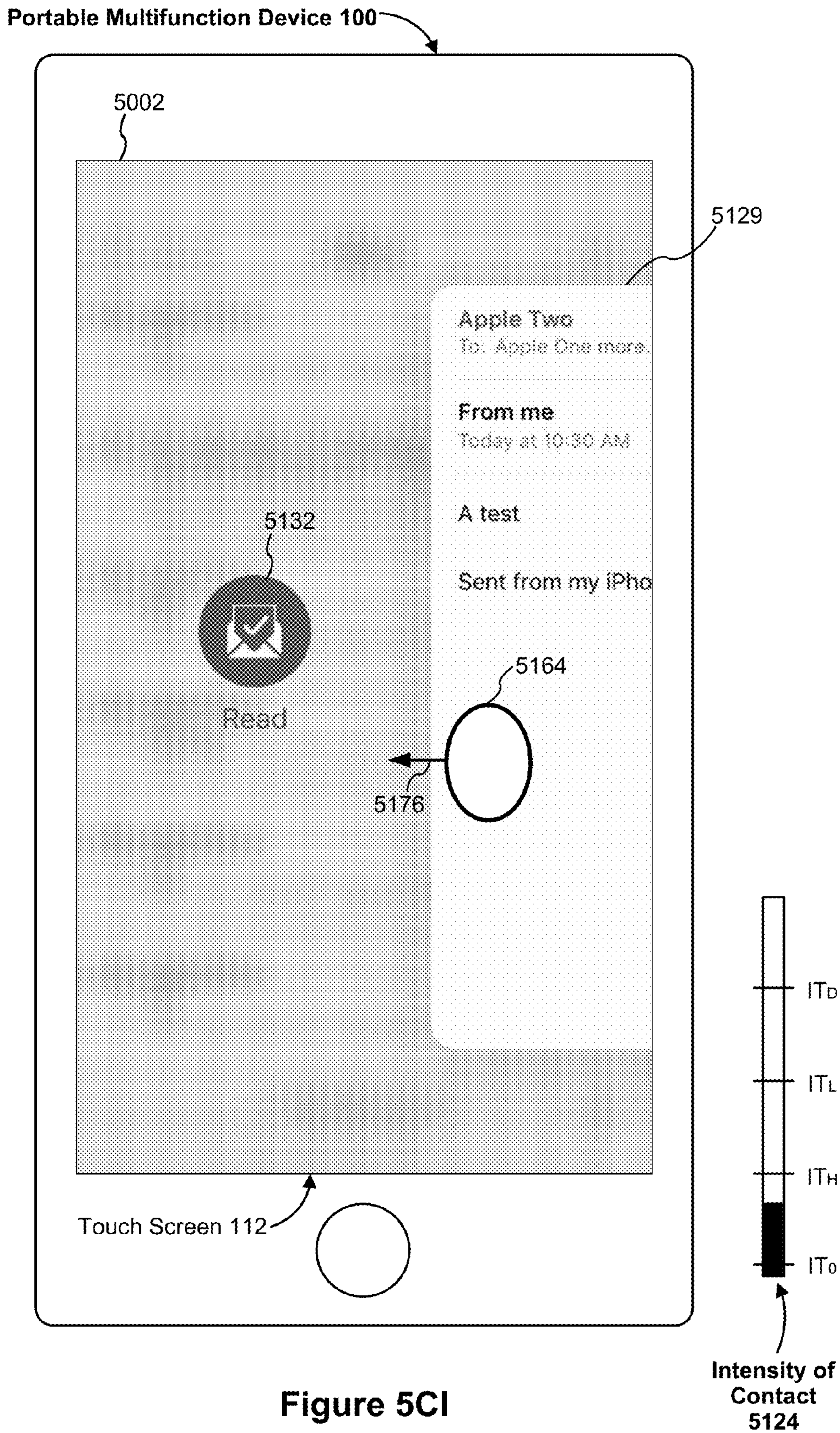
Figure 5C:
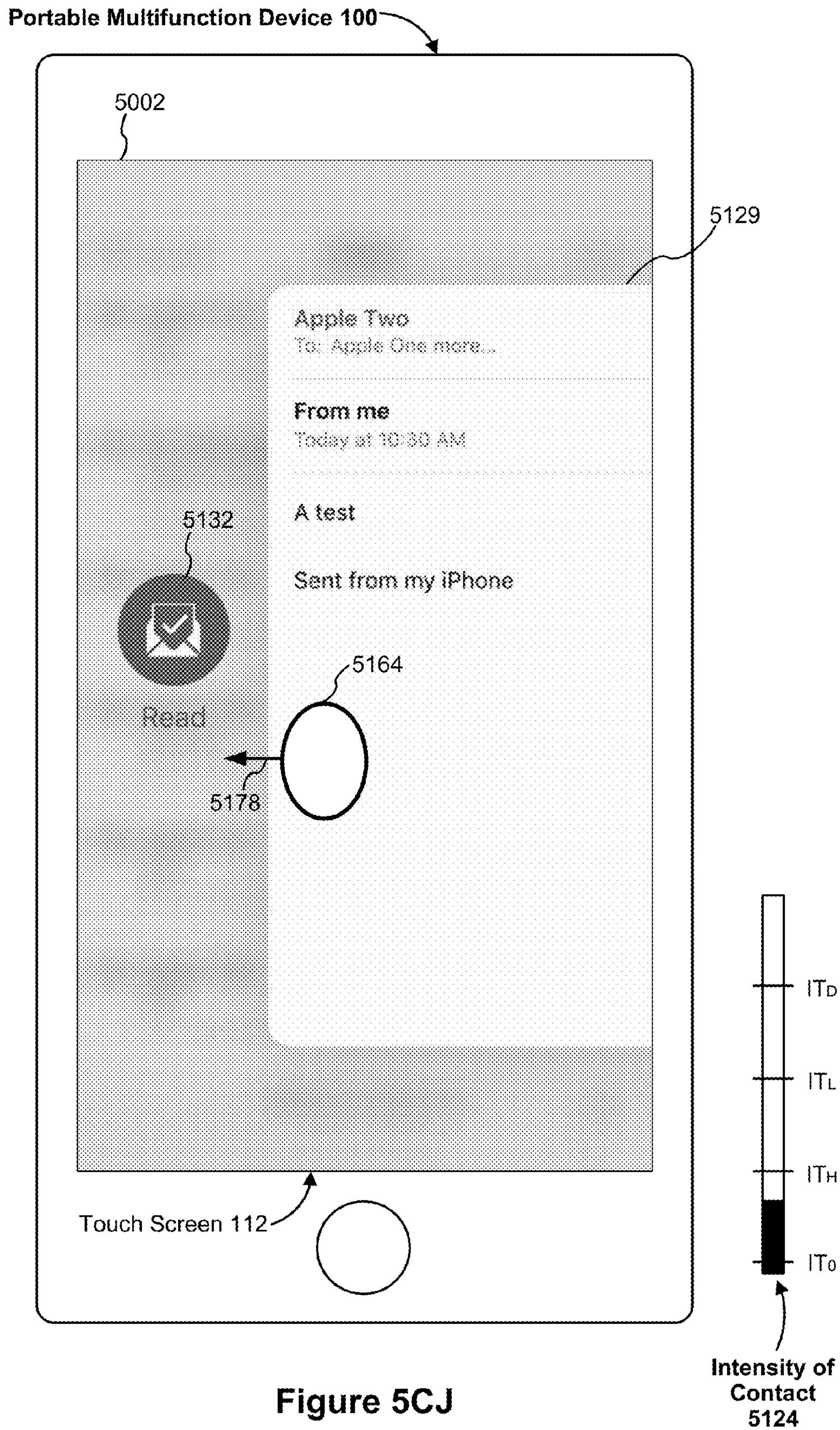
Figure 5C:
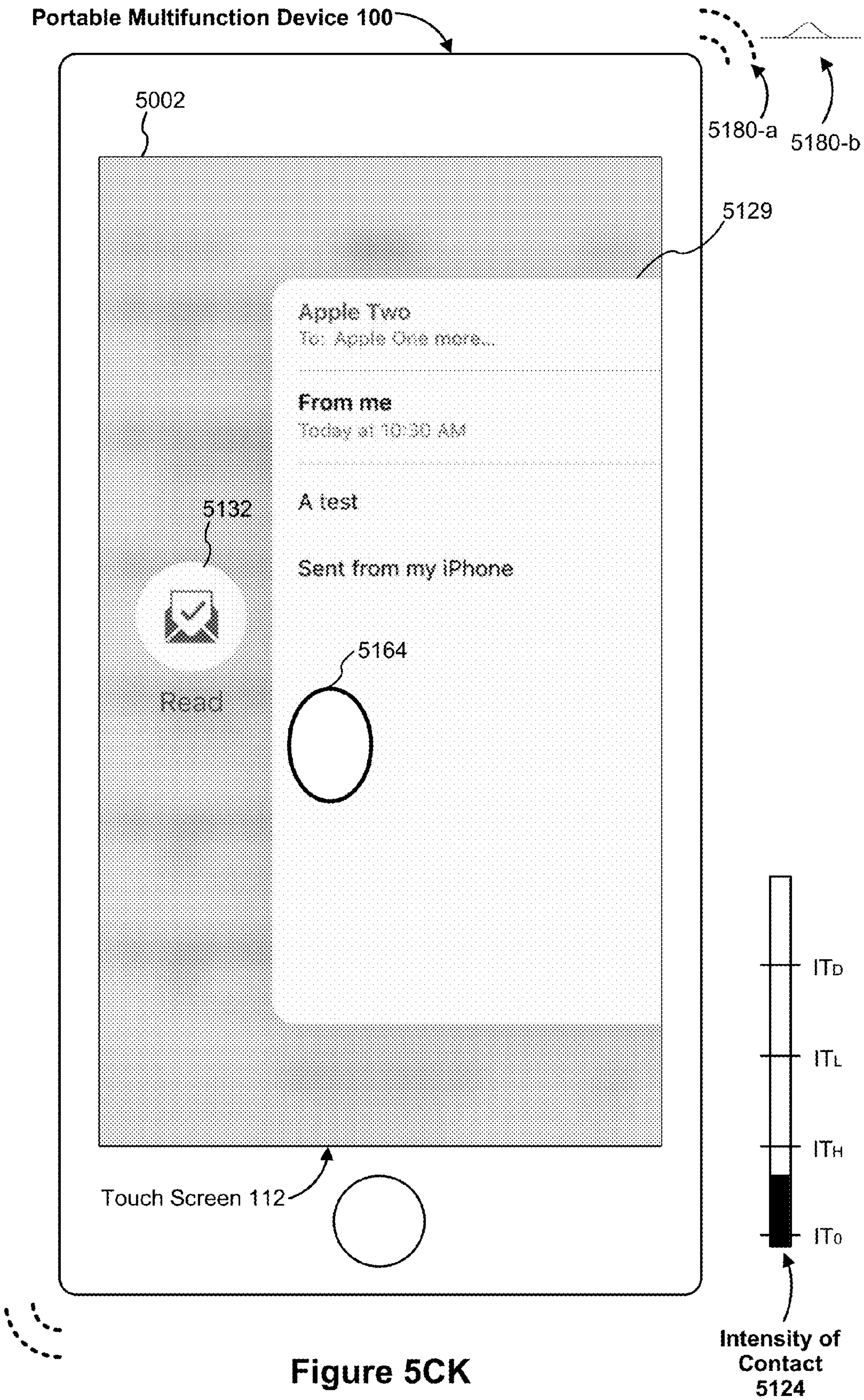
Figure 5C:
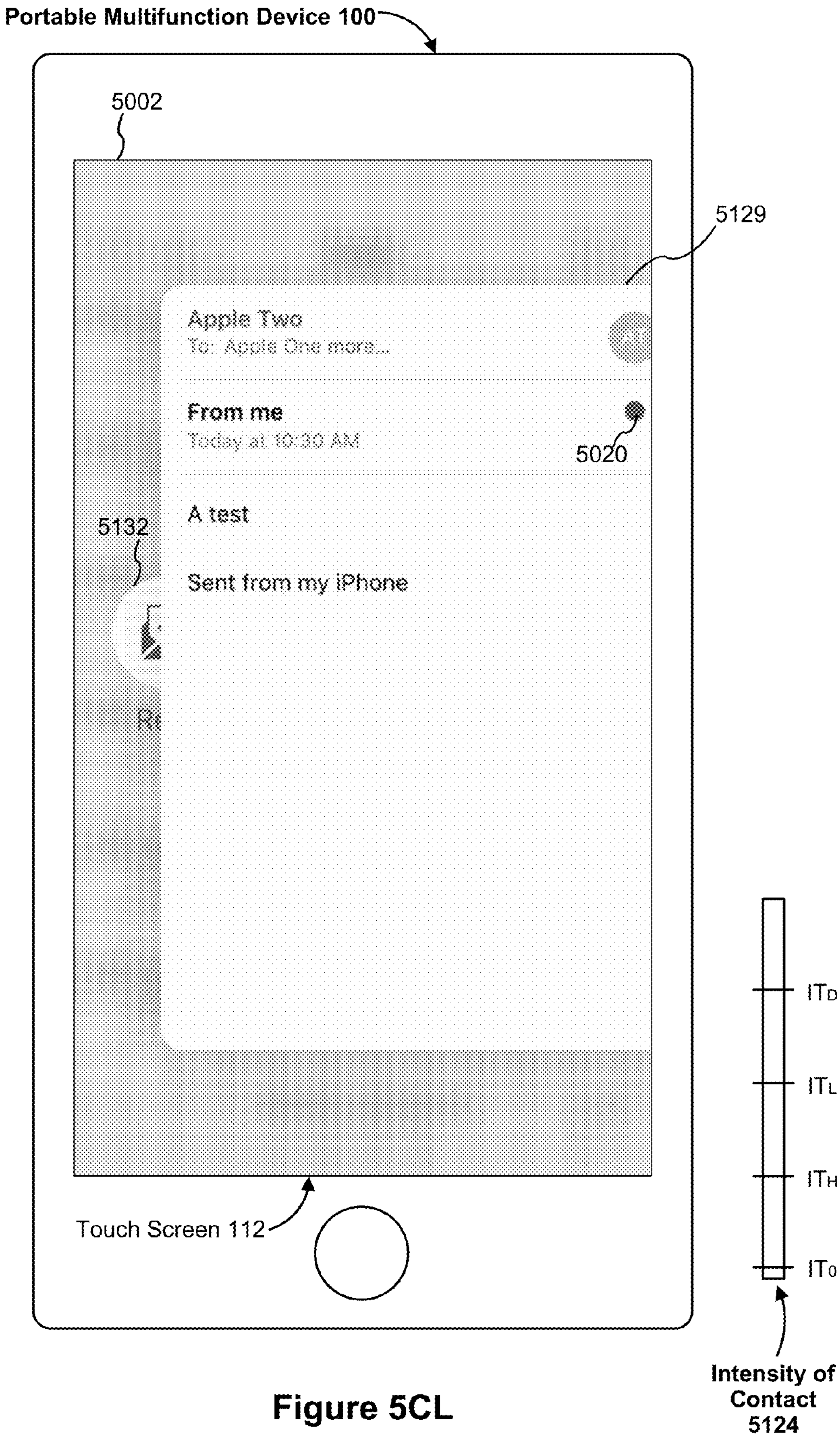
Figure 5C:
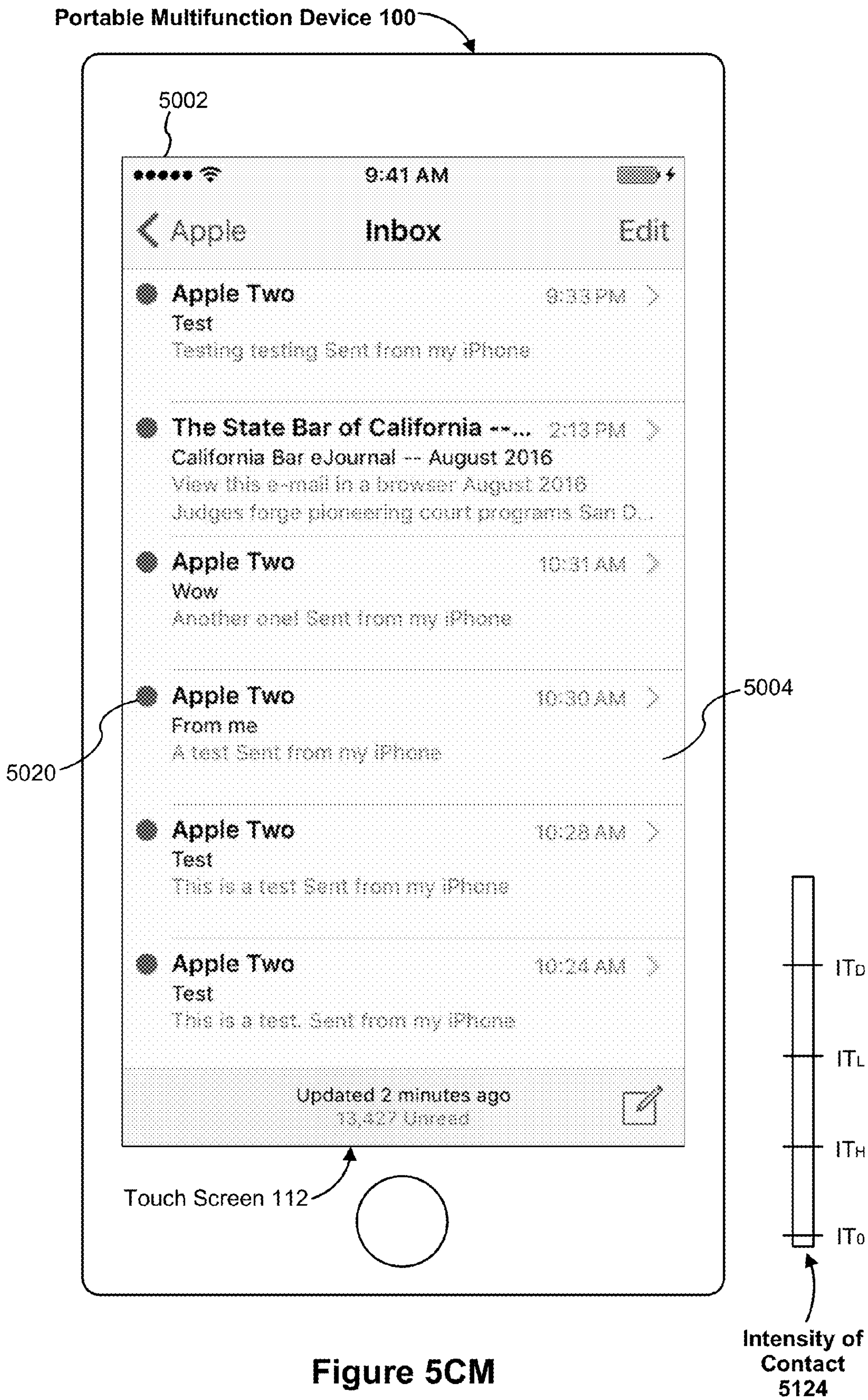
Figure 5C:
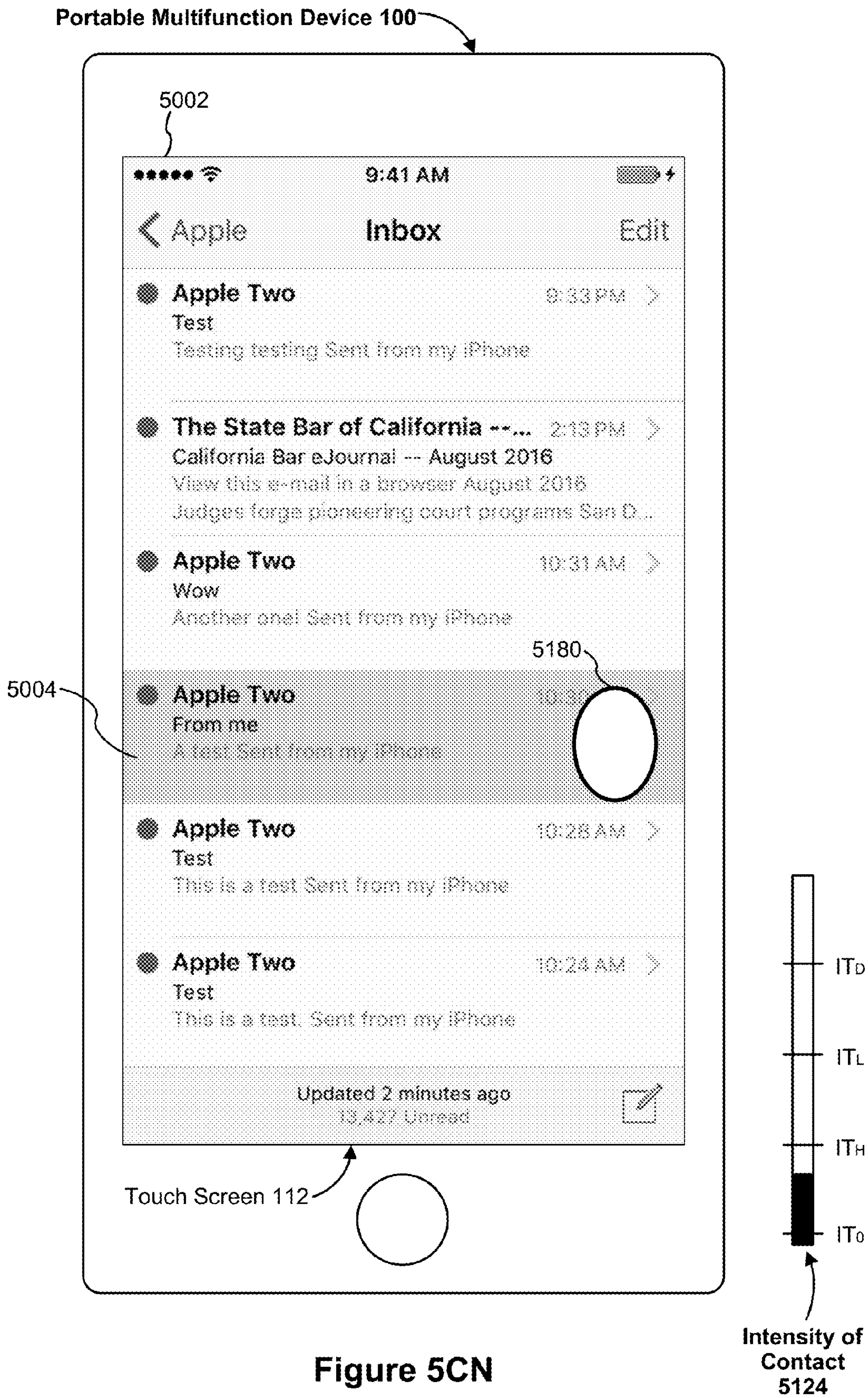
Figure 5C:
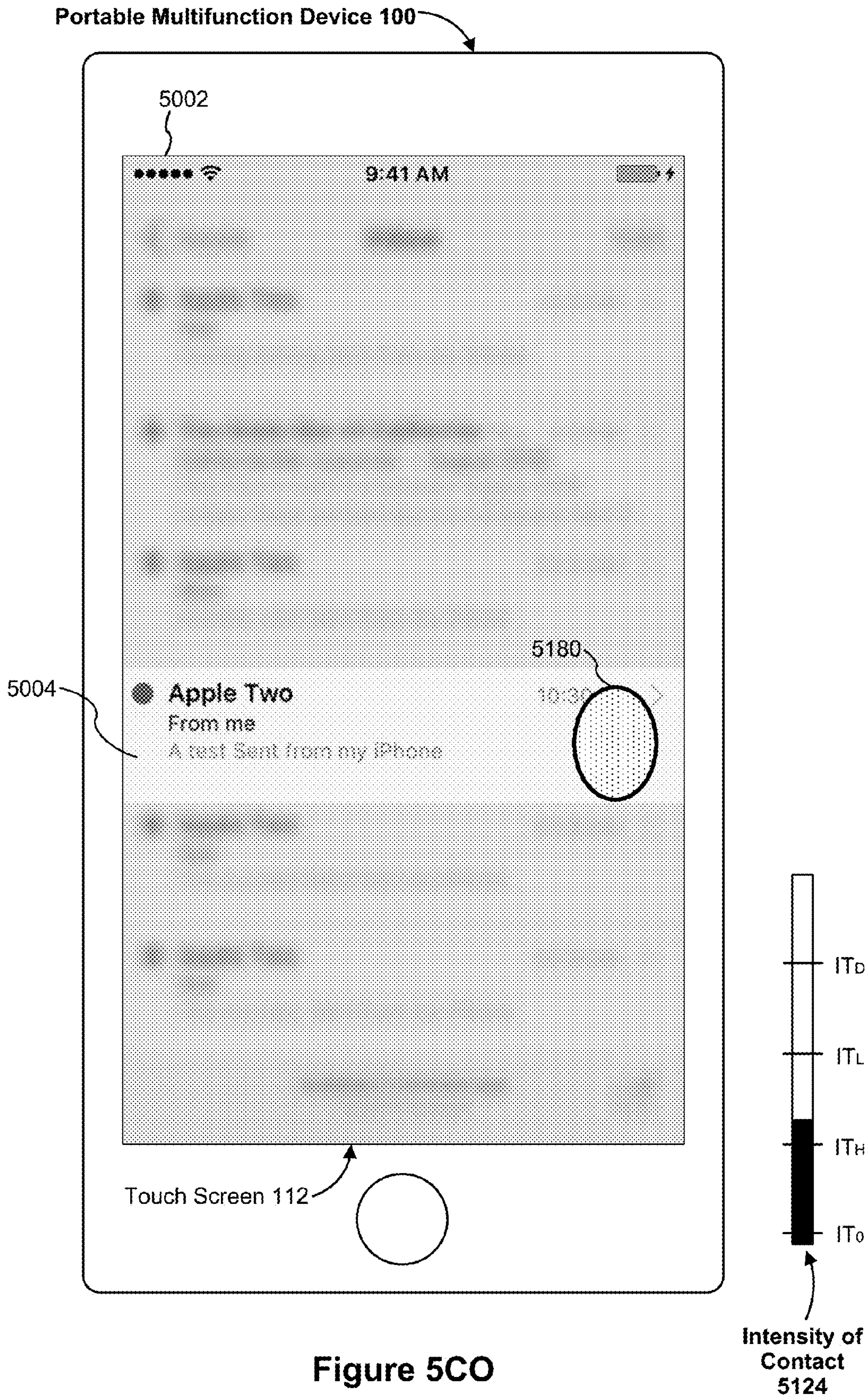
Figure 5C:
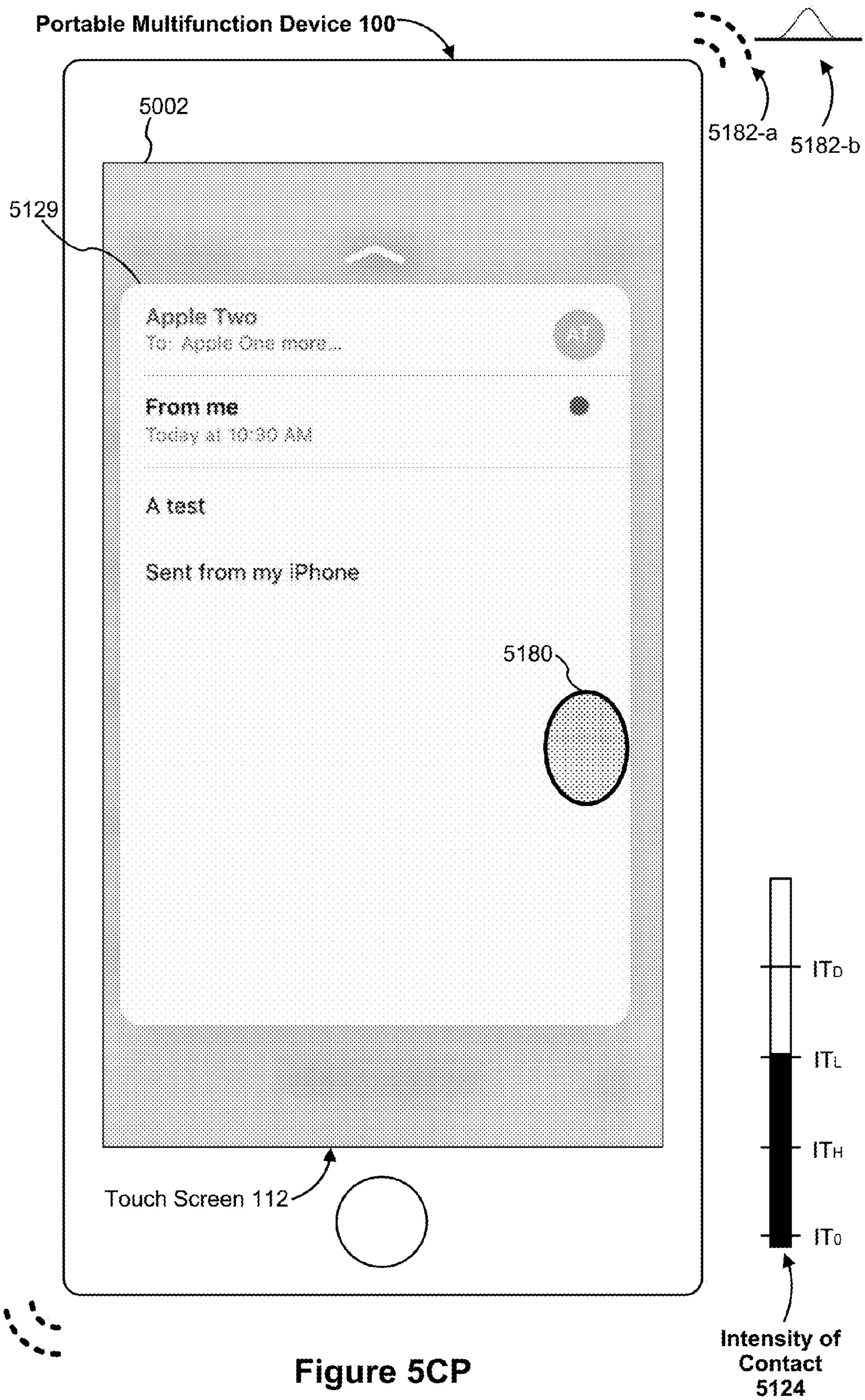
Figure 5C:
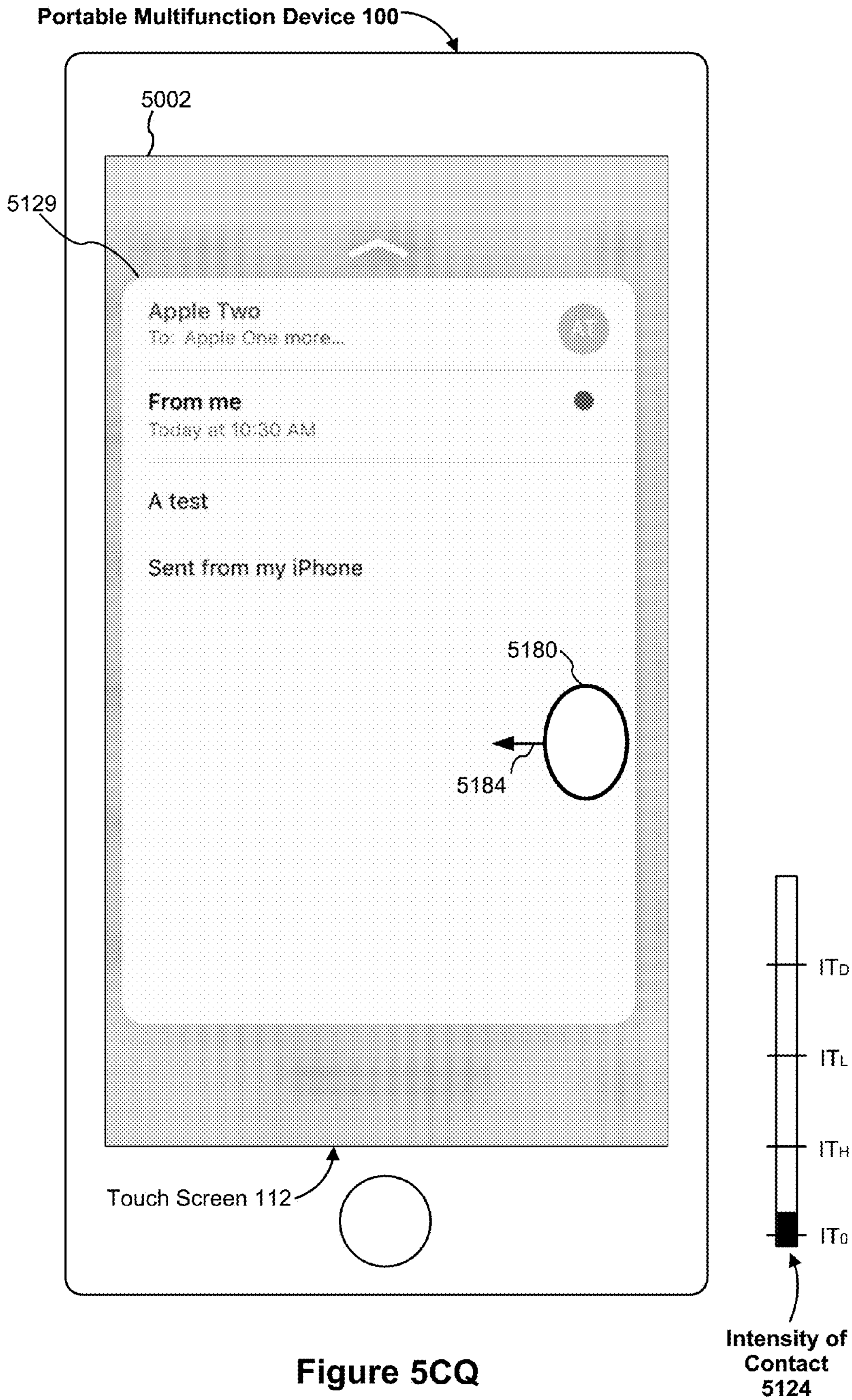
Figure 5C:
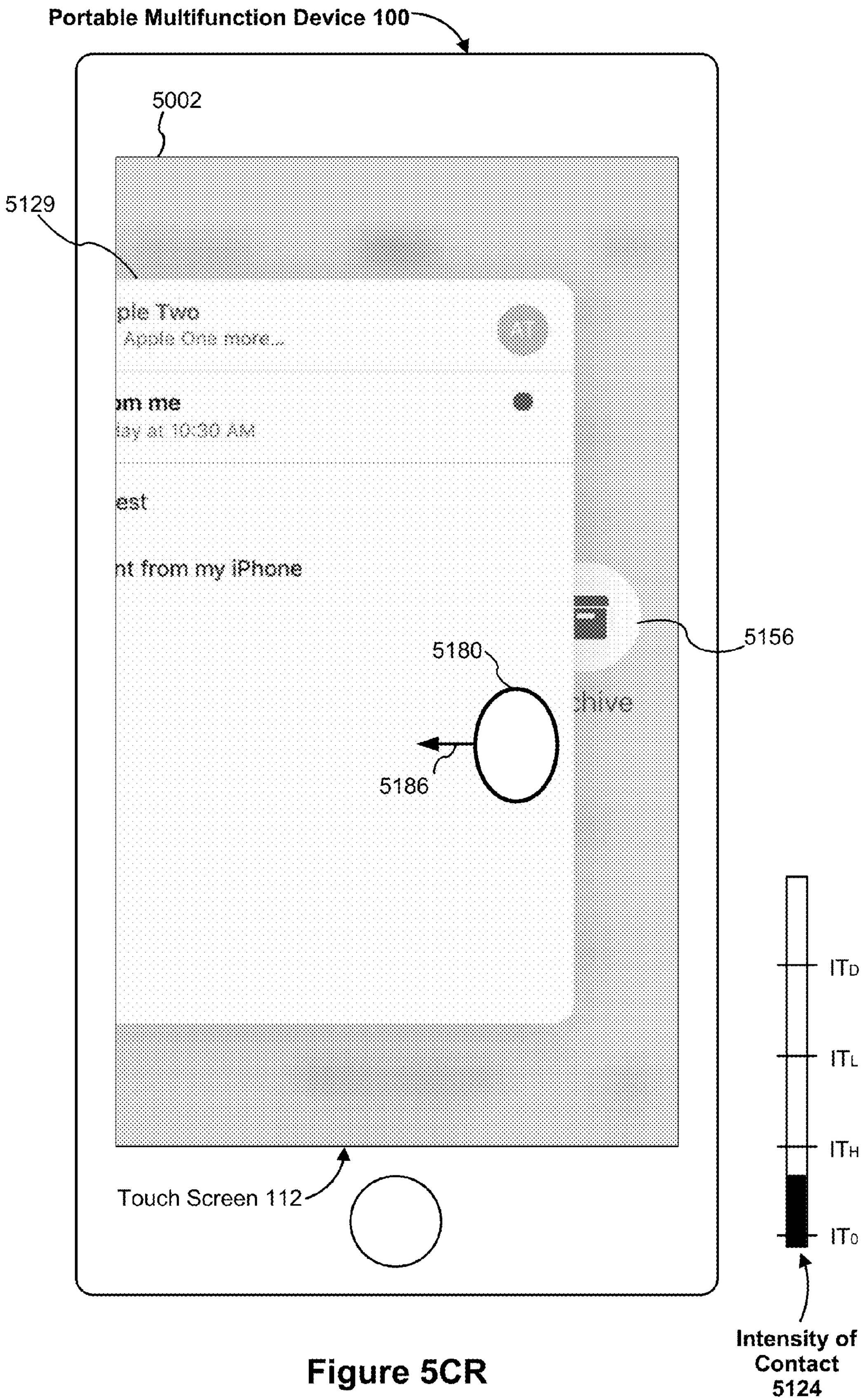
Figure 5C:
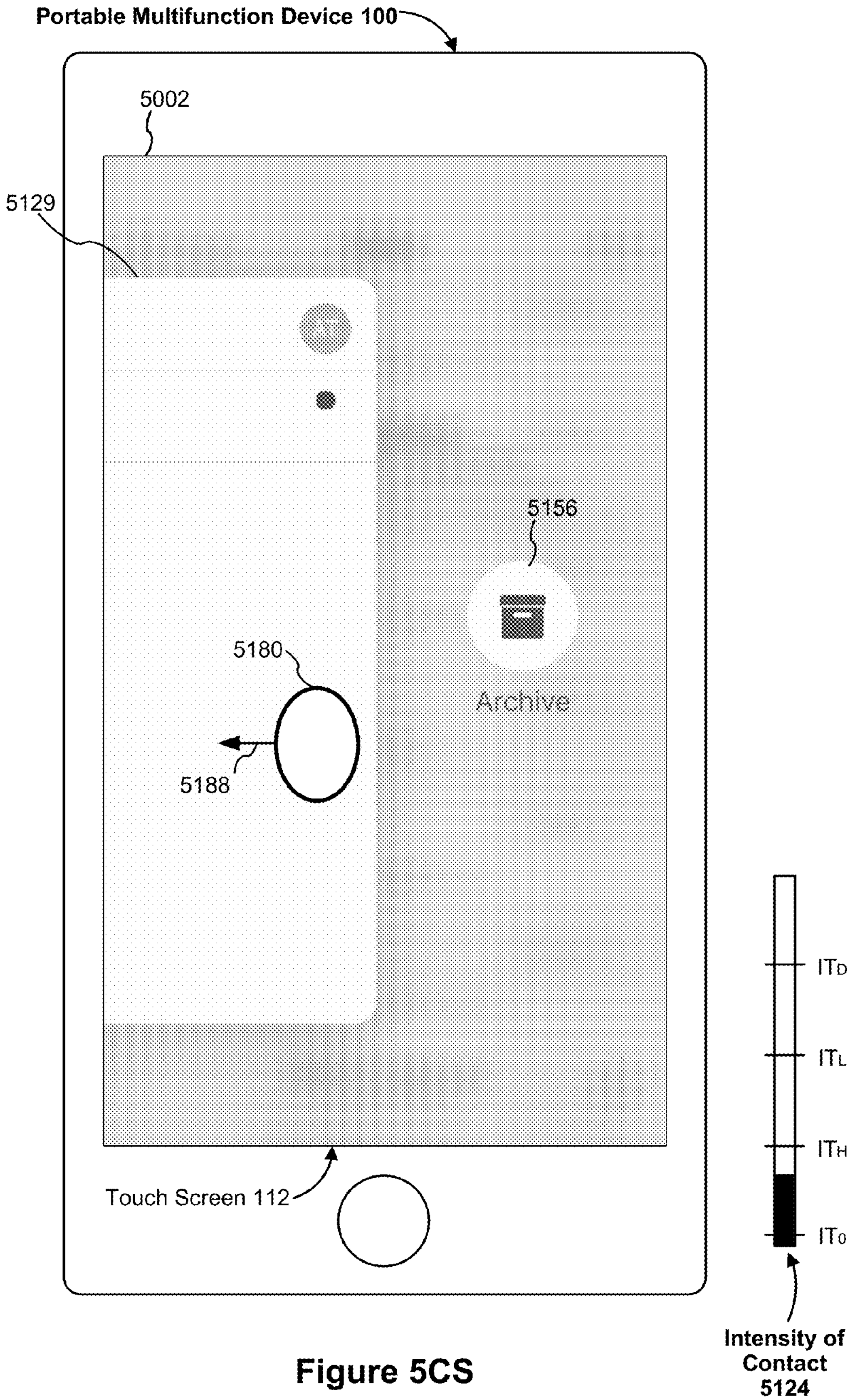
Figure 5C:
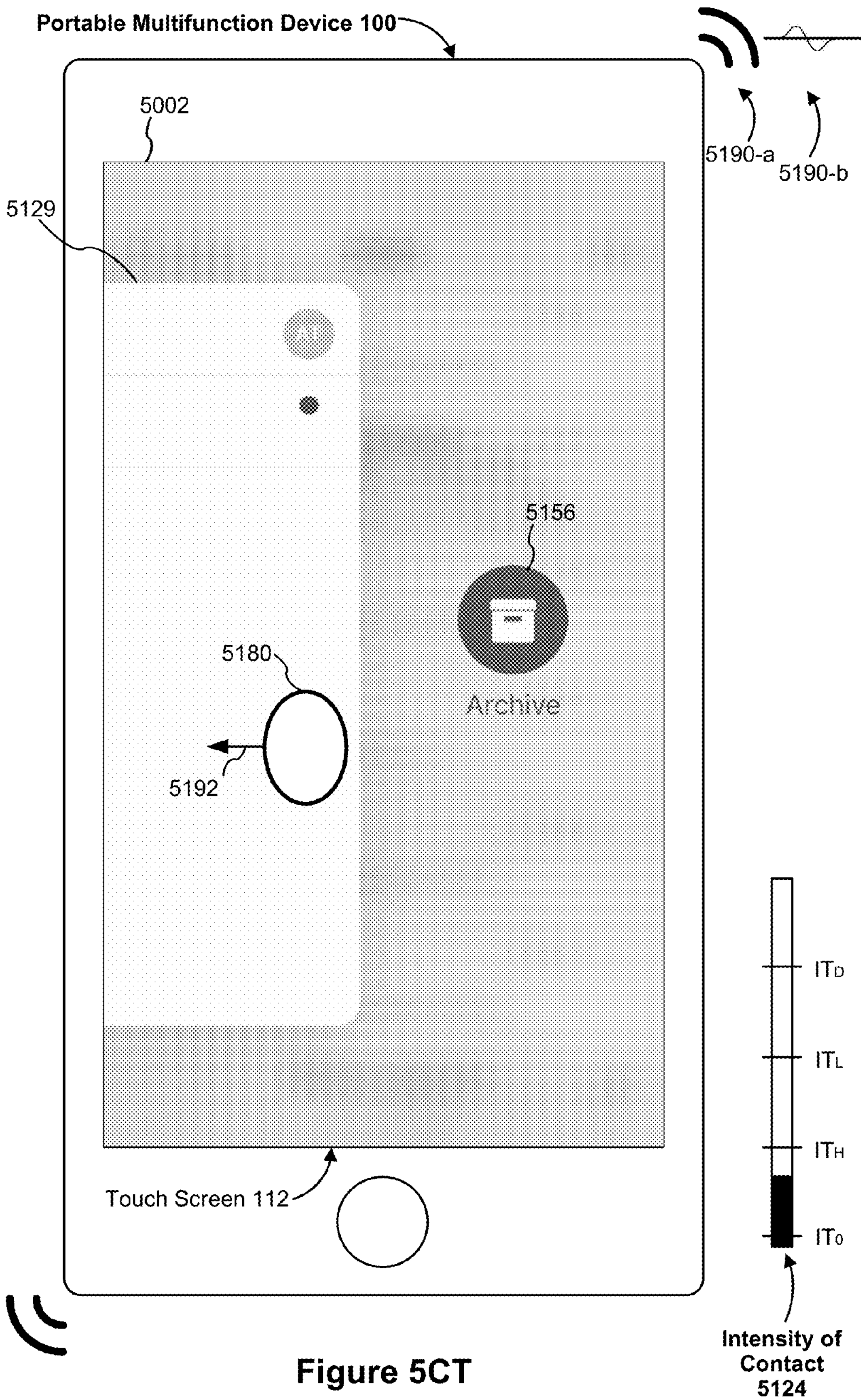
Figure 5C:
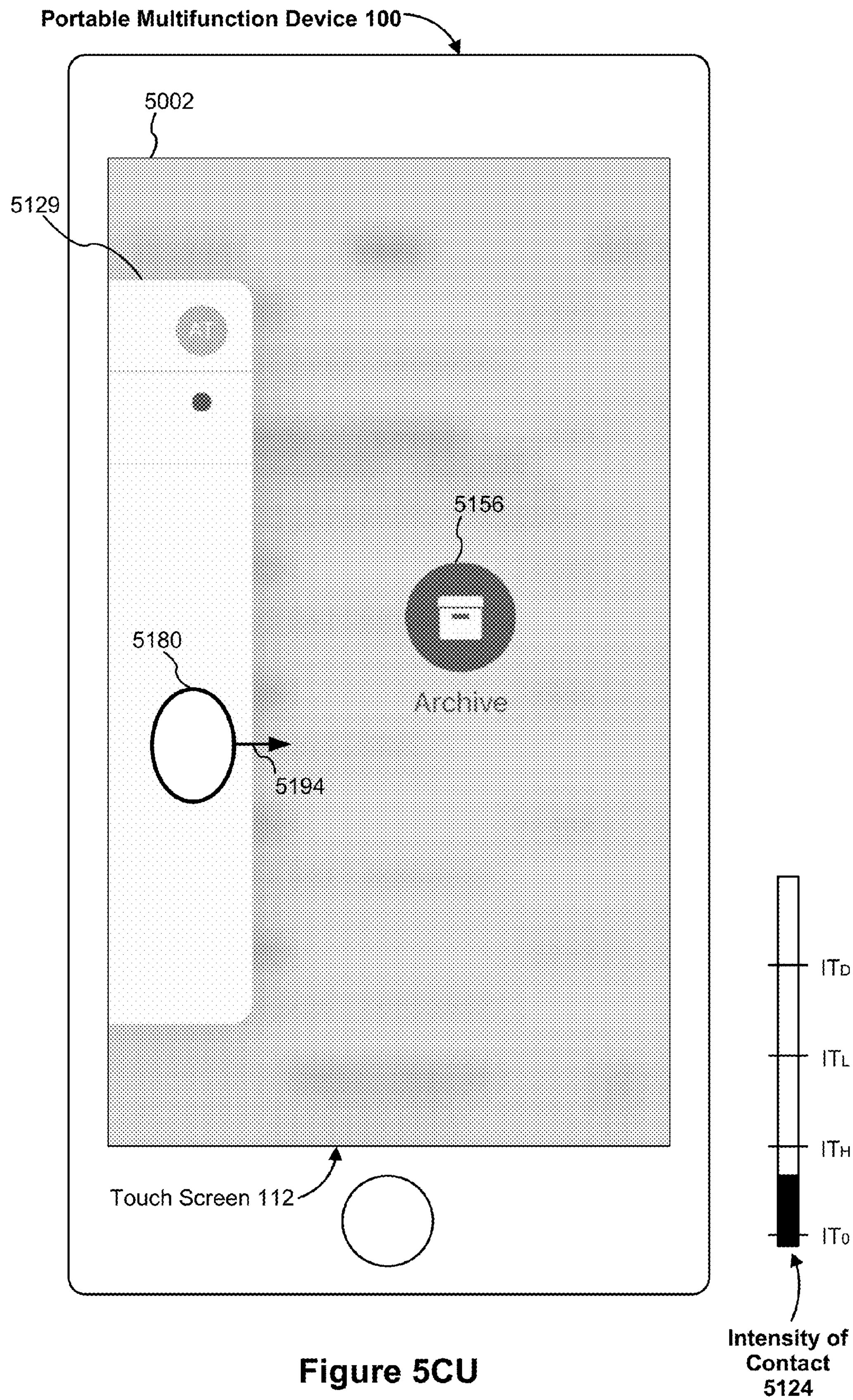
Figure 5C:
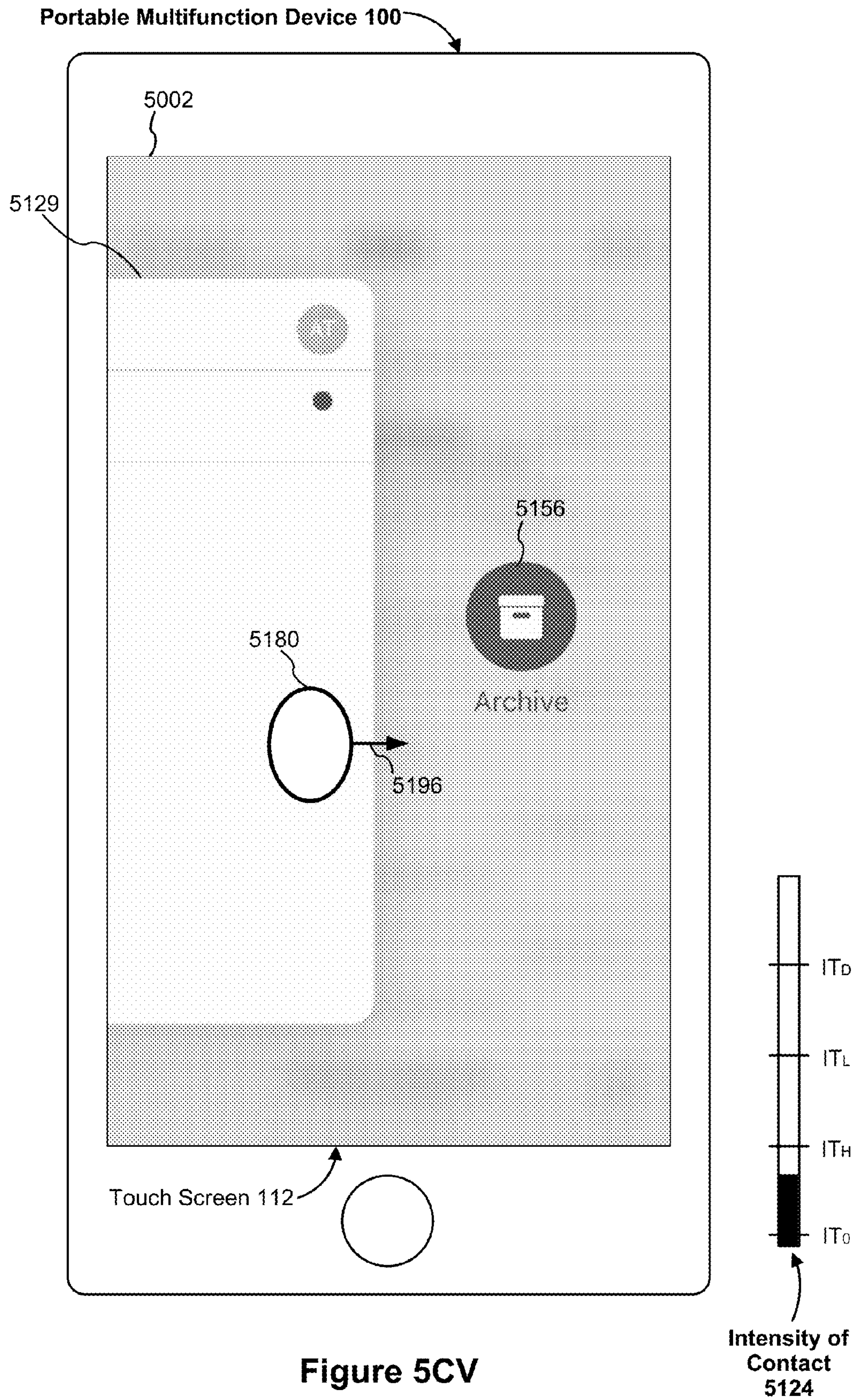
Figure 5C:
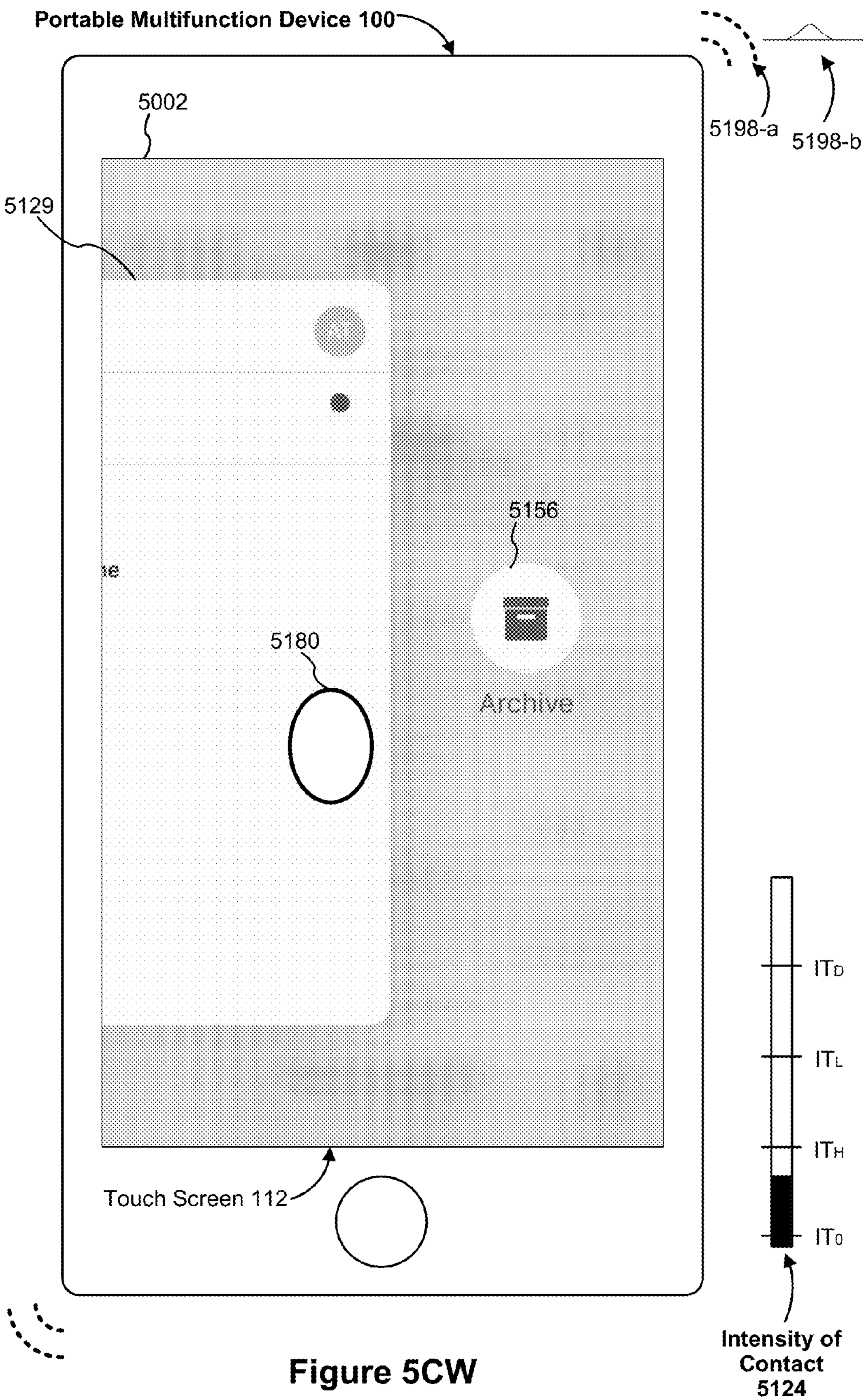
Figure 5C:
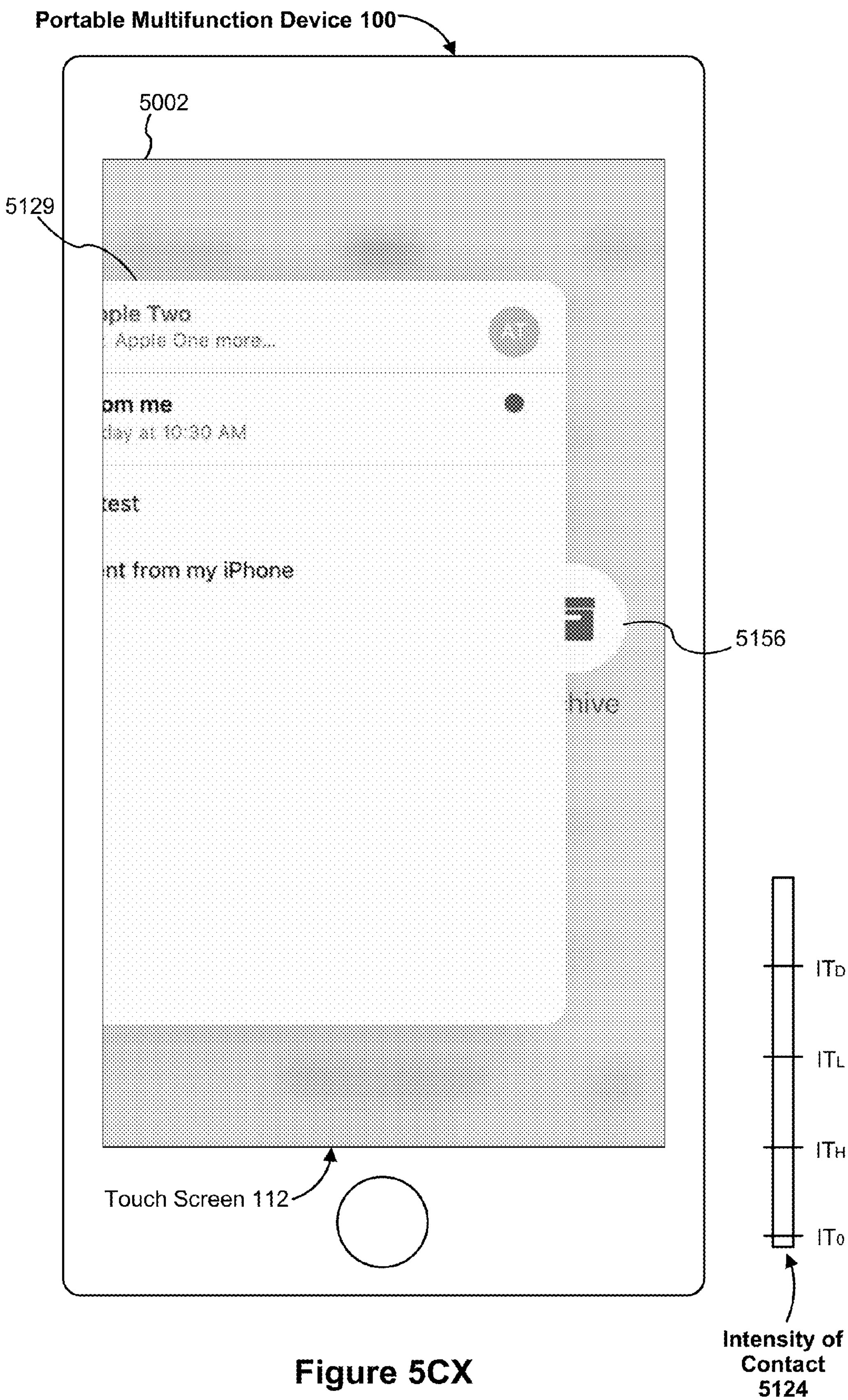
Figure 5C:
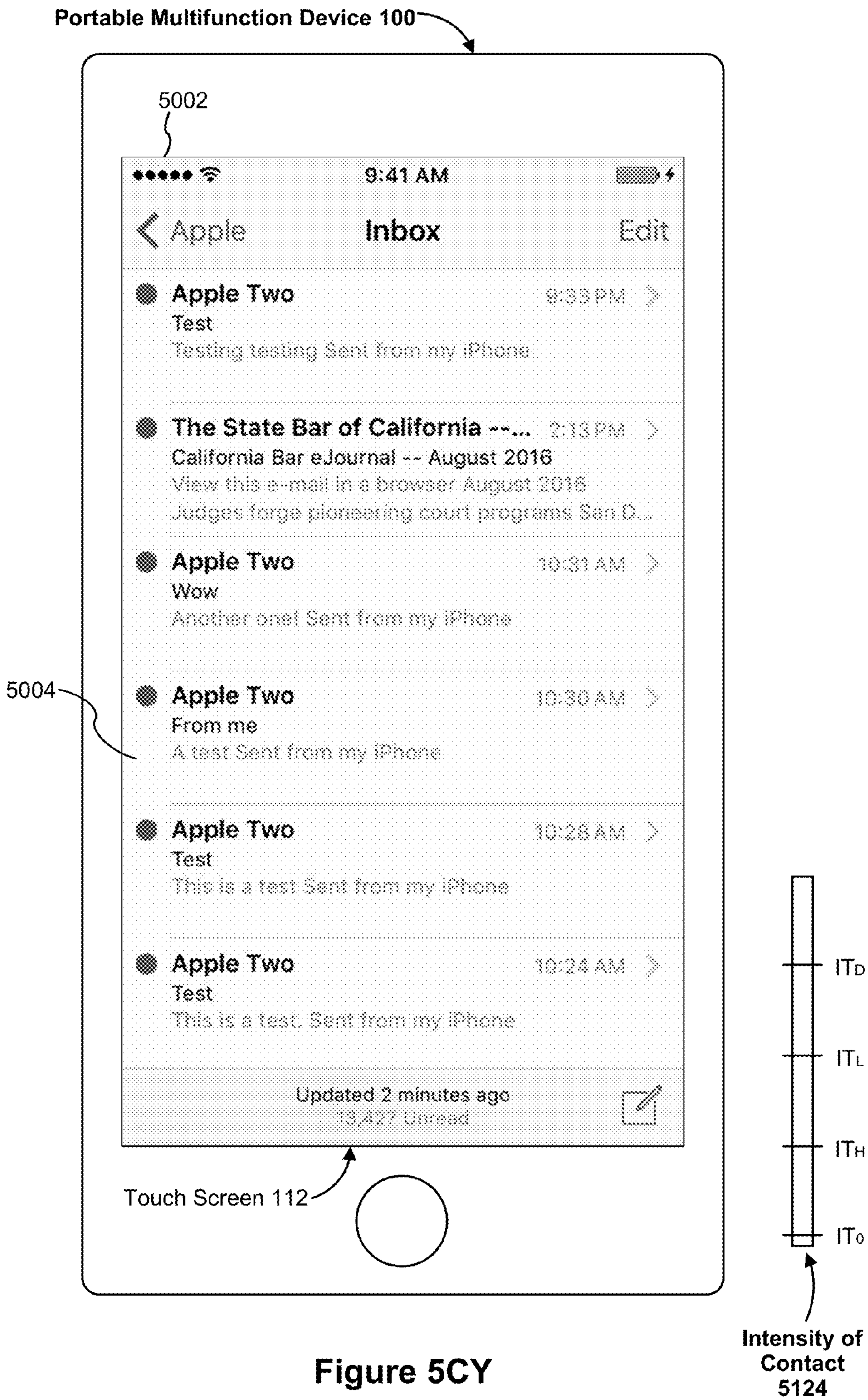
Figure 5C:
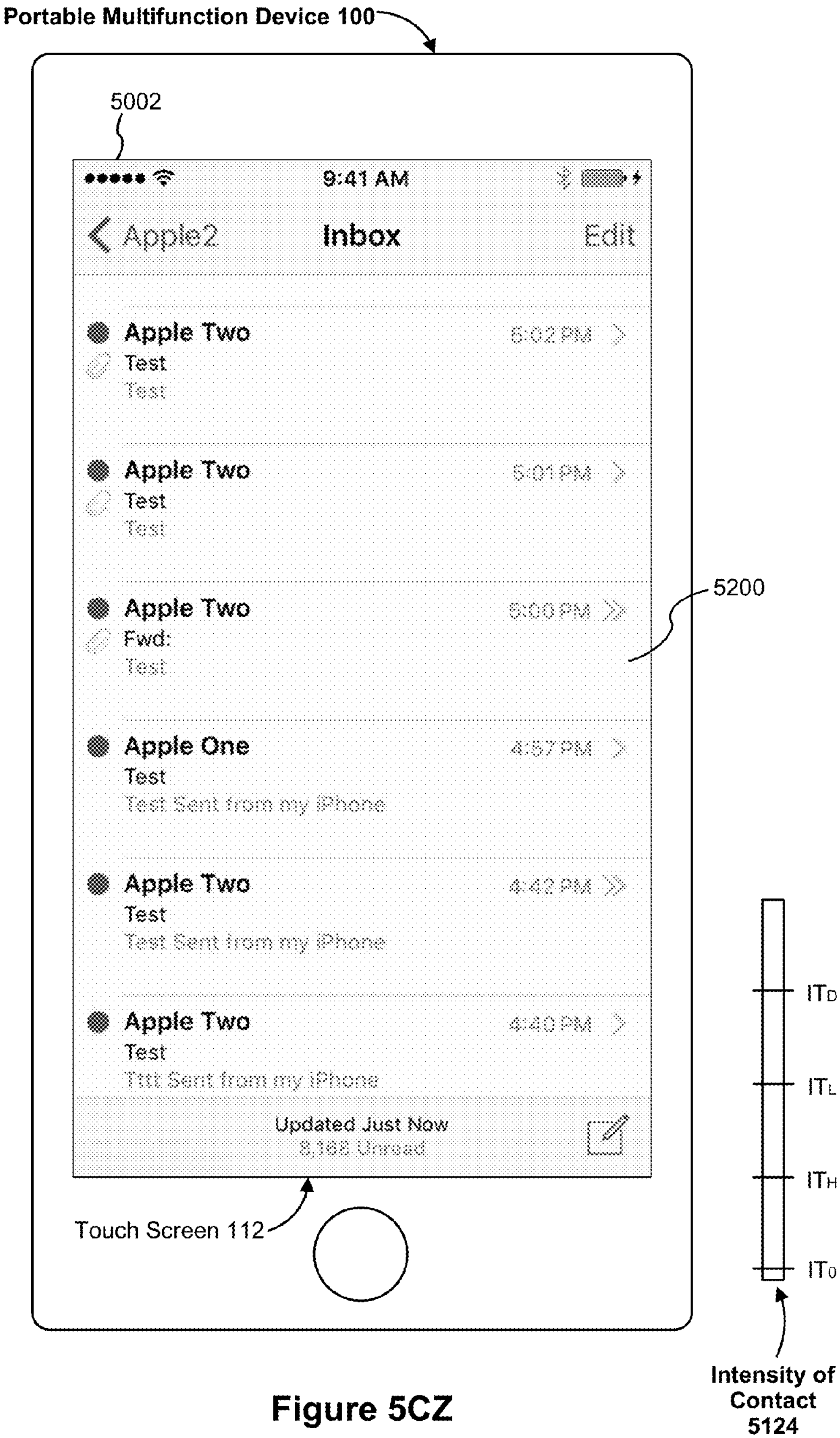
Figure 5D:
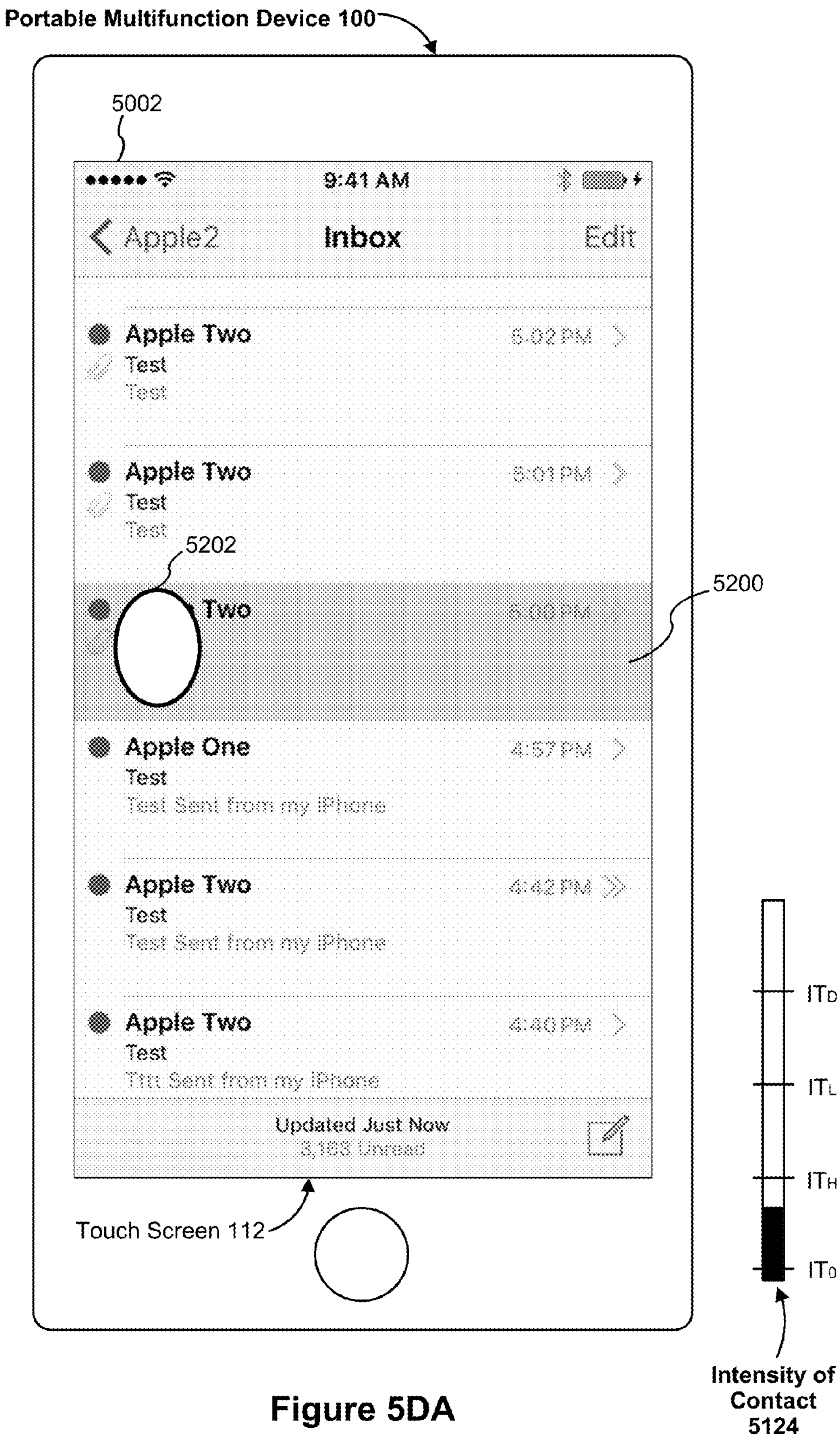
Figure 5D:
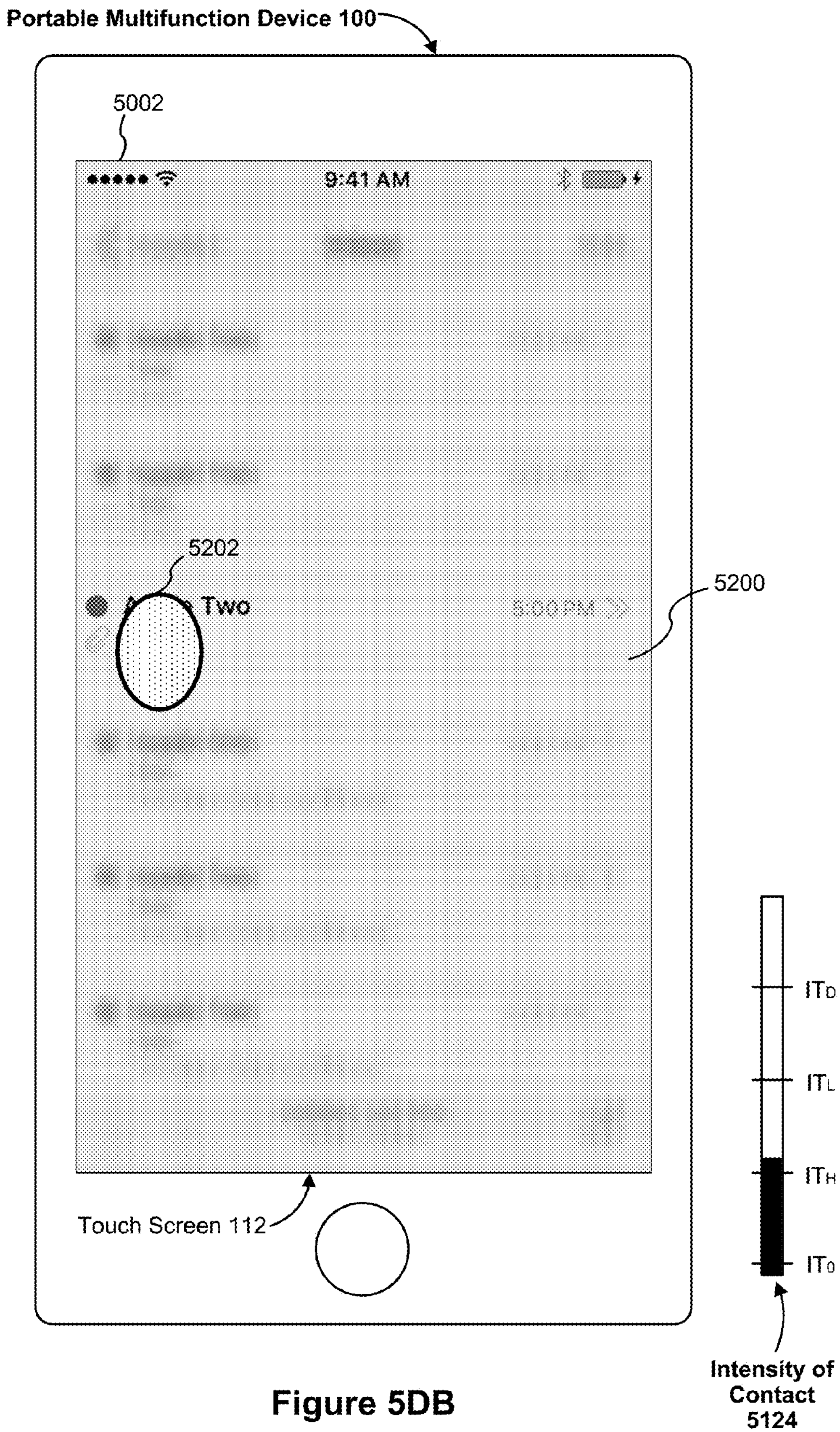
Figure 5D:
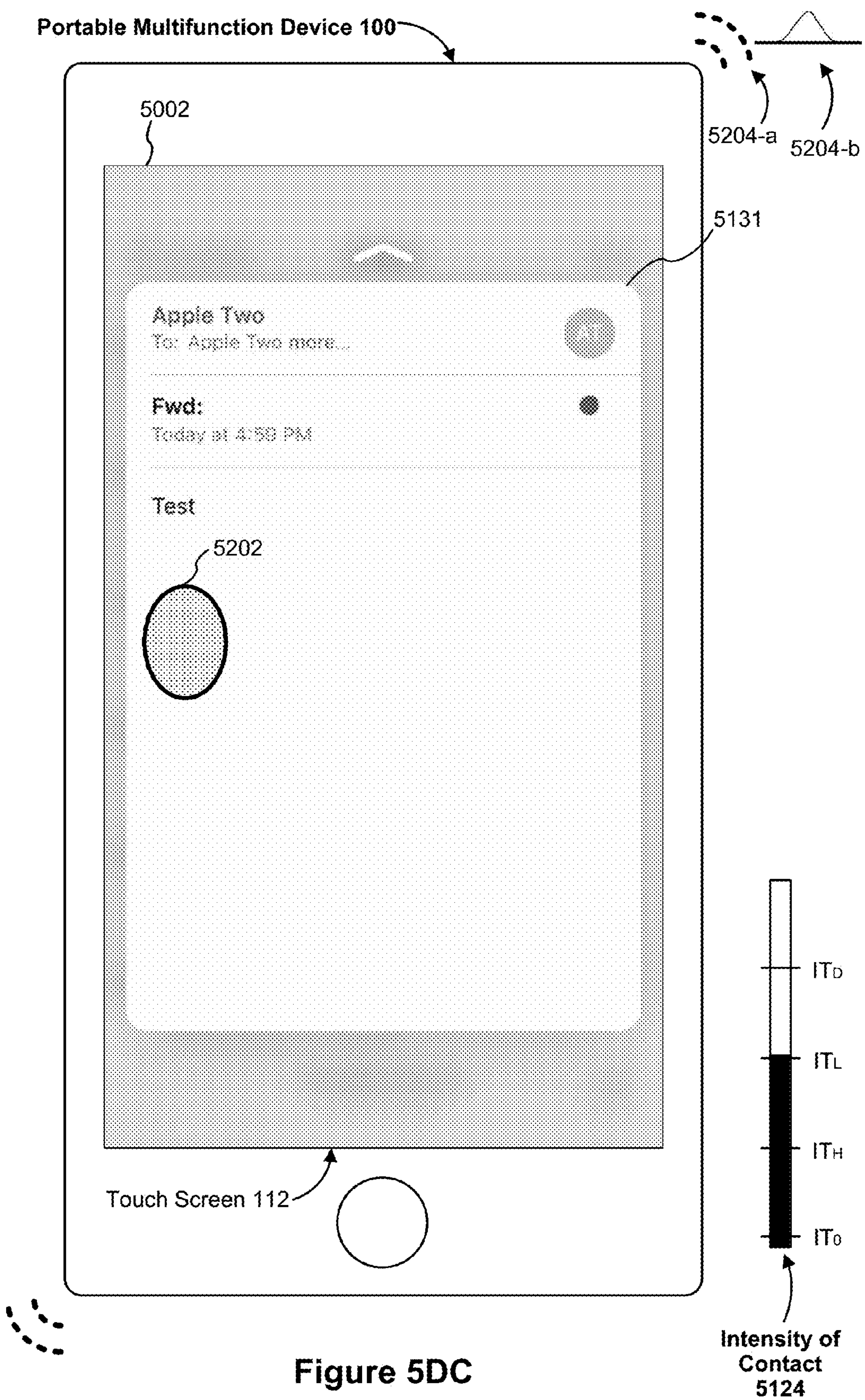
Figure 5D:
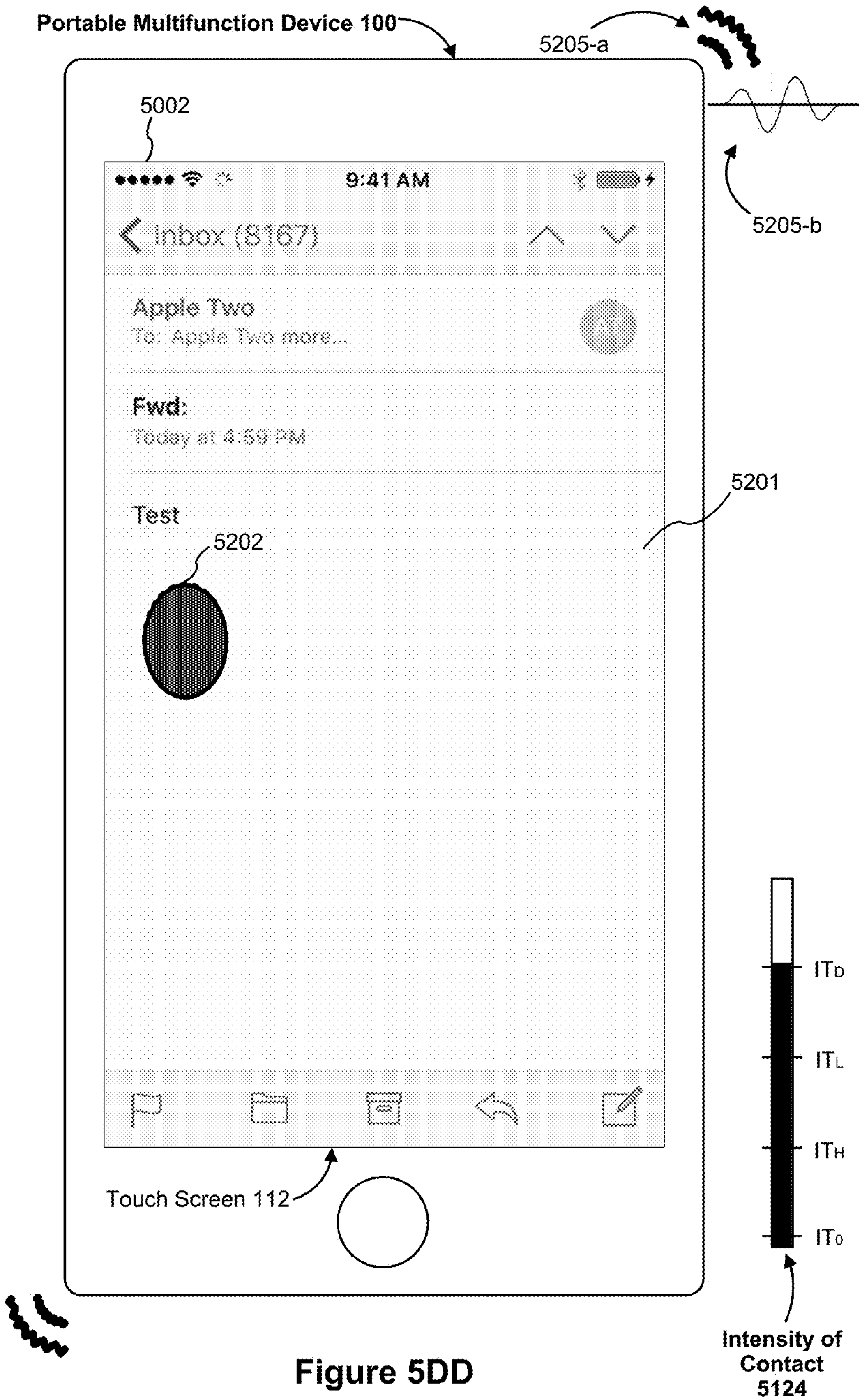
Figure 5D:
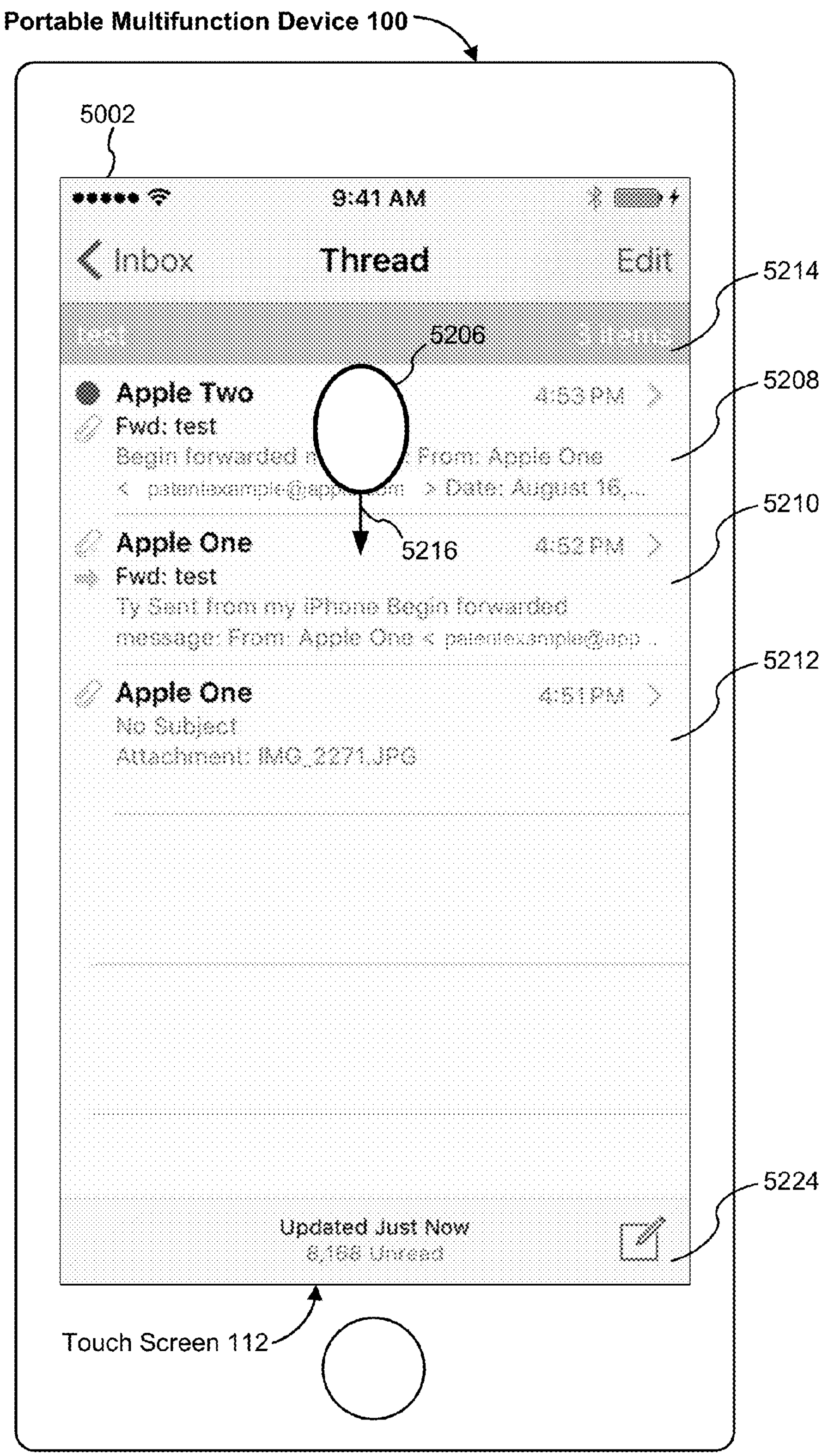
Figure 5D:
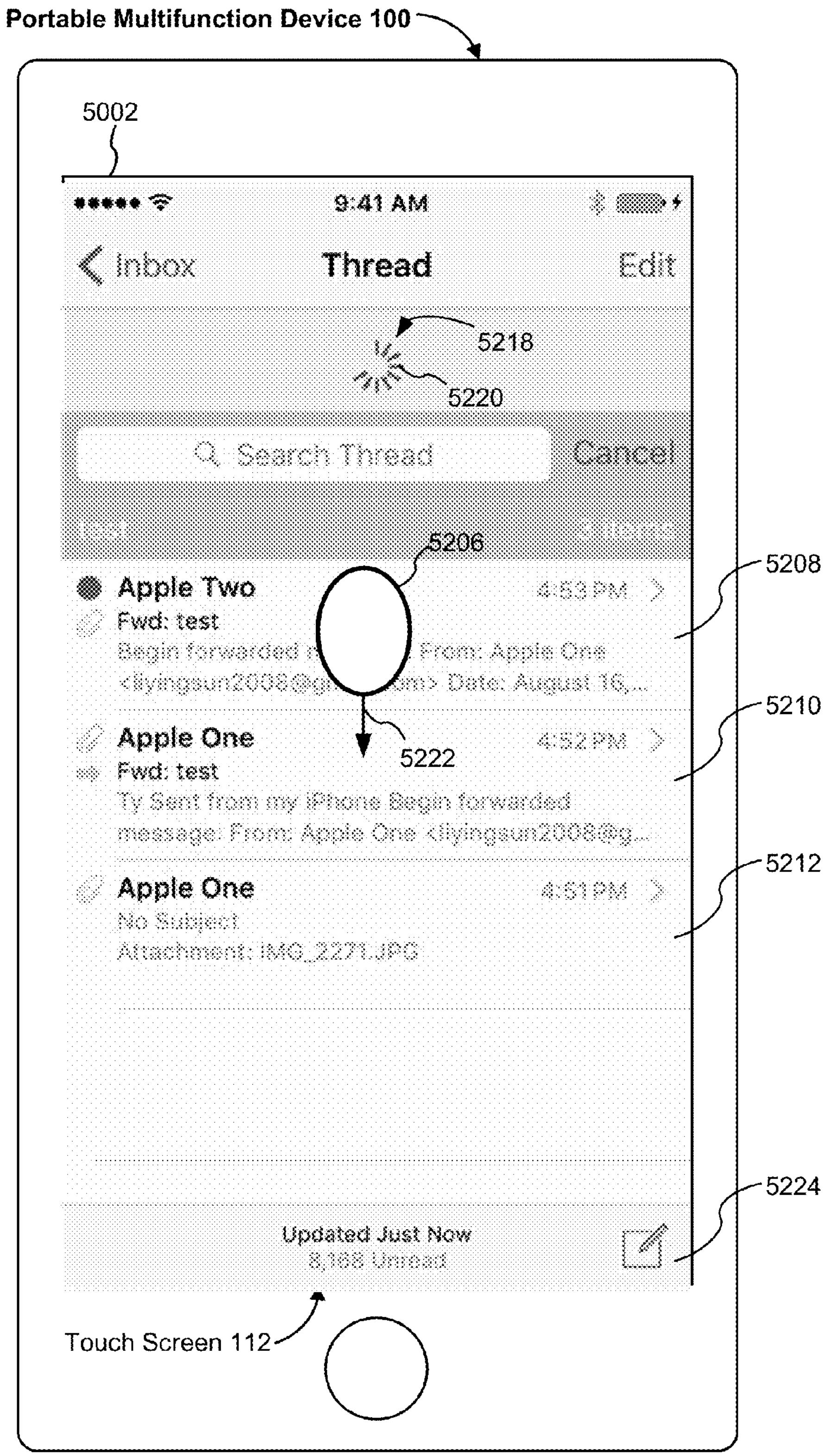
Figure 5D:
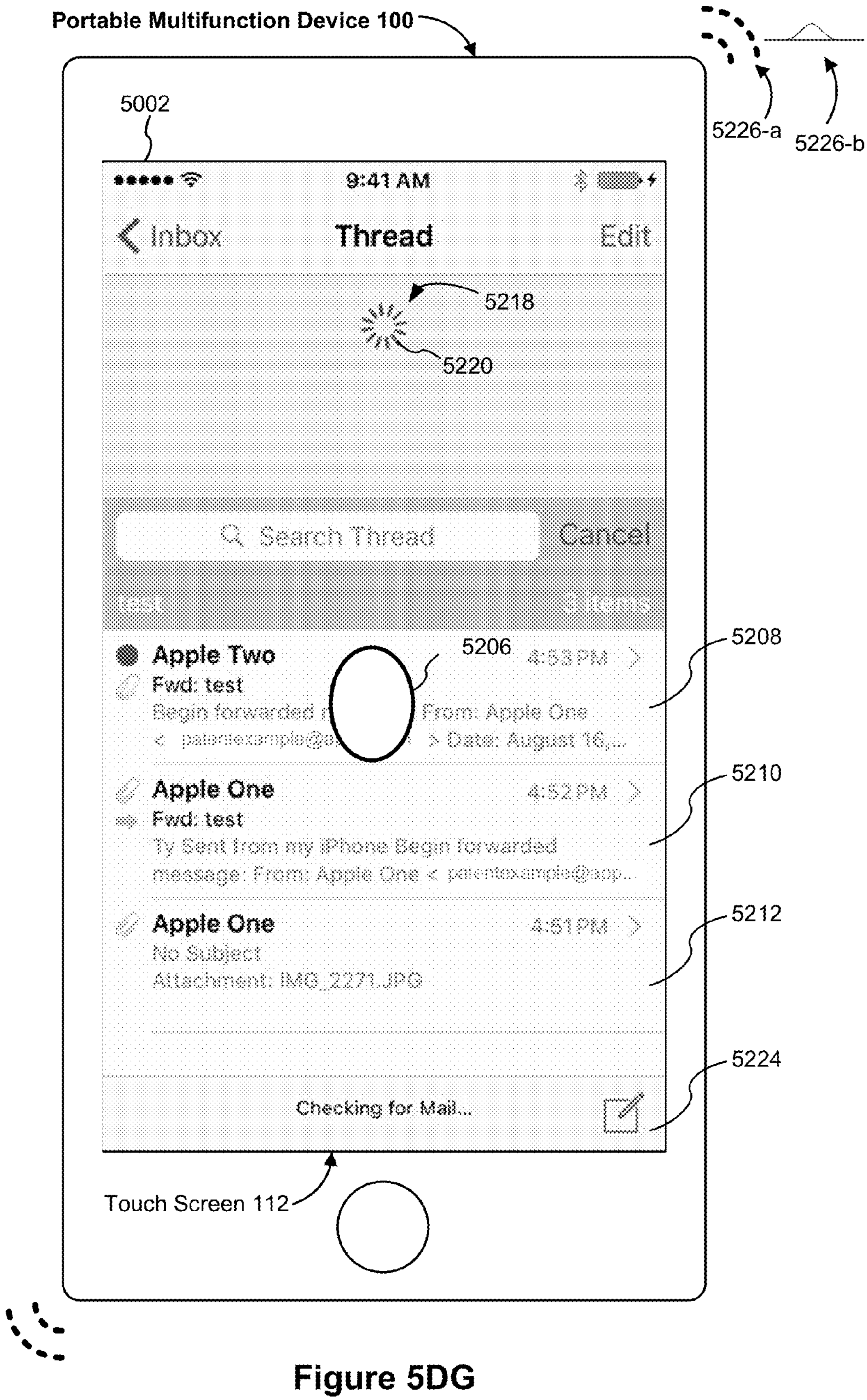
Figure 5D:
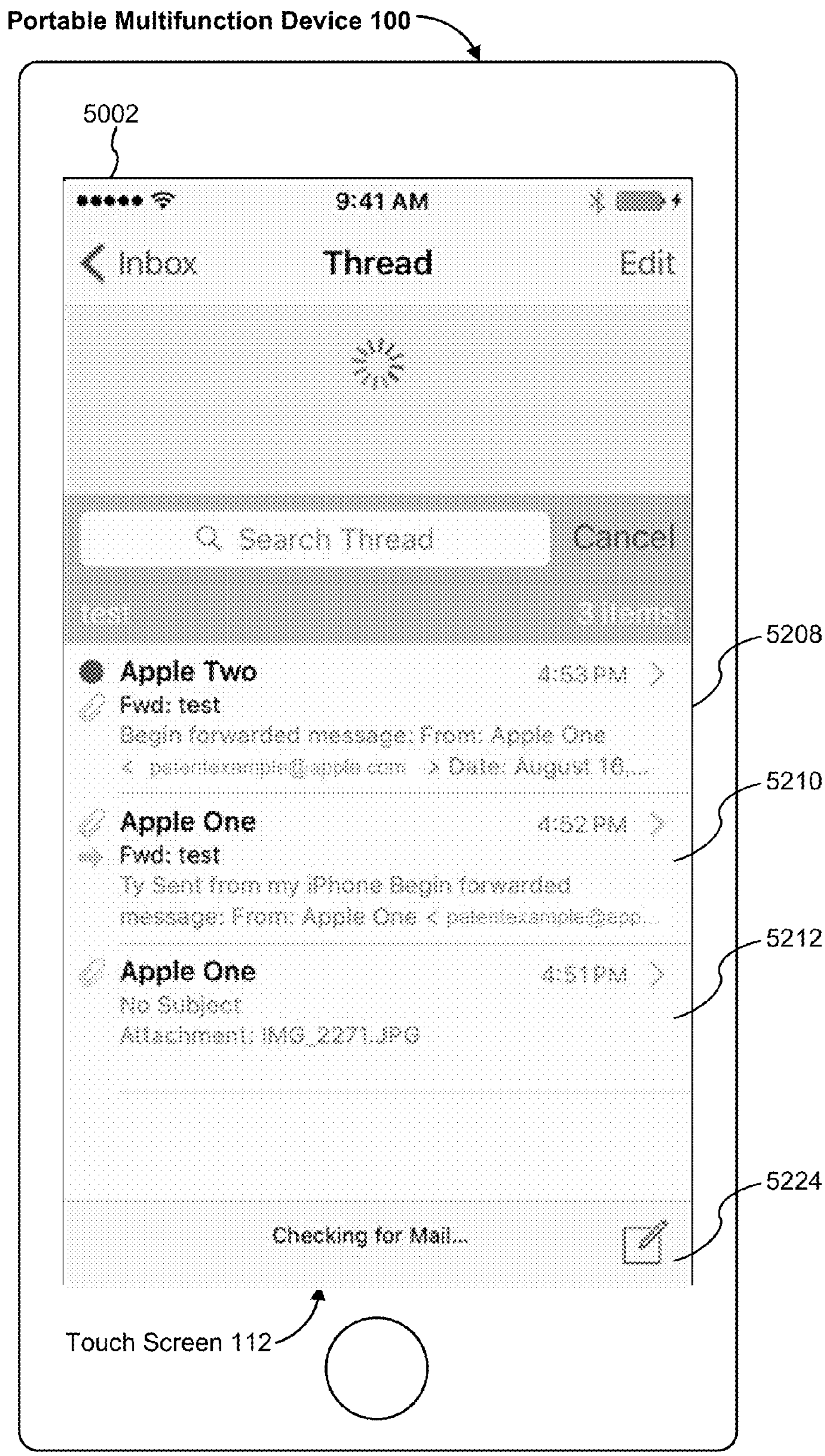
Figure 5D:
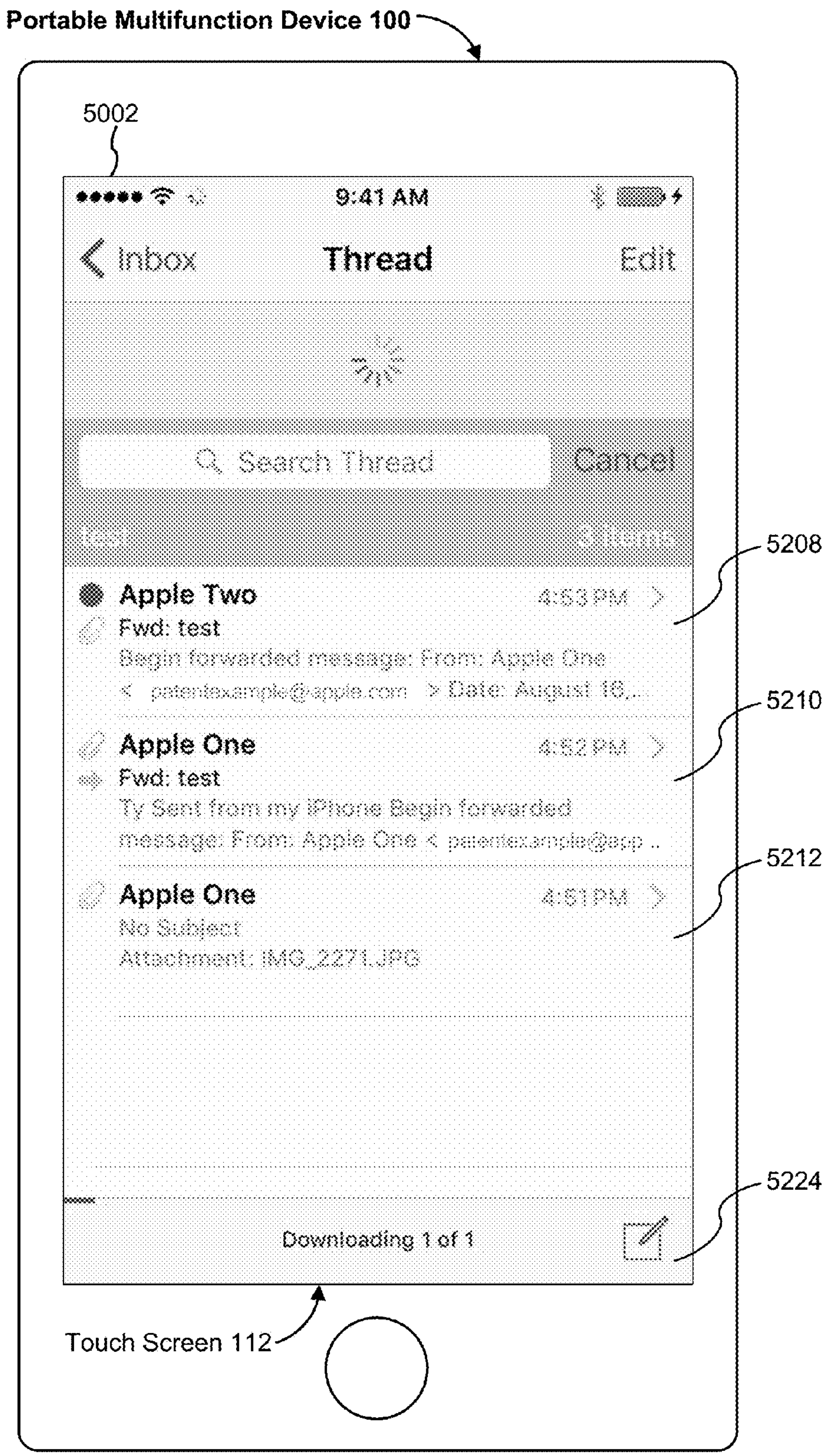
Figure 5D:
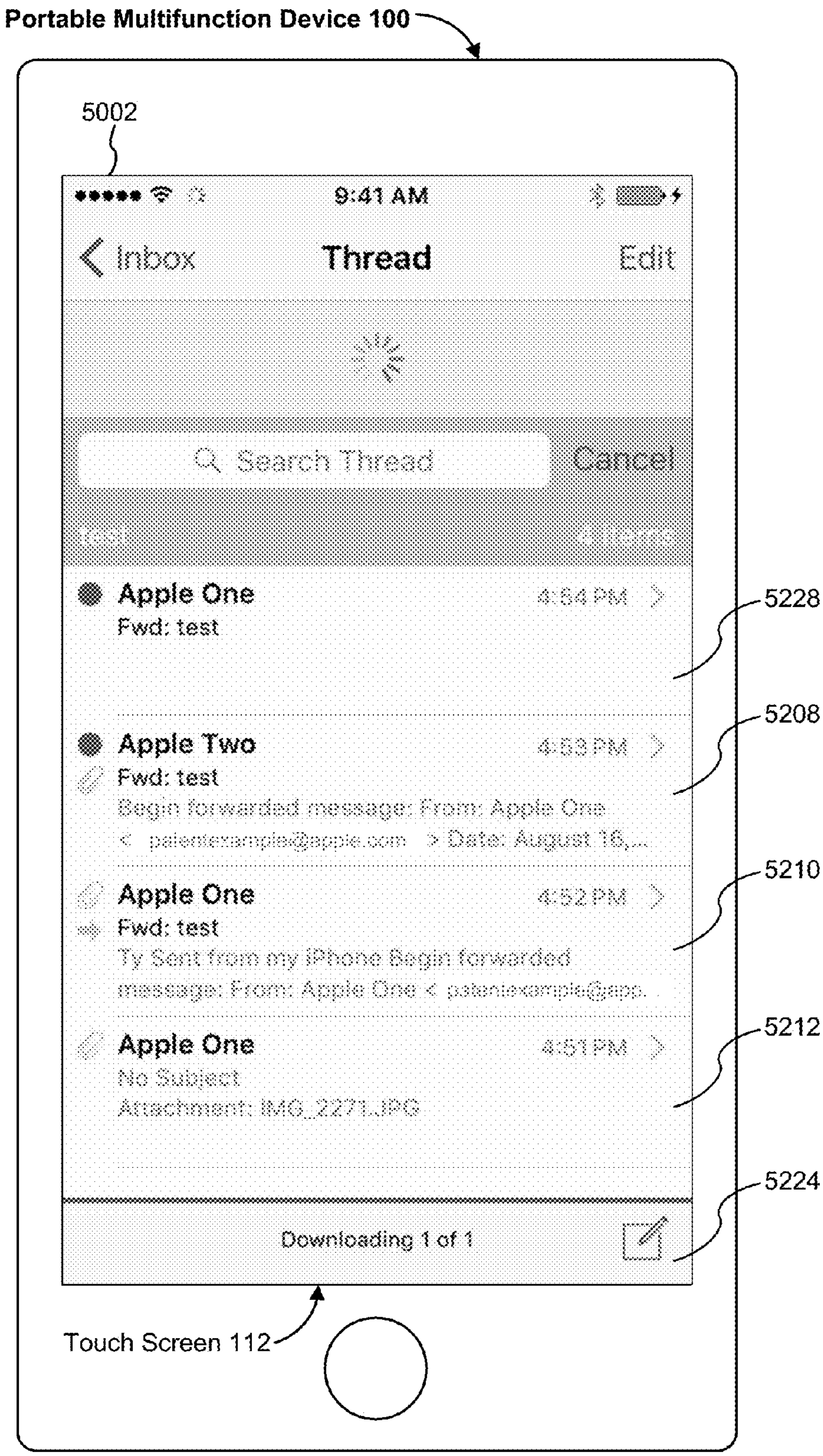
Figure 5D:
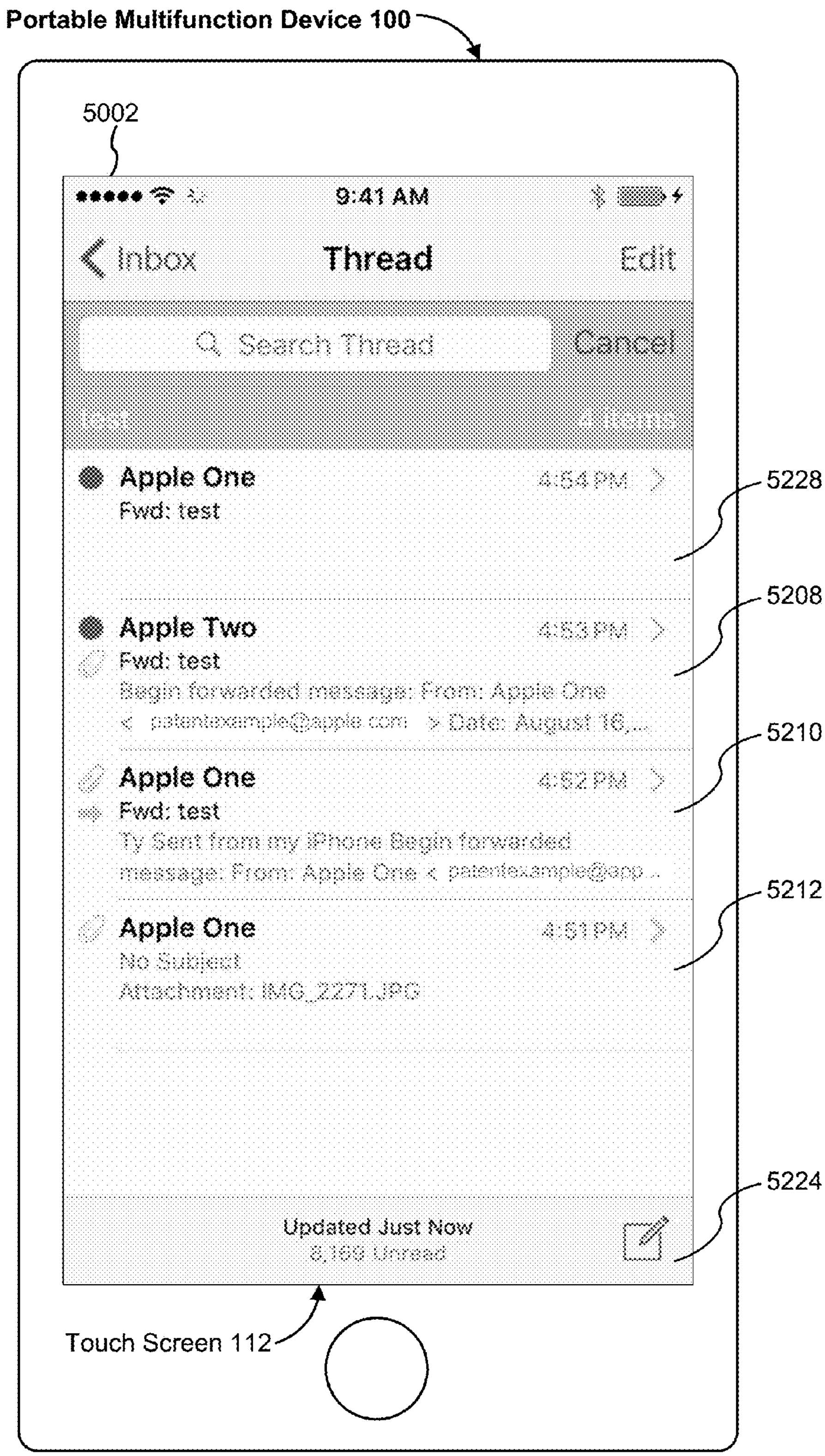

In FIG. 5Z, contact 5070 has moved along the path indicated by arrow 5074. As contact 5070 moves along the path indicated by arrow 5074, e-mail summary item 5008 continues to move in response to the movement of the contact 5070, continuing to gradually reveal content-marking indicator 5026, and gradually revealing marking indicator tray 5030. Contact 5070 continues to move along e-mail summary item 5008 as indicated by arrow 5076.

In FIG. 5AA, contact 5070 has moved along the path indicated by arrow 5076. As contact 5070 moves along the path indicated by arrow 5076, e-mail summary item 5008 continues to move in response to the movement of the contact 5070, continuing to gradually reveal content-marking indicator 5026 and marking indicator tray 5030. Contact 5070 continues to move along e-mail summary item 5008 as indicated by arrow 5078.

In FIG. 5AB, contact 5070 has moved along the path indicated by arrow 5078. As contact 5070 moves along the path indicated by arrow 5078, movement of contact 5070 meets movement threshold criteria (e.g., moves by a distance exceeding a movement threshold or moves past a threshold position in the user interface). When contact 5070 meets the movement threshold criteria, the device produces tactile output 5080 (e.g., MiniTap (270 Hz), gain: 1.0, as illustrated by indicator 5080-*a* and waveform 5080-*b*). In addition, the device displays an animation showing content-marking indicator 5026 suddenly expands in the direction of the movement of the contact 5070 (e.g., moves faster than the movement of the contact and/or moves faster than the previous movement of content-marking indicator 5026) to fill marking indicator tray 5030. After movement of contact 5070 has moved past the threshold position for changing the read/unread status of e-mail represented by e-mail summary item 5008, contact 5070 reverses direction and moves along e-mail summary item 5008 as indicated by arrow 5082.

In FIG. 5AC, contact 5070 has moved along the path indicated by arrow 5082. As contact 5070 moves along the path indicated by arrow 5082, e-mail summary item 5008 moves in response to the movement of the contact 5070. In response to the movement of contact 5070 along the path indicated by arrow 5082, content-marking indicator 5026 and marking indicator tray 5030 gradually "retreat" toward the left edge of the user interface 5002 (e.g., the size of content-marking indicator 5026 and marking indicator tray 5030 is shown gradually decreasing in size). Contact 5070 continues to move along e-mail summary item 5008 as indicated by arrow 5084.

In FIG. 5AD, contact 5070 has moved along the path indicated by arrow 5084. As contact 5070 moves along the path indicated by arrow 5086, movement of contact 5070 meets reversal criteria (e.g., reverse movement of contact 5070 exceeds a reverse movement threshold or moves past an operation cancellation threshold position that is to the left of the operation triggering threshold position). When contact 5070 moves past the operation cancellation threshold position in the user interface, the device provides tactile output 5086 (e.g., MicroTap (270 Hz), gain: 0.55, as illustrated by indicator 5086-*a* and waveform 5086-*b*) to indicate that the threshold for canceling the operation has been met. In addition, the device displays an animation showing content-marking indicator 5026 suddenly shrinks in the direction of the movement of the contact 5070 (e.g., moves faster than the movement of the contact and/or moves faster than the previous movement of content-marking indicator 5026) and marking indicator tray 5030 is re-displayed. In some embodiments, contact 5070 continues to move along e-mail summary item 5008 as indicated by arrow 5088.

In FIG. 5AE, in response to lift-off of contact 5070 from touch screen 112 when movement of contact 5070 has met reversal criteria described above with regard to FIG. 5AD, content-marking indicator 5026 is released. The status of the e-mail that corresponds to the third e-mail summary 5008 is maintained as "unread," as indicated by unread mail indicator 5020. In FIGS. 5AE-5AF, e-mail summary 5008 and content-marking indicator 5026 continues to move toward the left edge of the user interface 5002 (e.g., the size of content-marking indicator 5026 continues to decrease). In FIG. 5AF, display of the unread mail indicator 5020 is maintained in third e-mail summary 5008. In other words, the operation to change the read/unread status of the e-mail corresponding to e-mail summary 5008 is not performed upon lift-off of contact 5070 because contact 5070 retreated past the operation cancellation threshold position before lift-off, after having advanced past the operation triggering threshold position.

FIGS. 5AG-5AP illustrate a process for providing tactile outputs in conjunction with providing visual feedback when meeting an operation triggering threshold for an operation (e.g., archiving an email) and subsequently meeting an operation canceling threshold such that the operation is not performed. During the process, a contact moves in a first direction to pass a first threshold position for archiving an e-mail and subsequently moves in a second direction to pass a second threshold position for cancelling the operation for archiving the e-mail before lift-off.

In FIG. 5AG, the device detects an input on e-mail summary item 5008, such as touch-down of contact 5090 on touch screen 112. Contact 5090 moves along e-mail summary item 5008 as indicated by arrow 5092.

In FIG. 5AH, contact 5090 has moved along the path indicated by arrow 5092. As contact 5090 moves along the path indicated by arrow 5092, e-mail summary item 5008 moves in response to the movement of the contact 5090, e.g., along the path indicated by arrow 5092, gradually revealing (e.g., from the right edge of user interface 5002) content menu affordance 5056, flag content affordance 5058, and archive content affordance 5060. Contact 5090 continues to move along e-mail summary item 5008 as indicated by arrow 5094.

In FIG. 5AI, contact 5090 has moved along the path indicated by arrow 5094. As contact 5090 moves along the path indicated by arrow 5094, e-mail summary item 5008 continues to move in response to the movement of the contact 5090, continuing to gradually reveal content menu affordance 5056, flag content affordance 5058, and archive content affordance 5060. Contact 5090 continues to move along e-mail summary item 5008 as indicated by arrow 5096.

In FIG. 5AJ, contact 5090 has moved along the path indicated by arrow 5096. As contact 5090 moves along the path indicated by arrow 5096, movement of contact 5090 meets movement threshold criteria (e.g., moves by a distance exceeding a movement threshold or moves past a threshold position in the user interface). When movement of contact 5090 meets the movement threshold criteria, the device produces tactile output 5089 (e.g., MiniTap (270 Hz), gain: 1.0, as illustrated by indicator 5098-*a* and waveform 5098-*b*) to indicate that the contact has moved past the operation triggering threshold position. In addition, the device displays an animation showing archive content affordance 5060 suddenly expands in the direction of the movement of the contact 5090 (e.g., moves faster than the movement of the contact and/or moves faster than the previous movement of archive content affordance 5060) to cover marking content menu affordance 5056 and flag content affordance 5058. Contact 5090 continues to move along e-mail summary item 5008 as indicated by arrow 5100.

In FIG. 5AK, contact 5090 has moved along the path indicated by arrow 5100. As contact 5090 moves along the path indicated by arrow 5100, archive content affordance 5060 continues to move in response to the movement of the contact 5090. Contact 5090 reverses direction and moves along e-mail summary item 5008 as indicated by arrow 5102.

In FIG. 5AL, contact 5090 has moved along the path indicated by arrow 5102. As contact 5090 moves along the path indicated by arrow 5102, archive content affordance 5060 moves in response to the movement of the contact 5090. In response to the movement of contact 5090 along the path indicated by arrow 5102, archive content affordance 5060 gradually "retreats" toward the right edge of the user interface 5002 (e.g., the size of archive content affordance 5060 is shown gradually decreasing in size). Contact 5090 continues to move along e-mail summary item 5008 as indicated by arrow 5104.

In FIG. 5AM, contact 5090 has moved along the path indicated by arrow 5104. As contact 5090 moves along the path indicated by arrow 5104, movement of contact 5090 meets reversal criteria (e.g., reverse movement of contact 5090 exceeds a reverse movement threshold or moves past a threshold position for canceling the operation). When contact 5090 meets the reversal criteria, the device produces tactile output 5106 (e.g., MicroTap (270 Hz), gain: 0.55, as illustrated by indicator 5016-*a* and waveform 5036-*b*) to indicate that the contact has moved past the operation cancellation threshold position. In addition, the device displays an animation showing archive content affordance 5060 suddenly shrinks in the direction of the movement of the contact 5090 (e.g., moves faster than the movement of the contact and/or moves faster than the previous movement of archive content affordance 5060) and flag content affordance 5058 and archive content affordance 5060 are re-displayed. In some embodiments, contact 5090 continues to moves along e-mail summary item 5008 as indicated by arrow 5108.

In FIG. 5AN, in response to lift-off of contact 5090 from touch screen 112 after reverse movement by distance that exceeds the reverse movement threshold (e.g., after contact 5090 has moved in the reverse direction past the threshold position for cancelling the operation), as described above with regard to FIG. 5AM, e-mail summary 5008, affordances 5056, 5058, and 5060 are released. The status of the e-mail that corresponds to the third e-mail summary 5008 remains as un-archived. In FIGS. 5AO-5AP, content menu affordance 5056, flag content affordance 5058, and archive content affordance 5060 continue to "retreat" toward the right edge of the user interface 5002 (e.g., the size of content menu affordance 5056, flag content affordance 5058, and archive content affordance 5060 decrease). In FIG. 5AP, third e-mail summary 5008 is displayed (e.g., remains un-archived) in the list of e-mail summaries in user interface 5002.

FIGS. 5AQ-5AX illustrate a process for revealing and maintaining display of content menu affordance 5056, flag content affordance 5058, and archive content affordance 5060 to allow a selection input to be received at one of these affordances, without generating tactile outputs (e.g., because movement threshold criteria are not met).

In FIG. 5AQ, the device detects an input on e-mail summary item 5008, such as touch-down of contact 5110 on touch screen 112. Contact 5110 moves along e-mail summary item 5008 as indicated by arrow 5112.

In FIG. 5AR, contact 5110 has moved along the path indicated by arrow 5112. As contact 5110 moves along the path indicated by arrow 5112, e-mail summary item 5008 moves in response to the movement of the contact 5110, e.g., along the path indicated by arrow 5112, gradually revealing (e.g., from the right edge of user interface 5002) content menu affordance 5056, flag content affordance 5058, and archive content affordance 5060. Contact 5110 continues to move along e-mail summary item 5008 as indicated by arrow 5114.

In FIG. 5AS, contact 5110 has moved along the path indicated by arrow 5114. As contact 5110 moves along the path indicated by arrow 5114, e-mail summary item 5008 continues to move in response to the movement of the contact 5110, continuing to gradually reveal content menu affordance 5056, flag content affordance 5058, and archive content affordance 5060. Contact 5110 continues to move along e-mail summary item 5008 as indicated by arrow 5116.

In FIG. 5AT, contact 5110 has moved along the path indicated by arrow 5116 and lifted off from touch screen 112. Prior to lift-off, movement of contact 5110 satisfied parking threshold criteria (e.g., contact 5110 moved by a distance in excess of a parking threshold distance or position for parking content menu affordance 5056, flag content affordance 5058, and archive content affordance 5060) without satisfying the movement threshold criteria (e.g., contact 5110 did not move by a distance in excess of a movement threshold for archiving the e-mail that corresponds to e-mail summary item 5008). In response to the lift-off of the contact 5110 from touch screen 112, content menu affordance 5056, flag content affordance 5058, and archive content affordance 5060 are "parked" (e.g., display of content menu affordance 5056, flag content affordance 5058, and archive content affordance 5060 is maintained). When display of content menu affordance 5056, flag content affordance 5058, and archive content affordance 5060 is maintained, subsequent input (e.g., a tap input) received at content menu affordance 5056, flag content affordance 5058, or archive content affordance 5060 performs a operation associated with the respective affordance. For example, in response to a subsequent input received on content menu affordance 5056, a menu of action items is displayed; in response to subsequent input received on flag content affordance 5058, the status of an e-mail corresponding to e-mail summary item 5008 is toggled to a flagged status (or un-flagged status); and in response to subsequent input received on archive content affordance 5060, the e-mail corresponding to e-mail summary item 5008 is deleted.

In FIG. 5AU, the device detects an input, such as a tap input by contact 5118, on flag content affordance 5058. In response to the input by contact 5118, the status of the e-mail corresponding to e-mail summary item 5008 is toggled to a flagged status. In response to lift-off of contact 5118, content menu affordance 5056, flag content affordance 5058, and archive content affordance 5060 "retreat" toward the right edge of the user interface 5002 (e.g., the size of content menu affordance 5056, flag content affordance 5058, and archive content affordance 5060 decrease), as illustrated in FIGS. 5AV-5AX. Flag marker 5120 is displayed in e-mail summary item 5008, as shown in 5AX, to indicate that the e-mail corresponding to e-mail summary item 5008 has a flagged status.

FIGS. 5AY-5BI illustrate a process for displaying a preview of an e-mail corresponding to e-mail summary item 5008 in response to a first portion of an input (e.g., a press input) and for changing the read/unread status of the e-mail in response to a second portion of the input. During the process, the device generates tactile output in conjunction with displaying visual feedback when the threshold for displaying the preview is met, and when the threshold for triggering the change of the read/unread status of the e-mail is met.

FIG. 5AY displays a list of e-mail summary items including e-mail summary item 5004, e-mail summary item 5008, and fourth e-mail summary item 5009. In FIG. 5AY, e-mail summary item 5008 includes unread mail indicator 5020.

In FIG. 5AZ, the device detects an input on e-mail summary item 5008, such as touch-down of contact 5122 on touch screen 112. Third e-mail summary item 5008 is visually distinguished (e.g., highlighted, as shown) to indicate that e-mail summary item 5008 is selected and/or to distinguish selected e-mail summary item 5008 from non-selected first-email summary item 5004.

A characteristic intensity of contact 5122 increases from below a hint intensity threshold $IT_H$, as shown in intensity level meter 5124 of FIG. 5AZ, to a characteristic intensity above $IT_H$ and below a light press intensity threshold $IT_L$, as shown in intensity level meter 5124 of FIG. 5BA. When the characteristic intensity of contact 5122 increases above $IT_H$, as shown in FIG. 5BA, selected e-mail summary item 5008 is shown un-blurred while at least a portion of the remainder of user interface 5002 is blurred.

The characteristic intensity of contact 5122 increases from above $IT_H$ and below $IT_L$, as shown in intensity level meter 5124 of FIG. 5BA, to above $IT_L$, as shown in intensity level meter 5124 of FIG. 5BB. When the characteristic intensity of contact 5122 increases above $IT_L$, as shown in FIG. 5BB, the device produces tactile output 5126 (e.g., MicroTap (200 Hz), gain: 1.0, as illustrated by indicator 5126-*a* and waveform 5126-*b*) to indicate that the threshold intensity for displaying a preview associated with e-mail summary 5008 is met by the input. In addition, the device displays preview 5128 of the e-mail that corresponds to e-mail summary item 5008.

In FIG. 5BC, while preview 5128 is displayed, contact 5122 moves along a path as indicated by arrow 5130 (e.g., while preview 5128 is displayed underneath of contact 5122).

In FIG. 5BD, contact 5122 has moved along the path indicated by arrow 5130. As contact 5122 moves along the path indicated by arrow 5130, preview 5128 continues to move in response to the movement of the contact 5122, gradually revealing (e.g., from beneath preview 5128) content-marking indicator 5132. Contact 5122 continues to move along a path over preview 5128 as indicated by arrow 5134.

In FIG. 5BE, contact 5122 has moved along the path indicated by arrow 5134. As contact 5122 moves along the path indicated by arrow 5134, preview 5128 continues to move in response to the movement of the contact 5122, continuing to reveal content-marking indicator 5132. Contact 5122 continues to move along a path over preview 5128 as indicated by arrow 5136.

In FIG. 5BF, contact 5122 has moved along the path indicated by arrow 5136. As contact 5122 moves along the path indicated by arrow 5136, movement of contact 5122 meets movement threshold criteria (e.g., contact 5122 moves by a distance exceeding a movement threshold or past a threshold position) for triggering the operation for changing the read/unread status of the e-mail item. When movement of contact 5122 meets the movement threshold criteria, the device produces tactile output 5138 (e.g., MiniTap (270 Hz), gain: 1.0, as illustrated by indicator 5138-*a* and waveform 5138-*b*) to indicate that the movement threshold criteria are met. In addition, the device changes the appearance of content-marking indicator 5132 (e.g., the coloration of content-marking indicator 5132 is inverted) to indicate that, on lift-off of the contact, the status of the e-mail that corresponds to e-mail summary item 5008 will change from "unread" to "read."

In FIG. 5BG, in response to lift-off of contact 5122 from touch screen 112 when movement of contact 5122 has met the movement threshold criteria, as described above with regard to FIG. 5BF, preview 5128 is released. In FIGS. 5BG-5BI, display of preview 5128 is replaced by the list of e-mail summary items (e.g., preview 5128 continues sliding to the right until preview 5128 is no longer visible in user interface 5002 and the list of e-mail summary items is re-displayed).

In FIG. 5BI, the unread mail indicator 5020 is no longer displayed in third e-mail summary 5008.

FIGS. 5BJ-5BR illustrate a process for displaying a preview of an e-mail corresponding to e-mail summary item 5008 in response to a first portion of an input (e.g., a press input) and for changing the read/unread status of the e-mail in response to a second portion of the input. During the process, the device generates tactile output in conjunction with displaying visual feedback when the threshold for displaying the preview is met, and when the threshold for triggering the change of the read/unread status of the e-mail is met.

In FIG. 5BJ, the device detects an input on e-mail summary item 5008, such as touch-down of contact 5140 on touch screen 112. A characteristic intensity of contact 5140 increases from below a hint intensity threshold $IT_H$, as shown in intensity level meter 5124 of FIG. 5BJ, to a characteristic intensity above $IT_H$ and below a light press intensity threshold $IT_L$, as shown in intensity level meter 5124 of FIG. 5BK. When the characteristic intensity of contact 5140 increases above $IT_H$, as shown in FIG. 5BK, selected e-mail summary item 5008 is shown un-blurred while at least a portion of the remainder of user interface 5002 is blurred.

The characteristic intensity of contact 5140 increases from above $IT_H$ and below $IT_L$, as shown in intensity level meter 5124 of FIG. 5BK, to above $IT_L$, as shown in intensity level meter 5124 of FIG. 5BL. When the characteristic intensity of contact 5140 increases above $IT_L$, as shown in FIG. 5BL, the device produces tactile output 5142 (e.g., MicroTap (200 Hz), gain: 1.0, as illustrated by indicator 5142-*a* and waveform 5142-*b*) and the device displays a preview 5128 of the e-mail that corresponds to e-mail summary item 5008. Contact 5140 moves along a path on preview panel 5128 as indicated by arrow 5144.

In FIG. 5BM, while preview 5128 is displayed, contact 5140 moves along a path over preview 5128 as indicated by arrow 5144.

In FIG. 5BN, contact 5140 has moved along the path indicated by arrow 5144. As contact 5140 moves along the path indicated by arrow 5144, preview 5128 moves in response to the movement of the contact 5140, gradually revealing (e.g., from beneath preview 5128) content-marking indicator 5132. Contact 5140 continues to move along a path over preview 5128 as indicated by arrow 5146.

In FIG. 5BO, contact 5140 has moved along the path indicated by arrow 5146. As contact 5140 moves along the path indicated by arrow 5146, movement of contact 5140 meets movement threshold criteria (e.g., contact 5140 moves by a distance exceeding a movement threshold or moves past a threshold position in the user interface) for triggering the operation to change the read/unread status of the email. When movement of contact 5140 meets the movement threshold criteria, the device produces tactile output 5148 (e.g., MiniTap (270 Hz), gain: 1.0, as illustrated by indicator 5148-*a* and waveform 5148-*b*) to indicate that the threshold for displaying the preview corresponding to e-mail summary 5008 is met. In addition, the device changes the appearance of content-marking indicator 5132 (e.g., the coloration of content-marking indicator 5132 is inverted) to indicate that, on lift-off, the status of the e-mail that corresponds to e-mail summary item 5008 will change from "read" to "unread."

In FIG. 5BP, in response to lift-off of contact 5140 from touch screen 112 when movement of contact 5140 has met the movement threshold criteria, as described above with regard to FIG. 5BO, preview 5128 is released. In FIGS. 5BP-5BS, display of preview 5128 is replaced by the list of e-mail summary items (e.g., preview 5128 continues sliding to the right until preview 5128 is no longer visible in user interface 5002, as shown in FIG. 5BQ, and the list of e-mail summary items is re-displayed, as shown in FIG. 5BR).

In FIG. 5BR, the unread mail indicator 5020 is displayed in third e-mail summary 5008.

FIGS. 5BS-5CA illustrate a process for displaying a preview of an e-mail corresponding to e-mail summary item 5008 in response to a first portion of an input (e.g., a press input) and for archiving the e-mail in response to a second portion of the input. During the process, the device generates tactile output in conjunction with displaying visual feedback when the threshold for displaying the preview is met, and when the threshold for triggering the operation for archiving the e-mail is met.

In FIG. 5BS, the device detects an input on e-mail summary item 5008, such as touch-down of contact 5150 on touch screen 112. A characteristic intensity of contact 5150 increases from below a hint intensity threshold $IT_H$, as shown in intensity level meter 5124 of FIG. 5BS, to a characteristic intensity above $IT_H$ and below a light press intensity threshold $IT_L$, as shown in intensity level meter 5124 of FIG. 5BT. When the characteristic intensity of contact 5150 increases above $IT_H$, as shown in FIG. 5BT, selected e-mail summary item 5008 is shown un-blurred while at least a portion of the remainder of user interface 5002 is blurred.

The characteristic intensity of contact 5150 increases from above $IT_H$ and below $IT_L$, as shown in intensity level meter 5124 of FIG. 5BT, to above $IT_L$, as shown in intensity level meter 5124 of FIG. 5BU. When the characteristic intensity of contact 5150 increases above $IT_L$, as shown in FIG. 5BU, the device produces tactile output 5152 (e.g., MicroTap (200 Hz), gain: 1.0, as illustrated by indicator 5152-*a* and waveform 5152-*b*) and the device displays preview 5128 of the e-mail that corresponds to e-mail summary item 5008. While preview 5128 is displayed, contact 5150 moves along a path indicated by arrow 5157.

In FIG. 5BV, while preview 5128 is displayed, contact 5150 moves along a path over preview 5128 as indicated by arrow 5154.

In FIG. 5BW, contact 5150 has moved along a path indicated by arrow 5154. As contact 5150 moves along the path indicated by arrow 5154, preview 5128 moves in response to the movement of the contact 5150, e.g., along the path indicated by arrow 5154, gradually revealing (e.g., from beneath preview 5128) archiving indicator 5132. Contact 5150 continues to move along a path over preview 5128 as indicated by arrow 5158.

In FIG. 5BX, contact 5150 has moved along the path indicated by arrow 5158. As contact 5150 moves along the path indicated by arrow 5158, preview 5128 continues to move in response to the movement of the contact 5150, e.g., along the path indicated by arrow 5158, continuing to reveal archiving indicator 5156. Contact 5150 continues to move along a path on preview 5128 as indicated by arrow 5160.

In FIG. 5BY, contact 5150 has moved along the path indicated by arrow 5160. As contact 5150 moves along the path indicated by arrow 5160, movement of contact 5150 meets movement threshold criteria (e.g., contact 5150 moves by a distance exceeding a movement threshold or moves past a threshold position in the user interface). When movement of contact 5150 meets the movement threshold criteria, the device produces tactile output 5162 (e.g., MiniTap (270 Hz), gain: 1.0, as illustrated by indicator 5162-*a* and waveform 5162-*b*). In addition, the device changes the appearance of archiving indicator 5156 (e.g., the coloration of archiving indicator 5132 is inverted) to indicate that, on lift-off of contact 5150, the e-mail that corresponds to e-mail summary item 5008 will be archived.

In FIG. 5BZ, in response to lift-off of contact 5150 from touch screen 112 when movement of contact 5150 has met the movement threshold criteria, as described above with regard to FIG. 5BY, preview 5128 is released. In FIGS. 5BZ-5CA, display of preview 5128 is replaced by the list of e-mail summary items (e.g., preview 5128 continues sliding to the right until preview 5128 is no longer visible in user interface 5002, as shown in FIG. 5BZ). In FIGS. 5CA-5CC, the list of e-mail summary items is animated to indicate a gap in the former location of e-mail summary item 5008 that gradually closes to indicate that e-mail summary item 5008 has been archived. In FIG. 5CB, e-mail summary item 5004 is located next to fourth e-mail summary item 5009.

FIGS. 5CC-5CM illustrate a process for displaying a preview of an e-mail corresponding to e-mail summary item 5004 in response to a first portion of an input (e.g., a press input), for meeting an operation triggering threshold in response to a second portion of the input (e.g., a drag input in a first direction) and subsequently meeting an operation cancellation threshold in response a third portion of the input (e.g., a drag input in a second direction). During the process, the device generates tactile output in conjunction with displaying visual feedback when the threshold for displaying the preview is met, when the threshold for triggering the operation for changing the read/unread status of the e-mail is met, and when the threshold for canceling the operation for changing the read/unread status of the e-mail is met.

In FIG. 5CC, the device detects an input on e-mail summary item 5004, such as touch-down of contact 5164 on touch screen 112.

A characteristic intensity of contact 5164 increases from below a hint intensity threshold $IT_H$, as shown in intensity level meter 5124 of FIG. 5CC, to a characteristic intensity above $IT_H$ and below a light press intensity threshold $IT_L$, as shown in intensity level meter 5124 of FIG. 5CD. When the characteristic intensity of contact 5164 increases above $IT_H$, as shown in FIG. 5CD, selected e-mail summary item 5004 is shown un-blurred while at least a portion of the remainder of user interface 5002 is blurred.

The characteristic intensity of contact 5164 increases from above $IT_H$ and below $IT_L$, as shown in intensity level meter 5124 of FIG. 5CD, to above $IT_L$, as shown in intensity level meter 5124 of FIG. 5CE. When the characteristic intensity of contact 5164 increases above $IT_L$, as shown in FIG. 5CE, the device produces tactile output 5166 (e.g., MicroTap (200 Hz), gain: 1.0, as illustrated by indicator 5166-*a* and waveform 5166-*b*) and the device displays preview 5129 of the e-mail that corresponds to e-mail summary item 5004.

In FIG. 5CF, while preview 5129 is displayed, contact 5164 moves along a path over preview 5129 as indicated by arrow 5168.

In FIG. 5CG, contact 5164 has moved along the path indicated by arrow 5168. As contact 5164 moves along the path indicated by arrow 5168, preview 5129 moves in response to the movement of the contact 5164, gradually revealing (e.g., from beneath preview panel 5128) content-marking indicator 5132. Contact 5164 continues to move along a path over preview 5129 as indicated by arrow 5170.

In FIG. 5CH, contact 5164 has moved along the path indicated by arrow 5170. As contact 5164 moves along the path indicated by arrow 5170, movement of contact 5164 meets movement threshold criteria (e.g., contact 5164 moves by a distance exceeding a movement threshold or moves past a threshold position in the user interface). When movement of contact 5164 meets the movement threshold criteria, the device produces tactile output 5172 (e.g., MiniTap (270 Hz), gain: 1.0, as illustrated by indicator 5172-*a* and waveform 5172-*b*) to indicate that the movement threshold criteria for trigging the change of read/unread status of the e-mail are met. In addition, the device changes the appearance of content-marking indicator 5132 (e.g., the coloration of content-marking indicator 5132 is inverted) to indicate that, on lift-off of the contact, the status of the e-mail that corresponds to e-mail summary item 5004 will change from "unread" to "read." Contact 5164 continues to move along a path over preview 5129 as indicated by arrow 5174.

In FIG. 5CI, when movement of contact 5164 has met movement threshold criteria as described with regard to FIG. 5CH, contact 5164 reverses direction and moves along a path indicated by arrow 5176.

In FIG. 5CJ, contact 5164 has moved along the path indicated by arrow 5176. As contact 5164 moves along the path indicated by arrow 5176, preview 5129 moves in response to the movement of the contact 5164. Contact 5164 continues to move along a path over preview 5128 as indicated by arrow 5178.

In FIG. 5CK, contact 5164 has moved along the path indicated by arrow 5178. As contact 5164 moves along the path indicated by arrow 5178, movement of contact 5164 meets reversal criteria (e.g., reverse movement of contact 5164 exceeds a reverse movement threshold or passes a threshold position in the user interface). When movement of contact 5164 meets reversal criteria, the device provides tactile output 5180 (e.g., MicroTap (270 Hz), gain: 0.55, as illustrated by indicator 5180-*a* and waveform 5180-*b*) to indicate that the threshold for cancelling the operation for changing the read/unread status of the e-mail has been met. In addition, the device changes the appearance of content-marking indicator 5132 (e.g., the coloration of content-marking indicator 5132 is inverted) to indicate that the status of the e-mail (e.g., "read" or "unread") will not be changed on lift-off of contact 5164.

In FIG. 5CL, in response to lift-off of contact 5164 from touch screen 112 when movement of contact 5164 has met reversal criteria described above with regard to FIG. 5CK, preview 5129 is released. In FIGS. 5CL-5CM, display of preview 5129 is replaced by the list of e-mail summary items (e.g., preview 5129 continues sliding to the left until preview 5129 is no longer visible in user interface 5002 and the list of e-mail summary items is re-displayed).

In FIG. 5CM, display of the unread mail indicator 5020 is maintained in first e-mail summary 5004.

FIGS. 5CN-5CY illustrate a process for displaying a preview of an e-mail corresponding to e-mail summary item 5004 in response to a first portion of an input (e.g., a press input), for meeting an operation triggering threshold in response to a second portion of the input (e.g., a drag input in a first direction) and subsequently meeting an operation cancellation threshold in response a third portion of the input (e.g., a drag input in a second direction). During the process, the device generates tactile output in conjunction with displaying visual feedback when the threshold for displaying the preview is met, when the threshold for triggering the operation for archiving the e-mail is met, and when the threshold for canceling the operation for archiving the e-mail is met.

In FIG. 5CN, the device detects an input on e-mail summary item 5004, such as touch-down of contact 5180 on touch screen 112.

A characteristic intensity of contact 5180 increases from below a hint intensity threshold $IT_H$, as shown in intensity level meter 5124 of FIG. 5CN, to a characteristic intensity above $IT_H$ and below a light press intensity threshold $IT_L$, as shown in intensity level meter 5124 of FIG. 5CO. When the characteristic intensity of contact 5180 increases above $IT_H$, as shown in FIG. 5CO, selected e-mail summary item 5004 is shown un-blurred while at least a portion of the remainder of user interface 5002 is blurred.

The characteristic intensity of contact 5180 increases from above $IT_H$ and below $IT_L$, as shown in intensity level meter 5124 of FIG. 5CO, to above $IT_L$, as shown in intensity level meter 5124 of FIG. 5CP. When the characteristic intensity of contact 5180 increases above $IT_L$, as shown in FIG. 5CP, the device produces tactile output 5182 (e.g., MicroTap (200 Hz), gain: 1.0, as illustrated by indicator 5182-*a* and waveform 5182-*b*) to indicate that the threshold for displaying a preview of the e-mail that corresponds to e-mail summary item 5004 is met. In addition, the device displays preview 5129 that corresponds to e-mail summary item 5004.

In FIG. 5CQ, while preview 5129 is displayed, contact 5180 moves along a path over preview 5129 as indicated by arrow 5184.

In FIG. 5CR, contact 5180 has moved along the path indicated by arrow 5184. As contact 5180 moves along the path indicated by arrow 5184, preview 5129 moves in response to the movement of the contact 5184, gradually revealing (e.g., from beneath preview 5129) archiving indicator 5156. Contact 5180 continues to move along a path over preview 5129 as indicated by arrow 5186.

In FIG. 5CS, contact 5180 has moved along the path indicated by arrow 5186. As contact 5180 moves along the path indicated by arrow 5186, preview 5129 continues to moves in response to the movement of the contact 5186, continuing to reveal (e.g., from beneath preview 5129) archiving indicator 5156. Contact 5180 continues to move along a path over preview 5129 as indicated by arrow 5188.

In FIG. 5CT, contact 5180 has moved along the path indicated by arrow 5188. As contact 5180 moves along the path indicated by arrow 5188, movement of contact 5180 meets movement threshold criteria (e.g., contact 5180 moves by a distance exceeding a movement threshold or past a threshold position in the user interface). When movement of contact 5180 meets the movement threshold criteria, the device produces tactile output 5190 (e.g., MiniTap (270 Hz), gain: 1.0, as illustrated by indicator 5190-*a* and waveform 5190-*b*) to indicate that the threshold for triggering the archiving operation is met. In addition, the device changes the appearance of archiving indicator 5156 (e.g., the coloration of archiving indicator 5156 is inverted) to indicate that, on lift-off of the contact, the e-mail that corresponds to e-mail summary item 5004 will be archived. Contact 5180 continues to move along a path over preview 5129 as indicated by arrow 5192.

In FIG. 5CU, when movement of contact 5180 has met movement threshold criteria as described with regard to FIG. 5CT, contact 5180 reverses direction and moves along a path over preview 5129 as indicated by arrow 5194.

In FIG. 5CV, contact 5180 has moved along the path indicated by arrow 5194. As contact 5180 moves along the path indicated by arrow 5194, preview 5129 moves in response to the movement of the contact 5180. Contact 5180 continues to move along a path over preview 5129 as indicated by arrow 5196.

In FIG. 5CW, contact 5180 has moved along the path indicated by arrow 5196. As contact 5180 moves along the path indicated by arrow 5196, movement of contact 5180 meets reversal criteria (e.g., reverse movement of contact 5180 exceeds a reverse movement threshold or threshold position in the user interface). When movement of contact 5180 meets reversal criteria, the device provides tactile output 5198 (e.g., MicroTap (270 Hz), gain: 0.55, as illustrated by indicator 5198-*a* and waveform 5198-*b*) to indicate that the threshold for cancelling the archiving operation is met. In addition, the device changes the appearance of archiving indicator 5156 (e.g., the coloration of archiving indicator 5156 is inverted) to indicate that the e-mail will not be archived on lift-off of contact 5180.

In FIG. 5CX, in response to lift-off of contact 5180 from touch screen 112 when movement of contact 5180 has met reversal criteria described above with regard to FIG. 5CW, preview 5129 is released. In FIGS. 5CX-5CY, display of preview 5129 is replaced by the list of e-mail summary items (e.g., preview 5129 continues sliding to the right until preview 5129 is no longer visible in user interface 5002 and the list of e-mail summary items is re-displayed).

FIGS. 5CZ-5DD illustrate a process for displaying a preview of an e-mail corresponding to e-mail summary item 5200 in response to a first portion of an input (e.g., a press input that meets the light press intensity threshold $IT_L$), and for displaying the e-mail in response to a second portion of the input (e.g., a deep press input that meets the deep press intensity threshold $IT_D$). During the process, the device generates tactile output in conjunction with displaying the preview when the threshold for displaying the preview is met, and in conjunction with displaying the content of the email when the threshold for displaying the e-mail is met.

In FIG. 5CZ, a list of e-mail summaries including e-mail summary 5200 is displayed in user interface 5002.

In FIG. 5DA, the device detects an input on e-mail summary item 5200, such as touch-down of contact 5202 on touch screen 112.

A characteristic intensity of contact 5202 increases from below a hint intensity threshold $IT_H$, as shown in intensity level meter 5124 of FIG. 5DA, to a characteristic intensity above $IT_H$ and below a light press intensity threshold $IT_L$, as shown in intensity level meter 5124 of FIG. 5DB. When the characteristic intensity of contact 5202 increases above $IT_H$, as shown in FIG. 5DB, e-mail summary item 5200 is shown un-blurred while at least a portion of the remainder of user interface 5002 is blurred.

The characteristic intensity of contact 5202 increases from above $IT_H$ and below $IT_L$, as shown in intensity level meter 5124 of FIG. 5DB, to above $IT_L$, as shown in intensity level meter 5124 of FIG. 5DC. When the characteristic intensity of contact 5202 increases above $IT_L$, as shown in FIG. 5DC, the device produces tactile output 5204 (e.g., MicroTap (200 Hz), gain: 1.0, as illustrated by indicator 5204-*a* and waveform 5204-*b*) and the device displays preview 5131 of the e-mail that corresponds to e-mail summary item 5200.

The characteristic intensity of contact 5202 increases from above $IT_L$ and below $IT_D$, as shown in intensity level meter 5124 of FIG. 5DC, to above $IT_D$, as shown in intensity level meter 5124 of FIG. 5DD. When the characteristic intensity of contact 5202 increases above $IT_D$, as shown in FIG. 5DD, the device produces tactile output 5205 (e.g., FullTap (150 Hz), gain: 1.0, as illustrated by indicator 5205-*a* and waveform 5205-*b*) and the device ceases to display preview 5131 and displays the e-mail 5201 that corresponds to e-mail summary item 5200.

FIGS. 5DE-5DK illustrate a process for providing a tactile output in response to a drag input by a contact that passes a threshold position in the user interface. The tactile output is provided in conjunction with visually indicating that the threshold for refreshing a list of e-mail summary items has been reached and that the e-mail list will be refreshed (e.g., upon termination of the input, or upon crossing of the threshold position).

In FIG. 5DE, the device detects an input, such as a downward swipe gesture by contact 5206 on touch screen 112, on a list of e-mail summary items on user interface 5002. The list of e-mail summary items on user interface 5002 includes e-mail summary items 5208, 5210, and 5212. The list of e-mail summary items may include additional information such as thread information 5214. A current status of the list of e-mail summary items (e.g., "Updated Just Now") is indicated at status indicator field 5224. Contact 5206 moves along a path on the list of e-mail summary items as indicated by arrow 5216.

In FIG. 5DF, contact 5206 has moved along the path indicated by arrow 5216. As contact 5206 moves along the path indicated by arrow 5216, the list of e-mail summary items moves in response to the movement of contact 5206 (e.g., the list of e-mail summary items moves downward in response to the downward swipe gesture), revealing progress indicator 5218. Progress indicator 5218 indicates, e.g., whether the movement of contact 5206 meets movement threshold criteria (e.g., movement past a threshold position in the user interface) for refreshing a list and/or whether a refresh process to download and present newly received e-mails is ongoing. For example, when the movement of contact 5206 meets the movement threshold criteria, a full ring of progress indicator spokes is displayed, as indicated in 5DG. The contact 5206 continues to move along a path over the list of e-mail summary items as indicated by arrow 5222.

In FIG. 5DG, contact 5206 has moved along the path indicated by arrow 5222. As contact 5206 moves along the path indicated by arrow 5222, movement of contact 5206 meets movement threshold criteria (e.g., contact 5206 moves by a distance exceeding a movement threshold or past a threshold position in the user interface). When movement of contact 5206 meets the movement threshold criteria, the device produces tactile output 5226 (e.g., MicroTap (270 Hz), gain: 0.6, as illustrated by indicator 5226-*a* and waveform 5226-*b*) and initiates a content refresh process (e.g., to check for recently received e-mail). In some embodiments, the status indicated in status indicator field 5224 is updated to indicate that the content refresh process is initiated (e.g., "Checking for Mail . . . ").

In FIG. 5DH, in response to lift-off of contact 5206 from touch screen 112 when movement of contact 5206 has met the movement threshold criteria described above with regard to FIG. 5DG, the list of e-mail summary items is released and gradually returns to its initial position (e.g., moves upward), as illustrated at FIGS. 5DH-DK. In FIG. 5DI, status indicator field 5224 is updated to indicate that a new e-mail is being downloaded. In FIG. 5DJ, an e-mail summary item 5228 that corresponds to a downloaded recently received e-mail is shown in the e-mail summary list. In FIG. 5DK, the e-mail summary list, including the new e-mail summary item 5228, is returned to its original position, and status indicator field 5224 is updated to indicate that the e-mail summary list has been updated (e.g., "Updated Just Now").

Figure 6A:
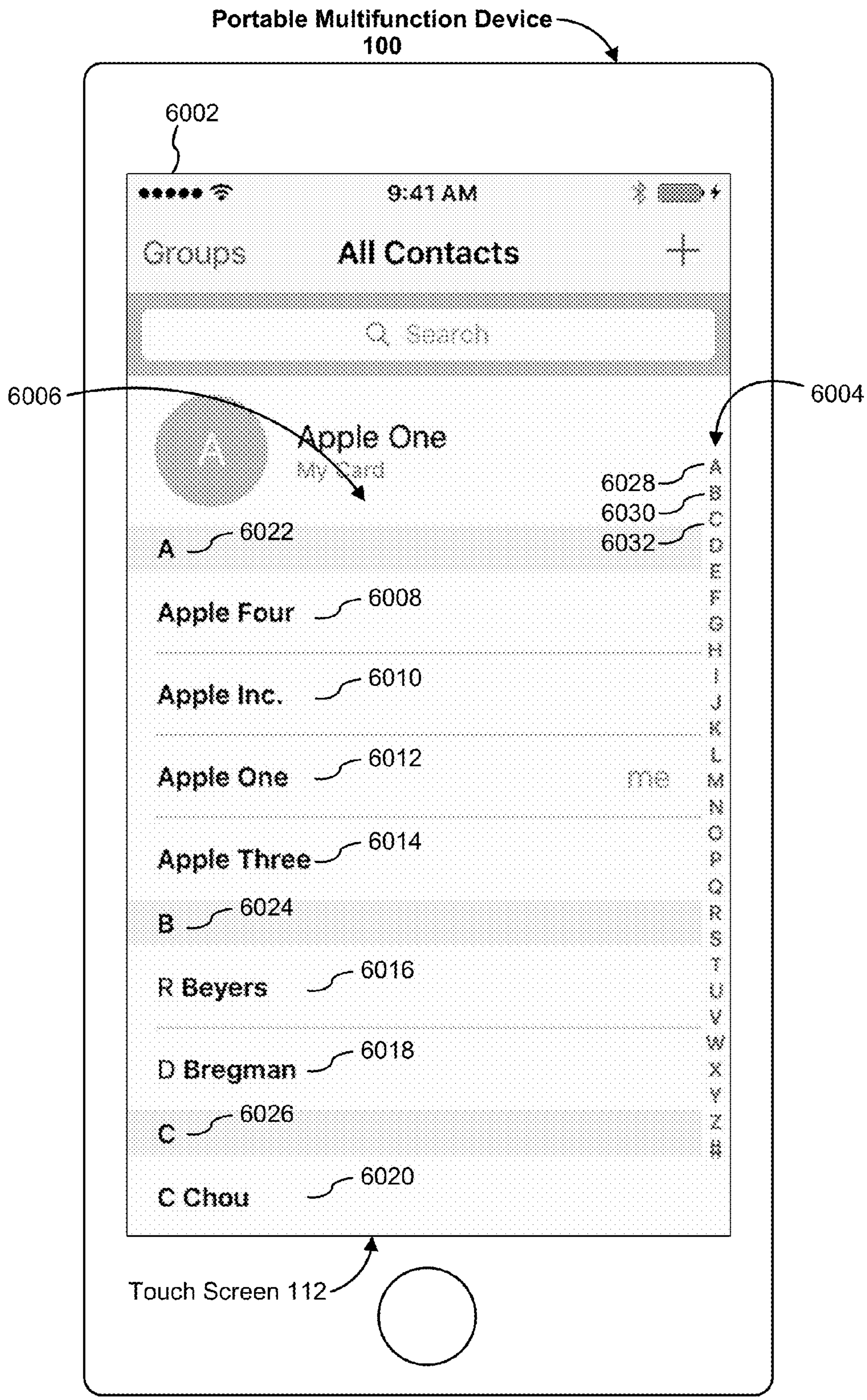
FIGS. 6A-6Z illustrate exemplary user interfaces for providing haptic feedback in conjunction with switching between subsets of indexed content during navigation of indexed content in accordance with some embodiments.
Figure 6B:
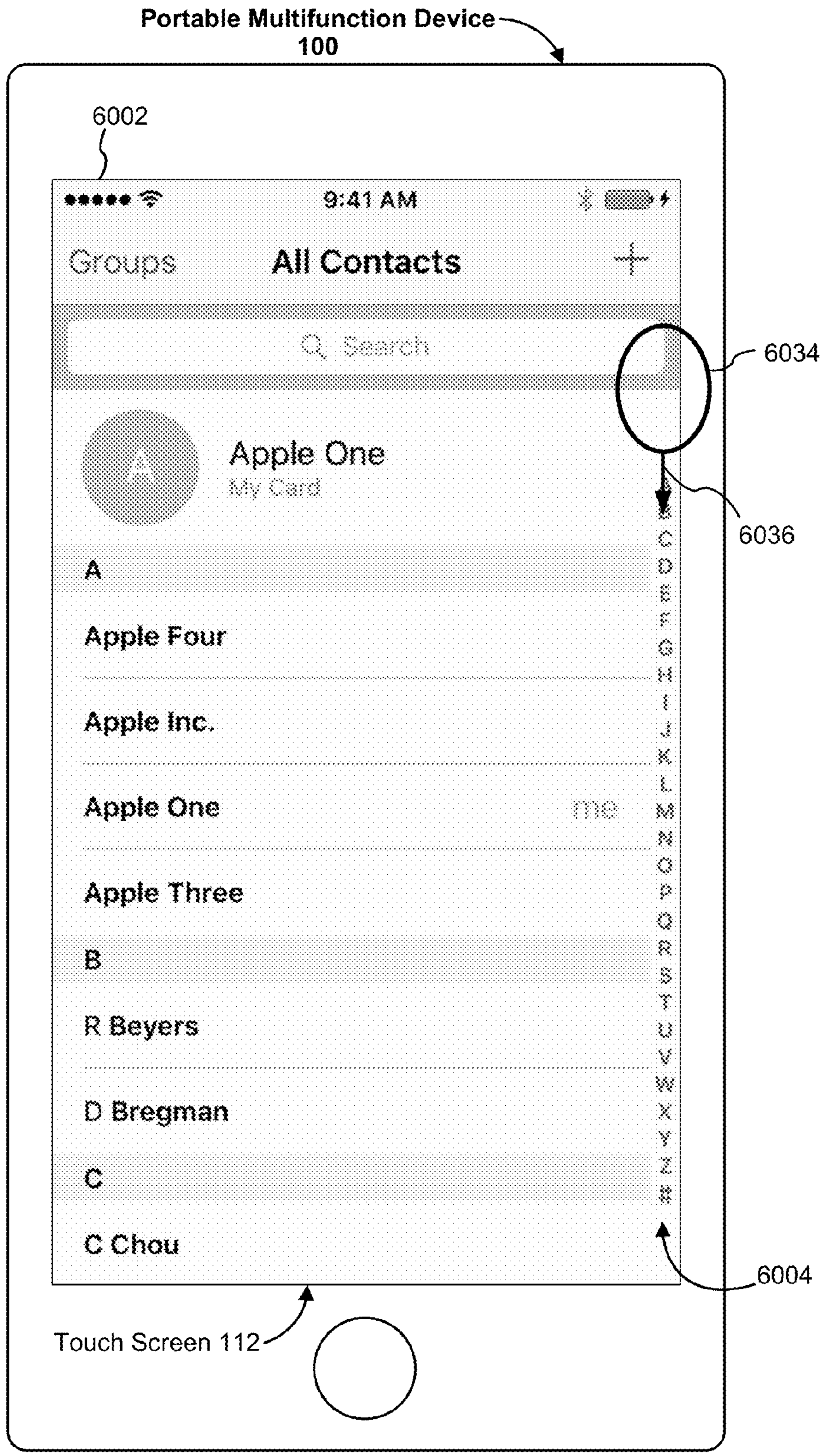
Figure 6C:
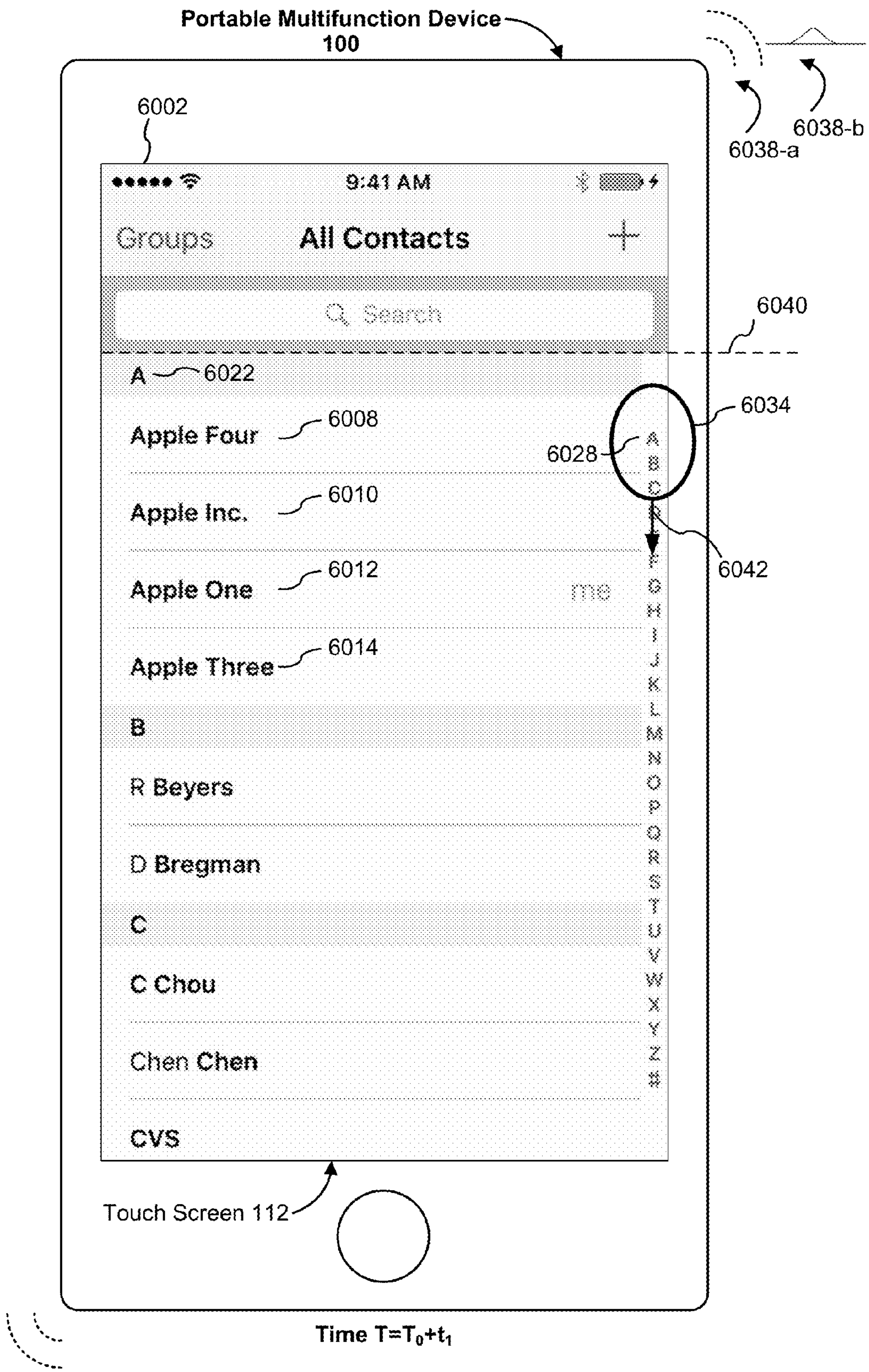
Figure 6D:
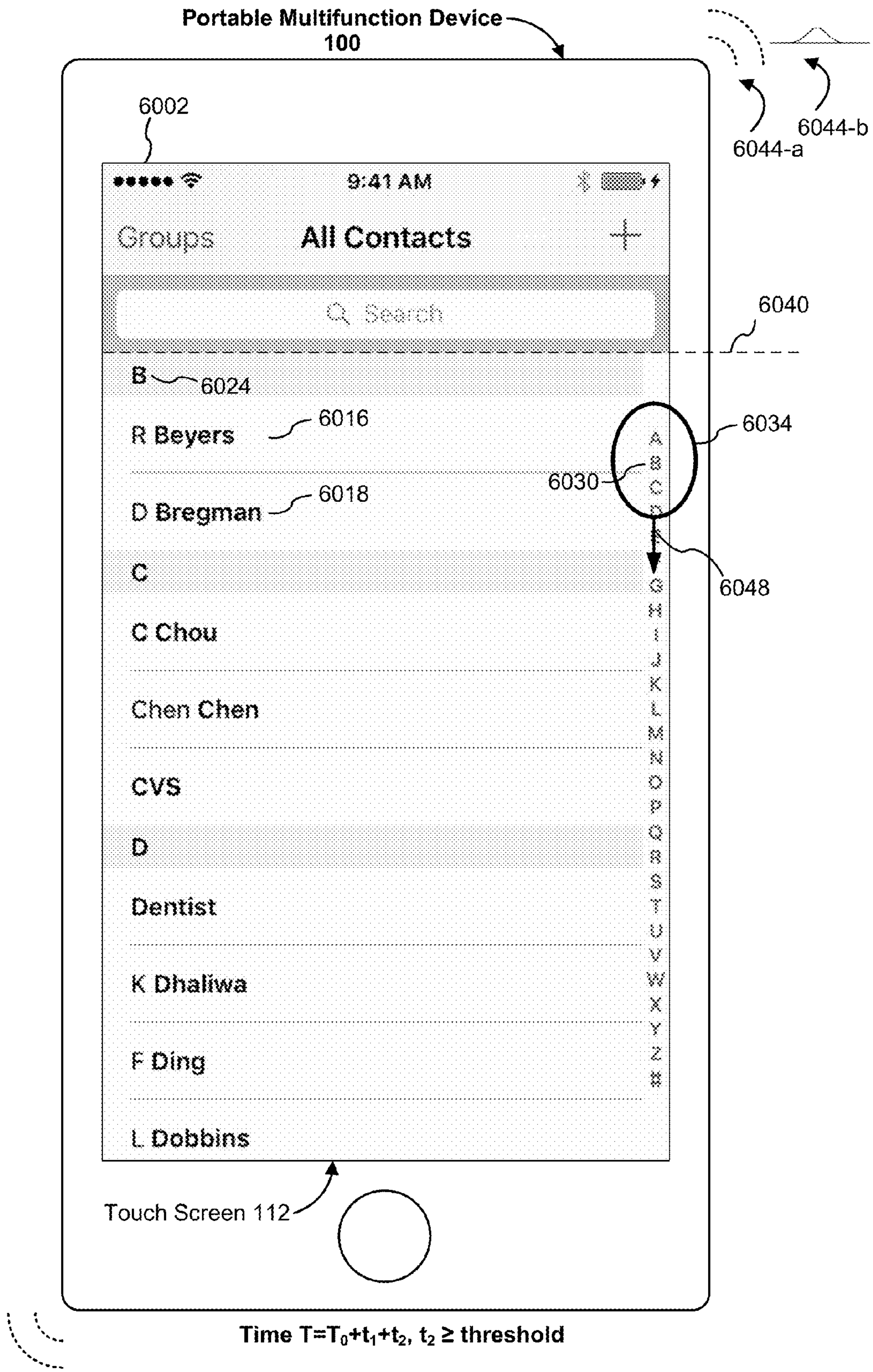
Figure 6E:
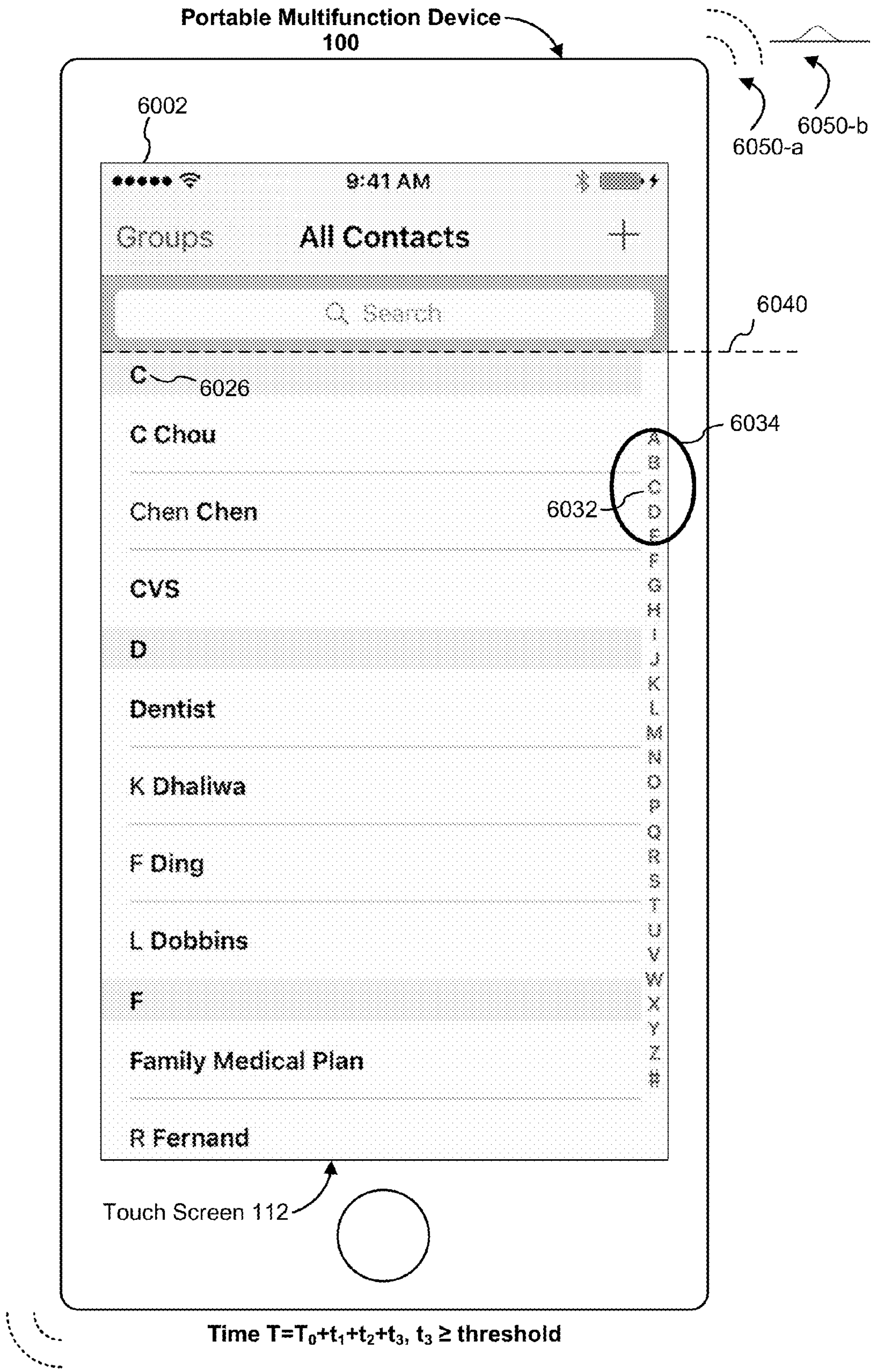
Figure 6F:
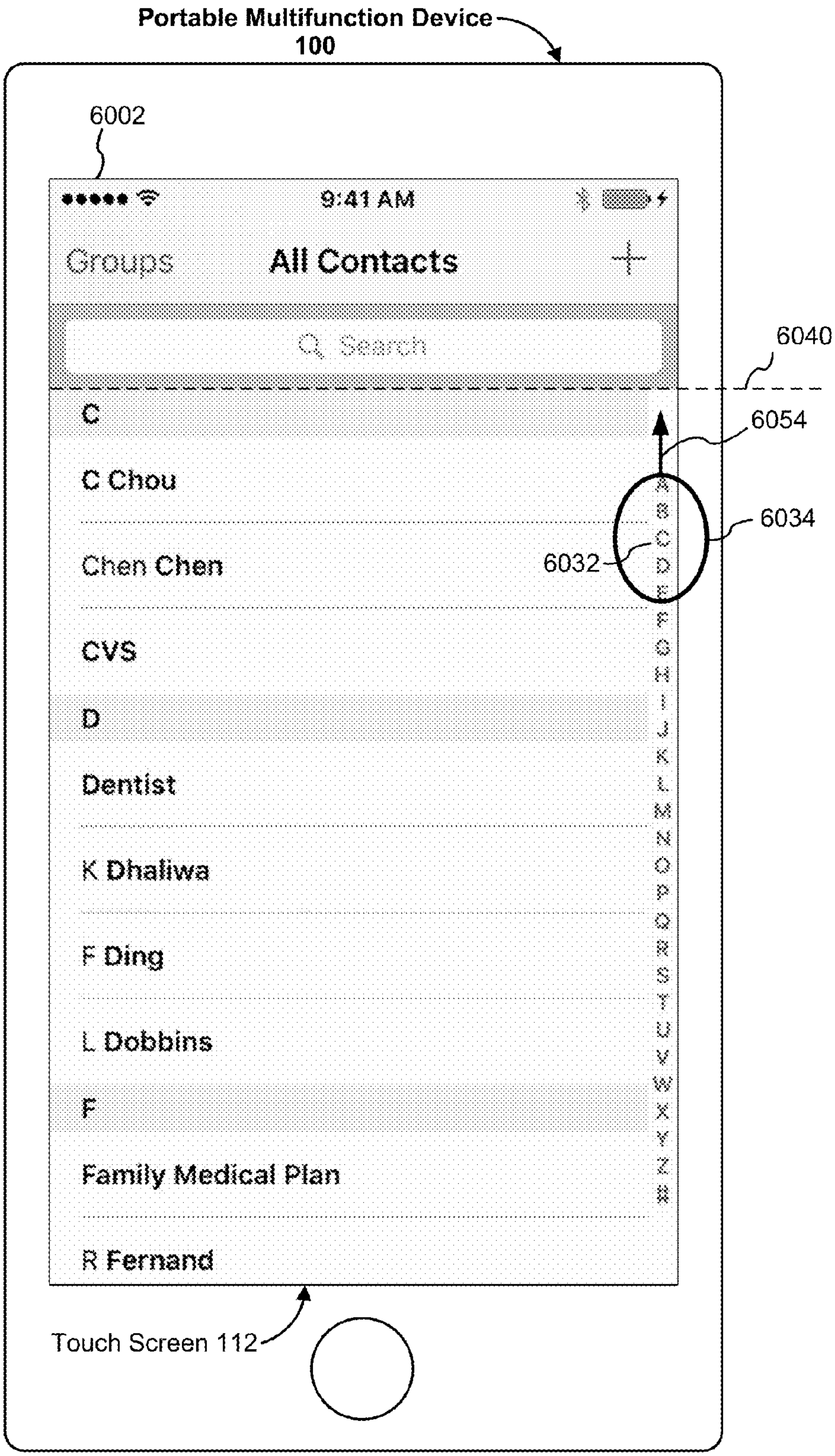
Figure 6G:
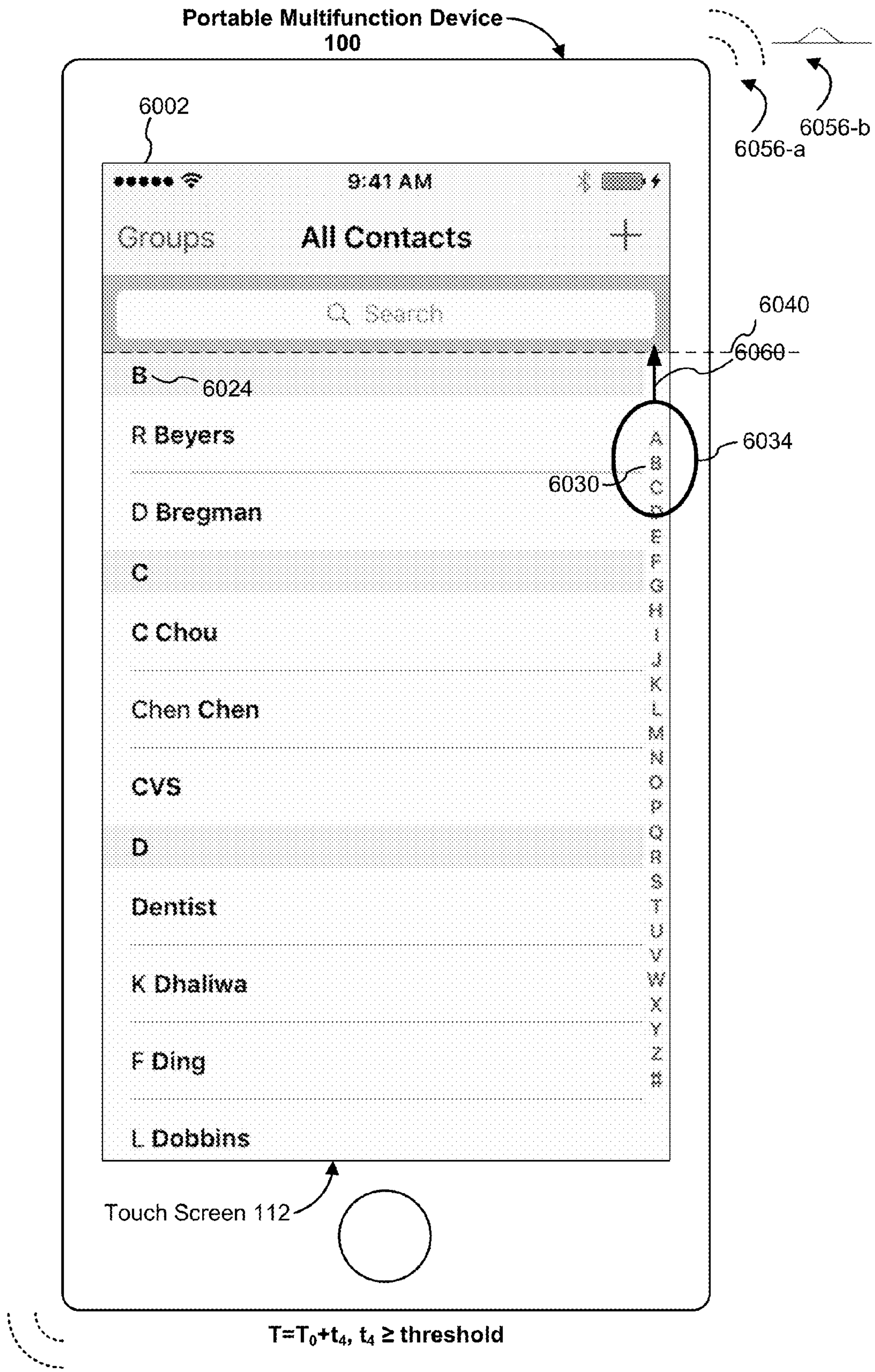
Figure 6H:
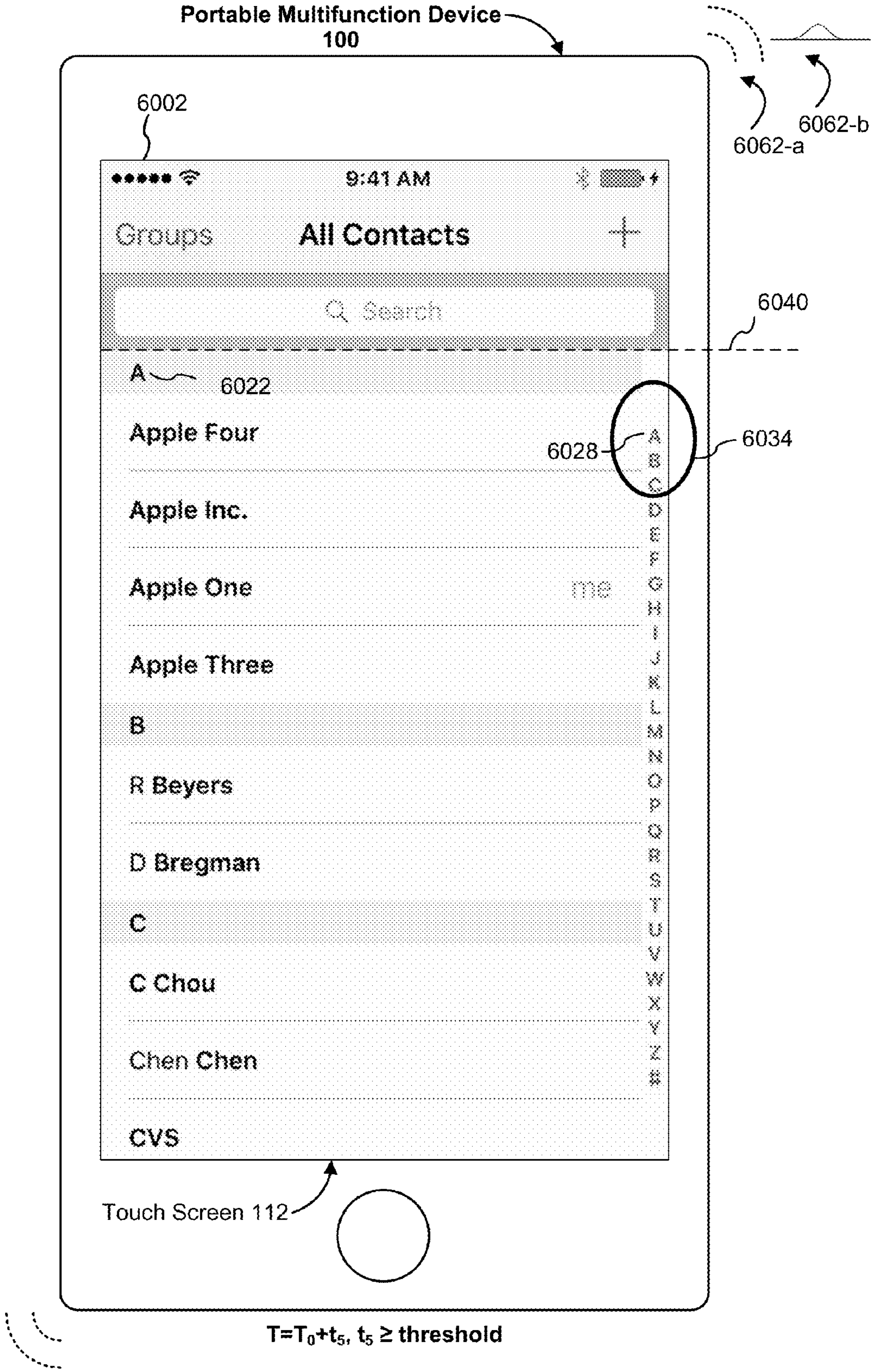
Figure 6I:
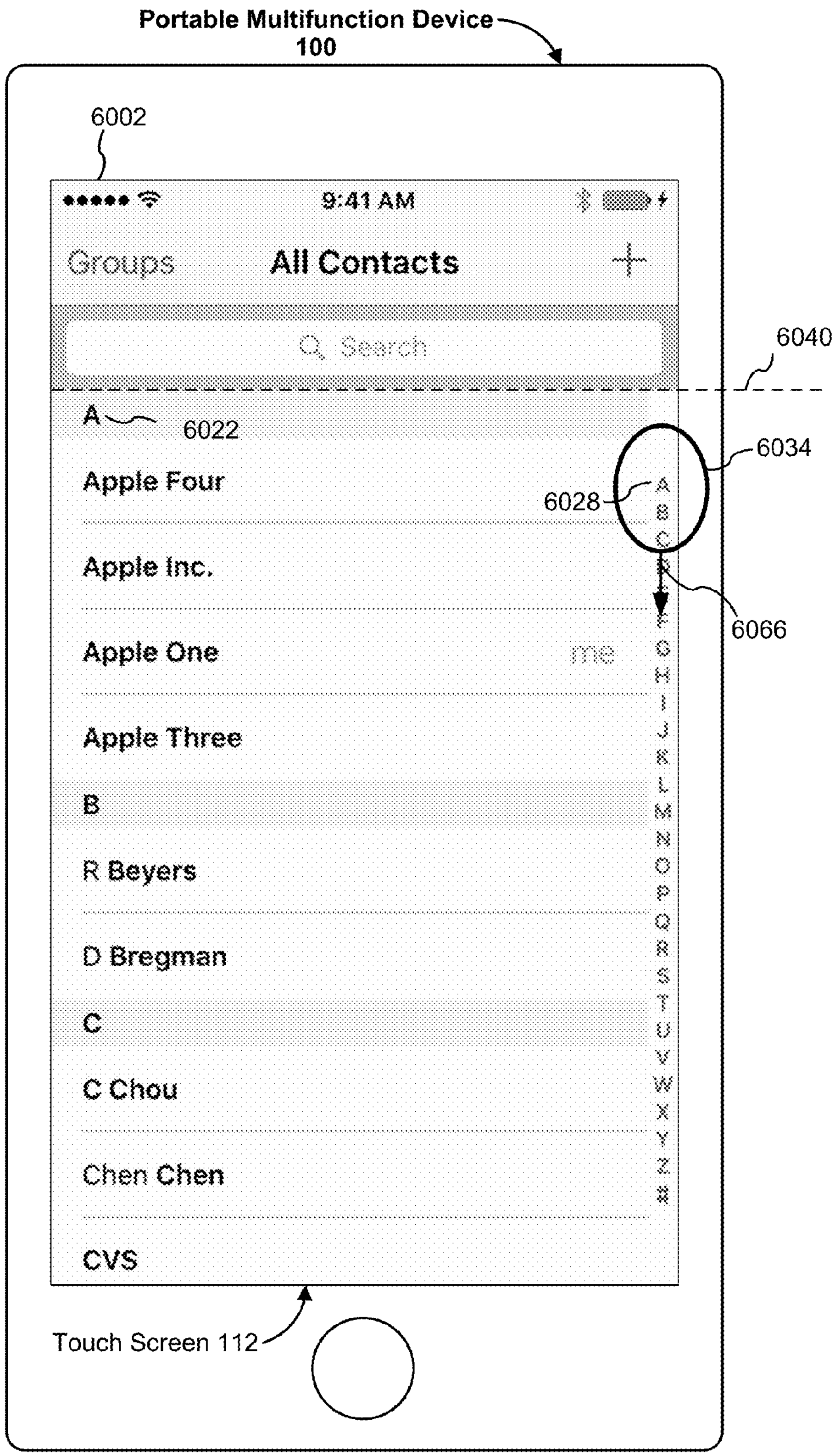
Figure 6J:
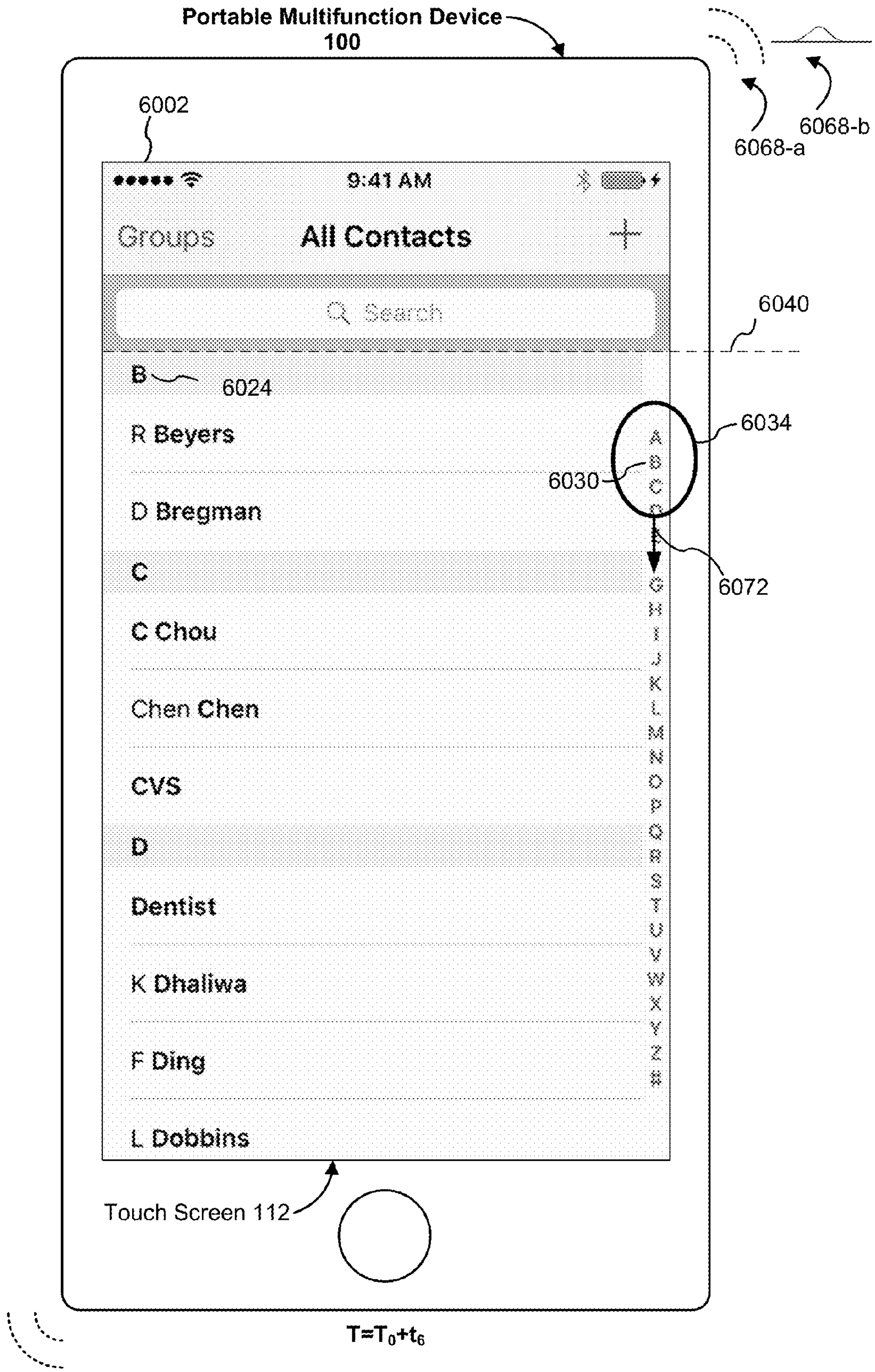
Figure 6K:
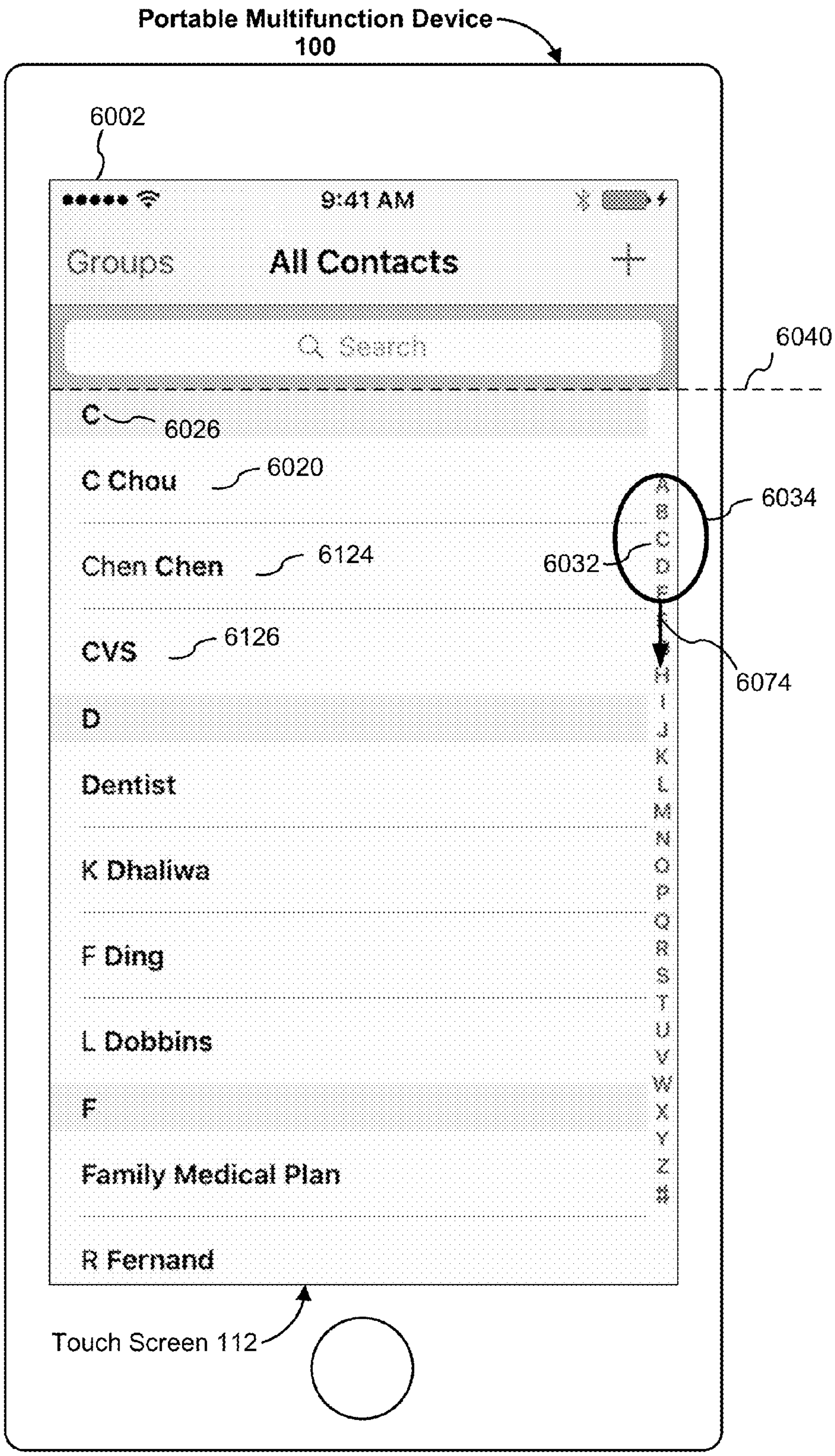
Figure 6L:
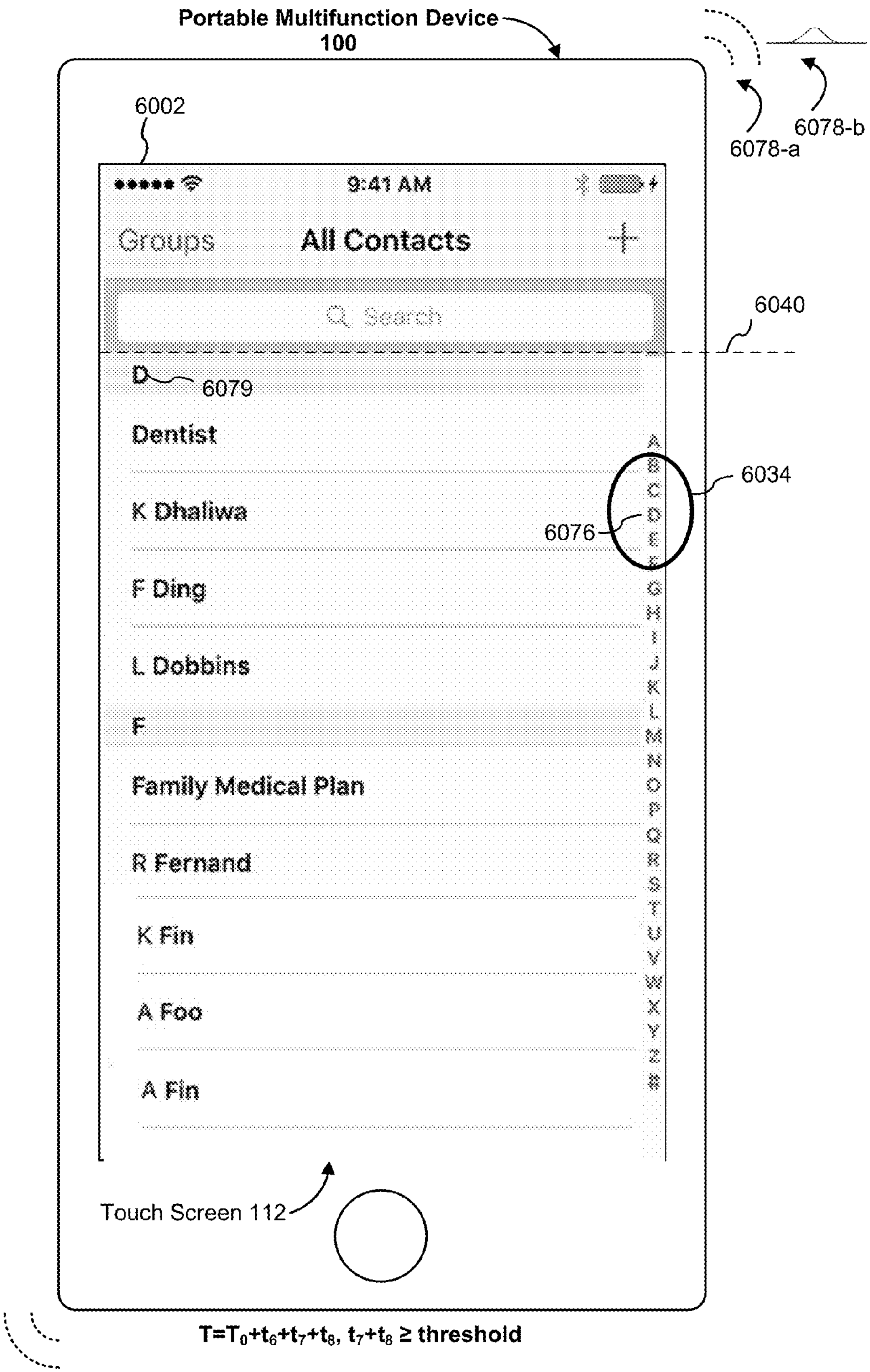
Figure 6M:
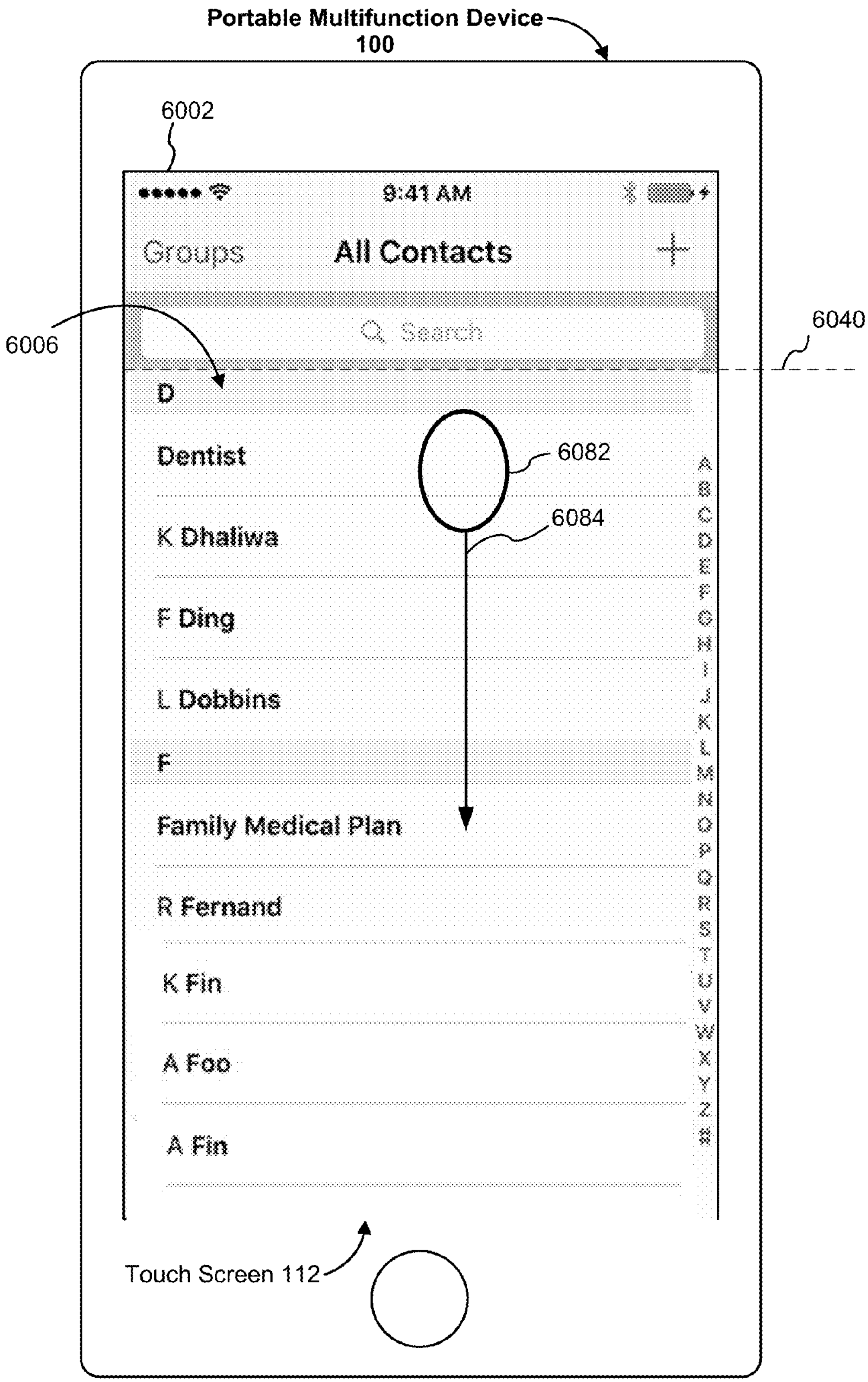
Figure 6N:
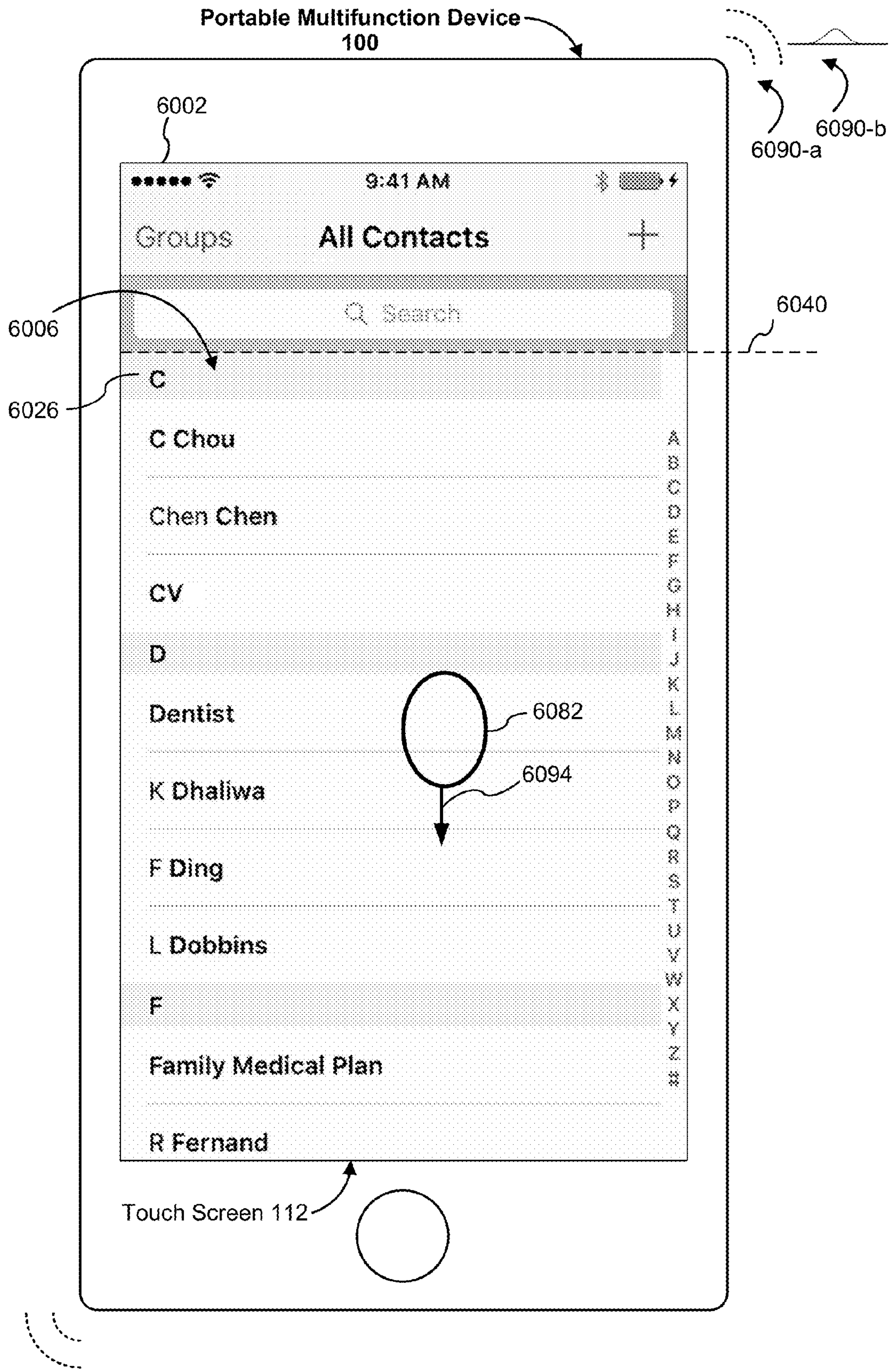
Figure 6O:
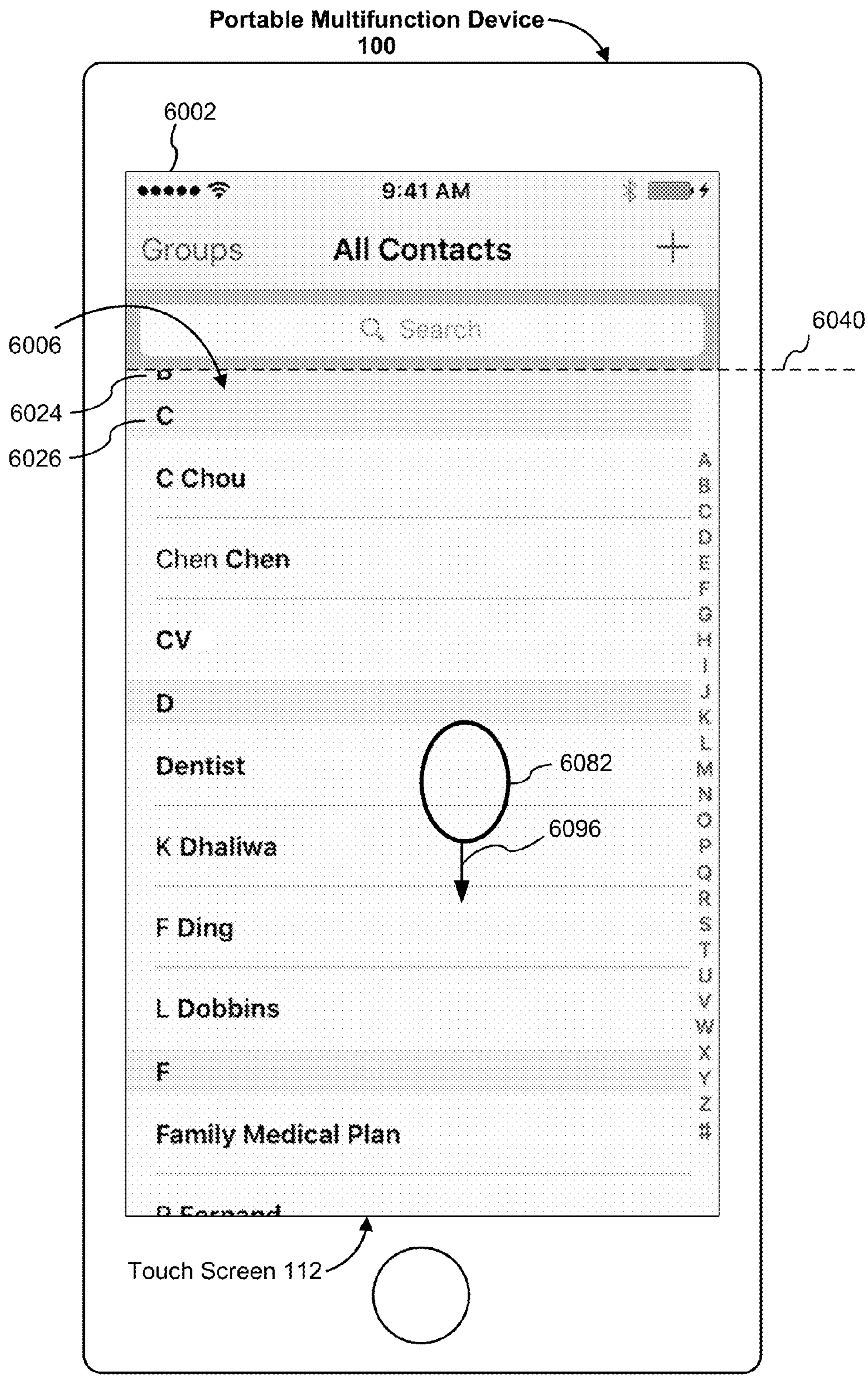
Figure 6P:
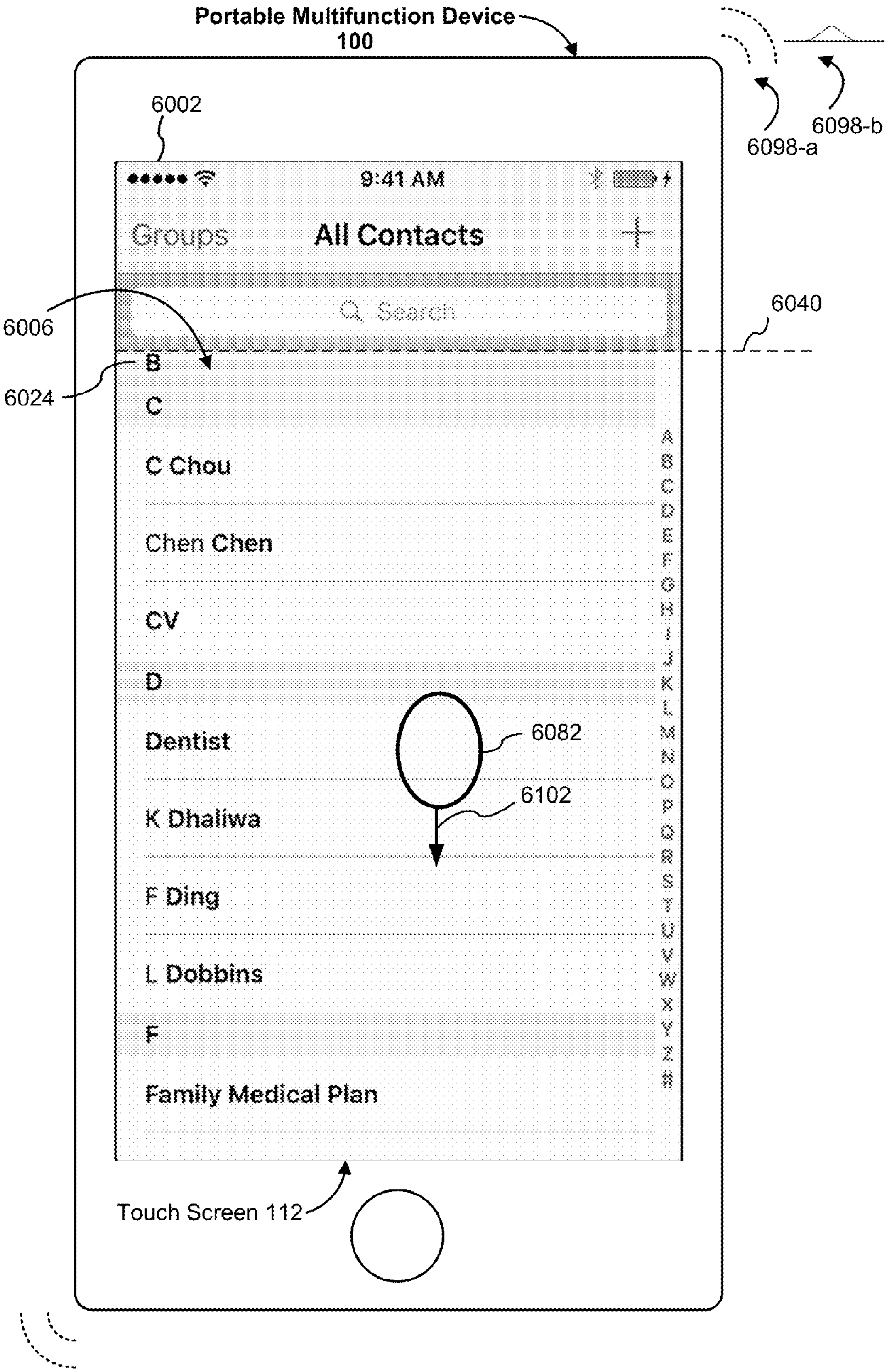
Figure 6Q:
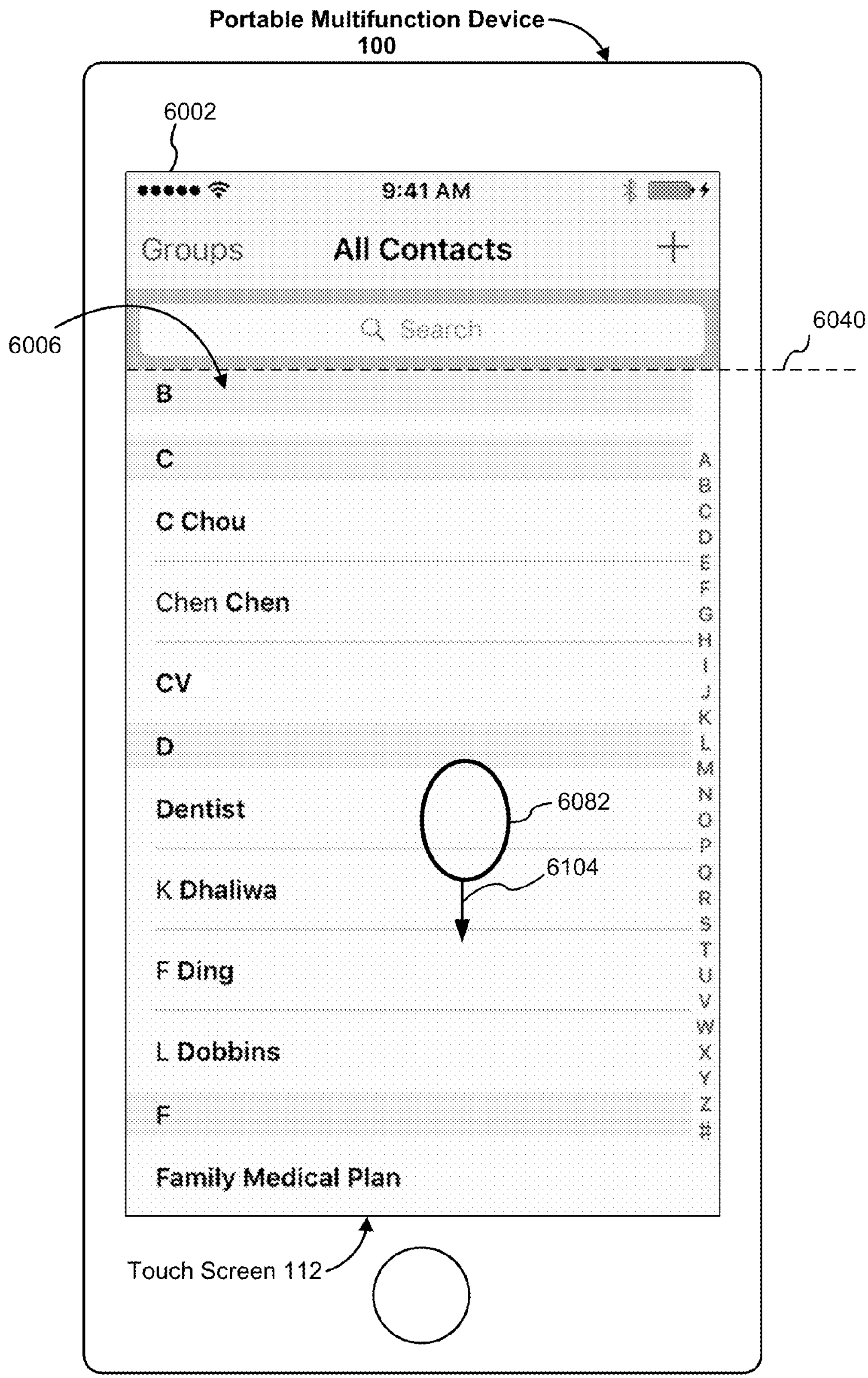
Figure 6R:
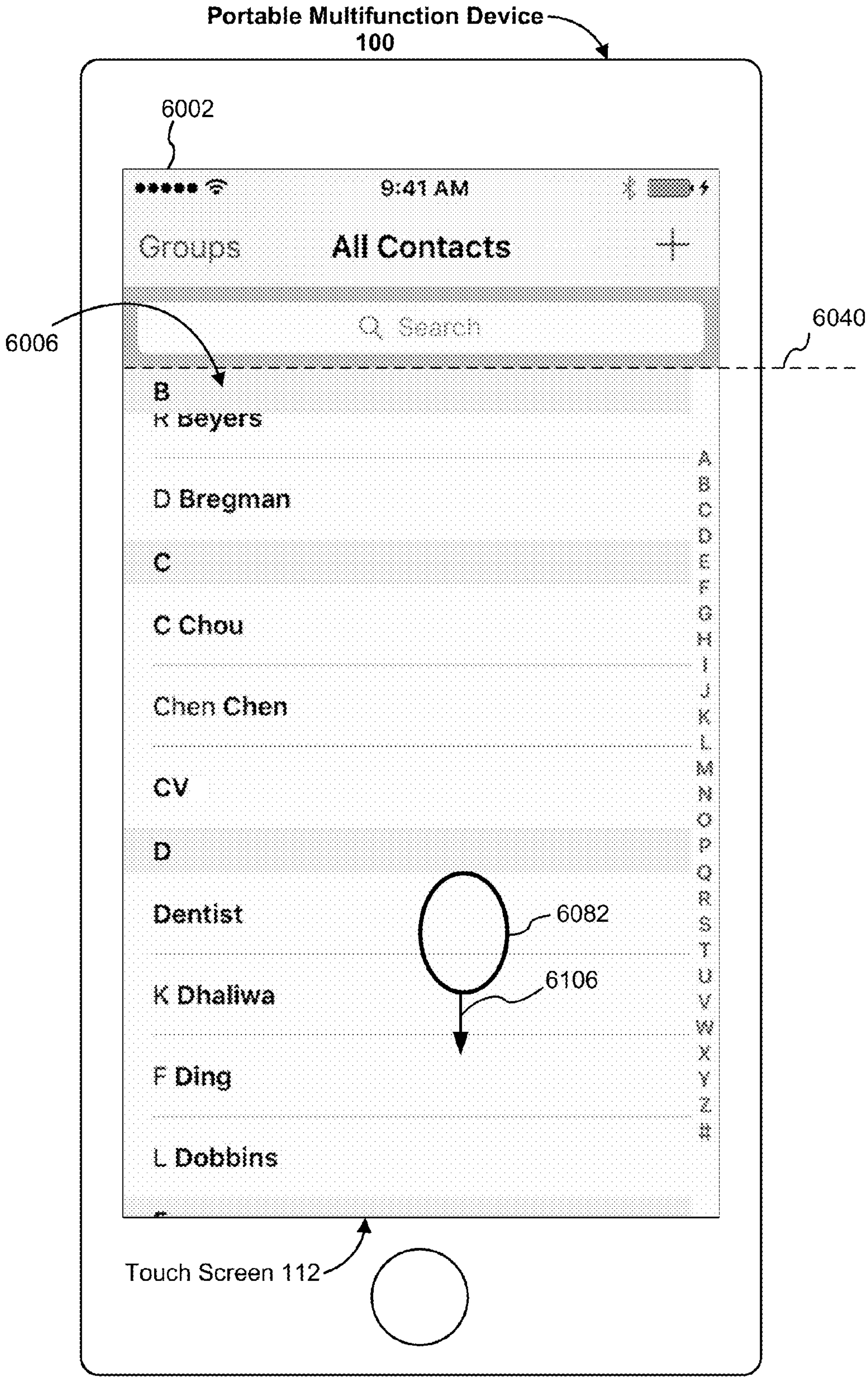
Figure 6S:
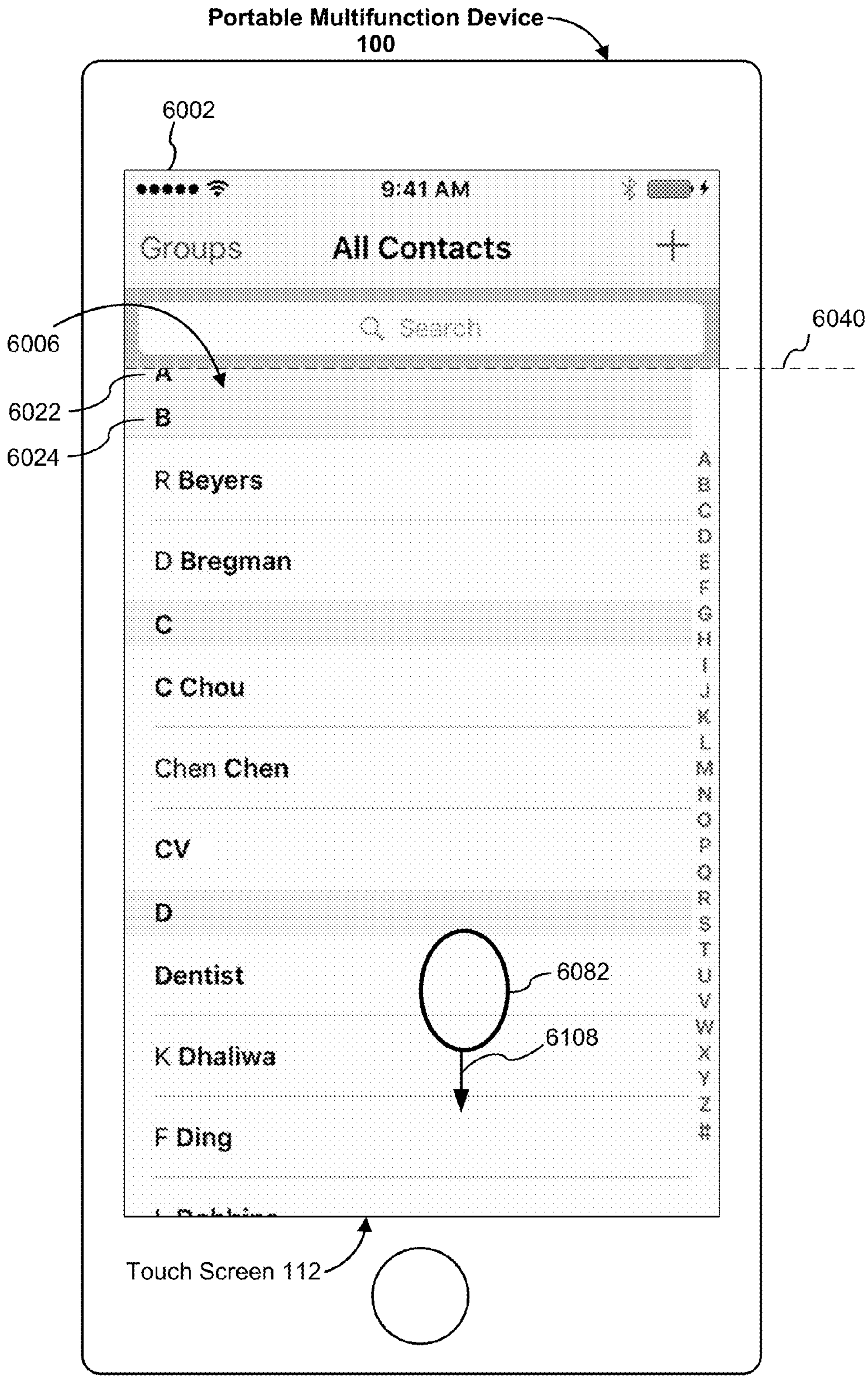
Figure 6T:
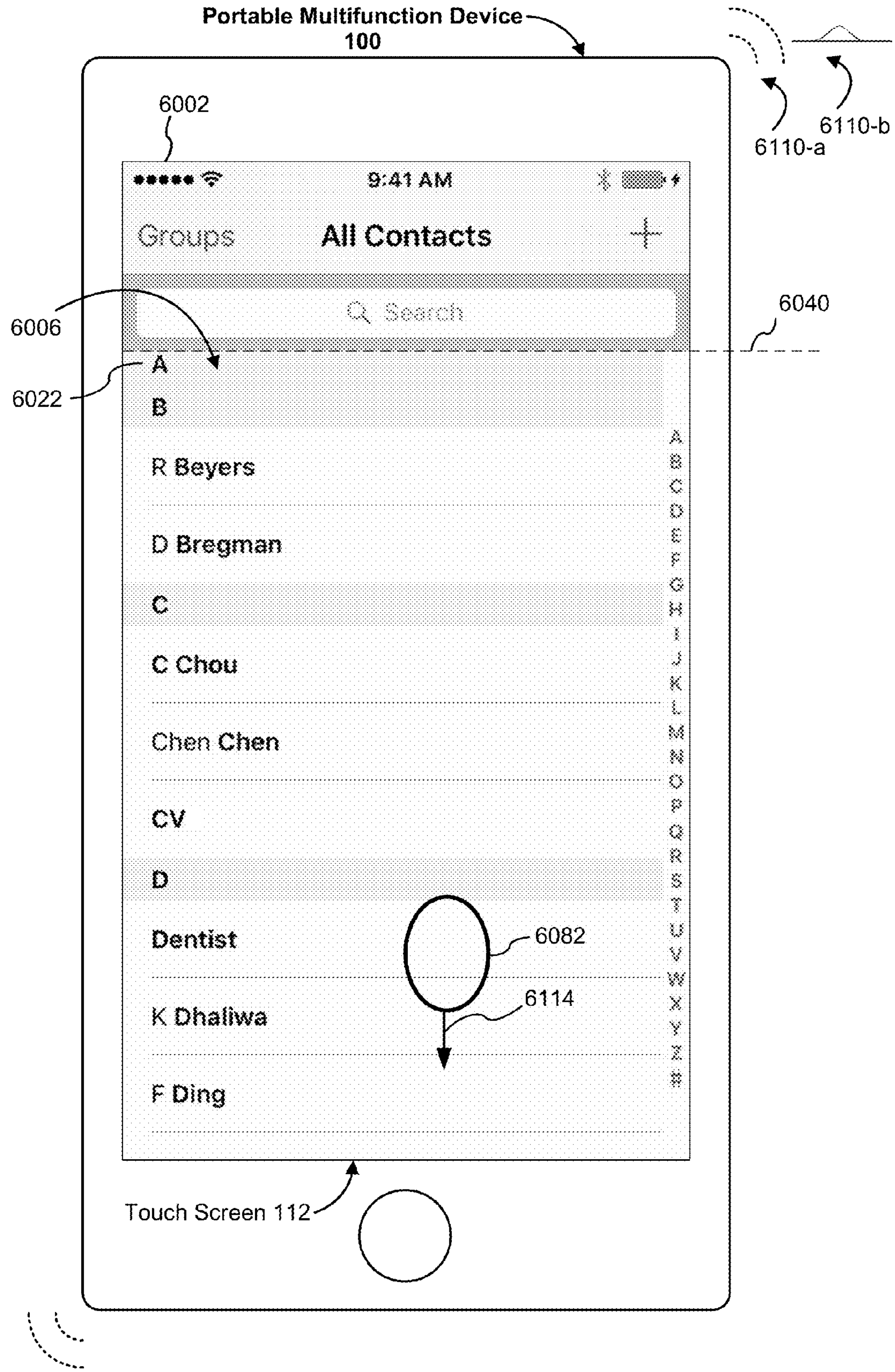
Figure 6U:
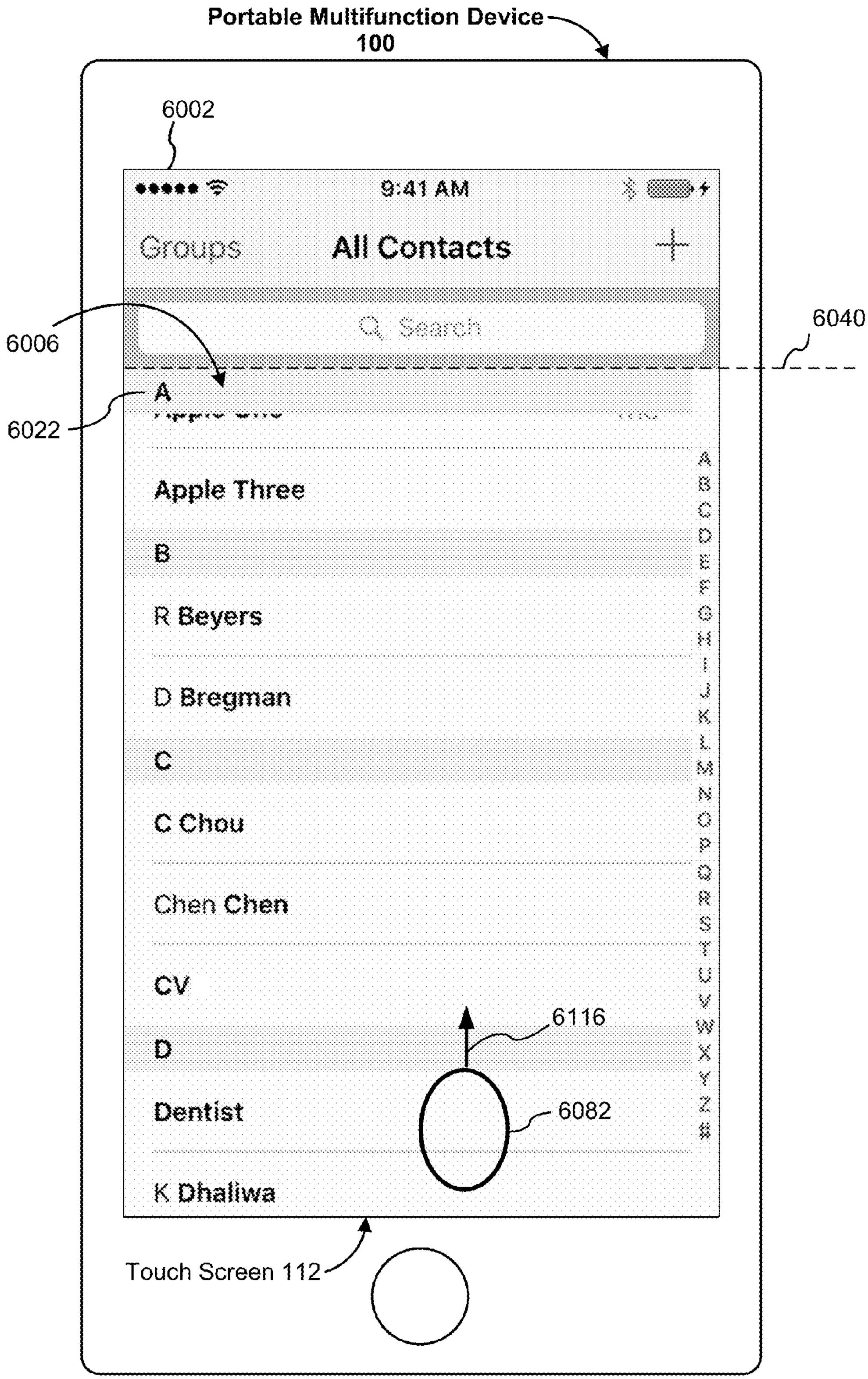
Figure 6V:
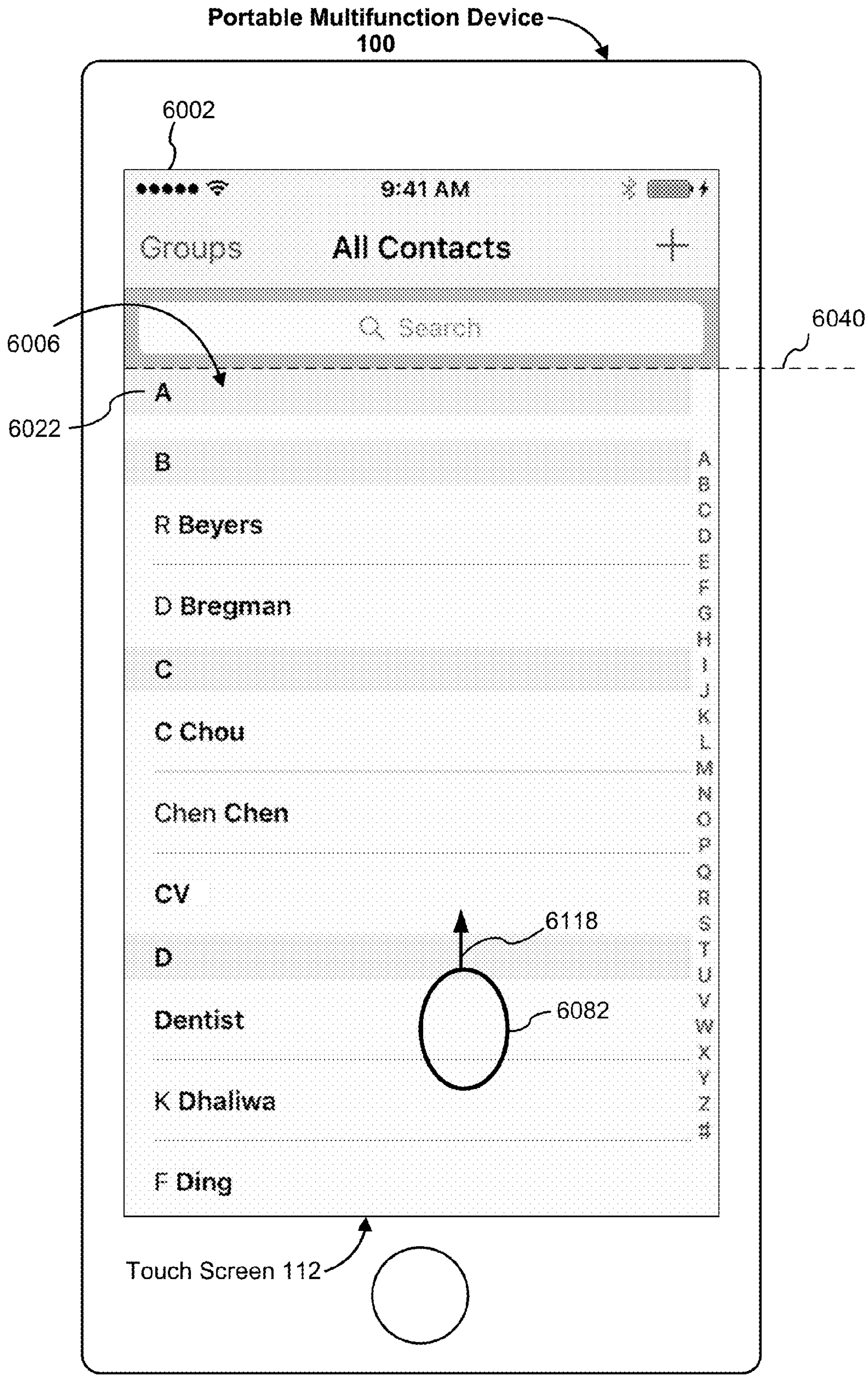
Figure 6W:
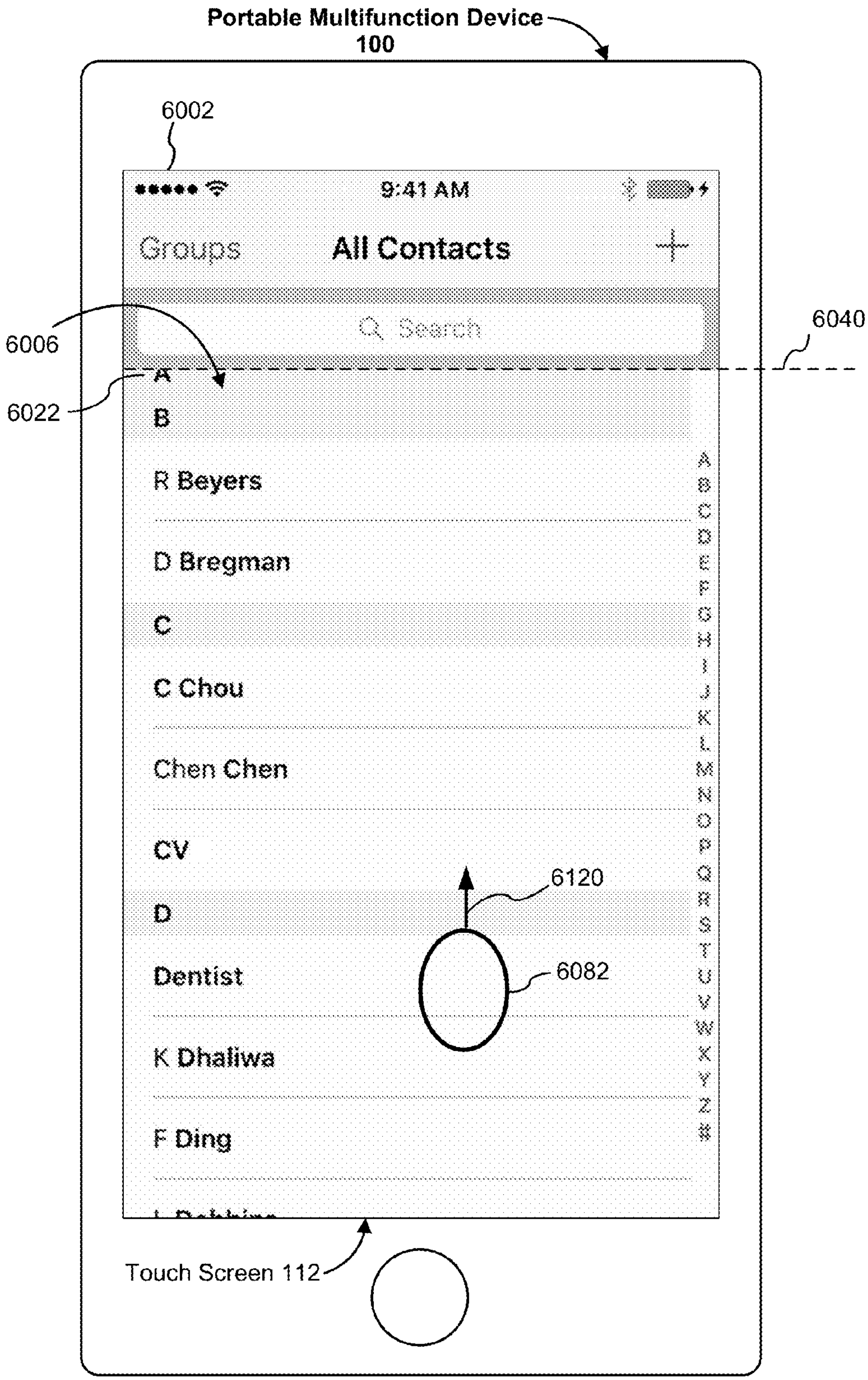
Figure 6X:
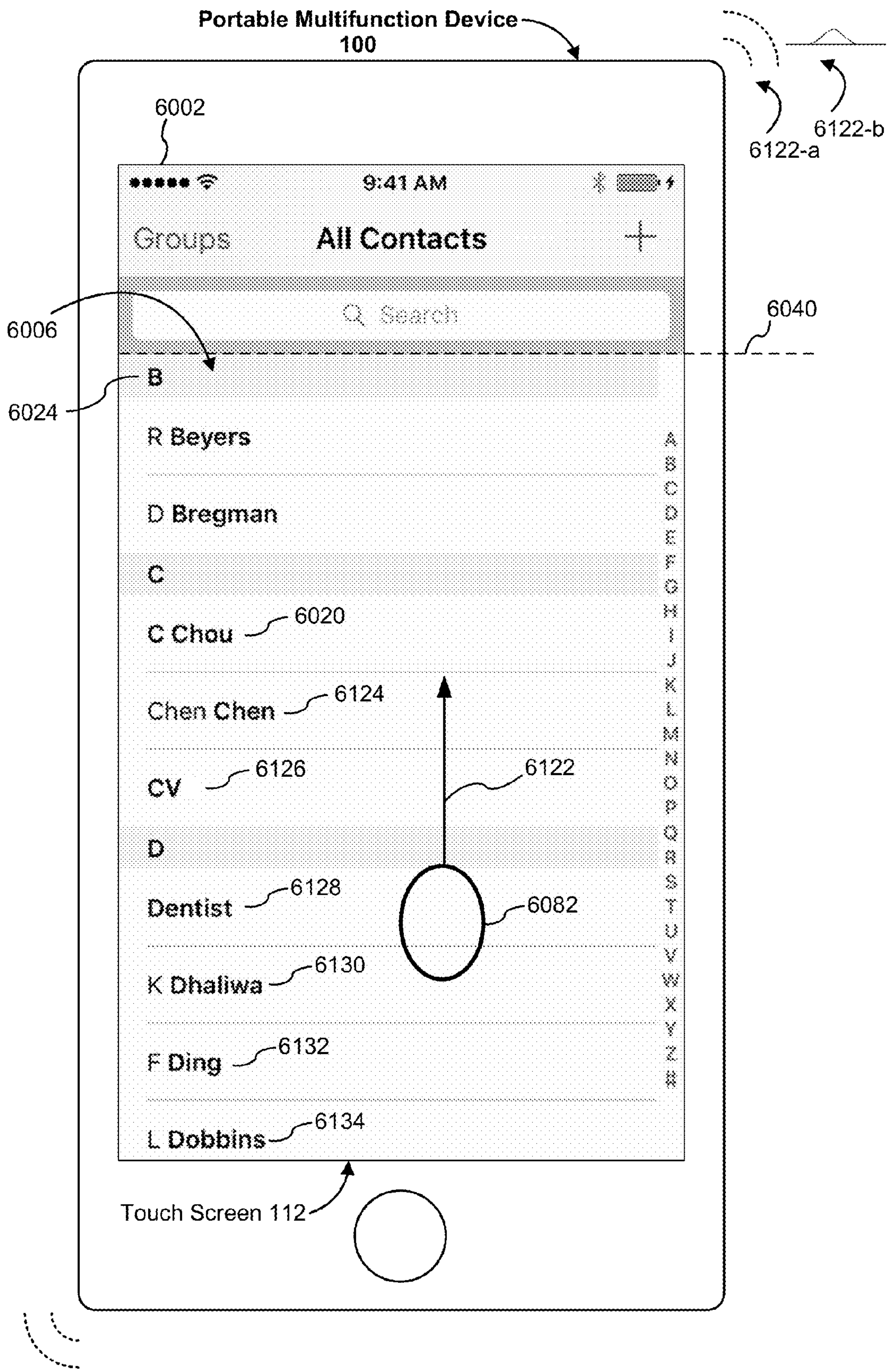
Figure 6Y:
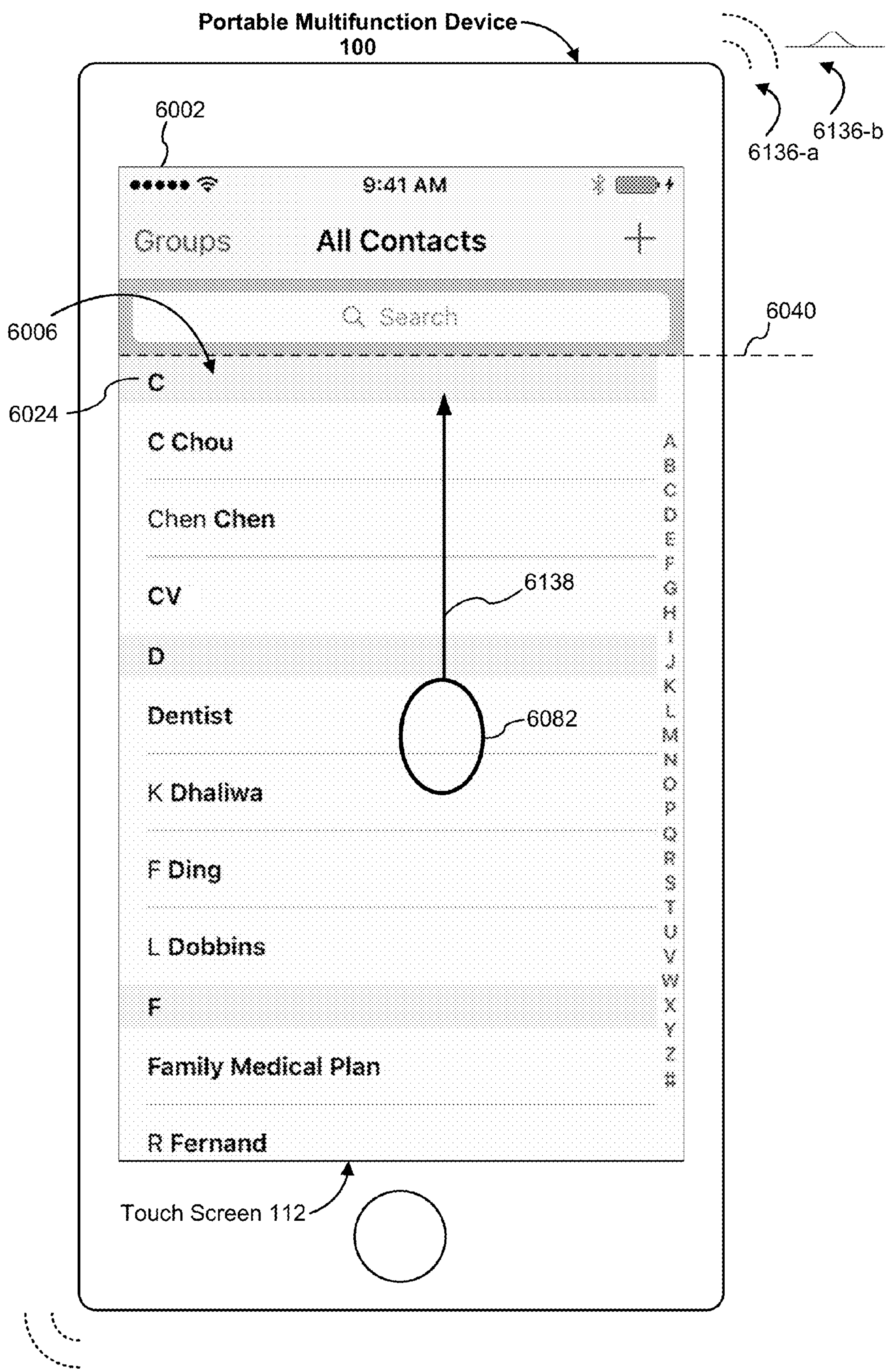
Figure 6Z:
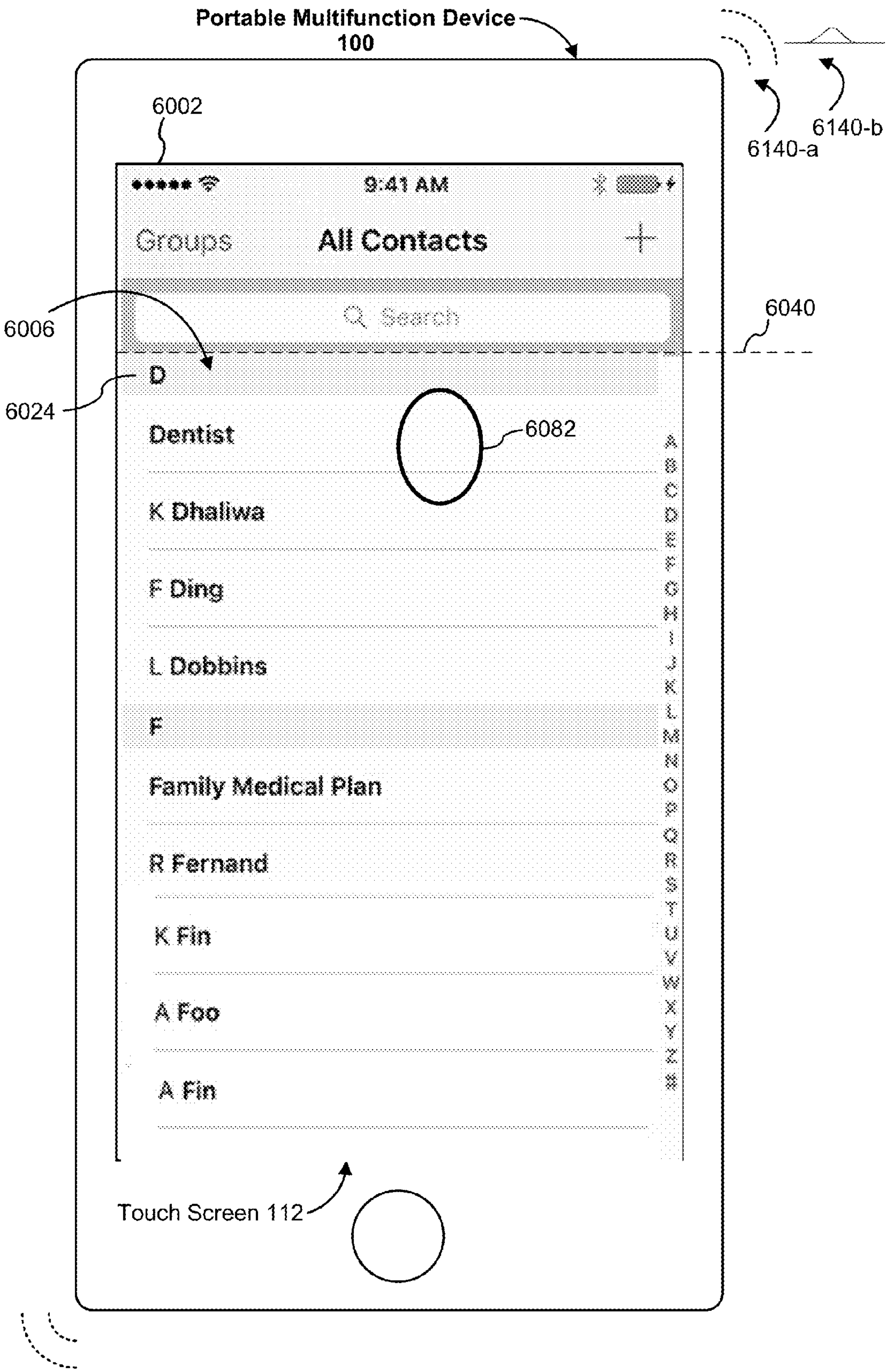

FIGS. 6A-6Z illustrate example user interfaces for providing tactile outputs that correspond to switching between content that correspond to different indices during navigation of indexed content. The user interfaces in these figures are used to illustrate the processes described below, including the processes in FIGS. 22A-22E. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIG. 6A illustrates a user interface 6002 for navigating an indexed list of names (e.g., contacts) in an address book. The user interface 6002 includes index scrubber 6004 and name list 6006. The name entries in name list 6006 are categorized into groups according to a letter in the identifying information for a name. Name list 6006 includes an "A" group of names (e.g., names that start with the letter "A") that includes names 6008, 6010, 6012, and 6014; a "B" group of names (e.g., names that start with the letter "B") that includes names 6016 and 6018; and a "C" group of names (e.g., names that start with the letter "C") that includes name 6022 and 6018. The name list 6006 includes group indices that are located adjacent to (e.g., preceding) the groups. For example, the "A" group of names is preceded by "A" group index 6022, the "B" group of names is preceded by "B" group index 6024, and the "C" group of names is preceded by "C" group index 6026. Index scrubber 6004 includes a listing of all of the group indices (in some embodiments, only a subset of group indices are displayed (e.g., some intermediate group indices may not be displayed due to space constraints in the index scrubber 6004)) for the name list 6006. For example, index scrubber 6004 includes index marker 6028 for index "A," index marker 6030 for index "B," and index marker 6032 for index "C."

FIGS. 6B-6H illustrate input to navigate between groups of name entries in name list 6006 using index scrubber 6004.

FIGS. 6B-6E illustrates movement of contact 6034 in the downward direction along index scrubber 6004.

In FIG. 6B, at an initial time $T=T_0$, the device detects an input, such as touch-down of contact 6034 on touch screen 112. Contact 6034 moves downward along index 6004 as indicated by arrow 6036.

In FIG. 6C, at a time $T=T_0+t_1$, contact 6034 has moved along the path indicated by arrow 6036 to a location on touch screen 112 that corresponds to index marker 6028 for index value "A" on index scrubber 6004. When contact 6034 moves to the location of index marker 6028 for index value "A" on index scrubber 6004, name list 6006 is shifted on the display such that "A" group index 6022 is located at upper edge 6040 of the region in which name list 6006 is displayed and the device produces tactile output 6038 (e.g., MicroTap (270 Hz), gain: 0.5, as illustrated by indicator 6038-*a* and waveform 6038-*b*). Contact 6034 continues to move downward along index 6004 as indicated by arrow 6042.

In FIG. 6D, at a time $T=T_0+t_1+t_2$, contact 6034 has moved along the path indicated by arrow 6042 to a location of index marker 6030 for index value "B" on index scrubber 6004. Time interval $t_2$ is greater than or equal to a threshold amount of time. When contact 6034 moves to a location of index marker 6030 for index value "B" on index scrubber 6004, name list 6006 is shifted on the display such that "B" group index 6024 is located at upper edge 6040 of the region in which name list 6006 is displayed and the device produces tactile output 6044 (e.g., MicroTap (270 Hz), gain: 0.5, as illustrated by indicator 6044-*a* and waveform 6044-*b*). Contact 6034 continues to move downward along index 6004 as indicated by arrow 6048.

In this example, the movement of contact 6034 along index scrubber 6004 is "slow" movement, during which the device provides tactile output every time contact 6034 reaches a next index marker along index scrubber 6004. In some embodiments, when movement of the contact 6034 is "fast" movement (e.g., the contact 6034 moves from an index marker to subsequent index markers at time intervals that are shorter than the threshold amount of time), the device does not provide tactile outputs every time contact 6034 reaches a next index marker along index scrubber 6004 (e.g., some tactile outputs are skipped), as described further below with regard to FIGS. 6I-6L.

In FIG. 6E, at a time $T=T_0+t_1+t_2+t_3$, contact 6034 has moved along the path indicated by arrow 6048 to a location of index marker 6032 for index value "C" on index scrubber 6004. Time interval $t_3$ is greater than or equal to the threshold amount of time described above with regard to FIG. 6D. When contact 6034 moves to a location of index marker 6032 for index value "C" on index scrubber 6004, name list 6006 is shifted on the display such that "C" group index 6026 is located at upper edge 6040 of the region in which name list 6006 is displayed and the device produces tactile output 6050 (e.g., MicroTap (270 Hz), gain: 0.5, as illustrated by indicator 6050-*a* waveform 6050-*b*).

FIGS. 6F-6H illustrates movement of contact 6034 in the upward direction along index scrubber 6004.

In FIG. 6F, at a time $T=T_0$ ($T_0$ in FIGS. 6F-6H is different from $T_0$ in FIGS. 6B-6E), contact 6034 is a location of index marker 6032 for index marker "C" on index scrubber 6004. Contact 6034 moves upward along index 6004 as indicated by arrow 6054.

In FIG. 6G, at a time $T=T_0+t_4$, contact 6034 has moved along the path indicated by arrow 6054 to a location of index marker 6030 for index value "B" on index scrubber 6004. Time interval $t_4$ is greater than or equal to the threshold amount of time since when the device generated the last tactile output (e.g., tactile output 6050). When contact 6034 moves to a location of index marker 6030 for index marker "B" on index scrubber 6004, name list 6006 is shifted on the display such that "B" group index 6024 is located at upper edge 6040 of the region in which name list 6006 is displayed and the device produces tactile output 6056 (e.g., MicroTap (270 Hz), gain: 0.5, as illustrated by indicator 6056-*a* and waveform 6056-*b*). Contact 6034 continues to move upward along index scrubber 6004 as indicated by arrow 6060.

In FIG. 6H, at a time $T=T_0+t_4+t_5$, contact 6034 has moved along the path indicated by arrow 6060 to a location of index marker 6028 for index value "A" on index scrubber 6004. Time interval $t_5$ is greater than or equal to the threshold amount of time described above with regard to FIG. 6D. When contact 6034 moves to a location of index marker 6028 for index value "A" on index scrubber 6004, name list 6006 is shifted on the display such that "A" group index 6022 is located at upper edge 6040 of the region in which name list 6006 is displayed and the device produces tactile output 6062 (e.g., MicroTap (270 Hz), gain: 0.5, as illustrated by indicator 6062-*a* and waveform 6062-*b*).

FIGS. 6I-6L illustrate an input (e.g., with "fast" movement) to navigate between groups of name entries in name list 6006 using index scrubber 6004.

In FIG. 6I, at an initial time $T=T_0$ (($T_0$ in FIGS. 6I-6L is different from $T_0$ in FIGS. 6B-6E and 6F-6H)), the device detects an input, such as touch-down of contact 6034 on touch screen 112. Contact 6034 moves downward along index scrubber 6004 as indicated by arrow 6066.

In FIG. 6J, at a time $T=T_0+t_6$, contact 6034 has moved along the path indicated by arrow 6066 to a location of index marker 6030 for index value "B" on index scrubber 6004. The time T is greater than the threshold amount of time since the device generated the last tactile output (e.g., tactile output 6062). When contact 6034 moves to a location of index marker 6028 for index value "B" on index scrubber 6004, name list 6006 is shifted on the display such that "B" group index 6024 is located at upper edge 6040 of the region in which name list 6006 is displayed and the device produces tactile output 6068 (e.g., MicroTap (270 Hz), gain: 0.5, as illustrated by indicator 6068-*a* and waveform 6068-*b*). Contact 6034 continues to move downward along index 6004 as indicated by arrow 6072.

In the following example, the movement of contact 6034 along index scrubber 6004 is "fast" movement (e.g., faster than the "slow" movement described with regard to FIGS. 6B-6H), during which the device does not provides tactile output every time contact 6034 reaches a next index marker along index scrubber 6004 (e.g., some tactile outputs are skipped).

In FIG. 6K, at a time $T=T_0+t_6+t_7$, contact 6034 has moved along the path indicated by arrow 6072 to a location of index marker 6032 for index value "C" on index scrubber 6004. Time interval $t_7$ is less than the threshold amount of time described above with regard to FIG. 6D. When contact 6034 moves to a location of index marker 6032 for index value "C" on index scrubber 6004, name list 6006 is shifted on the display such that "C" group index 6026 is located at upper edge 6040 of the region in which name list 6006 is displayed, but the device does not produce a tactile output (e.g., the tactile output is "skipped" because the movement of the contact is "fast" movement, and the threshold amount of time has not expired since the device generated the last tactile output (e.g., tactile output 6068). Contact 6034 continues to move downward along index 6004 as indicated by arrow 6074.

In FIG. 6L, at a time $T=T_0+t_6+t_7+t_5$, contact 6034 has moved along the path indicated by arrow 6074 to a location of index marker 6076 for index value "D" on index scrubber 6004. Time interval $t_7+t_5$ is more than the threshold amount of time described above with regard to FIG. 6D. In other words, the threshold amount of time has expired since the generation of the last tactile output (e.g., tactile output 6068). When contact 6034 moves to a location of index marker 6076 for index value "D" on index scrubber 6004, name list 6006 is shifted on the display such that "D" group index 6079 is located at upper edge 6040 of the region in which name list 6006 is displayed and the device produces a tactile output 6078 (e.g., MicroTap (270 Hz), gain: 0.5, as illustrated by indicator 6078-*a* and waveform 6078-*b*).

FIGS. 6M-6Z illustrate a process for swiping on name list 6006 to navigate between groups of name entries. Tactile outputs are optionally generated when each group of names passes a threshold position in the user interface.

In FIG. 6M, the device detects an input, such as touch-down of contact 6082 at a location on touch screen 112 that corresponds to name list 6006. Contact 6082 moves downward in name list 6006 as indicated by arrow 6084.

In FIG. 6N, contact 6082 has moved along the path indicated by arrow 6084. Name list 6006 moves in response to the movement of contact 6082 (e.g., name list 6006 is "attached" to contact 6082 such that the name list 606 moves along the path indicated by arrow 6084). When name list 6006 has scrolled such that "C" group index 6026 has moved across upper edge 6040 of a region in which name list 6006 is displayed, the device produces tactile output 6090 (e.g., MicroTap (270 Hz), gain: 0.5, as illustrated by indicator 6090-*a* and waveform 6090-*b*). Contact 6082 continues to move downward in name list 6006 as indicated by arrow 6094.

In FIG. 6O, contact 6082 has moved along the path indicated by arrow 6094. Name list 6006 moves in response to the movement of contact 6094 such that "B" group index 6024 is partially displayed but has not yet fully crossed upper edge 6040 of the region in which name list 6006 is displayed. Contact 6082 continues to move downward in name list 6006 as indicated by arrow 6096.

In FIG. 6P, contact 6082 has moved along the path indicated by arrow 6096. Name list 6006 moves in response to the movement of contact 6082. When name list 6006 has scrolled such that "B" group index 6024 has moved across upper edge 6040 of the region in which name list 6006 is displayed, the device produces tactile output 6098 (e.g., MicroTap (270 Hz), gain: 0.5, as illustrated by indicator 6098-*a* and waveform 6098-*b*). Contact 6082 continues to move downward in name list 6006 as indicated by arrow 6102.

In FIGS. 6Q-6R, contact 6082 moves downward in name list 6006 as indicated by arrows 6104 and 6106. Name list 606 scrolls downward in response to movement of contact 6082, revealing names in the "B" group.

In FIG. 6S, contact 6082 has moved along the path indicated by arrow 6106. Name list 6006 moves in response to the movement of contact 6082 such that "A" group index 6022 is partially displayed but has not yet fully crossed upper edge 6040 of the region in which name list 6006 is displayed. Contact 6082 continues to move downward in name list 6006 as indicated by arrow 6108.

In FIG. 6T, contact 6082 has moved along the path indicated by arrow 6108. Name list 6006 moves in response to the movement of contact 6082. When name list 6006 has scrolled such that "A" group index 6022 has moved across upper edge 6040 of a region in which name list 606 is displayed, the device produces tactile output 6110 (e.g., MicroTap (270 Hz), gain: 0.5, as illustrated by indicator 6110-*a* and waveform 6110-*b*). Contact 6082 continues to move downward in name list 6006 as indicated by arrow 6114.

In FIG. 6U, contact 6082 has moved along the path indicated by arrow 6114. Name list 6006 moves in response to the movement of contact 6094, revealing names in the "A" group. Movement of contact 6082 reverses direction and contact 6082 moves upward in name list 6006 as indicated by arrow 6116.

In FIG. 6V, contact 6082 has moved along the path indicated by arrow 6116. Name list 6006 moves in response to the movement of contact 6082, revealing an additional name from the "D" group. Contact 6082 continues to move upward in name list 6006 as indicated by arrow 6118.

In FIG. 6W, contact 6082 has moved along the path indicated by arrow 6118. Name list 6006 moves in response to the movement of contact 6082 such that "A" group index 6022 is partially obscured but has not yet fully crossed upper edge 6040 of the region in which name list 6006 is displayed. Contact 6082 continues to move upward in name list 6006 as indicated by arrow 6120.

In FIG. 6X, contact 6082 has moved along the path indicated by arrow 6120. Name list 6006 moves in response to the movement of contact 6082. When name list 6006 has scrolled such that "A" group index 6022 has moved across upper edge 6040 of a region in which name list 6006 is displayed, the device produces tactile output 6122-*a* (e.g., MicroTap (270 Hz), gain: 0.5, as illustrated by indicator 6122-*a* and waveform 6122-*b*).

Figure 7A:
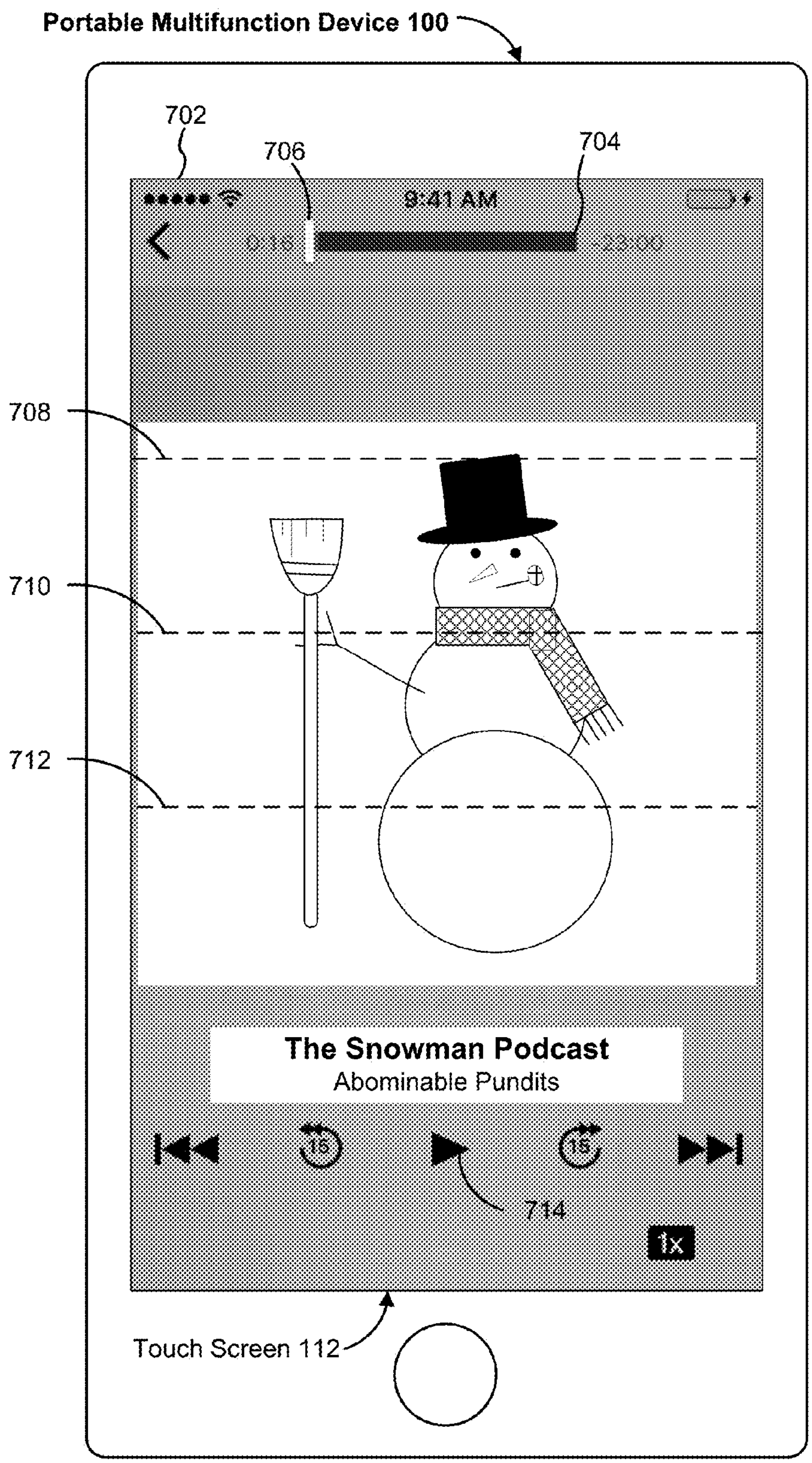
FIGS. 7A-7Q illustrate exemplary user interfaces for providing haptic feedback during variable rate scrubbing in accordance with some embodiments.
Figure 7B:
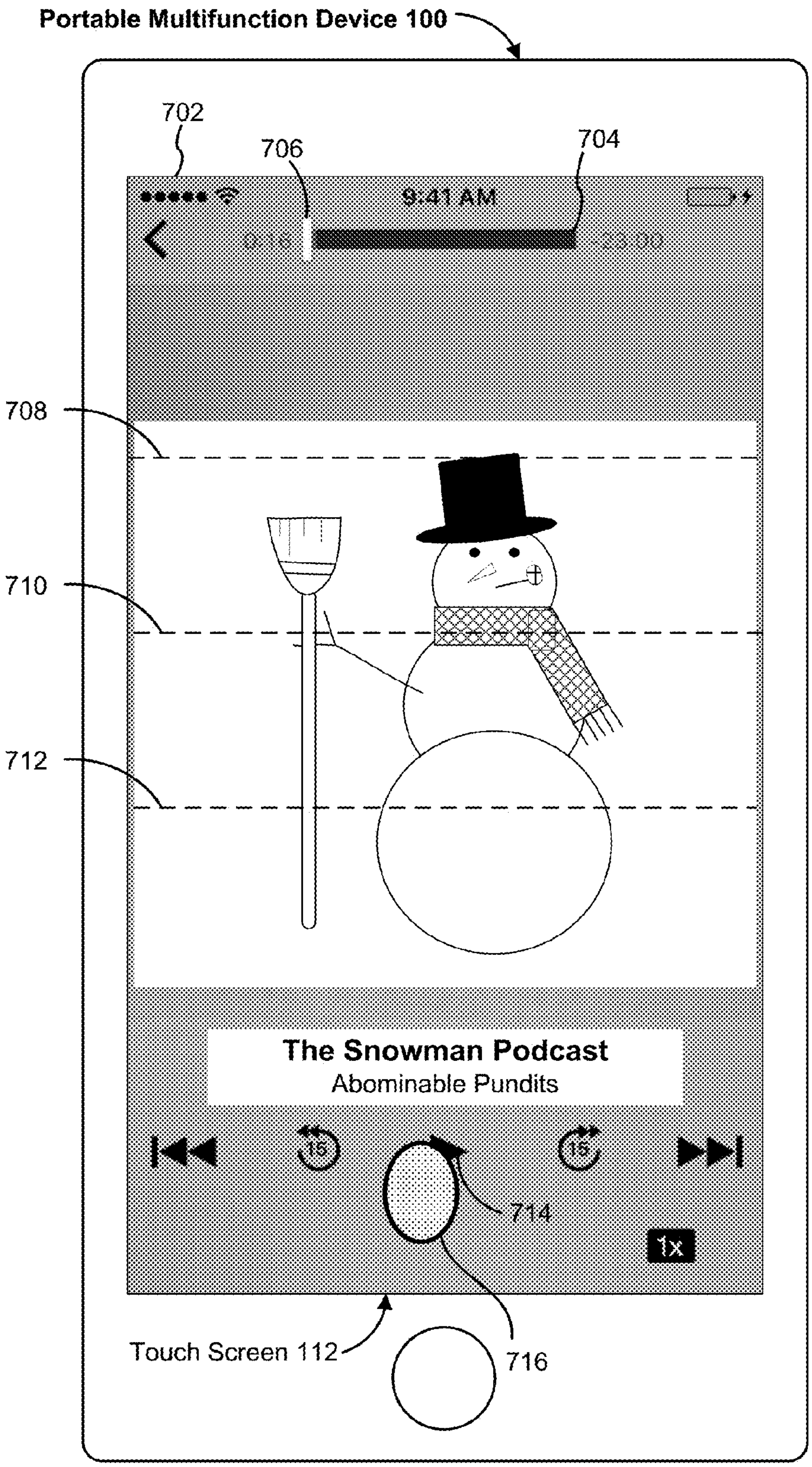
Figure 7C:
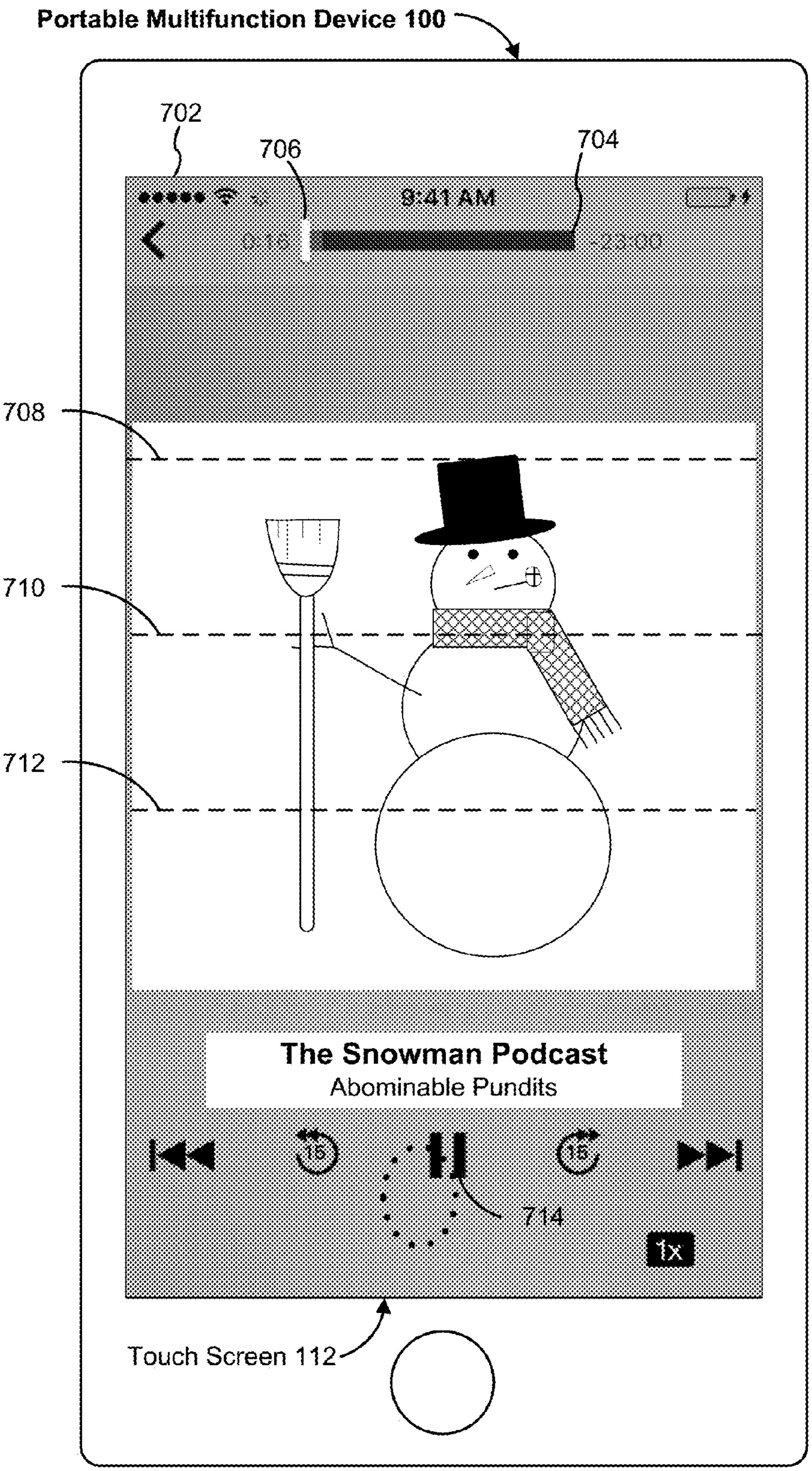
Figure 7D:
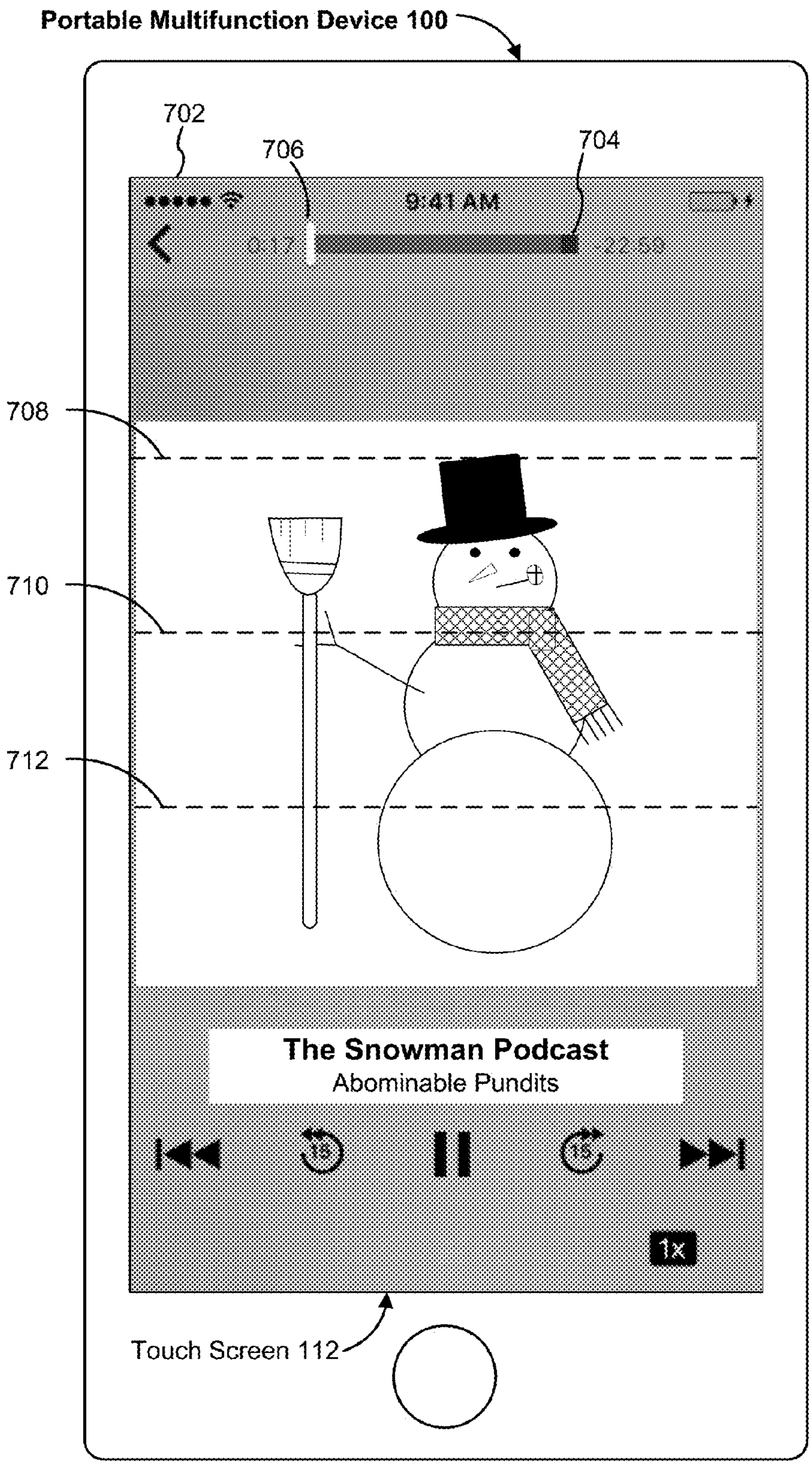
Figure 7E:
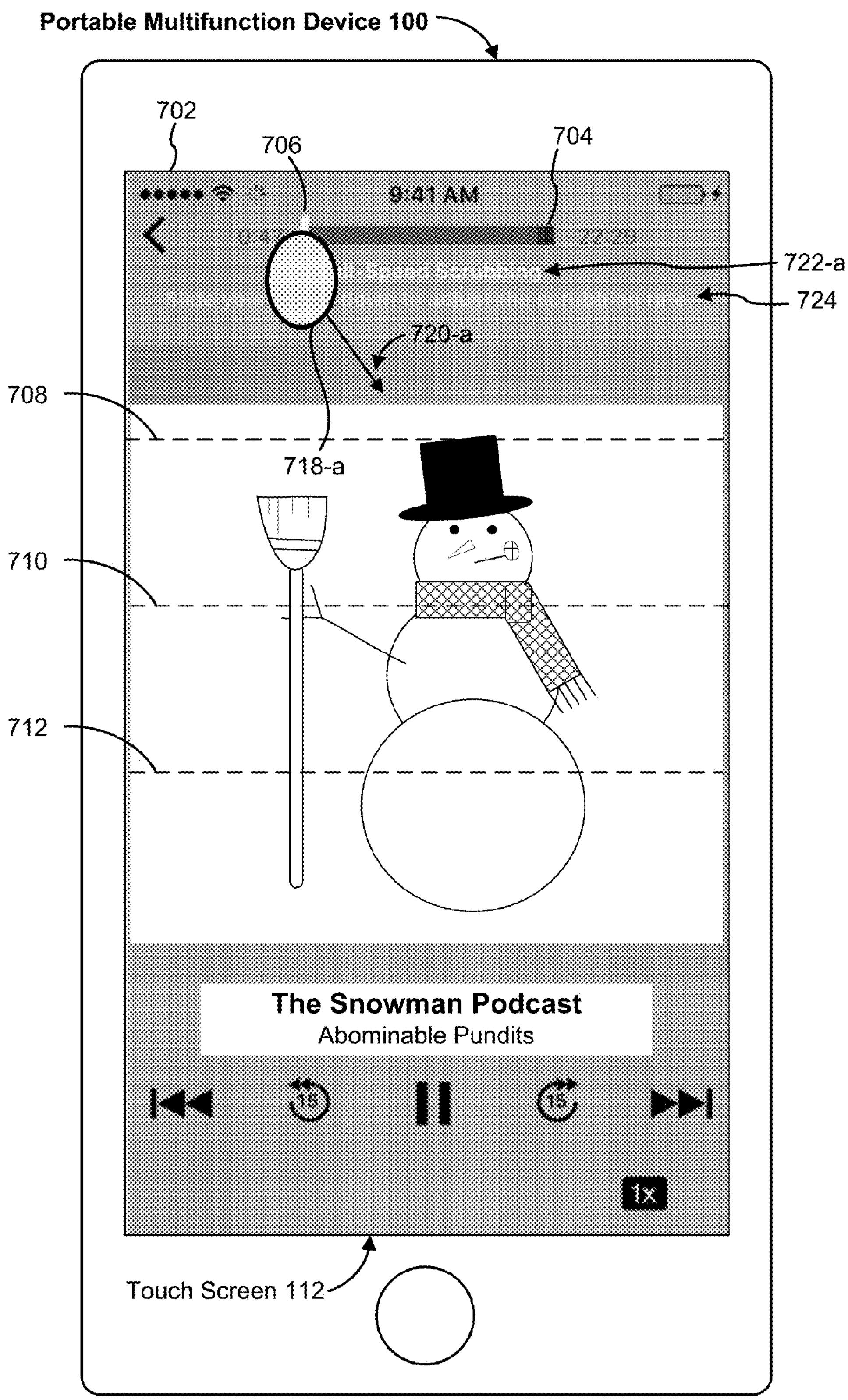
Figure 7F:
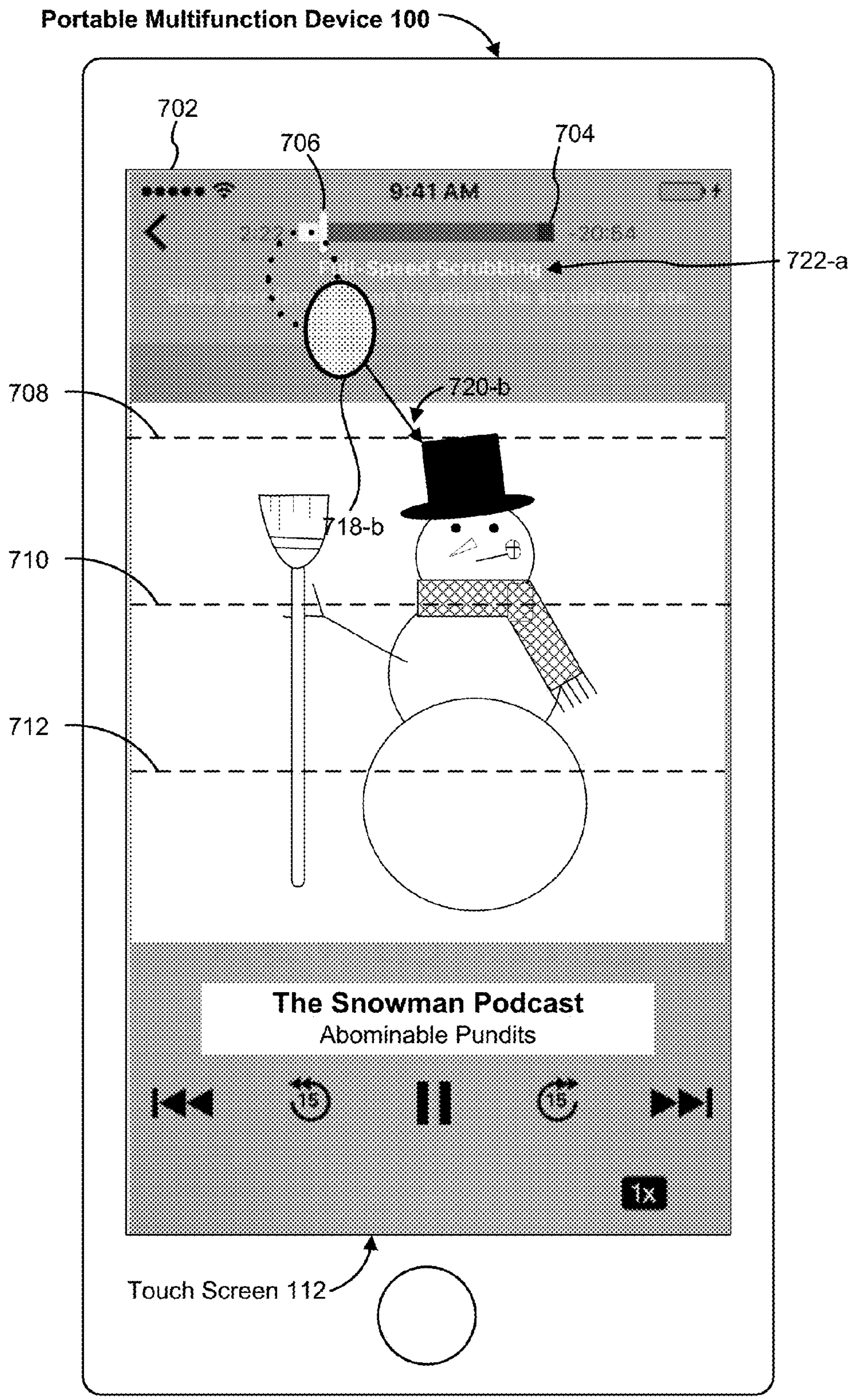
Figure 7G:
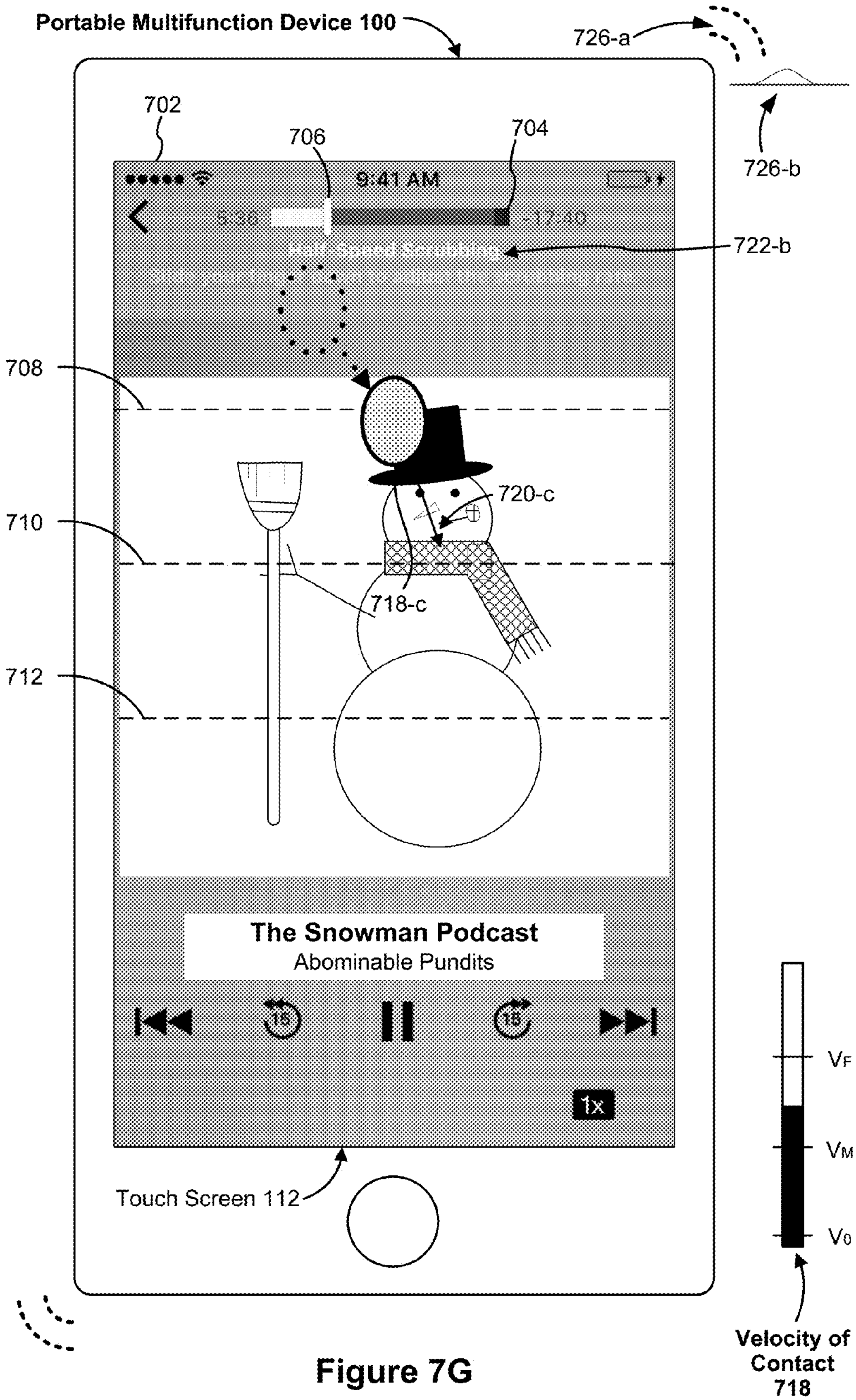
Figure 7H:
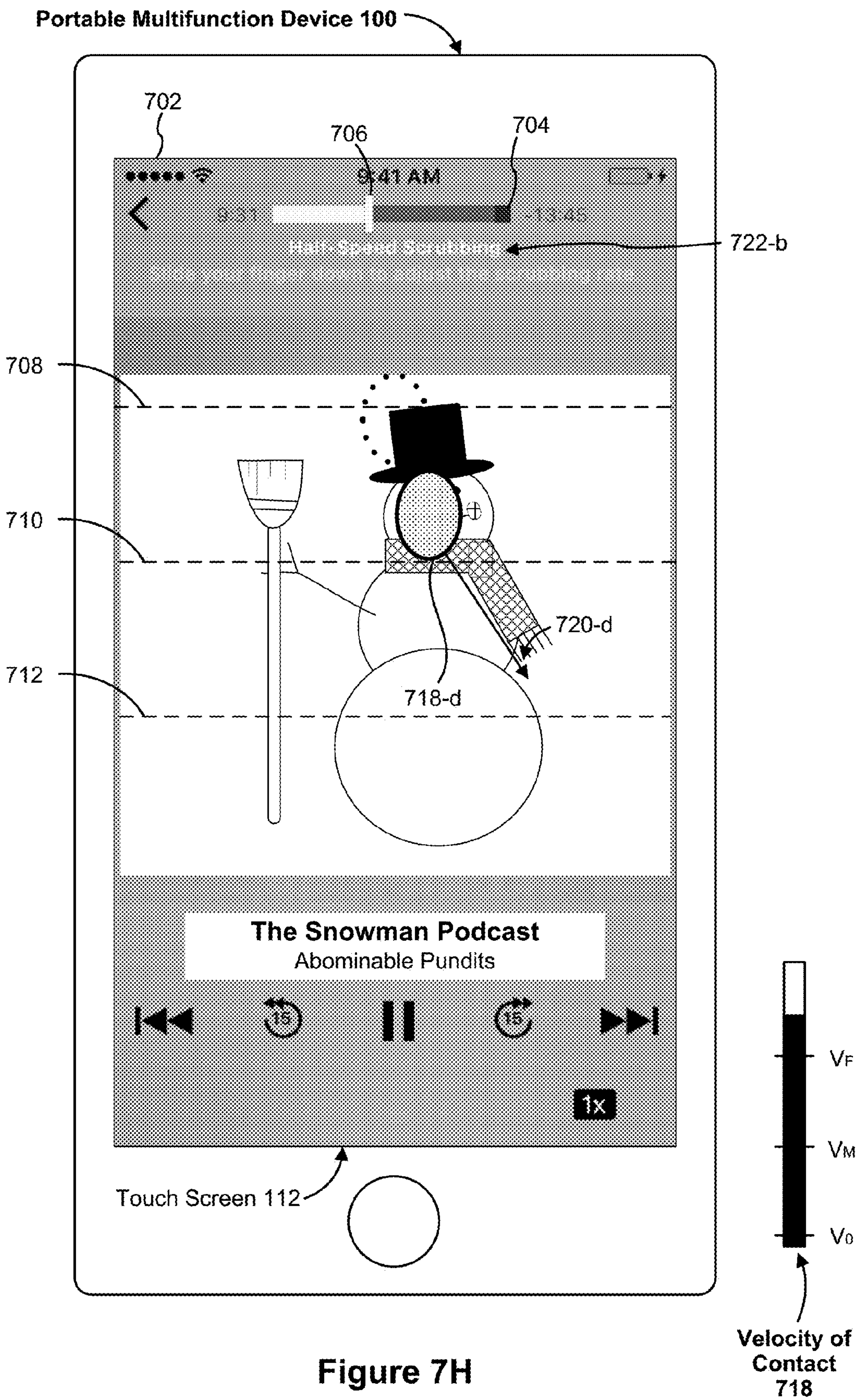
Figure 7I:
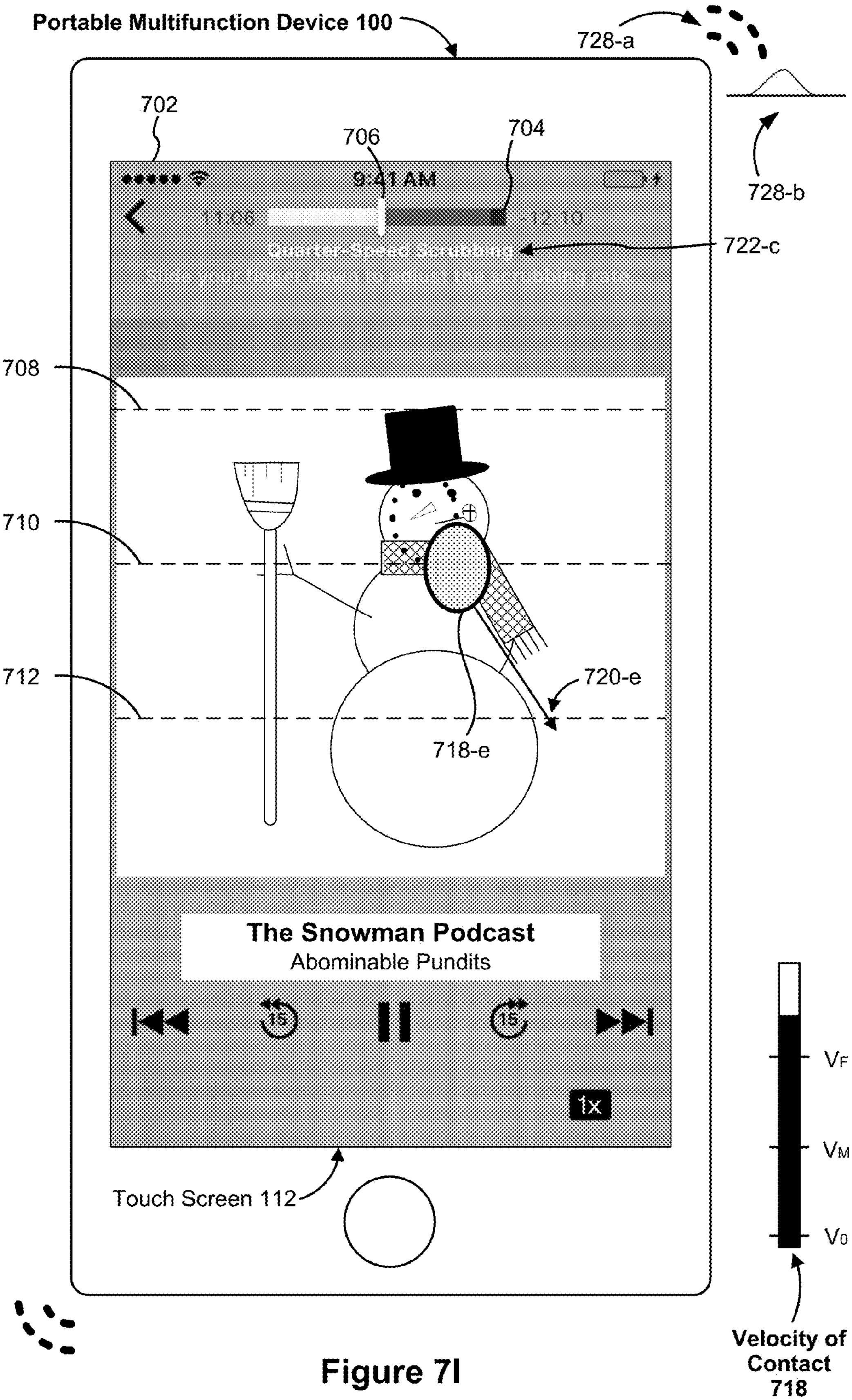
Figure 7J:
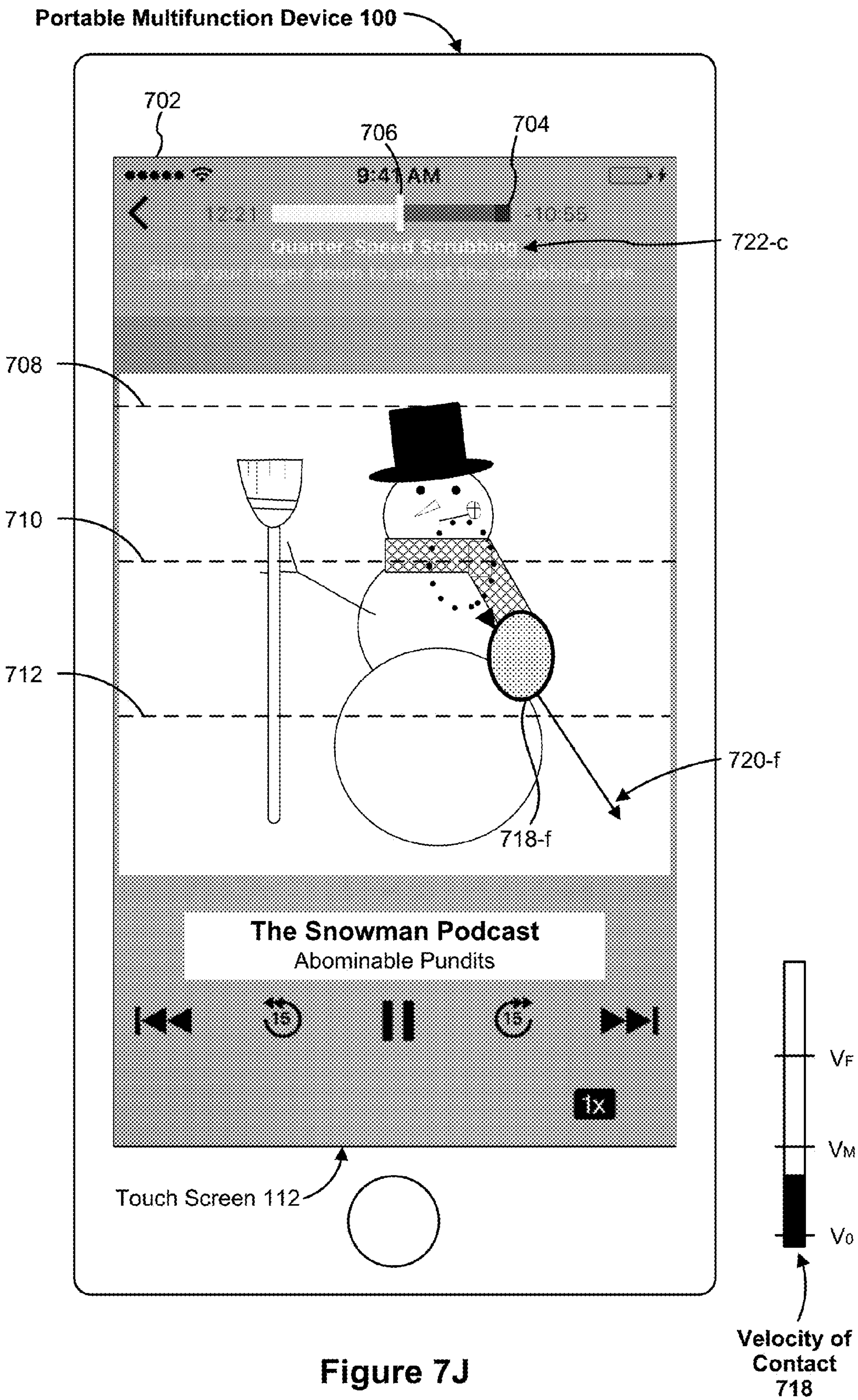
Figure 7K:
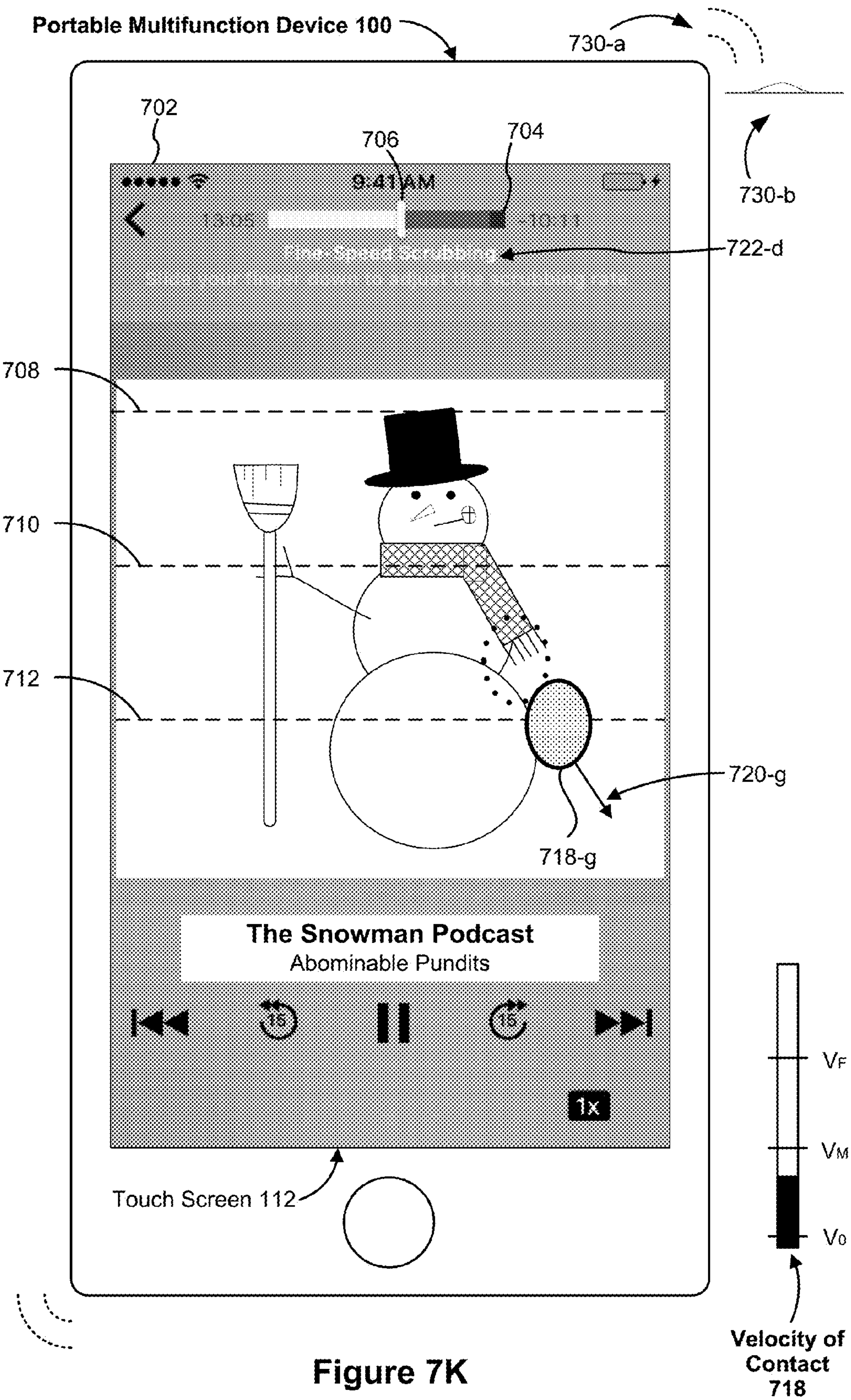
Figure 7L:
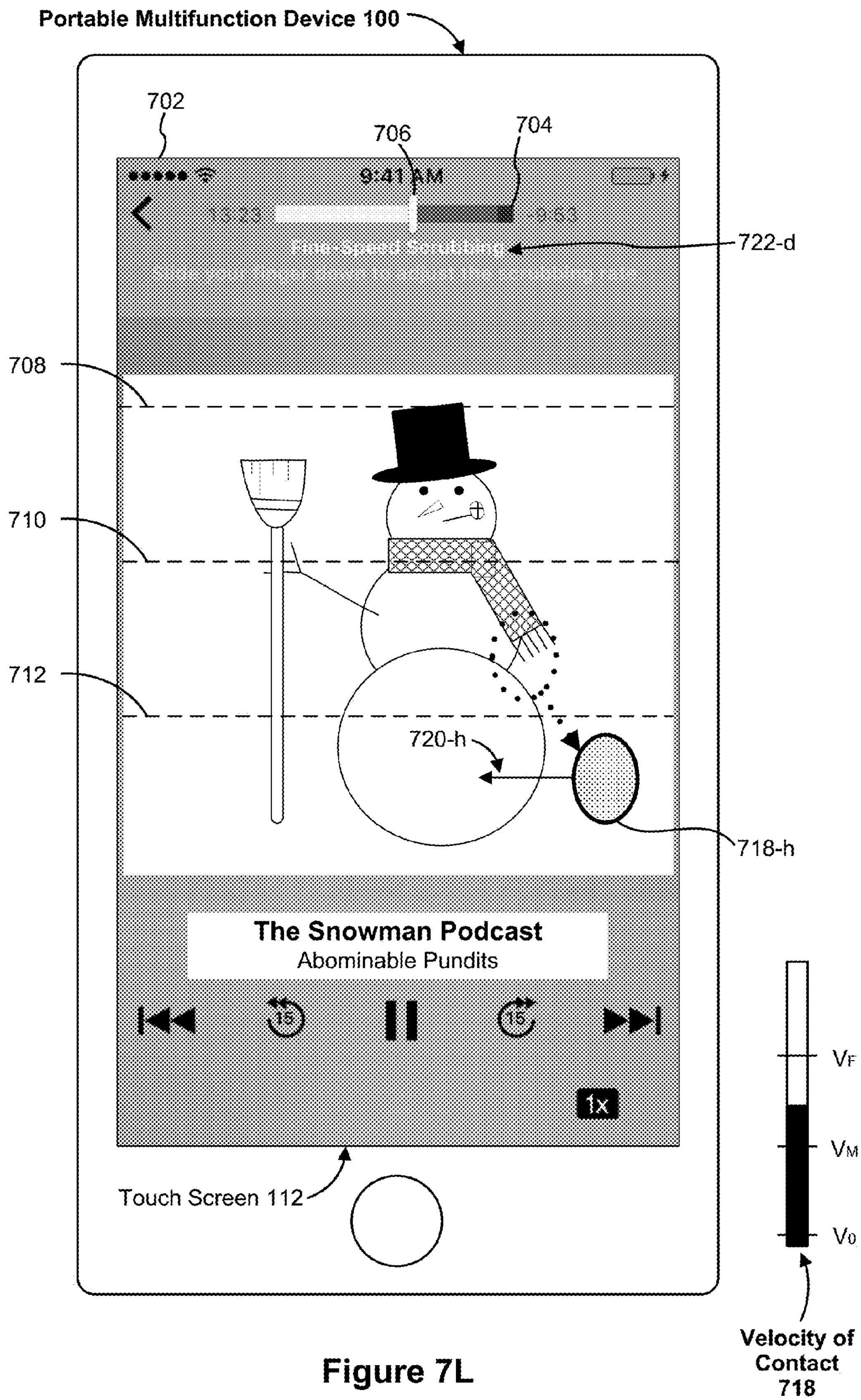
Figure 7M:
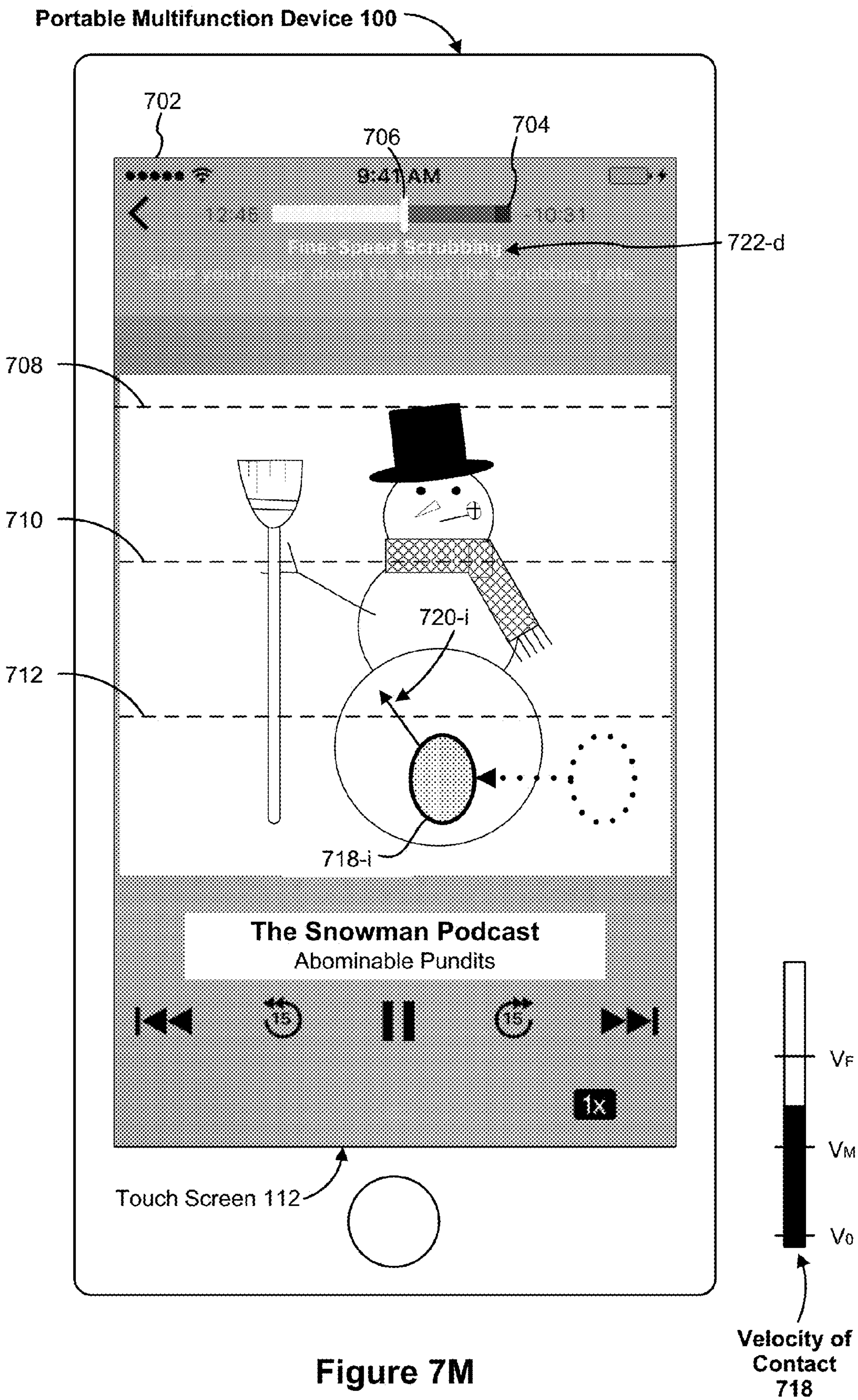
Figure 7N:
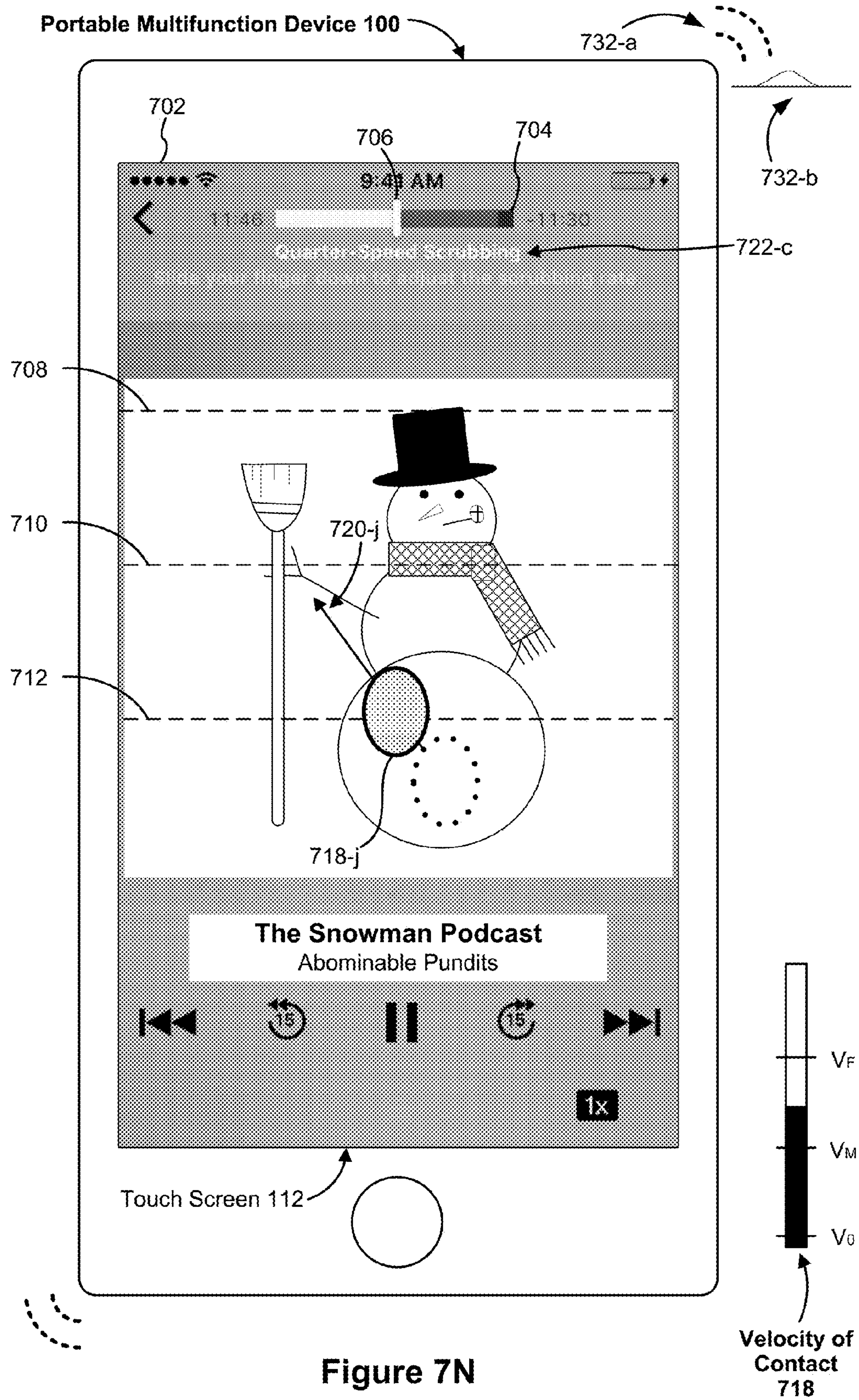
Figure 7O:
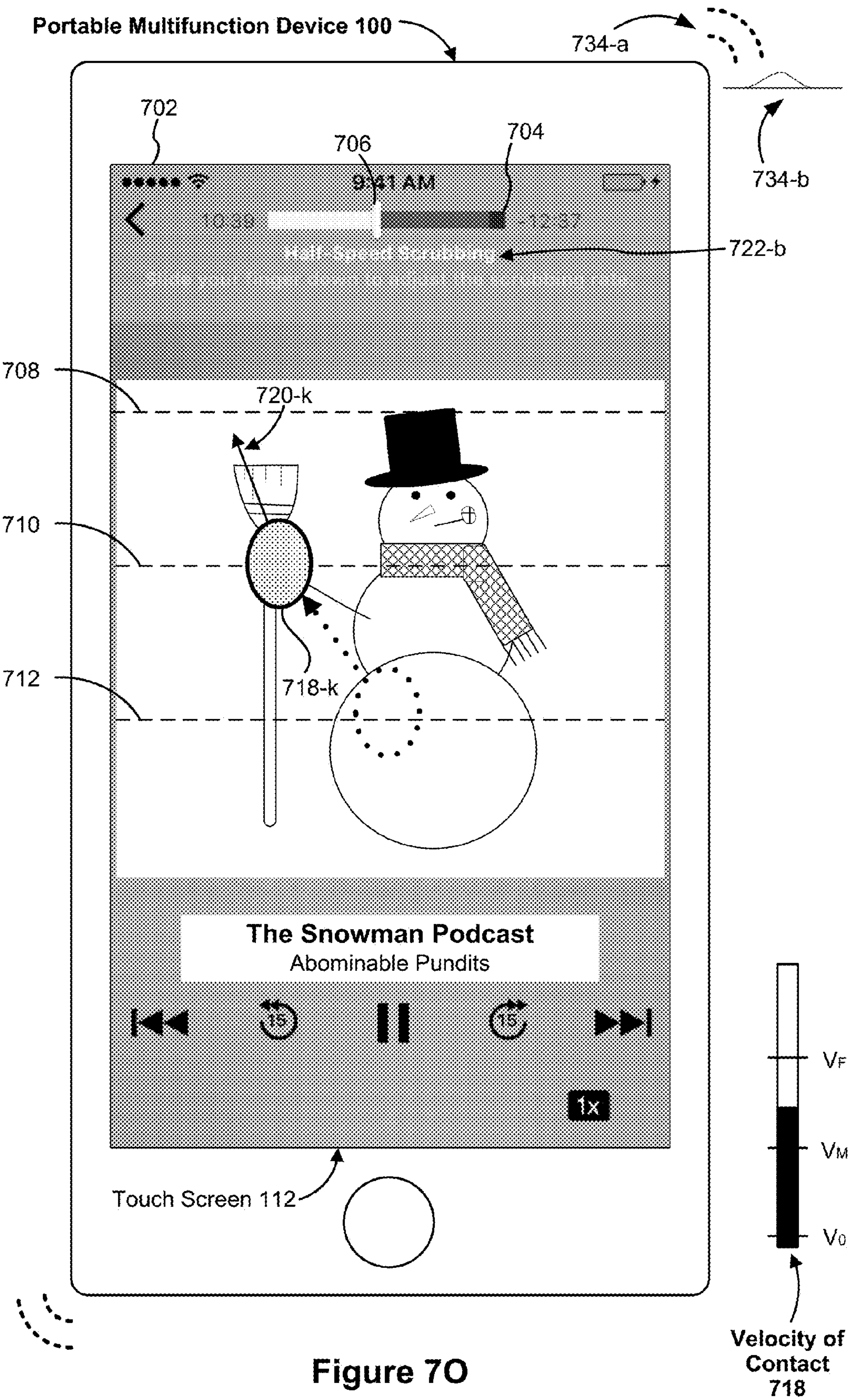
Figure 7P:
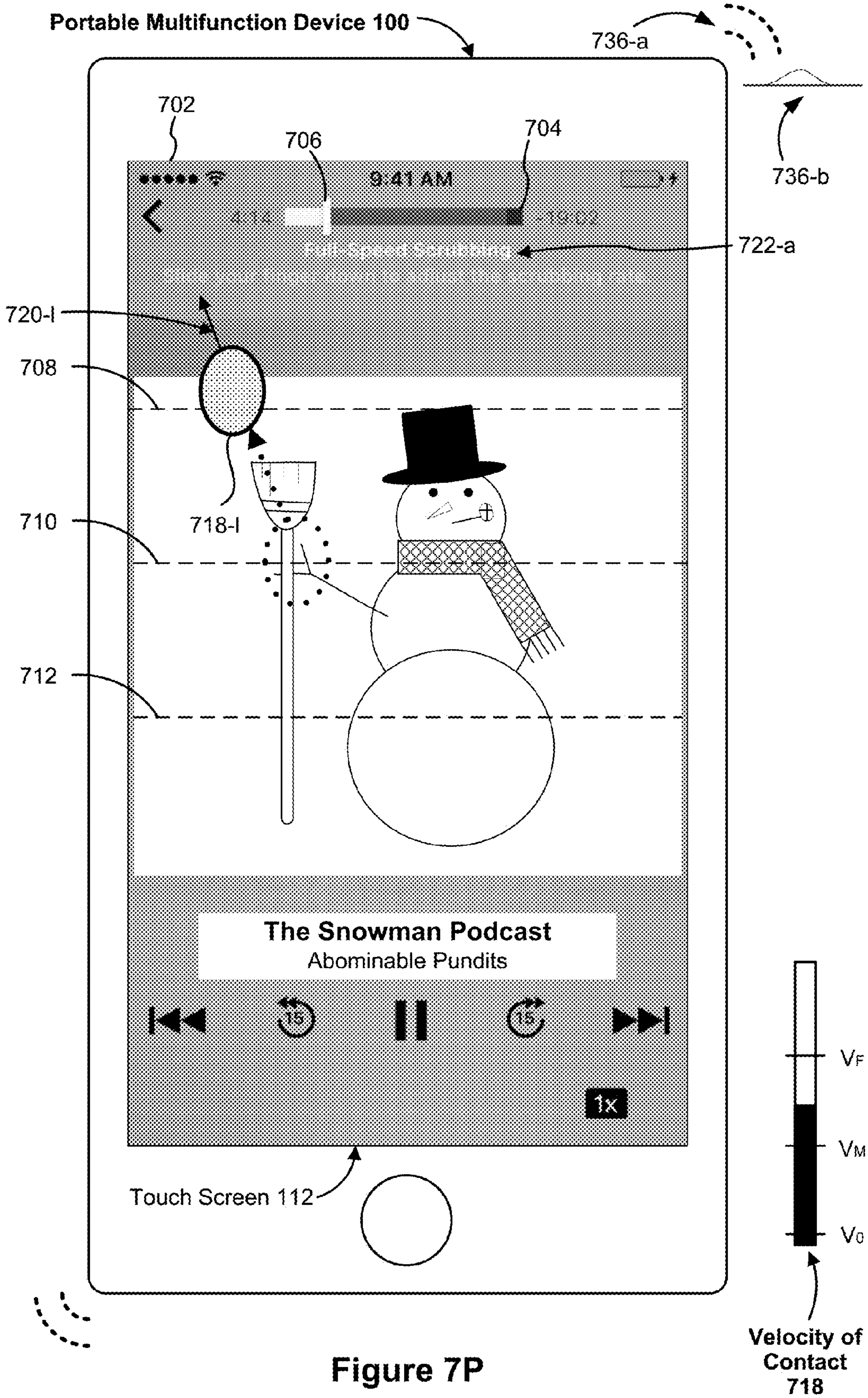
Figure 7Q:
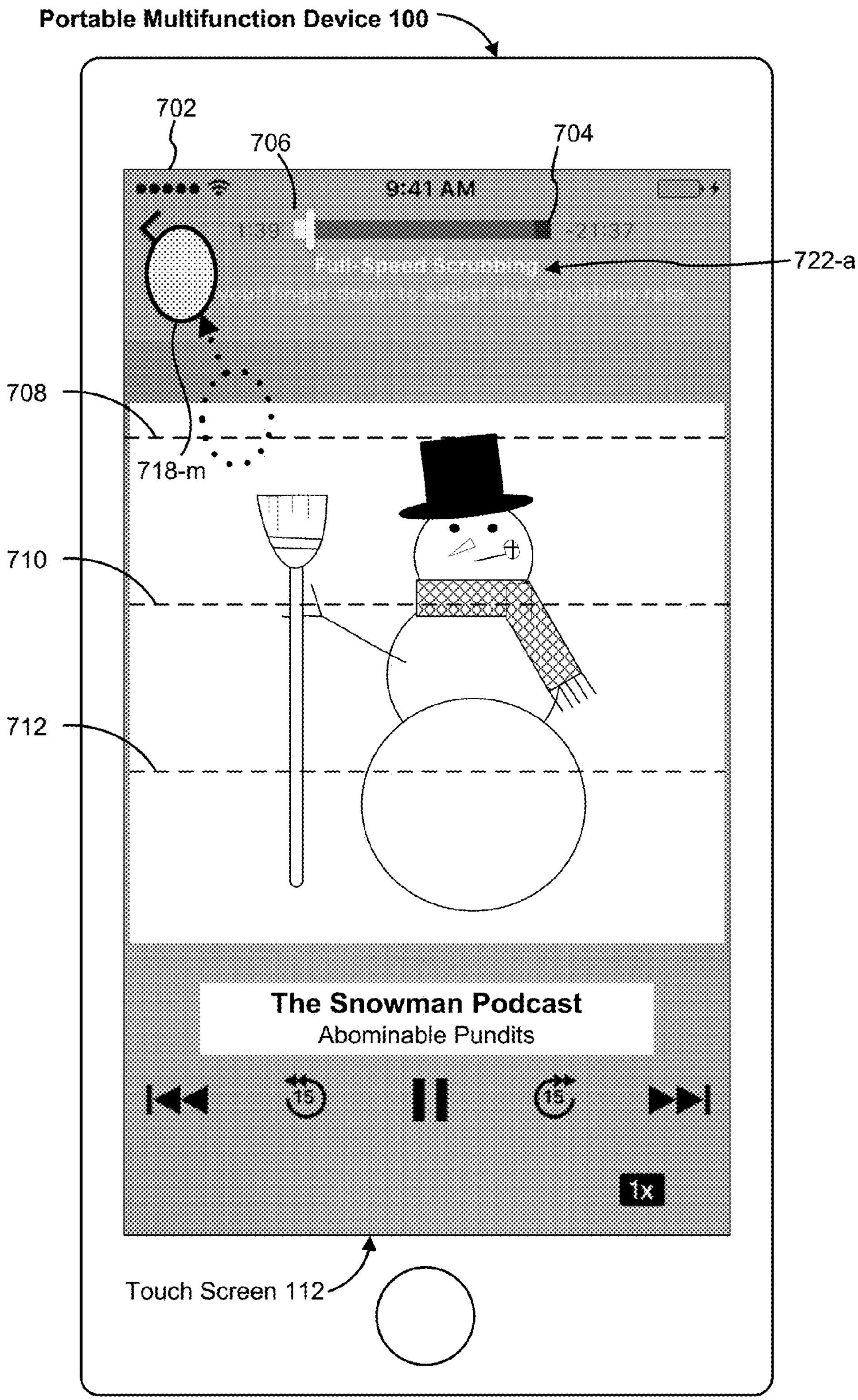

FIGS. 7A-7Q illustrate example user interfaces for providing tactile outputs during variable rate scrubbing in accordance with some embodiments. The user interfaces in these figures are used to illustrate the processes described below, including the processes in FIGS. 24A-24G. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 7A-7D illustrate initiating playing of content in a content player at a regular playback speed.

FIG. 7A displays a user interface 702 for a media content player that includes: a slider control 704; an adjustable progress indicator 706 in the slider control that indicates a current position in the content being played on the device; and other media content player controls, such as a play/pause icon 714.

In FIG. 7B, the device detects an input on the play/pause icon 714, such as a tap gesture by contact 716, which initiates playback of the content at a regular playback speed, as shown in FIGS. 7C-7D.

FIGS. 7E-7K illustrate movement 720 of contact 718 (e.g., in a drag gesture) from the progress indicator 706, away from the slider control 704, and across boundaries 708, 710, and 712. In some embodiments, boundaries 708, 710, and 712 are visually marked in user interface 702. In some embodiments, boundaries 708, 710, and 712 are invisible boundaries. In some embodiments, each boundary is optionally displayed briefly when it is crossed by a contact. In some embodiments, the boundaries separate areas that correspond to different scrubbing rates for adjusting the position of the progress indicator 706 in slider control 704. In some embodiments, while contact 718 (which started on progress indicator 706) is above boundary 708, the position of the progress indicator 706 in the slider control 704 moves by the same amount as the horizontal component of movement of contact 718 on the display, parallel to the slider control (so-called "full-speed scrubbing"). While contact 718 is between boundary 708 and boundary 710, the position of the progress indicator 706 in the slider control 704 moves by an amount that is just a fraction (e.g., ½ or equivalently 50%) of the horizontal component of movement of contact 718 on the display, parallel to the slider control (so-called "half-speed scrubbing"). While contact 718 is between boundary 710 and boundary 712, the position of the progress indicator 706 in the slider control 704 moves by an amount that is an even smaller fraction (e.g., ¼ or equivalently 25%) of the horizontal component of movement of contact 718 on the display, parallel to the slider control (so-called "quarter-speed scrubbing"). While contact 718 is below boundary 712, the position of the progress indicator 706 in the slider control 704 moves by an amount that is a still smaller fraction (e.g., ⅛ or equivalently 12.5%) of the horizontal component of movement of contact 718 on the display, parallel to the slider control (so-called "fine-speed scrubbing"). The fractional scrubbing rates used here (50%, 25%, and 12.5%) are just examples. Different scrubbing rates that progressively decrease as the vertical distance between the contact and the slider control increases could also be used.

The device provides tactile outputs (e.g., a MicroTap medium (150 Hz), Gain max: 0.8, Gain min: 0.0) to help a user adjust the scrubbing rate and quickly and precisely adjust the position of the progress indicator 706. In some embodiments, tactile outputs are triggered when the contact 718 crosses each of boundaries 708, 710, and 712. For example, tactile output 726 (FIG. 7G) is produced when contact 718 crosses boundary 708; tactile output 728 (FIG. 7I) is produced when contact 718 crosses boundary 710; and tactile output 730 (FIG. 7K) is produced when the contact 718 crosses boundary 712. These tactile outputs provide feedback to the user that the scrubbing rate is changing, which helps the user to select and use the desired scrubbing rate (e.g., initially using full-speed scrubbing to move the progress indicator quickly and then using slower scrubbing speeds to more precisely adjust the position of the progress indicator).

In some embodiments, crossing boundaries 708, 710, and 712 also triggers concurrent changes in visual feedback to the user. For example, the displayed text "Full-Speed Scrubbing" (e.g., as shown by scrubbing speed indicator 722-*a* in FIGS. 7E-7F) is changed to "Half-Speed Scrubbing" (e.g., as shown by scrubbing speed indicator 722-*b* in FIG. 7G) when the contact 718 crosses boundary 708; the displayed text "Half-Speed Scrubbing" (e.g., as shown by scrubbing speed indicator 722-*b* in FIGS. 7G-7H) is changed to "Quarter-Speed Scrubbing" (e.g., as shown by scrubbing speed indicator 722-*c* in FIG. 7I) when the contact 718 crosses boundary 710; and the displayed text "Quarter-Speed Scrubbing" (e.g., as shown by scrubbing speed indicator 722-*c* in FIGS. 7I-7J) is changed to "Fine-Speed Scrubbing" (e.g., as shown by scrubbing speed indicator 722-*a* in FIG. 7K) when the contact 718 crosses boundary 712. Providing concurrent visual feedback enhances the overall feedback to the user that the scrubbing rate is changing, which helps the user to select and use the desired scrubbing rate.

FIGS. 7L-7Q illustrate movement 720 of the contact 718 (e.g., in a continuation of the drag gesture in FIGS. 7E-7K) back towards the slider control 704, first across boundary 712, then across boundary 710, and then across boundary 708. In some embodiments, the device provides tactile outputs when the contact 718 crosses each of boundaries 712, 710, and 708, and concurrently adjusts the scrubbing rate (e.g., from fine-speed scrubbing to quarter-speed scrubbing, to half-speed scrubbing, and then to full-speed scrubbing).

In some embodiments, the characteristics of a given tactile output depend on the characteristics of the movement of the contact 718. In some embodiments, the device determines the velocity of the contact 718 at the time that a given boundary (or other threshold) is crossed. In some embodiments, the tactile output pattern is adjusted in accordance with the velocity of the contact when the boundary is crossed. In some embodiments, a gain factor applied to the amplitude of the tactile output pattern increases as the velocity of the contact at the boundary increases. For example, in FIG. 7G, the velocity of movement 720-*c* of the contact 718-*c* at boundary 708 is between a medium speed threshold $V_M$ and a fast speed threshold $V_F$ and a medium gain is applied in tactile output 726 (e.g., MicroTap (150 Hz), Gain: 0.5). The same tactile output pattern occurs in FIGS. 7N (e.g., for tactile output 732), 7O (e.g., for tactile output 734), and 7P (e.g., for tactile output 736) because the velocity of movement 720 of the contact 718 at the boundary crossings in these figures is between $V_M$ and $V_F$. In contrast, in FIG. 7I, the velocity of movement 720-*e* of the contact 718-*e* at boundary 710 is above the fast speed threshold $V_F$ and a large gain is applied in tactile output 728 (e.g., MicroTap (150 Hz), Gain: 0.8). Conversely, in FIG. 7K, the velocity of movement 720-*g* of the contact 718-*g* at boundary 712 is between the medium speed threshold $V_M$ and a low speed threshold $V_0$ and a small gain is applied in tactile output 730 (e.g., MicroTap (150 Hz), Gain: 0.3). This increase in gain/amplitude with velocity increases feedback to the user, which the user might otherwise miss because of the rapid contact movement. In some embodiments, the gain factor increases with the total velocity of the contact at the boundary (or other threshold). In some embodiments, the gain factor increases with the vertical component of the velocity of the contact at the boundary (or other threshold).

FIGS. 8A-8N, 9A-9V, and 10A-10I illustrate example user interfaces for providing tactile outputs for slider controls in accordance with some embodiments. The user interfaces in these figures are used to illustrate the processes described below, including the processes in FIGS. 26A-26E. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 8A-8E illustrate slowly adjusting a slider control for display brightness to a minimum brightness value, which does not produce a tactile output because of the slow adjustment speed at the minimum brightness value.

Figure 8A:
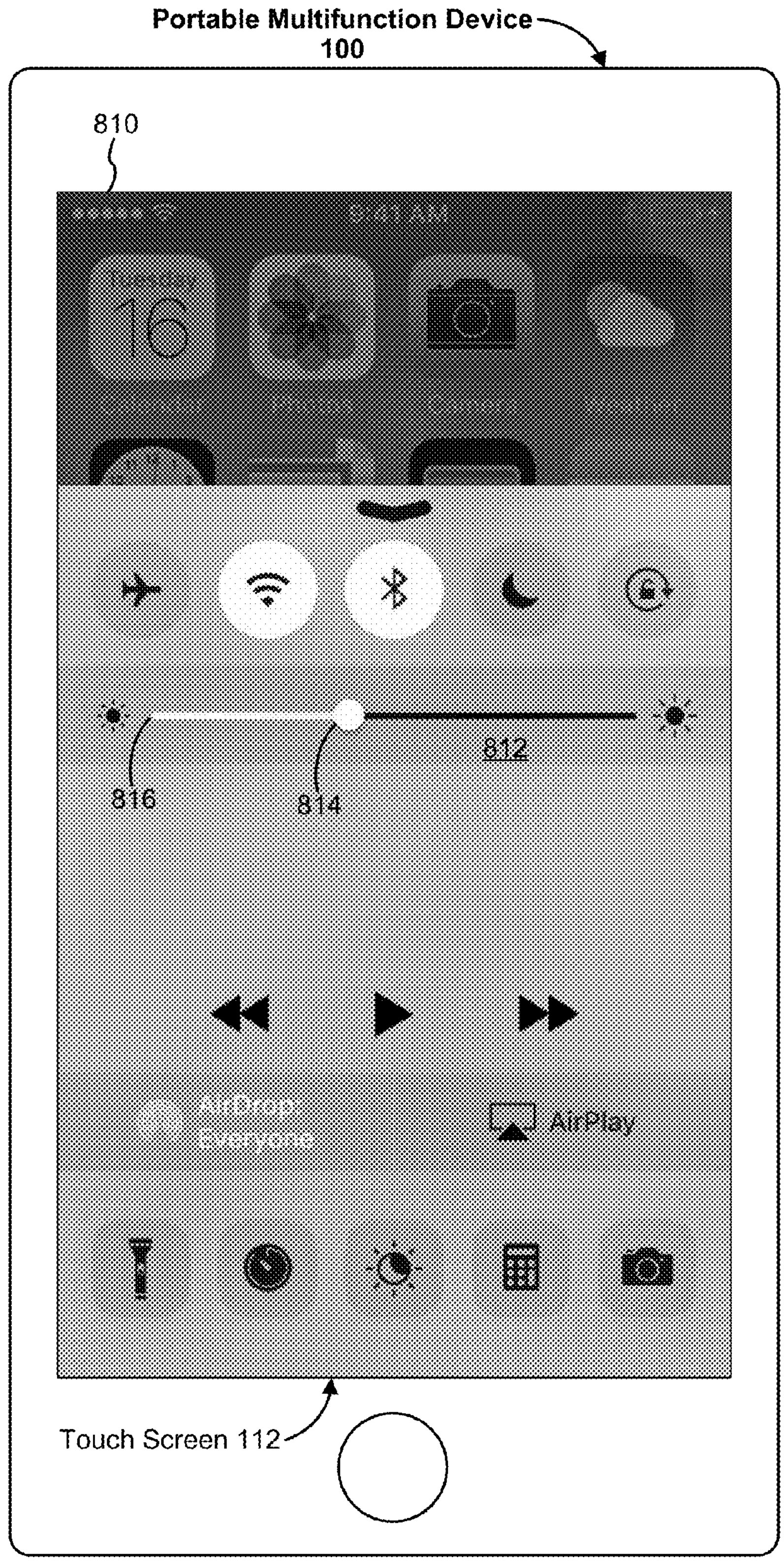
FIGS. 8A-8N illustrate exemplary user interfaces for providing haptic feedback for interaction with a slider control (e.g., a brightness slider control) in accordance with some embodiments.

FIG. 8A displays user interface 810 that includes a control panel with a plurality of device control affordances, including slider control 812 for adjusting the brightness of the display. The slider control 812 includes first end 816 that corresponds to a first value (e.g., a minimum brightness); second end 818 that corresponds to a second value (e.g., a maximum brightness); and movable indicator 814 (e.g., a bubble, thumb or other moveable icon) that indicates a current value in the (continuous) range of values between the first value and the second value.

Figure 8B:
Figure 8C:
Figure 8D:
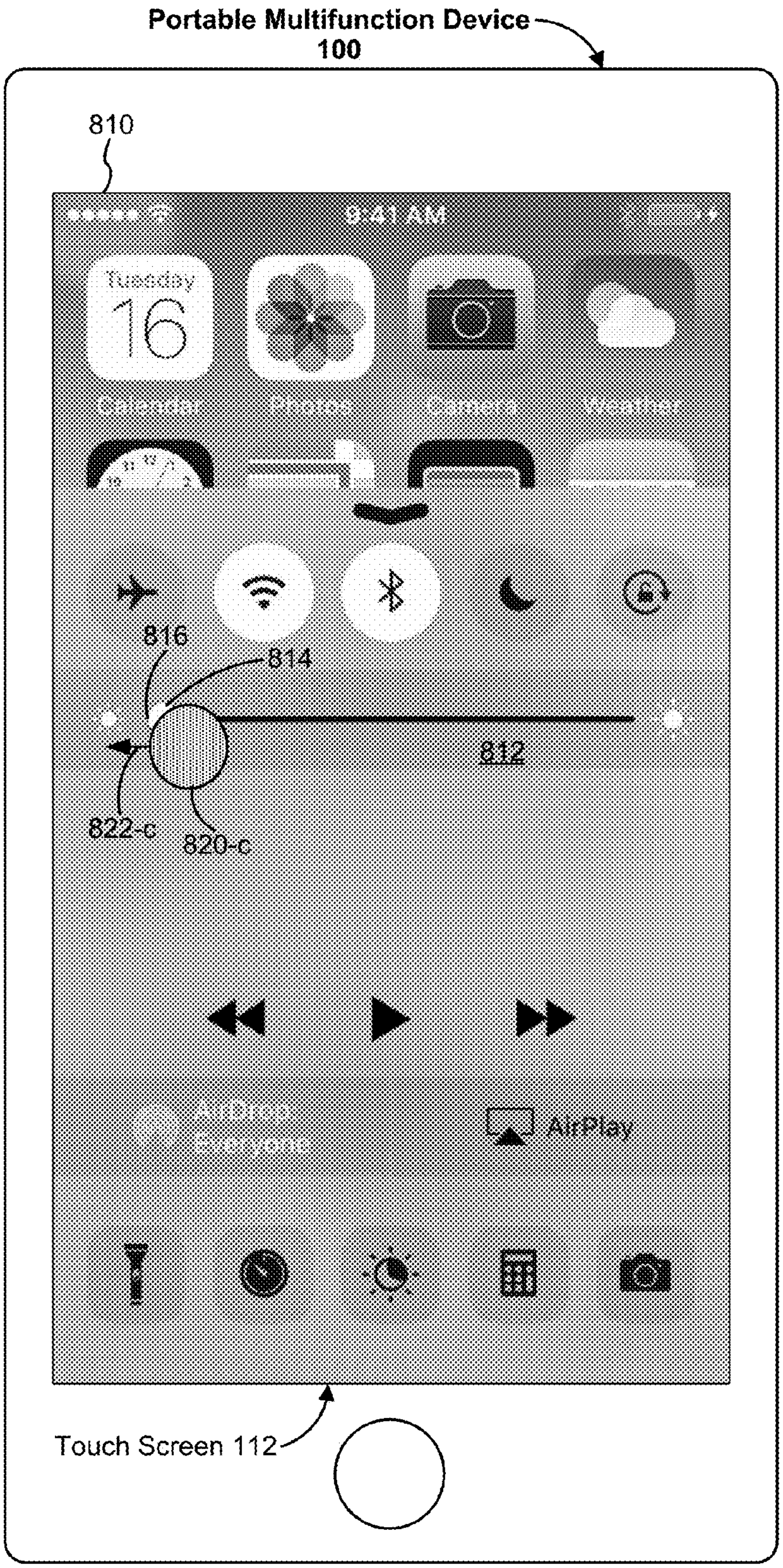
Figure 8E:
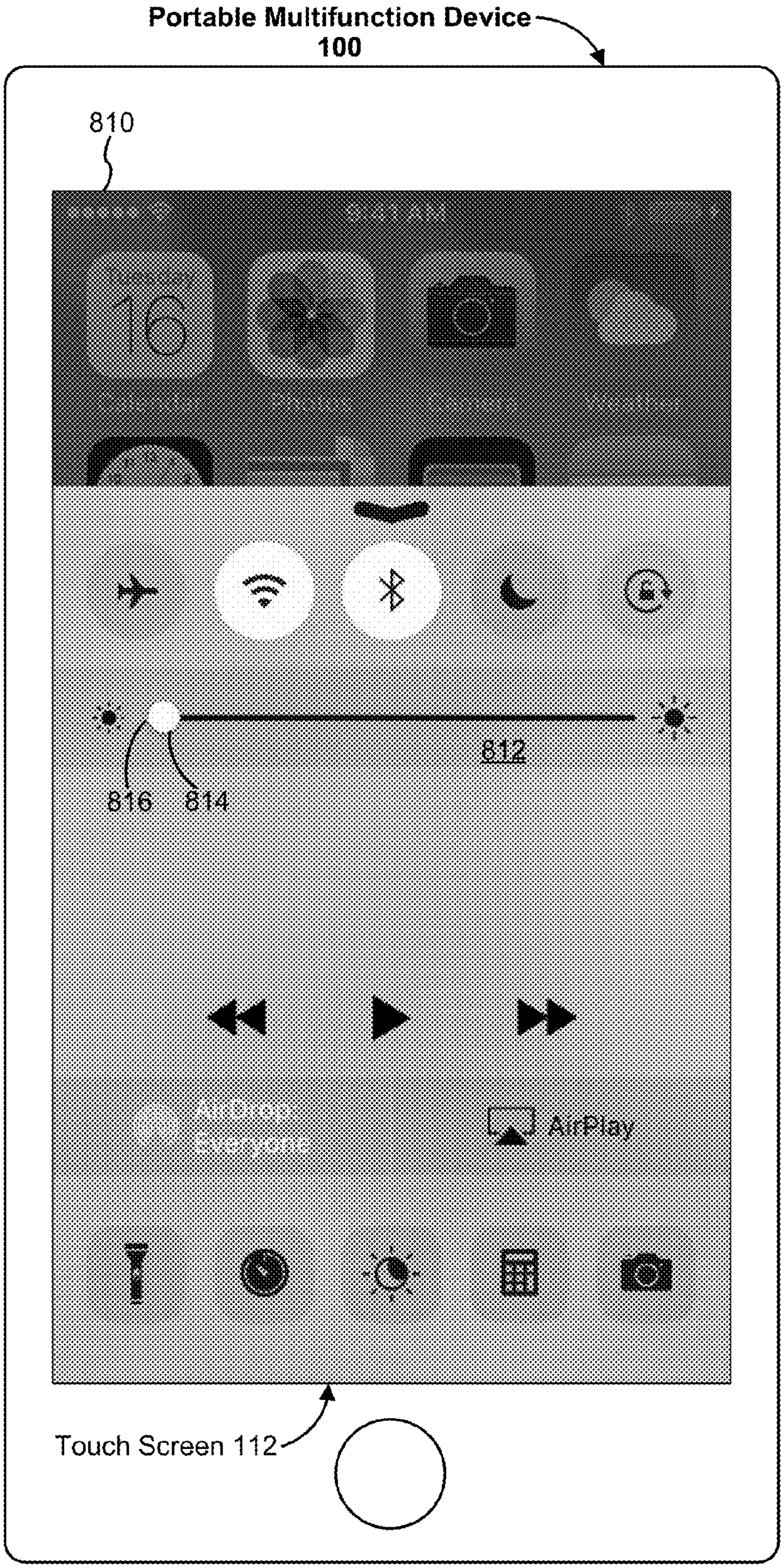

In FIGS. 8B-8D, the device detects an input on the movable indicator 814, e.g., a slow drag gesture by contact 820 with movement 822, which slowly adjusts the brightness of the display down to the minimum value. The rate of movement 822 (e.g., movement 822-*c* in FIG. 8D) of the contact 820 and the indicator 814 when the indicator 814 reaches the minimum value 816 is below a threshold speed, so no tactile output is produced. There is also no tactile output when contact 820 lifts off (FIG. 8E), leaving the display brightness set to its minimum end 816.

Figure 8F:
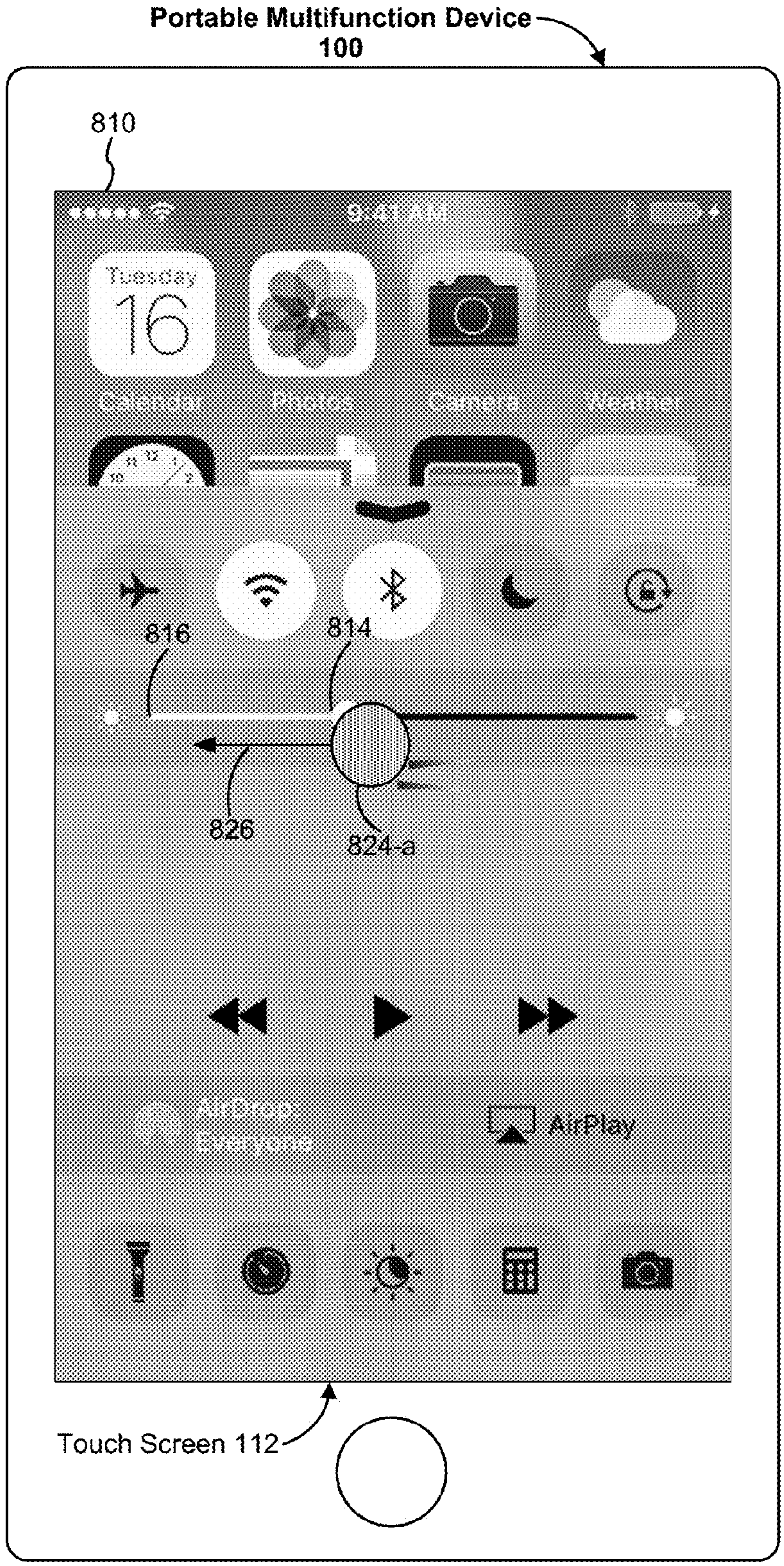
Figure 8G:
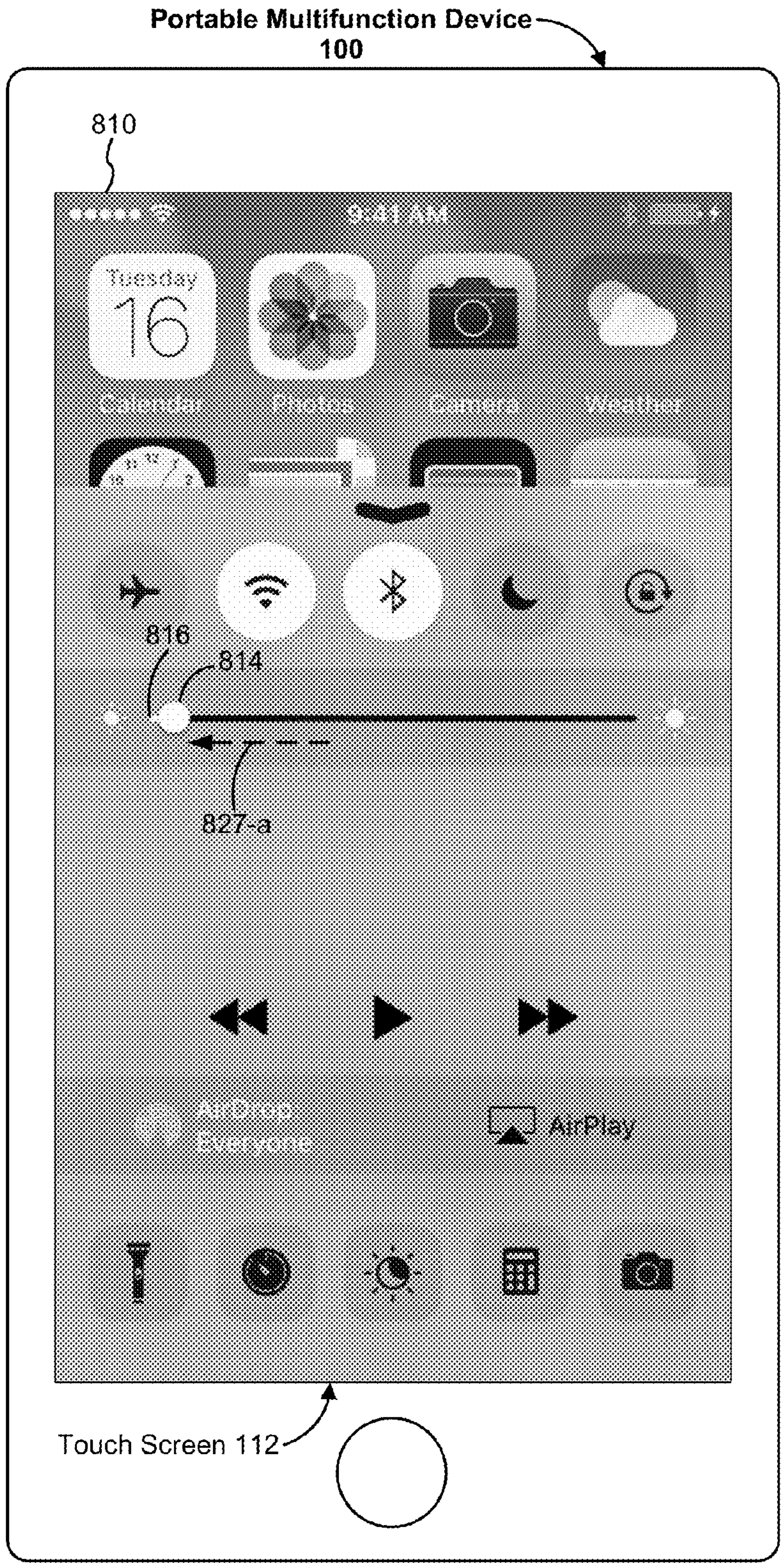
Figure 8H:
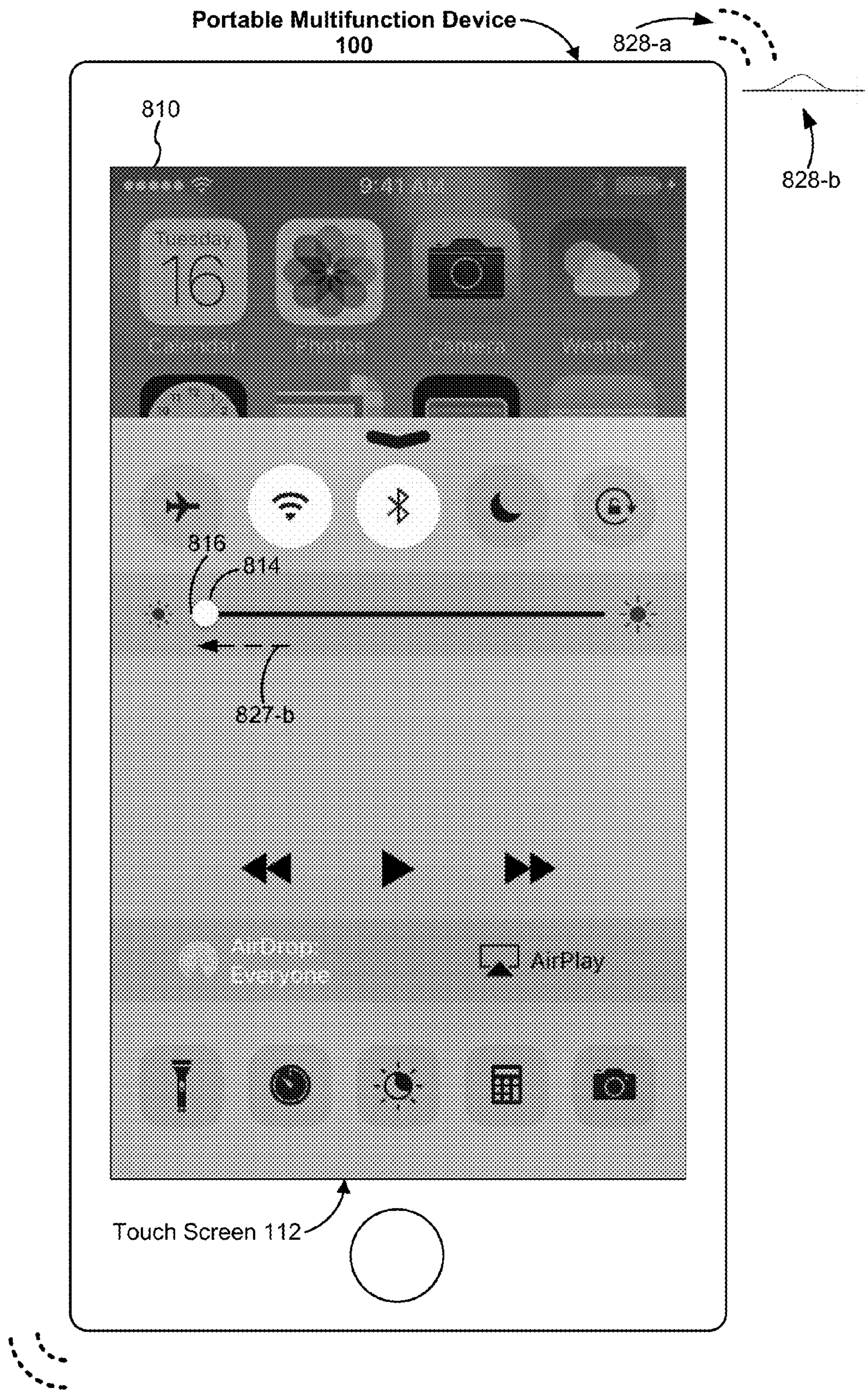
Figure 8I:

In FIGS. 8F-8H, the device detects a faster input on movable indicator 814, e.g., a flick gesture by contact 824 with movement 826, which quickly adjusts the brightness of the display down toward the minimum value. After the flick gesture (e.g., after lift-off of contact 824), movable indicator 814 continues to move with simulated inertia at a rate of movement 827. The rate of movement 827 (e.g., movement 827-*b* in FIG. 8H) when moveable indicator 814 reaches the minimum end 816 is above the threshold speed, so device generates tactile output 828 (e.g., MicroTap (150 Hz), Gain max: 0.6, Gain min: 0.3) with a tactile output pattern (e.g., amplitude of the tactile output pattern) that is configured based on the speed of indicator 814 when indicator 814 reaches the minimum end 816 of slider control 812. For example, at above the threshold speed, a greater gain factor is applied to a baseline tactile output pattern for a greater speed of the indicator when the indicator reaches the minimum end of the slider control.

Although not shown in FIGS. 8A-8H, when indicator 814 is dragged to minimum end 816 of slider control 812 with more than the threshold speed, the device generates a tactile output as well. The tactile output pattern of the tactile output that is generated is also configured according to the speed of indicator 814 when indicator 814 reaches the minimum end 816 of slider control 812. For example, a greater speed of moveable indicator 814 corresponds to a greater gain factor that is applied to a baseline tactile output pattern.

These tactile outputs provide feedback to the user that the minimum end of the slider control has been reached. Stronger tactile outputs are provided as faster, less precise inputs are used. Conversely, in some cases, tactile outputs are not provided, to avoid distracting the user, when the user is carefully adjusting the indicator with a drag gesture at a slower speed to the minimum value of the slider control.

Figure 8J:
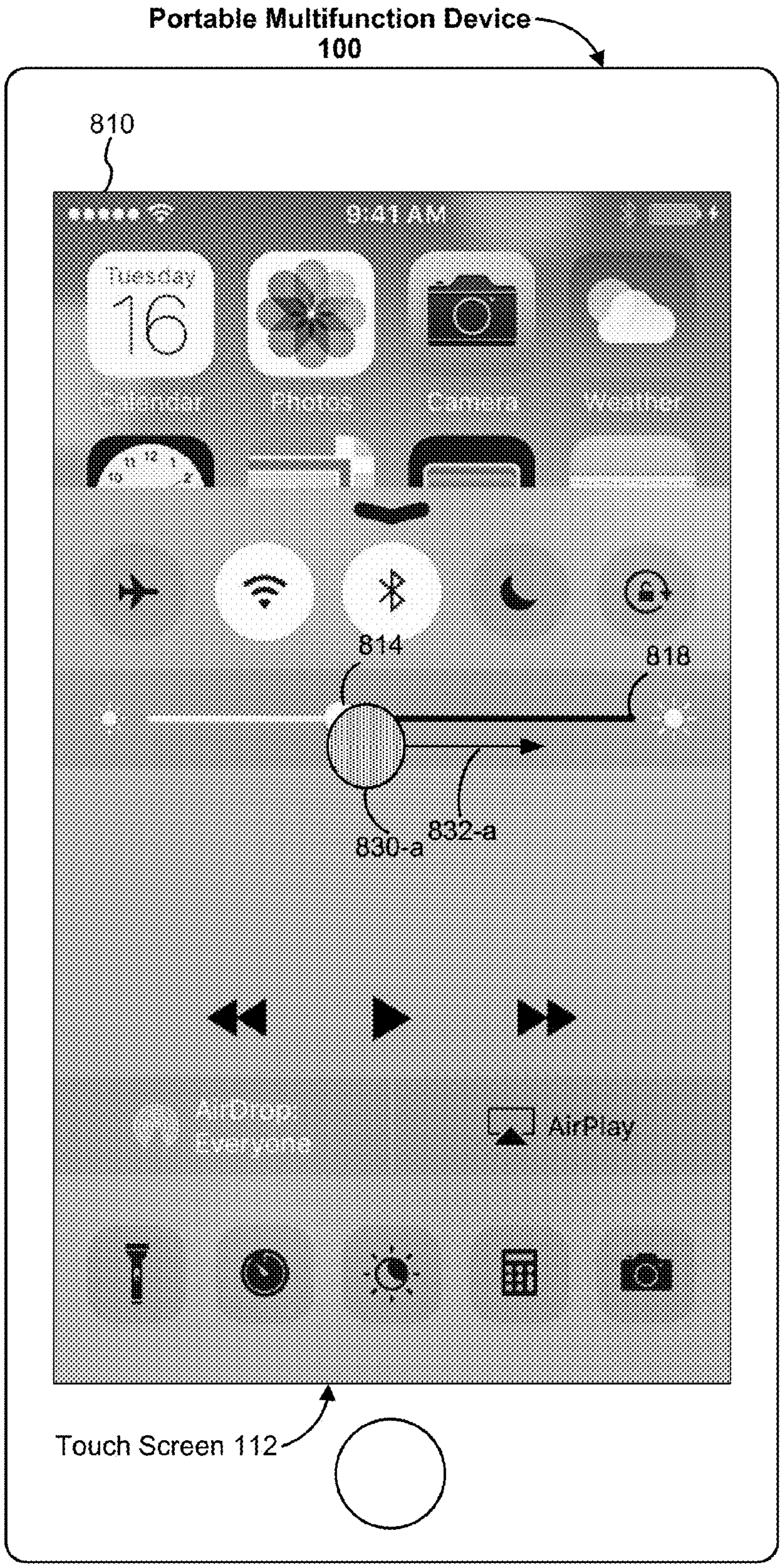
Figure 8K:
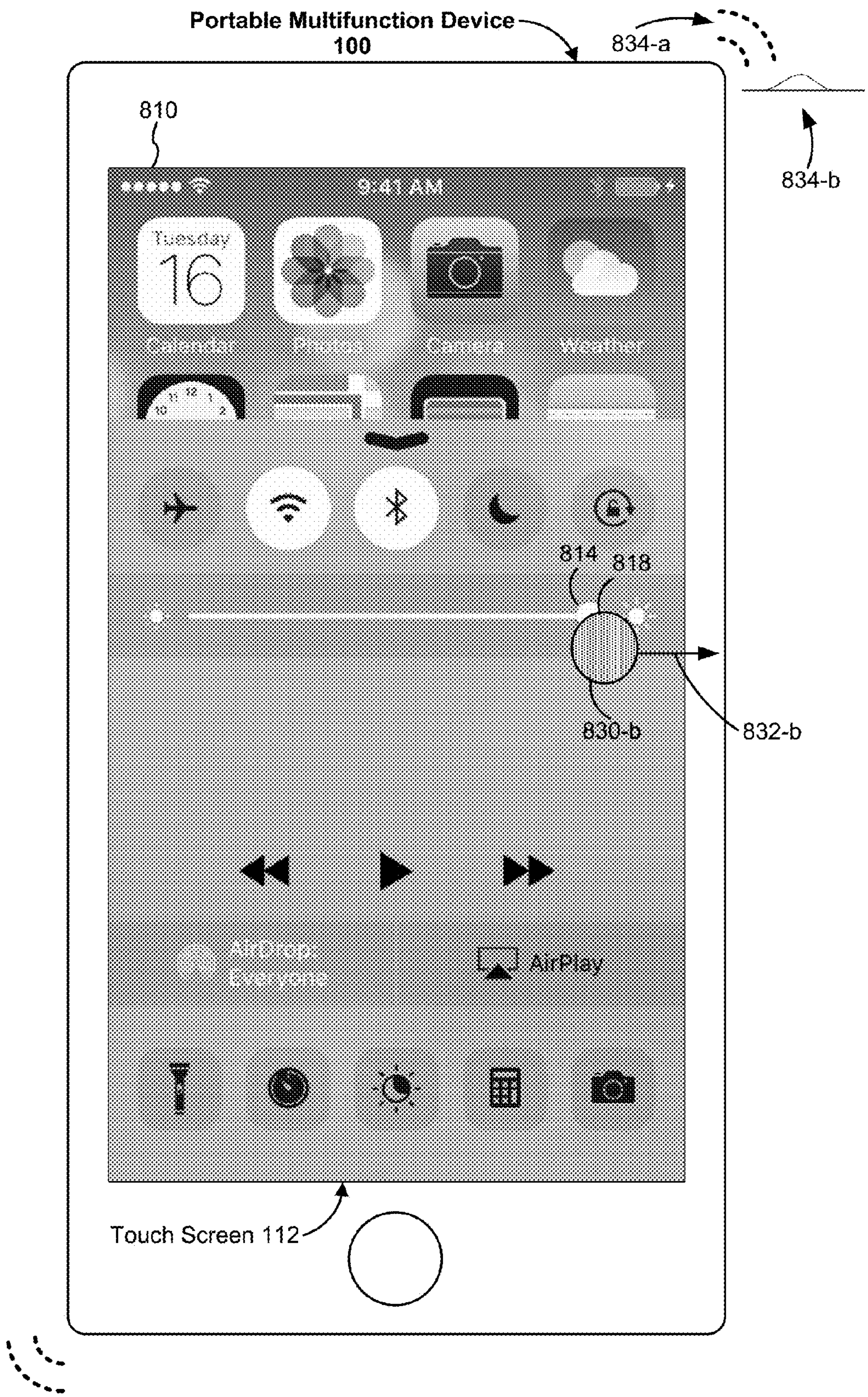

In FIGS. 81-8K, the device detects an input on movable indicator 814, e.g., a drag gesture by contact 830 with movement 832, which adjusts the brightness of the display up toward maximum end 818 of slider control 812. Tactile output 834 (e.g., MicroTap (150 Hz), Gain max: 0.6, Gain min: 0.3) is generated when indicator 814 reaches maximum end 818 of slider control 812. The tactile output pattern of tactile output 834 is configured based on the rate of movement of indicator 814 when the indicator 814 reaches maximum end 818 of slider control 812 (e.g., tactile output 834 has a gain of 0.5).

Figure 8L:
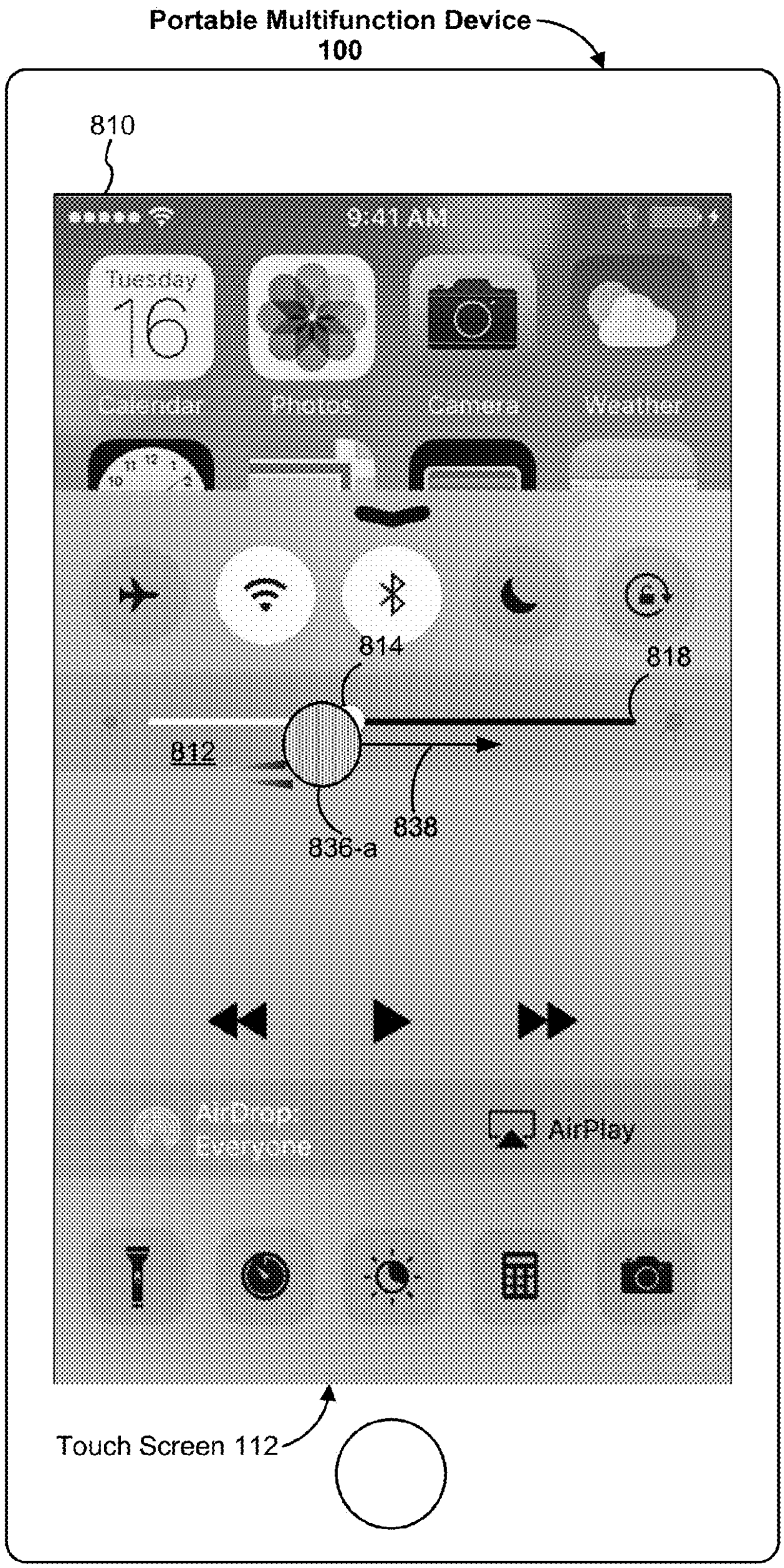
Figure 8M:
Figure 8N:
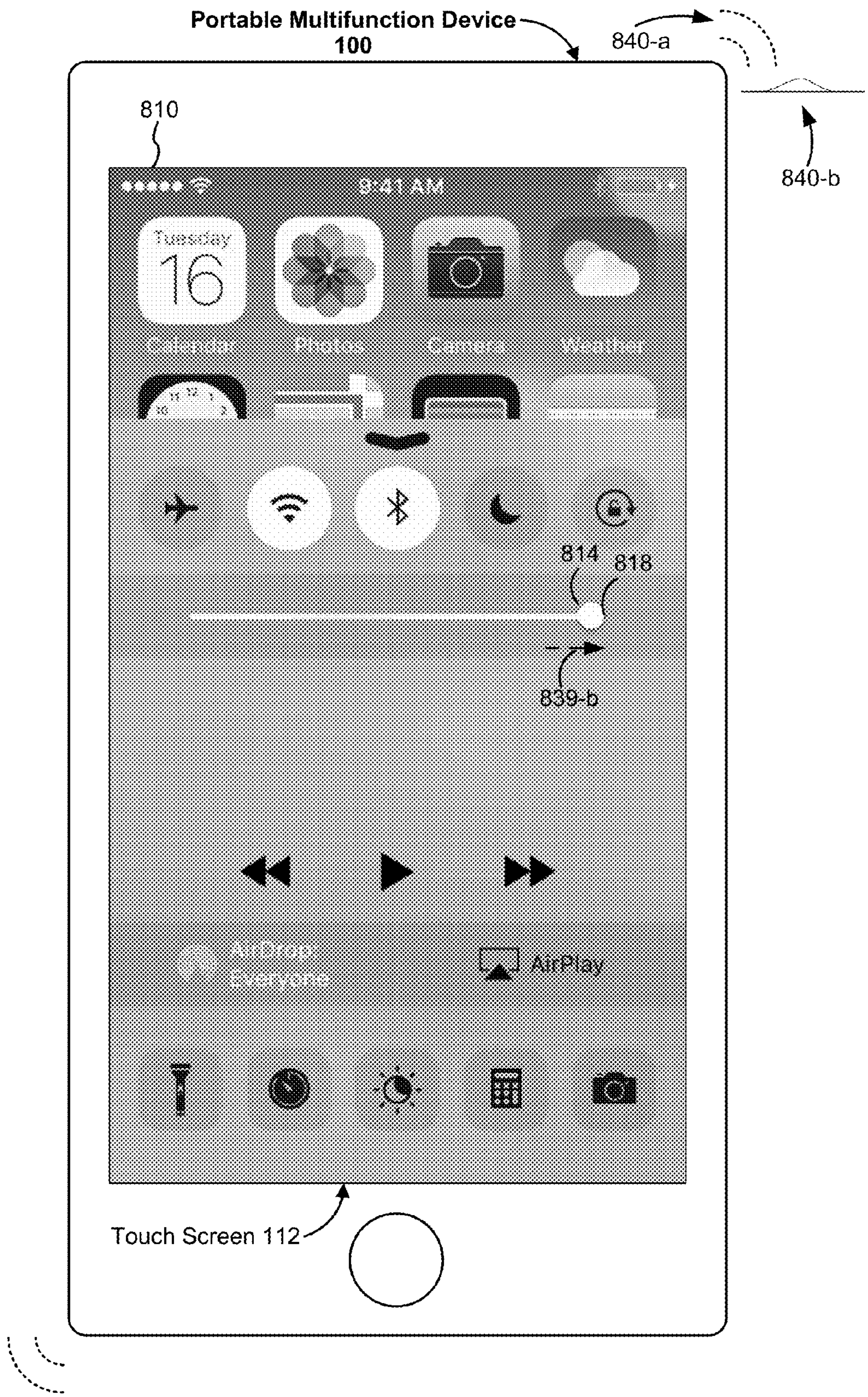

In FIGS. 8L-8M, the device detects a faster input on the movable indicator 814, e.g., a flick gesture by contact 836 with movement 838, which quickly adjusts the brightness of the display up toward the maximum end 818. After the flick gesture (e.g., after lift-off of contact 836), indicator 814 continues to move with simulated inertia. The rate of movement 839 by indicator 814 reduces gradually as indicator 814 continues to move along slider control 812. Tactile output 840 is produced (e.g., MicroTap (150 Hz), Gain max: 0.6, Gain min: 0.3) with a tactile output pattern that is configured based on the speed 839-*b* of indicator 814 when indicator 814 reaches maximum end 818 of slider control 812. Since speed 839-*b* of indicator 814 is slower in FIG. 8N than the speed of the indicator 814 in FIG. 8K, a smaller gain factor (e.g., a gain of 0.3) is applied to the baseline tactile output pattern to generate tactile output 840, as compared to the gain factor (e.g., a gain of 0.5) used in the generation of tactile output 843.

These tactile outputs provide feedback to the user that the maximum value has been reached in the slider control. Stronger tactile outputs are provided as faster, less precise inputs are used.

In some embodiments, visual feedback is also displayed when indicator 814 reaches an end of slider control 812, such as having indicator 814 bounce off of and away from the end of slider control 812, and then having indicator 814 return to the end of the slider control. Providing concurrent visual and haptic feedback enhances the overall feedback to the user that the end of the slider control has been reached and improves the operability of the slider control.

Figure 9A:
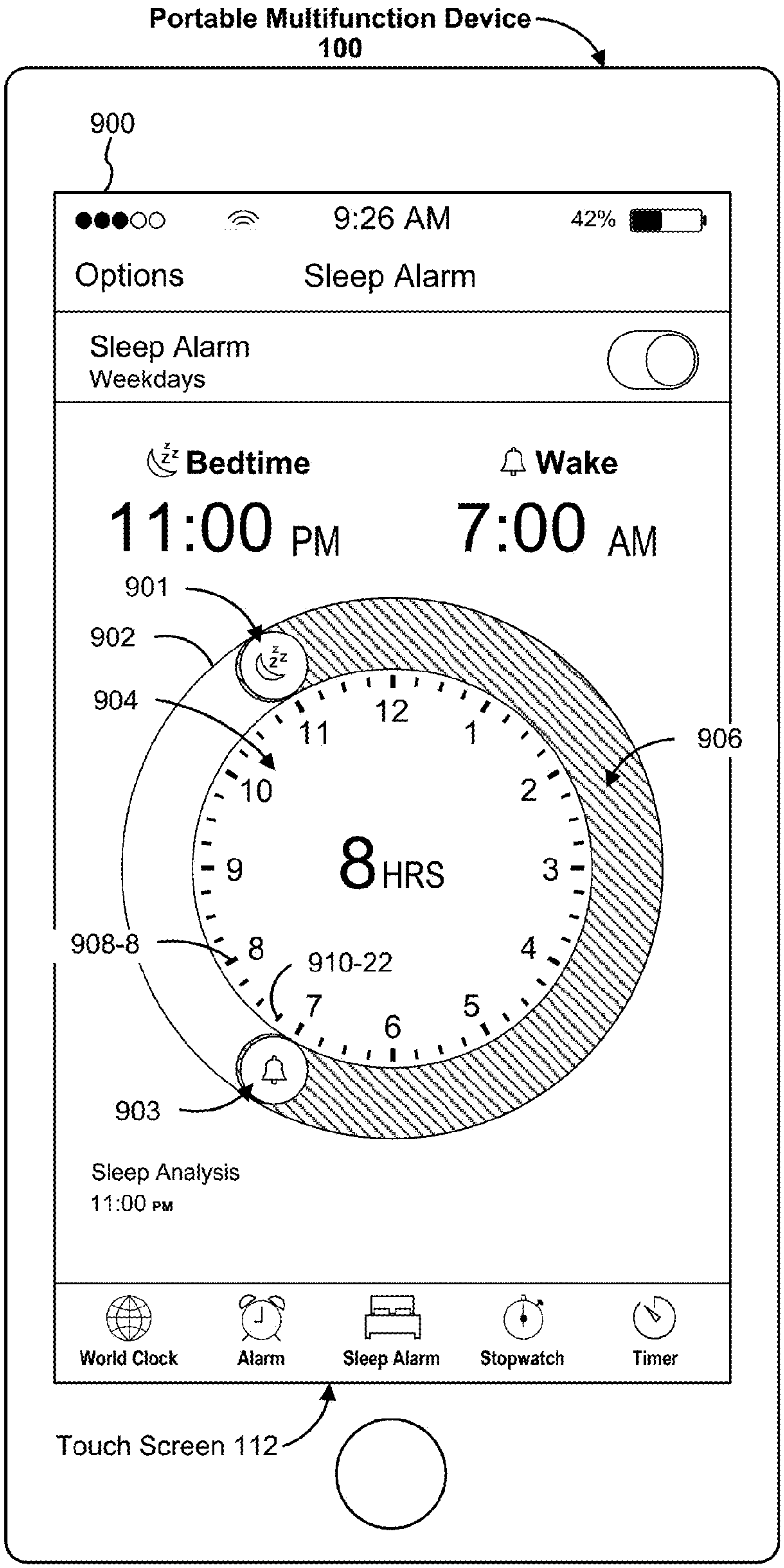
FIGS. 9A-9V illustrate exemplary user interfaces for providing haptic feedback for interaction with a slider control (e.g., a sleep timer slider control) in accordance with some embodiments.
Figure 9B:
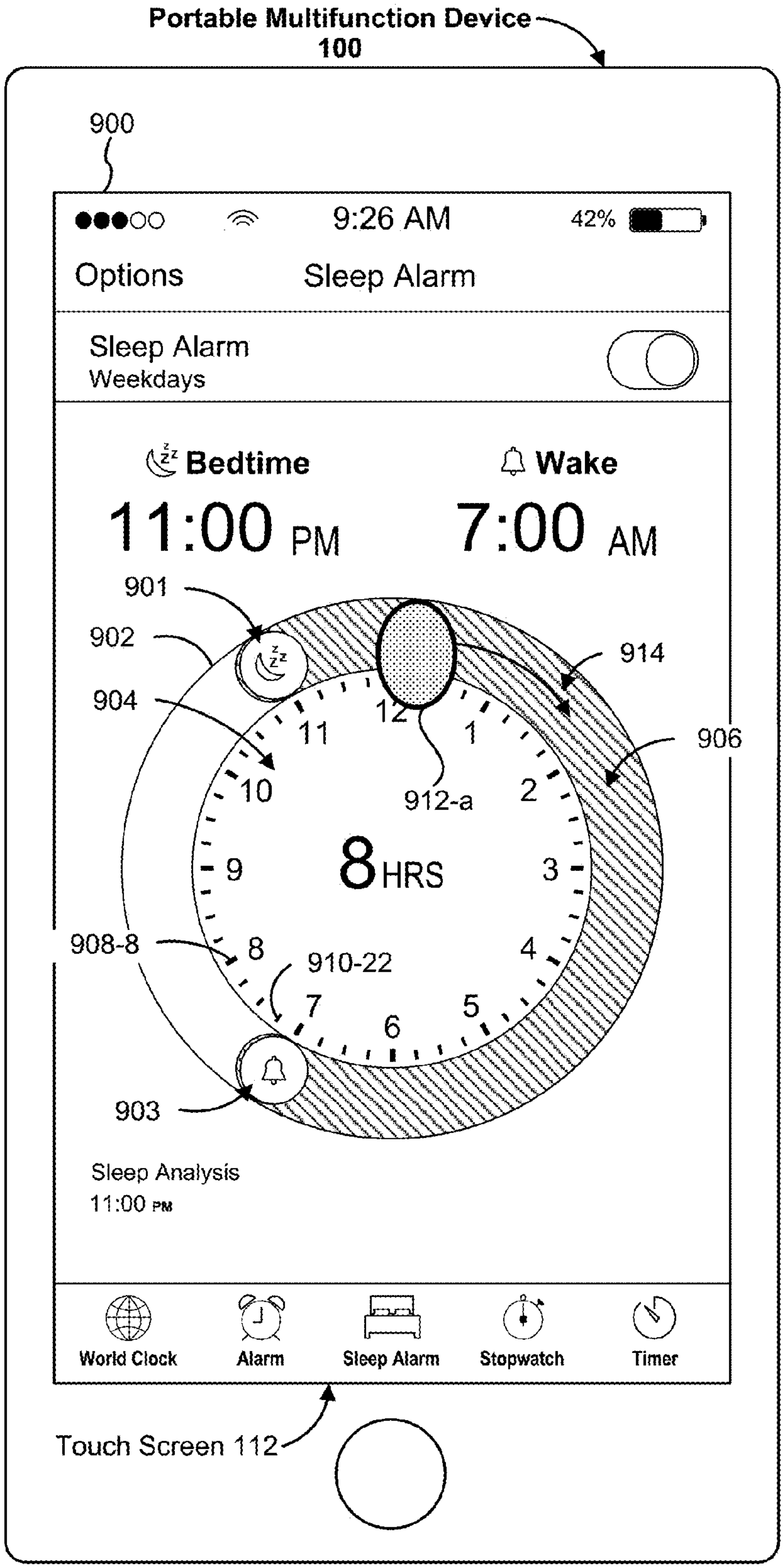
Figure 9C:
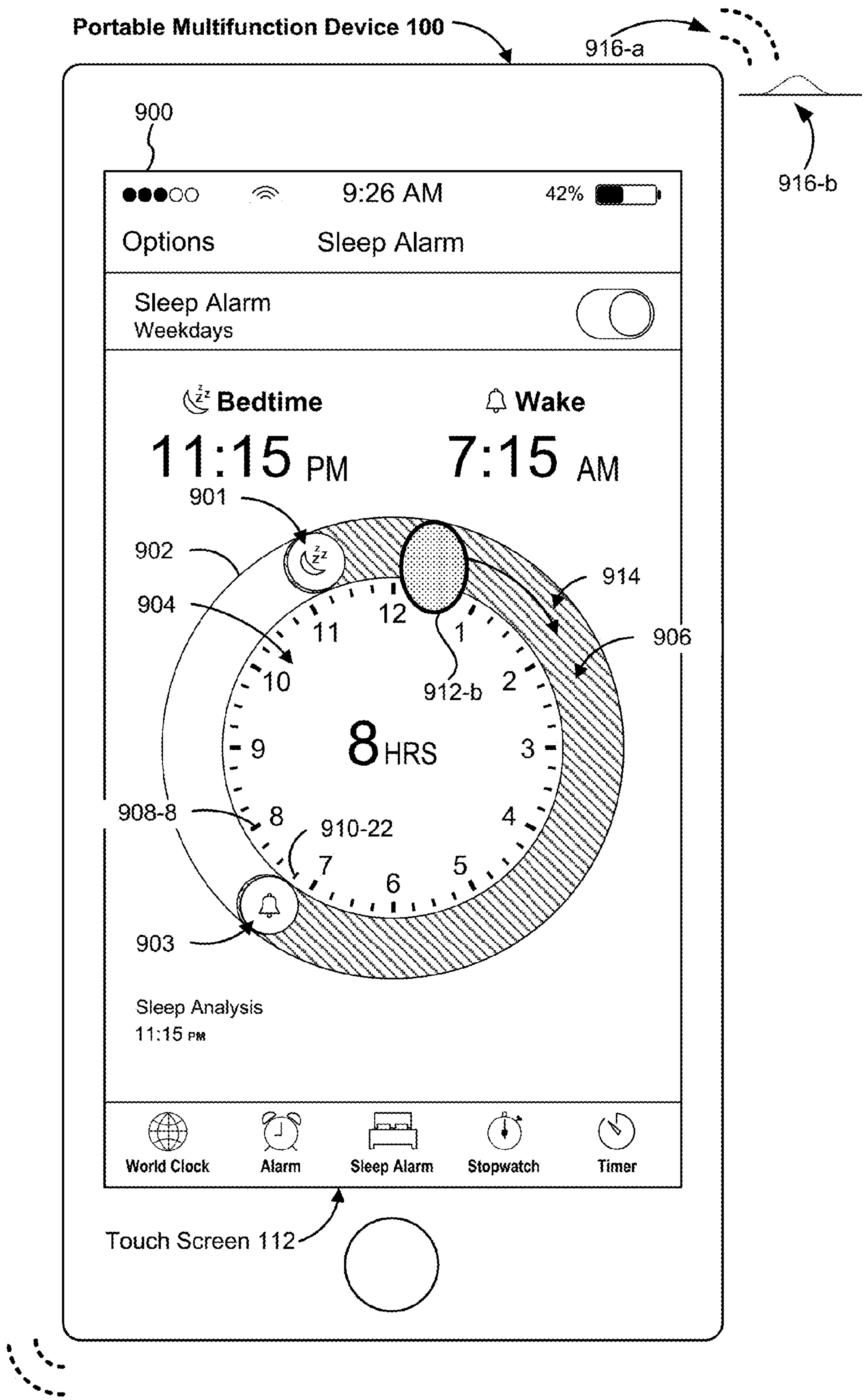
Figure 9D:
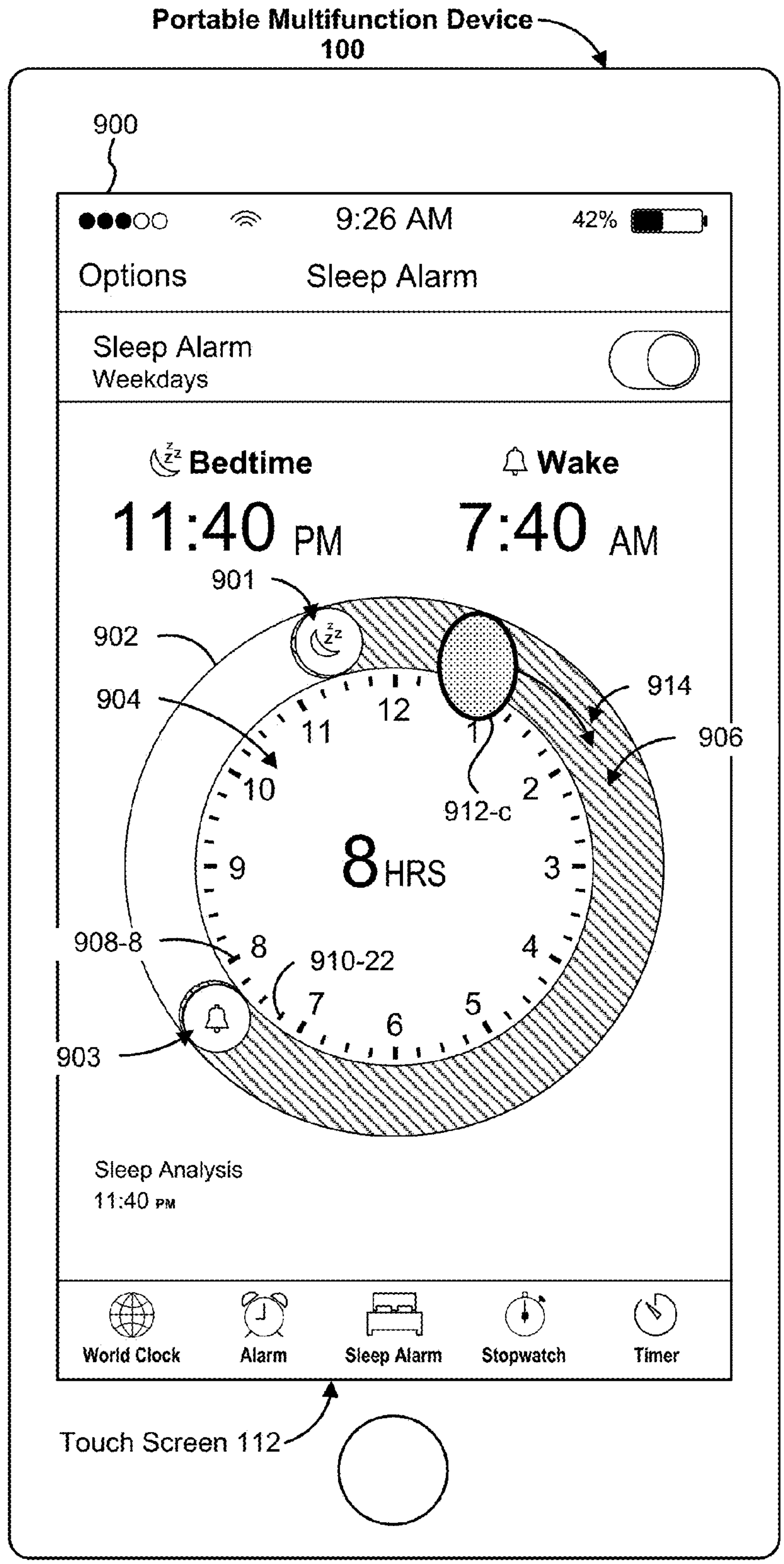
Figure 9E:
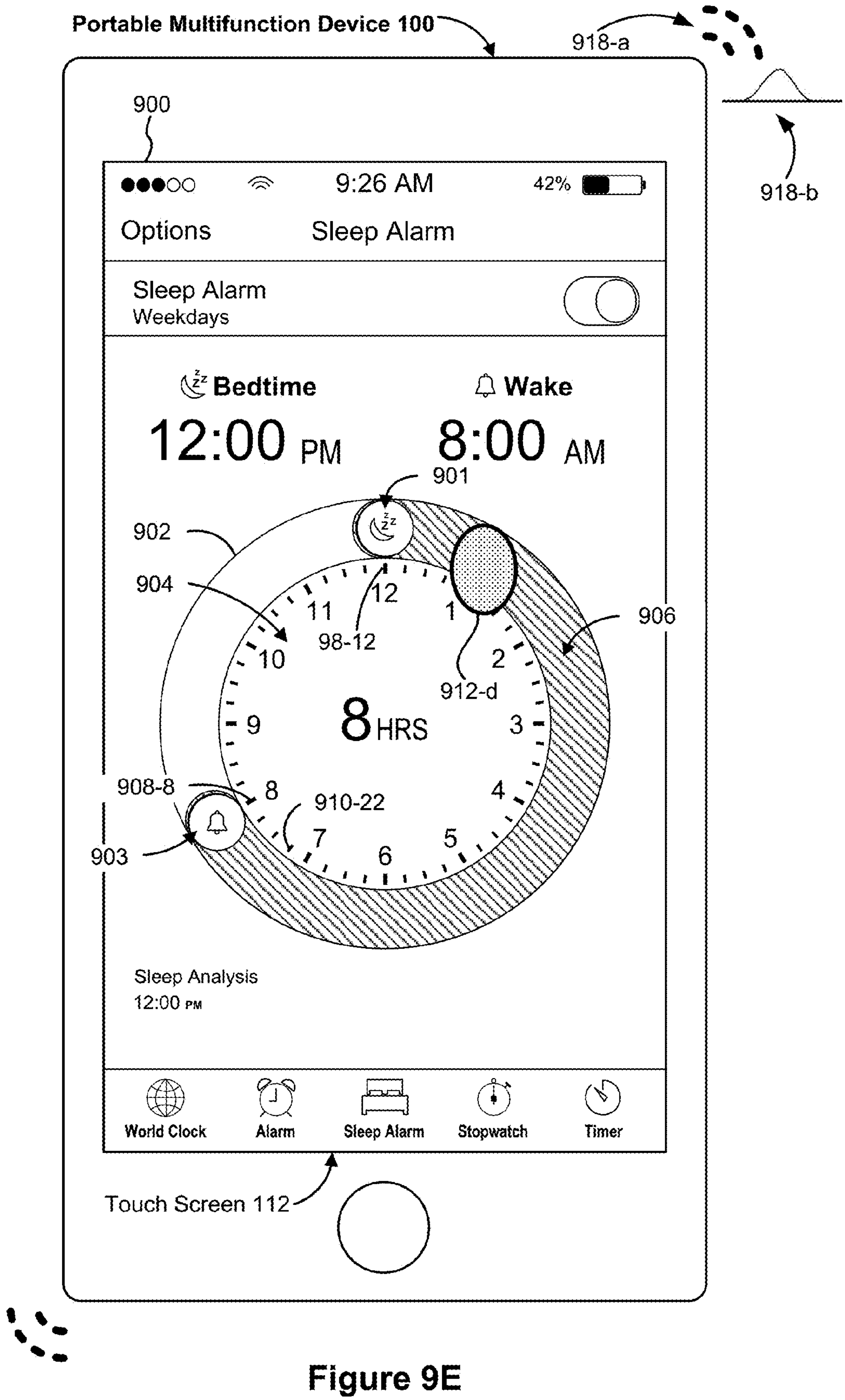
Figure 9F:
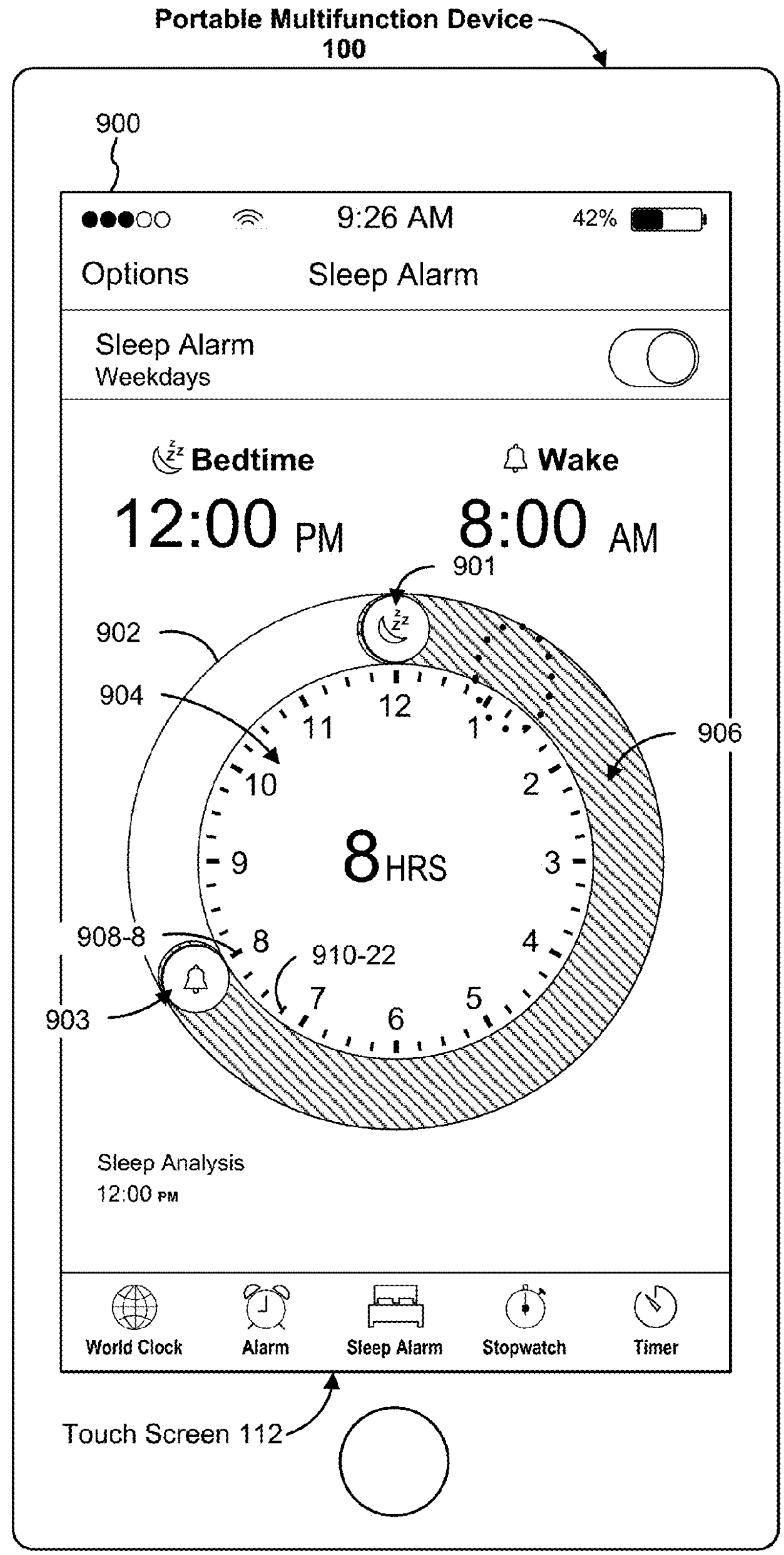
Figure 9G:
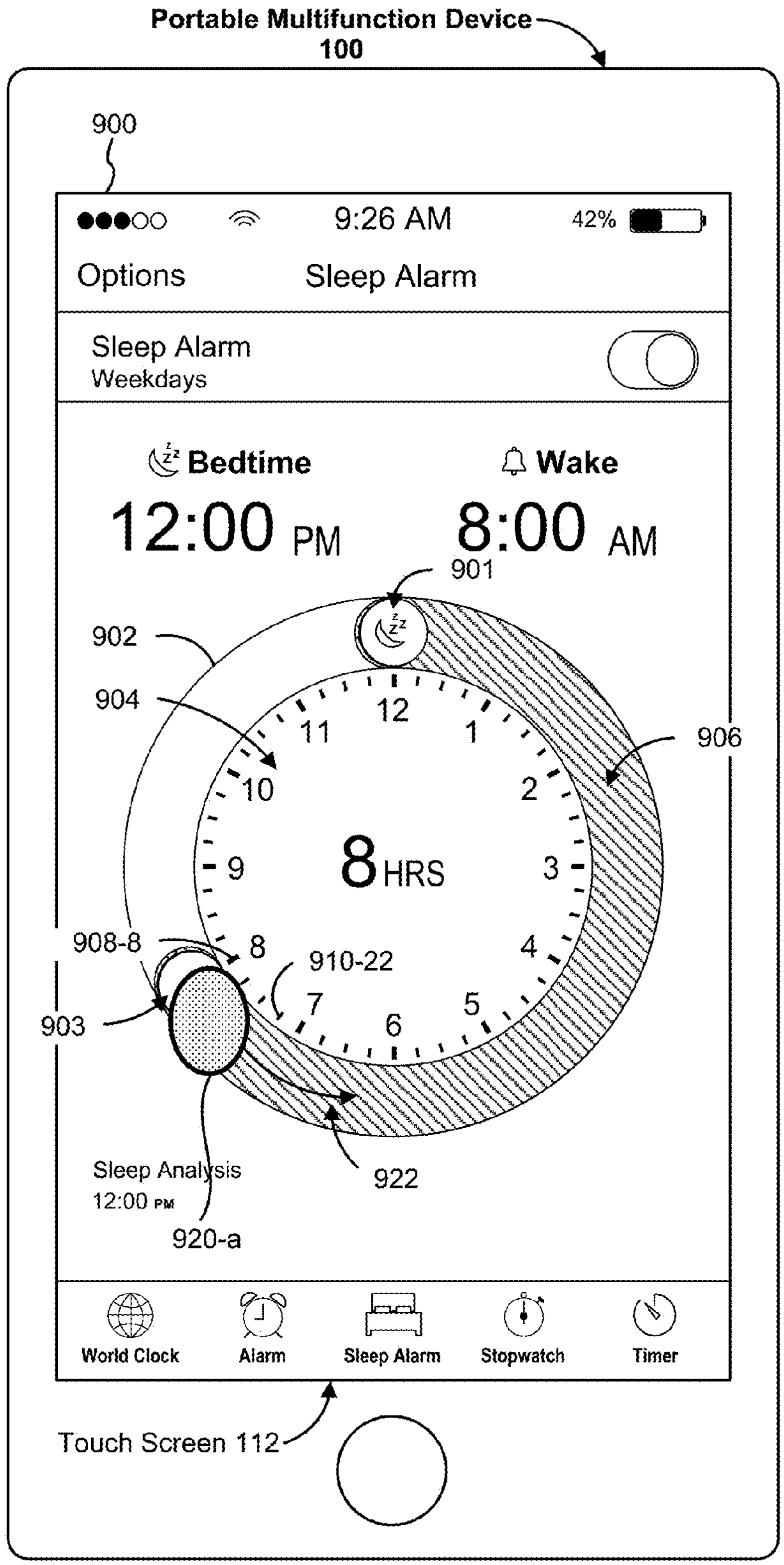
Figure 9H:
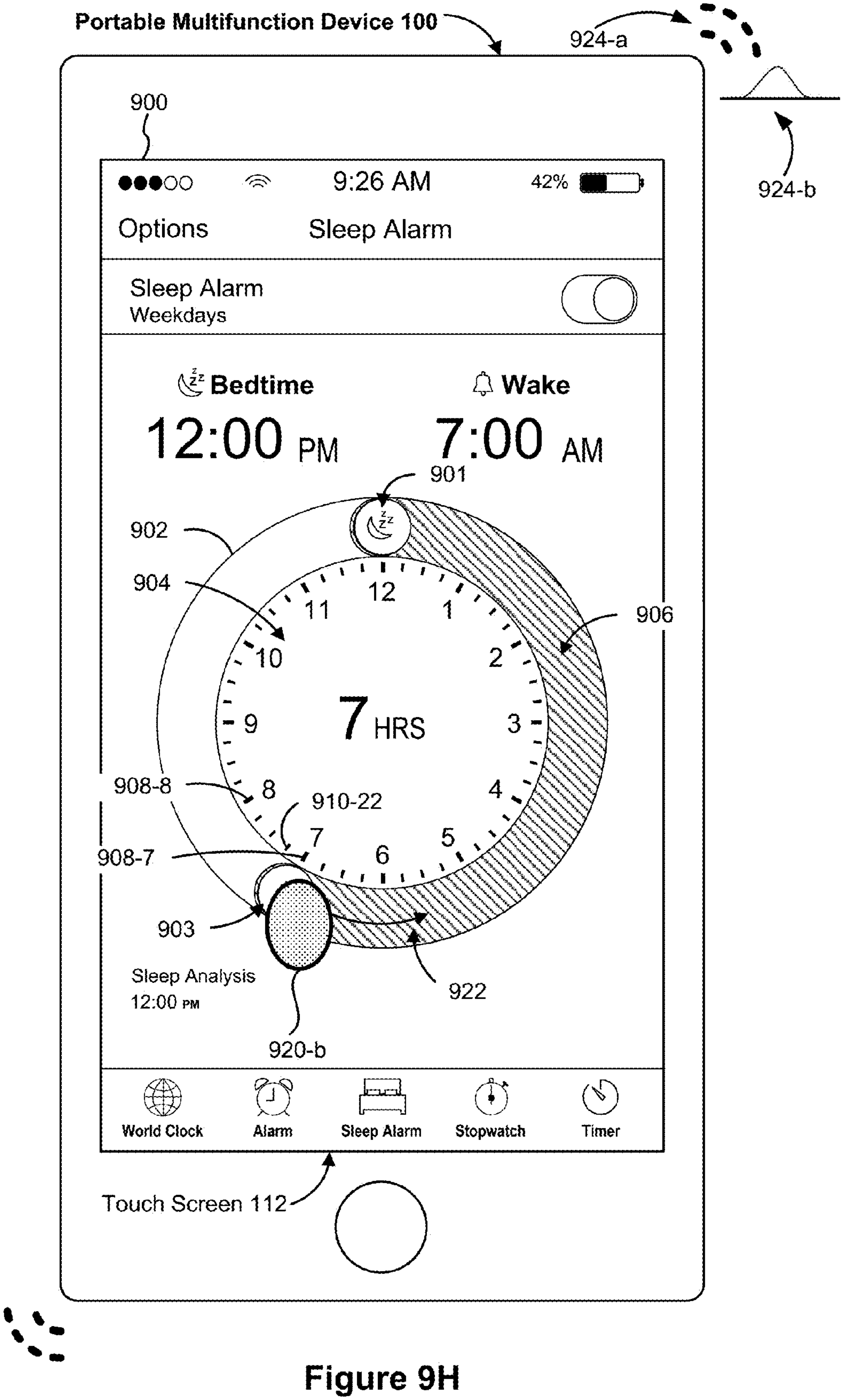
Figure 9I:
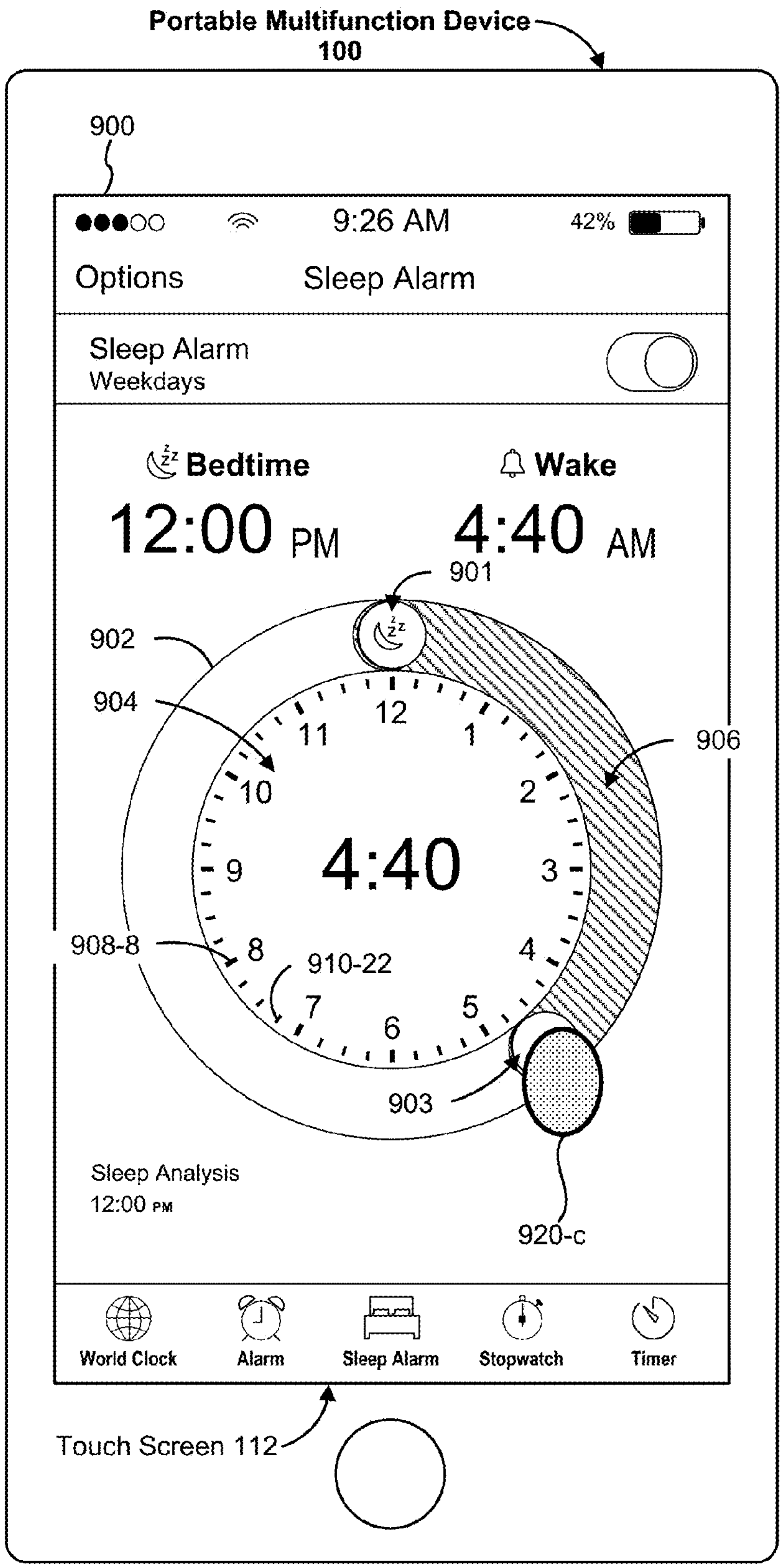
Figure 9J:
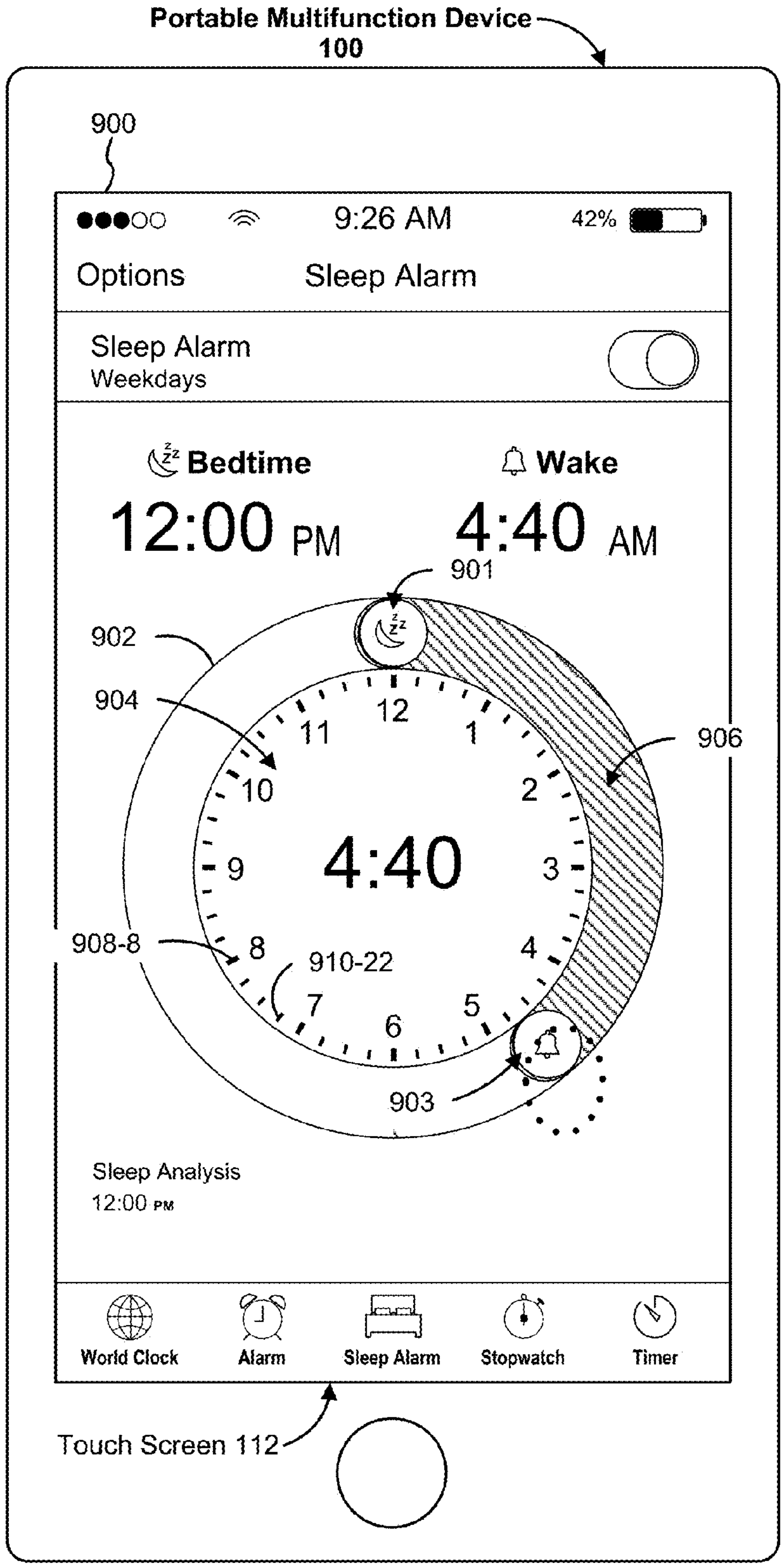
Figure 9K:
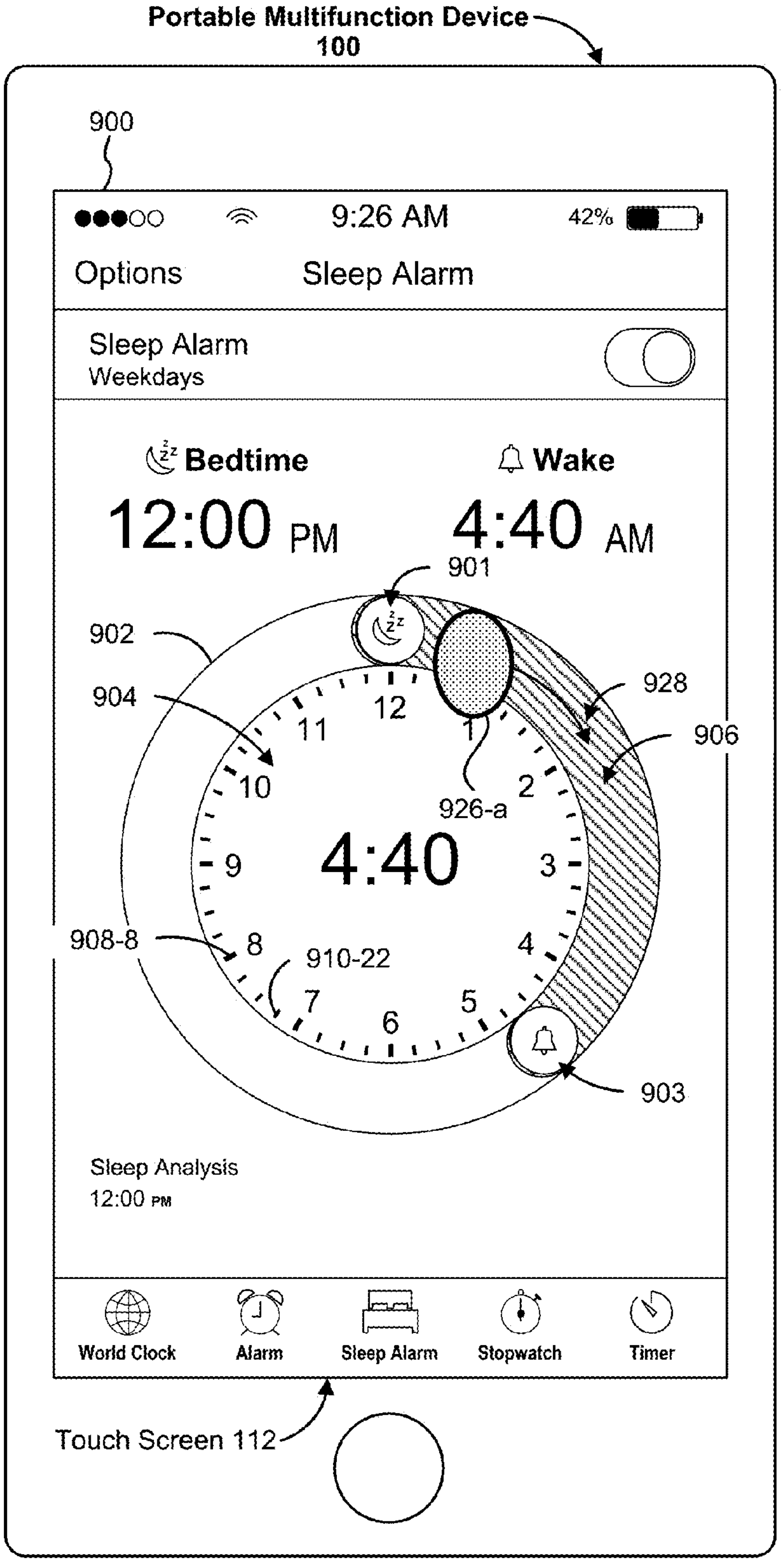
Figure 9L:
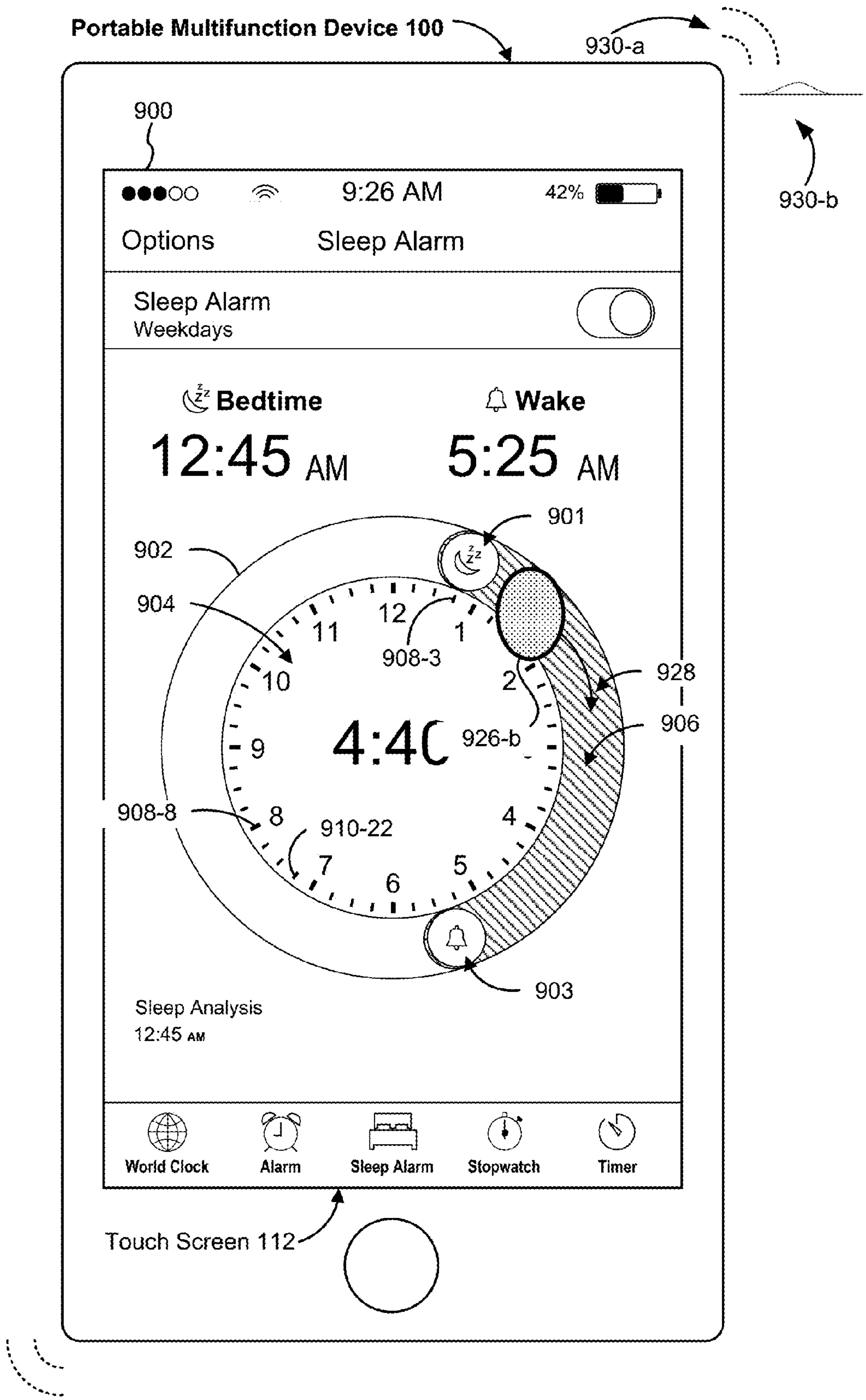
Figure 9M:
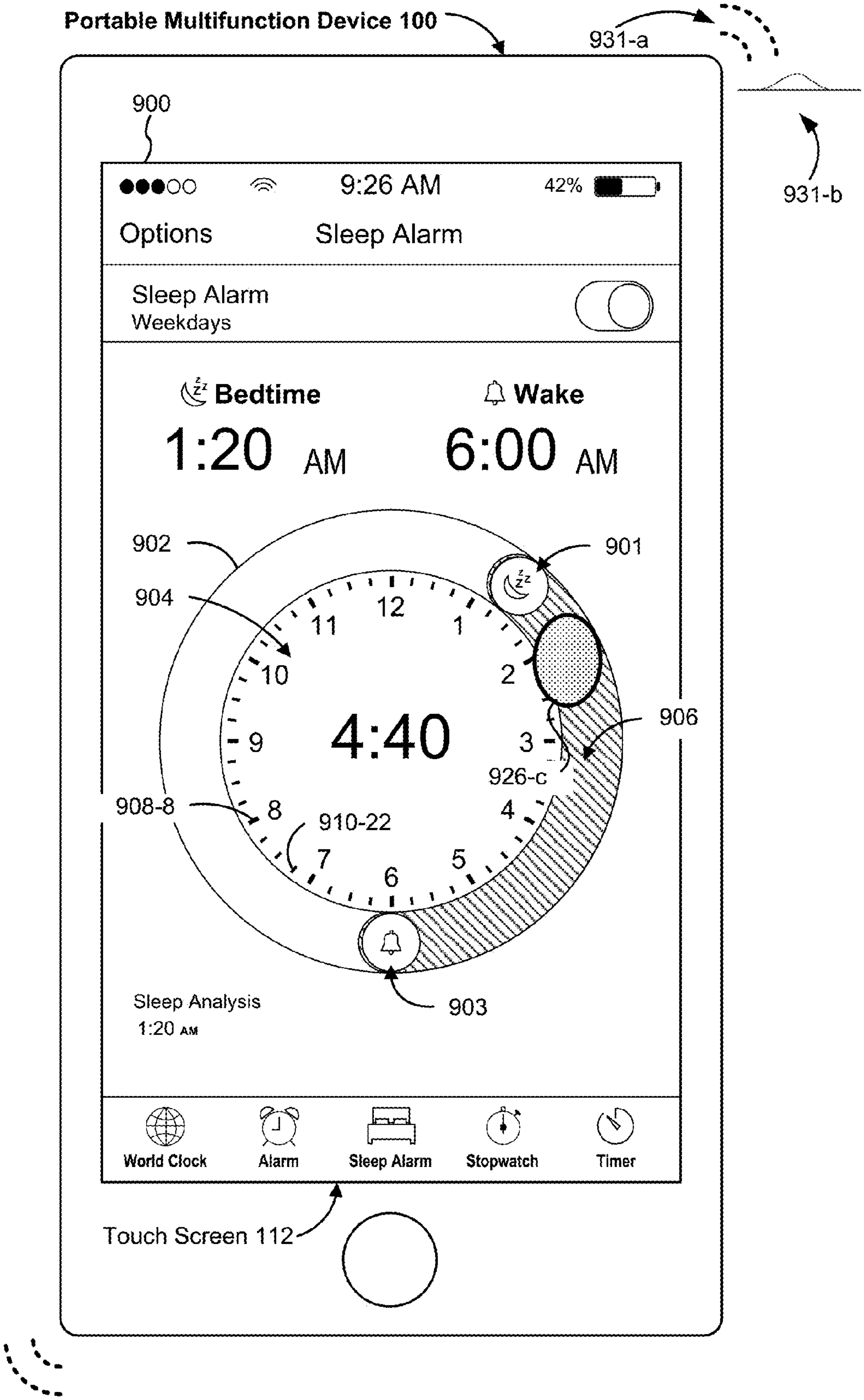
Figure 9N:
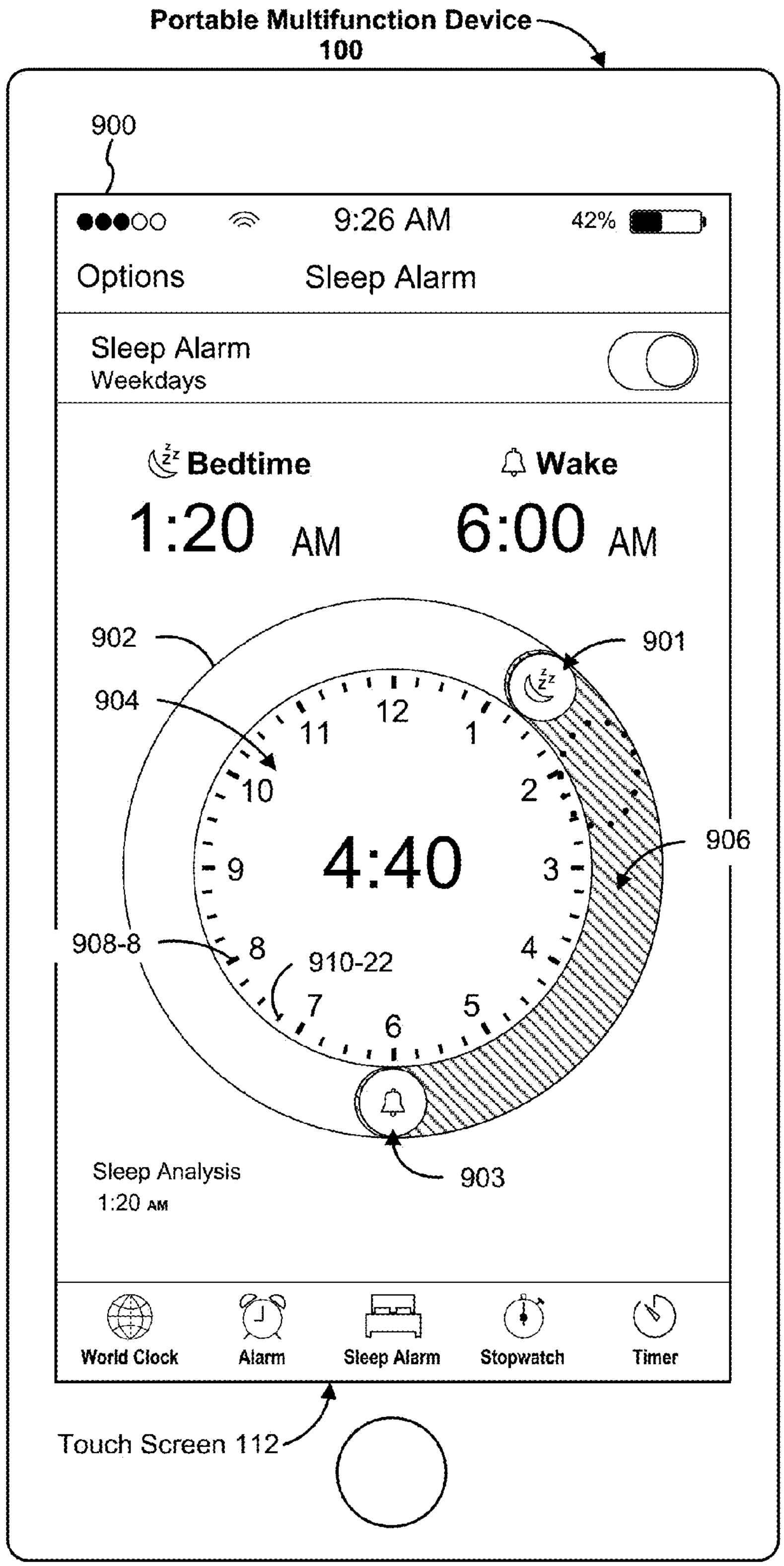
Figure 9O:
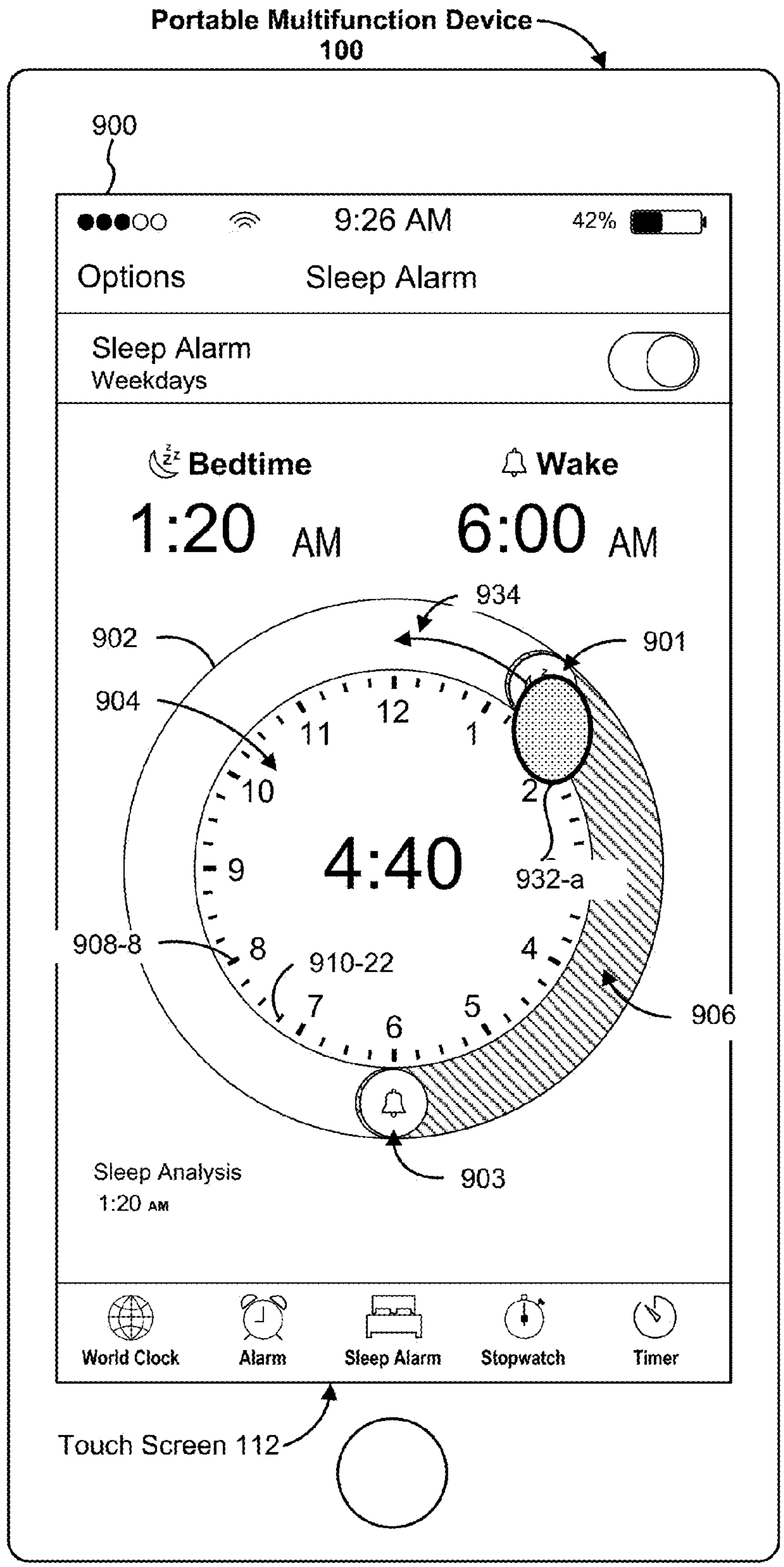
Figure 9P:
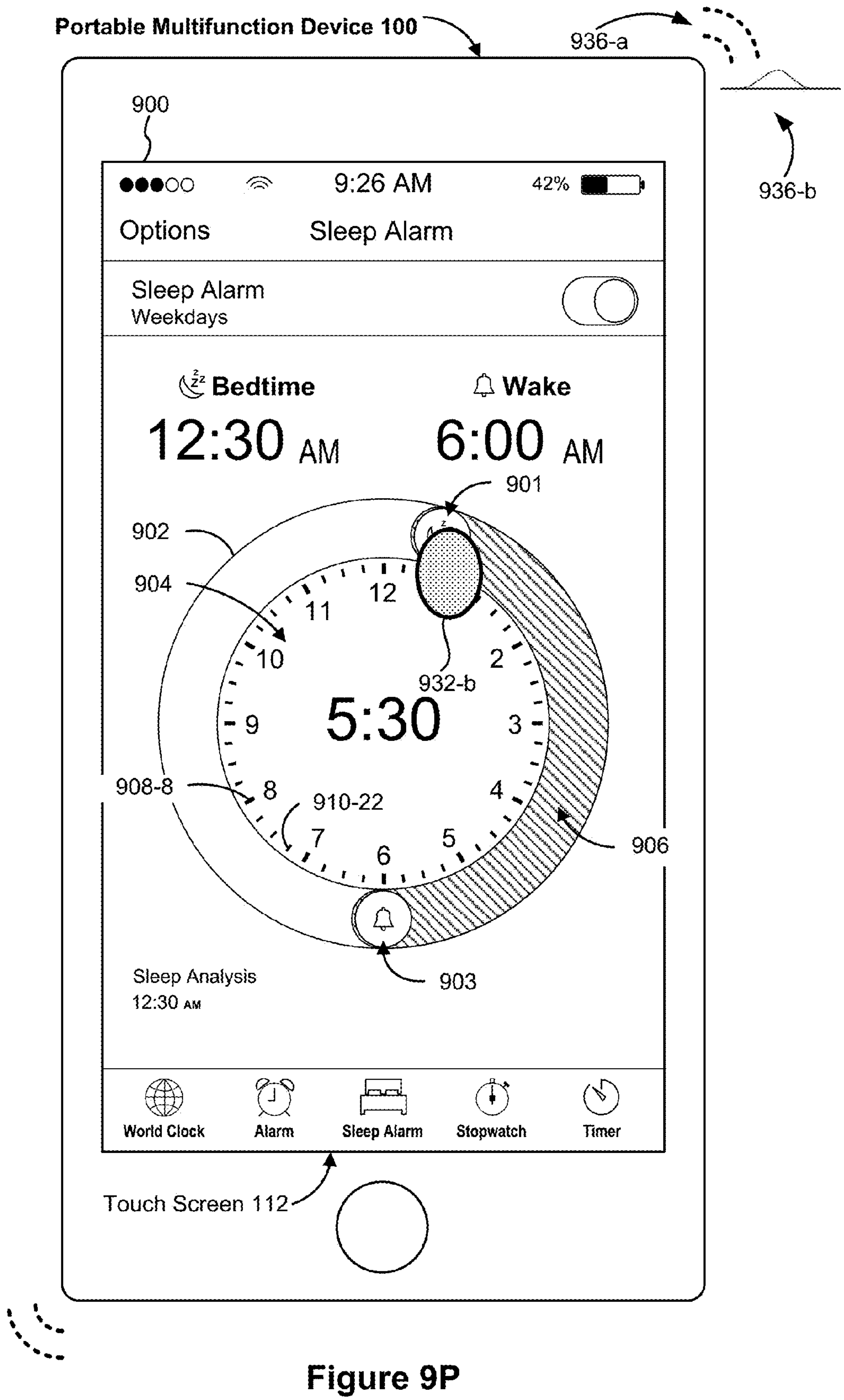
Figure 9Q:
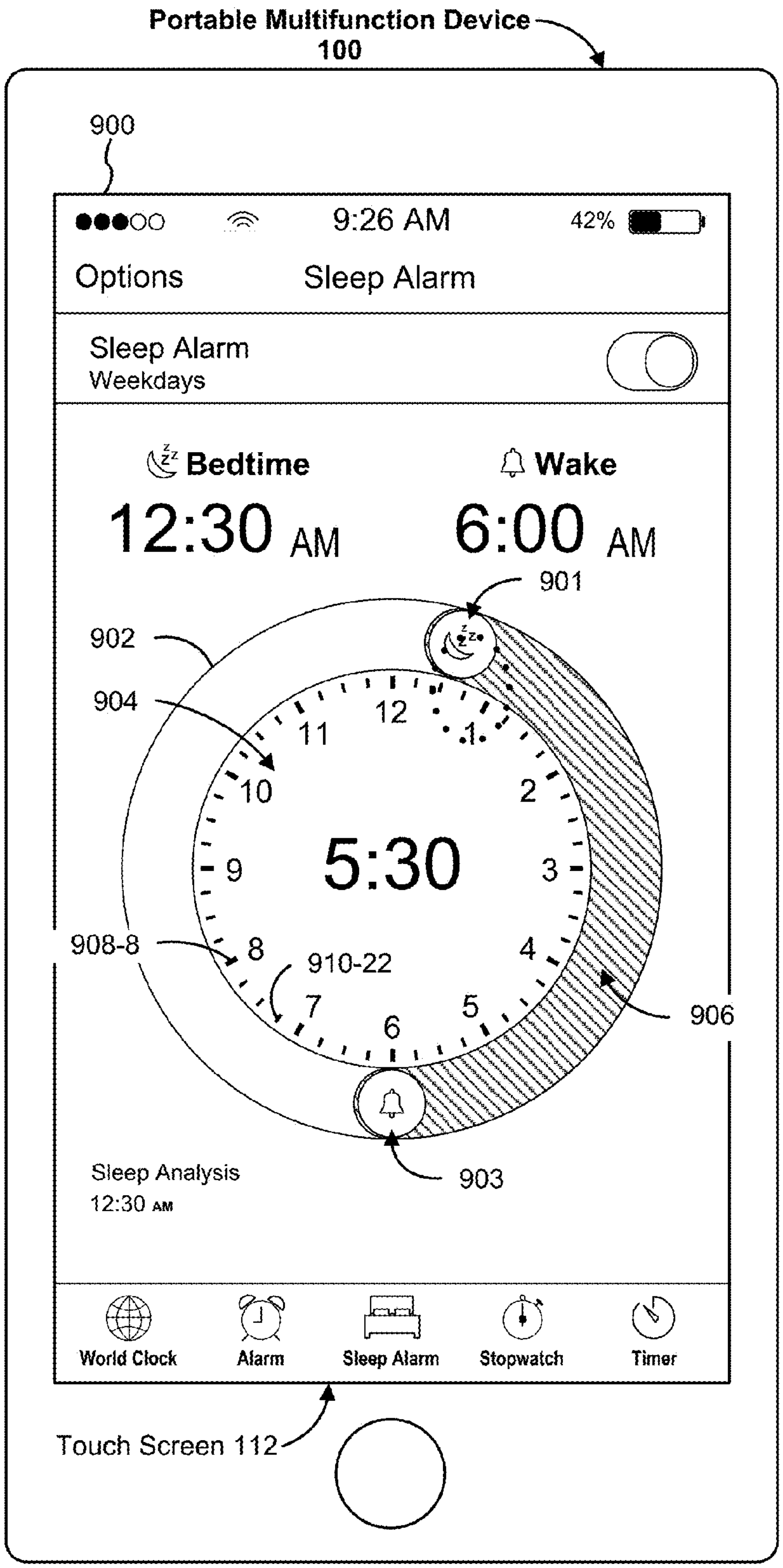
Figure 9R:
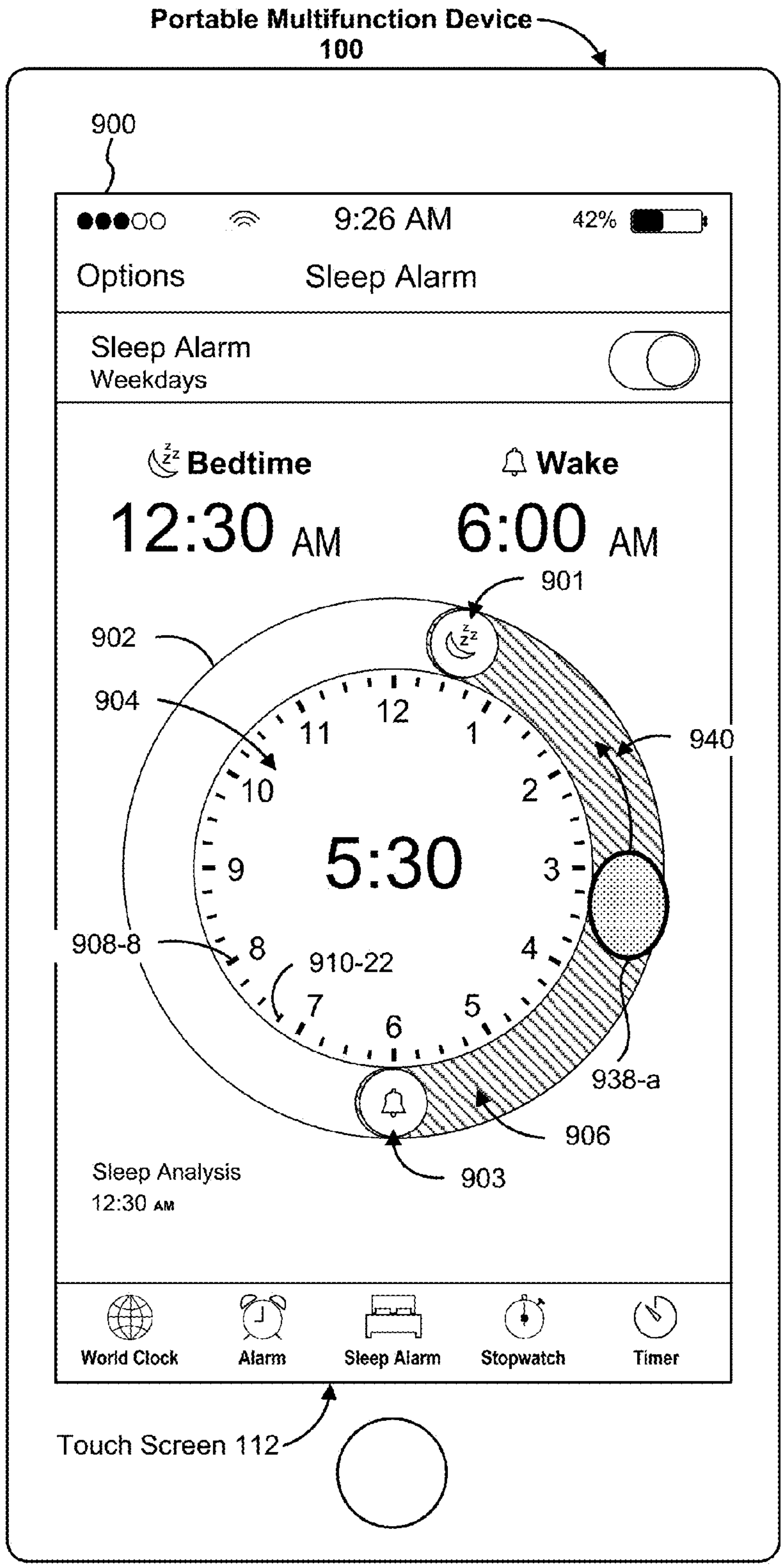
Figure 9S:
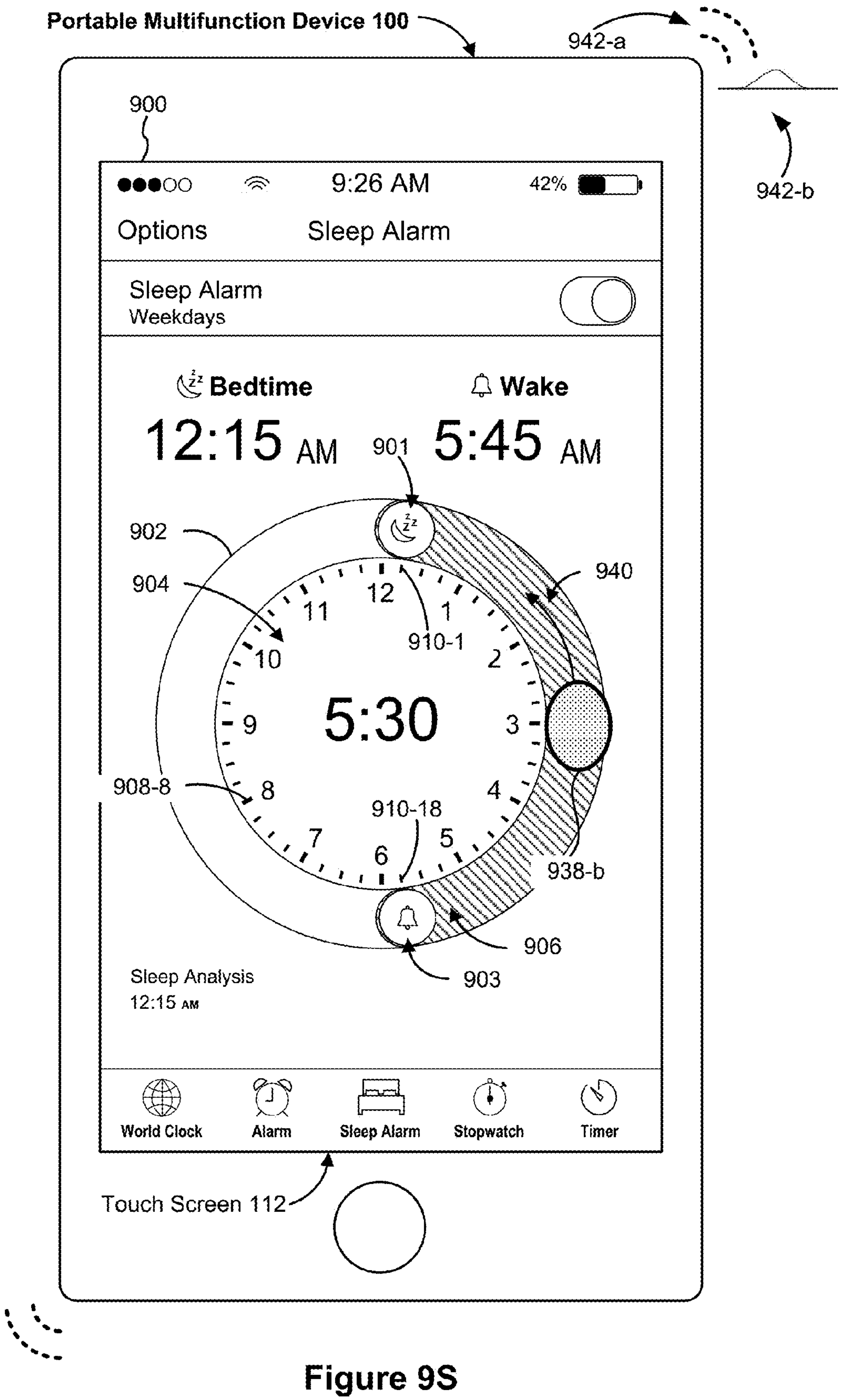
Figure 9T:
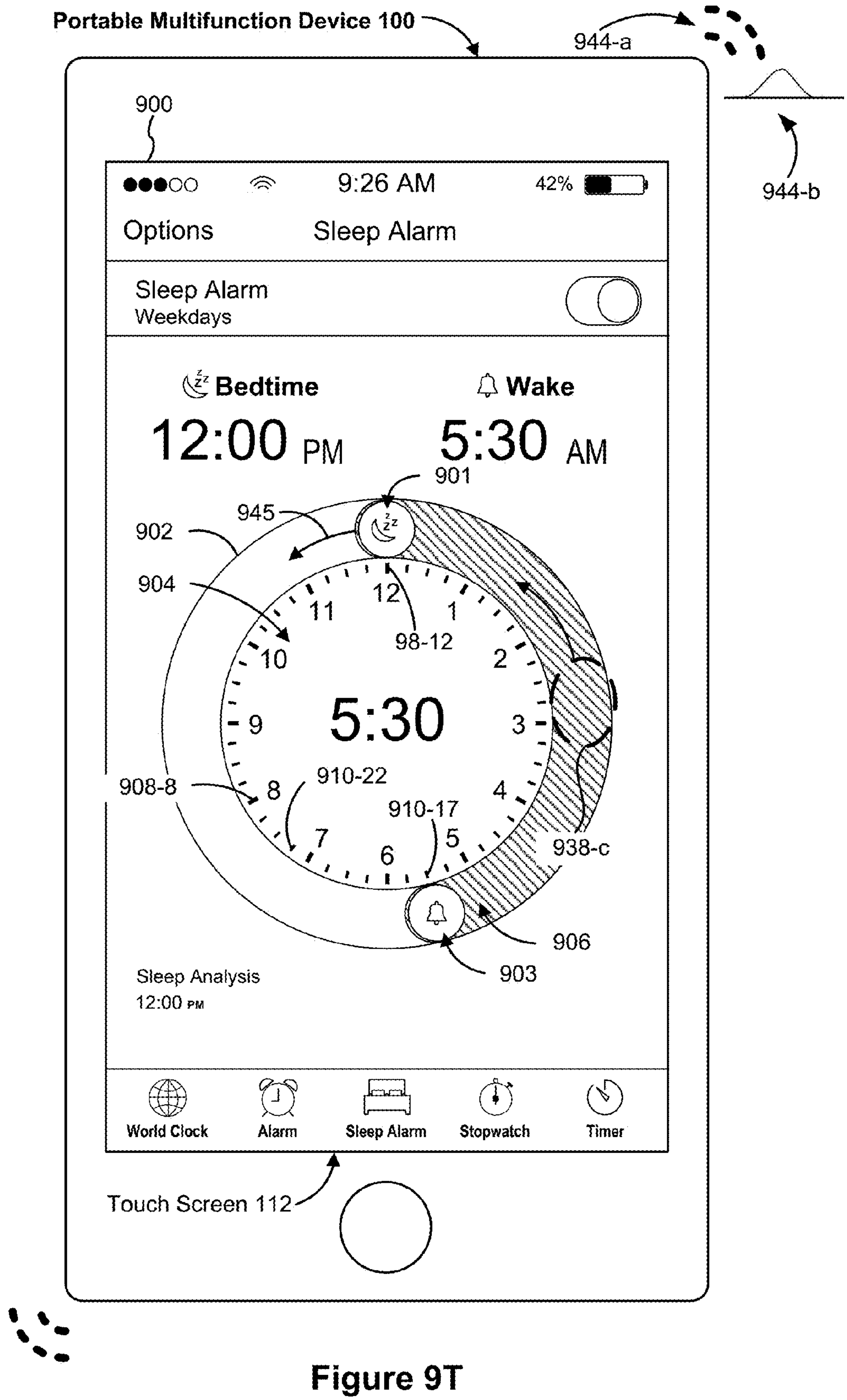
Figure 9U:
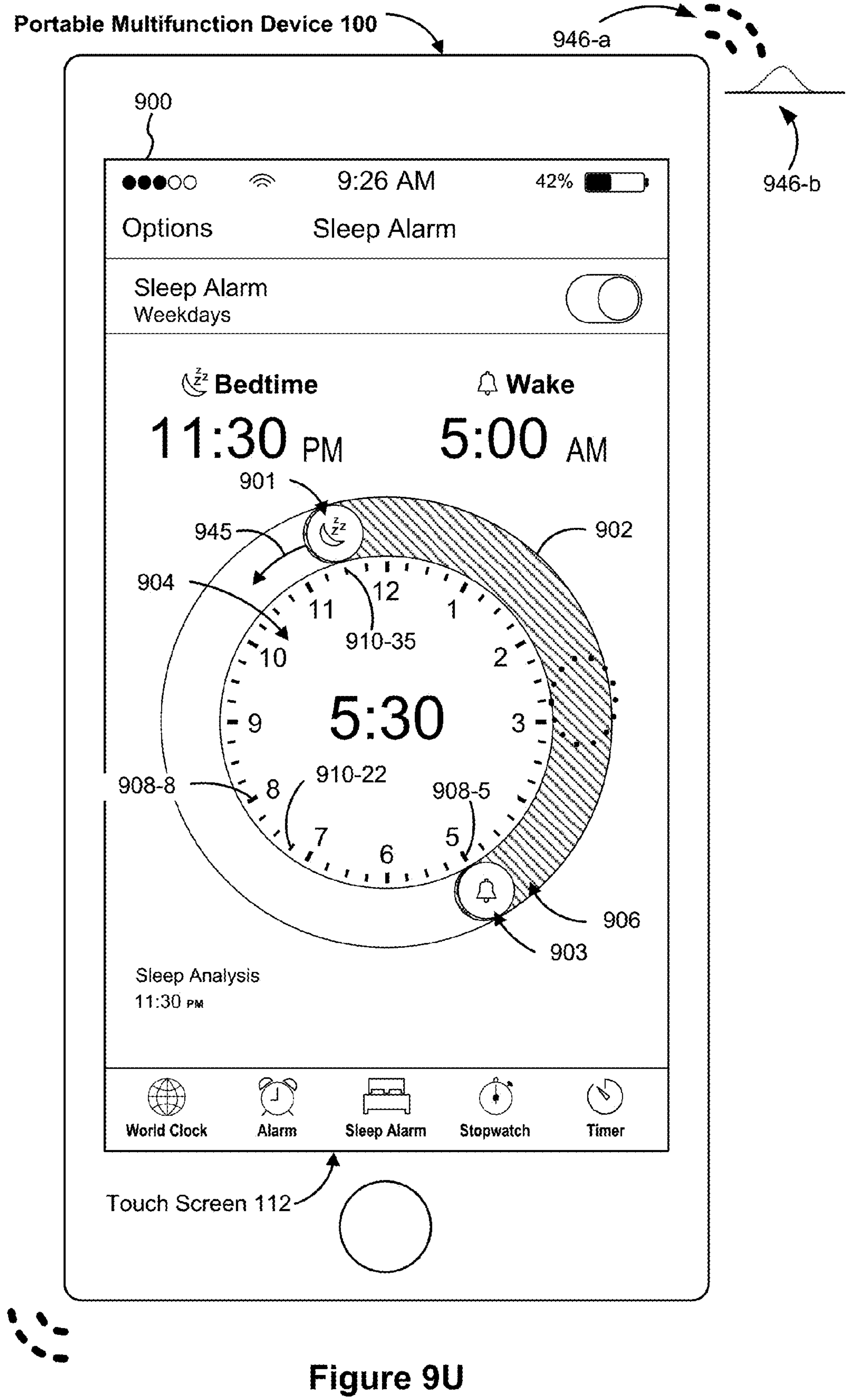
Figure 9V:
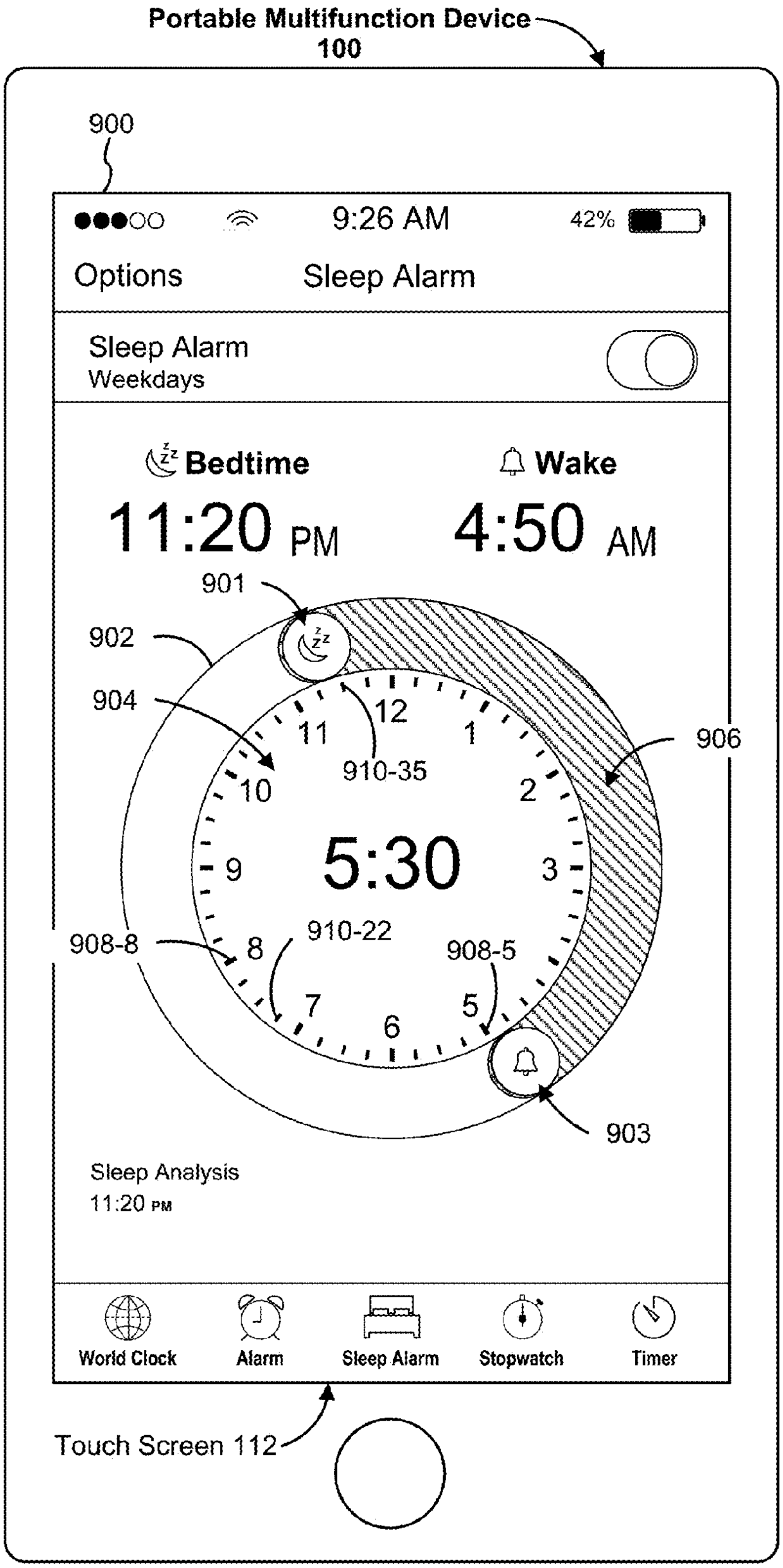

FIGS. 9A-9V illustrate exemplary user interfaces for providing tactile outputs while moving an indicator in a circular slider control, in accordance with some embodiments.

FIGS. 9A-9V display exemplary user interface 900 for a sleep timer, which includes circular slider control 902 positioned around clock face 904 (e.g., a slider control where the first end is connected to the second end, for example, at 12:00). Clock face 904 includes major tick marks 908-1 to 908-12 which correspond to a first set of predefined values in hour increments, on the hour, in circular control slider 902. Clock face 904 also includes minor tick marks 910-1 to 910-36 which correspond to a second set of predefined values in 15 minute increments, off the hour, in circular slider control 902. Moveable indicator 906 is displayed along circular slider 902 and can be moved around the outside of clock face 904. Moveable indicator 906 corresponds to a user-defined timer period, as bound by first end 901 and second end 903. For example, a user may set a bed-time with first end 901 and a wake-time with second end 903. User interface 900 provides tactile feedback when an end of moveable indicator 906 reaches an end of the slider (e.g., 12:00), as well as when moving over a major tick mark 908 or minor tick mark 910, assisting the user determine the set points of the slider control.

FIGS. 9A-9F illustrate an exemplary embodiment where the device generates tactile outputs to indicate predetermined times, when setting the starting and ending points of a user-defined time period on the sleep timer. The tactile outputs are generated when an end of the indicator moves over a tick mark on the clock face (e.g., as shown in FIGS. 9C and 9E), and differ depending on whether the end slides over a minor tick mark or a major tick mark. No tactile output is generated when an end of the indicator is passing a location between two tick marks (e.g., as shown in FIG. 9D). In some embodiments, the device imposes a limit on the maximum rate at which tactile outputs are generated, so if the indicator moves very quickly around the click face, some tactile outputs may be skipped. For example, if an end of the indicator moves past a tick mark and a threshold amount of time (e.g., 0.05 s) has not expired since when the device last generated a tactile output (e.g., at an earlier time when an end of the indicator passed a tick mark), the device forgoes generation of the current tactile output.

FIG. 9A illustrates a sleep alarm set for an eight-hour sleep time, between 11:00 PM and 7:00 AM, as indicated by the position of moveable indicator 906 (first end 901 is positioned at major tick mark 908-11, corresponding to 11:00 PM, and second end 903 is positioned at major tick mark 908-7, corresponding to 7:00 AM). In FIG. 9B, device 100 detects a drag gesture. The device rotates movable indicator 906 around slider control 902, in accordance with movement 914 of contact 912, in FIGS. 9B-9E.

While rotating indicator 906, the device generates first tactile output 916 (e.g., MicroTap (150 Hz), Gain max: 0.6, Gain min: 0.0) when first end 901 passes over minor tick mark 910-34 and second end 903 passes over minor tick mark 910-22, in FIG. 9C. While continuing to rotate indicator 906, the device generates second tactile output 918 (e.g., MicroTap (150 Hz), Gain max: 1.0, Gain min: 0.3) when first end 901 passes over major tick mark 908-12 and second end 903 passes over major tick mark 908-8, in FIG. 9E. Second tactile output 918 (e.g., MicroTap (150 Hz) with a gain of 1.0 in FIG. 9E) is stronger than first tactile output 916 (e.g., MicroTap (150 Hz) with a gain of 0.6 in FIG. 9C) because the ends of indicator 906 were over a major tick mark in FIG. 9E and a minor tick mark in FIG. 9C. FIG. 9F shows lift-off of the contact, ending rotation of the indicator 906.

FIGS. 9F-9J illustrate an exemplary embodiment where the device generates tactile output to indicate predetermined times, when shrinking the user-defined time period indicator by moving a single end of a movable indicator towards the other end of the indicator. The tactile output is generated when the end of the indicator moves over a tick mark on the clock face (e.g., as shown in FIG. 9H). No tactile output is generated when an end of the indicator is passing a location between two tick marks (e.g., as shown in FIG. 9I).

FIG. 9F illustrates a sleep alarm set for an eight-hour sleep time, between 12:00 PM (e.g., midnight) and 8:00 AM, as indicated by the position of moveable indicator 906 (first end 901 is positioned at major tick mark 908-12, corresponding to 12:00 PM, and second end 903 is positioned at major tick mark 908-8, corresponding to 8:00 AM). In FIG. 9G, device 100 detects a drag gesture. In FIGS. 9G-9I, movement 922 of contact 920 causes only second end 903 of movable indicator 906 to rotate around circular slider control 902, because contact 920 was first detected at the end of the indicator. This causes movable indicator 906 to shrink from an eight-hour time period, in FIG. 9G, to a four-hour and forty-minute time period, in FIG. 9I. In contrast, the series of FIGS. 9A-9F illustrated an embodiment where the entire movable indicator is rotated around the circular slider control because the contact was detected in the middle of the indicator, rather than on the end.

While moving second end 903 of indicator 906 around the clock face, the device generates third tactile output 924 (e.g., MicroTap (150 Hz), Gain max: 1.0, Gain min: 0.3) when second end 903 passes over major tick mark 910-22, corresponding to 7:00 AM, in FIG. 9H. Third tactile output 918 (e.g., MicroTap (150 Hz) with a gain of 1.0 in FIG. 9H) is stronger than first tactile output 916 (e.g., MicroTap (150 Hz) with a gain of 0.6 in FIG. 9C) because the end of indicator 906 was over a major tick mark in FIG. 9H and a minor tick mark in FIG. 9C. As illustrated in FIG. 9I, while continuing to rotate second end 903, no tactile output is generated when the second end passes over the clock value corresponding to 4:40 AM, because the value is not contained in either the first set of values (e.g., every fifteen minutes) or the second set of values (e.g., every hour) predefined to correspond to a tactile output. FIG. 9J shows lift-off of the contact, ending rotation of second end 903 of indicator 906.

FIGS. 9K-9N illustrate an embodiment where the device generates tactile output to indicate predetermined times, when either end of a movable indicator moves over a tick mark on the clock face. The tactile output is generated even if the other end of the indicator does concurrently cross over a tick mark on the clock face. This series of figures also illustrates an exemplary embodiment where the device generates a smaller tactile output while rotating a smaller movable indicator, as compared to the series of FIGS. 9A-9F, which illustrate a larger tactile output for similar triggering events.

FIG. 9K illustrates a sleep alarm set for a four-hour and forty-minute sleep time, between 12:00 PM (e.g., midnight) and 4:40 AM, as indicated by the position of moveable indicator 906 (first end 901 is positioned at major tick mark 908-12, corresponding to 12:00 PM, and second end 903 is positioned at a position corresponding to 4:40 AM). In FIG. 9K, device 100 detects a drag gesture. The device rotates movable indicator 906 around slider control 902, in accordance with movement 928 of contact 926, in FIGS. 9K-9M.

While rotating indicator 906, the device generates fourth tactile output 930 (e.g., MicroTap (150 Hz), Gain max: 0.6, Gain min: 0.0) when first end 901 passes over minor tick mark 908-3, in FIG. 9L, even though second end 903 is not concurrently passing over a tick mark. While continuing to rotate indicator 906, the device generates fifth tactile output 931 (e.g., MicroTap (150 Hz), Gain max: 1.0, Gain min: 0.3) when second end 901 passes over major tick mark 908-6, in FIG. 9M, even though first end 901 is not concurrently passing over a tick mark. Fifth tactile output 931 (e.g., MicroTap (150 Hz) with a gain of 0.5 in FIG. 9M) is stronger than fourth tactile output 930 (e.g., MicroTap (150 Hz) with a gain of 0.3 in FIG. 9L) because the end of indicator 906 was over a major tick mark in FIG. 9M and a minor tick mark in FIG. 9L. FIG. 9N shows lift-off of the contact, ending rotation of indicator 906.

FIGS. 9L and 9M illustrate tactile inputs generated in response to one end of the indicator passing over minor and major tick marks, as also illustrated in FIGS. 9C and 9E, respectively. However, because indicator 906 is smaller in FIGS. 9L and 9M, than in FIGS. 9C and 9E, the respective tactile outputs generated in FIG. 9L (e.g., MicroTap (150 Hz) with a gain of 0.3) and FIG. 9M (e.g., MicroTap (150 Hz) with a gain of 0.5) are smaller than the corresponding tactile outputs in FIG. 9C (e.g., MicroTap (150 Hz) with a gain of 0.6) and FIG. 9E (e.g., MicroTap (150 Hz) with a gain of 1.0).

FIGS. 9O-9Q illustrate an exemplary embodiment where the device generates tactile output to indicate predetermined times, when expanding the user-defined time period indicator by moving a single end of a movable indicator away from the other end of the indicator. The tactile output is generated when the end of the indicator moves over a tick mark on the clock face.

FIG. 9O illustrates a sleep alarm set for a four-hour and forty-minute sleep time, between 1:20 AM and 6:00 AM, as indicated by the position of moveable indicator 906 (first end 901 is positioned at a position corresponding to 1:20 AM, and second end 903 is positioned at major tick mark 908-6, corresponding to 6:00 AM). In FIG. 9O, device 100 detects a drag gesture. In FIGS. 9O-9P, movement 934 of contact 932 causes only first end 901 of movable indicator 906 to rotate around circular slider control 902, because contact 932 was first detected at the end of the indicator. This causes movable indicator 906 to expand from a four-hour and forty-minute time period, in FIG. 9O, to a five-hour and thirty-minute time period, in FIG. 9P.

While rotating indicator 906, the device generates sixth tactile output 936 (e.g., MicroTap (150 Hz), Gain max: 0.6, Gain min: 0.0) when end 903 passes over minor tick mark 908-1, corresponding to 12:30 AM, in FIG. 9P. FIG. 9Q shows lift-off of the contact, ending rotation of the indicator 906.

FIGS. 9R-9V illustrate an embodiment where the device suppresses a tactile output when triggered at the same time another tactile output is triggered. The Figures also illustrate an embodiment where the device generates a tactile output after a gesture ends, while the movable indicator continues to move with simulated inertia from the gesture.

FIG. 9R illustrates a sleep alarm set for a five-hour and thirty-minute sleep time, between 12:30 AM and 6:00 AM, as indicated by the position of moveable indicator 906 (first end 901 is positioned at minor tick mark 910-2, corresponding to 12:30 AM, and second end 903 is positioned at major tick mark 908-6, corresponding to 6:00 AM. In FIG. 9R, device 100 detects a drag gesture. The device rotates movable indicator 906 around slider control 902, in accordance with movement 940 of contact 938, in FIGS. 9R-9T.

While rotating indicator 906, the device generates sixth tactile output 942 (e.g., MicroTap (150 Hz), Gain max: 0.6, Gain min: 0.0) when first end 901 passes over minor tick mark 910-1 and second end passes over minor tick mark 910-18, in FIG. 9S. Because the first end and second end pass over tick marks at the same time, the device suppresses one of the tactile outputs that would have been generated. Both events would have generated the same type of tactile output because both ends were passing over minor tick marks. Both events would have generated the same type of tactile output with the same magnitude because both ends were passing over minor tick marks with the same speed. For example, tactile output 942 is a MicroTap (150 Hz) with a gain of 0.6. In some embodiments, not shown in FIG. 9S, the device superimposes the tactile outputs that would be generated for each end that is passing a tick mark, and generate a combined tactile output (e.g., with the same waveform and double the amplitude as that shown in FIG. 9S). In some embodiments, the device uses independent moveable masses to generate tactile outputs for each end that is passing a tick mark.

While continuing to rotate indicator 906, the device generates seventh tactile output 944 (e.g., MicroTap Medium (150 Hz), Gain max: 1.0, Gain min: 0.3) when first end 901 passes over major tick mark 908-12 and second end 903 passes over minor tick mark 910-17, in FIG. 9T. Because the first end and second end pass over tick marks at the same time, the device suppresses the tactile output that would have been generated by second end 903 passing over minor tick mark 910-17, in favor of generating the tactile output generated by first end 901 passing over major tick mark 908-12. Because the event caused by the first end 901 generates a bigger tactile output than the event caused by the second end 903, the tactile output generated by the event caused by the first end 901 takes priority over the other potential tactile output. For example, tactile output 942 is a MicroTap (150 Hz) with a gain of 0.9. In some embodiments, not shown in FIG. 9T, the device superimposes the tactile outputs that would be generated for each end that is passing a tick mark, and generate a combined tactile output (e.g., with the same waveform and higher amplitude than that shown in FIG. 9T). In some embodiments, the device uses independent moveable masses to generate tactile outputs for each end that is passing a tick mark.

FIG. 9T also illustrates lift-off of contact 938. However, movable indicator 906 continues to rotate around slider control 902 with simulated inertia 945.

While indicator 906 continues to rotate with simulated inertia 945, the device generates eighth tactile output 946 (e.g., MicroTap (150 Hz), Gain max: 0.6, Gain min: 0.0) when first end 901 passes over minor tick mark 910-35 and second end 903 passes over major tick mark 908-5, in FIG. 9U. Because the first end and second end pass over tick marks at the same time, and because second end 903 is passing over a higher priority tick mark than is first end 901, the device suppresses the tactile output that would have been generated by first end 901, in favor of generating the tactile output generated by second end 903 passing over major tick mark 908-5. FIG. 9V illustrates indicator 906 coming to rest over a time period spanning from 11:20 PM to 4:50 AM. No further tactile outputs are generated because the ends of the indicator are positioned between tick marks.

The tactile outputs, described above for FIGS. 9A-9V, provide feedback to the user that an end of the indicator has reached a predetermined value (e.g., time) on the circular slider control, e.g., every fifteen minutes. Greater tactile outputs are provided so that the user can distinguish a sub-set of predetermined values (e.g., times on the hour) from the larger set of predetermined values (e.g., fifteen-minute increments). This allows a user to more easily set a value (e.g., time or period of time) on the circular slider, by providing concurrent visual and haptic feedback, which enhances the overall feedback to the user and improves the operability of the slider control. Conversely, in some embodiments, tactile outputs are dampened or not provided, to avoid distracting the user. In addition, when the device detects touch input on a touch screen display, haptic feedback is also helpful to convey information to the user when the user's finger or stylus obscures a key portion of the user interface.

FIGS. 9A-9V display exemplary user interface 900 for a sleep timer, which includes clock 902. The clock includes a timer handle 906, having a first end 901 that defines a first (e.g., starting) time in a user-defined time period and a second end 903 that defines a second (e.g., ending) time in the user-defined time period; and a clock face 904, representing a continuous range of values (e.g., times from 12:00 to 11:59), including major tick marks 908-1 to 908-12 which correspond to a first set of predefined values in the continuous range of values (e.g., in hour increments, on the hour) and minor tick marks 910-1 to 910-36 which correspond to a second set of predefined values in the continuous range of values (e.g., 15 minute increments, off the hour).

Timer handle 906 corresponds to a user-defined timer period, as bound by first end 901 and second end 903. Timer handle 906 is movable (e.g., rotatable) around clock face 904, responsive to user input gestures initiated in the middle (e.g., not on the ends) of the handle, e.g., as illustrated in sets of FIGS. 9B-9E, 9K-9M, and 9R-9V. Timer handle 906 is contractible (e.g. as illustrated in series of FIGS. 9G-9J) and expandable (e.g., as illustrated in series of FIGS. 9O-9Q), responsive to user input gestures initiated on either end. While rotating, contracting, or expanding, device 100 generates tactile outputs when either end 901 and 903 passes over a tick mark on the face of the clock.

FIGS. 10A-10I illustrate example user interfaces for providing tactile outputs for an image picker slider while choosing an image from a plurality of images (e.g., choosing one or more images from a series of images taken in a burst mode of a digital camera).

Figure 10A:
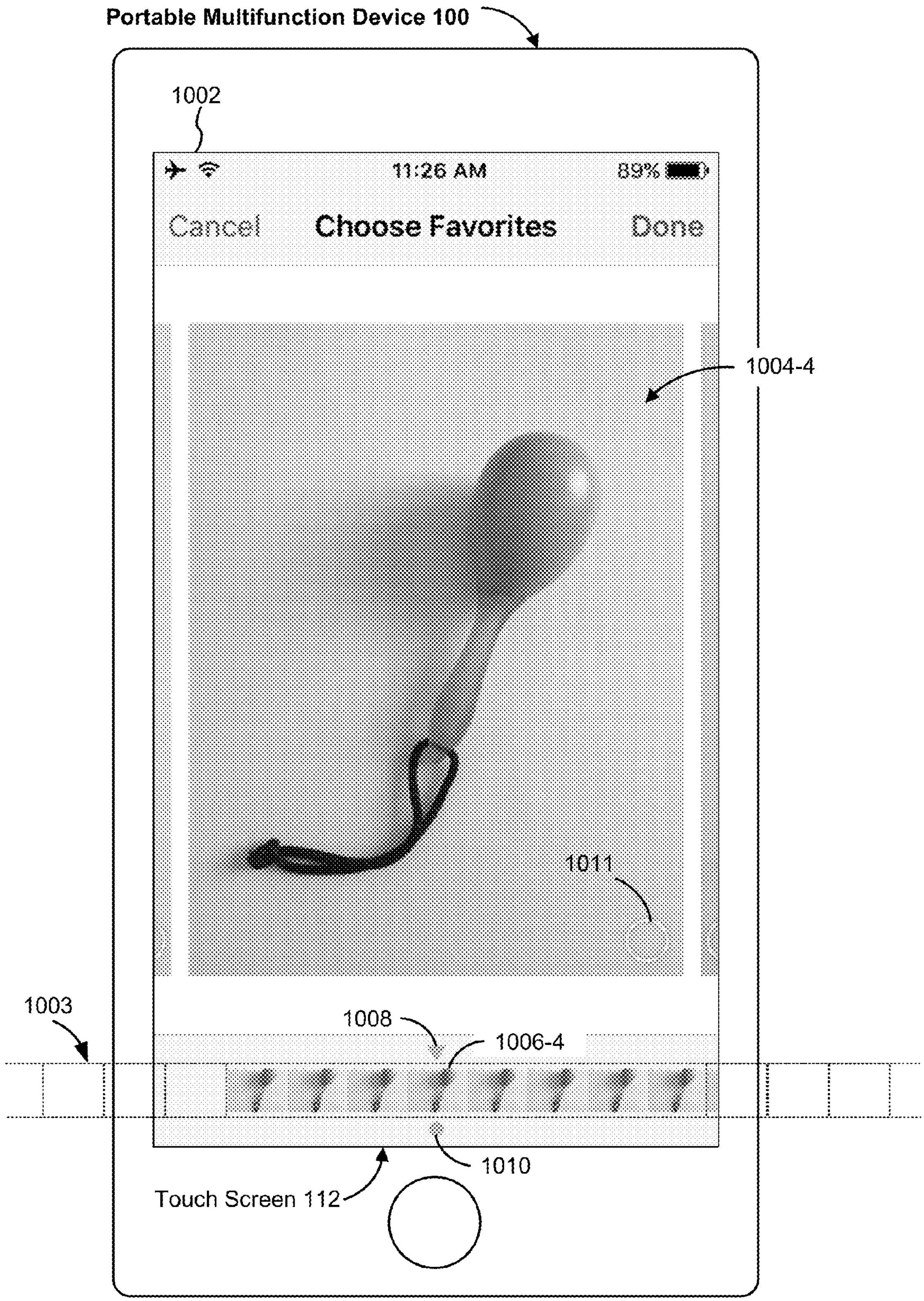
FIGS. 10A-10I illustrate exemplary user interfaces for providing haptic feedback for interaction with a slider control (e.g., a photo selector slider control) in accordance with some embodiments.

FIG. 10A displays a user interface 1002 that enables a user to manually choose one or more images from a sequence of images, which includes: an image slider 1003 that includes reduced-scale representations 1006 (e.g., thumbnail images) of a plurality of images 1004 in a sequence of images; a pointer 1008 that points to a given reduced scale representation (e.g., 1006-4) whose corresponding (larger) image (e.g., 1004-4) is being is displayed; a (larger) image 1004 that corresponds to the reduced-scale representation 1006 that pointer 1008 is currently pointing to; indicator 1010 that indicates an image that automatic analysis of the sequence of images (e.g., automatic analysis of sharpness, clarity, and/or motion blur) finds to be a better image in the sequence of images; a check box area 1011 for image 1004 that when activated (e.g., by a tap gesture) places a check or other mark to indicate that the user has chosen that image; a cancel icon that when activated (e.g., by a tap gesture) exits the image choosing mode without choosing any of the images in the sequence of images; and a done icon that when activated (e.g., by a tap gesture) exits the image choosing mode and displays an options menu that enables the user to pick whether the user wants to keep all of images in the sequence of images or just the user-chosen image(s).

In some embodiments, user interface 1002 is displayed in response to detecting an input (e.g., a tap gesture) on a selection icon that corresponds to the sequence of images 1004.

Figure 10B:
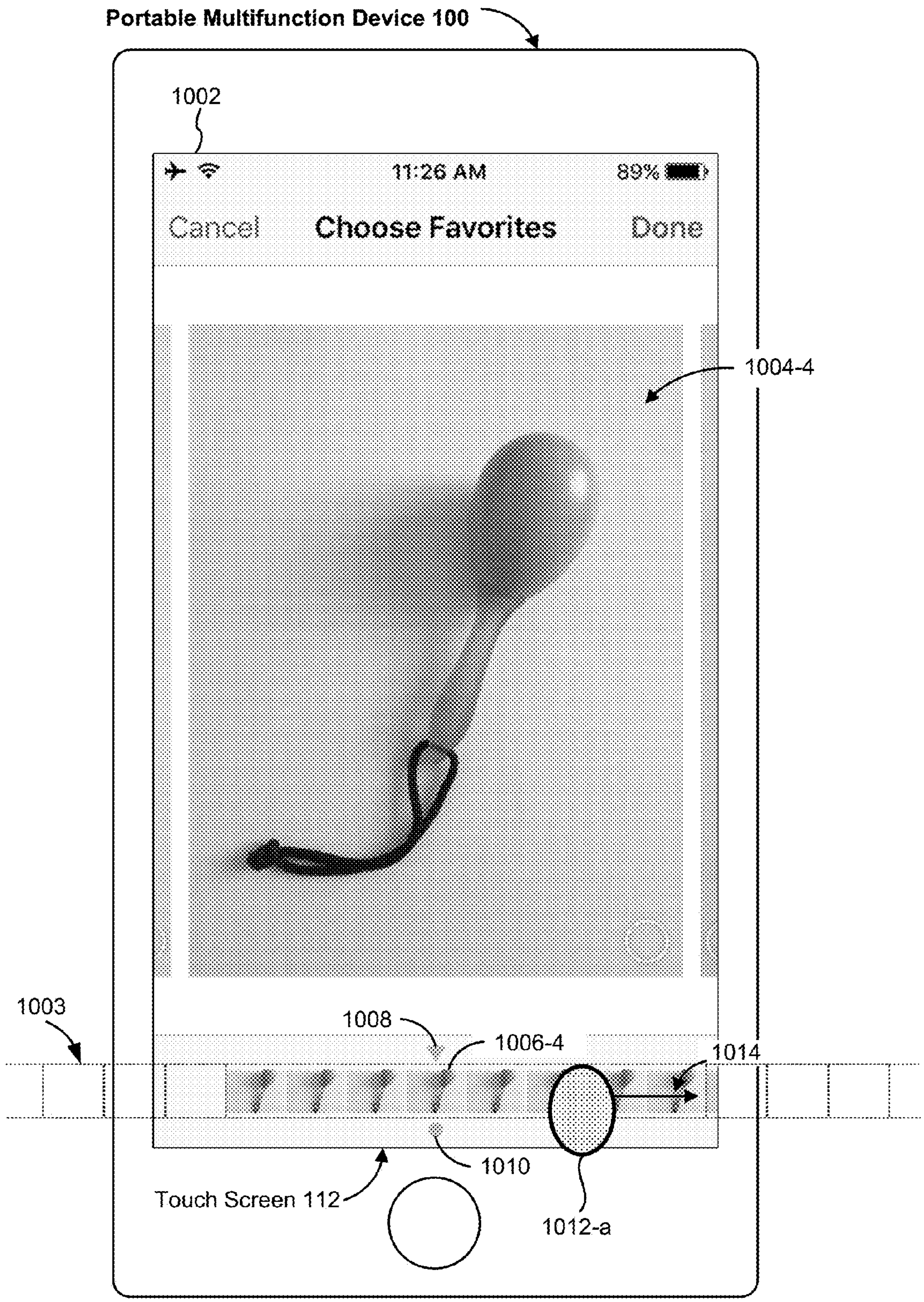
Figure 10C:
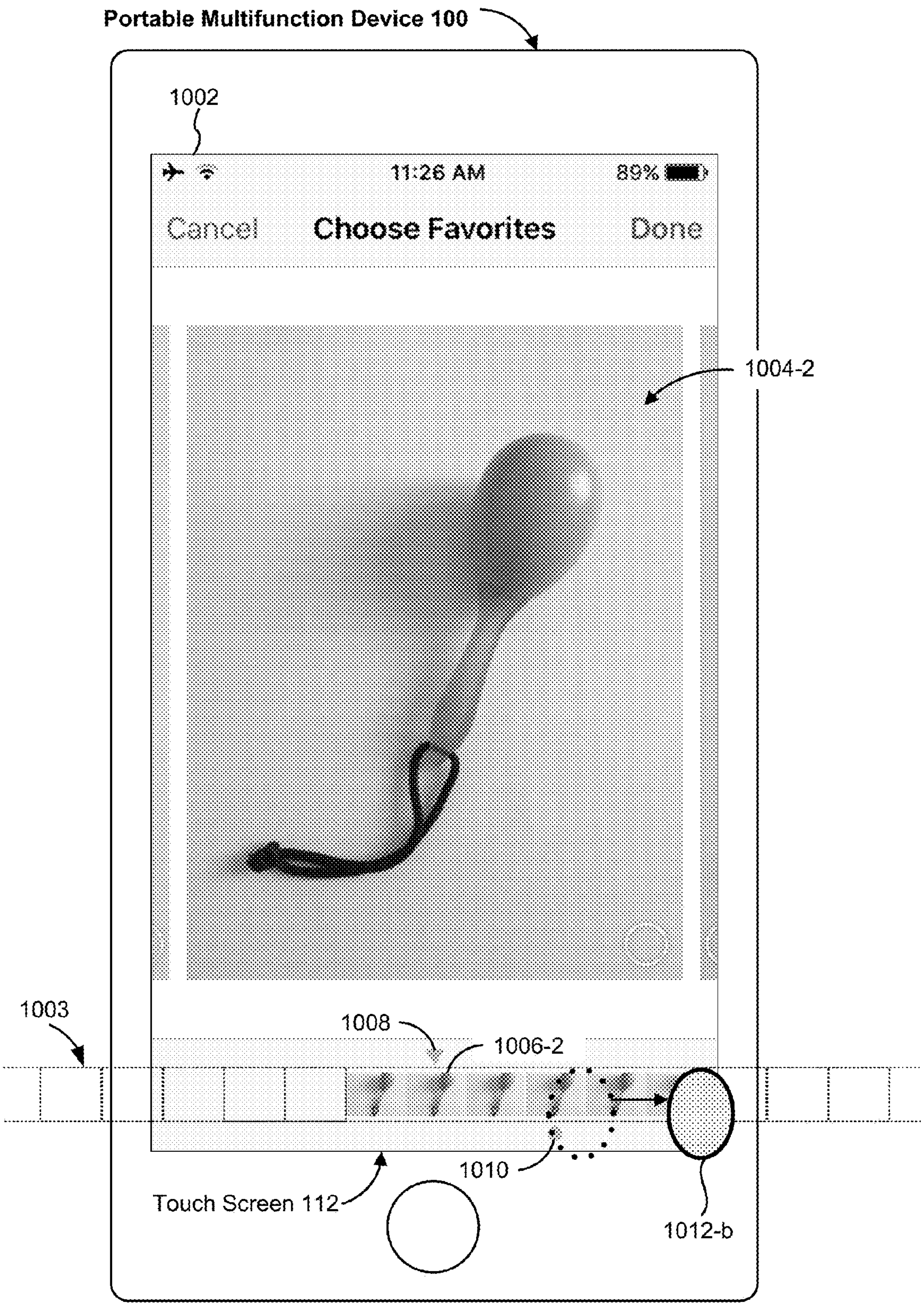

In FIGS. 10B-10C, the device detects an input on the image slider 1003, such as a drag, swipe, or flick gesture by contact 1012 with movement 1014, which horizontally scrolls the reduced-scale representations 1006 in the image slider 1003 rightward and concurrently changes the corresponding image 1004 that is displayed. For example, in FIG. 10B, the pointer 1008 points to reduced-scale representation 1006-4 and the corresponding (larger) image 1004-4 is displayed, whereas in FIG. 10C, the pointer 1008 points to reduced-scale representation 1006-2 and the corresponding (larger) image 1004-2 is displayed.

Figure 10D:
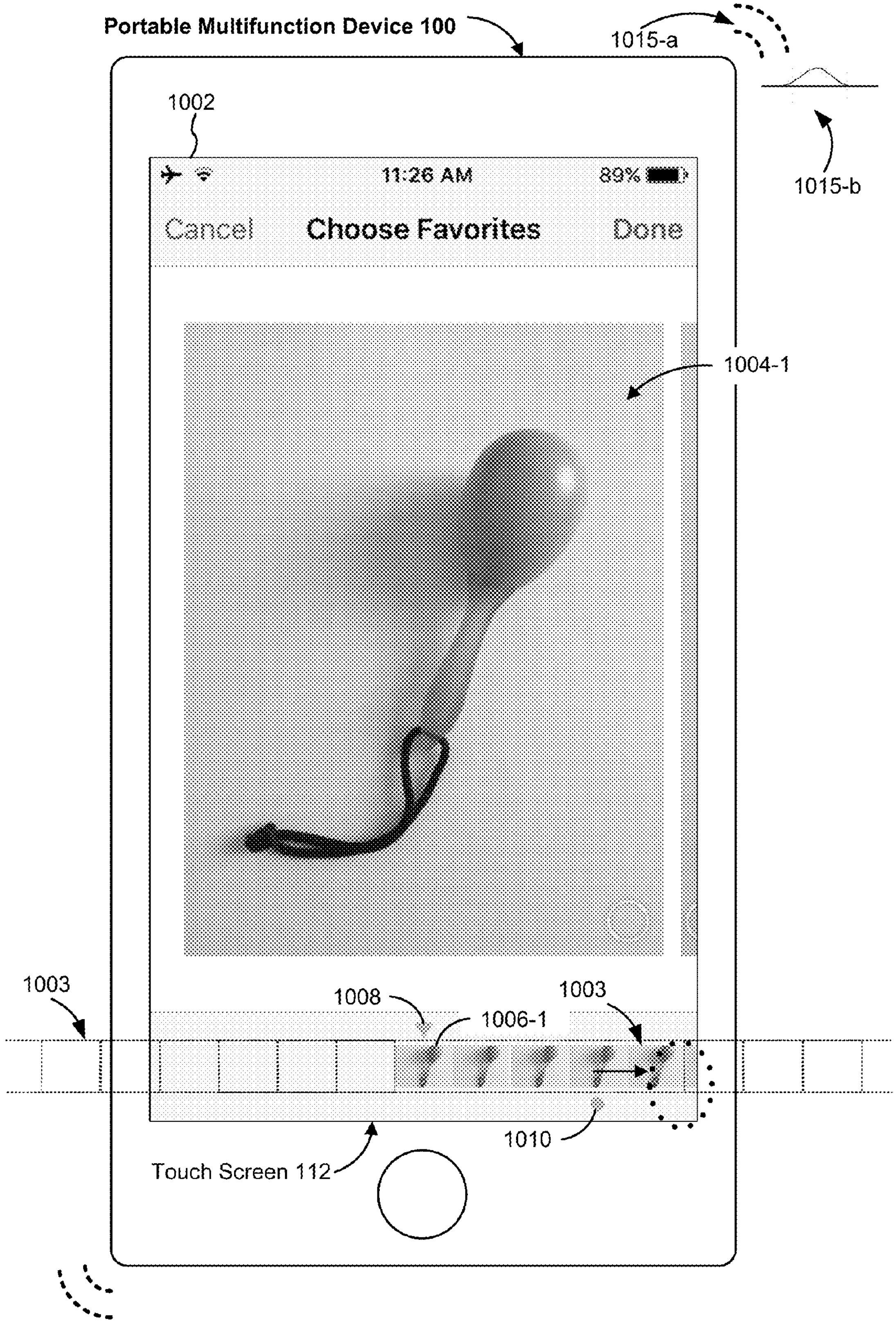

In FIG. 10D, the pointer 1008 points to a reduced-scale representation at a terminus of the image slider 1003, namely reduced-scale representation 1006-1 at the beginning of the image slider 1003, which triggers tactile output 1015 (e.g., MicroTap (150 Hz), Gain max: 0.8, Gain min: 0.0). The tactile output 1015 is optionally produced with a tactile output pattern that is based on the speed of the image slider 1003 when a reduced-scale representation at a terminus of the image slider 1003 reaches the pointer 1008. For example, as the speed of the image slider 1003 increases, the gain of the tactile output pattern increases. These tactile outputs provide feedback to the user that a terminus of the image slider has been reached, with greater tactile outputs being provided as faster, less precise inputs are used. Conversely, in some cases, tactile outputs are not provided, to avoid distracting the user, when the user is carefully adjusting the image slider 1003 with a drag gesture at a slower speed.

In some embodiments, the tactile output 1015 is triggered when the pointer 1008 is over the center of the reduced-scale representation 1006. In some embodiments, the tactile output 1015 is triggered when the pointer 1008 is over the right hand edge of the reduced-scale representation 1006. In some embodiments, the tactile output 1015 is triggered when the pointer 1008 is over the left hand edge of the reduced-scale representation 1006.

Figure 10E:
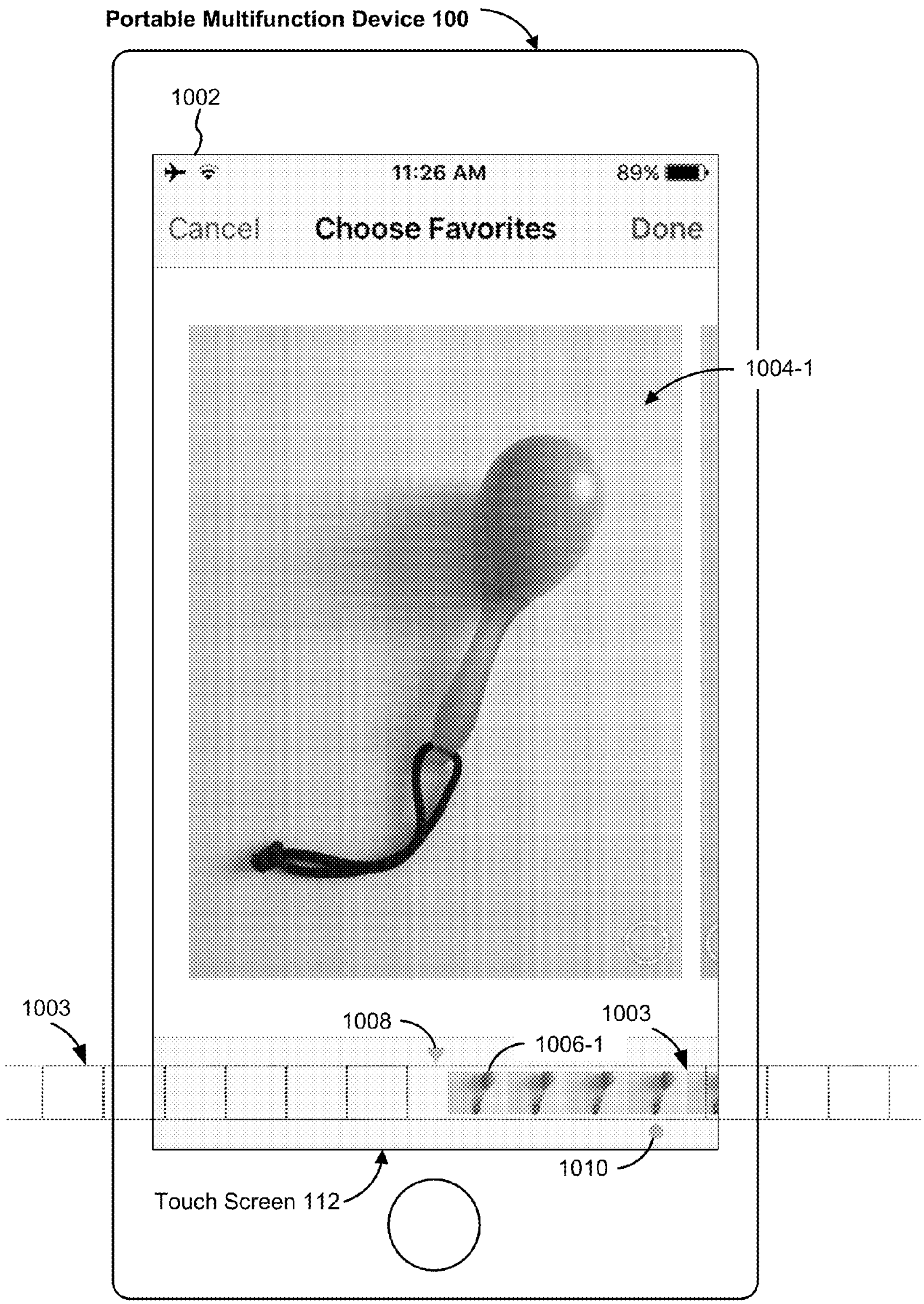
Figure 10F:
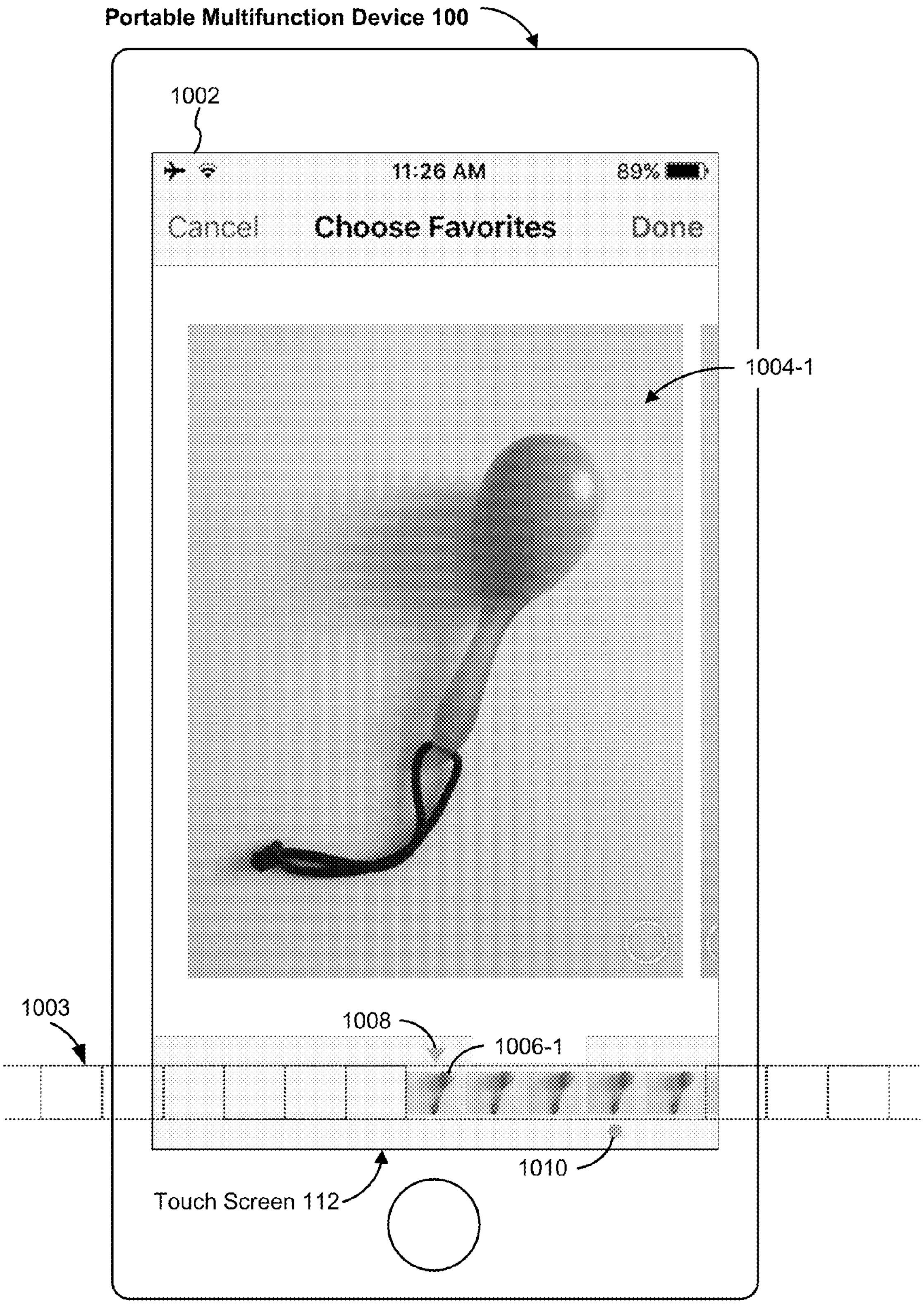

In some embodiments, visual feedback is also provided when a terminus of the image slider 1003 is reached, such as a “rubber band” effect. For example, in response to a fast input by contact 1012, the image slider 1003 continues to scroll horizontally rightward such that the pointer 1008 is no longer pointing to the reduced-scale representation 1006-1 at the terminus of the image slider 1003, as shown in FIG. 10E. Then, after scrolling horizontally rightward such that the pointer 1008 is no longer pointing to the reduced-scale representation 1006-1, the image slider 1003 scrolls horizontally leftward such that the pointer 1008 points to the reduced-scale representation 1006-1 at the terminus of the image slider 1003, as shown in FIG. 10F. Providing concurrent visual and haptic feedback enhances the overall feedback to the user that an end of the image slider has been reached and improves the operability of the image slider control.

Figure 10G:
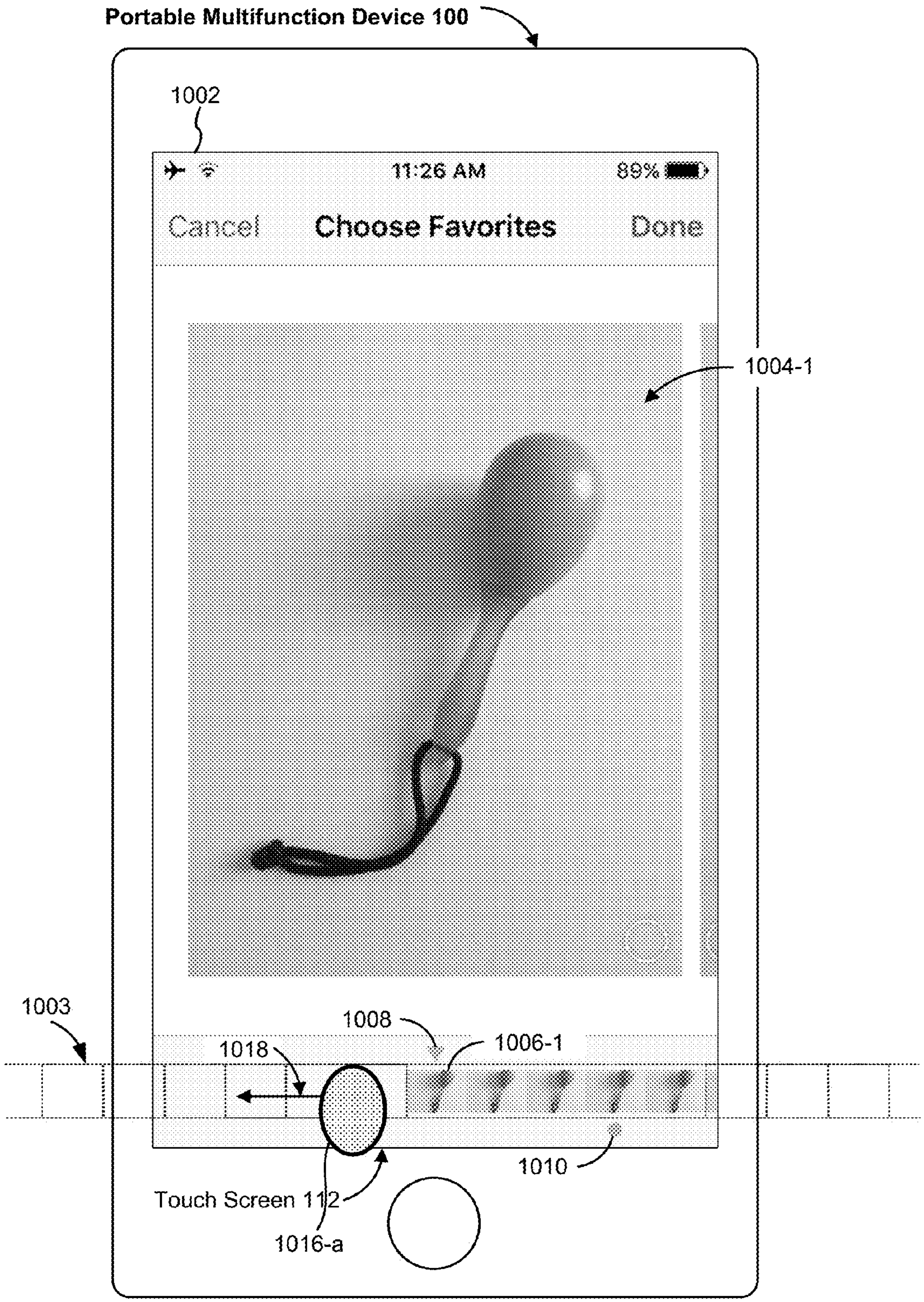
Figure 10H:
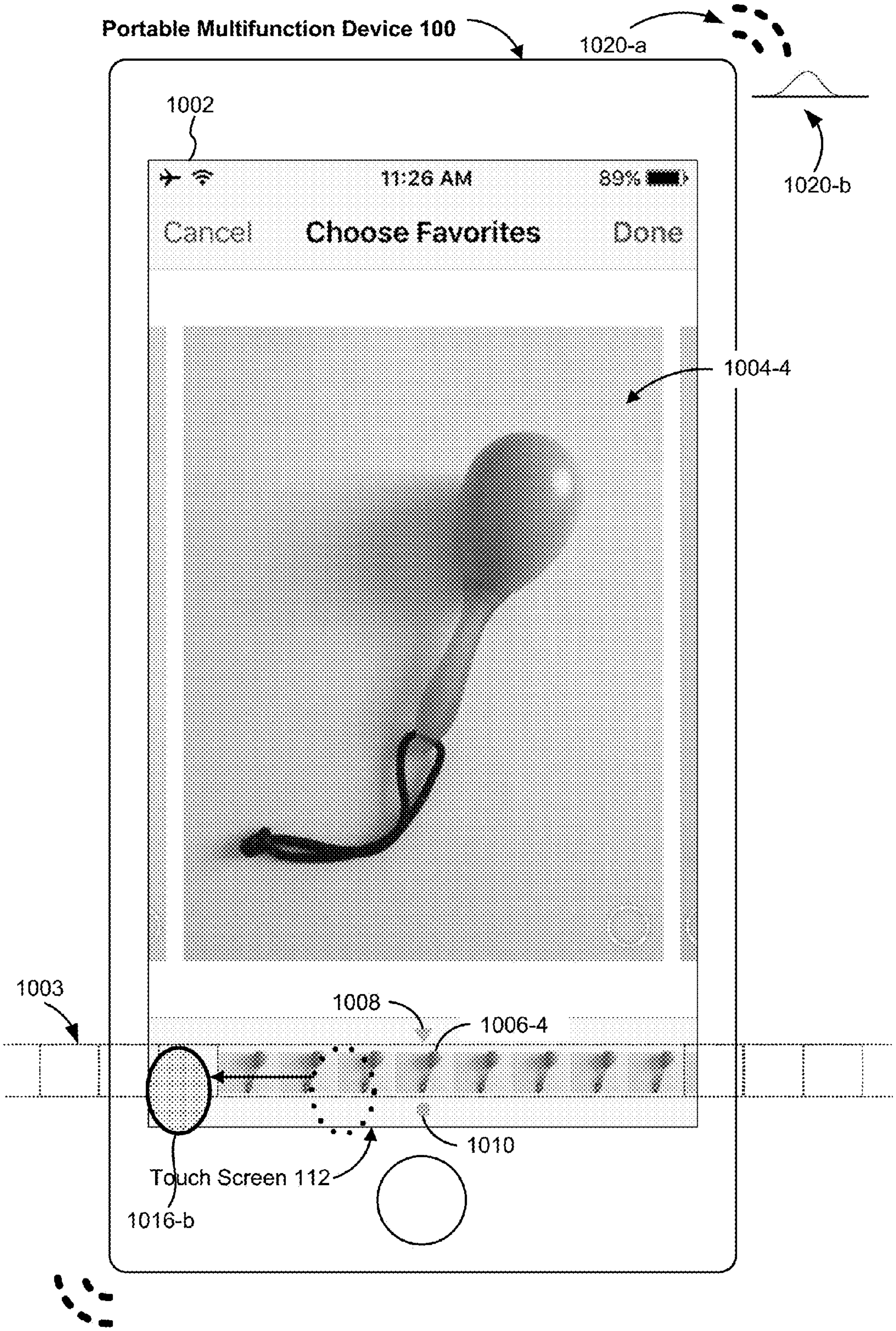

In FIGS. 10G-10H, the device detects an input on the image slider 1003, such as a drag, swipe, or flick gesture by contact 1016 with movement 1018, which horizontally scrolls the reduced-scale representations 1006 in the image slider 1003 leftward.

In FIG. 10H, the pointer 1008 points to reduced-scale representation 1006-4, whose corresponding (larger) image 1004-4 was originally displayed upon entering the image choosing mode (FIG. 10A), which triggers tactile output 1020 (e.g., MicroTap (150 Hz), Gain max: 0.8, Gain min: 0.0). The tactile output 1020 is optionally produced with a tactile output pattern that is based on the speed of the image slider 1003 when the reduced-scale representation 1006-4, whose corresponding (larger) image 1004-4 was originally displayed upon entering the image choosing mode, reaches the pointer 1008. For example, as the speed of the image slider 1003 increases, the gain of the tactile output pattern increases. For example, tactile output 1020 in FIG. 10H has a higher amplitude (e.g., with a gain of 0.8) than tactile output 1015 in FIG. 10D (e.g., with a gain factor of 0.6), since movement speed of the reduced-scale representations 1006 is higher in FIG. 10H than in FIG. 10D.

These tactile outputs provide feedback to the user that the image 1004 that was originally displayed upon entering the image choosing mode (e.g., 1004-4) is once again being displayed, with greater tactile outputs being provided as faster, less precise inputs are used. This feedback helps the user navigate through the sequence of images back to the originally displayed image. Conversely, in some cases, tactile outputs are not provided, to avoid distracting the user, when the user is carefully adjusting the image slider 1003 with a drag gesture at a slower speed.

Figure 10I:
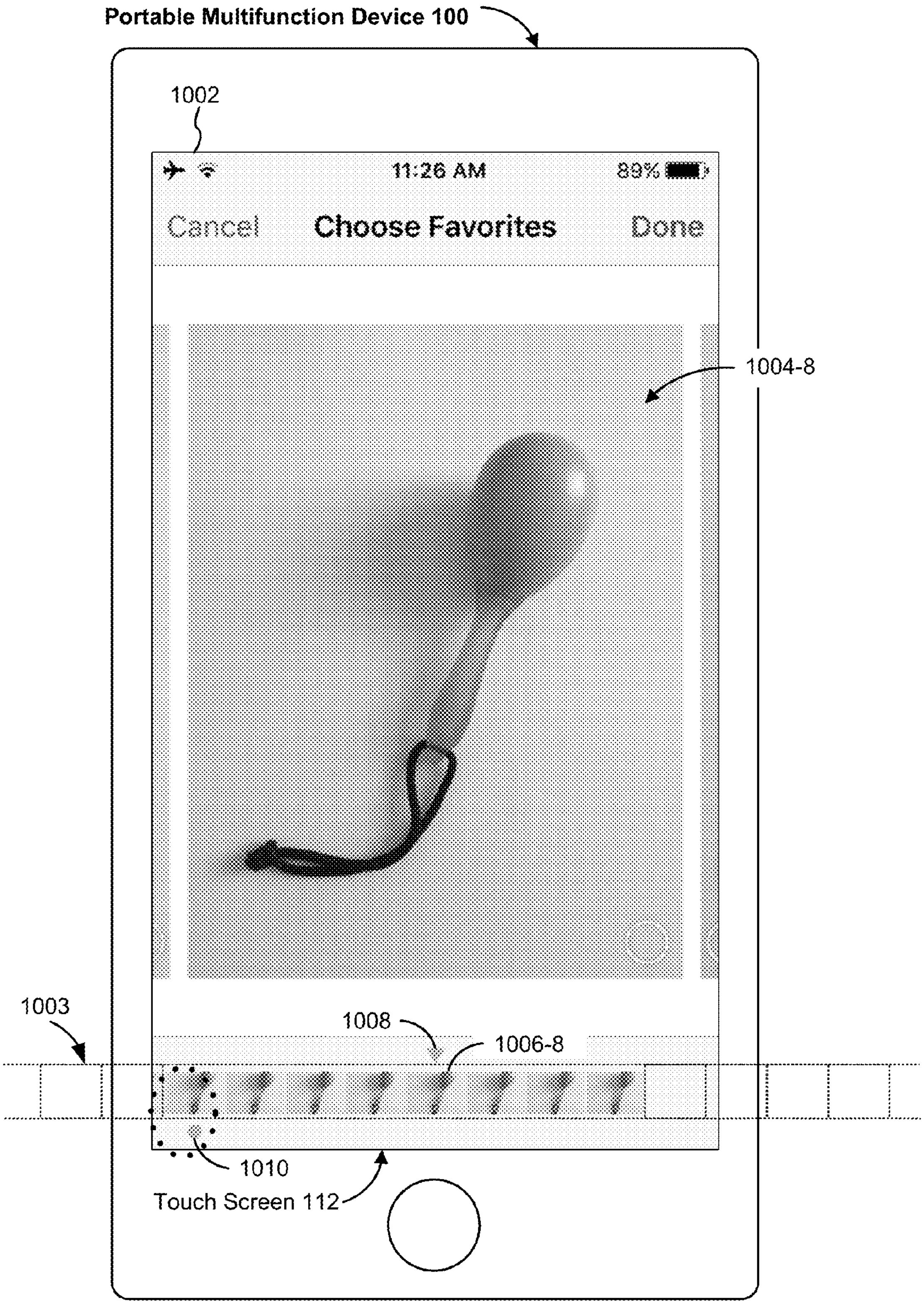

In FIG. 10I, the image slider continues to scroll horizontally leftward with simulated inertia after the input by contact 1016 ends, with corresponding changes to the displayed image 1004.

FIGS. 11A-11L, 12A-12O, and 13A-13L illustrate example user interfaces for providing tactile outputs with visual rubber band effects in accordance with some embodiments. The user interfaces in these figures are used to illustrate the processes described below, including the processes in FIGS. 28A-28E. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 11A-11E illustrate a rubber band effect applied to a list of items (e.g., a list of emails in a thread in an email application), with one or more tactile outputs.

Figure 11A:
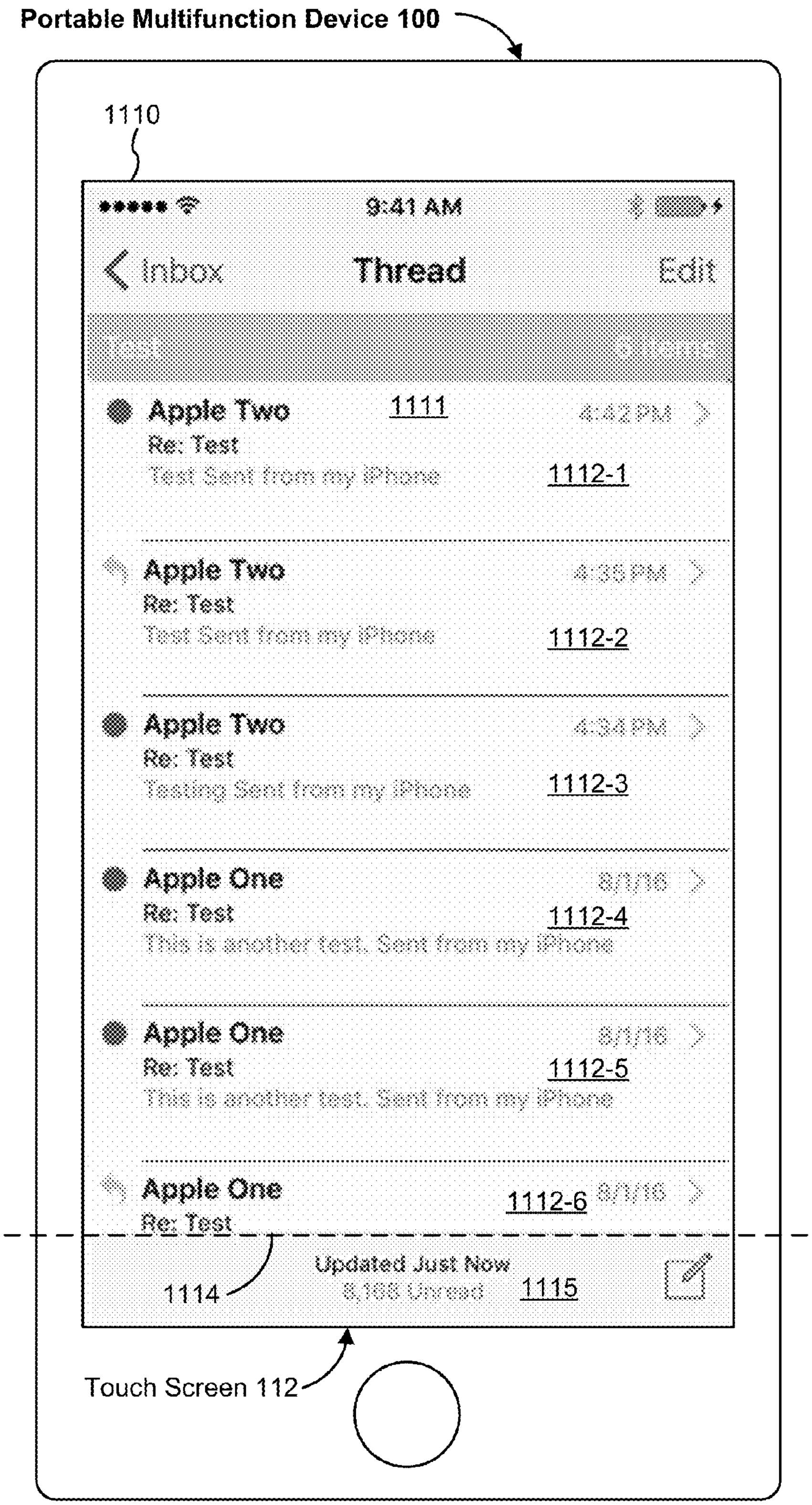
FIGS. 11A-11L illustrate exemplary user interfaces for providing haptic feedback in conjunction with visual rubber band effect (e.g., in a list user interface) in accordance with some embodiments.

FIG. 11A displays a user interface 1110 that includes: a list 1111 of emails 1112; a region 1115 adjacent to the list 1111 (e.g., which includes information about emails "Updated Just Now 8,168 Unread" and an icon that when activated (e.g., by a tap gesture) displays a user interface for preparing a new email); and a threshold position at the top edge of region 1115 (e.g., dashed line 1114, which is typically not displayed as a separate user interface element).

Figure 11B:
Figure 11C:
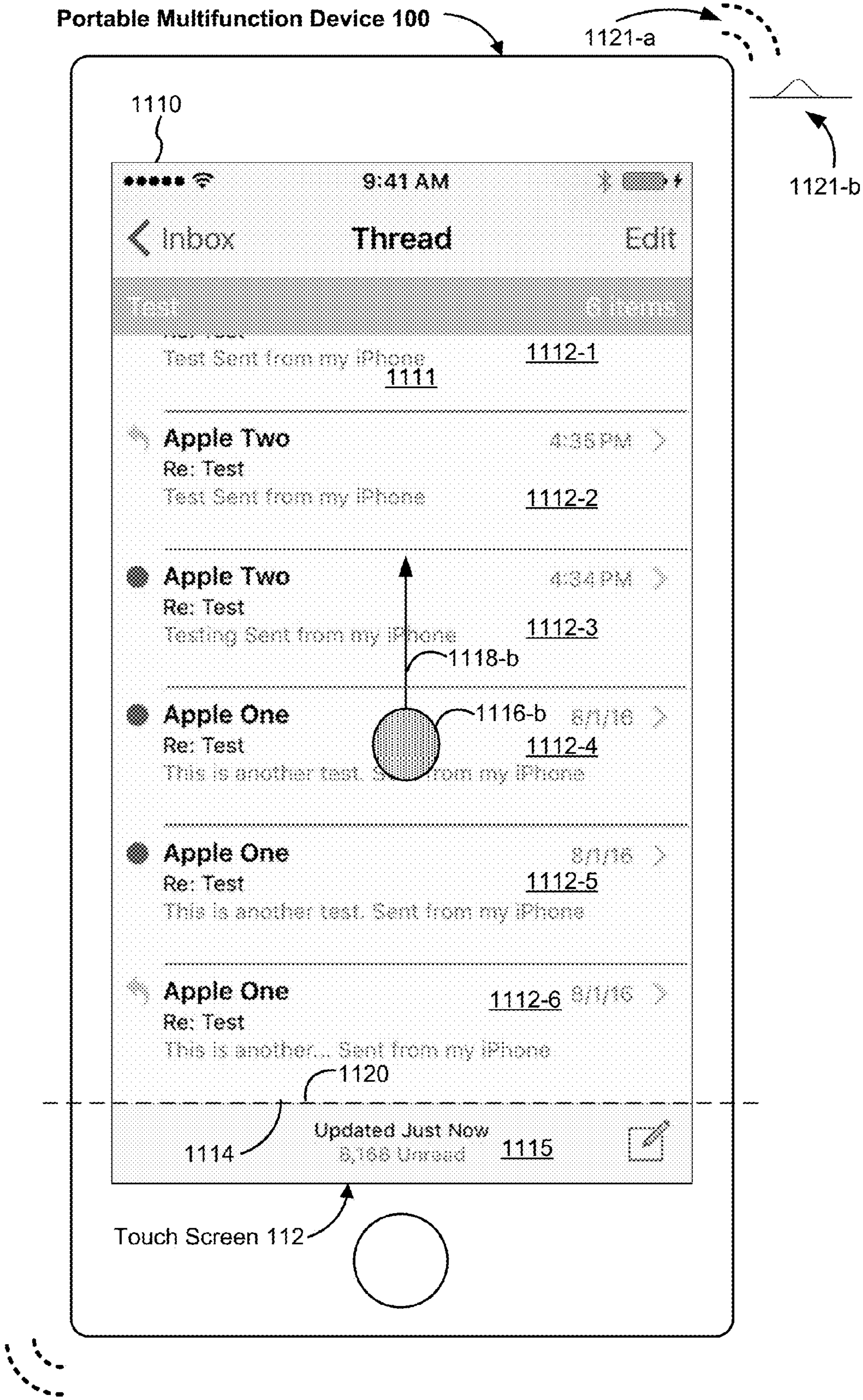
Figure 11D:

In FIGS. 11B-11D, the device detects an input on list 1111, namely a drag gesture by contact 1116 with movement 1118, which scrolls the list 1111 of emails 1112 upward in accordance with the movement of contact 1116.

In FIG. 11C, an outer edge 1120 of the list 1111 of emails (which corresponds to the bottom edge of email 1112-6) is at the threshold position 1114. In some embodiments, tactile output 1121 (e.g., MicroTap (270 Hz), Gain: 0.6) is triggered when the outer edge 1120 crosses the threshold position 1114. This tactile output 1121 provides feedback to the user that an end of the list has been reached.

In some embodiments, a characteristic of tactile output 1121 (e.g., an amplitude, duration, frequency, and/or waveform of a tactile output pattern that makes up the tactile output and/or audio that accompanies the tactile output) is configured based on a characteristic speed of the input (e.g., an average speed of the contact) at a time when the outer edge 1120 of the list 1111 moves across the threshold position 1114 in the user interface 1110. For example, a greater gain of the tactile output is used for a greater speed of the contact when the outer edge 1120 crosses threshold position 1114, which helps make the haptic feedback apparent to the user when faster inputs are made.

In some embodiments, a characteristic of tactile output 1121 (e.g., an amplitude, duration, frequency, and/or waveform of a tactile output pattern that makes up the tactile output and/or audio that accompanies the tactile output) is configured based on a characteristic speed of a relevant user interface element (e.g., an average speed of the edge 1120) at a time when the outer edge 1120 of the list 1111 moves across the threshold position 1114 in the user interface 1110. For example, a greater gain of the tactile output is used for a greater speed of the edge 1120 when the outer edge 1120 crosses threshold position 1114, which helps make the haptic feedback apparent to the user when faster inputs are made.

Figure 11E:
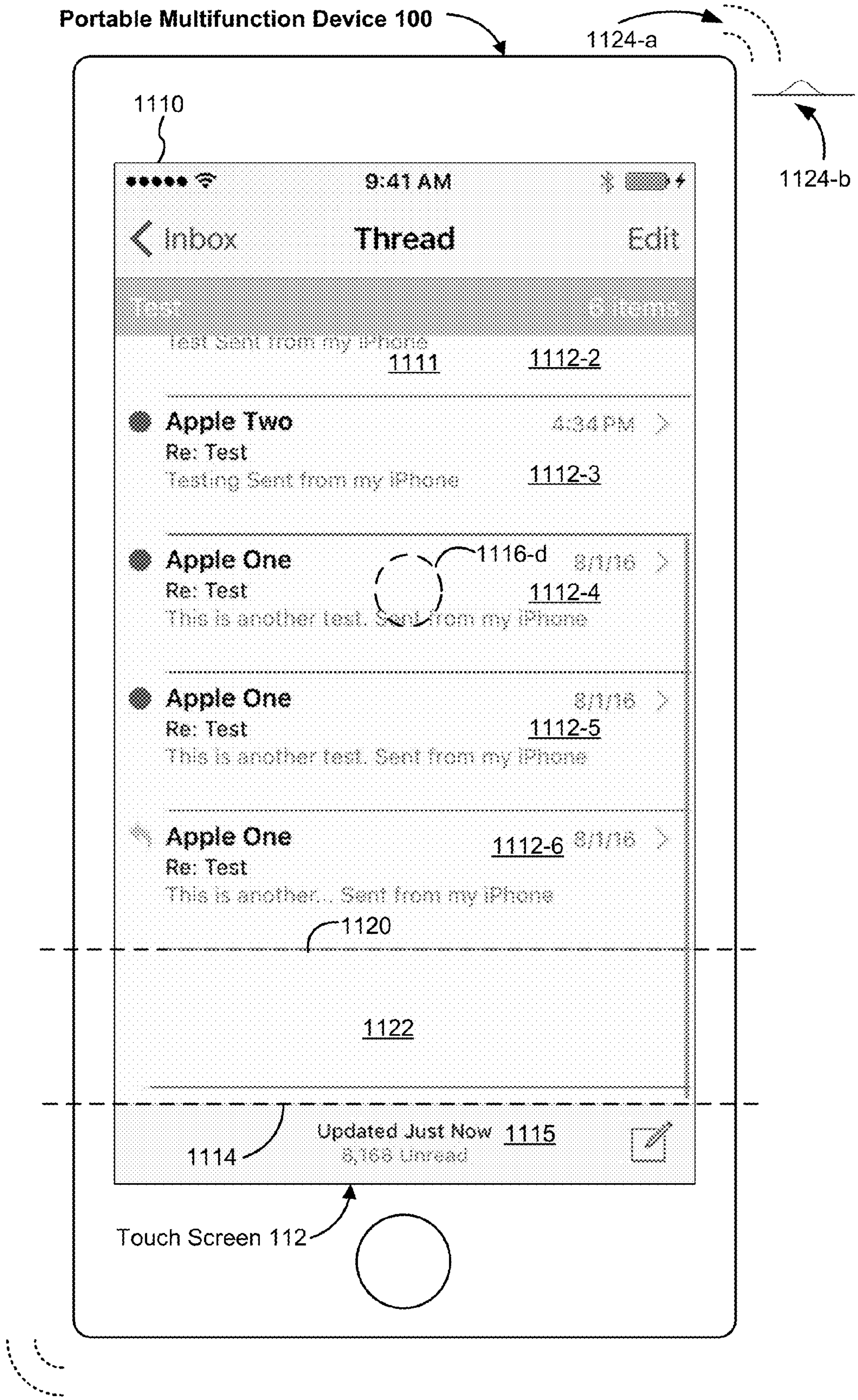

In FIGS. 11D-11E, an area 1122 is displayed and expands between the outer edge 1120 of list 1111 and the threshold position 1114 as the list 1111 continues to move upwards in accordance with the movement 1118-*c* of contact 1116-*c*.

In FIG. 11E, the device detects termination of the contact (e.g., lift-off of contact 1116-*d*). In some embodiments, tactile output 1124 (e.g., MicroTap (270 Hz), Gain: 0.3) is triggered when the device detects termination of the contact. In some embodiments, a characteristic of the tactile output 1124 (e.g., an amplitude, duration, frequency, and/or waveform of a tactile output pattern that makes up the tactile output and/or audio that accompanies the tactile output) is configured based on an extent by which the outer edge 1120 of the list 1111 has moved beyond the threshold position 1114 in the user interface (e.g., at the time when termination of the input is detected). For example, a greater gain of the tactile output is used for a greater extent by which the outer edge 1120 of the list 1111 has moved beyond the threshold position 1114, which makes the haptic feedback increase as the visual rubber band effect feedback increases.

Figure 11F:
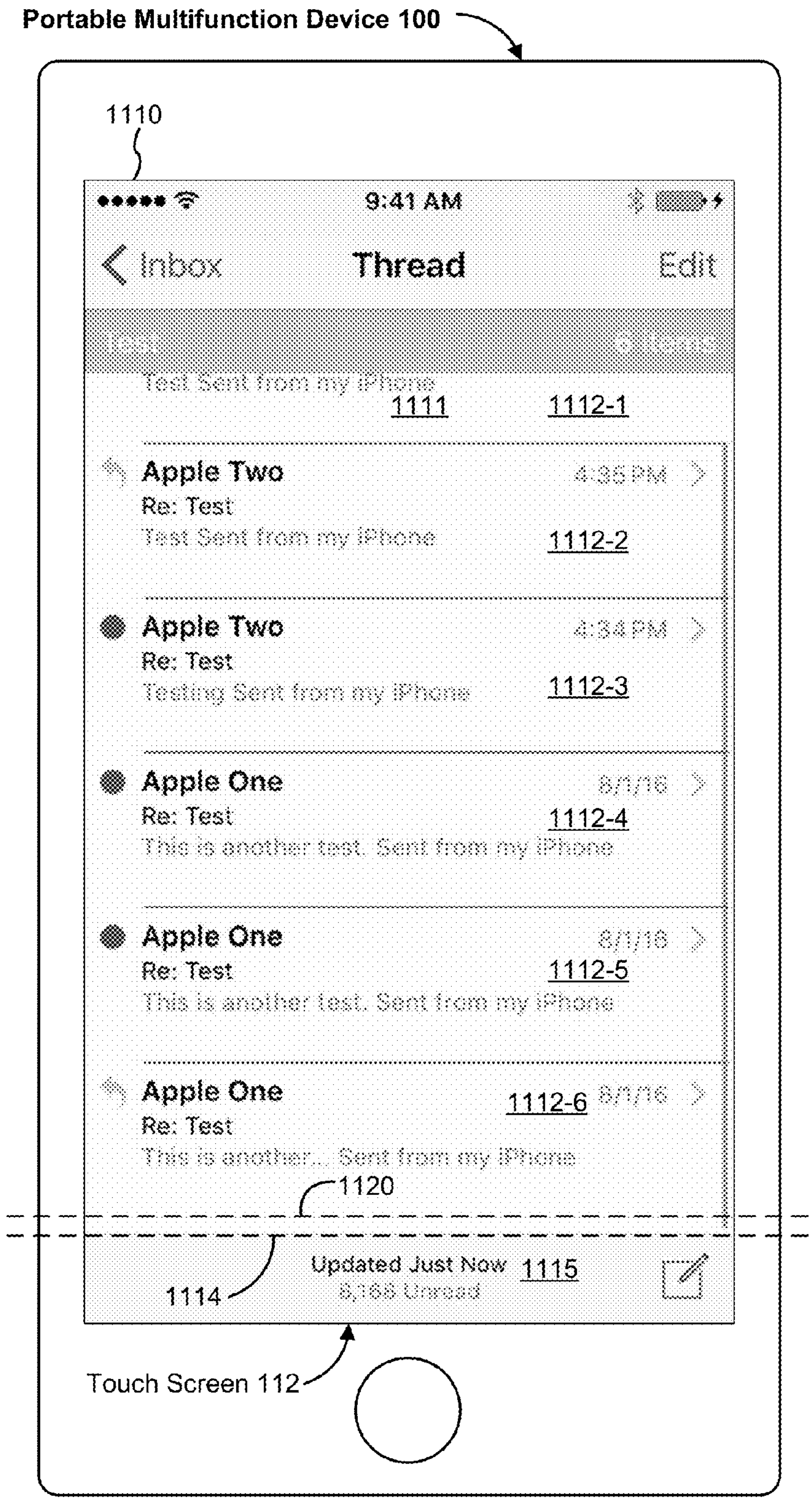
Figure 11G:
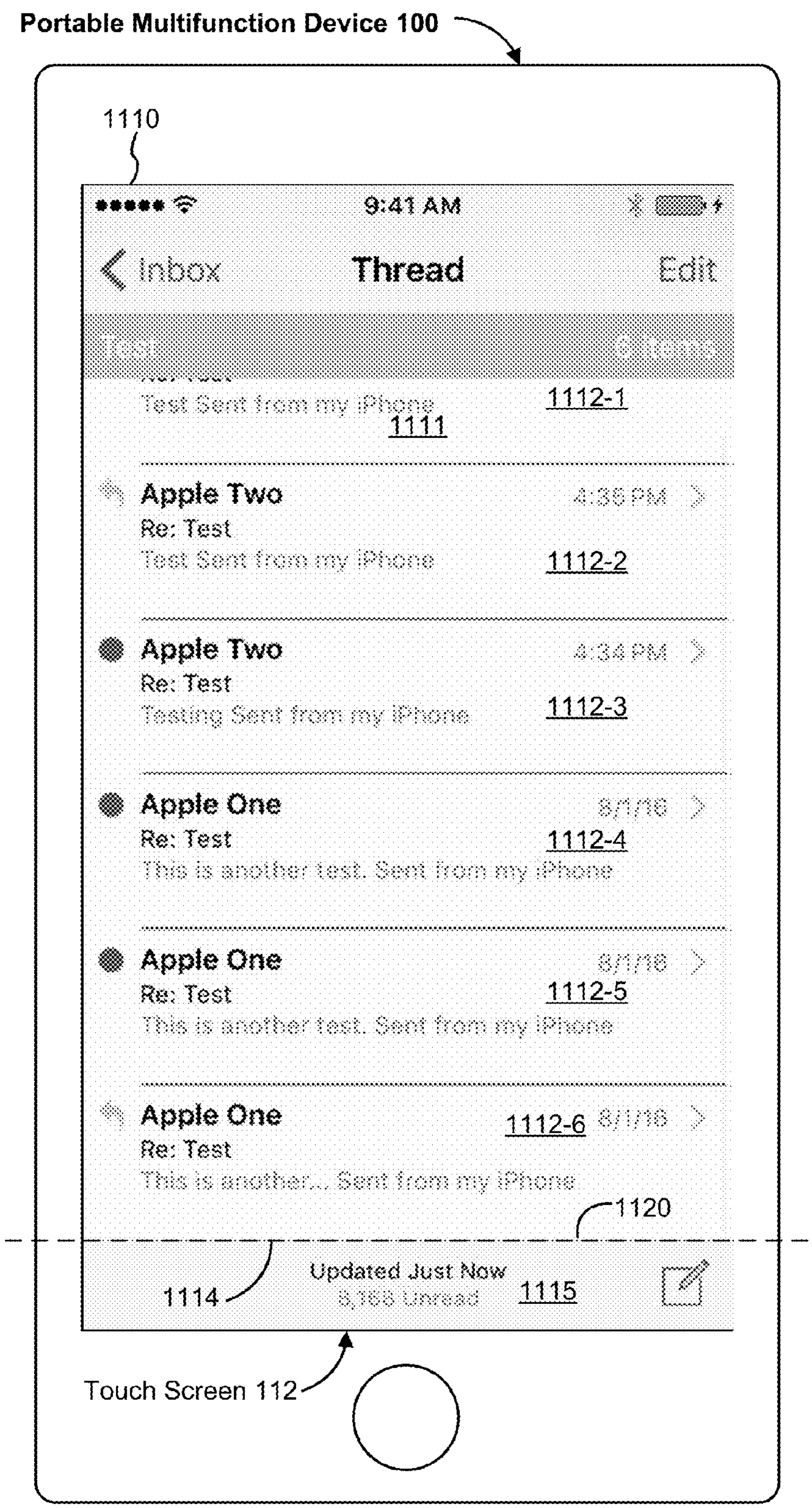

In response to detecting termination of the contact 1116-*d* (FIG. 11E), the device scrolls the list 1111 downward until the outer edge 1120 of the list returns to the threshold position 1114, as shown in FIGS. 11F-11G.

As shown in FIGS. 11D-11G, the display of the area 1122 beyond the outer edge 1120 of the list as the list continues to scroll in a first direction (e.g., upwards) in accordance with the movement 1118 of the contact 1116 (e.g., as shown in FIGS. 11D-11E), followed by, in response to detecting termination of the contact, scrolling the list in the opposite direction (e.g., downwards) until the area 1122 ceases to be displayed (e.g., as shown in FIGS. 11E-11G) is one example of a rubber band effect.

Tactile output 1124 reinforces the visual feedback to the user that a rubber band effect is being applied, which automatically displays as much of the bottom portion of the list as possible after lift-off, after showing the user that the bottom edge of the list is being viewed. Providing concurrent visual and haptic feedback enhances the overall feedback to the user that the end of the list has been reached and improves the efficiency of the scrolling process. In some embodiments, only one of tactile output 1121 and tactile output 1124 is produced, to avoid providing excessive haptic feedback.

Figure 11H:
Figure 11I:
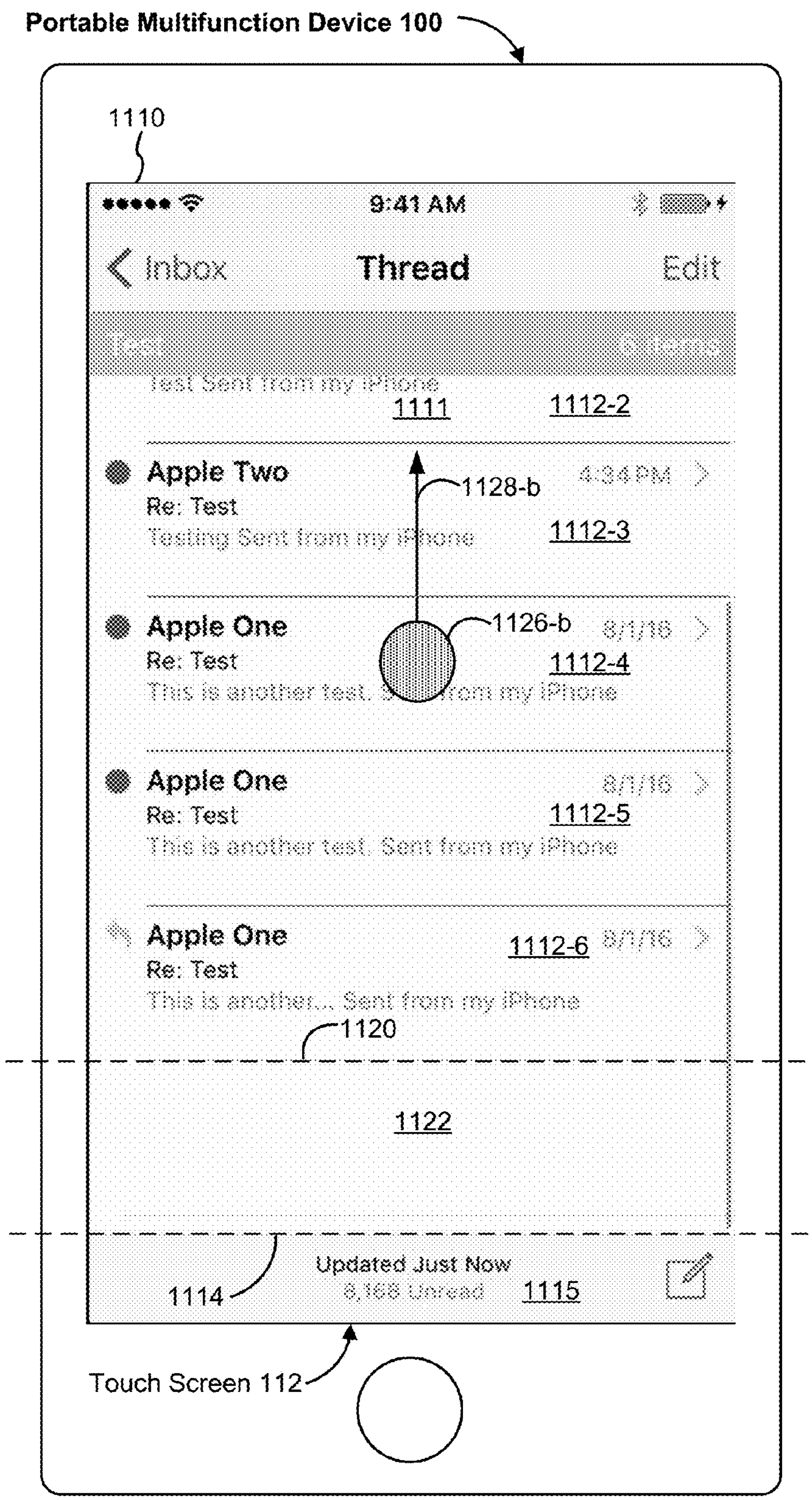

In FIGS. 11H-11I, the device detects another input on list 1111, namely a drag gesture by contact 1126 with movement 1128, which scrolls the list 1111 of emails 1112 upward in accordance with the movement of contact 1126. No tactile output is generated when the edge 1120 of list 1111 passes the threshold position 1114, because the input did not cause any scrolling of the list before the edge 1120 passes the threshold position 1114.

Figure 11J:
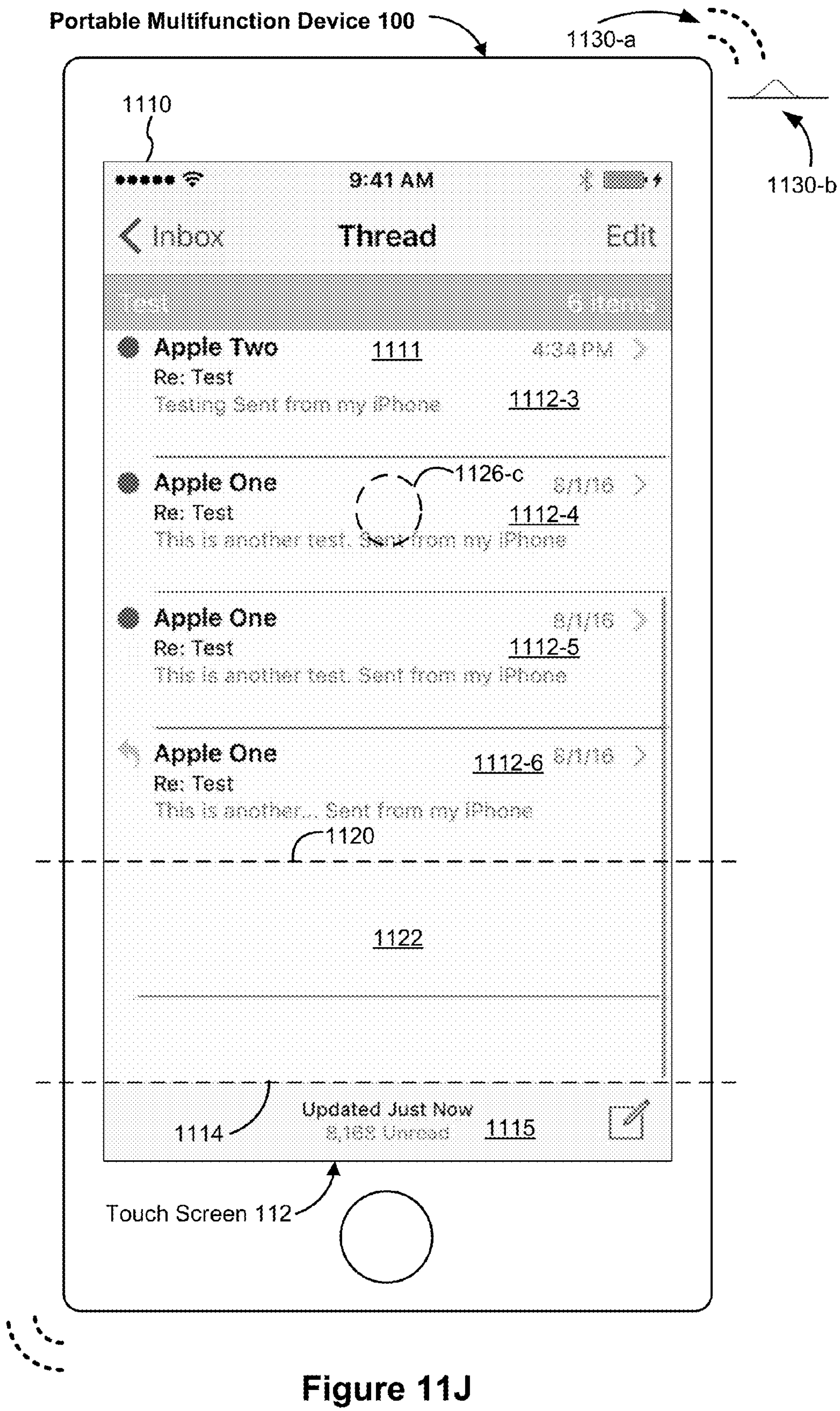

In FIGS. 11H-11J, area 1122 is displayed and expands between the outer edge 1120 of list 1111 and the threshold position 1114 as the list 1111 continues to move upwards in accordance with the movement 1128-*b* of contact 1126-*b*.

In FIG. 11J, the device detects termination of the contact (e.g., lift-off of contact 1126-*c*). In some embodiments, tactile output 1130 (e.g., MicroTap (270 Hz), Gain: 0.6) is triggered when the device detects termination of the contact.

In some embodiments, a characteristic of the tactile output 1130 (e.g., an amplitude, duration, frequency, and/or waveform of a tactile output pattern that makes up the tactile output and/or audio that accompanies the tactile output) is different from a corresponding characteristic of the tactile output 1124 because of the extent by which the outer edge 1120 of the list 1111 has moved beyond the threshold position 1114 at the time when termination of the input is detected is greater for the input by contact 1126 than for the input by contact 1116. For example, the gain of the tactile output increases as the extent by which the outer edge 1120 of the list 1111 has moved beyond the threshold position 1114 increases. In such cases, tactile output 1130 (e.g., a gain of 0.6 in FIG. 11J) would have greater gain than tactile output 1124 (e.g., a gain of 0.3 in FIG. 11E) because the input by contact 1126 moved the outer edge 1120 beyond the threshold position 1114 by a greater amount than the input by contact 1116 (as indicated by the greater area 1122 in FIG. 11J as compared to FIG. 11E).

Figure 11K:
Figure 11L:
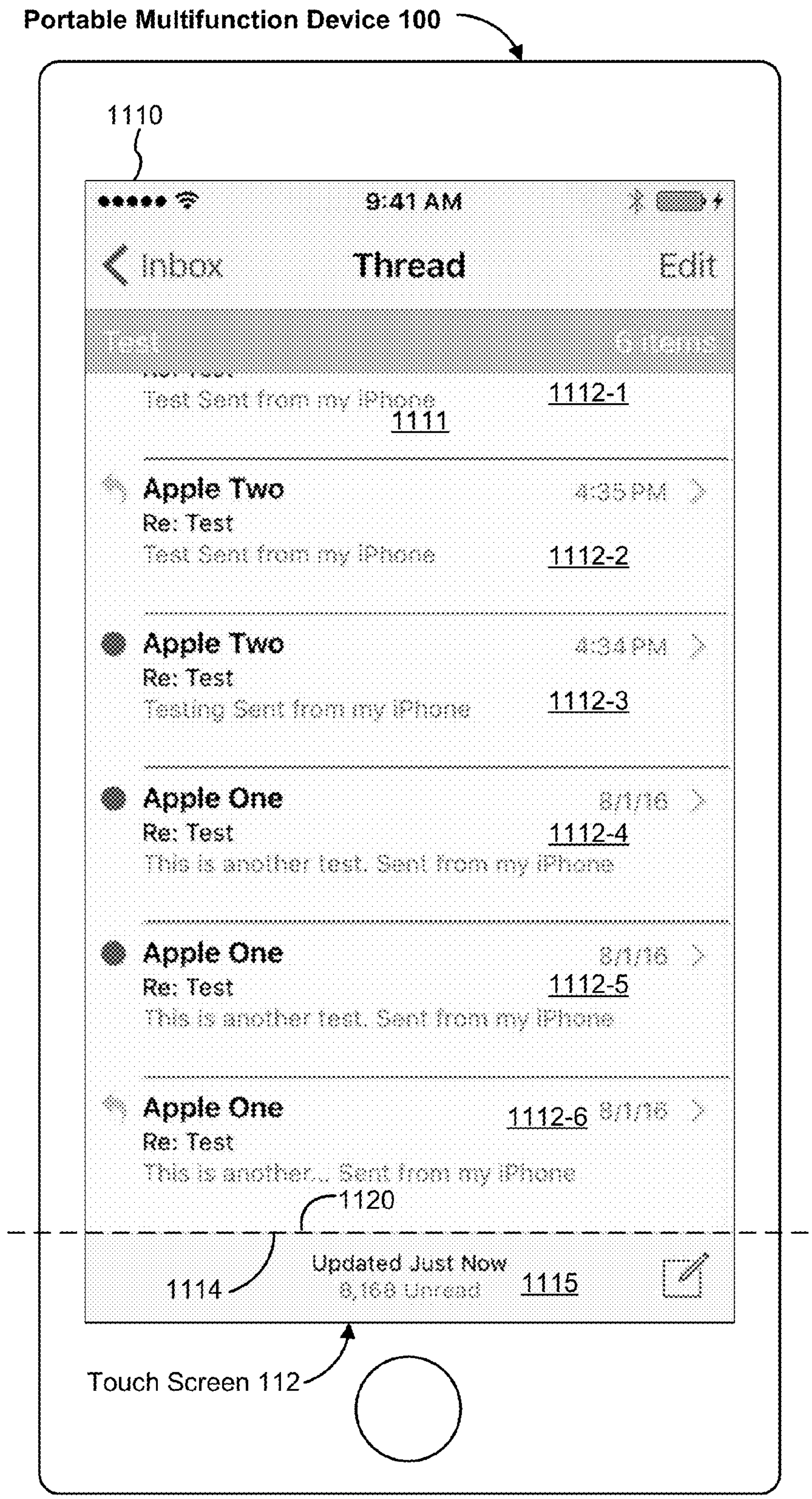

In response to detecting termination of the contact 1126-*c* (FIG. 11J), the device scrolls the list 1111 downward until the outer edge 1120 of the list returns to the threshold position 1114, as shown in FIGS. 11K-11L.

In some embodiments, a tactile output is generated upon starting to move the position of the outer edge of the list 1111 back towards the threshold position 1114 (e.g., when the list 1111 starts to bounce back, the device generates a tactile output indicating that the list 1111 has started to bounce back). This tactile output upon starting to bounce back is optionally in place of or in addition to tactile output 1121 (which starts upon outer edge 1120 crossing threshold 1114) and/or tactile output 1124 (which starts upon detecting termination of the input).

FIGS. 12A-12F illustrate a rubber band effect applied to a digital image (e.g., a screen capture of a MacBook advertisement) after a zoom-out operation, with one or more tactile outputs.

Figure 12A:
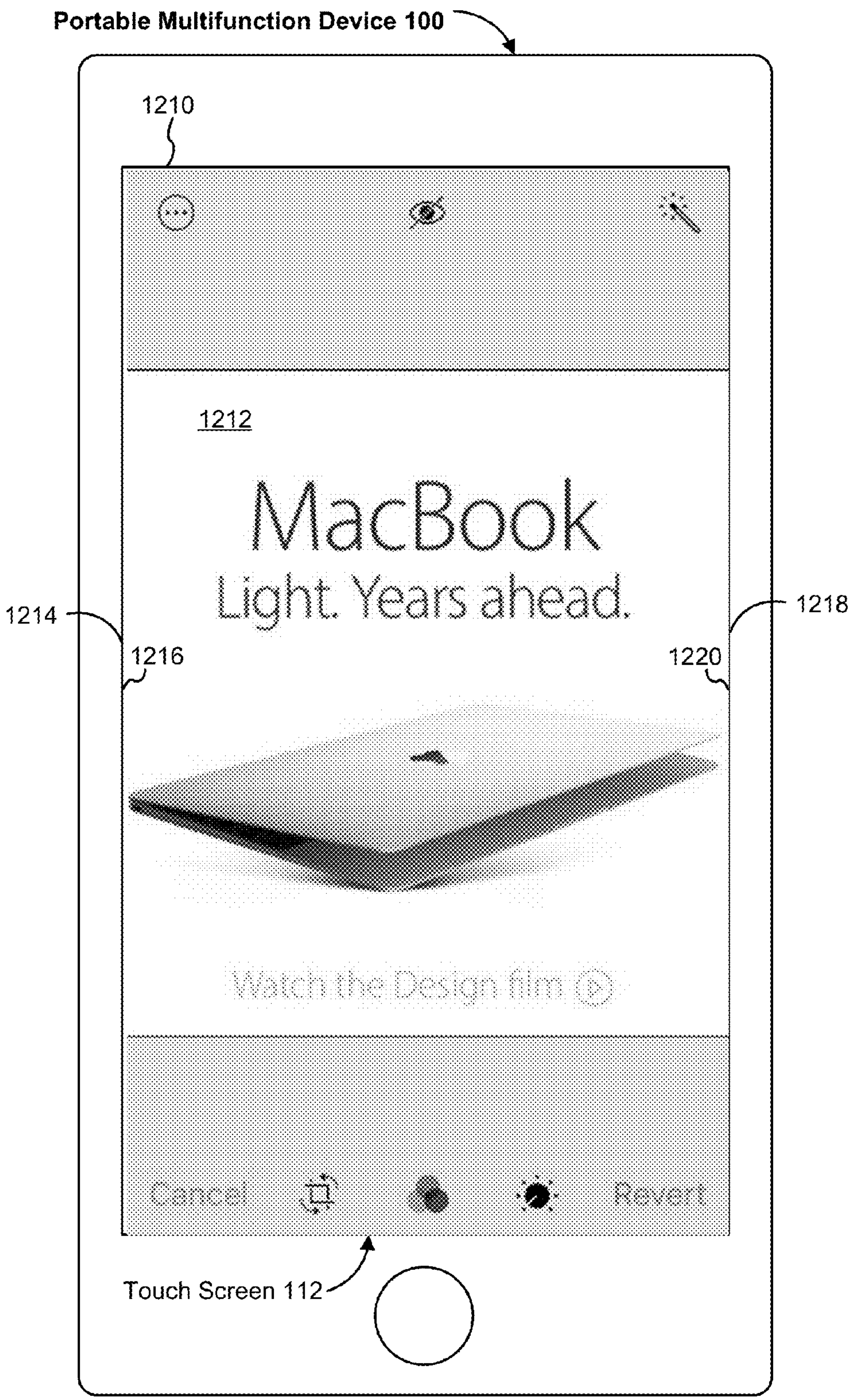
FIGS. 12A-12O illustrate exemplary user interfaces for providing haptic feedback in conjunction with visual rubber band effect (e.g., in a photo editor user interface) in accordance with some embodiments.

FIG. 12A displays a user interface 1210 for editing a digital image that includes: a digital image 1212 displayed at a first size such that the width of the image matches the width of the user interface, with the left edge 1216 of image 1212 at a threshold position 1214 in the user interface (e.g., the left edge of user interface 1210) and with the right edge 1220 of image 1212 at a threshold position 1218 in the user interface (e.g., the right edge of user interface 1210); and affordances that when activated (e.g., by a tap gesture) enable various image editing functions, such as red-eye removal, auto-enhance, crop/rotate, filter, adjustments to light, color, and black & white, revert, and cancel.

Figure 12B:
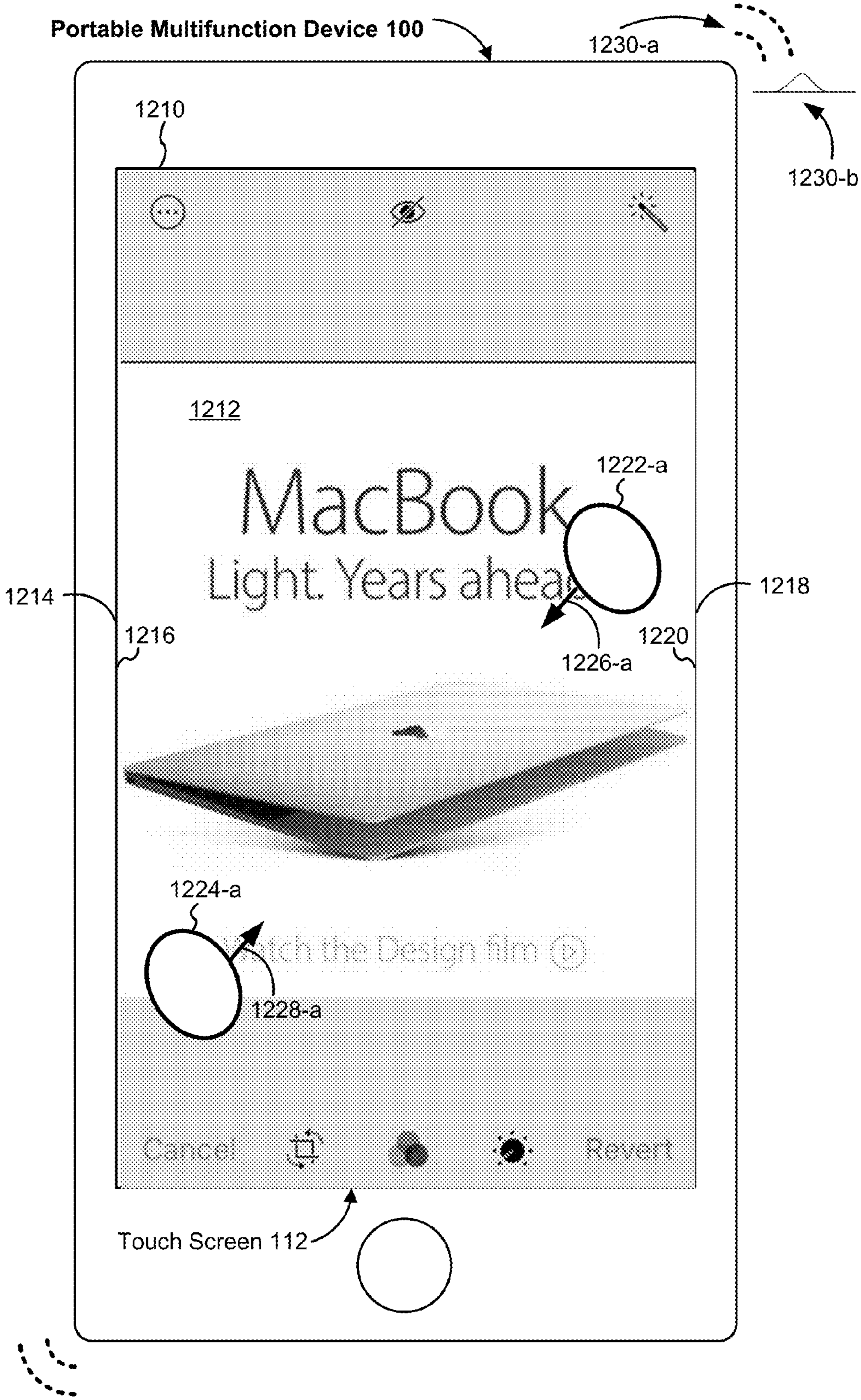
Figure 12C:
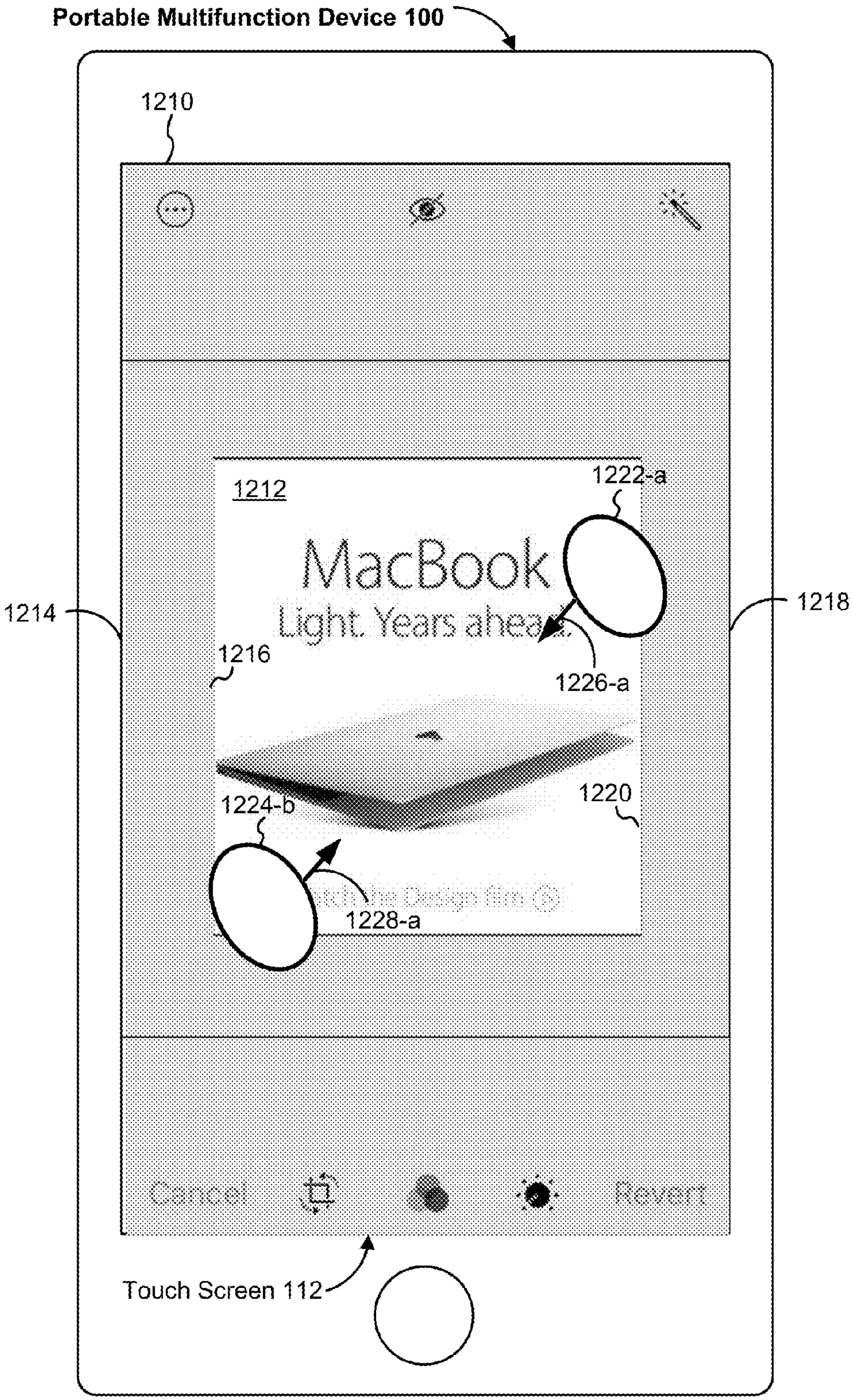
Figure 12D:
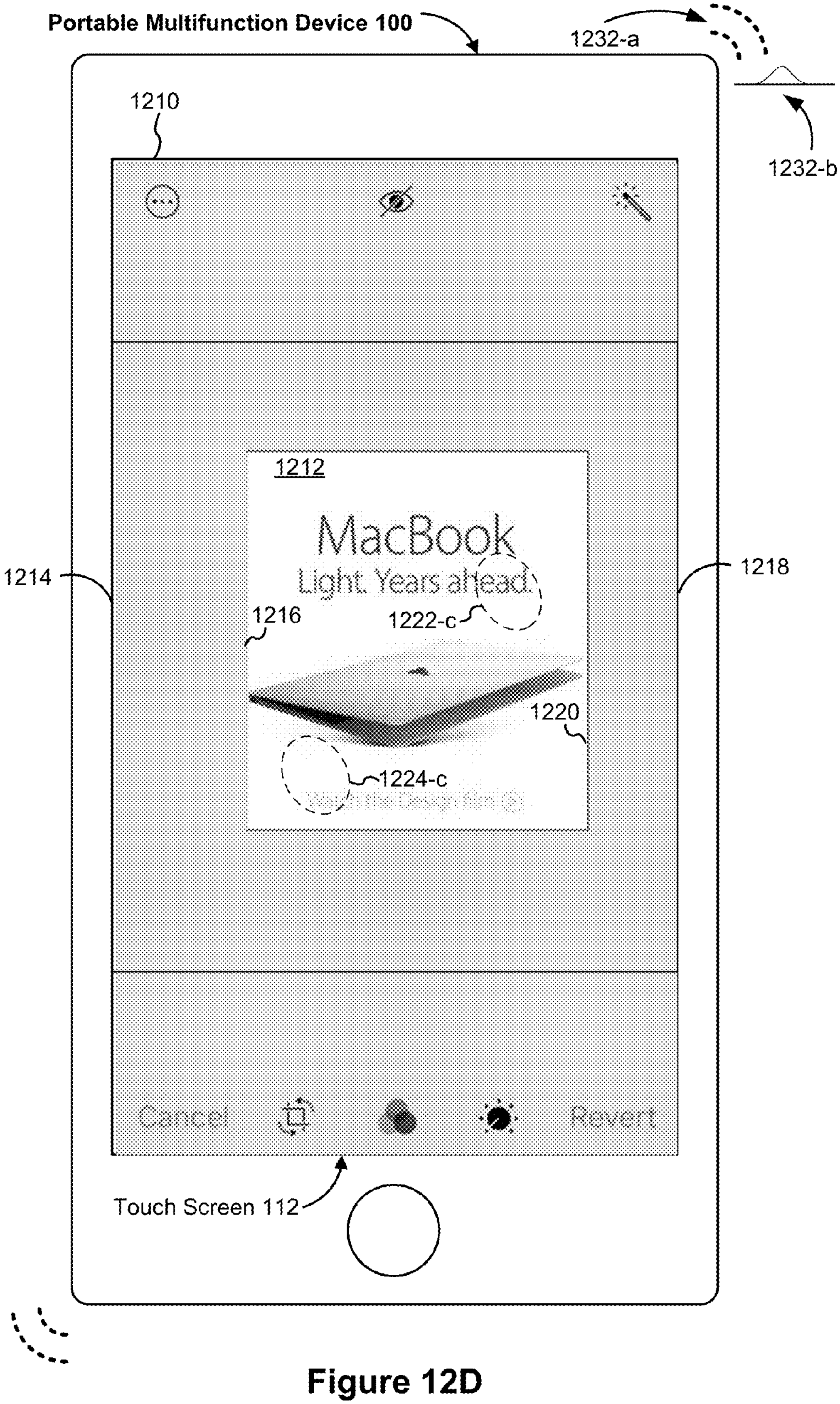

In FIGS. 12B-12D, the device detects an input on image 1212, namely a pinch gesture by contacts 1222 and 1224 with movements 1226 and 1228, respectively, which zoom out the image 1212 in accordance with the movements of contacts 1222 and 1224. In FIGS. 12B-12D, the left edge 1216 of image 1212 moves away from threshold position 1214 and the right edge 1220 of image 1212 moves away from threshold position 1218 as the pinch gesture and the zoom out operation progress, with (background) areas beyond the left edge 1216 and the right edge 1220 of the image displayed.

In some embodiments, device 100 generates tactile output 1230 (e.g., MicroTap (270 Hz), Gain: 0.6) is triggered when the zoom out starts. Tactile output 1230 provides feedback to the user that the width of the displayed image has been reduced below the width of the user interface (which is optionally the default minimum displayed size for the image), which will lead to a rubber band effect after lift-off of at least one of contacts 1222 and 1224. In some embodiments, a tactile output is triggered when an outer edge of the image (e.g., left edge 1216 and/or right edge 1220) crosses a threshold position in the user interface (e.g., threshold position 1214 and/or threshold position 1218).

In some embodiments, a characteristic of the tactile output 1230 (e.g., an amplitude, duration, frequency, and/or waveform of a tactile output pattern that makes up the tactile output and/or audio that accompanies the tactile output) is configured based on a characteristic speed of the input (e.g., a speed of contact 1224 and/or contact 1226) at a time when an outer edge of the image 1212 moves across a threshold position in the user interface 1210. For example, the gain of the tactile output increases as the pinching speed of contacts 1224 and 1226 increases when the outer edge of image 1212 crosses a threshold position in the user interface 1210, which helps make the haptic feedback apparent to the user when faster inputs are made.

In some embodiments, a characteristic of the tactile output 1121 (e.g., an amplitude, duration, frequency, and/or waveform of a tactile output pattern that makes up the tactile output and/or audio that accompanies the tactile output) is configured based on a characteristic speed of an outer edge if the image 1212 at a time when the outer edge of the image 1212 moves across a threshold position in the user interface 1210. For example, the gain of the tactile output increases as the speed of an outer edge (e.g., left edge 1216 and/or right edge 1220) increases when the outer edge crosses a threshold position (e.g., threshold position 1214 and/or threshold position 1218), which helps make the haptic feedback apparent to the user when faster inputs are made.

In FIG. 12D, the device detects termination of at least one of the contacts (e.g., lift-off of contact 1222-*c* and/or 1224-*c*). In some embodiments, the device generates tactile output 1232 (e.g., MicroTap (270 Hz), Gain: 0.6) is triggered when the device detects termination of at least one of the contacts. In some embodiments, a characteristic of tactile output 1232 (e.g., an amplitude, duration, frequency, and/or waveform of a tactile output pattern that makes up the tactile output and/or audio that accompanies the tactile output) is configured based on an extent by which the outer edges 1216 and 1220 of the image 1212 have moved beyond the threshold positions 1214 and 1218 in the user interface (e.g., at the time when termination of the input is detected). For example, the gain of the tactile output increases as the amount of zoom out (demagnification) of image 1212 upon detecting termination increases, which makes the haptic feedback increase as the visual rubber band effect feedback increases.

Figure 12E:
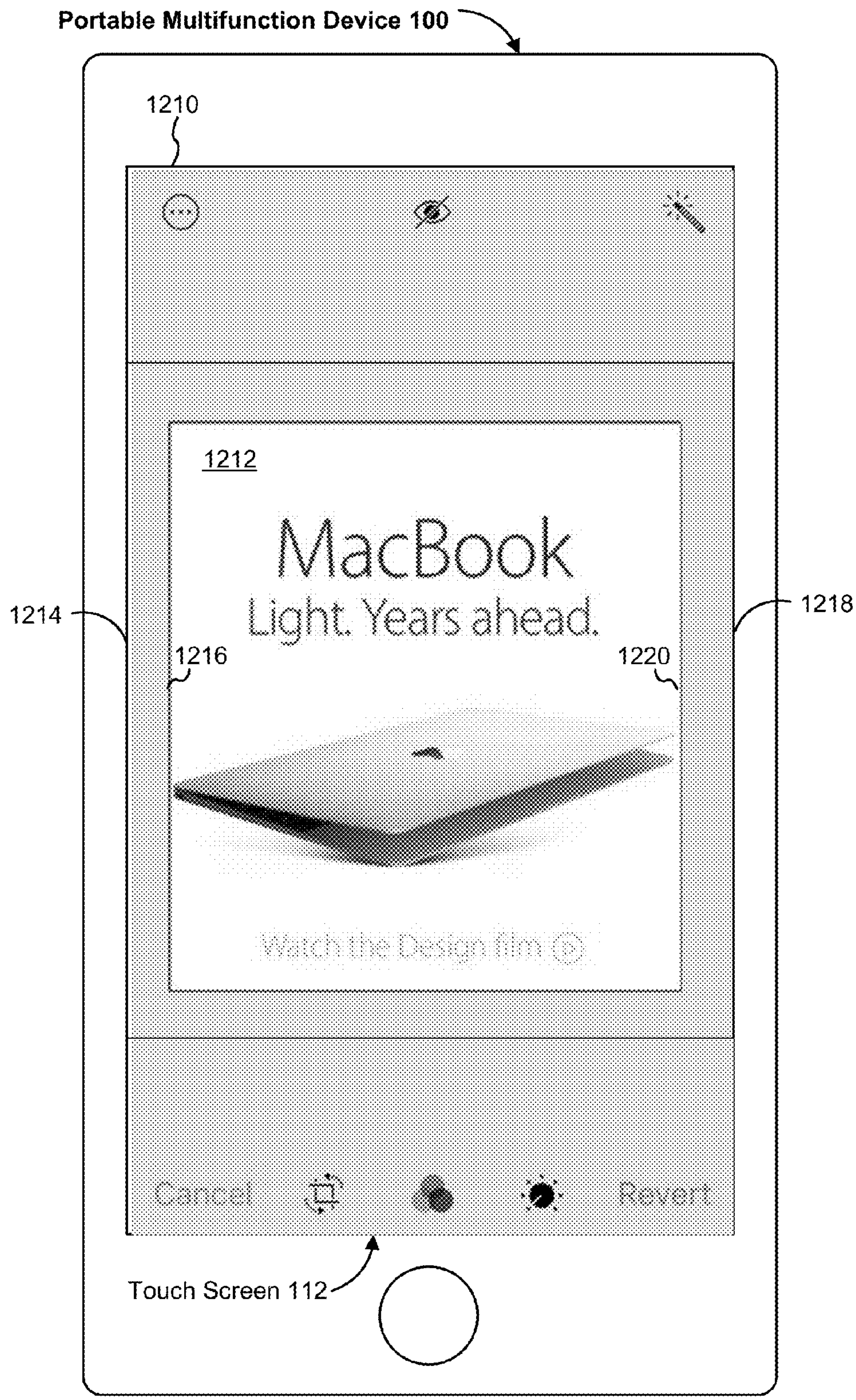
Figure 12F:
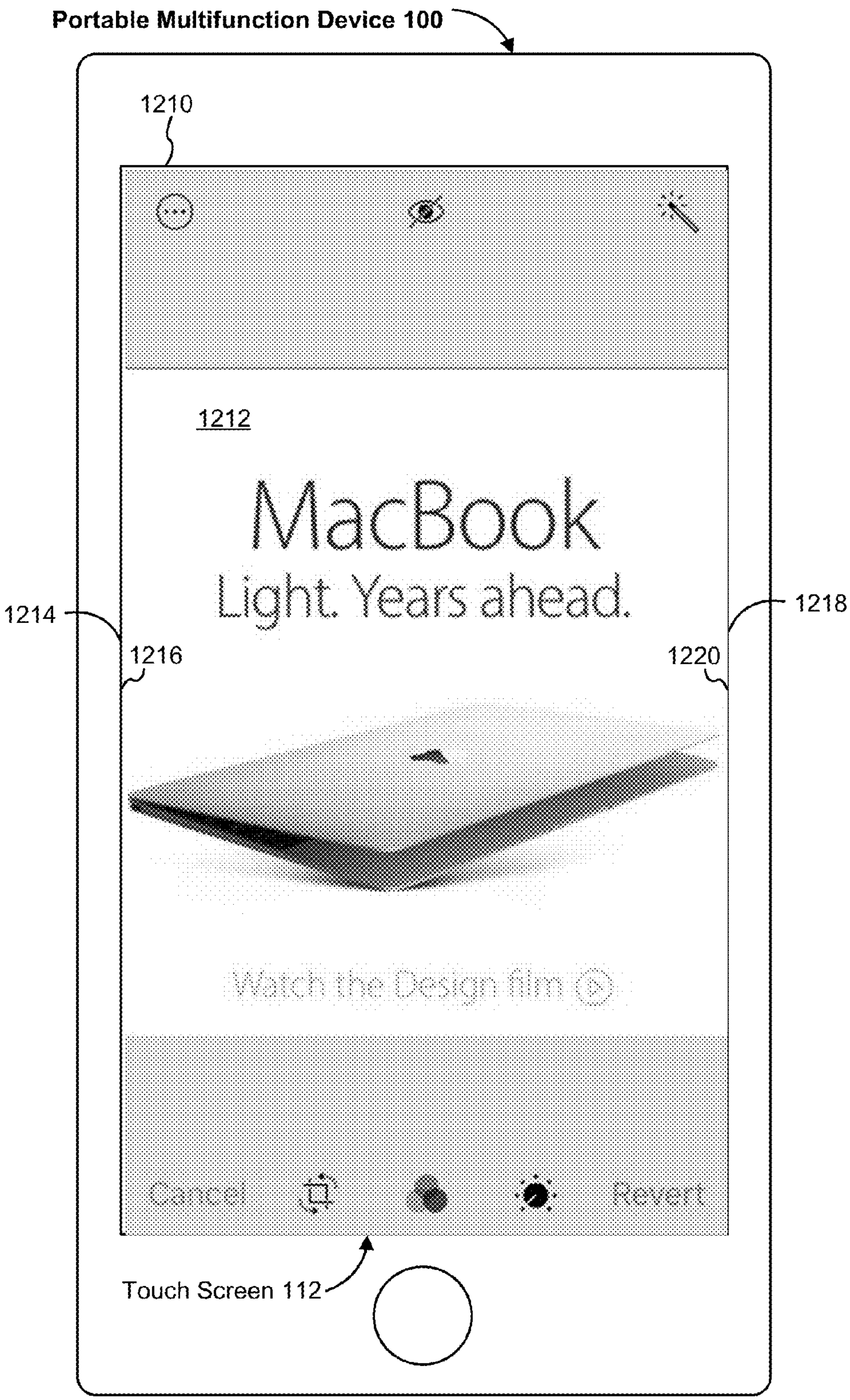

In response to detecting termination of at least one of the contacts (e.g., lift-off of contact 1222-*c* and/or 1224-*c*, FIG. 12D), the device increases the size of image 1212 until the width of the image once again matches the width of the user interface, as shown in FIGS. 12E-12F. In FIG. 12F, the left edge 1216 of image 1212 has returned to the threshold position 1214 in the user interface (e.g., the left edge of user interface 1210) and the right edge 1220 of image 1212 has returned to the threshold position 1218 in the user interface (e.g., the right edge of user interface 1210).

The display of the (background) areas beyond the left and right edges of the image 1212 as the image zooms out in accordance with the movements 1226 and 1228 of contacts 1222 and 1224, respectively, followed by, in response to detecting termination of at least one of the contacts, magnifying the image until the width of the image once again matches the width of the user interface is another example of a rubber band effect.

Tactile output 1232 reinforces the visual feedback to the user that a rubber band effect is being applied, which automatically fills the display with the full width of the image after lift-off, after showing the user that the entire image is being viewed. Providing concurrent visual and haptic feedback enhances the overall feedback to the user that the entire image is being viewed and fills the display, which improves the efficiency of viewing images. In some embodiments, only one of tactile output 1230 and tactile output 1232 is produced, to avoid providing excessive haptic feedback.

FIGS. 12G-12J illustrate a rubber band effect applied to a digital image (e.g., a screen capture of a MacBook advertisement) after translation, with a tactile output.

Figure 12G:
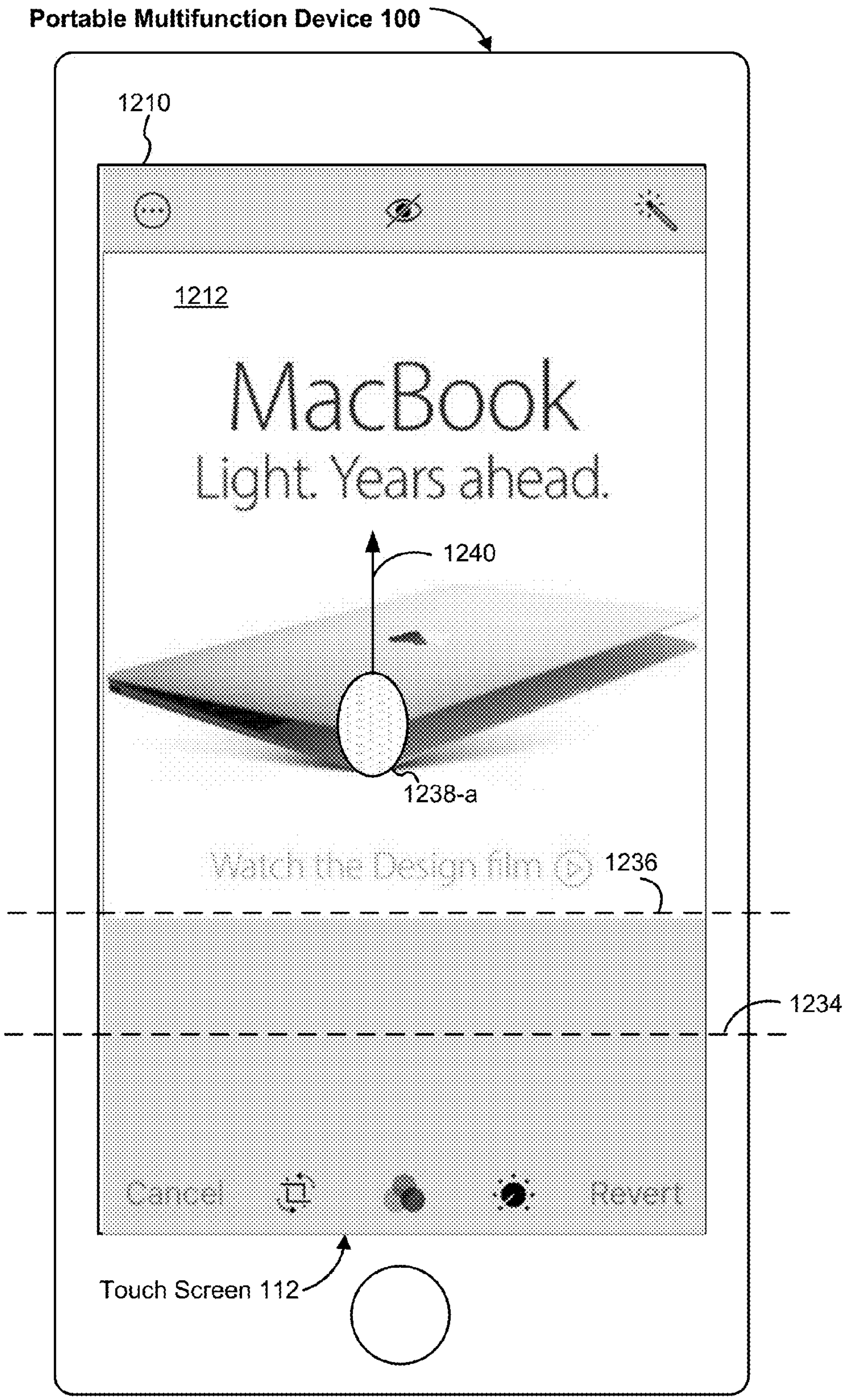

In FIG. 12G, the device detects an input on image 1212, namely a drag gesture by contact 1238 with movement 1240, which translates the image 1212 (e.g., upward) in accordance with the movement of contact 1238. In FIG. 12G, the bottom edge 1236 of image 1212 moves away from threshold position 1234 as the drag gesture and the scrolling progress, with more (background) area displayed below the bottom edge 1236.

Figure 12H:
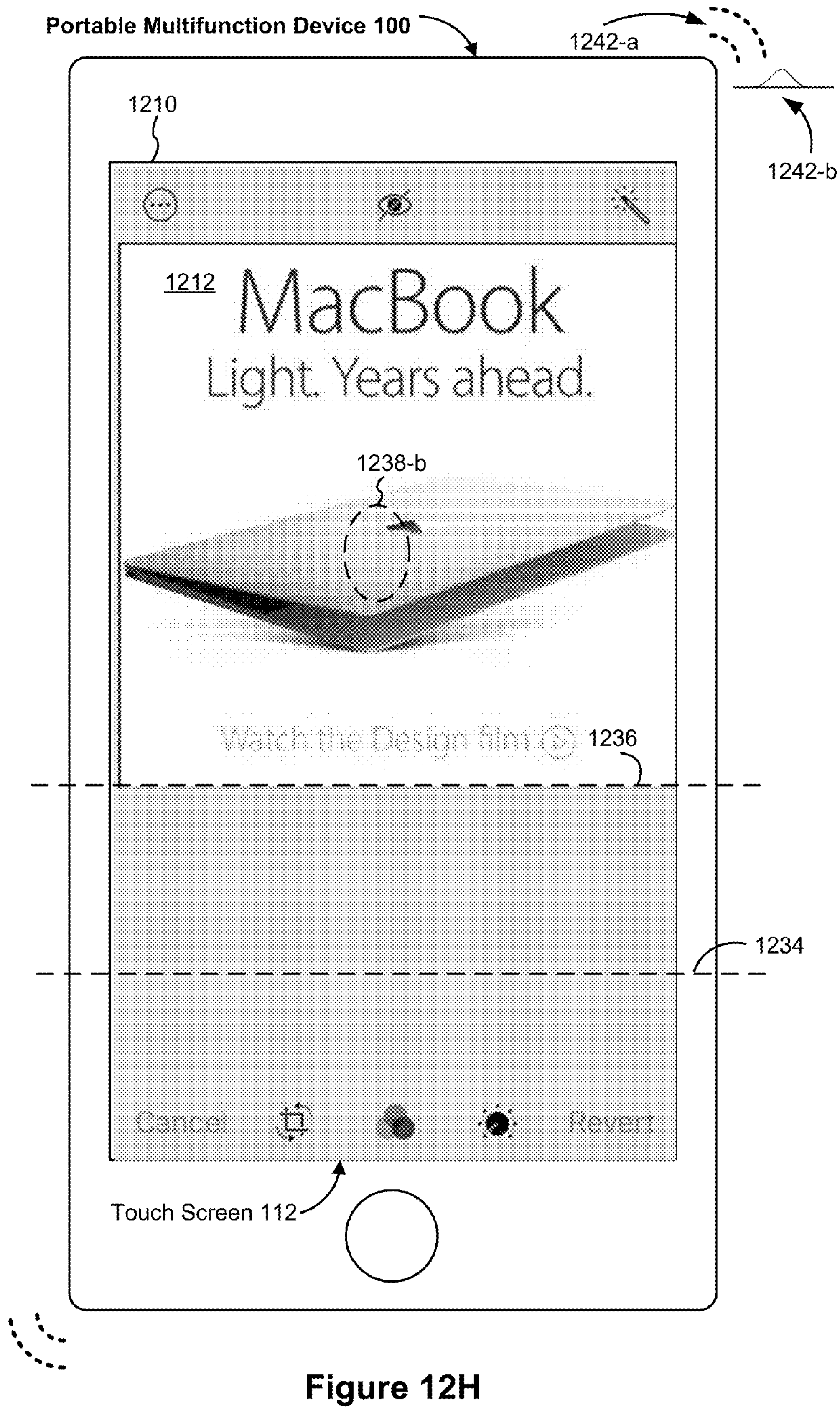

In FIG. 12H, the device detects termination of the contact (e.g., lift-off of contact 1238-*b*). In some embodiments, a tactile output 1242 (e.g., MicroTap High (270 Hz), Gain: 0.6) is triggered when the device detects termination of the contact. In some embodiments, a characteristic of the tactile output 1242 (e.g., an amplitude, duration, frequency, and/or waveform of a tactile output pattern that makes up the tactile output and/or audio that accompanies the tactile output) is configured based on an extent by which the bottom edge 1236 of the image 1212 has moved beyond the threshold position 1234 in the user interface (e.g., at the time when termination of the input is detected). For example, the gain of the tactile output increases as the amount of translation of image 1212 upon detecting termination increases, which makes the haptic feedback increase as the visual rubber band effect feedback increases.

Figure 12I:
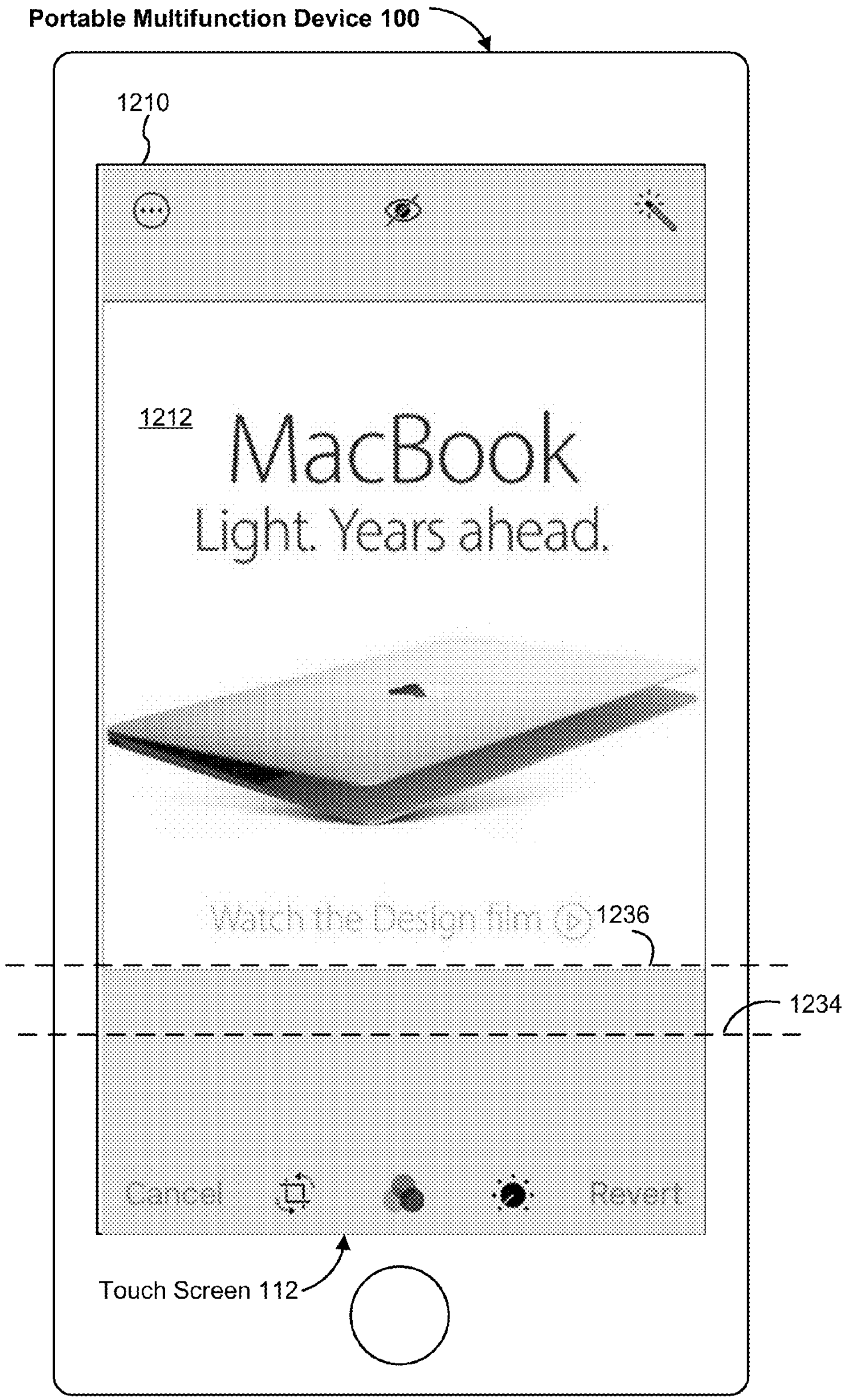
Figure 12J:
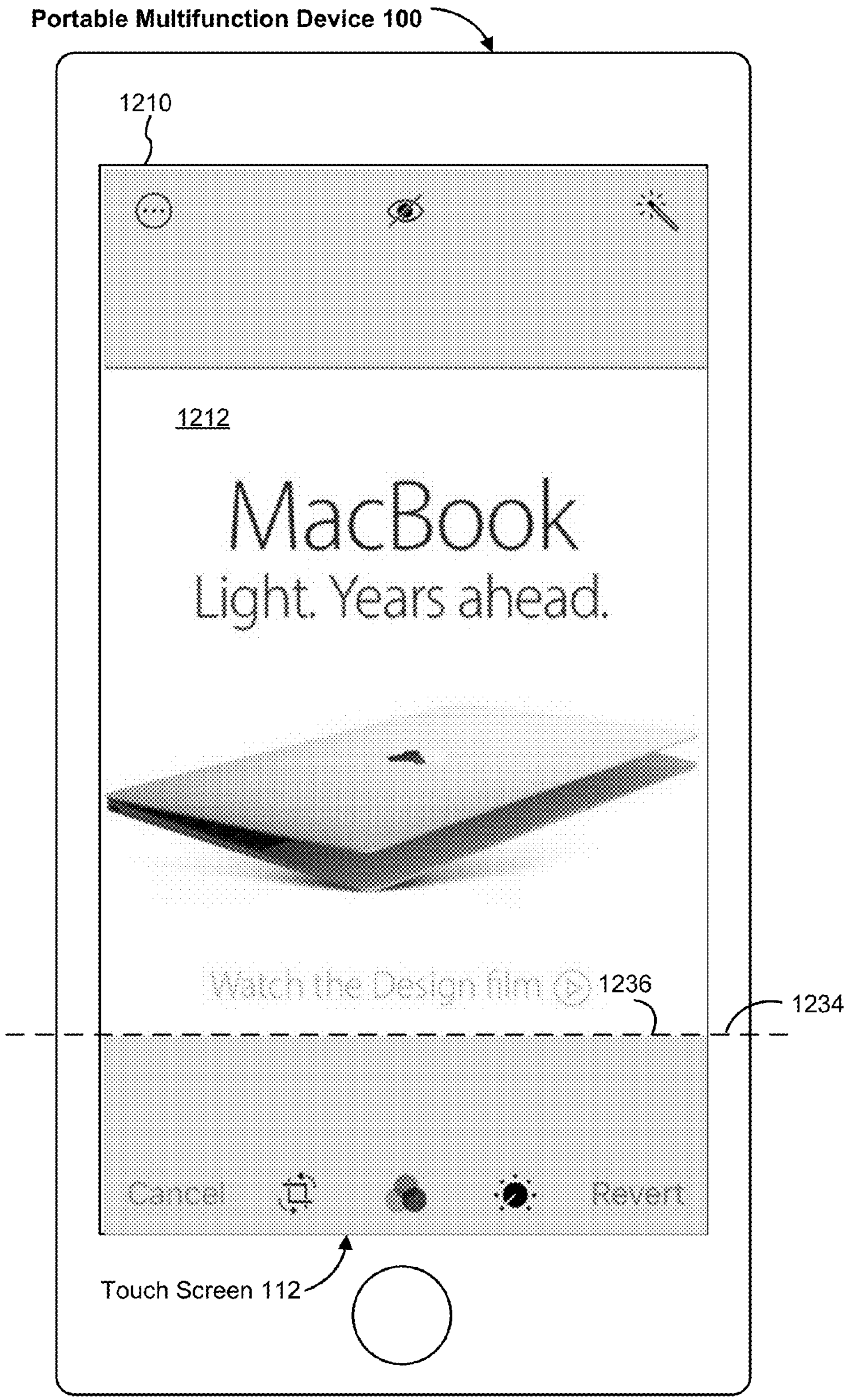
Figure 12K:
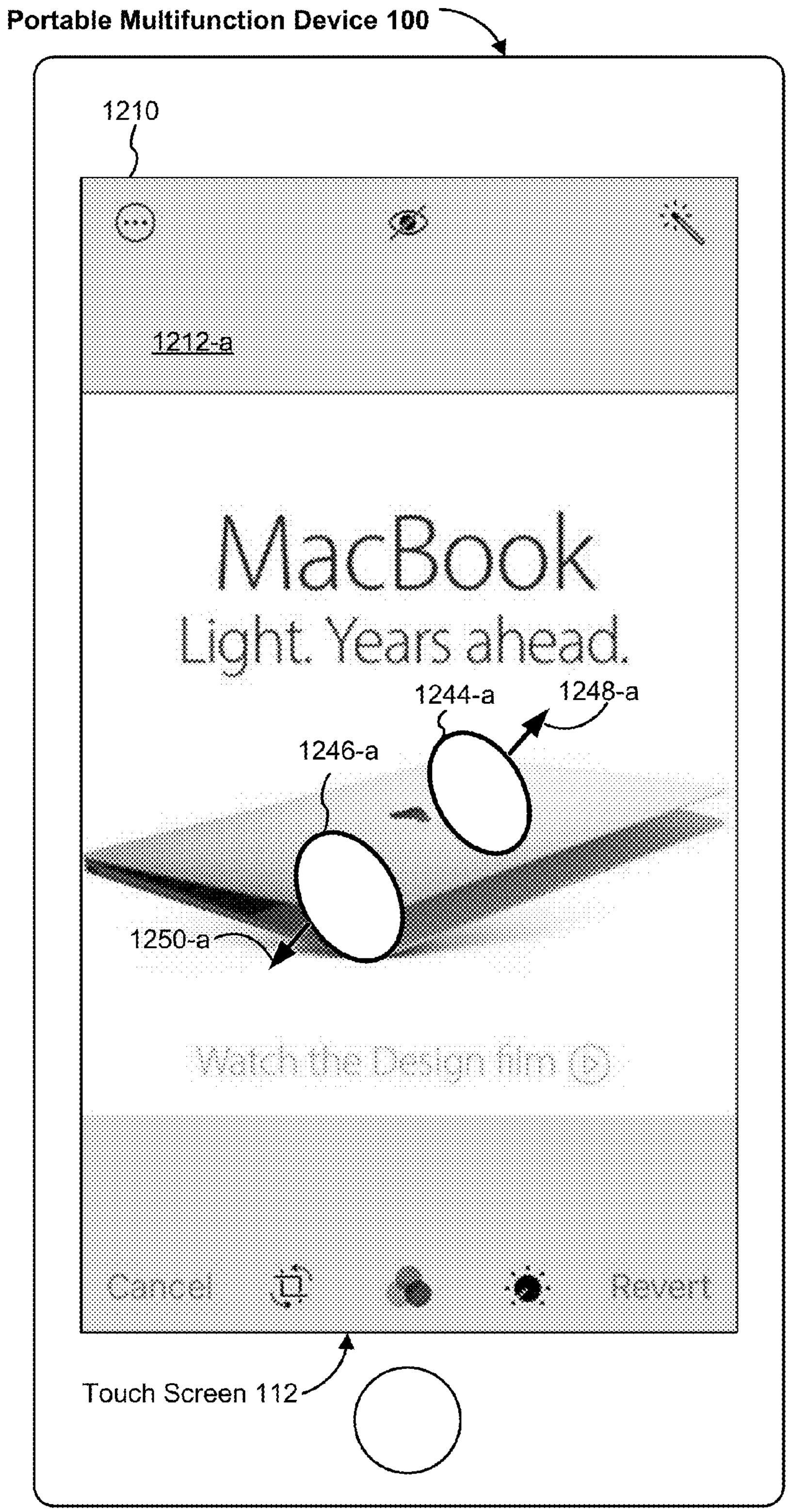

In response to detecting termination of the contact 1238-*b* (FIG. 12H), the device translates the image 1212 (e.g., downward) until the bottom edge 1236 of the image returns to the threshold position 1234, as shown in FIGS. 12I-12J.

The display of more (background) area below the bottom edge 1236 of the image as the image translates upwards in accordance with the movement 1240 of the contact 1238, followed by, in response to detecting termination of the contact, translating the image in the opposite direction (e.g., downwards) until the additional (background) area ceases to be displayed, thereby returning the image to its original, centered position, is another example of a rubber band effect.

Tactile output 1242 reinforces the visual feedback to the user that a rubber band effect is being applied, which automatically re-centers the image in the user interface after translation. Providing concurrent visual and haptic feedback enhances the overall feedback to the user that the image is being centered and improves the efficiency of the translation process.

FIGS. 12K-12O illustrate a rubber band effect applied to a digital image (e.g., a screen capture of a MacBook advertisement) after a zoom-in operation, with one or more tactile outputs.

Figure 12L:
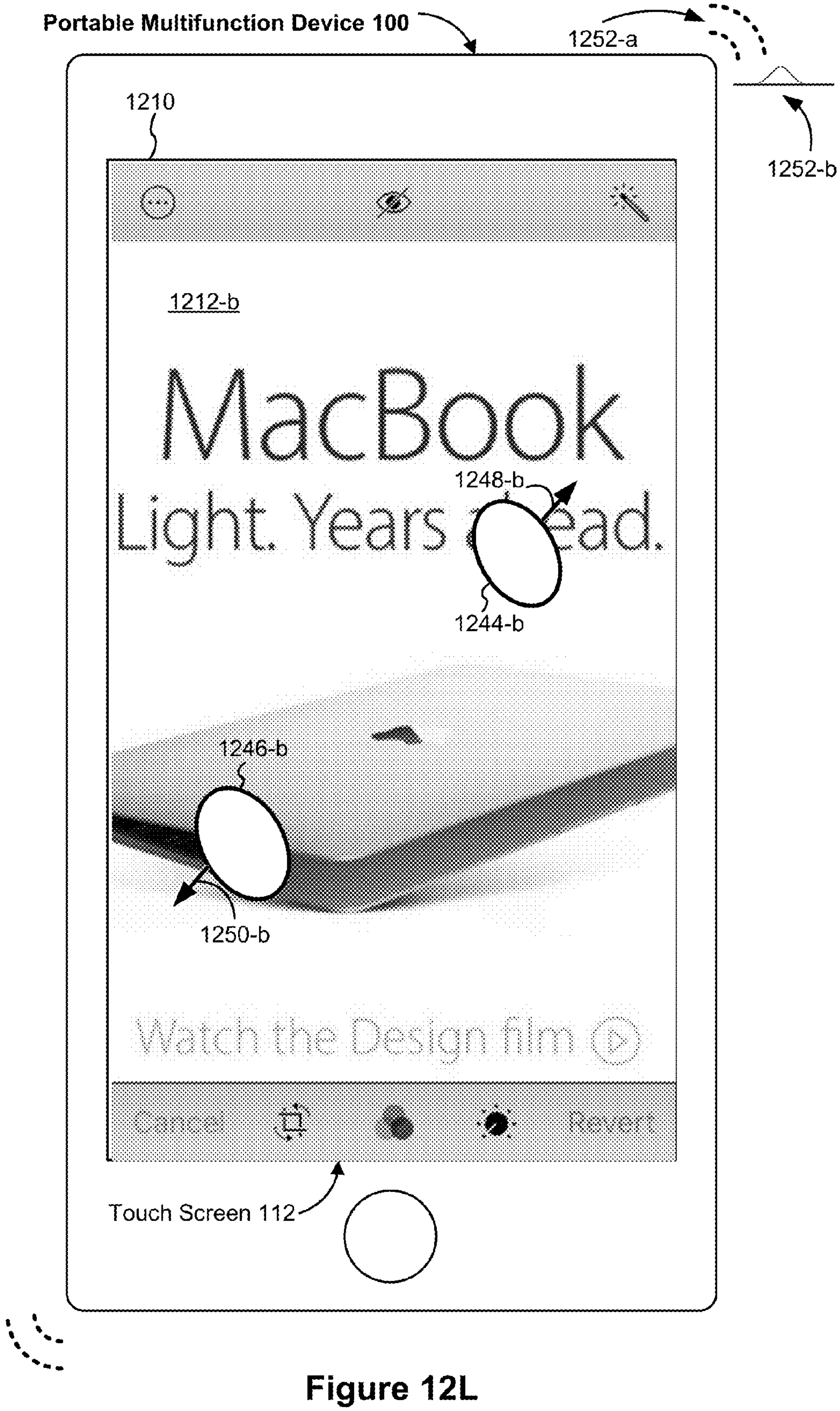
Figure 12M:
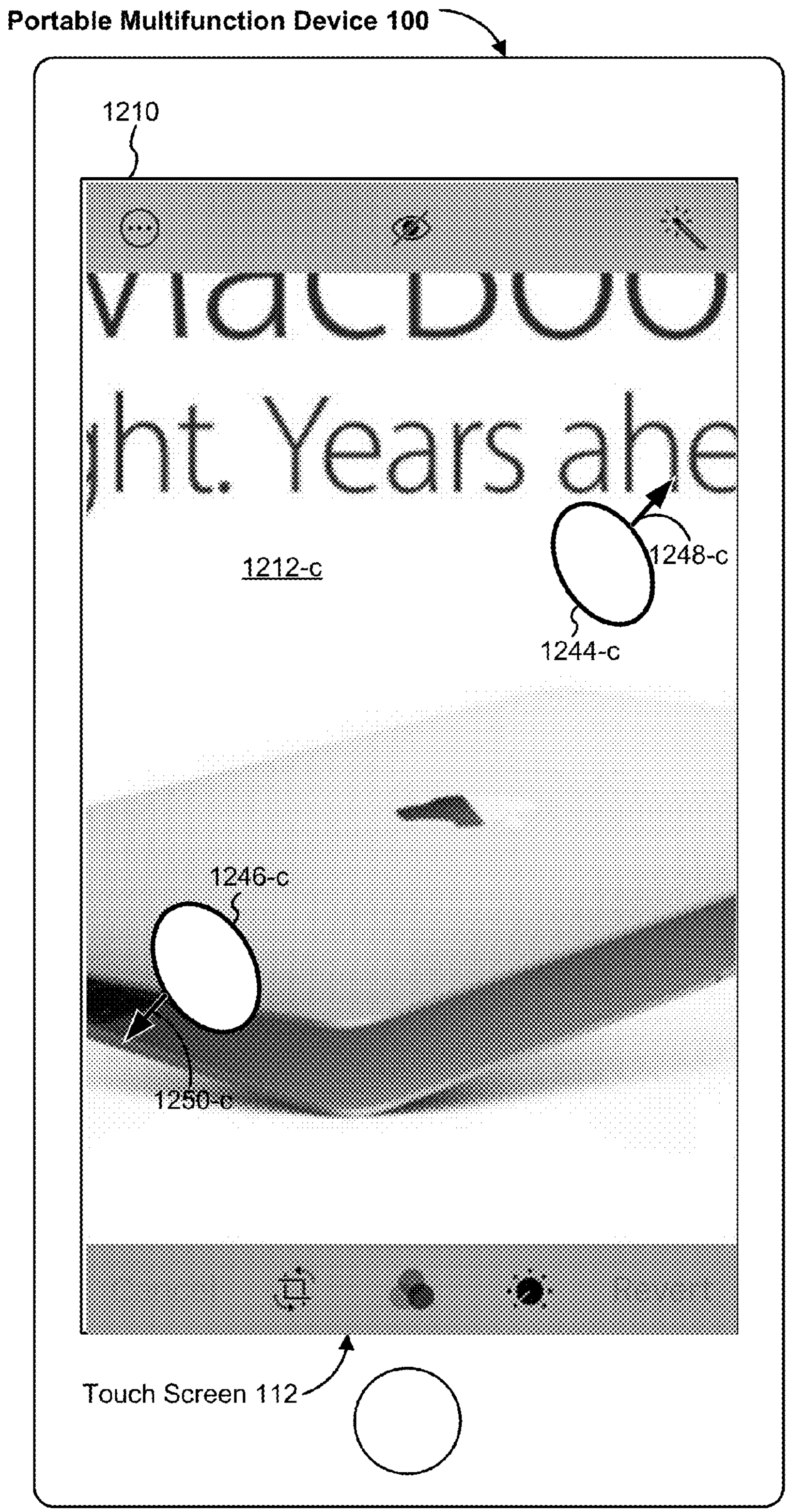

In FIGS. 12K-12N, the device detects an input on image 1212, namely a depinch gesture by contacts 1244 and 1246 with movements 1248 and 1250, respectively, which zoom in (magnify) the image 1212 in accordance with the movements of contacts 1244 and 1246. In FIGS. 12K-12N, decreasing portions of the image 1212 are displayed at increasing magnifications in response to detecting the depinch gesture. In FIG. 12L, the image 1212-*b* passes through a zoom-in amount (magnification) that corresponds to a predefined maximum zoom-in amount (magnification) for the image after the input terminates (e.g., after lift-off of at least one of contacts 1244 and 1246).

In some embodiments, device 100 generates tactile output 1252 (e.g., MicroTap (270 Hz), Gain: 0.6) is triggered when image 1212-*b* passes through the zoom-in amount (magnification) that corresponds to the predefined maximum zoom-in amount (magnification) for the image after the input terminates (e.g., image 1212-*b* with the magnification shown in FIG. 12L). Tactile output 1252 provides feedback to the user that the zoom-in amount (magnification) of the image 1212 is being increased above the predefined maximum zoom-in amount (magnification) for the image after the input terminates (which is optionally the default maximum magnification for the image), which will lead to a rubber band effect after lift-off of at least one of contacts 1244 and 1246. In some embodiments, a tactile output is triggered when an outer edge of the image (e.g., beyond the portion of image 1212-*b* displayed on touch screen 112 in FIG. 12L) crosses a threshold position in the user interface (e.g., also beyond the portion of image 1212-*b* displayed on touch screen 112 in FIG. 12L).

In some embodiments, a characteristic of the tactile output 1252 (e.g., an amplitude, duration, frequency, and/or waveform of a tactile output pattern that makes up the tactile output and/or audio that accompanies the tactile output) is configured based on a characteristic speed of the input (e.g., a speed of contact 1244 and/or contact 1246) at a time when the image 1212-*b* passes through the zoom-in amount (magnification) that corresponds to the predefined maximum zoom-in amount (magnification) for the image after the input terminates. For example, the gain of the tactile output increases as the depinching speed of contacts 1244 and 1246 increases when the image 1212-*b* passes through the zoom-in amount (magnification) that corresponds to the predefined maximum zoom-in amount (magnification) for the image after the input terminates, which helps make the haptic feedback apparent to the user when faster inputs are made.

In some embodiments, a characteristic of the tactile output 1252 (e.g., an amplitude, duration, frequency, and/or waveform of a tactile output pattern that makes up the tactile output and/or audio that accompanies the tactile output) is configured based on a characteristic speed of zooming in at a time when the image 1212-*b* passes through the zoom-in amount (magnification) that corresponds to the predefined maximum zoom-in amount (magnification) for the image after the input terminates. For example, the gain of the tactile output increases as the speed of zooming in increases when the image 1212-*b* passes through the zoom-in amount (magnification) that corresponds to the predefined maximum zoom-in amount (magnification) for the image after the input terminates, which helps make the haptic feedback apparent to the user when faster inputs are made.

Figure 12N:
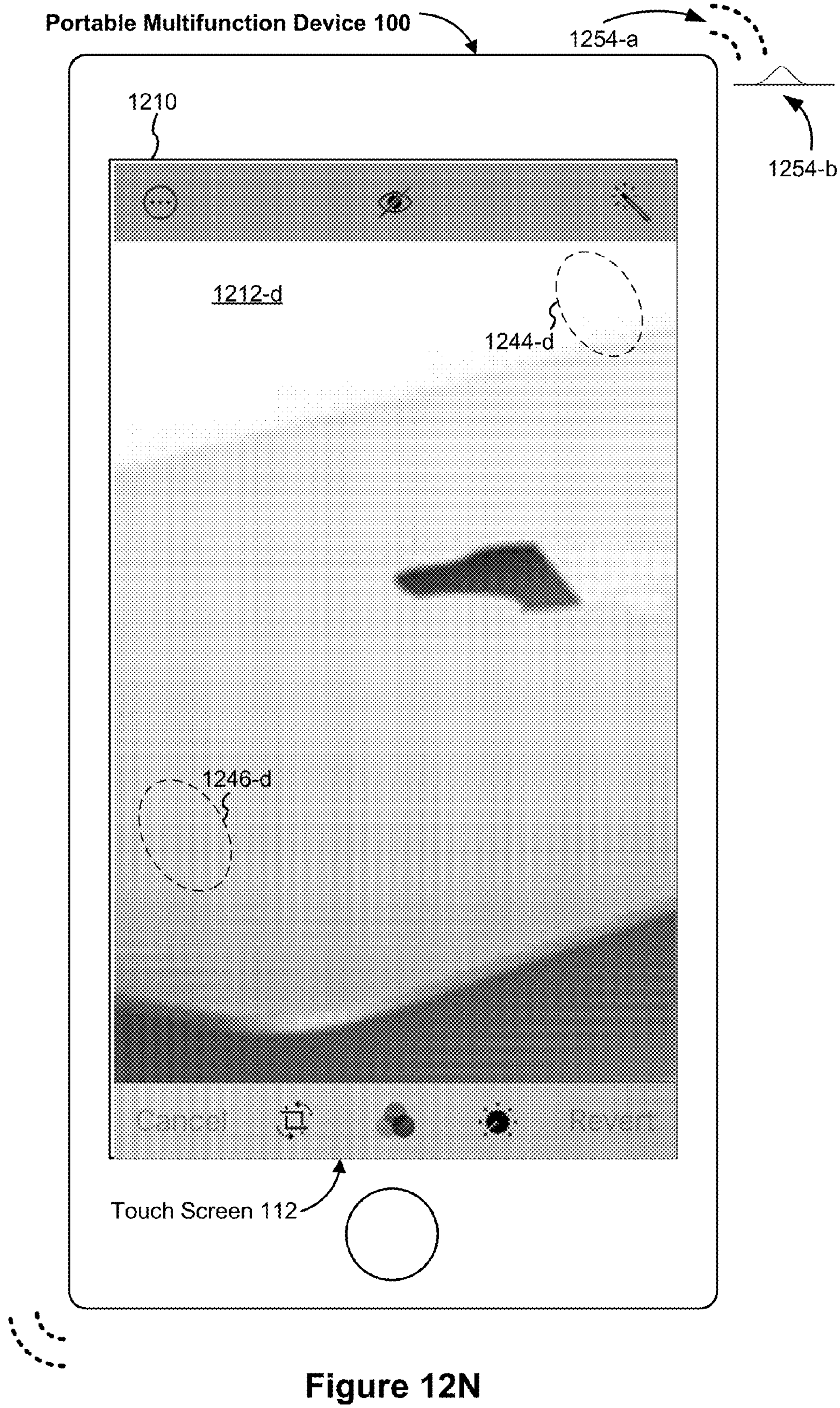

In FIG. 12N, the device detects termination of at least one of the contacts (e.g., lift-off of contact 1244-*d* and/or 1246-*d*). In some embodiments, a tactile output 1254 (e.g., MicroTap (270 Hz), Gain: 0.6) is triggered when the device detects termination of at least one of the contacts. In some embodiments, a characteristic of the tactile output 1254 (e.g., an amplitude, duration, frequency, and/or waveform of a tactile output pattern that makes up the tactile output and/or audio that accompanies the tactile output) is configured based on an extent by which the image 1212 has been zoomed in (magnified) beyond the predefined maximum zoom-in amount (magnification) for the image after the input terminates (e.g., at the time when termination of the input is detected). For example, the gain of the tactile output increases as the amount of zoom in (magnification) of image 1212 upon detecting termination increases, which makes the haptic feedback increase as the visual rubber band effect feedback increases.

Figure 12O:
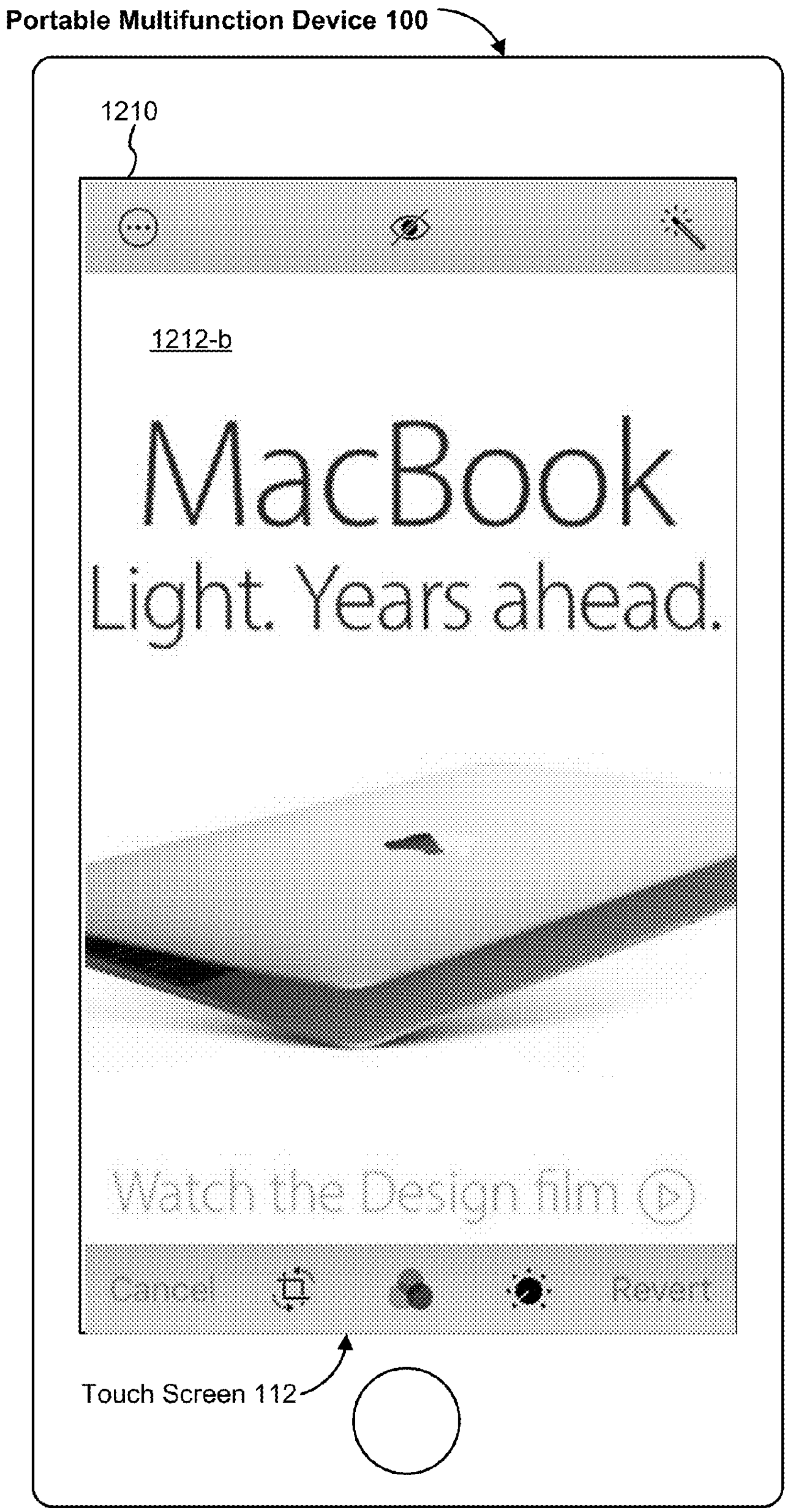

In response to detecting termination of at least one of the contacts (e.g., lift-off of contact 1244-*d* and/or 1246-*d*, FIG. 12N), the device decreases the size of image 1212 to the predefined maximum zoom-in amount (magnification) 1212-*b*, as shown in FIG. 12O.

The display of the image 1212 at magnifications greater than the predefined maximum zoom-in amount (magnification) as the image zooms in accordance with the movements 1248 and 1250 of contacts 1244 and 1246, respectively, followed by, in response to detecting termination of at least one of the contacts, demagnifying the image until the image magnification matches the predefined maximum zoom-in amount (magnification) is another example of a rubber band effect.

Tactile output 1254 reinforces the visual feedback to the user that a rubber band effect is being applied, which automatically displays the image at the predefined maximum zoom-in amount (magnification) after lift-off. Providing concurrent visual and haptic feedback enhances the overall feedback to the user that the image is being viewed at the predefined maximum zoom-in amount (magnification), which improves the efficiency of zooming images. In some embodiments, only one of tactile output 1252 and tactile output 1254 is produced, to avoid providing excessive haptic feedback.

Turning to FIGS. 13A-13L, these figures illustrate exemplary web browser interface for providing tactile outputs on zooming (magnifying or demagnifying) beyond a predefined web browser boundary, in accordance with some embodiments. FIGS. 13A-13G illustrate zooming in (magnifying) on an exemplary webpage and the tactile output generated in connection with the webpage expansion. FIGS. 13H-13L illustrate zooming out (de-magnifying) an exemplary webpage and the tactile output generated in connection with the shrinking of the webpage.

Figure 13A:
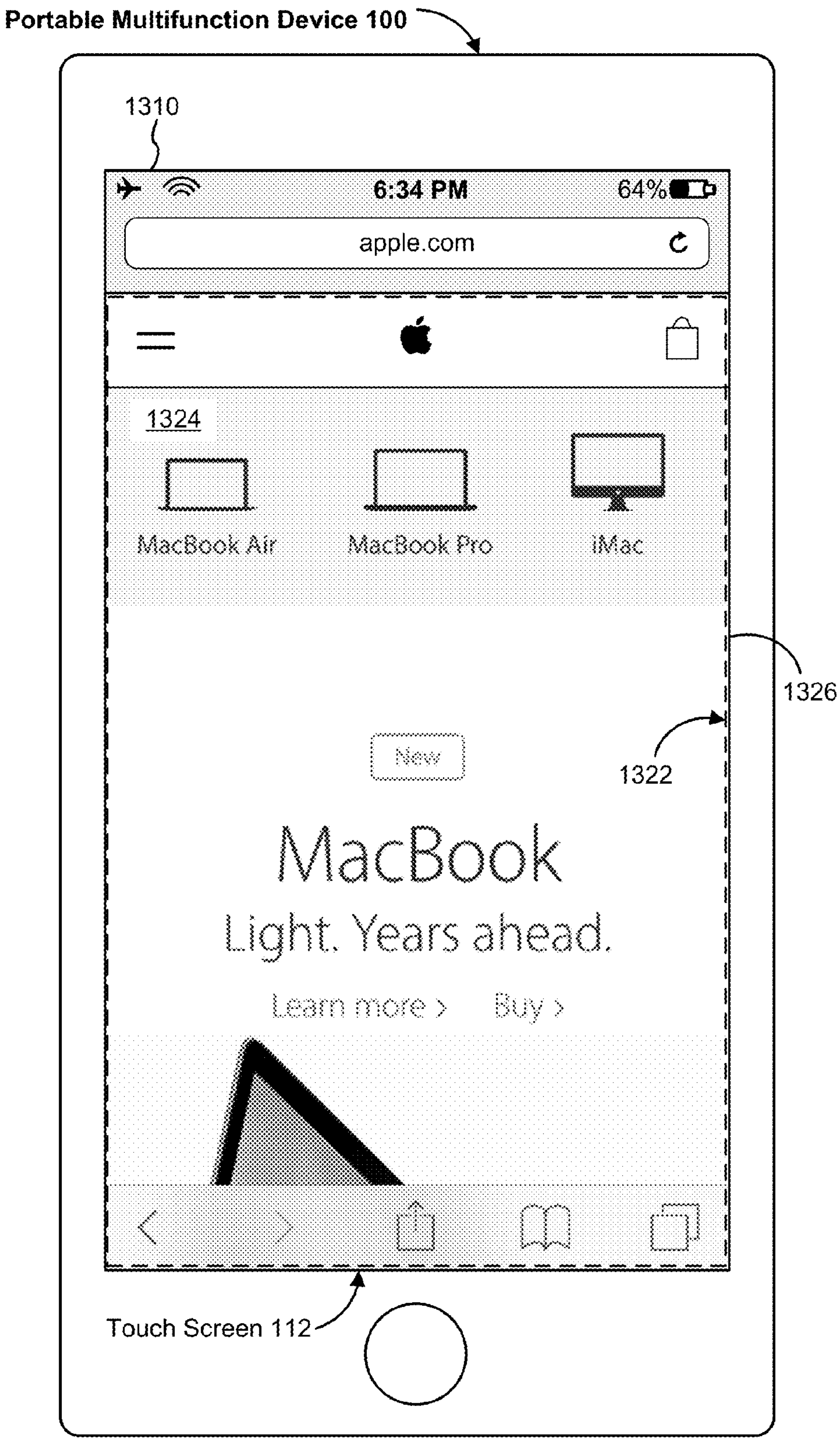
FIGS. 13A-13L illustrate exemplary user interfaces for providing haptic feedback in conjunction with visual rubber band effect (e.g., in a web browser user interface) in accordance with some embodiments.

In FIG. 13A, an exemplary web browser interface 1310 is displayed on touch screen display 112. In some embodiments, the browser interface 1310 includes content display region 1326 that displays a webpage (e.g., webpage 1324). For example, in FIG. 13A, webpage 1324 corresponds to the web address "apple.com" displayed in the address bar above content display region 1322. In FIG. 13A, boundary 1322 of webpage 1324 coincides with the boundary of content display region 1326 of browser interface 1310.

Figure 13B:
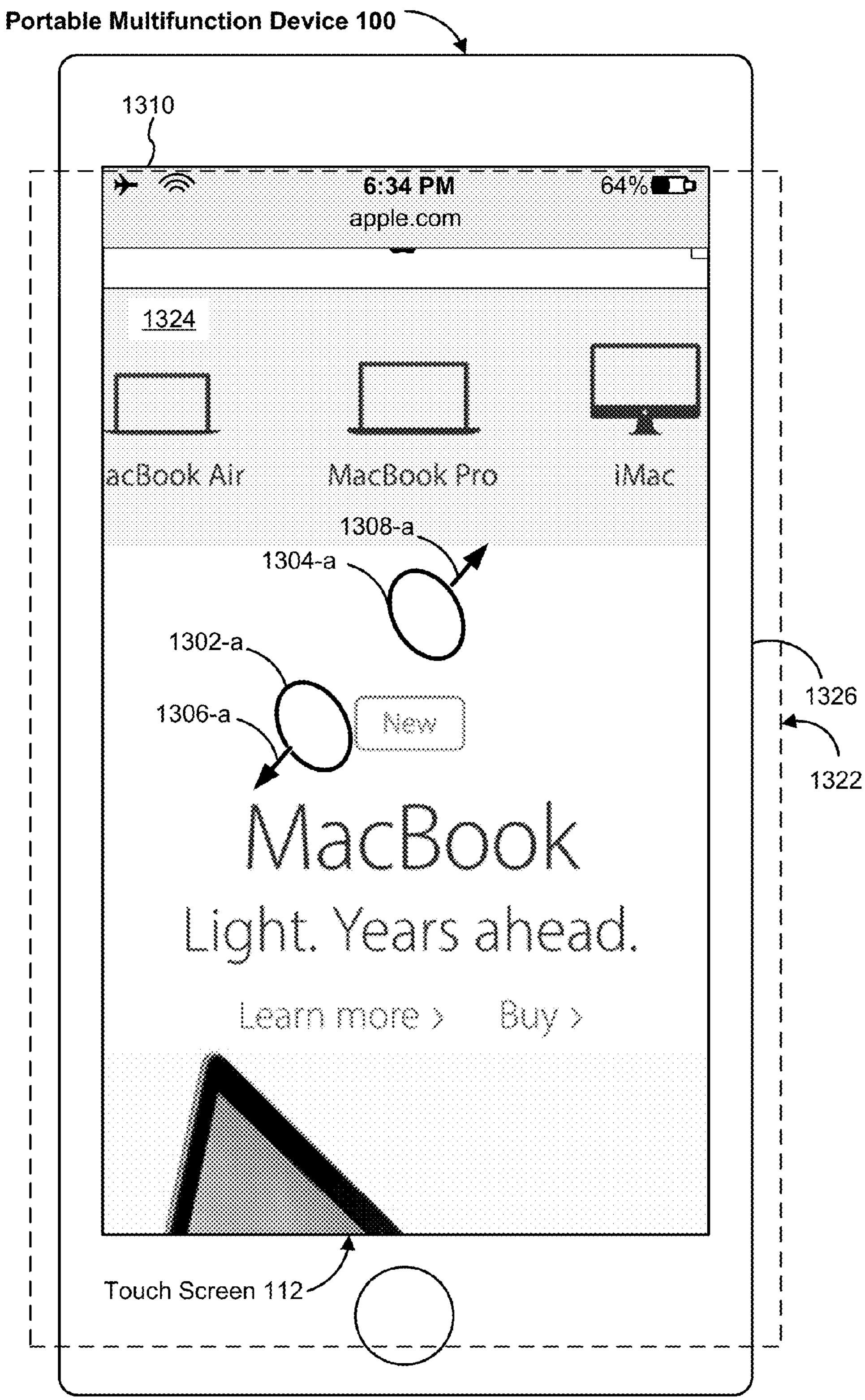
Figure 13C:

In FIG. 13B, the device detects an input, such as a depinch gesture by two contacts 1302 and 1304 moving away from each other across the touch-sensitive surface 112, as indicated by movement 1306 and 1308. In response to detecting the depinch gesture by two contacts 1302, 1304, the device expands the webpage 1324, such that the position of boundary 1322 of webpage 1324 is pushed outside of content display region 1326 (e.g., outside of the displayed region of the web browser interface 1310). As a result, only a portion of webpage 1324 is visible on touch screen display 112. As contacts 1302 and 1304 move further apart, in FIG. 13C, the expansion of webpage 1324 continues in accordance with movements 1306 and 1308 of contacts 1302 and 1304.

Figure 13D:
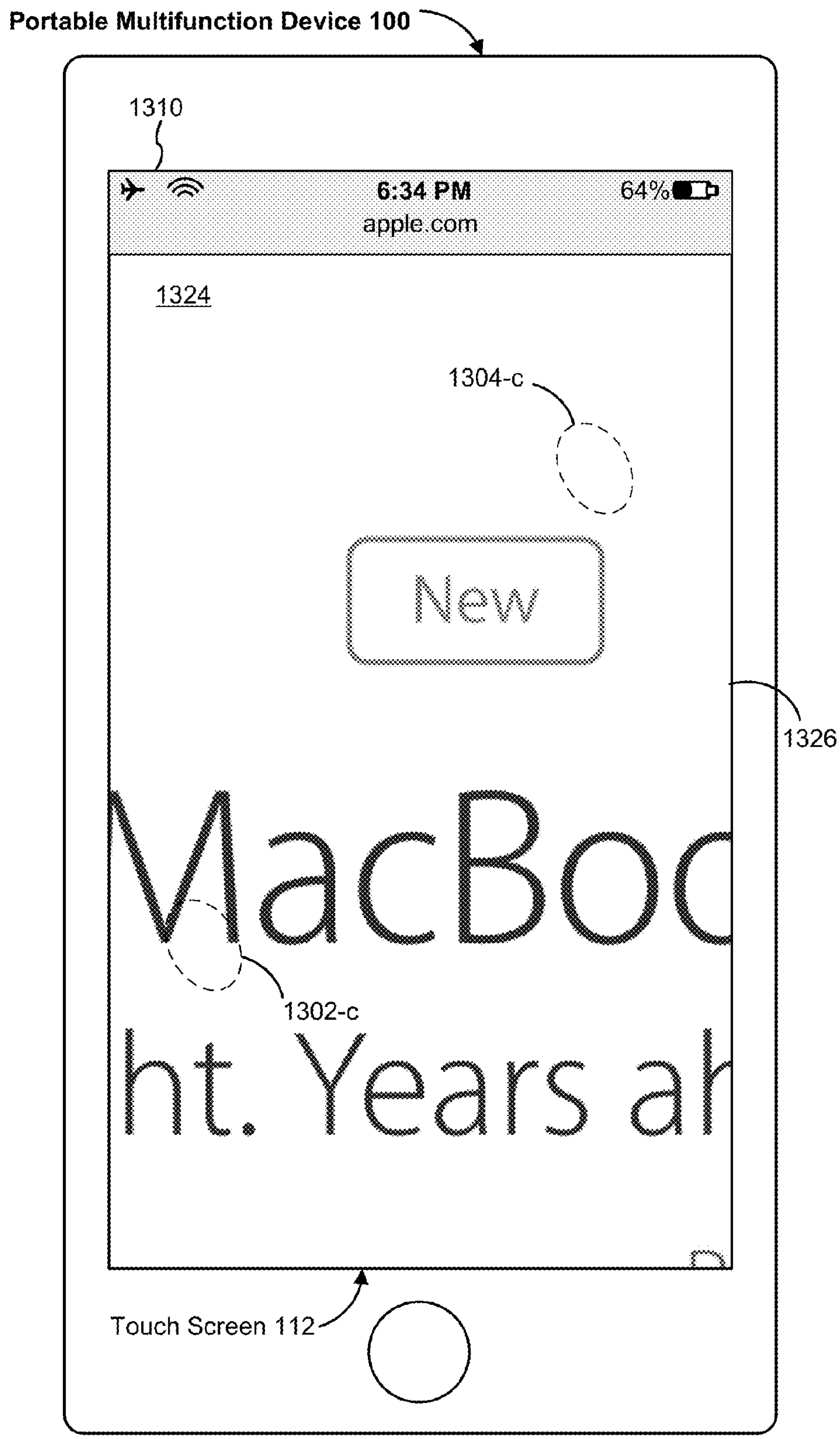
Figure 13E:
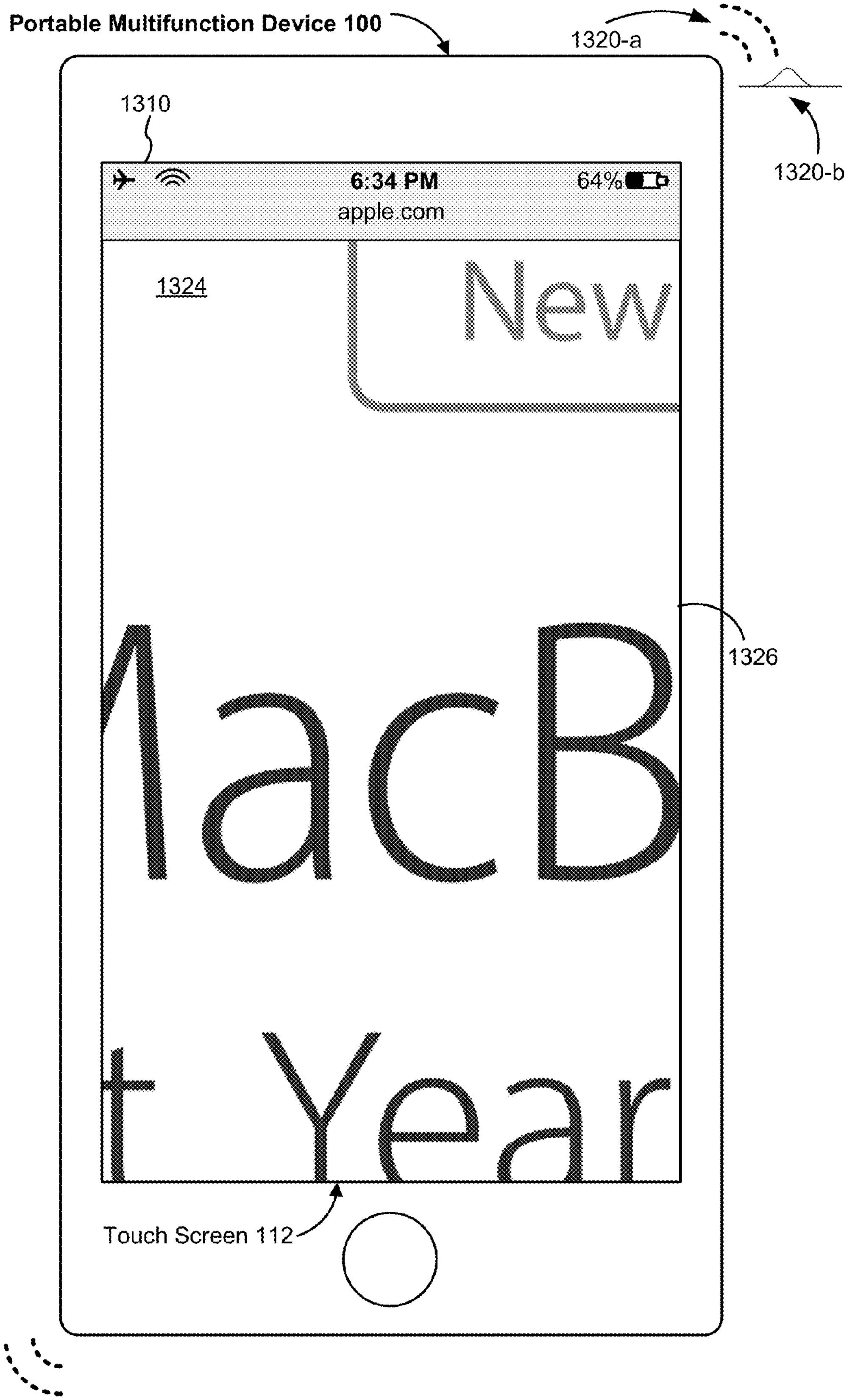
Figure 13F:
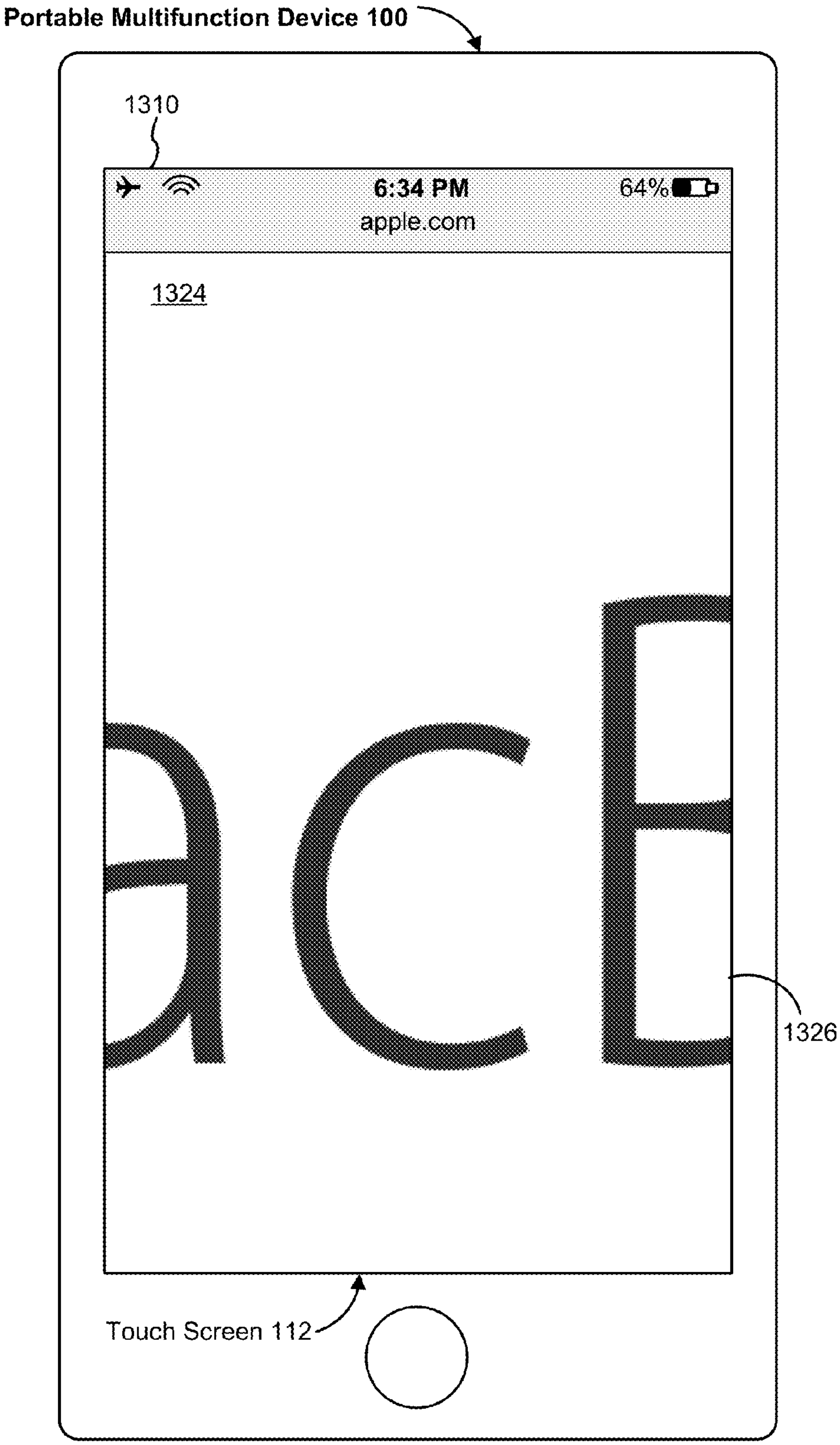
Figure 13G:
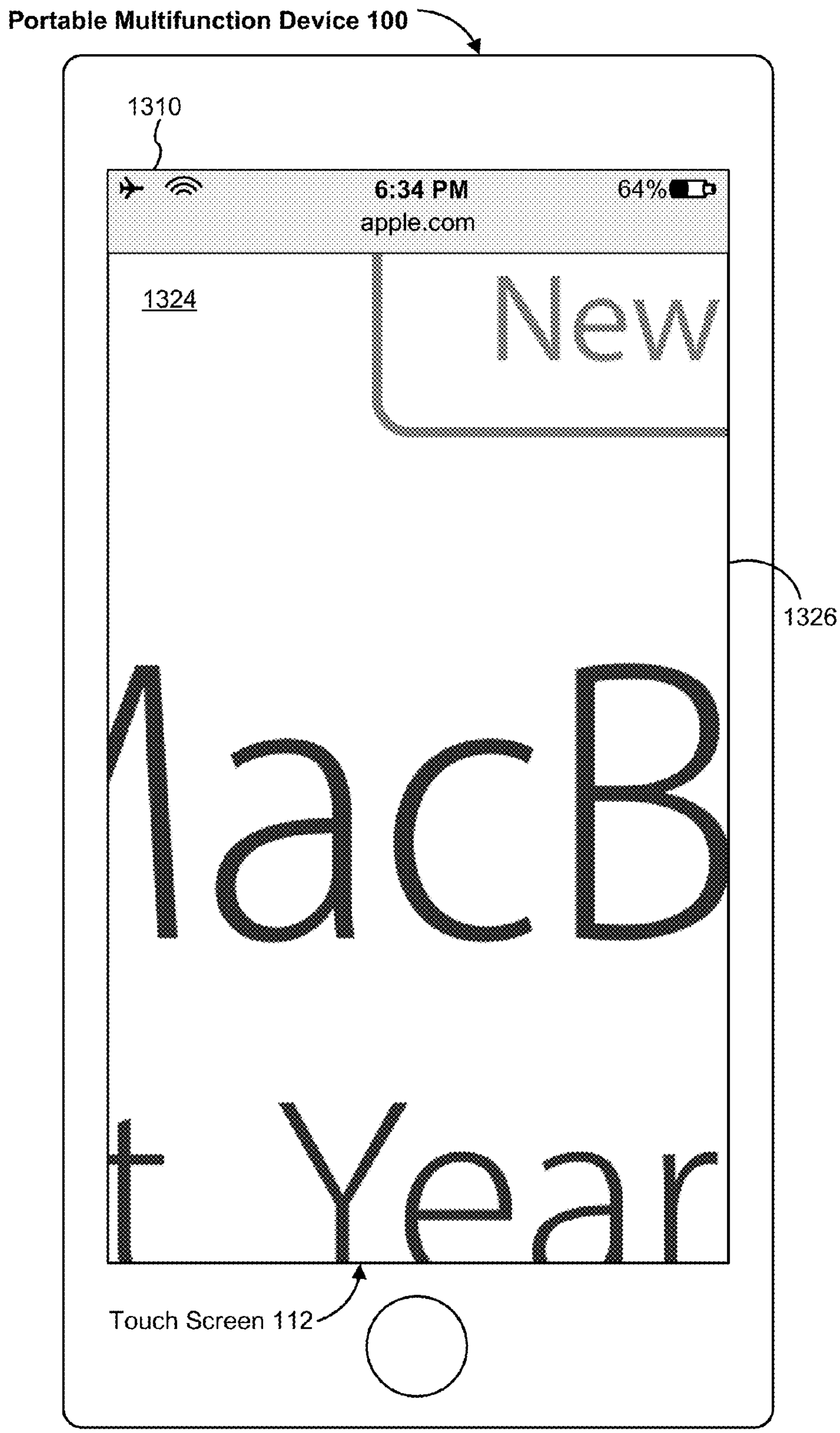

In FIG. 13D, the device detects lift-off of contacts 1302 and 1304, yet webpage 1324 continues to expand due to simulated inertia after lift-off of the contacts, in accordance with some embodiments. While expansion of webpage 1324 continues, the device detects that boundary 1322 of webpage 1324 moving past a threshold position outside the content display region 1326 of the web browser interface 1310, where the threshold position corresponds to a predetermined maximum size of the expanded webpage in a stable state, as shown in FIG. 13E. In response to detecting that the expansion has passed this predetermined maximum size, the device generates tactile output 1320 (e.g., MicroTap (270 Hz) with a gain of 0.6) to indicate that the maximum stable size of the webpage has been reached, and that the webpage will shrink back to this stable maximum size once the influence of the simulated inertia ends. FIG. 13F illustrates the continued expansion of webpage 1324 under the influence of simulated inertia. FIG. 13G illustrates that after webpage 1324 shrink back to the predetermined maximum size and remains at that predetermined maximum size after the influence of simulated inertia is ended.

The display of the webpage 1324 at magnifications greater than the predefined maximum zoom-in amount (magnification) as the webpage zooms in accordance with the movements due to simulated inertia, followed by, in response to detecting termination of simulated inertia, demagnifying the image until the image magnification matches the predefined maximum zoom-in amount (magnification) is another example of a rubber band effect.

Tactile output 1320 reinforces the visual feedback to the user that a rubber band effect is being applied, which automatically displays the webpage at the predefined maximum zoom-in amount (magnification) after lift-off. Providing concurrent visual and haptic feedback enhances the overall feedback to the user that the webpage is being viewed at the predefined maximum zoom-in amount (magnification), which improves the efficiency of zooming webpages.

Figure 13H:
Figure 13I:
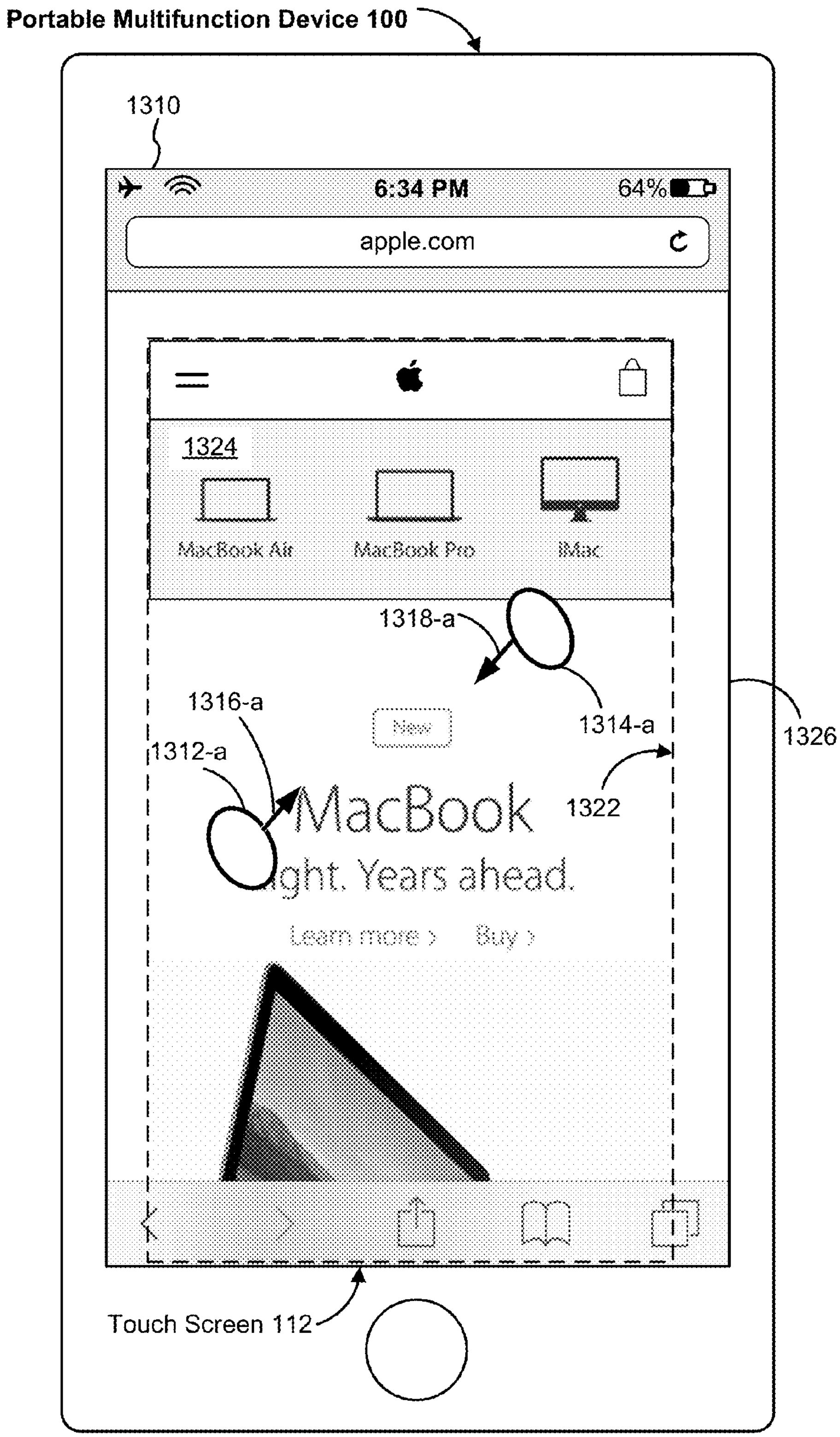

In FIG. 13H, exemplary web browser interface 1310 is displayed on touch screen display 112. In FIG. 13I, the device detects an input, such as a pinch gesture by two contacts 1312 and 1314 moving toward each other across the touch-sensitive surface 112, as indicated by movements 1316 and 1318. In response to detecting the pinch gesture by contacts 1312 and 1314, the device shrinks webpage 1324, such that the position of an outer edge 1322 of webpage 1324 is pulled inside the boundary of content display region 1326. As a result, a smaller version of webpage 1324 is displayed within content display region 1326 with space around webpage 1324.

Figure 13J:
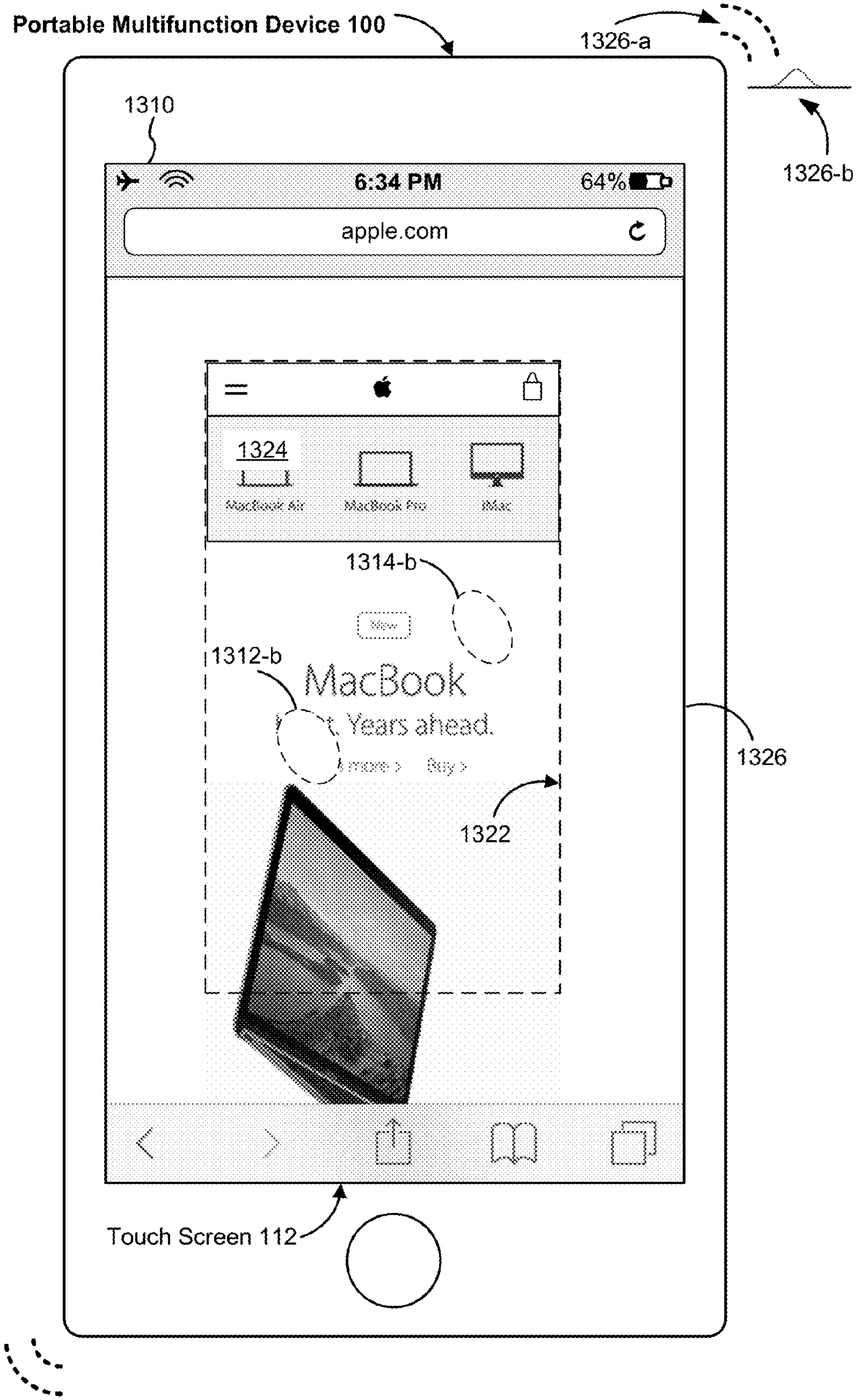
Figure 13K:
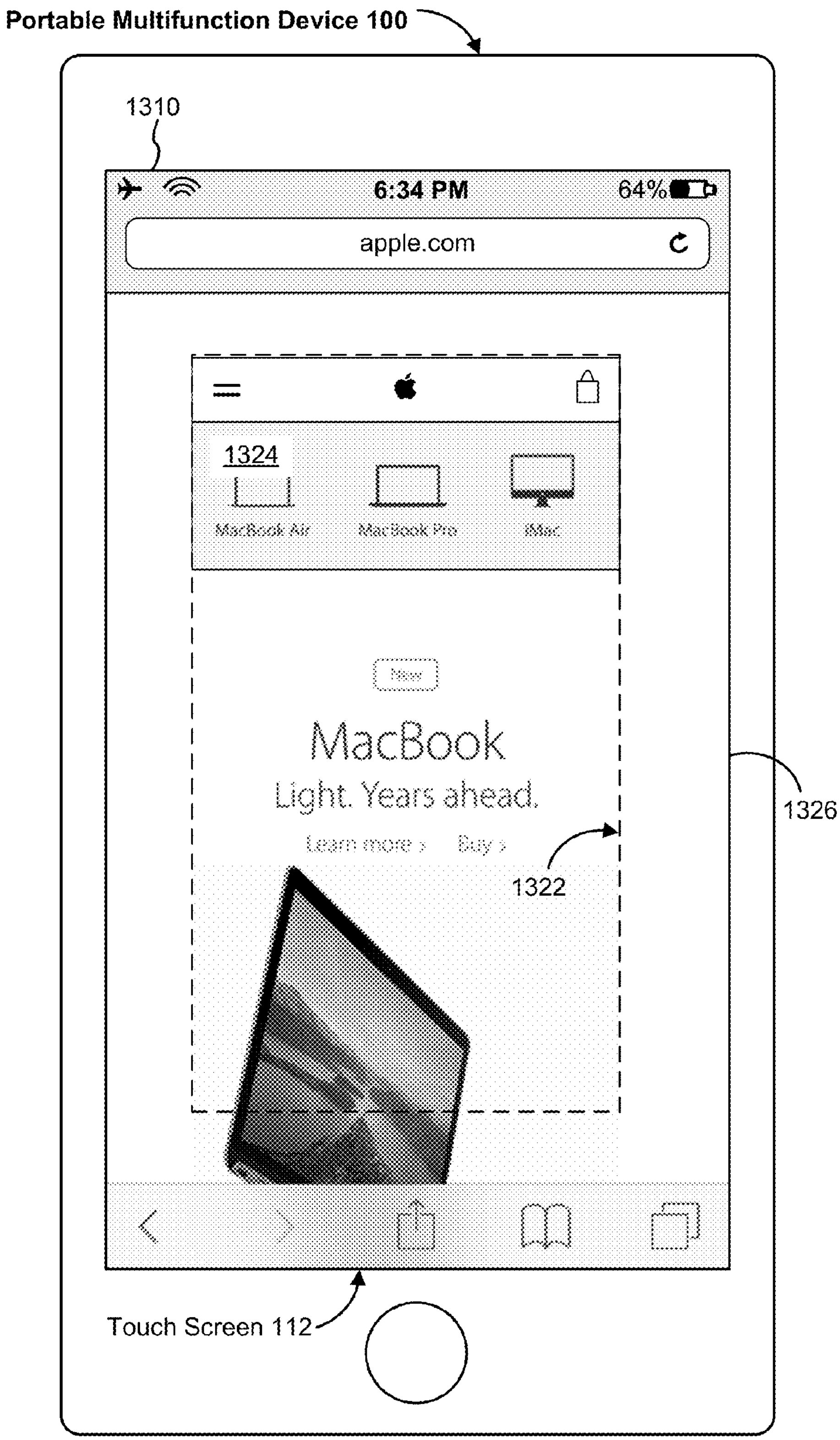
Figure 13L:
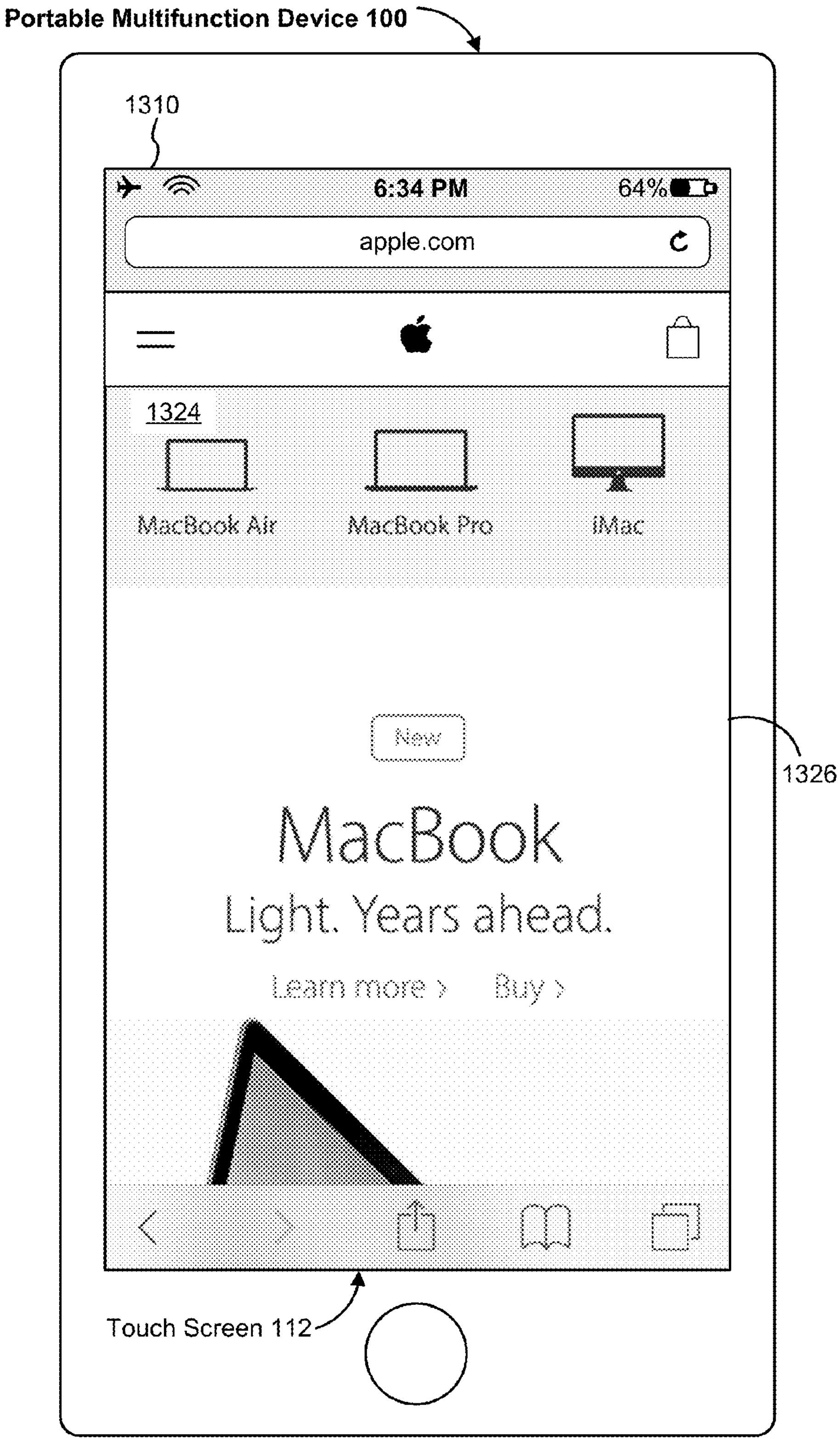

In some embodiments, the previous stable size of webpage 1324 is the original size of webpage 1324 prior to detection of the pinch gesture. In some embodiments, the tactile output is not generated until the device detects a termination of the pinch gesture (e.g., lift-off of at least one of contacts 1312 and 1314 is detected). For example, in FIGS. 13I-13J, as contacts 1312 and 1314 move closer to each other, webpage 1324 continues to shrink in accordance with the movements 1316 and 1318 of contacts 1312 and 1304. In FIG. 13J, in response to detecting the lift-off of contacts 1312 and 1314, the device generates tactile output 1326 (e.g., MicroTap High (270 Hz) with a gain of 0.6) to indicate that the current size of the webpage is an unstable size, and that a rubber band effect will be applied to expand the webpage to a stable size (e.g., the original size which is also the predetermined minimum size of the webpage). As shown in FIGS. 13K-13L, the device restores the size of webpage 1324 by expanding webpage 1324 until boundary 1322 of the webpage coincides with the boundary of the content display region 1326 again (FIG. 13L).

The display of the (background) areas beyond the boundary 1322 of webpage 1324 as the webpage zooms out in accordance with the movements of contacts 1312 and 1314, respectively, followed by, in response to detecting termination of at least one of the contacts, magnifying the image until the boundary 1322 of the webpage once again matches the boundary of content display region 1326 is another example of a rubber band effect.

Tactile output 1236 reinforces the visual feedback to the user that a rubber band effect is being applied, which automatically fills the display with the original size of the webpage after lift-off, after showing the user that the entire webpage is being viewed. Providing concurrent visual and haptic feedback enhances the overall feedback to the user that the entire webpage is being viewed and fills the content display region of the browser interface, which improves the efficiency of viewing webpages.

FIGS. 14A-14T, 15A-15L, and 16A-16K illustrate providing tactile output to indicate creation, picking up, dragging, and dropping of an object, in accordance with some embodiments. The user interfaces in these figures also illustrate providing tactile output to indicate other changes in the user interface, such as snapping to predetermined snap positions, moving cross boundaries in the user interface, shifting to new areas of the user interface, etc. The examples in these figures are used to illustrate the processes described below with respect to FIGS. 30A-30G.

Figure 14A:
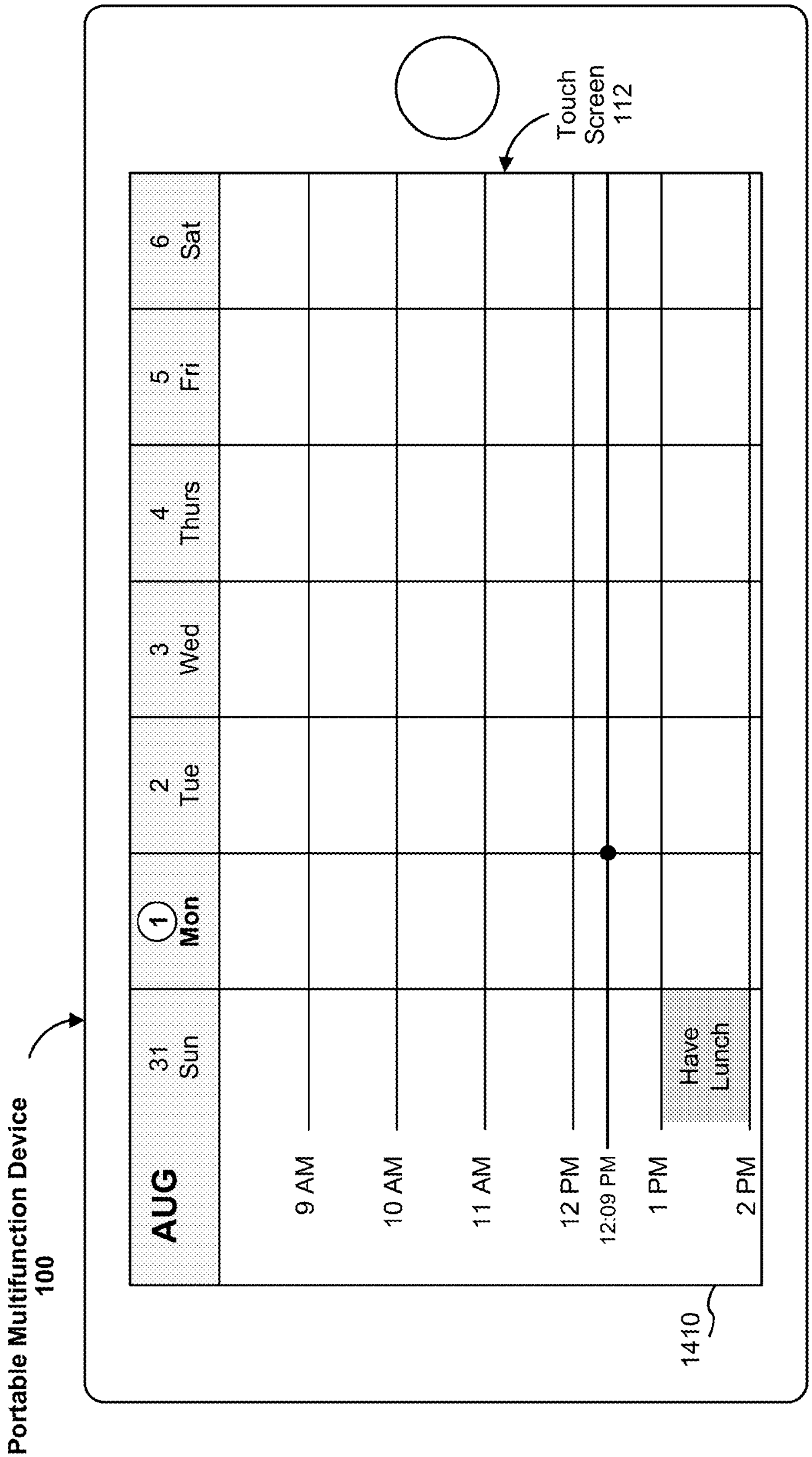
FIGS. 14A-14T illustrate exemplary user interfaces for providing haptic feedback to indicate selection, picking up, dragging, dropping, and/or snapping of objects in a user interface (e.g., a calendar user interface), in accordance with some embodiments.
Figure 14B:
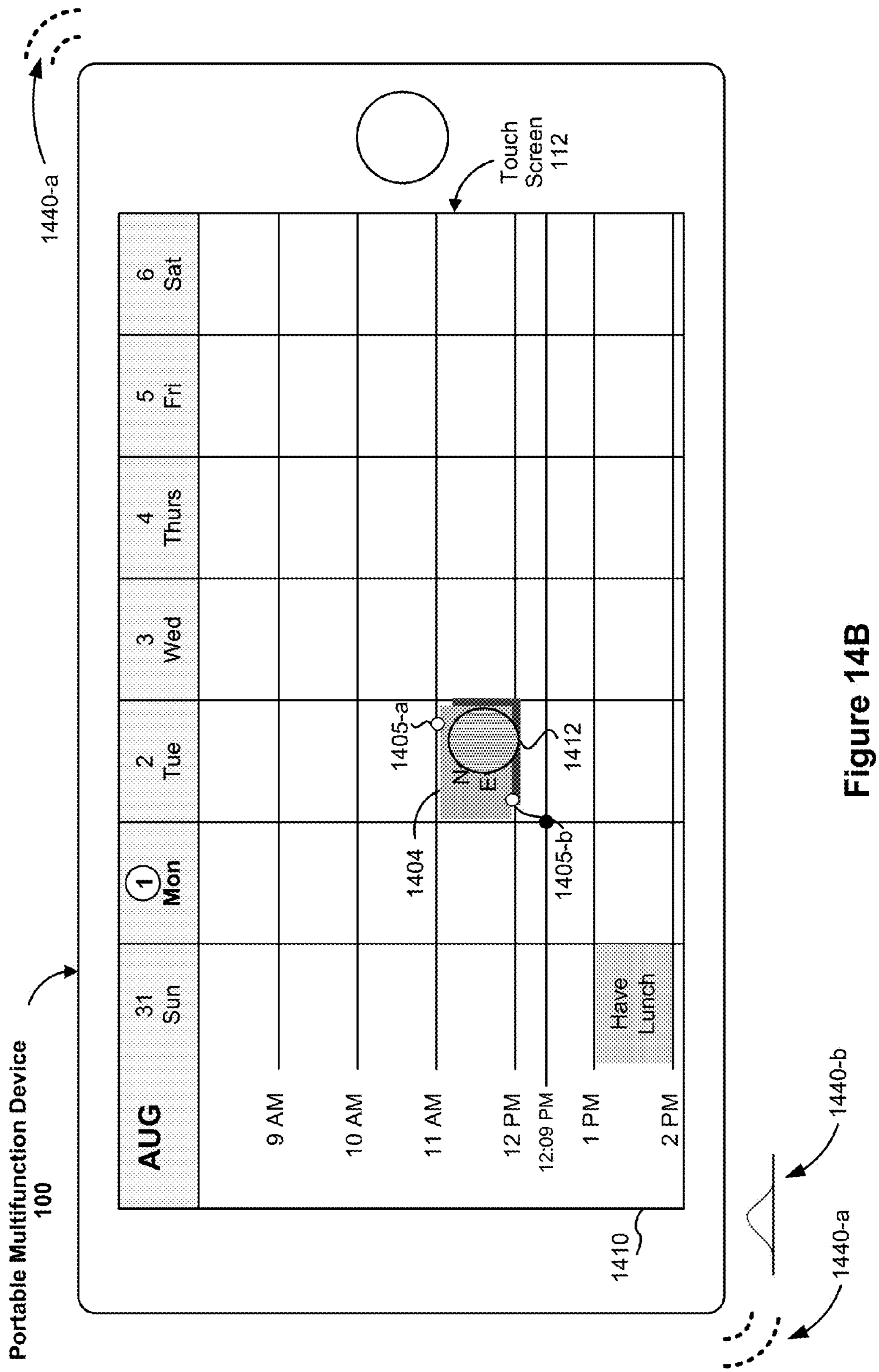
Figure 14C:
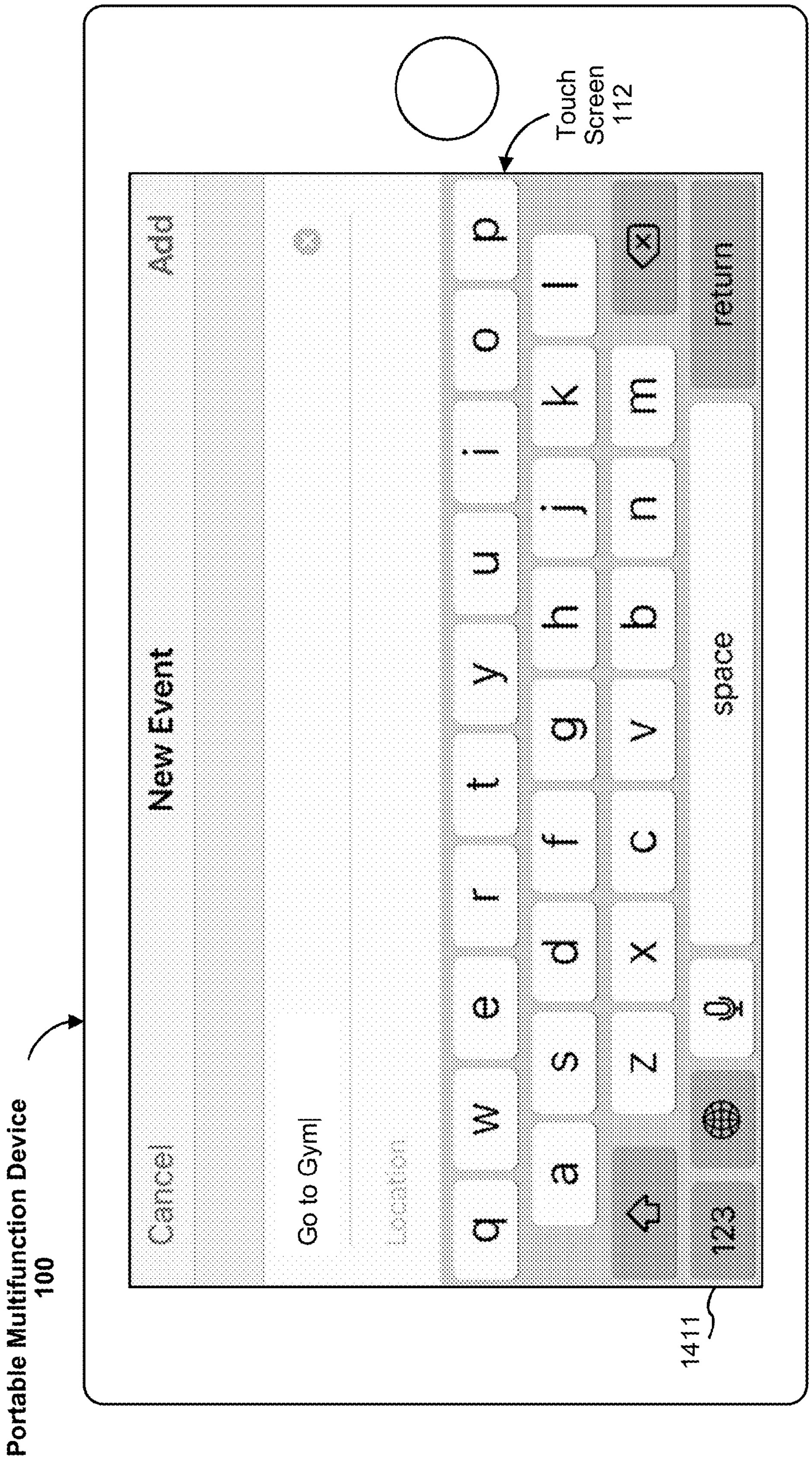
Figure 14D:
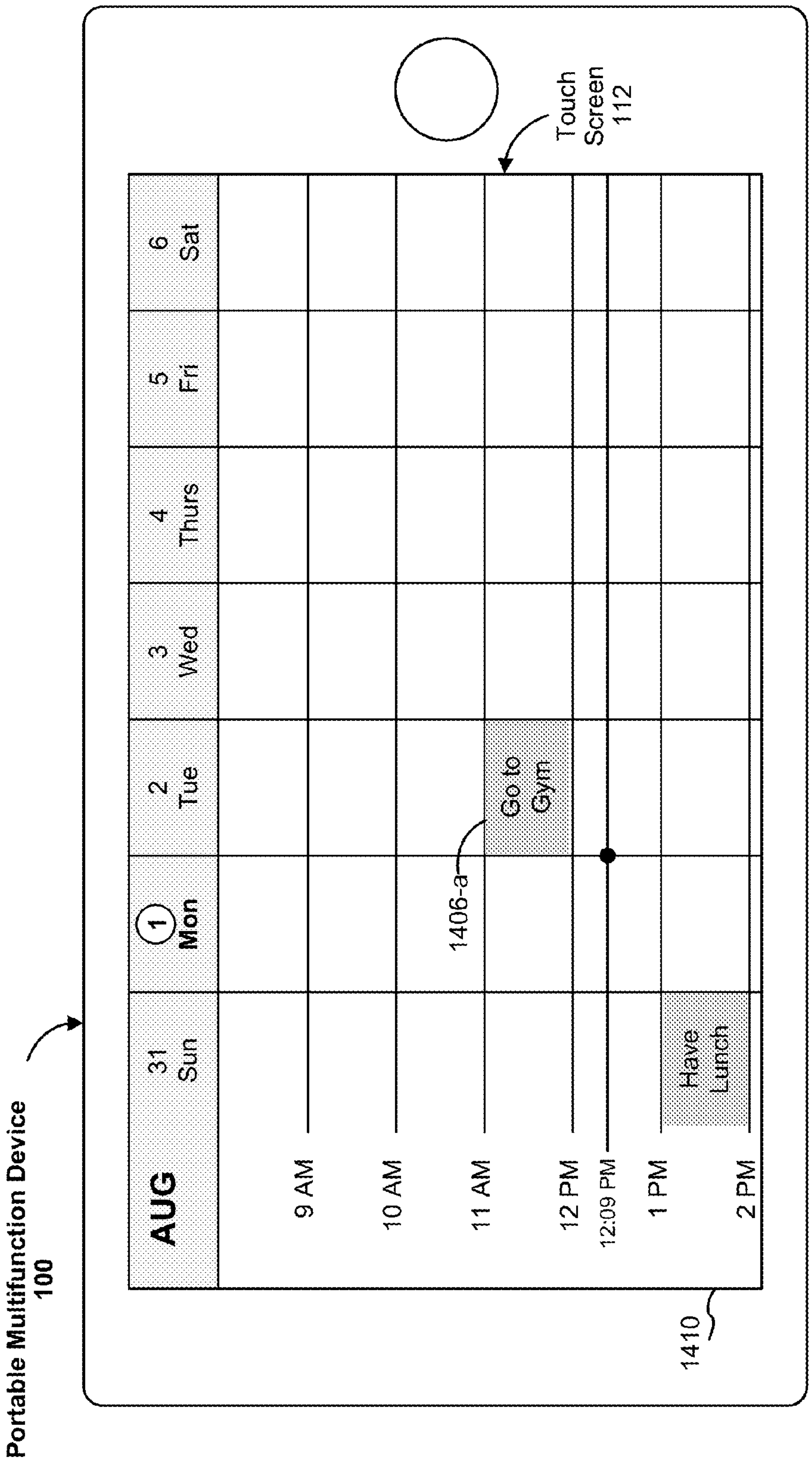
Figure 14E:
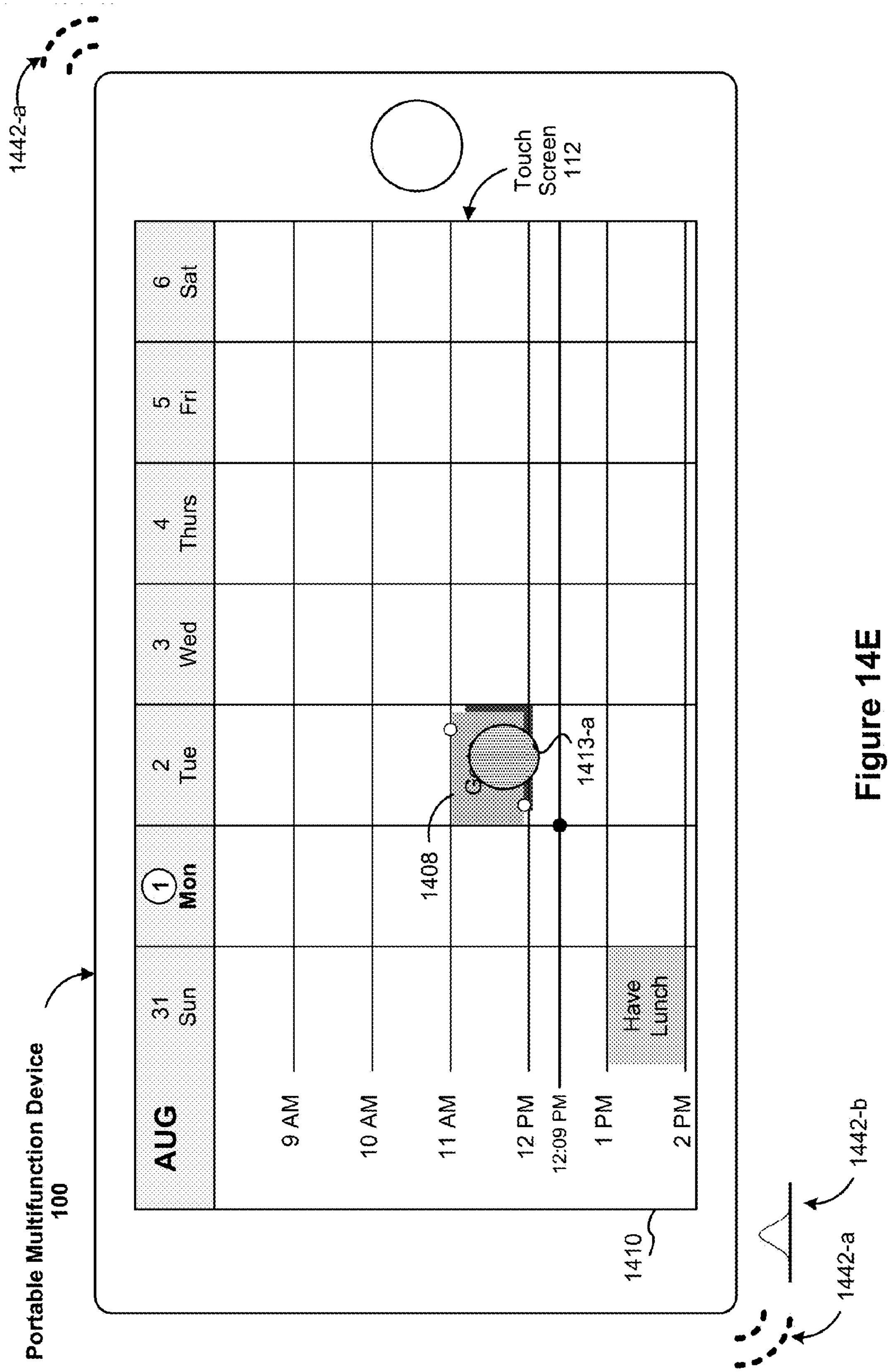
Figure 14F:
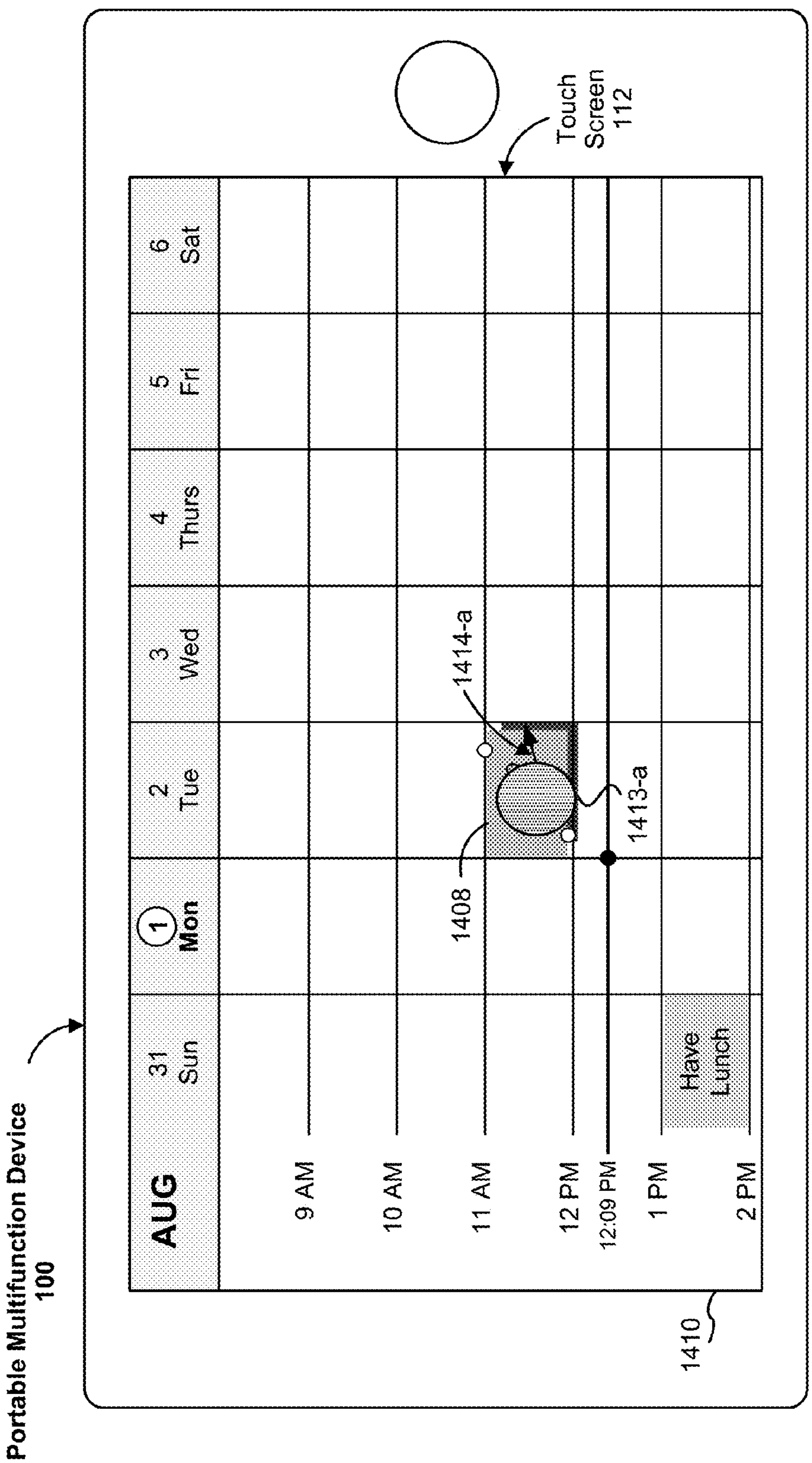
Figure 14G:
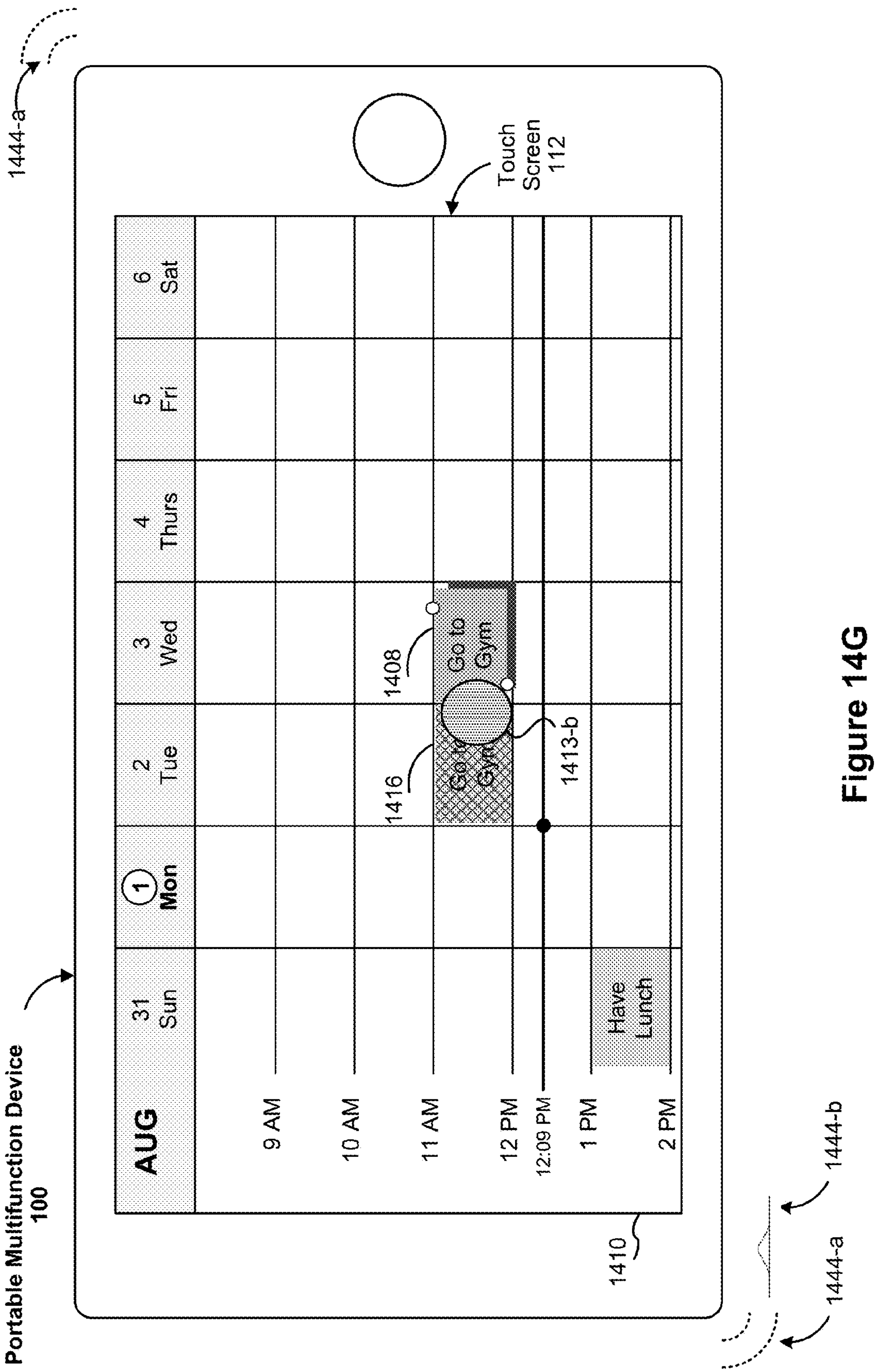
Figure 14H:
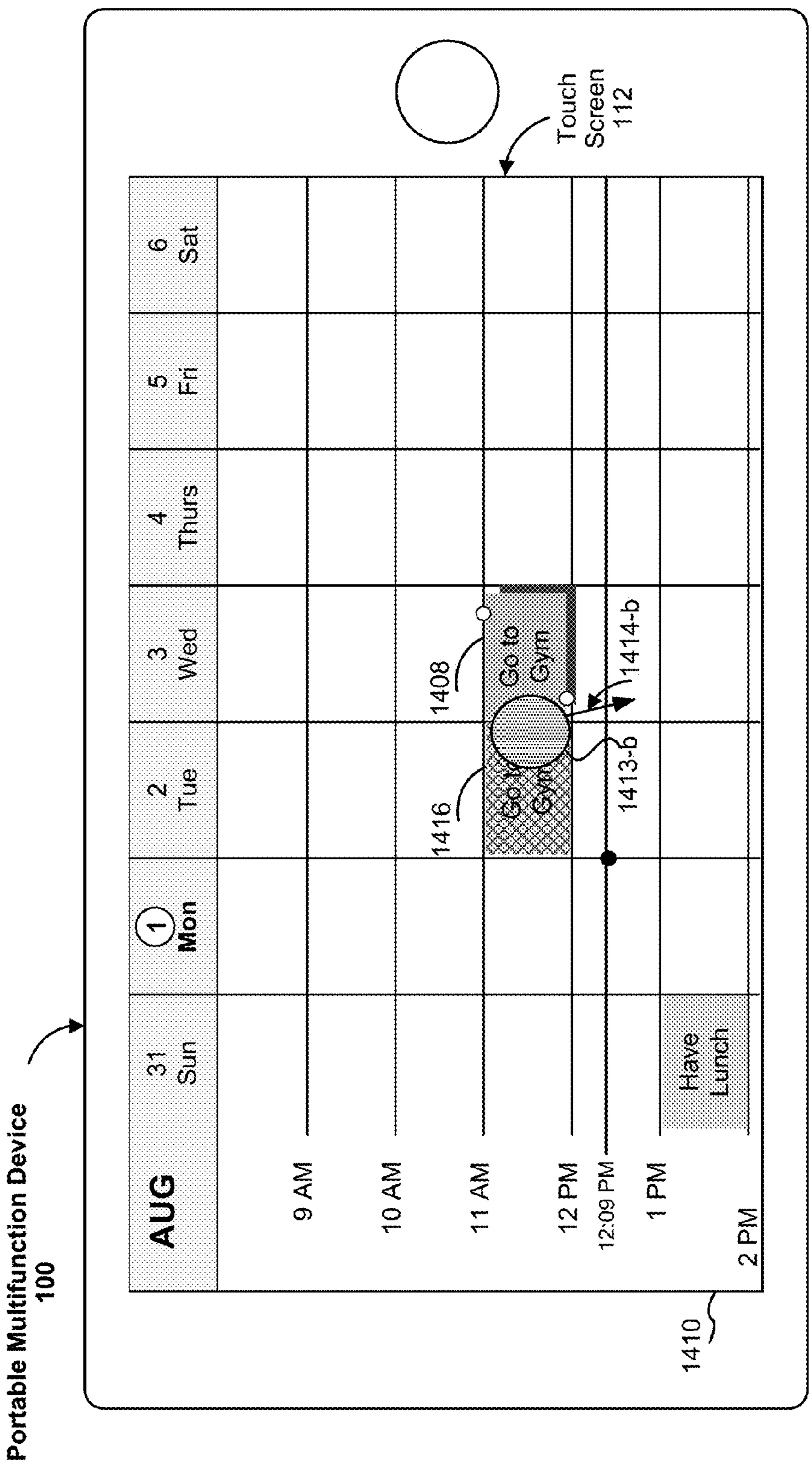
Figure 14I:
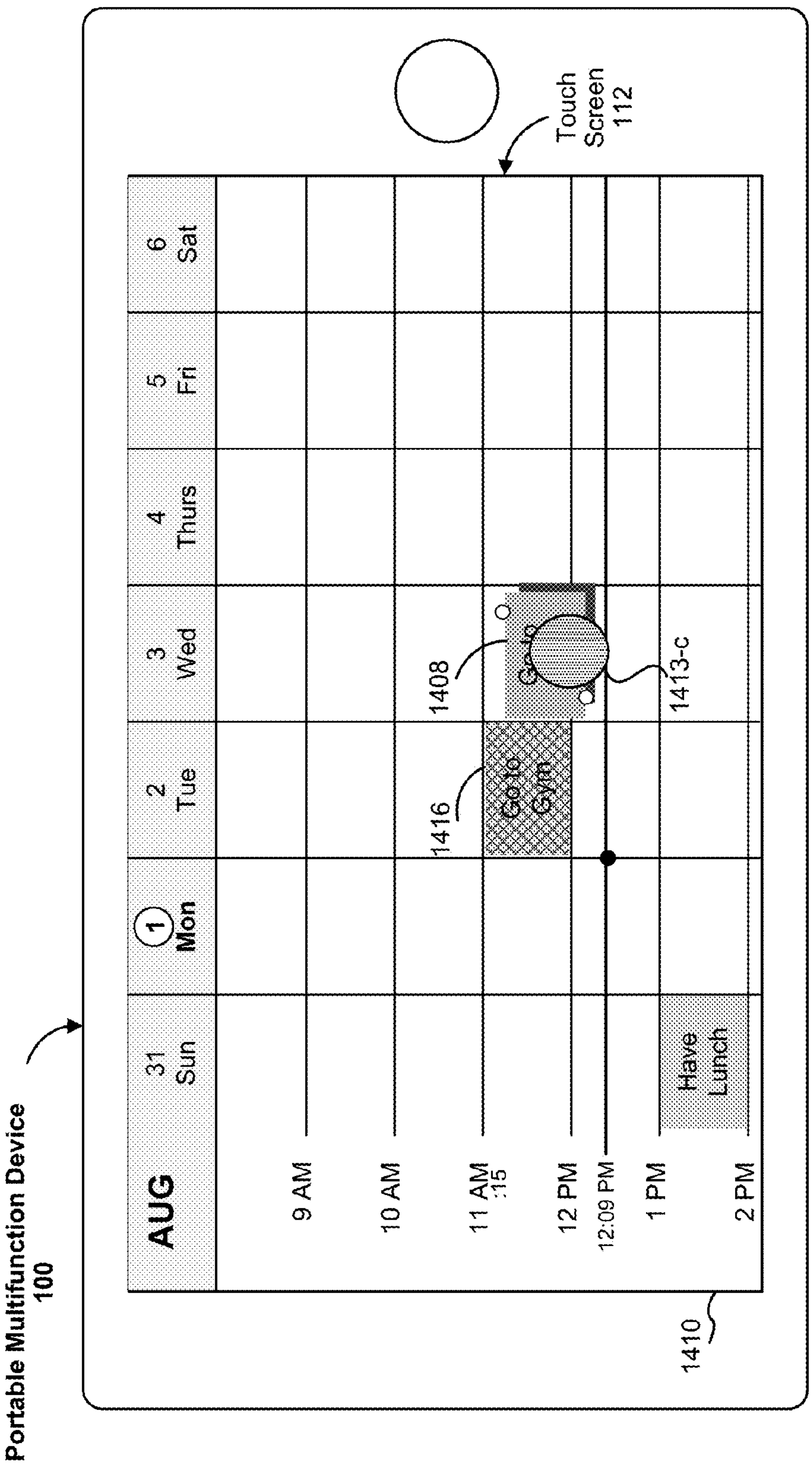
Figure 14J:
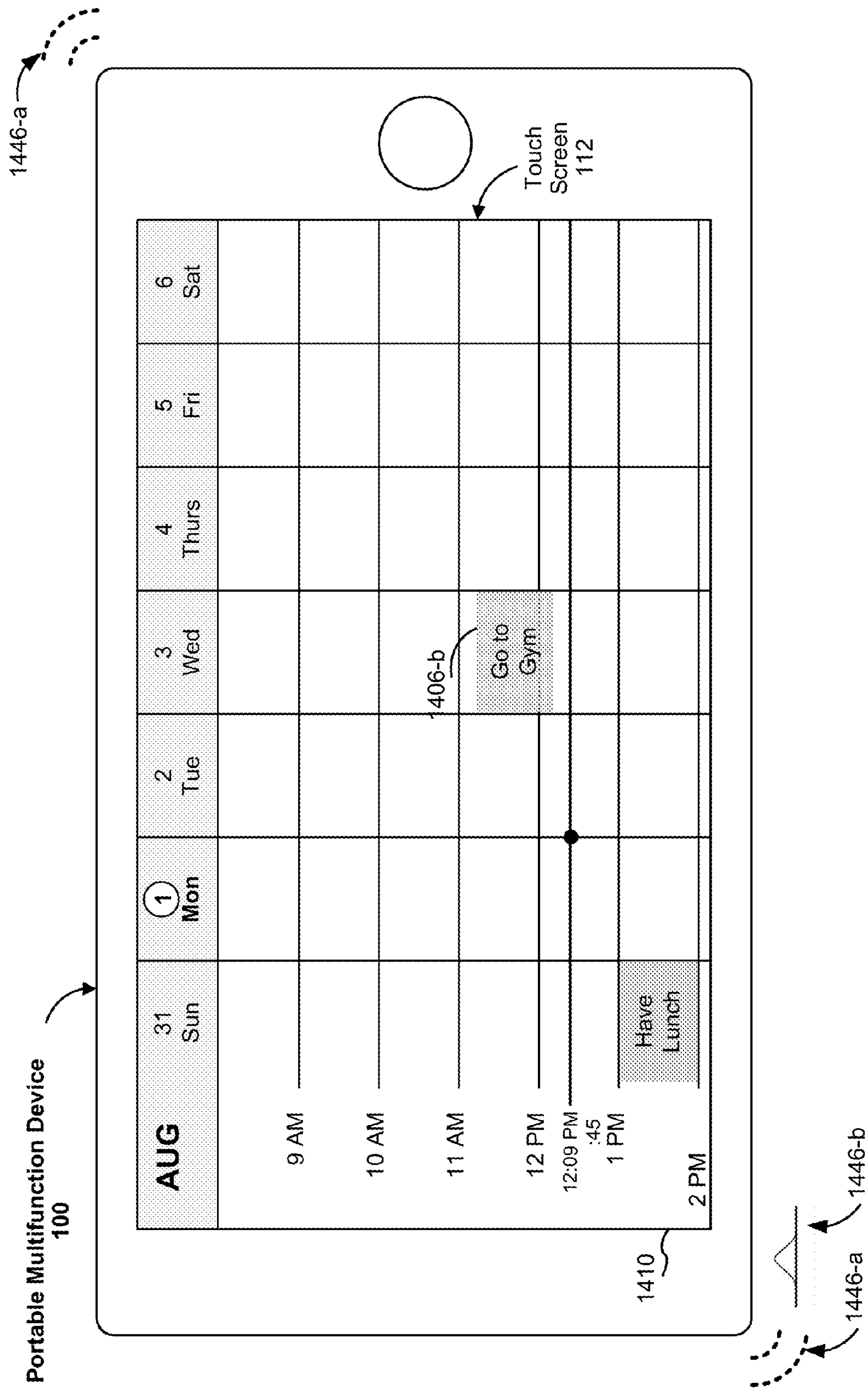
Figure 14K:
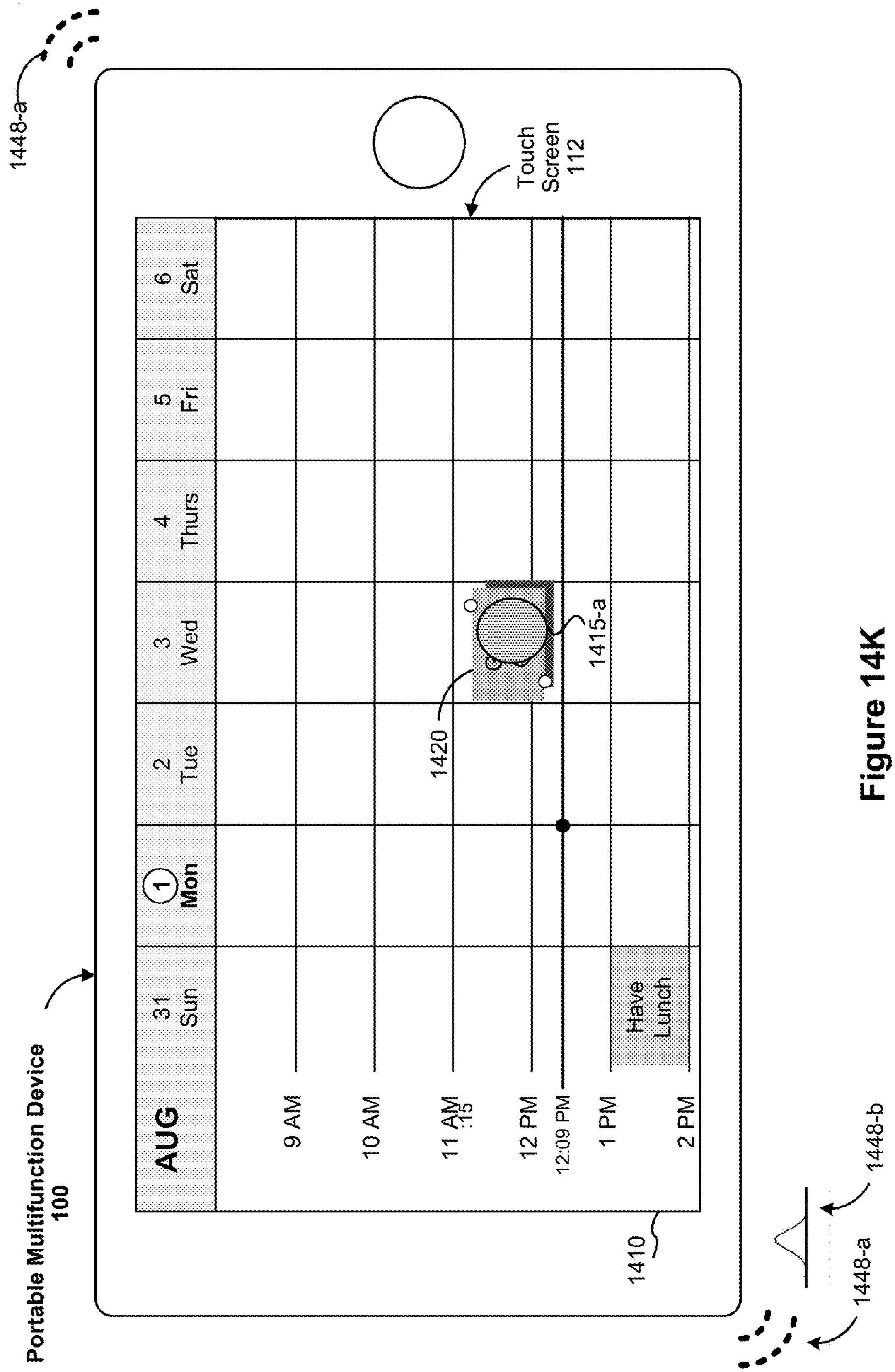
Figure 14L:
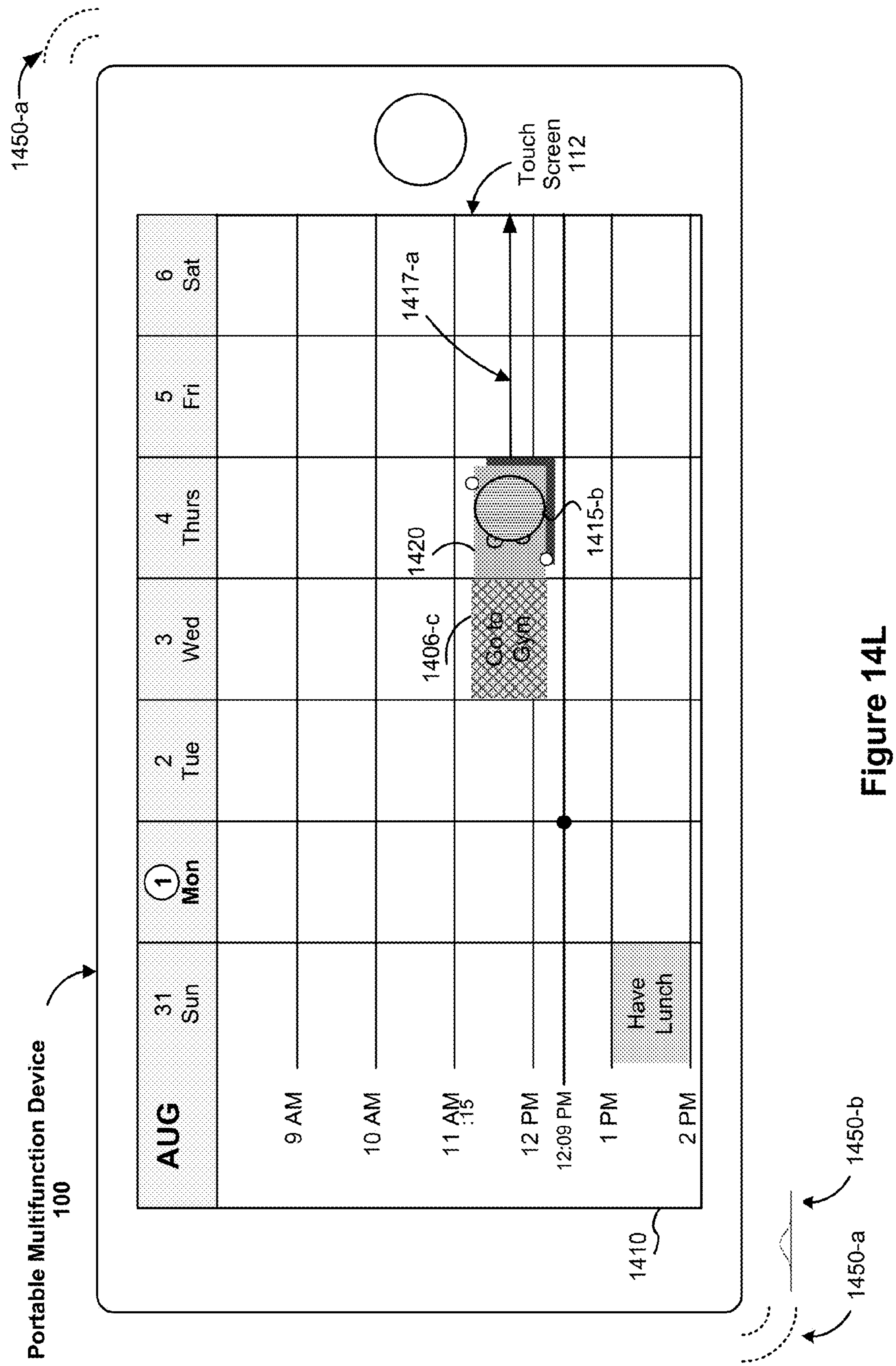
Figure 14M:
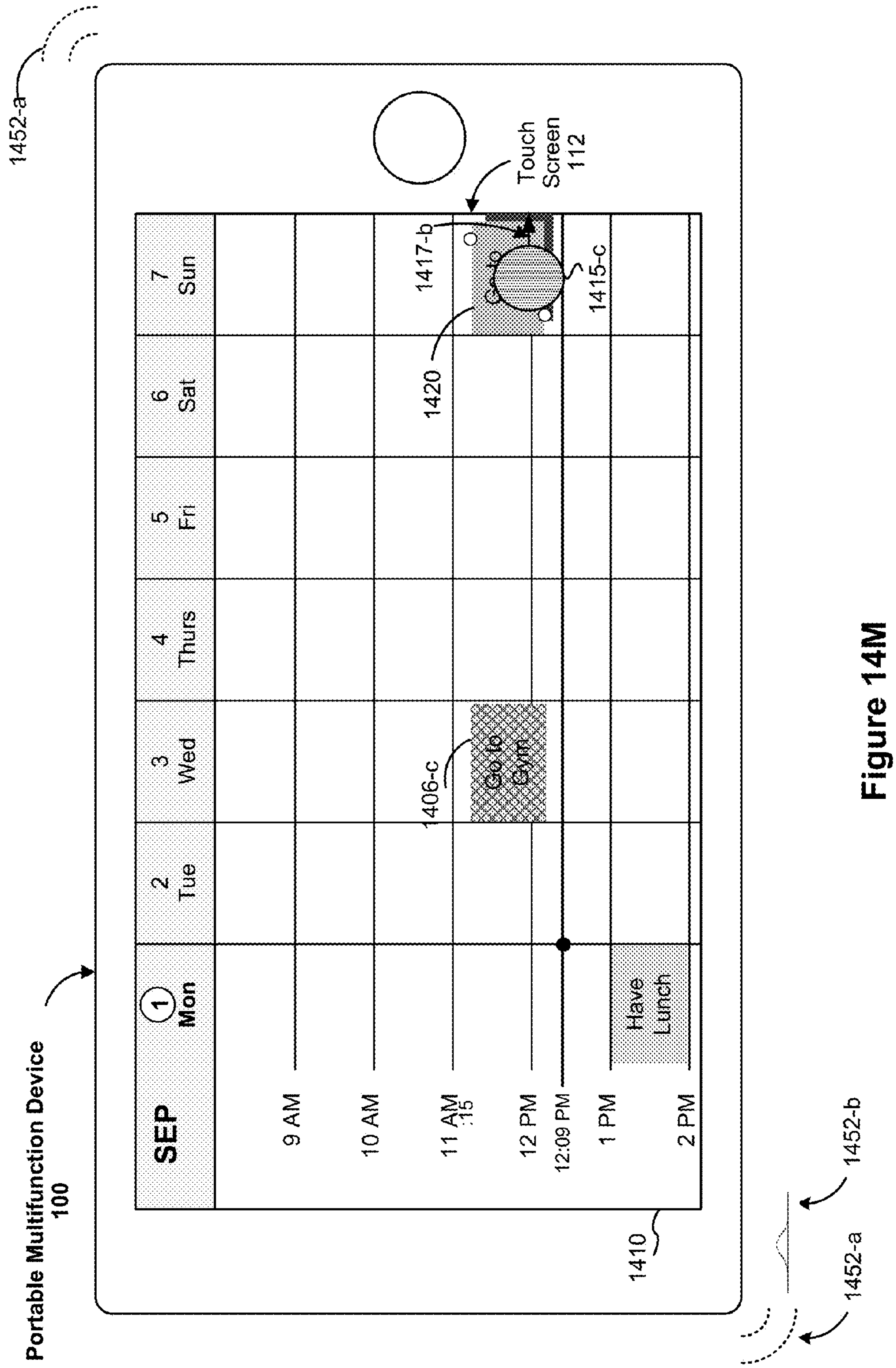
Figure 14N:
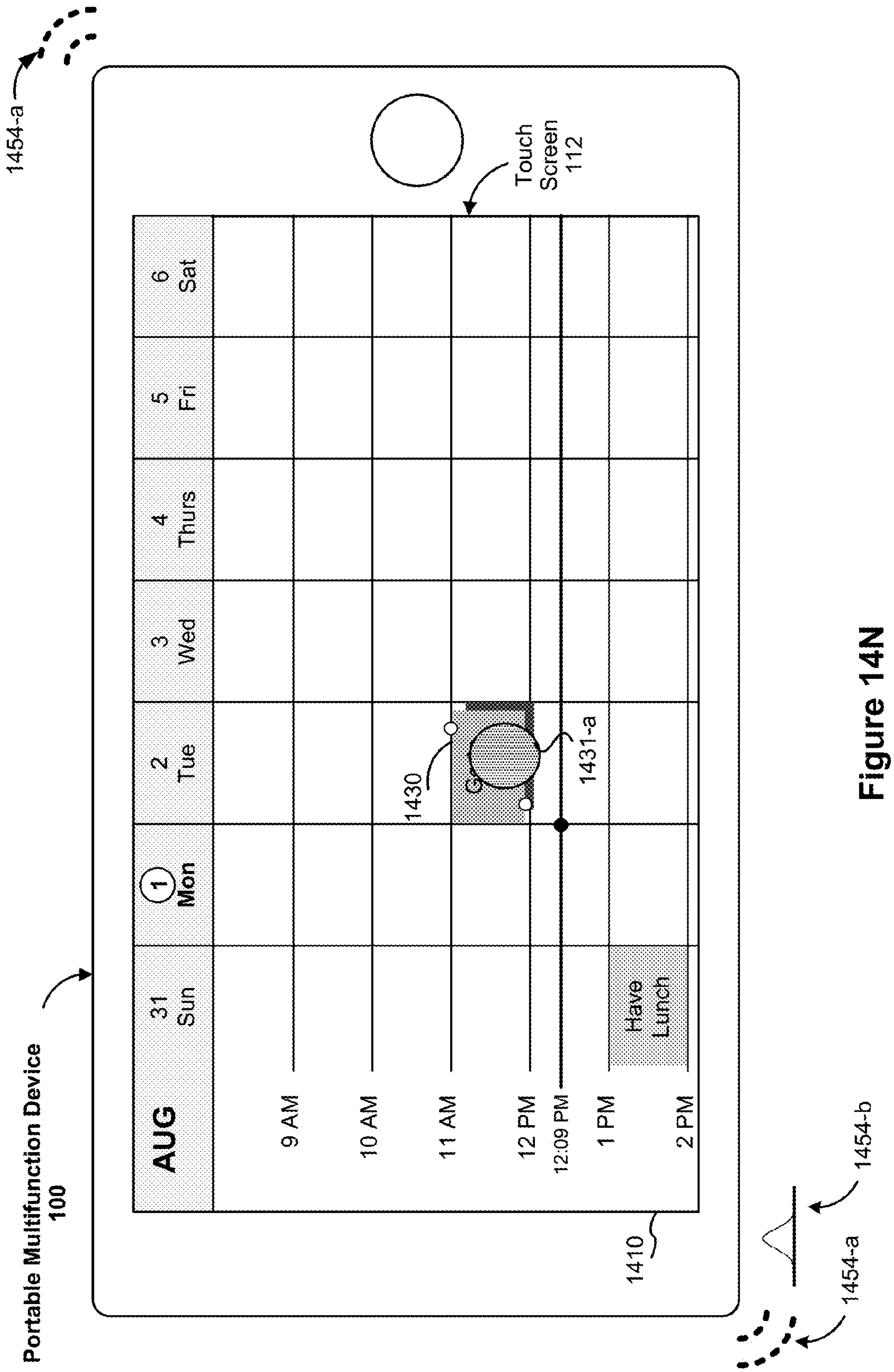
Figure 14O:
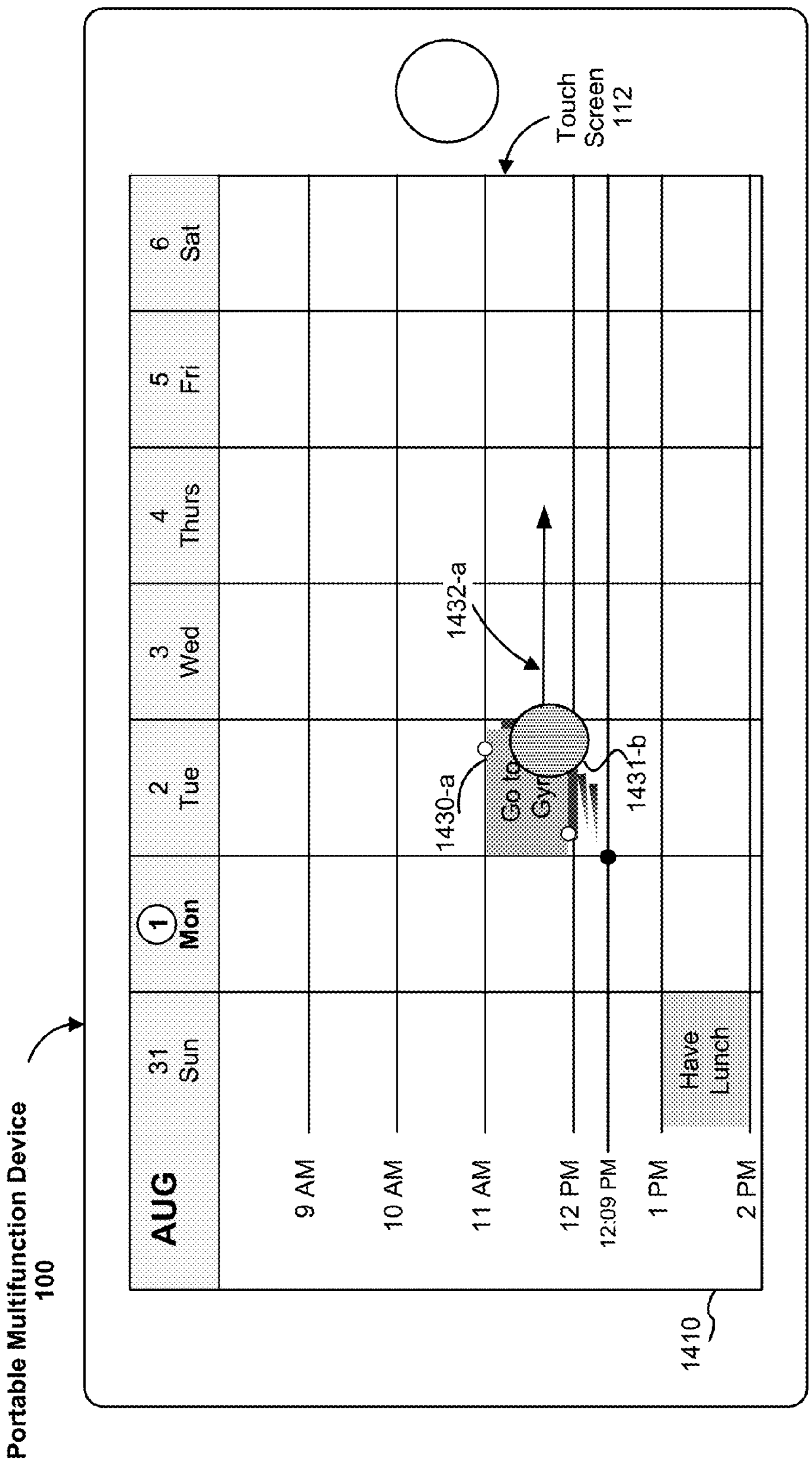
Figure 14P:
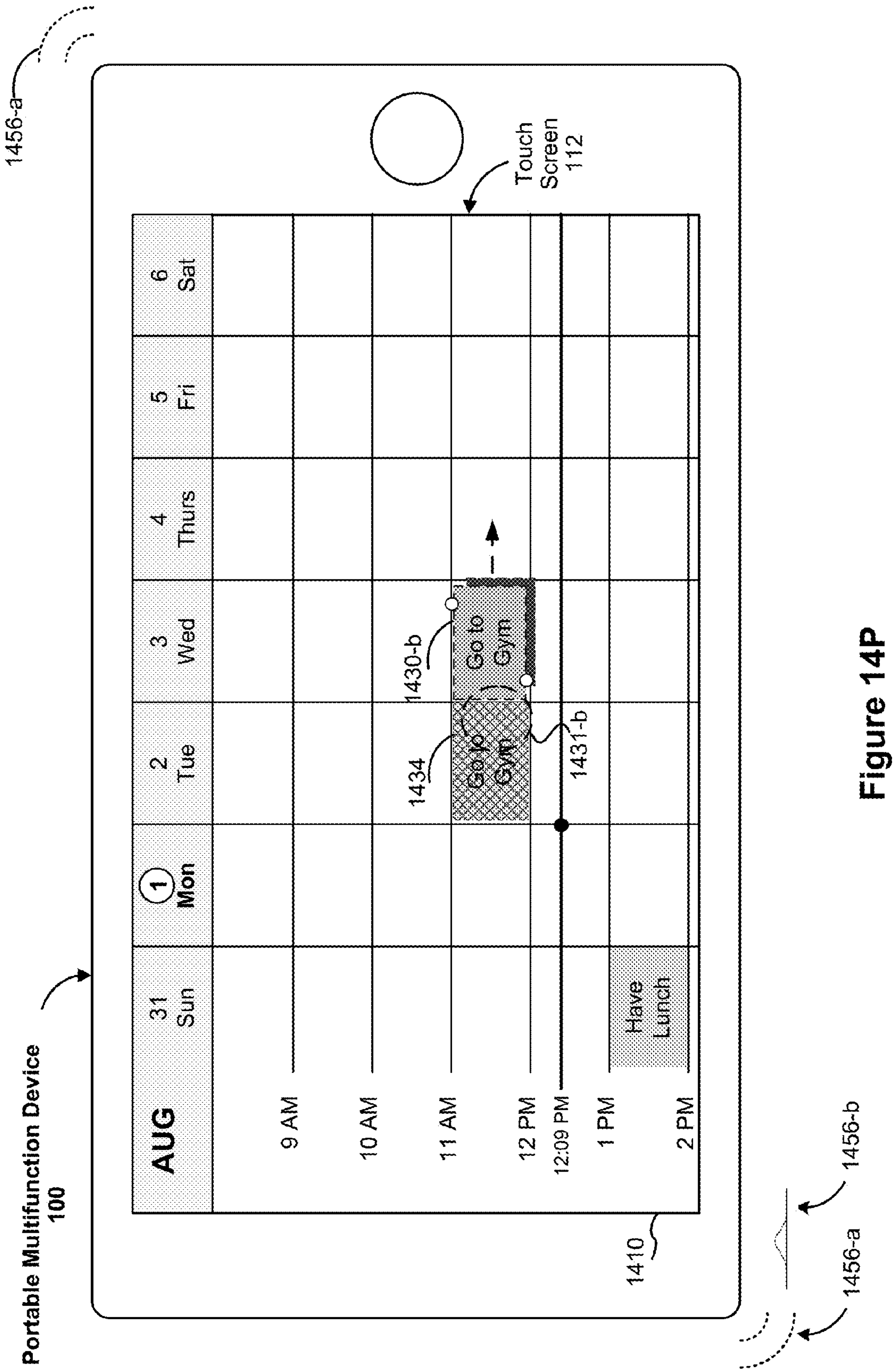
Figure 14Q:
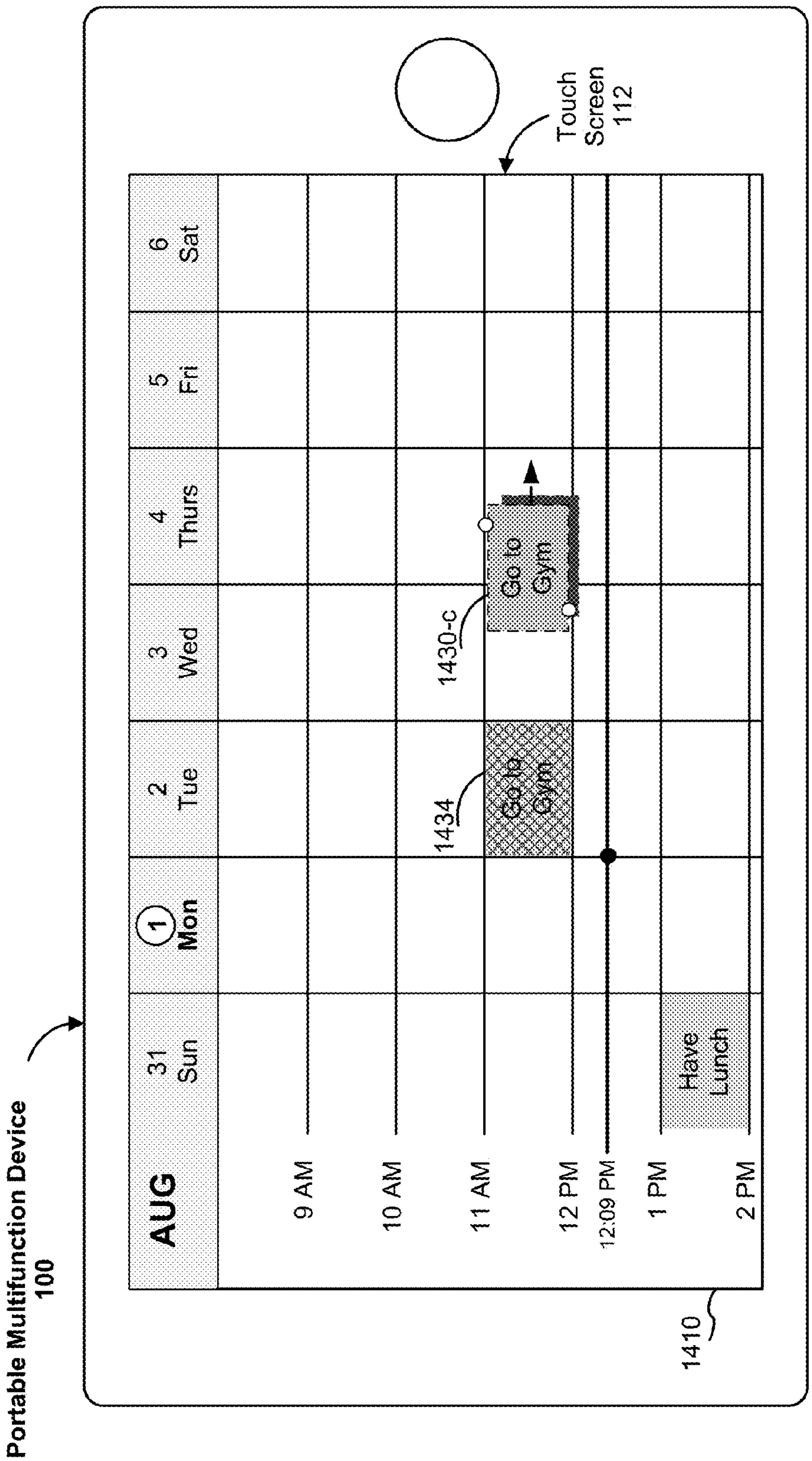
Figure 14R:
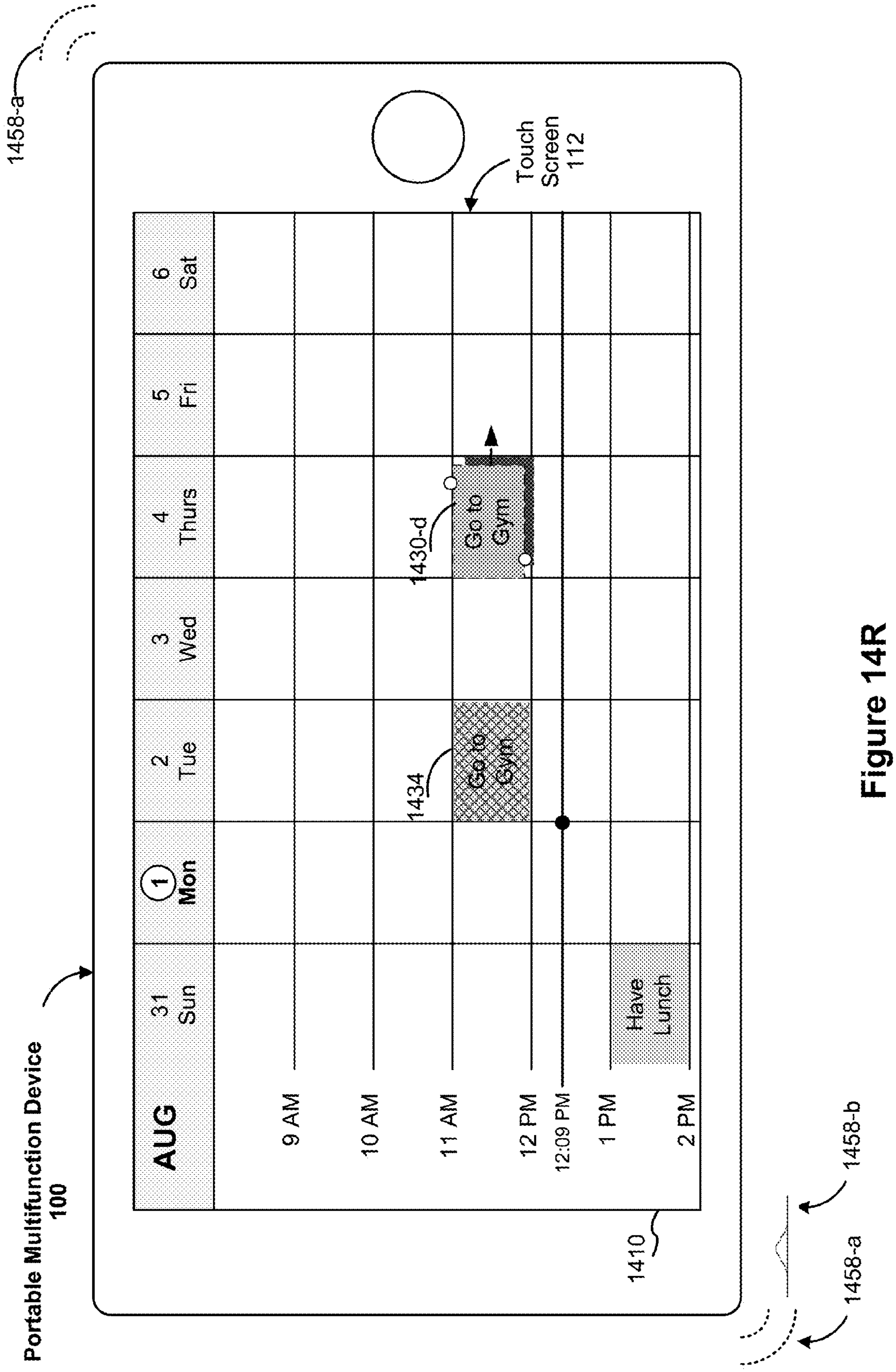
Figure 14S:
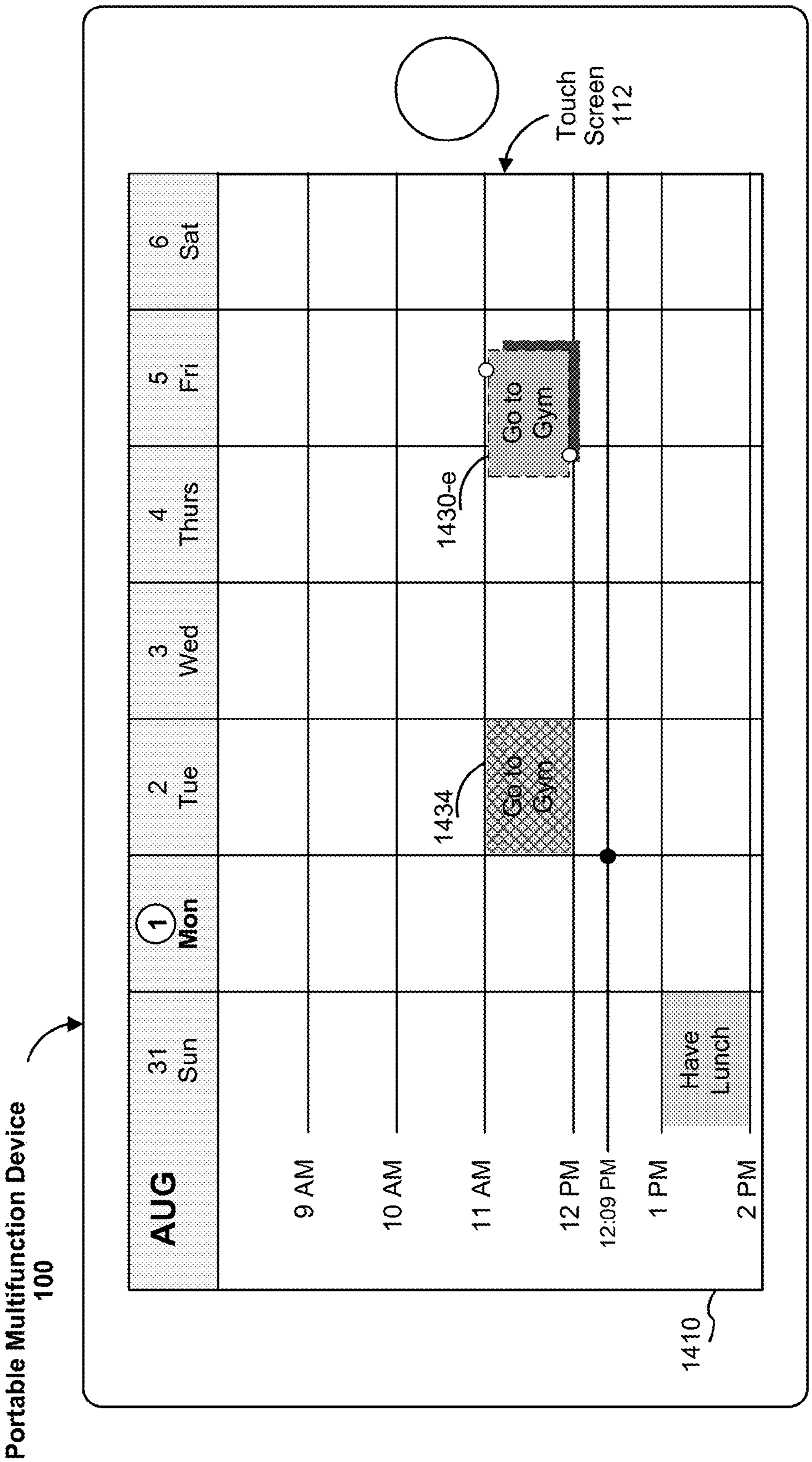
Figure 14T:
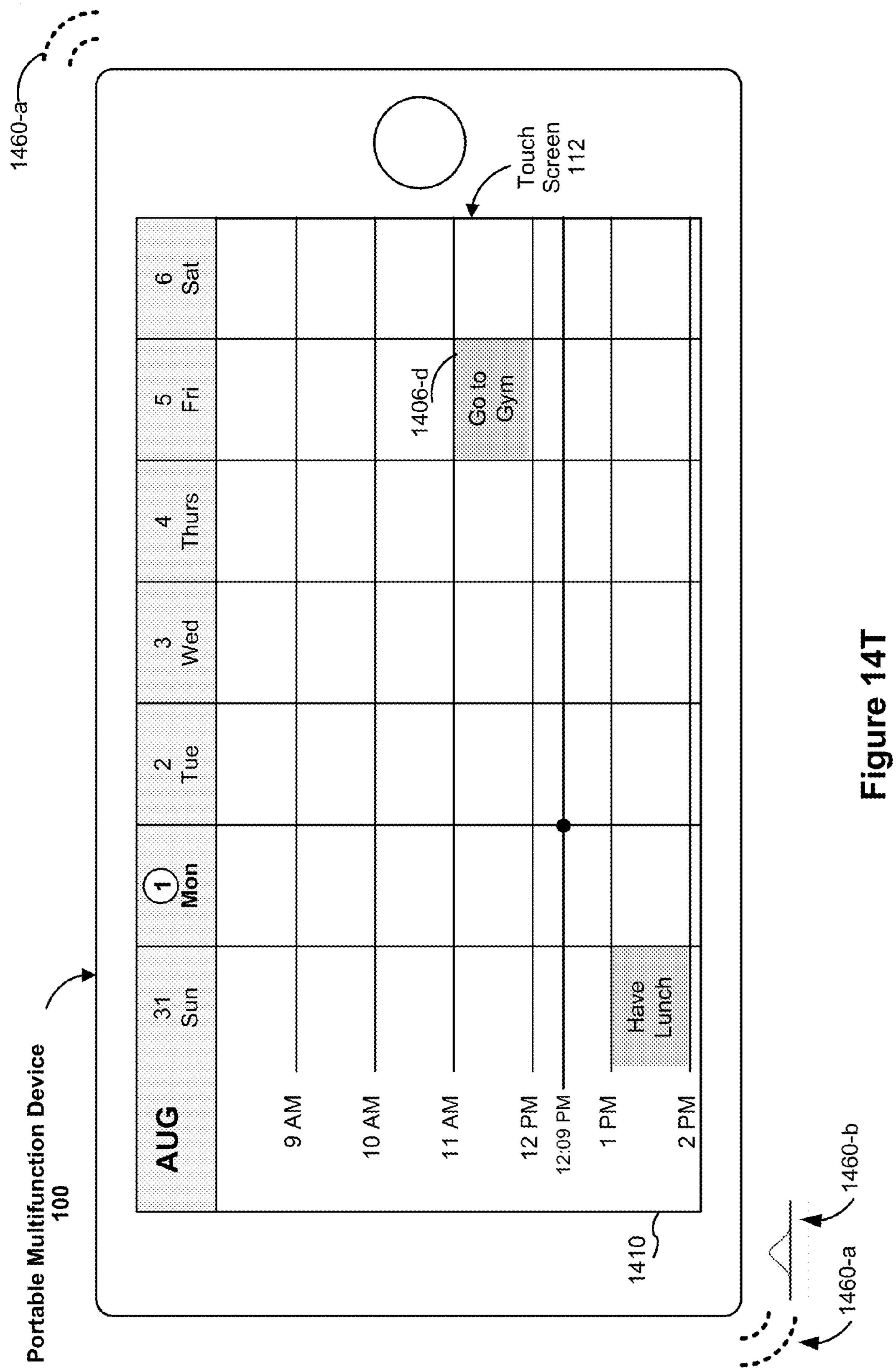

FIGS. 14A-14T illustrate exemplary calendar user interfaces for providing various tactile outputs while performing various calendar event creation and editing functions, in accordance with some embodiments.

FIGS. 14A-14D illustrate exemplary calendar user interfaces for providing tactile outputs during creation of a new calendar entry. In FIG. 14A, a week view calendar interface 1410 is displayed on touch screen display 112. Calendar interface 1410 includes a plurality of predetermined object snap positions. In some embodiments, the plurality of predetermined object snap positions are exact locations on the user interface (e.g., locations that correspond to certain predefined points, lines, cells, and/or areas) that an object would to settle into when the object is released (e.g., dropped, or otherwise freed from factors that influence the object's movement) within a threshold range of the exact locations. For example, in calendar interface 1410, date lines in the calendar grid define object snap positions for a calendar entry, a predefined snap position corresponds a respective date, and a calendar entry would settle between two adjacent date lines when the calendar entry is dropped in proximity to a region between the two adjacent date lines.

In addition to vertical date lines, calendar interface 1410 also includes horizontal lines dividing a day by hour or a fraction of an hour, such that a cell in calendar interface 1410 represents a time slot in a particular day. In some embodiments, the horizontal lines are not the only object snap position, i.e., the object may snap to invisible snap positions between adjacent hour lines (e.g., invisible snap positions correspond to 15 minute intervals away from the hour lines). In some embodiments, calendar interface 1410 also includes a horizontal line with a dot 1405 indicating current time and date to facilitate event marking.

In FIG. 14A, calendar interface 1410 initially contains one existing calendar entry (e.g., "Have Lunch") scheduled for Sunday, August 31. In some embodiments, a user may initiate a new event creation by an input on the touch screen display 112, as shown in FIG. 14B. In some embodiments, the device detects a long press input by contact 1412 on the touch screen 112 (e.g., a contact over the displayed calendar interface 1410 with intensity exceeding $IT_L$ for a predetermined threshold amount of time, e.g., 300 ms) to initiate the creation of a new calendar entry. In some embodiments, the device detects a deep press input having an intensity exceeding $IT_D$ on the displayed calendar interface 1410 to initiate creation of a new calendar entry.

Also shown in FIG. 14B, in response to detecting the input by contact 1412, an object 1404 with label "New Event" is displayed. Object 1404 is displayed in a selected state (e.g., as indicated by resize handle 1405 on object 1404) in calendar interface 1410. In some embodiments, the device displays an animation showing the object being lifted up from the calendar interface toward the surface of the display (e.g., jumping up to contact 1412).

In conjunction with visually indicating the selection of object 1404 (and lifting up of object 1404 toward contact 1412, the device generates tactile output 1440 (e.g., MicroTap High (150 Hz) with a gain of 0.8) to indicate that a new calendar entry is created. Subsequently, in FIG. 14C, a new event information entry interface 1411 is displayed for entering event information, e.g., title "Go to Gym" and/or location for the new calendar entry. In some embodiments, if movement is detected before lift-off of contact 1412, the device optionally generate another tactile output to indicate that the new calendar entry is moved. The tactile output signals to the user that the calendar entry is moved to a location different from its initial location, in case this movement is caused inadvertently by an unintentional movement of contact 1412 before lift-off. No tactile output is generated when no movement of the contact 1412 was detected prior to lift-off of contact 1412, and object 1412 will remain at its original location. Once the event information is entered in interface 1411, the user may select the "Add" affordance to save and return to calendar interface 1410, as shown in FIG. 14D. In FIG. 14D, the title of the new event has been updated to "Go to Gym." Object 1406 is now an existing calendar entry, and appears in an unselected state.

FIGS. 14E-14J illustrate exemplary user interfaces for providing tactile outputs during picking up, dragging and dropping of an existing calendar entry, in accordance with some embodiments. The picking up, dragging, and dropping of the existing calendar entry are performed in response to various portions of an input by contact 1413.

FIG. 14E illustrates picking up an existing calendar entry 1408 in response to a first portion of the input by contact 1413. As shown in FIG. 14E, the device detects a long press input by contact 1413, and changes the appearance of calendar entry 1408 to indicate its selected state. In conjunction with visually indicating the selection and lifting up of calendar entry 1408, the device 100 generates tactile output 1442 (e.g., MicroTap (270 Hz) with a gain of 1.0). Tactile output 1442 for picking up an existing object in FIG. 14E (e.g., MicroTap (270 Hz) with a gain of 1.0) has a higher frequency and amplitude (and/or gain factor) than tactile output 1440 for creating a new object in FIG. 14B (e.g., MicroTap (150 Hz) with a gain of 0.8).

FIGS. 14F-14I illustrate dragging the item in response to a second portion of the input by contact 1413. In some embodiments, the second portion of the input by contact 1413 includes movement of contact 1413 across the touch screen display 112. In some embodiments, the selected object 1408 is dragged by contact 1413 during movement 1414 of contact 1413. During movement of contact 1414, the object 1408 snaps to one or more snap positions (e.g., the date line between Tuesday and Wednesday) when the object and contact 1413 are near these snap positions.

In FIG. 14F, the device detects movement of contact 1413 to a location within a threshold range of date boundary between Tuesday, September 2 and Wednesday, September 3. In FIG. 14G, in accordance with the movement of contact 1413, the device moves the selected object 1408 from Tuesday, September 2 to a time slot on Wednesday, September 3, and displays a ghost image 1416 of the moving object 1408 at its pre-movement object snap position, e.g., 11 AM-12 PM, Tuesday, September 2.

In some embodiments, the selected object 1408 stays at one object snap position (e.g., Tuesday, September 2) until contact 1413 has moved out of the threshold range associated with the current object snap position (e.g., Tuesday, September 2), and reached the threshold range associated with the next snap position (e.g., Wednesday, September 3) such that it appears as though object 1408 slides under the contact and springs to the next snap position (e.g., Wednesday, September 3).

In conjunction with moving object 1408 to the next predetermined object snap position, the device generates tactile output 1444 (e.g., a MicroTap (270 Hz) with a gain of 0.4). In some embodiments, tactile output 1444 for indicating object snapping into a new position has lower amplitude than tactile output 1442 (FIG. 14E) for indicating object being picked up (e.g., MicroTap (270 Hz) with a gain of 1.0).

After object 1408 snaps to a time slot on Wednesday, September 3, in FIG. 14H, contact 1413 moves in a vertical direction as indicated by movement 1414. In accordance with the contact's movement, the device moves object 1408 to a different time of the day, e.g., from starting at 11 AM to starting at 11:15 AM, as shown in FIG. 14I. no tactile output is generated by the device in conjunction with moving the event object to a different time.

In FIG. 14J, the device detects a third portion of the input by contact 1413 and determines that drop-off criteria are met (e.g., lift-off of contact 1413 is detected, and object 1408 is stationary). In response to determining that drop-off criteria are met, the device 100 visually indicates deselection of the object by ceasing to display the ghost object 1416 and/or changing the appearance of the object 1408 to an unselected state. In addition, the device generates tactile output 1446 (e.g., MicroTap (270 Hz) with a gain of 0.6) to indicate that the object 1416 been dropped and has settled into a time slot. In some embodiments, there is a delay between the start of the drop-off and the time when the object finally settles into a snap position, and the device generates tactile output 1416 at a time that is synchronized with the final settling of the object into the snap position. FIG. 14J shows object 1416 in the snap position associated with the drop-off, e.g., the time slot corresponding to 11:15 AM-12:15 PM, Wednesday, September 3, in the unselected state, when tactile output 1446 is generated.

FIGS. 14K-14M illustrate providing tactile output when a previously undisplayed portion of the calendar interface is displayed in response to a calendar entry being moved to a boundary of the calendar interface, in accordance with some embodiments. The process includes first picking up the object and then dragging the object to the edge of the calendar interface.

FIG. 14K illustrates that an existing calendar entry 1420 is picked up by a long press input by contact 1415, and in conjunction with showing the selection and lift-up of calendar entry 1420, the device generates tactile output 1448 (e.g., MicroTap (270 Hz) with a gain of 1.0) to indicate selection of calendar entry 1420.

In FIG. 14L, the device detects movement of contact 1415, and in response to detecting movement of contact 1415, the device moves calendar entry 1420 with the movement of contact 1415. The device generates a respective tactile output (e.g., tactile output 1450 (MicroTap (270 Hz) with a gain of 0.4) each time when calendar entry 1420 snaps into a new time slot (e.g., time slot on September 4) in the calendar interface 1410 when contact 1415 (and calendar entry 1420) moves within the threshold range of the new time slot. During the movement of calendar entry 1420, a ghost image 1406 of the calendar entry is displayed at the original location of calendar entry 1420.

In FIG. 14M, as calendar entry 1420 is dragged close to the edge of the calendar interface 1410, the device shifts the calendar interface 1410 such that a previously undisplayed portion of the calendar interface (e.g., the column corresponds to September 7) is displayed underneath calendar entry 1420 near the edge of the calendar interface. For example, while calendar entry 1420 remains stationary at the edge of the calendar interface 1410, the calendar interface slides leftward underneath calendar entry 1420 such that the next day (September 7) is displayed under calendar entry 1420. The device also generates tactile output 1452 (e.g., MicroTap (270 Hz) with a gain of 0.4) in conjunction with shifting calendar interface 1410 relative to calendar entry 1420. In some embodiments, as contact 1415 is maintained at the edge of calendar interface 1410, the device periodically shifts the calendar interface leftward to reveal additional days until lift-off of contact 1415 is detected. In some embodiments, the device generates a corresponding tactile output each time the calendar interface shifts by a day.

FIGS. 14N-14T illustrate exemplary calendar user interfaces for providing tactile outputs when a calendar entry is flicked across multiple snap positions and settling into a final position in the calendar interface, in accordance with some embodiments.

Similar to moving a calendar entry by dragging as described above with reference to FIGS. 14N-14M, calendar entry 1430 is first selected during a first portion of an input by contact 1431 (e.g., a press input by contact 1431), as shown in FIG. 14N. In response to visually indicating selection of calendar entry 1430 by contact 1431, the device generates tactile output 1454 (e.g., MicroTap (270 Hz) with a gain of 1.0) to indicate selection of calendar entry 1430.

In FIG. 14O, the device detects the second portion of the input by contact 1431 that includes a fast movement 1432 of contact 1431 (e.g., a fling or flick gesture) across the touch screen display 112 followed by lift-off of contact 1431 (e.g., at a location between September 2 column and September 3 column).

FIGS. 14P-14S shows that, calendar entry 1430 continues to move to the right across multiple days under the influence of simulated inertia. the device snaps calendar entry 1430 to a time slot in each day that calendar entry 1430 passes, and generates a corresponding tactile output (e.g., tactile output 1456 and tactile output 1458, respectively (e.g., MicroTap (270 Hz) with a gain of 0.4) to indicate that calendar entry 1430 has moved to a new snap position.

In FIG. 14S, when calendar entry 1430 has slowed down enough (e.g., the speed of calendar entry 1430 drops to zero or a threshold speed) after the termination of the input by contact 1431, the device determines that drop-off criteria are met. As shown in FIGS. 14S-14T, when the speed of calendar entry 1430 drops below the threshold speed and calendar entry 1430 is within a threshold range of a predetermined snap position (e.g., a slot on September 5), the device snaps calendar entry 1430 to the predetermined snap position in the calendar interface 1410 (FIG. 14T). When calendar entry 1430 settles into the snap position, the device generates tactile output 1460 (e.g., MicroTap (270 Hz) with a gain of 0.6) as shown in FIG. 14T. In FIGS. 14Q and 14S, before calendar entry 1430 snaps into any snap position (e.g., when calendar entry 1430 is between date lines), no tactile output is generated.

In FIG. 14T, after calendar entry 1430 settles into the final snap position, the device visually indicates deselection of calendar entry 1430 and ceases to display the ghost image 1434.

FIGS. 15A-15L illustrate providing various tactile outputs when re-arranging weather items in a listing of weather items, in accordance with some embodiments. The re-arrangement of the weather items is performed in accordance with picking up one of the weather items and moving the weather item either by a drag gesture or by a flick gesture. Movement of the weather item in accordance with a drag gesture is shown in FIGS. 15B-15E, and movement of the weather item in accordance with a flick gesture is shown in FIGS. 15F-15L.

In this example, tactile outputs are generated when a weather item is picked up from a snap position and dropping off at another snap position. Additional tactile outputs are generated in conjunction with automatic movements of other weather items that are not picked up, e.g., other items snapping into nearby snap positions to make room for the item that is being dragged or flicked, and other items bumping into one another as they move to make room for the item that is being dragged or flicked, as explained in greater detail below.

Figure 15A:
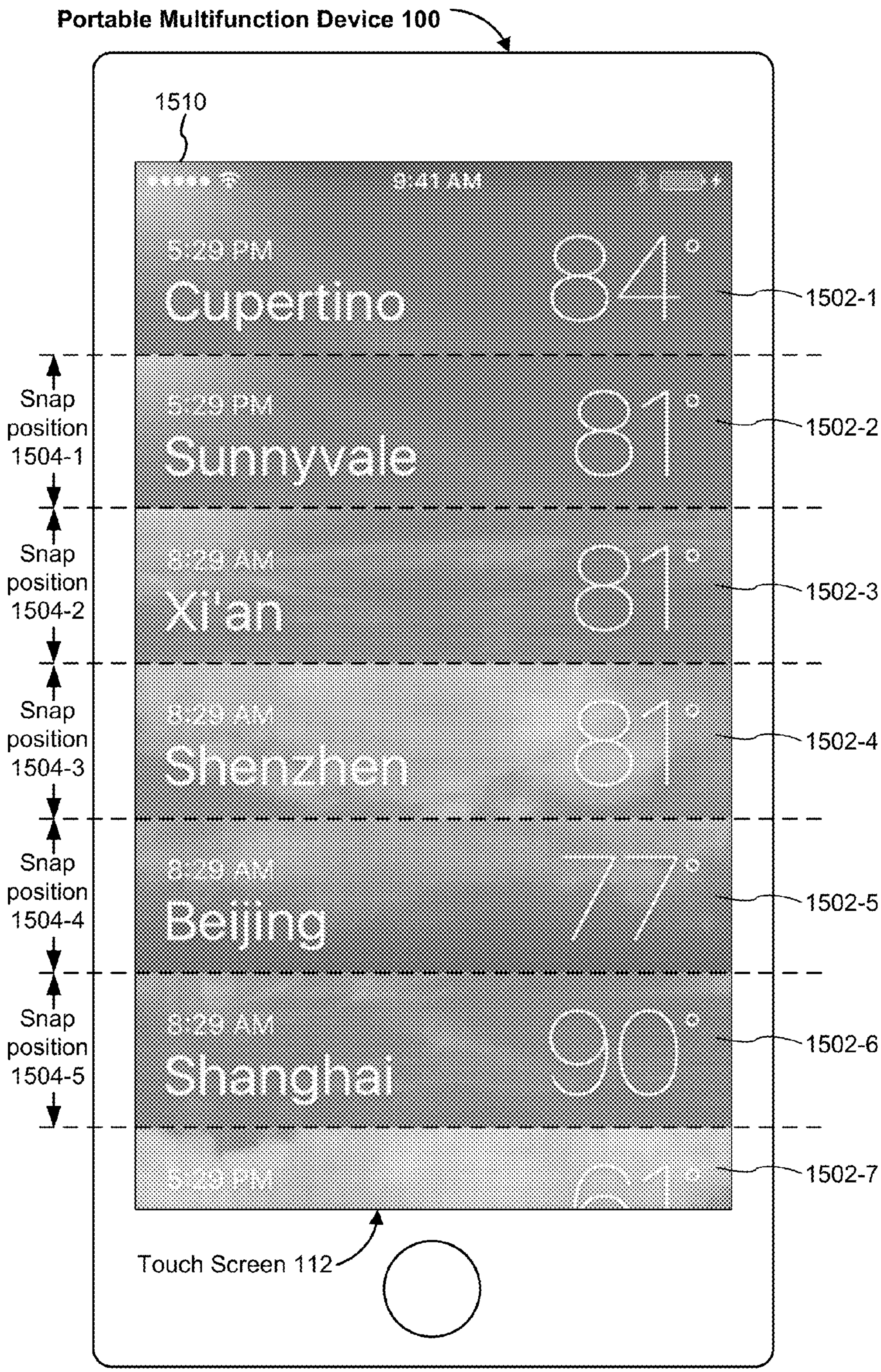
FIGS. 15A-15L illustrate exemplary user interfaces for providing haptic feedback to indicate selection, picking up, dragging, dropping, and snapping of objects in a user interface (e.g., a weather forecast user interface), in accordance with some embodiments.

In FIG. 15A, a weather forecast interface 1510 is displayed on touch screen display 112. Weather forecast interface 1510 includes a plurality of weather items arranged in a list. Each weather item provides an indication of weather at a respective geographical location. For example, a listing of weather items 1502 (1502-1 through 1502-7) correspond to weather forecasts for a plurality of cities. For example, item 1502-1 provides current weather conditions for the city of Cupertino, item 1502-2 for the city of Sunnyvale, item 1502-3 for Xi'an, 1502-4 for Shenzhen, 1502-5 for Beijing, 1502-6 for Shanghai, and 1502-7 for a different city etc. In the weather forecast interface 1510, these items 1502 are located next to one another, i.e., occupying adjacent slots (e.g., snap positions 1504). Boundary lines between adjacent weather items define snap positions 1504 for these weather items 1502. For example, Shenzhen weather item 1502-4, Beijing weather item 1502-5, and Shanghai weather item 1502-6 occupy three adjacent slots. The boundary line between adjacent weather items for Shenzhen 1502-4 and Beijing 1502-5, and the boundary line between adjacent weather items for Beijing 1502-5 and Shanghai 1502-6 define a slot that correspond to snap position 1504-4. In some embodiments, a weather item may settle into a slot defined by a pair of adjacent boundary lines when the weather item moves into the slot.

Figure 15B:
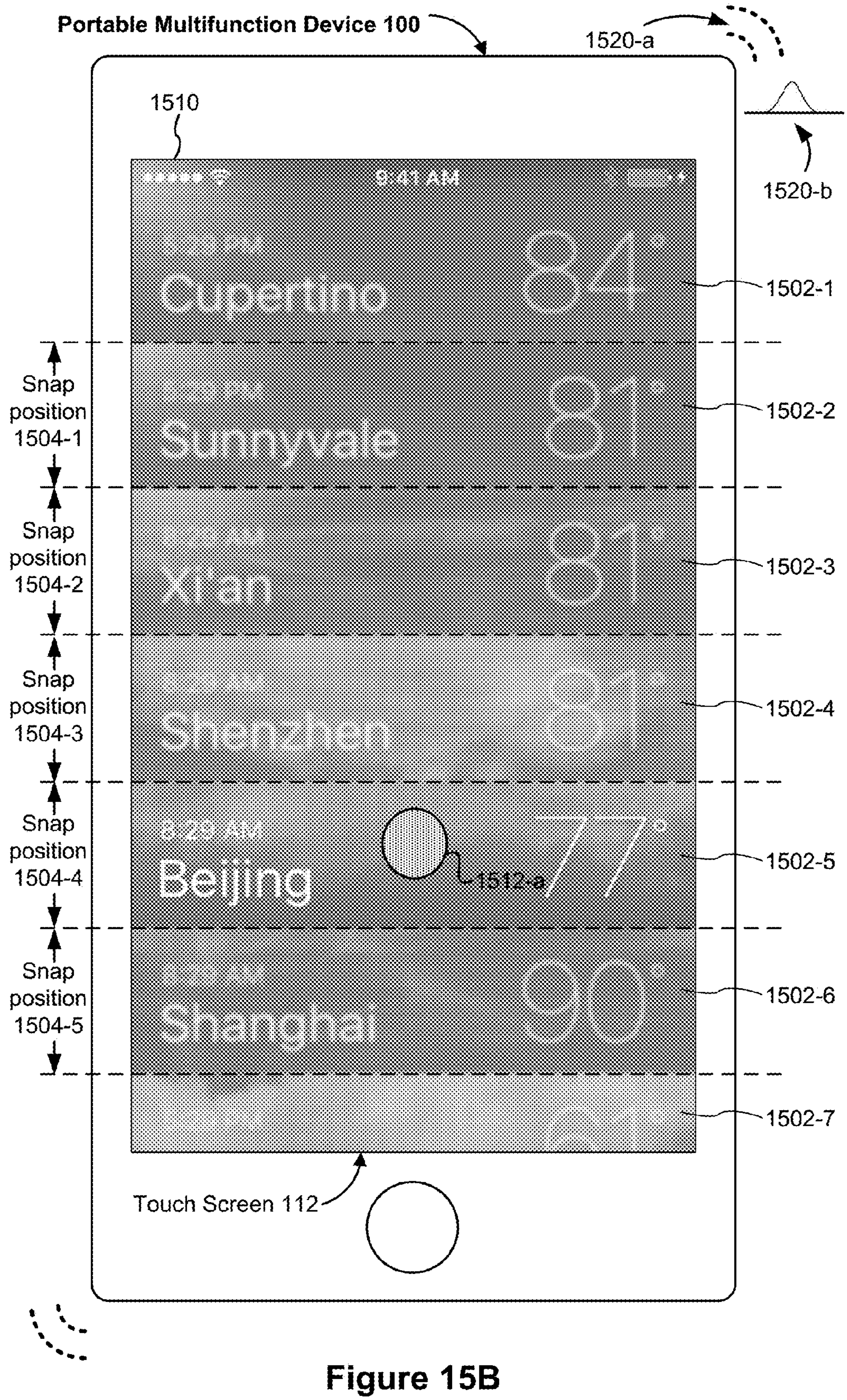

In FIG. 15B, similar to selecting an existing calendar entry, Beijing weather item 1502-5 is selected in response to a first portion of an input by contact 1512 (e.g., a long press or a deep press). In response to the selection of weather item 1502-5, the device visually indicates that Beijing weather item 1502-5 is selected, e.g., highlighted, enlarged and/or focused, as opposed to dimmed, shrank, and/or blurred of the unselected items 1502-1, 1502-2, 1502-3, 1502-4, 1502-5, and 1502-6. In conjunction with visually indicating the selection of item 1502-5, the device generates tactile output 1520 (e.g., MicroTap High (270 Hz) with a gain of 1.0) to indicate selection of item 1502-5.

Figure 15C:
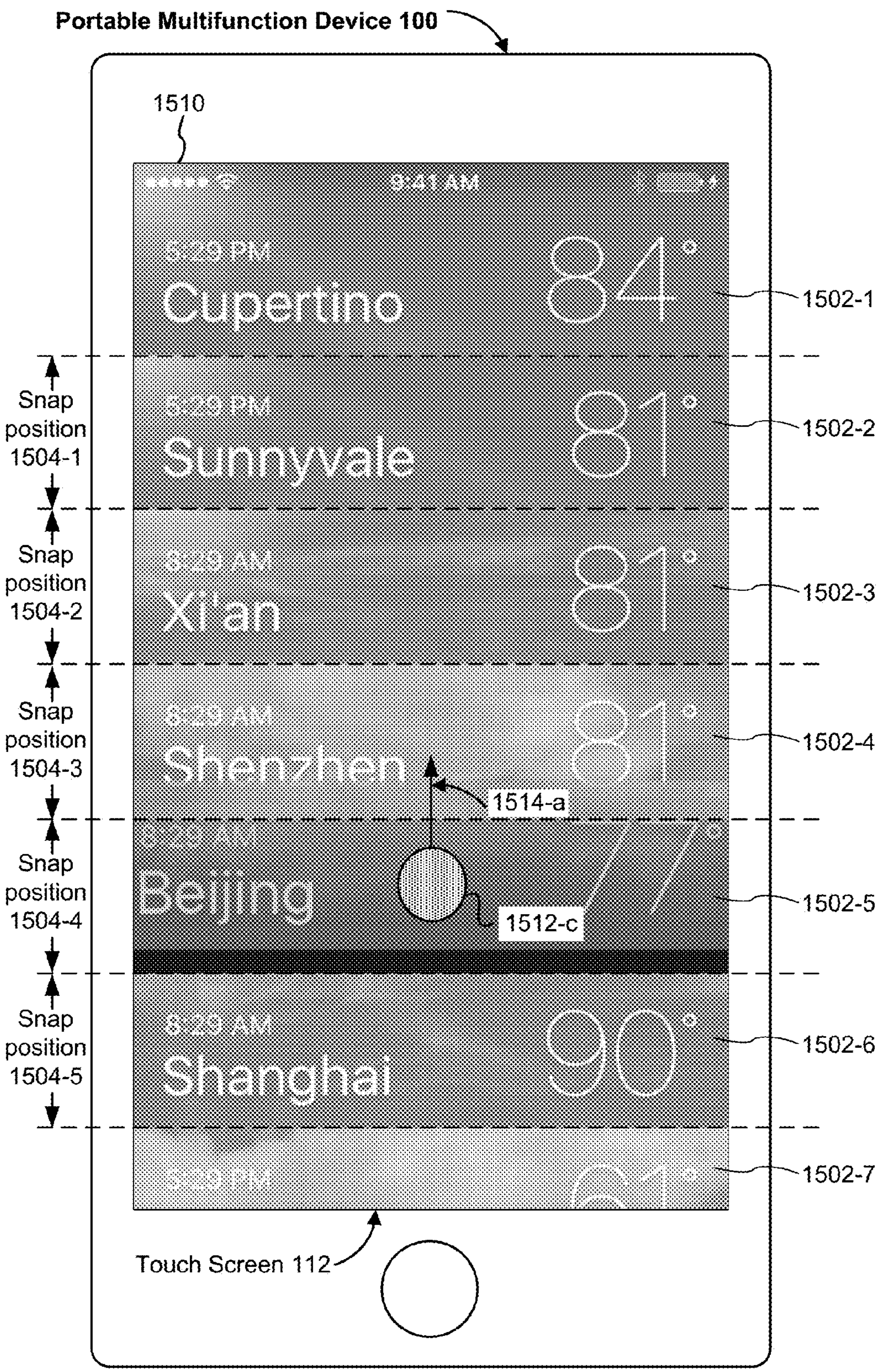

In FIG. 15C, while Beijing weather item 1502-5 is selected, movement 1514 of contact 1512 is detected. In response to detecting the upward movement 1514 of contact 1512, the device moves the selected item 1502-5 in accordance with the movement of contact 1512, as shown in FIGS. 15C-15D.

Figure 15D:
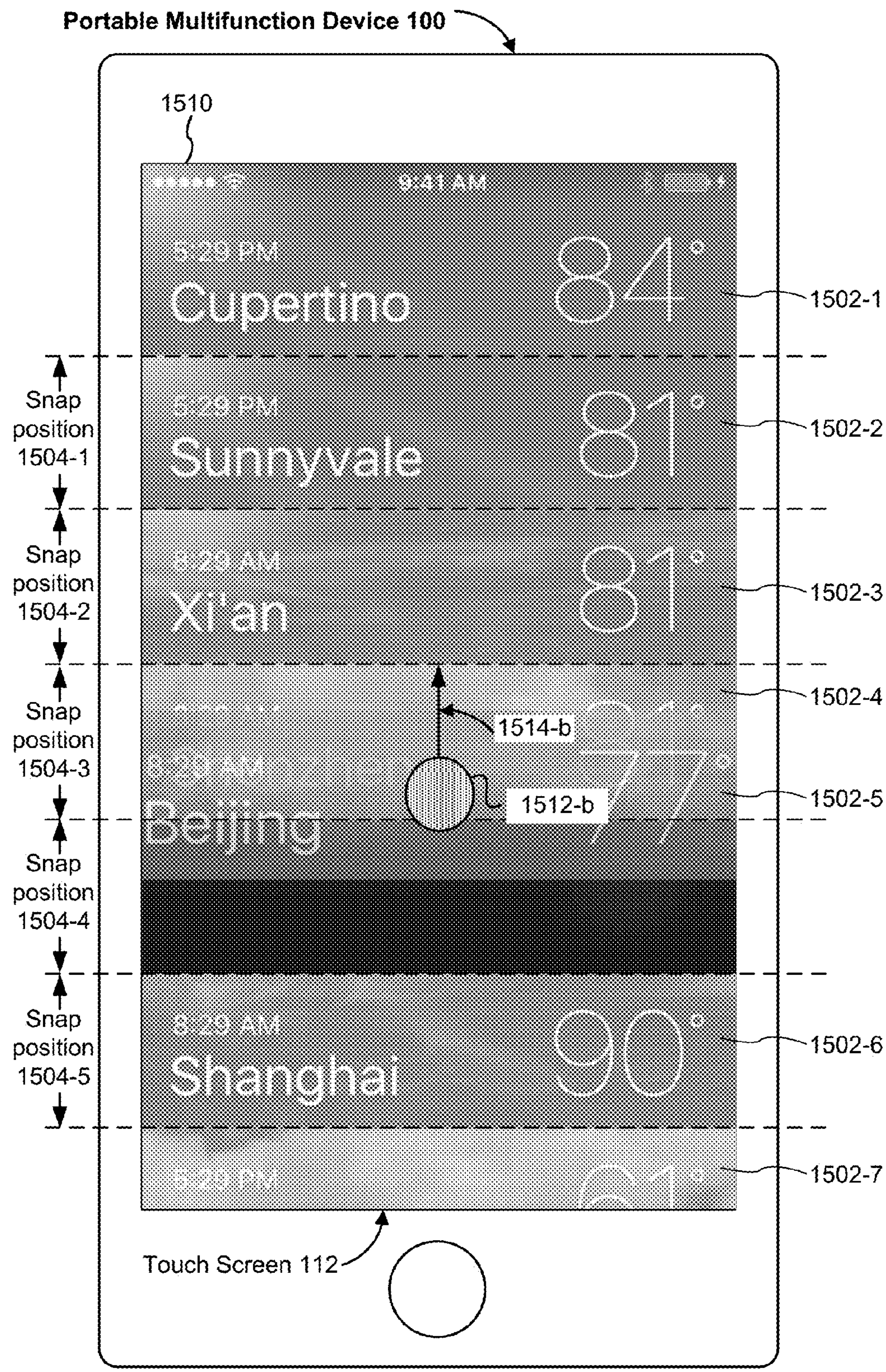

In FIG. 15D, as Beijing weather item 1502-5 moves further upward towards snap position 1504-3, where unselected weather item for Shenzhen 1502-4 is located, the slot 1504-4 that corresponds to Beijing weather item 1502-5's pre-movement position 1504-4 becomes vacant. To make room for Beijing weather item 1502-5 and to fill the vacant slot, Shenzhen weather item 1504-3 moves downward toward the vacant slot. As Shenzhen weather item 1504-3 moves into the vacant slot at snap position 1504-4, the device generates tactile output 1522 (e.g., MicroTap (270 Hz) with a gain of 1.0) to indicate the movement of weather item 1504-3 into the vacant slot at snap position 1504-4.

Figure 15E:
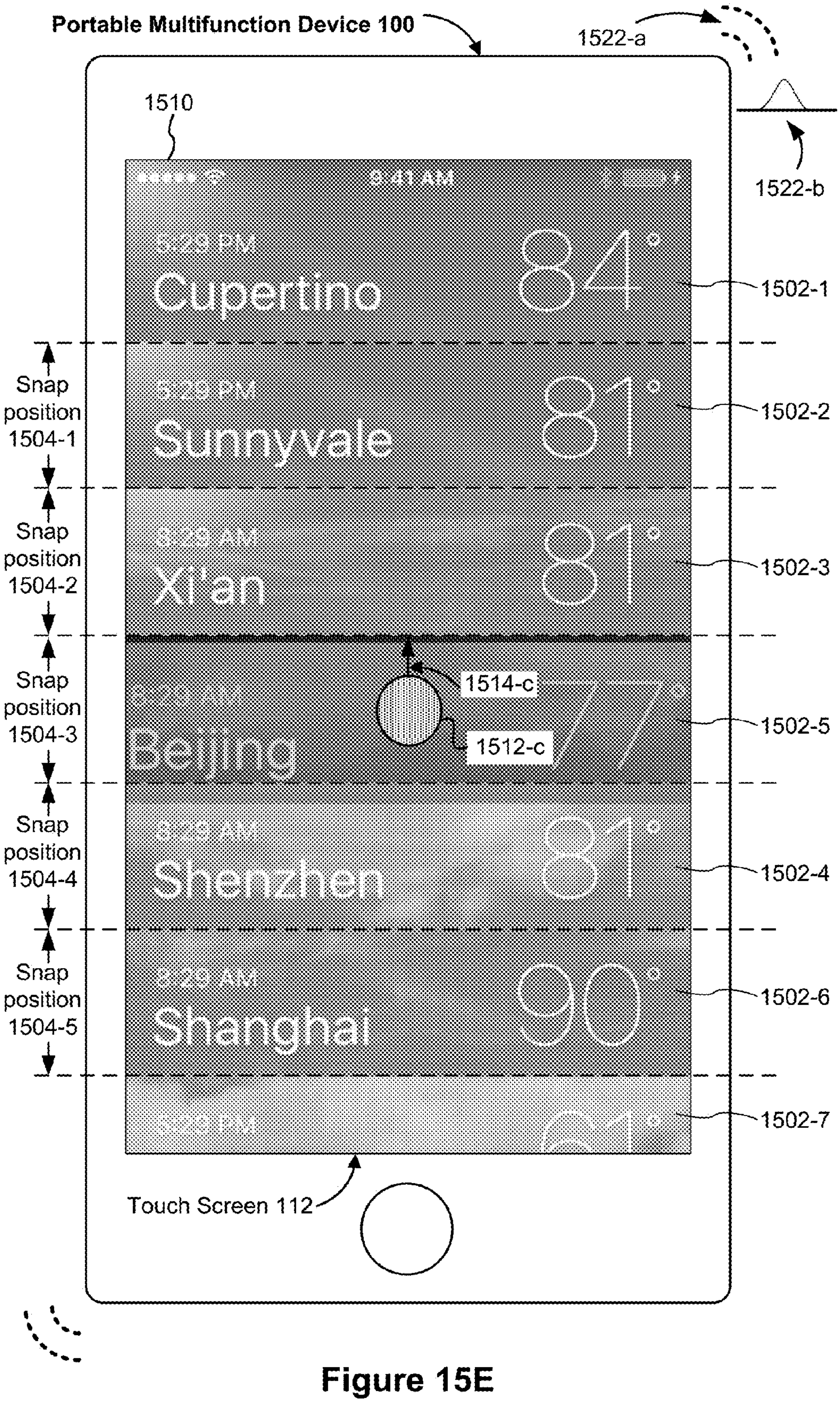
Figure 15F:
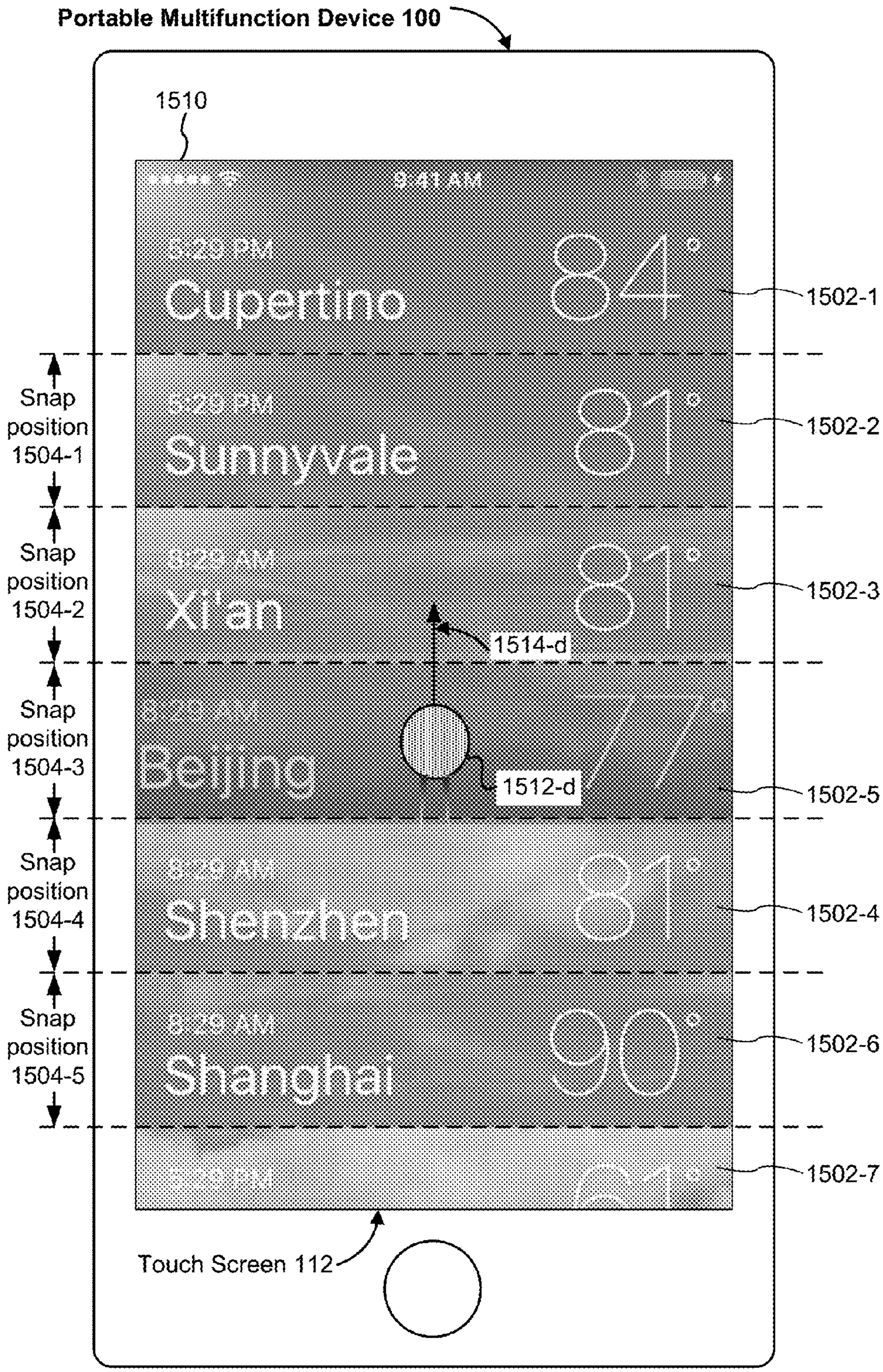
Figure 15G:
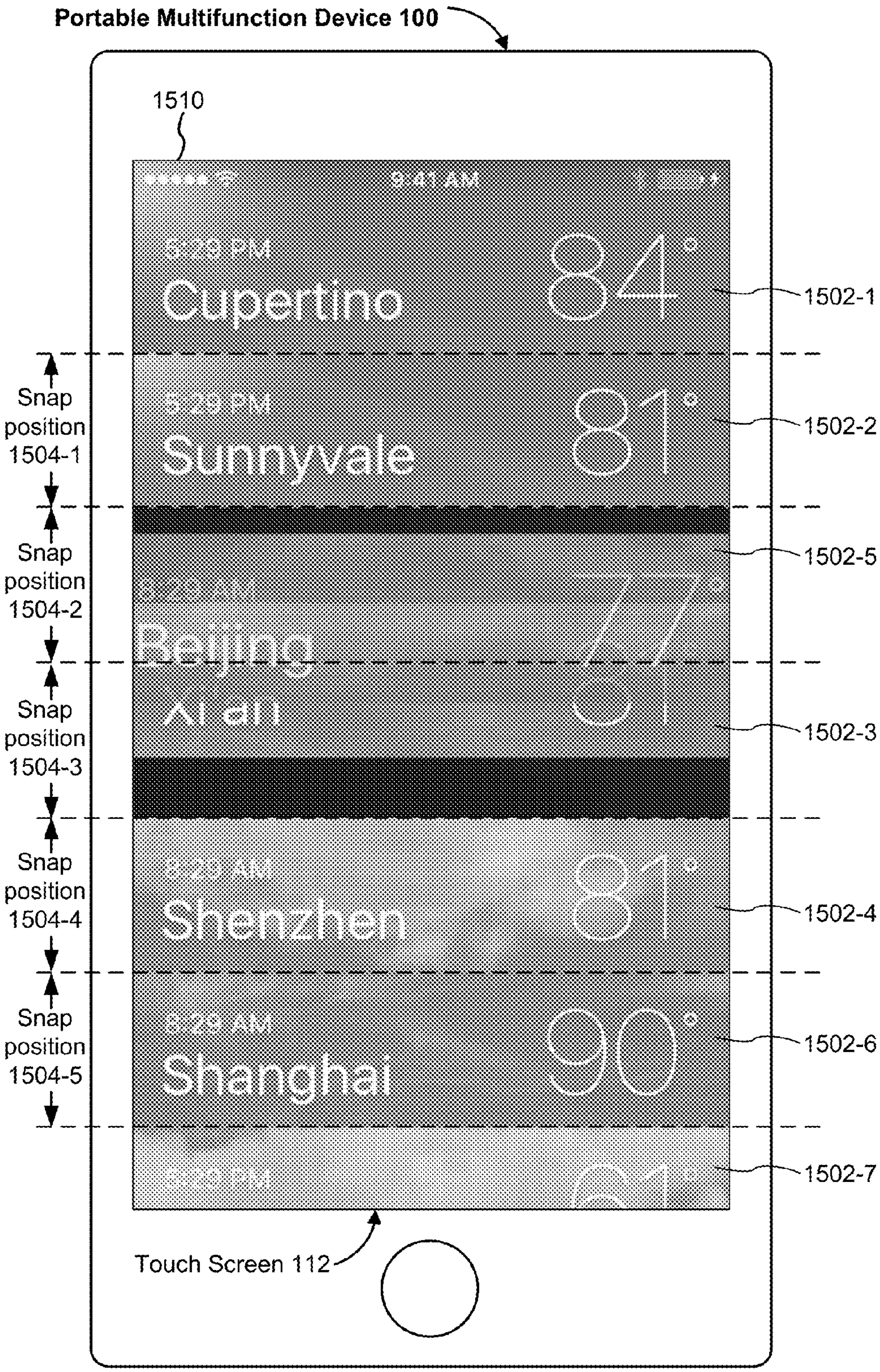

In FIG. 15F, after the Beijing weather item 1502-5 is picked up by contact 1512 (in FIG. 15B), the device detects a flick gesture by contact 1512 (e.g., contact 1512 quickly moves before lift-off). As shown in FIG. 15G, Beijing weather item 1502-5 continues to move upward after the lift-off of contact 1512 with gradually decreasing speed. While the weather item 1502-5 continues to move, first the slot corresponding to snap position 1504-3 is vacated. To make room for the moving item 1502-5 and to fill the vacant slot at snap position 1504-3, the device moves Xi'an weather item 1502-3 at snap position 1504-2 toward snap position 1504-3, as shown in FIG. 15G. When Xi'an weather item 1502-3 settles into snap position 1504-3, the device generates tactile output 1524 (e.g., MicroTap (270 Hz) with a gain of 1.0) to indicate that item 1502-3 has settled into snap position 1504-3, and the slot corresponding to snap position 1504-2 has become vacant, as shown in FIG. 15H.

Similarly, as Beijing weather item 1502-5 moves pass snap position 1504-2 and within a threshold range of snap position 1504-1 (FIG. 15I), the device moves Sunnyvale weather item 1502-2 at snap position 1504-1 toward snap position 1504-2. When Sunnyvale weather item 1502-2 settles into snap position 1504-2, the device generates tactile output 1526 (e.g., MicroTap (270 Hz) with a gain of 1.0), as shown in FIG. 15J.

Figure 15H:
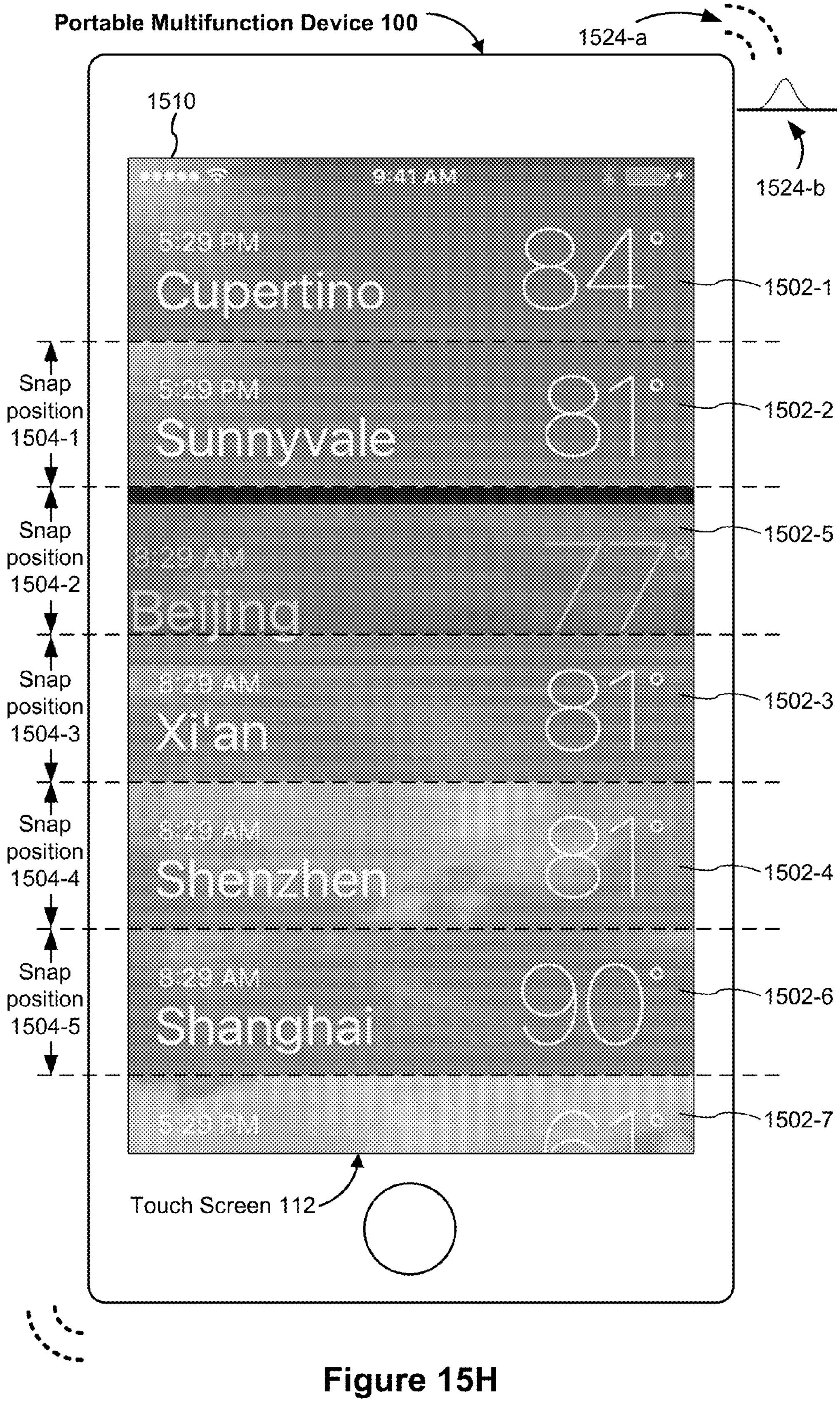
Figure 15I:
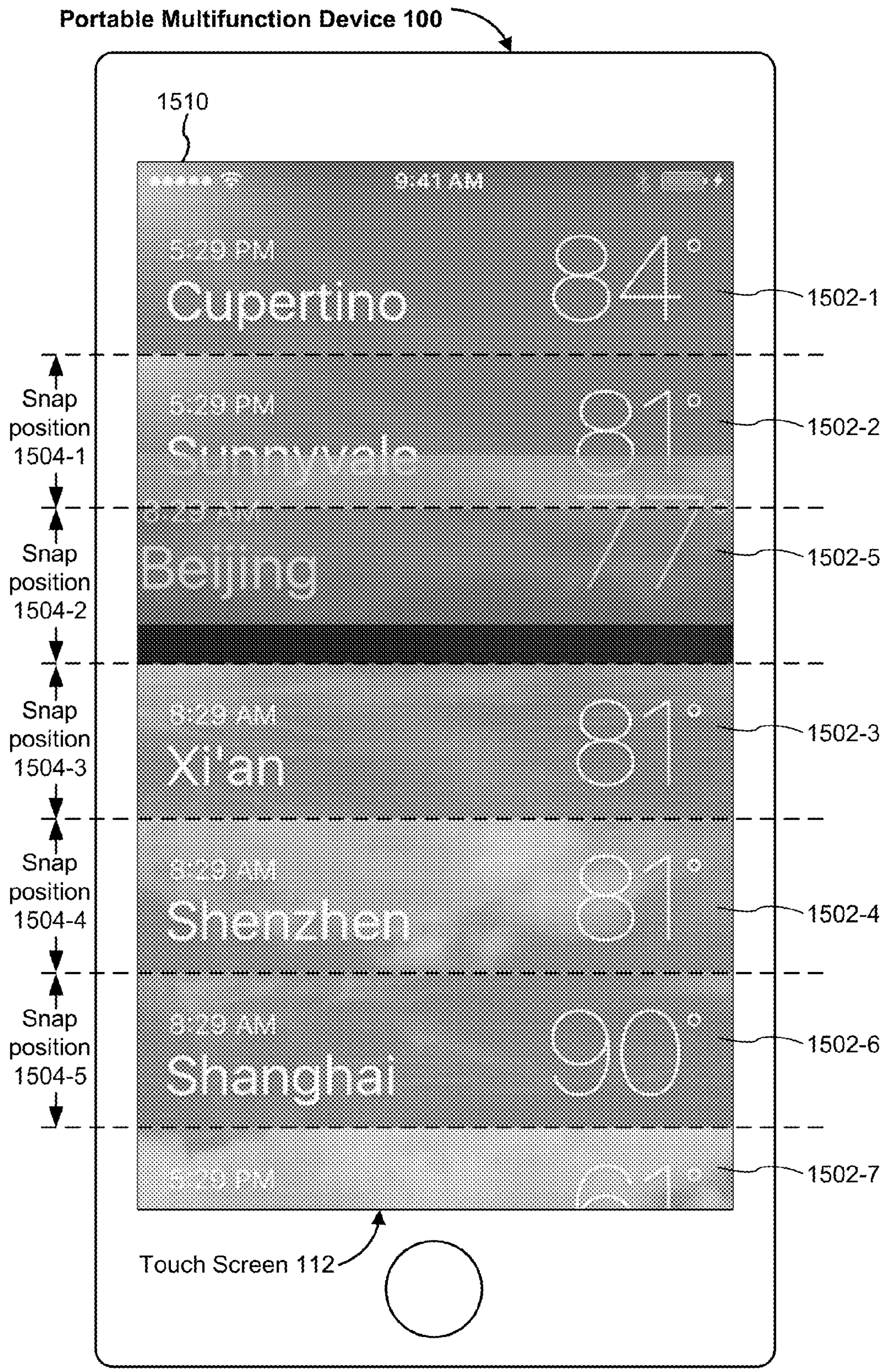
Figure 15J:
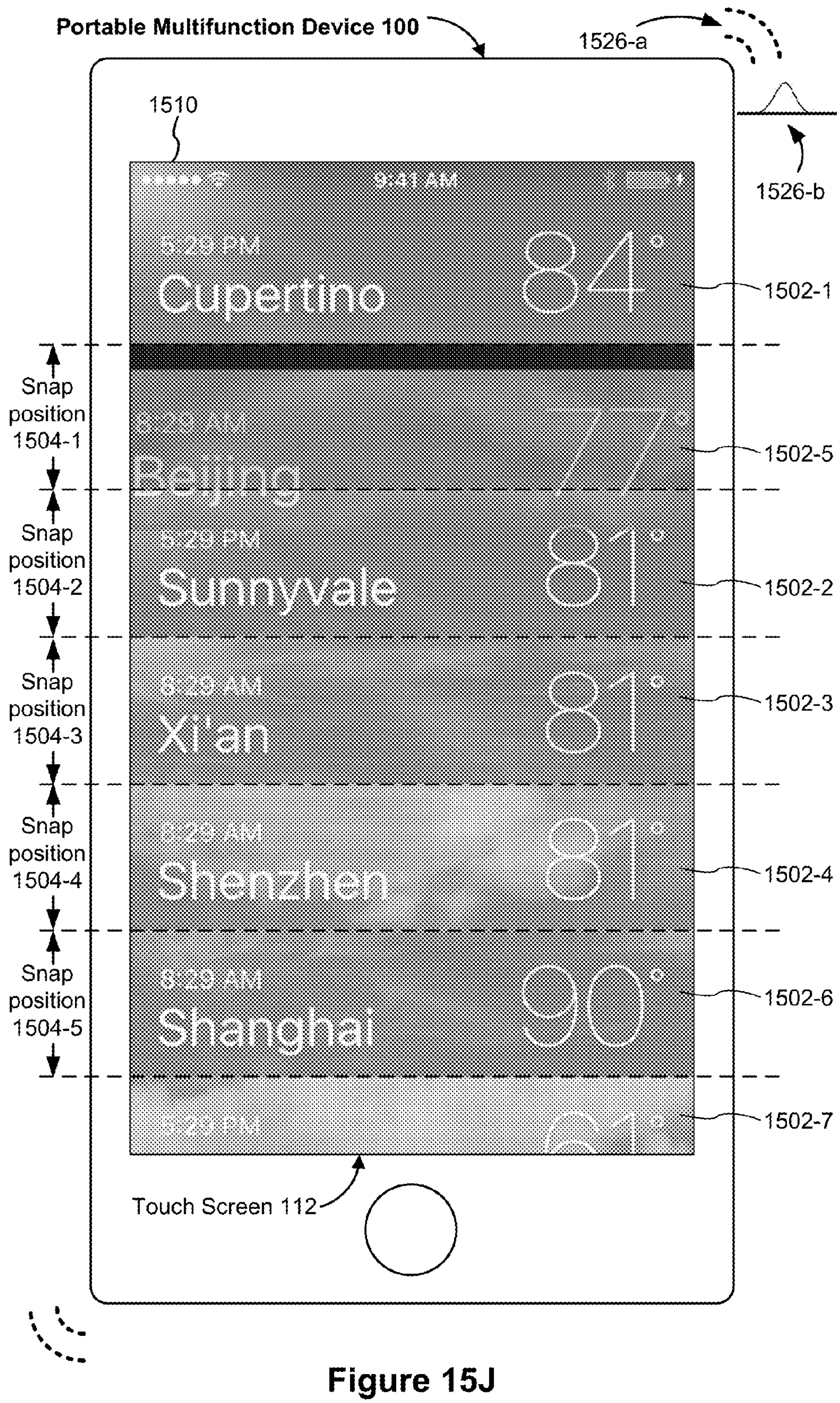
Figure 15K:
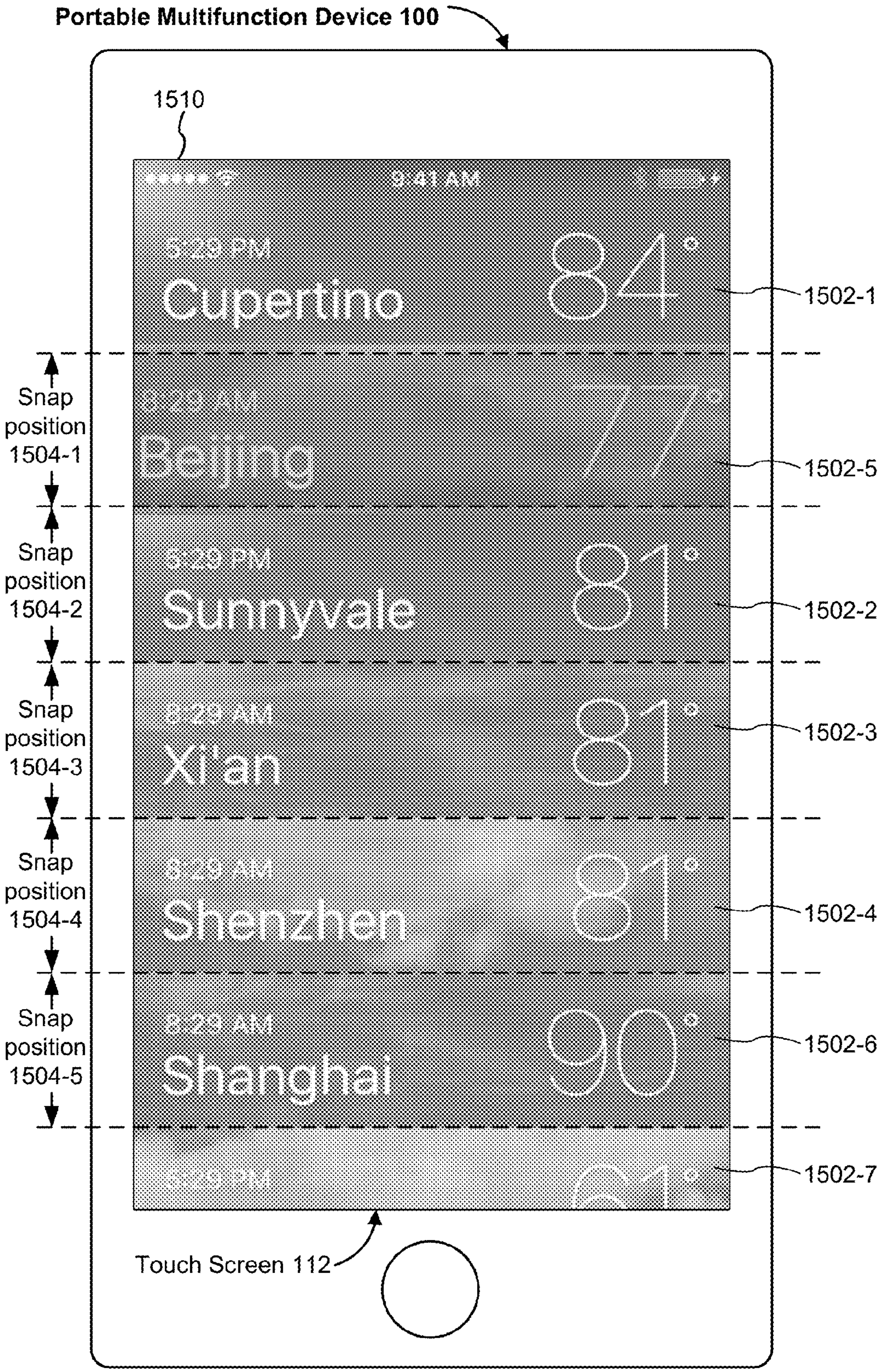
Figure 15L:
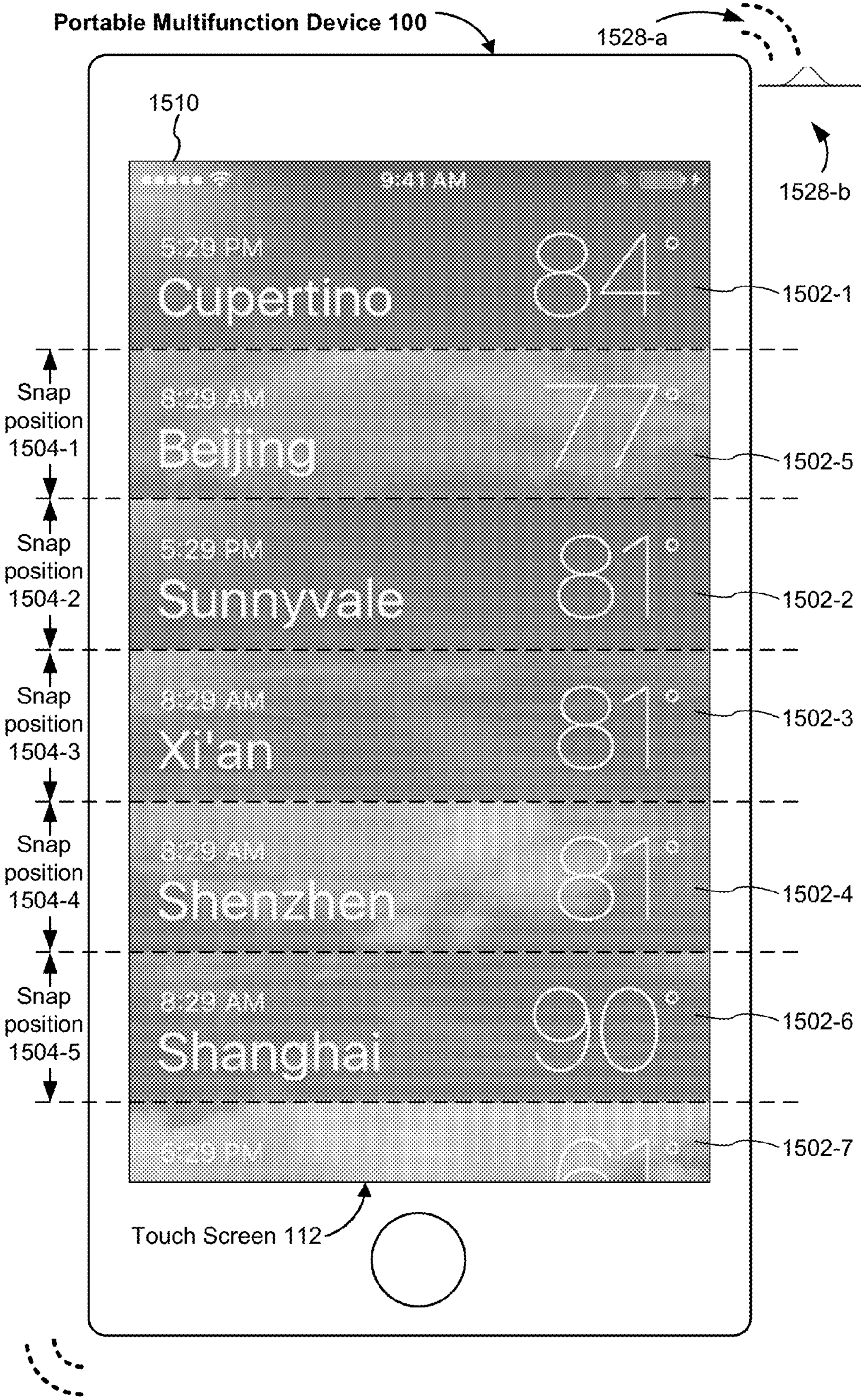

Also shown in FIG. 15J, the speed of weather item 1502-5 has slowed to a point that drop-off criteria are met and weather item 1502-5 is within a threshold range of snap position 1504-1. In FIG. 15K, the device snaps weather item 1502-5 to the slot at snap position 1504-1. In FIG. 15L, because the drop-off criteria are met, i.e., the movement speed of weather item 1502-5 is below the threshold speed after weather item 1502-5 reaches within the threshold range of the snap position 1504-1, the device visually indicates deselection of weather item 1502-5 (e.g., by shrinking the weather item Beijing 1502-5 to a pre-selection size and drops it into the slot at snap position 1504-1). In addition, the device generates tactile output 1528 (e.g., MicroTap (270 Hz) with a gain of 0.6) to indicate that weather item 1502-5 has settled into the slot at snap position 1504-1.

In some embodiments, when weather items snaps into adjacent slots to make room for the moving item, e.g., as shown in FIGS. 15E, 15H, and 15J, the device generates tactile outputs that are MicroTaps (150 Hz) with a gain of 0.4. In some embodiments, if multiple items are moving and snapping into positions in a short amount of time, the device may optionally skip one or more tactile outputs if the tactile outputs generation rate is going to exceed a threshold rate (e.g., one tactile output per 0.05 seconds) for tactile output generation.

FIGS. 16A-16K illustrate providing various tactile outputs when re-arranging icons on a home screen user interface, in accordance with some embodiments. The re-arrangement of icons is performed due to movement of one icon in accordance with movement of contact, e.g., flicking an icon out of the dock (FIGS. 16B-16E) or dragging an icon into the dock (FIGS. 16F-16K).

Figure 16A:
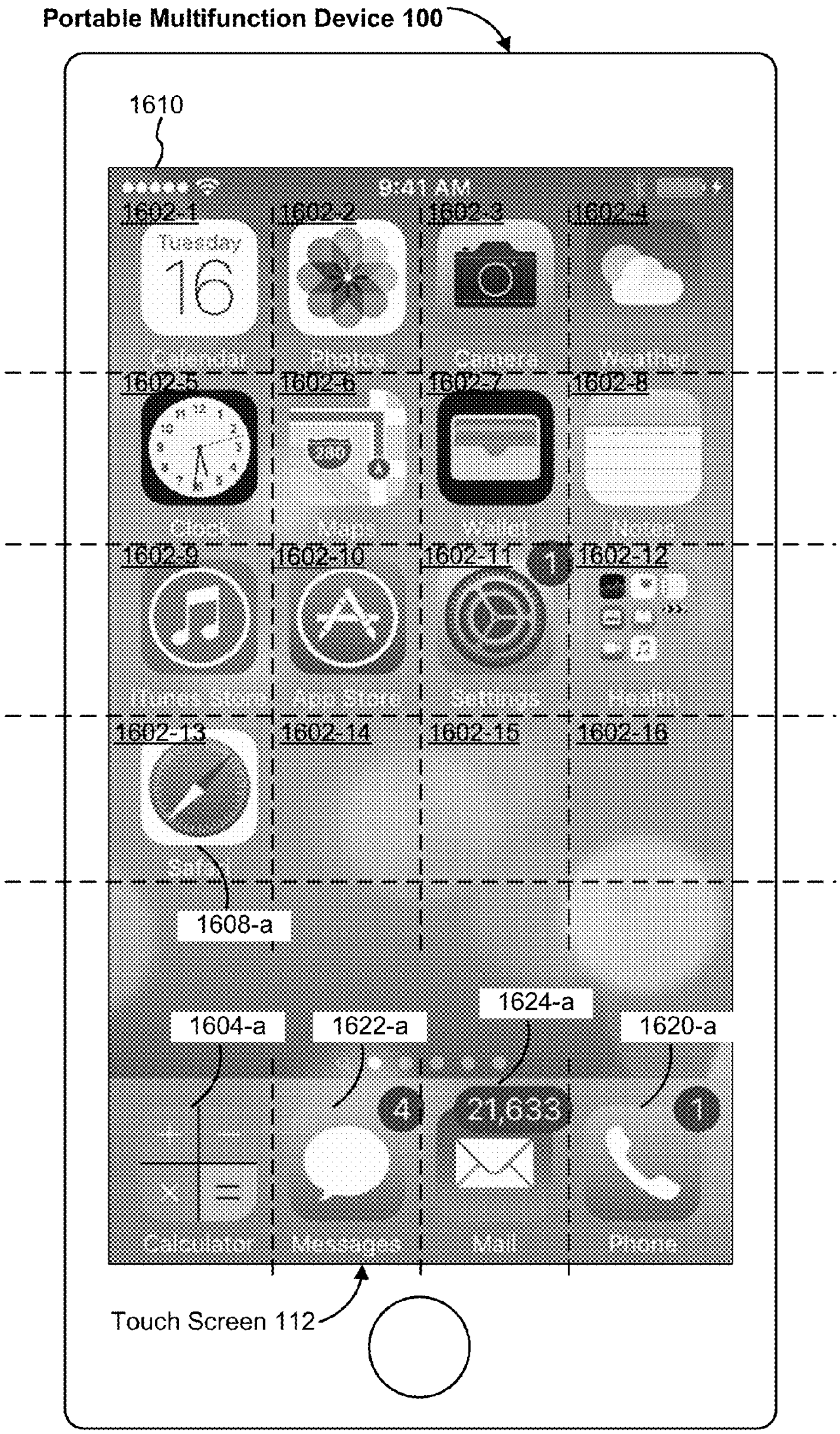
FIGS. 16A-16K illustrate exemplary user interfaces for providing haptic feedback to indicate selection, picking up, dragging, dropping, and snapping of objects in a user interface (e.g., a home screen user interface), in accordance with some embodiments.

In FIG. 16A, a home screen user interface 1610 is displayed on touch screen display 112. Home screen 1610 includes a plurality of application launch icons that correspond to different applications, e.g., a "calendar" icon corresponds to a calendar application, a "photos" icon corresponds to a photo browsing/editing application etc. The application launch icons are displayed at a plurality of predetermined snap positions, such as snap positions 1602 in a general area of the home screen or in dock at the bottom of the home screen user interface. In some embodiments, a moving application icon settles into a predetermined snap position when the moving icon is within a threshold range of the predetermined snap position.

In some embodiments, the snap positions are dynamically determined based on the number of icons on the user interface (either in the general area of the home screen or within the dock) and display settings (e.g., the icon size and the area for displaying the icons), such that icons displayed at these snap positions appear to be adjacent to one another in a evenly spaced grid.

Figure 16B:
Figure 16C:
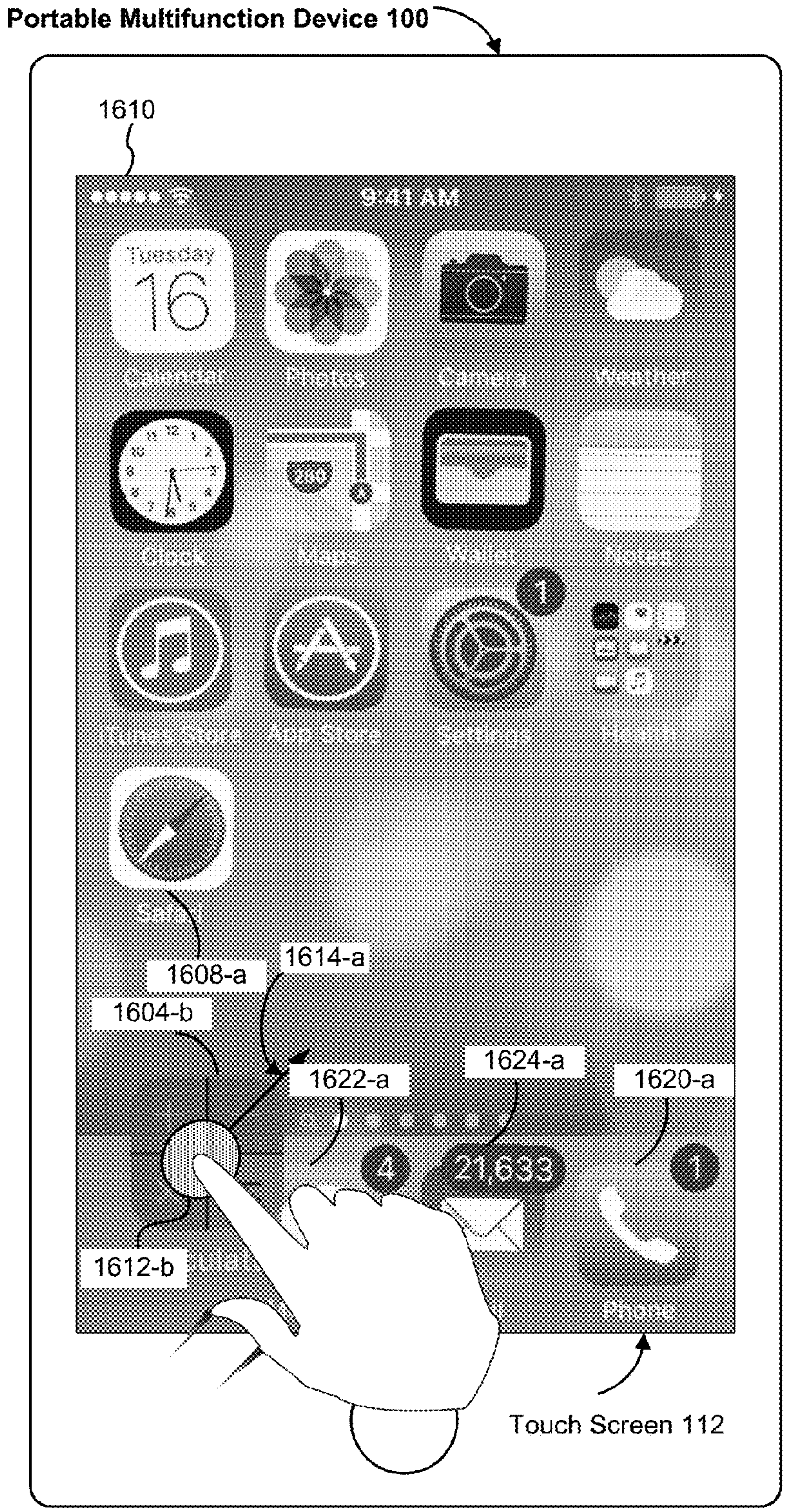
Figure 16D:
Figure 16E:
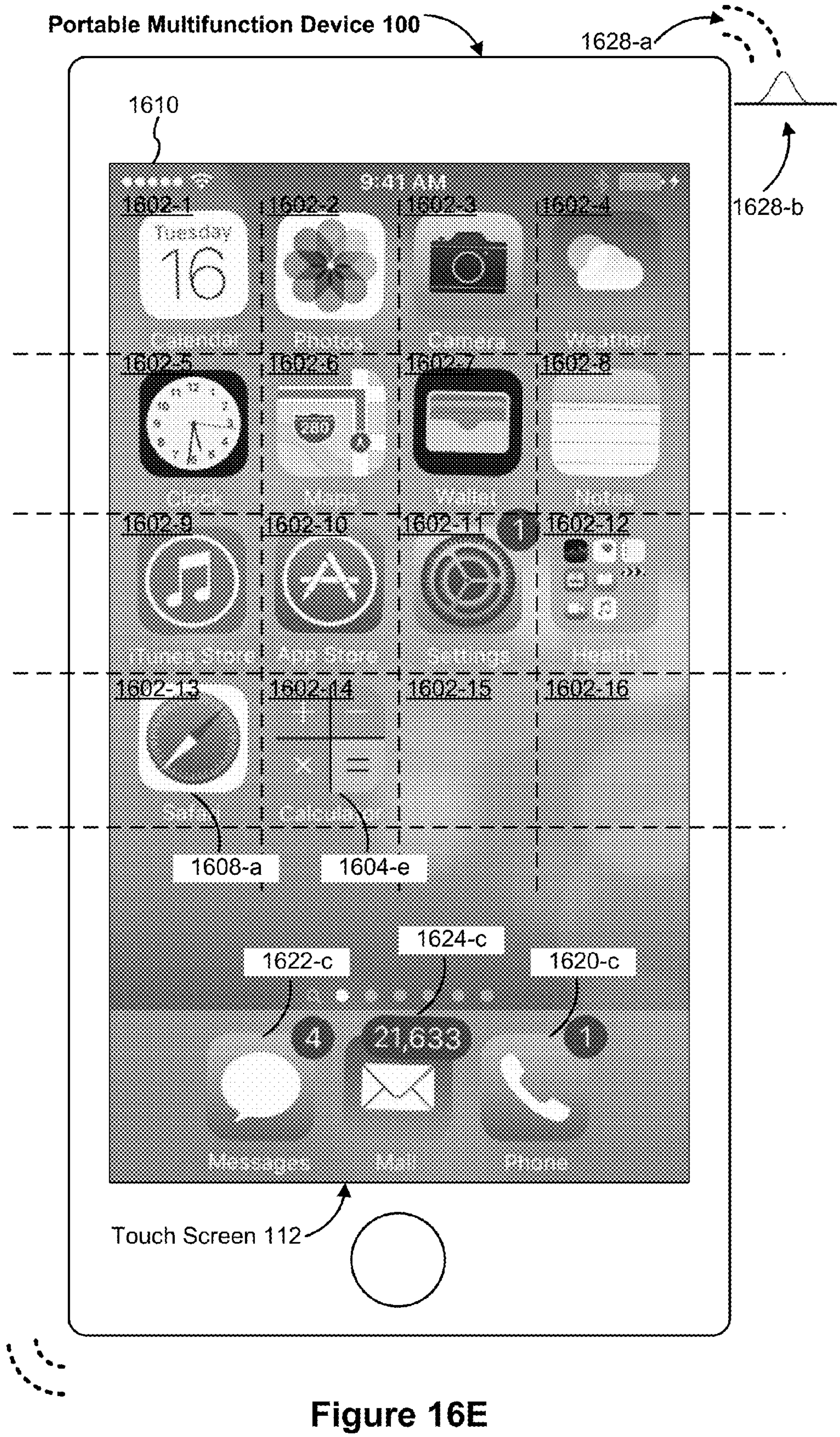
Figure 16F:

In FIG. 16A, the area outside the dock is divided into a four by four grid, while the area in the dock is divided into a single row with four cells for displaying four adjacent icons (FIG. 16A) or three cells for displaying three adjacent icons (FIG. 16F). When an icon outside the dock is added to the dock or an icon in the dock is removed from the dock, the device recalculates the snap positions, re-arranges other icons in the dock into the new snap positions, and generates a tactile output in conjunction with the icon re-arrangement, as explained in greater detail below with reference to FIG. 16J.

In some embodiments, sequence numbers or the like are assigned to these predetermined snap positions, e.g., 1602-1 . . . 1602-16 in FIG. 16A, such that the predetermined snap positions are filled up in sequence and the icons are displayed adjacent to one another. When the region corresponds to a snap position is empty (e.g., due to a movement of the icon out of that region, FIG. 16G), an icon at an adjacent higher (or lower) numbered snap position automatically moves in to fill the empty slot. For example, in FIGS. 16G-16H, when the "Safari" icon 1608 moves out of the snap position 1602-13, the "calculator" icon 1604 automatically moves from the snap position 1602-14 to 1602-13 to fill the empty slot. In such embodiments, a moving application icon settles into the highest (or lowest) numbered vacant snap position, e.g., the predetermined snap position 1602-14 as shown in FIGS. 16B-16E.

Referring to FIG. 16B, calculator icon 1604 in the dock is selected in response to a first portion of an input by contact 1612 (e.g., a long press or a deep press by contact 1612). In response to the selection of icon 1604, the device visually indicates that calendar icon 1604 is selected (e.g., icon 1604 is highlighted and enlarged). In conjunction with visually indicating the selection of icon 1604, the device generates tactile output 1626 (e.g., MicroTap (270 Hz) with a gain of 1.0) to indicate selection of icon 1604.

In FIG. 16C, while calculator icon 1604 is selected, a second portion of input by contact 1604 is detected as indicated by the movement 1614 of contact 1612. In response to detecting the movement 1614 of contact 1612, the device moves the selected calculator icon 1604 in accordance with the movement 1614 of contact 1612 out of the dock.

In FIG. 16D, the device detects fast finger movement and subsequently lift-off of contact 1612. In response, the device continues to move calculator icon 1604 after detecting the lift-off of contact 1612. The calculator icon 1604 moves with gradually decreasing speed after the contact lift-off due to simulated inertia. When the simulated inertial movement of calculator icon 1604 stops after the contact lift-off, the device moves calendar icon 1604 towards a vacant region in the user interface that corresponds to the next available predetermined snap position 1602-14.

In FIG. 16E, the drop-off criteria are met, e.g., the movement speed of the object drops below a threshold speed after calculator icon 1604 is within proximity of the snap position 1602-14. In response, the device moves calculator icon 1604 into the snap position 1602-14, visually indicates deselection of calculator 1604 (e.g., by shrinking calculator icon to a pre-selection size) and generates tactile output 1628 (e.g., MicroTap (270 Hz) with a gain of 0.6) to indicate that calculator icon 1604 has settled into a snap position 1602-14.

Though not shown in FIG. 16E, in some embodiments, as the device detects removal of an icon from the dock, the device calculates snap positions and moves the remaining icons (e.g., icons 1622, 1624, and 1620) in the dock to the new snap positions so that these icons are displayed uniformly in the dock. In conjunction with re-arranging the remaining icons, in some embodiments, the device generates a tactile output (e.g., MicroTap (270 Hz) with a gain of 0.4) to simulate icons snapping into their new positions.

In FIG. 16F, Safari icon 1608 located outside of the dock is selected in response to a first portion of an input by contact 1616 (e.g., a long press or a deep press by contact 1616). In response to the first portion of the input, the device visually indicates that Safari icon 1608 is selected (e.g., icon 1608 is highlighted and enlarged). In conjunction with visually indicating the selection of icon 1608, the device generates tactile output 1630 (e.g., MicroTap (270 Hz) with a gain of 1.0) to indicate selection of icon 1608.

Figure 16G:
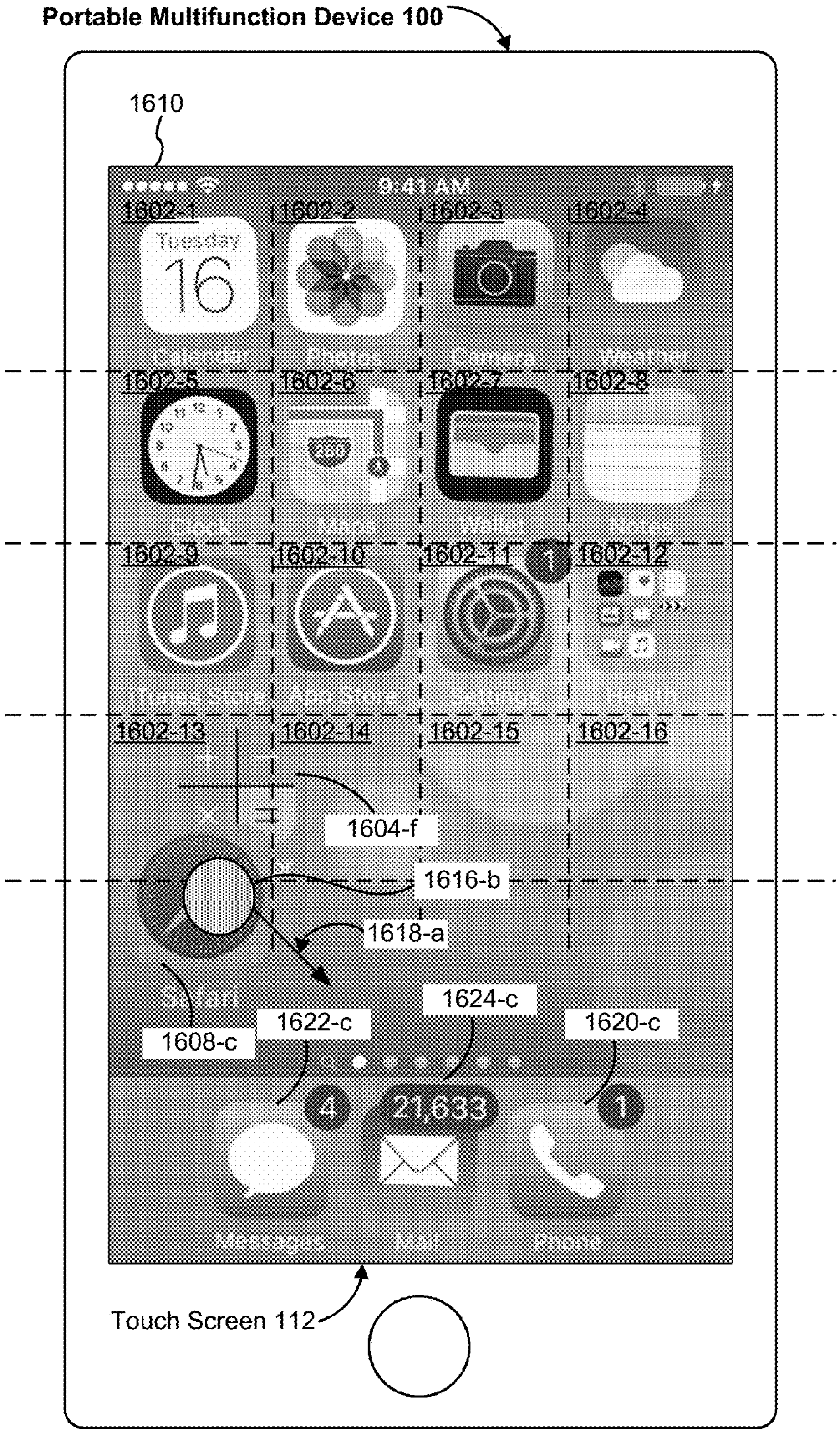
Figure 16H:
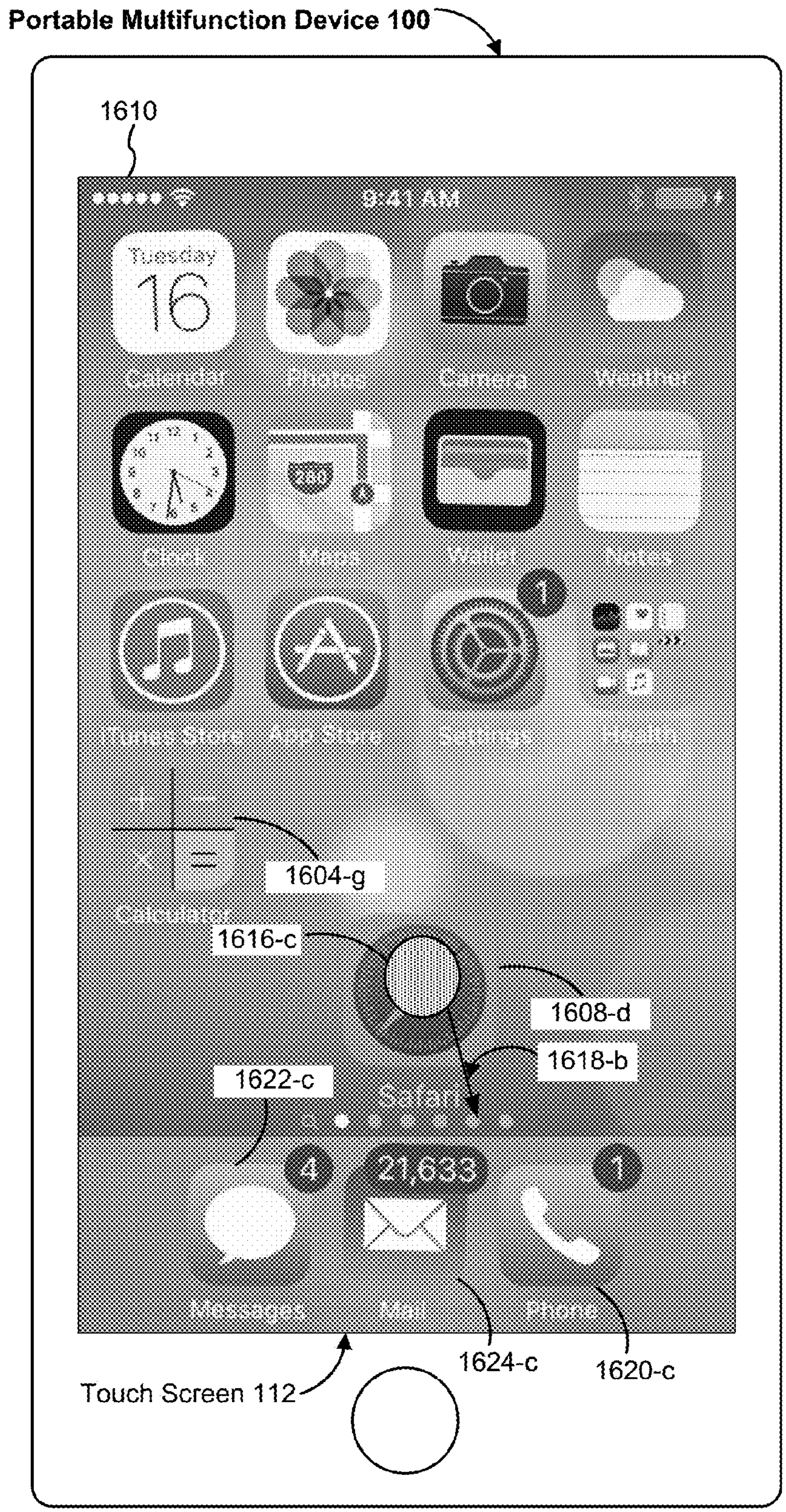
Figure 16I:
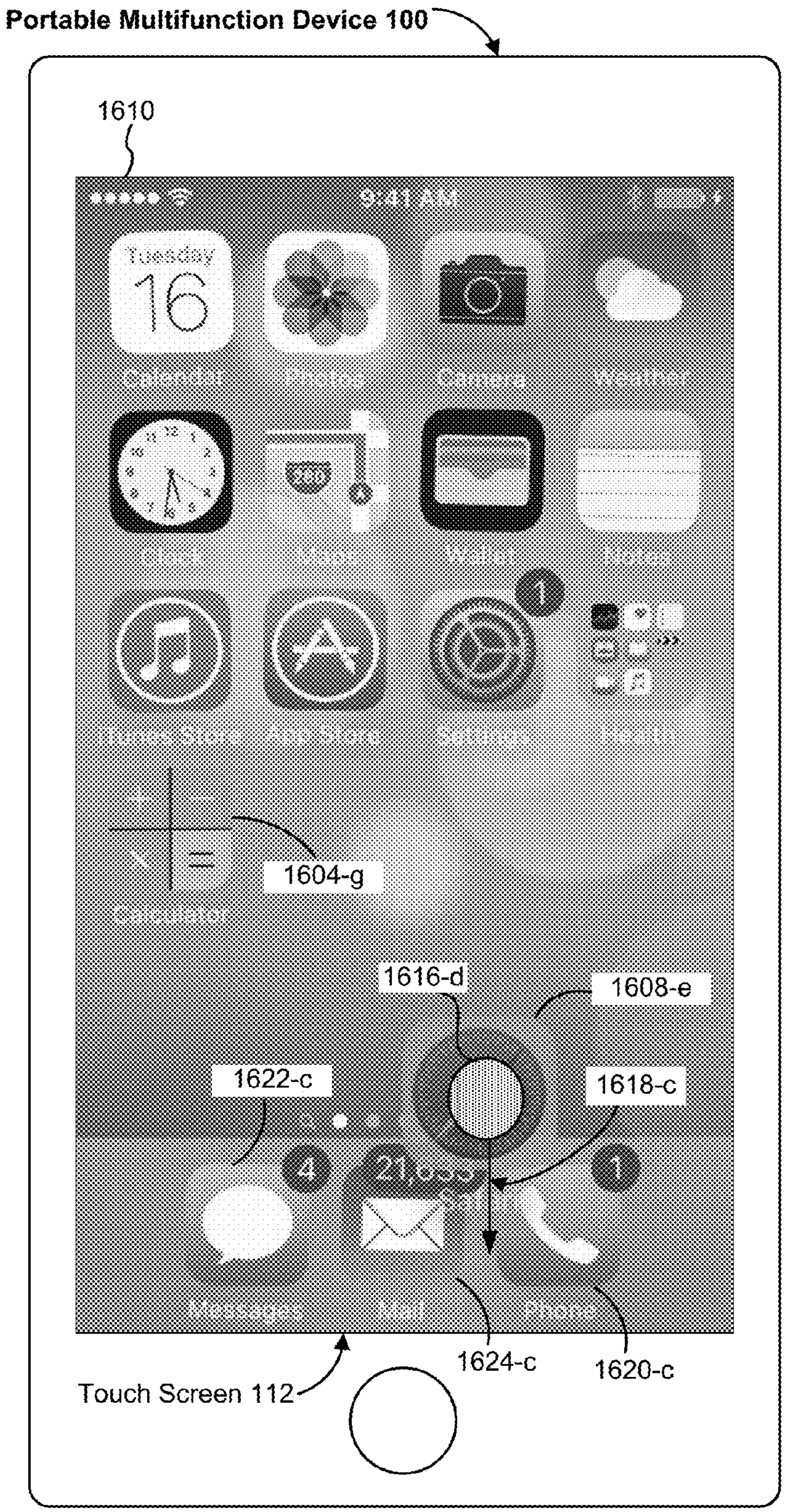

In FIG. 16G, while Safari icon 1608 is selected, the device detects movement 1618 of contact 1616. In response to detecting movement 1618 of contact 1616, the device moves the selected Safari icon 1608 in accordance with the movement 1618, e.g., first moving icon 1608 out of the snap position 1602-13, then closer to the dock (FIG. 16H), and then into the dock (FIG. 16I).

Figure 16J:

In FIG. 16J, as the device detects that icon 1608 has entered the dock, the device calculates snap positions to accommodate icon 1608 inside the dock. The device then moves other icons (e.g., icons 1620, 1622, and 1624) in the dock to the new snap positions to make room for Safari icon 1608. In conjunction with re-arranging other icons, in some embodiments, the device generates tactile output 1632 (e.g., MicroTap (270 Hz) with a gain of 0.4).

Figure 16K:

In FIG. 16K, drop-off criteria are met (e.g., the movement speed of Safari icon 1608 drops below a threshold speed after the object is within proximity of a snap position in the dock). In response to determining that the drop-off criteria are met, the device 100 moves Safari icon 1608 into the snap position in the dock, visually indicates deselection of Safari icon 1608 (e.g., by shrinking Safari icon to a pre-selection size) and generates tactile output 1634 (e.g., MicroTap (270 Hz) with a gain of 0.6) to indicate that Safari icon 1608 has settled into the snap position in the dock.

FIGS. 17A-17H and 18A-18E illustrate providing tactile outputs on satisfaction of device orientation criteria, in accordance with some embodiments. FIGS. 17A-17H and 18A-18E are used to illustrate the processes described below with respect to FIGS. 32A-32C.

FIGS. 17A-17H illustrate exemplary compass user interface and various tactile outputs generated when changing the orientation of the device 100 based on alignment of the device with a nearby magnetic field (e.g., the Earth's magnetic field), in accordance with some embodiments.

Figure 17A:
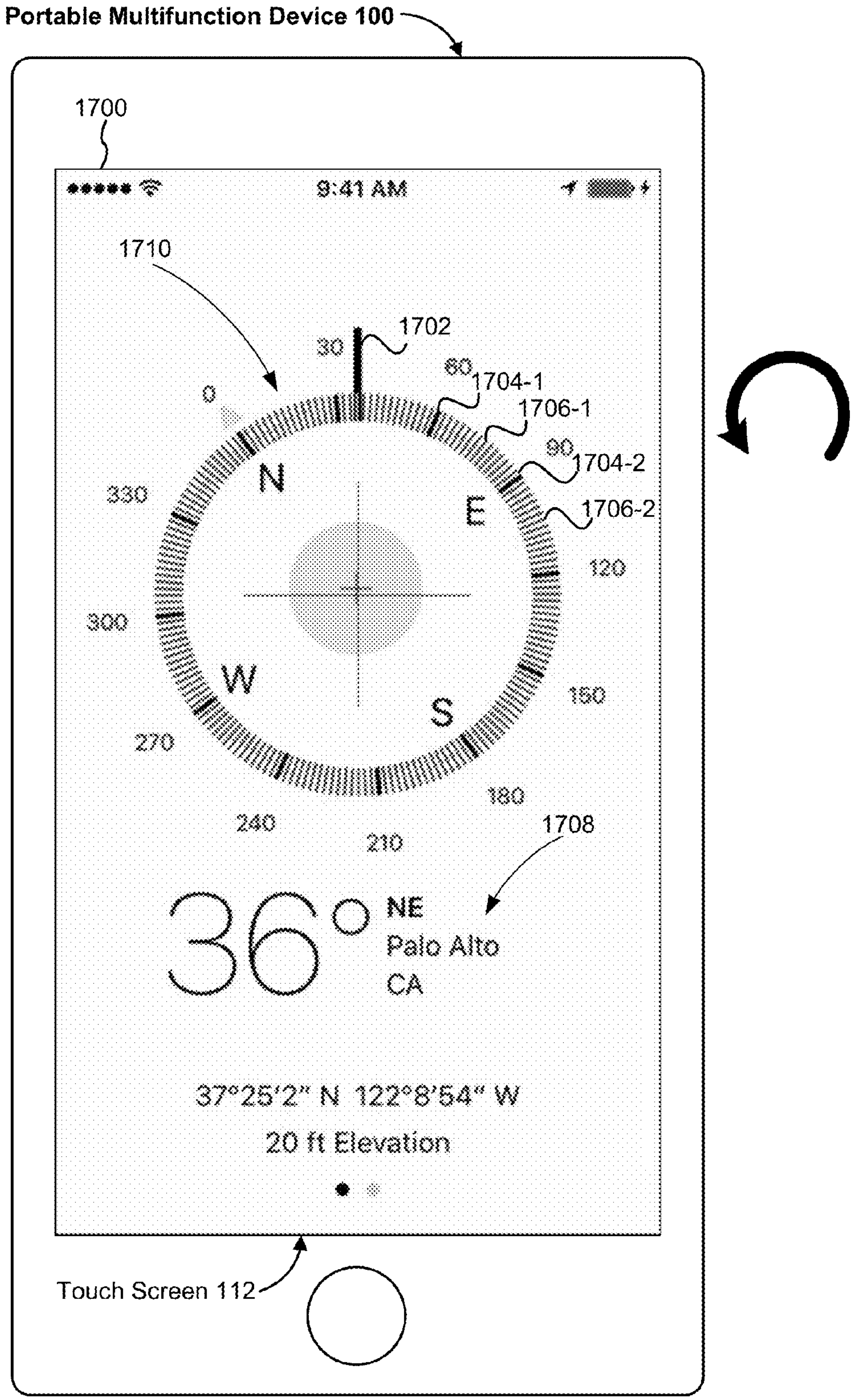
FIGS. 17A-17H illustrate exemplary user interfaces for providing haptic feedback on satisfaction of device orientation criteria (e.g., device is aligned with particular directions relative to magnetic North) in accordance with some embodiments.

In FIG. 17A, a compass interface 1700 is displayed on touch screen display 112. The compass user interface 1700 includes a compass face 1710 with a plurality of major markings 1704 (e.g., the bold line at 0 degree, 30 degree, 60 degree, North, East etc.) that correspond to a plurality of major directions relative to a magnetic field near the device (e.g., every 30 degrees away from true North). In some embodiments, the compass face 1710 further includes, between each pair of adjacent major markings of the plurality of major markings 1704, a plurality of minor markings 1706 that correspond to a plurality of minor directions (e.g., 1 degree, 32 degree etc.). On the compass interface 1700, the device also displays an indicator of device orientation 1702 that indicates the current orientation of the electronic device 100, e.g., the indicator 1702 coincides with a minor marking at 36 degree in between two major markings North and East indicating the current orientation of the electronic device is 36 degree north east. In addition, compass interface 1700 includes orientation value indicator 1708 that textually specifies the current orientation of the device 100.

Figure 17B:
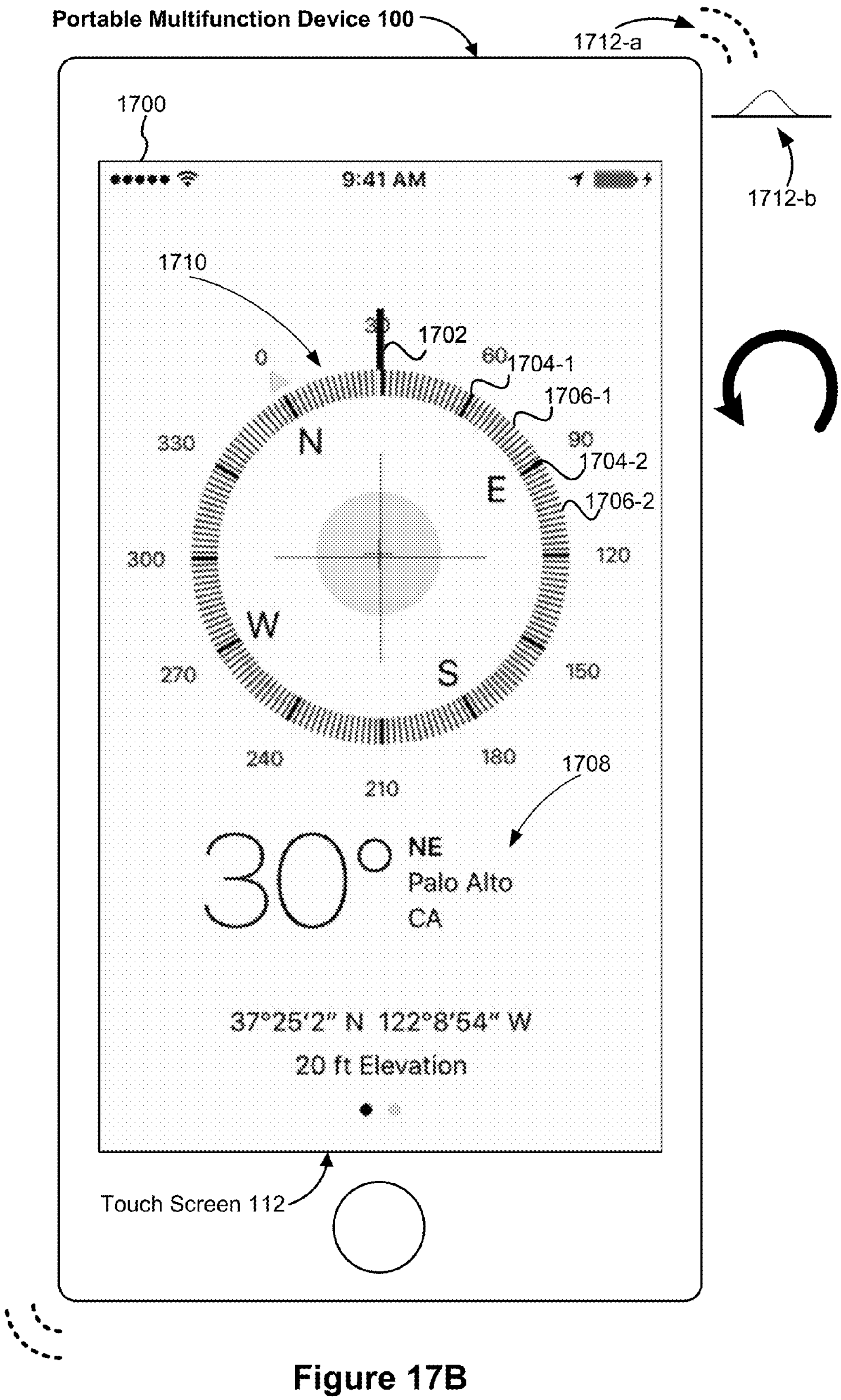

In FIG. 17B, as the device reorients (e.g., rotates counterclockwise), the compass face rotates clockwise until indicator 1702 coincides with a major marking, e.g., 30 degree marking, the device determines that the device has reached a predetermined direction, e.g., every 30 degree away from North, and generates tactile output 1712 (e.g., MicroTap (150 Hz) with a gain of 0.8).

Figure 17C:
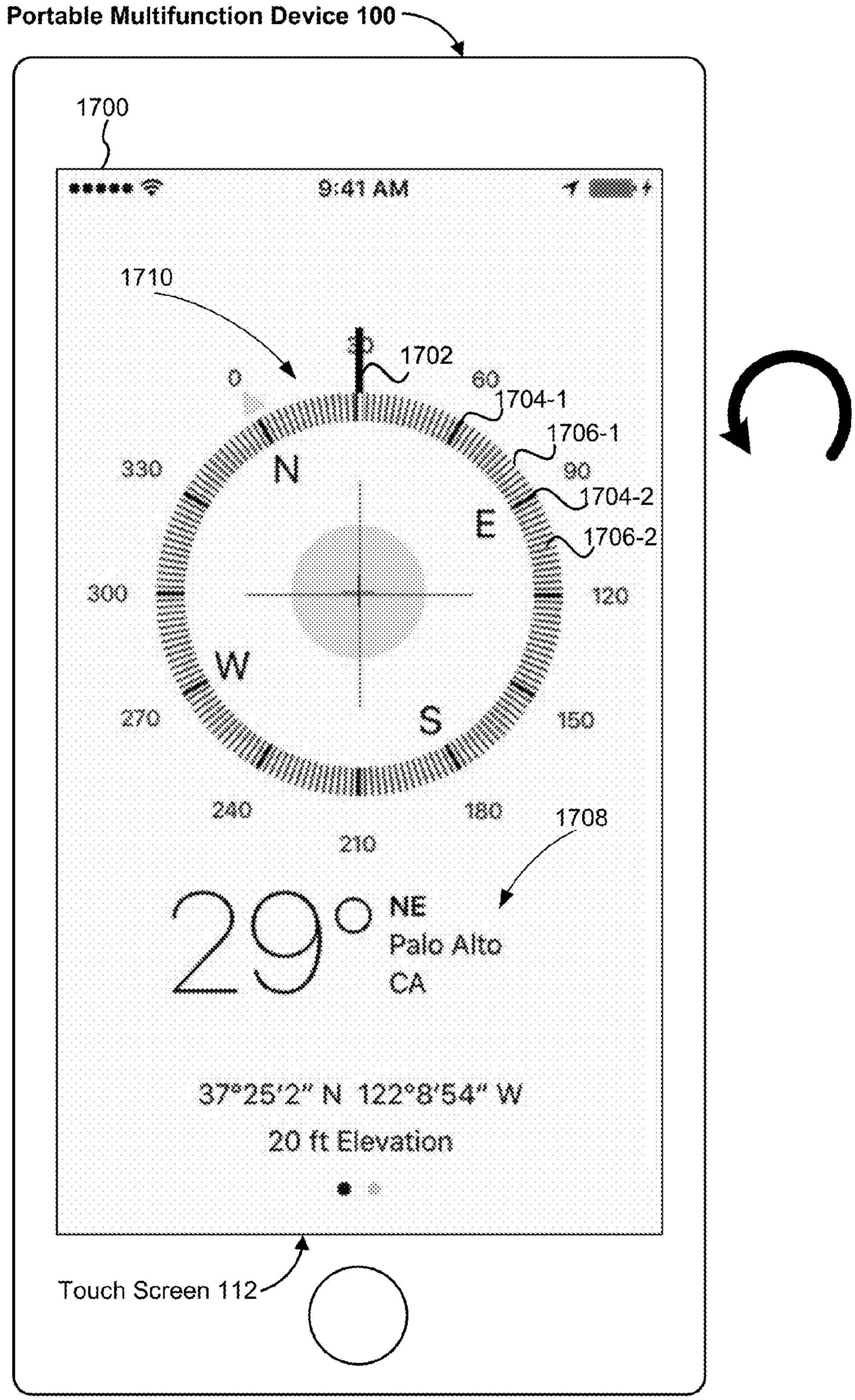
Figure 17D:
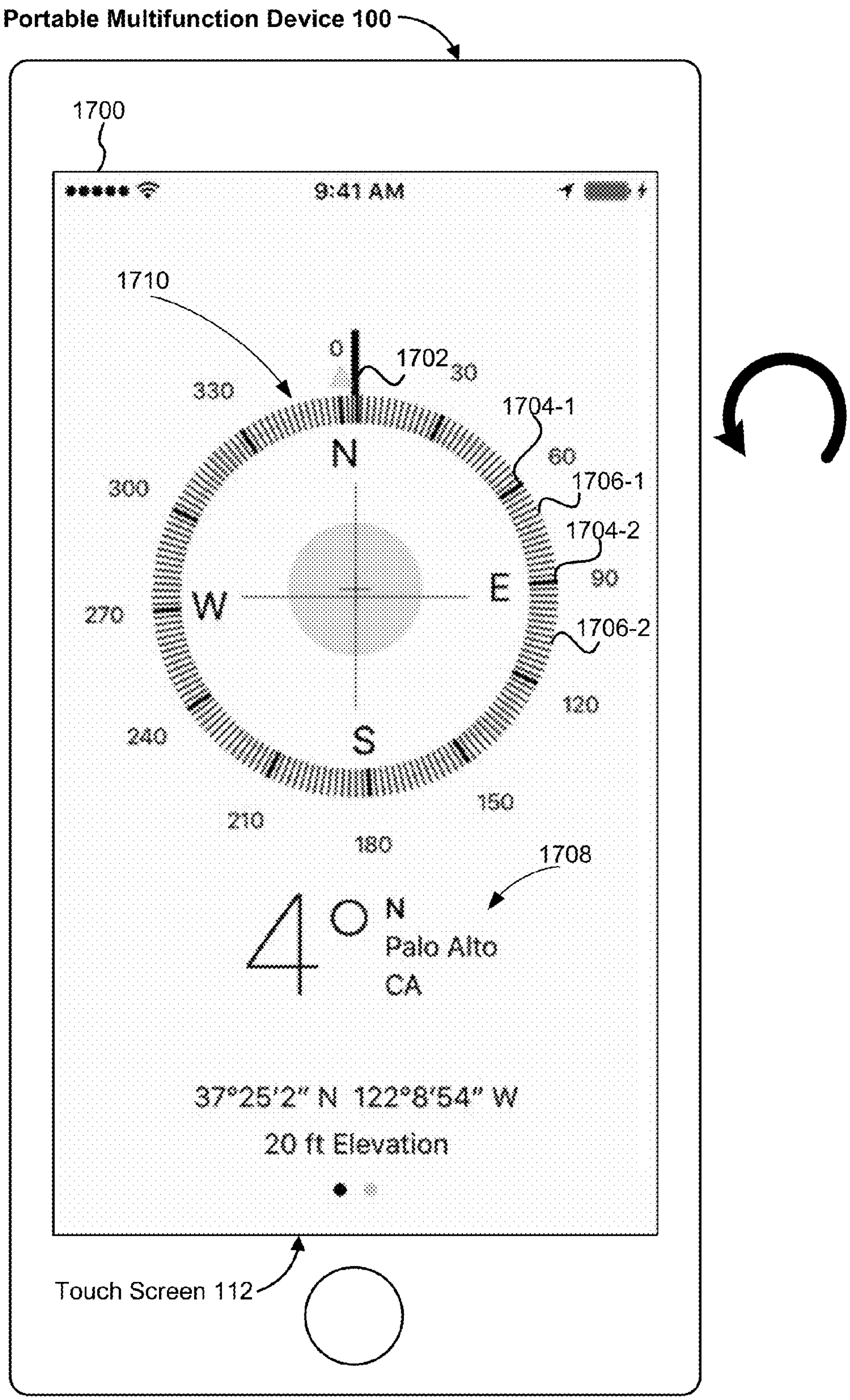

In FIG. 17C, as the device reorients further (e.g., rotates counterclockwise), the compass face rotates clockwise further past the major marking (e.g., 30 degree) until the indicator 1702 coincides with a minor marking (e.g., 29 degree marking). The device determines that the device has not reached a predetermined direction, e.g., every 30 degrees away from North, thus does not generate any tactile output. Similarly, in FIG. 17D, when the device rotates to four degrees from North, compass face 1710 rotates clockwise further to indicate the current orientation as four degrees away from North. The device determines that the device has not reached a predetermined direction, and does not generate any tactile output.

The reorientation of device 100 continues, and as shown in FIGS. 17E-17H, the compass face 1710 rotates clockwise further. In accordance with a determination that the device has reached the predetermined directions at 0 degree to North (FIG. 17E) and 330 degree away from North (FIG. 17H), the device generates tactile outputs 1714 and 1716 (e.g., MicroTap (150 Hz) with a gain of 0.8), respectively. In contrast, no tactile output is generated when the device has not reached any predetermined direction (e.g., 358 degrees away from North in FIG. 17F or 331 degrees away from North in FIG. 17G).

FIGS. 18A-18E illustrate an exemplary level user interface and tactile output generated when the device is level and stable based on an alignment of the device with a plane normal to the Earth's gravitational field, in accordance with some embodiments.

Figure 18A:
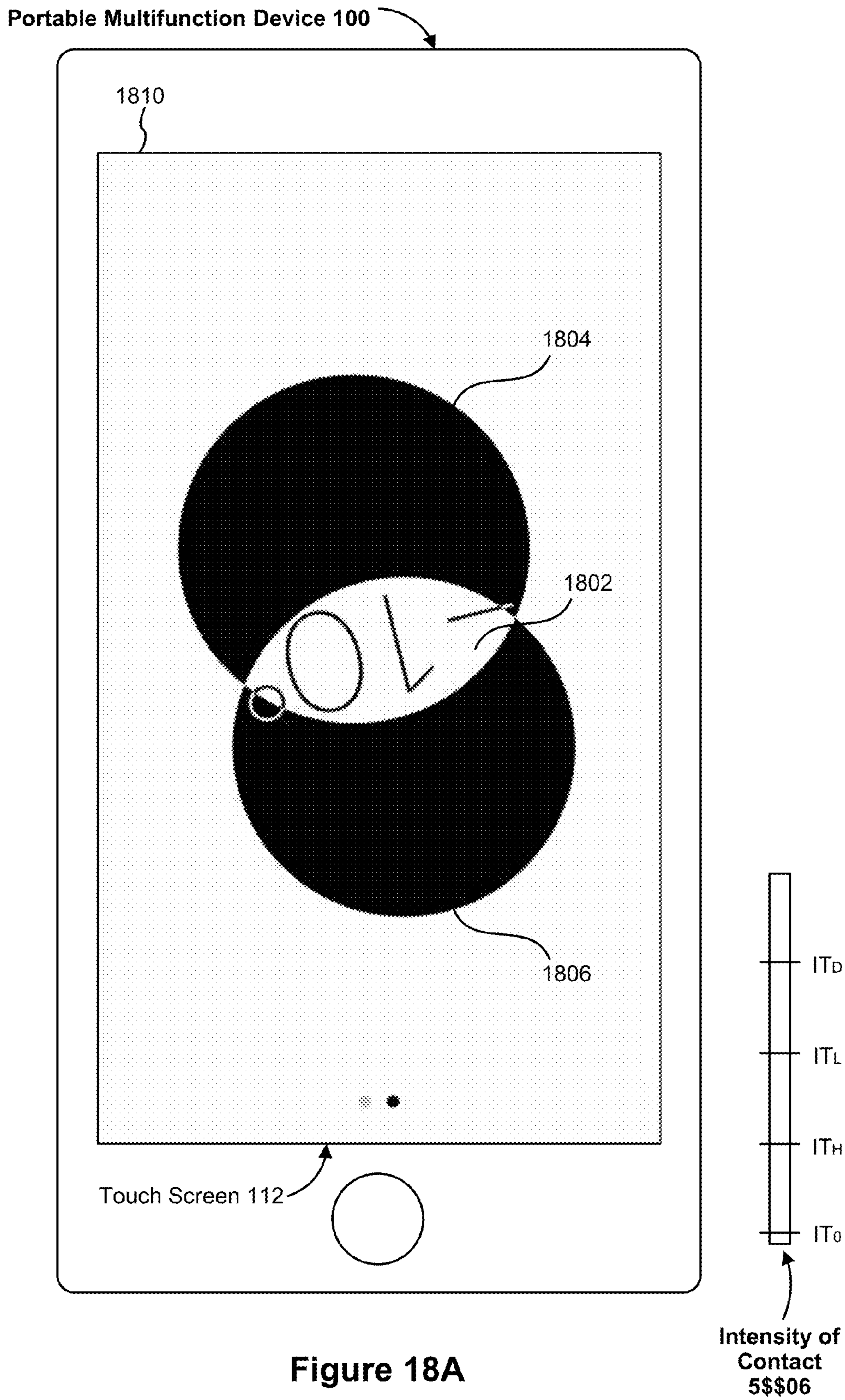
FIGS. 18A-18E illustrate exemplary user interfaces for providing haptic feedback on satisfaction of device orientation criteria (e.g., device is level and stable) in accordance with some embodiments.

In FIG. 18A, a level interface 1810 is displayed on touch screen display 112. The level user interface 1810 includes an alignment indicator that indicates a current degree of deviation from a level state, e.g., two intersecting circles 1804 and 1806. The overlap portion 1802 between the intersecting circles 1804 and 1806 and the number (e.g., −10 degrees) within the overlap portion 1802 indicate how much the device deviates from the level state (e.g., by 10 degrees in FIG. 18A).

Figure 18B:
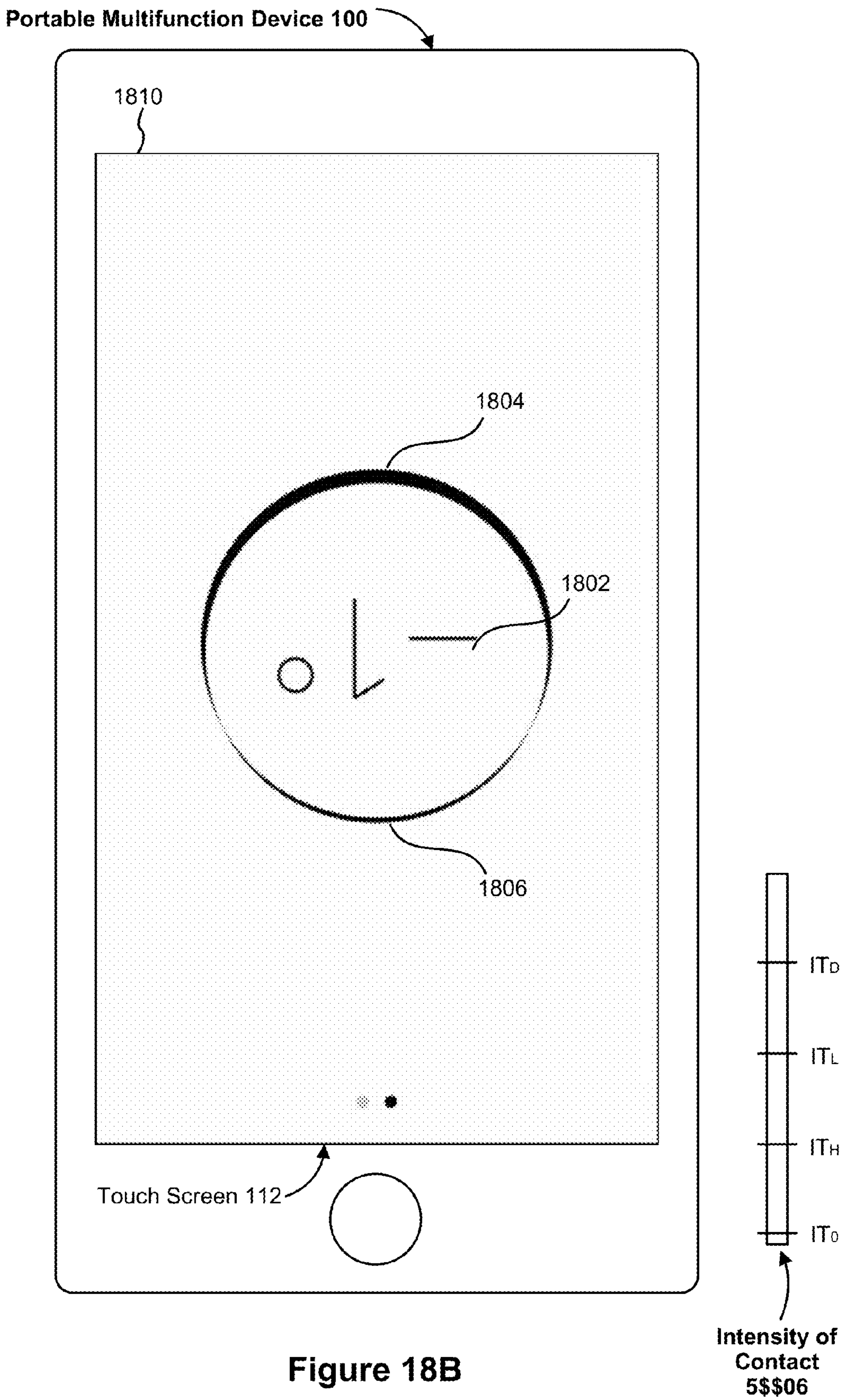
Figure 18C:
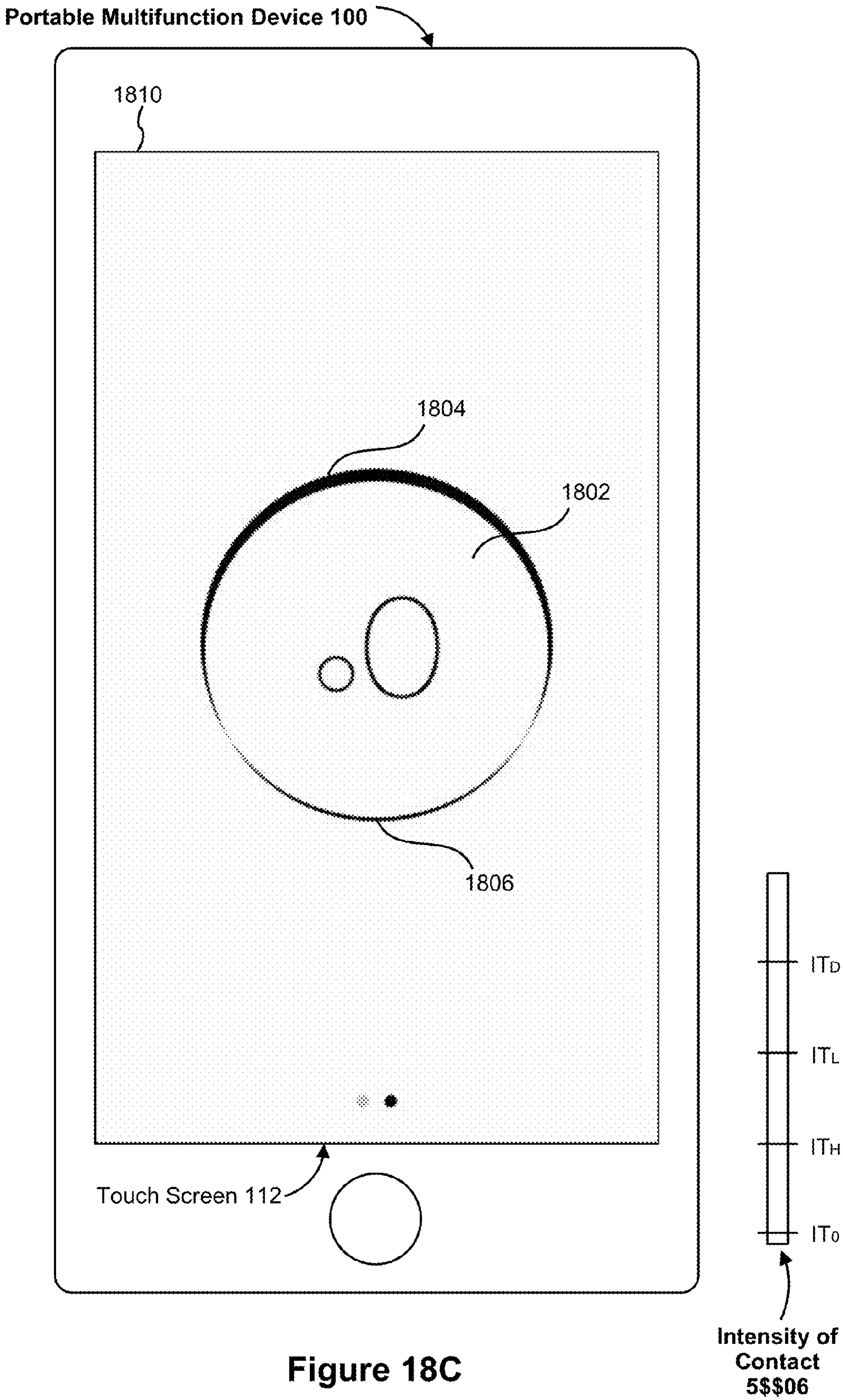
Figure 18D:
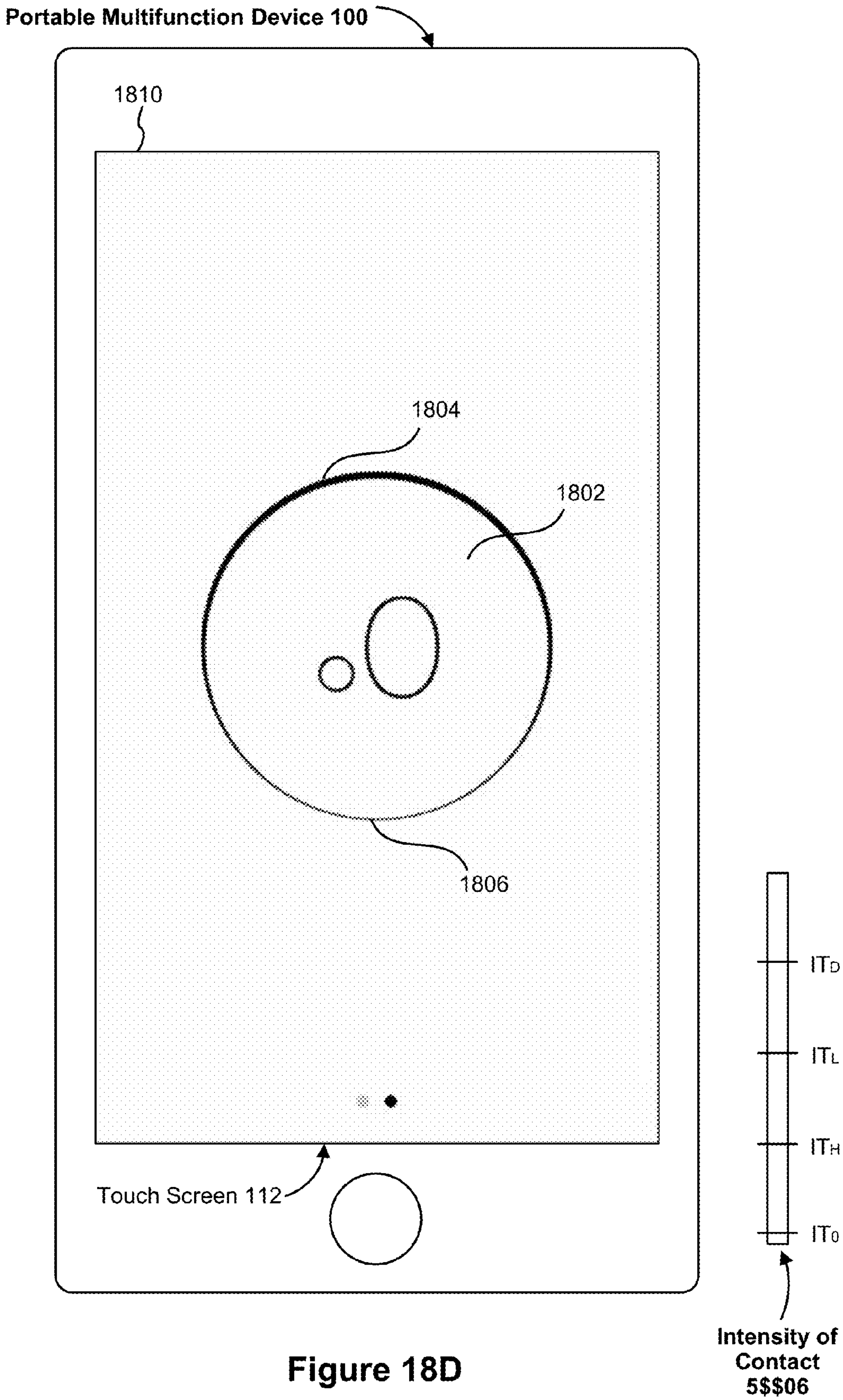

FIGS. 18B-18D illustrate that in accordance with adjusting the levelness of device 100, the alignment indicator is updated in real time to indicate that the device is approaching a level state, e.g., first deviating from a level state by 1 degree (FIG. 18B), then deviating from a level state by a fraction of a degree as indicated by the number 0 and the two circles 1806 and 1804 being almost concentric.

Figure 18E:
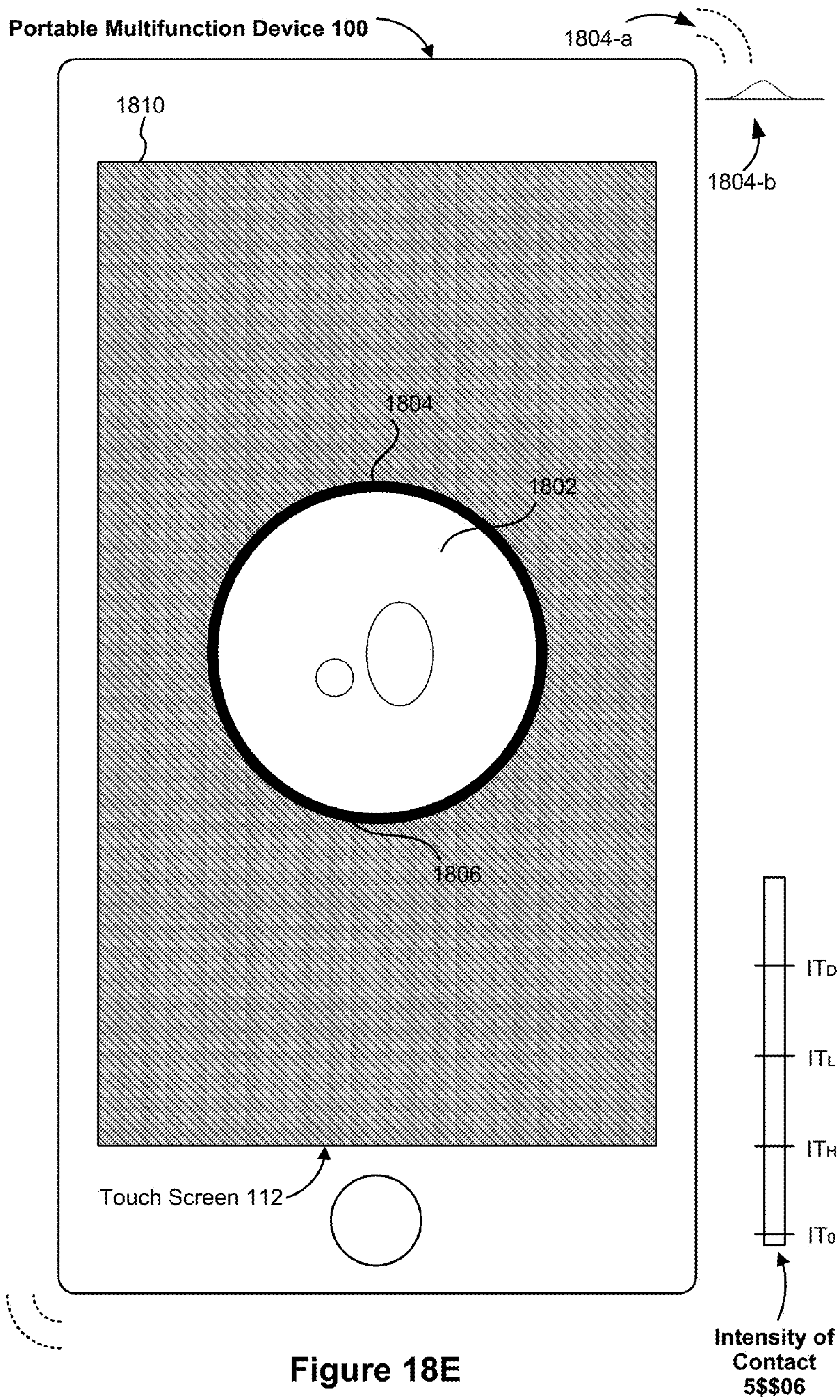

In FIG. 18E, in accordance with a determination that the device is level and stable, e.g., the deviation from the level state remains below a threshold amount (e.g., less than 1 degree) for at least a threshold amount of time (e.g., one second), the device changes the level interface 1810, e.g., to a different color or shade, to indicate that the current orientation of the device is level and stable, and generates a tactile output 1804 (e.g., MicroTap (150 Hz) with a gain of 0.8).

Figure 19A:
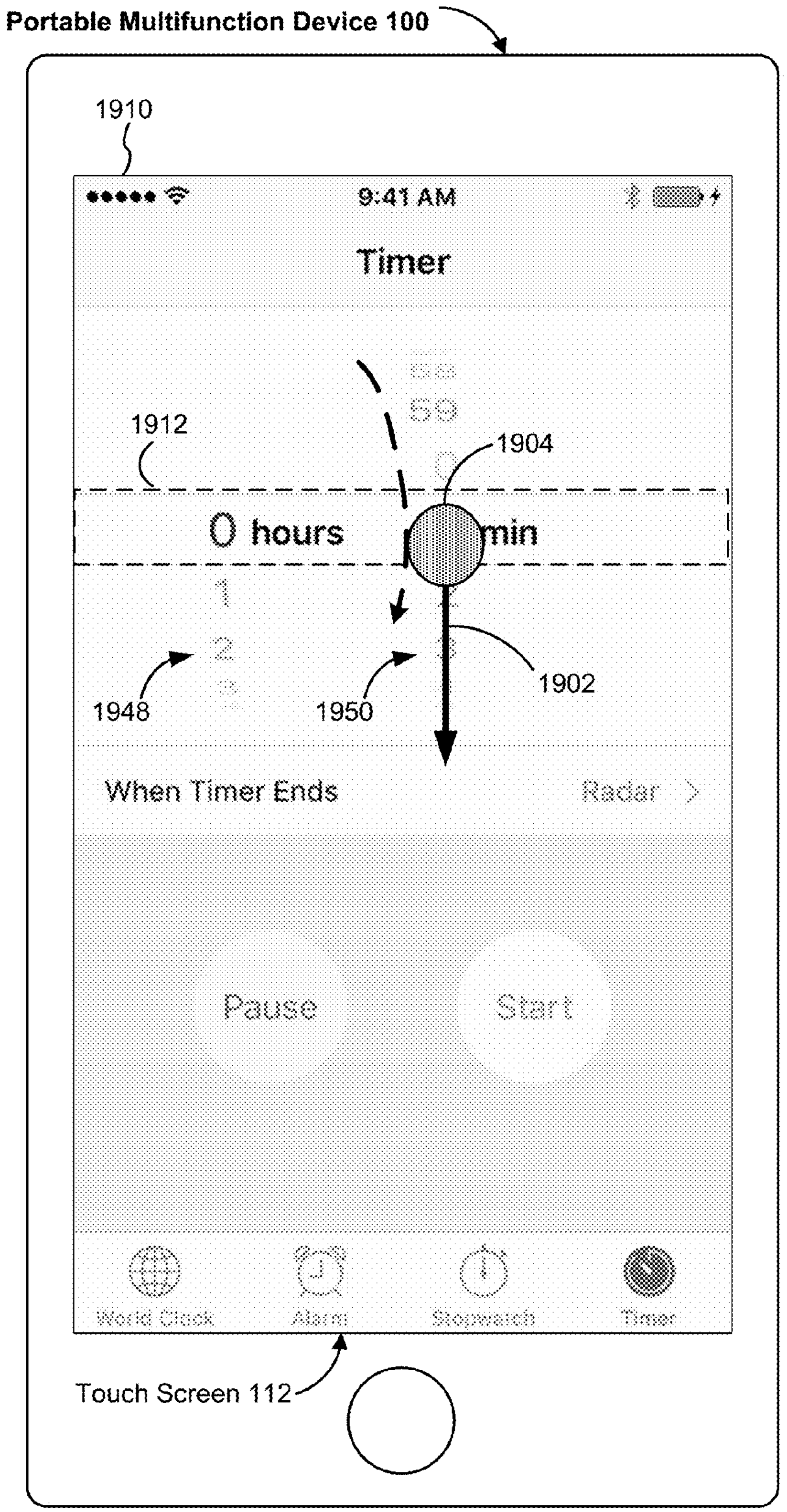
FIGS. 19A-19T illustrate exemplary user interfaces for providing haptic feedback for selection of a respective value in a value picker in accordance with some embodiments.
Figure 19B:
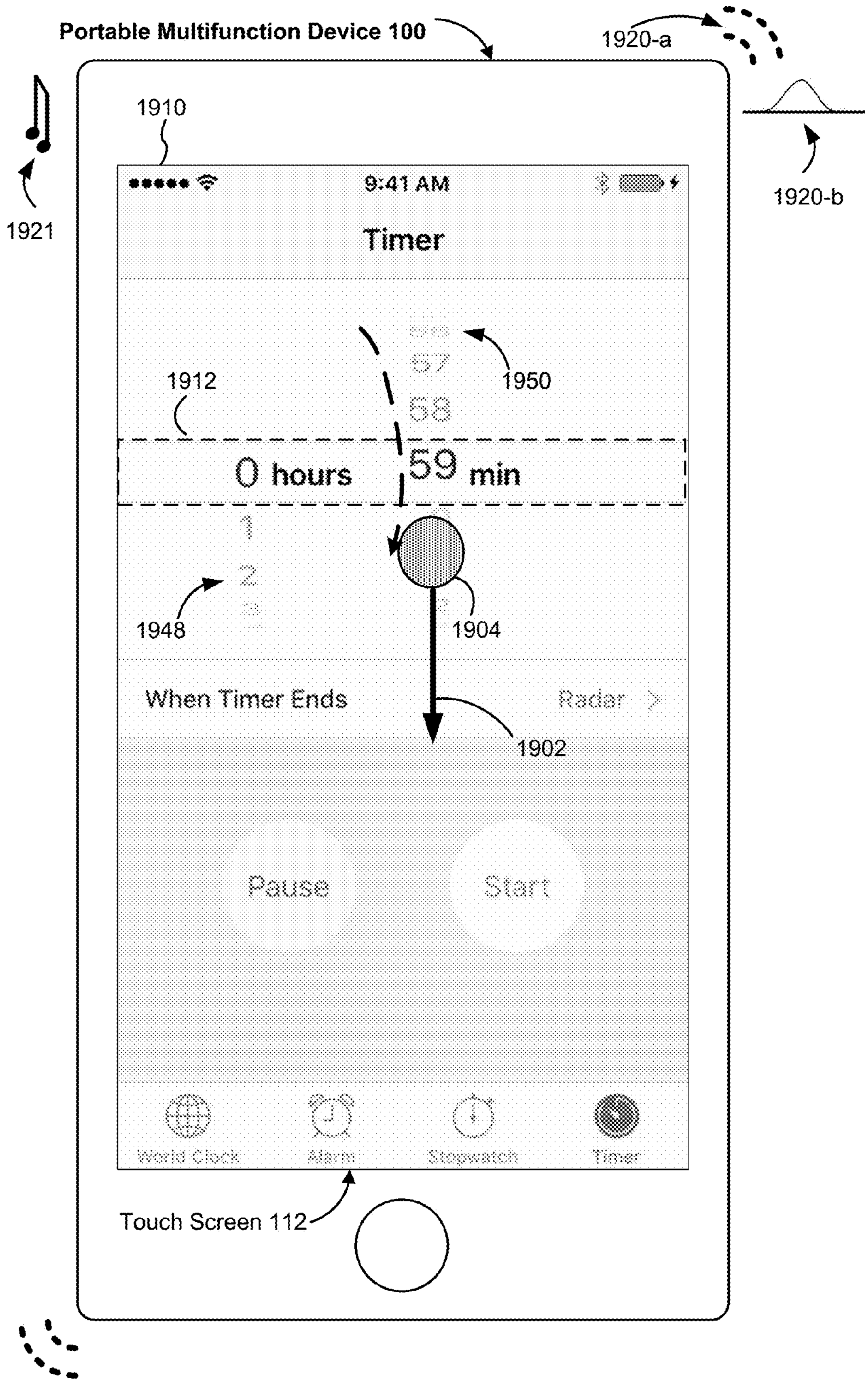
Figure 19C:
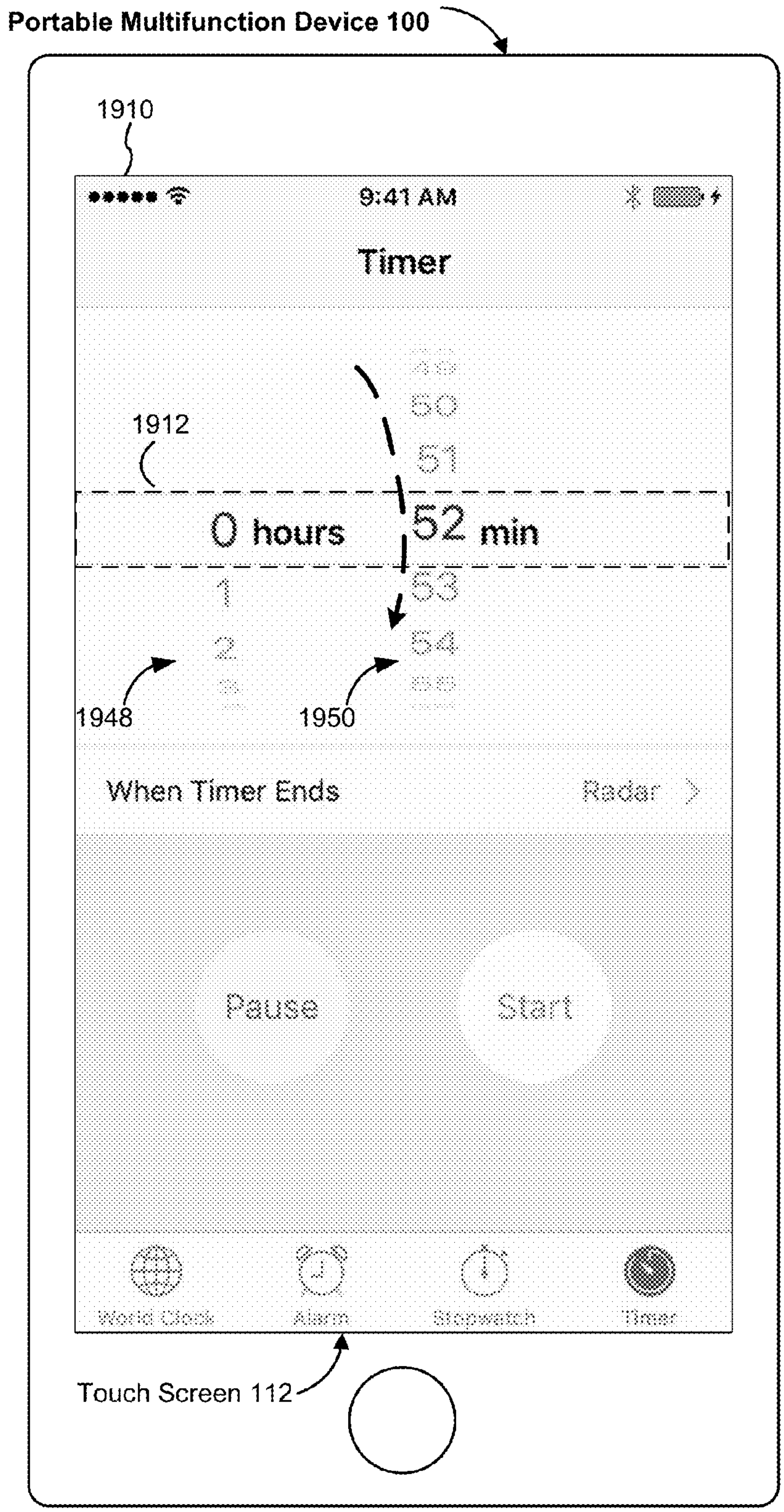
Figure 19D:
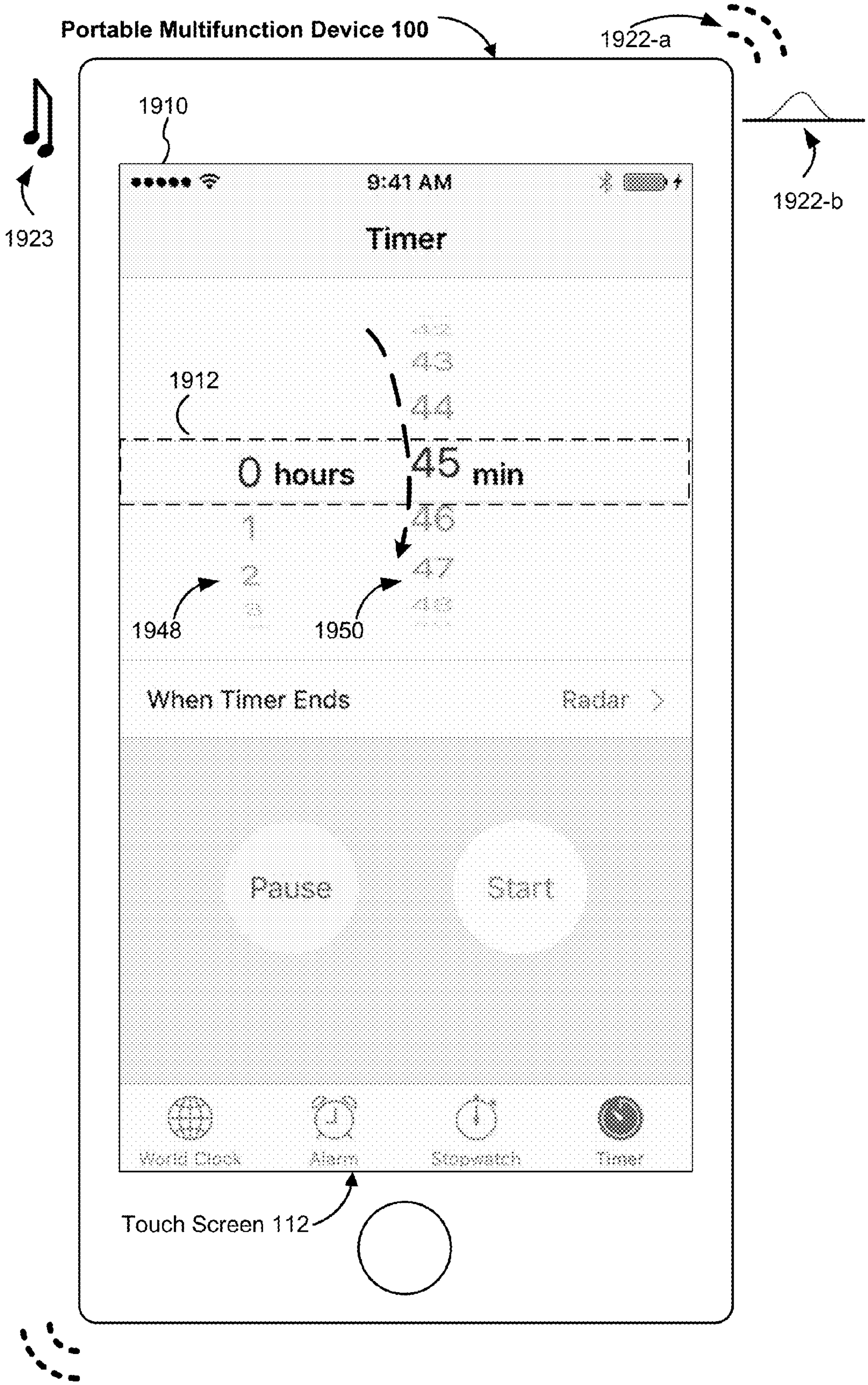
Figure 19E:
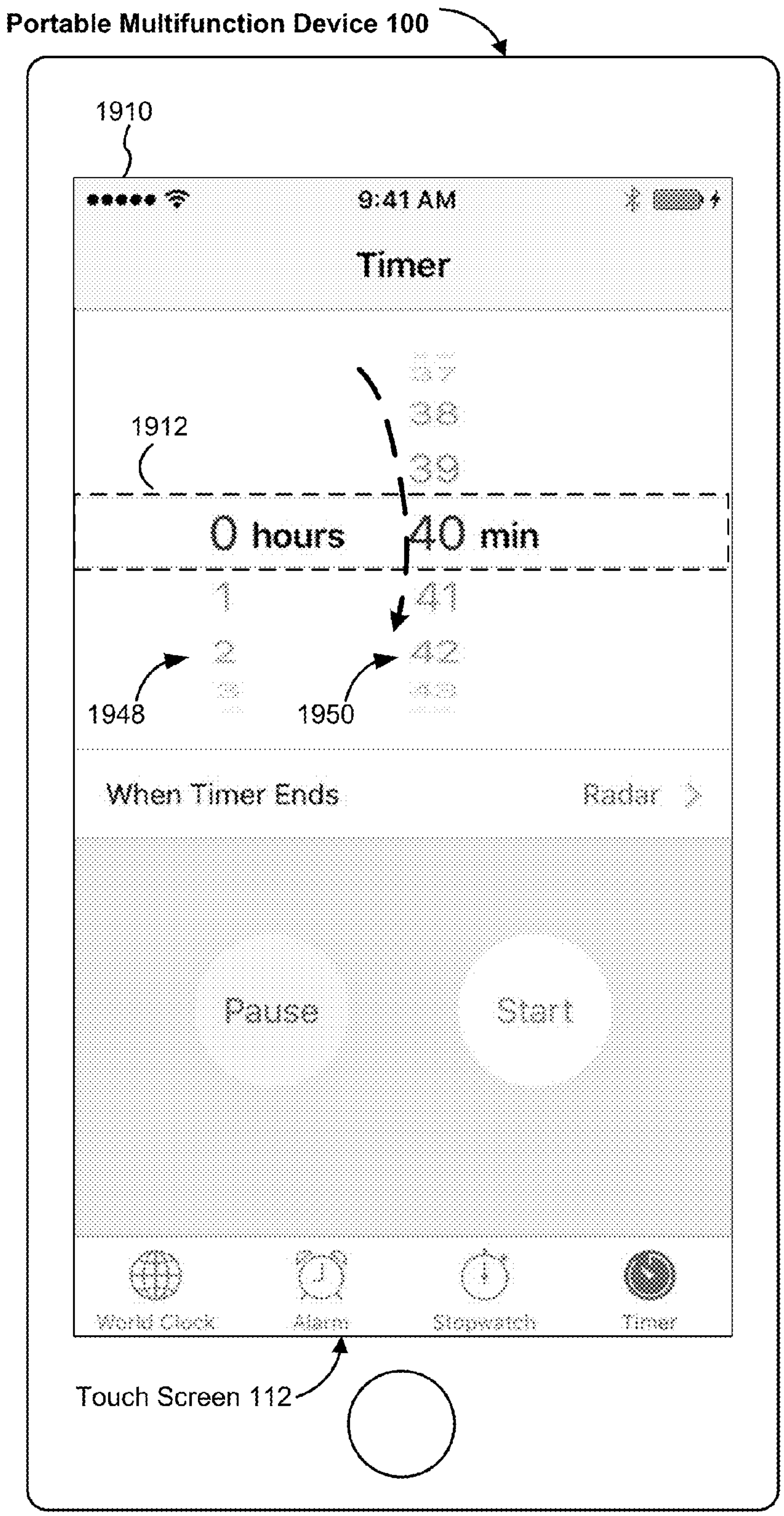
Figure 19F:
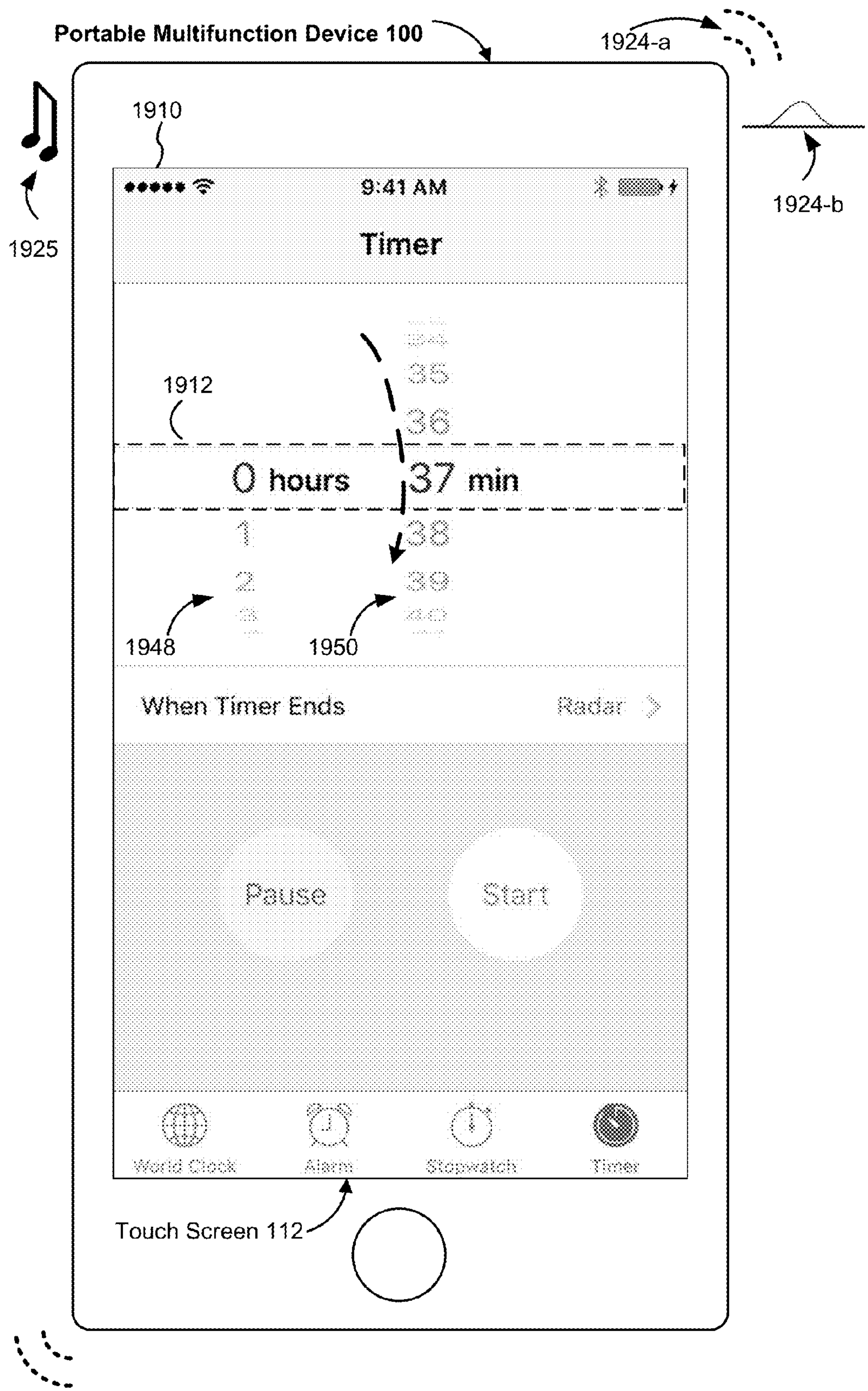
Figure 19G:
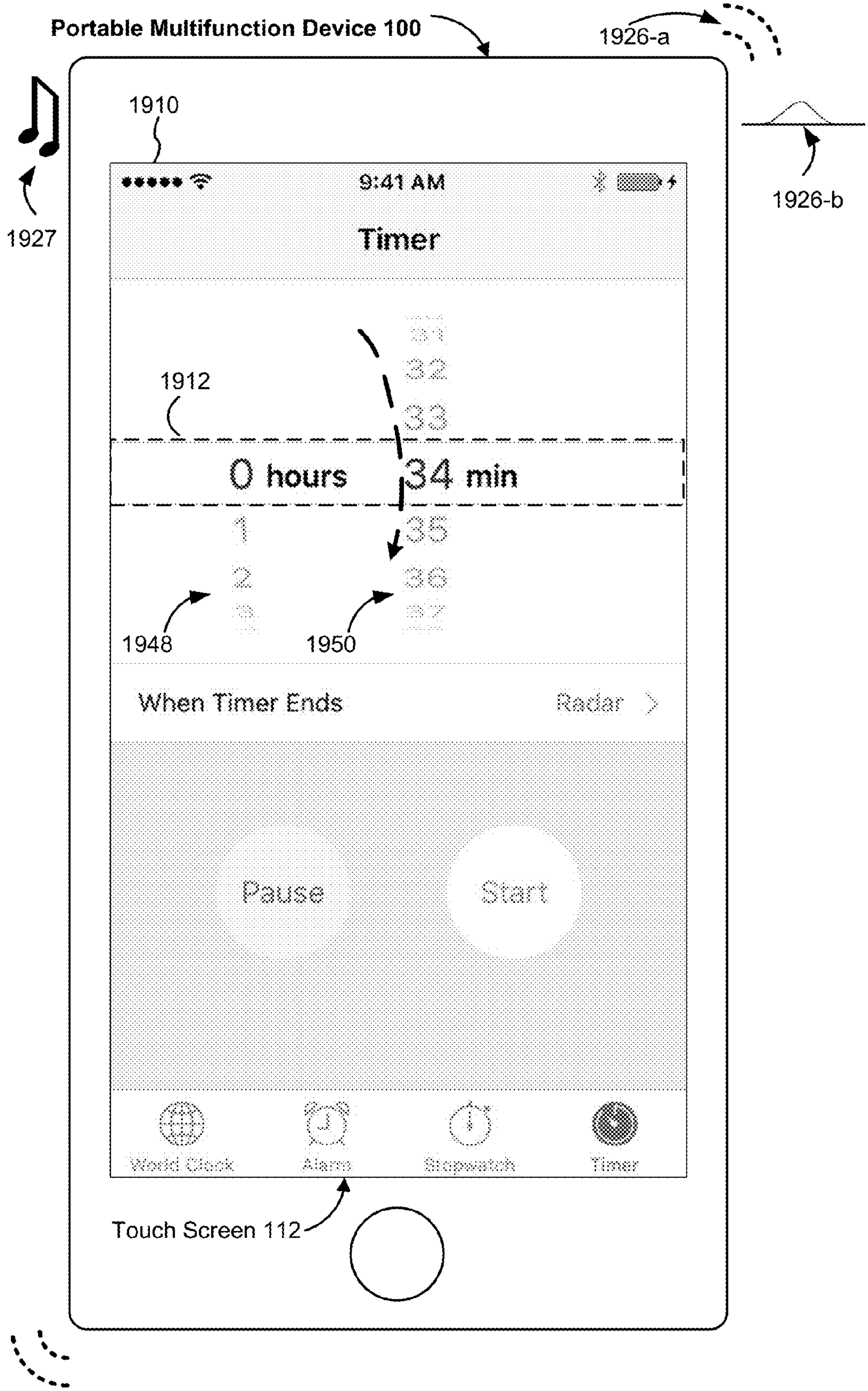
Figure 19H:
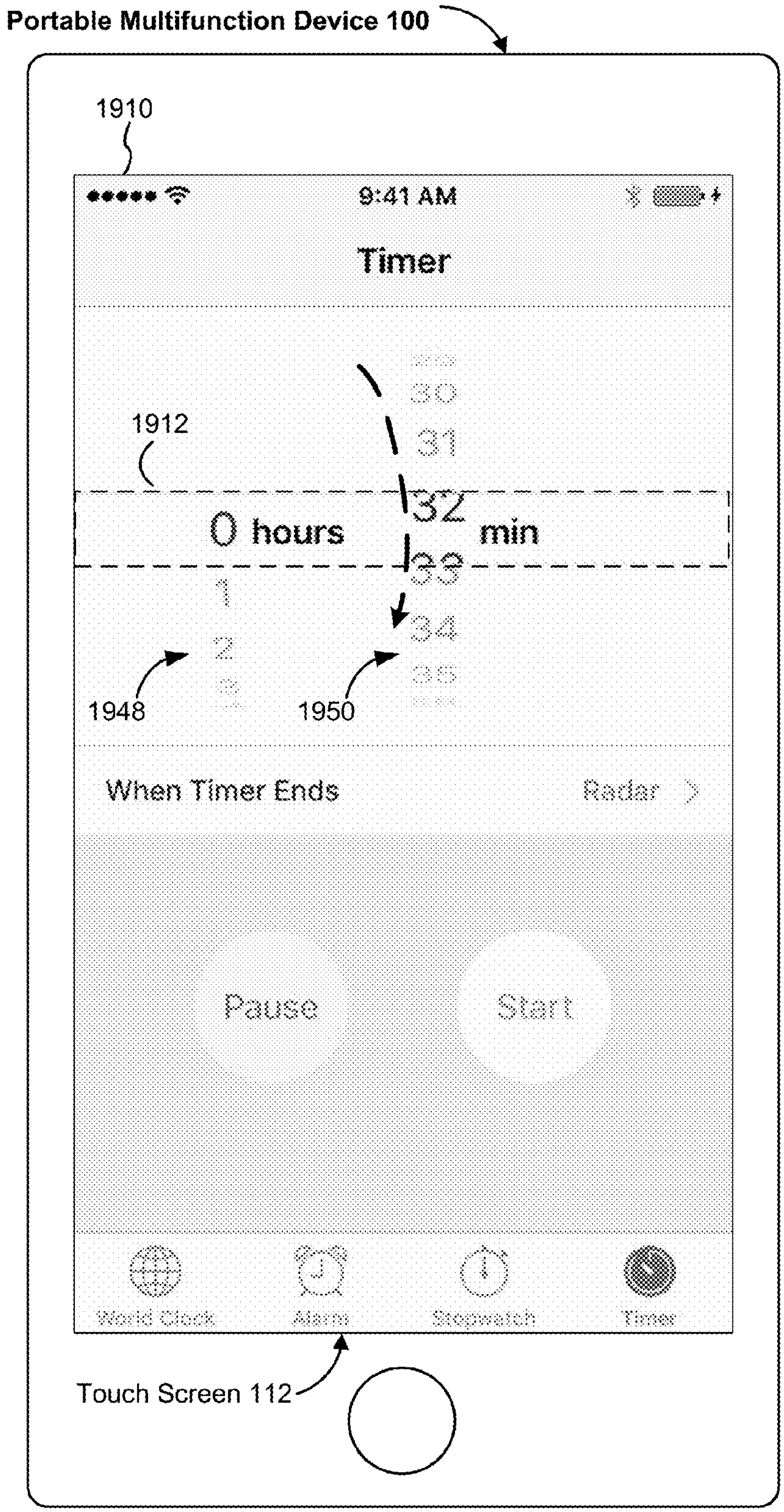
Figure 19I:
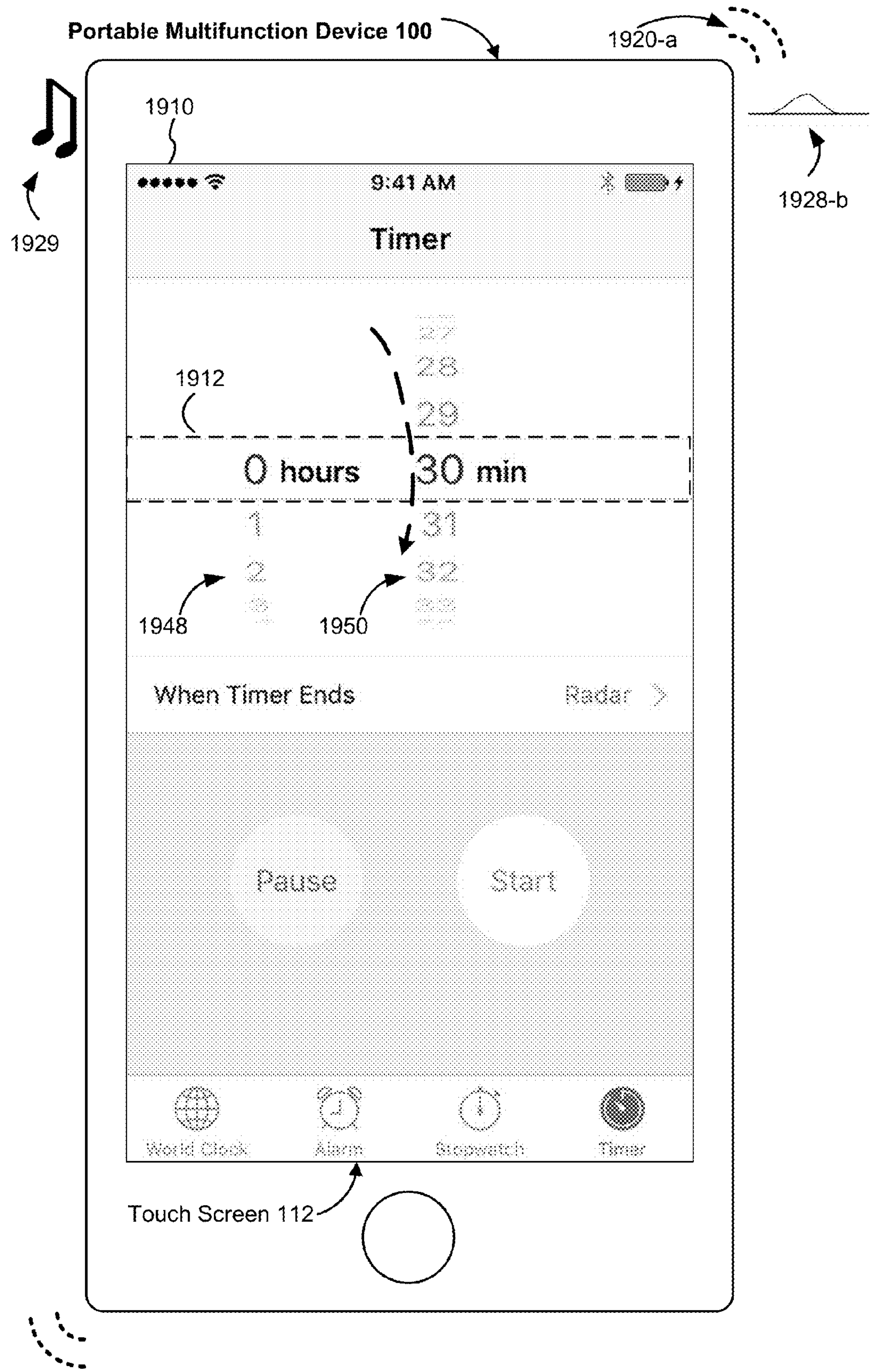
Figure 19J:
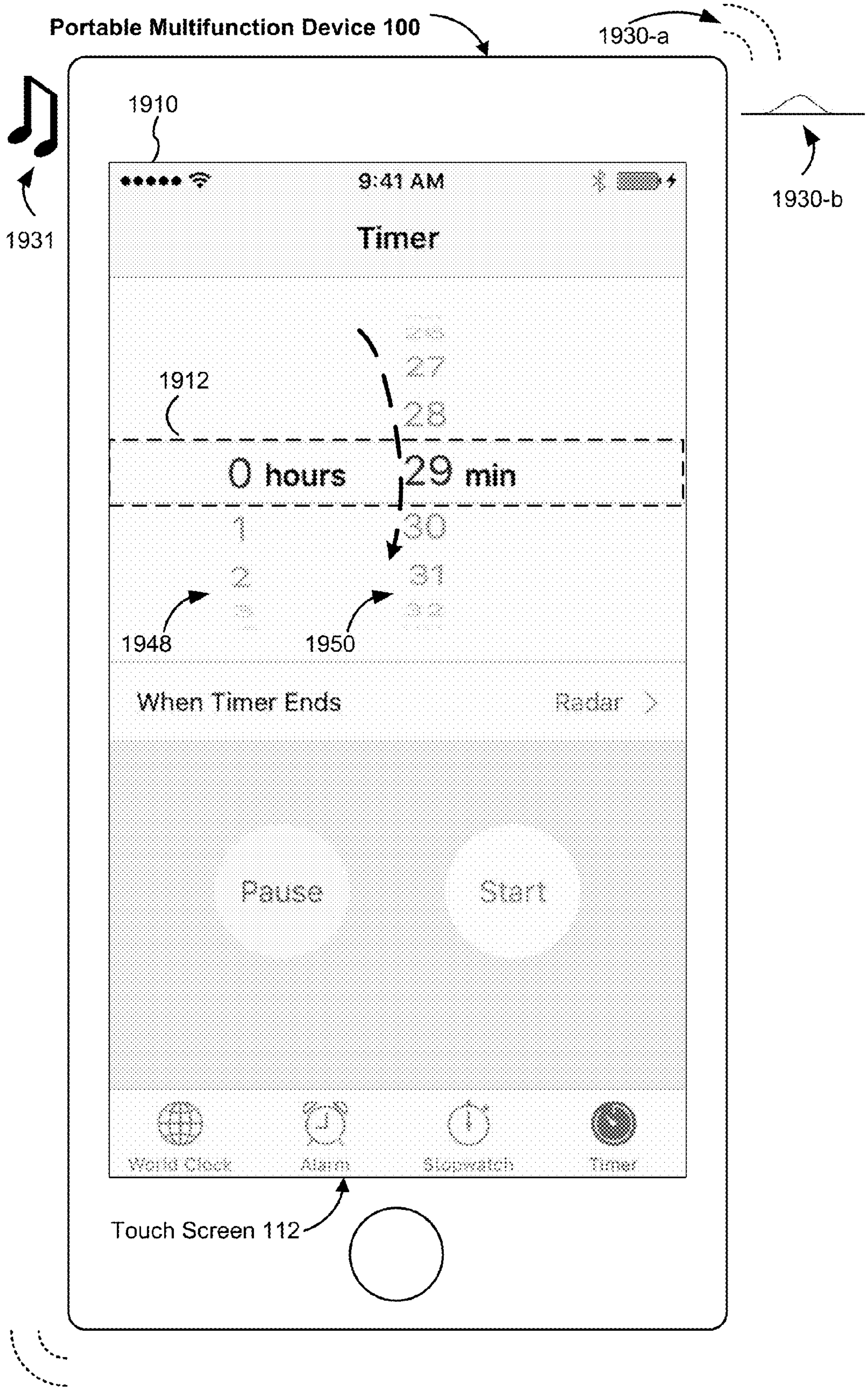
Figure 19K:
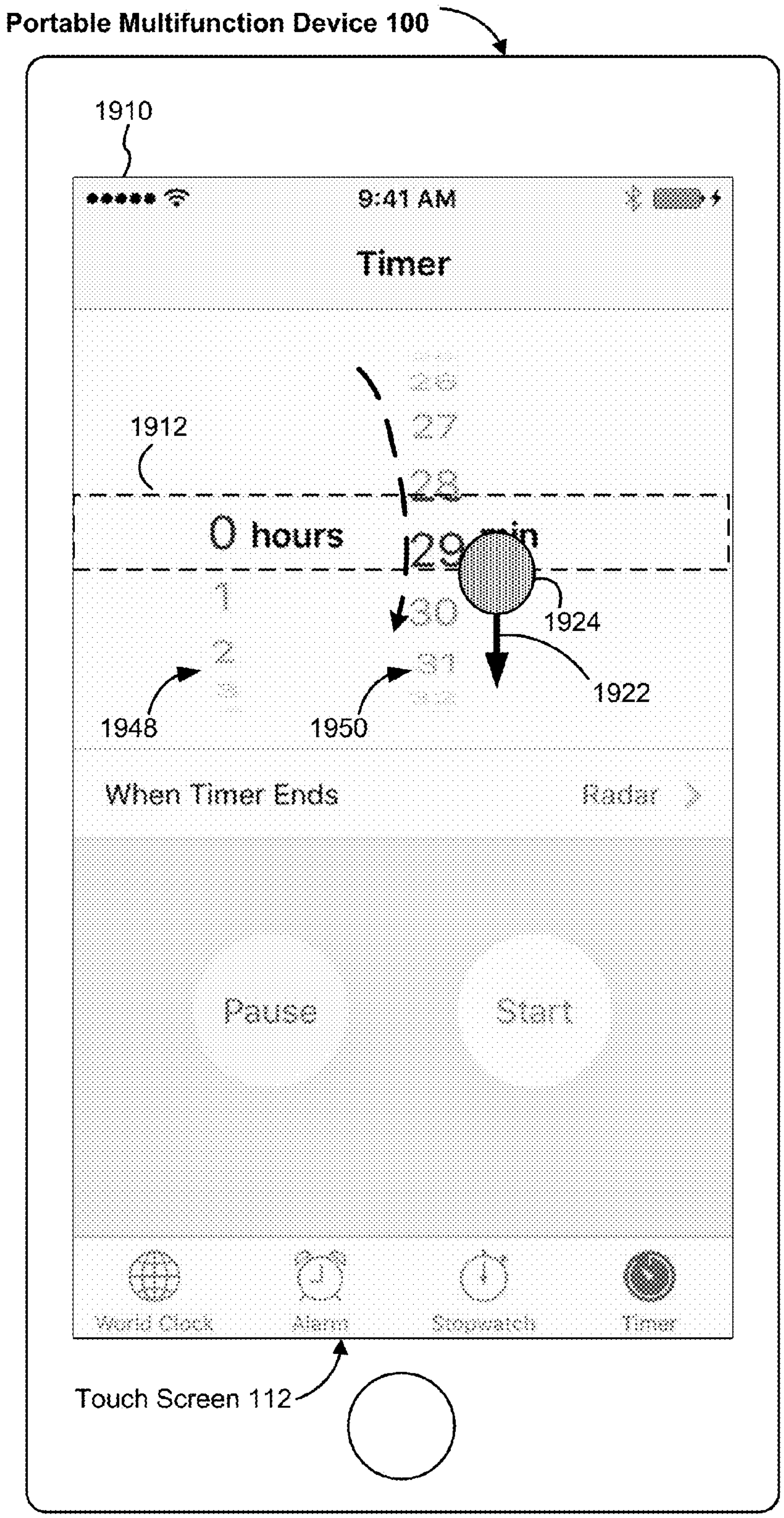
Figure 19L:
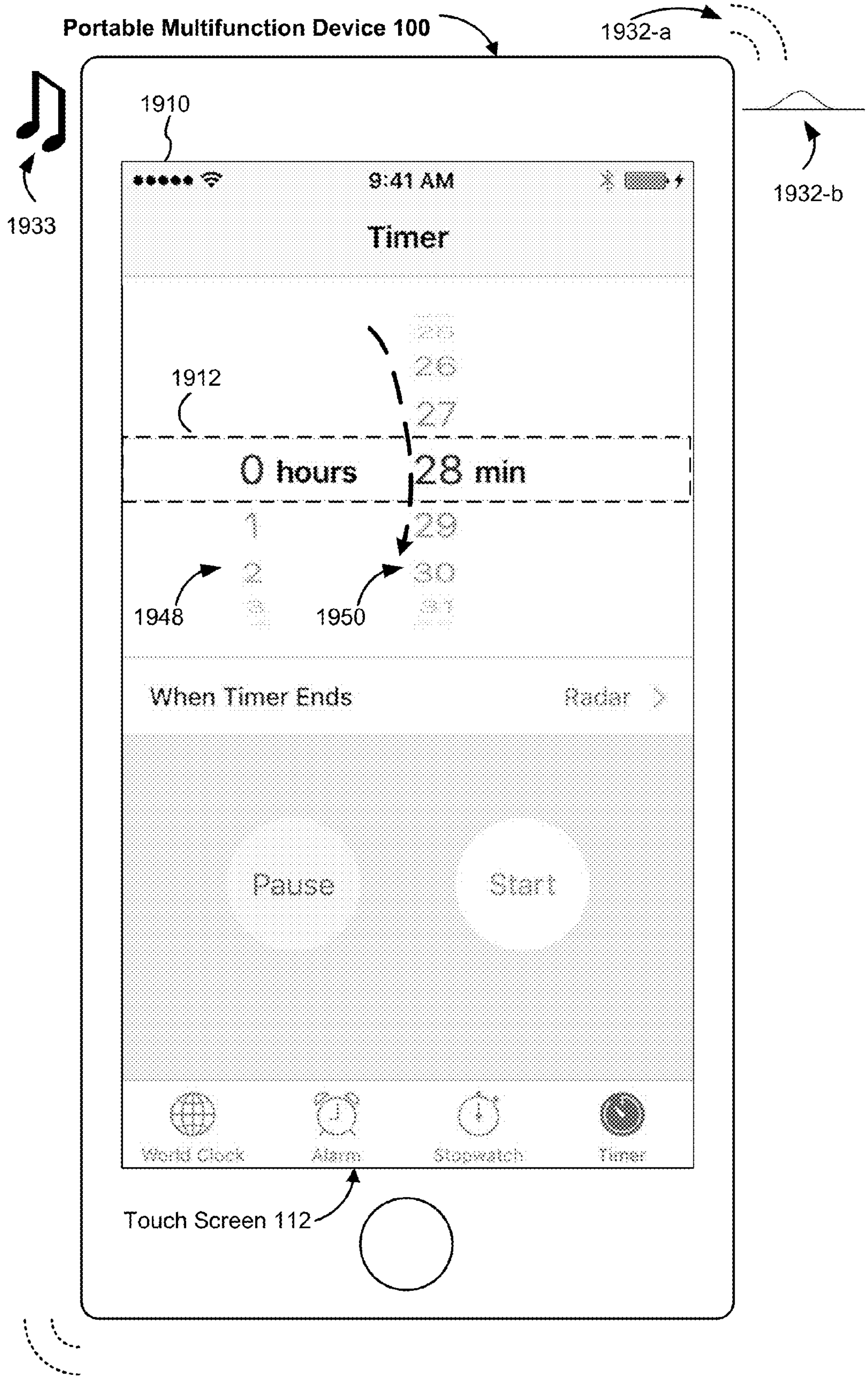
Figure 19M:
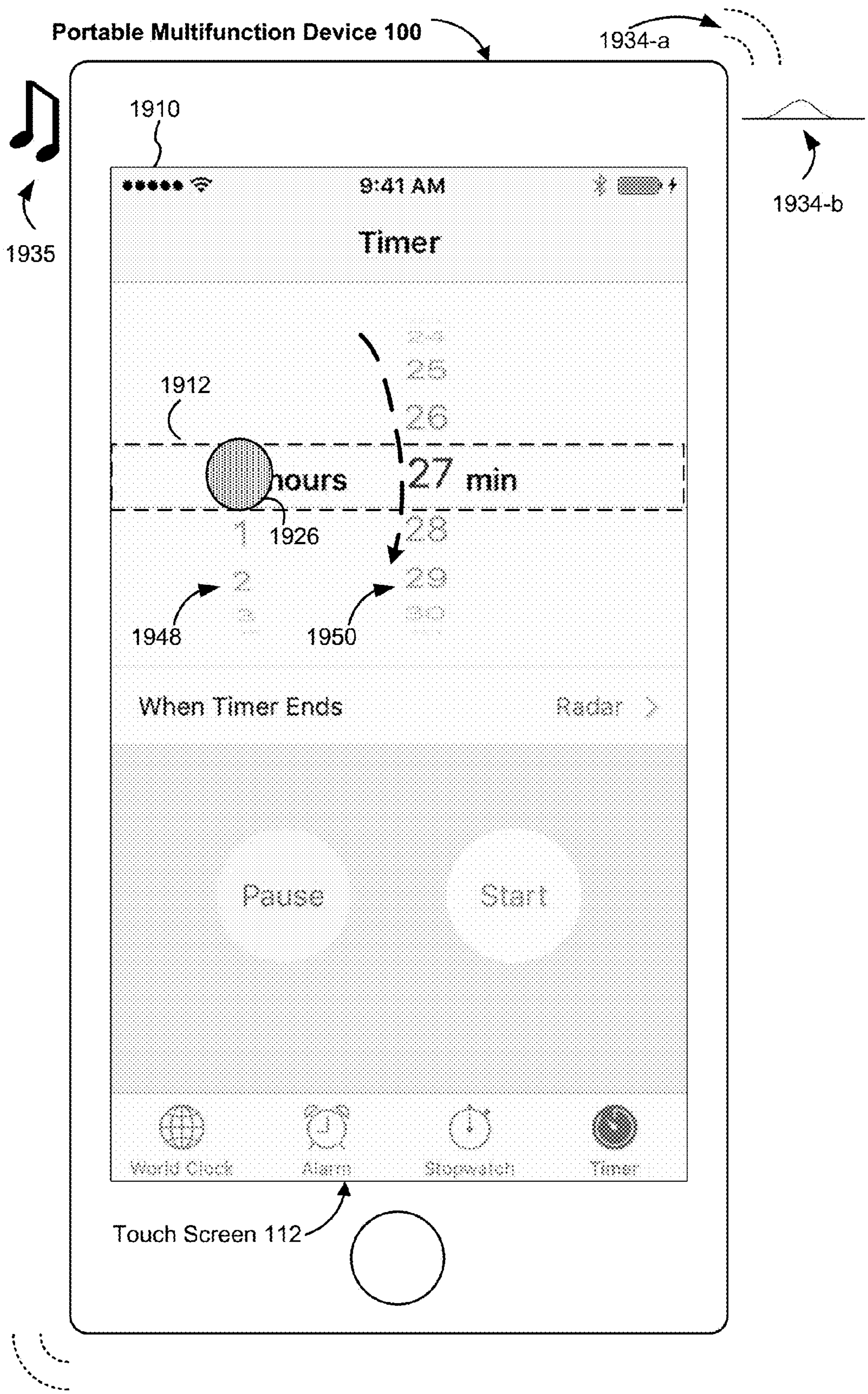
Figure 19N:
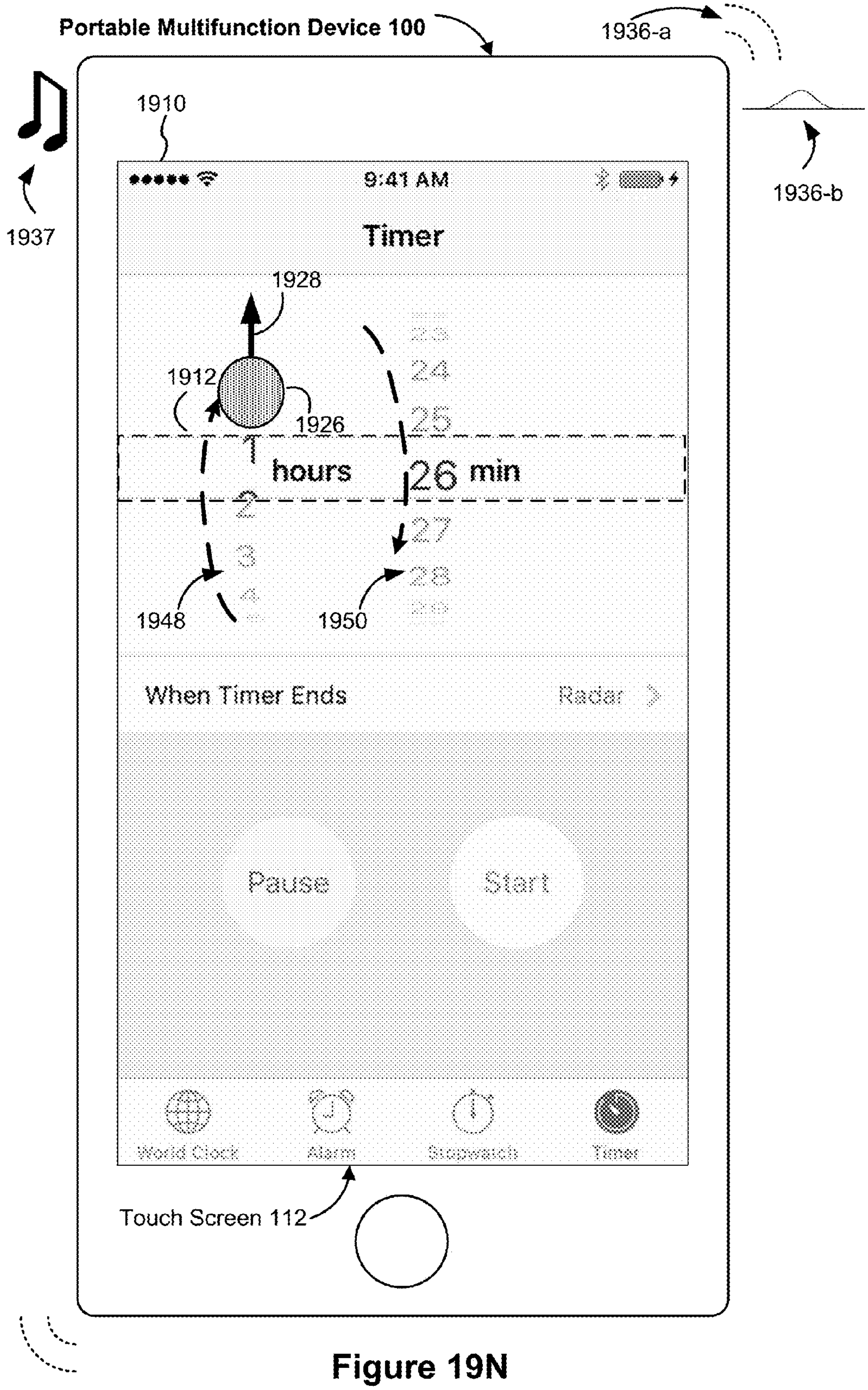
Figure 19O:
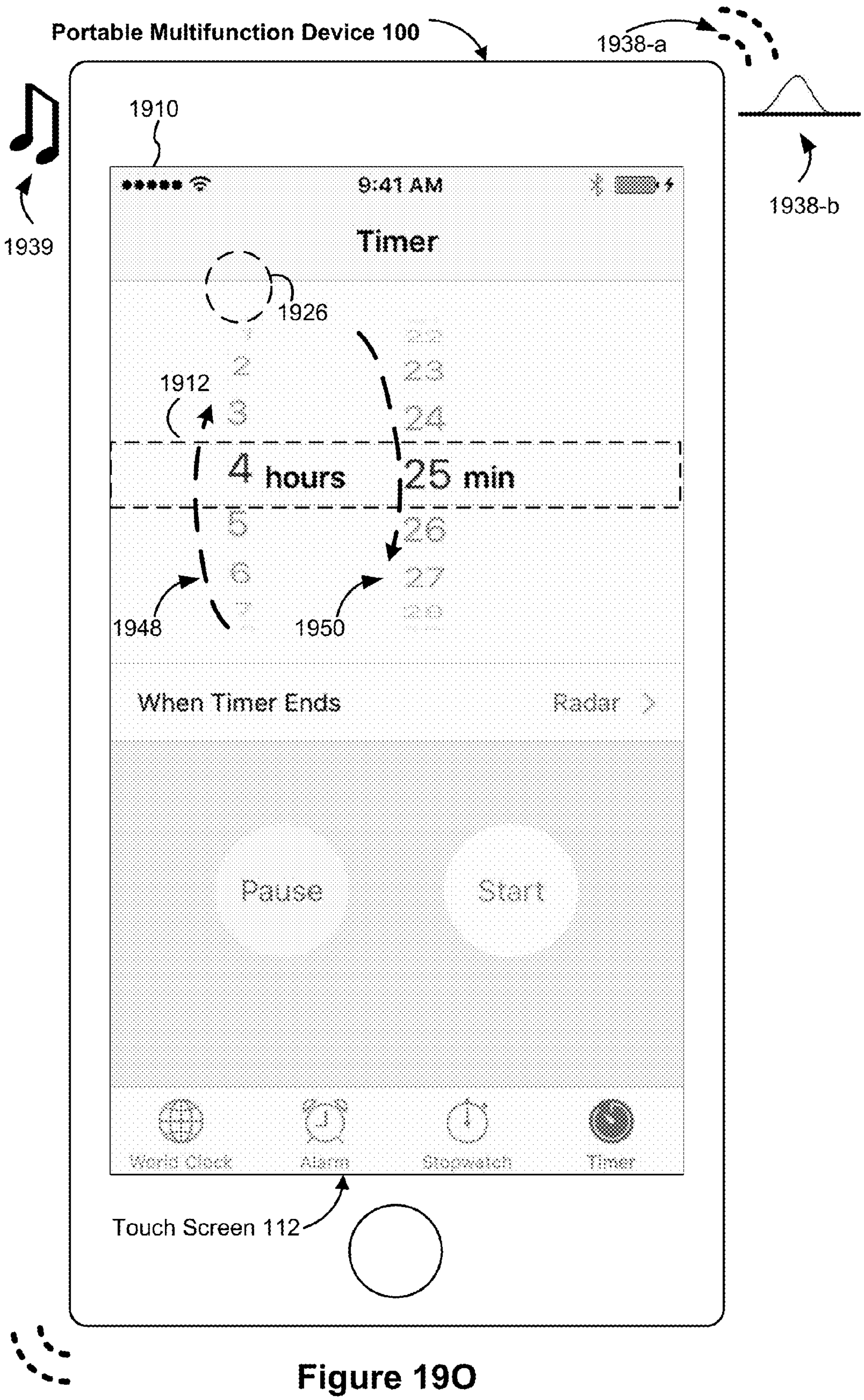
Figure 19P:
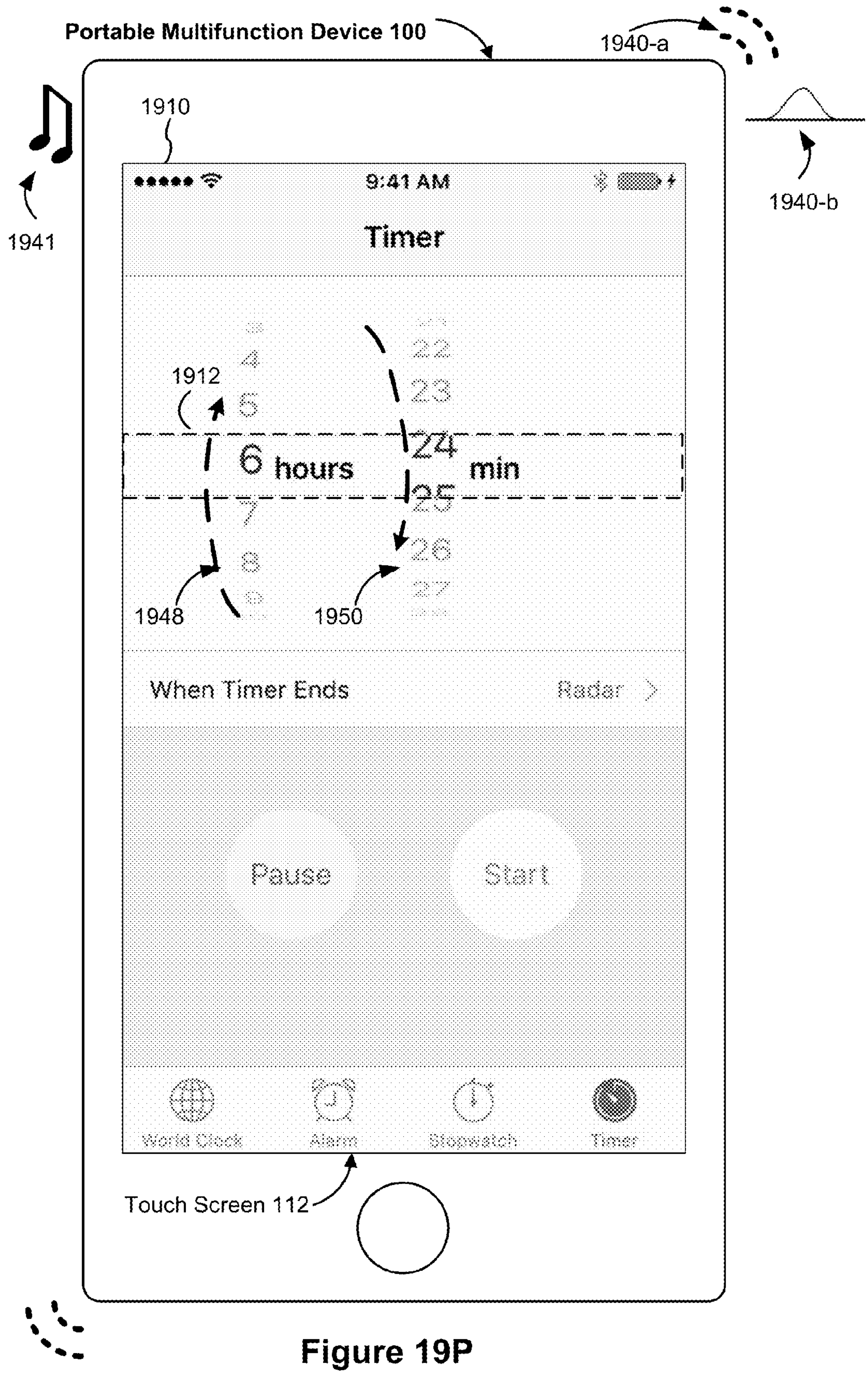
Figure 19Q:
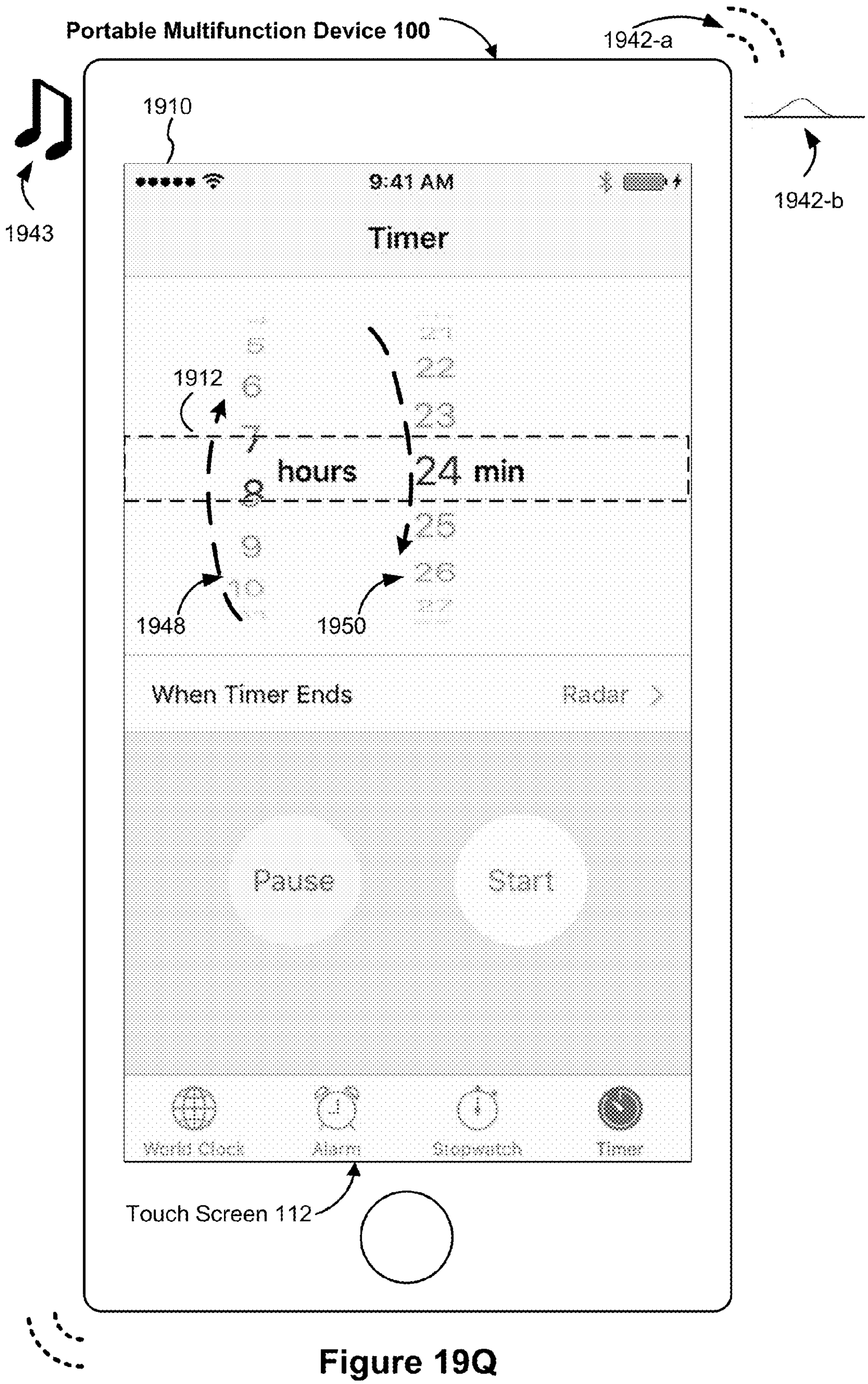
Figure 19R:
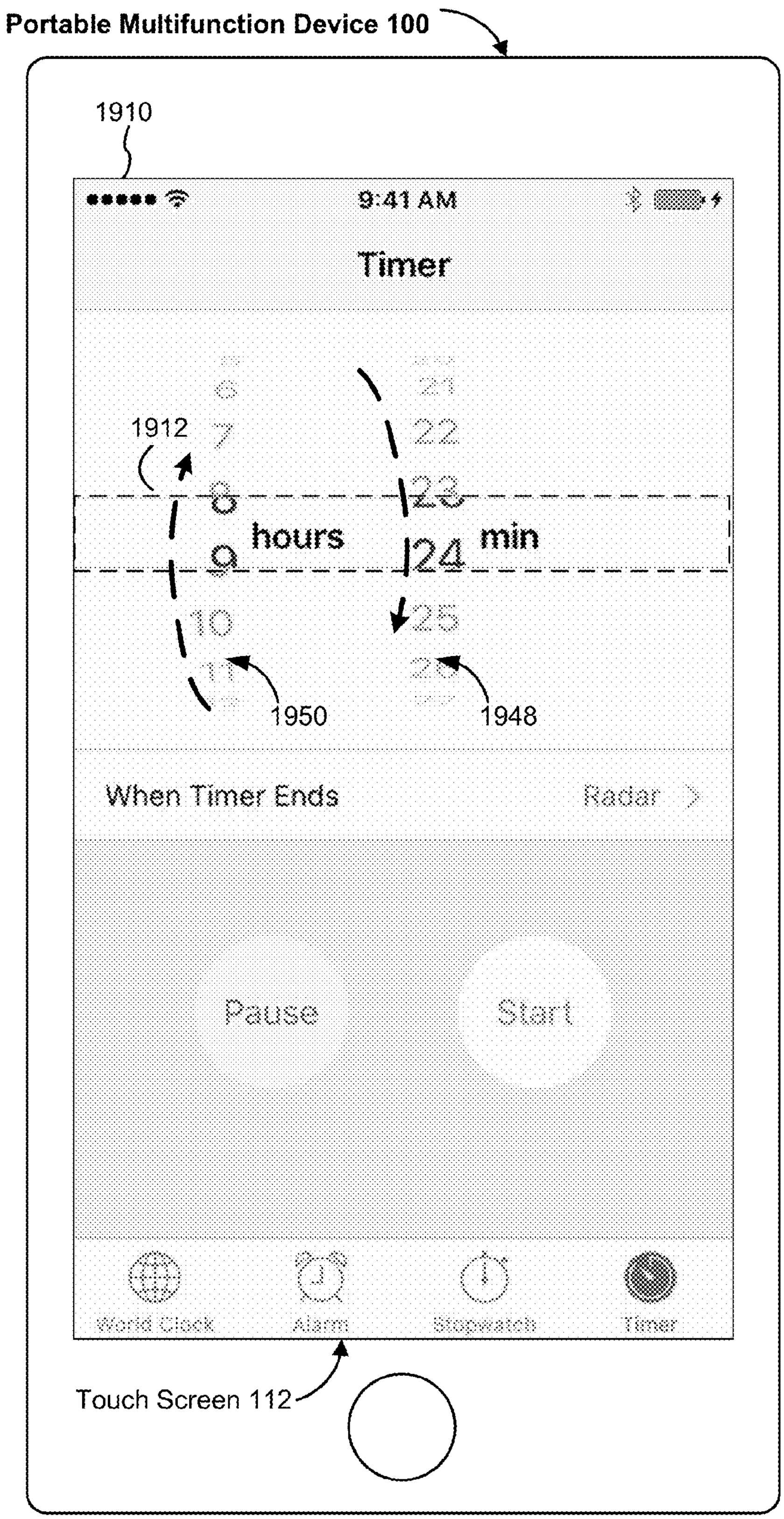
Figure 19S:
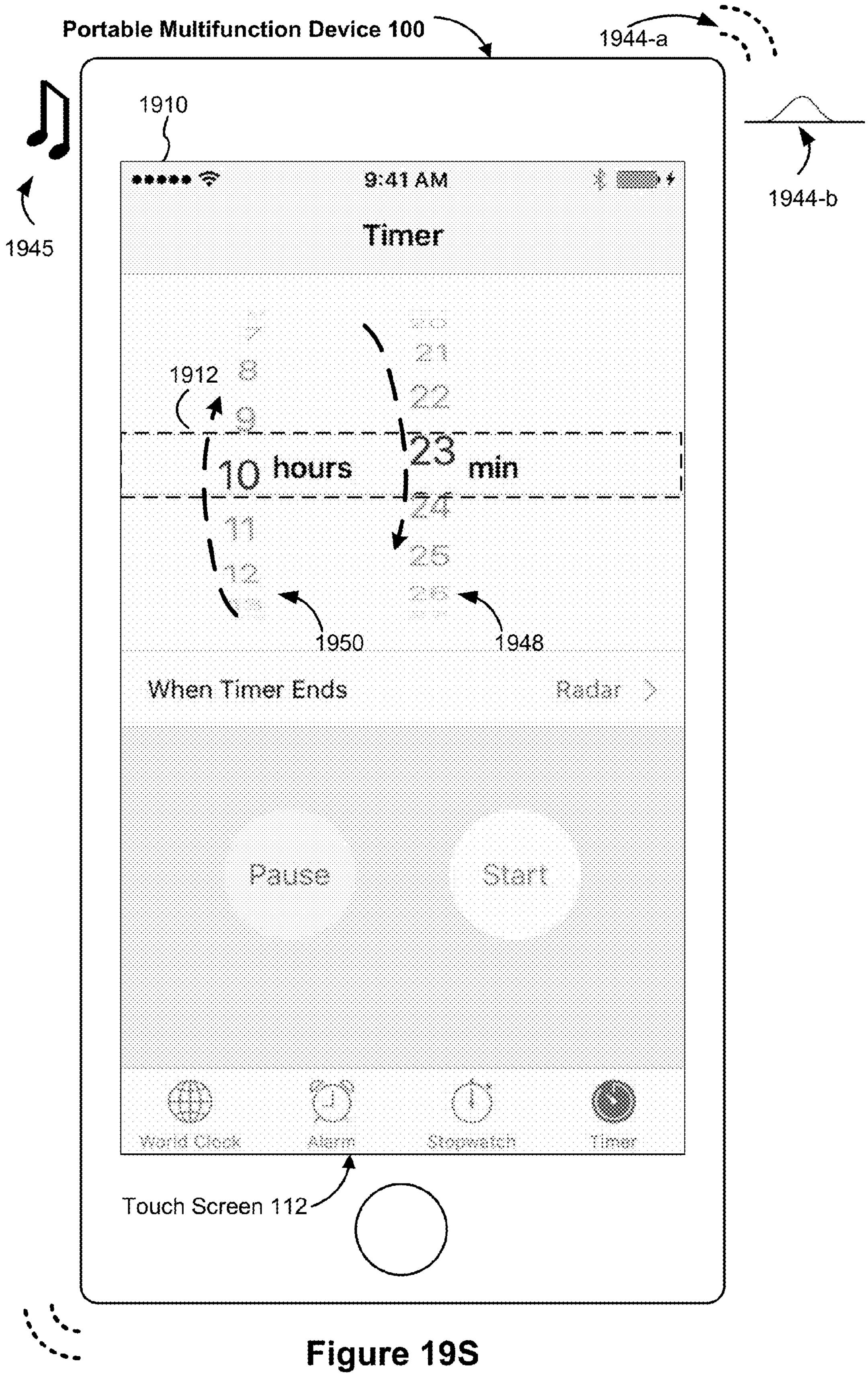
Figure 19T:
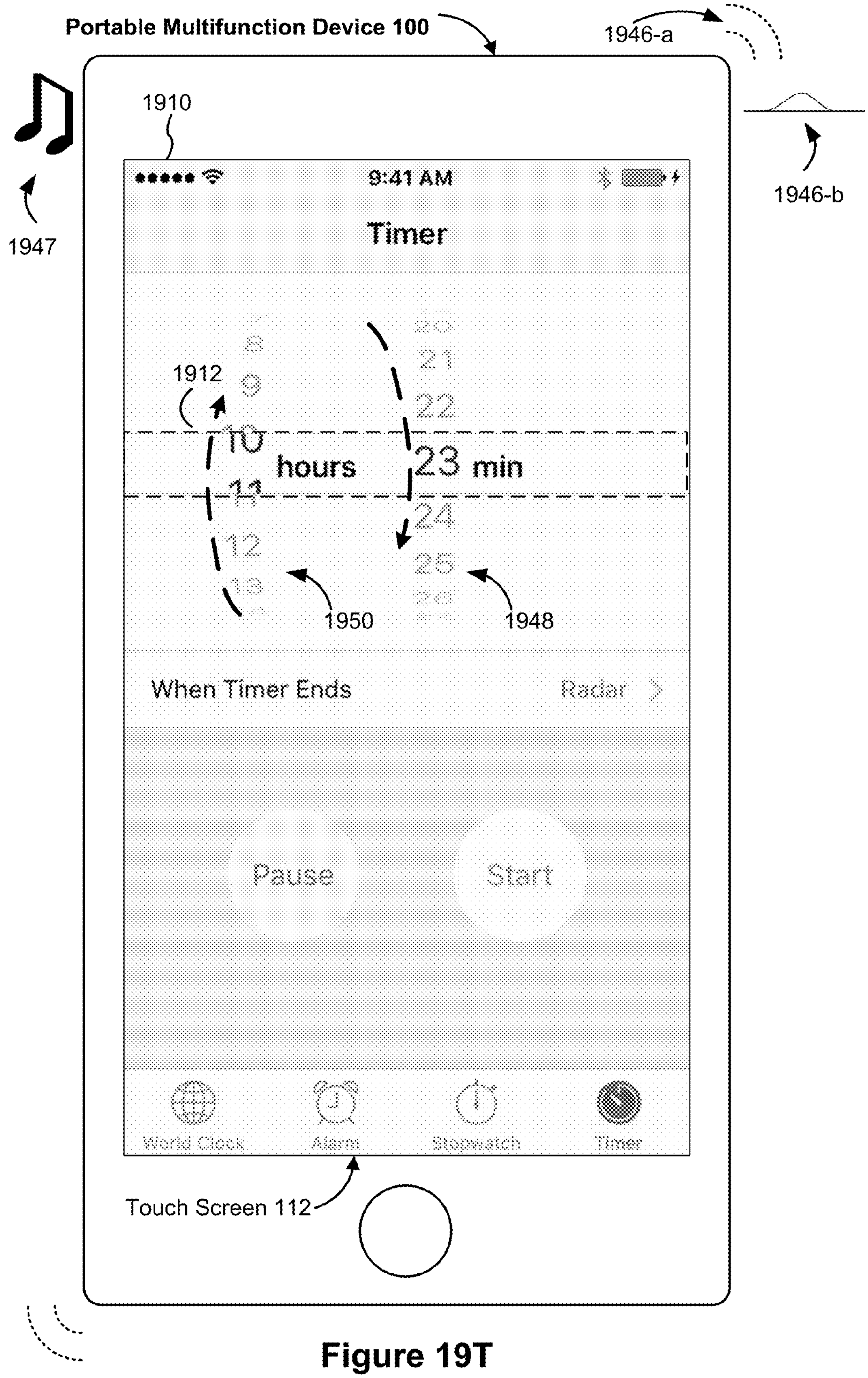

FIGS. 19A-19T illustrate generating tactile outputs when a moveable component moves through a sequence of selectable values or options in a value picker, in accordance with some embodiments. These figures are used to illustrate the processes described below with respect to FIGS. 34A-34D.

In this example, a time picker user interface 1910 is illustrated. Time picker user interface 1910 includes first moveable component 1950 (e.g., a rotatable minute wheel) for selecting a minute value from a sequence of sixty minute values (e.g., 0-59). Time picker user interface 1910 further includes second moveable component 1948 (e.g., a rotatable hour wheel) for selecting an hour value from a sequence of twenty four hour values (e.g., 0-23). Moveable component 1950 moves through a minute value when the minute value is presented within a stationary selection window 1912 in front of moveable component 1950. Similarly, moveable component 1948 moves through an hour value when the hour value is presented within stationary selection window 1912 in front of moveable component 1948. Though exemplary interface 1910 is a time picker, time picker user interface 1910 can be a date picker or alike, e.g., a date picker that includes movable components for choosing a year, a month, and a date value from a plurality of year, month, and date values, respectively.

FIGS. 19A-19J illustrate moving minute wheel 1950 through a sequence of minute values and generating tactile outputs in connection with the minute wheel moving through one or more of the sequence of minute values. FIGS. 19K-19T illustrate moving both the hour wheel and the minute wheel at the same time and generating respective tactile outputs in connection with the dual movements.

In FIG. 19A, the device detects a scroll input directed to minute wheel 1950 that includes downward movement 1902 of contact 1904 at a location that corresponds to minute wheel 1950.

In FIG. 19B, in response to detecting the scroll input by contact 1904, the device rotates minute wheel 1950 such that respective markers for minute values passes through stationary selection window 1912. For example, in accordance with the downward movement 1902 of contact 1904, minute wheel has moved through value "0" and is moving through value "59" in FIG. 19B. In conjunction with showing minute wheel 1950 moving through value "59" (e.g., the currently selected minute value for the time picker is "59"), the device generates tactile output 1920 (e.g., MicroTap High (270 Hz) with a gain of 0.9 and a threshold minimum interval of 0.05 seconds since the last tactile output that was generated by the same tactile output generator or by the device) to indicate that a new minute value has been selected by movement of minute wheel 1950. In addition, the device also generates haptic audio output 1921 to accompany tactile output 1920. The haptic audio output 1921 has a haptic audio output pattern (e.g., frequency, amplitude, duration, and/or timing) that is selected in accordance with the tactile output pattern (e.g., frequency, amplitude, duration, and/or timing) of tactile output 1920.

After detecting movement 1902 of contact 1904, the device detects lift-off of contact 1904 (not shown). As shown in FIGS. 19B-19J, after the lift-off the contact 1904, the minute wheel continues to rotate due to simulated inertia, and the continued movement slows down gradually until the movement of minute wheel 1950 stops. As minute wheel 1950 moves through a sequence of minute values, a tactile output and an accompanying haptic audio output are generated for the selection of each value, except when a threshold amount time (e.g., 0.05 seconds) has not expired since the time when a tactile output was last generated (e.g., for the selection of a previous minute value in the time picker). In other words, when the minute wheel is moving through multiple values in a very short amount of time (e.g., when the wheel is spinning at a fast speed right after lift-off of contact 1904), the threshold rate for generating tactile outputs is reached, and some tactile outputs that are due to be generated are skipped. In some embodiments, when a particular tactile output is skipped due to the constraint on tactile output generate rate, the device optionally continues to play the haptic audio output that was supposed to accompany the skipped tactile output, in order to provide non-visual feedback to the user in the absence of the particular tactile output.

As shown in FIGS. 19B-19J, respective tactile outputs (e.g., tactile outputs 1920, 1922, 1924, 1926, 1928, and 1930) are generated when minute value "59" (FIG. 19B), minute value "45" (FIG. 19D), minute value "37" (FIG. 19F), minute value "34" (FIG. 19G), minute value "30" (FIG. 19I), and minute value "29" (FIG. 19J) each become the currently selected minute value in the time picker. As shown in these Figures, the amplitudes of these tactile outputs are gradually decreased (e.g., with gain factors reducing from 0.9 to 0.3) as the speed of minute wheel 1950 gradually slows down. In some embodiments, the amplitude is adjusted smoothly with decreasing speed of the wheel. In some embodiments, the amplitude is adjusted at discrete steps with threshold ranges of speed corresponding to each discrete amplitude or gain value. The waveforms and frequencies of these tactile outputs are kept constant (e.g., MicroTap (270 Hz)). In addition to the tactile outputs (e.g., tactile outputs 1920, 1922, 1924, 1926, 1928, and 1930) that are generated, the device also generate a respective haptic audio output (e.g., haptic audio outputs 1921, 1923, 1925, 1927, 1929, and 1931, respectively) to accompany each of the tactile outputs (e.g., each of tactile outputs 1920, 1922, 1924, 1926, 1928, and 1930) that are generated. In some embodiments, the frequencies of the haptic audio outputs (e.g., haptic audio outputs 1921, 1923, 1925, 1927, 1929, and 1931) are gradually decreased as the speed of minute wheel 1950 gradually slows down. By decreasing the frequencies of the haptic audio outputs and keeping the frequencies of the tactile outputs constant, the functional requirements placed on the tactile output generator(s) is reduced, thereby lowering manufacturing cost of the tactile output generator(s) and the device, without seriously compromising the quality of haptic feedback provided to the user.

In some embodiments, a threshold maximum rate for tactile output generation is imposed on the tactile output generator used to generate tactile outputs in response to detecting the minute wheel passing through minute values in the time picker. For example, in some embodiments, a maximum rate of one tactile output per 0.05 seconds is imposed, and if the device or the tactile output generator of the device has provided a tactile output, the device or tactile output generator of the device will skip a next tactile output if the next tactile output is due to be generated before the expiration of the threshold time interval of 0.05 seconds. As shown in FIGS. 19B-19J, the device skipped tactile outputs when minute value "52" (FIG. 19C) and minute value "40" (FIG. 19E) are being passed through in the time picker because the threshold time interval has not expired when these tactile outputs were due to be generated. In some embodiments, haptic audio outputs that accompany these skipped tactile outputs are also skipped. In some embodiments, the haptic audio output that is to accompany a particular skipped tactile output is still generated even when that particular tactile output is skipped.

In FIG. 19H, no tactile output or haptic audio output is generated when time wheel 1950 is in between minute values (e.g., no minute value is currently selected in the selection window 1912).

In another example, in FIG. 19K, the device detects another scroll input directed to minute wheel 1950 that includes a slow movement 1922 of contact 1924 on the touch-sensitive surface 112 at a location that corresponds to minute wheel 1950 and subsequent lift-off of contact 1924. In response to detecting the slow and brief scroll input by contact 1924, the device rotates minute wheel 1950 through a sequence minute values (e.g., minute values "29" through "23", as shown in FIGS. 19K-19T). The speed of minute wheel slows down gradually over time. Because the scroll input is slow, tactile outputs are not skipped due to the threshold rate of tactile output generation. For example, as shown in FIGS. 19L and 19M, two consecutive tactile outputs 1932 and 1934 are generated when minute wheel 1950 passes through consecutive minute values "28" and "27" over a period of time greater than the threshold time interval for generating tactile outputs (e.g., 0.05 seconds). In FIGS. 19L and 19M, since the speed of minute wheel 1950 is low, tactile outputs 1932 and 1934 have relatively low amplitudes (e.g., with a gain of 0.4). In addition, the device also generates corresponding haptic audio outputs 1933 and 1935 to accompany tactile outputs 1932 and 1935 respectively. In some embodiments, haptic audio output 1935 has a lower frequency than haptic audio output 1933, while the amplitudes and frequencies of tactile outputs 1932 and 1934 are the same (e.g., MicroTap (270 Hz) with a gain of 0.4).

In some embodiments, a particular tactile output may be skipped or combined with another tactile output, if the other tactile output (e.g., a stronger tactile output, or a tactile output with a higher frequency) is also due to be generated at the same time (e.g., the minute and hour wheels may be moving through a respective value at the same time), as illustrated in FIGS. 19M-19T.

In FIGS. 19M-19N, while minute wheel 1950 continues to rotate due to simulated inertia (e.g., or due to additional scroll inputs), the device detects another scroll input directed to hour wheel 1948 that includes movement 1928 of contact 1926 at a location that corresponds to hour wheel 1948. In response to detecting the scroll input by contact 1926, the device rotates the hour wheel, e.g., in a direction opposite the rotation of the minute wheel 1950.

In some embodiments, similar to generating a tactile output in connection with the minute wheel moving through a minute value, as the hour wheel moves through an hour value, the device also generates a tactile output to indicate that a new hour value is selected in the time picker. In some embodiments, the device also generates a haptic audio output to accompany the tactile output.

In some embodiments, the tactile output generator of the device uses two different movable masses to independently generate respective tactile outputs that correspond to the minute wheel and the hour wheel. In some embodiments, when a single movable mass is used, the device optionally combines the tactile output patterns for the respective tactile outputs that are due to be generated for the minute wheel and the hour wheel at the same time, and generate a tactile output based on the combined tactile output pattern. In some embodiments, the device skips one of the two tactile outputs (e.g., the weaker tactile output (e.g., lower amplitude, lower frequency, or both) that are due to be generated at the same time). In some embodiments, the device skips one of the tactile outputs that are due to be generated within the threshold time interval (e.g., 0.05 seconds), e.g., when the minute wheel passes through a respective minute value within the threshold time interval after the time when the hour wheel passes through respective hour value, the device skips the tactile output for the minute wheel.

In FIG. 19N, the device generates tactile output 1936 (e.g., MicroTap (270 Hz) with a gain of 0.4) with haptic audio output 1937, as minute wheel 1950 moves through minute value "26". No tactile output is generated for hour wheel 1948 at this time, as hour wheel 1948 is in between hour values "1" and "2".

In FIG. 19O, when hour wheel 1948 moves through hour value "4" at the same time as minute wheel 1950 moves through minute value "25", the device generates tactile output 1938 in conjunction with both wheels moving through a respective value. In some embodiments, tactile output 1938 (MicroTap (270 Hz)) has a stronger amplitude that is selected based on a combination of the amplitudes for respective tactile outputs that are due to be generated for each of the two wheels. In some embodiments, tactile output 1938 is the same tactile output that would be generated for one of the wheels (e.g., the faster moving wheel of the two wheels, or the heavier wheel of the two) while the other wheel were not moving. In this example, tactile outputs 1938 and 1940 (and accompanying haptic audio outputs 1939 and 1941) are both generated in accordance with movement of the hour wheel through a respective hour value (e.g., with a gain selected in accordance with the speed of hour wheel 1948 in FIGS. 19O and 19P). For example, tactile output 1938 has a gain of 0.7, while tactile output 1940 has a gain of 0.6.

In FIGS. 19Q and 19T, tactile outputs 1942 and 1946 (e.g., MicroTap (270 Hz) with a gain of 0.4 and 0.3, respectively) and corresponding haptic audio outputs 1943 and 1947 are generated in conjunction with minute wheel 1950 moving through minute values "24" and "23" respectively. In FIG. 19S, tactile output 1944 (e.g., MicroTap (270 Hz) with a gain of 0.5) and corresponding haptic audio output 1945 are generated in conjunction with hour wheel 1948 moving through hour value "10". Relative to tactile outputs 1942 and 1946, tactile output 1944 has a higher amplitude due to the faster speed of hour wheel 1948 than minute wheel 1950.

In FIG. 19R, no tactile output is generated because neither the hour wheel nor the minute wheel is passing through a respective value in the time picker.

FIGS. 20A-20G are flow diagrams illustrating a method 2000 of providing tactile outputs to reveal a hidden threshold for content management, in accordance with some embodiments. The method 2000 is performed at an electronic device (e.g., device 300, FIG. 3, or portable multifunction device 100, FIG. 1A) with a display, a touch-sensitive surface, and one or more tactile output generators for generating tactile outputs. In some embodiments, the electronic device includes one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 2000 are, optionally, combined and/or the order of some operations is, optionally, changed.

As described below, the method 2000 provides an intuitive way to provide haptic feedback indicating crossing of a threshold for triggering or canceling an operation associated with a user interface item. In some embodiments, the threshold for triggering or canceling an operation, such as a threshold position or a threshold amount of movement by a focus selector on a user interface, is not visually marked on the user interface. In such cases, haptic feedback indicating the crossing of such a threshold is particularly helpful to the user when deciding how to proceed with the current input upon receiving such a feedback, e.g., to decide whether to terminate the current input in order to complete the operation or to reverse the current input to cancel the operation. Haptic feedback is advantageous over conventional visual feedback in that it is easier to notice and less distracting than conventional visual feedback (e.g., animation, visual effects on user interface elements, etc.) in many cases. For example, the user is not required to be fixated on the user interface while providing an input (e.g., a swipe gesture) in order to achieve a result outcome. Additionally, tactile feedback provides valuable information to the user for touch screen user interfaces where the user's finger is obscuring corresponding visual feedback. Providing this improved nonvisual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The device displays (2002) on display 112, a user interface 5002 that includes a first item (e.g., an email item in a listing of emails, a news article item in a listing of news articles, a preview of an email that is displayed in response to a deep press input on an email item in a listing of emails, etc.). For example, the user interface 5002 includes a list of e-mail summary items (e.g., including e-mail summary items 5004, 5006, and 5008), as indicated in FIG. 5A, and the first item is e-mail summary item 5006.

While displaying the user interface 5002 that includes the first item, the device detects (2004) a first portion of an input by a first contact (e.g., contact 5052 as indicated in FIG. 5Q-5U) on the touch-sensitive surface 112, wherein the detecting the first portion of the input by the first contact includes detecting the first contact at a location on the touch-sensitive surface 112 that corresponds to the first item, and detecting a first movement of the first contact (e.g., a movement of contact 5052 on e-mail summary item 5006, as indicated by arrows 5054, 5062, 5064, and 5066 in FIGS. 5Q-5T) on the touch-sensitive surface 112.

Additional examples of a first contact include, e.g., contact 5022 as indicated in FIGS. 5B-5F, contact 5038 as indicated in FIGS. 5J-5N, contact 5070 as indicated in FIGS. 5X-5AE, contact 5090 as indicated in FIGS. 5AG-5AN, contact 5110 as indicated in FIGS. 5AQ-5AS, contact 5122 as indicated in FIGS. 5AZ-5BF, contact 5140 as indicates in FIGS. 5BJ-5BO, contact 5150 as indicated in FIGS. 5BS-5BY, contact 5164 as indicated in FIGS. 5CC-5CK, contact 5180 as indicated in FIGS. 5CN-5CW, contact 5202 as indicated in FIGS. 5DA-5DD, and contact 5206 as indicated in FIGS. 5DE-5DG.

For example, detecting the first portion of the input includes detecting touch-down of the first contact (e.g., contact 5052) on the touch-sensitive surface 112 while the first item (e.g., e-mail summary item 5006) is displayed, as illustrated in FIG. 5Q, followed by detecting a first movement of the first contact (e.g., a movement on e-mail summary item 5006 as illustrated in FIGS. 5Q-5U) in a first direction (e.g., leftward). In some embodiments, the first portion of the input occurs after a light press input (e.g., as described with regard to FIGS. 5BS-5BU) by the same first contact (e.g., contact 5150) had caused the display of the first item (e.g., a preview of an email message, such as the preview illustrated in preview panel 5128 of FIG. 5BU) in the user interface 5002, and detecting the first portion of the input includes detecting a subsequent movement of the first contact (e.g., as described with regard to FIGS. 5BB-5BY) in a first direction (e.g., leftward) while the first item is displayed.

In response to detecting the first portion of the input that includes the first movement of the first contact (2006), in accordance with a determination that the first movement of the first contact meets first movement-threshold criteria that are a precondition for performing a first operation (e.g., movement of contact 5052, as illustrated at 5Q-5U, exceeds a threshold movement distance), the device generates (2006-*a*) a first tactile output (e.g., tactile output 5068 as illustrated in FIG. 5U), wherein the first tactile output indicates that the first movement-threshold criteria for the first operation have been met. In accordance with a determination that the first movement of the first contact does not meet the first movement-threshold criteria for the first operation, the device forgoes (2006-*b*) generation of the first tactile output. For example, the first tactile output serves as an alert to the user that a first operation corresponding to a selectable option (e.g., an archive content option for archiving an e-mail that corresponds to e-mail summary item 5006, as illustrated at FIGS. 5Q-5W) will be performed upon liftoff of the contact, provided that no cancellation of the operation (e.g., a cancellation as described with regard to FIGS. 5AG-5AP) takes place before the liftoff of the contact. In some embodiments, the selectable option is last one of multiple selectable options that have been revealed in response to a swipe input by the first contact that is directed to the first item (e.g., as illustrated in FIG. 5T, the selectable option is an archive content affordance 5060 that is the last one of multiple selectable options (menu affordance 5056, flag content affordance 5058, and archive content affordance 5060). In some embodiments, the first movement-threshold criteria require that the first movement of the contact exceeds a first distance or location threshold in a first direction. For example, a first distance is a distance halfway between edges of the display. For example, a location threshold is a threshold distance away from an edge of the display.

In some embodiments, after generating the first tactile output in accordance with the determination that the first movement of the first contact meets the first movement-threshold criteria, the device detects (2008) a second portion of the input by the first contact, wherein the second portion of the input includes a second movement of the first contact. For example, FIG. 5AJ illustrates a tactile output 5098 that occurs in response to the leftward movement by contact 5090 illustrated in FIGS. 5AG-5AJ. After the device generates tactile output 5090, a rightward movement by contact 5090 is detected, as illustrated in FIGS. 5AK-5AN.

In response to detecting the second portion of the input by the first contact, in accordance with a determination that the second movement of the first contact meets reversal criteria for cancelling the first operation (e.g., movement, such as movement in the opposite direction of the first movement, that exceeds a threshold distance and/or that moves to a threshold location for canceling the first operation), the device generates (2010) a second tactile output, wherein the second tactile output indicates that the reversal criteria for cancelling the first operation have been met; and in accordance with a determination that the second movement of the first contact does not meet the reversal criteria, the device forgoes generation of the second tactile output. For example, after leftward movement of contact 5090, as illustrated by FIGS. 5AG-5AK, rightward movement of contact 5090, as illustrated at 5AK-5AN, exceeds a threshold movement distance. In accordance with a determination that the rightward movement of contact 5090 exceeds the threshold movement distance, a second tactile output is generated as illustrated at 5106 of Figure AM. The second tactile output (e.g., 5106) serves as an alert to the user that the first operation corresponding to one of the selectable options (e.g., the last selectable option that has been revealed, such as archive content affordance 5060) will no longer be performed upon liftoff of the contact, provided that the first movement-threshold criteria are not met for a second time by further movement of the first contact before the liftoff of the first contact. For example, due to the cancellation input illustrated in FIGS. 5AK-5AN (the rightward movement of contact 5090 on e-mail summary item 5008), the e-mail that corresponds to e-mail summary item 5008 is not archived on liftoff of the contact 5070.

In some embodiments, it is helpful to provide haptic feedback for both crossing a threshold for triggering an operation, and for subsequently crossing a threshold for canceling the operation, because, without the haptic feedback for the latter, the user would feel unsure of the outcome upon termination of the current input. Thus, providing haptic feedback for the satisfaction of the reversal criteria enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments (2012), the first tactile output (e.g., tactile output 5098, as illustrated in FIG. 5AJ) and the second tactile output (e.g., tactile output 5106, as illustrated in FIG. 5AM) have different tactile output patterns (e.g., different characteristic values for at least a first output characteristic). An output characteristic is, e.g., a characteristic amplitude, frequency, duration, waveform, and/or number of cycles across a neutral position, etc.). For example, the first tactile output is a MiniTap (270 Hz), gain: 1.0 (e.g., as illustrated at 5098-*b*), and the second tactile output is a MicroTap (270 Hz), gain: 0.55 (e.g., as illustrated at 5106-*b*). In some embodiments, the tactile output pattern includes the characteristics of a given tactile output, such as the amplitude of the output, the shape of a movement waveform in the output, the duration of the output (e.g., a discrete tap output or a continuous ongoing output), the characteristics of objects being simulated by the output (e.g., the size, material, and/or mass of simulated objects, such as a simulated ball rolling on a simulated surface), the number of objects being simulated by the output, and/or characteristics of the movements of the simulated objects.

In some embodiments, by providing different tactile outputs for the crossing of the operation-triggering threshold and the crossing of the operation-cancellation threshold, the device succinctly alerts the user of two very different outcomes in which the user's input would result. Even if the user may have crossed the operation-trigger and the operation-cancellation thresholds multiple times, the user would still be able to tell the outcome of his/her current input. Thus, providing different haptic feedback signals for the crossing of the operation-triggering threshold and the operation-cancellation threshold enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments (2014), the first tactile output and the second tactile output have the same frequencies and different amplitudes (e.g., the first tactile output 5098 has a frequency of 270 Hz and a gain of 1.0, and the second output 5106 has a frequency of 270 Hz and a gain of 0.55).

For example, in some embodiments, the haptic feedback for the operation-cancellation threshold has lower amplitude than the haptic feedback for the operation-triggering threshold. At a time when a user is already on alert due to the haptic feedback for the operation-triggering threshold and the current portion of the user's input indicates a desire to cancel the operation, it is highly likely that the user is anticipating some feedback from the device that confirms cancellation of the operation; thus, the haptic feedback for the cancellation with a relatively low amplitude will be as effective as a high amplitude haptic feedback, but requires less power to generate and additionally avoids overwhelming or fatiguing the user with tactile outputs that are too strong.

In some embodiments (2016), the first tactile output and the second tactile output have the same frequencies and different waveforms (e.g., the first tactile output is a MiniTap (270 Hz) and the second tactile output is a MicroTap (270 Hz)).

In some embodiments, the discrete tactile outputs with different number of cycles provide distinct sensations in the user's hand, such that the user can easily tell apart whether the operation-triggering threshold or the operation-cancellation threshold has been crossed. Thus, providing respective tactile outputs with different waveforms and substantially the same duration for the crossing of the operation-triggering threshold and the crossing of the operation-cancellation threshold enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments (2018), the first movement-threshold criteria and the reversal criteria correspond to different threshold locations on the display.

In some embodiments, the device detects (2020) lift-off of the first contact. In response to detecting the lift-off of the first contact: in accordance with a determination that the input meets activation criteria for the first operation, wherein the activation criteria include the first movement-threshold criteria, performing the first operation; and in accordance with a determination that the input does not meet the activation criteria for the first operation, forgoing performance of the first operation.

For example, an input that meets activation criteria for performing an "archive content" operation is illustrated in FIGS. 5Q-5U. On liftoff of contact 5052, as illustrated in FIGS. 5U-5W, the "archive content" operation is performed (e.g., an e-mail corresponding to e-mail summary item 5006, at which contact 5052 was detected, is archived).

In another example, an input that meets activation criteria for performing a "mark read" operation is illustrated in FIGS. 5B-5F. On liftoff of contact 5022, the "mark read" operation is performed, as illustrated in FIGS. 5F-5I.

In another example, an input that meets activation criteria for performing a "mark unread" operation is illustrated in FIGS. 5J-5N. On liftoff of contact 5038, the "mark unread" operation is performed, as illustrated in FIGS. 5N-5P.

In another example, an input that meets activation criteria for performing a "mark read" operation is illustrated in FIGS. 5AZ-5BF. On liftoff of contact 5122, the "mark read" operation is performed, as illustrated in FIGS. 5BF-5BI.

In another example, an input that meets activation criteria for performing a "mark read" operation is illustrated in FIGS. 5BJ-5BO. On liftoff of contact 5140, the "mark unread" operation is performed, as illustrated in FIGS. 5BO-5BR.

In another example, an input that meets activation criteria for performing a "archive content" operation is illustrated in FIGS. 5BS-5BY. On liftoff of contact 5150 the "archive" operation is performed, as illustrated in FIGS. 5BY-5CB.

In another example, an input that meets activation criteria for performing a "list refresh" operation is illustrated in FIGS. 5DE-5DG. On liftoff of contact 5206, as illustrated in FIGS. 5DG-5DM, the "list refresh" operation is performed.

Additional examples of a first operation include, e.g., flag e-mail, delete e-display menu, like article, dislike article, save article, share article, bookmark article, mute channel (e.g., a news channel), and/or report article. In some embodiments, the activation of the first operation is not reversible, and the first operation is performed as soon as the first movement-threshold criteria are met, or upon lift-off after the first movement-threshold criteria are met. In some embodiments, the activation of the first operation are reversible, and the first operation is only performed if cancellation criteria are not met by additional reverse movement of the first contact after the first movement-threshold criteria have been met.

In some embodiments, operation cancellation occurs when the input includes a subsequent movement of the first contact (reverse movement) in a direction opposite the movement in the first direction and the subsequent movement exceeds a threshold distance or location in the reverse direction. For example, operation cancellation does not occur when the lift-off of the contact detected after the first movement with no subsequent movement in the reverse direction, or with a subsequent movement that does not exceed a threshold distance or location in the reverse direction.

Examples of operation cancellation are illustrated with regard to FIGS. 5AX-5AF, FIGS. 5AG-5AP, FIGS. 5CC-5CM, and FIGS. 5CN-5CY.

In some embodiments, the activation criteria include (2022), in addition to the first movement-threshold criteria, a requirement that the input does not include a second movement that meets cancellation criteria prior to the lift-off of the first contact.

In some embodiments, in response to detecting the first portion of the input by the first contact, the device moves (2024) the first item in accordance with the first movement of the first contact. For example, as illustrated in FIGS. 5Q-5U, an exemplary first item (e-mail summary item 5006) moves in accordance with the movement of an exemplary first contact (e.g., contact 5052).

In some embodiments, in response to detecting the first portion of the input by the first contact, the device reveals (2026) one or more selectable options that each correspond to a respective operation applicable to the first item (e.g., flag e-mail, archive e-mail, mark e-mail read, mark e-mail unread, display menu (with a selectable option to perform operation), like article, dislike article, save article, share article, bookmark article, mute channel (e.g., a news channel), and/or report article). For example, as illustrated in FIGS. 5Q-5T, an in response to an input by contact 5052, selectable options content menu affordance 5056, flag content affordance 5058, and archive content affordance 5060 are revealed. In some embodiments, the one or more selectable options include a first option (e.g., archive content affordance 5060) that corresponds to the first operation. In some embodiments, detecting that the first movement of the contact meets the movement-threshold criteria occurs while the first item is moving in accordance with the first movement of the first contact. In some embodiments, an animation is displayed when the first movement-threshold criteria are met to show the option corresponding to the first operation to expand and cover the other options, or change color if it is the only option that is displayed. For example, in FIG. 5T, selectable options content menu affordance 5056, flag content affordance 5058, and archive content affordance 5060 are displayed, and in FIG. 5U, when first movement-threshold criteria are met, menu affordance 5056 and flag content affordance 5058 are covered by archive content affordance 5060.

In some embodiments, in response to detecting the lift-off of the first contact (2028), in accordance with a determination that the input does not meet the activation criteria for the first operation, and that movement of the first contact upon lift-off of the first contact meets second movement-threshold criteria that are lower than the first movement-threshold criteria (e.g., the second movement-threshold criteria require that the net movement of the contact is less than a first distance or location threshold associated with the first movement-threshold criteria and greater than a second distance or location threshold that is shorter or closer to a reference location (e.g., the right edge of the display)), the device maintains display of the one or more selectable options after detecting lift-off of the first contact (e.g., display of a menu of selectable options is maintained such that a selectable option is selectable and/or the menu is dismissible by a subsequent input by another contact).

For example, in FIGS. 5AQ-5AS, an input by contact 5116 reveals content menu affordance 5056, flag content affordance 5058, and archive content affordance 5060. On liftoff of contact 5116, display is maintained of selectable options content menu affordance 5056, flag content affordance 5058, and archive content affordance 5060, as illustrated in FIGS. 5AS-5AT. In FIG. 5AU, an input (e.g., a tap input) by contact 5118 is detected at a location on touch screen 112 that corresponds to flag content affordance 5058. As illustrated at 5AV-5AX, the input by contact 5118 selects a flag content option associated with flag content affordance 5058 to apply a flag 5120 to an e-mail that corresponds to e-mail summary item 5008.

In some embodiments, in accordance with a determination that the net movement of the first contact upon lift-off does not meet the second movement threshold criteria, the device restores the first item to it is original location and ceases to display the one or more selectable options. In some embodiments, no tactile output is provided when the second movement-threshold criteria are met by the first contact.

In some embodiments, the first item is a preview of a second item (e.g., an email message that corresponds to an e-mail summary item) that was displayed in the user interface prior to the display of the first item in the user interface. For example, the first item is a preview of an e-mail that corresponds to e-mail summary item 5008 (e.g., as shown in preview panel 5128 of FIG. 5BU) and the second item is e-mail summary item 5008 that was displayed in user interface 5002 (e.g., as indicated in Figures AZ-BA) prior to display of the e-mail preview. Prior to displaying the user interface that includes the first item, the device (2030): displays the user interface (e.g., user interface 5002 that includes a list of e-mail summary items) that includes the second item (e.g., e-mail summary item 5008); while displaying the user interface that includes the second item, the device detects the first contact (e.g., contact 5150, as shown in FIG. 5BS) on the touch-sensitive surface 112 at a location that corresponds to the second item; while displaying the user interface that includes the second item, the device detects an increase in a characteristic intensity of the first contact (e.g., as illustrated by intensity meter 5124 of Figures BS-BU); in response to detecting the increase in the characteristic intensity of the first contact: in accordance with a determination that the characteristic intensity of the first contact meets content-preview criteria, wherein the content-preview criteria require that the characteristic intensity of the first contact meets a first intensity threshold (e.g., a light press intensity threshold) in order for the content-preview criteria to be met (e.g., the characteristic intensity of contact 5150 increases above light press intensity threshold level $IT_L$, as illustrated in FIG. 5BU): ceasing to display the user interface that includes the second item, wherein the user interface that includes the second item is replaced by the user interface that includes the first item; and, in accordance with a determination that the characteristic intensity of the first contact does not meet the content-preview criteria, the device maintains display of the user interface that includes the second item.

In some embodiments, in response to detecting the increase in the characteristic intensity of the first contact (2032): in accordance with a determination that the characteristic intensity of the first contact meets the content-preview criteria, generating a third tactile output (e.g., MicroTap (200 Hz), gain: 1.0), wherein the third tactile output indicates that the content-preview criteria have been met, and in accordance with a determination that the characteristic intensity of the first contact does not meet the content preview criteria, forgoing generating the third tactile output. For example, in Figure BU, when the characteristic intensity of contact 5150 meets content-preview criteria (e.g., the characteristic intensity of the contact increases above $IT_L$, as indicated by intensity level meter 5124), the device produces tactile output 5152.

In some embodiments (2034), the first tactile output that indicates satisfaction of the first movement-threshold criteria and the third tactile output that indicates satisfaction of the content-preview criteria have different waveforms. For example, in Figures BU-BY the third tactile output is tactile output 5152 (e.g., MicroTap (200 Hz), gain: 1.0, as illustrated by waveform 5152-*b*) that occurs when the characteristic intensity of contact 5150 increases above $IT_L$, as indicated by intensity level meter 5124 of Figure BU, and the first tactile output is tactile output 5162 (e.g., MiniTap (270 Hz), gain: 1.0, as illustrated by waveform 5162-*b*) occurs in response to movement of contact 5150 along the path indicated by arrows 5154, 5158, 5160 until first movement-threshold criteria are satisfied, as indicated in Figure BY.

In some embodiments (2036), the first tactile output (e.g., tactile output 5162, as described with regard to FIG. 5BY) that indicates satisfaction of the first movement-threshold criteria has a higher frequency than the third tactile output (e.g., tactile output 5152, as described with regard to FIG. 5BU) that indicates satisfaction of the content-preview criteria (e.g., the first tactile output is has a frequency of 270 Hz, and third tactile output has a frequency of 200 Hz).

In some embodiments (2038), the first tactile output (e.g., tactile output 5190, as described with regard to Figure CT) that indicates satisfaction of the first movement-threshold criteria and the third tactile output (e.g., tactile output 5182, as described with regard to FIG. 5CP) that indicates satisfaction of the content-preview criteria have different waveforms (e.g., the first tactile output is MiniTap, and third tactile output is a MicroTap).

In some embodiments (2040), the second tactile output (e.g., tactile output 5198, as described with regard to Figure CW) that indicates satisfaction of the reversal criteria has a higher frequency than the third tactile output (e.g., tactile output 5182, as described with regard to FIG. 5CP) that indicates satisfaction of the content-preview criteria (e.g., the second tactile output has a frequency of 270 Hz, and third tactile output has a frequency of 200 Hz).

In some embodiments, while displaying the user interface that includes the first item, the device detects (2042) a second increase in the characteristic intensity of the first contact. For example, after a first increase in the characteristic intensity of contact 5202 to above light press intensity threshold $IT_L$, as illustrated in FIGS. 5DA-5DC, the characteristic intensity of contact 5202 continues to increase, as illustrated in FIG. 5DD. In response to detecting the second increase in the characteristic intensity of the first contact, in accordance with a determination that the characteristic intensity of the first contact meets content-display criteria, wherein the content-display criteria require that the characteristic intensity of the first contact meets a second intensity threshold (e.g., a deep press intensity threshold $IT_D$ as illustrated by intensity level meter 5124) in order for the content-display criteria to be met: replacing the user interface that includes the first item (e.g., preview platform 5128, as shown in FIG. 5DC) with a user interface that includes content that corresponds to the first item on the display (e.g., in the context of the native application of the content, such as an e-mail displayed in a native e-mail application) and generating a fourth tactile output (e.g., tactile output 5205, as indicated in FIG. 5DD), wherein the fourth tactile output indicates that the content-display criteria have been met. For example, in accordance with a determination that the characteristic intensity of contact 5202 increased above deep press intensity threshold level $IT_D$, as illustrated in FIG. 5DD, a preview of e-mail 5201 displayed in preview platform 5128 of FIG. 5DC is replaced with display of the e-mail 5201 in a native e-mail application 5201 as indicated in FIG. 5DD.

In some embodiments, the fourth tactile output (e.g., tactile output 5205, as indicated in FIG. 5DD) has a different tactile output pattern (for at least a first output characteristic) from the first tactile output (e.g., tactile output 5190, as indicated in FIG. 5CT), the second tactile output (e.g., tactile output 5198, as indicated in FIG. 5CW), and/or the third tactile output (e.g., tactile output 5182, as indicated in FIG. 5CP). For example, the fourth tactile output has a different waveform (e.g., a different number of cycles) from the first tactile output, the second tactile output, and the third tactile output (e.g., the fourth tactile output is a FullTap (150 Hz), gain: 1.0. In some embodiments, the fourth tactile output has at least one characteristic value that is the same as a characteristic value of the first tactile output, the second tactile output, and/or the third tactile output.

In some embodiments, In response to detecting the second increase in the characteristic intensity of the first contact, in accordance with a determination that the characteristic intensity of the second contact does not meet the content-display criteria, the device forgoes replacing the user interface that includes the first item with the user interface that includes content that corresponds to the first item on the display; and forgoes generation of the fourth tactile output.

In some embodiments (2044), the third tactile output (e.g., tactile output 5182, as indicated in FIG. 5CP) that indicates satisfaction of the content-preview criteria has a higher frequency than the fourth tactile output (e.g., tactile output 5205, as indicated in FIG. 5DD) that indicates satisfaction of the content-display criteria (e.g., the third tactile output for content preview has a frequency of 200 Hz, and the fourth tactile output for content display has a frequency of 150 Hz).

In some embodiments (2046), the third tactile output (e.g., tactile output 5182, as indicated in FIG. 5CP) that indicates satisfaction of the content-preview criteria and the fourth tactile output (e.g., tactile output 5205, as indicated in FIG. 5DD) that indicates satisfaction of the content-display criteria have different waveforms (e.g., third tactile output for preview is a MicroTap, while the fourth tactile output for content display is a FullTap).

In some embodiments (2048), the first operation modifies a status associated with the first item (e.g. the first operation flags an e-mail, archives the e-mail, marks e-mail as read, marks an e-mail as unread, likes an article, dislikes an article, saves an article, shares an article, bookmarks an article, mute a channel (e.g., a news channel), and/or report an article).

In some embodiments (2050), the first operation is a destructive operation (e.g., the first operation deletes the first item).

In some embodiments (2052), the first item is a news item that represents one or more news stories and the first operation is one of: sharing the first item and marking the first item as not a favorite. In some embodiments, movement of the contact in the first direction corresponds to a sharing the first item and movement of the contact in the second direction corresponds marking the news item as not a favorite. In some embodiments, the movement threshold for performing the delete operation is higher than the movement threshold for performing the mark as read operation. In some embodiments, the tactile outputs for indicating that movement-threshold criteria have been met and that reversal criteria have been met are used for both the movement in the first direction and the movement in the second direction.

In some embodiments, the first item is an electronic message item (e.g., e-mail summary item 5004, e-mail summary item 5006, or e-mail summary item 5008) that represents one or more electronic messages and the first operation is one of: marking the first item as read (e.g., as illustrated in FIGS. 5B-5I or as illustrated in FIGS. 5AZ-5BI) and deleting the first item (or archiving the first item as illustrated in FIGS. 5Q-5W or as illustrated in FIGS. 5BS-5CB). In some embodiments, movement of the contact in the first direction corresponds to a delete operation (or an archive operation) and movement of the contact in the second direction corresponds marking the electronic message as read. In some embodiments, the movement threshold for performing the delete operation (or an archive operation) is higher than the movement threshold for performing the mark as read operation. In some embodiments, the tactile outputs for indicating that movement-threshold criteria have been met and that reversal criteria have been met are used for both the movement in the first direction and the movement in the second direction.

It should be understood that the particular order in which the operations in FIGS. 20A-20G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 2200, 2400, 2600, 2800, 3000, 3200 and 3400) are also applicable in an analogous manner to method 2000 described above with respect to FIGS. 20A-20G. For example, the contacts, gestures, user interface objects, tactile outputs, intensity thresholds, and animations described above with reference to method 2000 optionally have one or more of the characteristics of the contacts, gestures, user interface objects, tactile outputs, intensity thresholds, and animations described herein with reference to other methods described herein (e.g., methods 2200, 2400, 2600, 2800, 3000, 3200 and 3400). For brevity, these details are not repeated here.

Figure 21:
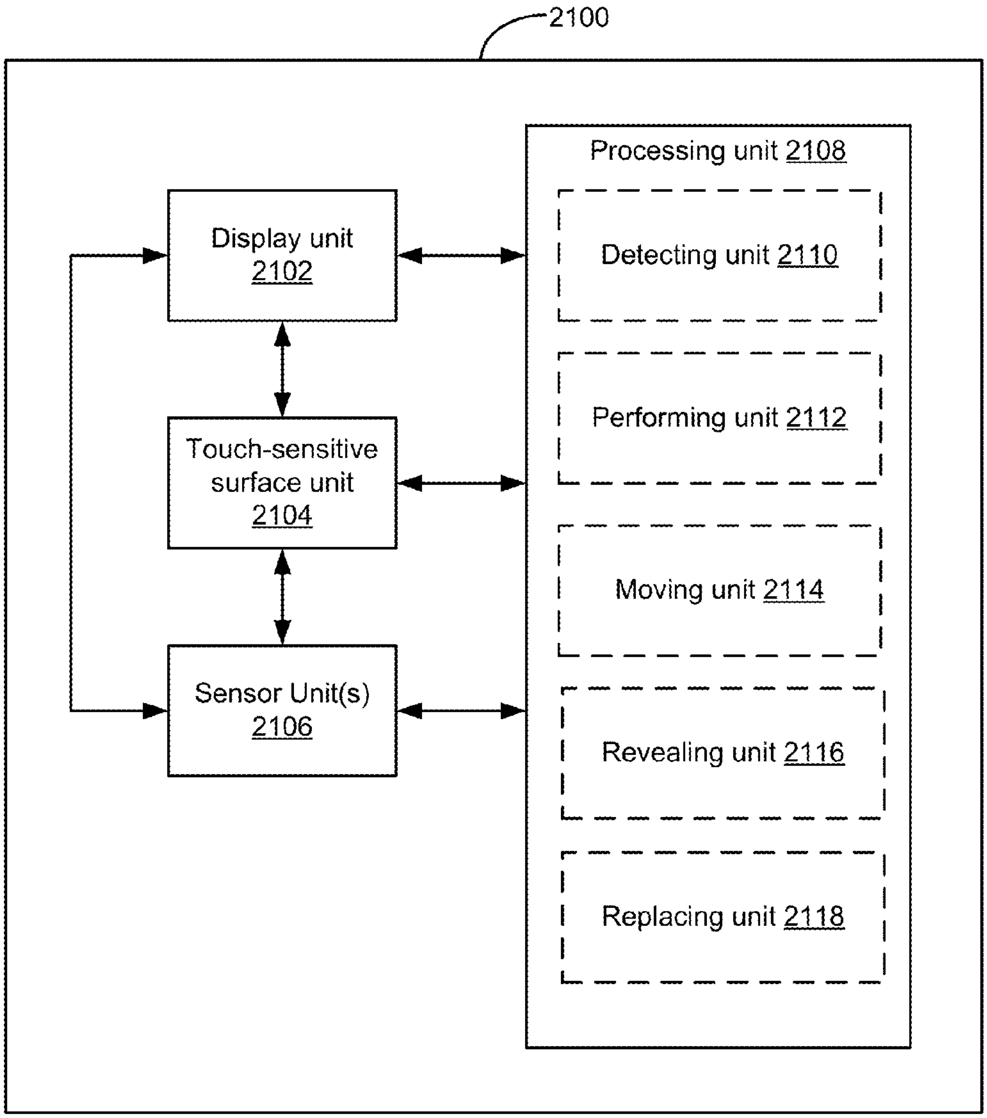
FIG. 21 is a functional block diagram of an electronic device in accordance with some embodiments.

In accordance with some embodiments, FIG. 21 shows a functional block diagram of an electronic device 2100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 21 are, optionally, combined or separated into sub-blocks to implement the principles of the various described embodiments. Therefore, the description herein optionally supports any possible combination or separation or further definition of the functional blocks described herein.

As shown in FIG. 21, an electronic device 2100 includes a display unit 2102 configured to display user interfaces; a touch-sensitive surface unit 2104; one or more tactile output generator units 2106 configured to generate tactile outputs; and a processing unit 2108 coupled to the display unit 2102, the touch-sensitive surface unit 2104, and the one or more tactile output generator units 2106. In some embodiments, the processing unit includes detecting unit 2110, performing unit 2112, moving unit 2114, revealing unit 2116, and replacing unit 2118.

The processing unit 2108 is configured to: enable display of (e.g., with the display unit 2102), on the display unit 2102, a user interface that includes a first item; while displaying the user interface that includes the first item, detect (e.g., with the detecting unit 2110) a first portion of an input by a first contact on the touch-sensitive unit, wherein detecting the first portion of the input by the first contact includes detecting (e.g., with the detecting unit 2110) the first contact at a location on the touch-sensitive unit that corresponds to the first item, and detecting (e.g., with the detecting unit 2110) a first movement of the first contact on the touch-sensitive unit; and, in response to detecting the first portion of the input that includes the first movement of the first contact: in accordance with a determination that the first movement of the first contact meets first movement-threshold criteria that are a precondition for performing a first operation, generate (e.g., with the tactile output generator unit(s) 2106) a first tactile output, wherein the first tactile output indicates that the first movement-threshold criteria for the first operation have been met; and in accordance with a determination that the first movement of the first contact does not meet the first movement-threshold criteria for the first operation, forgo generation of the first tactile output.

In some embodiments, the processing unit 2108 is further configured to: after generating the first tactile output in accordance with the determination that the first movement of the first contact meets the first movement-threshold criteria, detect (e.g., with the detecting unit 2110) a second portion of the input by the first contact, wherein the second portion of the input includes a second movement of the first contact; in response to detecting the second portion of the input by the first contact: in accordance with a determination that the second movement of the first contact meets reversal criteria for cancelling the first operation, generate (e.g., with the tactile output generator unit(s) 2106) a second tactile output, wherein the second tactile output indicates that the reversal criteria for cancelling the first operation have been met; and in accordance with a determination that the second movement of the first contact does not meet the reversal criteria, forgo generation of the second tactile output.

In some embodiments, the first tactile output and the second tactile output have different tactile output patterns.

In some embodiments, the first tactile output and the second tactile output have the same frequencies and different amplitudes.

In some embodiments, the first tactile output and the second tactile output have the same frequencies and different waveforms.

In some embodiments, the first movement-threshold criteria and the reversal criteria correspond to different threshold locations on the display unit 2102.

In some embodiments, the processing unit 2108 is further configured to: detect (e.g., with the detecting unit 2110) lift-off of the first contact; in response to detecting the lift-off of the first contact: in accordance with a determination that the input meets activation criteria for the first operation, wherein the activation criteria include the first movement-threshold criteria, perform (e.g., with the performing unit 2112) the first operation; and in accordance with a determination that the input does not meet the activation criteria for the first operation, forgo performance of the first operation.

In some embodiments, the activation criteria include, in addition to the first movement-threshold criteria, a requirement that the input does not include a second movement that meets cancellation criteria prior to the lift-off of the first contact.

In some embodiments, the processing unit 2108 is further configured to: in respect to detecting the first portion of the input by the first contact, move (e.g., with the moving unit 2114) the first item in accordance with the first movement of the first contact.

In some embodiments, the processing unit 2108 is further configured to: in response to detecting the first portion of the input by the first contact, reveal (e.g., with the revealing unit 2116) one or more selectable options that each correspond to a respective operation applicable to the first item.

In some embodiments, the processing unit 2108 is further configured to: in response to detecting the lift-off of the first contact: in accordance with a determination that the input does not meet the activation criteria for the first operation, and that movement of the first contact upon lift-off of the first contact meets second movement-threshold criteria that are lower than the first movement-threshold criteria, maintain display of (e.g., with the display unit 2102) the one or more selectable options after detecting lift-off of the first contact.

In some embodiments, the first item is a preview of a second item that was displayed in the user interface prior to the display of the first item in the user interface, and the processing unit 2108 is further configured to: prior to displaying the user interface that includes the first item: enable display of (e.g., with the display unit 2102) the user interface that includes the second item; while displaying the user interface that includes the second item, detect (e.g., with the detecting unit 2110) the first contact on the touch-sensitive unit at a location that corresponds to the second item; while displaying the user interface that includes the second item, detect (e.g., with the detecting unit 2110) an increase in a characteristic intensity of the first contact; in response to detecting the increase in the characteristic intensity of the first contact: in accordance with a determination that the characteristic intensity of the first contact meets content-preview criteria, wherein the content-preview criteria require that the characteristic intensity of the first contact meets a first intensity threshold in order for the content-preview criteria to be met: cease to display (e.g., with the display unit 2102) the user interface that includes the second item, wherein the user interface that includes the second item is replaced by the user interface that includes the first item; and in accordance with a determination that the characteristic intensity of the first contact does not meet the content-preview criteria, maintain display of (e.g., with the display unit 2102) the user interface that includes the second item.

In some embodiments, the processing unit 2108 is further configured to: in response to detecting the increase in the characteristic intensity of the first contact: in accordance with a determination that the characteristic intensity of the first contact meets the content-preview criteria, generate (e.g., with the tactile output generator unit(s) 2106) a third tactile output, wherein the third tactile output indicates that the content-preview criteria have been met, and in accordance with a determination that the characteristic intensity of the first contact does not meet the content preview criteria, forgo generating the third tactile output.

In some embodiments, the first tactile output that indicates satisfaction of the first movement-threshold criteria and the third tactile output that indicates satisfaction of the content-preview criteria have different waveforms.

In some embodiments, the first tactile output that indicates satisfaction of the first movement-threshold criteria has a higher frequency than the third tactile output that indicates satisfaction of the content-preview criteria.

In some embodiments, the second tactile output that indicates satisfaction of the reversal criteria and the third tactile output that indicates satisfaction of the content-preview criteria have different waveforms.

In some embodiments, the second tactile output that indicates satisfaction of the reversal criteria has a higher frequency than the third tactile output that indicates satisfaction of the content-preview criteria.

In some embodiments, the processing unit 2108 is further configured to: while displaying the user interface that includes the first item, detect (e.g., with the detecting unit 2110) a second increase in the characteristic intensity of the first contact; in response to detecting the second increase in the characteristic intensity of the first contact: in accordance with a determination that the characteristic intensity of the first contact meets content-display criteria, wherein the content-display criteria require that the characteristic intensity of the first contact meets a second intensity threshold in order for the content-display criteria to be met: replacing (e.g., with the replacing unit 2118) the user interface that includes the first item with a user interface that includes content that corresponds to the first item on the display unit 2102; and generate (e.g., with the tactile output generator unit(s) 2106) a fourth tactile output, wherein the fourth tactile output indicates that the content-display criteria have been met; and in accordance with a determination that the characteristic intensity of the second contact does not meet the content-display criteria: forgo replacing the user interface that includes the first item with the user interface that includes content that corresponds to the first item on the display unit 2102; and forgo generation of the fourth tactile output.

In some embodiments, the third tactile output that indicates satisfaction of the content-preview criteria has a higher frequency than the fourth tactile output that indicates satisfaction of the content-display criteria.

In some embodiments, the third tactile output that indicates satisfaction of the content-preview criteria and the fourth tactile output that indicates satisfaction of the content-display criteria have different waveforms.

In some embodiments, the first operation modifies a status associated with the first item.

In some embodiments, the first operation is a destructive operation.

In some embodiments, the first item is a news item that represents one or more news stories and the first operation is one of: sharing the first item and marking the first item as not a favorite.

In some embodiments, the first item is an electronic message item that represents one or more electronic messages and the first operation is one of: marking the first item as read and deleting the first item.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 20A-20G are, optionally, implemented by components depicted in FIGS. 1A-1B or FIG. 21. For example, detection operation 2004 and generating operation 2006 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 22A-22E are flow diagrams illustrating a method 2200 of providing haptic feedback that is synchronized with visually switching through subsets of items in an item navigation user interface, in accordance with some embodiments. The method 2200 is performed at an electronic device (e.g., device 300, FIG. 3, or portable multifunction device 100, FIG. 1A) with a display, a touch-sensitive surface, and one or more tactile output generators for generating tactile outputs. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, the method 700 provides an intuitive way to provide haptic feedback that is synchronized with visually switching through subsets of items in an item navigation user interface (e.g., a contact list, a photo browser, etc.) in response to user input directed to index values that correspond to the subsets of items in the item navigation user interface. In some embodiments, a tactile output is generated when a subset of items corresponding to an invoked index value moves to a predetermined position in the item navigation user interface. The tactile output provides non-visual confirmation to the user that a respective index value corresponding to the subset of items has been invoked, while the movement of the subset of items in the item navigation user interface are visual changes resulted from the invocation of the index value. In some embodiments, the haptic feedback provided by way of the tactile output(s) is particularly helpful because the index values may be densely packed into an index navigation element with size restriction, making it difficult to see the exact positions of the index value under the user's finger contact. With the synchronization of the tactile outputs and the visual switching of the subsets of items in the user interface, the causal link between the input and the user interface changes is highlighted to the user. Providing this improved nonvisual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The device displays (2200) on the display, an item navigation user interface (e.g., a user interface 6002 that includes name list 6006 as described with regard to FIG. 6A, a photo browsing user interface, or a news browsing interface). The item navigation user interface includes (2202-*a*) a representation of a first portion of a plurality of items (e.g., names 6008, 6010, 6012, 6014, 6016, 6018, and 6020 in FIG. 6A), wherein the plurality of items are arranged into two or more groups (e.g., an "A" group of names that includes names 6008, 6010, 6012, and 6014; "B" group that includes names 6016 and 6018; and a "C" group of names that includes name 6020) that are represented by corresponding index values (e.g., "A" group index 6022, "B" group index 6024, and "C" group index 6026) in a plurality of index values and the first portion of the plurality of items includes a first group of the items that corresponds to a first index value in the plurality of index values (e.g., an alphabetical listing of contacts grouped by the first letters of the contacts' last names, a series of image thumbnails, and/or news items arranged on a linear timeline and grouped by days of creation/publication). The item navigation user interface also includes (2202-*b*) an index navigation element (e.g., index scrubber 6004) that includes representations of three or more of the plurality of index values (e.g., letters, numbers, dates, date ranges, and/or labels). For example, index scrubber 6004 is an index navigation element that includes index marker 6028 that represents "A" group index 6022, index marker 6030 that represents "B" group index 6024, and index marker 6032 that represents "C" group index 6026.

While displaying the item navigation user interface, the device detects (2204) a first drag gesture (e.g., by a first contact 6034) on the touch-sensitive surface 112 that includes movement from a first location corresponding to the representation of the first index value that represents a first group of the items (e.g., index marker 6028 that represents "A" group index 6022) to a second location corresponding to a representation of a second index value that represents a second group of the items (e.g., index marker 6030 that represents "B" group index 6030).

In response to detecting the first drag gesture (2206): the device generates (2206-*a*) via the one or more tactile output generators, a first tactile output 6044-*a* (e.g., a MicroTap (270 Hz), gain: 0.5, as illustrated by waveform 6044-*b*) that corresponds to the movement to the second location corresponding to the second index value; and switches (2206-*b*) from displaying the representation of the first portion of the plurality of items (e.g., "A" group names 6008, 6010, 6012, and 6014) to displaying a representation of a second portion of the plurality of items, wherein the second portion of the plurality of items include the second group of the items (e.g., "B" group names 6016 and 6018).

In some embodiments, switching from displaying the representation of the first portion of the plurality of items to displaying the representation of the second portion of the plurality of items includes (2208) replacing display of the representation of the first portion of the plurality of items with display of the representation of the second portion of the plurality of items without scrolling the items (e.g., the second group of the items replaces the first group of the items abruptly at the top end of the user interface, upon arrival of the contact at the second index value that represents the second group of the items).

For example, the switching between subsets of items without scrolling the items is more congruent with the synchronization with the invocation of the index values which occur at discrete points of time during the drag input. The synchronization between the user interface changes and the tactile output generation agrees better with the user's expectation and enhances the operability of the device. As a result, the user-device interface is made more efficient (e.g., by helping the user to provide proper inputs and reducing user mistakes when operating/interacting with the device), and battery life of the device may be improved by enabling the user to use the device more quickly and efficiently.

In some embodiments, the representation of the first portion of the plurality of items starts (2210) with an item with a predefined characteristic within the first group of the items (e.g., the "A" group of names 6008, 6010, 6012, and 6014 starts with "A" group index 6022 and/or alphabetically first name 6008); and the representation of the second portion of the plurality of items starts with an item with the same predefined characteristic within the second group of the items (e.g., the "B" group of names 6016 and 6018 starts with "B" group index 6024 and/or alphabetically first name 6016). For example, the item is the alphabetically or chronologically first item in the groups, or the alphabetically or chronologically last item in the groups.

In some embodiments, switching from displaying the representation of the first portion of the plurality of items to displaying the representation of the second portion of the plurality of items includes (2212) displaying the representation of the second portion of the plurality of items at a predefined location in the item navigation user interface (e.g., the top of the second portion is displayed at the top edge of an item display region of the item navigation user interface, such as upper edge 6040 of the region in which name list 6006 is displayed).

In some embodiments, while displaying the item navigation user interface 6002, the device detects (2214) a second drag gesture (e.g., by a second contact 6082 distinct from the first contact 6034) on the touch-sensitive surface that includes movement from a third location corresponding to a third group of the items (e.g., group corresponding to the letter "D," such as a group of names including names 6128, 6130, 6132, and 6134) toward a fourth location corresponding to the fourth group of the items (e.g., the group of names corresponding to the letter "C," such as a group of names including names 6020, 6124, and 6126) in the item navigation user interface (e.g., movement on name list 6006 along a path indicated by arrow 6122, as illustrated in FIGS. 6X-6Y). In response to detecting the second drag gesture, the device moves the third group of the items and the fourth group of the items in accordance with the second drag gesture (e.g., scrolling name list 6006 upward with an upward swipe gesture, as illustrated in FIGS. 6X-6Y); and while moving the third group of the items and the fourth group of the items (and while maintaining the ordered arrangement of the items on the user interface), the device detects that the fourth group of the items has moved across a predetermined position in the user interface (e.g., the top of the fourth group has reached the top edge in the user interface). For example, the group corresponding to the letter "C" has reached upper edge 6040 of the region in which name list 6006 is displayed, as illustrated in FIG. 6Y.

In response to detecting that the fourth group (e.g., the group corresponding to the letter "C") of the items has moved across the predetermined position (e.g., as illustrated in FIG. 6Y), the device generates a second tactile output (e.g., tactile output 6136) in conjunction with (e.g., at the time when) the fourth group of the items moves across the predetermined position in the user interface.

The device detects that the third group of the items has moved across the predetermined position (e.g., the top of the third group has reached the top edge of the item display region in the user interface) in the user interface. For example, the group corresponding to the letter "D" has moved along a path indicated by arrow 6138, as shown in FIG. 6Y, and reached upper edge 6040 of the region in which name list 6006 is displayed, as illustrated in FIG. 6Z. In response to detecting that the third group of the items has moved across the predetermined position, the device generates a third tactile output (e.g., tactile output 6140) in conjunction with (e.g., at the time when) the third group of the items moving across the predetermined position in the user interface.

In some embodiments, while displaying the item navigation user interface (e.g., user interface 6002), the device detects (2216) a second drag gesture (e.g., a gesture along a path indicated by arrows 6122 and 6138, as illustrated in FIGS. 6X-6Z) on the touch-sensitive surface that includes movement from a third location corresponding to a third group of the items (e.g., group corresponding to the letter "D") toward a fourth location corresponding to the fourth group of the items (e.g., the group corresponding to the letter "C"). In response to detecting the second drag gesture, the device moves the third group of the items and the fourth group of the items in accordance with the second drag gesture (e.g., scrolling the contact list upward with an upward swipe gesture) without generating tactile outputs when the third and fourth items move across the predetermined position in the user interface.

In some embodiments, the first group of items and the second group of items are separated by one or more intermediate groups of items that correspond to respective intermediate index values (2218) between the first index value and the second index value in the plurality of index values. For example, the first group of items is the "A" group that includes names 6008, 6010, 6012, and 6014 (see FIG. 6A); the second group of items is the "D" group that includes names 6128, 6130, 6132, and 6134 (see FIG. 6X); and the one or more intermediate groups of items include the "B" group that includes names 6016 and 6018 (see FIG. 6A) and the "C" group that includes name 6020, 6124, and 6126 (see FIG. 6X).

In some embodiments, while the first drag gesture is detected, the device detects movement of the first drag gesture to a location that corresponds to a first intermediate index value in the plurality of index values. For example, the first drag gesture is a movement of contact 6034 along a path indicated by arrow 6066 from a first location corresponding to index marker 6028 that represents index marker 6022 that represents the "A" group index to a second location corresponding to index marker 6030 that represents the "B" group index, as illustrated in FIGS. 6I-6J. In response to detecting the movement of the first drag gesture to the location that corresponds to the first intermediate index value (e.g., "B" group index 6030), the device generates, via the one or more tactile output generators, a fourth tactile output (e.g., tactile output 6068, as indicated in FIG. 6J) that corresponds to the movement to the first intermediate value. The device displays a representation of a third portion of the plurality of items, wherein the third portion of the plurality of items include a first intermediate group of the items (e.g., "B" group items including names 6016 and 6018) that corresponds to the first intermediate value. For example, the device switches from displaying a representation of a respective portion of the plurality of items that include a group corresponding to another index value (e.g., "A" group index 6028) immediately preceding the first intermediate index value.

In some embodiments, while the first drag gesture is detected (2220): the device detects movement of the first drag gesture to a location that corresponds to a second intermediate index value in the plurality of index values. For example, the drag gesture described with regard to FIGS. 6I-6J continues along a path indicated by arrow 6072 to a location of index marker 6032 corresponding to the "C" group index, as illustrated in FIG. 6K. In response to detecting the movement of the first drag gesture to the location that corresponds to the second intermediate index value, the device determines a movement characteristic of the first drag gesture (e.g., a speed of the movement when reaching the second intermediate index value, or a time (e.g., time interval $t_7$) between the movement reaching the second intermediate index values (e.g., index marker 6032 corresponding to the "C" group index) and the movement reaching an earlier index value for which a tactile output was generated (index marker 6030 corresponding to the "B" group index). In accordance with a determination that the movement characteristic of the first drag gesture does not meet haptic-skipping criteria, the device generates a fifth tactile output to indicate that the second intermediate index value has been reached. In accordance with a determination that the movement characteristic of the first drag gesture meets the haptic-skipping criteria, the device forgoes generating the fifth tactile output (e.g., as illustrated in FIG. 6J) to indicate that the second intermediate index value has been reached. For example, in some embodiments, the movement-threshold criteria require that the movement characteristic of the first drag gesture (e.g., a speed of the movement of the contact) exceeds a predetermined threshold value (e.g., a threshold speed) when the movement first drag gesture reaches the second intermediate index value).

In some embodiments, the haptic-skipping criteria require (2222) that a speed of the movement exceeds a threshold speed when the movement of the first drag gesture reaches the second intermediate index value in the user interface, in order for the haptic-skipping criteria to be met.

In some embodiments, the haptic-skipping criteria require (2224) that a time at which the movement of the first drag gesture reaches the second intermediate index value (e.g., time $T=T_0+t_6+t_7$) in the user interface is less than a threshold amount of time since a tactile output was generated (e.g., at time $T_0+t_6$) upon the movement of the first drag gesture reaching another index value (e.g., the first intermediate index value, or the index value that correspond to the most recently generated tactile output) in the plurality of index values, in order for the haptic-skipping criteria to be met. For example, in FIG. 6J, at a time $T=T_0+t_6$, the device generates a tactile output 6068 upon movement of the drag gesture by contact 6034 reaches the first intermediate index value (e.g., index marker 6030 corresponding to the "B" group index). In FIG. 6K, at a time $T_0+t_6+t_7$, the contact has moved to the second intermediate index value (e.g., index marker 6032 corresponding to the "C" group index), however, the time since tactile output 6068 was generated is less than a threshold amount of time (e.g., a minimum amount of time between sequential tactile outputs), so no tactile output is generated.

In some embodiments, in response to detecting the movement of the first drag gesture to the location corresponding to the second intermediate index value (e.g., index marker 6032 corresponding to the "C" group index, as shown in FIG. 6K), the device switches (2226) from displaying the representation of the third portion of the items (e.g., the portion of "B" group items including names 6016 and 6018) to displaying a representation of a fourth portion of the items (e.g., "C" group items including names 6020, 6124, and 6126) that corresponds to the second intermediate index value (e.g., regardless of whether the fifth tactile output is generated).

In some embodiments, the item navigation user interface includes (2228) representations of a plurality of address book items (e.g., a name list 6006 that includes names 6008, 6010, 6012, 6014, 6016, 6018, and 6020 in FIG. 6A) arranged into two or more groups (e.g., groups that include an "A" group of names that includes names 6008, 6010, 6012, and 6014; "B" group that includes names 6016 and 6018; and a "C" group of names that includes names 6020, 6124, and 6126) that correspond to different index letters ("A" group index 6022, "B" group index 6024, and "C" group index 6026) of a plurality of index letters, and the index navigation element (e.g., index scrubber 6004) includes representations of two or more of the plurality of index letters (e.g., index marker 6028 for index "A," index marker 6030 for index "B," and index marker 6032 for index "C").

In some embodiments, the item navigation user interface includes (2230) representations of a plurality of image items arranged into two or more groups that correspond to different index date ranges of a plurality of index dates, and the index navigation element includes representations of two or more of the plurality of index date ranges.

In some embodiments, the item navigation user interface includes (2232) representations of a plurality of news items arranged into two or more groups that correspond to different index date ranges of a plurality of index dates, and the index navigation element includes representations of two or more of the plurality of index date ranges It should be understood that the particular order in which the operations in FIGS. 22A-22E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 2000, 2400, 2600, 2800. 3000, 3200, and 3400) are also applicable in an analogous manner to method 2200 described above with respect to FIGS. 22A-22E. For example, the contacts, gestures, user interface objects, tactile outputs, focus selectors, and animations described above with reference to method 2200 optionally have one or more of the characteristics of the contacts, gestures, user interface objects, tactile outputs, focus selectors, and animations described herein with reference to other methods described herein (e.g., methods 2000, 2400, 2600, 2800. 3000, 3200, and 3400). For brevity, these details are not repeated here.

Figure 23:
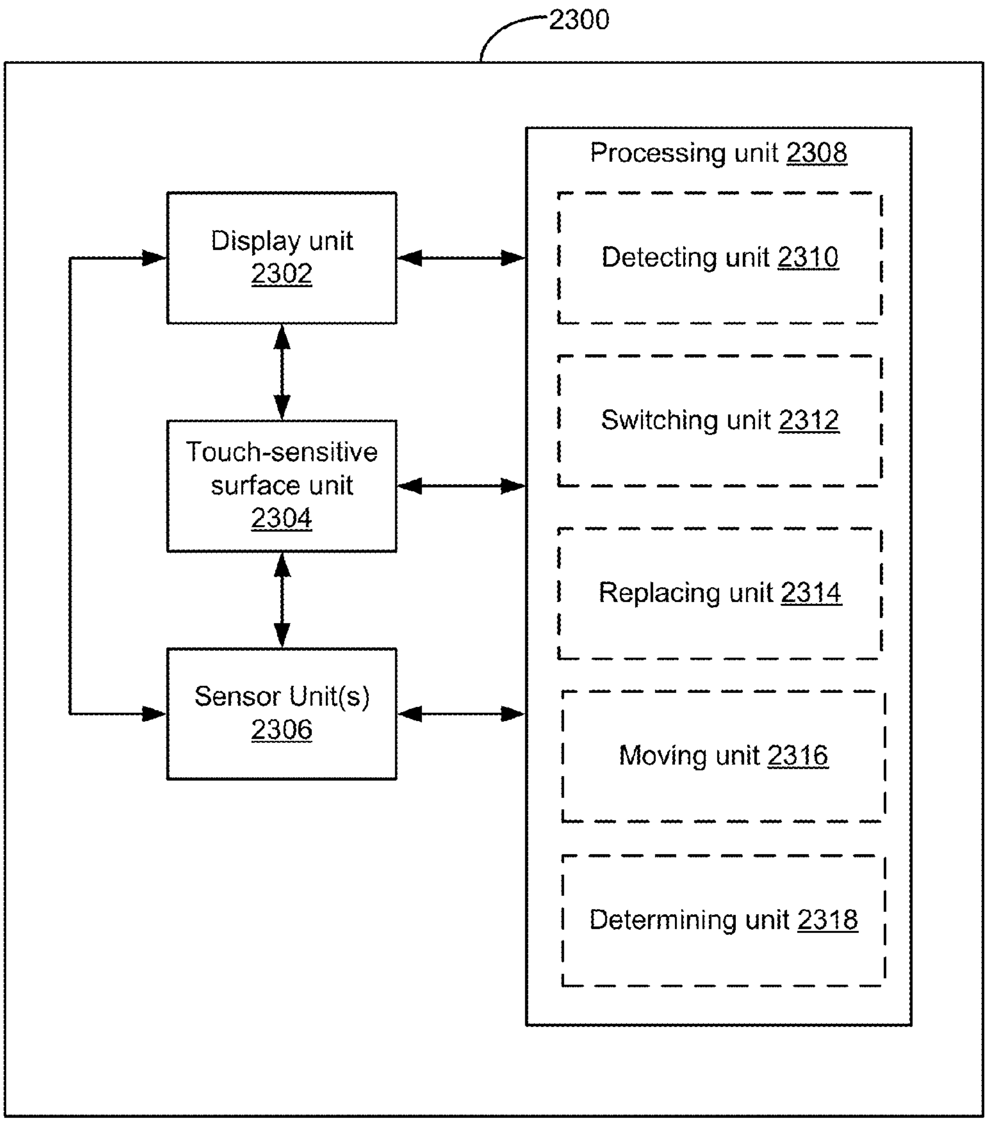
FIG. 23 is a functional block diagram of an electronic device in accordance with some embodiments.

In accordance with some embodiments, FIG. 23 shows a functional block diagram of an electronic device 2300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 23 are, optionally, combined or separated into sub-blocks to implement the principles of the various described embodiments. Therefore, the description herein optionally supports any possible combination or separation or further definition of the functional blocks described herein.

As shown in FIG. 23, an electronic device 2300 includes a display unit 2302 configured to display user interfaces; a touch-sensitive surface unit 2304; one or more tactile output generator units 2306 configured to generate tactile outputs; and a processing unit 2308 coupled to the display unit 2302, the touch-sensitive surface unit 2304, and the one or more tactile output generator units 2306. In some embodiments, the processing unit includes detecting unit 2310, switching unit 2312, replacing unit 2314, moving unit 2316, and determining unit 2318.

The processing unit 2308 is configured to: enable display of (e.g., with the display unit 2302), on the display unit 2302, an item navigation user interface that includes: a representation of a first portion of a plurality of items, wherein the plurality of items are arranged into two or more groups that are represented by corresponding index values in a plurality of index values and the first portion of the plurality of items includes a first group of the items that corresponds to a first index value in the plurality of index values; an index navigation element that includes representations of three or more of the plurality of index values; while displaying the item navigation user interface, detect (e.g., with the detecting unit 2310) a first drag gesture on the touch-sensitive surface unit 2304 that includes movement from a first location corresponding to the representation of the first index value that represents a first group of the items to a second location corresponding to a representation of a second index value that represents a second group of the items; and in response to detecting the first drag gesture: generate (e.g., with the tactile output generator unit(s) 2306), via the one or more tactile output generator units, a first tactile output that corresponds to the movement to the second location corresponding to the second index value;

and switch from (e.g., with the switching unit 2312) displaying the representation of the first portion of the plurality of items to displaying a representation of a second portion of the plurality of items, wherein the second portion of the plurality of items include the second group of the items.

In some embodiments, switching from displaying the representation of the first portion of the plurality of items to displaying the representation of the second portion of the plurality of items includes replacing (e.g., with the replacing unit 2314) the display of the representation of the first portion of the plurality of items with the display of the representation of the second portion of the plurality of items without scrolling the items.

In some embodiments, the representation of the first portion of the plurality of items starts with an item with a predefined characteristic within the first group of the items; and the representation of the second portion of the plurality of items starts with an item with the same predefined characteristic within the second group of the items.

In some embodiments, switching from displaying the representation of the first portion of the plurality of items to displaying the representation of the second portion of the plurality of items includes displaying (e.g., with the display unit 2302) the representation of the second portion of the plurality of items at a predefined location in the item navigation user interface.

In some embodiments, the processing unit 2308 is further configured to: while displaying the item navigation user interface, detect (e.g., with the detecting unit 2310) a second drag gesture on the touch-sensitive surface unit 2304 that includes movement from a third location corresponding to a third group of the items toward a fourth location corresponding to the fourth group of the items in the item navigation user interface; and in response to detecting the second drag gesture: move (e.g., with the moving unit 2316) the third group of the items and the fourth group of the items in accordance with the second drag gesture; and while moving the third group of the items and the fourth group of the items: detect (e.g., with the detecting unit 2310) that the fourth group of the items has moved across a predetermined position in the user interface; in response to detecting that the fourth group of the items has moved across the predetermined position, generate (e.g., with the tactile output generator unit(s) 2306) a second tactile output in conjunction with the fourth group of the items moving across the predetermined position in the user interface; detect (e.g., with the detecting unit 2310) that the third group of the items has moved across the predetermined position in the user interface; and in response to detecting that the third group of the items has moved across the predetermined position, generate (e.g., with the tactile output generator unit(s) 2306) a third tactile output in conjunction with the third group of the items moving across the predetermined position in the user interface.

In some embodiments, the processing unit 2308 is further configured to: while displaying the item navigation user interface, detect (e.g., with the detecting unit 2310) a second drag gesture on the touch-sensitive surface unit 2304 that includes movement from a third location corresponding to a third group of the items toward a fourth location corresponding to the fourth group of the items; and in response to detecting the second drag gesture, move (e.g., with the moving unit 2316) the third group of the items and the fourth group of the items in accordance with the second drag gesture without generating tactile outputs when the third and fourth items move across the predetermined position in the user interface.

In some embodiments, the first group of items and the second group of items are separated by one or more intermediate groups of items that correspond to respective intermediate index values between the first index value and the second index value in the plurality of index values; and the processing unit 2308 is further configured to: while the drag gesture is detected: detect (e.g., with the detecting unit 2310) movement of the drag gesture to a location that corresponds to a first intermediate index value in the plurality of index values; and in response to detecting the movement of the drag gesture to the location that corresponds to the first intermediate index value: generate (e.g., with the tactile output generator unit(s) 2306), via the one or more tactile output generator units, a fourth tactile output that corresponds to the movement to the first intermediate value; and enable display of (e.g., with the display unit 2302) a representation of a third portion of the plurality of items, wherein the third portion of the plurality of items include a first intermediate group of the items that corresponds to the first intermediate value.

In some embodiments, the processing unit is further configured to, while the drag gesture is detected: detect (e.g., with the detecting unit 2310) movement of the drag gesture to a location that corresponds to a second intermediate index value in the plurality of index values; and in response to detecting the movement of the drag gesture to the location that corresponds to the second intermediate index value: determine (e.g., with the determining unit 2318) a movement characteristic of the drag gesture; in accordance with a determination that the movement characteristic of the drag gesture does not meet haptic-skipping criteria, generate (e.g., with the tactile output generator unit(s) 2306) a fifth tactile output to indicate that the second intermediate index value has been reached; and in accordance with a determination that the movement characteristic of the drag gesture meets the haptic-skipping criteria, forgo generating the fifth tactile output to indicate that the second intermediate index value has been reached.

In some embodiments, the haptic-skipping criteria require that a speed of the movement exceeds a threshold speed when the movement of the drag gesture reaches the second intermediate index value in the user interface, in order for the haptic-skipping criteria to be met.

In some embodiments, the haptic-skipping criteria require that a time at which the movement of the drag gesture reaches the second intermediate index value in the user interface is less than a threshold amount of time since a tactile output was generated upon the movement of the drag gesture reaching another index value in the plurality of index values, in order for the haptic-skipping criteria to be met.

In some embodiments, the processing unit 2308 is further configured to: in response to detecting the movement of the drag gesture to the location corresponding to the second intermediate index value, switch from (e.g., with the switching unit 2312) displaying the representation of the third portion of the items to displaying a representation of a fourth portion of the items that corresponds to the second intermediate index value.

In some embodiments, the item navigation user interface includes representations of a plurality of address book items arranged into two or more groups that correspond to different index letters of a plurality of index letters, and the index navigation element includes representations of two or more of the plurality of index letters.

In some embodiments, the item navigation user interface includes representations of a plurality of image items arranged into two or more groups that correspond to different index date ranges of a plurality of index dates, and the index navigation element includes representations of two or more of the plurality of index date ranges.

In some embodiments, the item navigation user interface includes representations of a plurality of news items arranged into two or more groups that correspond to different index date ranges of a plurality of index dates, and the index navigation element includes representations of two or more of the plurality of index date ranges.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 22A-22E are, optionally, implemented by components depicted in FIGS. 1A-1B or FIG. 23. For example, detection operations 2204 and tactile feedback operation 2206 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 24A-24G are flow diagrams illustrating a method 2400 of providing haptic feedback during variable rate scrubbing in accordance with some embodiments. The method 2400 is performed at an electronic device (e.g., device 300, FIG. 3, or portable multifunction device 100, FIG. 1A) with a display, a touch-sensitive surface, one or more tactile output generators for generating tactile outputs, and optionally one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 2400 are, optionally, combined and/or the order of some operations is, optionally, changed.

As described below, the method 2400 relates to providing haptic feedback when a boundary between zones associated with two different adjustment rates of an adjustable control is crossed by a focus selector in accordance with movement of a contact across a touch-sensitive surface. Haptic feedback indicating the crossing of the boundary between such zones is advantageous over conventional visual feedback without haptic feedback because it is easier to notice and less distracting than some types of visual feedback. Additionally, tactile feedback provides valuable information to the user for touch screen user interfaces where the user's finger is obscuring corresponding visual feedback. Additionally, with haptic feedback, the boundary between adjacent zones need not be visually marked in the control user interface, and the changes in the user interface that correspond to the crossing of the boundary may be made more subtle and less intrusive to avoid visually cluttering the user interface and/or unnecessarily distracting the user from a task at hand. With haptic feedback, the user does not need to be as visually focused on the user interface while providing an input (e.g., a swipe gesture). Providing this improved nonvisual feedback enhances the operability of the device (e.g., by non-visually alerting the user that an adjustment rate has changed during an input) and makes the user-device interface more efficient (e.g., by helping the user to provide proper inputs and reducing user mistakes when operating/interacting with the device).

The device displays (2402) a user interface on the display, where the user interface includes an adjustable control (e.g., slider control 704 with adjustable progress indicator 706, FIG. 7A). In some embodiments, the adjustable control is a progress indicator with a scrubbing thumb or icon. In some embodiments, the adjustable control is an indication of progress along a predefine path that is configured to move along the predefined path in the user interface. In some embodiments, the adjustable control is a position indicator or progress icon that is configured to move back and forth along a linear slider control (e.g., an audio/video scrubber) in accordance with a drag input by a contact. In some embodiments, the adjustable control is a rotatable dial that is configured to rotate back and forth around an axis in accordance with a drag input by a contact or a rotation input by two contacts.

The device then detects (2404) a contact (or two concurrent contacts) on the touch-sensitive surface at a location that corresponds to the adjustable control on the display (e.g., contact 718-*a*, FIG. 7E), where movement of the contact that corresponds to movement away from the adjustable control changes an adjustment rate for adjusting the adjustable control based on movement of the contact (e.g., detecting touch-down of a contact while a focus selector is located on the progress indicator, or detecting touch-down of a contact on a touch-screen display at a location that corresponds to the progress indicator).

While continuously detecting (2406) the contact on the touch-sensitive surface (e.g., the drag input or rotation input is provided by a continuous contact moving across the touch-sensitive surface, after the progress indicator has been selected by the focus selector upon initial detection of the contact), the device detects (2406-*a*) a first movement of the contact across the touch-sensitive surface (e.g., a diagonal movement, or a vertical movement followed by a horizontal movement, or a horizontal movement followed by a vertical movement, or a series of zigzag movement that causes both horizontal displacements and vertical displacements of the focus selector, a rotational movement that includes both a radial component away from an axis and a rotational component around the axis, etc.). In response (2406-*b*) to detecting the first movement of the contact: in accordance with a determination that the first movement of the contact corresponds to more than a first threshold amount of movement of a focus selector away from the adjustable control (2406-*c*) (e.g., movement 720-*c* of contact 718-*c*, FIG. 7G), where the first threshold amount of movement triggers a transition from a first adjustment rate to a second adjustment rate (e.g., from full-speed to half-speed scrubbing rate): the device generates (2406-*d*) a first tactile output 726, FIG. 7G (e.g., a MicroTap medium (150 Hz), Gain max: 0.8, Gain min: 0.0), via the one or more tactile output devices, when the focus selector has reached the first threshold amount of movement, and adjusts (2406-*e*) the adjustable control at the second adjustment rate in accordance with movement of the contact that is detected after the focus selector has moved more than the first threshold amount (e.g., movement 720-*d* of contact 718-*d*, FIG. 7H); and in accordance with a determination that the first movement of the contact corresponds to less than the first threshold amount of movement of the focus selector away from the adjustable control (e.g., movement 720-*a* of contact 718-*a*, FIG. 7E and movement 720-*b* of contact 718-*b*, FIG. 7F), the device adjusts (2406-*f*) the adjustable control at the first adjustment rate in accordance with movement of the contact without generating the first tactile output.

In some embodiments, while continuously detecting (2408) the contact on the touch-sensitive surface, the device detects (2408-*a*) a second movement of the contact across the touch-sensitive surface (e.g., a diagonal movement, or a vertical movement followed by a horizontal movement, or a horizontal movement followed by a vertical movement, or a series of zigzag movement that causes both horizontal displacements and vertical displacements of the focus selector, a radial movement followed by a rotational movement, a spiral movement around a center of rotation, etc.). In response (2408-*b*) to detecting the second movement of the contact: in accordance with a determination that the second movement of the contact corresponds to more than a second threshold amount of movement of the focus selector away from the adjustable control (e.g., movement 720-*e* of contact 718-*e*, FIG. 7I) (e.g., the second threshold amount of movement corresponds to a second threshold distance or a second threshold position away from the adjustable control in the vertical direction) (2408-*c*), where the second threshold amount of movement triggers a transition from the second adjustment rate to a third adjustment rate (e.g., from half-speed to quarter-speed scrubbing rate): the device generates (2408-*d*) a second tactile output 728, FIG. 7I (e.g., a MicroTap medium (150 Hz), Gain max: 0.8, Gain min: 0.0), via the one or more tactile output devices, when the focus selector has reached the second threshold amount of movement, and adjusts (2408-*e*) the adjustable control at the third adjustment rate in accordance with movement of the contact that is detected after the focus selector has moved more than the second threshold amount (e.g., movement 720-*f* of contact 718-*f*, FIG. 7J); and in accordance with a determination that the second movement of the contact corresponds to less than the second threshold amount of movement of the focus selector away from the adjustable control (e.g., movement 720-*d* of contact 718-*d*, FIG. 7H), the device adjusts (2408-*f*) the adjustable control at the second adjustment rate in accordance with movement of the contact without generating the second tactile output.

In some embodiments, while continuously detecting (2410) the contact on the touch-sensitive surface: the device detects (2410-*a*) a third movement of the contact across the touch-sensitive surface (e.g., a diagonal movement, or a vertical movement followed by a horizontal movement, or a horizontal movement followed by a vertical movement, or a series of zigzag movement that causes both horizontal displacements and vertical displacements of the focus selector, a radial movement followed by a rotational movement, a spiral movement around a center of rotation, etc.). In response (2410-*b*) to detecting the third movement of the contact: in accordance with a determination that the third movement of the contact corresponds to more than a third threshold amount of movement of the focus selector away from the adjustable control (e.g., movement 720-*g* of contact 718-*g*, FIG. 7K) (e.g., the third threshold amount of movement corresponds to a third threshold distance or a third threshold position away from the adjustable control in the vertical direction) (2410-*c*), where the third threshold amount of movement triggers a transition from the third adjustment rate to a fourth adjustment rate (e.g., from quarter-speed to fine scrubbing speed): the device generates (2410-*d*) a third tactile output 730, FIG. 7K (e.g., a MicroTap medium (150 Hz), Gain max: 0.8, Gain min: 0.0), via the one or more tactile output devices, when the focus selector has reached the third threshold amount of movement, and adjusts (2410-*e*) the adjustable control at the fourth adjustment rate in accordance with movement of the contact that is detected after the focus selector has moved more than the third threshold amount (e.g., movement 720-*h* of contact 718-*h*, FIG. 7L); and in accordance with a determination that the third movement of the contact corresponds to less than the third threshold amount of movement of the focus selector away from the adjustable control (e.g., movement 720-*f* of contact 718-*f*, FIG. 7J), the device adjusts (2410-*f*) the adjustable control at the third adjustment rate in accordance with movement of the contact without generating the third tactile output.

In some embodiments, while continuously detecting (2412) the contact on the touch-sensitive surface, the device detects (2412-*a*) a fourth movement of the contact across the touch-sensitive surface (e.g., a diagonal movement, or a vertical movement followed by a horizontal movement, or a horizontal movement followed by a vertical movement, or a series of zigzag movement that causes both horizontal displacements and vertical displacements of the focus selector, a radial movement followed by a rotational movement, a spiral movement around a center of rotation, etc.). In response (2412-*b*) to detecting the fourth movement of the contact: in accordance with a determination that the fourth movement of the contact corresponds to more than a fourth threshold amount of movement of the focus selector toward the adjustable control (e.g., movement 720-1 of contact 718-1, FIG. 7P) (e.g., the fourth threshold amount of movement corresponds to a fourth threshold distance or a fourth threshold position away from the adjustable control in the vertical direction) (2412-*c*), where the fourth threshold amount of movement triggers a transition from the second adjustment rate to the first adjustment rate (e.g., from half-speed to full-speed): the device generates (2412-*d*) a fourth tactile output 736, FIG. 7P (e.g., a MicroTap medium (150 Hz), Gain max: 0.8, Gain min: 0.0), via the one or more tactile output devices, when the focus selector has reached the fourth threshold amount of movement, and adjusts (2412-*e*) the adjustable control at the first adjustment rate in accordance with movement of the contact that is detected after the focus selector has moved more than the fourth threshold amount (e.g., movement 720 of contact 718-*m*, FIG. 7Q); and in accordance with a determination that the fourth movement of the contact corresponds to less than the fourth threshold amount of movement of the focus selector toward the adjustable control, the device adjusts (2412-*f*) the adjustable control at the second adjustment rate in accordance with movement of the contact without generating the fourth tactile output. In some embodiments, a corresponding tactile output is generated when a threshold position between regions corresponding to other adjustment rates is crossed by the contact as well.

In some embodiments, adjusting the adjustable control at a respective adjustment rate in accordance with movement of the contact includes (2414) adjusting the adjustable control by an amount (e.g., a linear amount or an angular amount) that is proportional to the movement of the contact in a respective direction (e.g., movement along the linear progress bar, or movement in a direction around a rotational axis) with a proportionality constant (e.g., 1, 0.5, 0.25, etc.) that corresponds to the respective adjustment rate (e.g., the full-speed adjustment rate, the half-speed adjustment rate, the quarter-speed adjustment rate, etc.).

In some embodiments, while continuously detecting the contact on the touch-sensitive surface: in response to detecting the first movement of the contact: in accordance with a determination that the first movement of the contact corresponds to more than the first threshold amount of movement of the focus selector away from the adjustable control, the device switches (2416) from displaying a visual indication of the first adjustment rate (e.g., the text "full-speed scrubbing," 722-*a* in FIG. 7F) to displaying a visual indication of the second adjustment rate (e.g., the text "half-speed scrubbing," 722-*b* in FIG. 7G); and in accordance with a determination that the first movement of the contact does not correspond to more than the first threshold amount of movement of the focus selector away from the adjustable control, the device maintains (2416-*b*) display of the visual indication of the first adjustment rate (e.g., the text "full-speed scrubbing").

In some embodiments, generating the first tactile output (2418), via the one or more tactile output devices, when the focus selector has reached the first threshold amount of movement includes determining (2418-*a*) a movement metric that corresponds to movement of the contact when the focus selector reaches the first threshold amount of movement (e.g., a movement speed of the contact when the first threshold amount of movement is reached, such as the velocity 718 of movement 720-*c* of contact 718-*c* in FIG. 7G), and generating (2418-*b*) the first tactile output 726 in accordance with a tactile output pattern that is adjusted in accordance with the movement metric (e.g., a faster movement speed corresponds to a higher gain factor that is applied to the amplitude of the tactile output pattern).

In some embodiments, when the first threshold amount of movement is reached, an amplitude of the tactile output pattern is adjusted (2420) in accordance with a movement speed of the focus selector when the threshold amount of movement is reached. In some embodiments, when the first threshold amount of movement is movement in a respective direction relative to (e.g., perpendicular to) the linear scrubber, the movement speed is based on the speed of the focus selector in the respective direction.

In some embodiments, the adjustable control includes (2422) a movable indicator that is configured to move along a linear path in accordance with the movement of the focus selector, and movement (2422-*a*) of the focus selector (e.g., a contact) in a direction perpendicular to the linear path is required to move the focus selector from a first region in the user interface that corresponds to the first adjustment rate to a second region in the user interface that corresponds to the second adjustment rate. In some embodiments, the linear control includes a linear slider with a moveable indicator icon/knob (e.g., slider control 704 with adjustable progress indicator 706, FIG. 7A). In some embodiments, the linear control includes a media progress indicator that indicates current playback location of a media file. In some embodiments, the linear control includes a content browsing indicator that indicates the location of currently displayed page within multi-page content (e.g., an electronic book).

In some embodiments, the adjustable control includes (2424) a rotatable indicator that is configured to rotate around an axis in accordance with the movement of the focus selector, and movement (2424-*a*) of the focus selector (e.g., a contact) in a radial direction away from axis is required to move the focus selector from a first region in the user interface that corresponds to the first adjustment rate to a second region in the user interface that corresponds to the second adjustment rate. In some embodiments, the adjustable control includes a rotatable dial with a marker that corresponds to the start position. The dial is rotated by a movement of the focus selector that is around the axis. Movement of the focus selector in the radial direction corresponds to movement that changes the adjustment rate.

In some embodiments, in response to detecting the first movement of the contact, in accordance with a determination that the first movement of the contact corresponds to more than the first threshold amount of movement of the focus selector away from the adjustable control, where the first threshold amount of movement triggers a transition from the first adjustment rate to the second adjustment rate, the device adjusts (2426) the control at the first adjustment rate in accordance with movement of the contact that is detected before the focus selector has moved more than the first threshold amount (e.g., movement 720-*a* of contact 718-*a* in FIG. 7E and movement 720-*b* of contact 718-*b* in FIG. 7F).

In some embodiments, in response to detecting the first movement of the contact: in accordance with a determination that the first movement of the contact corresponds to more than a second threshold amount of movement of the focus selector away from the adjustable control (2428) (e.g., movement 720-*e* of contact 718-*e* in FIG. 7I), where the second threshold amount of movement triggers a transition from the second adjustment rate to a third adjustment rate (e.g., from half-speed to quarter-speed scrubbing rate): the device generates (2428-*a*) a second tactile output 728, FIG. 7I (e.g., a MicroTap medium (150 Hz), Gain max: 0.8, Gain min: 0.0), via the one or more tactile output devices, when the focus selector has reached the second threshold amount of movement, and (e.g., in addition to or instead of generating the first tactile output) adjusts (2428-*b*) the adjustable control at a third adjustment rate in accordance with movement of the contact that is detected after the focus selector has moved more than the second threshold amount (e.g., movement 720-*f* of contact 718-*f* in FIG. 7J. In some embodiments, the adjustable control is adjusted at the first adjustment rate in accordance with movement of the contact that is detected before the focus selector has moved more than the first threshold amount. In some embodiments, the adjustable control is adjusted at the second adjustment rate in accordance with movement of the contact that is detected before the focus selector has moved more than the second threshold amount (but has moved more than the first threshold amount).

In some embodiments, in response to detecting the first movement of the contact: in accordance with a determination that the first movement of the contact corresponds to more than a third threshold amount of movement of the focus selector away from the adjustable control (2430) (e.g., movement 720-*g* of contact 718-*g* in FIG. 7K), where the third threshold amount of movement triggers a transition from a third adjustment rate to a fourth adjustment rate (e.g., from quarter-speed to a fine-speed scrubbing rate): the device generates (2430-*a*) a third tactile output 730, FIG. 7K (e.g., a MicroTap medium (150 Hz), Gain max: 0.8, Gain min: 0.0), via the one or more tactile output devices, when the focus selector has reached the third threshold amount of movement, and (e.g., in addition to or instead of generating the first tactile output and/or the second tactile output)

adjusts (2430-*b*) the adjustable control at a fourth adjustment rate in accordance with movement of the contact that is detected after the focus selector has moved more than the third threshold amount (e.g., movement 720-*h* of contact 718-*h* in FIG. 7L). In some embodiments, the adjustable control is adjusted at the first adjustment rate in accordance with movement of the contact that is detected before the focus selector has moved more than the first threshold amount. In some embodiments, the adjustable control is adjusted at the second adjustment rate in accordance with movement of the contact that is detected before the focus selector has moved more than the second threshold amount (but has moved more than the first threshold amount). In some embodiments, the adjustable control is adjusted at the third adjustment rate in accordance with movement of the contact that is detected before the focus selector has moved more than the third threshold amount (but has moved more than the second threshold amount).

It should be understood that the particular order in which the operations in FIGS. 24A-24G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 2000, 2200, 2600, 2800, 3000, 3200, and 3400) are also applicable in an analogous manner to method 2400 described above with respect to FIGS. 24A-24G. For example, the contacts, gestures, user interface objects, tactile outputs, intensity thresholds, focus selectors, animations described above with reference to method 2400 optionally have one or more of the characteristics of the contacts, gestures, user interface objects, tactile outputs, intensity thresholds, focus selectors, animations described herein with reference to other methods described herein (e.g., methods 2000, 2200, 2600, 2800, 3000, 3200, and 3400). For brevity, these details are not repeated here.

Figure 25:
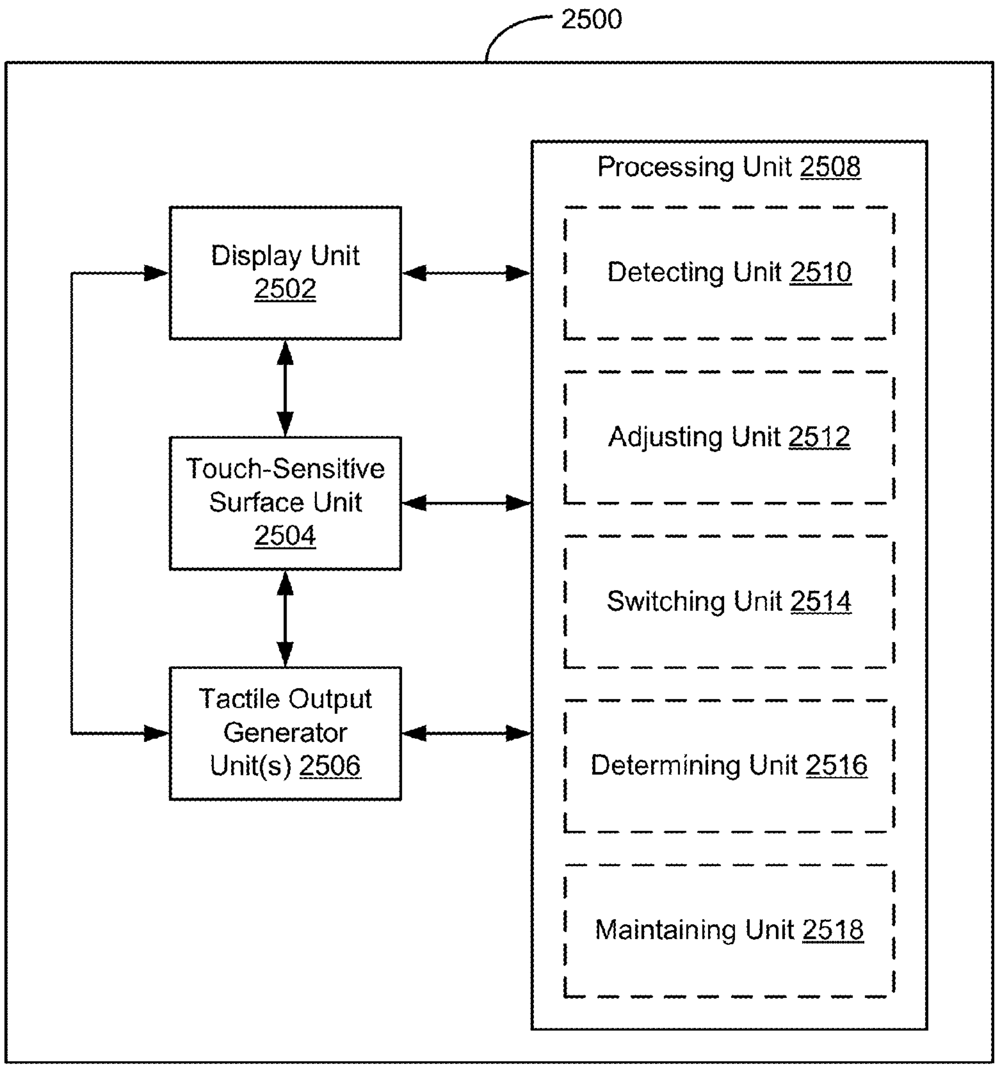
FIG. 25 is a functional block diagram of an electronic device in accordance with some embodiments.

In accordance with some embodiments, FIG. 25 shows a functional block diagram of an electronic device 2500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 25 are, optionally, combined or separated into sub-blocks to implement the principles of the various described embodiments. Therefore, the description herein optionally supports any possible combination or separation or further definition of the functional blocks described herein.

As shown in FIG. 25, an electronic device 2500 includes a display unit 2502 configured to display user interfaces; a touch-sensitive surface unit 2504; one or more tactile output generator units 2506 configured to generate tactile outputs; and a processing unit 2508 coupled to the display unit 2502, the touch-sensitive surface unit 2504, and the one or more tactile output generator units 2506. In some embodiments, the processing unit includes detecting unit 2510, adjusting unit 2512, switching unit 2514, determining unit 2516, and maintaining unit 2518.

The processing unit 2508 is configured to: enable display of (e.g., with the display unit 2502) a user interface on the display unit 2502, wherein the user interface includes an adjustable control; detect (e.g., with the detecting unit 2510) a contact on the touch-sensitive surface unit 2504 at a location that corresponds to the adjustable control on the display unit 2502, wherein movement of the contact that corresponds to movement away from the adjustable control changes an adjustment rate for adjusting the adjustable control based on movement of the contact; while continuously detecting the contact on the touch-sensitive surface unit 2504: detect (e.g., with the detecting unit 2510) a first movement of the contact across the touch-sensitive surface unit 2504; and in response to detecting the first movement of the contact: in accordance with a determination that the first movement of the contact corresponds to more than a first threshold amount of movement of a focus selector away from the adjustable control, wherein the first threshold amount of movement triggers a transition from a first adjustment rate to a second adjustment rate: generate (e.g., with the tactile output generator unit(s) 2506) a first tactile output, via the one or more tactile output devices, when the focus selector has reached the first threshold amount of movement; and adjust (e.g., with the adjusting unit 2512) the adjustable control at the second adjustment rate in accordance with movement of the contact that is detected after the focus selector has moved more than the first threshold amount; and in accordance with a determination that the first movement of the contact corresponds to less than the first threshold amount of movement of the focus selector away from the adjustable control, adjust (e.g., with the adjusting unit 2512) the adjustable control at the first adjustment rate in accordance with movement of the contact without generating the first tactile output.

In some embodiments, the processing unit 2508 is further configured to: while continuously detecting the contact on the touch-sensitive surface unit 2504: detect (e.g., with the detecting unit 2510) a second movement of the contact across the touch-sensitive surface unit 2504; and in response to detecting the second movement of the contact: in accordance with a determination that the second movement of the contact corresponds to more than a second threshold amount of movement of the focus selector away from the adjustable control, wherein the second threshold amount of movement triggers a transition from the second adjustment rate to a third adjustment rate: generate (e.g., with the tactile output generator unit(s) 2506) a second tactile output, via the one or more tactile output devices, when the focus selector has reached the second threshold amount of movement; and adjust (e.g., with the adjusting unit 2512) the adjustable control at the third adjustment rate in accordance with movement of the contact that is detected after the focus selector has moved more than the second threshold amount; and in accordance with a determination that the second movement of the contact corresponds to less than the second threshold amount of movement of the focus selector away from the adjustable control, adjust (e.g., with the adjusting unit 2512) the adjustable control at the second adjustment rate in accordance with movement of the contact without generating the second tactile output.

In some embodiments, the processing unit 2508 is further configured to: while continuously detecting the contact on the touch-sensitive surface unit 2504: detect (e.g., with the detecting unit 2510) a third movement of the contact across the touch-sensitive surface unit 2504; and in response to detecting the third movement of the contact: in accordance with a determination that the third movement of the contact corresponds to more than a third threshold amount of movement of the focus selector away from the adjustable control, wherein the third threshold amount of movement triggers a transition from the third adjustment rate to a fourth adjustment rate: generate (e.g., with the tactile output generator unit(s) 2506) a third tactile output, via the one or more tactile output devices, when the focus selector has reached the third threshold amount of movement; and adjust (e.g., with the adjusting unit 2512) the adjustable control at the fourth adjustment rate in accordance with movement of the contact that is detected after the focus selector has moved more than the third threshold amount; and in accordance with a determination that the third movement of the contact corresponds to less than the third threshold amount of movement of the focus selector away from the adjustable control, adjust (e.g., with the adjusting unit 2512) the adjustable control at the third adjustment rate in accordance with movement of the contact without generating the third tactile output.

In some embodiments, the processing unit 2508 is further configured to: while continuously detecting the contact on the touch-sensitive surface unit 2504: detect (e.g., with the detecting unit 2510) a fourth movement of the contact across the touch-sensitive surface unit 2504; and in response to detecting the fourth movement of the contact: in accordance with a determination that the fourth movement of the contact corresponds to more than a fourth threshold amount of movement of the focus selector toward the adjustable control, wherein the fourth threshold amount of movement triggers a transition from the second adjustment rate to the first adjustment rate: generate (e.g., with the tactile output generator unit(s) 2506) a fourth tactile output, via the one or more tactile output devices, when the focus selector has reached the fourth threshold amount of movement; and adjust (e.g., with the adjusting unit 2512) the adjustable control at the first adjustment rate in accordance with movement of the contact that is detected after the focus selector has moved more than the fourth threshold amount; and in accordance with a determination that the fourth movement of the contact corresponds to less than the fourth threshold amount of movement of the focus selector toward the adjustable control, adjust (e.g., with the adjusting unit 2512) the adjustable control at the second adjustment rate in accordance with movement of the contact without generating the fourth tactile output.

In some embodiments, adjusting the adjustable control at a respective adjustment rate in accordance with movement of the contact includes adjusting the adjustable control by an amount that is proportional to the movement of the contact in a respective direction with a proportionality constant that corresponds to the respective adjustment rate.

In some embodiments, the processing unit 2508 is further configured to: while continuously detecting the contact on the touch-sensitive surface unit 2504: in response to detecting the first movement of the contact: in accordance with a determination that the first movement of the contact corresponds to more than the first threshold amount of movement of the focus selector away from the adjustable control, switch from (e.g., with the switching unit 2514) displaying a visual indication of the first adjustment rate to displaying a visual indication of the second adjustment rate; and in accordance with a determination that the first movement of the contact does not correspond to more than the first threshold amount of movement of the focus selector away from the adjustable control, maintain display of (e.g., with the maintaining unit 2518) the visual indication of the first adjustment rate.

In some embodiments, generating the first tactile output, via the one or more tactile output devices, when the focus selector has reached the first threshold amount of movement includes: determining (e.g., with the determining unit 2516) a movement metric that corresponds to movement of the contact when the focus selector reaches the first threshold amount of movement; and generating (e.g., with the tactile generator unit(s) 2506) the first tactile output in accordance with a tactile output pattern that is adjusted in accordance with the movement metric.

In some embodiments, when the first threshold amount of movement is reached, an amplitude of the tactile output pattern is adjusted in accordance with a movement speed of the focus selector when the threshold amount of movement is reached.

In some embodiments, the adjustable control includes a movable indicator that is configured to move along a linear path in accordance with the movement of the focus selector, and movement of the focus selector in a direction perpendicular to the linear path is required to move the focus selector from a first region in the user interface that corresponds to the first adjustment rate to a second region in the user interface that corresponds to the second adjustment rate.

In some embodiments, the adjustable control includes a rotatable indicator that is configured to rotate around an axis in accordance with the movement of the focus selector, and movement of the focus selector in a radial direction away from axis is required to move the focus selector from a first region in the user interface that corresponds to the first adjustment rate to a second region in the user interface that corresponds to the second adjustment rate.

In some embodiments, the processing unit 2508 is further configured to, in response to detecting the first movement of the contact, in accordance with a determination that the first movement of the contact corresponds to more than the first threshold amount of movement of the focus selector away from the adjustable control, wherein the first threshold amount of movement triggers a transition from the first adjustment rate to the second adjustment rate, adjust (e.g., with the adjusting unit 2512) the control at the first adjustment rate in accordance with movement of the contact that is detected before the focus selector has moved more than the first threshold amount.

In some embodiments, the processing unit 2508 is further configured to, in response to detecting the first movement of the contact: in accordance with a determination that the first movement of the contact corresponds to more than a second threshold amount of movement of the focus selector away from the adjustable control, wherein the second threshold amount of movement triggers a transition from the second adjustment rate to a third adjustment rate: generate (e.g., with the tactile output generator unit(s) 2506) a second tactile output, via the one or more tactile output devices, when the focus selector has reached the second threshold amount of movement; and adjust (e.g., with the adjusting unit 2512) the adjustable control at a third adjustment rate in accordance with movement of the contact that is detected after the focus selector has moved more than the second threshold amount.

In some embodiments, the processing unit 2508 is further configured to, in response to detecting the first movement of the contact: in accordance with a determination that the first movement of the contact corresponds to more than a third threshold amount of movement of the focus selector away from the adjustable control, wherein the third threshold amount of movement triggers a transition from a third adjustment rate to a fourth adjustment rate: generate (e.g., with the tactile output generator unit(s) 2506) a third tactile output, via the one or more tactile output devices, when the focus selector has reached the third threshold amount of movement; and adjust (e.g., with the adjusting unit 2512) the adjustable control at a fourth adjustment rate in accordance with movement of the contact that is detected after the focus selector has moved more than the third threshold amount.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 24A-24G are, optionally, implemented by components depicted in FIGS. 1A-1B or FIG. 25. For example, detection operations 2404 and tactile feedback operation 2406 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 26A-26E are flow diagrams illustrating a method 2600 of providing tactile outputs for slider controls in accordance with some embodiments. The method 2600 is performed at an electronic device (e.g., device 300, FIG. 3, or portable multifunction device 100, FIG. 1A) with a display, a touch-sensitive surface, one or more tactile output generators for generating tactile outputs, and optionally one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 2600 are, optionally, combined and/or the order of some operations is, optionally, changed.

As described below, the method 2600 relates to providing haptic feedback in the form of a tactile output when a moveable indicator of a slider control reaches an end of the slider control, where a tactile output pattern (e.g., including amplitude, frequency, and/or duration) of the tactile output is configured based on a movement speed of the moveable indicator when the moveable indicator reaches the end of the slider control. By adjusting the tactile output pattern of the tactile output according to the movement speed of the moveable indicator, the device appears more responsive to the changes in the user's input. Additionally, tactile feedback provides valuable information to the user for touch screen user interfaces where the user's finger is obscuring corresponding visual feedback. This more responsive feedback mechanism helps to guide the user to provide proper inputs and reduce user mistakes when operating/interacting with the device, thereby enhancing the operability of the device and making the user-device interface more efficient. In addition, by reducing user mistakes and helping the user to use the device more quickly and efficiently, the improved haptic feedback also reduces power usage and improves battery life of the device.

The device displays (2602) a user interface on the display, where the user interface includes a slider control that represents a continuous range of values between a first value and a second value (e.g., a range of values that correspond to a continuous range of numerical values, a continuous or discrete sequence of positions, or a listing of values corresponding to different states or selectable options), the slider control includes a first end that corresponds to the first value and a second end that corresponds to the second value. For example, in a linear slider control (e.g., a brightness slider control 812, FIG. 8A), the two ends of the slider control are located at different locations and correspond to two boundary values (e.g., maximum value 818 and minimum value 816, FIG. 8A) of the range of values; in a circular slider control, the two ends of the slider control are located at the same location and correspond to two boundary values of the range of values (e.g., hour values around a clock face, e.g., circular slider 902 with overlapping ends at 0 and 12 hour mark as shown in FIG. 9A). The slider control further includes a movable indicator that is configured to move along the slider control between the first end and the second end of the slider control, to indicate a current value selected from the continuous range of values represented by the slider control (e.g., movable indicator 814, FIG. 8A). In some embodiments, the moveable indicator represents a continuous range of values that is a subset of values represented by the slider control (e.g., moveable indicator 906 in FIG. 9A). In some embodiments, the slider control (e.g., image slider 1003) includes a sequence of slots for thumbnail representations in a photo selector, and the moveable indicator (e.g., image representations 1006) is a sequence of thumbnail representations that slide along the sequence of slots, e.g., as shown in FIG. 10A.

The device detects (2604) a contact on the touch-sensitive surface at a location that corresponds to the moveable indicator of the slider control (e.g., contact 824, FIG. 8F; contact 830, FIG. 8J; or contact 836, FIG. 8L). The device then detects (2406) movement of the contact on the touch-sensitive surface. In response (2606-*a*) to detecting the movement of the contact, the device moves (2606-*b*) the moveable indicator along the slider control in accordance with the movement of the contact, and generates (2606-*c*) a first tactile output upon the moveable indicator reaching the first end of the slider control, wherein a tactile output pattern of the first tactile output (e.g., a characteristic value for a first output characteristic (e.g., amplitude, frequency, duration, waveform, number of oscillations across a neutral position, etc.) of the tactile output) is configured based on a movement speed of the movable indicator when the moveable indicator reaches the first end of the slider control (e.g., a higher speed of the moveable indicator corresponds to a higher amplitude of the tactile output pattern, or a higher frequency of the tactile output pattern).

In some embodiments, the movable indicator spans a plurality of values in the range of values, the plurality of values include a beginning value represented by a first end of the moveable indicator and an ending value represented by a second end of the moveable indicator; and moving the moveable indicator includes moving at least one of the first end and the second end of the moveable indicator (2608).

In some embodiments, moving the moveable indicator includes simultaneously changing (2610) the beginning value and the ending value while maintaining a current size of the moveable indicator. In some embodiments, the device, in response (2610-*a*) to detecting the movement of the contact: generates (2610-*b*) one or more tactile outputs that correspond to movement of the first end of the moveable indicator over one or more predefined values (e.g., values indicated by markings) in the slider control, and generates (2610-*c*) one or more tactile outputs that correspond to movement of the second end of the moveable indicator over the one or more predefined values (e.g., values indicated by markings) in the slider control.

In some embodiments, in accordance with a determination that the first end of the movable indicator and the second end of the moveable indicator have each reached a respective one of the one or more predefined values at the same time, the device forgoes (2612) generating a respective tactile output that corresponds to one of the first and the second ends reaching the respective ones of the one or more predefined values, while generating a respective tactile output that corresponds to one of the first and the second ends reaching the respective ones of the one or more predefined values.

In some embodiments, the one or more predefined values include (2614) one or more major values (e.g., hour marks) and one or more minor values (e.g., minute marks), and forgoing generating the respective tactile output (2614-*a*) that corresponds to one of the first and the second ends reaching the respective ones of the one or more predefined values includes forgoing (2614-*b*) generating a respective tactile output that corresponds to one of the first and the second ends reaching a minor value of the one or more predefined values (e.g., while generating a respective tactile output that corresponds to one of the first and the second ends reaching a major value of the one or more predefined values). This is illustrated in FIGS. 9C, 9E, 9M, 9S, 9T, 9U, where when both ends of the moveable indicator 906 moves past a tick mark on the clock face, only one tactile output is generated, and the other tactile output is not generated.

In some embodiments, moving the moveable indicator includes moving (2616) the first end of the moveable indicator, without moving the second end of the moveable indicator, and the device, in response (2616-*a*) to detecting the movement of the contact, generates (2616-*b*) one or more tactile outputs that correspond to movement of the first end of the moveable indicator over one or more predefined values (e.g., values indicated by markings) in the slider control (e.g., generating the tactile outputs for movements of the first end without generating tactile outputs corresponding to the second end because the second end is not moving). This is illustrated in FIGS. 9F-9J, for example.

In some embodiments, in response (2618) to detecting the movement of the contact, the device generates (2618-*a*) one or more tactile outputs that correspond to movement of the moveable indicator over one or more predefined values (e.g., values indicated by markings) in the slider control (e.g., the timing of the tactile outputs are synchronized with the timing of when the predefined values are passed by the moveable indicator). In some embodiments, when the movable indicator continues to move after lift-off of the contact due to inertia, the speed of the movable indicator gradually decreases and the time between adjacent tactile outputs increases, as the moveable indicator continues to pass additional evenly spaced tick marks on the user interface. This is illustrated in FIGS. 9S-9U, for example.

In some embodiments, the one or more predefined values include (2620) one or more major values (e.g., hour marks) and one or more minor values (e.g., minute marks), and generating one or more tactile outputs that correspond to movement of the moveable indicator over the one or more predefined values in the slider control includes (2620-*a*): generating (2620-*b*) respective tactile outputs that correspond to movement of the moveable indicators over the one or more major values with a first tactile output pattern and generating (2620-*c*) respective tactile outputs that correspond to movement of the moveable indicators over the one or more minor values with a second tactile output pattern, where the second tactile output pattern has a smaller amplitude and/or a shorter duration than the first tactile output pattern. This is illustrated in FIGS. 9C and 9E, for example, tactile output 916 that corresponds to an end passing a minor tick mark has a smaller amplitude than tactile output 918 that corresponds to an end passing a major tick mark.

In some embodiments, in response (2622) to detecting the movement of the contact, in accordance with a determination that the moveable indicator has reached the second end of the slider control (e.g., a minimum value or origin point of the slider control) in accordance with the movement of the contact (2622-*a*): in accordance with a determination that a movement speed of the moveable indicator at a time when the moveable indicator reaches the second end of the adjustable control meets a first speed threshold, the device generates (2622-*b*) a second tactile output to indicate that the moveable indicator has reached the second end of the adjustable control; and in accordance with a determination that the movement speed of the moveable indicator at the time when the moveable indicator reaches the second end of the adjustable control does not meet the first speed threshold (e.g., the movement speed of the moveable indicator is too slow), the device forgoes (2622-*c*) generation of the second tactile output.

For example, for the slider control 814 in FIGS. 8A-8E, the device forgoes generation of a tactile output when the user drags the moveable indicator of the slider control to the minimum end with a slow speed. Such embodiments take into account the deliberateness of the user's input and respond in a way that respects the user's desire to not be disturbed by an unnecessary tactile output. This more responsive feedback mechanism helps to guide the user to provide proper inputs and reduce user mistakes when operating/interacting with the device, thereby enhancing the operability of the device and making the user-device interface more efficient.

In some embodiments, moving the moveable indicator along the slider control in accordance with the movement of the contact includes (2624): moving (2624-*a*) the moveable indicator along the slider control, while continuing to detect the contact on the touch-sensitive surface (e.g., as shown in FIG. 8F) and continuing to move (2624-*b*) the moveable indicator along the slider control after lift-off of the contact is detected (e.g., continuing to move the moveable indicator with gradually decreasing speed after lift-off of the contact is detected, until the speed reaches zero and/or until the moveable indicator reaches the end of the slider control, as shown in FIG. 8G-8H). In some embodiments, the moveable indicator bounces back and forth one or more times with decreasing amplitude after reaching the end of the slider control.

In some embodiments, the moveable indicator has an adjustable size, and a tactile output pattern of the first tactile output is configured in accordance with a current size of the moveable indicator (2626). E.g., a larger moveable indicator (e.g., a longer duration of the sleep timer) causes a stronger tactile output when moved pass tick marks on a clock face or flung against an end of a slider control. For example, in FIGS. 9A-9F, moveable indicator 906 has a larger size as compared to moveable indicator 906 shown in FIGS.

9K-9Q, and a stronger tactile output is generated for the larger moveable indicator 906 (e.g., tactile output 918 in FIG. 9E is stronger than tactile output 931 in FIG. 9M; and tactile output 916 in FIG. 9C is stronger than tactile output 930 in FIG. 9L).

In some embodiments, the first tactile output is a discrete tactile output (2628); e.g., a tactile output with no more than two cycles of oscillation about a neutral position, such as a FullTap, a MiniTap, or a MicroTap.

In some embodiments, in accordance with a determination that the moveable indicator has reached a respective predefined value in the continuous range of values (2630): in accordance with a determination that a threshold amount of time (e.g., 0.05 s) has expired since generation of a last tactile output (e.g., the tactile output rate limit is not reached), the device generates (2630-*a*) a respective tactile output to indicate that the moveable indicator has reached the respective defined value; and in accordance with a determination that the threshold amount of time has not expired since generation of the last tactile output (e.g., the tactile output rate limit is reached), the device forgoes (2630-*b*) generation of the respective tactile output to indicate that the moveable indicator has reached the respective defined value.

In some embodiments, discrete tactile outputs of short durations (e.g., a few milliseconds to tens of milliseconds) are used to indicate that values of significance (e.g., values at tick marks) on the slider control have been crossed by the moveable indicator. This is helpful when the movement of the moveable indicator is relatively slow. However, when the moveable indicator moves past many such values in a short amount of time, the benefit of providing a tactile output for each such value of significance diminishes. Therefore, it is advantageous to skip some tactile outputs if they would come too close to a previously played tactile output (e.g., less than 50 milliseconds). This restriction on the rate of tactile output generation helps to conserve power and avoid unnecessary distraction to the user. Additionally, the burden on the tactile output generators may also be lessened by the restriction on the rate of the tactile output generation, which may lead to a reduction of the device's manufacturing and maintenance cost and extend the device's usable lifespan.

In some embodiments, the slider control is an image picker (2632) for selecting a representative image from a plurality of images (e.g., a series of images taken in a burst mode of a digital camera, as illustrated in FIGS. 10A-10I), the moveable indicator includes (2632-*a*) representations of the plurality of images, the slider control includes (2632-*b*) an indicator located in between the first end and the second end of the slider control (e.g., the positions of the first end and the second end of the slider control are determined based on the number of images in the plurality of images and may be located outside of the viewable region of the display, e.g., the length of the slider control is roughly two times of the length needed to accommodate all of the images) and the device generates (2632-*c*) a second tactile output upon a respective image of the plurality of images reaching the indicator. In some embodiments, the respective image is an image that is a proposed selection from a burst of images. In some embodiments, there are multiple images that are marked as proposed selections from a burst of images.

It should be understood that the particular order in which the operations in FIGS. 26A-26E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 2000, 2200, 2400, 2800, 3000, 3200, and 3400) are also applicable in an analogous manner to method 2600 described above with respect to FIGS. 26A-26E. For example, the contacts, gestures, user interface objects, tactile outputs, intensity thresholds, focus selectors, animations described above with reference to method 2600 optionally have one or more of the characteristics of the contacts, gestures, user interface objects, tactile outputs, intensity thresholds, focus selectors, animations described herein with reference to other methods described herein (e.g., methods 2000, 2200, 2400, 2800, 3000, 3200, and 3400). For brevity, these details are not repeated here.

Figure 27:
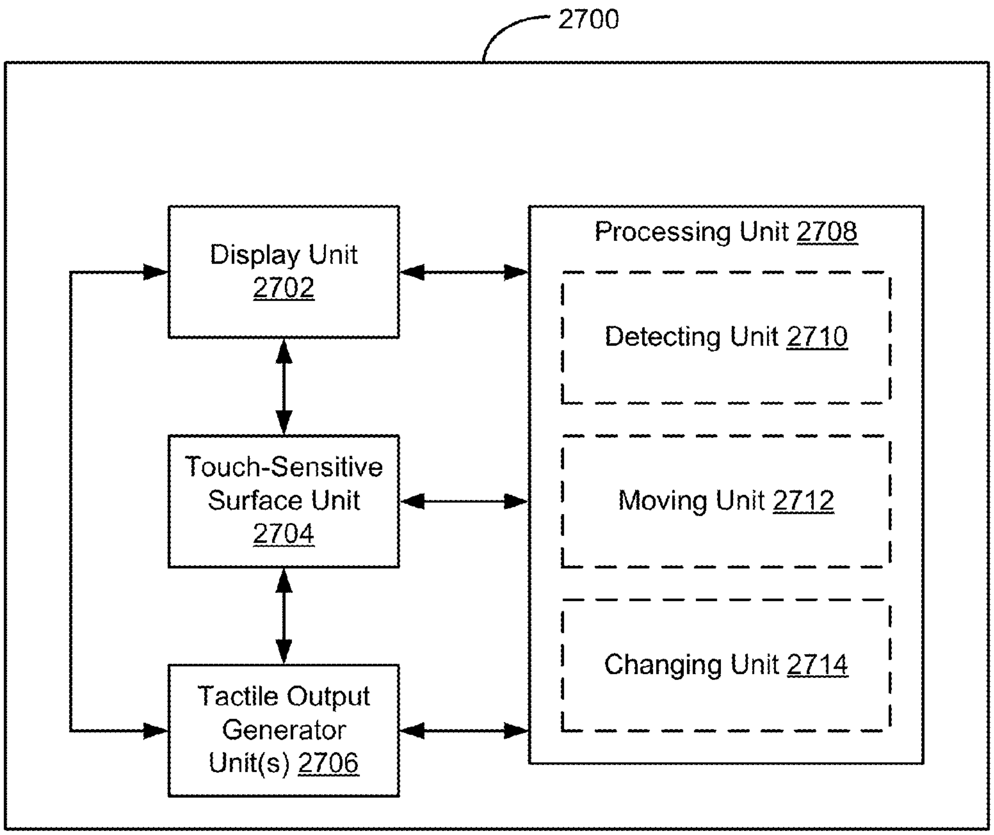
FIG. 27 is a functional block diagram of an electronic device in accordance with some embodiments.

In accordance with some embodiments, FIG. 27 shows a functional block diagram of an electronic device 2700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 27 are, optionally, combined or separated into sub-blocks to implement the principles of the various described embodiments. Therefore, the description herein optionally supports any possible combination or separation or further definition of the functional blocks described herein.

As shown in FIG. 27, an electronic device 2700 includes a display unit 2702 configured to display user interfaces; a touch-sensitive surface unit 2704; one or more tactile output generator units 2706 configured to generate tactile outputs; and a processing unit 2708 coupled to the display unit 2702, the touch-sensitive surface unit 2704, and the one or more tactile output generator units 2706. In some embodiments, the processing unit includes detecting unit 2710, moving unit 2712, and changing unit 2714.

The processing unit 2708 is configured to: enable display of (e.g., with the display unit 2702) a user interface on the display unit 2702, wherein: the user interface includes a slider control that represents a continuous range of values between a first value and a second value, the slider control includes a first end that corresponds to the first value and a second end that corresponds to the second value, the slider control further includes a movable indicator that is configured to move (e.g., with the moving unit 2712) along the slider control between the first end and the second end of the slider control, to indicate a current value selected from the continuous range of values represented by the slider control; detect (e.g., with the detecting unit 2710) a contact on the touch-sensitive surface unit 2704 at a location that corresponds to the moveable indicator of the slider control; detect (e.g., with the detecting unit 2710) movement of the contact on the touch-sensitive surface unit 2704; and in response to detecting the movement of the contact, move (e.g., with the moving unit 2712) the moveable indicator along the slider control in accordance with the movement of the contact; and generate (e.g., with the tactile output generator unit(s) 2706) a first tactile output upon the moveable indicator reaching the first end of the slider control in accordance with the movement of the contact, wherein a tactile output pattern of the first tactile output is configured based on a movement speed of the movable indicator when the moveable indicator reaches the first end of the slider control.

In some embodiments, the movable indicator spans a plurality of values in the range of values, the plurality of values include a beginning value represented by a first end of the moveable indicator and an ending value represented by a second end of the moveable indicator; and move (e.g., with the moving unit 2712) the moveable indicator includes moving (e.g., with the moving unit 2712) at least one of the first end and the second end of the moveable indicator.

In some embodiments, moving the moveable indicator includes simultaneously changing (e.g., with the changing unit 2714) the beginning value and the ending value while maintaining a current size of the moveable indicator; and the processing unit is further configured to, in response to detecting the movement of the contact: generate (e.g., with the tactile output generator unit(s) 2706) one or more tactile outputs that correspond to movement of the first end of the moveable indicator over one or more predefined values in the slider control; and generate (e.g., with the tactile output generator unit(s) 2706) one or more tactile outputs that correspond to movement of the second end of the moveable indicator over the one or more predefined values in the slider control.

In some embodiments, the processing unit 2708 is further configured to: in accordance with a determination that the first end of the movable indicator and the second end of the moveable indicator have each reached a respective one of the one or more predefined values at the same time: forgo generating a respective tactile output that corresponds to one of the first and the second ends reaching the respective ones of the one or more predefined values, while generating a respective tactile output that corresponds to one of the first and the second ends reaching the respective ones of the one or more predefined values.

In some embodiments, the one or more predefined values include one or more major values and one or more minor values, and forgoing generating the respective tactile output that corresponds to one of the first and the second ends reaching the respective ones of the one or more predefined values includes: forgoing generating a respective tactile output that corresponds to one of the first and the second ends reaching a minor value of the one or more predefined values.

In some embodiments, moving the moveable indicator includes moving (e.g., with the moving unit 2712) the first end of the moveable indicator, without moving the second end of the moveable indicator; and the processing unit is further configured to, in response to detecting the movement of the contact: generate (e.g., with the tactile output generator unit(s) 2706) one or more tactile outputs that correspond to movement of the first end of the moveable indicator over one or more predefined values in the slider control.

In some embodiments, the processing unit 2708 is further configured to: in response to detecting the movement of the contact: generate (e.g., with the tactile output generator unit(s) 2706) one or more tactile outputs that correspond to movement of the moveable indicator over one or more predefined values in the slider control.

In some embodiments, the one or more predefined values include one or more major values and one or more minor values, and generating one or more tactile outputs that correspond to movement of the moveable indicator over the one or more predefined values in the slider control includes: generating respective tactile outputs that correspond to movement of the moveable indicators over the one or more major values with a first tactile output pattern; and generating respective tactile outputs that correspond to movement of the moveable indicators over the one or more minor values with a second tactile output pattern, wherein the second tactile output pattern has a smaller amplitude and/or a shorter duration than the first tactile output pattern.

In some embodiments, the processing unit 2708 is further configured to: in response to detecting the movement of the contact, in accordance with a determination that the moveable indicator has reached the second end of the slider control in accordance with the movement of the contact: in accordance with a determination that a movement speed of the moveable indicator at a time when the moveable indicator reaches the second end of the adjustable control meets a first speed threshold, generate (e.g., with the tactile output generator unit(s) 2706) a second tactile output to indicate that the moveable indicator has reached the second end of the adjustable control; and in accordance with a determination that the movement speed of the moveable indicator at the time when the moveable indicator reaches the second end of the adjustable control does not meet the first speed threshold, forgo generation of the second tactile output.

In some embodiments, moving the moveable indicator along the slider control in accordance with the movement of the contact includes: moving (e.g., with the moving unit 2712) the moveable indicator along the slider control, while continuing to detect (e.g., with the detecting unit 2710) the contact on the touch-sensitive surface unit 2704; and continuing to move (e.g., with the moving unit 2712) the moveable indicator along the slider control after lift-off of the contact is detected.

In some embodiments, the moveable indicator has an adjustable size, and wherein a tactile output pattern of the first tactile output is configured in accordance with a current size of the moveable indicator.

In some embodiments, the first tactile output is a discrete tactile output.

In some embodiments, the processing unit 2708 is further configured to: in accordance with a determination that the moveable indicator has reached a respective predefined value in the continuous range of values: in accordance with a determination that a threshold amount of time has expired since generation of a last tactile output, generate (e.g., with the tactile output generator unit(s) 2706) a respective tactile output to indicate that the moveable indicator has reached the respective defined value; and in accordance with a determination that the threshold amount of time has not expired since generation of the last tactile output, forgo generation of the respective tactile output to indicate that the moveable indicator has reached the respective defined value.

In some embodiments, the slider control is an image picker for selecting a representative image from a plurality of images; the moveable indicator includes representations of the plurality of images; the slider control includes an indicator located in between the first end and the second end of the slider control and the processing unit 2708 is further configured to: generate (e.g., with the tactile output generator unit(s) 2706) a second tactile output upon a respective image of the plurality of images reaching the indicator.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 26A-26E are, optionally, implemented by components depicted in FIGS. 1A-1B or FIG. 27. For example, detection operations 2604 and tactile feedback operation 2606 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 28A-28E are flow diagrams illustrating a method 2800 of providing tactile outputs with visual rubber band effects in accordance with some embodiments. The method 2800 is performed at an electronic device (e.g., device 300, FIG. 3, or portable multifunction device 100, FIG. 1A) with a display, a touch-sensitive surface, one or more tactile output generators for generating tactile outputs, and optionally one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. Some operations in method 2800 are, optionally, combined and/or the order of some operations is, optionally, changed.

As described below, the method 2800 relates to providing haptic feedback to indicate to the user that, after an outer edge of a user interface element has crossed a threshold position during resizing or movement of the user interface object, a rubber band visual effect will be applied. For example, in some embodiments, the rubber band effect causes the outer edge of the user interface element to move back to the threshold position after the termination of the resizing or drag input or after the user interface element has come to a stop at the end of its movement due to inertia. The device provides a tactile output upon crossing of the threshold position and/or upon termination of the input. In either case, the tactile output comes immediately before the visual rubber band effect becomes noticeable to the user. The timing of the tactile output generation reinforces the visual feedback to the user regarding the initiation of the rubber band effect, and primes the user regarding the subsequent changes that occur in the user interface. Haptic feedback is easy to notice and less distracting than some types of visual feedback. The user does not need to be as visually focused on the user interface while providing an input (e.g., a swipe gesture or a pinch gesture) in order to know what will happen next in the user interface. Additionally, tactile feedback provides valuable information to the user for touch screen user interfaces where the user's finger is obscuring corresponding visual feedback. Providing this improved nonvisual feedback enhances the operability of the device and makes the user-device interface more efficient (e.g., by helping the user to provide proper inputs, avoid user confusion, and reducing user mistakes due to such confusion when operating/interacting with the device).

The device displays (2802) a user interface on the display, where the user interface includes a first user interface element (e.g., the first user interface element is a list of items 1111 (FIG. 11A), or a user interface object such as an image 1212 (FIG. 12A)). The device then detects (2804) a contact at a location on the touch-sensitive surface that corresponds to the first user interface element (e.g., contact 1116, FIG. 11B; contact 1126, FIG. 11H; contact 1222, FIG. 12B; contact 1238, FIG. 12G; contact 1244, FIG. 12K; contact 1302, FIG. 13B; or contact 1314, FIG. 13I). The device then detects (2806) an input by the contact (e.g., a drag input by the contact (e.g., FIGS. 11B-11E, FIGS. 11H-11J, or FIGS. 12G-12H), a pinch gesture by two contacts moving toward each other (e.g., FIGS. 12B-12D or FIGS. 13I-13J), or a depinch gesture by two contacts moving away from each other (e.g., FIGS. 12K-12N or FIGS. 13B-13D)), including detecting a movement of the contact across the touch-sensitive surface.

In response to detecting the input by the contact, the device changes (2808) a position of an outer edge of the user interface element relative to a first threshold position in the user interface (e.g., the first threshold position may be located on the edge of the user interface, or a position outside of the currently displayed portion of the user interface, or a position within the currently displayed portion of the user interface) in accordance with the movement of the contact on the touch-sensitive surface.

The device then detects (2810) that the change in the position of the outer edge of the user interface element relative to the first threshold position in the user interface has caused the outer edge of the user interface element to move across the first threshold position in the user interface. For example, as shown in FIGS. 11B-11E, a drag input scrolls a list 1111 until the end of the list appears in the user interface, and the drag input continues to move the list such that the end of the list is dragged past the first threshold position 1114 in the user interface (e.g., a position within the currently displayed portion of the user interface). For example, as shown in FIGS. 12B-12D, a pinch input shrinks an image until the edge of the image passes a threshold position in the user interface that corresponds to a first minimum size. For example, as shown in FIGS. 12K-12N a depinch input expands an image until the edge of the image moves past a threshold position outside the currently displayed portion of the user interface that corresponds to a first maximum size (e.g., the outer edge of the object may cross the first threshold position before the termination of the contact (e.g., dragged by the contact), or after the termination of the input (e.g., through movement due to simulated inertia)).

After detecting (2812) that the outer edge of the user interface element has moved across the first threshold position in the user interface (e.g., the object has moved pass the first edge position by a threshold amount or reached a second threshold position in the plane of the user interface; the image has shrunken beyond first minimum size to a second minimum size smaller than the first minimum size; or the image has expanded beyond the first maximum size to a second maximum size larger than the first maximum size (e.g., only part of the image may be visible in the user interface when the image has expanded beyond the first maximum size)), the device generates (2812-*a*) a tactile output (e.g., to indicate that the current position of the user interface element is an unstable position, and that the user interface element will be returned to a previous stable position, such as returning the outer edge of the user interface element to the first threshold position) and moves (2812-*b*) the position of the outer edge of the user interface element to the first threshold position (e.g., after termination of the input, and/or after the simulated inertial movement of the user interface element has come to a stop), as shown in FIGS. 11C-11G, 11J-11L, 12B-12F, 12H-12J, 12L-12O, 13E-13H, and 13J-13L.

In some embodiments, changing the position of the outer edge of the user interface element (e.g., an item list, or a content region, or an image, etc.) relative to the first threshold position in the user interface (e.g., boundary of a user interface window or display region that contains the user interface element) includes scrolling (2814) the user interface element in a first direction relative to the first threshold position in the user interface (e.g., as shown in FIGS. 11B-11E).

In some embodiments, in response (2816) to detecting the input by the contact, the device scrolls (2816-*a*) the user interface element such that the outer edge of the user interface element moves across the first threshold position (e.g., a position within the currently displayed portion of the user interface) in the user interface and displays (2816-*b*) a first region (e.g., region 1122 in FIG. 11E) that extends from the outer edge of the user interface element in a second direction opposite the first direction after the outer edge of user interface element is moved past the first threshold position (e.g., in accordance with the movement of the contact, and, optionally, in accordance with simulated inertial movement of the user interface element after lift-off of the contact).

In some embodiments, moving (2818) the position of the outer edge of the user interface element to the first threshold position includes scrolling (2818-*a*) the user interface element in the second direction until the outer edge of the user interface returns to the first threshold position and ceasing (2818-*b*) to display the first region that extends from the outer edge of the user interface element (e.g., as shown in FIGS. 11E-11G).

In some embodiments, changing the position of the outer edge of the user interface element (e.g., a content region, or an image, etc.) relative to the first threshold position in the user interface (e.g., boundary of a user interface window or display region that contains the user interface element) includes expanding (2820) the user interface element in the user interface (e.g., as shown in FIGS. 12K-12N).

In some embodiments, in response (2822) to detecting the input by the contact, the device expands (2822-*a*) the user interface element until reaching a first maximum size of the user interface element, where the outer edge of the user interface element moves beyond a displayed portion of the user interface, and the first threshold position is determined based on the first maximum size (e.g., the first maximum size is a stable maximum size of the user interface element) and is located outside of the viewable region of the user interface, and further expands (2822-*b*) the user interface element beyond the first maximum size (e.g., in accordance with the movement of the contact, and, optionally, in accordance with simulated inertial movement of the user interface element after lift-off of the contact), e.g., as shown in FIGS. 12K-12N and 13A-13G. In some embodiments, the user interface element can be stretched beyond the stable maximum size to a larger size, but will not remain at that larger size after the input or motion that causes the stretch to that larger size ceases to affect the user interface element.

In some embodiments, moving the position of the outer edge of the user interface element to the first threshold position includes shrinking (2824) the user interface element such that the user interface element returns to the first maximum size of the user interface element (e.g., the first maximum size is a stable maximum size of the user interface element), e.g., as shown in FIGS. 12K-12O and 13A-13H. In some embodiments, the stable maximum size is the original size of the user interface element.

In some embodiments, changing the position of the outer edge of the user interface element (e.g., a content region, or an image, etc.) relative to the first threshold position in the user interface (e.g., boundary of a user interface window or display region that contains the user interface element) includes shrinking (2826) the user interface element in the user interface (e.g., as shown in FIGS. 12B-12D and 13I-13J).

In some embodiments, in response (2828) to detecting the input by the contact, the device shrinks (2828-*a*) the user interface element such that the user interface element reaches a first minimum size of the user interface element, where the first threshold position is determined based on the first minimum size and is located within of a displayed portion of the user interface element, and further shrinks (2828-*b*) the user interface element beyond the first minimum size (e.g., in accordance with the movement of the contact, and, optionally, in accordance with the simulated inertial movement of the user interface element after lift-off of the contact). In some embodiments, the user interface element can be shrunken beyond the stable minimum size to a smaller size, but will not remain at that smaller size after the input or motion that causes the shrink to that smaller size ceases to affect the user interface element.

In some embodiments, moving the position of the outer edge of the user interface element to the first threshold position includes expanding (2830) the user interface element such that the user interface element returns to the first minimum size of the user interface element (e.g., the first minimum size is a stable minimum size of the user interface element). In some embodiments, the stable minimum size is the original size of the user interface element (e.g., as shown in FIGS. 12D-12F and 13J-13L).

In some embodiments, a respective characteristic (e.g., a tactile output pattern (e.g., including an amplitude, a duration, a frequency, and/or a waveform, of the tactile output pattern), an accompanying audio, etc.) of the tactile output is configured (2832) based on a speed at which the outer edge of the user interface element moves across the first threshold position in the user interface.

In some embodiments, a respective characteristic (e.g., a tactile output pattern (e.g., including an amplitude, a duration, a frequency, and/or a waveform, of the tactile output pattern), an accompanying audio, etc.) of the tactile output is configured (2834) based on a characteristic speed of the input (e.g., an average speed of the contact) at a time when the outer edge of the user interface element moves across the first threshold position in the user interface.

In some embodiments, a respective characteristic (e.g., a tactile output pattern (e.g., including an amplitude, a duration, a frequency, and/or a waveform, of the tactile output pattern), an accompanying audio, etc.) of the tactile output is configured (2836) based on an extent by which the outer edge of the user interface element has moved beyond the first threshold position in the user interface (e.g., when termination of the input is detected, or when the user interface element gradually stops moving sometime after the termination of the input).

In some embodiments, generating the tactile output includes generating (2838) the tactile output upon detecting that the outer edge of the user interface element has moved across the first threshold position in the user interface (e.g., tactile output 1121, FIG. 11C).

In some embodiments, generating the tactile output includes generating (2840) the tactile output upon detecting the termination of the input (e.g., upon detecting lift-off of the contact) (e.g., tactile output 1124, FIG. 11E).

In some embodiments, generating the tactile output includes generating (2842) the tactile output upon starting to move the position of the outer edge of the user interface element to the first threshold position (e.g., when the user interface element starts to bounce back, the device generates a tactile output indicating that the user interface element has started to bounce back).

In some embodiments, the device generates (2844) a second tactile output upon detecting that the outer edge of the user interface element has moved across the first threshold position in the user interface.

It should be understood that the particular order in which the operations in FIGS. 28A-28E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 2000, 2200, 2400, 2600, 3000, 3200, and 3400) are also applicable in an analogous manner to method 2800 described above with respect to FIGS. 28A-28E. For example, the contacts, gestures, user interface objects, tactile outputs, intensity thresholds, focus selectors, animations described above with reference to method 2800 optionally have one or more of the characteristics of the contacts, gestures, user interface objects, tactile outputs, intensity thresholds, focus selectors, animations described herein with reference to other methods described herein (e.g., methods 2000, 2200, 2400, 2600, 3000, 3200, and 3400). For brevity, these details are not repeated here.

Figure 29:
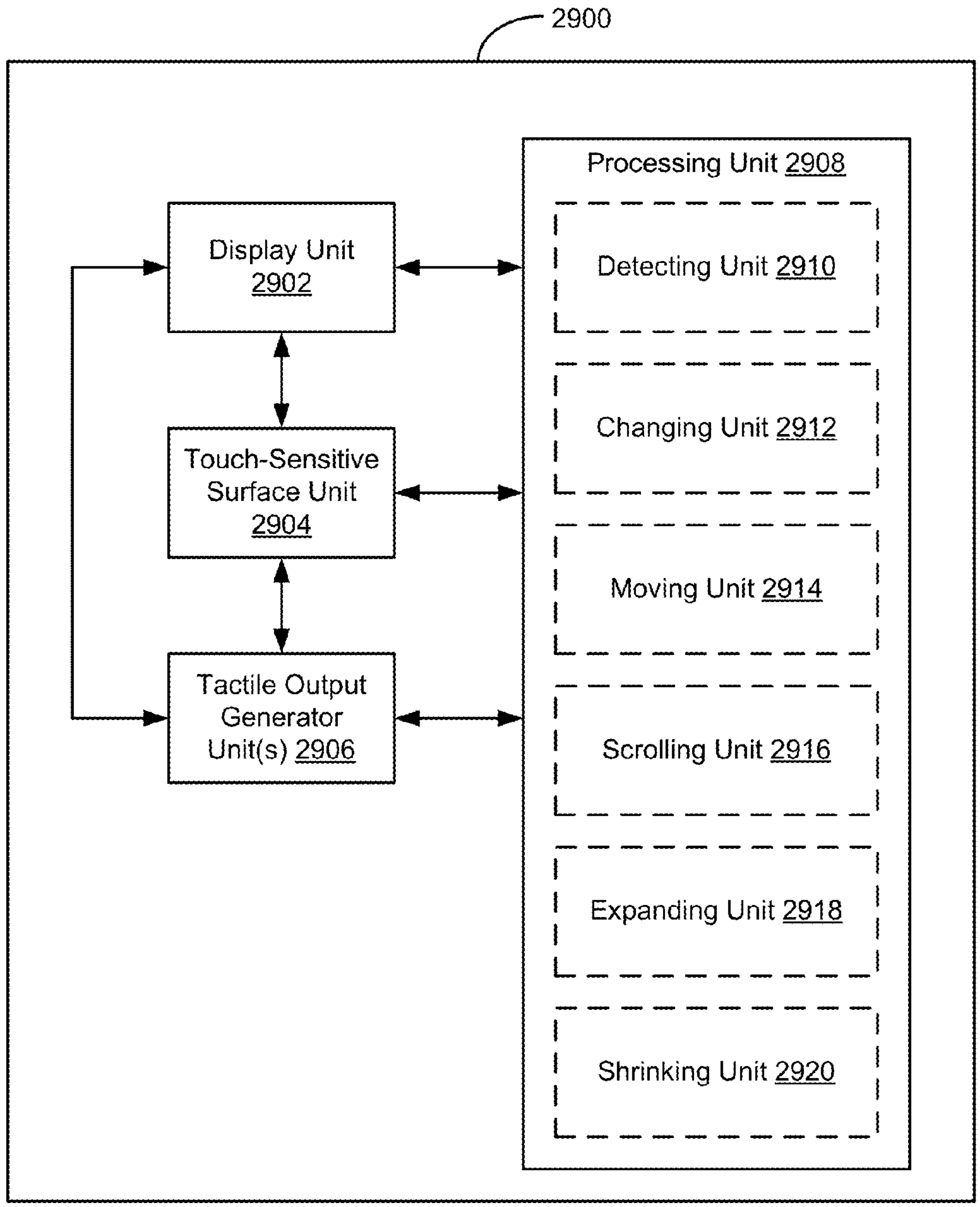
FIG. 29 is a functional block diagram of an electronic device in accordance with some embodiments.
Figure 30A:
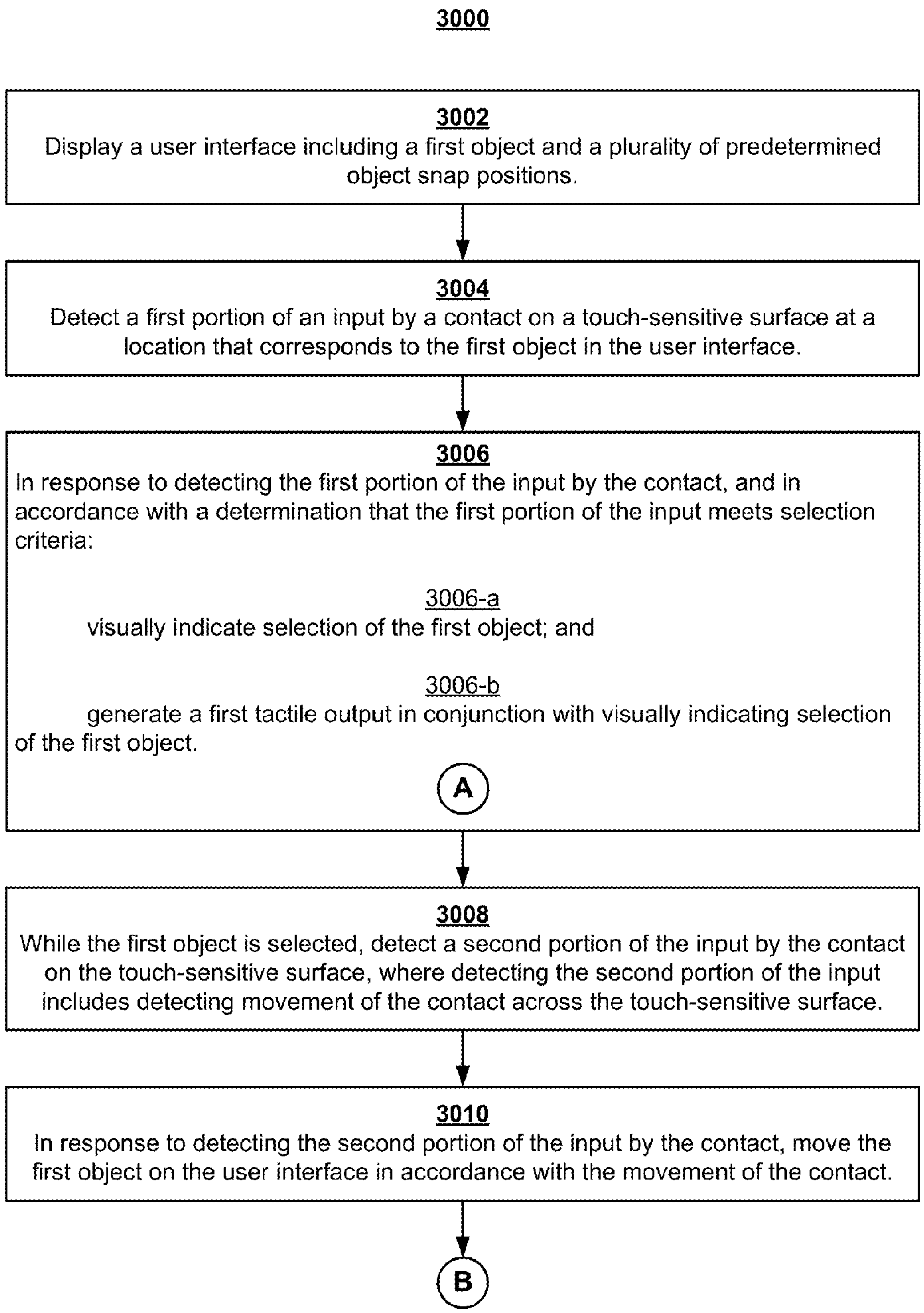

In accordance with some embodiments, FIG. 29 shows a functional block diagram of an electronic device 2900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 29 are, optionally, combined or separated into sub-blocks to implement the principles of the various described embodiments. Therefore, the description herein optionally supports any possible combination or separation or further definition of the functional blocks described herein.

As shown in FIG. 29, an electronic device 2900 includes a display unit 2902 configured to display user interfaces; a touch-sensitive surface unit 2904; one or more tactile output generator units 2906 configured to generate tactile outputs; and a processing unit 2908 coupled to the display unit 2902, the touch-sensitive surface unit 2904, and the one or more tactile output generator units 2906. In some embodiments, the processing unit includes detecting unit 2910, changing unit 2912, moving unit 2914, scrolling unit 2916, expanding unit 2918, and shrinking unit 2920.

The processing unit 2908 is configured to: enable display of (e.g., with the display unit 2902) a user interface on the display unit 2902, wherein the user interface includes a first user interface element; detect (e.g., with the detecting unit 2910) a contact at a location on the touch-sensitive surface unit 2904 that corresponds to the first user interface element; detect (e.g., with the detecting unit 2910) an input by the contact, including detecting (e.g., with the detecting unit 2910) a movement of the contact across the touch-sensitive surface unit 2904; in response to detecting the input by the contact: change (e.g., with the changing unit 2912) a position of an outer edge of the user interface element relative to a first threshold position in the user interface in accordance with the movement of the contact on the touch-sensitive surface unit 2904; detect (e.g., with the detecting unit 2910) that the change in the position of the outer edge of the user interface element relative to the first threshold position in the user interface has caused the outer edge of the user interface element to move (e.g., with the moving unit 2914) across the first threshold position in the user interface; after detecting that the outer edge of the user interface element has moved across the first threshold position in the user interface, generate (e.g., with the tactile output generator unit(s) 2906) a tactile output; and move (e.g., with the moving unit 2914) the position of the outer edge of the user interface element to the first threshold position.

In some embodiments, changing the position of the outer edge of the user interface element relative to the first threshold position in the user interface includes scrolling (e.g., with the scrolling unit 2916) the user interface element in a first direction relative to the first threshold position in the user interface.

In some embodiments, the processing unit 2908 is further configured to: in response to detecting the input by the contact: scroll (e.g., with the scrolling unit 2916) the user interface element such that the outer edge of the user interface element moves across the first threshold position in the user interface; and enable display of (e.g., with the display unit 2902) a first region that extends from the outer edge of the user interface element in a second direction opposite the first direction after the outer edge of user interface element is moved past the first threshold position.

In some embodiments, moving the position of the outer edge of the user interface element to the first threshold position includes: scrolling (e.g., with the scrolling unit 2916) the user interface element in the second direction until the outer edge of the user interface returns to the first threshold position; and ceasing to display the first region that extends from the outer edge of the user interface element.

In some embodiments, changing the position of the outer edge of the user interface element relative to the first threshold position in the user interface includes expanding (e.g., with the expanding unit 2918) the user interface element in the user interface.

In some embodiments, the processing unit 2908 is further configured to: in response to detecting the input by the contact: expand (e.g., with the expanding unit 2918) the user interface element until reaching a first maximum size of the user interface element, wherein the outer edge of the user interface element moves beyond a displayed portion of the user interface, and the first threshold position is determined based on the first maximum size and is located outside of the viewable region of the user interface; and further expand (e.g., with the expanding unit 2918) the user interface element beyond the first maximum size.

In some embodiments, moving the position of the outer edge of the user interface element to the first threshold position includes: shrinking (e.g., with the shrinking unit 2920) the user interface element such that the user interface element returns to the first maximum size of the user interface element.

In some embodiments, changing the position of the outer edge of the user interface element relative to the first threshold position in the user interface includes shrinking (e.g., with the shrinking unit 2920) the user interface element in the user interface.

In some embodiments, the processing unit 2908 is further configured to: in response to detecting the input by the contact: shrink (e.g., with the shrinking unit 2920) the user interface element such that the user interface element reaches a first minimum size of the user interface element, wherein the first threshold position is determined based on the first minimum size and is located within of a displayed portion of the user interface element; and further shrink (e.g., with the shrinking unit 2920) the user interface element beyond the first minimum size.

In some embodiments, moving the position of the outer edge of the user interface element to the first threshold position includes: expanding (e.g., with the expanding unit 2918) the user interface element such that the user interface element returns to the first minimum size of the user interface element.

In some embodiments, a respective characteristic of the tactile output is configured based on a speed at which the outer edge of the user interface element moves across the first threshold position in the user interface.

In some embodiments, a respective characteristic of the tactile output is configured based on a characteristic speed of the input at a time when the outer edge of the user interface element moves across the first threshold position in the user interface.

In some embodiments, a respective characteristic of the tactile output is configured based on an extent by which the outer edge of the user interface element has moved beyond the first threshold position in the user interface.

In some embodiments, generating the tactile output includes generating (e.g., with the tactile output generator unit(s) 2906) the tactile output upon detecting that the outer edge of the user interface element has moved across the first threshold position in the user interface.

In some embodiments, generating the tactile output includes generating (e.g., with the tactile output generator unit(s) 2906) the tactile output upon detecting the termination of the input.

In some embodiments, the processing unit 2908 is further configured to: generate (e.g., with the tactile output generator unit(s) 2906) a second tactile output upon detecting that the outer edge of the user interface element has moved across the first threshold position in the user interface.

In some embodiments, generating the tactile output includes generating (e.g., with the tactile output generator unit(s) 2906) the tactile output upon starting to move (e.g., with the moving unit 2914) the position of the outer edge of the user interface element to the first threshold position.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 28A-28E are, optionally, implemented by components depicted in FIGS. 1A-1B or FIG. 29. For example, detection operations 2804, 2806, and 2810 and tactile feedback operation 2812 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 30A-30G are flow diagrams illustrating a method 3000 of providing haptic feedback in conjunction with visually indicating selection of an object and drop-off of an object into a predetermined snap position in a user interface. The method 3000 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 3000 are, optionally, combined and/or the order of some operations is, optionally, changed.

As described below, the method 3000 relates to providing haptic feedback in conjunction with visually indicating selection of an object and drop-off of an object into a predetermined snap position in a user interface. Additionally, tactile feedback provides valuable information to the user for touch screen user interfaces where the user's finger is obscuring corresponding visual feedback, which is frequently the case when a user is dragging a user interface object on a touch screen. The haptic feedback reinforces the visual feedback in the user interface regarding the selection and drop-off of the object, thereby enhancing the operability of the device and making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The device displays (3002) a user interface on the display, where the user interface includes a first object and a plurality of predetermined object snap positions. In some embodiments, the plurality of predetermined object snap positions are exact locations on the user interface (e.g., locations that correspond to certain predefined points, lines, cells, and/or areas) that an object would to settle into when the object is released (e.g., dropped, or otherwise freed from factors that influence the object's movement or position) within a threshold range of the those exact locations. For example, in a calendar interface, date lines in the calendar grid define object snap positions for a calendar entry, and a calendar entry would settle between two adjacent date lines when the calendar entry is dropped in proximity to a region between the two adjacent date lines. In another example, in an item list (e.g., a weather information interface that includes a list of weather items that correspond to a plurality of cities), boundary lines between adjacent list items define snap positions for a list item, and a list item would settle into a slot defined by a pair of adjacent boundary lines when the list item is moved to and released in proximity to the slot. In yet another example, in the home screen interface, a hidden grid define locations that application icons are displayed in the home screen, and these locations are snap locations that a moved application icon can settle into when released near those locations. This is illustrated in FIG. 14A (calendar interface 1410), FIG. 15A (weather forecast interface 1510), and FIG. 16A (home screen 1610).

The device then detects (3004) a first portion of an input by a contact on the touch-sensitive surface at a location that corresponds to the first object in the user interface (e.g., the first portion of the input includes touch-down of the contact at a location on the touch-sensitive surface that corresponds to the first object in the user inter; or the first portion of the input includes movement of a contact to a location on the touch-sensitive surface that corresponds to the first object in the user interface).

In response (3006) to detecting the first portion of the input by the contact, and in accordance with a determination that the first portion of the input meets selection criteria (e.g., the selection criteria require that the contact be maintained for at least a threshold amount of time, and/or that a characteristic intensity of the contact exceeds a predetermined intensity threshold (e.g., a light press intensity threshold $IT_L$) in order for the selection criteria to be met) (and while continuing to detect the contact), the device visually indicates (3006-*a*) selection of the first object (e.g., the object is highlighted, changed to a different color/font/size, marked with handles, and/or animated, the object appears to be lifted off from the surface of the user interface in the virtual z-direction and/or floating on the surface of the user interface) and generates (3006-*b*) a first tactile output (e.g., a MicroTap High (270 Hz) with a gain of 0.6) in conjunction with visually indicating selection of the first object. E.g., in some embodiments, there is a delay between initial detection of the contact and the selection of the object, and the tactile output is generated upon lift-off of the object from the surface of the user interface, e.g., in the virtual z-direction, after selection criteria are met by the contact (e.g., when the contact has been maintained for at least a threshold amount of time, and/or when a characteristic intensity of the contact exceeds a predetermined intensity threshold (e.g., a light press intensity threshold $IT_L$)). Selecting or picking up an object is illustrated in FIG. 14E (selecting calendar entry 1406 (shown as 1408 in selected state) by contact 1413), FIG. 14K (selection of calendar entry 1406 (shown as 1420 in selected state) by contact 1415), FIG. 14N (selection of calendar entry 1406 (shown in 1430 in selected state) by contact 1431), FIG. 15B (selection of weather item 1502-5 by contact 1512), FIG. 16B (selection of icon 1604 by contact 1612), and FIG. 16F (selection of icon 1608 by contact 1616), for example.

While the first object is selected, the device detects (3008) a second portion of the input by the contact on the touch-sensitive surface, where detecting the second portion of the input includes detecting movement of the contact across the touch-sensitive surface. In response to detecting the second portion of the input by the contact, the device moves (3010) the first object on the user interface in accordance with the movement of the contact. This is shown in FIGS. 14F-14I and 14L-14M (dragging of calendar entry); FIGS. 15C-15D (e.g., dragging of weather item); and FIGS. 16G-16I (dragging icon).

After detecting the second portion of the input, while the first object is proximate to a first predetermined object snap position (e.g., a location between two adjacent date lines in a calendar interface, a slot that is vacated by another list item, a slot for an application icon on a home screen), the device detects a third portion of the input by the contact on the touch sensitive surface (e.g., the third portion of the input includes lift-off of the contact, or a drop in the characteristic intensity of the contact below a threshold intensity (e.g., a release intensity threshold $IT_{LR}$ that is lower than a light press intensity threshold $IT_L$)).

In response (3014) to detecting the third portion of the input by the contact, and in accordance with a determination that the third portion of the input meets drop-off criteria, the device visually indicates (3014-*a*) deselection of the first object (e.g., the object is un-highlighted, restored to its preselection state, and/or animated), moves (3014-*b*) the first object to the first predetermined object snap position (e.g., so that the object is automatically snapped, aligned, jumped to the first predetermined object snap position, e.g., a cell that corresponds to Thursday, August 4, 12-1 PM), and generates (3014-*c*) a second tactile output (e.g., a MicroTap High (270 Hz) with a gain of 0.6, to indicate that the first object has settled into the first predetermined snap position). Dropping an object is illustrated in FIGS. 14H-14J, 15L, 16E, and 16K.

In some embodiments, the drop-off criteria require that a characteristic intensity of the contact drops below a predetermined intensity threshold (e.g., the light press intensity threshold $IT_L$, a release intensity threshold $IT_{LR}$ that is lower than $IT_L$, or the contact detection intensity threshold (e.g., lift-off of the contact)) in order for the drop-off criteria to be met. In some embodiments, the drop-off criteria require that, if after lift-off of the contact, the first object continues to move due to moment of inertia, a movement speed of the first object drops below a threshold speed after the first object reaches within a threshold range of the first predetermined snap position, in order for the drop-off criteria to be met. For example, in FIG. 16D, drop-off criteria are met when speed of icon 1604 due to simulated inertia is below a threshold value and the icon is within a threshold range of a snap position. In FIGS. 14I and 14J, drop-off criteria are met when lift-off of contact 1413 is detected. In FIGS. 14S-14Q, drop-off criteria are met when the speed of calendar entry due to simulated inertia is below a threshold value and calendar entry is within a threshold range of a snap position. In FIGS. 15K-15L, drop-off criteria are met when speed of item 1502-5 due to simulated inertia is below a threshold value and calendar entry is within a threshold range of a snap position.

In some embodiments, the selection criteria require (3016) that a characteristic intensity of the contact exceeds a first intensity threshold and that the contact is maintained for at least a predetermined threshold amount of time in order for the selection criteria to be met (e.g., a long press on the displayed calendar with intensity exceeding $IT_L$ for a predetermined threshold amount of time, e.g., 300 ms).

In some embodiments, the selection criteria require (3018) that a characteristic intensity of the contact exceeds a first intensity threshold and a second intensity threshold above the first intensity threshold (e.g., a deep press on the displayed calendar, the deep press having an intensity exceeding $IT_D$).

In some embodiments, a second tactile output pattern of the second tactile output is different from a first tactile output pattern of the first tactile output (3020). For example, the pickup tactile output generated in conjunction with visually indicating selection of the calendar event "Go to Gym" has a first tactile output pattern (e.g., a MicroTap Medium (150 Hz), Gain min: 0.0 and max: 0.6), while the drop tactile output generated in conjunction with displaying the calendar event "Go to Gym" at the first predetermined object snap position has a second tactile output pattern (e.g., a MicroTap High (270 Hz), Gain: 0.6)).

In some embodiments, by using tactile outputs with different tactile output patterns, the device effectively communicate to the user regarding the different operations that have been performed in response to the current portion of the input. The visual distinctions between picking up an object and dropping off of an object in the user interface is reinforced by the different haptic sensations caused by the tactile outputs generated according to the different tactile output patterns. This improved non-visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first tactile output is generated (3022) concurrently with visually indicating the selection of the first object. For example, in some embodiments, in cases where there is a delay between the initial detection of the contact, the selection of the object, and the visual changes that indicate the selection of the object, the generation of the first tactile output is synchronized with the visual changes that indicate the selection of the object (e.g., the first tactile output is generated when the first object lifts off of display, not when the finger touches down on the touch-sensitive surface). This is illustrated in FIGS. 14B, 14E, 14B, 16B, and 16F, for example.

In some embodiments, there is a delay between the time when the selection criteria are met by a current portion of the input and the time when the first object completes the visual transition from an unselected state to a selected state. By introducing the tactile output at the time when the first object completes the visual transition to the selected state, the device assures the user that the transition is complete and the object is picked up and ready for movement. The proper timing of the haptic feedback helps the user to provide proper inputs and reduces user mistakes when interacting with the device (e.g., by helping the user to determine when to start dragging the object), thereby enhancing the operability of the device and making the user-device interface more efficient, which, additionally, reduces power usage and improves battery life of the device by enabling the user to use the device more quickly and efficiently.

In some embodiments, the second tactile output is generated (3024) concurrently with arrival of the first object at the first predetermined object snap position. For example, in cases where there is a delay (e.g., 500 ms) between detection of the third portion of the input by the contact (e.g., the lift-off of the contact) and the snapping of the first object into the first predetermined object snap position, the tactile output generation is synchronized with the object settling into the snap position. For example, in FIG. 14P, when a user flings an object across the display, the lift-off of the contact happens when the contact is located within the grid location for "Wednesday, August 3, 10-11 AM", and the calendar event "Go to Gym" continues to move on the calendar user interface across the date boundary between "Thursday, August 4" and "Friday, August 5" after the lift-off of the contact. When the calendar event settles into the first predetermined object snap position, e.g., the position for "Friday, August 5" (e.g., drop-off of the object from the surface of the user interface in the virtual z-direction and horizontal shifting in the x-y plane into the position between the date lines), the second tactile output is generated concurrently with displaying the calendar event "Go to Gym" at the time slot on Friday, August 5, e.g., as shown in FIGS. 14S-14T. Thus, the drop tactile output occurs when the object settles into place, not when the finger lifts off the touch-sensitive surface. This is also illustrated in FIGS. 15F-15L, and FIGS. 16C-16E, for example.

In some embodiments, the delay between the time when the input is terminated and the when the first object completes its motion and finally settle into a stable position can be significant. By introducing the tactile output at the time when the first object finally settles into a stable position, the device assures the user that the drop-off of the first object is completed, and the object is now in a stable state. The proper timing of the haptic feedback helps the user to provide proper inputs and reduces user mistakes when interacting with the device (e.g., by helping the user to determine whether the object is at a desired location and whether additional adjustments are needed), thereby enhancing the operability of the device and making the user-device interface more efficient, which, additionally, reduces power usage and improves battery life of the device by enabling the user to use the device more quickly and efficiently.

In some embodiments, detecting the movement of the contact across the touch-sensitive surface includes detecting (3026) that the contact has moved to a threshold location in proximity to an edge of the display (or to an edge of the displayed portion of the user interface) (e.g., the contact moves within a predetermined distance from a date boundary adjacent to the edge of the display, either before reaching the date boundary or after reaching the date boundary) and moving the first object on the user interface in accordance with the movement of the contact includes moving (3026-*a*) the first object to the threshold location in proximity to the edge of the display in accordance with the movement of the contact. The device shifts (3026-*b*) the user interface relative to the first object on the display, such that a previously un-displayed portion of the user interface is displayed underneath the first object, and the device generates (3026-*c*) a third tactile output in conjunction with shifting the user interface relative to the first object on the display.

For example, with reference to shifting step 3026-*b*, when the object is moved to the right edge of the display, the weekly calendar view slides to the left to display the next day or week under the object "Go to Gym". Similarly, when the object is moved to the left edge of the display, the weekly calendar view slides to the right to display the previous day or week under the object.

For example, with reference to generating step 3026-*c*, the weekly calendar view of August 31-September 6 shifts by a day. As a result, the weekly calendar view for the week of September 1-7 slides under the calendar object "Go to Gym" and a third tactile output (e.g., a MicroTap High (270 Hz), Gain: 0.4) is generated in conjunction with sliding the weekly calendar view for the week of September 1-7 under the calendar object "Go to Gym". This is illustrated in FIG. 14M, where a tactile output 1452 is generated in conjunction with shifting the calendar user interface 1410.

In some embodiments, the shifting of the user interface may be hard to notice and/or may cause disorientation and confusion of the user. By introducing the tactile output in conjunction with the changes in the user interface, the device alerts the user that an event of significance has occurred, and prompts the user to pay attention to the changes in the user interface. The haptic feedback provided in conjunction with the user interface changes helps the user to provide proper inputs and reduces user mistakes when interacting with the device (e.g., by helping the user to note the relative position between the object and the newly revealed portion of the user interface), thereby enhancing the operability of the device and making the user-device interface more efficient, which, additionally, reduces power usage and improves battery life of the device by enabling the user to use the device more quickly and efficiently.

In some embodiments, detecting the movement of the contact across the touch-sensitive surface includes detecting (3028) that the contact has moved to a threshold location in proximity to a second predetermined object snap position (e.g., the contact moves within a predetermined distance from a date boundary, either before reaching the date boundary or after crossing the date boundary) and moving (3028-*a*) the first object on the user interface in accordance with the movement of the contact includes, in response to detecting that the contact has moved to the threshold location in proximity to the second predetermined object snap position, moving (3028-*b*) the first object, relative to the threshold location, to the second predetermined object snap position. The device generates (3028-*c*) a third tactile output in conjunction with moving the first object to the second predetermined object snap position. This is illustrated in FIG. 14G, for example.

For example, with reference to moving step 3028-*b*, while the first object is dragged by the contact, the object snaps to one or more snap positions when the object is dragged near those snap positions. As the contact continues to move away from a snap position at which the object is currently settled, the object stays at the snap position until the contact has moved out of the threshold range associated with the current snap position, and reached the threshold range associated with the next snap position. Once the contact has reached the threshold range of the next snap position, the object jumps to catch up with the contact and snaps to the next snap position. For example, in FIG. 14G, when the finger moves horizontally within the grid for "Tuesday, August 2, 10-11 AM," the calendar event "Go to Gym" remains stationary. While the finger moves close to the date boundary between "Tuesday, August 2" and "Wednesday, August 3," the device moves the calendar event "Go to Gym" from "Tuesday, August 2, 10-11 AM" to "Wednesday, August 3, 10-11 AM" ("the second predetermined object snap position" in this case), such that it appears the calendar event "Go to Gym" slides under the finger and automatically springs to the next snap position).

For example, with reference to generating step 3028-*c*, while the calendar event "Go to Gym" is moved from Tuesday, August 2, 10-11 AM and snapped to the location for Wednesday, August 3, 10-11 AM, a retarget tactile output (e.g., a MicroTap High (270 Hz), Gain: 0.4) is generated. In some embodiments, the third tactile output has lower amplitude than the first tactile output (e.g., a MicroTap Medium (150 Hz), Gain min: 0.0 and max: 0.6) for the pickup of the first object. In some embodiments, the third tactile output has a different waveform from the first tactile output, the pickup tactile output.)

In some embodiments, by introducing the tactile output at the time when the first object settles into a new snap position, the device alerts the user to pay attention to the new position of the object and make a decision regarding whether to the object has arrived at a desired position. The haptic feedback provided in conjunction with the user interface changes helps the user to provide proper inputs and reduces user mistakes when interacting with the device (e.g., by helping the user to take note of the new position of the object), thereby enhancing the operability of the device and making the user-device interface more efficient, which, additionally, reduces power usage and improves battery life of the device by enabling the user to use the device more quickly and efficiently.

In some embodiments, before the first object is moved to the first predetermined snap location (3030), the user interface includes a second object located at the first predetermined snap position, and the user interface includes a second predetermined snap position adjacent to the first predetermined snap position. For example, in the weather forecast user interface, the weather items "Shenzhen" and "Beijing" occupy two adjacent slots (snap position 1 and snap position 2). The device moves (3030-*a*) the first object toward the first predetermined snap position (e.g., either in accordance with the movement of the contact or by movement of inertia after lift-off of the contact) and, in accordance with a determination that the first object is within a threshold range of the first predetermined snap position, moves (3030-*b*) the second object from the first predetermined snap position to the second predetermined object snap position (e.g., while moving weather for Beijing object towards weather for Shenzhen object, weather for Shenzhen object is moved from the first object snap position 1504-3 and snapped to the second object snap position 1504-4 to make room for the moving weather object for "Beijing".) The device also generates (3030-*c*) a fourth tactile output in conjunction with moving the second object to the second predetermined snap position. (e.g., while moving weather for Shenzhen object to the second object snap position 1504-4, a snap tactile output 1522 (e.g., a MicroTap High (270 Hz), Gain: 0.4) is generated, as shown in FIGS. 15C-15E.

In some embodiments, the fourth tactile output (e.g., a MicroTap High (270 Hz), Gain: 0.4) has a lower amplitude than the first tactile output (e.g., a MicroTap Medium (150 Hz), Gain min: 0.0 and max: 0.6), the pickup tactile output. In some embodiments, the fourth tactile output has a different waveform from the first tactile output, the pickup tactile output, e.g., a different number of cycles.) In some embodiments, when the first object continues to move forward to another snap position adjacent to the first predetermined snap position (e.g., the slot occupied by the weather item "Xi'an"), the object currently occupying that snap position will move to the first snap position to make room for the weather item "Beijing." When the object settles into the first snap position, a tactile output is generated. In some embodiments, when a series of objects are placed in a sequence of snap positions, when the first object moves past each of the objects, the objects each jump to the adjacent vacant slot, and an accompanying tactile output is generated. The rate by which the tactile outputs are generated is limited by a threshold, such that, if the rate that the objects are moving into new slots is higher than the threshold, some tactile outputs are skipped (e.g., when the rate is faster than once every 0.05 seconds). In some embodiments, the tactile output is generated by calculating a time based on the time at which the object moved over a slot into which it could be dropped and adding a predefined amount of time delay and generating the tactile output after the time delay. This avoids generating a cascade of tactile outputs when the movement of one of the object causes multiple objects to snap into different locations.

In some embodiments, moving the first object toward the first predetermined snap position includes moving (3032) the first object toward the first predetermined snap position in accordance with movement of the contact on the touch-sensitive surface that corresponds to movement toward the first predetermined snap position.

In some embodiments, the third portion of the input includes lift-off of the contact (3034) and moving the first object toward the first predetermined snap position includes continuing (3034-*a*) movement of the first object toward the first predetermined snap position after the lift-off of the contact (e.g., with gradually decreasing speed).

In some embodiments, the first tactile output has higher amplitude (3036) than the second tactile output (3036). For example, the first tactile output is a pickup tactile output (e.g., a MicroTap High (270 Hz), Gain: 1.0) and the second tactile output is a drop tactile output (e.g., a MicroTap High (270 Hz), Gain Drop: 0.6).

In some embodiments, the first tactile output has same waveform (3038) as the second tactile output (e.g., both are MicroTaps, with half a cycle).

In some embodiments, the device detects (3040) (e.g., either before the input, or after the input for pickup and drop-off) a second input by a second contact on the touch-sensitive surface at a location that corresponds to a third snap position in the user interface. In accordance with a determination (3040-*a*) that the second input meets item creation criteria (e.g., the second input is a long press by the second contact on the touch-sensitive surface at a location that corresponds to a snap location that is not already occupied by another object), the device displays (3040-*b*) a new object in the user interface and generates (3040-*c*) a fifth tactile output (e.g., a MicroTap Medium (150 Hz), Gain max: 0.8 Gain min: 0.0) in conjunction with displaying the new item in the user interface. In some embodiments, upon lift-off of the second contact, a new user interface for entering information about the new object is displayed (no tactile output is generated). After the object information is entered and the new user interface is dismissed, the original user interface is displayed with the new item as an existing item (in an unselected state).

In some embodiments, the device detects (3042) termination of the second input, including detecting lift-off of the second contact. In response (3042-*a*) to detecting the lift-off of the second contact, the device (optionally) displays (3042-*b*) a second user interface for entering information related to the new object, in accordance with a determination that the second input includes movement of the second contact before the lift-off of the second contact, generates (3042-*c*) a sixth tactile output (e.g., and maintaining display of the calendar user interface) (e.g., a drop tactile output, such as a MicroTap High (270 Hz), Gain: 0.6), and in accordance with a determination that the second input does not include movement of the second contact before the lift-off of the second contact, forgoes (3042-*d*) generation of the sixth tactile output (e.g., and displaying a new event editing user interface for editing details of a new event created in response to the second input). In some embodiments, the user interface shows the movement of the new object with the second contact before the user interface for entering information about the new object is displayed.

In some embodiments, in response to detecting the first portion of the input by the contact, and in accordance with a determination that the third portion of the input does not meet the selection criteria, the device scrolls (3044) content displayed in the user interface in response to detecting movement of the contact across the touch-sensitive surface.

In some embodiments, the user interface is a calendar interface, the plurality of predetermined snap positions correspond to a plurality of dates, and the first object includes a representation of a calendar entry (3046). This is shown in FIGS. 14A-14T.

In some embodiments, the user interface is an application launch user interface that includes a plurality of application icons that correspond to different applications of a plurality of applications, the plurality of predetermined snap positions correspond to a plurality of positions for displaying application icons, and the first object includes a first application icon that corresponds to a first application of the plurality of applications (3048). This is shown in FIGS. 16A-16K.

In some embodiments, the user interface is a weather forecast user interface that includes a plurality of weather items that correspond to different geographical locations of a plurality of geographical locations and include an indication of the weather at a corresponding geographical location, the plurality of predetermined snap positions correspond to a plurality of positions for displaying weather items, and the first object includes a first weather item of the plurality of weather items (3050). This is shown in FIGS. 15A-15L.

It should be understood that the particular order in which the operations in FIGS. 30A-30G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 2000, 2200, 2400, 2600, 2800, 3200, and 3400) are also applicable in an analogous manner to method 3000 described above with respect to FIGS. 30A-30G. For example, the contacts, gestures, user interface objects, tactile outputs, intensity thresholds, focus selectors, animations described above with reference to method 3000 optionally have one or more of the characteristics of the contacts, gestures, user interface objects, tactile outputs, intensity thresholds, focus selectors, animations described herein with reference to other methods described herein (e.g., methods 2000, 2200, 2400, 2600, 2800, 3200, and 3400). For brevity, these details are not repeated here.

Figure 31:
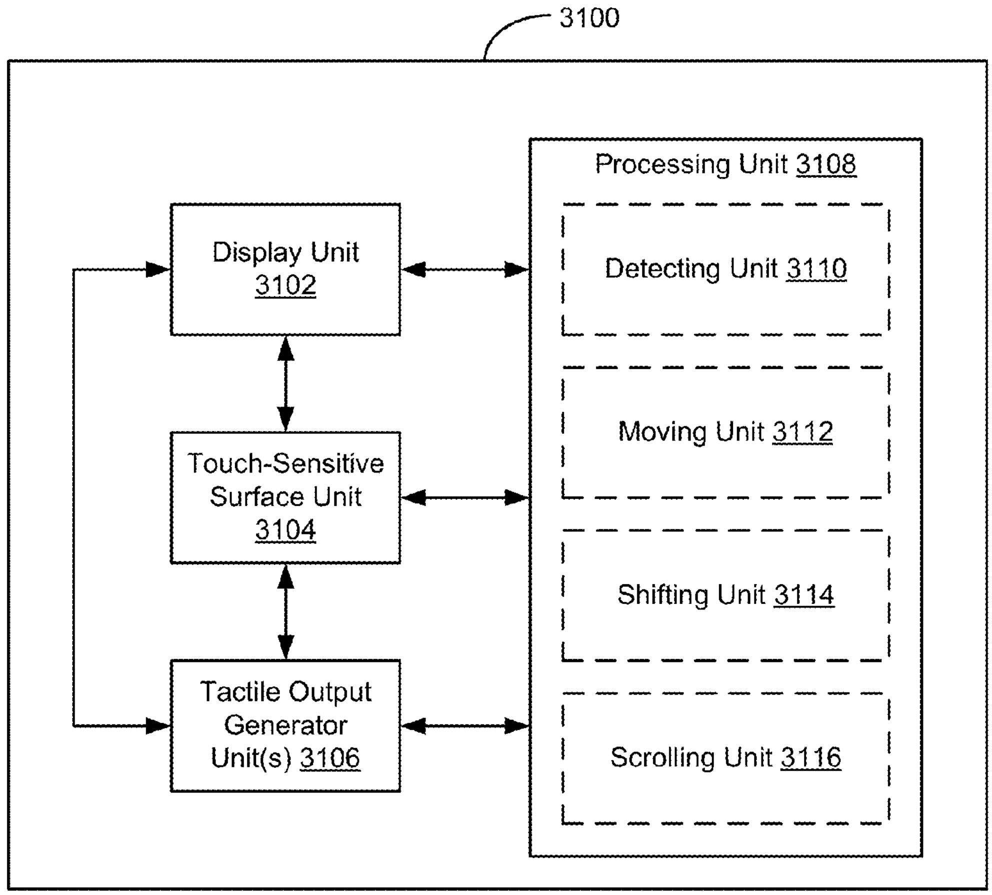
FIG. 31 is a functional block diagram of an electronic device in accordance with some embodiments.

In accordance with some embodiments, FIG. 31 shows a functional block diagram of an electronic device 3100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 31 are, optionally, combined or separated into sub-blocks to implement the principles of the various described embodiments. Therefore, the description herein optionally supports any possible combination or separation or further definition of the functional blocks described herein.

As shown in FIG. 31, an electronic device 3100 includes a display unit 3102 configured to display user interfaces; a touch-sensitive surface unit 3104; one or more tactile output generator units 3106 configured to generate tactile outputs; and a processing unit 3108 coupled to the display unit 3102, the touch-sensitive surface unit 3104, and the one or more tactile output generator units 3106. In some embodiments, the processing unit includes detecting unit 3110, moving unit 3112, shifting unit 3114, and scrolling unit 3116.

The processing unit 3108 is configured to: enable display of (e.g., with the display unit 3102) a user interface on the display unit 3102, wherein the user interface includes a first object and a plurality of predetermined object snap positions; detect (e.g., with the detecting unit 3110) a first portion of an input by a contact on the touch-sensitive surface unit 3104 at a location that corresponds to the first object in the user interface; in response to detecting the first portion of the input by the contact, and in accordance with a determination that the first portion of the input meets selection criteria: visually indicate (e.g., with the display unit 3102) selection of the first object; and generate (e.g., with the tactile output generator unit(s) 3106) a first tactile output in conjunction with visually indicating selection of the first object; while the first object is selected, detect (e.g., with the detecting unit 3110) a second portion of the input by the contact on the touch-sensitive surface unit 3104, wherein detecting the second portion of the input includes detecting (e.g., with the detecting unit 3110) movement of the contact across the touch-sensitive surface unit 3104; in response to detecting the second portion of the input by the contact, move (e.g., with the moving unit 3112) the first object on the user interface in accordance with the movement of the contact; after detecting the second portion of the input, while the first object is proximate to a first predetermined object snap position, detect (e.g., with the detecting unit 3110) a third portion of the input by the contact on the touch sensitive surface; and in response to detecting the third portion of the input by the contact, and in accordance with a determination that the third portion of the input meets drop-off criteria: visually indicate (e.g., with the display unit 3102) deselection of the first object; move (e.g., with the moving unit 3112) the first object to the first predetermined object snap position; and generate (e.g., with the tactile output generator unit(s) 3106) a second tactile output.

In some embodiments, the selection criteria require that a characteristic intensity of the contact exceeds a first intensity threshold and that the contact is maintained for at least a predetermined threshold amount of time in order for the selection criteria to be met.

In some embodiments, the selection criteria require that a characteristic intensity of the contact exceeds a first intensity threshold and a second intensity threshold above the first intensity threshold.

In some embodiments, a second tactile output pattern of the second tactile output is different from a first tactile output pattern of the first tactile output.

In some embodiments, the first tactile output is generated concurrently with visually indicating the selection of the first object.

In some embodiments, the second tactile output is generated concurrently with arrival of the first object at the first predetermined object snap position.

In some embodiments, detecting the movement of the contact across the touch-sensitive surface unit 3104 includes detecting (e.g., with the detecting unit 3110) that the contact has moved to a threshold location in proximity to an edge of the display unit 3102; and moving the first object on the user interface in accordance with the movement of the contact includes moving (e.g., with the moving unit 3112) the first object to the threshold location in proximity to the edge of the display unit 3102 in accordance with the movement of the contact; and the processing unit 3108 is further configured to: shift (e.g., with the shifting unit 3114) the user interface relative to the first object on the display unit 3102, such that a previously un-displayed portion of the user interface is displayed underneath the first object; generate (e.g., with the tactile output generator unit(s) 3106) a third tactile output in conjunction with shifting the user interface relative to the first object on the display unit 3102.

In some embodiments, detecting the movement of the contact across the touch-sensitive surface unit 3104 includes detecting (e.g., with the detecting unit 3110) that the contact has moved to a threshold location in proximity to a second predetermined object snap position; moving the first object on the user interface in accordance with the movement of the contact includes: in response to detecting that the contact has moved to the threshold location in proximity to the second predetermined object snap position, moving (e.g., with the moving unit 3112) the first object, relative to the threshold location, to the second predetermined object snap position; and generating (e.g., with the tactile output generator unit(s) 3106) a third tactile output in conjunction with moving the first object to the second predetermined object snap position.

In some embodiments, before the first object is moved to the first predetermined snap location, the user interface includes a second object located at the first predetermined snap position, and the user interface includes a second predetermined snap position adjacent to the first predetermined snap position; and the processing unit 3108 is further configured to: move (e.g., with the moving unit 3112) the first object toward the first predetermined snap position; and in accordance with a determination that the first object is within a threshold range of the first predetermined snap position, move (e.g., with the moving unit 3112) the second object from the first predetermined snap position to the second predetermined object snap position; and generate (e.g., with the tactile output generator unit(s) 3106) a fourth tactile output in conjunction with moving the second object to the second predetermined snap position.

In some embodiments, the third portion of the input includes lift-off of the contact; and moving the first object toward the first predetermined snap position includes continuing movement of the first object toward the first predetermined snap position after the lift-off of the contact.

In some embodiments, the first tactile output has higher amplitude than the second tactile output.

In some embodiments, the first tactile output has same waveform as the second tactile output.

In some embodiments, the processing unit 3108 is further configured to: detect (e.g., with the detecting unit 3110) a second input by a second contact on the touch-sensitive surface unit 3104 at a location that corresponds to a third snap position in the user interface; and in accordance with a determination that the second input meets item creation criteria: enable display of (e.g., with the display unit 3102) a new object in the user interface; and generate (e.g., with the tactile output generator unit(s) 3106) a fifth tactile output in conjunction with displaying the new item in the user interface.

In some embodiments, the processing unit 3108 is further configured to: detect (e.g., with the detecting unit 3110) termination of the second input, including detecting (e.g., with the detecting unit 3110) lift-off of the second contact; in response to detecting the lift-off of the second contact: enable display of (e.g., with the display unit 3102) a second user interface for entering information related to the new object; in accordance with a determination that the second input includes movement of the second contact before the lift-off of the second contact, generate (e.g., with the tactile output generator unit(s) 3106) a sixth tactile output; and in accordance with a determination that the second input does not include movement of the second contact before the lift-off of the second contact, forgo generation of the sixth tactile output.

In some embodiments, the processing unit 3108 is further configured to: in response to detecting the first portion of the input by the contact, and in accordance with a determination that the third portion of the input does not meet the selection criteria, scroll (e.g., with the scrolling unit 3116) content displayed in the user interface in response to detecting movement of the contact across the touch-sensitive surface unit 3104.

In some embodiments, the user interface is a calendar interface, the plurality of predetermined snap positions correspond to a plurality of dates, and the first object includes a representation of a calendar entry.

In some embodiments, the user interface is an application launch user interface that includes a plurality of application icons that correspond to different applications of a plurality of applications, the plurality of predetermined snap positions correspond to a plurality of positions for displaying application icons, and the first object includes a first application icon that corresponds to a first application of the plurality of applications.

In some embodiments, the user interface is a weather forecast user interface that includes a plurality of weather items that correspond to different geographical locations of a plurality of geographical locations and include an indication of the weather at a corresponding geographical location, the plurality of predetermined snap positions correspond to a plurality of positions for displaying weather items, and the first object includes a first weather item of the plurality of weather items.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 30A-30G are, optionally, implemented by components depicted in FIGS. 1A-1B or FIG. 31. For example, detection operation 3004 and tactile feedback operation 3006 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 32A:
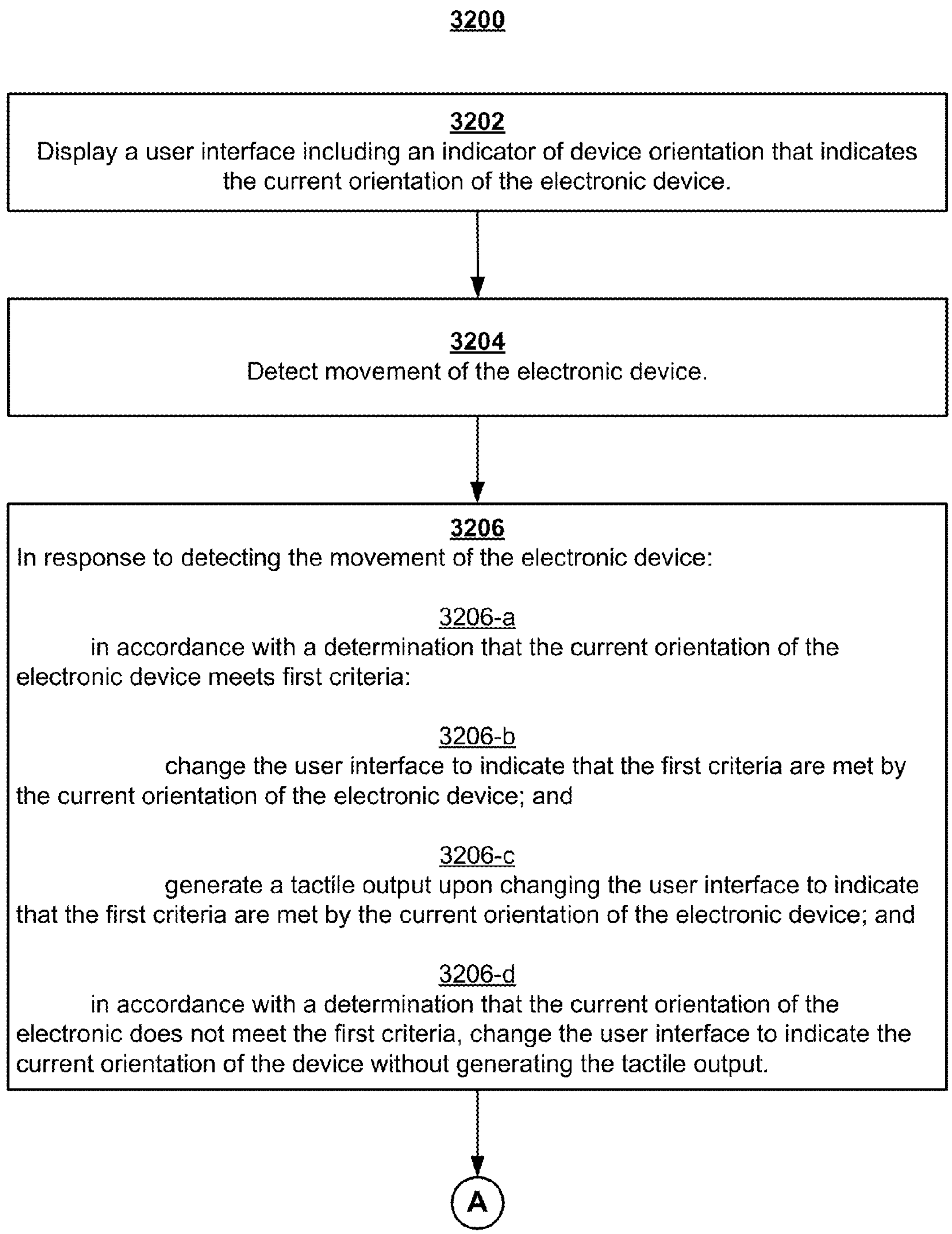

FIGS. 32A-32C are flow diagrams illustrating a method 3200 of providing haptic feedback in conjunction with visual feedback in accordance with a determination that a current orientation of a device meets certain predetermined criteria. The method 3200 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 3200 are, optionally, combined and/or the order of some operations is, optionally, changed.

As described below, the method 3200 relates providing haptic feedback in conjunction with visual feedback in accordance with a determination that a current orientation of a device meets certain predetermined criteria. By providing haptic feedback, the device alerts the user when the device has reached an orientation of interest without requiring the user to maintain visual contact with the user interface. In addition, in some embodiments, the visual changes that indicate the satisfaction of the criteria may be subtle and difficult to notice. Additionally, tactile feedback provides valuable information to the user for touch screen user interfaces where the user's finger is obscuring corresponding visual feedback. The haptic feedback reinforces the visual feedback regarding the current orientation state of the device, thereby enhancing the operability of the device and making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The device displays (3202) a user interface on the display, where the user interface includes an indicator of device orientation that indicates the current orientation of the electronic device. For example, in some embodiments, the indicator of device orientation is a compass that indicates the device's orientation relative to the Earth's magnetic field (e.g., as shown in FIG. 17A), a level that indicates the orientation of the device relative to a plane that is normal to the Earth's gravitational field when the device is held horizontally (e.g., as shown in FIG. 18A), or a plumbness indicator (which may be part of the level app) that indicates the orientation of the device relative to the Earth's gravitational field when the device is held vertically.

Figure 17E:
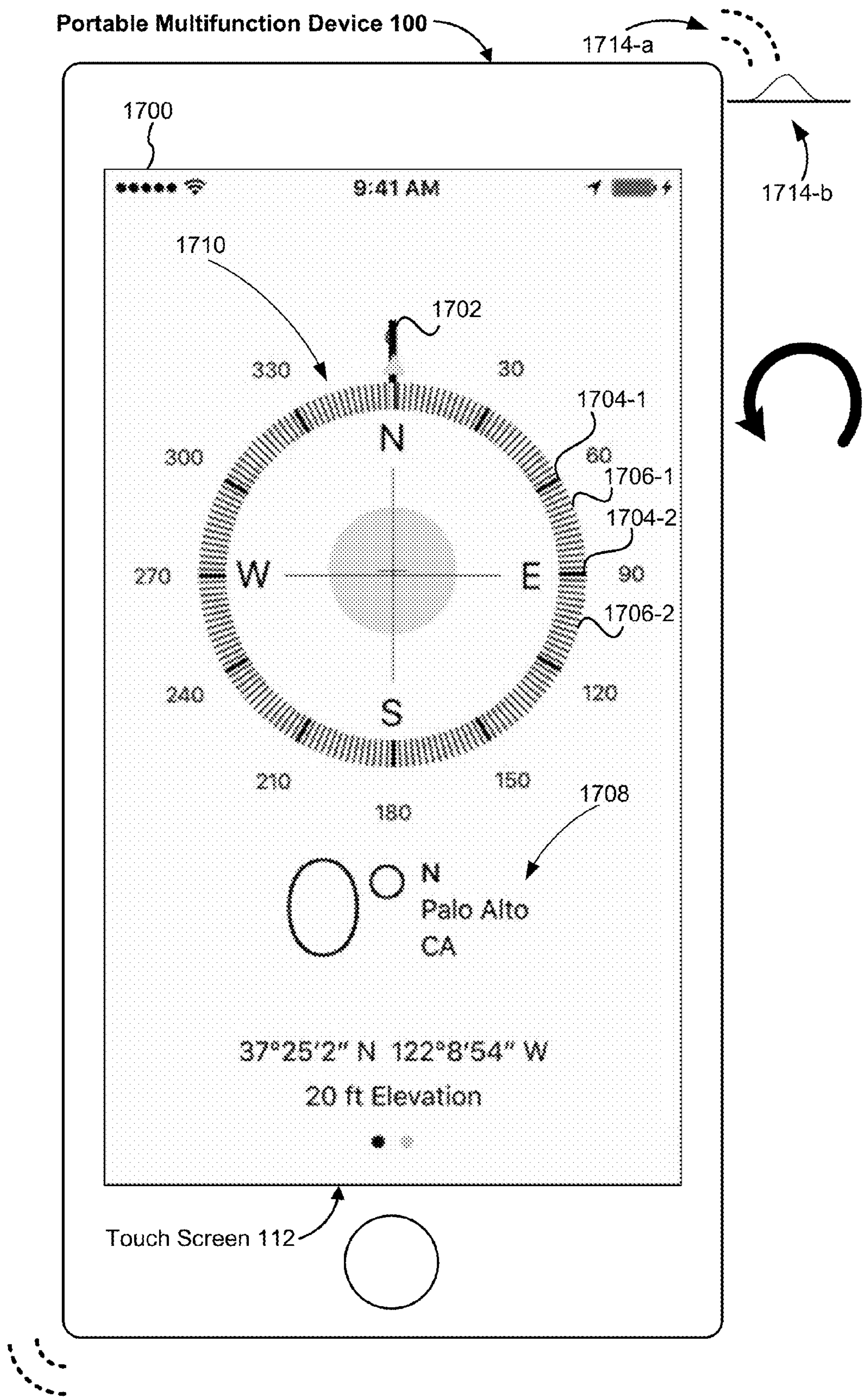
Figure 17F:
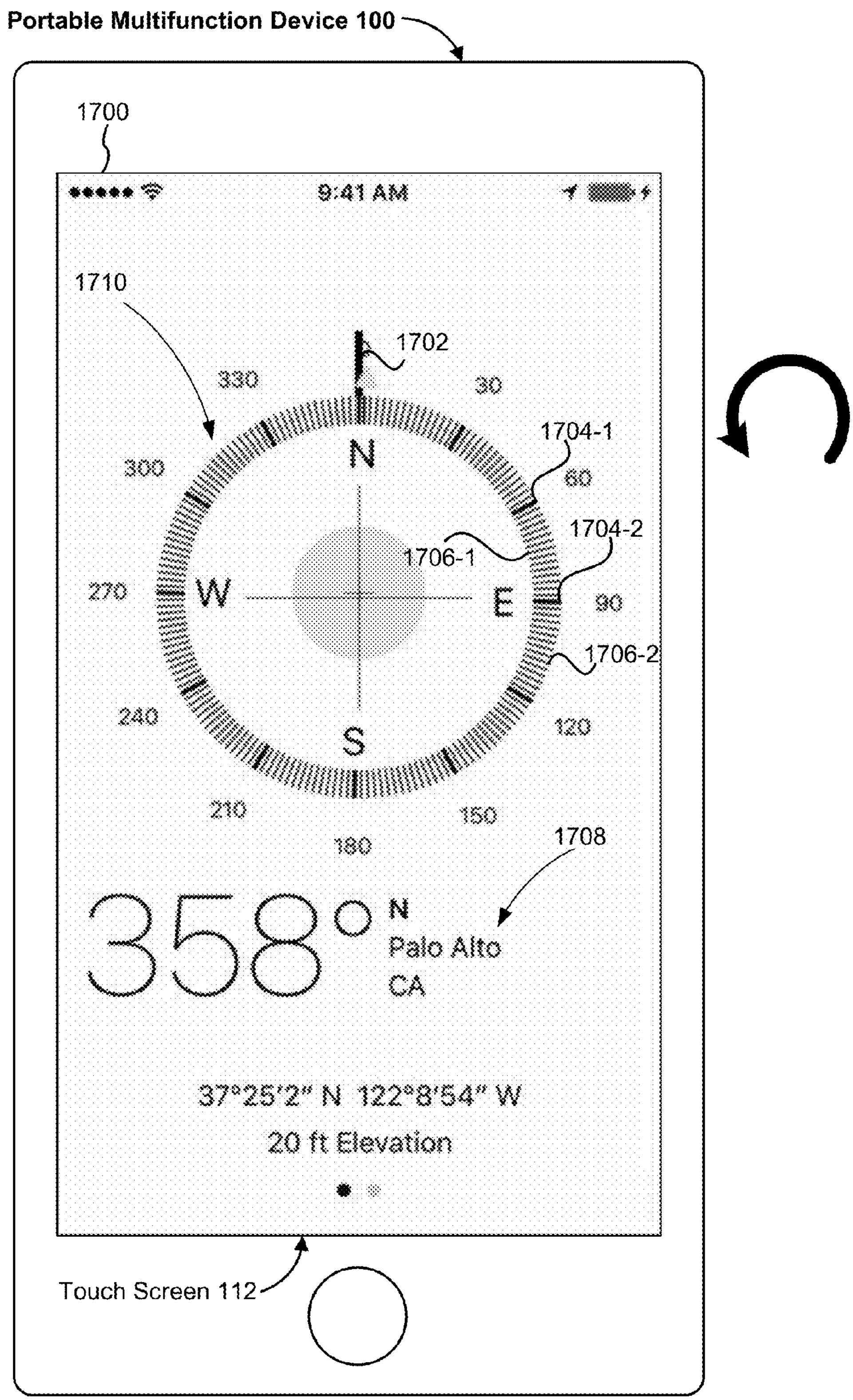
Figure 17G:
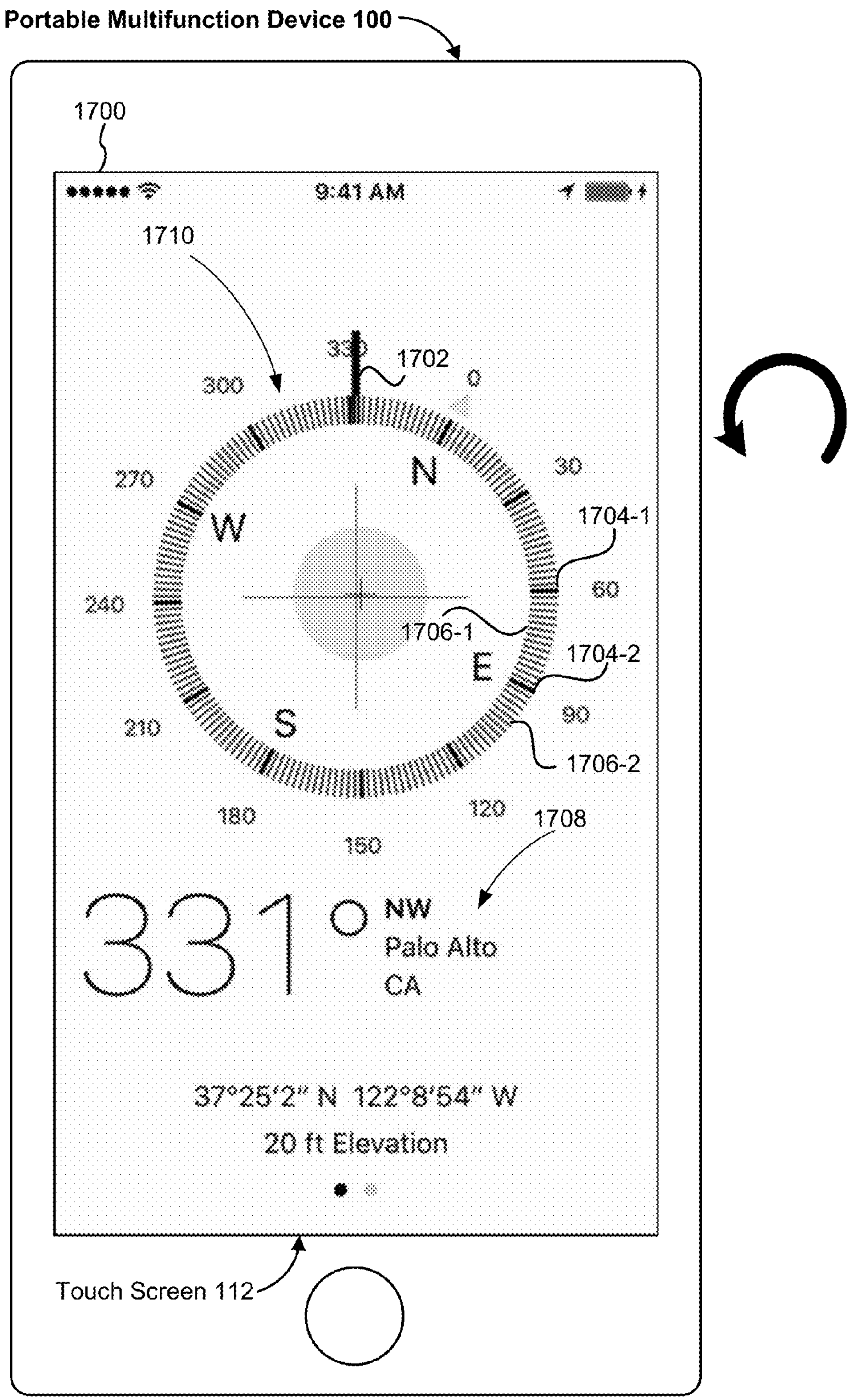
Figure 17H:
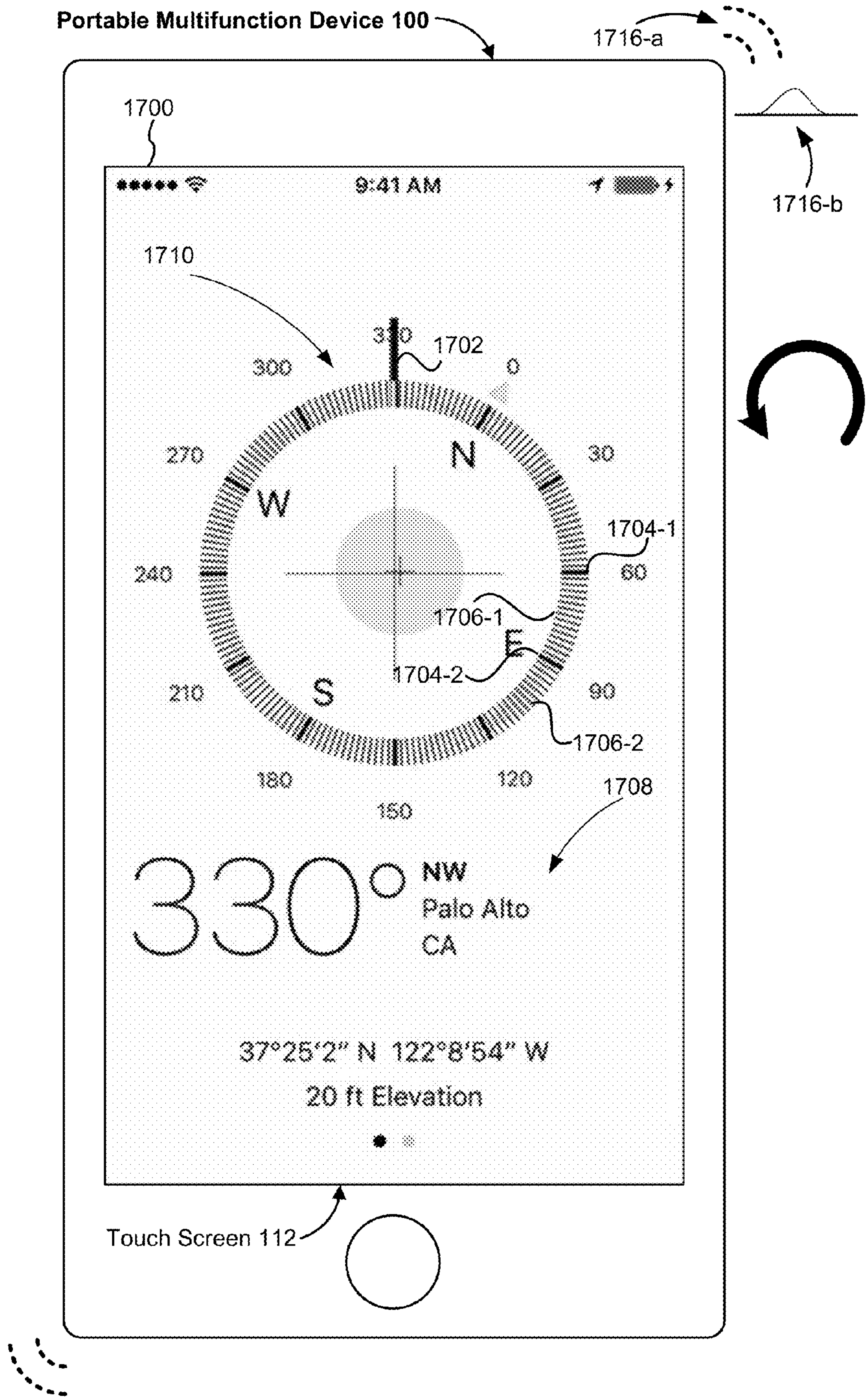

The device then detects (3204) movement of the electronic device. In response (3206) to detecting the movement of the electronic device: in accordance with a determination (3206-*a*) that the current orientation of the electronic device meets first criteria: the device changes (3206-*b*) the user interface to indicate that the first criteria are met by the current orientation of the electronic device (e.g., change the color of the user interface (e.g., as shown in FIG. 18E) or move a direction indicator around a compass face (e.g., as shown in FIGS. 17B, 17E, and 17H)) and generates (3206-*c*) a tactile output (e.g., tactile outputs 1712, 1714, and 1716 in FIGS. 17B, 17E, and 17H; and tactile output 1804 in FIG. 18E) upon changing the user interface to indicate that the first criteria are met by the current orientation of the electronic device; and, in accordance with a determination that the current orientation of the electronic does not meet the first criteria, the device changes (3206-*d*) the user interface to indicate the current orientation of the device without generating the tactile output (e.g., the user interface is continuously updated with the changing orientation of the device, as shown in FIGS. 17C, 17D, 17F, 17G, and FIGS. 18A-18D). In one example, the first criteria are met when the device is level and stable (e.g., as shown in FIG. 18E). In another example, the first criteria are met when the device is plumb and stable. In yet another example, the first criteria are met when the device reaches one of one or more predetermined directions (e.g., every 30 degrees away from true North, as shown in FIGS. 17B, 17E, and 17H).

In some embodiments, after generating the tactile output in accordance with the current orientation of the electronic device meeting the first criteria, the device detects (3208) second movement of the electronic device. In response (3208-*a*) to detecting the second movement of the electronic device: in accordance with a determination (3208-*b*) that the current orientation of the electronic device meets the first criteria for a second time, the device changes (3208-*c*) the user interface to indicate that the first criteria are met by the current orientation of the electronic device and generates (3208-*d*) a second tactile output upon changing the user interface to indicate that the first criteria are met by the current orientation of the electronic device; and, in accordance with a determination that the current orientation of the electronic does not meet the first criteria for the second time, the device changes (3208-*e*) the user interface to indicate the current orientation of the device without generating the second tactile output. In one example, the first criteria are met for a second time when the device re-entered the level state for at least a threshold amount of time after moving away from the level state. In another example, the first criteria are met for a second time when the device re-entered the plumb state for at least a threshold amount of time after leaving the plumb state. In yet another example, the first criteria are met for a second time when the device reaches another one of the one or more predetermined directions (e.g., every 30 degrees away from true North).

In some embodiments, the user interface includes (3210) a compass face with a plurality of major markings that correspond to a plurality of major directions relative to a magnetic field near the device. In some embodiments. the compass face further includes, between each pair of adjacent major markings of the plurality of major markings, a plurality of minor markings that correspond to a plurality of minor directions. The first criteria require that the current device orientation matches one of the plurality of major directions in order for the first criteria to be met. The first criteria are not met when the current device orientation does not match one of the plurality of major directions (e.g., the current device orientation matches one of the plurality of minor directions). Changing the user interface to indicate that the first criteria are met by the current orientation of the electronic device includes displaying the current orientation of the device as one of the major directions (e.g., displaying the orientation as "0 degrees," "30 degrees," etc. on the compass face). This is shown in FIGS. 17A-17H, for example.

In some embodiments, the user interface includes (3212) an alignment indicator (e.g., a level indicator or a plumb indicator) that indicates a current degree of deviation from a predetermined orientation (e.g., a bubble between two lines to indicate deviation from the level state, or a number to indicate deviation from the level or plumb state, or two intersecting circles to indicate deviation from the level state, or two intersecting straight lines to indicate deviation from the plumb state, etc.) that is determined based on the current orientation of the electronic device. The first criteria require that the current degree of deviation is less than a threshold amount and remains below the threshold amount for at least a threshold amount of time (e.g., device is level and stable, or the device is plumb and stable) in order for the first criteria to be met. The first criteria are not met when the current degree of deviation does not remain below the threshold amount for at least the threshold amount of time. Changing the user interface to indicate that the first criteria are met by the current orientation of the electronic device includes changing a color of the user interface (e.g., the user interface turns green when the first criteria are met and the tactile output is generated). This is shown in FIGS. 18A-18E, for example.

In some embodiments, determining (3214) the current orientation of the electronic device includes: in accordance with a determination that the electronic device is in a first orientation state with respect to a reference orientation (e.g., the reference orientation is a horizontal plane, and the device is more horizontal than vertical relative to the horizontal plane. In some embodiments, the horizontal plane is a plane that is normal to a direction of the Earth's gravitational field), the device determines (3214-*a*) the current orientation of the electronic device in accordance with a degree of alignment of the electronic device with the reference orientation; and, in accordance with a determination that the electronic device is in a second orientation state with respect to the reference orientation (e.g., the reference orientation is a horizontal plane, and the device is more vertical than horizontal relative to the horizontal plane), the device determines (3214-*b*) the current orientation of the electronic device in accordance with a degree of alignment of the electronic device with the Earth's gravitational field.

In some embodiments, the first criteria require (3216) that a rate for generating tactile outputs in accordance with the current orientation of the electronic device does not exceed a predetermined rate limit (e.g., no more than one tactile output every 0.05 seconds) in order for the first criteria to be met.

In some embodiments, the first criteria require (3216) that only one tactile output is generated while the current orientation of the electronic device is maintained (e.g., a tactile output is generated when the device reaches a predetermined orientation, and no subsequent tactile output is generated while the device is maintained in that predetermined orientation, or when the device leaves that predetermined orientation).

It should be understood that the particular order in which the operations in FIGS. 32A-32C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 2000, 2200, 2400, 2600, 2800, 3000, and 3400) are also applicable in an analogous manner to method 3200 described above with respect to FIGS. 32A-32C. For example, the contacts, gestures, user interface objects, tactile outputs, intensity thresholds, focus selectors, animations described above with reference to method 3200 optionally have one or more of the characteristics of the contacts, gestures, user interface objects, tactile outputs, intensity thresholds, focus selectors, animations described herein with reference to other methods described herein (e.g., methods 2000, 2200, 2400, 2600, 2800, 3000, and 3400). For brevity, these details are not repeated here.

Figure 33:
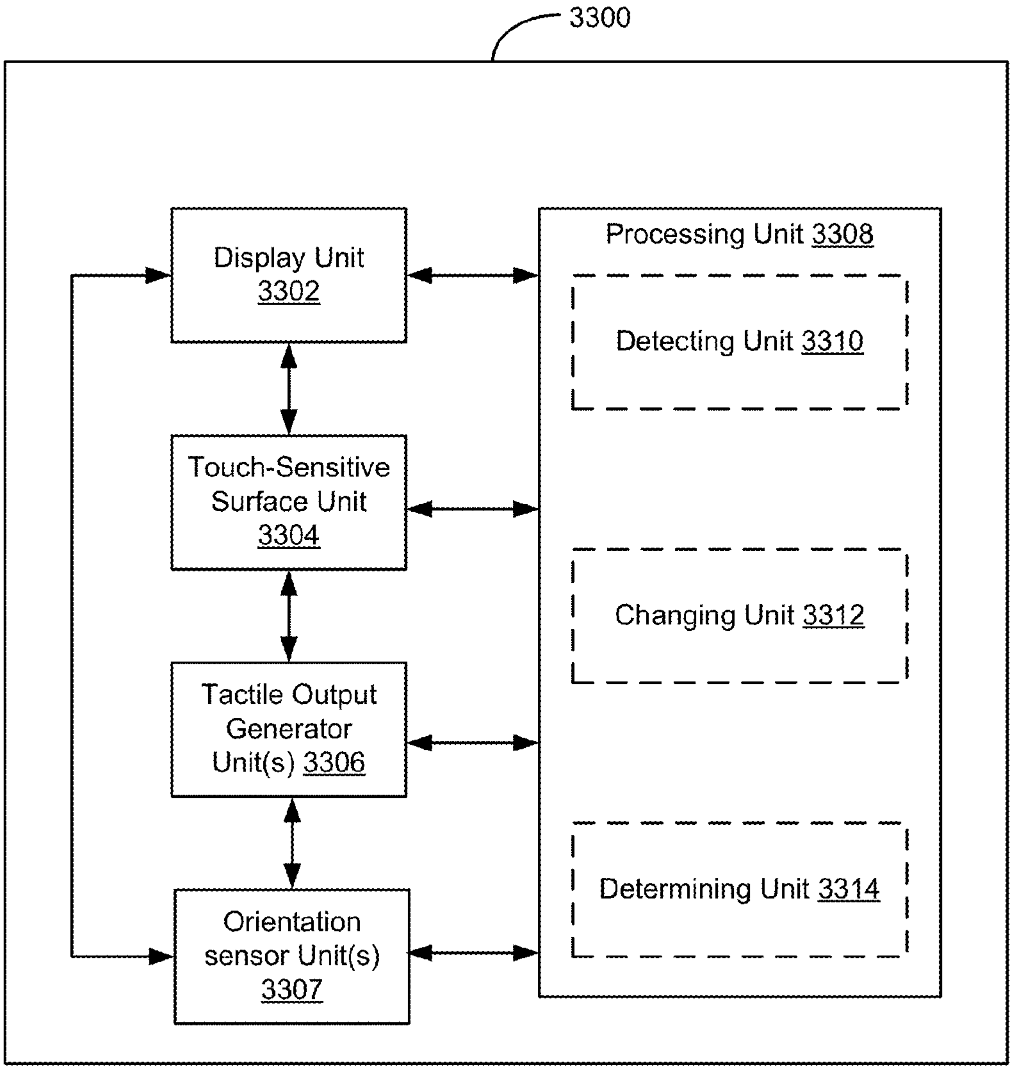
FIG. 33 is a functional block diagram of an electronic device in accordance with some embodiments.

In accordance with some embodiments, FIG. 33 shows a functional block diagram of an electronic device 3300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 33 are, optionally, combined or separated into sub-blocks to implement the principles of the various described embodiments. Therefore, the description herein optionally supports any possible combination or separation or further definition of the functional blocks described herein.

As shown in FIG. 33, an electronic device 3300 includes a display unit 3302 configured to display user interfaces; a touch-sensitive surface unit 3304; one or more tactile output generator units 3306 configured to generate tactile outputs; one or more orientation sensor units 3307 configured to determine a current orientation of the electronic device, and a processing unit 3308 coupled to the display unit 3302, the touch-sensitive surface unit 3304, and the one or more tactile output generator units 3306. In some embodiments, the processing unit includes detecting unit 3310, changing unit 3312, and determining unit 3314.

The processing unit 3308 is configured to: enable display of (e.g., with the display unit 3302) a user interface on the display unit 3302, wherein the user interface includes an indicator of device orientation that indicates (e.g., with the orientation sensor units 3307) the current orientation of the electronic device; detect (e.g., with the detecting unit 3310) movement of the electronic device; and, in response to detecting the movement of the electronic device: in accordance with a determination that the current orientation of the electronic device meets first criteria: change (e.g., with the changing unit 3312) the user interface to indicate that the first criteria are met by the current orientation of the electronic device; and generate (e.g., with the tactile output generator unit(s) 3306) a tactile output upon changing the user interface to indicate that the first criteria are met by the current orientation of the electronic device; and in accordance with a determination that the current orientation of the electronic device does not meet the first criteria, change (e.g., with the changing unit 3312) the user interface to indicate the current orientation of the device without generating the tactile output.

In some embodiments, the user interface includes a compass face with a plurality of major markings that correspond to a plurality of major directions relative to a magnetic field near the device, the first criteria require that the current device orientation matches one of the plurality of major directions in order for the first criteria to be met, the first criteria are not met when the current device orientation does not match one of the plurality of major directions, and changing the user interface to indicate that the first criteria are met by the current orientation of the electronic device includes displaying (e.g., with the display unit 3302) the current orientation of the device as one of the major directions.

In some embodiments, the processing unit 3308 is further configured to: after generating the tactile output in accordance with the current orientation of the electronic device meeting the first criteria, detect (e.g., with the detecting unit 3310) second movement of the electronic device; and, in response to detecting the second movement of the electronic device: in accordance with a determination (e.g., with the determining unit 3314) that the current orientation of the electronic device meets the first criteria for a second time: change (e.g., with the changing unit 3312) the user interface to indicate that the first criteria are met by the current orientation of the electronic device; and generate (e.g., with the tactile output generator unit(s) 3306) a second tactile output upon changing the user interface to indicate that the first criteria are met by the current orientation of the electronic device; and in accordance with a determination (e.g., with the determining unit 3314) that the current orientation of the electronic device does not meet the first criteria for the second time, change (e.g., with the changing unit 3312) the user interface to indicate the current orientation of the device without generating the second tactile output.

In some embodiments, the user interface includes an alignment indicator that indicates a current degree of deviation from a predetermined orientation that is determined (e.g., with the determining unit 3314) based on the current orientation (e.g., with the orientation sensor units 3307) of the electronic device, the first criteria require that the current degree of deviation is less than a threshold amount and remains below the threshold amount for at least a threshold amount of time in order for the first criteria to be met, the first criteria are not met when the current degree of deviation does not remain below the threshold amount for at least the threshold amount of time, and changing (e.g., with the changing unit 3312) the user interface to indicate that the first criteria are met by the current orientation of the electronic device includes changing (e.g., with the changing unit 3312) a color of the user interface.

In some embodiments, determining the current orientation of the electronic device includes: in accordance with a determination that the electronic device is in a first orientation state with respect to a reference orientation, determining (e.g., with the determining unit 3314) the current orientation of the electronic device (e.g., with the orientation sensor units 3307) in accordance with a degree of alignment of the electronic device with the reference orientation; and in accordance with a determination (e.g., with the determining unit 3314) that the electronic device is in a second orientation state (e.g., with the orientation sensor units 3307) with respect to the reference orientation, determining (e.g., with the determining unit 3314) the current orientation of the electronic device in accordance with a degree of alignment of the electronic device with the Earth's gravitational field.

In some embodiments, the first criteria require that a rate for generating tactile outputs in accordance with the current orientation of the electronic device does not exceed a predetermined rate limit in order for the first criteria to be met.

In some embodiments, the first criteria require that only one tactile output is generated while the current orientation of the electronic device is maintained.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 32A-32C are, optionally, implemented by components depicted in FIGS. 1A-1B or FIG. 33. For example, detection operations 3204 and tactile feedback operation 3206 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 34A-34D are flow diagrams illustrating a method 3400 of providing coordinated haptic and audio feedback in accordance with a moveable component passing through selectable options. The method 3400 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 3400 are, optionally, combined and/or the order of some operations is, optionally, changed.

As described below, the method 3400 relates to providing haptic feedback with accompanying audio feedback in accordance with a respective speed by which a moveable component passes through each selectable option in a plurality of selectable options (e.g., with slowing speed after termination of a scroll input that had set the moveable component in motion). In some embodiments, as the moveable component passes through a series of selectable options with decreasing speed, the device generates tactile outputs that have the same value for a first property (e.g., frequency) and different values for a second property (e.g., amplitude), while providing corresponding audio outputs with different values for the first property (e.g., frequency). It is advantageous to combine tactile outputs and audio outputs in an intelligent manner to provide a rich and intuitive experience to the user without undue burdens on the device's hardware/software capabilities and inform the user about the speed and amount of movement of the moveable component. For example, by keeping the first property (e.g., frequency) of the tactile outputs at a constant value and only vary the value of a second property (e.g., amplitude), the burdens placed on the tactile output generators are reduced (e.g., especially when tactile outputs are generated at a high rate), which improves longevity of the device. By providing corresponding audio outputs with varying values for the first property (e.g., frequency), the device can make up the variations needed to convey the correct sensations that match the visual changes in the user interface with minimal cost. Additionally, tactile feedback provides valuable information to the user for touch screen user interfaces where the user's finger is obscuring corresponding visual feedback. Providing this improved nonvisual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The device displays (3402) a user interface on the display, where the user interface includes a user interface object that includes a first moveable component (e.g., minute wheel 1950 in FIG. 19A) that represents a first plurality of selectable options (e.g., a time picker with moveable elements for choosing a hour and a minute value from a plurality of hour and minute values, respectively; a date picker with movable elements for choosing a year, a month, and a date value from a plurality of year, month, and date values, respectively).

The device detects (3404) a first scroll input (e.g., input by contact 1904) directed to the first moveable component (e.g., minute wheel 1950) of the user interface object that includes movement of a first contact on the touch-sensitive surface and liftoff of the first contact from the touch-sensitive surface.

In response (3406) to detecting the first scroll input: the device moves (3406-*a*) the first moveable component through a subset of the first plurality of selectable options of the first moveable component (e.g., the moveable component moves through a respective selectable option when the respective selectable option passes a predetermined position (e.g., a position marked by an stationary indicator) or enters a predetermined state (e.g., facing forward at the user) in the user interface during the movement of the moveable component), including moving the first moveable component through a first selectable option and a second selectable option of the first moveable component after detecting the liftoff of the first contact from the touch-sensitive surface, where the movement of the first moveable component gradually slows down after the liftoff of the first contact is detected (e.g., the moveable component continues to move due to inertia). This is illustrated in FIGS. 19A-19J, for example, where minute wheel 1950 gradually slows down after input by contact 1904 is terminated and minute wheel 1950 passes through a sequence of minute values during its movement.

As the first moveable component moves (3406-*b*) through a first selectable option with a first speed, the device generates (3406-*c*) a first tactile output (e.g., a MicroTap High (270 Hz), gain: 0.4, minimum interval 0.05 seconds) and generates (3406-*d*) a first audio output (e.g., a haptic audio output that accompanies the tactile output). This is illustrated in FIG. 19B where tactile output 1920 and audio output 1921 are generated when minute wheel passes through minute value "59", for example.

As the first moveable component moves (3406-*e*) through the second selectable option with a second speed that is slower than the first speed, the device generates (3406-*f*) a second tactile output that is different in a first output property (e.g., amplitude) than the first tactile output and that is the same in a second output property (e.g., frequency) as the first tactile output (e.g., the second tactile output is a MicroTap High (270 Hz), with a gain: 0.2, minimum interval 0.05 seconds) and generates (3406-*g*) a second audio output that is different in the second output property (e.g., frequency) than the first audio output. This is illustrated in FIG. 19G where tactile output 1926 and audio output 1927 are generated when minute wheel passes through minute value "34" at a slower speed than when minute wheel passed through minute value "59" in FIG. 19B. Tactile output 1926 has a lower amplitude than tactile output 1920, and same frequency as tactile output 1920. Audio output 1927 has a higher frequency than Audio output 1921.

For example, when the wheel of the minute element rotates through a series of values in sequence with decreasing speed after lift-off of the contact is detected, the frequencies of the tactile outputs remain the same (e.g., at 270 Hz), but the amplitudes of the tactile outputs decrease with the decreasing speed of the wheel (e.g., the gain value decreases with the decreasing speed); in contrast, the pitches of the audio outputs that accompany the tactile outputs become lower over time with the reducing speed of the wheel.

In some embodiments, moving the first moveable component through the subset of the first plurality of selectable options of the first moveable component includes moving (3408) the first moveable component through a third selectable option of the first plurality of selectable options. As the first movable component moves (3408-*a*) through the third selectable option of the first plurality of selectable options: in accordance with a determination that a tactile output rate limit is not reached, the device generates (3408-*b*) a third tactile output (and generates a third audio output); and, in accordance with a determination that the tactile output rate limit is reached, the device forgoes (3408-*c*) generation of the third tactile output. This is illustrated in FIGS. 19B-19J, where tactile outputs are skipped in FIGS. 19C, 19E when minute wheel is passing through values at a high speed and the tactile output rate limit is reached; and where tactile outputs are generated in FIGS. 19D, 19F, 19G, 19I, and 19J when tactile output rate limit is not reached (e.g., either because previous tactile outputs have been skipped or when speed of minute wheel has slowed down). In some embodiments, audio outputs are still generated, even when a tactile output is skipped due to the tactile output rate limit being reached. In some embodiments, the tactile outputs are still timed to coincide with movement of the first moveable component even when tactile outputs are skipped.

In some embodiments, the user interface object further includes (3410) a second moveable component (e.g., hour wheel 1948 in FIG. 19K) that represents a second plurality of selectable options (e.g., in a time picker, if the first moveable component is for choosing the minute values, the second moveable component is for choosing the hour values.

While the movement of the first moveable component continues (e.g., either before or after detecting the lift-off of the first scroll input), the device detects (3410-*a*) a second scroll input directed to the second moveable component of the user interface object that includes movement of a second contact on the touch-sensitive surface and liftoff of the second contact from the touch-sensitive surface. This is illustrated in FIGS. 19M-19N.

In response (3410-*b*) to detecting the second scroll input, and while the first moveable component continues to move through the first plurality of selectable options (e.g., either before or after the lift-off of the first contact in the first scroll input), the device moves (3410-*c*) the second moveable component through a subset of the second plurality of selectable options of the second moveable component, including moving the second moveable component through a first selectable option of the second plurality of selectable options and, as the second moveable component moves through the first selectable option of the second plurality of selectable options, the device generates (3410-*d*) a fourth tactile output (and generating a fourth audio output). This is illustrated in FIG. 19O, for example, where hour wheel 1948 moves through hour value "4", while minute wheel 1950 continues to move through minute values. Device 100 generates tactile output 1938 and audio output 1939 when hour wheel moves past hour value "4". This is also illustrated in FIG. 19P, for example, where hour wheel 1948 moves through hour value "6", while minute wheel 1950 continues to move through minute values. Device 100 generates tactile output 1940 and audio output 1941 when hour wheel moves past hour value "6".

In some embodiments, as the tactile outputs and audio outputs for the second moveable component vary as the second moveable component slows down in the same or a similar way in which the tactile and audio outputs for the first moveable component vary (e.g., with the amplitude of the tactile outputs and audio outputs decreasing and the audio frequency changing while the tactile output frequency remains the same). In some embodiments, the tactile outputs for the second moveable component have tactile outputs with a tactile output pattern that is different from the tactile output pattern of the tactile outputs for the first moveable component (e.g., the first moveable component uses MiniTaps and the second moveable component uses MicroTaps, or the first moveable component uses MiniTaps and the second moveable component uses FullTaps). In some embodiments, the tactile outputs for the second moveable component have tactile outputs with a frequency that is different from the frequency of the tactile outputs for the first moveable component (e.g., the first moveable component uses MiniTaps at 270 Hz and the second moveable component uses MiniTaps at 150 Hz). In some embodiments, the baseline tactile output patterns of the first and second moveable components are selected in accordance with respective sizes of the first and second moveable components, and gain factors for changing the amplitudes of the tactile outputs are selected based on the speeds of the moveable component when crossing the selectable options.

In some embodiments, the second moveable component moves (3412) through the first selectable option of the second plurality of selectable options while the first selectable component has moved past the first selectable option of the first plurality of selectable options and has not reached the second selectable option of the first plurality of selectable options, and the fourth tactile output is generated between the first and the second tactile outputs. For example, after minute wheel 1950 passes through minute value "27" in FIG. 19M (tactile output 1934 and audio output 1935 are generated), hour wheel passes through hour value "4" (tactile output 1938 and audio output 1939 are generated), then minute wheel passes through minute value "24" (tactile output 1942 and audio output 1943 are generated).

In some embodiments, the second moveable component moves (3414) through the first selectable option of the second plurality of selectable options after the lift-off of the second contact is detected.

In some embodiments, moving the second moveable component through the subset of the second plurality of selectable options of the second moveable component includes moving (3416) the second moveable component through a second selectable option of the second plurality of selectable options.

As the second movable component moves (3416-*a*) through the second selectable option of the second plurality of selectable options: in accordance with a determination that a tactile output rate limit is not reached, the device generates (3416-*b*) a fifth tactile output; and, in accordance with a determination that the tactile output rate limit is reached, the device forgoes (3416-*c*) generation of the fifth tactile output.

For example, with reference to generating step 3416-*b*, in some embodiments, the tactile output limit is a respective tactile output limit that applies to the second moveable component only, and a separate tactile output limit applies to the first moveable component. In some embodiments, a single tactile output limit applies to both the first and the second moveable components.

With reference to forgoing step 3416-*c*, in some embodiments, audio outputs are still generated, even when a tactile output is skipped due to the tactile output rate limit being reached. In some embodiments, the tactile outputs are still timed to coincide with movement of the first and second moveable components even when tactile outputs are skipped.

In some embodiments, the first tactile output and the second tactile output have the same duration (e.g., 7.5 ms) (3418).

In some embodiments, the first tactile output and the second tactile output have the same frequency (e.g., 270 Hz) (3420).

In some embodiments, the first audio output and the second audio output have different amplitudes (e.g., different gains due to different movement speed) (3422).

In some embodiments, there is a first delay between the first tactile output and the first audio output, there is a second delay between the second tactile output and the second audio output, and the first delay is different from the second delay (3424). E.g., a greater delay is used for a slower speed of the moveable component as it moves through a selectable option.

It should be understood that the particular order in which the operations in FIGS. 34A-34D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 2000, 2200, 2400, 2600, 2800, 3000, and 3200) are also applicable in an analogous manner to method 3400 described above with respect to FIGS. 34A-34D. For example, the contacts, gestures, user interface objects, tactile outputs, intensity thresholds, focus selectors, animations described above with reference to method 3400 optionally have one or more of the characteristics of the contacts, gestures, user interface objects, tactile outputs, intensity thresholds, focus selectors, animations described herein with reference to other methods described herein (e.g., methods 2000, 2200, 2400, 2600, 2800, 3000, and 3200). For brevity, these details are not repeated here.

Figure 35:
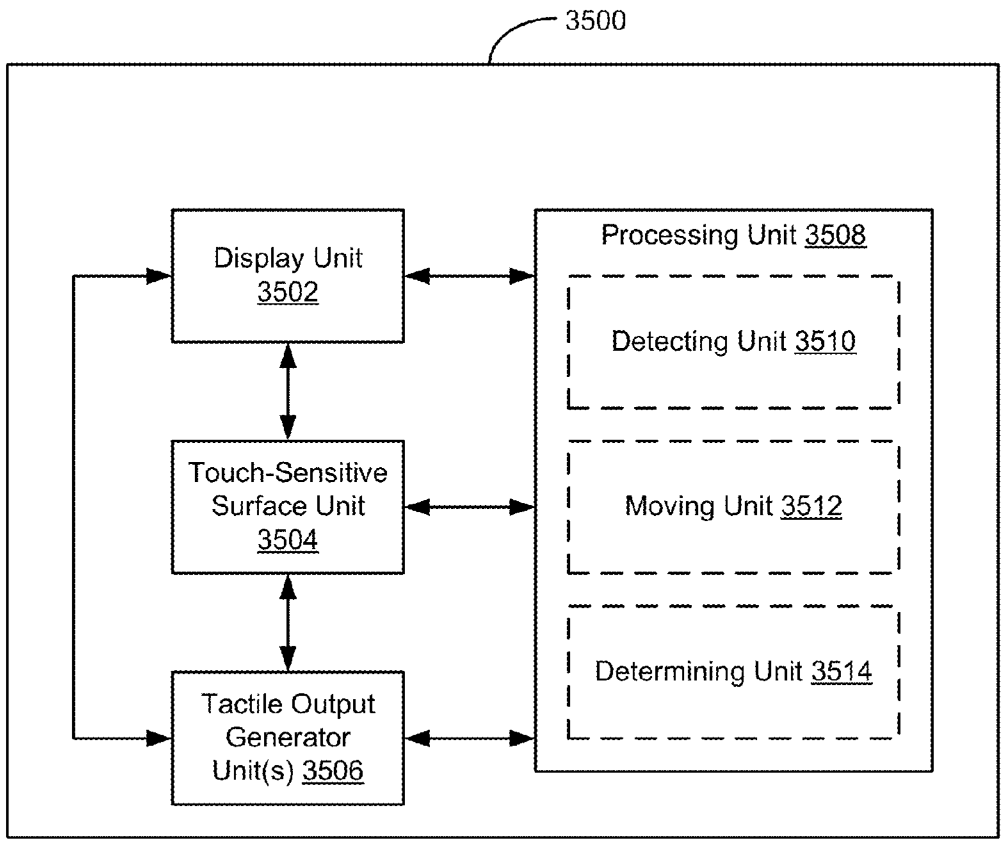
FIG. 35 is a functional block diagram of an electronic device in accordance with some embodiments.

In accordance with some embodiments, FIG. 35 shows a functional block diagram of an electronic device 3500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 35 are, optionally, combined or separated into sub-blocks to implement the principles of the various described embodiments. Therefore, the description herein optionally supports any possible combination or separation or further definition of the functional blocks described herein.

As shown in FIG. 35, an electronic device 3500 includes a display unit 3502 configured to display user interfaces; a touch-sensitive surface unit 3504; one or more tactile output generator units 3506 configured to generate tactile outputs; and a processing unit 3508 coupled to the display unit 3502, the touch-sensitive surface unit 3504, and the one or more tactile output generator units 3506. In some embodiments, the processing unit includes detecting unit 3510, moving unit 3512, and determining unit 3514.

The processing unit 3508 is configured to: enable display of (e.g., with the display unit 3502) a user interface on the display unit 3502, wherein the user interface includes a user interface object that includes a first moveable component that represents a first plurality of selectable options; detect (e.g., with the detecting unit 3510) a first scroll input directed to the first moveable component of the user interface object that includes movement of a first contact on the touch-sensitive surface unit 3504 and liftoff of the first contact from the touch-sensitive surface unit 3504; in response to detecting the first scroll input: move (e.g., with the moving unit 3512) the first moveable component through a subset of the first plurality of selectable options of the first moveable component, including moving (e.g., with the moving unit 3512) the first moveable component through a first selectable option and a second selectable option of the first moveable component after detecting the liftoff of the first contact from the touch-sensitive surface unit 3504, wherein the movement of the first moveable component gradually slows down after the liftoff of the first contact is detected; as the first moveable component moves through a first selectable option with a first speed: generate (e.g., with the tactile output generator unit(s) 3506) a first tactile output; and generate (e.g., with the tactile output generator unit(s) 3506) a first audio output; and, as the first moveable component moves through the second selectable option with a second speed that is slower than the first speed: generate (e.g., with the tactile output generator unit(s) 3506) a second tactile output that is different in a first output property than the first tactile output and that is the same in a second output property as the first tactile output; and generate (e.g., with the tactile output generator unit(s) 3506) a second audio output that is different in the second output property than the first audio output.

In some embodiments, moving the first moveable component through the subset of the first plurality of selectable options of the first moveable component includes moving (e.g., with the moving unit 3512) the first moveable component through a third selectable option of the first plurality of selectable options; and the processing unit 3508 is further configured to: as the first movable component moves through the third selectable option of the first plurality of selectable options: in accordance with a determination (e.g., with the determining unit 3514) that a tactile output rate limit is not reached, generate (e.g., with the tactile output generator unit(s) 3506) a third tactile output; and in accordance with a determination (e.g., with the determining unit 3514) that the tactile output rate limit is reached, forgo generation of the third tactile output.

In some embodiments, the user interface object further includes a second moveable component that represents a second plurality of selectable options; and the processing unit 3508 is further configured to: while the movement of the first moveable component continues, detect (e.g., with the detecting unit 3510) a second scroll input directed to the second moveable component of the user interface object that includes movement of a second contact on the touch-sensitive surface unit 3504 and liftoff of the second contact from the touch-sensitive surface unit 3504; and in response to detecting the second scroll input, and while the first moveable component continues to move (e.g., with the moving unit 3512) through the first plurality of selectable options: move (e.g., with the moving unit 3512) the second moveable component through a subset of the second plurality of selectable options of the second moveable component, including moving (e.g., with the moving unit 3512) the second moveable component through a first selectable option of the second plurality of selectable options; and as the second moveable component moves through the first selectable option of the second plurality of selectable options, generate (e.g., with the tactile output generator unit(s) 3506) a fourth tactile output In some embodiments, the second moveable component moves through the first selectable option while the first selectable component has moved past the first selectable option and has not reached the second selectable option, and the fourth tactile output is generated between the first and the second tactile outputs.

In some embodiments, the second moveable component moves through the first selectable option of the second plurality of selectable options after the lift-off of the second contact is detected.

In some embodiments, moving the second moveable component through the subset of the second plurality of selectable options of the second moveable component includes moving the second moveable component through a second selectable option of the second plurality of selectable options; and the processing unit 3508 is further configured to: as the second movable component moves through the second selectable option of the second plurality of selectable options: in accordance with a determination (e.g., with the determining unit 3514) that a tactile output rate limit is not reached, generate (e.g., with the tactile output generator unit(s) 3506) a fifth tactile output; and in accordance with a determination (e.g., with the determining unit 3514) that the tactile output rate limit is reached, forgo generation of the fifth tactile output.

In some embodiments, the first tactile output and the second tactile output have the same duration.

In some embodiments, the first tactile output and the second tactile output have the same frequency.

In some embodiments, the first audio output and the second audio output have different amplitudes.

In some embodiments, there is a first delay between the first tactile output and the first audio output, there is a second delay between the second tactile output and the second audio output, and the first delay is different from the second delay.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 34A-34D are, optionally, implemented by components depicted in FIGS. 1A-1B or FIG. 35. For example, detection operation 3402 and tactile feedback operation 3406 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer readable storage medium storing one or more programs, the one or more programs comprising instructions, which when executed by an electronic device with a display, a touch-sensitive surface, and one or more tactile output generators for generating tactile outputs associated with physical displacement of the electronic device or a component of the electronic device, cause the device to:

display a user interface on the display, wherein the user interface includes a first object and a plurality of predetermined object snap positions;

detect a first portion of an input by a contact on the touch-sensitive surface at a location that corresponds to the first object in the user interface;

in response to detecting the first portion of the input by the contact, and in accordance with a determination that the first portion of the input meets selection criteria:

visually indicate selection of the first object; and generate a first tactile output in conjunction with visually indicating selection of the first object;

while the first object is selected, detect a second portion of the input by the contact on the touch-sensitive surface, wherein detecting the second portion of the input includes detecting movement of the contact across the touch-sensitive surface;

in response to detecting the second portion of the input by the contact, move the first object on the user interface in accordance with the movement of the contact;

after detecting the second portion of the input, while the first object is proximate to a first predetermined object snap position, detect a third portion of the input by the contact on the touch sensitive surface; and in response to detecting the third portion of the input by the contact, and in accordance with a determination that the third portion of the input meets drop-off criteria:

visually indicate deselection of the first object;

move the first object to the first predetermined object snap position, wherein moving the first object to the first predetermined object snap position includes movement of the first object settling into the first predetermined object snap position; and generate a second tactile output that is synchronized with the movement of the first object settling into the first predetermined object snap position.

2. The computer readable storage medium of claim 1, wherein the selection criteria require that a characteristic intensity of the contact exceeds a first intensity threshold and that the contact is maintained for at least a predetermined threshold amount of time in order for the selection criteria to be met.

3. The computer readable storage medium of claim 1, wherein the selection criteria require that a characteristic intensity of the contact exceeds a first intensity threshold and a second intensity threshold above the first intensity threshold.

4. The computer readable storage medium of claim 1, wherein a second tactile output pattern of the second tactile output is different from a first tactile output pattern of the first tactile output.

5. The computer readable storage medium of claim 1, wherein the first tactile output is generated concurrently with visually indicating the selection of the first object.

6. The computer readable storage medium of claim 1, wherein the second tactile output is generated concurrently with arrival of the first object at the first predetermined object snap position.

7. The computer readable storage medium of claim 1, wherein:

detecting the movement of the contact across the touch-sensitive surface includes detecting that the contact has moved to a threshold location in proximity to an edge of the display;

moving the first object on the user interface in accordance with the movement of the contact includes moving the first object to the threshold location in proximity to the edge of the display in accordance with the movement of the contact; and the one or more programs further comprise instructions that cause the device to:

shift the user interface relative to the first object on the display, such that a previously un-displayed portion of the user interface is displayed underneath the first object; and generate a third tactile output in conjunction with shifting the user interface relative to the first object on the display.

8. The computer readable storage medium of claim 1, wherein:

detecting the movement of the contact across the touch-sensitive surface includes detecting that the contact has moved to a threshold location in proximity to a second predetermined object snap position; and moving the first object on the user interface in accordance with the movement of the contact includes:

in response to detecting that the contact has moved to the threshold location in proximity to the second predetermined object snap position, moving the first object, relative to the threshold location, to the second predetermined object snap position; and generating a third tactile output in conjunction with moving the first object to the second predetermined object snap position.

9. The computer readable storage medium of claim 1, wherein:

before the first object is moved to the first predetermined snap location, the user interface includes a second object located at the first predetermined snap position, and the user interface includes a second predetermined snap position adjacent to the first predetermined snap position; and the one or more programs further comprise instructions that cause the device to:

move the first object toward the first predetermined snap position;

in accordance with a determination that the first object is within a threshold range of the first predetermined snap position, move the second object from the first predetermined snap position to the second predetermined object snap position; and generate a fourth tactile output in conjunction with moving the second object to the second predetermined snap position.

10. The computer readable storage medium of claim 9, wherein:

the third portion of the input includes lift-off of the contact; and moving the first object toward the first predetermined snap position includes continuing movement of the first object toward the first predetermined snap position after the lift-off of the contact.

11. The computer readable storage medium of claim 1, wherein the first tactile output has a higher amplitude than the second tactile output.

12. The computer readable storage medium of claim 1, wherein the first tactile output has a same waveform as the second tactile output.

13. The computer readable storage medium of claim 1, the one or more programs further comprising instructions that cause the device to:

detect a second input by a second contact on the touch-sensitive surface at a location that corresponds to a third snap position in the user interface; and in accordance with a determination that the second input meets item creation criteria:

display a new object in the user interface; and generate a fifth tactile output in conjunction with displaying the new object in the user interface.

14. The computer readable storage medium of claim 13, the one or more programs further comprising instructions that cause the device to:

detect termination of the second input, including detecting lift-off of the second contact;

in response to detecting the lift-off of the second contact:

display a second user interface for entering information related to the new object;

in accordance with a determination that the second input includes movement of the second contact before the lift-off of the second contact, generate a sixth tactile output; and in accordance with a determination that the second input does not include movement of the second contact before the lift-off of the second contact, forgo generation of the sixth tactile output.

15. The computer readable storage medium of claim 1, the one or more programs further comprising instructions that cause the device to:

in response to detecting the first portion of the input by the contact, and in accordance with a determination that the first portion of the input does not meet the selection criteria, scroll content displayed in the user interface in response to detecting movement of the contact across the touch-sensitive surface.

16. The computer readable storage medium of claim 1, wherein:

the user interface is a calendar interface, the plurality of predetermined snap positions correspond to a plurality of dates, and the first object includes a representation of a calendar entry.

17. The computer readable storage medium of claim 1, wherein:

the user interface is an application launch user interface that includes a plurality of application icons that correspond to different applications of a plurality of applications, the plurality of predetermined snap positions correspond to a plurality of positions for displaying application icons, and the first object includes a first application icon that corresponds to a first application of the plurality of applications.

18. The computer readable storage medium of claim 1, wherein:

the user interface is a weather forecast user interface that includes a plurality of weather items that correspond to different geographical locations of a plurality of geographical locations and include an indication of the weather at a corresponding geographical location, the plurality of predetermined snap positions correspond to a plurality of positions for displaying weather items, and the first object includes a first weather item of the plurality of weather items.

19. A method, comprising:

at an electronic device with a touch-sensitive surface, a display, and one or more tactile output generators for generating tactile outputs associated with physical displacement of the electronic device or a component of the electronic device:

displaying a user interface on the display, wherein the user interface includes a first object and a plurality of predetermined object snap positions;

detecting a first portion of an input by a contact on the touch-sensitive surface at a location that corresponds to the first object in the user interface;

in response to detecting the first portion of the input by the contact, and in accordance with a determination that the first portion of the input meets selection criteria:

visually indicating selection of the first object; and generating a first tactile output in conjunction with visually indicating selection of the first object;

while the first object is selected, detecting a second portion of the input by the contact on the touch-sensitive surface, wherein detecting the second portion of the input includes detecting movement of the contact across the touch-sensitive surface;

in response to detecting the second portion of the input by the contact, moving the first object on the user interface in accordance with the movement of the contact;

after detecting the second portion of the input, while the first object is proximate to a first predetermined object snap position, detecting a third portion of the input by the contact on the touch sensitive surface; and in response to detecting the third portion of the input by the contact, and in accordance with a determination that the third portion of the input meets drop-off criteria:

visually indicating deselection of the first object;

moving the first object to the first predetermined object snap position, wherein moving the first object to the first predetermined object snap position includes movement of the first object settling into the first predetermined object snap position; and generating a second tactile output that is synchronized with the movement of the first object settling into the first predetermined object snap position.

20. The method of claim 19, wherein the selection criteria require that a characteristic intensity of the contact exceeds a first intensity threshold and that the contact is maintained for at least a predetermined threshold amount of time in order for the selection criteria to be met.

21. The method of claim 19, wherein the selection criteria require that a characteristic intensity of the contact exceeds a first intensity threshold and a second intensity threshold above the first intensity threshold.

22. The method of claim 19, wherein a second tactile output pattern of the second tactile output is different from a first tactile output pattern of the first tactile output.

23. The method of claim 19, wherein the first tactile output is generated concurrently with visually indicating the selection of the first object.

24. The method of claim 19, wherein the second tactile output is generated concurrently with arrival of the first object at the first predetermined object snap position.

25. The method of claim 19, wherein:

detecting the movement of the contact across the touch-sensitive surface includes detecting that the contact has moved to a threshold location in proximity to an edge of the display;

moving the first object on the user interface in accordance with the movement of the contact includes moving the first object to the threshold location in proximity to the edge of the display in accordance with the movement of the contact; and the method further includes:

shifting the user interface relative to the first object on the display, such that a previously un-displayed portion of the user interface is displayed underneath the first object; and generating a third tactile output in conjunction with shifting the user interface relative to the first object on the display.

26. The method of claim 19, wherein:

detecting the movement of the contact across the touch-sensitive surface includes detecting that the contact has moved to a threshold location in proximity to a second predetermined object snap position; and moving the first object on the user interface in accordance with the movement of the contact includes:

in response to detecting that the contact has moved to the threshold location in proximity to the second predetermined object snap position, moving the first object, relative to the threshold location, to the second predetermined object snap position; and generating a third tactile output in conjunction with moving the first object to the second predetermined object snap position.

27. The method of claim 19, wherein:

before the first object is moved to the first predetermined snap location, the user interface includes a second object located at the first predetermined snap position, and the user interface includes a second predetermined snap position adjacent to the first predetermined snap position; and the method further includes:

moving the first object toward the first predetermined snap position;

in accordance with a determination that the first object is within a threshold range of the first predetermined snap position, moving the second object from the first predetermined snap position to the second predetermined object snap position; and generating a fourth tactile output in conjunction with moving the second object to the second predetermined snap position.

28. The method of claim 27, wherein:

the third portion of the input includes lift-off of the contact; and moving the first object toward the first predetermined snap position includes continuing movement of the first object toward the first predetermined snap position after the lift-off of the contact.

29. The method of claim 19, wherein the first tactile output has a higher amplitude than the second tactile output.

30. The method of claim 19, wherein the first tactile output has a same waveform as the second tactile output.

31. The method of claim 19, including:

detecting a second input by a second contact on the touch-sensitive surface at a location that corresponds to a third snap position in the user interface; and in accordance with a determination that the second input meets item creation criteria:

displaying a new object in the user interface; and generating a fifth tactile output in conjunction with displaying the new object in the user interface.

32. The method of claim 31, including:

detecting termination of the second input, including detecting lift-off of the second contact;

in response to detecting the lift-off of the second contact:

displaying a second user interface for entering information related to the new object;

in accordance with a determination that the second input includes movement of the second contact before the lift-off of the second contact, generating a sixth tactile output; and in accordance with a determination that the second input does not include movement of the second contact before the lift-off of the second contact, forgoing generation of the sixth tactile output.

33. The method of claim 19, including:

in response to detecting the first portion of the input by the contact, and in accordance with a determination that the first portion of the input does not meet the selection criteria, scrolling content displayed in the user interface in response to detecting movement of the contact across the touch-sensitive surface.

34. The method of claim 19, wherein:

the user interface is a calendar interface, the plurality of predetermined snap positions correspond to a plurality of dates, and the first object includes a representation of a calendar entry.

35. The method of claim 19, wherein:

the user interface is an application launch user interface that includes a plurality of application icons that correspond to different applications of a plurality of applications, the plurality of predetermined snap positions correspond to a plurality of positions for displaying application icons, and the first object includes a first application icon that corresponds to a first application of the plurality of applications.

36. The method of claim 19, wherein:

the user interface is a weather forecast user interface that includes a plurality of weather items that correspond to different geographical locations of a plurality of geographical locations and include an indication of the weather at a corresponding geographical location, the plurality of predetermined snap positions correspond to a plurality of positions for displaying weather items, and the first object includes a first weather item of the plurality of weather items.

37. An electronic device, comprising:

a display;

a touch-sensitive surface;

one or more tactile output generators for generating tactile outputs associated with physical displacement of the electronic device or a component of the electronic device;

one or more processors;

memory; and one or more programs, wherein the one or more programs are stored in the memory and configured to be executed by the one or more processors, the one or more programs including instructions for:

displaying a user interface on the display, wherein the user interface includes a first object and a plurality of predetermined object snap positions;

detecting a first portion of an input by a contact on the touch-sensitive surface at a location that corresponds to the first object in the user interface;

in response to detecting the first portion of the input by the contact, and in accordance with a determination that the first portion of the input meets selection criteria:

visually indicating selection of the first object; and generating a first tactile output in conjunction with visually indicating selection of the first object;

while the first object is selected, detecting a second portion of the input by the contact on the touch-sensitive surface, wherein detecting the second portion of the input includes detecting movement of the contact across the touch-sensitive surface;

in response to detecting the second portion of the input by the contact, moving the first object on the user interface in accordance with the movement of the contact;

after detecting the second portion of the input, while the first object is proximate to a first predetermined object snap position, detecting a third portion of the input by the contact on the touch sensitive surface; and in response to detecting the third portion of the input by the contact, and in accordance with a determination that the third portion of the input meets drop-off criteria:

visually indicating deselection of the first object;

moving the first object to the first predetermined object snap position, wherein moving the first object to the first predetermined object snap position includes movement of the first object settling into the first predetermined object snap position; and generating a second tactile output that is synchronized with the movement of the first object settling into the first predetermined object snap position.

38. The electronic device of claim 37, wherein the selection criteria require that a characteristic intensity of the contact exceeds a first intensity threshold and that the contact is maintained for at least a predetermined threshold amount of time in order for the selection criteria to be met.

39. The electronic device of claim 37, wherein the selection criteria require that a characteristic intensity of the contact exceeds a first intensity threshold and a second intensity threshold above the first intensity threshold.

40. The electronic device of claim 37, wherein a second tactile output pattern of the second tactile output is different from a first tactile output pattern of the first tactile output.

41. The electronic device of claim 37, wherein the first tactile output is generated concurrently with visually indicating the selection of the first object.

42. The electronic device of claim 37, wherein the second tactile output is generated concurrently with arrival of the first object at the first predetermined object snap position.

43. The electronic device of claim 37, wherein:

detecting the movement of the contact across the touch-sensitive surface includes detecting that the contact has moved to a threshold location in proximity to an edge of the display;

moving the first object on the user interface in accordance with the movement of the contact includes moving the first object to the threshold location in proximity to the edge of the display in accordance with the movement of the contact; and the one or more programs further include instructions for:

shifting the user interface relative to the first object on the display, such that a previously un-displayed portion of the user interface is displayed underneath the first object; and generating a third tactile output in conjunction with shifting the user interface relative to the first object on the display.

44. The electronic device of claim 37, wherein:

detecting the movement of the contact across the touch-sensitive surface includes detecting that the contact has moved to a threshold location in proximity to a second predetermined object snap position; and moving the first object on the user interface in accordance with the movement of the contact includes:

in response to detecting that the contact has moved to the threshold location in proximity to the second predetermined object snap position, moving the first object, relative to the threshold location, to the second predetermined object snap position; and generating a third tactile output in conjunction with moving the first object to the second predetermined object snap position.

45. The electronic device of claim 37, wherein:

before the first object is moved to the first predetermined snap location, the user interface includes a second object located at the first predetermined snap position, and the user interface includes a second predetermined snap position adjacent to the first predetermined snap position; and the one or more programs further include instructions for:

moving the first object toward the first predetermined snap position;

in accordance with a determination that the first object is within a threshold range of the first predetermined snap position, moving the second object from the first predetermined snap position to the second predetermined object snap position; and generating a fourth tactile output in conjunction with moving the second object to the second predetermined snap position.

46. The electronic device of claim 45, wherein:

the third portion of the input includes lift-off of the contact; and moving the first object toward the first predetermined snap position includes continuing movement of the first object toward the first predetermined snap position after the lift-off of the contact.

47. The electronic device of claim 37, wherein the first tactile output has a higher amplitude than the second tactile output.

48. The electronic device of claim 37, wherein the first tactile output has a same waveform as the second tactile output.

49. The electronic device of claim 37, the one or more programs further including instructions for:

detecting a second input by a second contact on the touch-sensitive surface at a location that corresponds to a third snap position in the user interface; and in accordance with a determination that the second input meets item creation criteria:

displaying a new object in the user interface; and generating a fifth tactile output in conjunction with displaying the new object in the user interface.

50. The electronic device of claim 49, the one or more programs further including instructions for:

detecting termination of the second input, including detecting lift-off of the second contact;

in response to detecting the lift-off of the second contact:

displaying a second user interface for entering information related to the new object;

in accordance with a determination that the second input includes movement of the second contact before the lift-off of the second contact, generating a sixth tactile output; and in accordance with a determination that the second input does not include movement of the second contact before the lift-off of the second contact, forgoing generation of the sixth tactile output.

51. The electronic device of claim 37, the one or more programs further including instructions for:

in response to detecting the first portion of the input by the contact, and in accordance with a determination that the first portion of the input does not meet the selection criteria, scrolling content displayed in the user interface in response to detecting movement of the contact across the touch-sensitive surface.

52. The electronic device of claim 37, wherein:

the user interface is a calendar interface, the plurality of predetermined snap positions correspond to a plurality of dates, and the first object includes a representation of a calendar entry.

53. The electronic device of claim 37, wherein:

the user interface is an application launch user interface that includes a plurality of application icons that correspond to different applications of a plurality of applications, the plurality of predetermined snap positions correspond to a plurality of positions for displaying application icons, and the first object includes a first application icon that corresponds to a first application of the plurality of applications.

54. The electronic device of claim 37, wherein:

the user interface is a weather forecast user interface that includes a plurality of weather items that correspond to different geographical locations of a plurality of geographical locations and include an indication of the weather at a corresponding geographical location, the plurality of predetermined snap positions correspond to a plurality of positions for displaying weather items, and the first object includes a first weather item of the plurality of weather items.

* * * * *